US011036387B2

(12) United States Patent
Karunamuni et al.

(10) Patent No.: US 11,036,387 B2
(45) Date of Patent: Jun. 15, 2021

(54) DEVICES, METHODS, AND GRAPHICAL USER INTERFACES FOR NAVIGATING BETWEEN USER INTERFACES AND INTERACTING WITH CONTROL OBJECTS

(71) Applicant: Apple Inc., Cupertino, CA (US)

(72) Inventors: Chanaka G. Karunamuni, San Jose, CA (US); Marcos Alonso Ruiz, San Francisco, CA (US); Nathan de Vries, San Francisco, CA (US); Brandon M. Walkin, San Francisco, CA (US); Stephen O. Lemay, San Francisco, CA (US); Christopher P. Foss, San Francisco, CA (US); Caelan G. Stack, San Francisco, CA (US); Jeffrey T. Bernstein, San Francisco, CA (US); Julian K. Missig, Redwood City, CA (US); Linda L. Dong, Altadena, CA (US)

(73) Assignee: APPLE INC., Cupertino, CA (US)

( * ) Notice: Subject to any disclaimer, the term of this patent is extended or adjusted under 35 U.S.C. 154(b) by 109 days.

(21) Appl. No.: 15/980,609

(22) Filed: May 15, 2018

(65) Prior Publication Data

US 2018/0335939 A1 Nov. 22, 2018

Related U.S. Application Data

(60) Provisional application No. 62/668,171, filed on May 7, 2018, provisional application No. 62/557,101, filed
(Continued)

(51) Int. Cl.

*G06F 3/0488* (2013.01)
*G06F 3/0486* (2013.01)
(Continued)

(52) U.S. Cl.
CPC ........ *G06F 3/04883* (2013.01); *G06F 3/0481* (2013.01); *G06F 3/0482* (2013.01);
(Continued)

(58) Field of Classification Search
CPC ............... G06F 3/04883; G06F 3/0412; G06F 3/04817; G06F 3/0482; G06F 3/0484;
(Continued)

(56) References Cited

U.S. PATENT DOCUMENTS

| | | | | |
|---|---|---|---|---|
| 9,547,525 | B1 | 1/2017 | Trainor et al. | |
| 10,481,769 | B2 * | 11/2019 | Karunamuni | ....... G06F 3/04886 |

(Continued)

FOREIGN PATENT DOCUMENTS

| | | | |
|---|---|---|---|
| AU | 2016100649 | A4 | 6/2016 |
| CN | 201942663 | U | 8/2011 |

(Continued)

OTHER PUBLICATIONS

Gurman, "How Apple Plans to Change the Way You Use the Next iPhone", https://web.archive.org/web/20170830102248/https://www.bloomberg.com/news/articles/2017-08-30/how-apple-plans-to-change-the-way-we use-the-next-iphone, Aug. 30, 2017, 4 pages.
(Continued)

*Primary Examiner* — Andrew T Chiusano
(74) *Attorney, Agent, or Firm* — Morgan, Lewis & Bockius LLP

(57) ABSTRACT

An electronic device with a display and a touch-sensitive surface displays a first user interface of a first application. The device detects an input a contact on the touch-sensitive surface, movement of the contact across the touch-sensitive surface, and liftoff of the contact at an end of the movement. In response, the device, in accordance with a determination that the input meets last-application-display criteria, displays a second user interface of a second application that is
(Continued)

distinct from the first application; and in accordance with a determination that the input meets home-display criteria, displays a home screen user interface that includes a plurality of application launch icons that correspond to a plurality of applications installed on the device.

63 Claims, 406 Drawing Sheets

Related U.S. Application Data on Sep. 11, 2017, provisional application No. 62/556,410, filed on Sep. 9, 2017, provisional application No. 62/514,900, filed on Jun. 4, 2017, provisional application No. 62/507,212, filed on May 16, 2017.

(51) Int. Cl.

| | |
|---|---|
| ***G06F 3/0484*** | (2013.01) |
| ***G06F 3/0481*** | (2013.01) |
| ***G06F 9/451*** | (2018.01) |
| ***G06F 9/445*** | (2018.01) |
| ***G06F 3/0482*** | (2013.01) |
| ***G06F 9/44*** | (2018.01) |
| ***G06F 8/38*** | (2018.01) |

(52) U.S. Cl.

CPC .......... *G06F 3/0484* (2013.01); *G06F 3/0486* (2013.01); *G06F 3/04817* (2013.01); *G06F 3/04847* (2013.01); *G06F 3/04886* (2013.01); *G06F 8/38* (2013.01); *G06F 9/44* (2013.01); *G06F 9/445* (2013.01); *G06F 9/451* (2018.02)

(58) Field of Classification Search

CPC .. G06F 3/0481; G06F 3/04847; G06F 3/0486; G06F 3/04886; G06F 9/451; G06F 9/44; G06F 9/445; G06F 8/38

See application file for complete search history.

(56) References Cited

U.S. PATENT DOCUMENTS

2007/0222768 A1 9/2007 Geurts et al.
2007/0288862 A1 12/2007 Ording
2009/0037846 A1 2/2009 Spalink et al.
2010/0017710 A1 1/2010 Kim et al.
2010/0088639 A1 4/2010 Yach et al.
2010/0162182 A1 6/2010 Oh et al.
2011/0157029 A1 6/2011 Tseng
2011/0252357 A1 10/2011 Chaudhri
2011/0252380 A1* 10/2011 Chaudhri ............ G06F 3/04842 715/836
2012/0192117 A1 7/2012 Migos et al.
2012/0236037 A1 9/2012 Lessing et al.
2012/0284673 A1* 11/2012 Lamb .................. G06F 3/04883 715/863
2012/0299968 A1 11/2012 Wong et al.
2012/0304132 A1 11/2012 Sareen et al.
2012/0319984 A1 12/2012 Borovsky et al.
2013/0145295 A1* 6/2013 Bocking ................. G06F 3/017 715/764
2013/0159930 A1* 6/2013 Paretti ................... G06F 3/0488 715/821
2013/0174179 A1 7/2013 Park et al.
2013/0205304 A1 8/2013 Jeon et al.
2013/0215040 A1 8/2013 Bose et al.
2013/0227495 A1 8/2013 Rydenhag et al.
2013/0325481 A1 12/2013 Van Os et al.
2014/0053116 A1* 2/2014 Smith ................... G06F 3/0488 715/863
2014/0137008 A1* 5/2014 Pan ..................... G06F 3/04883 715/761
2014/0137020 A1 5/2014 Sharma et al.
2014/0143696 A1 5/2014 Weng et al.
2014/0210753 A1 7/2014 Lee et al.
2014/0229888 A1 8/2014 Ko et al.
2014/0365945 A1 12/2014 Karunamuni et al.
2015/0046867 A1 2/2015 Moore et al.
2015/0135108 A1 5/2015 Pope et al.
2015/0153929 A1* 6/2015 Bernstein .............. G06F 3/0481 715/781
2015/0169071 A1* 6/2015 Jitkoff ................. G06F 3/04883 715/863
2016/0004429 A1 1/2016 Bernstein et al.
2016/0062642 A1 3/2016 Borovsky et al.
2016/0224220 A1 8/2016 Ganguly
2016/0259497 A1 9/2016 Foss et al.
2016/0334960 A1 11/2016 Brown et al.
2016/0356613 A1 12/2016 Hajj et al.
2016/0357305 A1 12/2016 Wells et al.
2016/0357368 A1* 12/2016 Federighi .............. G06F 3/0488
2016/0357390 A1 12/2016 Federighi et al.
2016/0357404 A1 12/2016 Alonso Ruiz et al.
2016/0378334 A1 12/2016 Liu et al.
2017/0068410 A1 3/2017 Alonso Ruiz et al.
2018/0329550 A1* 11/2018 Dellinger .............. G06F 3/0486
2018/0335921 A1* 11/2018 Karunamuni ......... G06F 3/0488
2018/0335939 A1* 11/2018 Karunamuni ......... G06F 3/0481
2019/0018565 A1* 1/2019 Lee ....................... G06F 1/1643
2019/0212892 A1 7/2019 Karunamuni et al.
2019/0339855 A1* 11/2019 Walkin .............. H04M 1/72522
2020/0301556 A1 9/2020 Alonso Ruiz et al.

FOREIGN PATENT DOCUMENTS

| | | | |
|---|---|---|---|
| CN | 106227374 | A | 12/2014 |
| CN | 106227440 | A | 12/2014 |
| CN | 104487928 | A | 4/2015 |
| CN | 104508618 | A | 4/2015 |
| CN | 104903835 | A | 9/2015 |
| CN | 106133748 | A | 11/2016 |
| CN | 106155549 | A | 11/2016 |
| CN | 106201316 | A | 12/2016 |
| CN | 106489112 | A | 3/2017 |
| EP | 2 434 368 | A1 | 3/2012 |
| EP | 2434368 | A1 | 3/2012 |
| JP | 2014-515519 | A | 6/2014 |
| JP | 2015-507312 | A | 3/2015 |
| JP | 2016-511854 | A | 4/2016 |
| JP | 2017-522841 | A | 8/2017 |
| KR | 20130063019 | A | 6/2013 |
| KR | 20130076397 | A | 7/2013 |
| KR | 20150104587 | A | 9/2015 |
| WO | WO 2013/169870 | A1 | 11/2013 |
| WO | WO 2015/023419 | A1 | 2/2015 |
| WO | WO 2016/200586 | A1 | 12/2016 |

OTHER PUBLICATIONS

Patent, dated Jul. 11, 2019, received in Danish Patent Application No. 201770710, which corresponds with U.S. Appl. No. 15/879,111, 5 pages.

Office Action, dated Jun. 10, 2019, received in Japanese Patent Application No. 2018-516725, which corresponds with U.S. Appl. No. 15/879,111, 8 pages.

Patent, dated May 17, 2019, received in Korean Patent Application No. 2018-7013172, which corresponds with U.S. Appl. No. 15/879,111, 5 pages.

Office Action, dated May 10, 2019, received in Australian Patent Application No. 2018253513, which corresponds with U.S. Appl. No. 15/879,111, 4 pages.

Office Action, dated Apr. 25, 2019, received in Chinese Patent Application No. 201880000251.6, which corresponds with U.S. Appl. No. 15/879,111, 5 pages.

Notice of Allowance, dated May 1, 2019, received in Danish Patent Application No. 201770377, which corresponds with U.S. Appl. No. 15/879,111, 2 pages.

(56) References Cited

OTHER PUBLICATIONS

Notice of Allowance, dated May 8, 2019, received in Danish Patent Application No. 201770710, which corresponds with U.S. Appl. No. 15/879,111, 2 pages.
Notice of Allowance, dated Nov. 29, 2018, received in U.S. Appl. No. 15/879,111, 9 pages.
Certificate of Grant, dated Nov. 8, 2018, received in Australian Patent Application No. 2018201254, which corresponds with U.S. Appl. No. 15/879,111, 4 pages.
Office Action, dated Dec. 13, 2018, received in Danish Patent Application No. 201770377, which corresponds with U.S. Appl. No. 15/879,111, 2 pages.
Office Action, dated Feb. 19, 2019, received in Danish Patent Application No. 201770377, which corresponds with U.S. Appl. No. 15/879,111, 2 pages.
Patent, dated Jan. 8, 2019, received in Danish Patent Application No. 201770709, which corresponds with U.S. Appl. No. 15/879,111, 5 pages.
Intention to Grant, dated Feb. 15, 2019, received in Danish Patent Application No. 201770710, which corresponds with U.S. Appl. No. 15/879,111, 2 pages.
Office Action, dated Dec. 3, 2018, received in Korean Patent Application No. 2018-7013727, which corresponds with U.S. Appl. No. 15/879,111, 2 pages.
Notice of Allowance, dated Mar. 3, 2019, received in Korean Patent Application No. 2018-7013727, which corresponds with U.S. Appl. No. 15/879,111, 6 pages.
Notice of Allowance, dated Oct. 30, 2018, received in U.S. Appl. No. 15/879,111, 9 pages.
Office Action, dated Oct. 16, 2018, received in Danish Patent Application No. 201770710, which corresponds with U.S. Appl. No. 15/879,111, 3 pages.
International Search Report and Written Opinion, dated Aug. 13, 2018, received in International Patent Application No. PCT/US2018/015434, which corresponds with U.S. Appl. No. 15/879,111, 17 pages.
Invitation to Pay, dated Sep. 7, 2018, received in International Patent Application No. PCT/US2018/032976, which corresponds with U.S. Appl. No. 15/879,111, 12 pages.
International Search Report and Written Opinion, dated Nov. 2, 2018, received in International Patent Application No. PCT/US2018/032976, which corresponds with U.S. Appl. No. 15/879,111, 16 pages.
YouTube, "Seng 1.2 Review: the Bestg App Switcher Tweak for iOS 9", https://www.youtube.com/watch?v=FA4bIL15E0, Dec. 15, 2015, 3 pages.
Office Action, dated Jun. 14, 2018, received in U.S. Appl. No. 15/879,111, 25 pages.
Office Action, dated Mar. 22, 2013, received in Australian Patent Application No. 2018201254, which corresponds with U.S. Appl. No. 15/879,111, 4 pages.
Notice of Acceptance, dated Jul. 11, 2018, received in Australian Patent Application No. 2018201254, which corresponds with U.S. Appl. No. 15/879,111, 3 pages.
Office Action, dated Aug. 4, 2017, received in Danish Patent Application No. 201770377, which corresponds with U.S. Appl. No. 15/879,111, 9 pages.
Office Action, dated Mar. 23, 2018, received in Danish Patent Application No. 201770377, which corresponds with U.S. Appl. No. 15/879,111, 3 pages.
Office Action, dated Jul. 13, 2018, received in Danish Patent Application No. 201770377, which corresponds with U.S. Appl. No. 15/879,111, 2 pages.
Office Action, dated Nov. 6, 2017, received in Danish Patent Application No. 201770709, which corresponds with U.S. Appl. No. 15/879,111, 15 pages.
Office Action, dated Jan. 12, 2018, received in Danish Patent Application No. 201770709, which corresponds with U.S. Appl. No. 15/879,111, 3 pages.
Office Action, dated Feb. 7, 2018, received in Danish Patent Application No. 201770709, which corresponds with U.S. Appl. No. 15/879,111, 2 pages.
Notice of Allowance, dated Mar. 27, 2018, received in Danish Patent Application No. 201770709, which corresponds with U.S. Appl. No. 15/879,111, 2 pages.
Office Action, dated Oct. 16, 2017, received in Danish Patent Application No. 201770710, which corresponds with U.S. Appl. No. 15/879,111, 10 pages.
Office Action, dated Apr. 9, 2018, received in Danish Patent Application No. 201770710, which corresponds with U.S. Appl. No. 15/879,111, 5 pages.
Office Action, dated Dec. 20, 2019, received in Chinese Patent Application No. 201910389055.9, which corresponds with U.S. Appl. No. 15/879,111, 7 pages.
Patent, dated Nov. 8, 2019, received in Japanese Patent Application No. 2018-516725, which corresponds with U.S. Appl. No. 15/879,111, 3 pages.
Extended European Search Report, dated Feb. 3, 2020, received in European Patent Application No. 18173877.2, which corresponds with U.S. Appl. No. 15/879,111, 5 pages.
Patent, dated Aug. 7, 2020, received in Chinese Patent Application No. 2019103890525, which corresponds with U.S. Appl. No. 15/879,111, 7 pages.
Patent, dated Aug. 11, 2020, received in Chinese Patent Application No. 201910389055.9, which corresponds with U.S. Appl. No. 15/879,111, 7 pages.
Patent, dated Jun. 30, 2020, received in Korean Patent Application No. 2019-7014088, which corresponds with U.S. Appl. No. 15/980,609, 5 pages.
Office Action, dated Jul. 15, 2020, received in U.S. Appl. No. 16/262,808, 14 pages.
Office Action, dated Aug. 14, 2020, received in Australian Patent Application No. 2020200937, which corresponds with U.S. Appl. No. 16/262,808, 5 pages.
Office Action, dated Sep. 21, 2020, received in Korean Patent Application No. 2020-7018724, which corresponds with U.S. Appl. No. 16/262,808, 8 pages.
Patent, dated May 14, 2020, received in Australian Patent Application No. 2018253513, which corresponds with U.S. Appl. No. 15/879,111, 3 pages.
Notice of Allowance, dated Apr. 7, 2020, received in Chinese Patent Application No. 201880000251.6, which corresponds with U.S. Appl. No. 15/879,111, 10 pages.
Patent, dated Jun. 19, 2020, received in Chinese Patent Application No. 201880000251.6, which corresponds with U.S. Appl. No. 15/879,111, 7 pages.
Office Action, dated Mar. 24, 2020, received in Chinese Patent Application No. 2019103890525, which corresponds with U.S. Appl. No. 15/879,111, 5 pages.
Notice of Allowance, dated May 26, 2020, received in Chinese Patent Application No. 201910389055.9, which corresponds with U.S. Appl. No. 15/879,111, 9 pages.
Office Action, dated Apr. 3, 2020, received in European Patent Application No. 18702895.6, which corresponds with U.S. Appl. No. 15/879,111, 6 pages.
Office Action, dated Apr. 2, 2020, received in Danish Patent Application No. 201970234, which corresponds with U.S. Appl. No. 16/262,808, 2 pages.
Notice of Acceptance, dated Oct. 28, 2019, received in Australian Patent Application No. 2018253513, which corresponds with U.S. Appl. No. 15/879,111, 3 pages.
Office Action, dated Oct. 16, 2019, received in Chinese Patent Application No. 201880000251.6, which corresonds with U.S. Appl. No. 15/879,111, 4 pages.
Office Action, dated Nov. 11, 2019, received in Chinese Patent Application No. 2019103890525, which corresponds with U.S. Appl. No. 15/879,111, 5 pages.
Patent, dated Aug. 29, 2019, received in Danish Patent Application No. 201770377, which corresponds with U.S. Appl. No. 15/879,111, 5 pages.

(56) References Cited

OTHER PUBLICATIONS

Notice of Allowance, dated Oct. 11, 2019, received in Japanese Patent Application No. 2018-516725, which corresponds with U.S. Appl. No. 15/879,111, 5 pages.
Office Action, dated Sep. 30, 2019, received in Korean Patent Application No. 2019-7014088, which corresponds with U.S. Appl. No. 15/980,609, 4 pages.
Office Action, dated Nov. 8, 2019, received in Danish Patent Application No. 201970234, which corresponds with U.S. Appl. No. 16/262,808, 9 pages.
Intention to Grant, dated Dec. 21, 2020, received in European Patent Application No. 19173877.2, which corresponds with U.S. Appl. No. 15/879,111, 7 pages.
Office Action, dated Jan. 29, 2021, received in Indian Patent Application No. 201817025620, which corresponds with U.S. Appl. No. 15/879,111, 7 pages.
Notice of Allowance, dated Jan. 4, 2021, received in Japanese Patent Application No. 2019-197534, which corresponds with U.S. Appl. No. 15/980,609, 2 pages.
Notice of Allowance, dated Dec. 9, 2020, received in U.S. Appl. No. 16/262,808, 7 pages.
Office Action, dated Jan. 8, 2021, received in Danish Patent Application No. 201970234, which corresponds with U.S. Appl. No. 16/262,808, 4 pages.
Patent, dated Feb. 5, 2021, received in Japanese Patent Application No. 2019-197534, which corresponds with U.S. Appl. No. 15/980,609, 3 pages.
Notice of Acceptance, dated Jan. 18, 2021, received in Australian Patent Application No. 2020200937, which corresponds with U.S. Appl. No. 16/262,808, 3 pages.
Notice of Allowance, dated Feb. 25, 2021, received in Korean Patent Application No. 2020-7018724, which corresponds with U.S. Appl. No. 16/262,808, 2 pages.

* cited by examiner

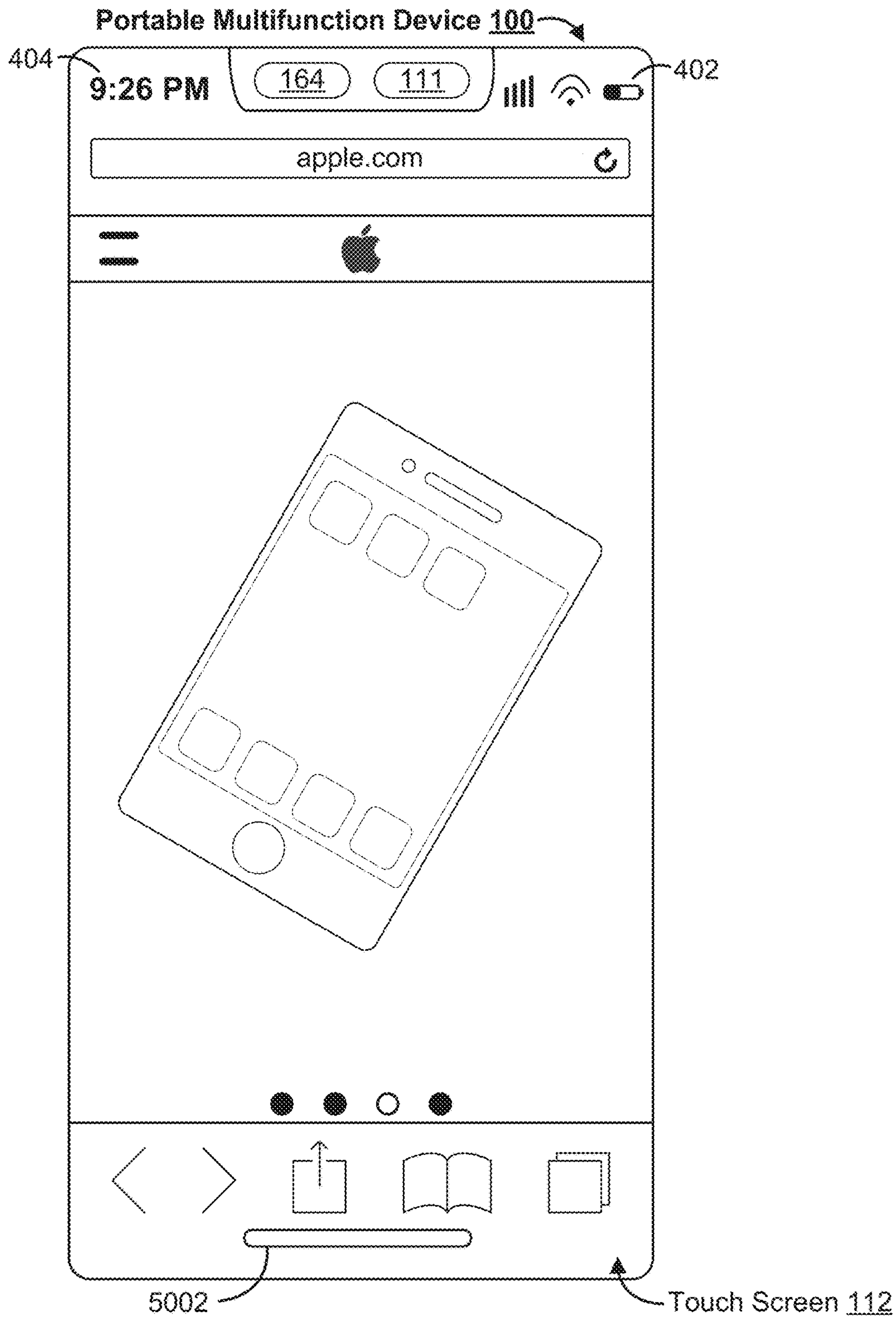
Figure 5A1

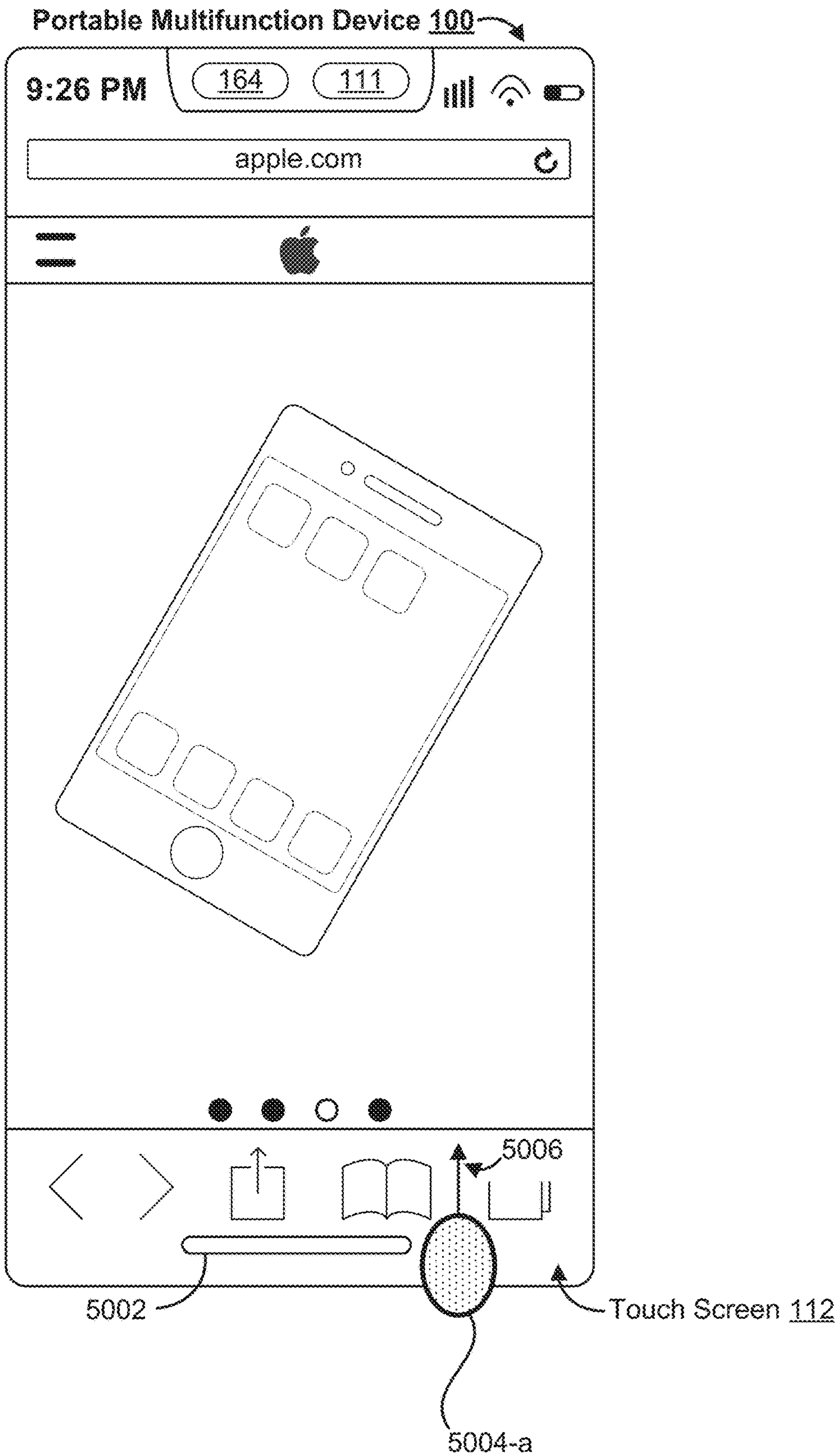
Figure 5A2

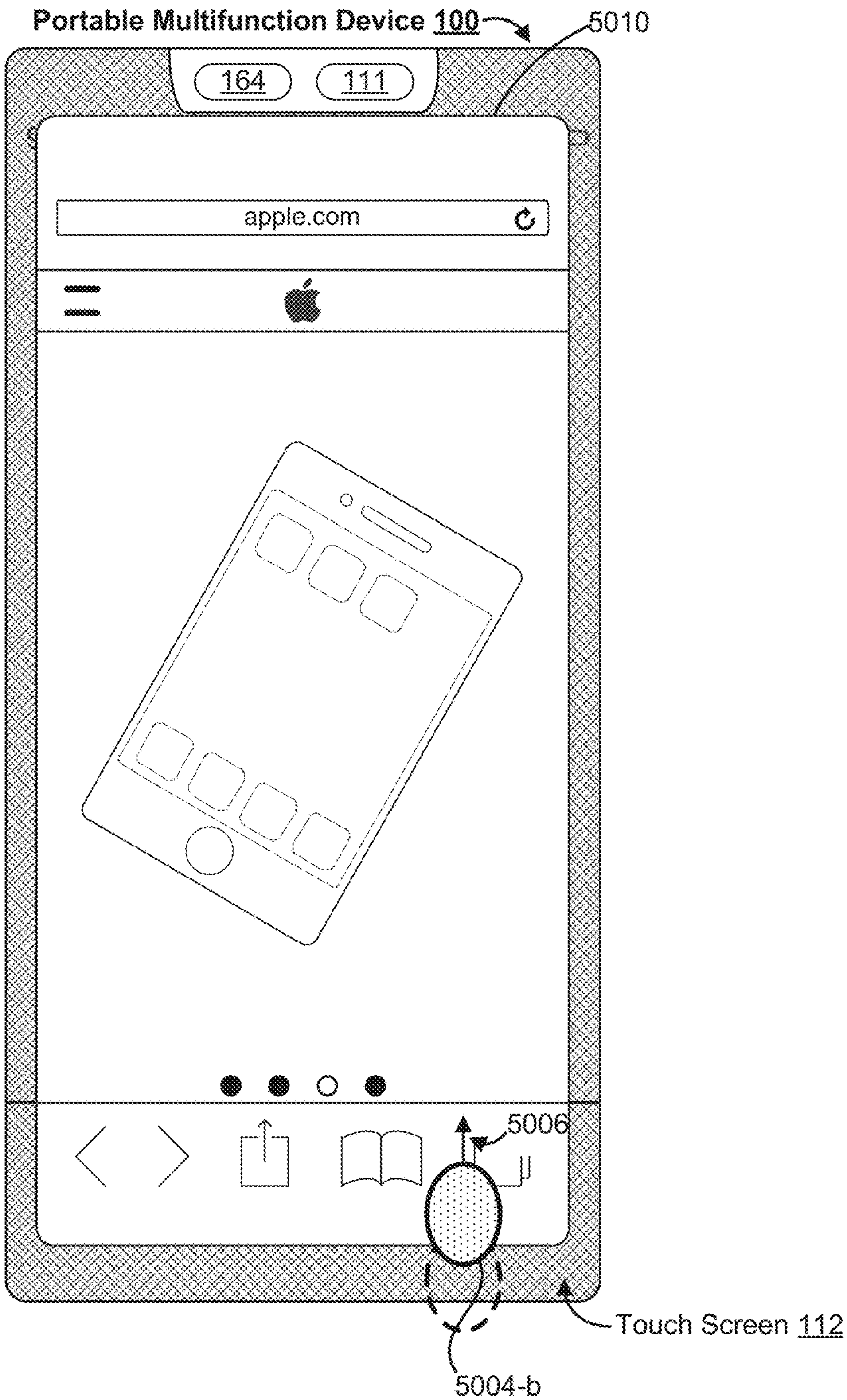
Figure 5A3

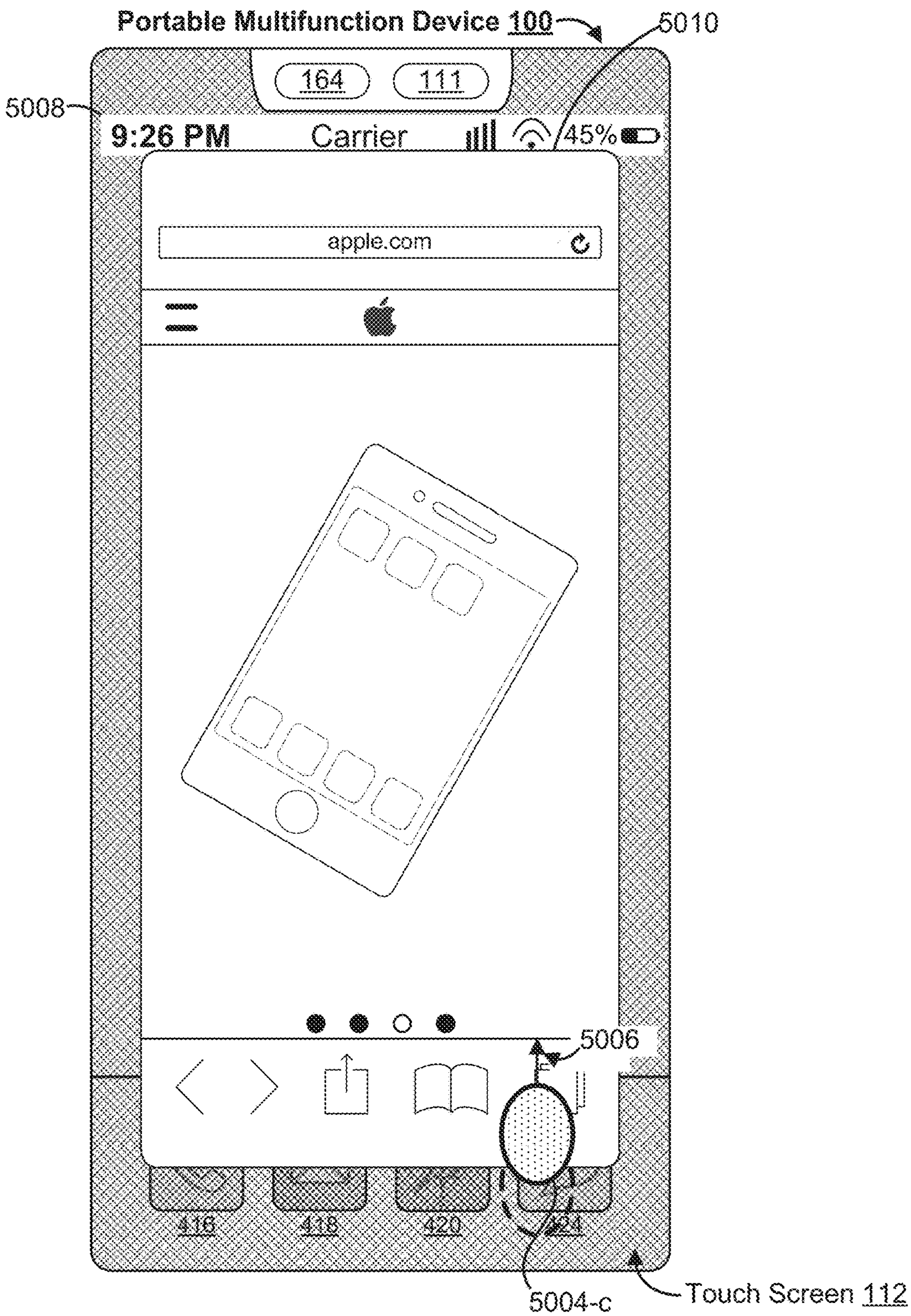
Figure 5A4

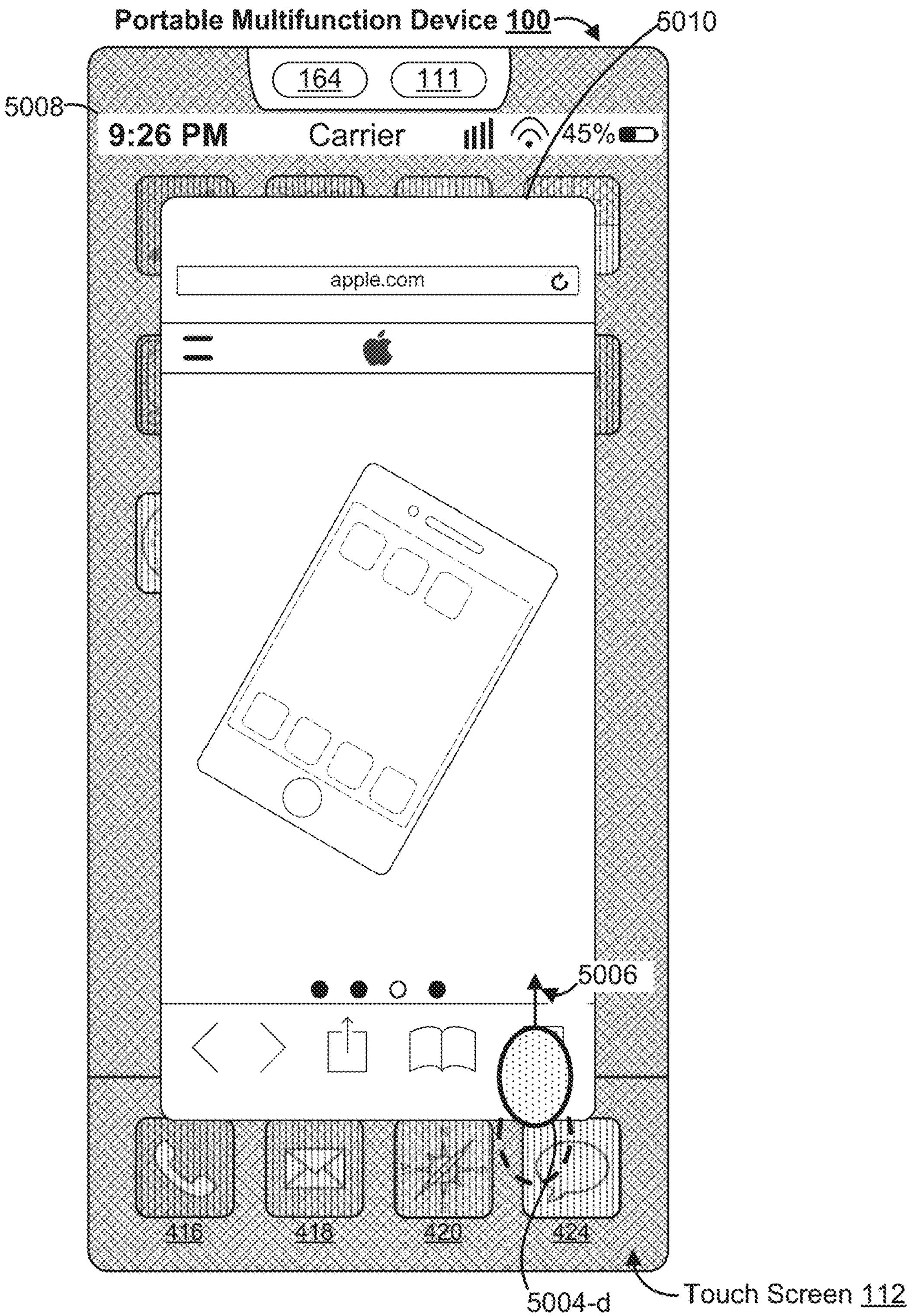
Figure 5A5

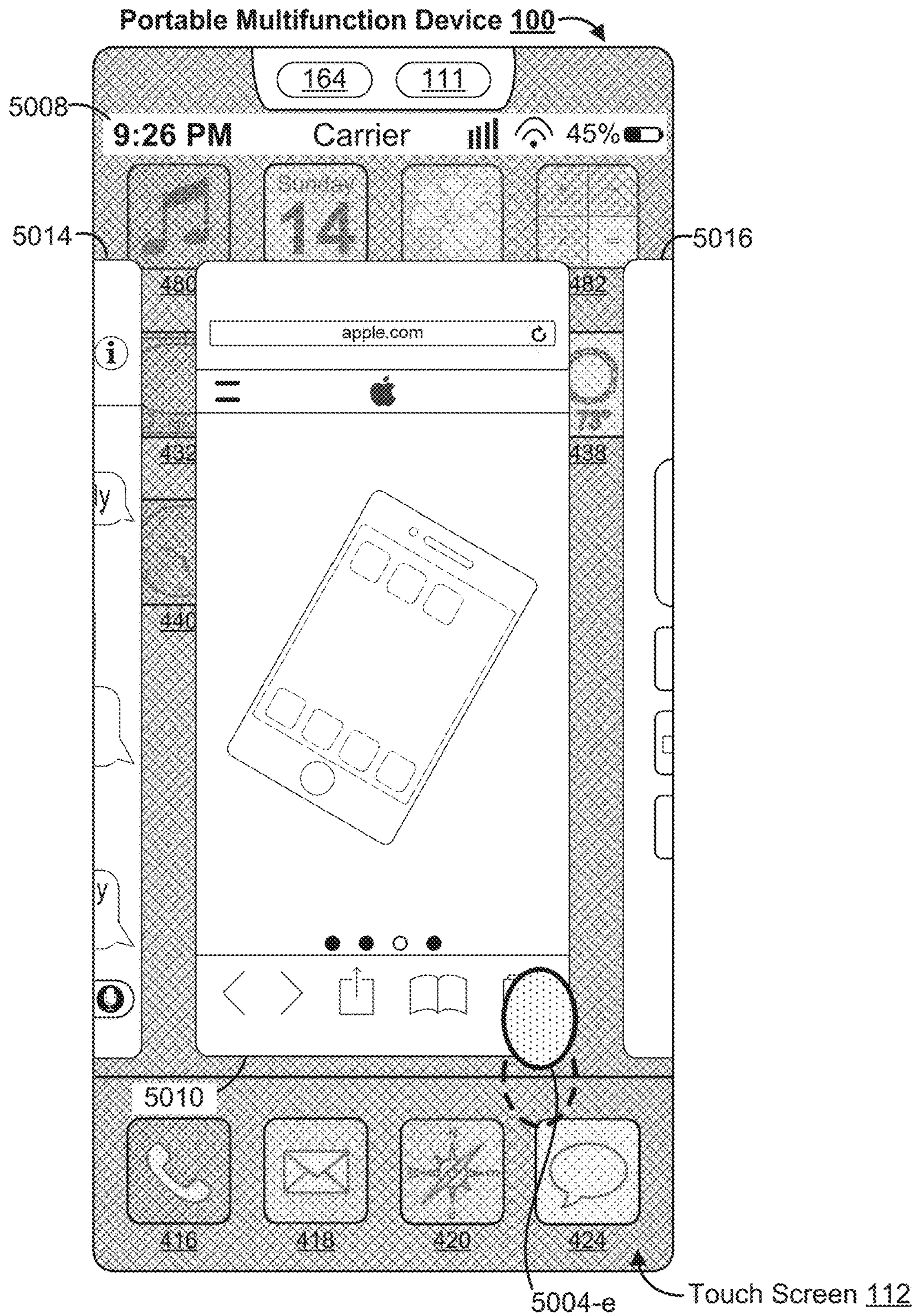
Figure 5A6

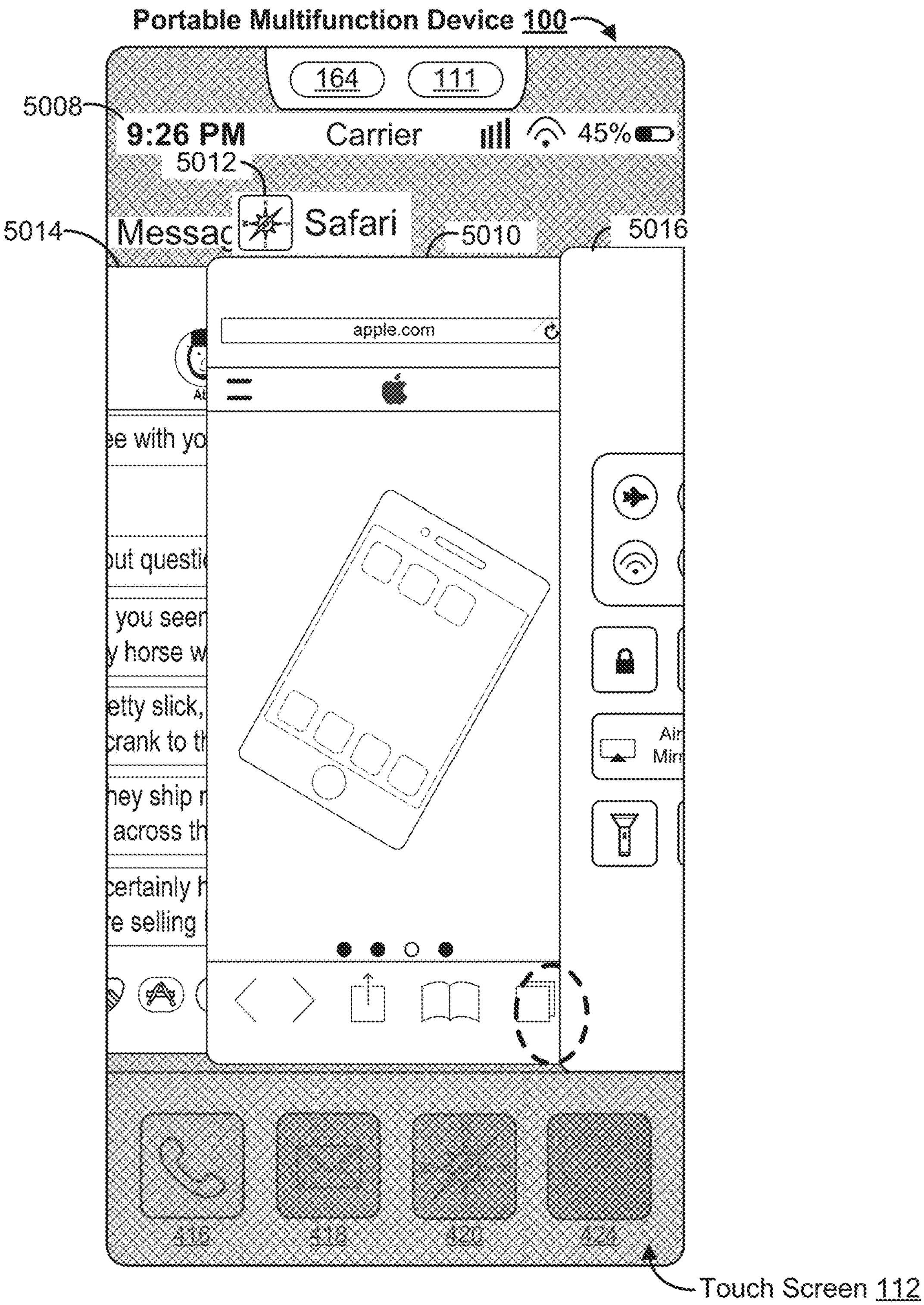
Figure 5A7

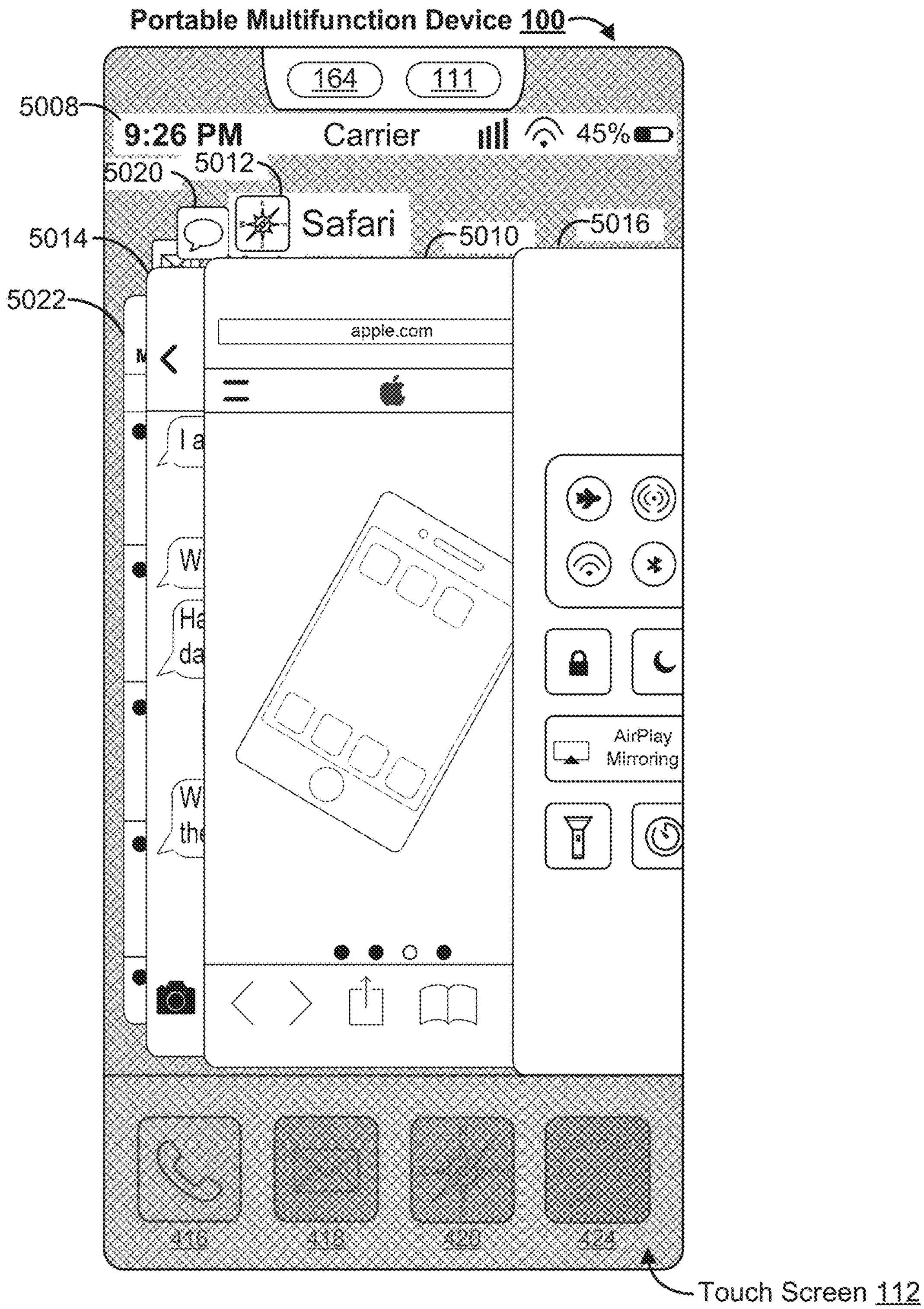
Figure 5A8

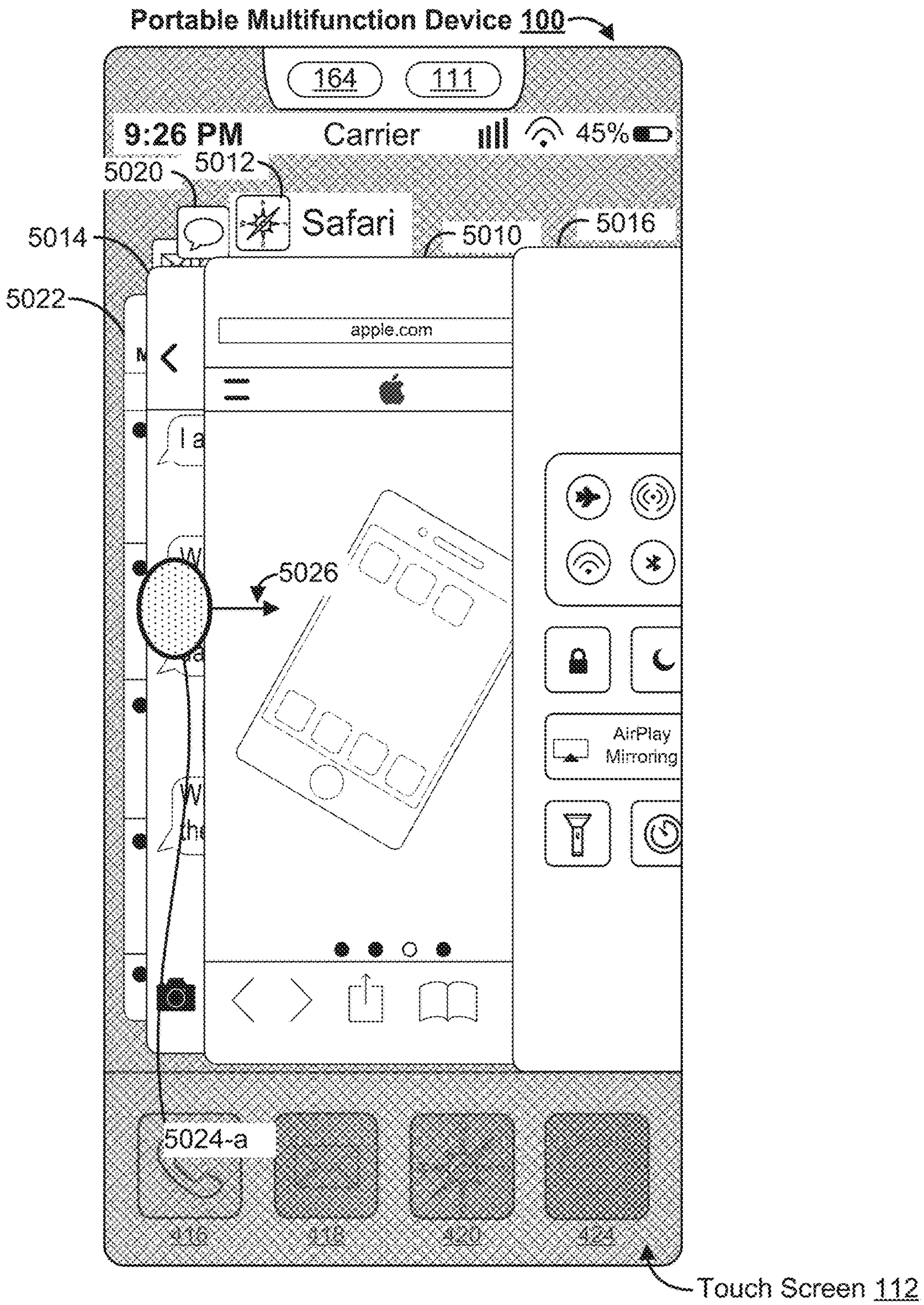
Figure 5A9

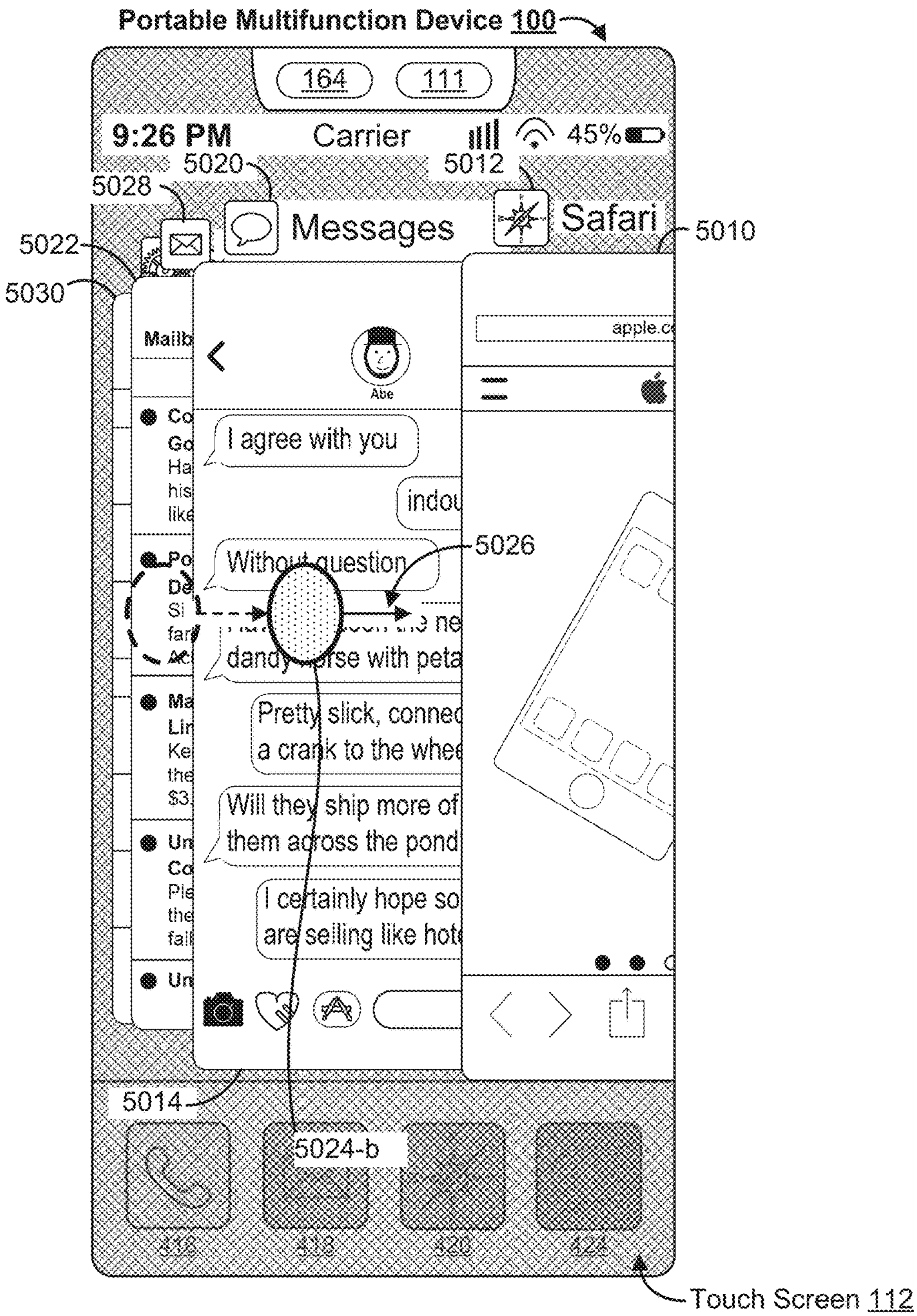
Figure 5A10

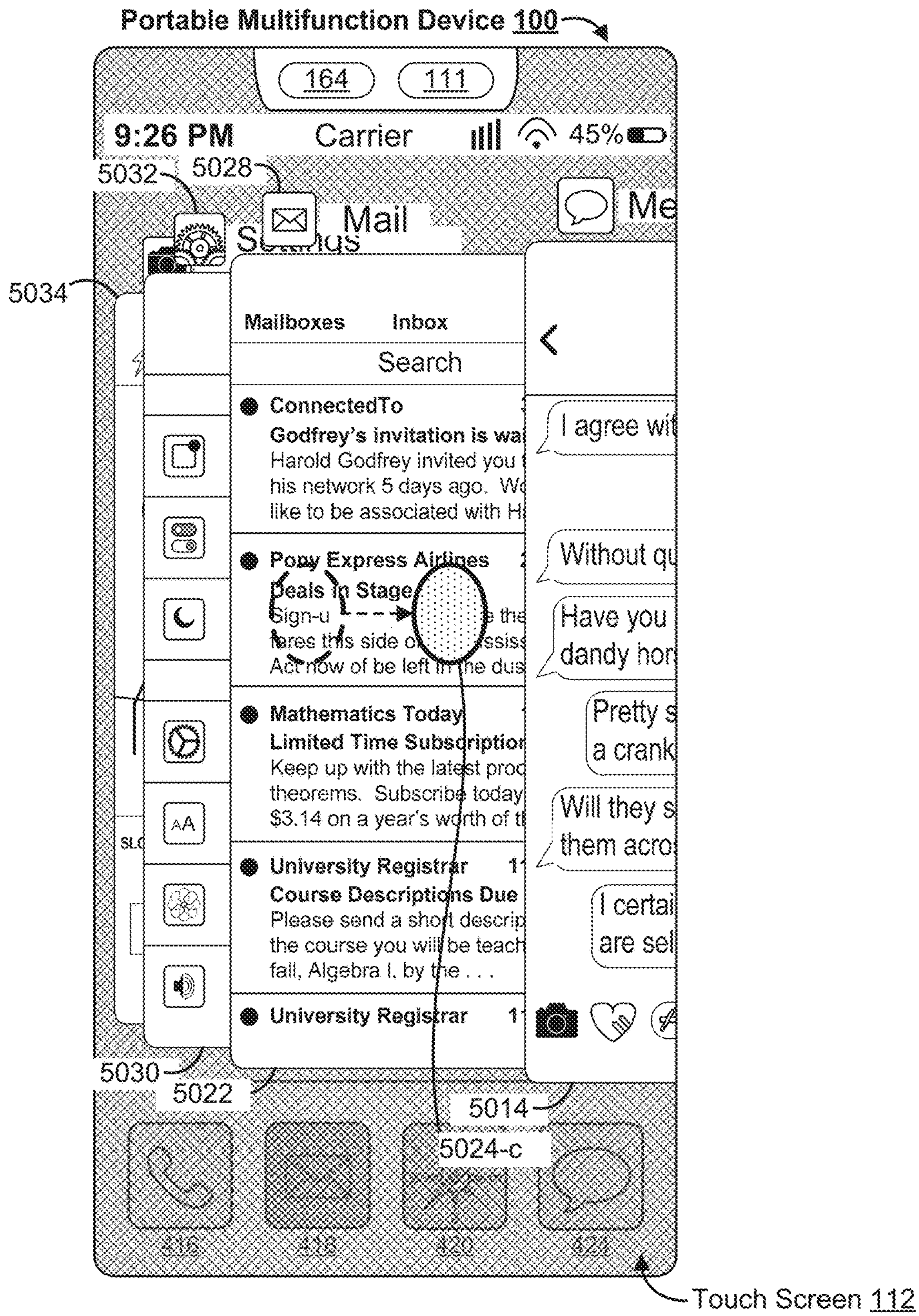
Figure 5A11

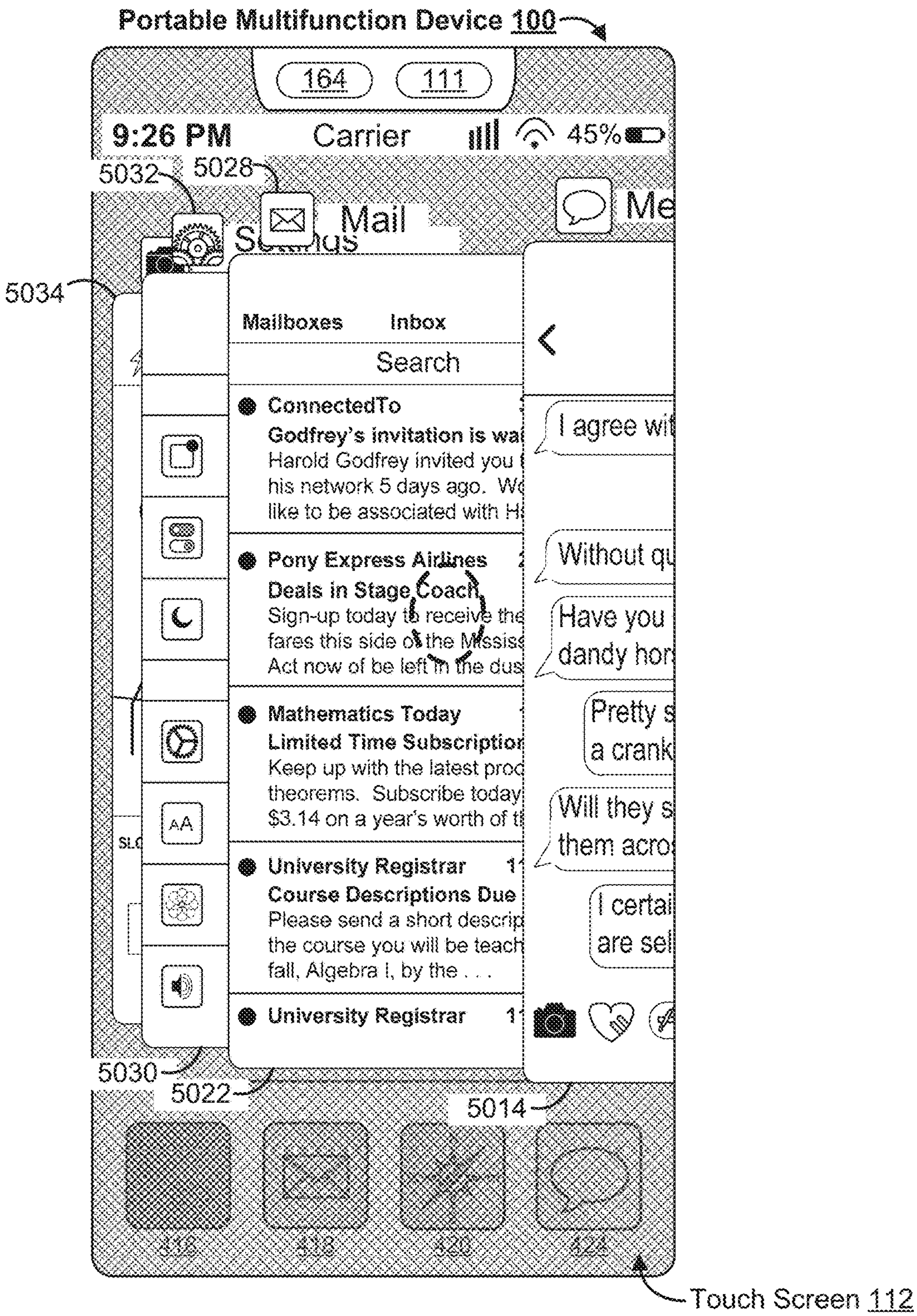
Figure 5A12

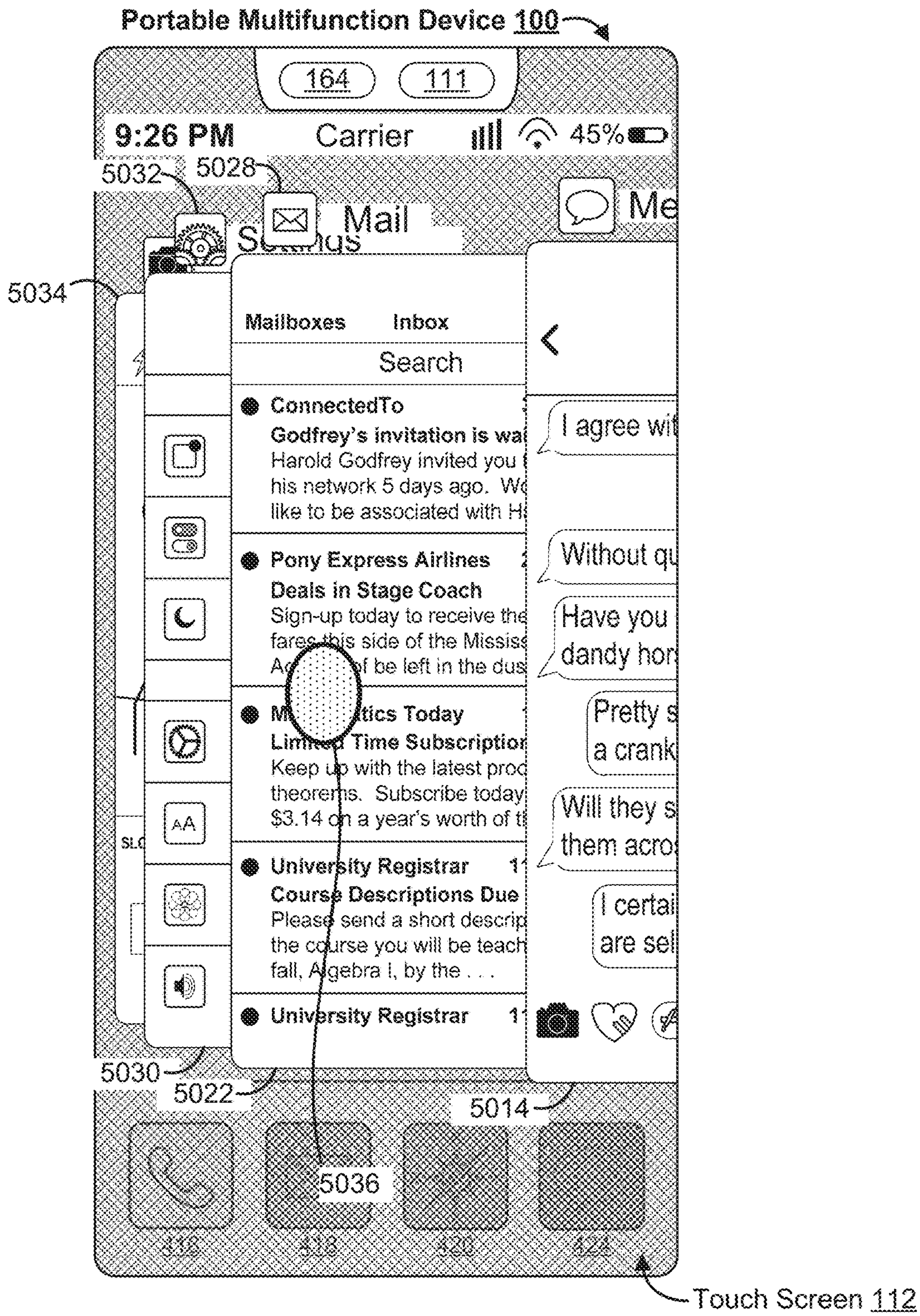
Figure 5A13

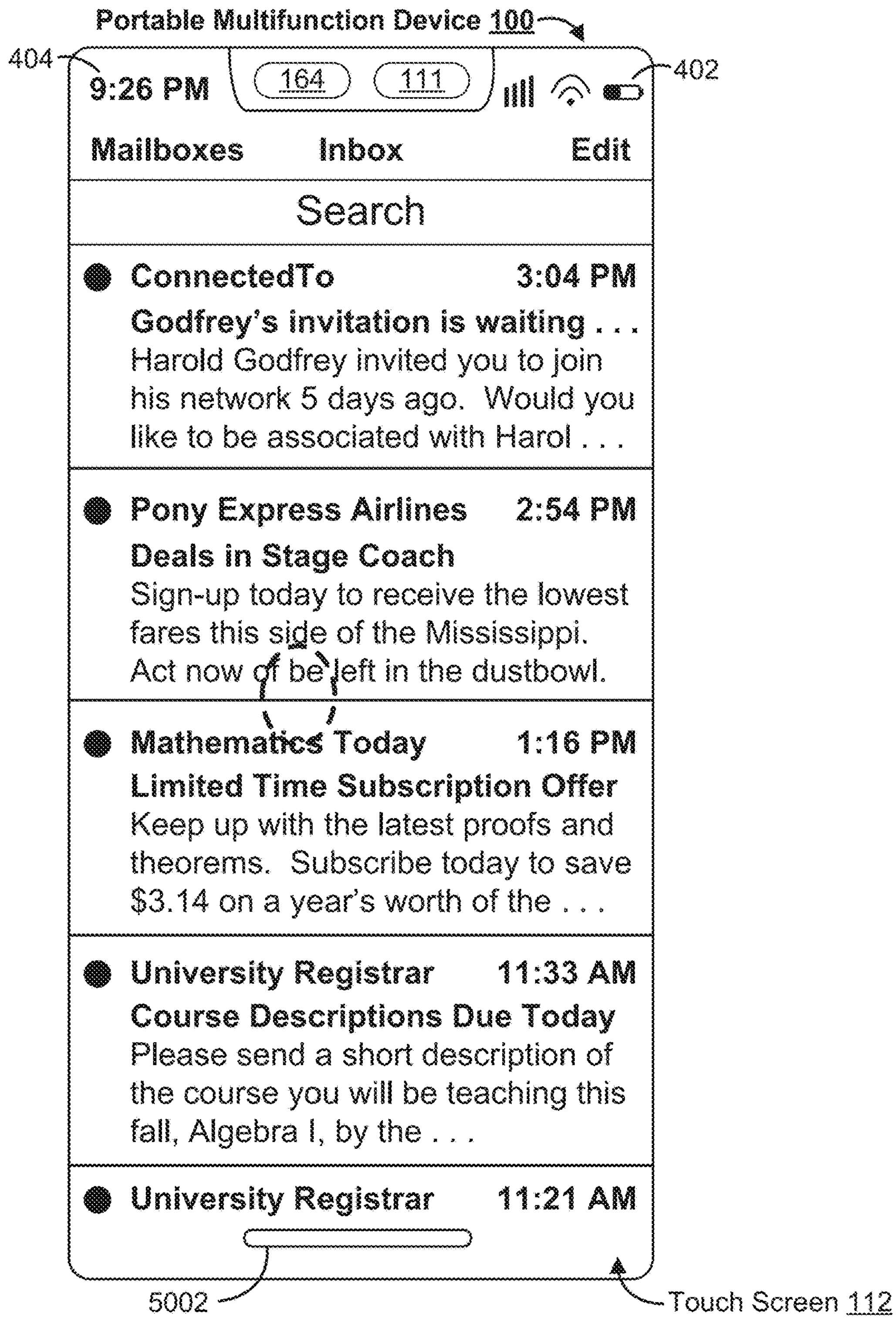
Figure 5A14

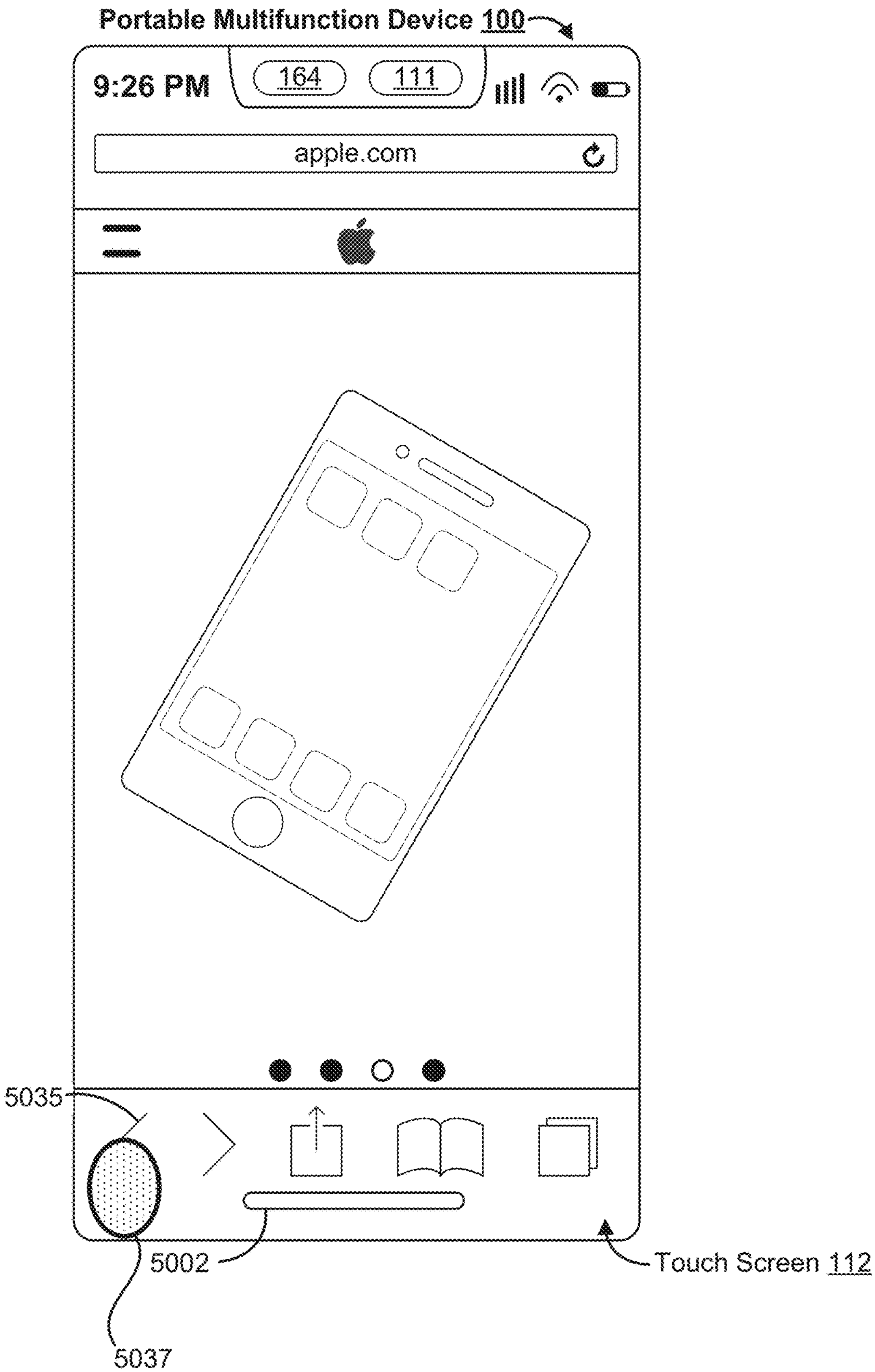
Figure 5A15

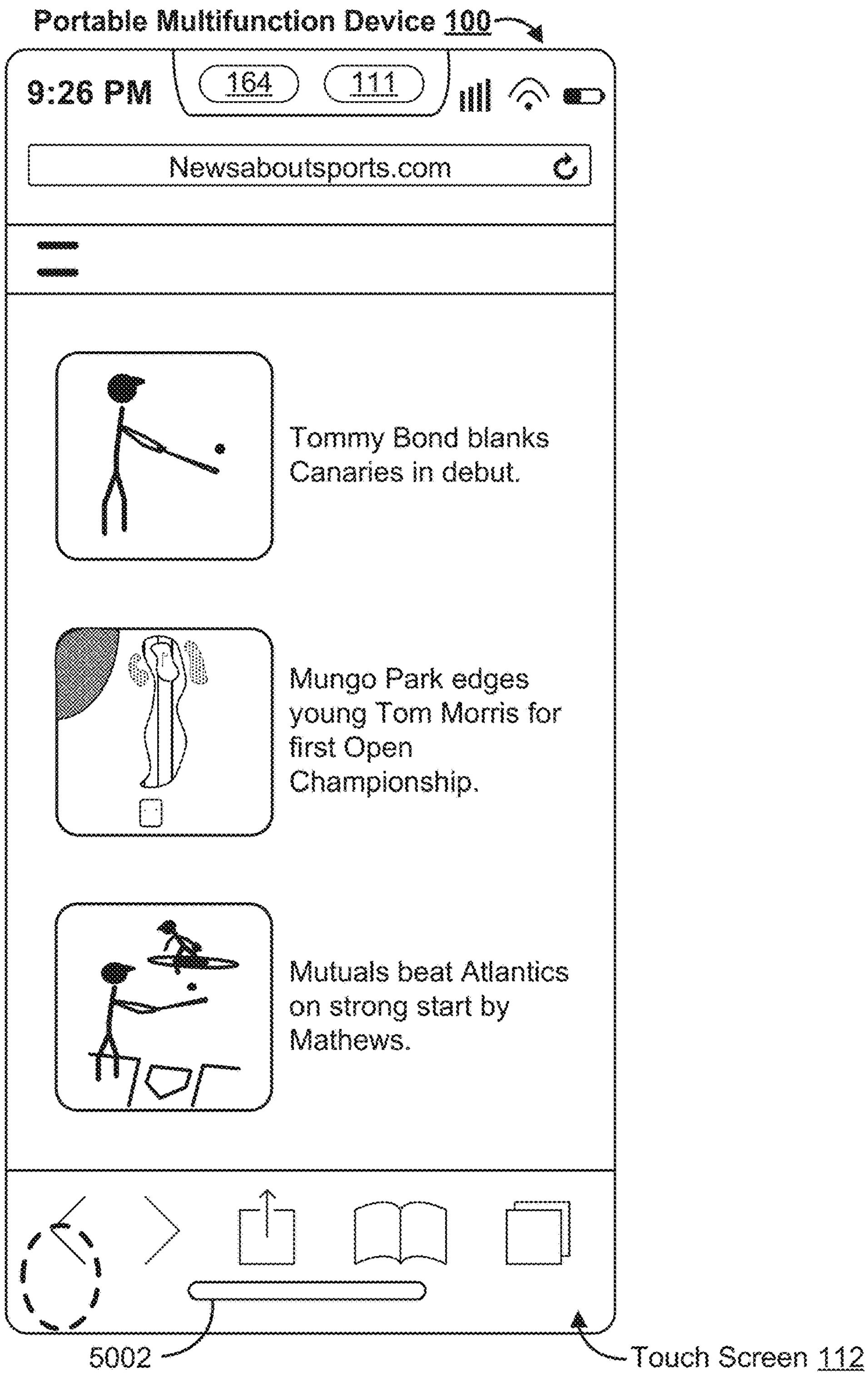
Figure 5A16

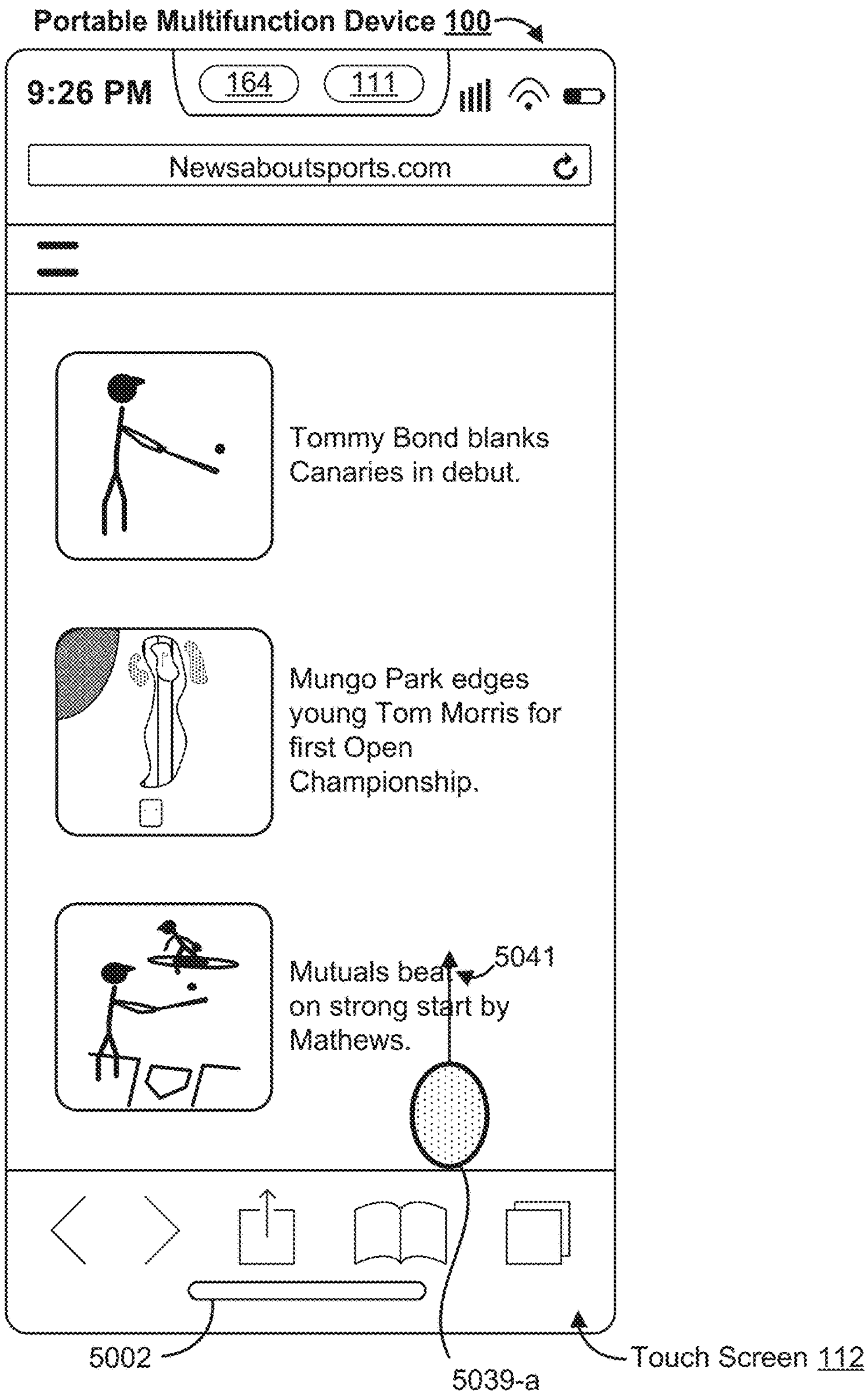
Figure 5A17

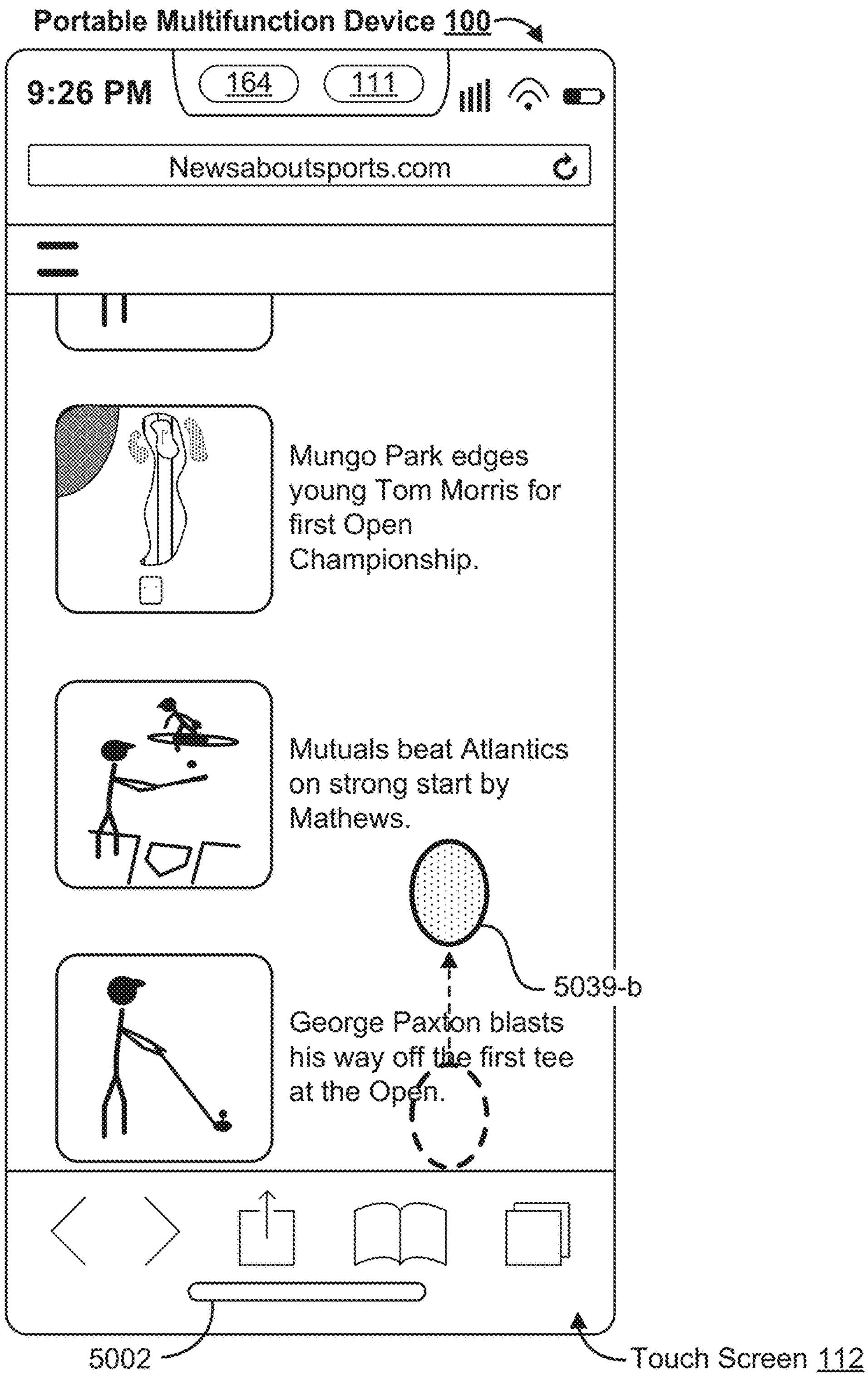
Figure 5A18

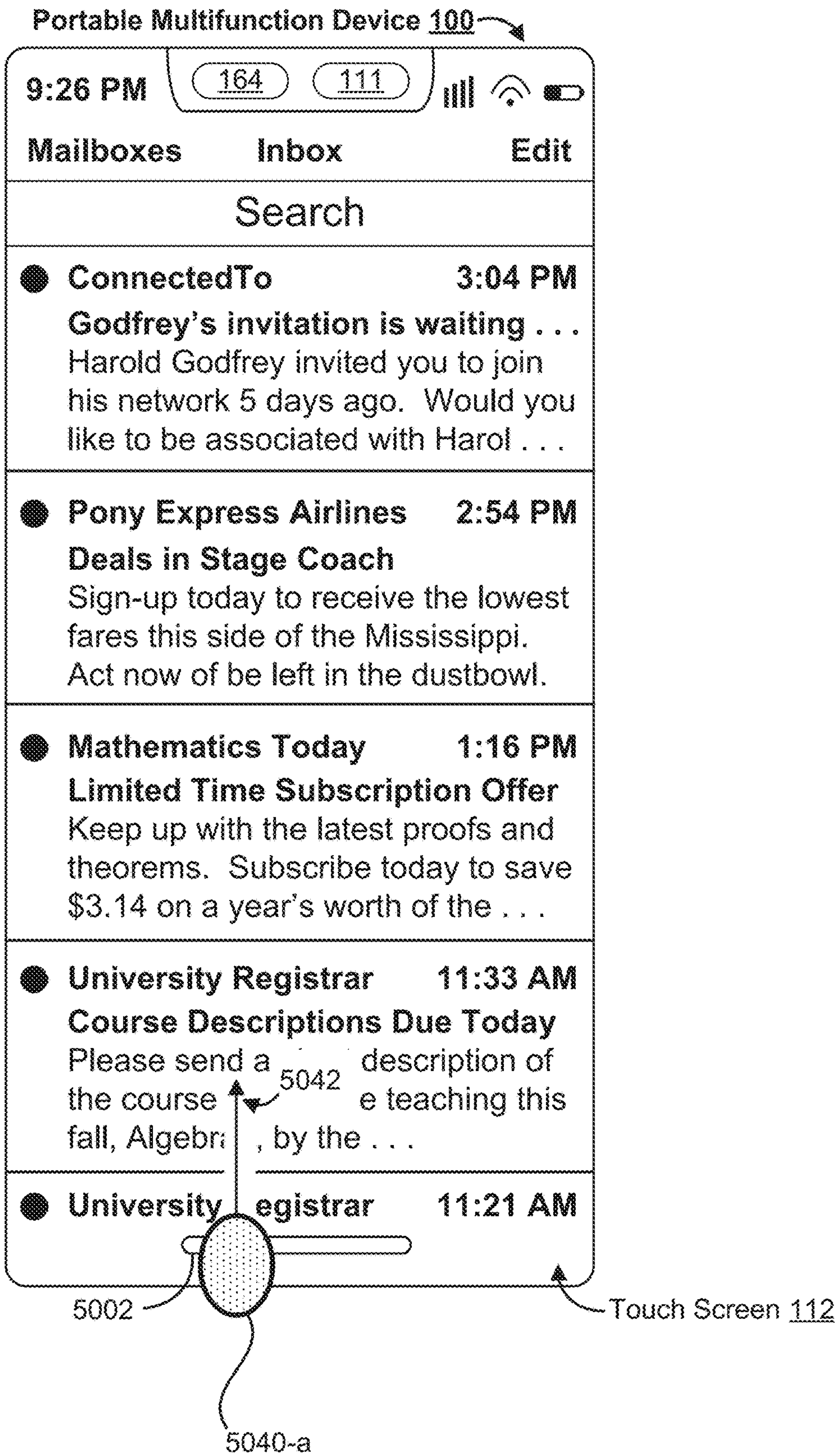
Figure 5A19

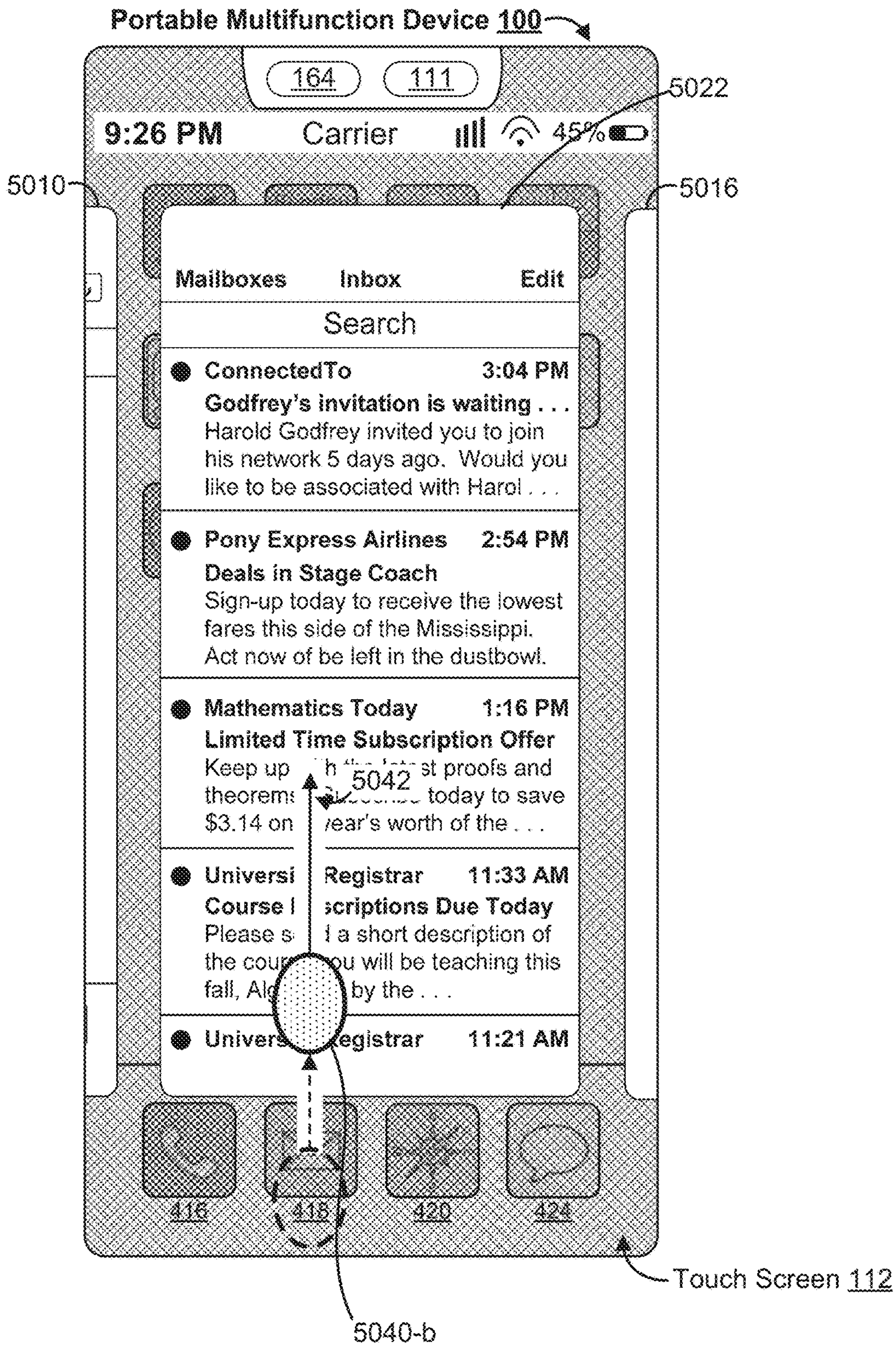
Figure 5A20

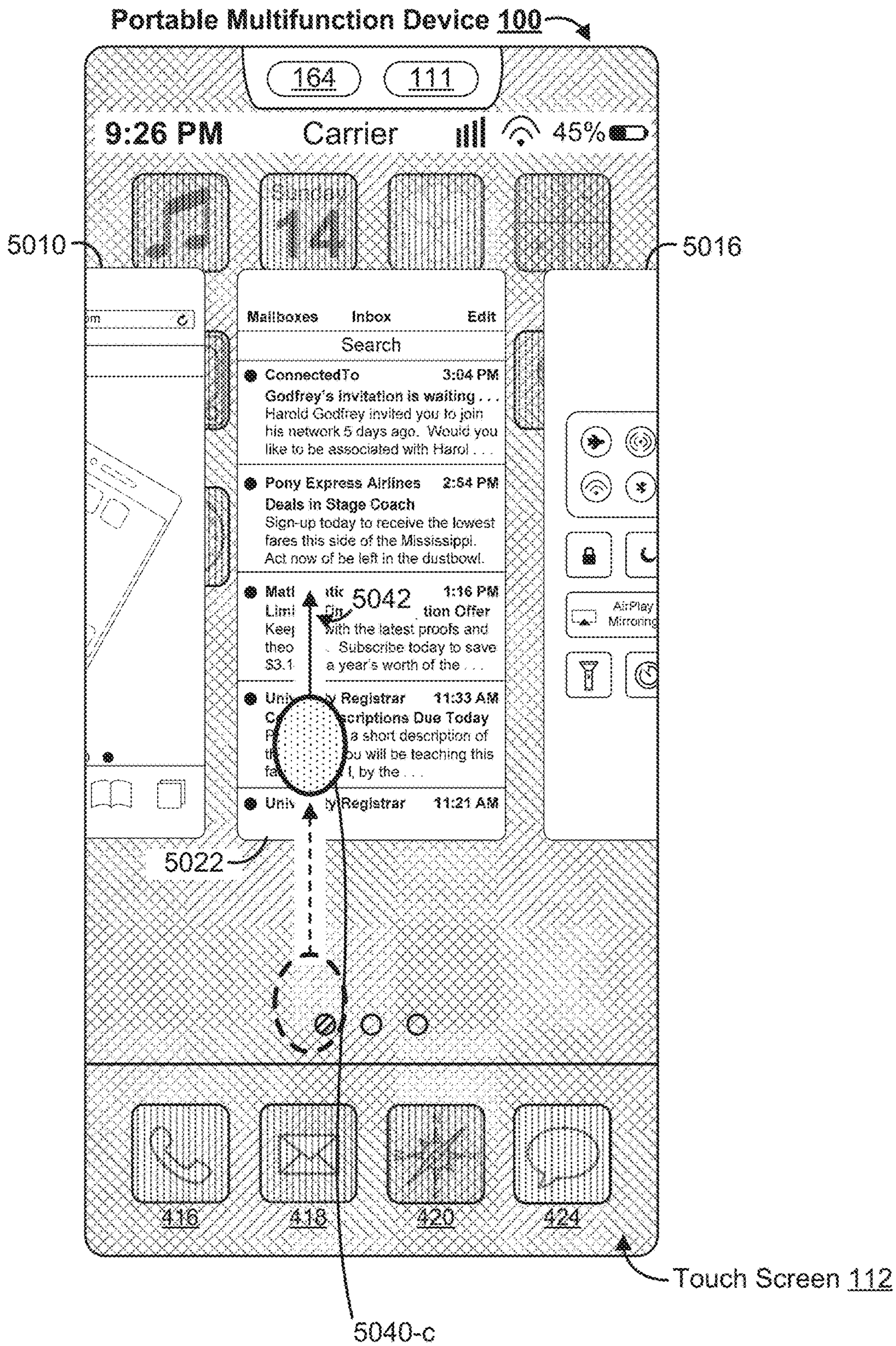
Figure 5A21

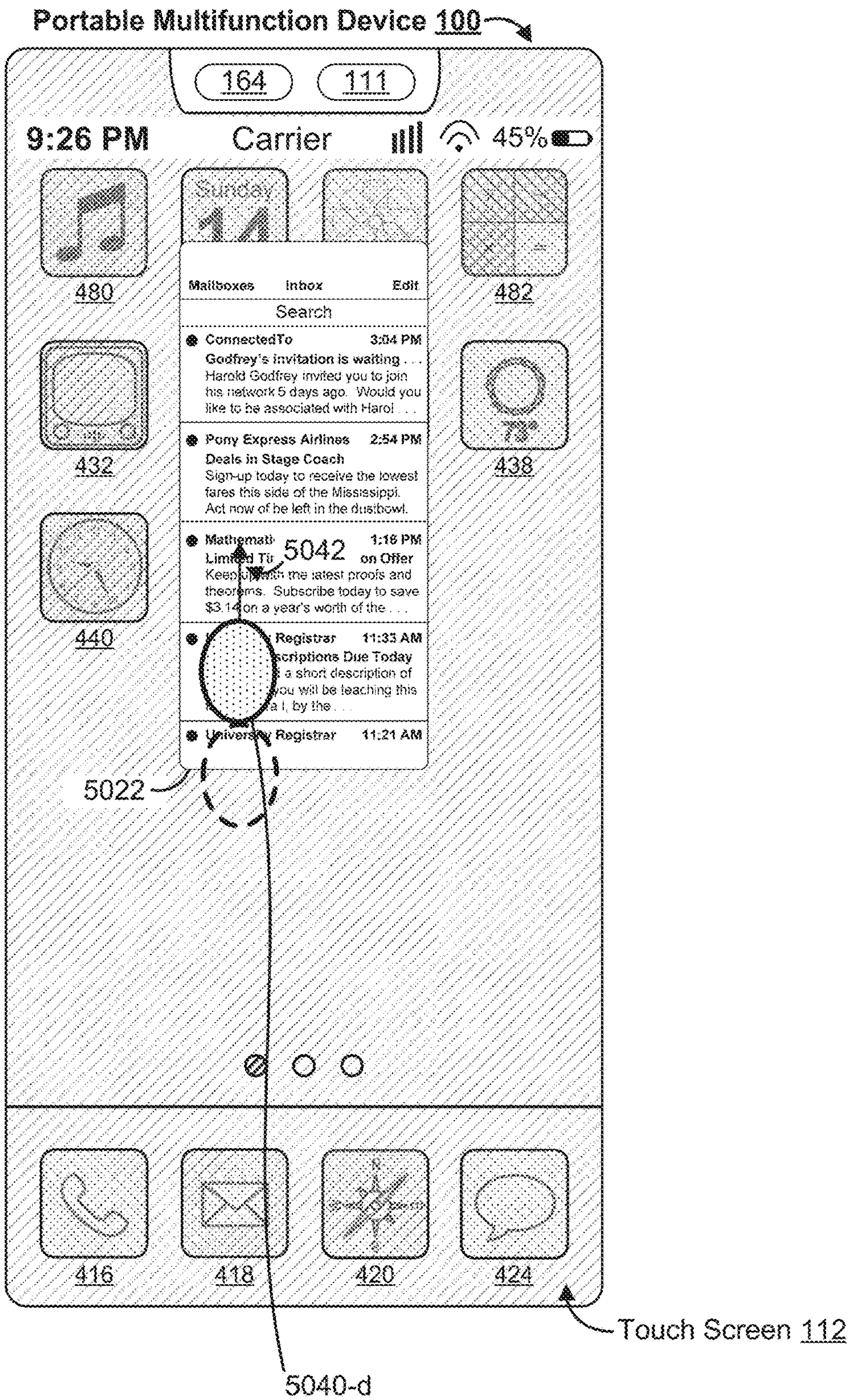
Figure 5A22

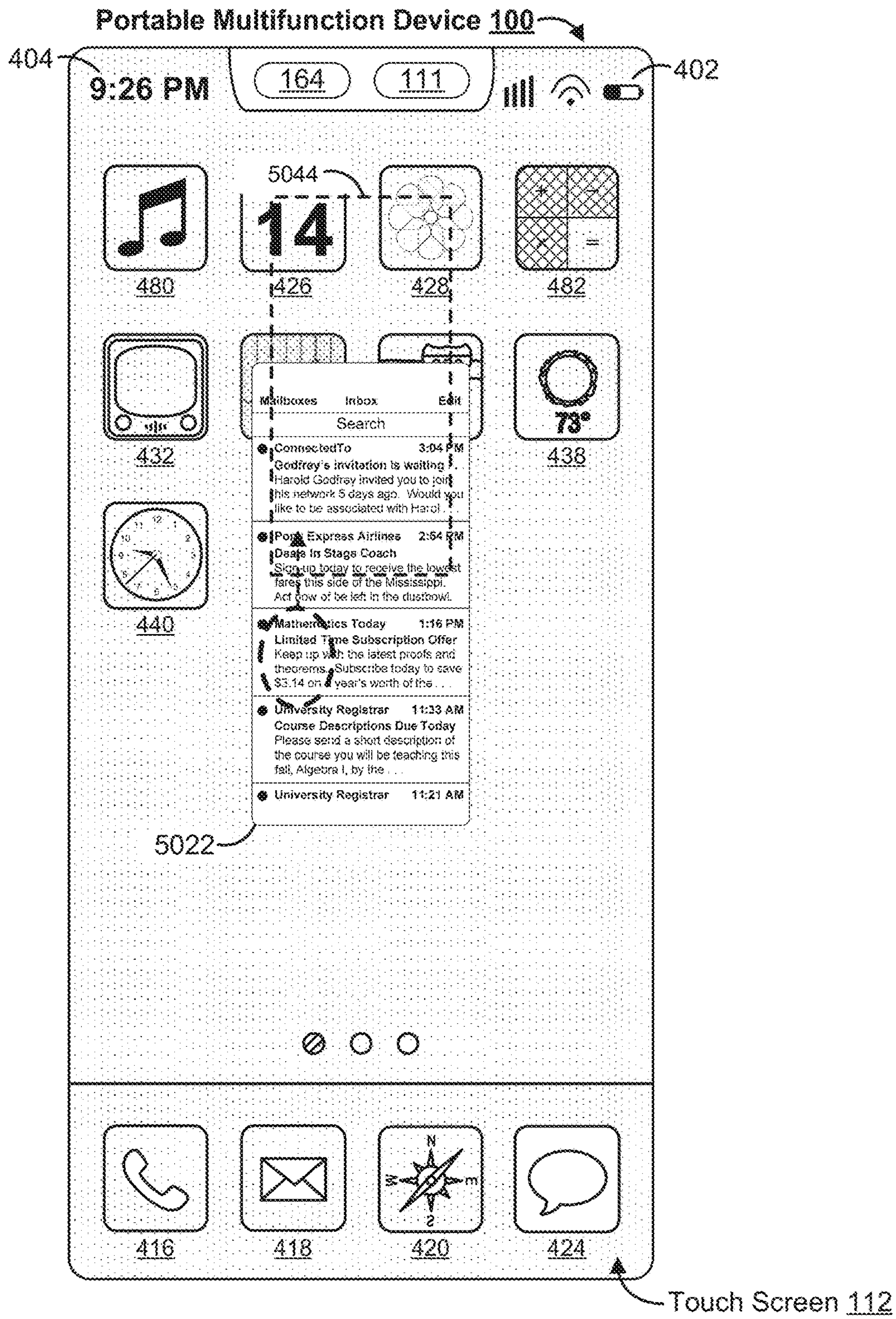
Figure 5A23

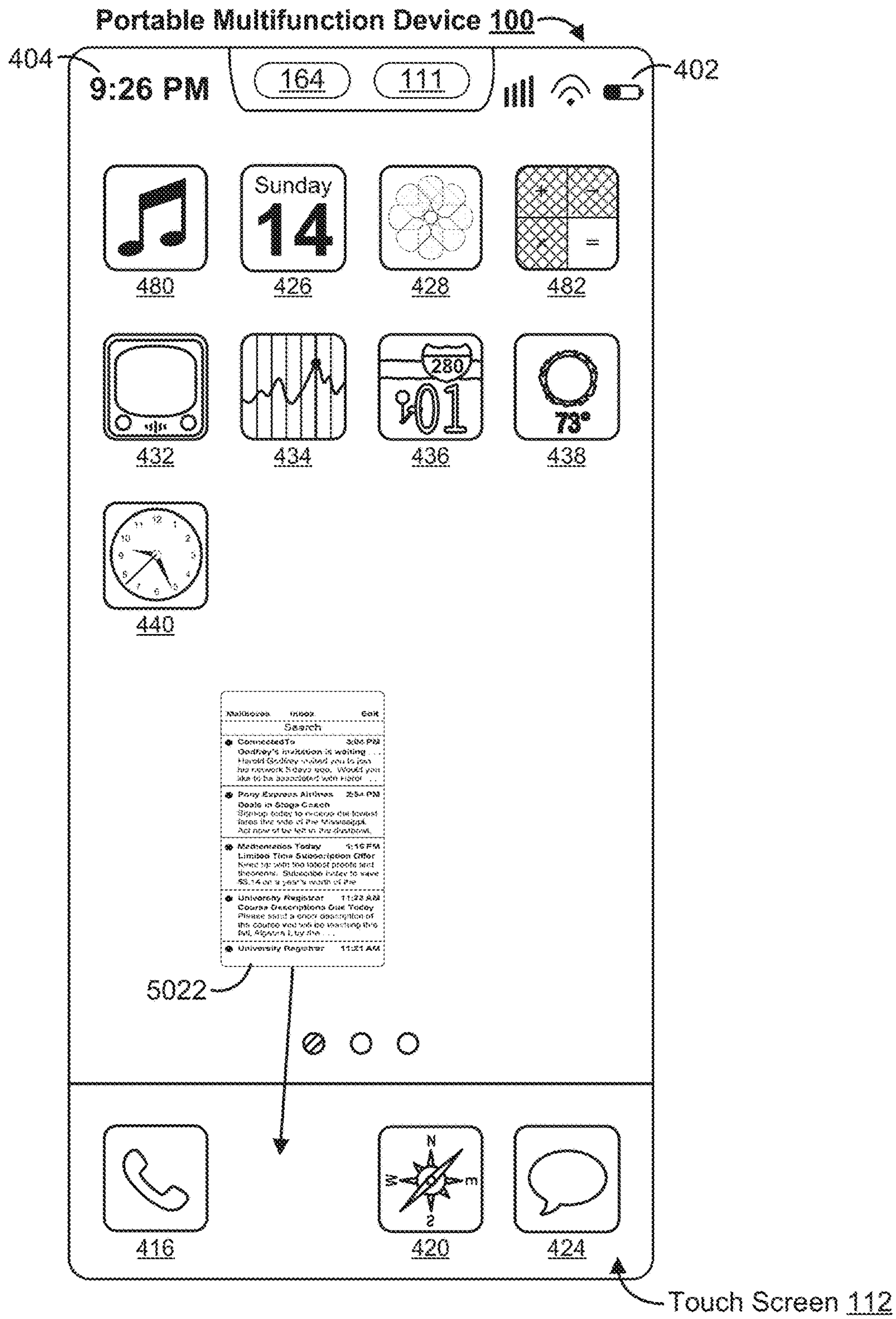
Figure 5A24

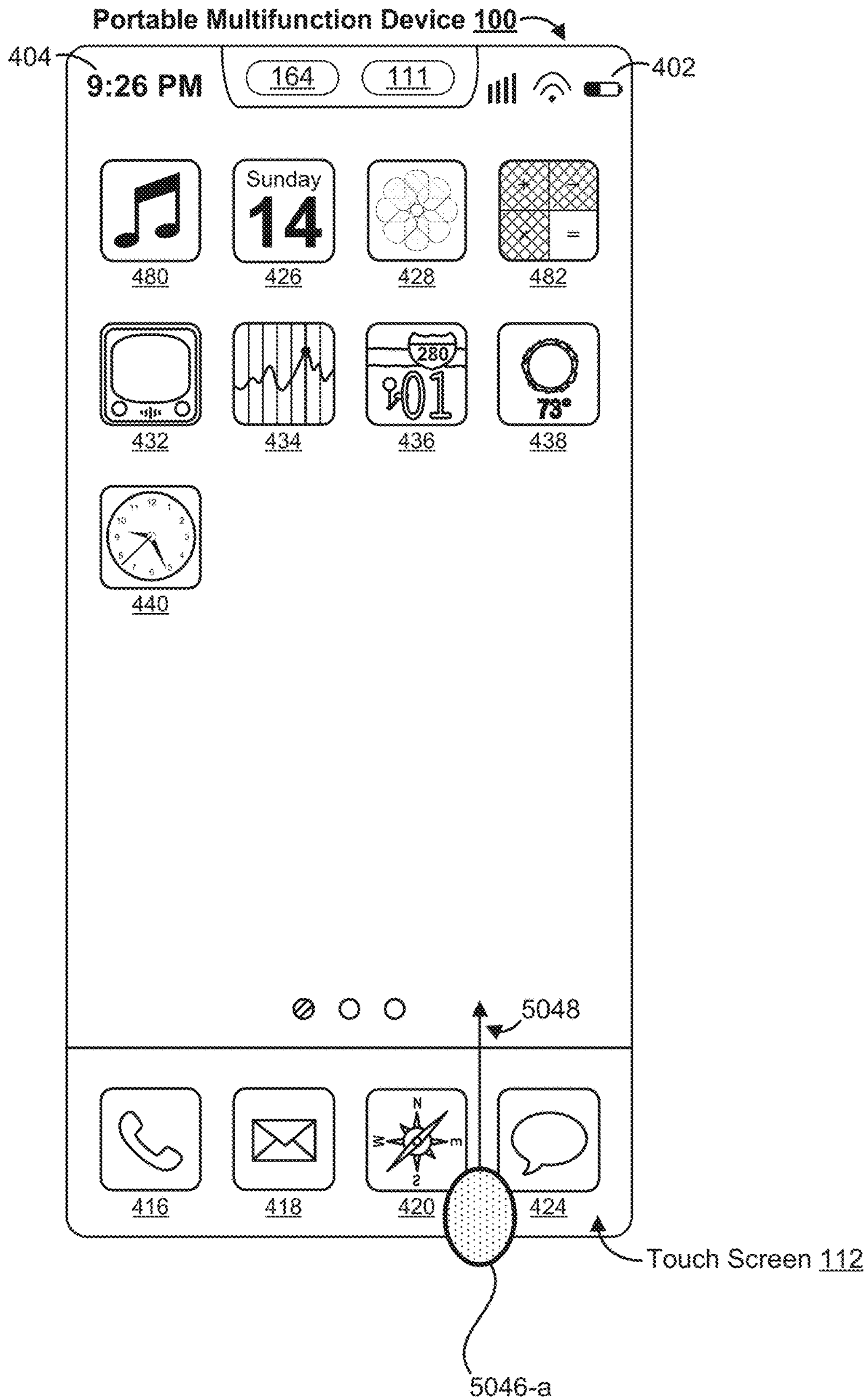
Figure 5A25

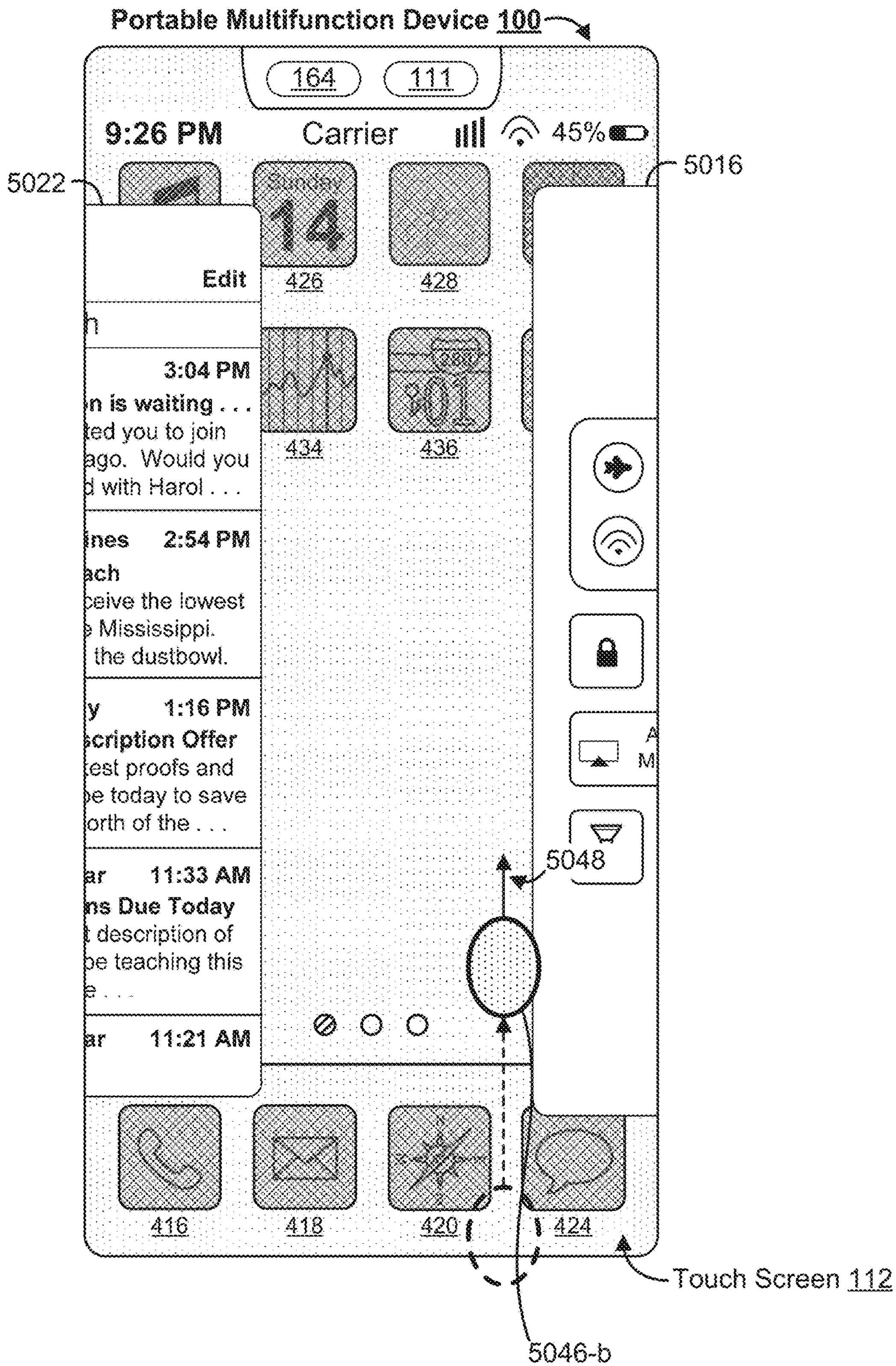
Figure 5A26

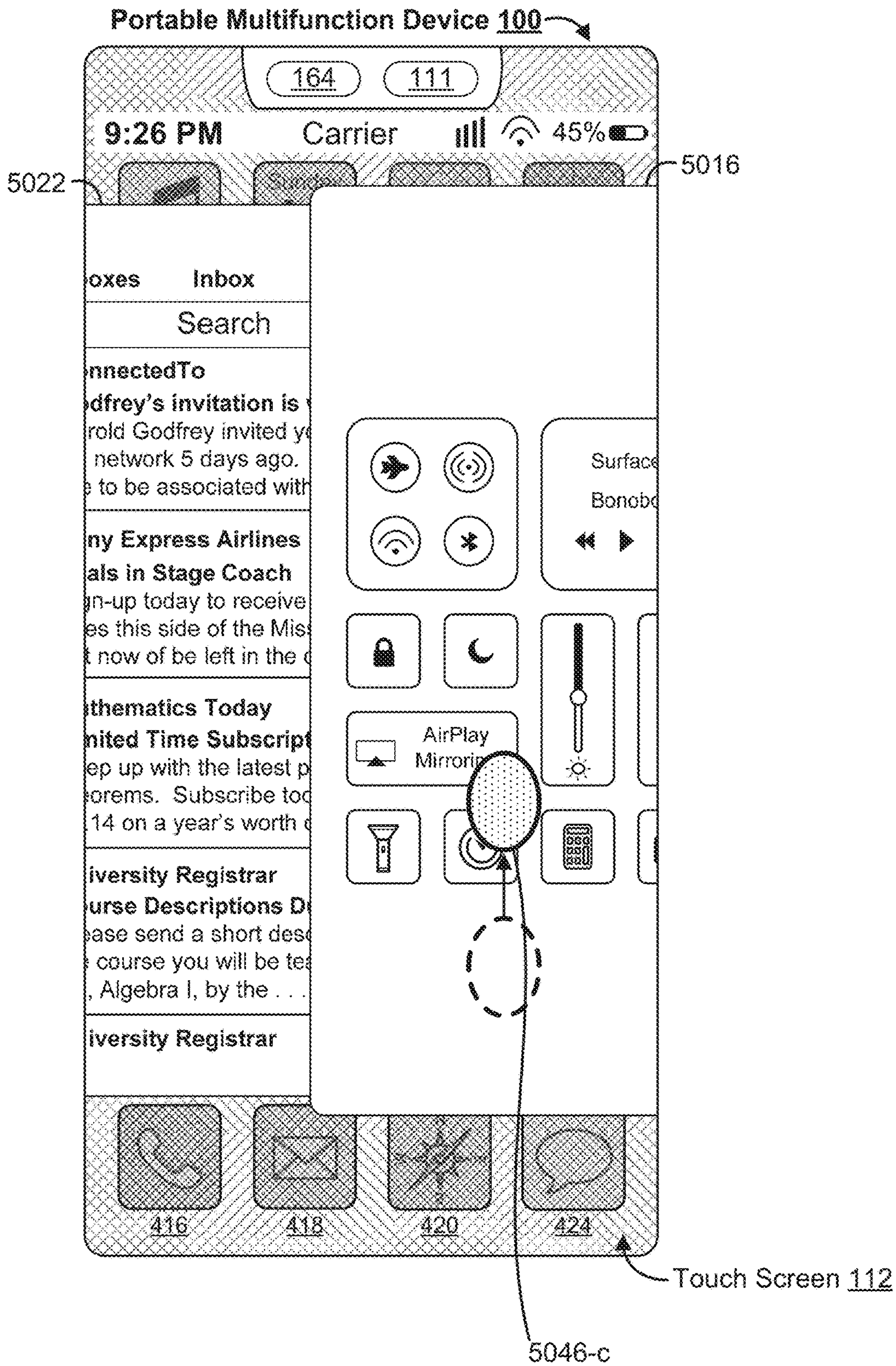
Figure 5A27

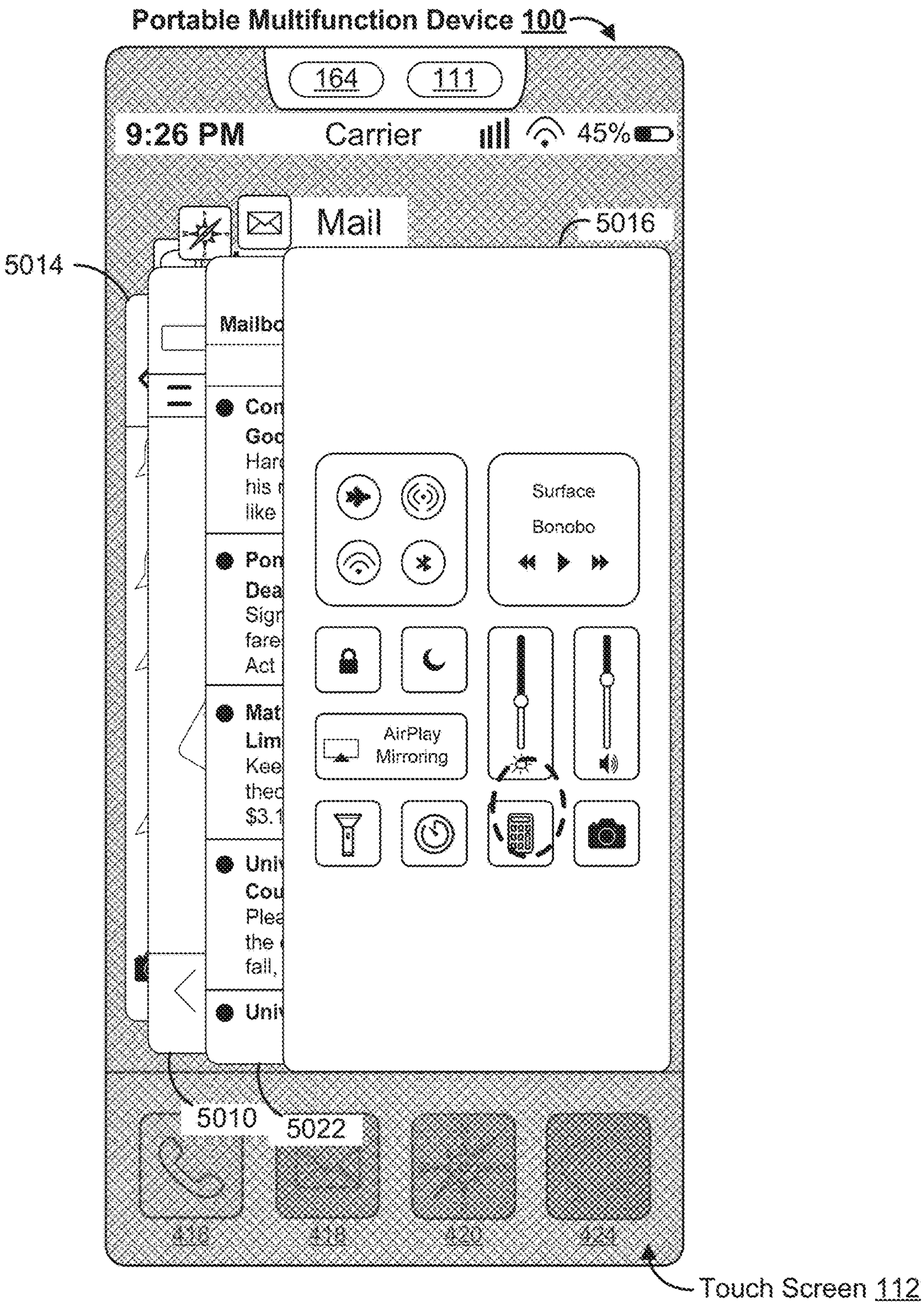
Figure 5A28

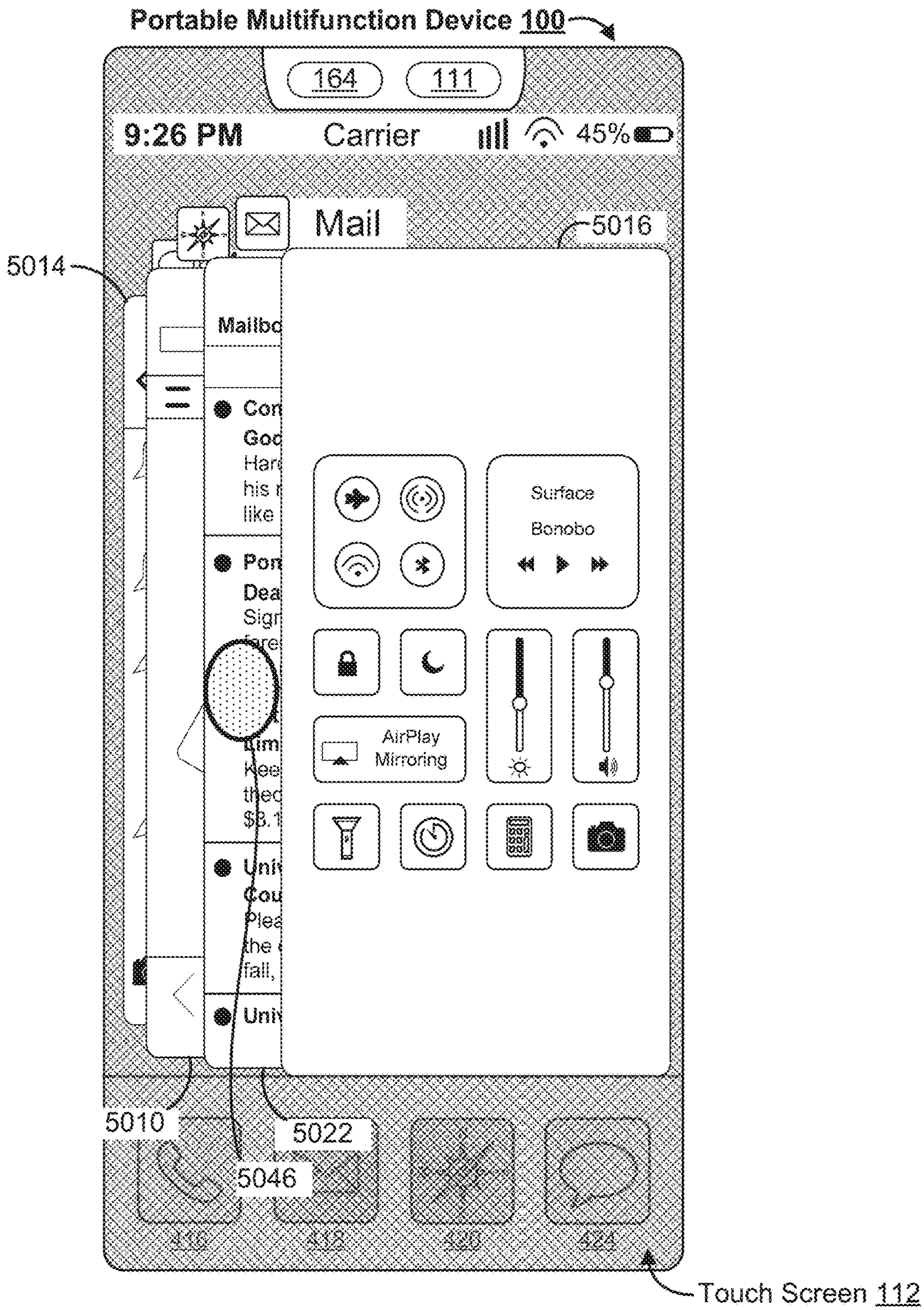
Figure 5A29

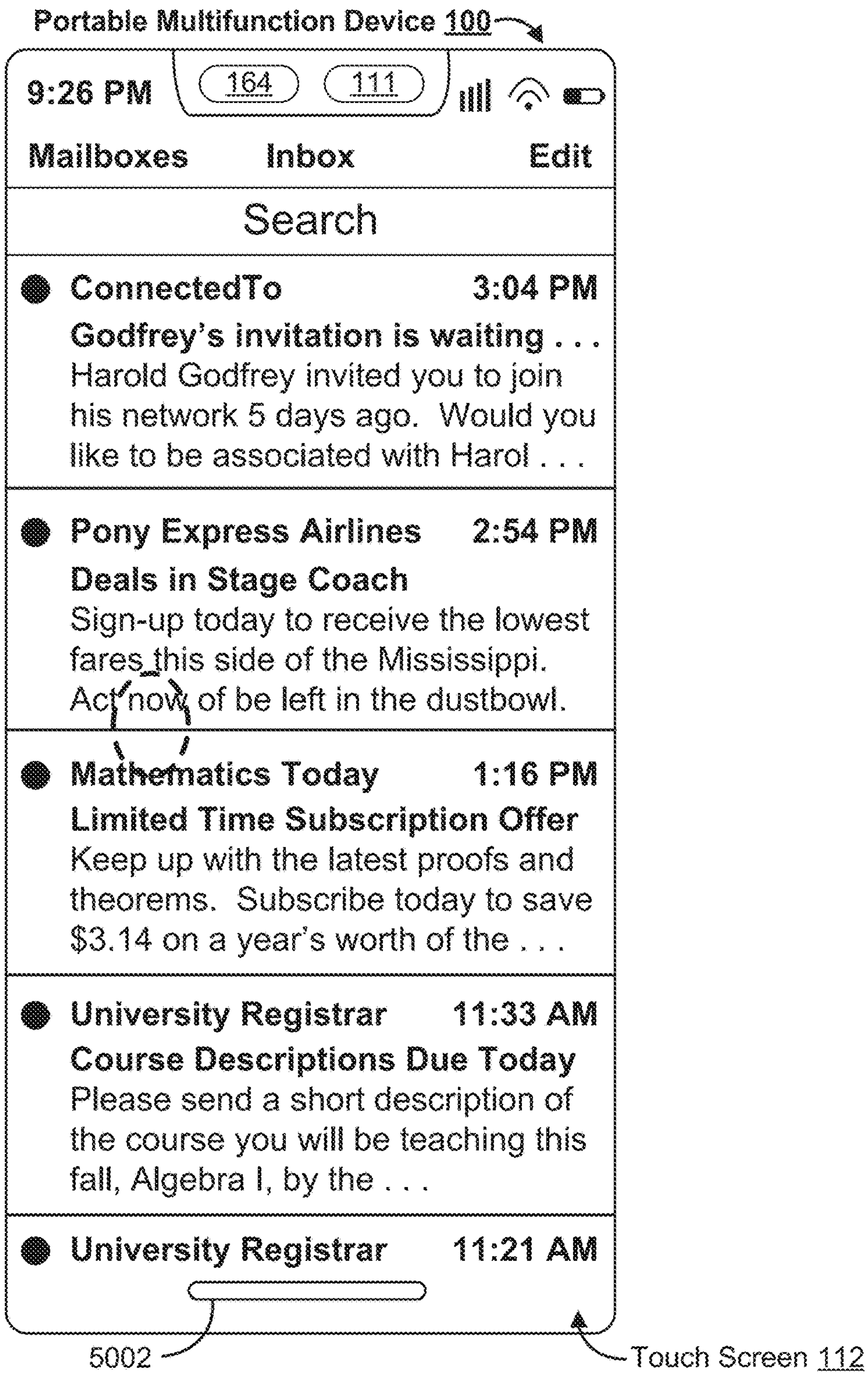
Figure 5A30

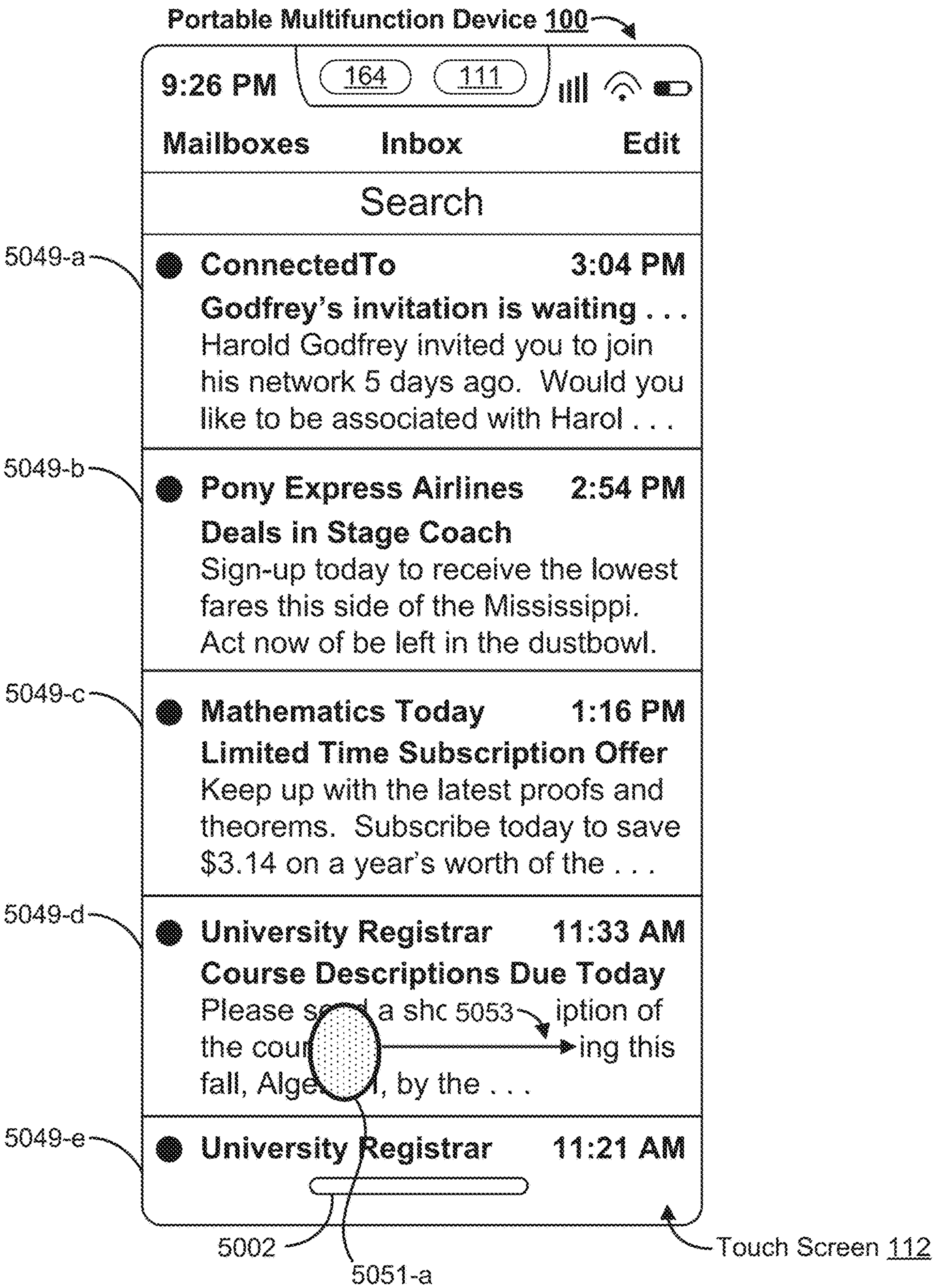
Figure 5A31

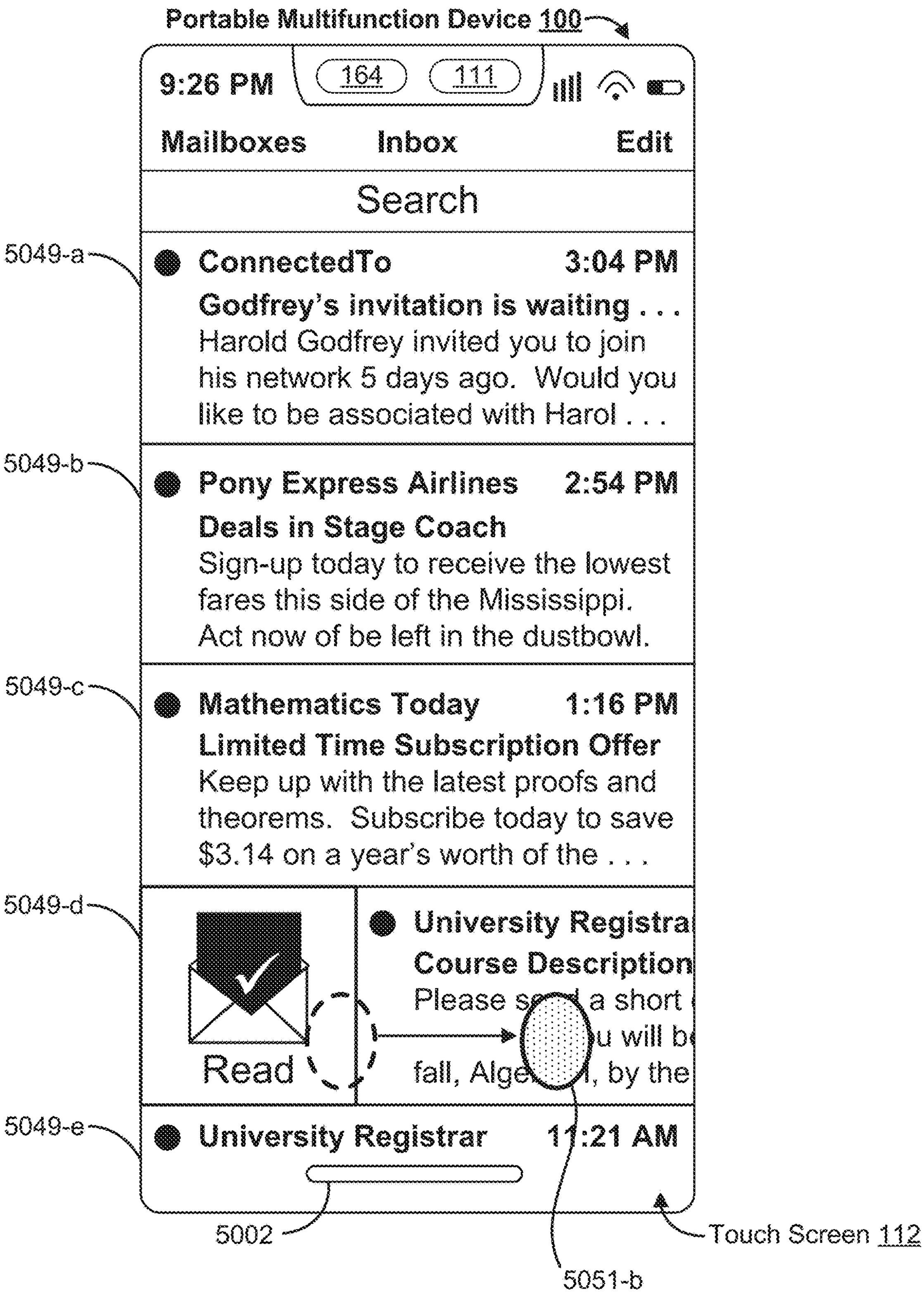
Figure 5A32

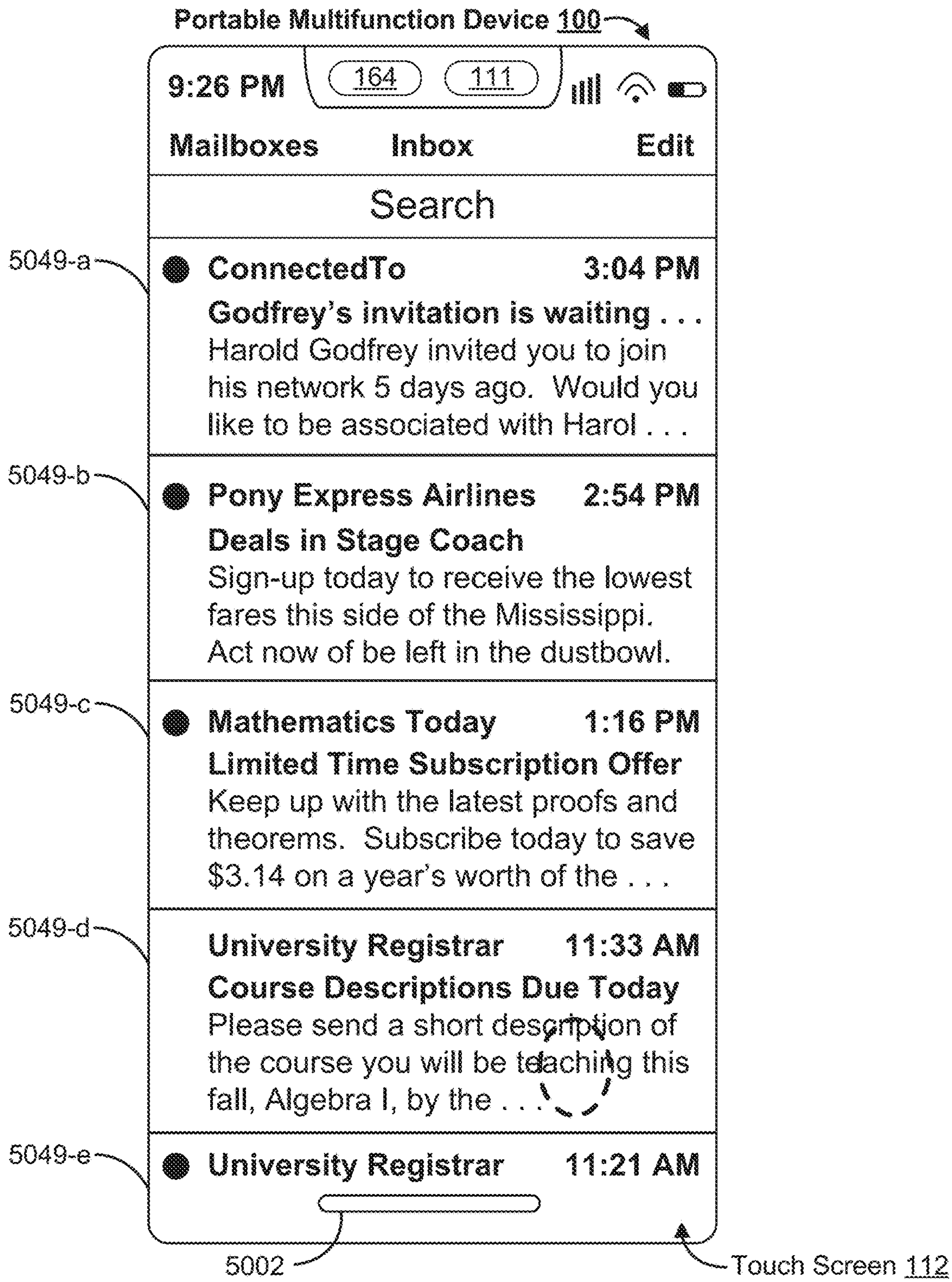
Figure 5A33

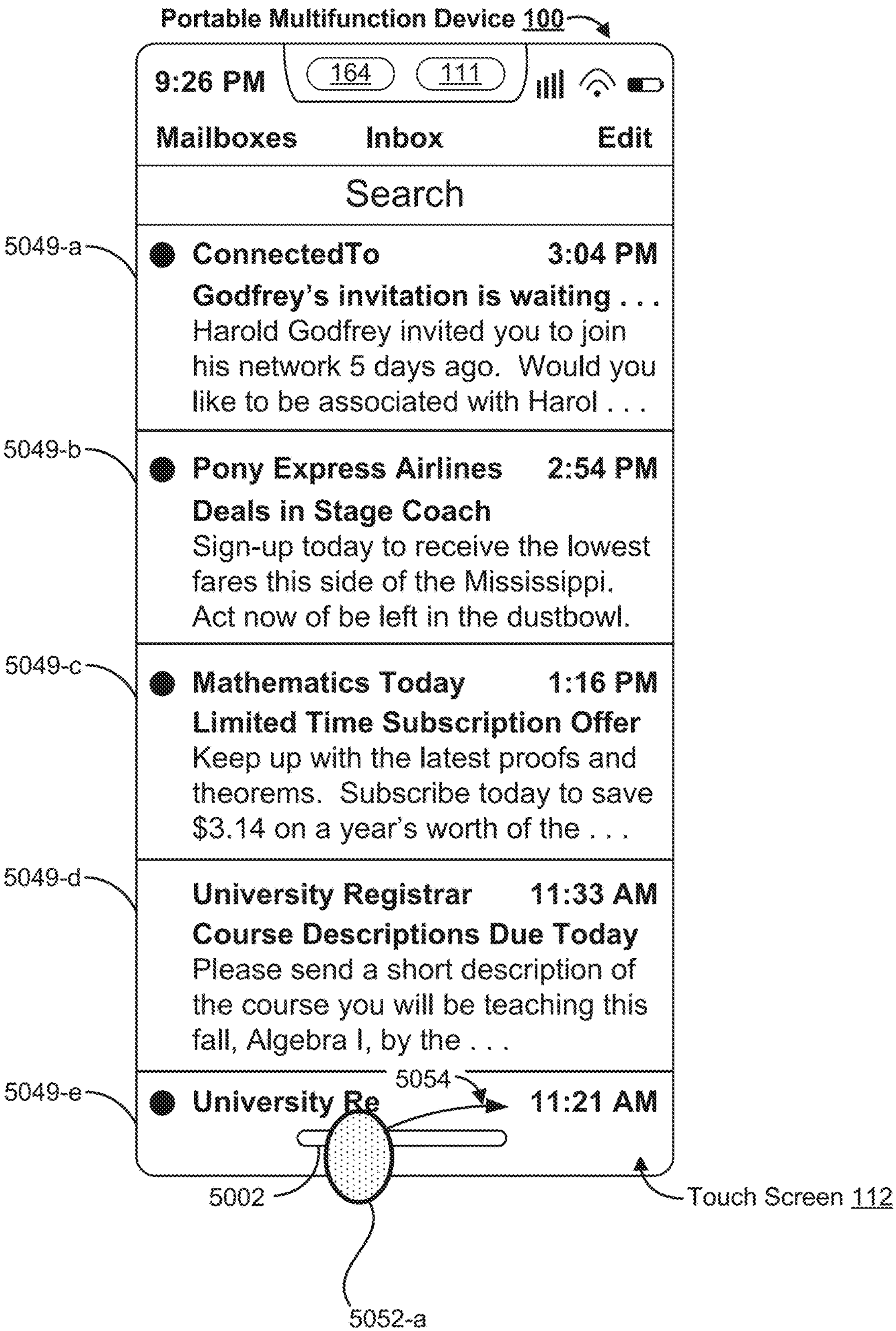
Figure 5A34

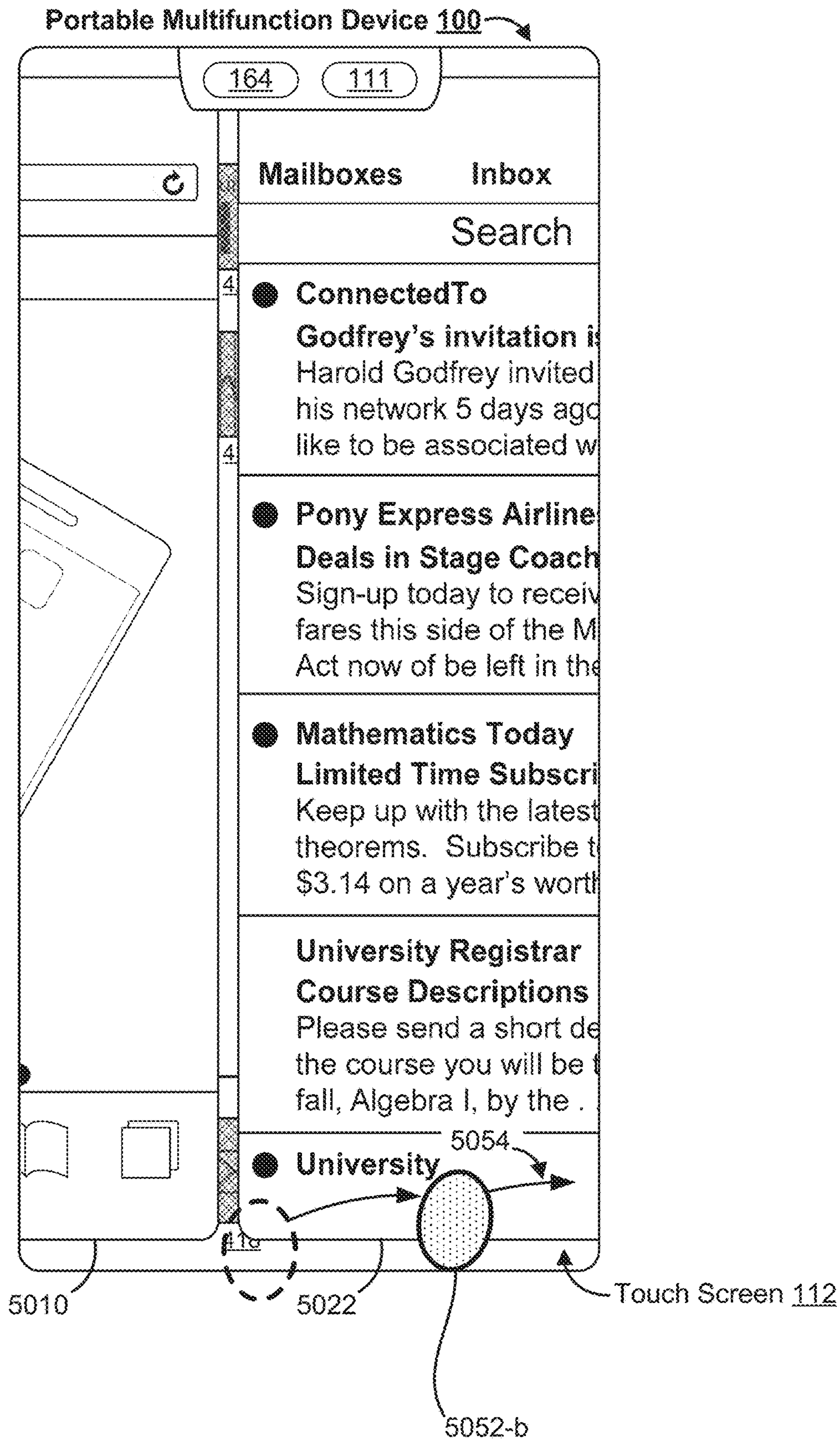
Figure 5A35

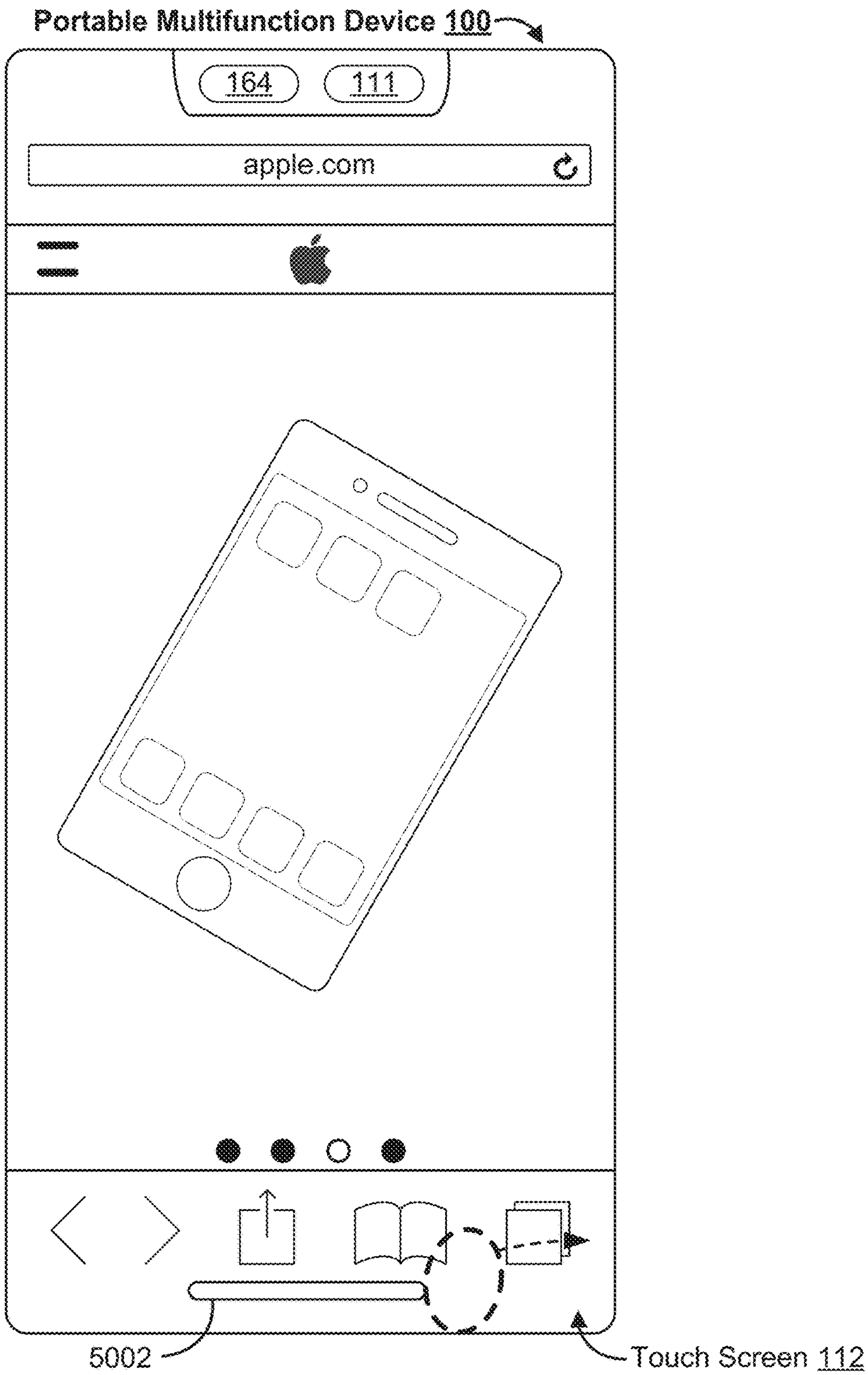
Figure 5A36

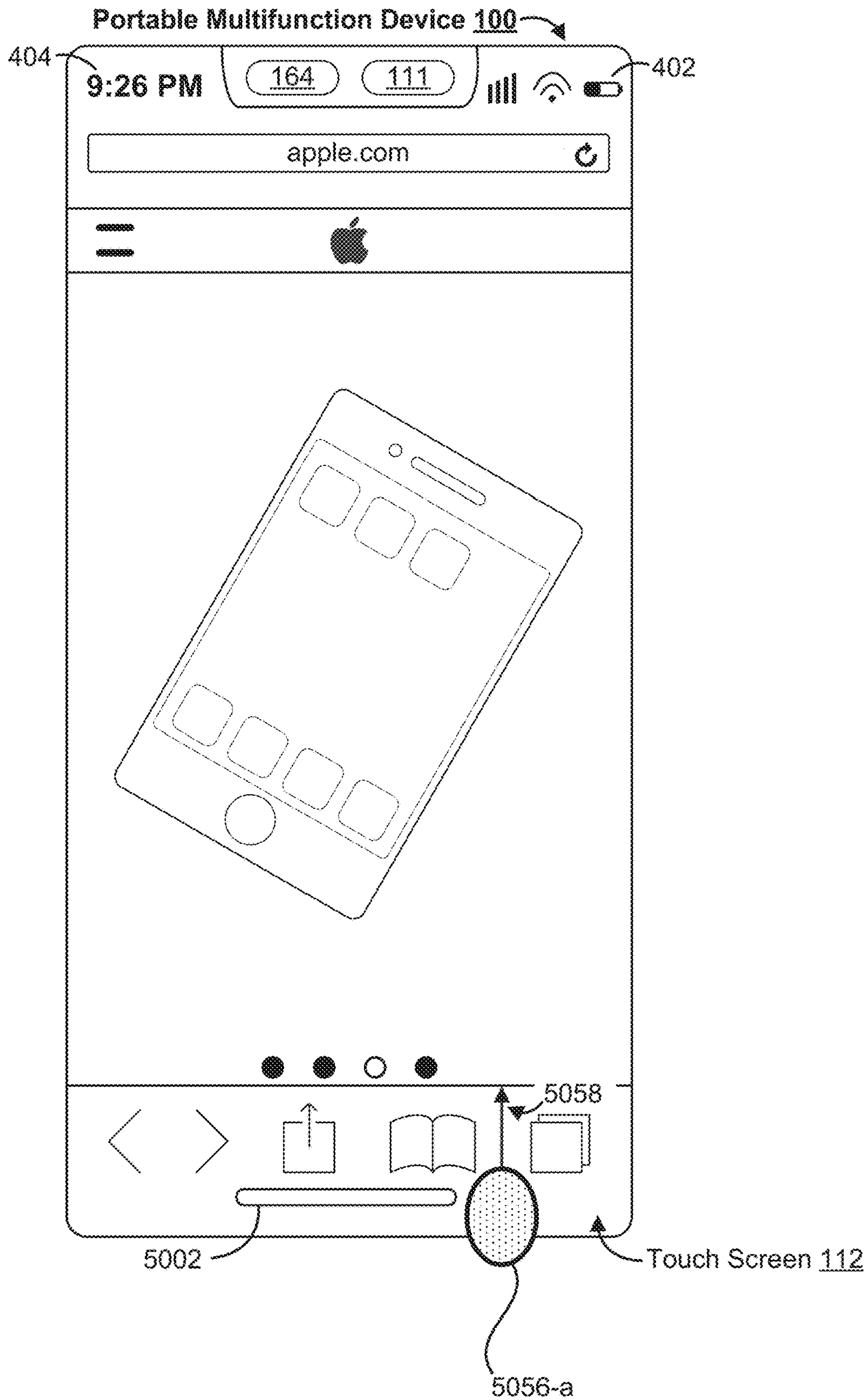
Figure 5A37

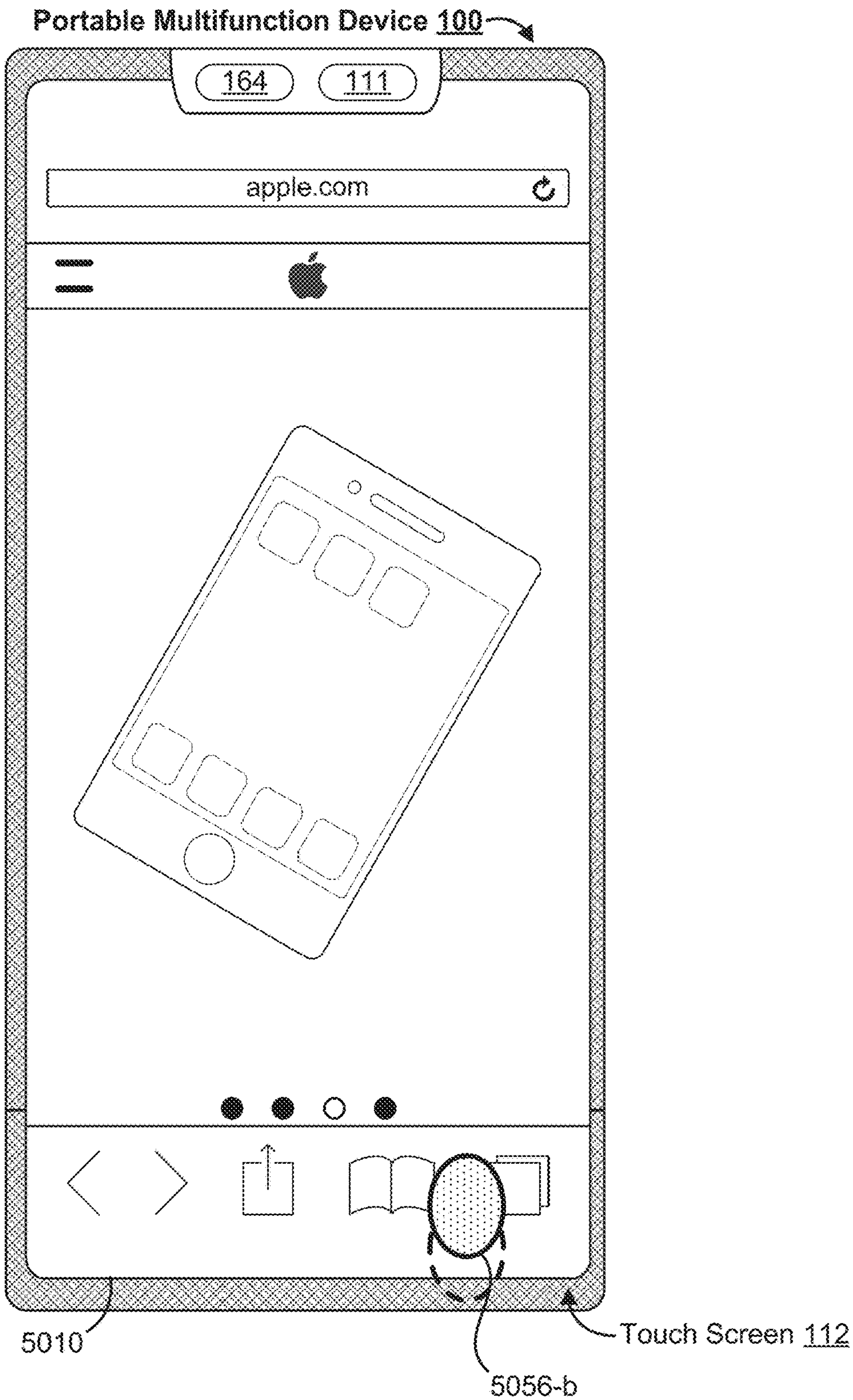
Figure 5A38

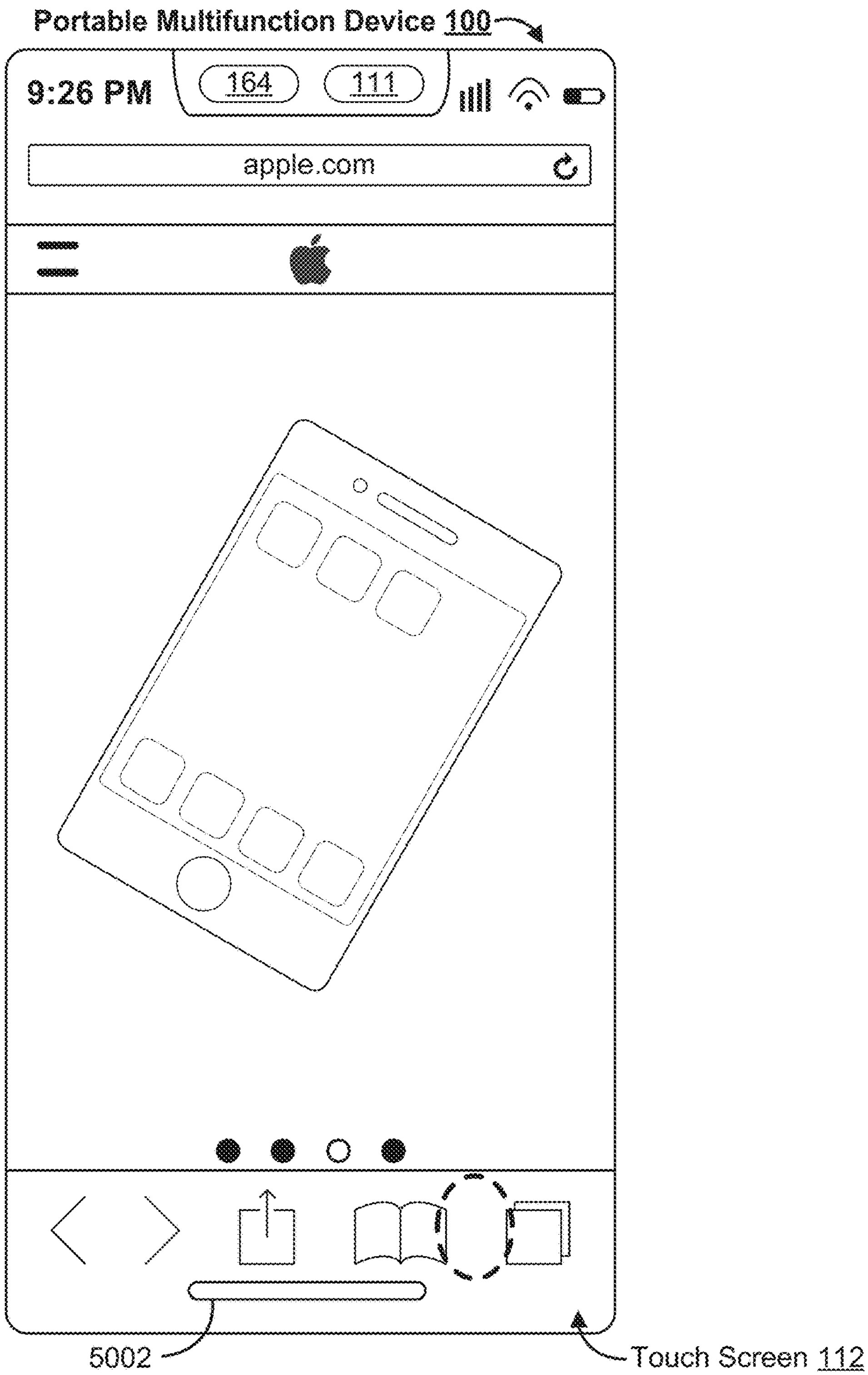
Figure 5A39

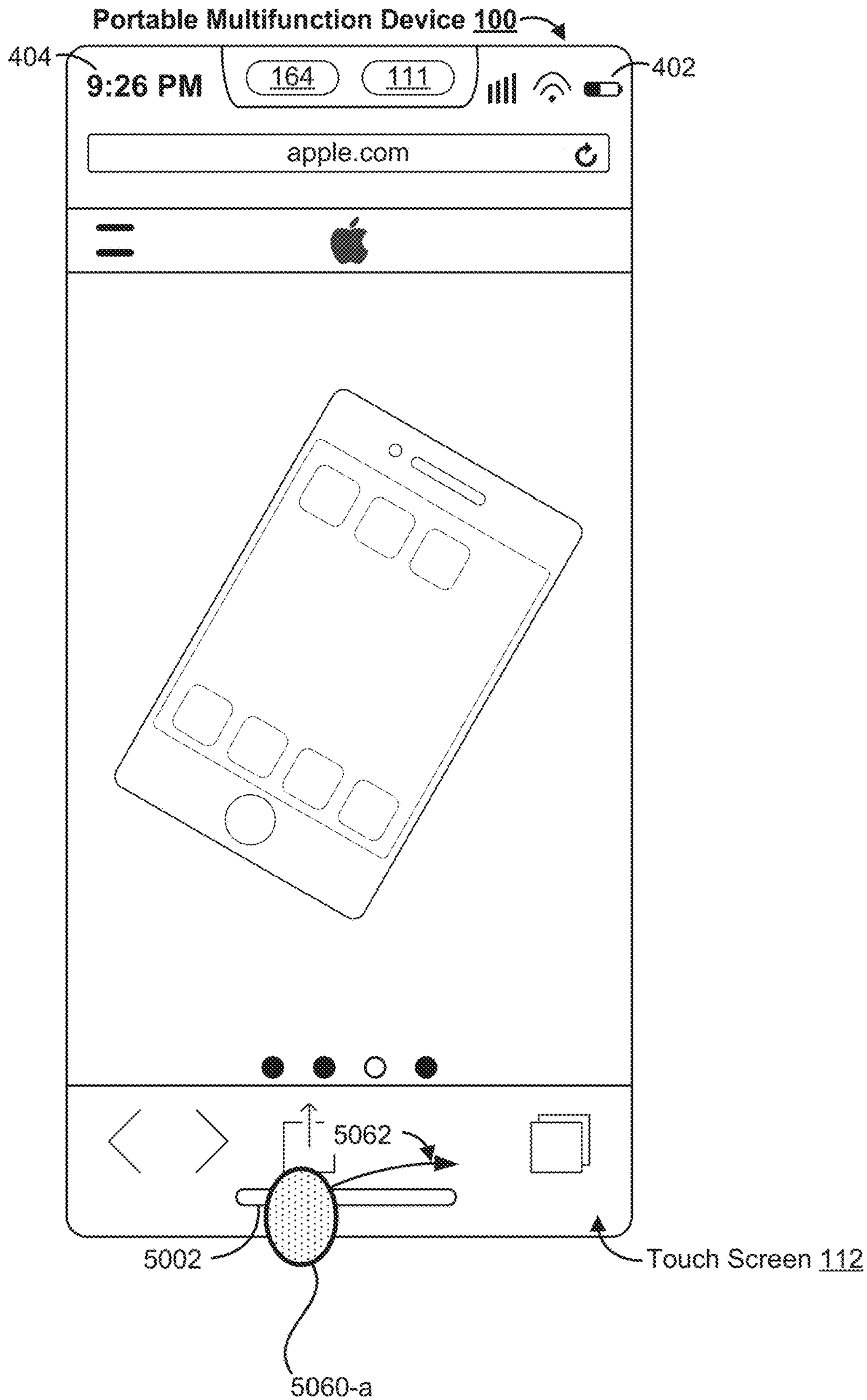
Figure 5A40

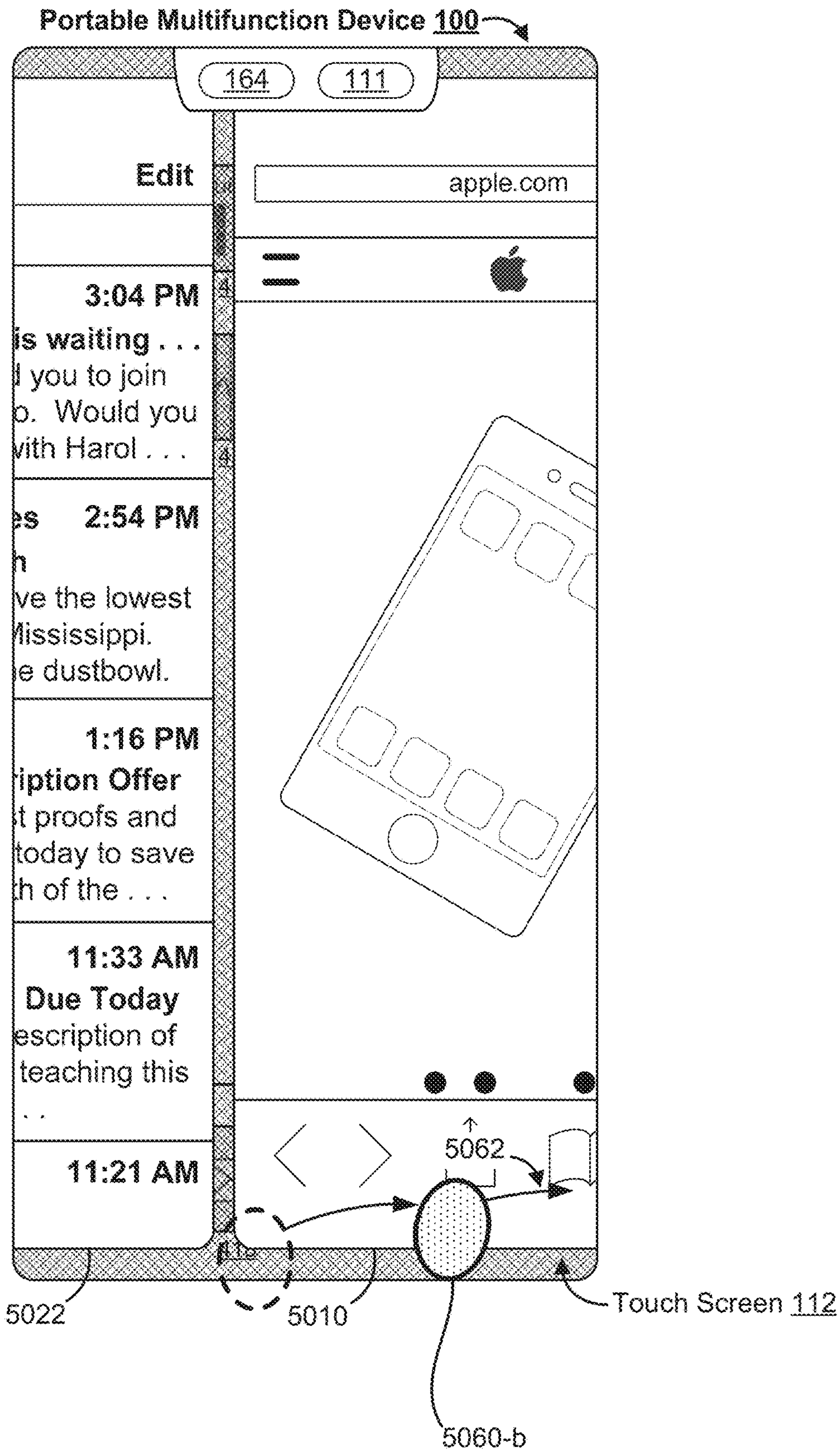
Figure 5A41

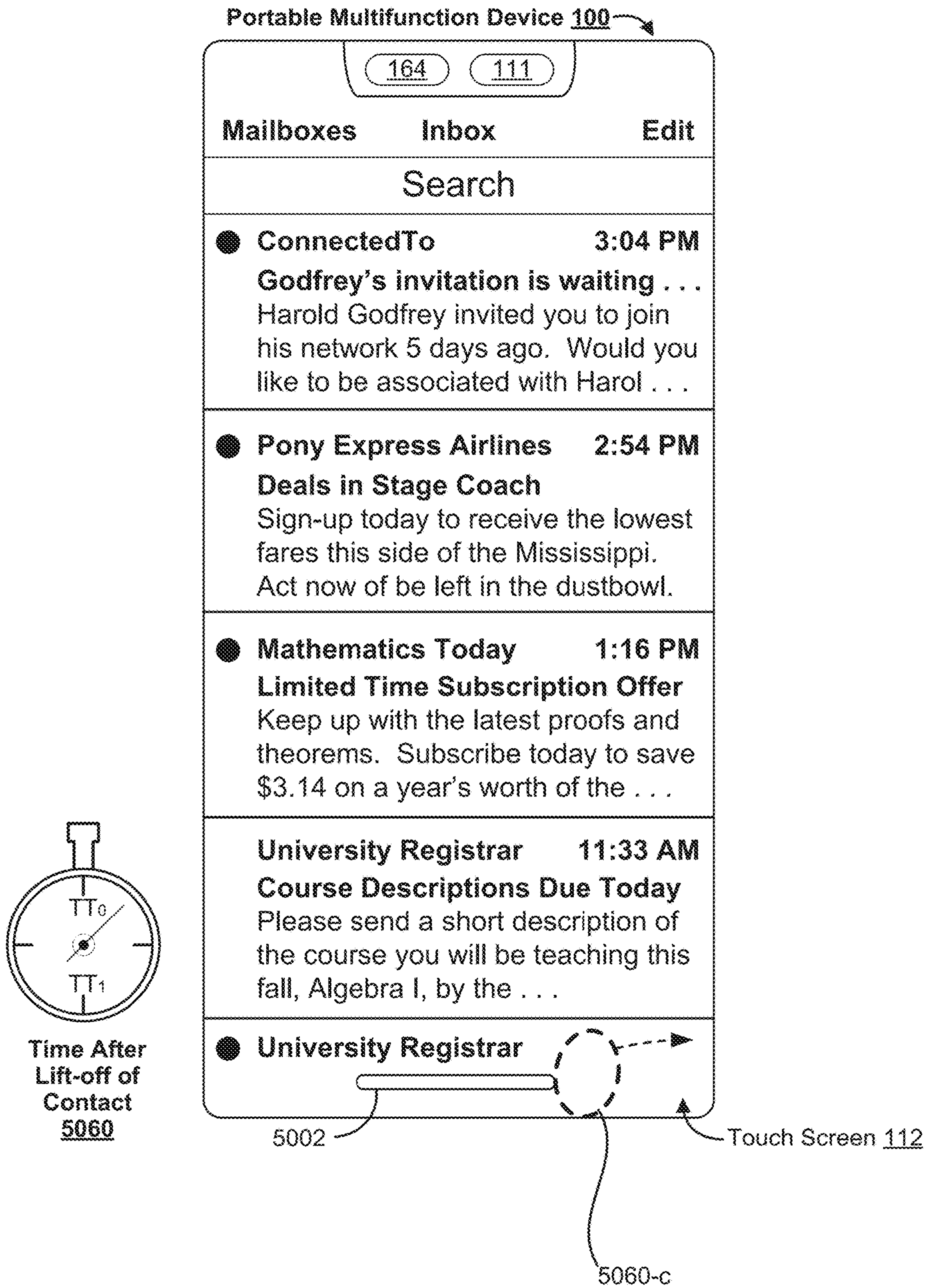
Figure 5A42

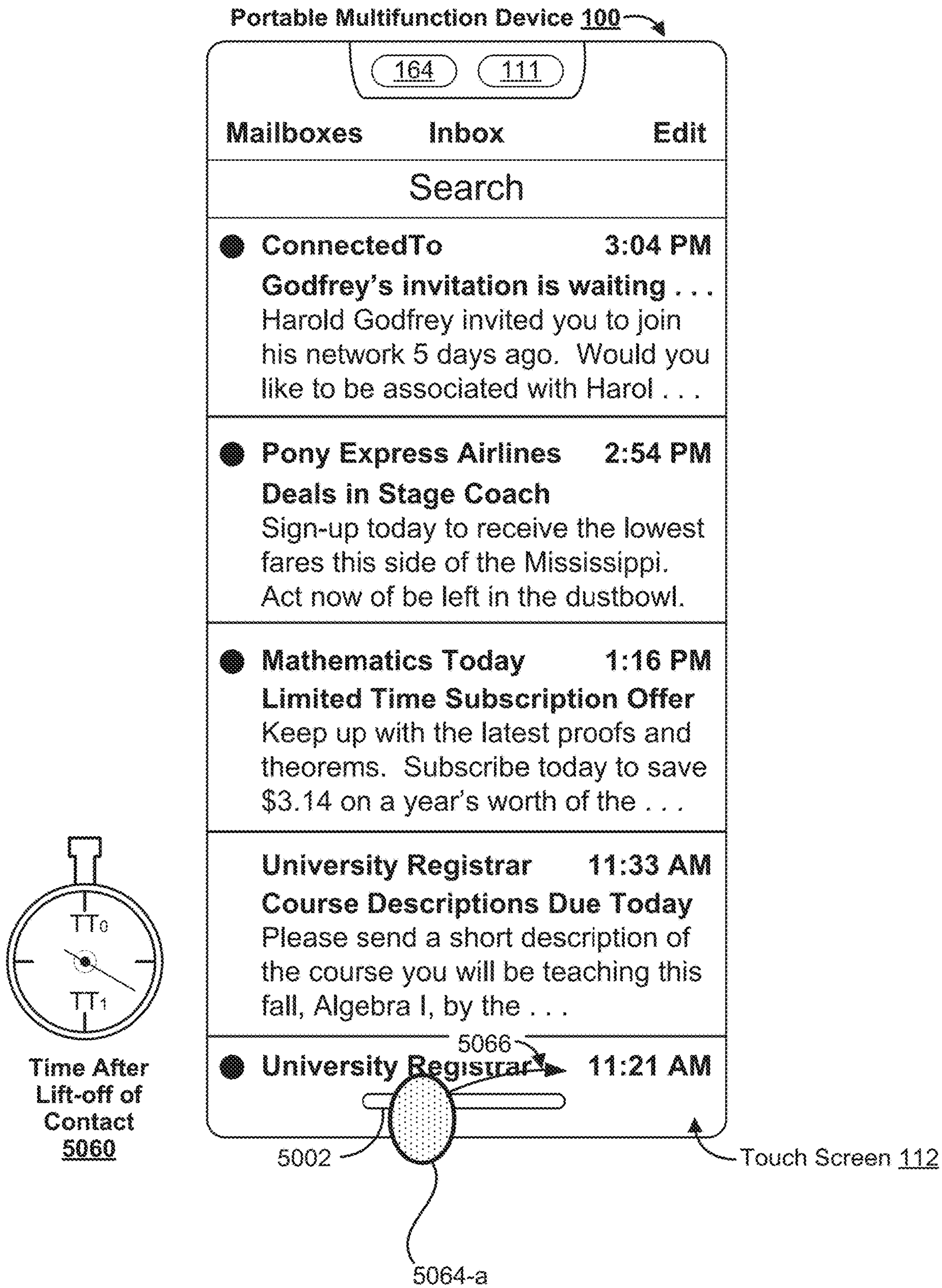
Figure 5A43

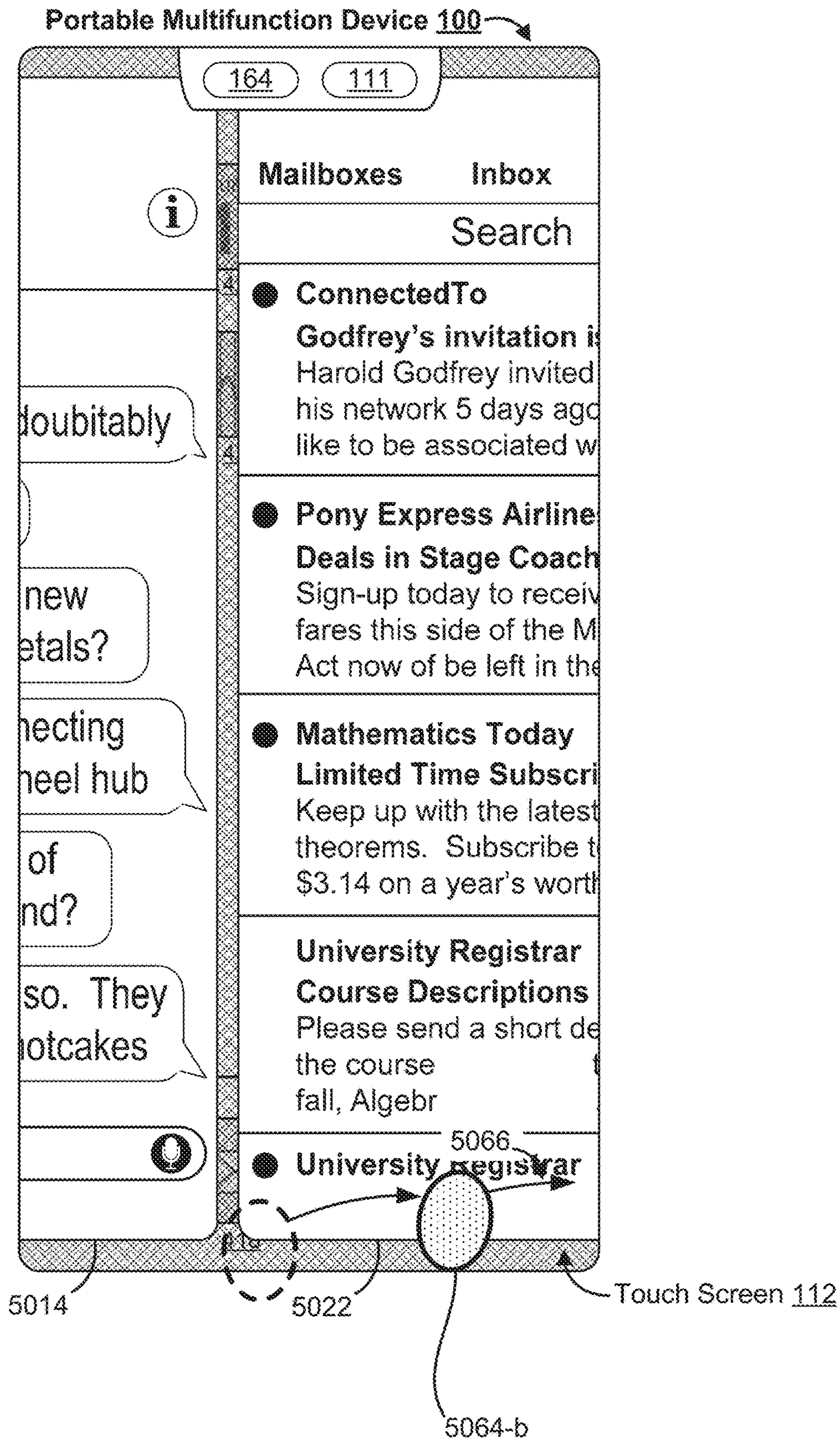
Figure 5A44

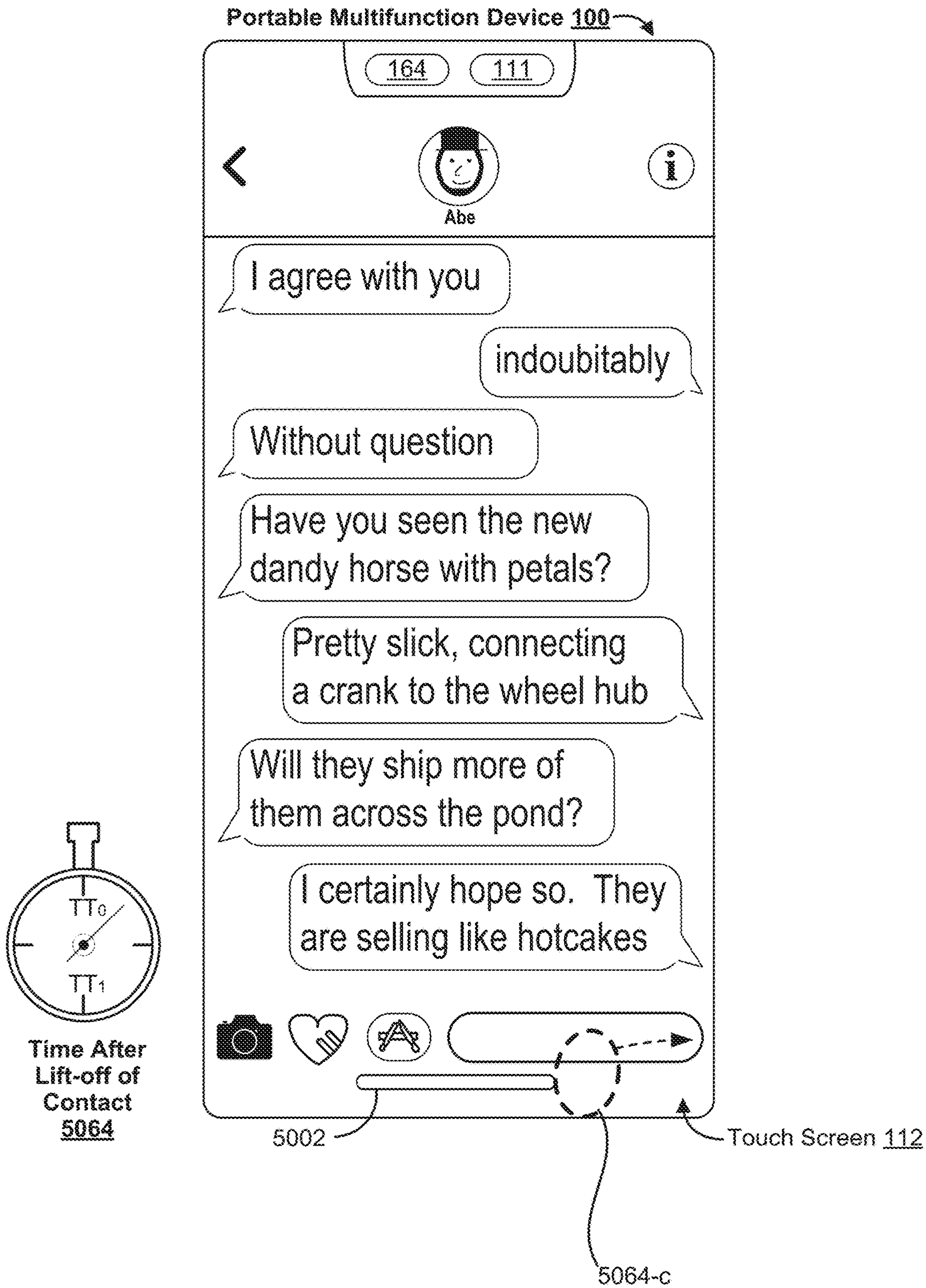
Figure 5A45

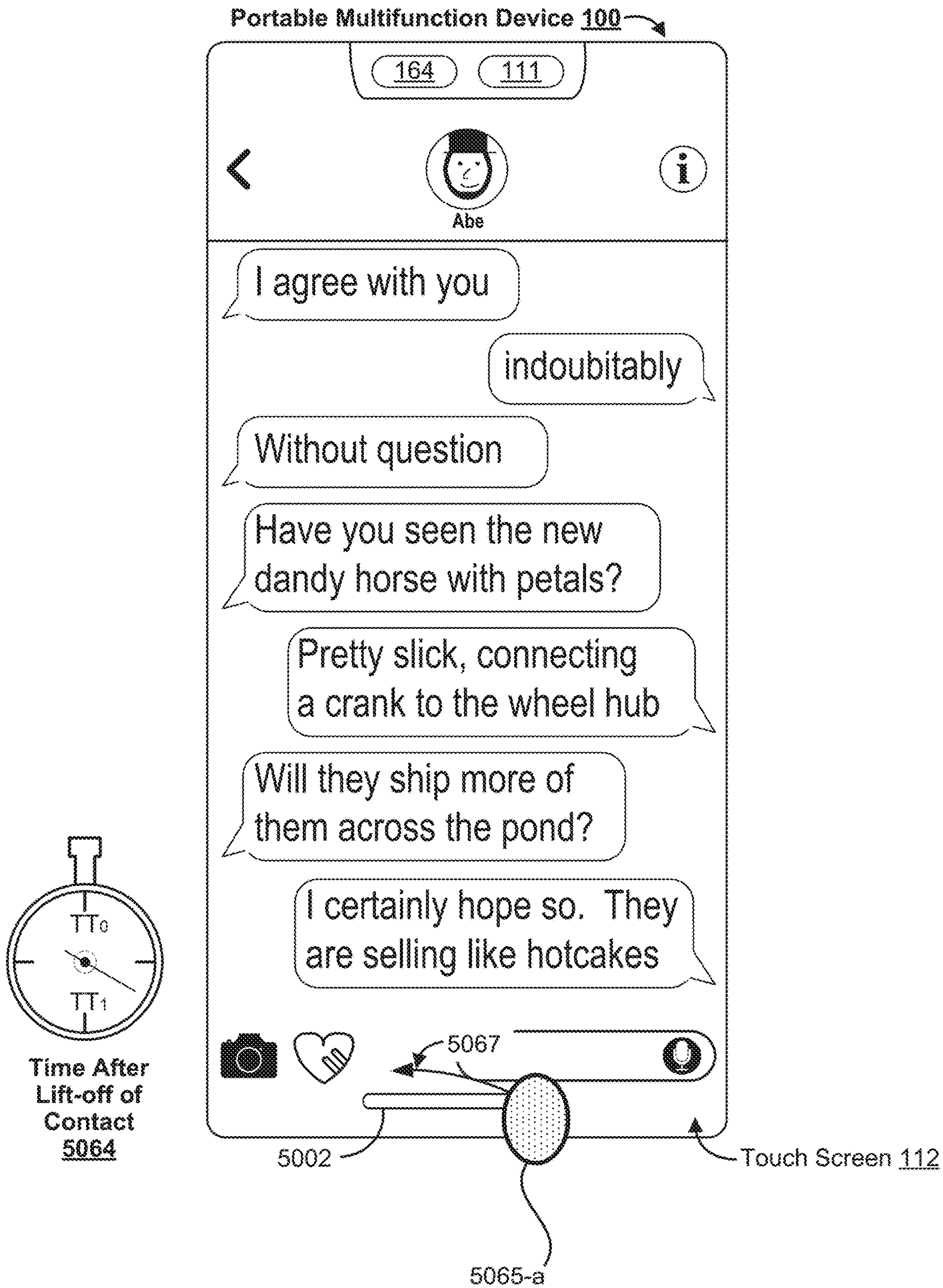
Figure 5A46

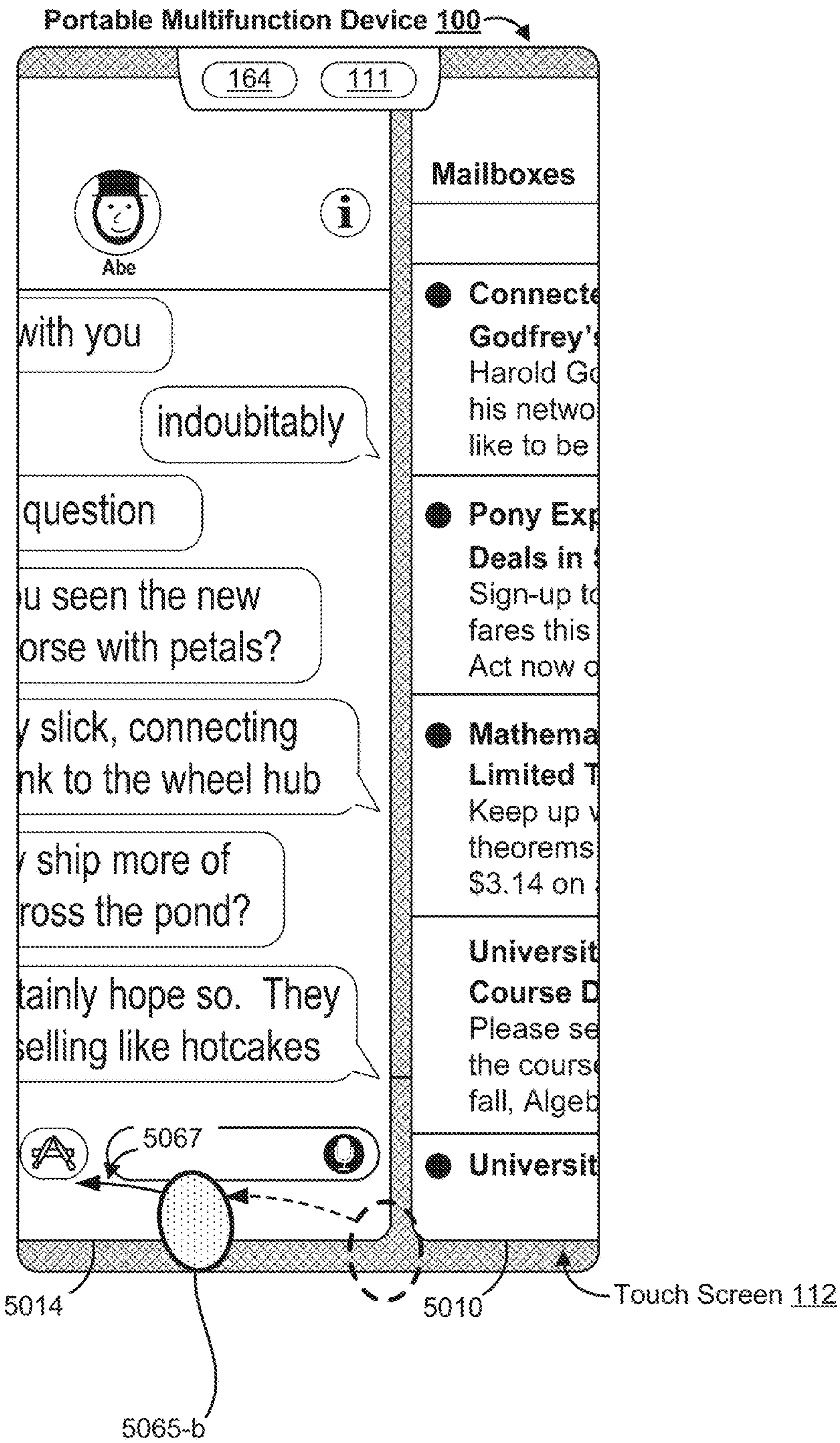
Figure 5A47

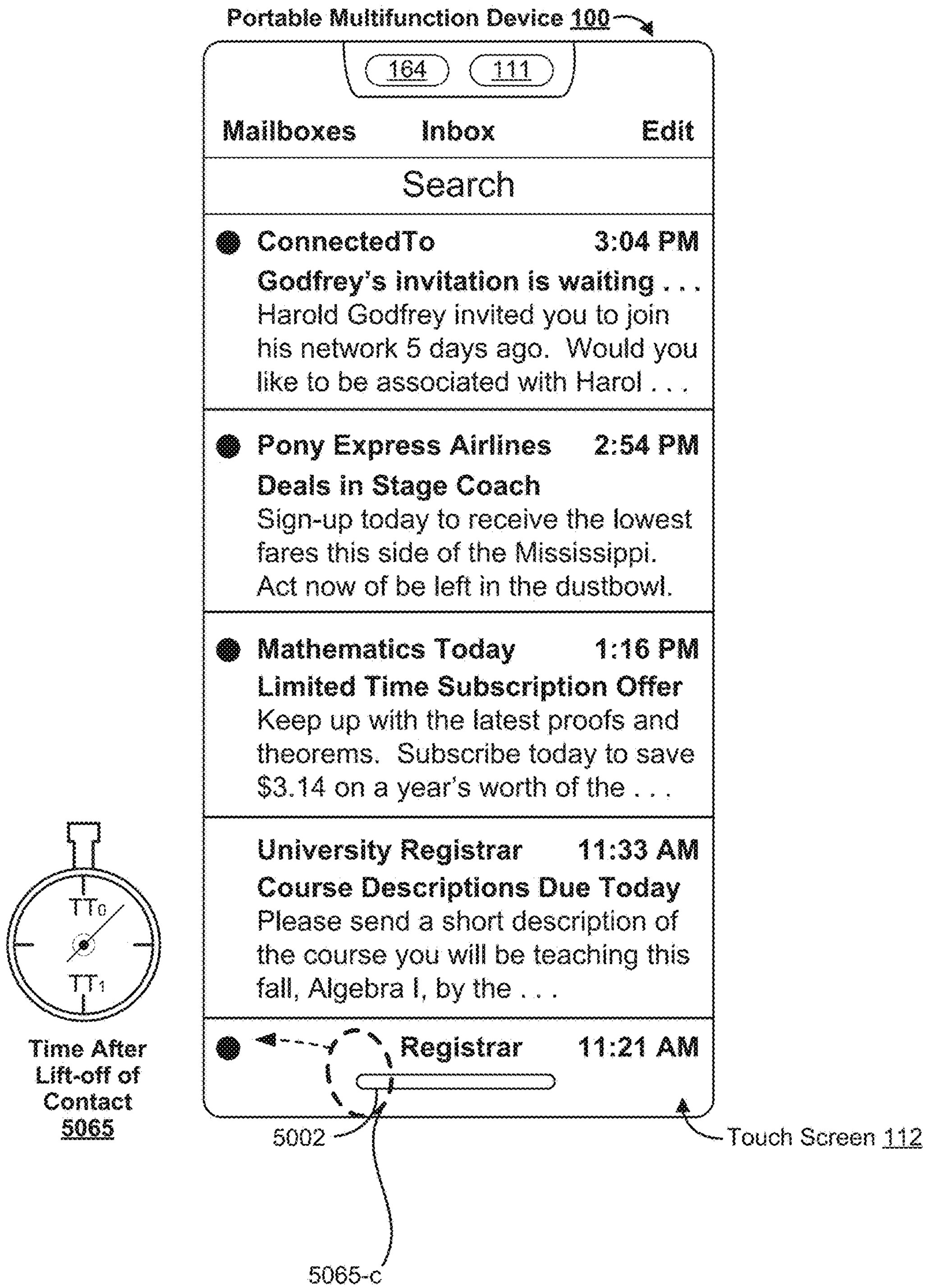
Figure 5A48

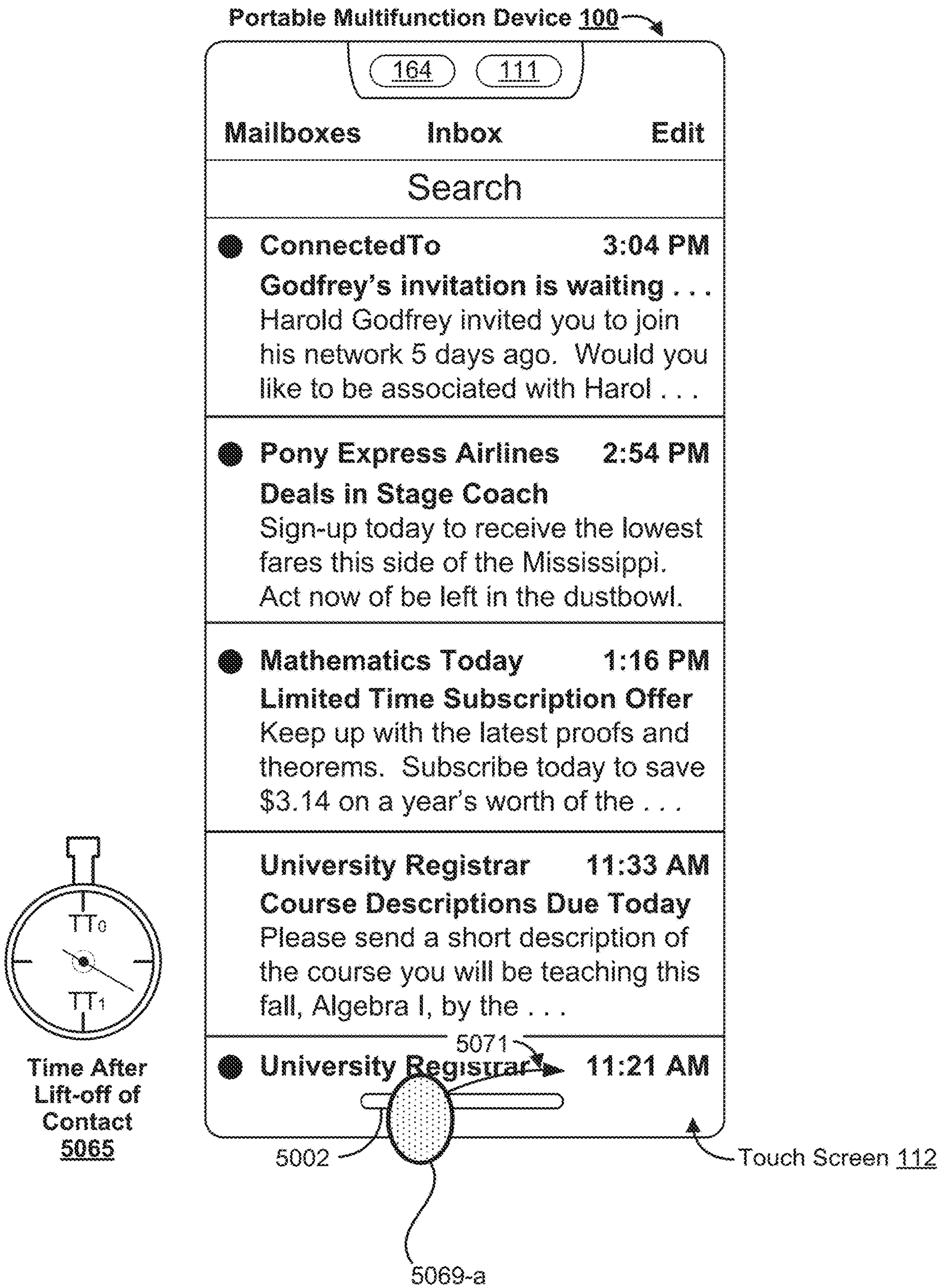
Figure 5A49

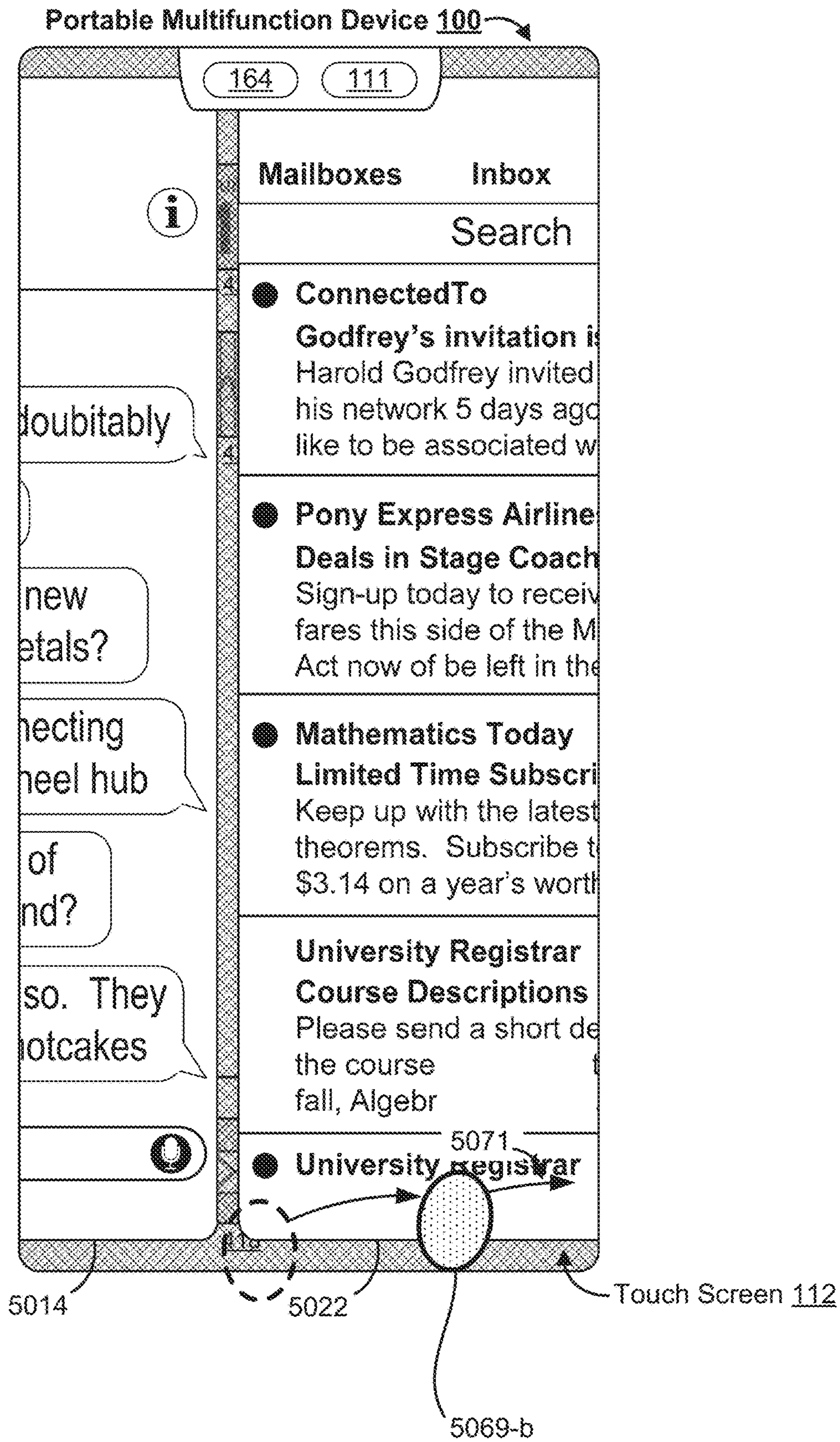
Figure 5A50

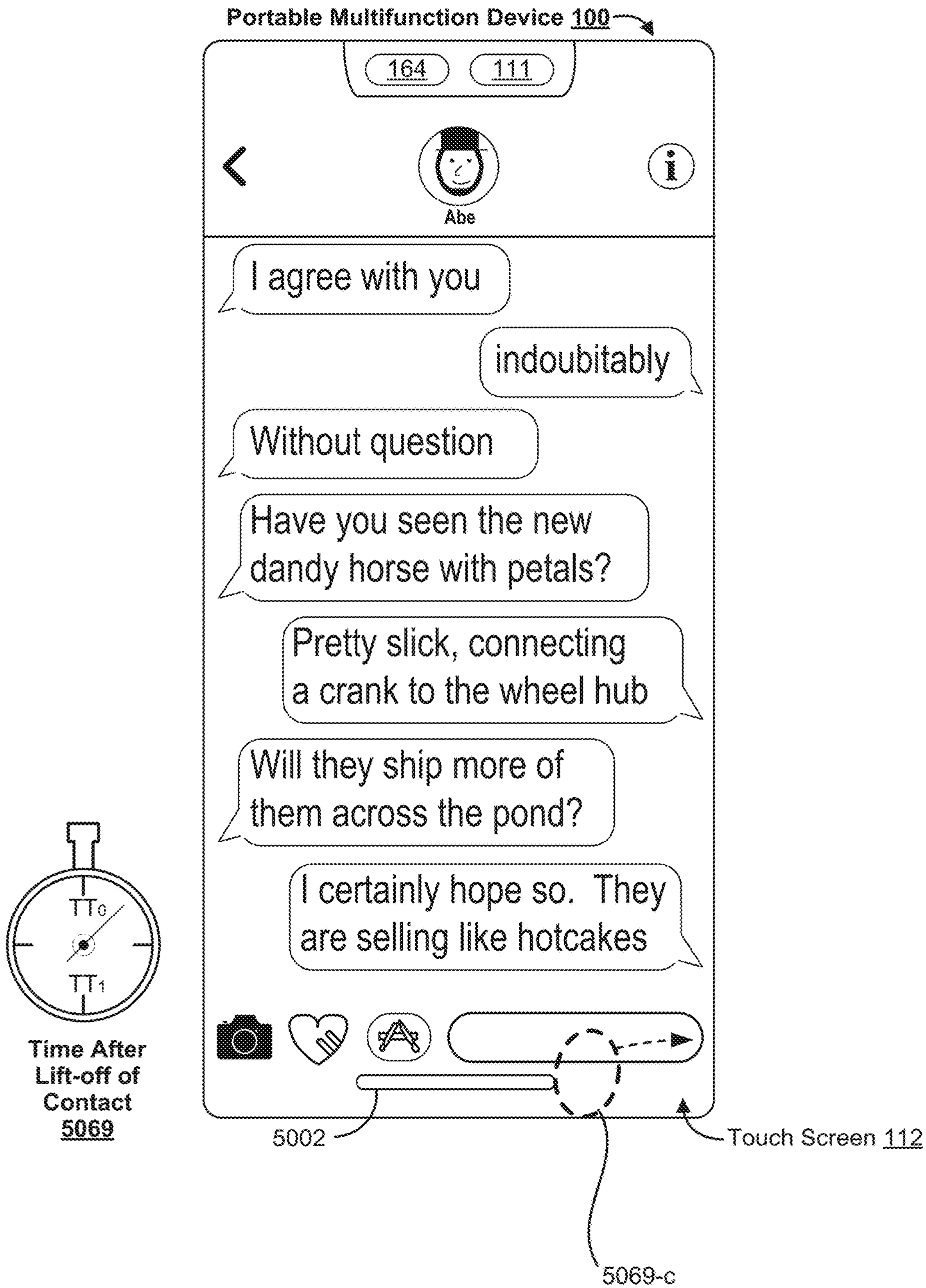
Figure 5A51

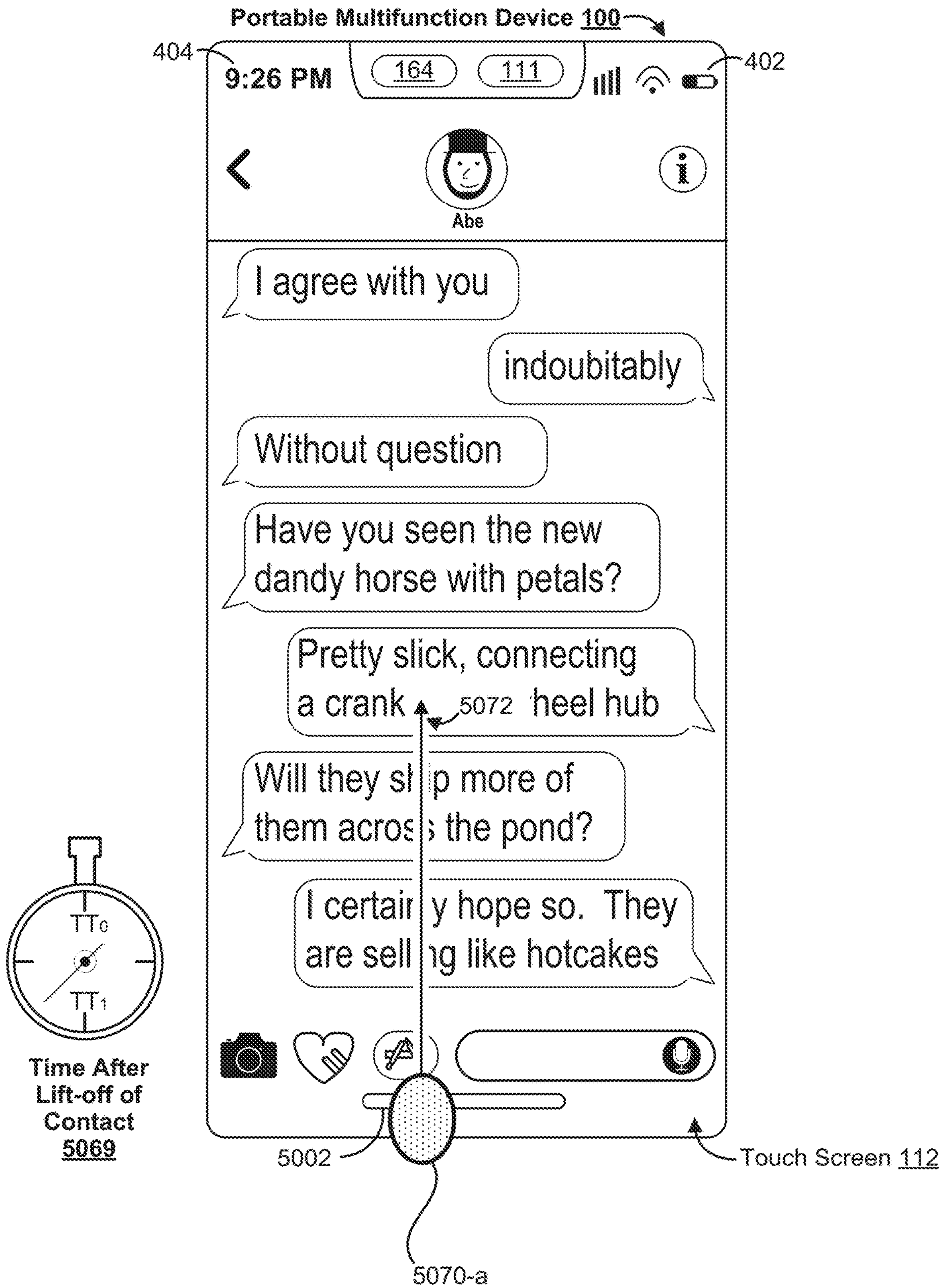
Figure 5A52

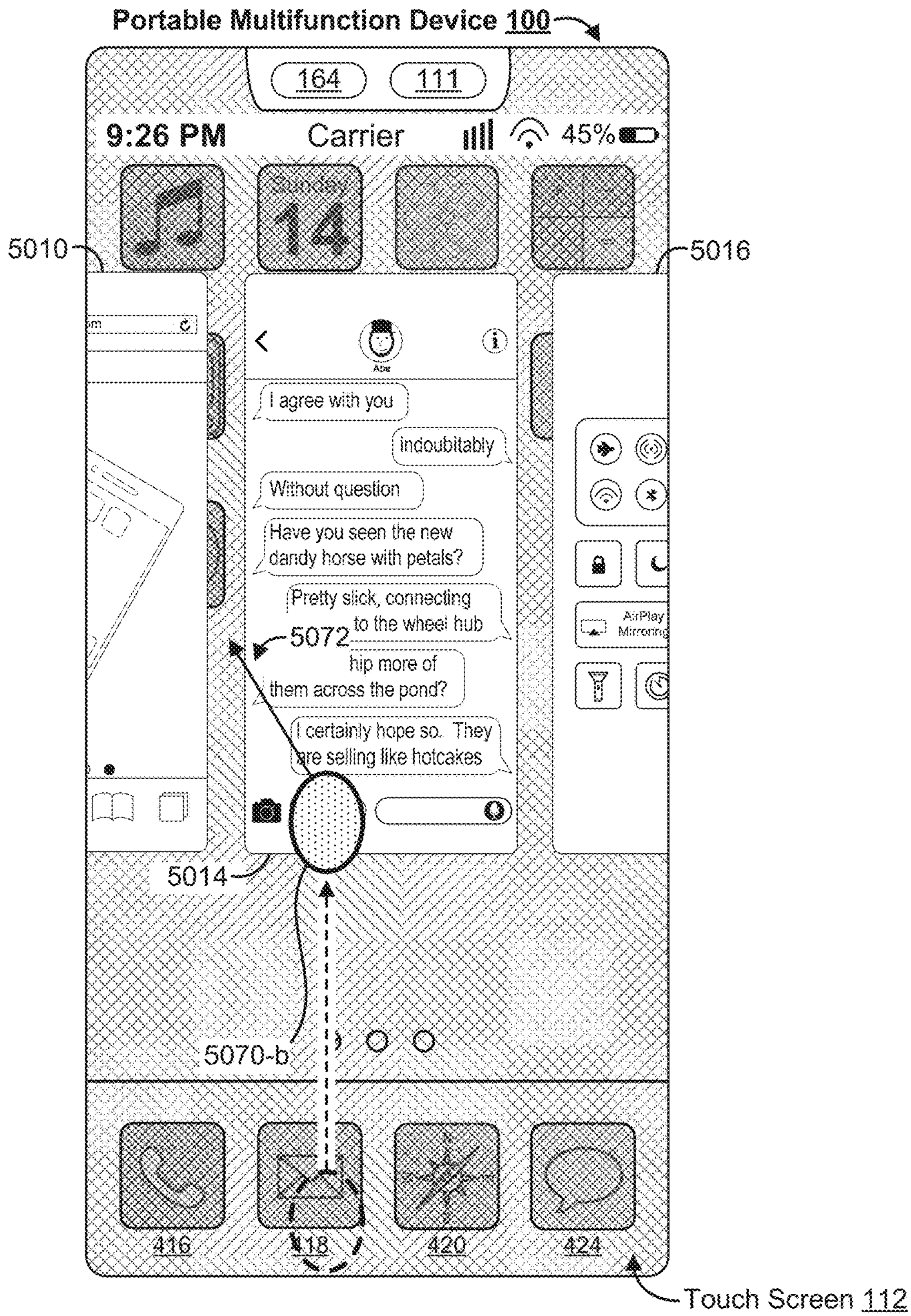
Figure 5A53

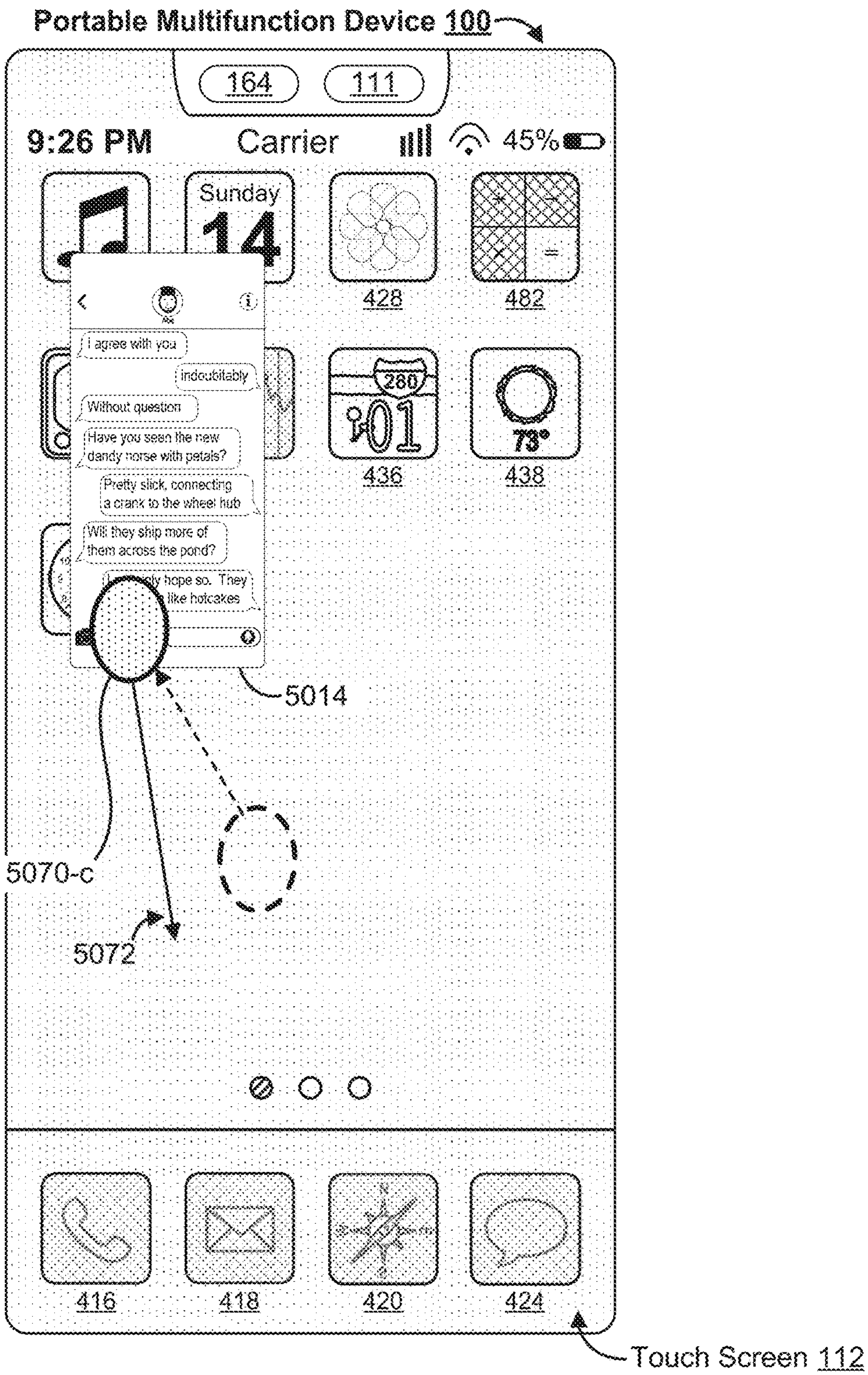
Figure 5A54

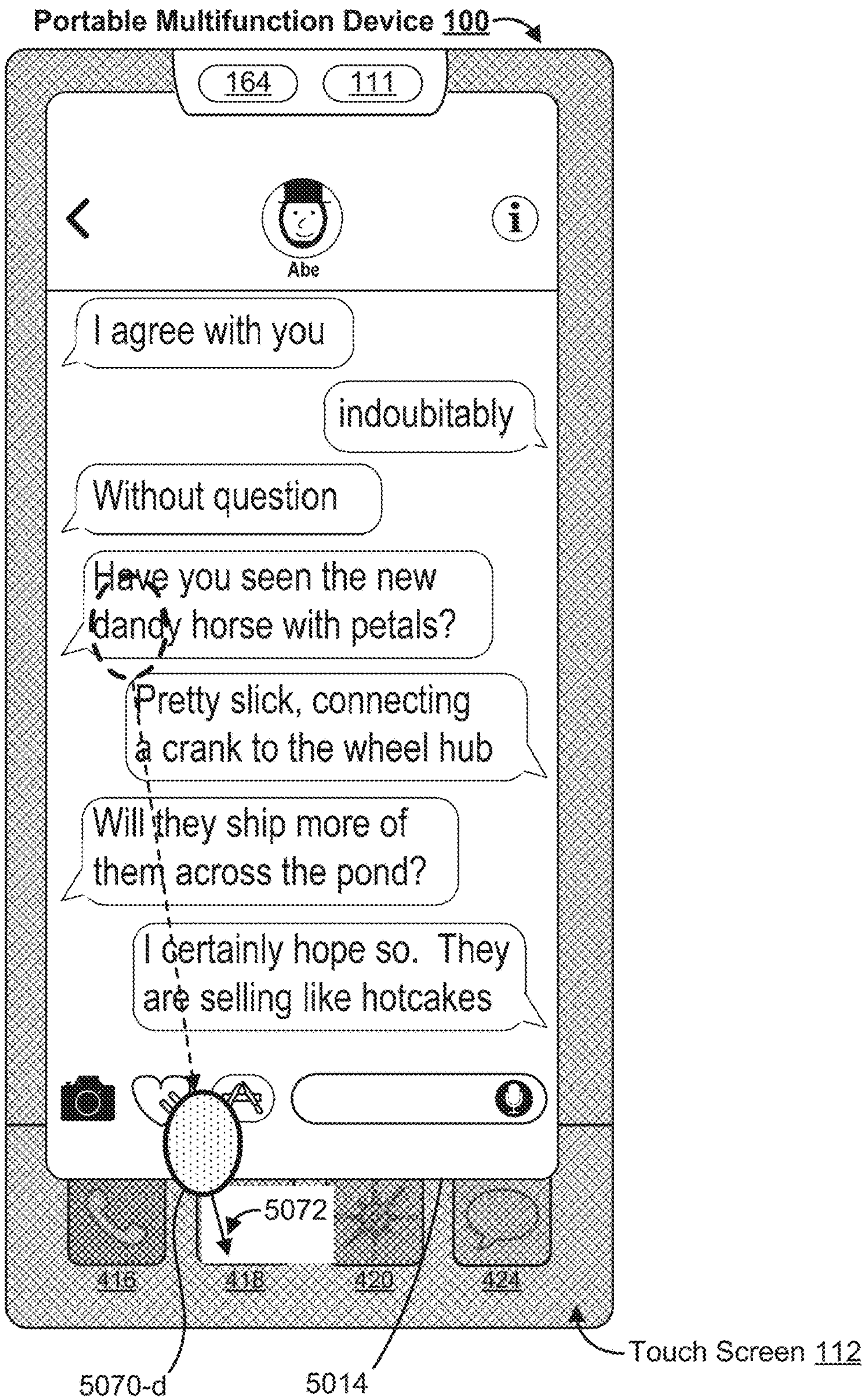
Figure 5A55

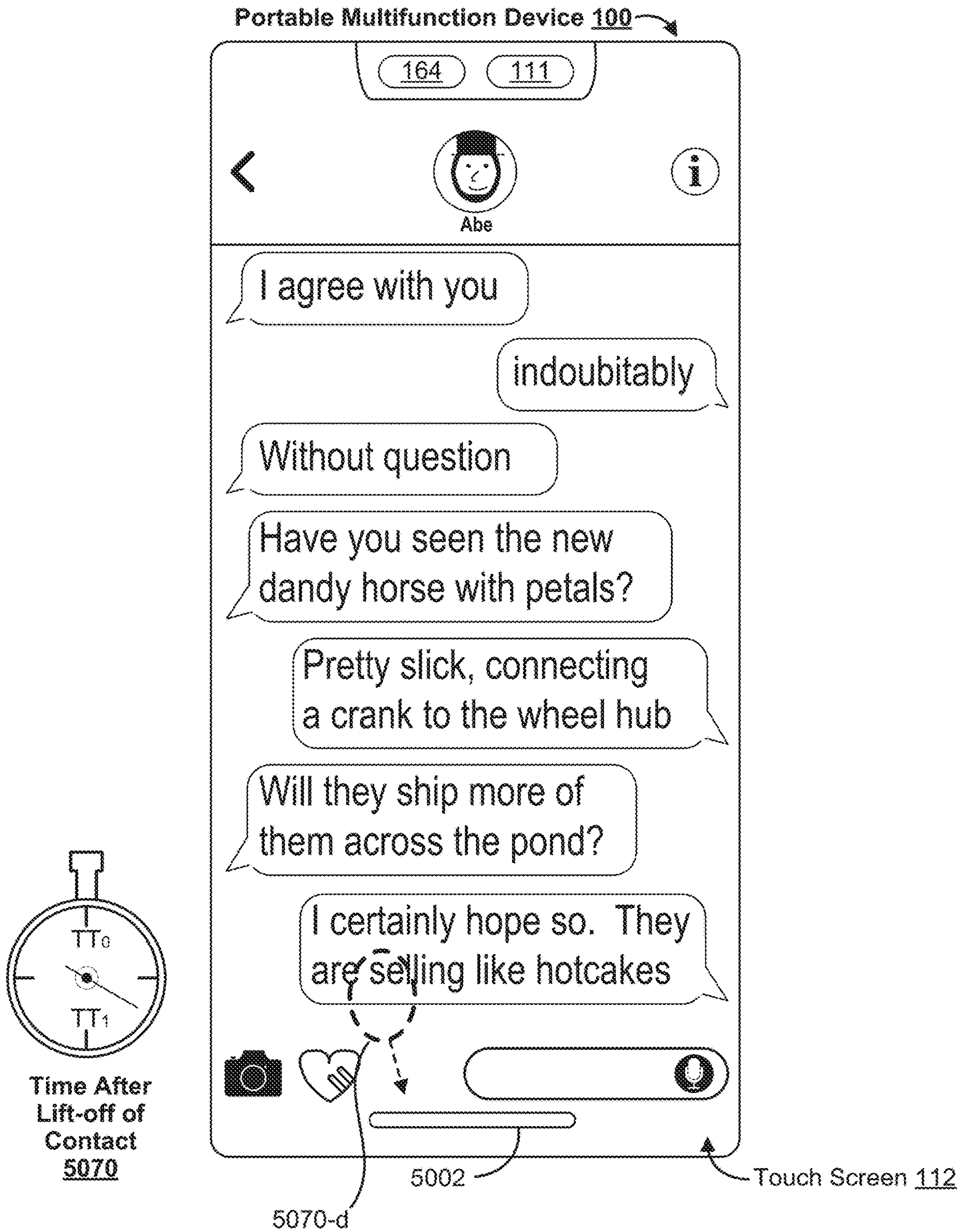
Figure 5A56

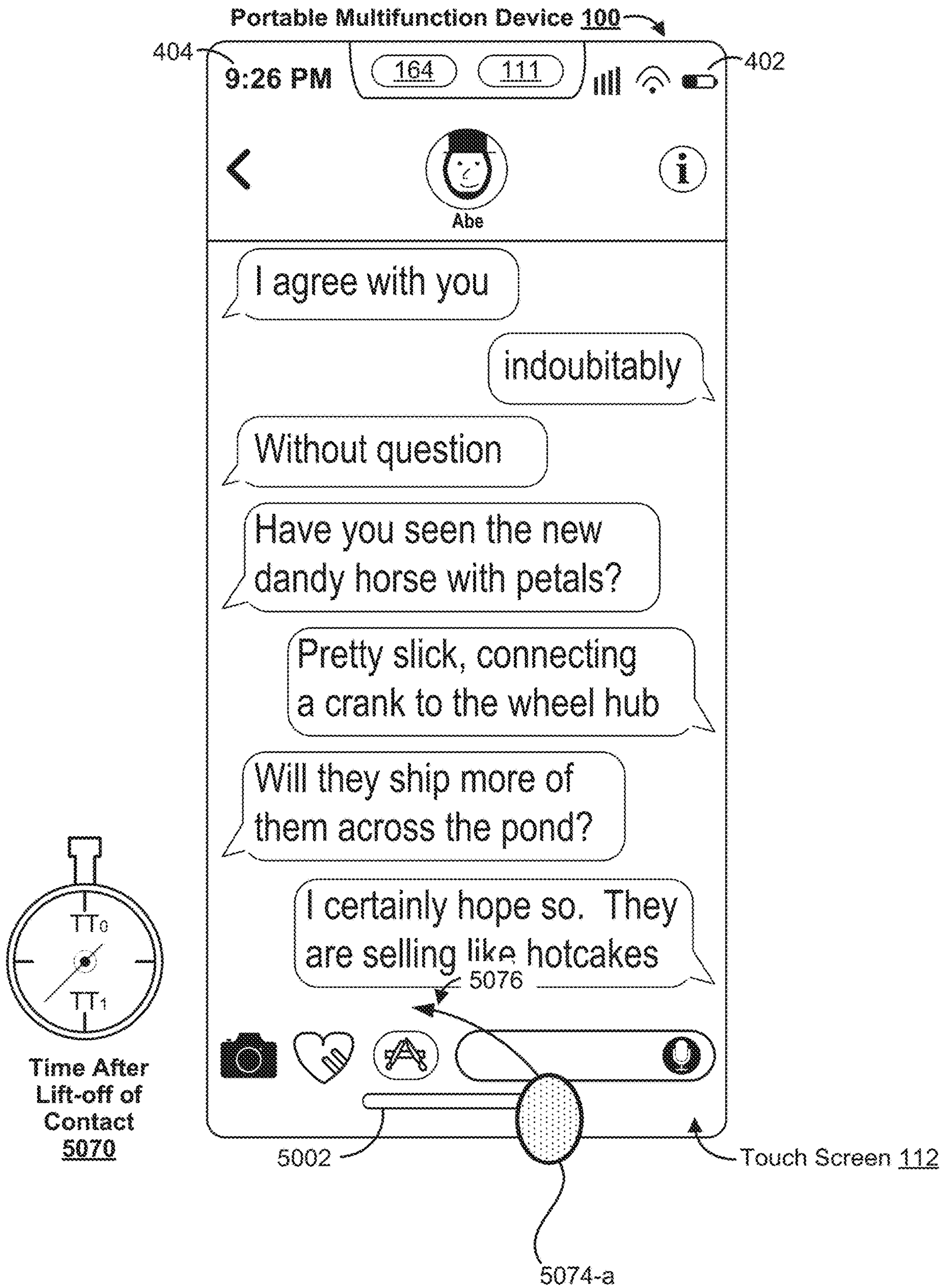
Figure 5A57

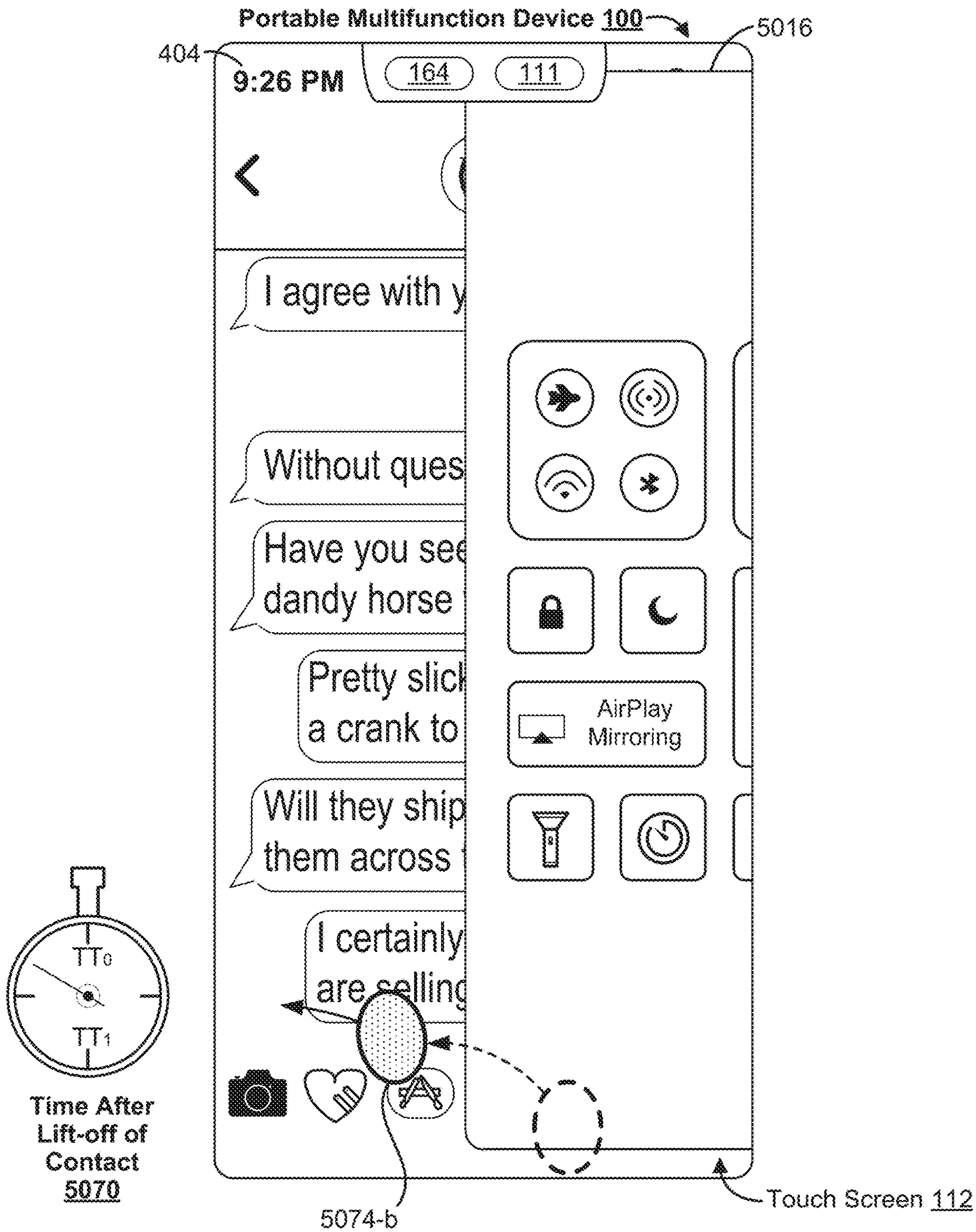
Figure 5A58

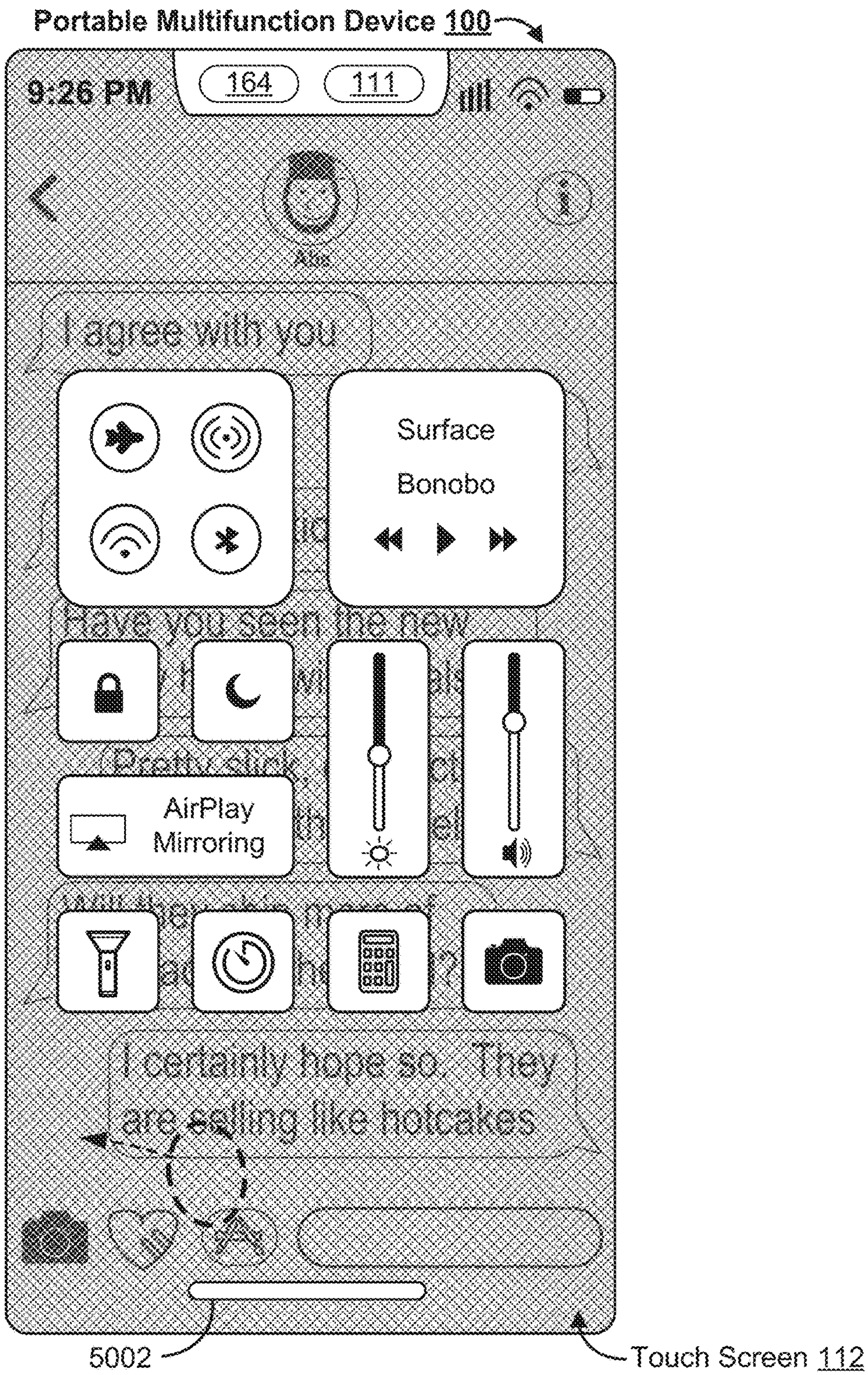
Figure 5A59

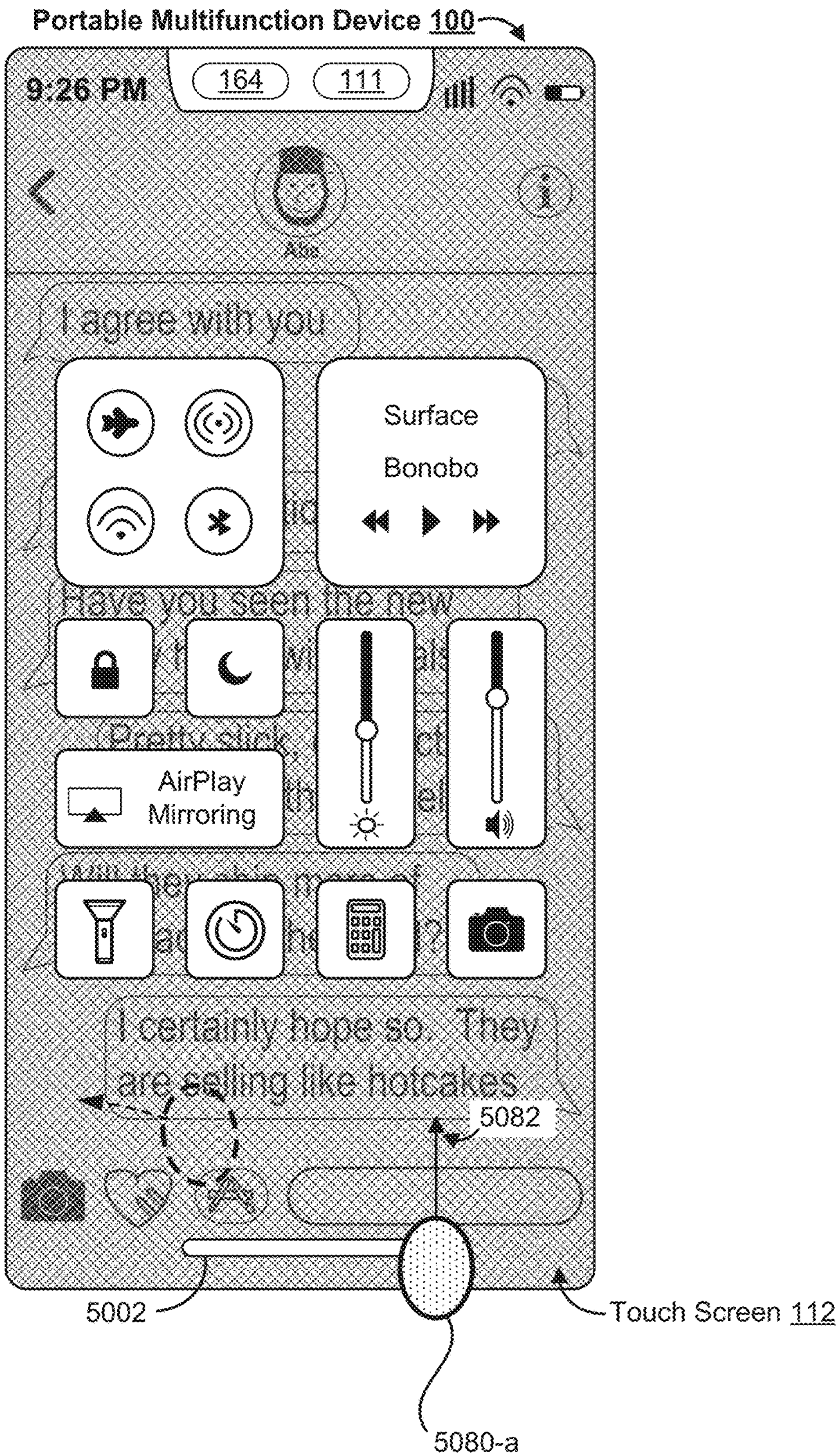
Figure 5A60

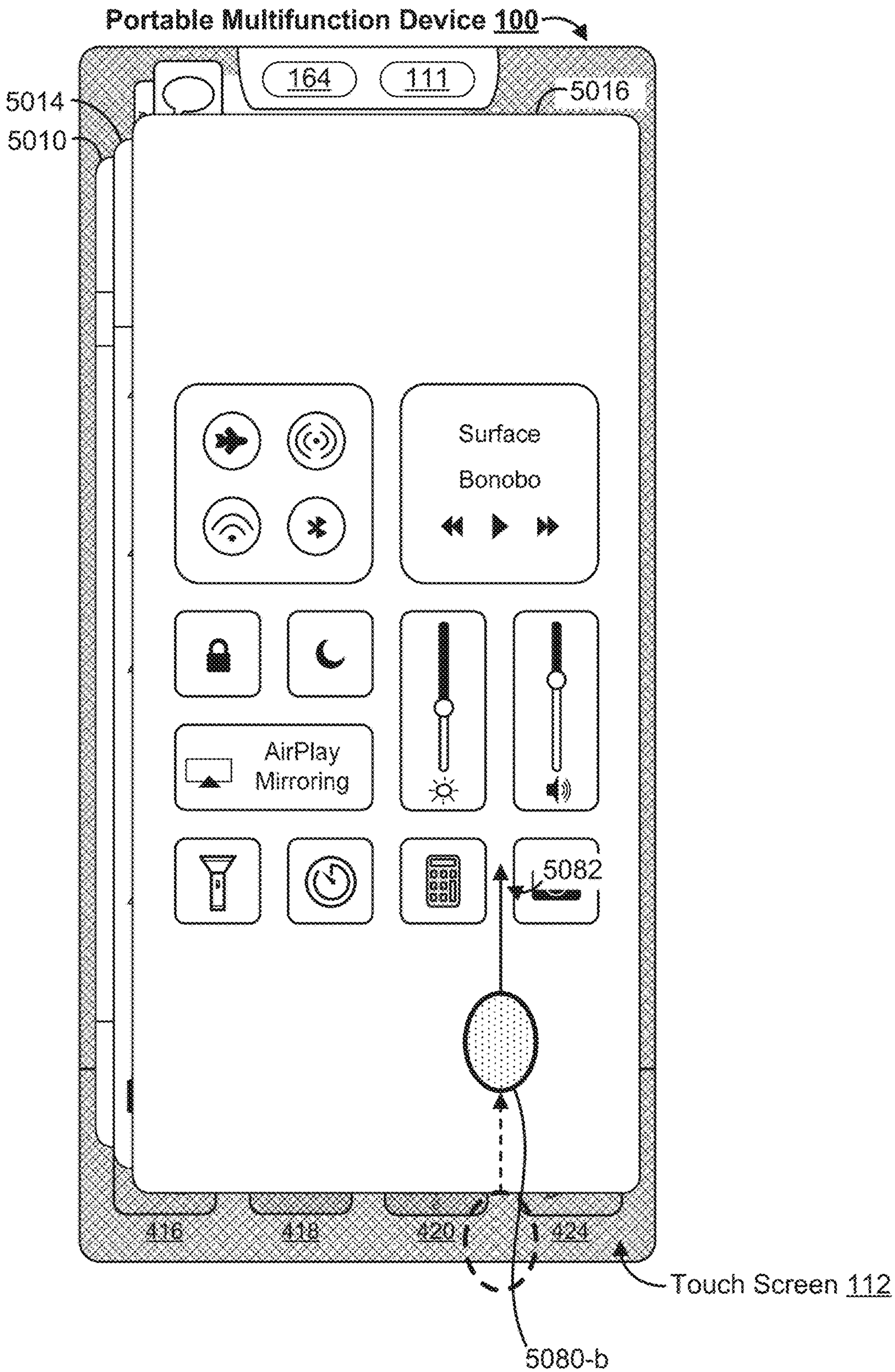
Figure 5A61

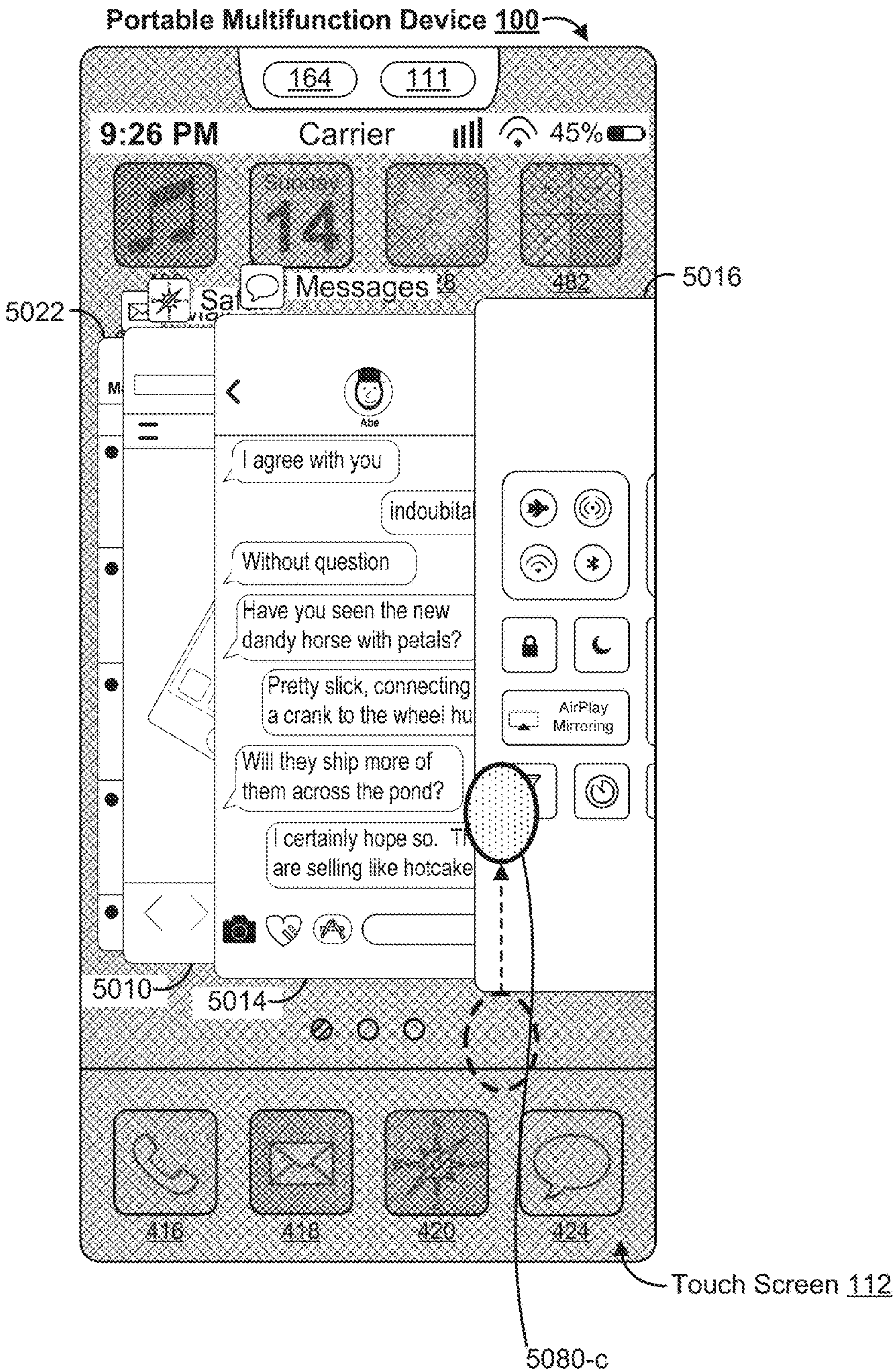
Figure 5A62

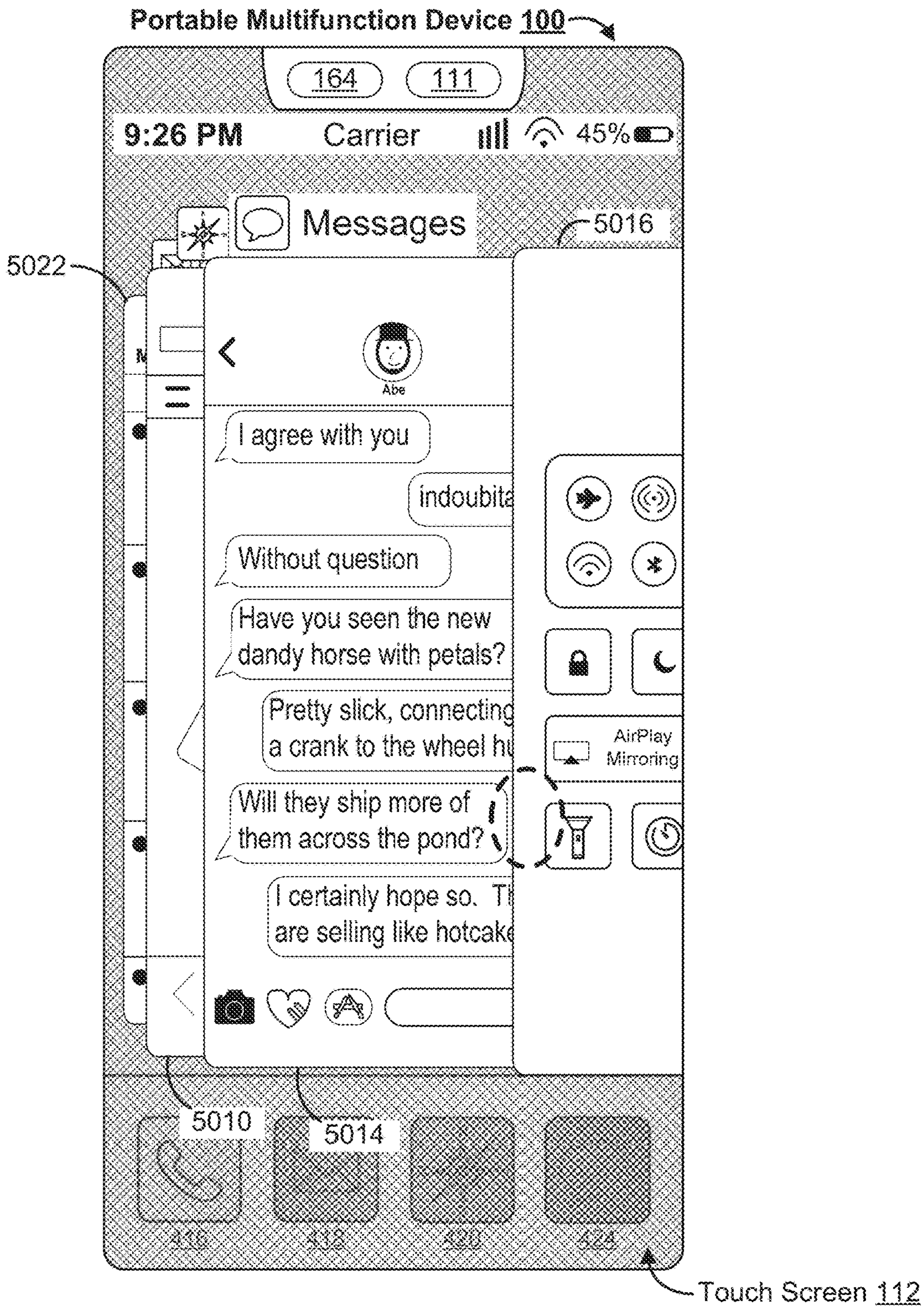
Figure 5A63

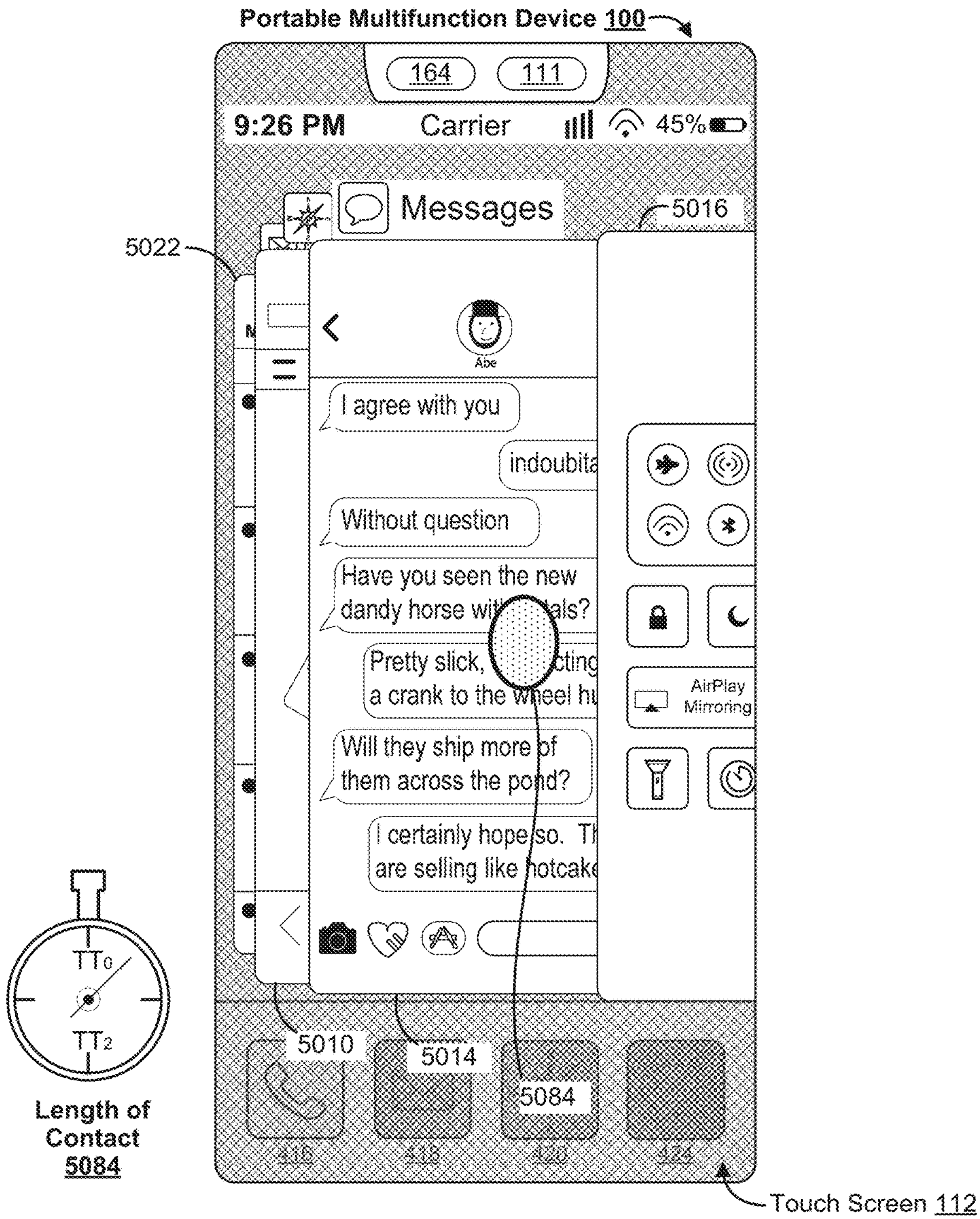
Figure 5A64

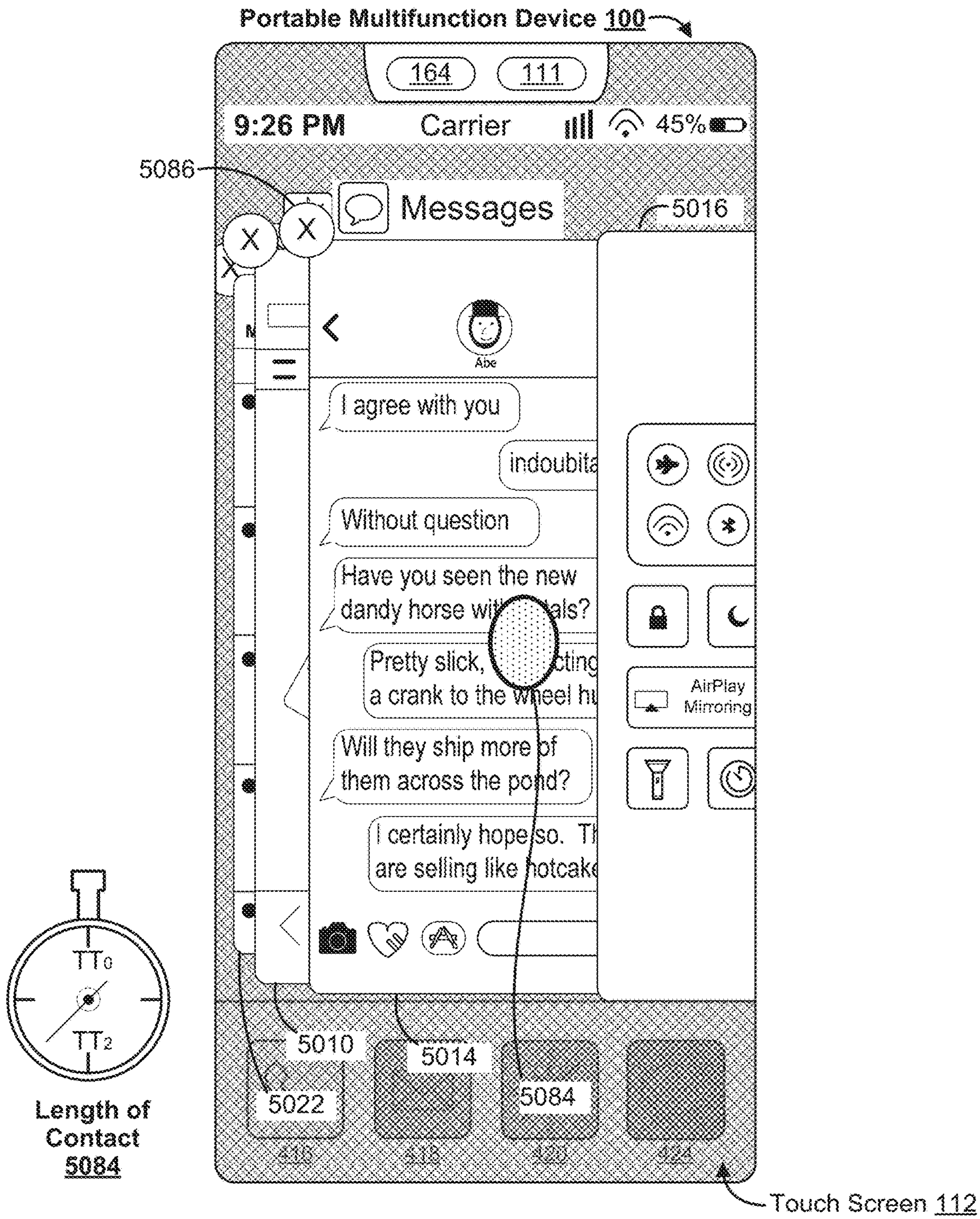
Figure 5A65

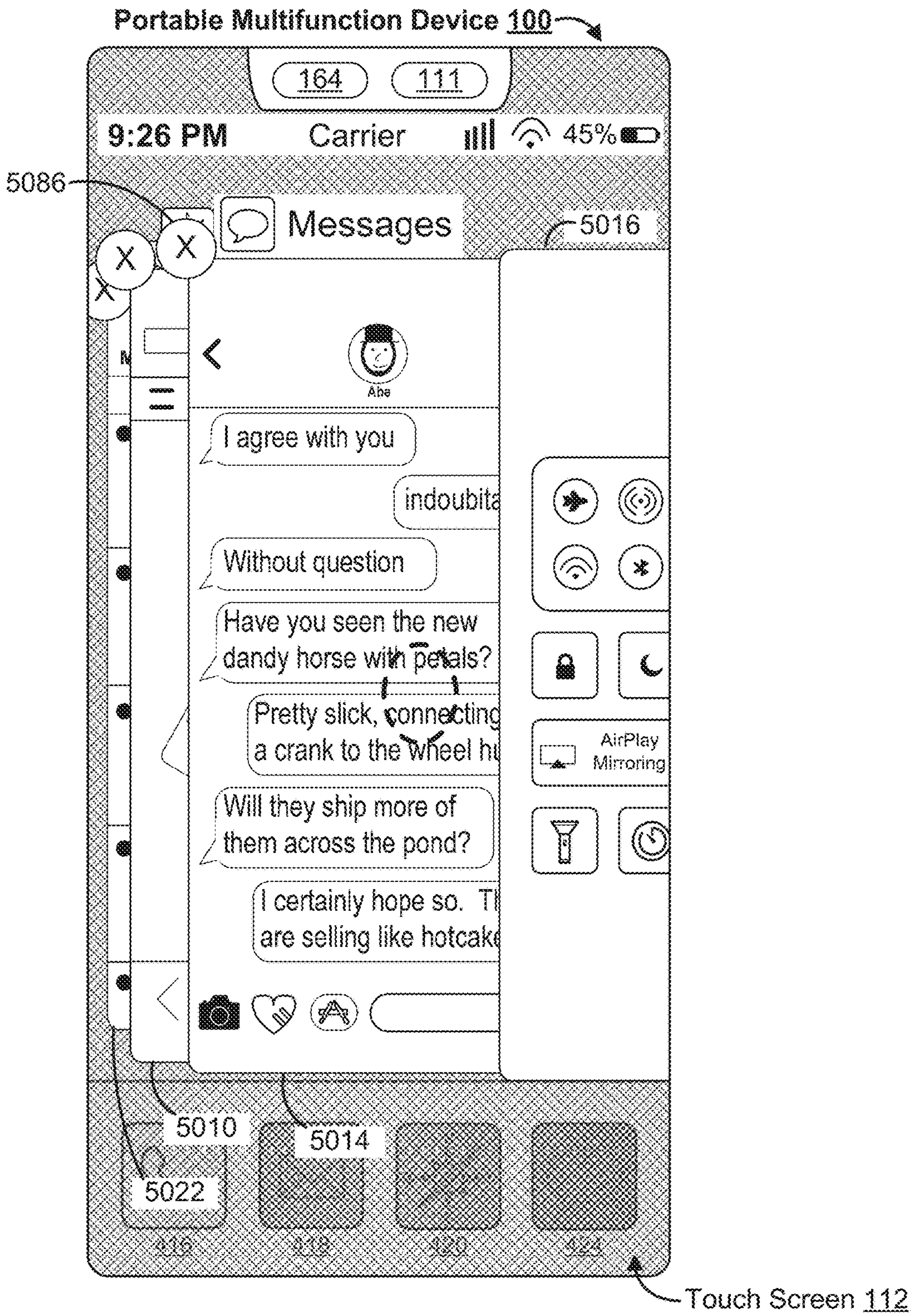
Figure 5A66

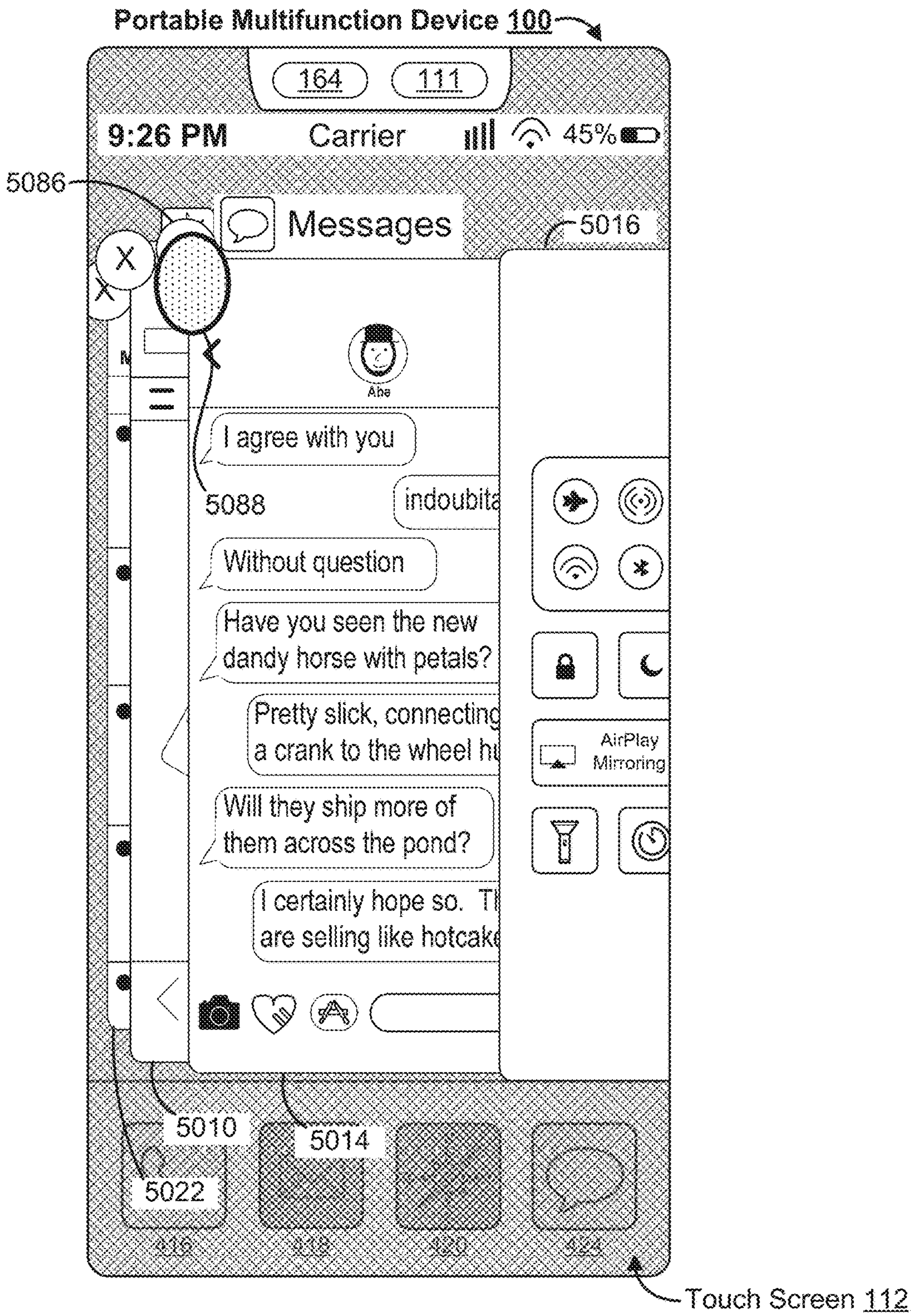
Figure 5A67

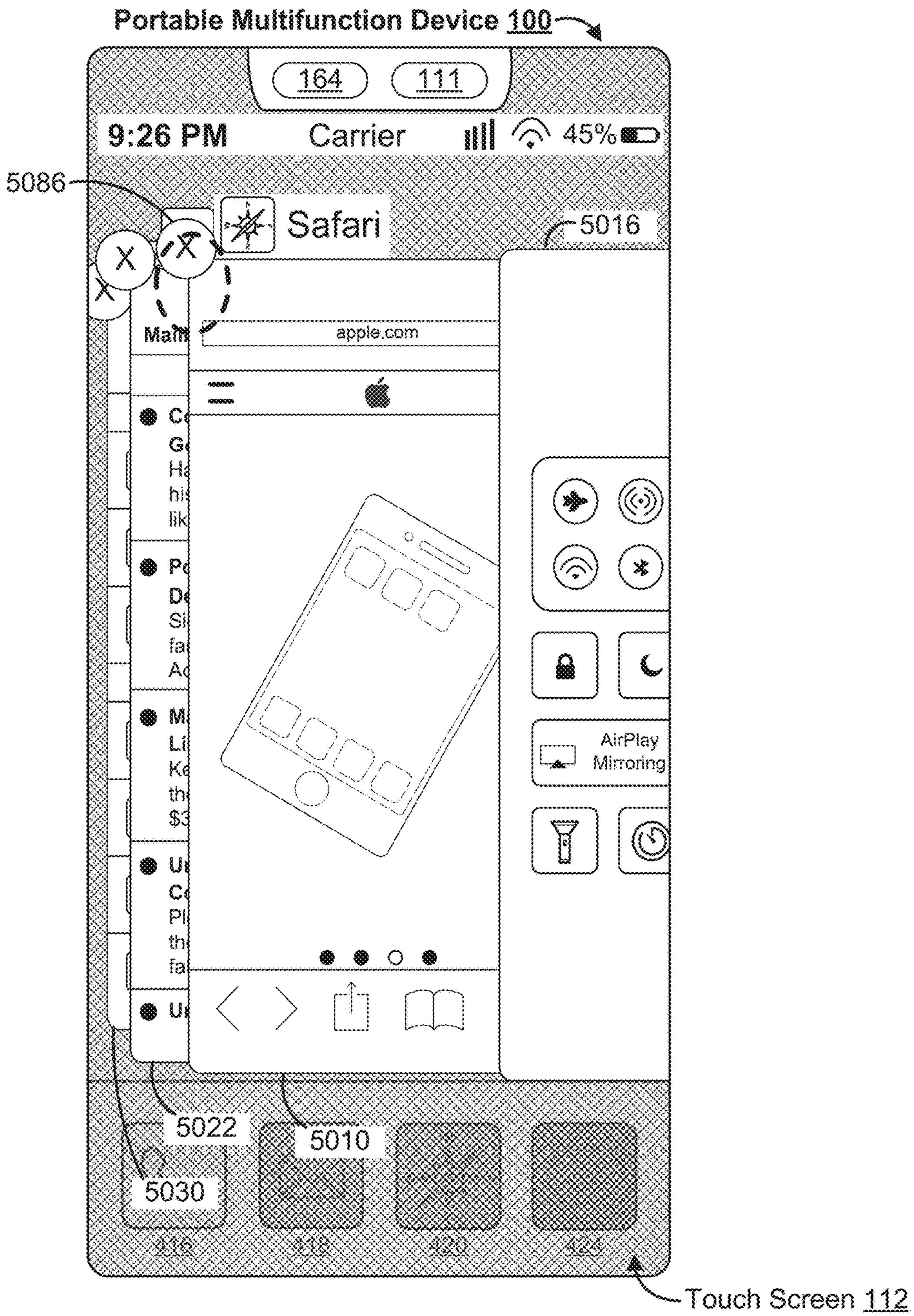
Figure 5A68

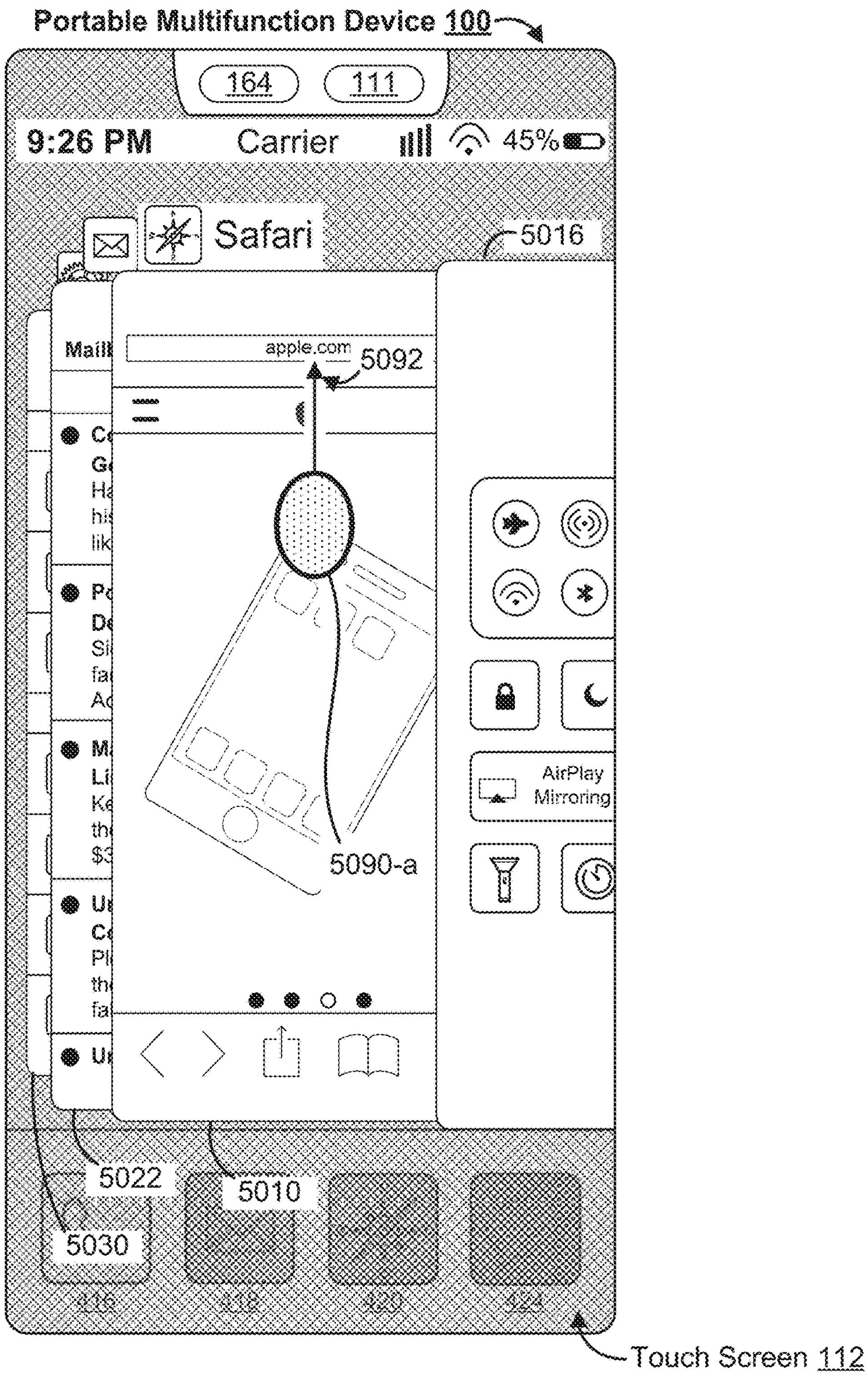
Figure 5A69

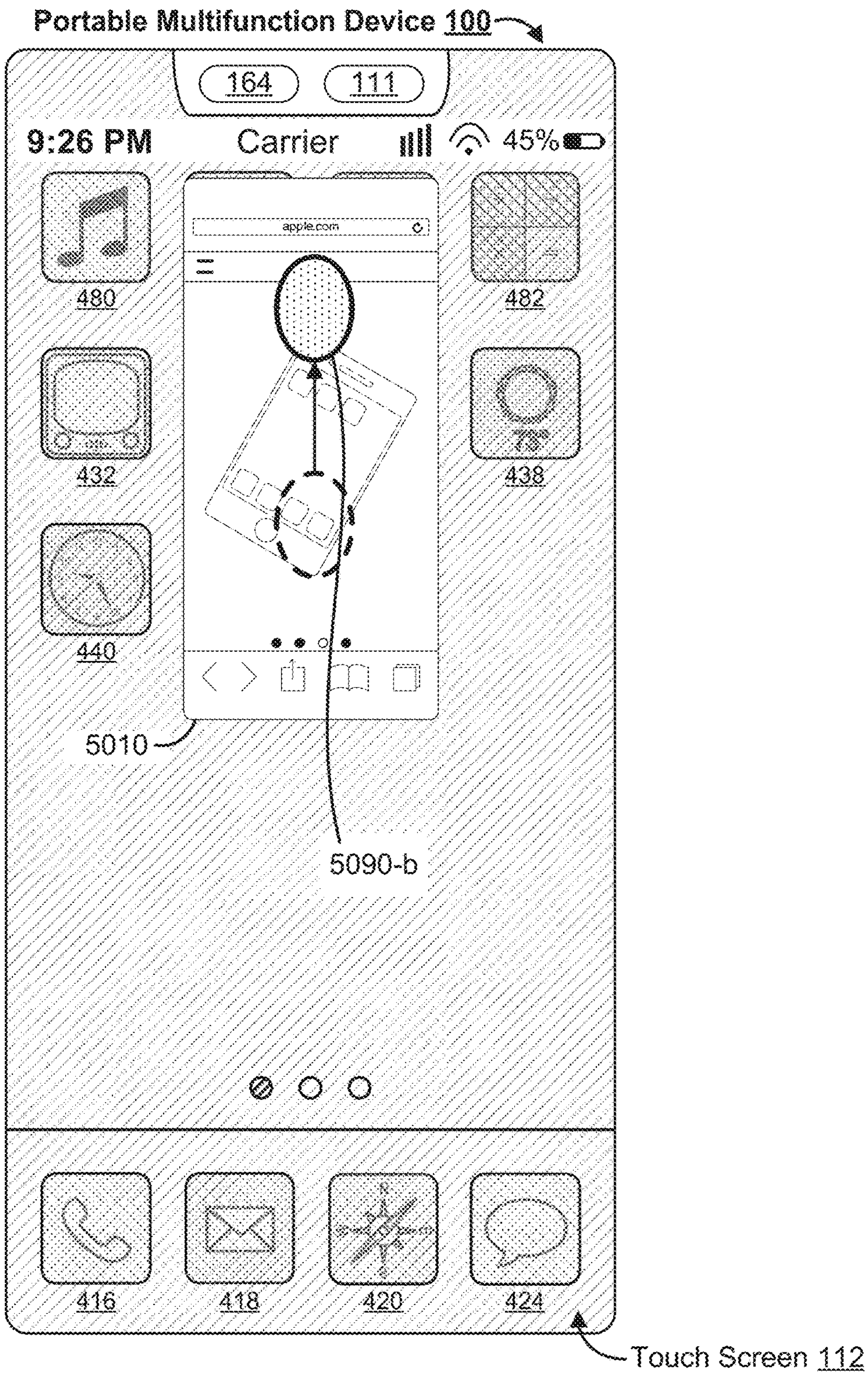
Figure 5A70

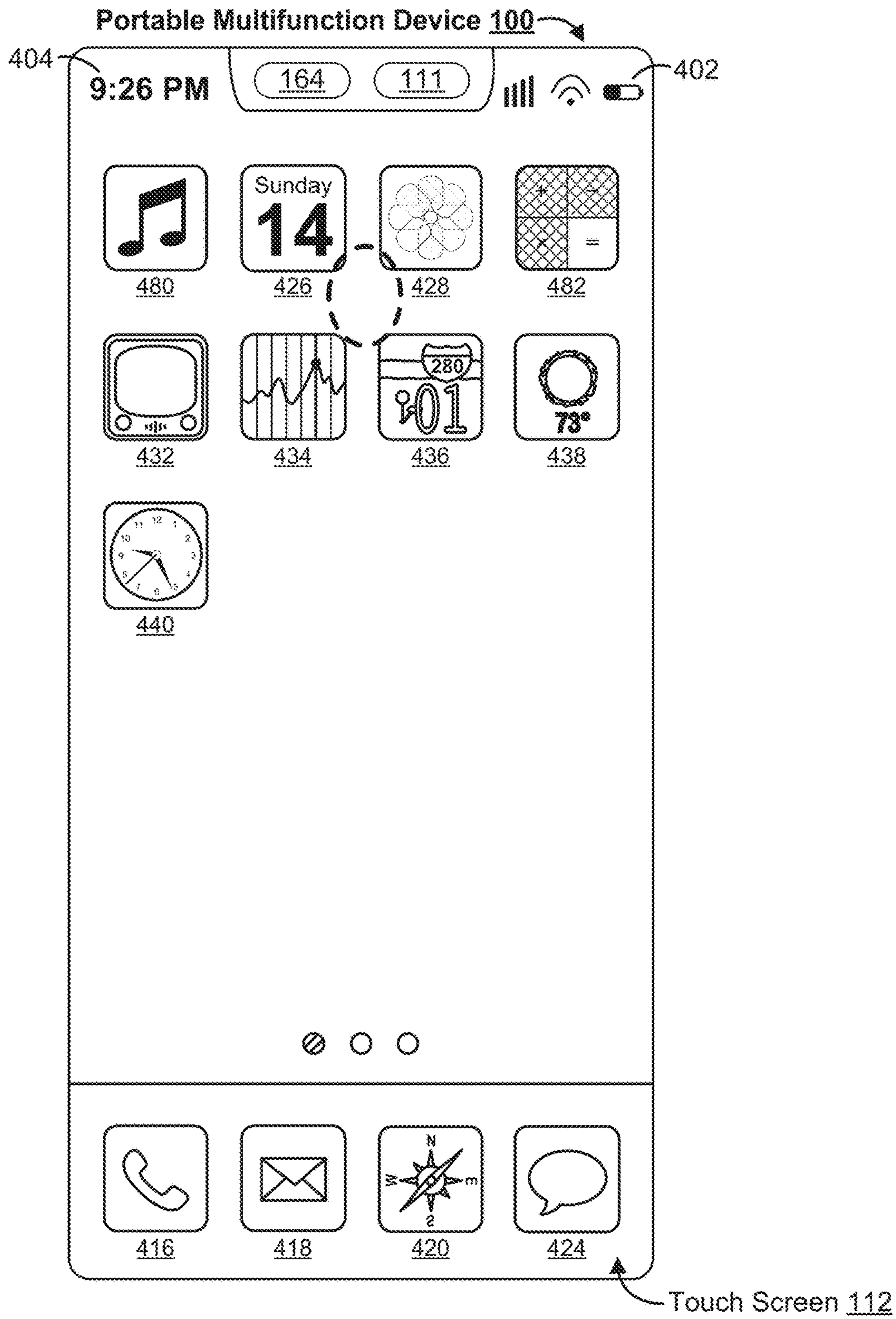
Figure 5A71

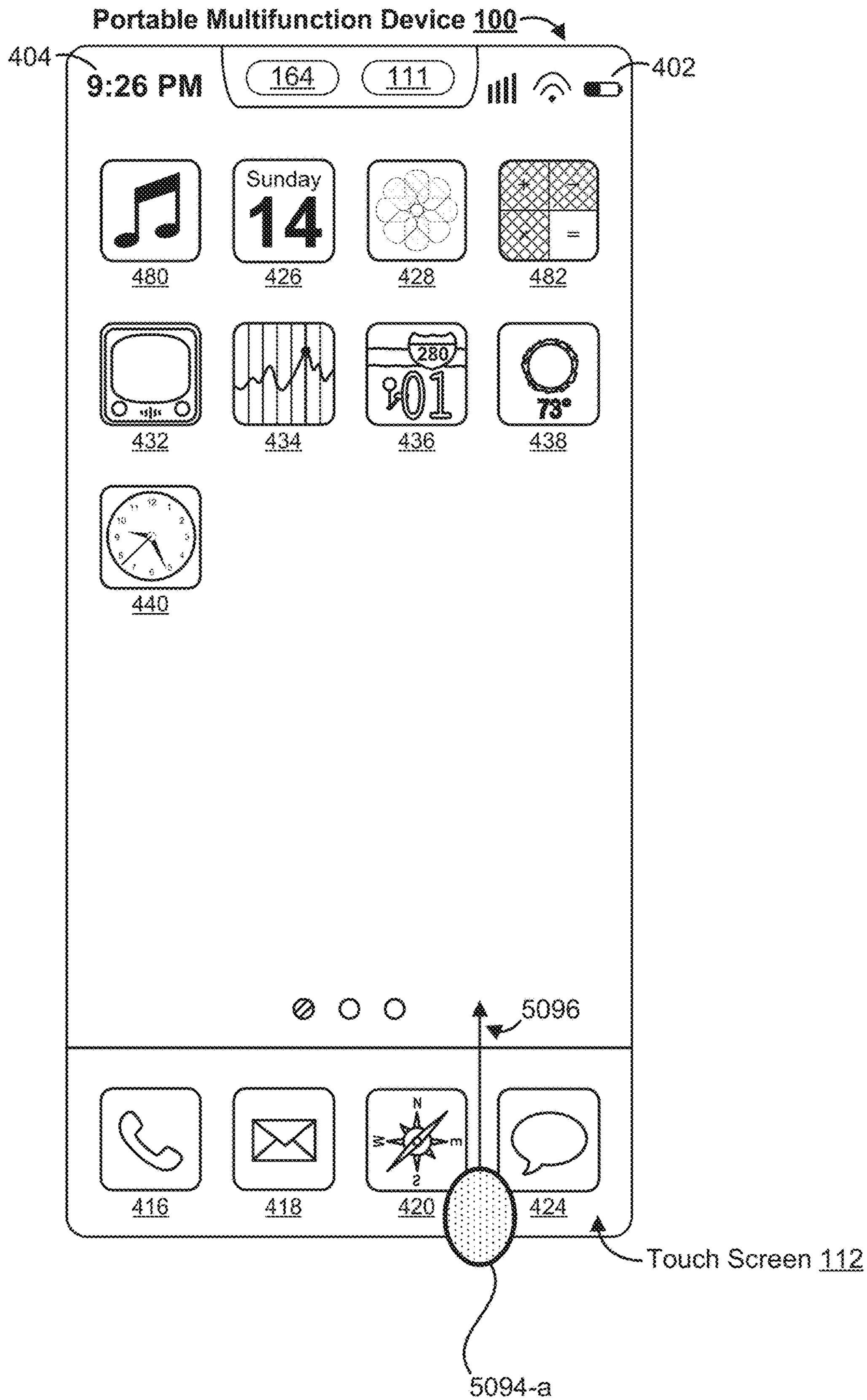
Figure 5A72

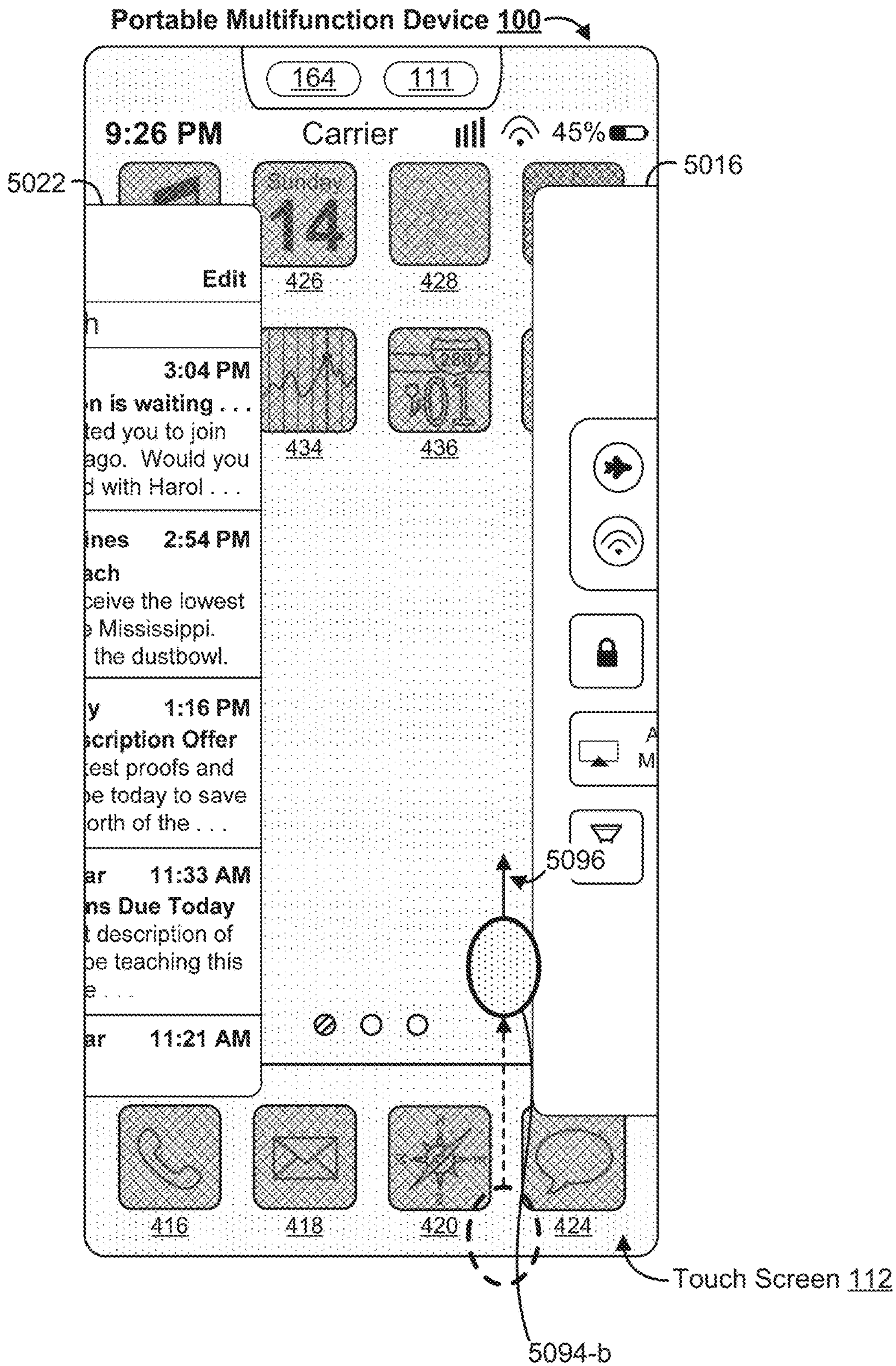
Figure 5A73

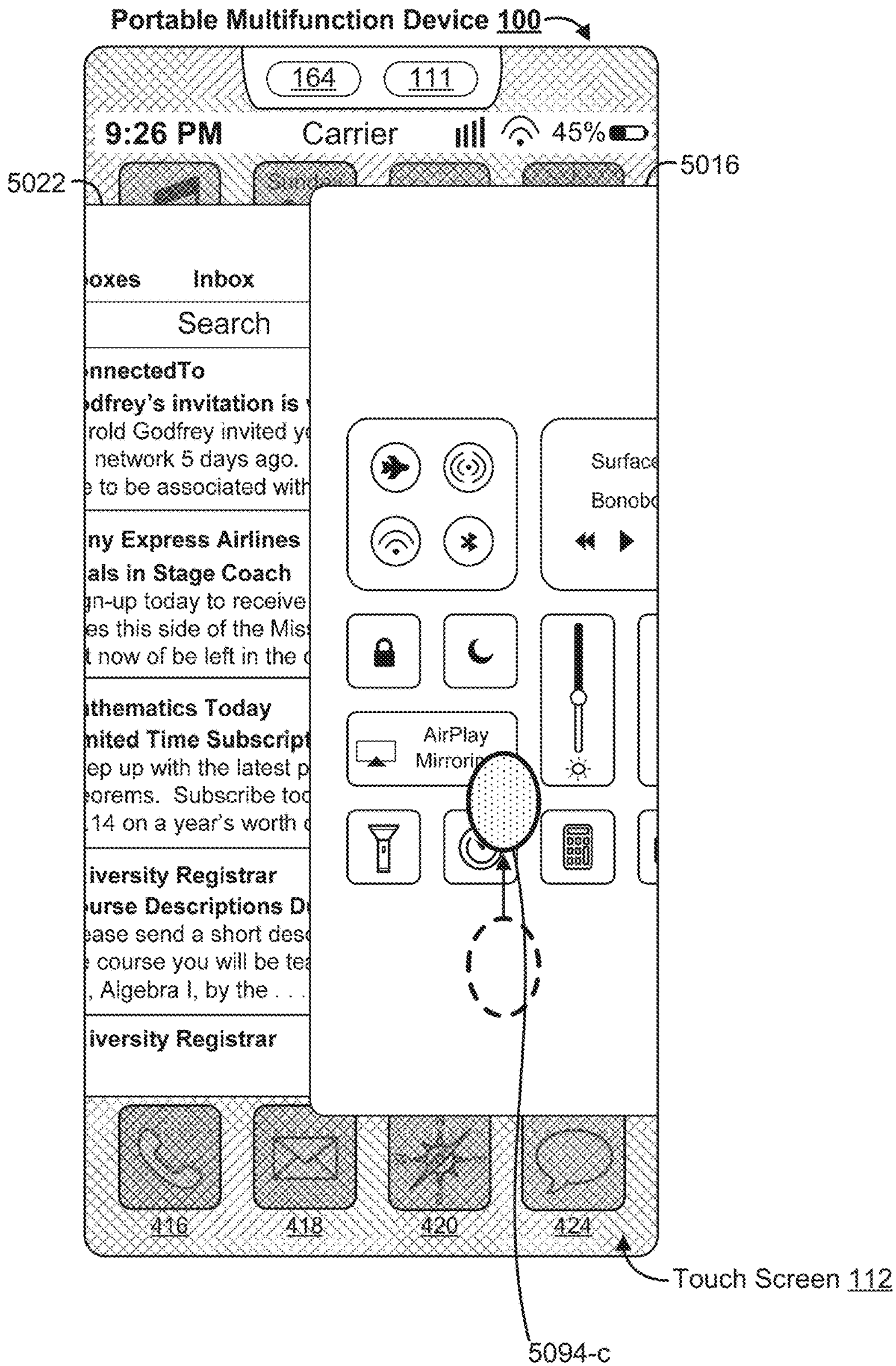
Figure 5A74

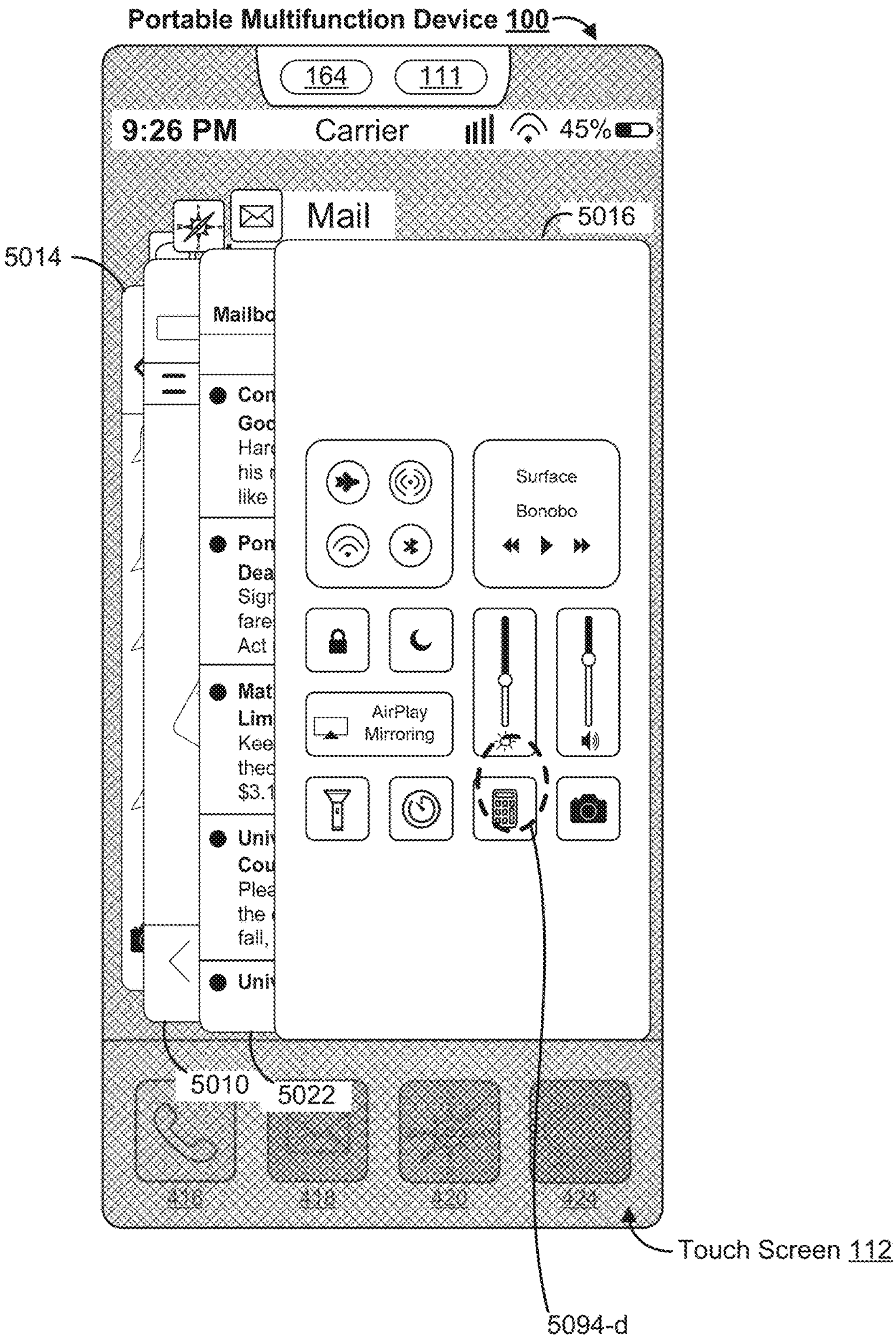
Figure 5A75

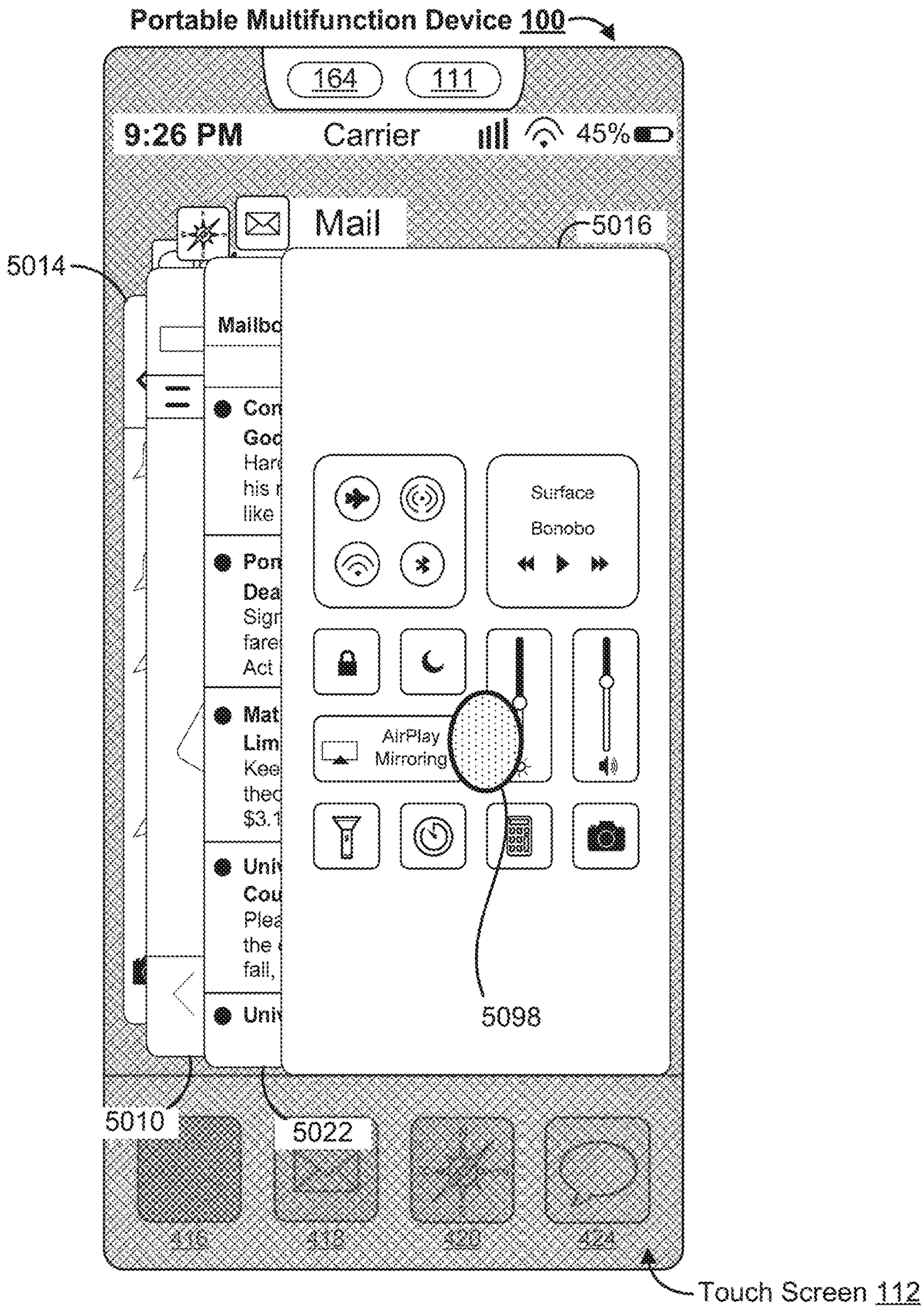
Figure 5A76

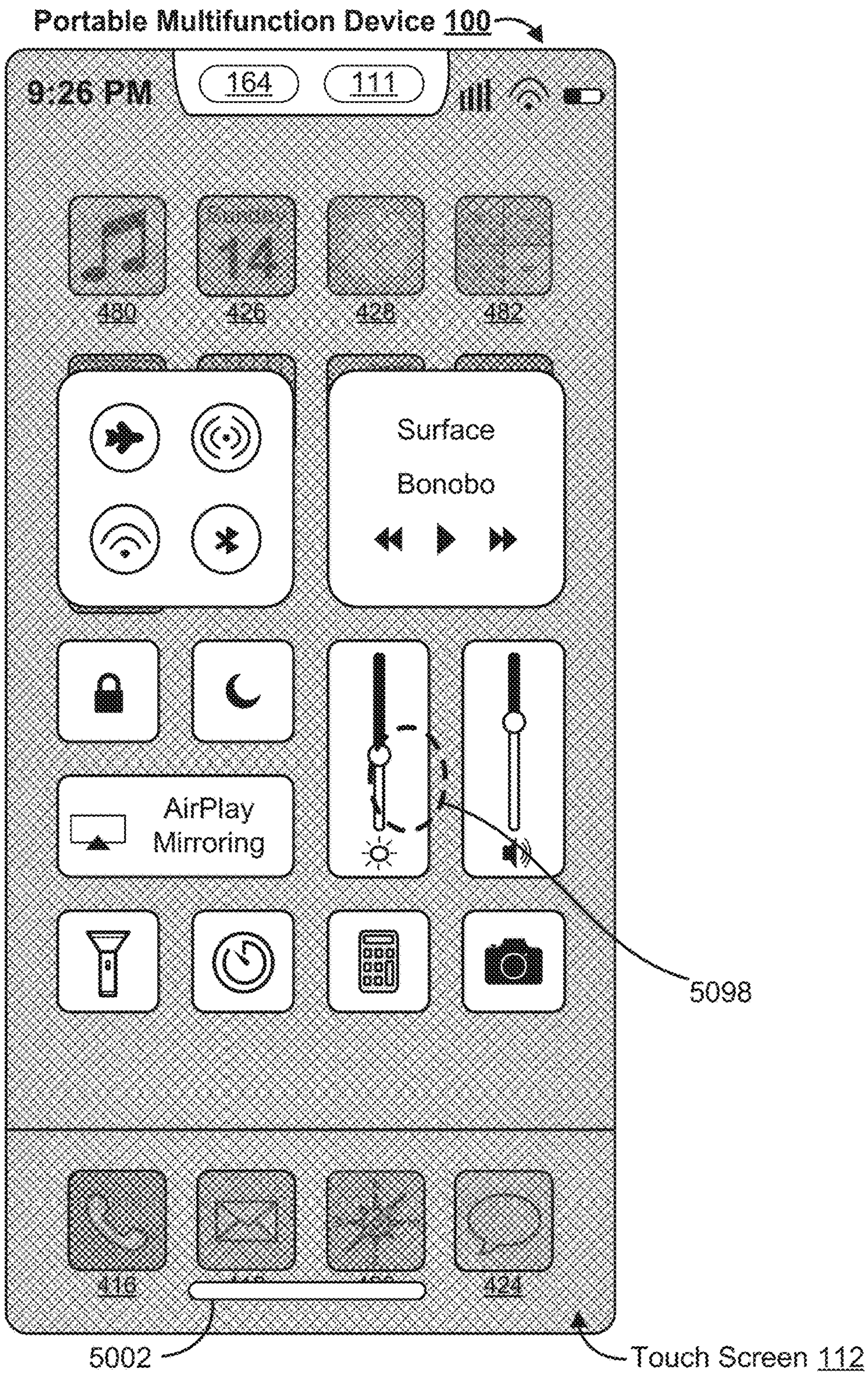
Figure 5A77

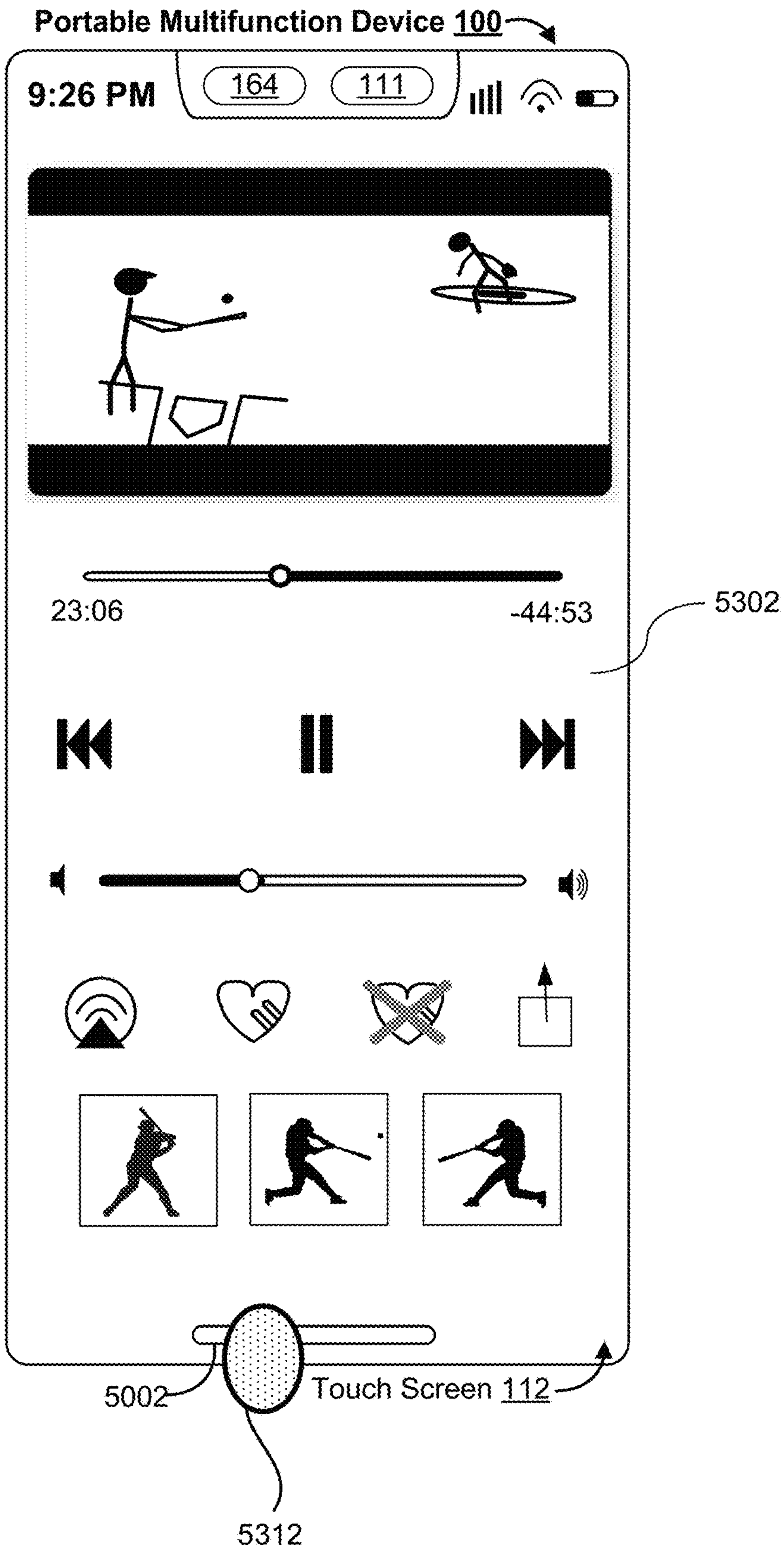
Figure 5B1

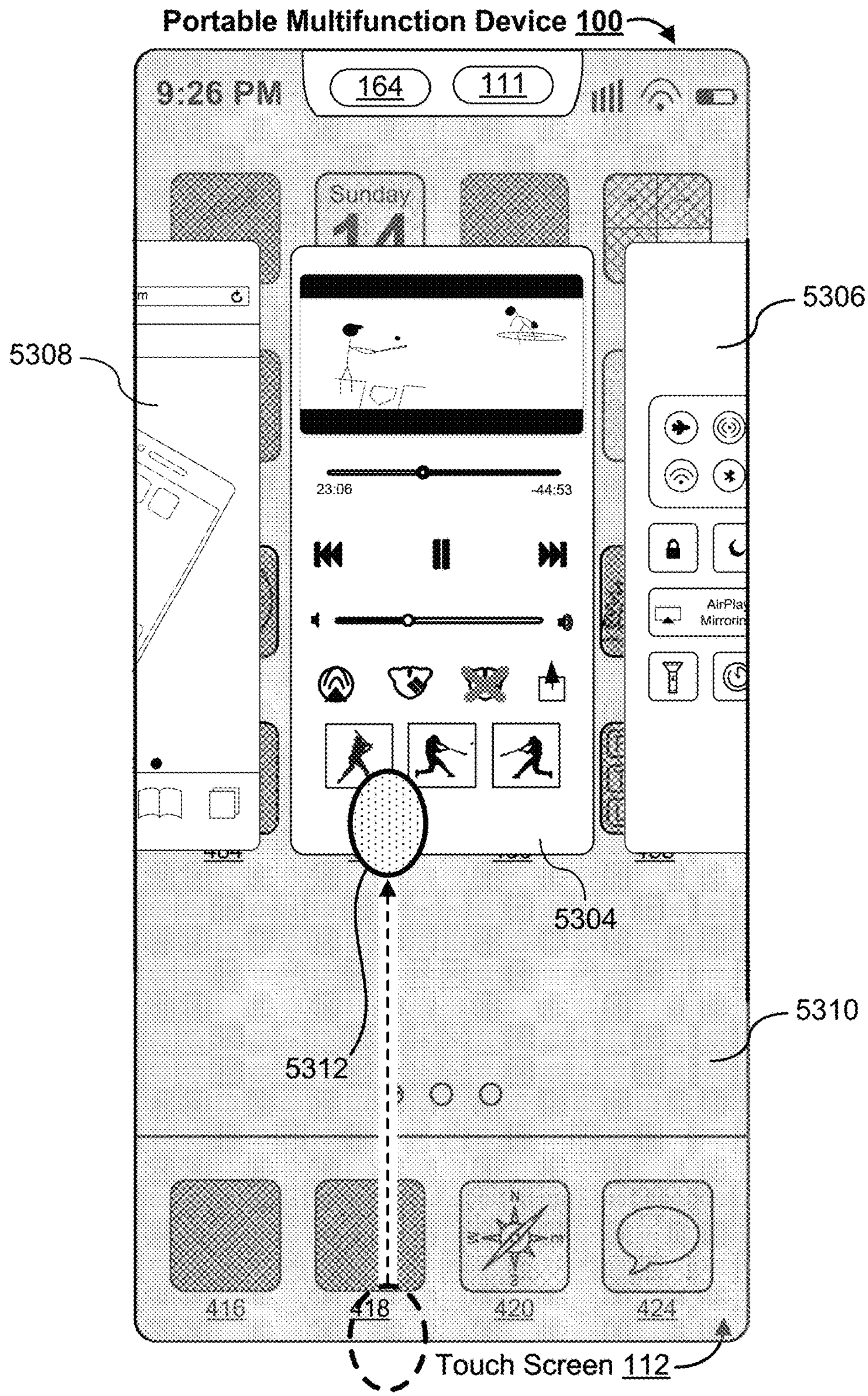
Figure 5B2

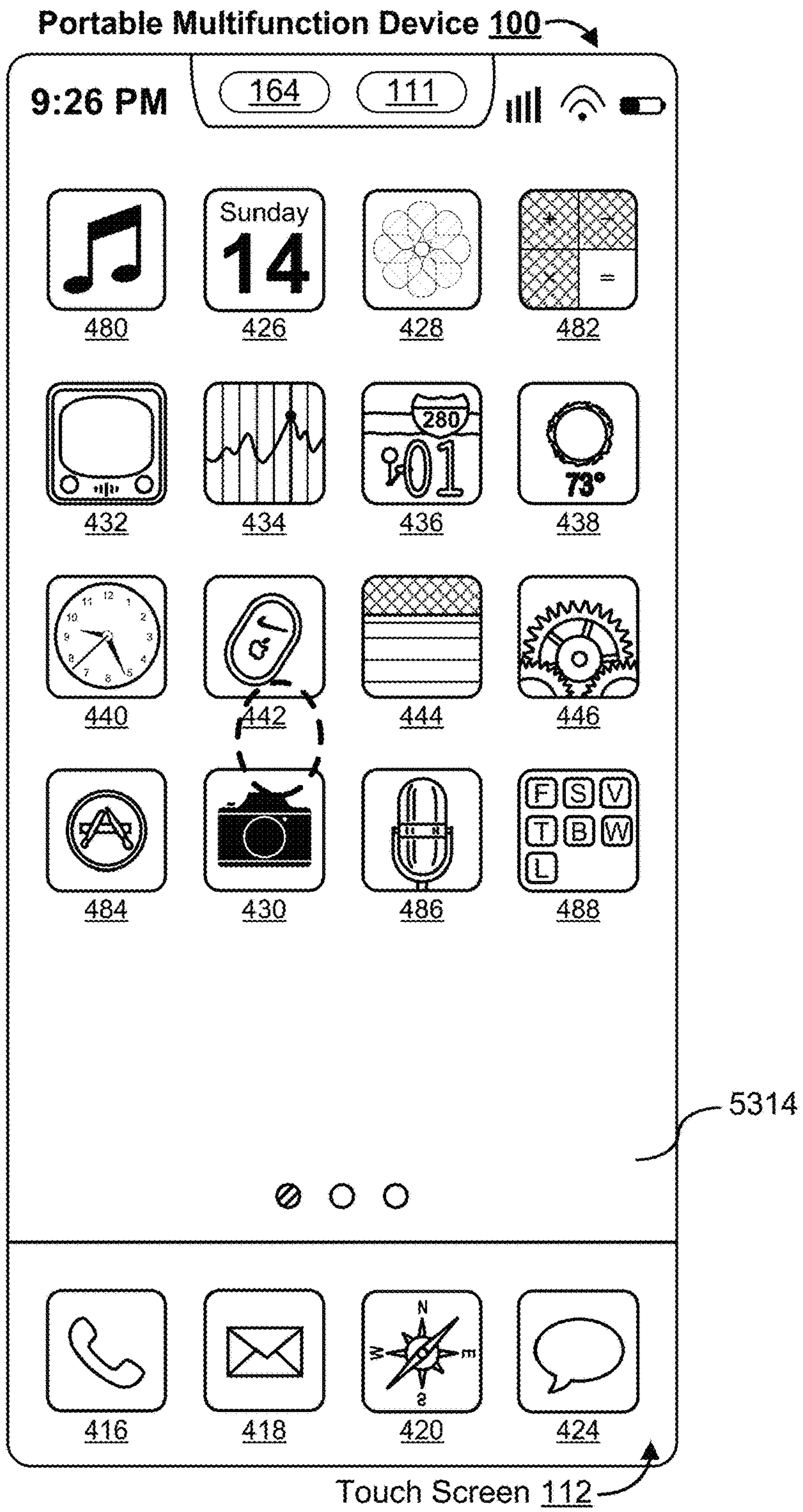
Figure 5B3

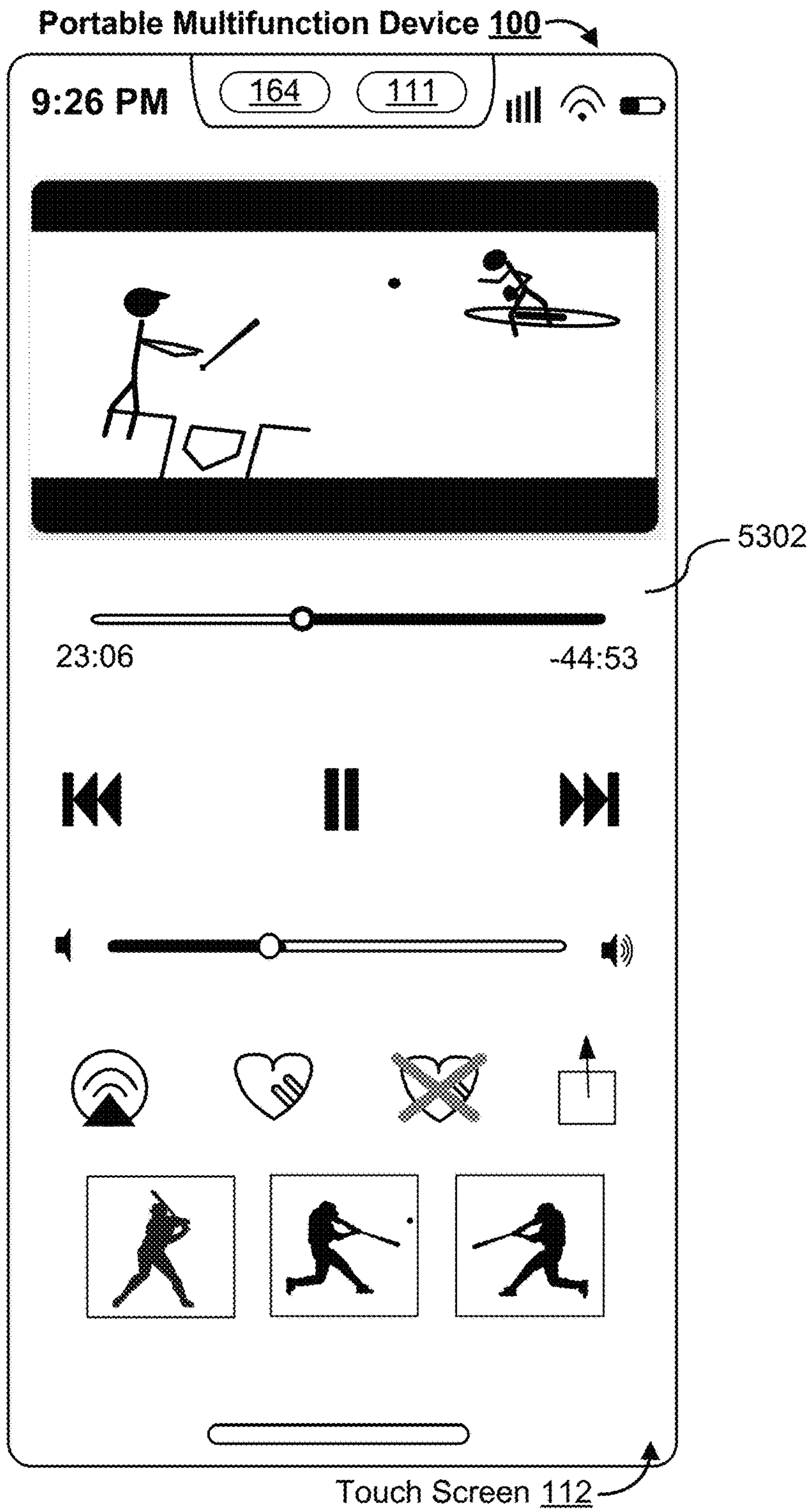
Figure 5B4

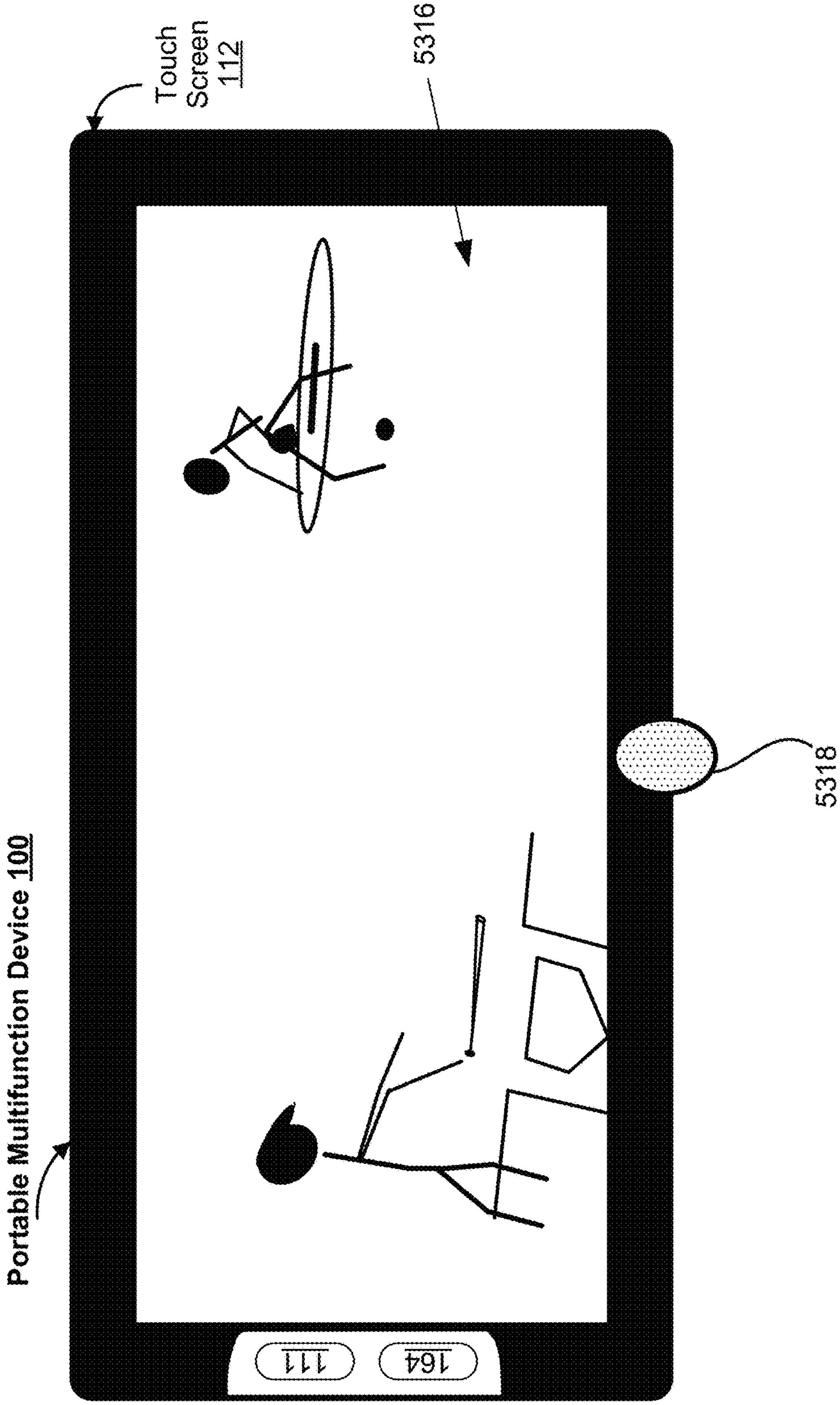
Figure 5B5

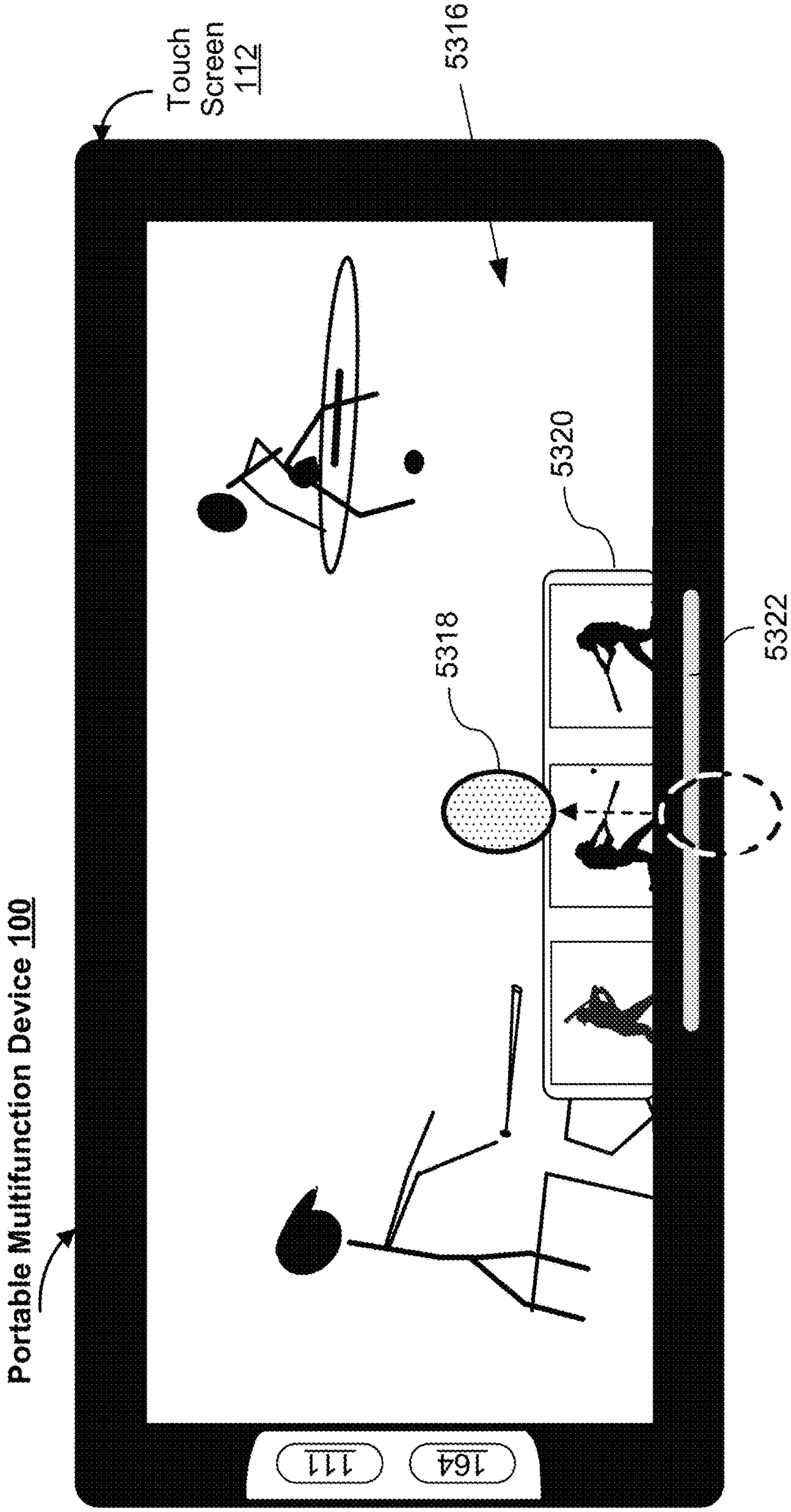
Figure 5B6

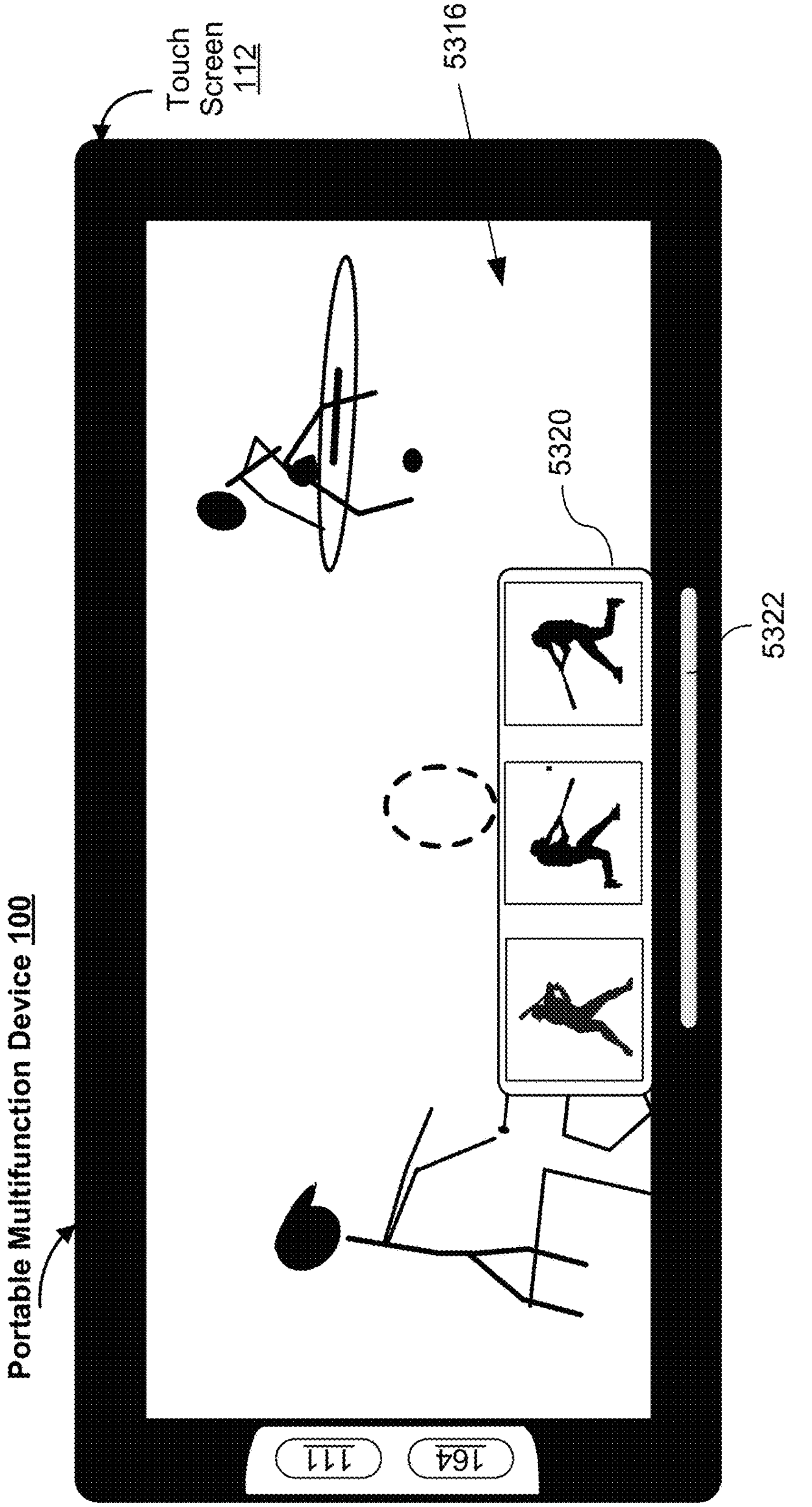
Figure 5B7

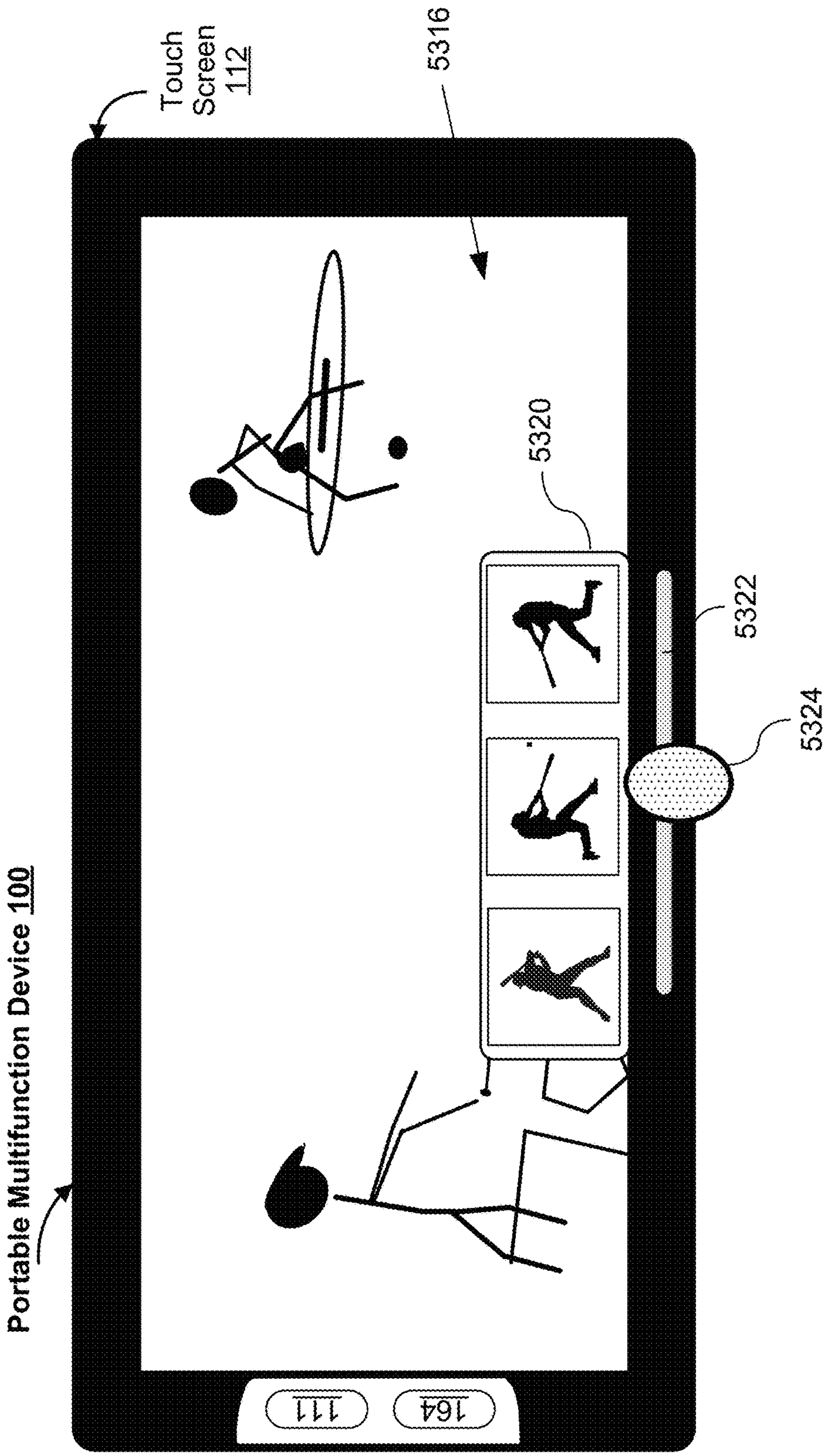
Figure 5B8

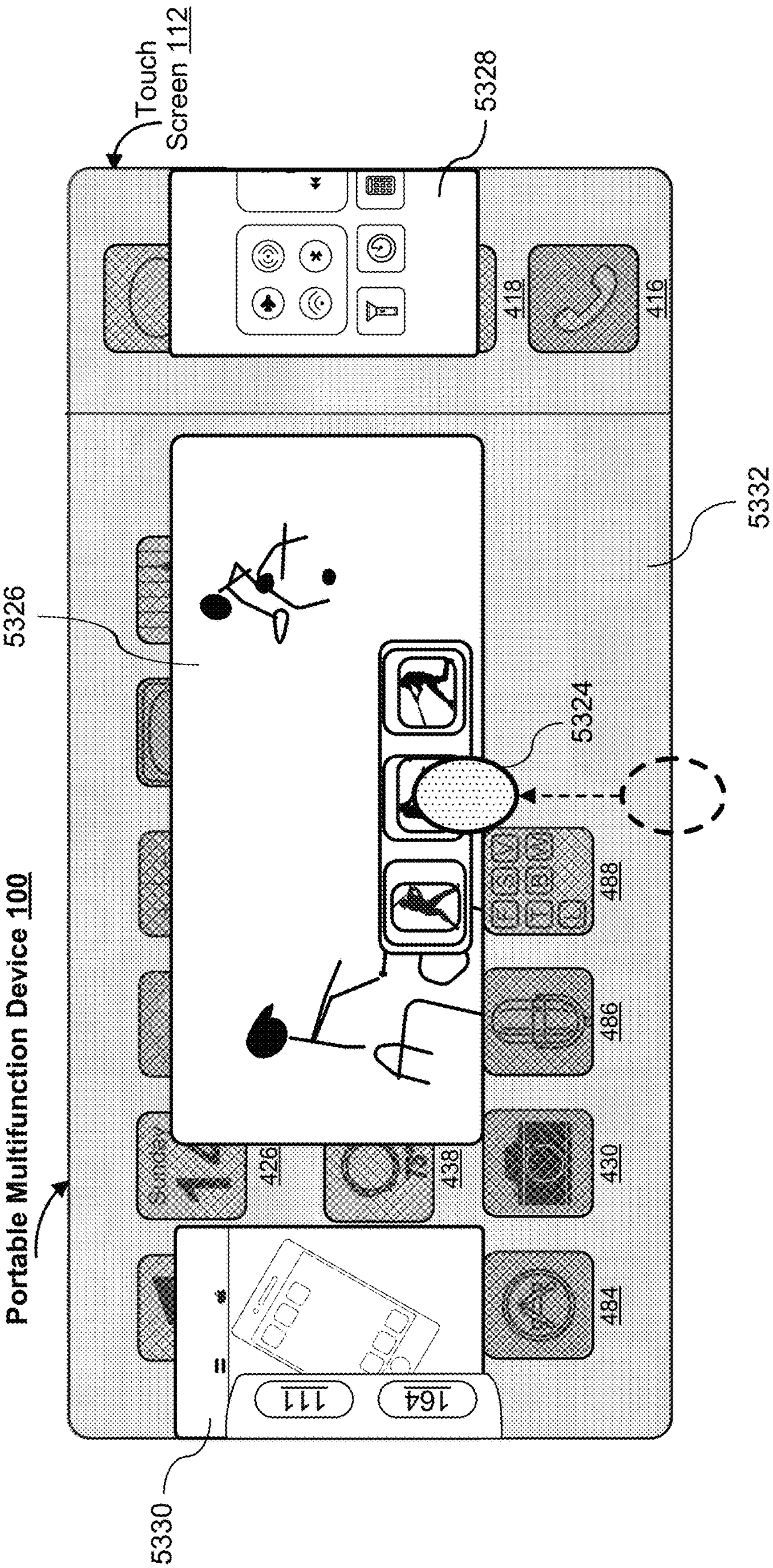
Figure 5B9

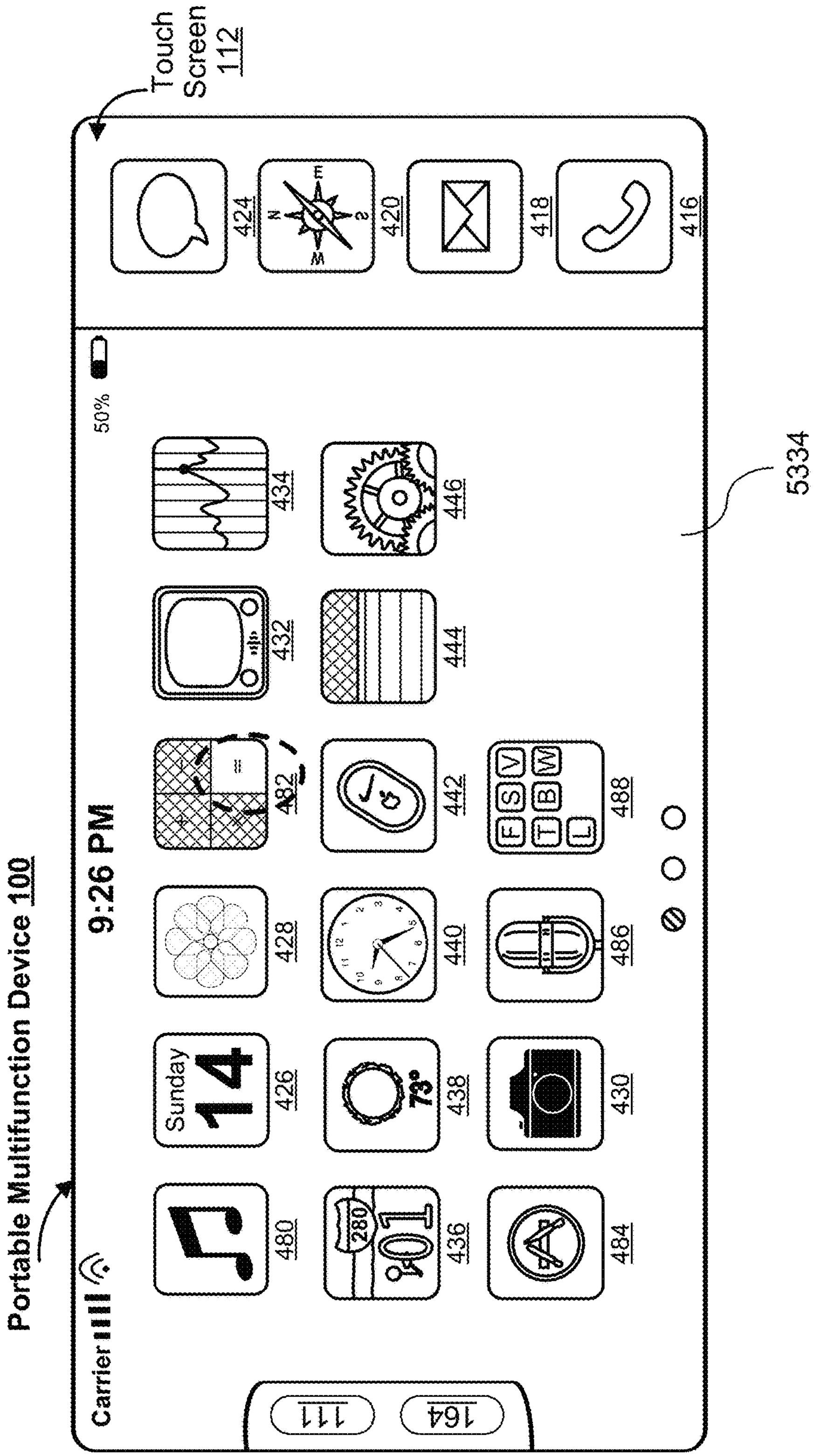
Figure 5B10

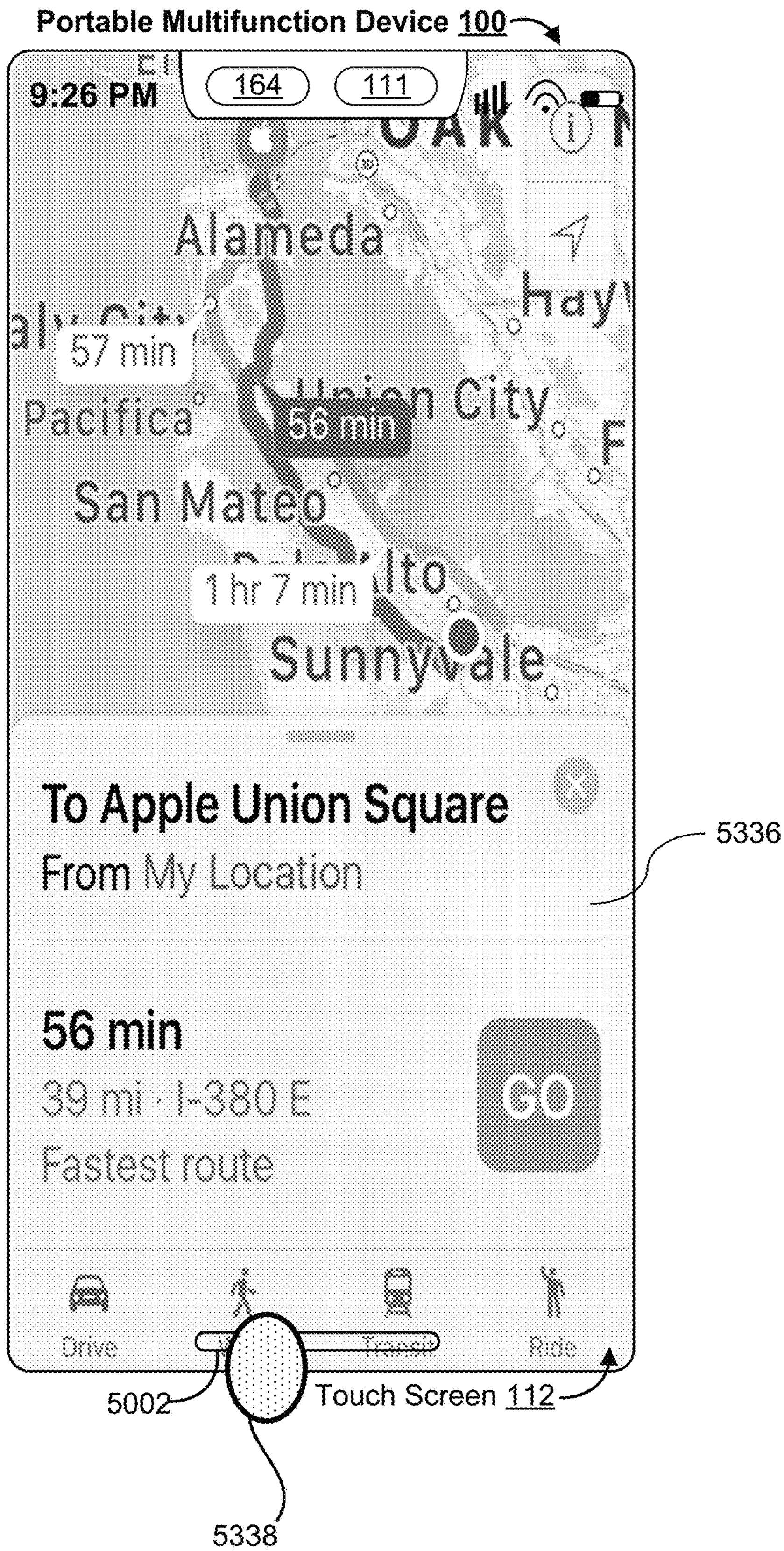
Figure 5B11

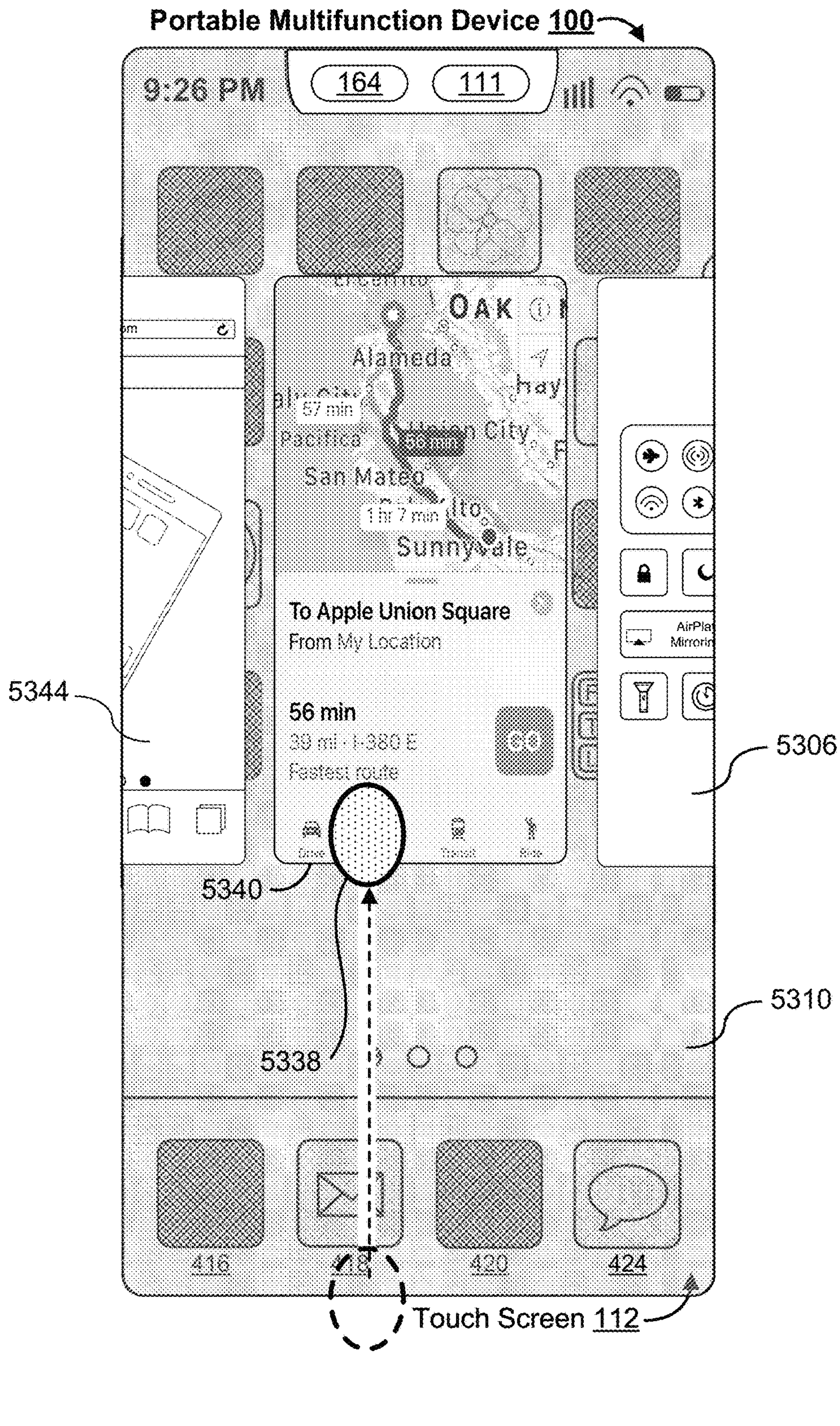
Figure 5B12

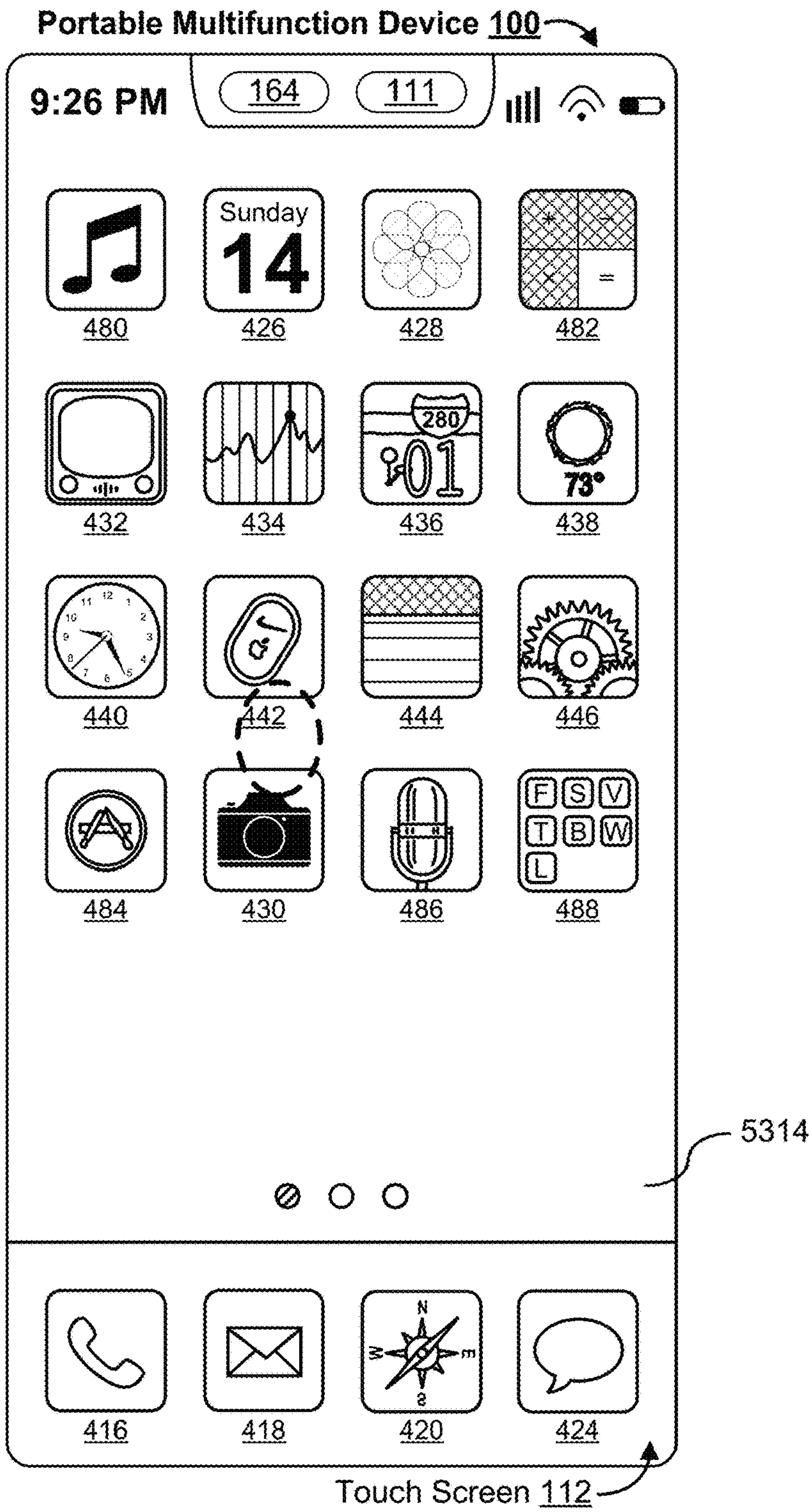
Figure 5B13

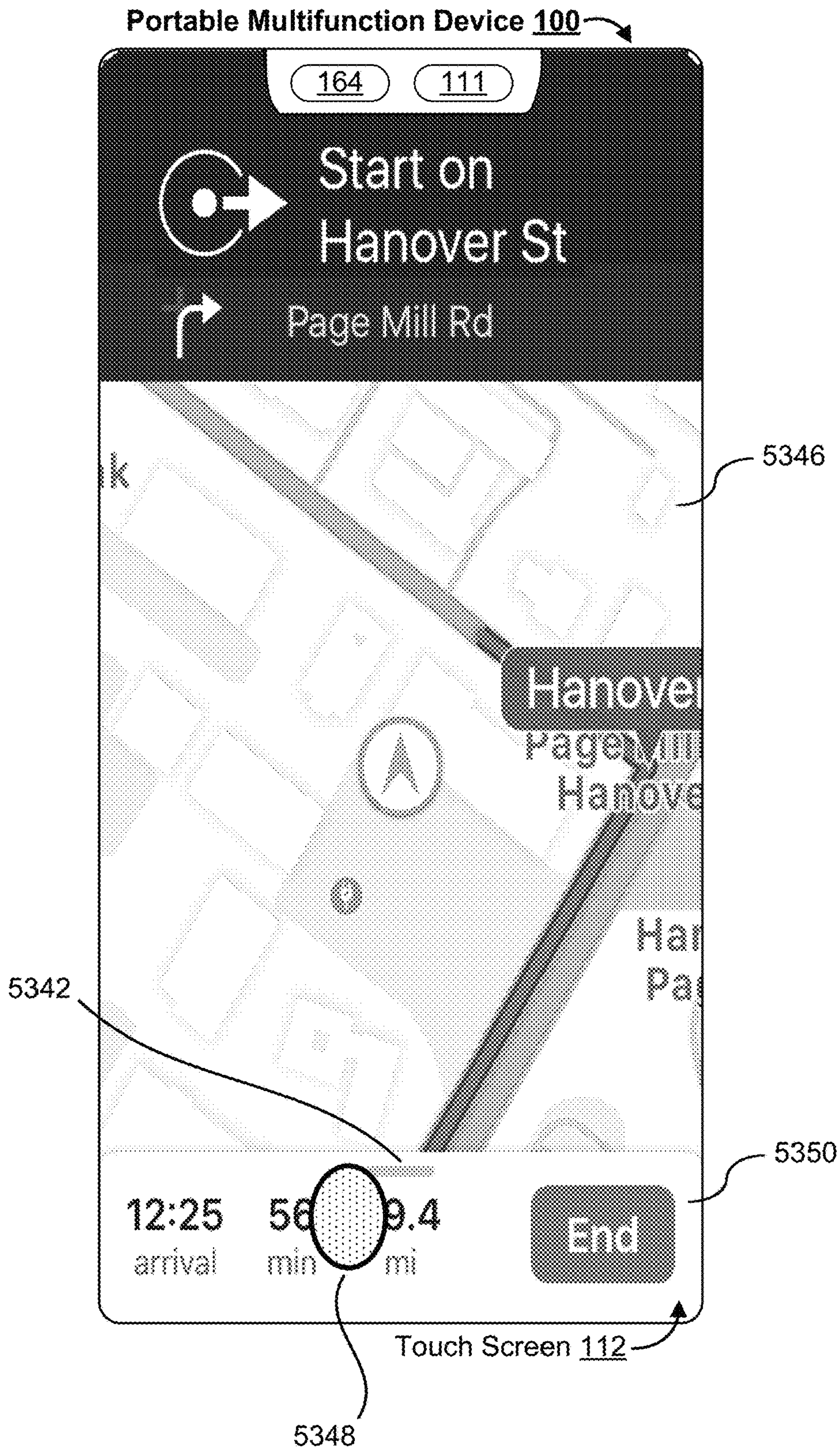
Figure 5B14

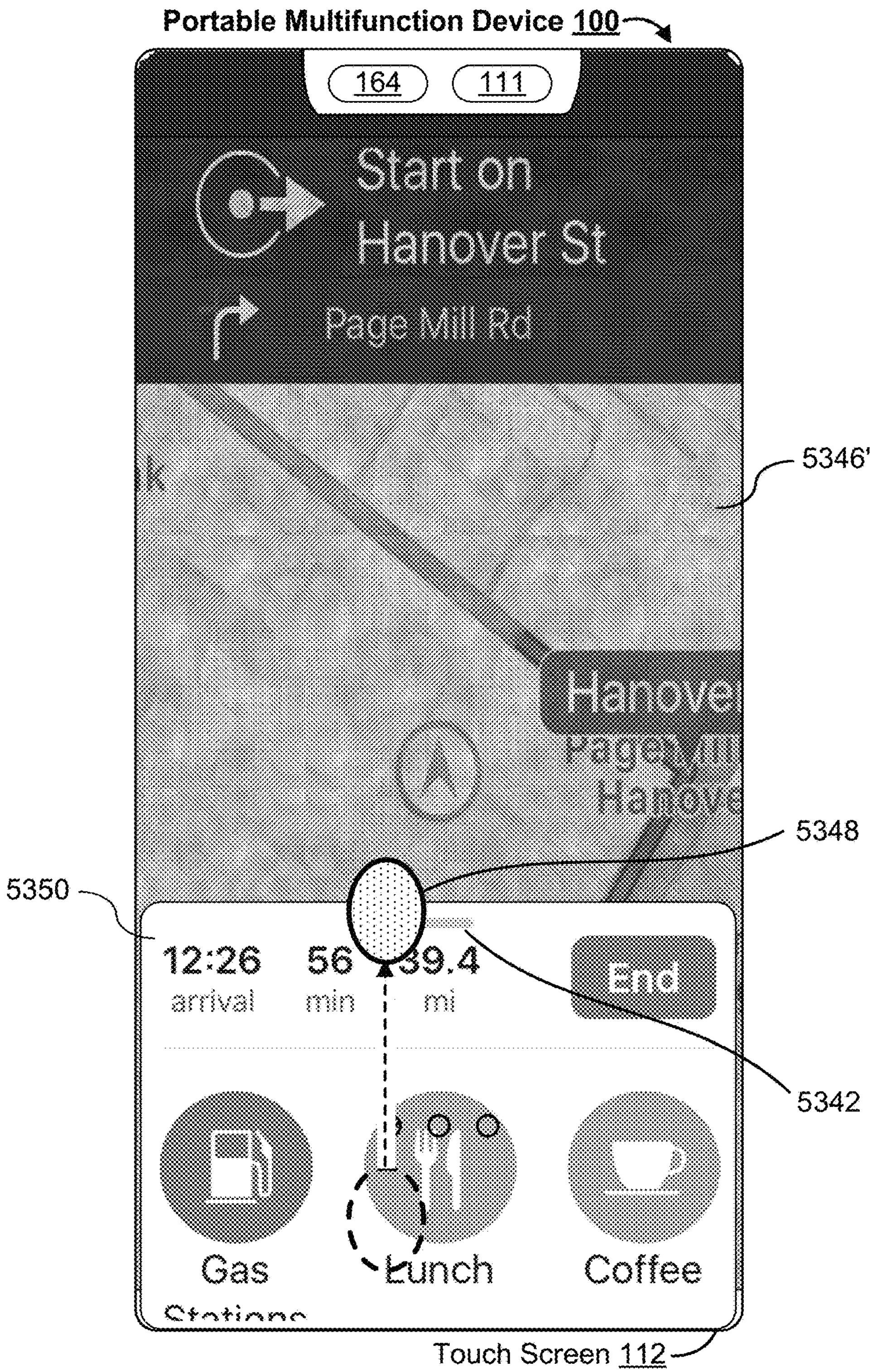
Figure 5B15

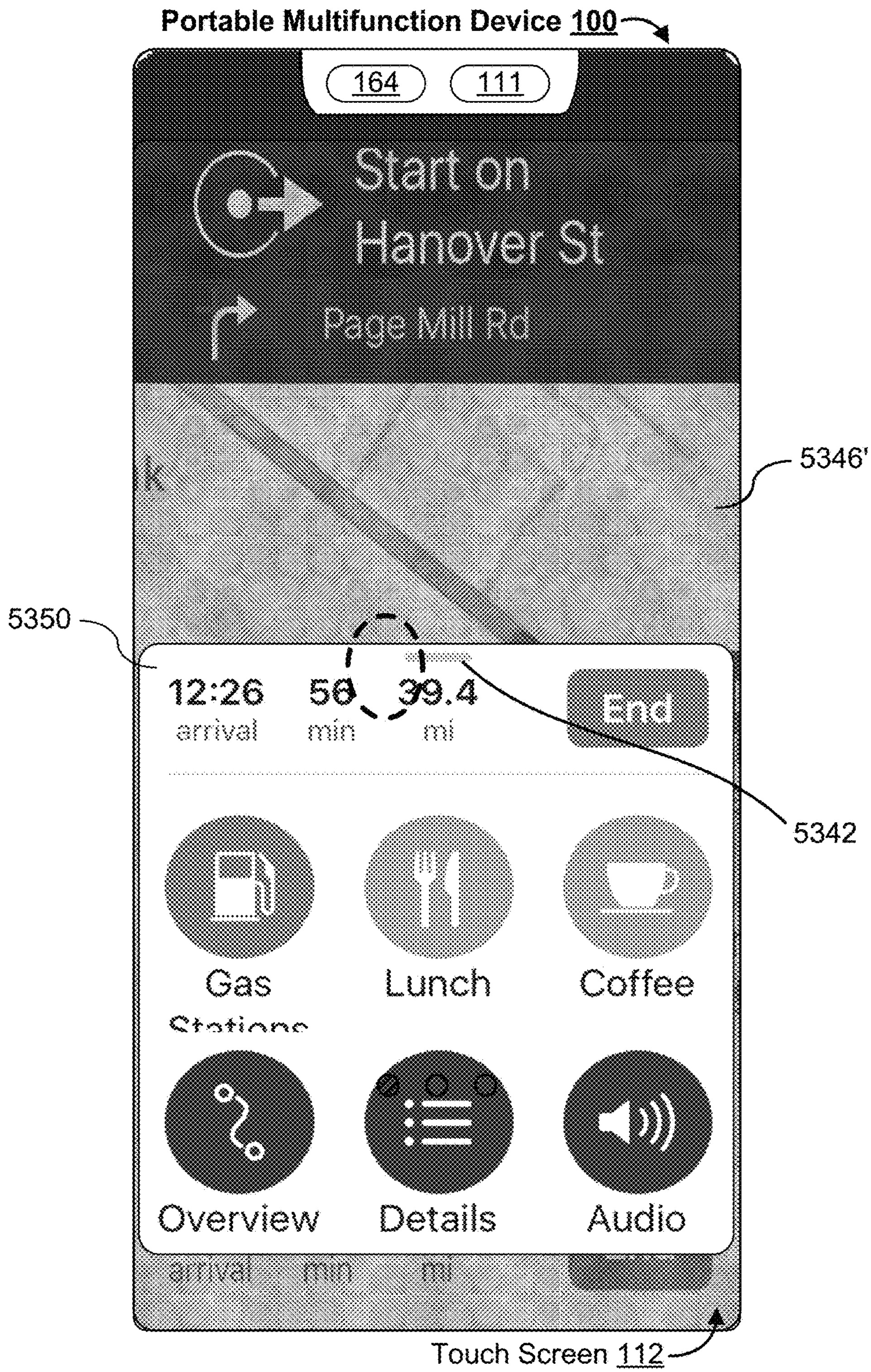
Figure 5B16

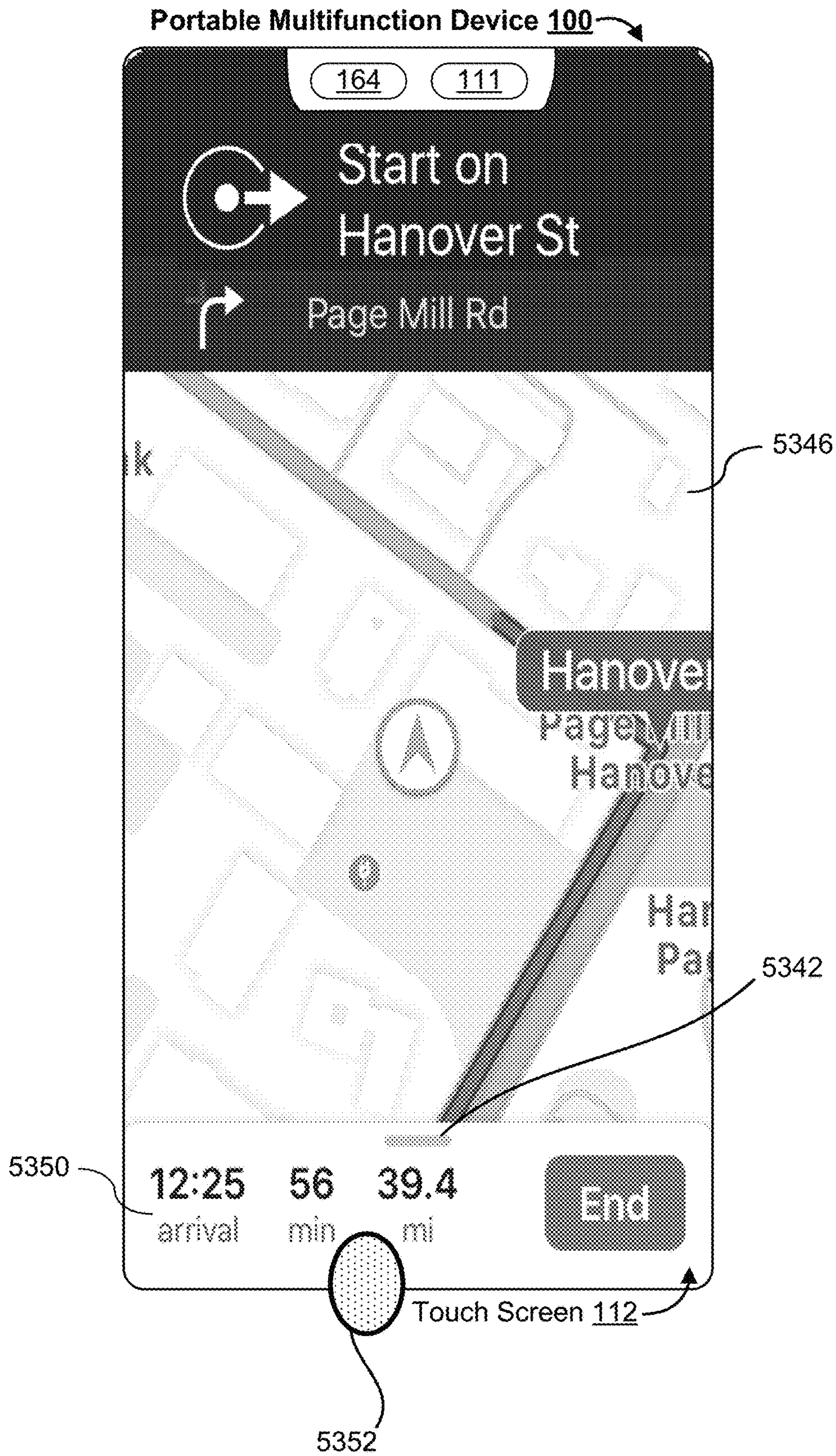
Figure 5B17

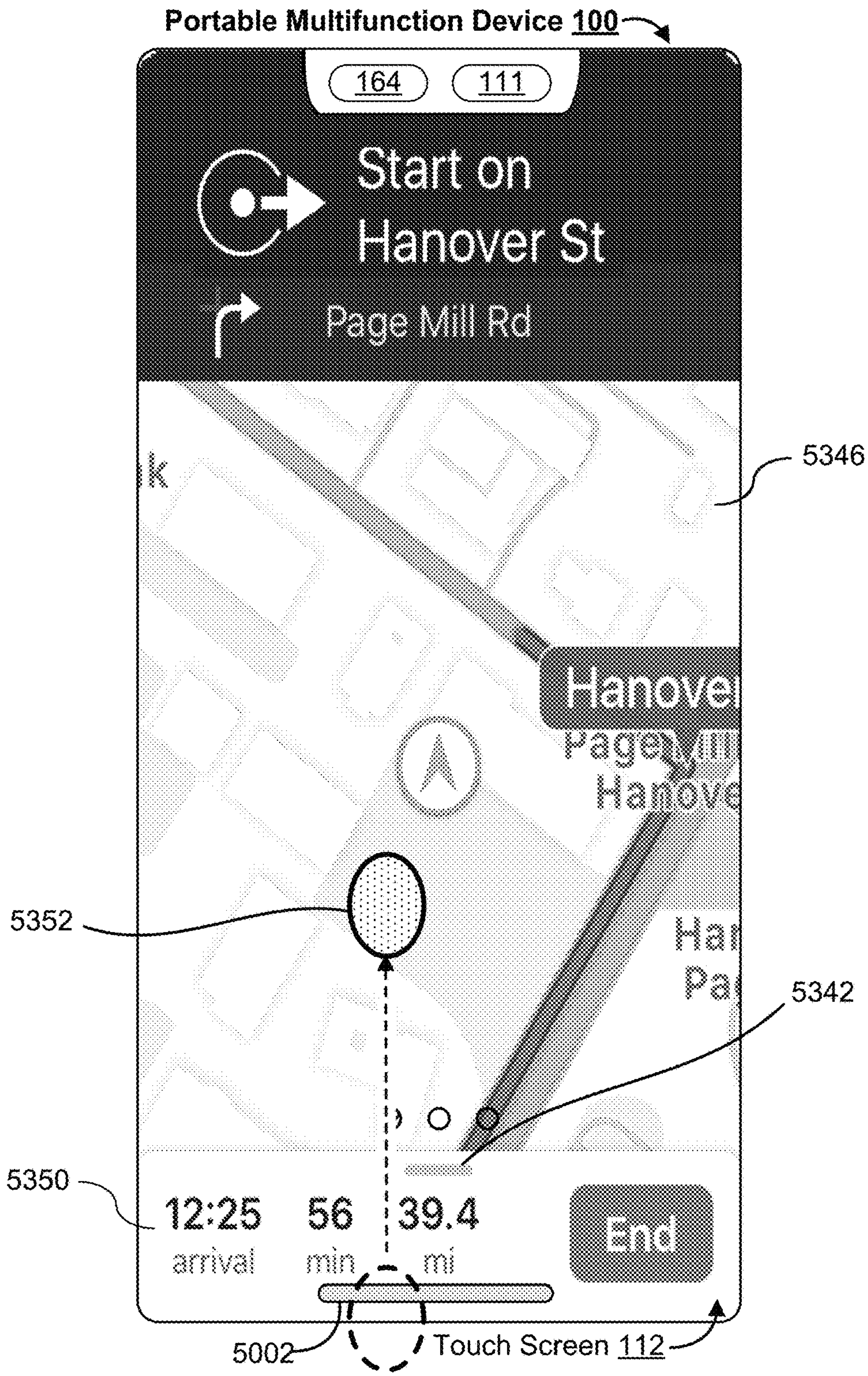
Figure 5B18

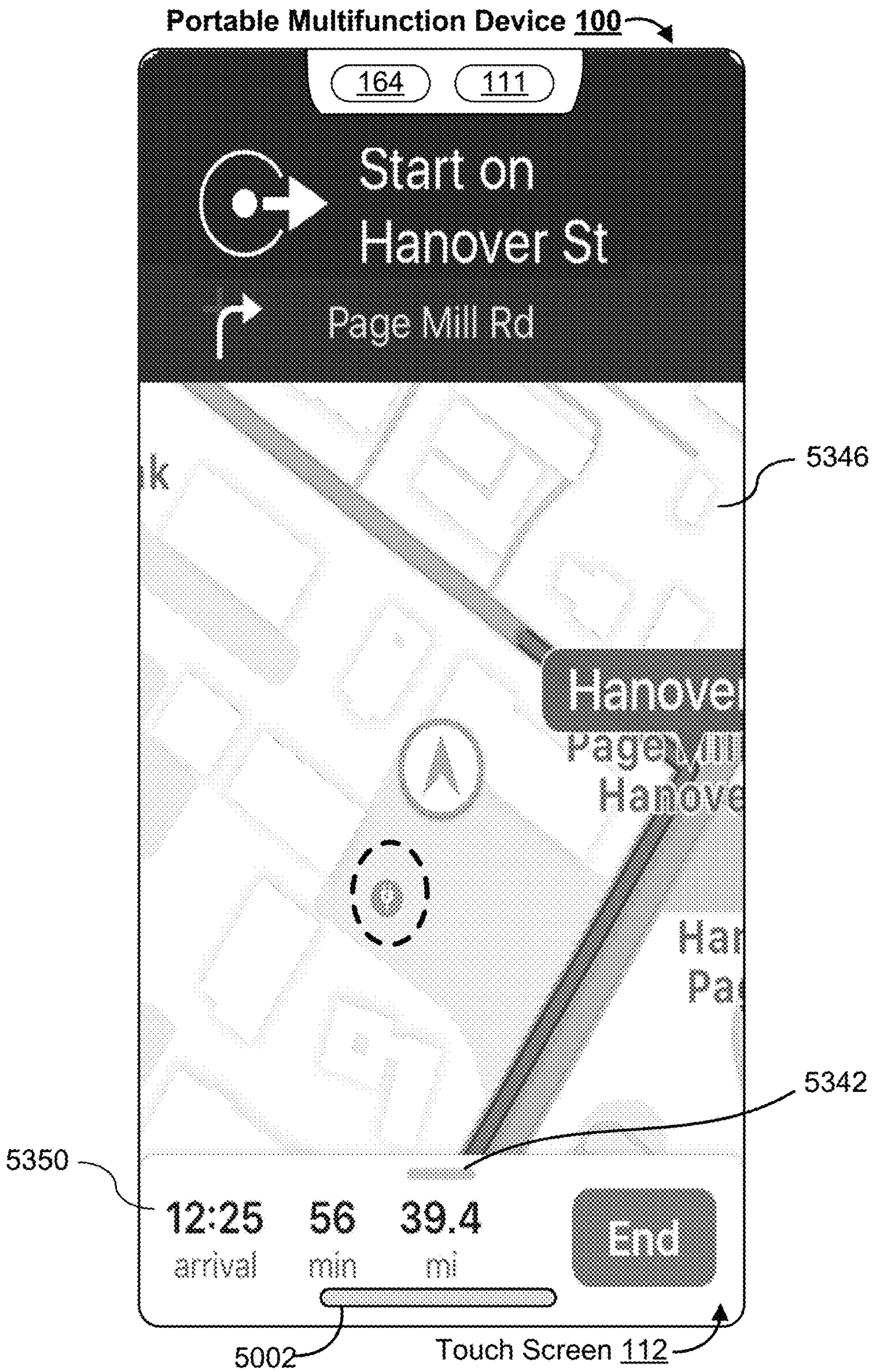
Figure 5B19

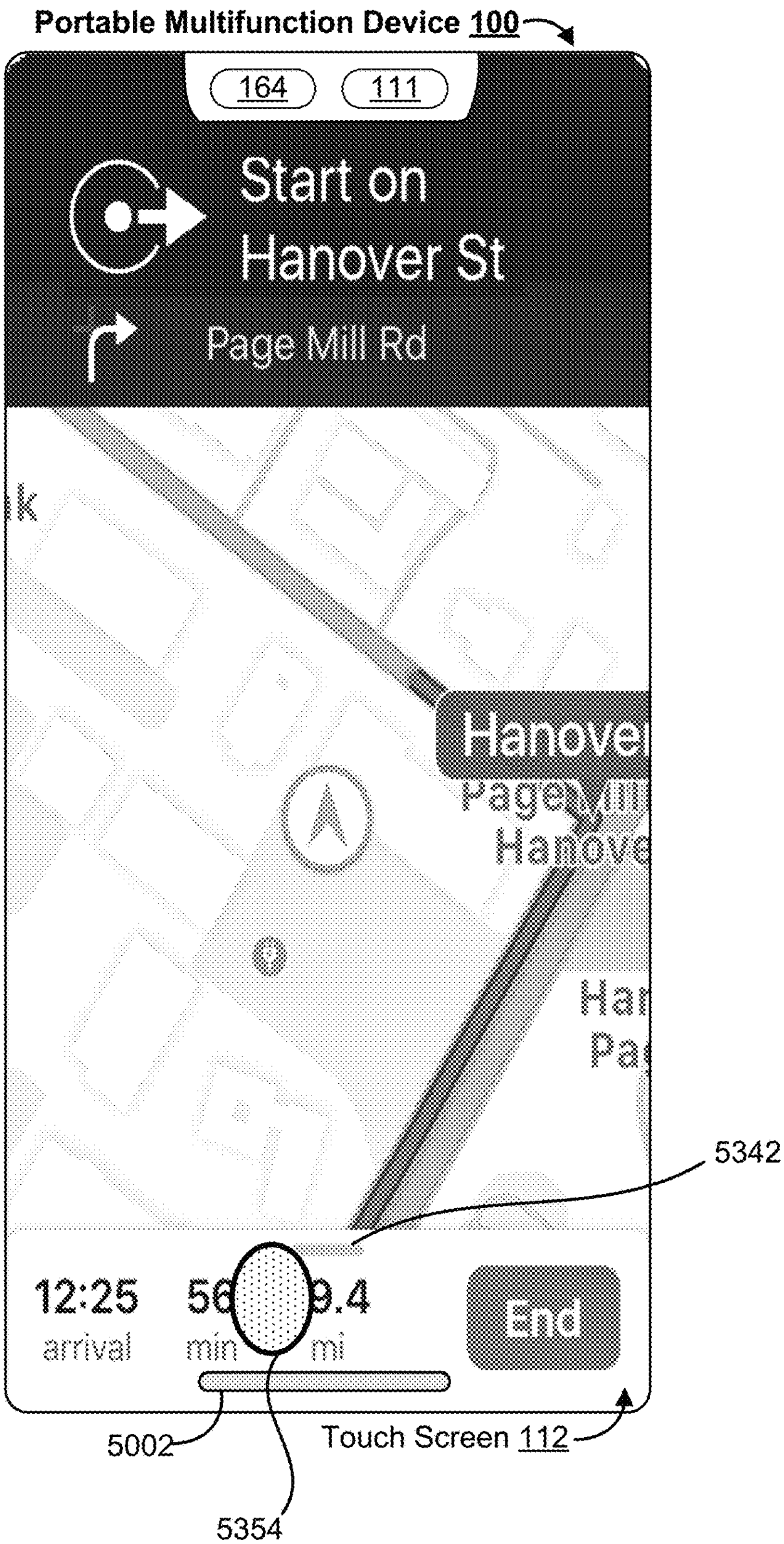
Figure 5B20

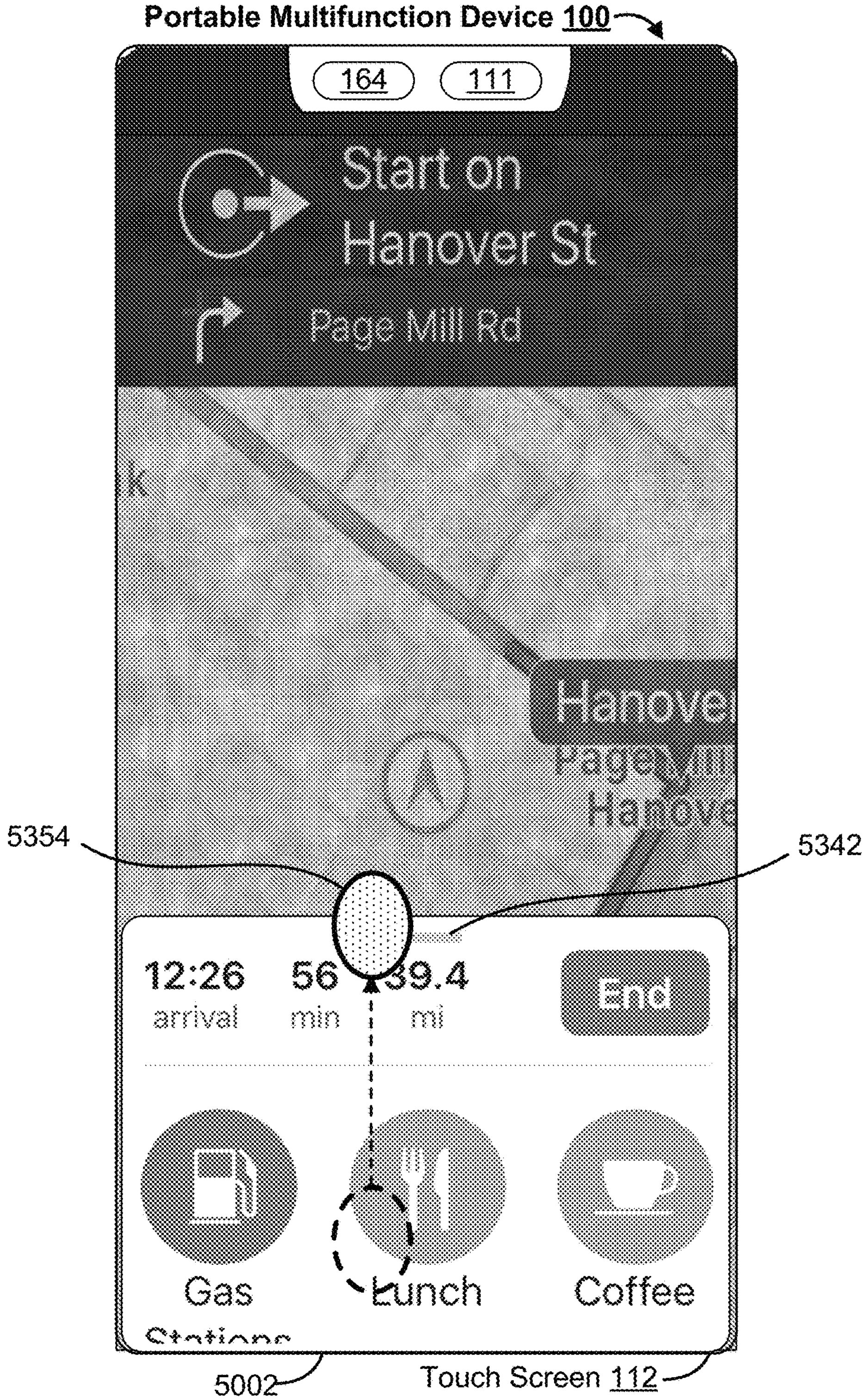
Figure 5B21

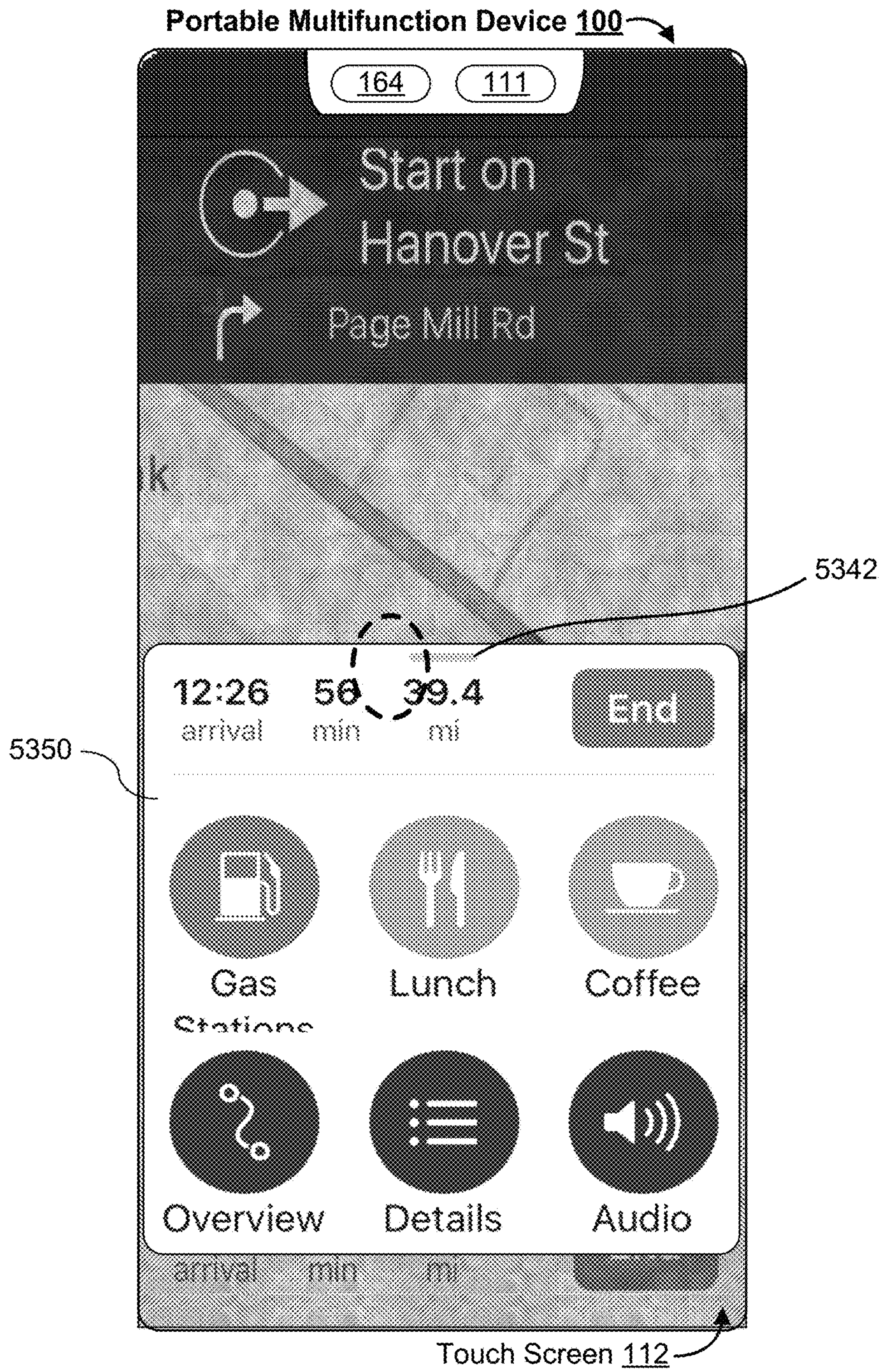
Figure 5B22

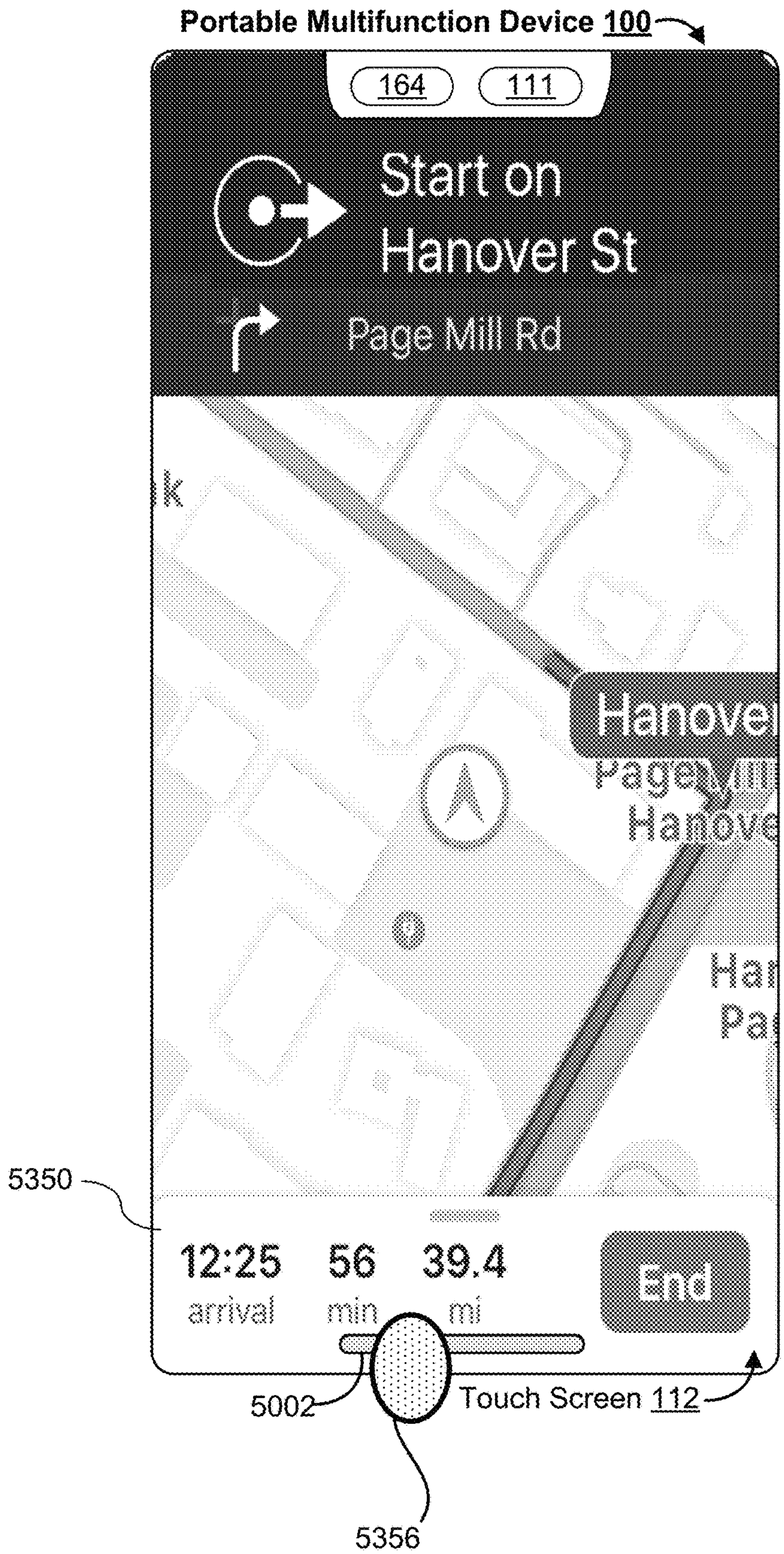
Figure 5B23

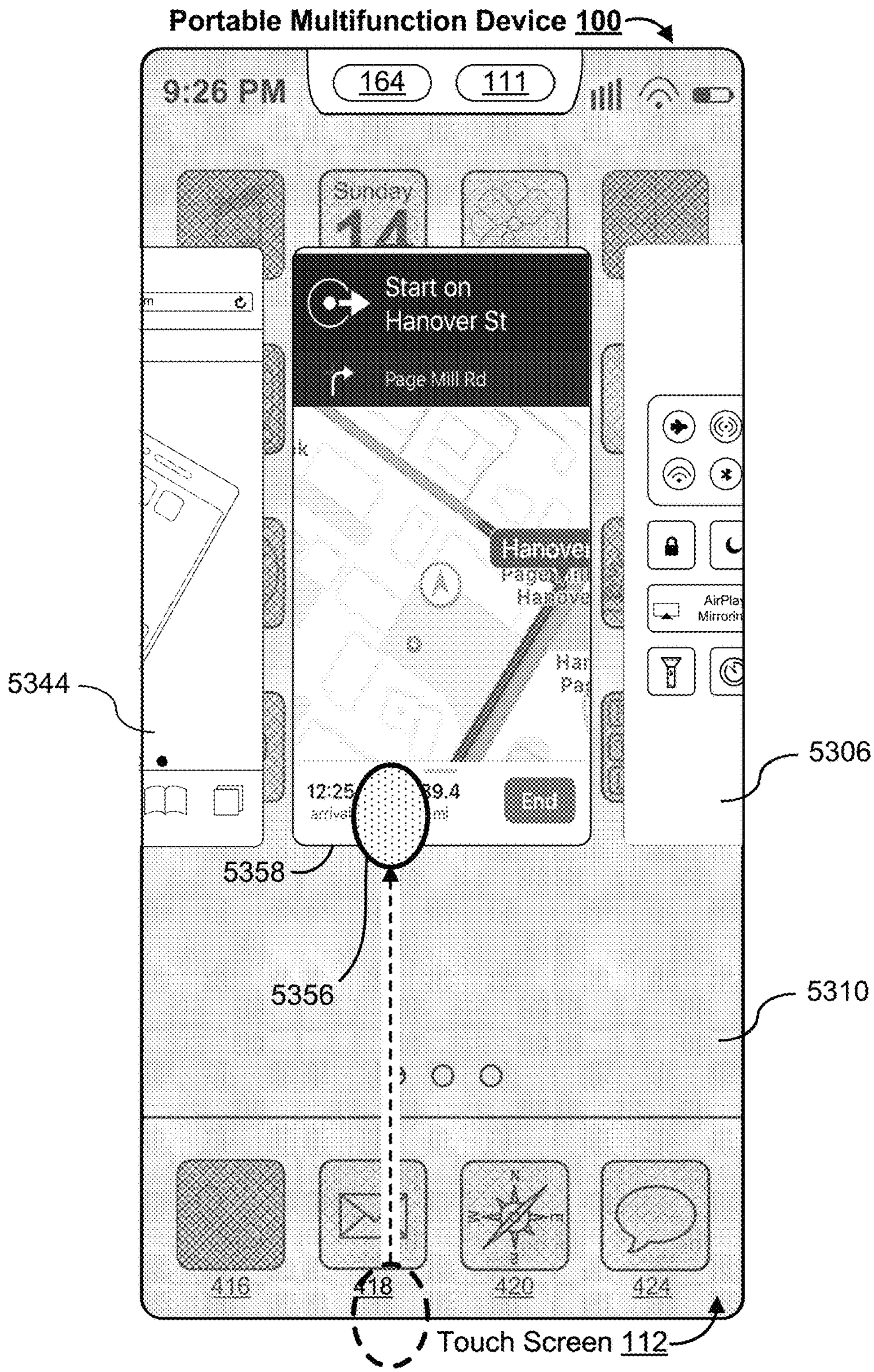
Figure 5B24

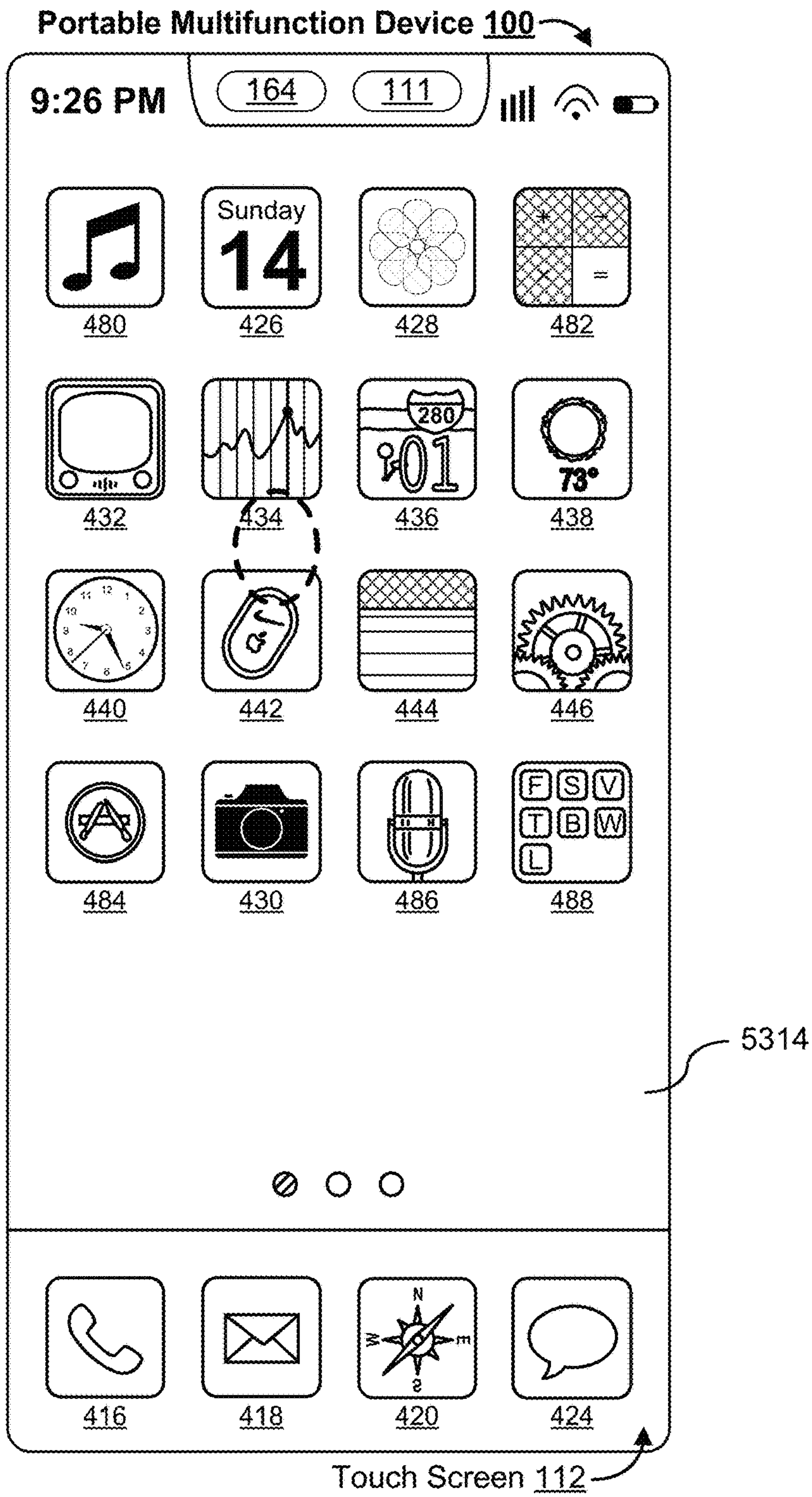
Figure 5B25

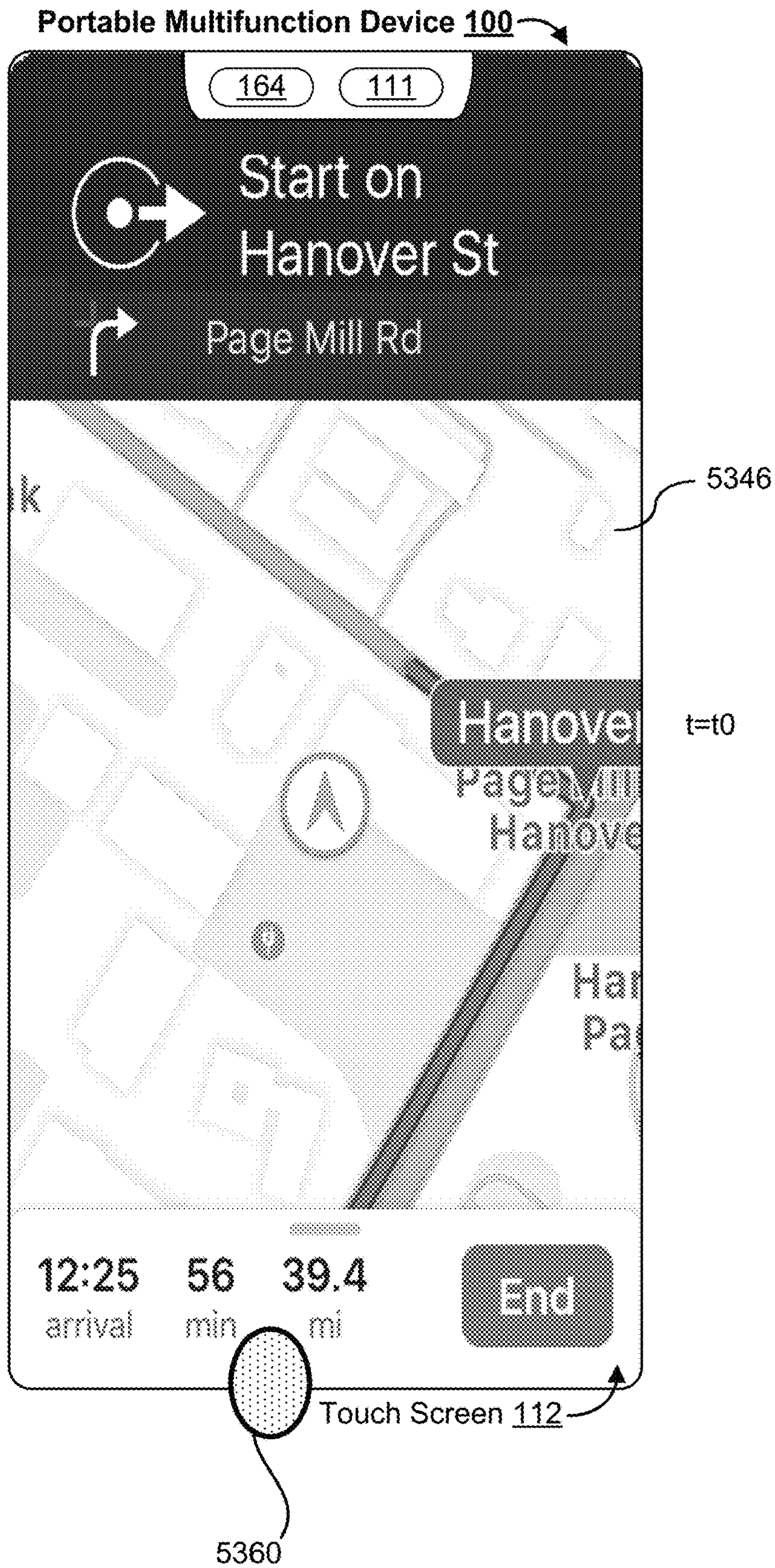
Figure 5B26

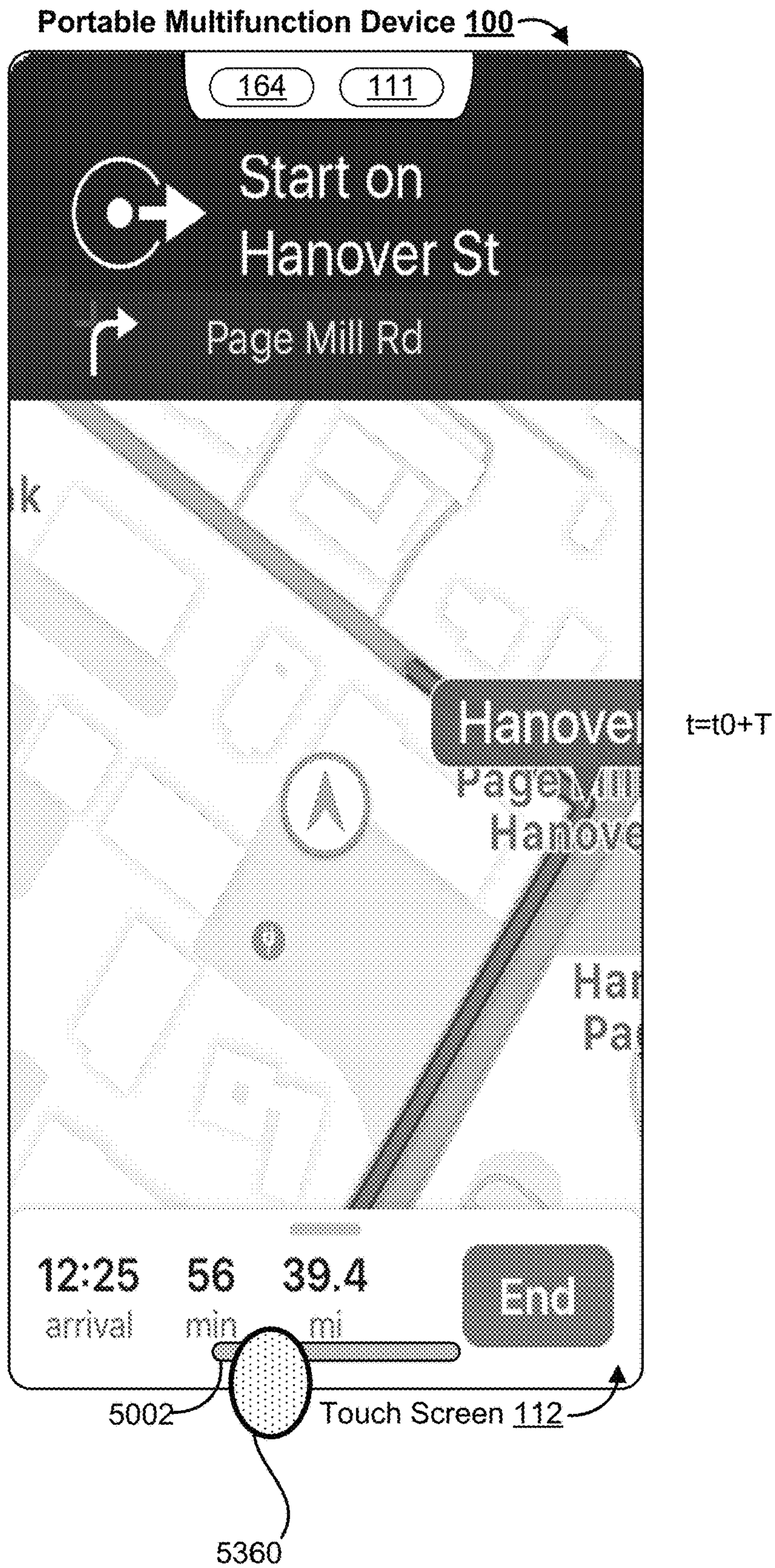
Figure 5B27

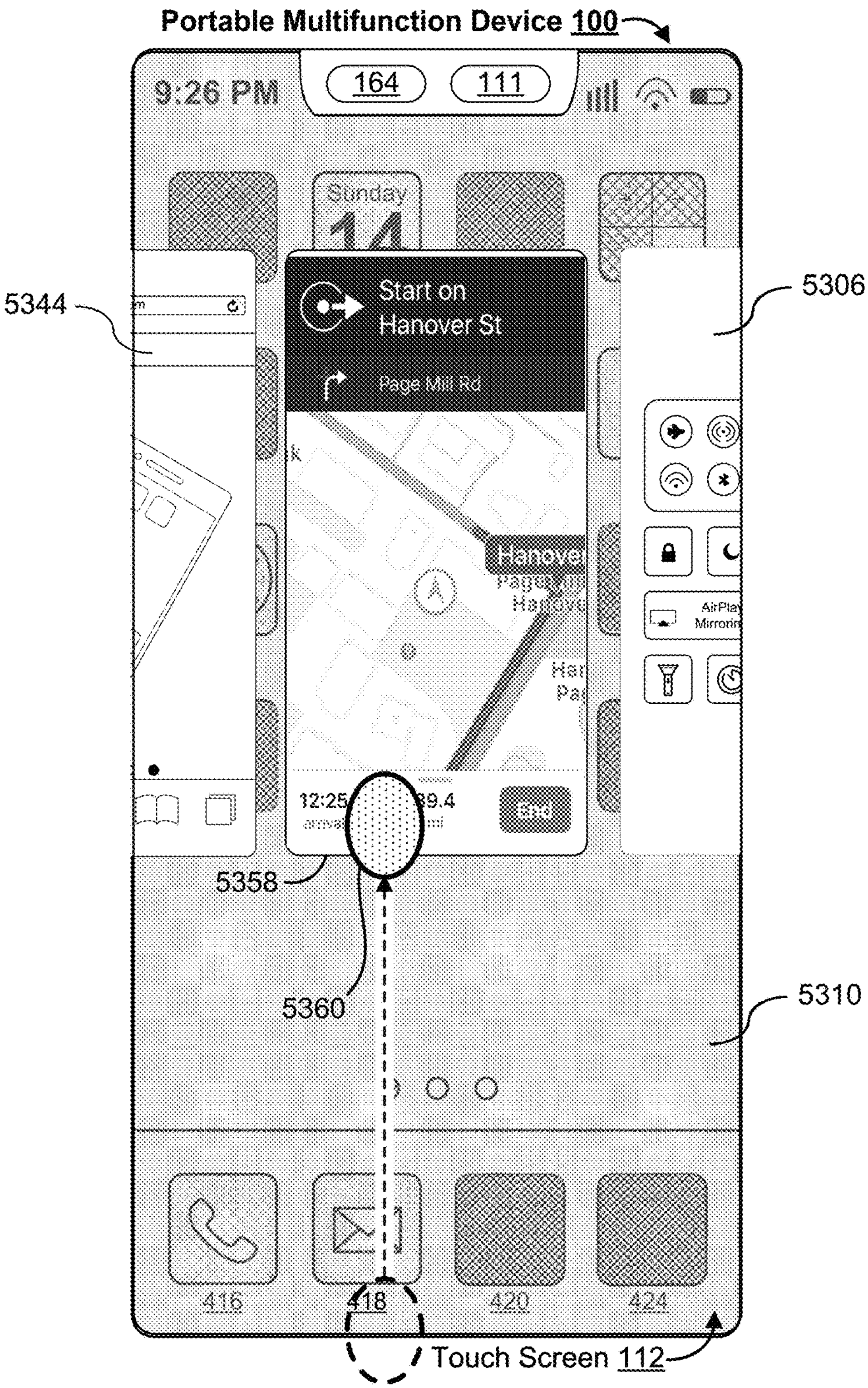
Figure 5B28

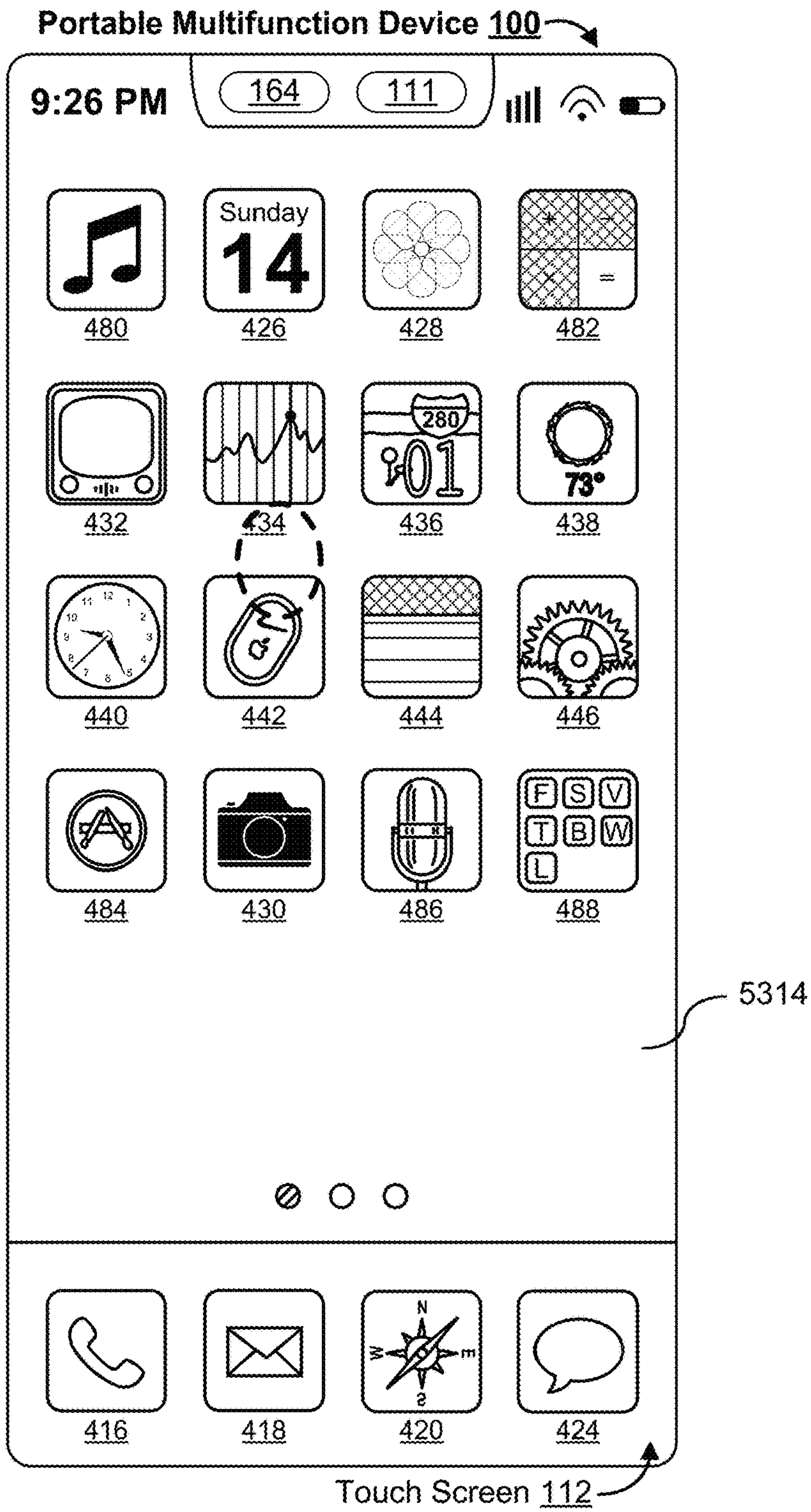
Figure 5B29

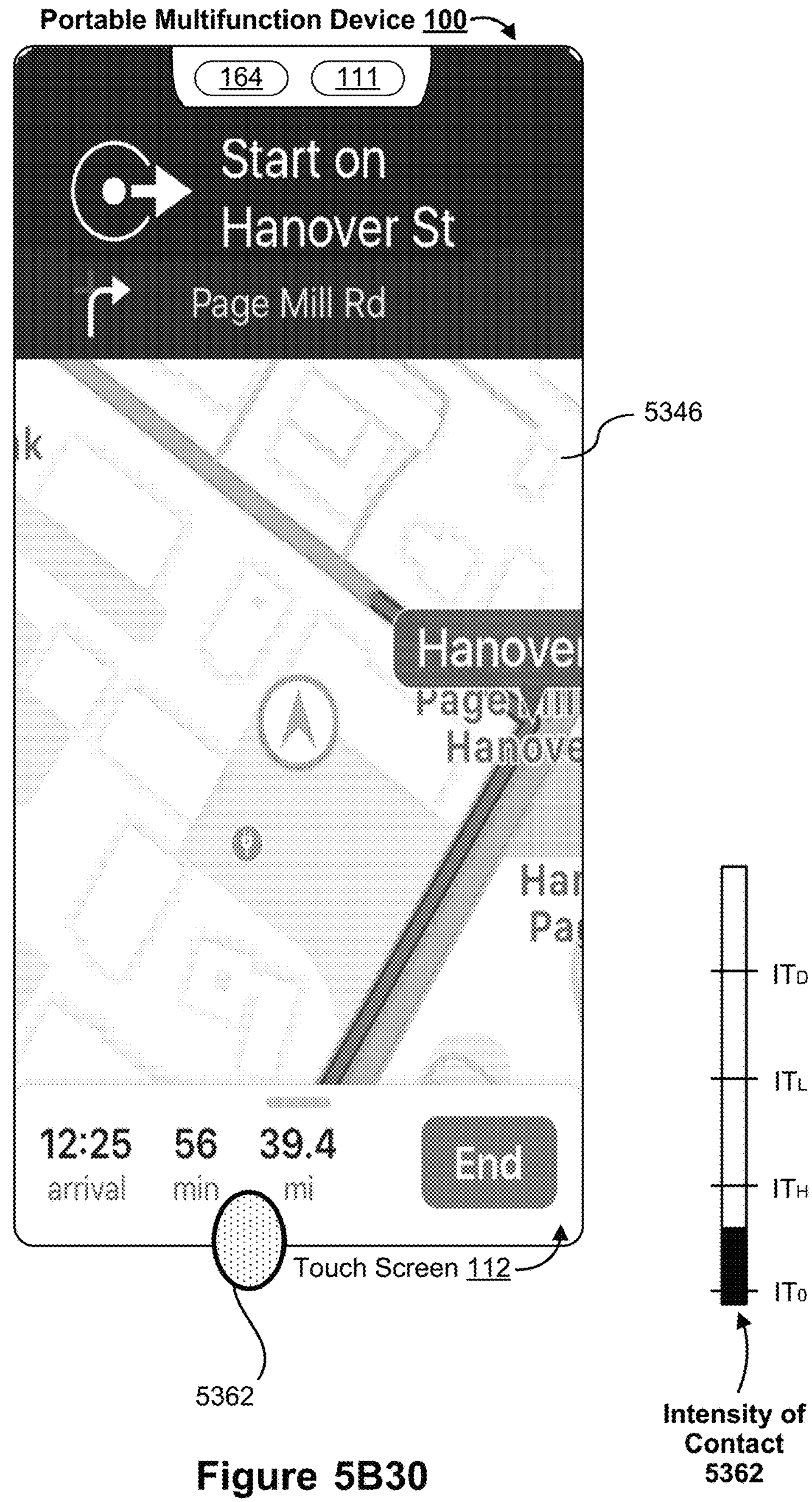
Figure 5B30

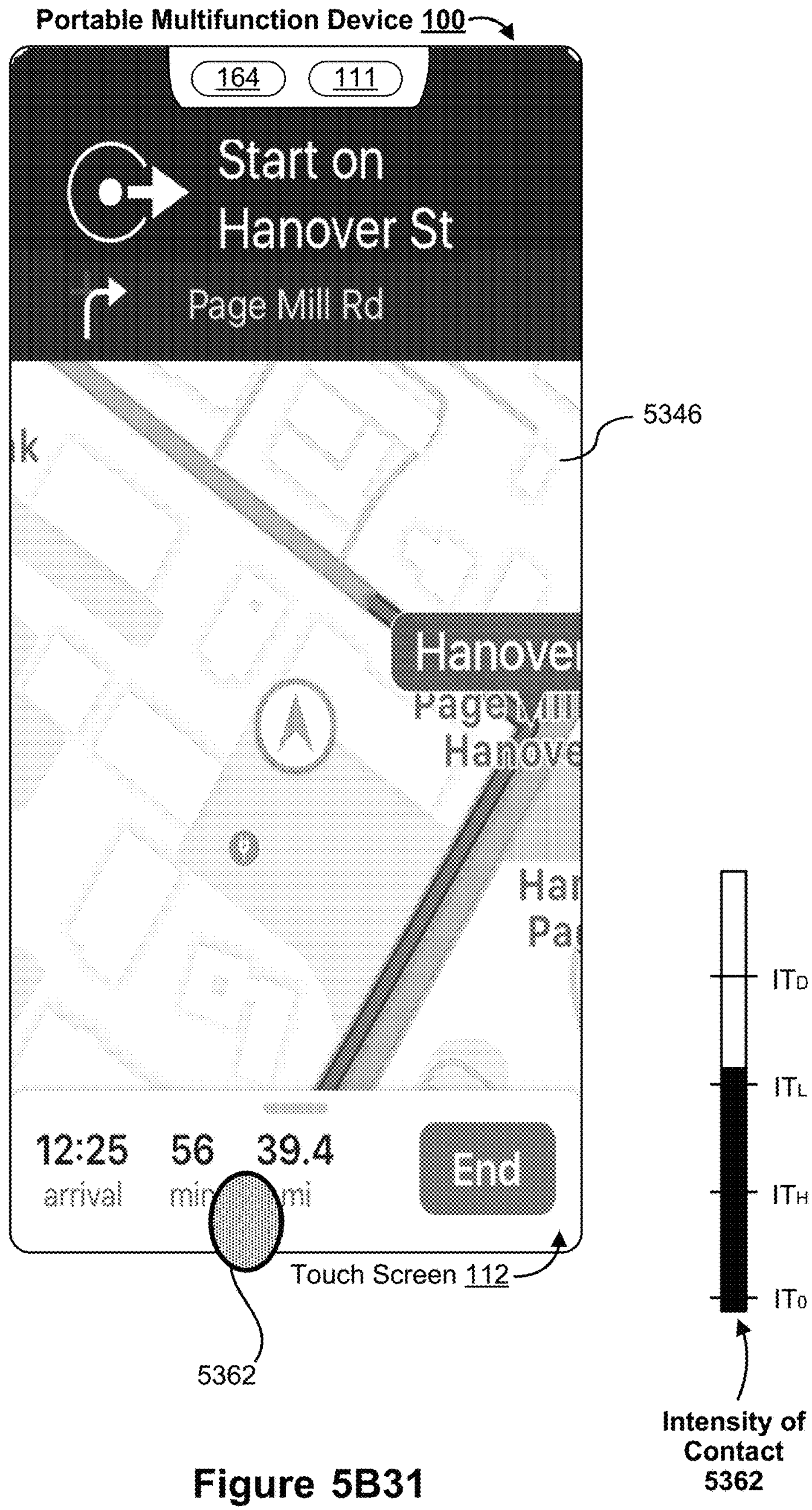
Figure 5B31

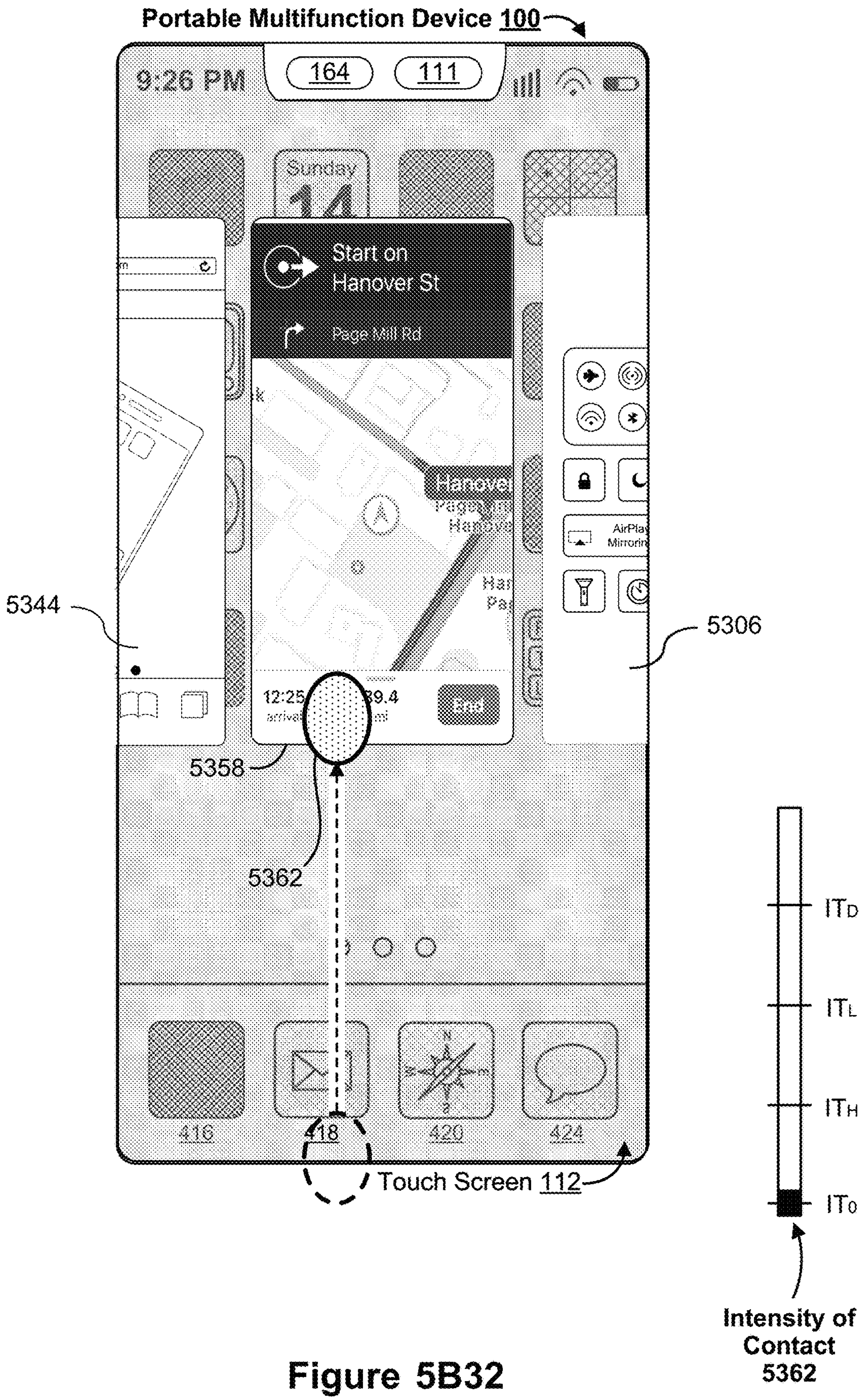
Figure 5B32

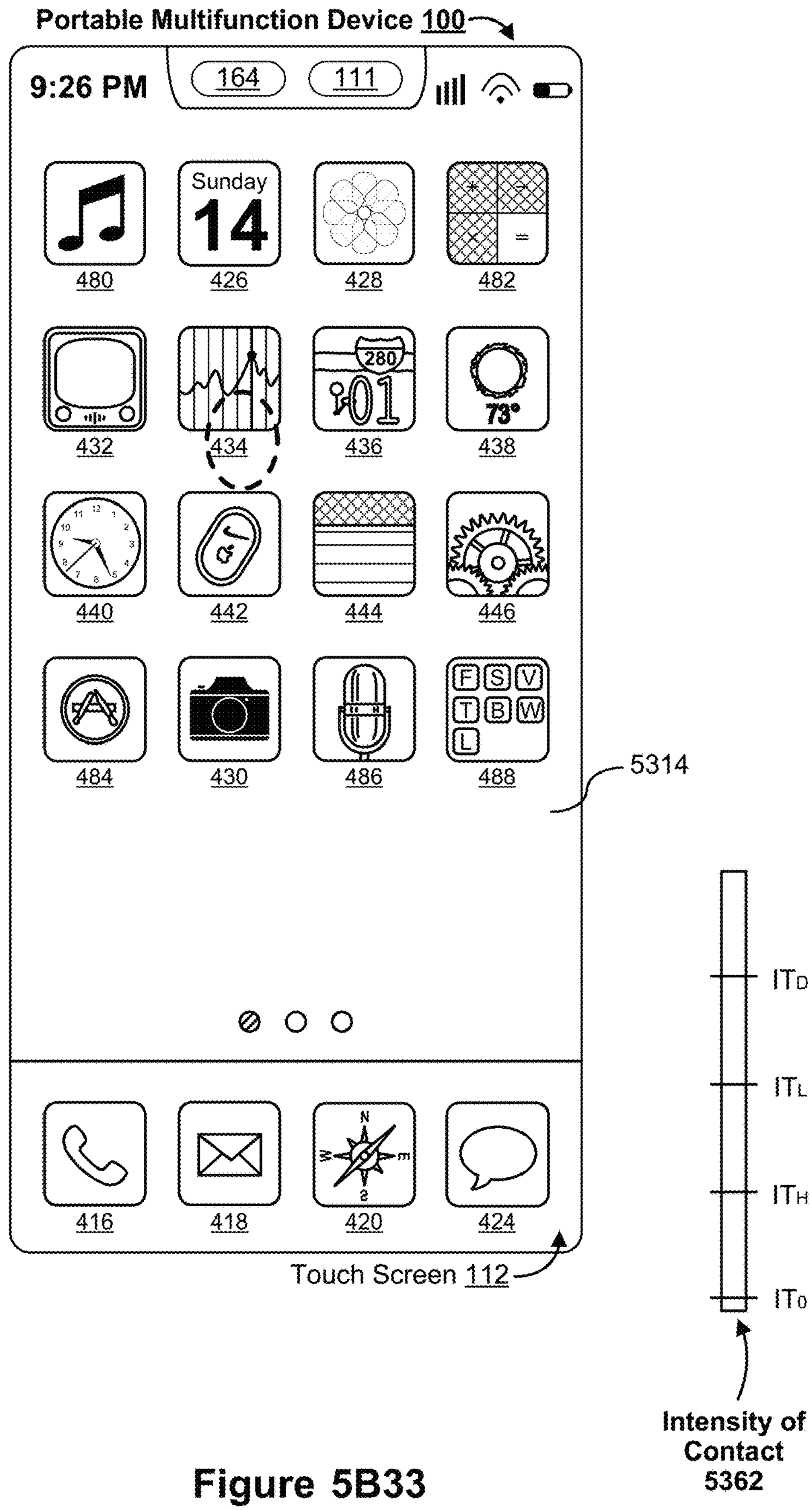
Figure 5B33

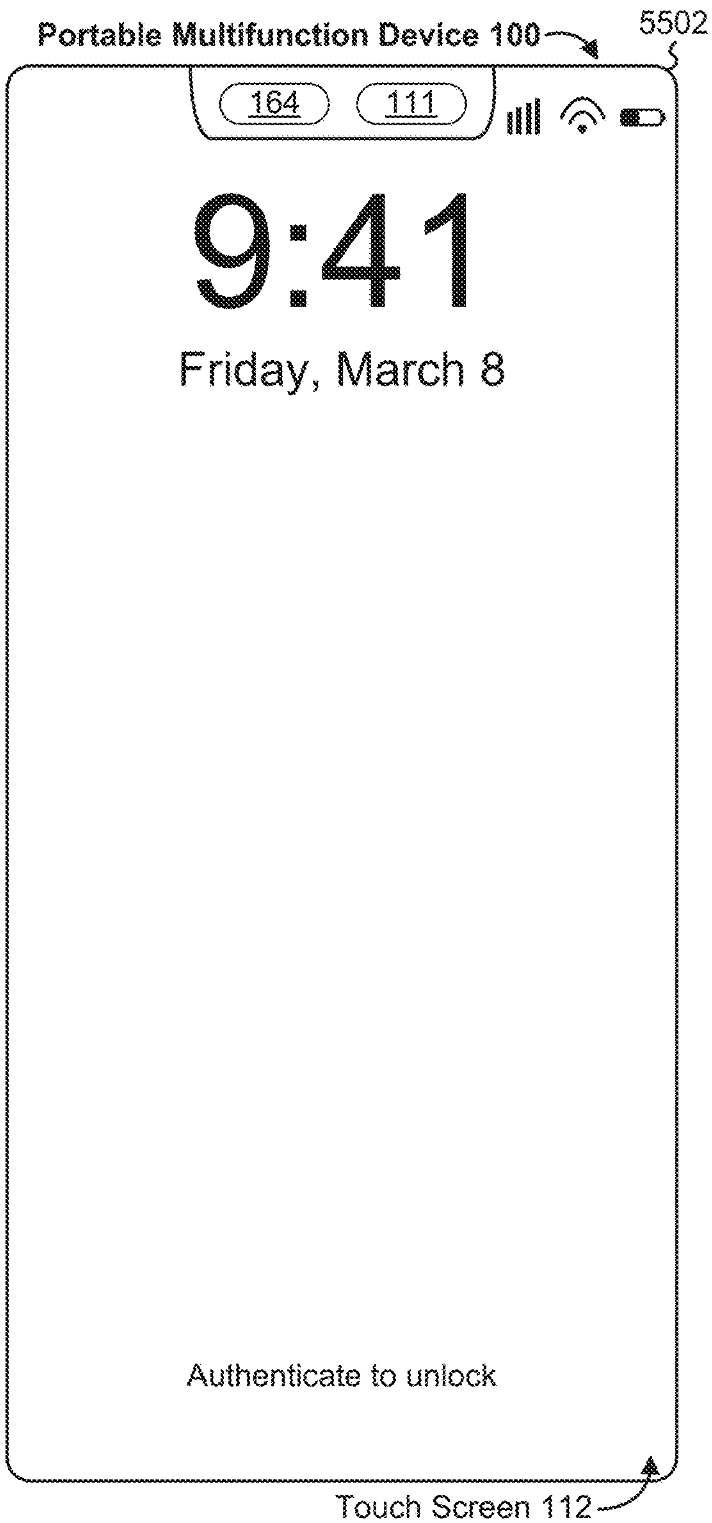
Figure 5C1

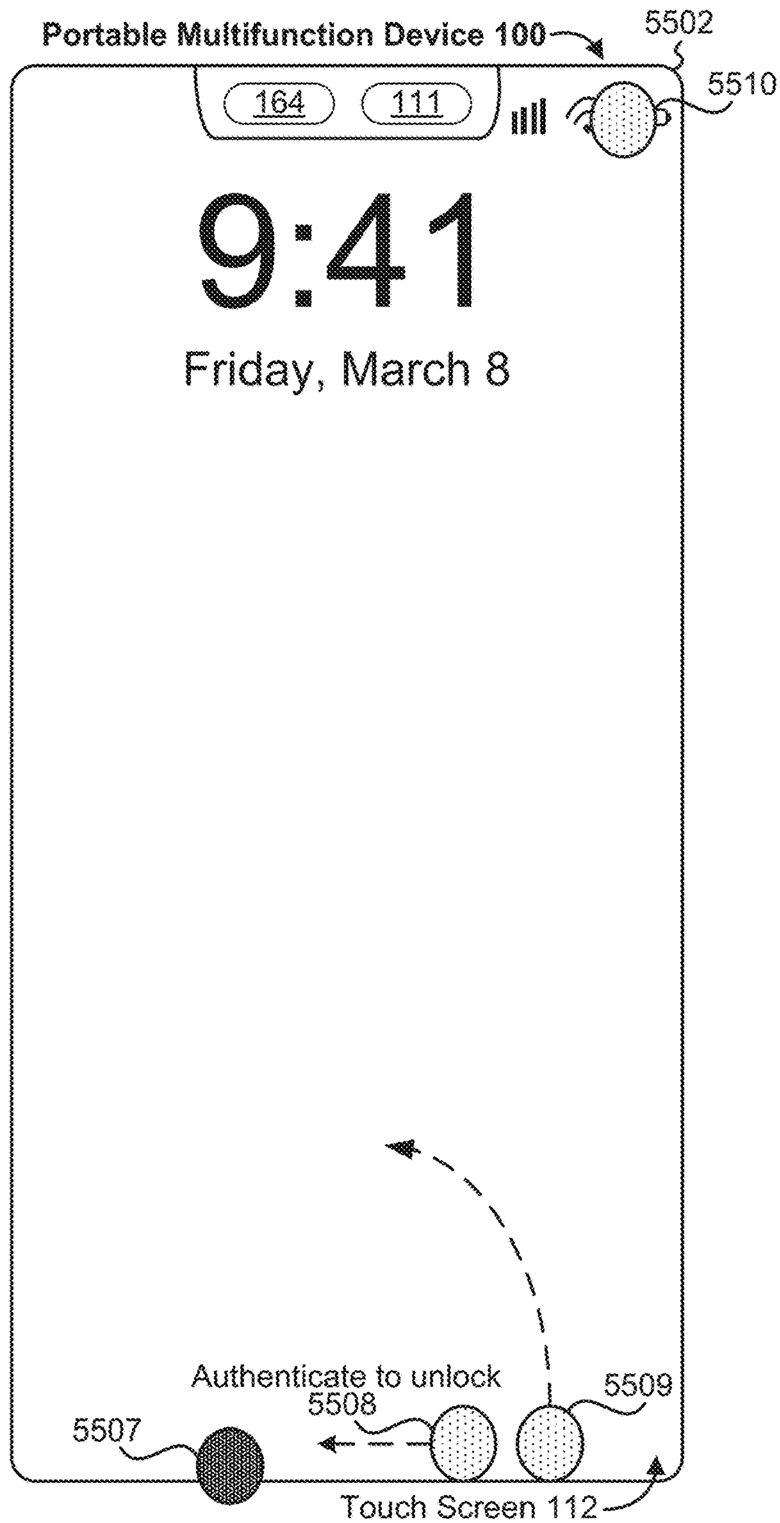
Figure 5C2

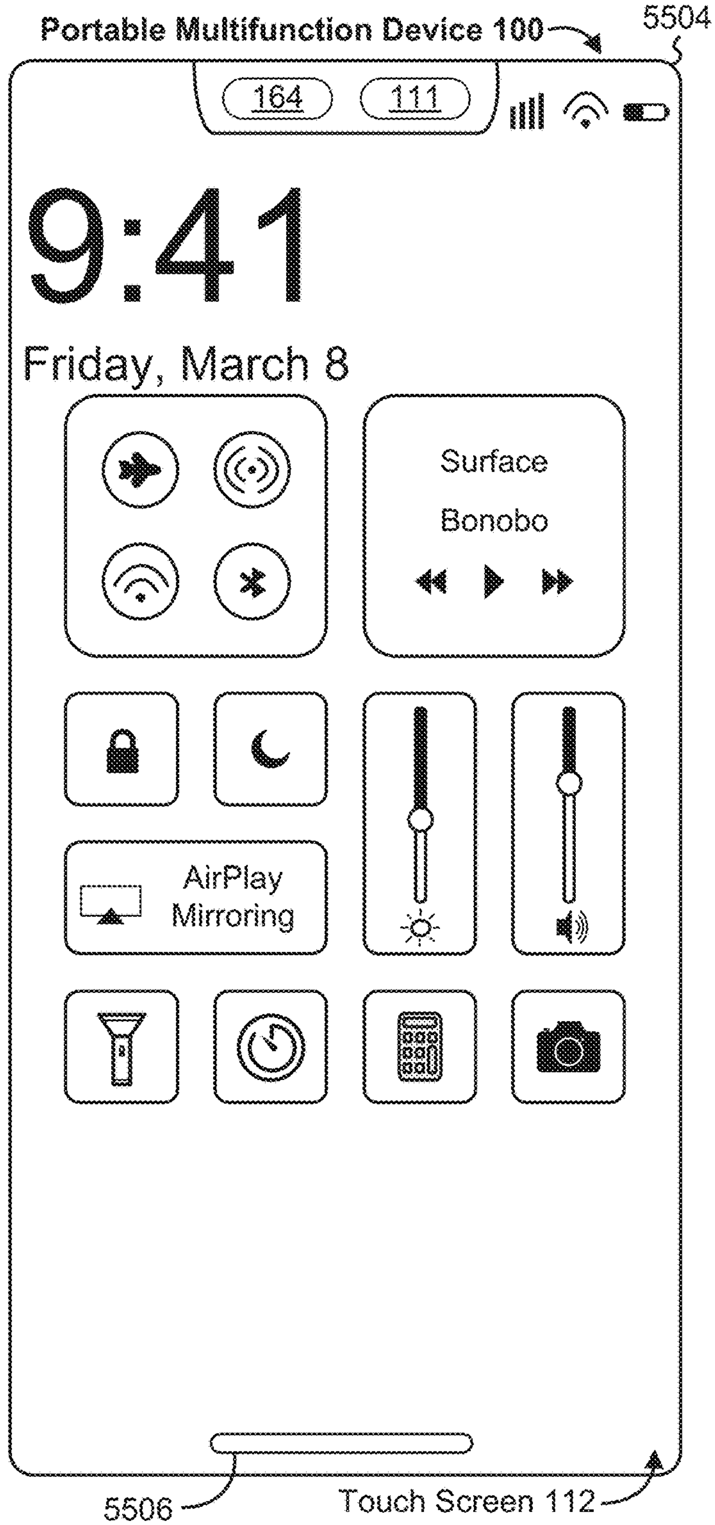
Figure 5C3

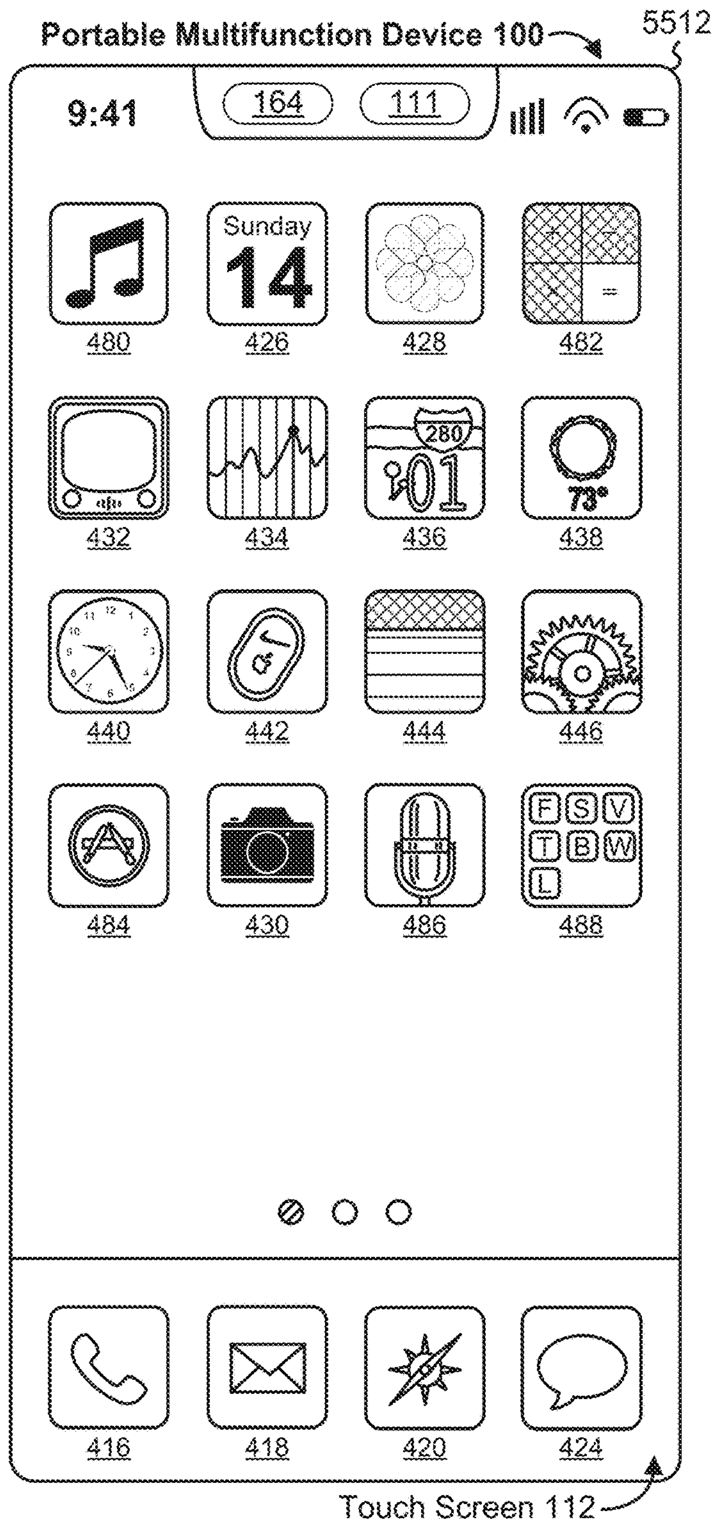
Figure 5C4

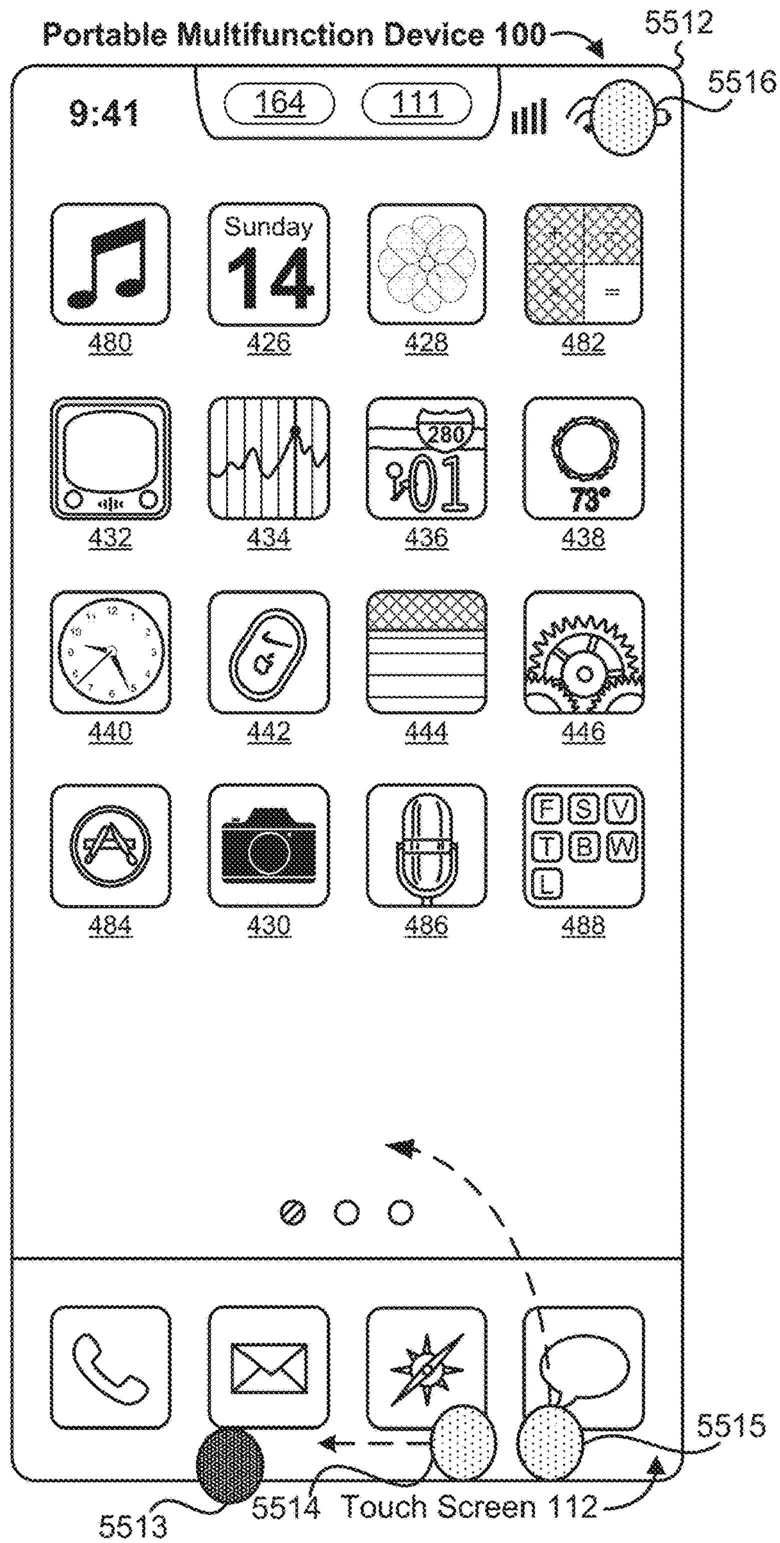
Figure 5C5

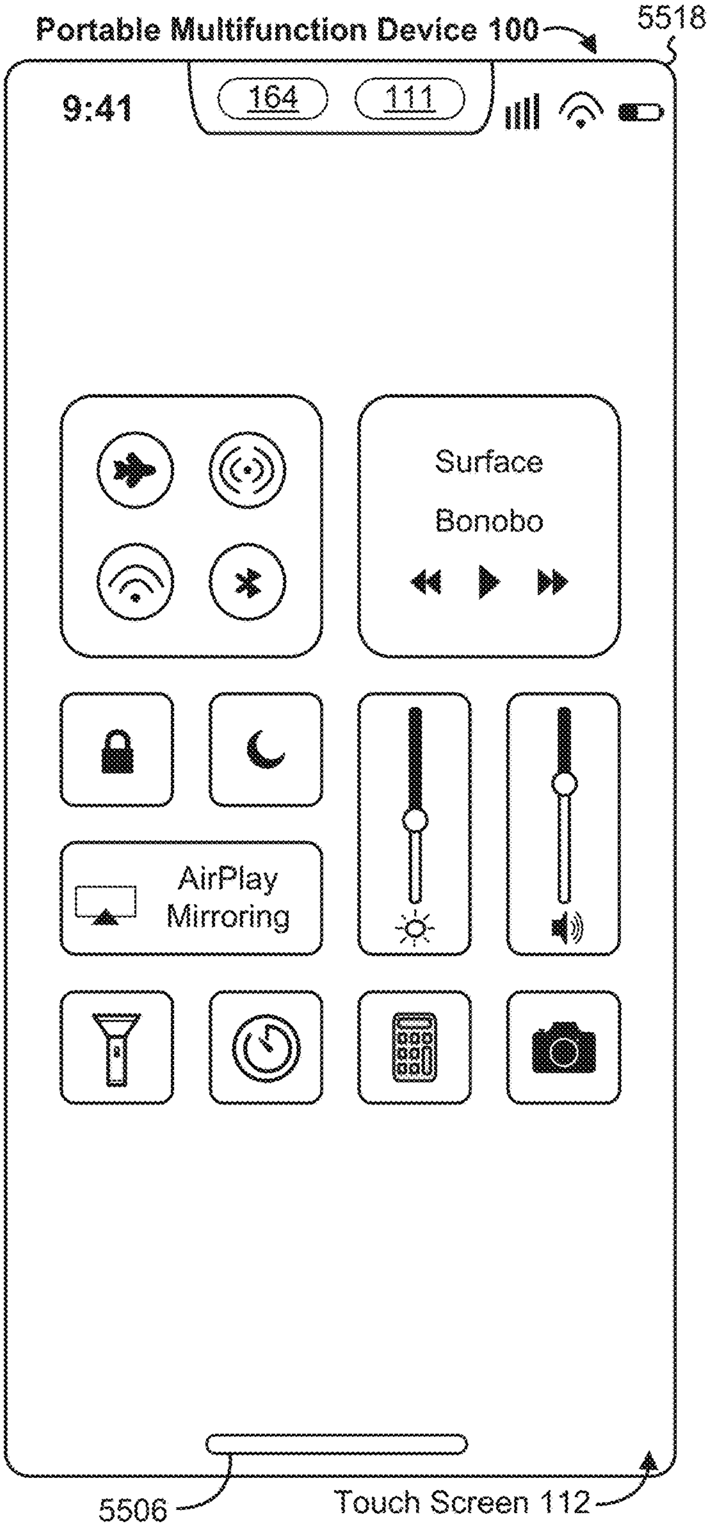
Figure 5C6

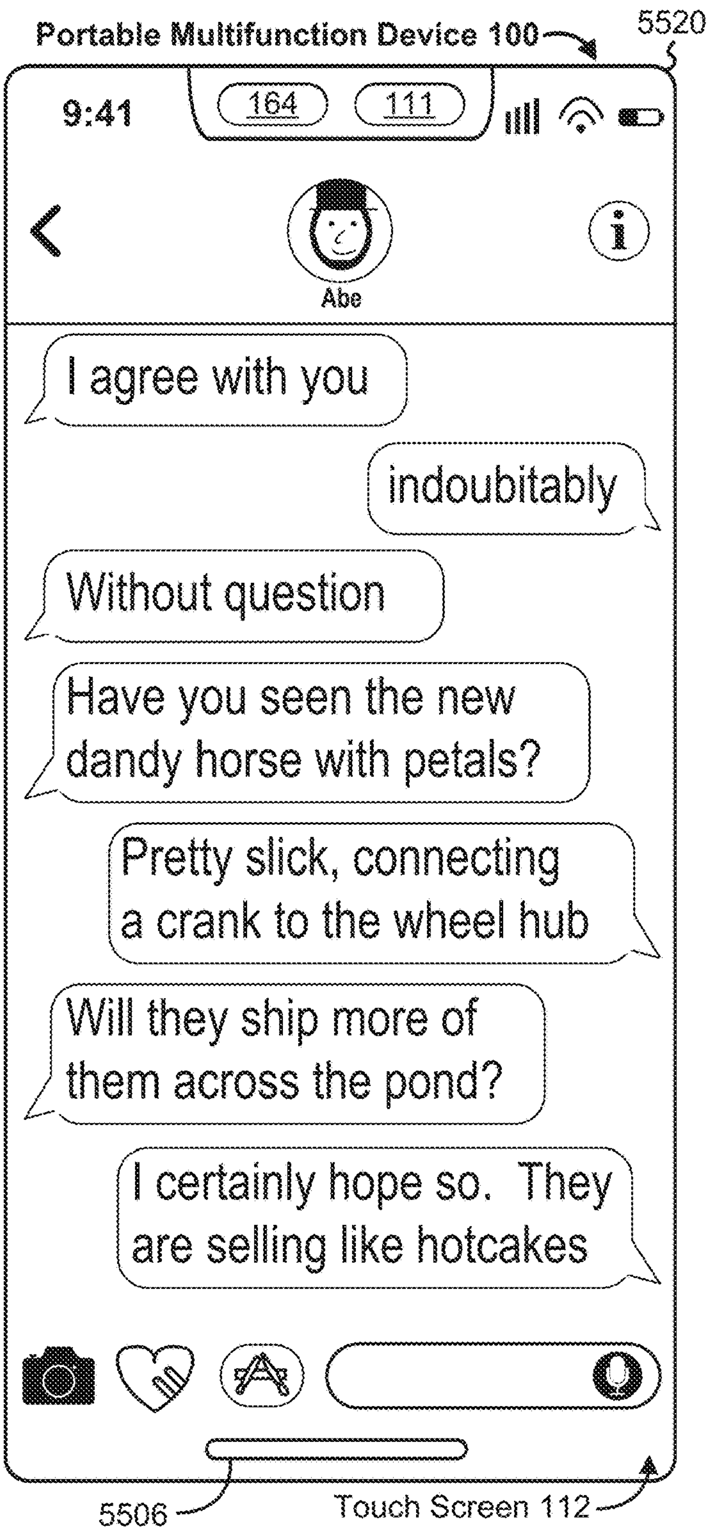
Figure 5C7

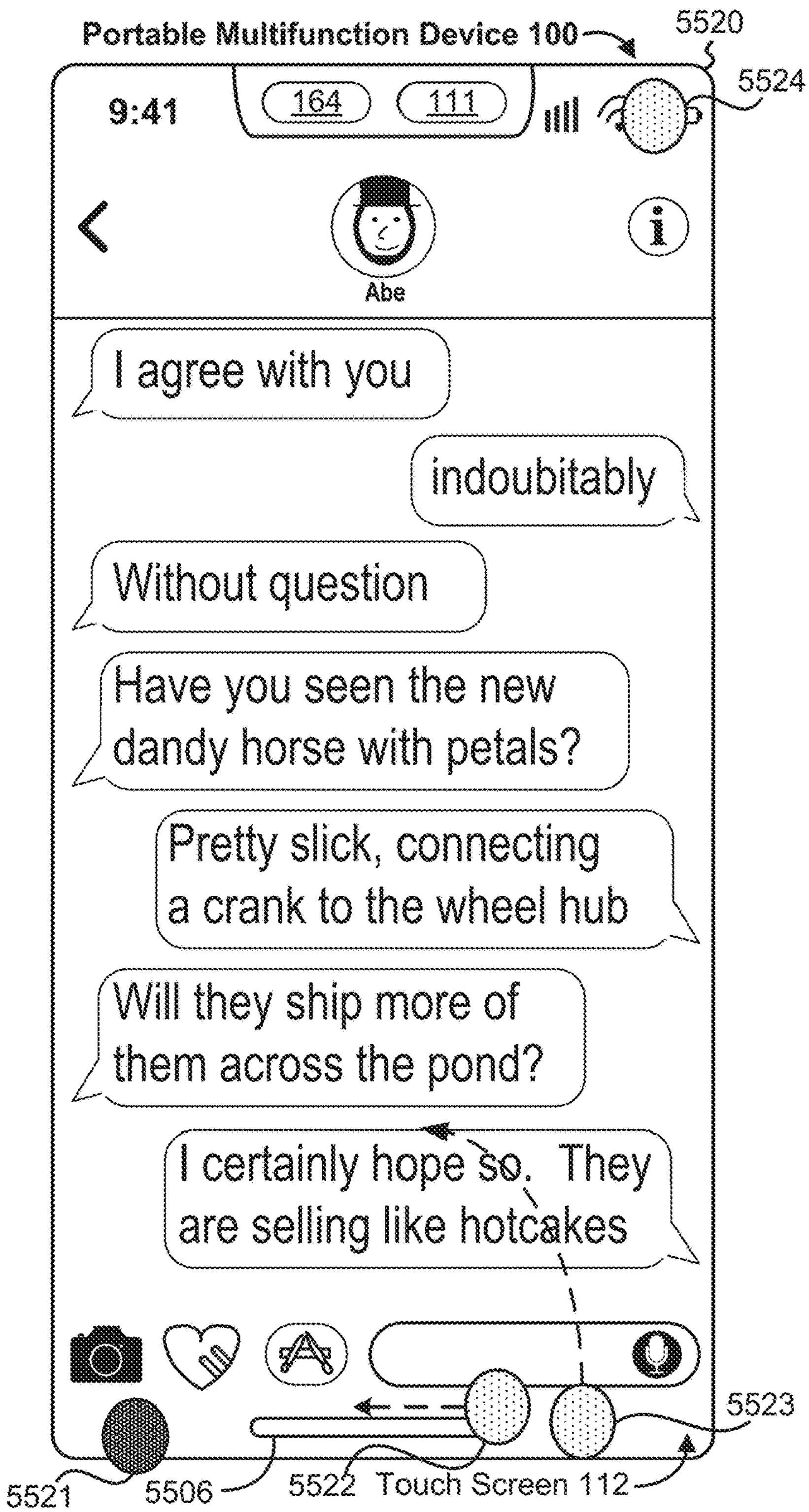
Figure 5C8

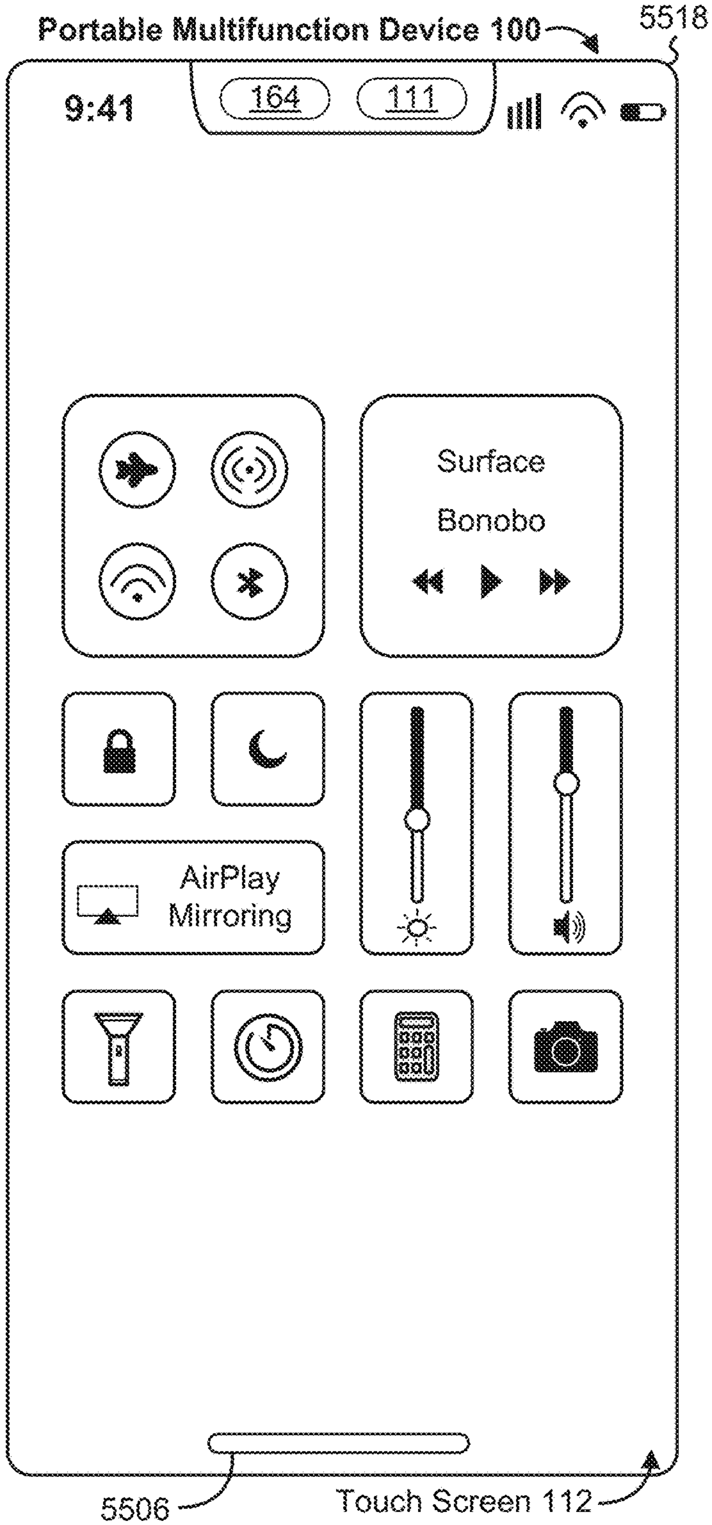
Figure 5C9

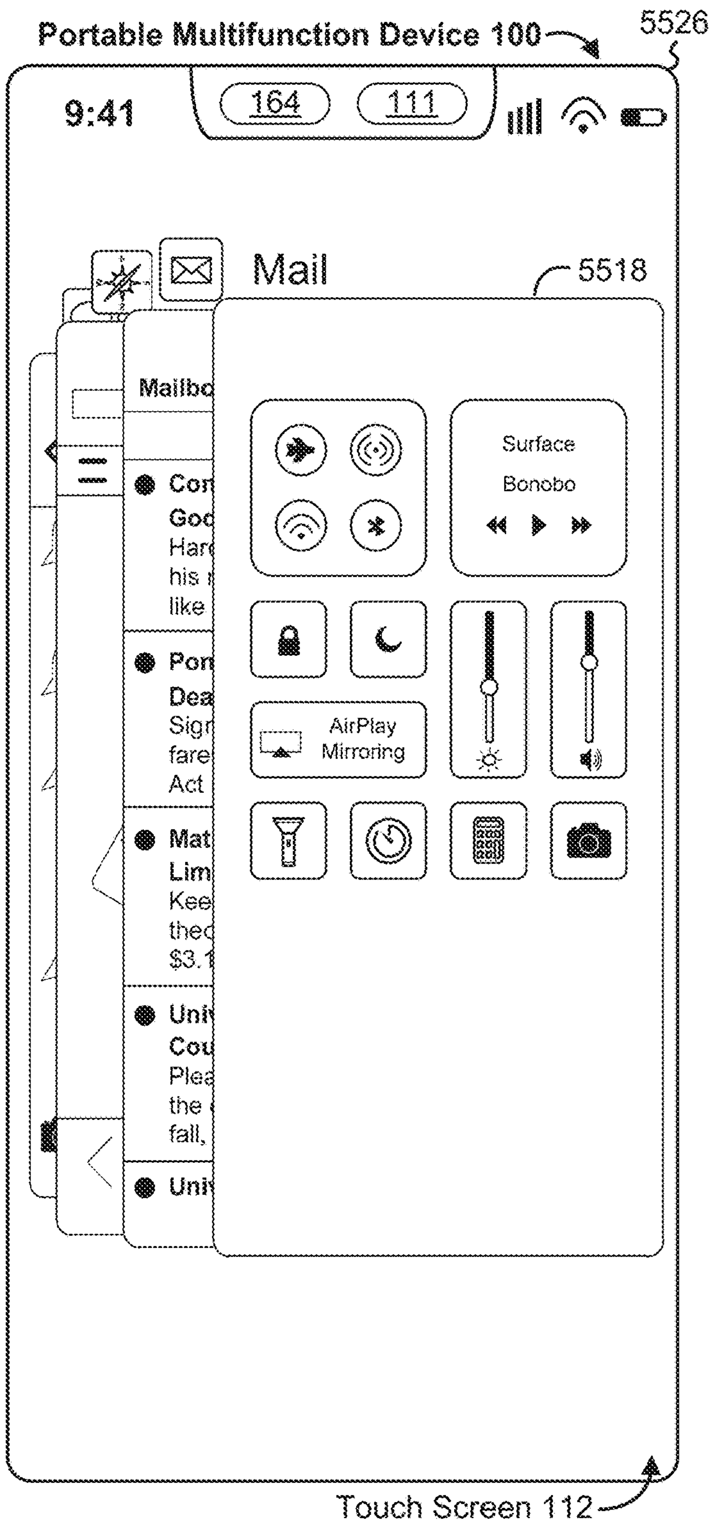
Figure 5C10

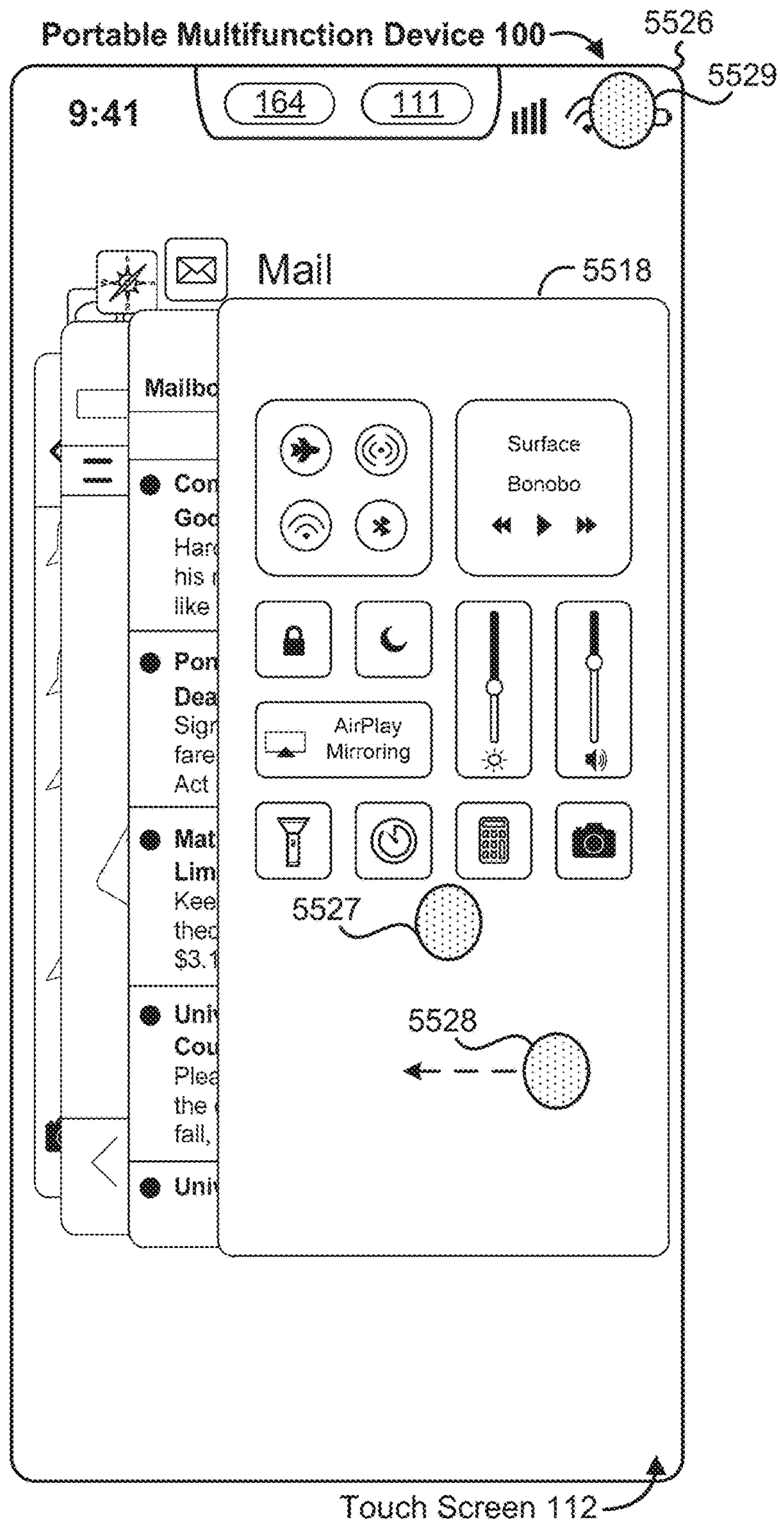
Figure 5C11

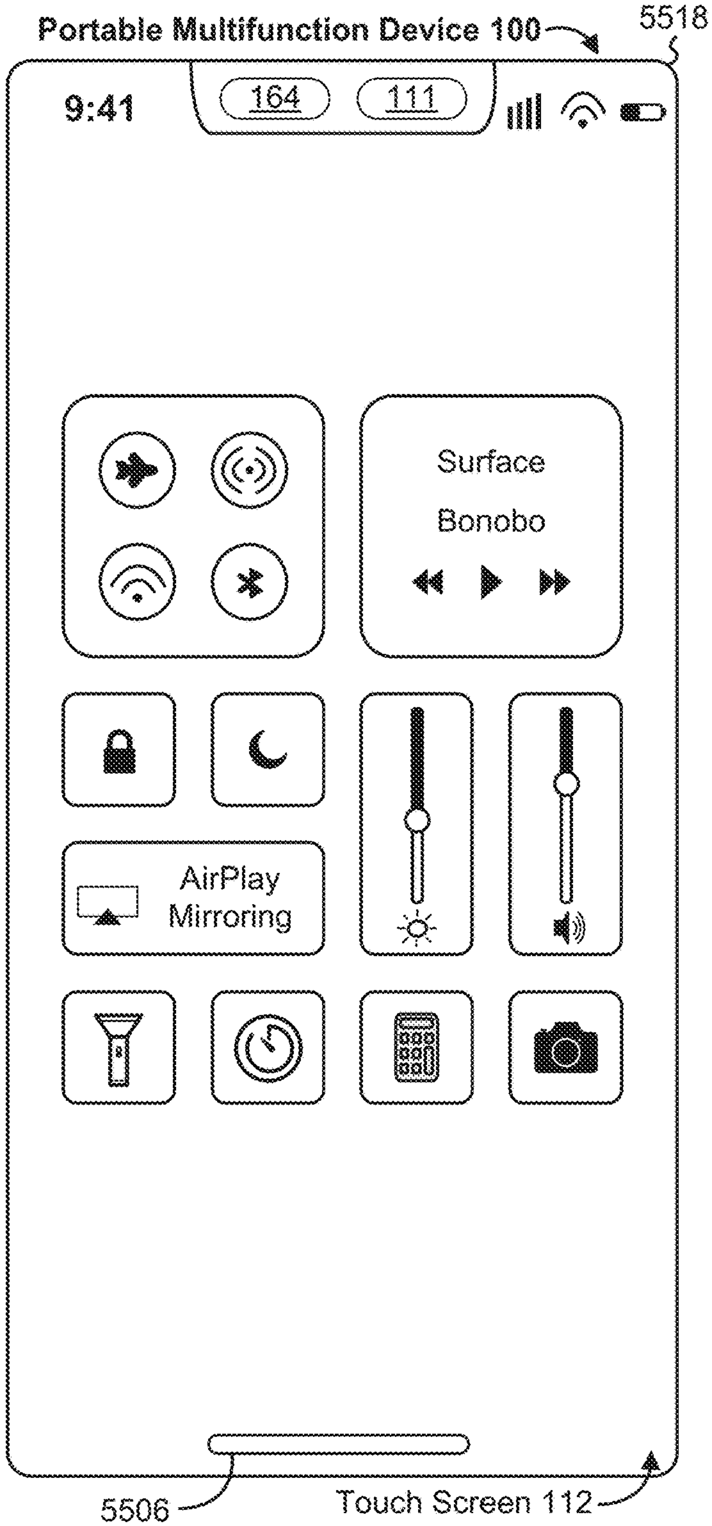
Figure 5C12

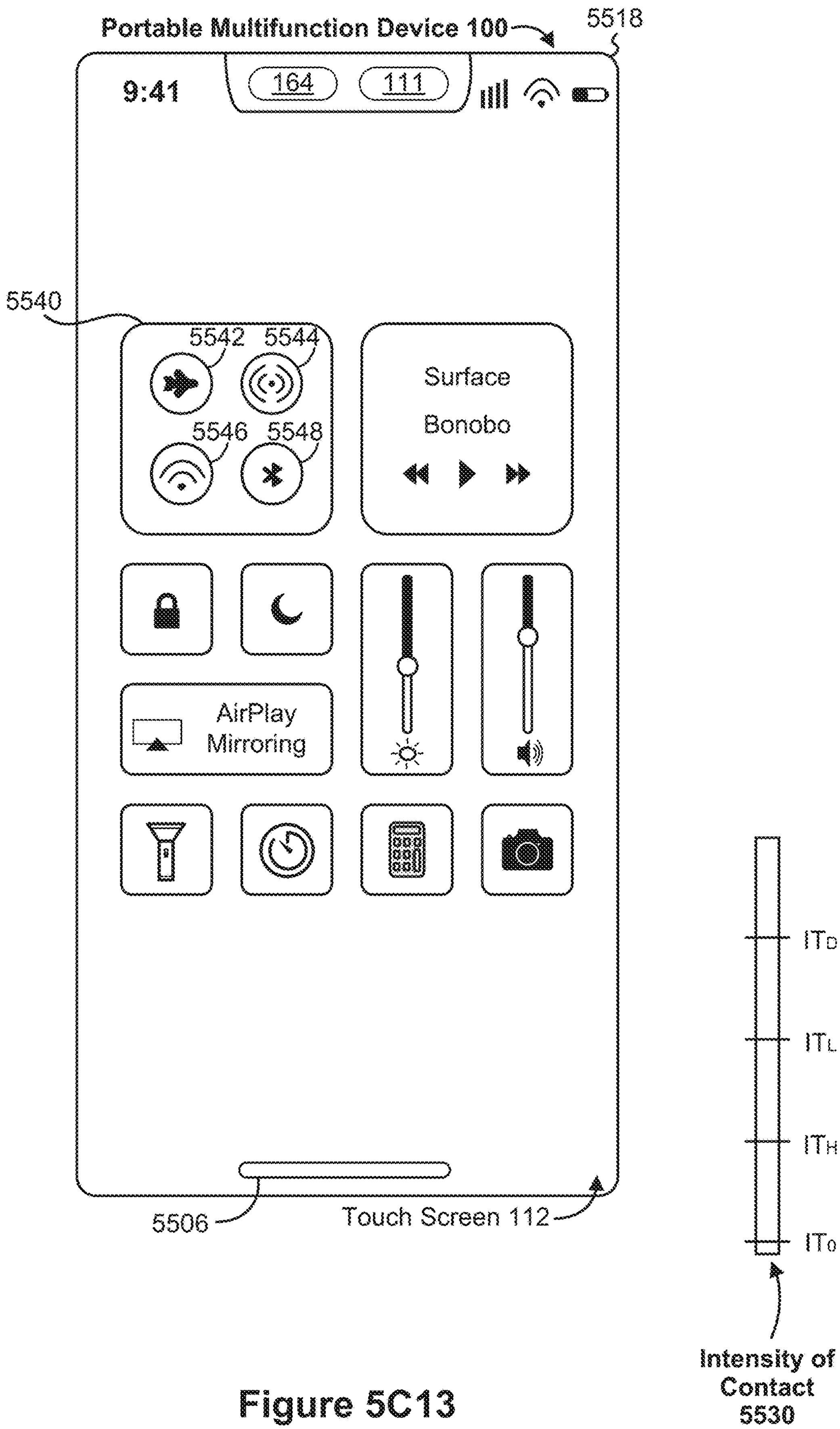
Figure 5C13

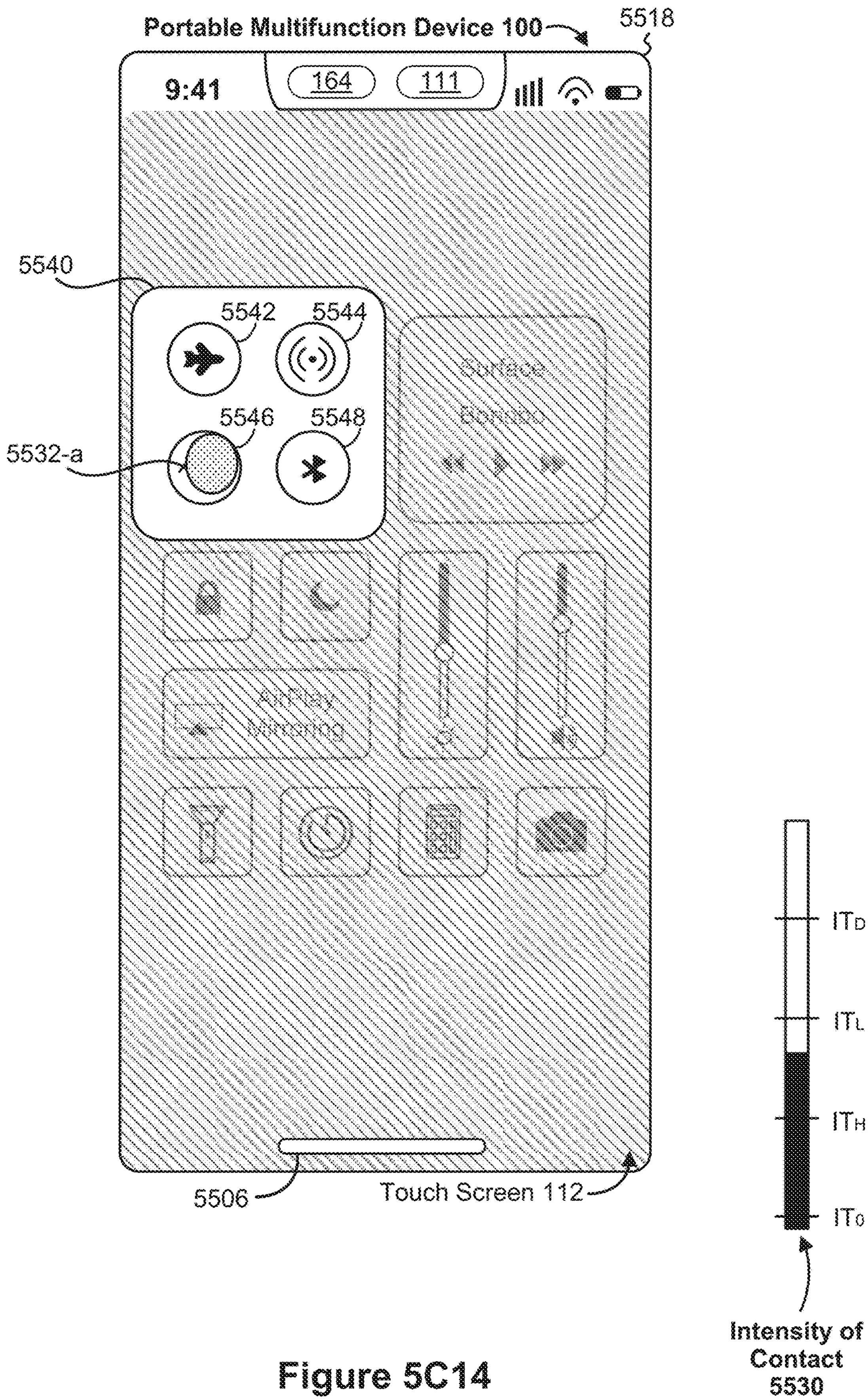
Figure 5C14

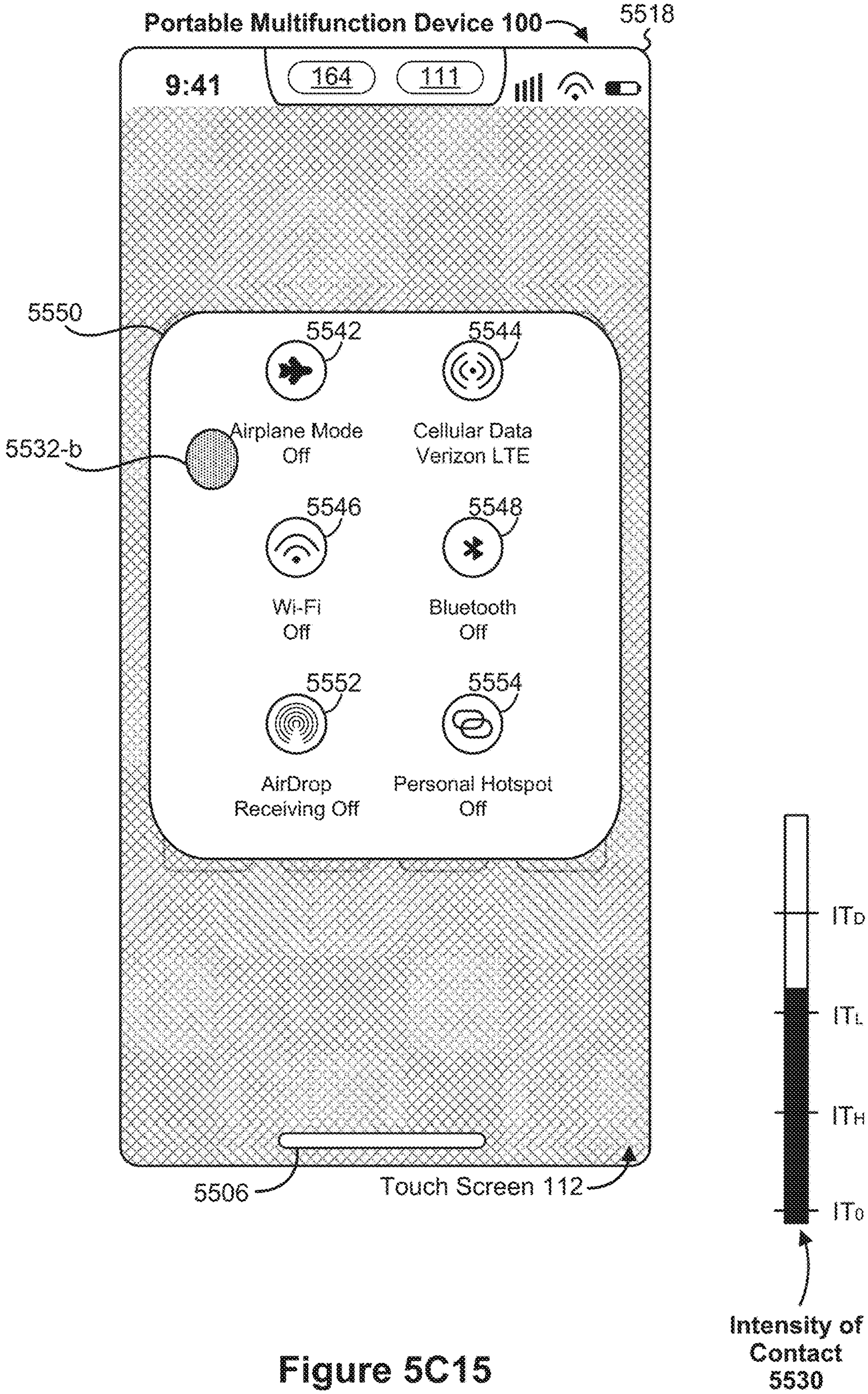
Figure 5C15

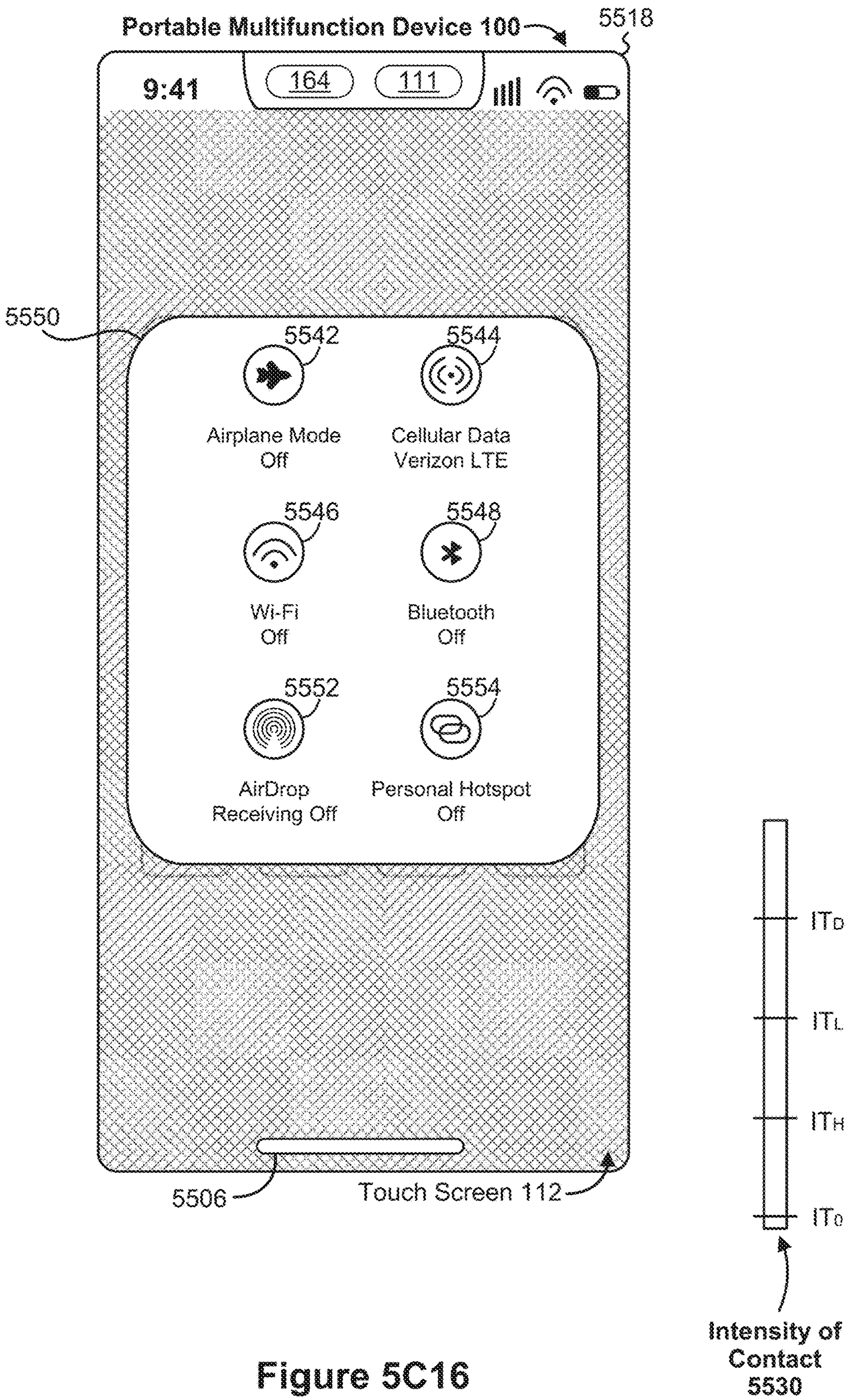
Figure 5C16

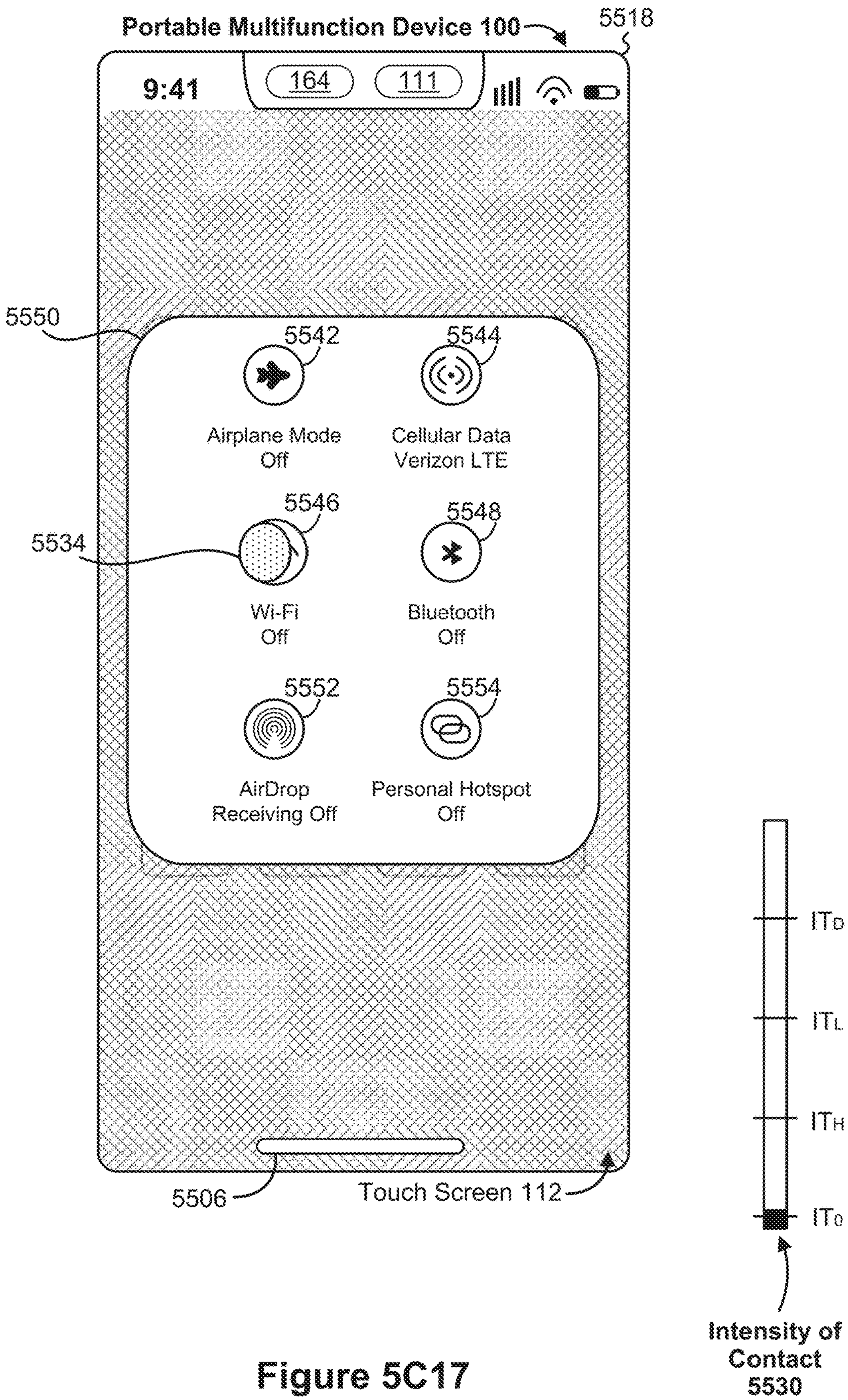
Figure 5C17

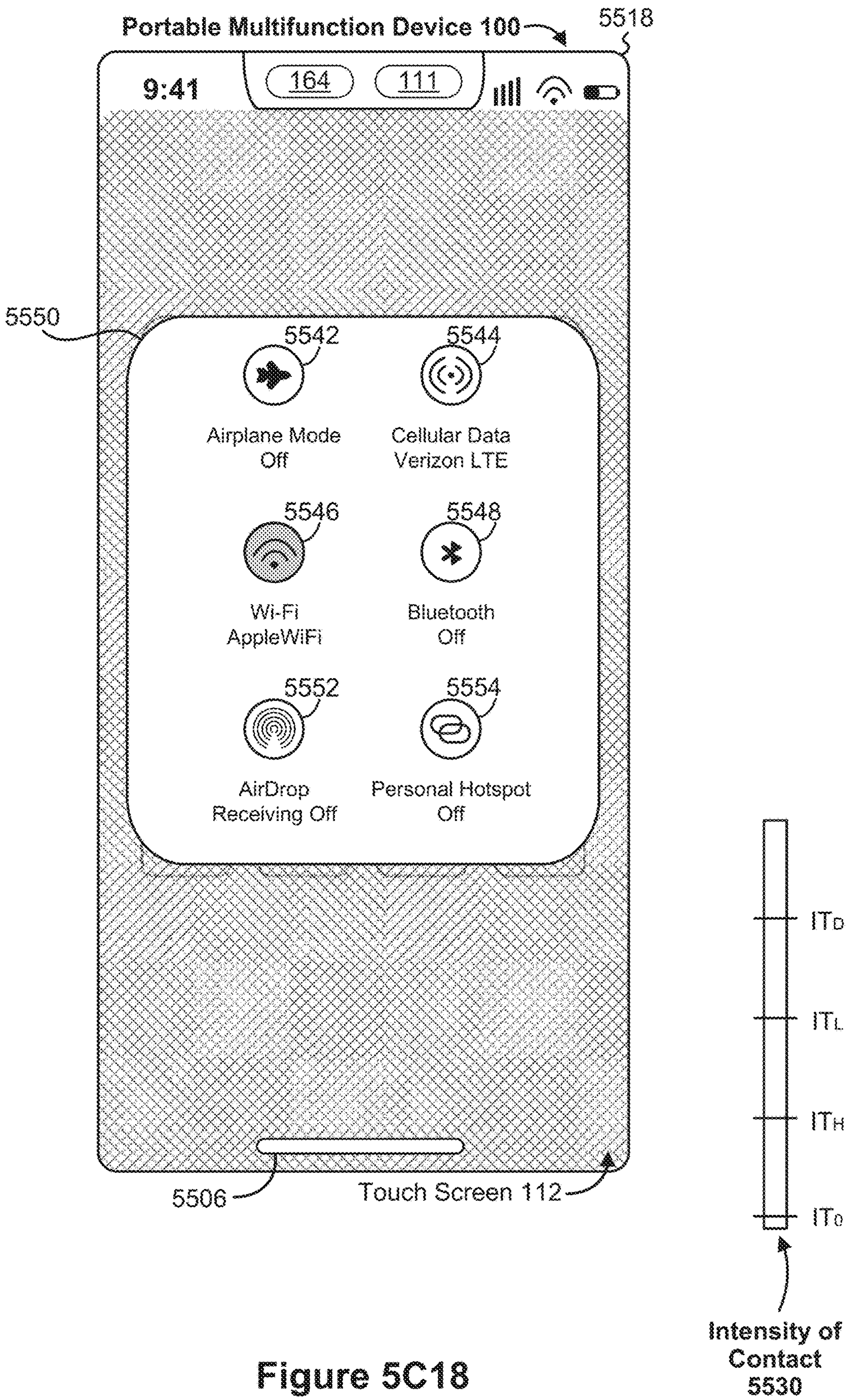
Figure 5C18

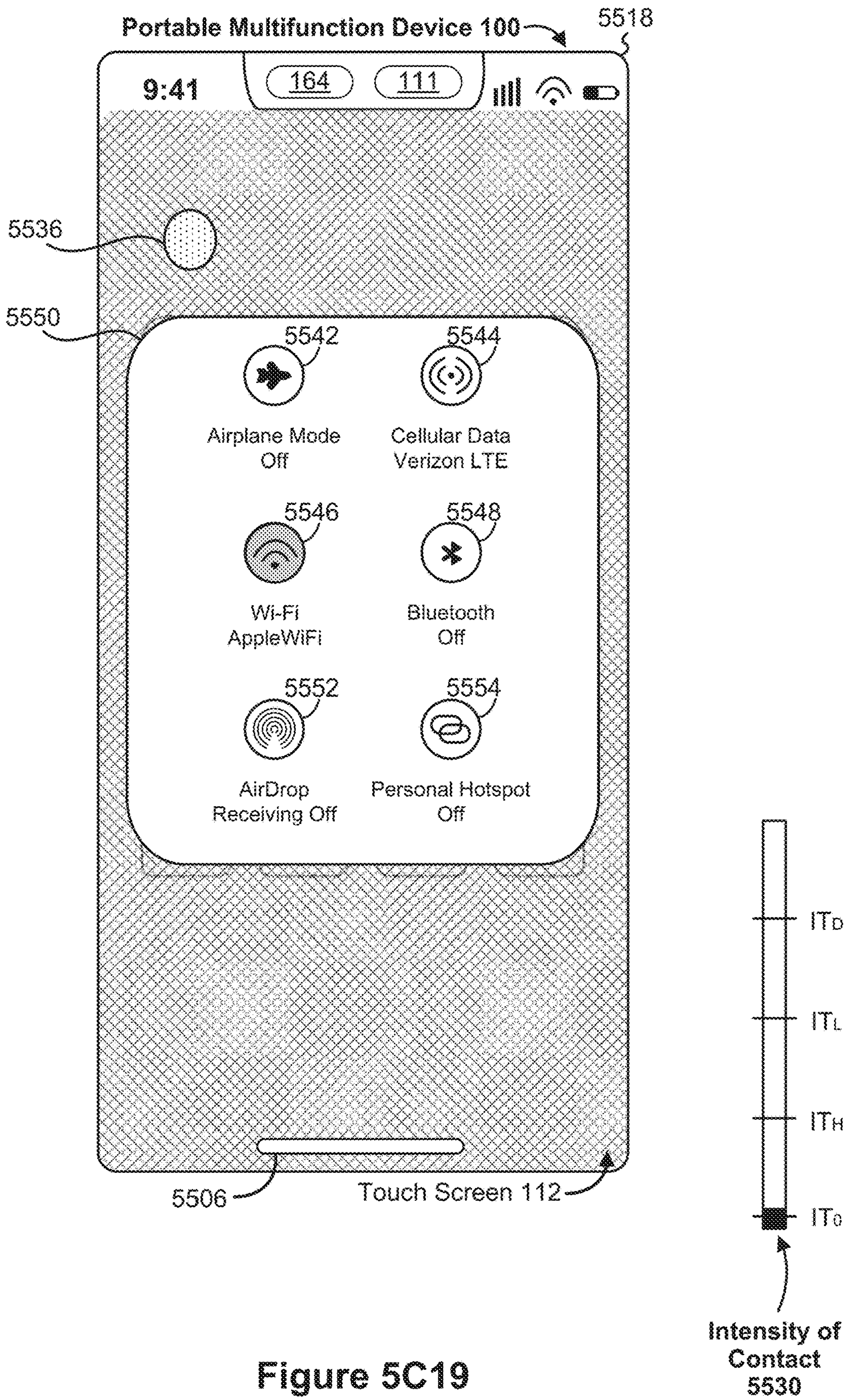
Figure 5C19

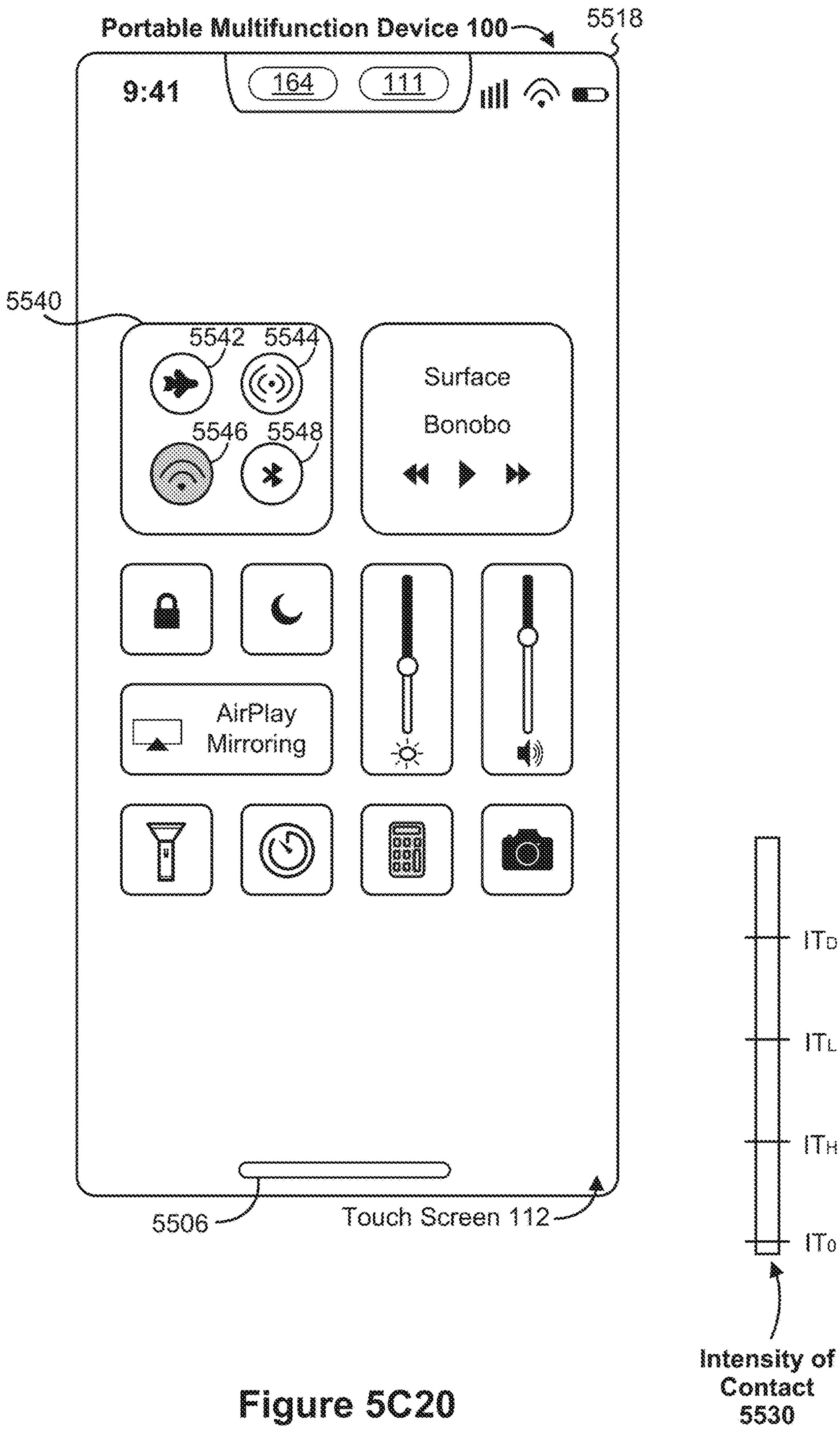
Figure 5C20

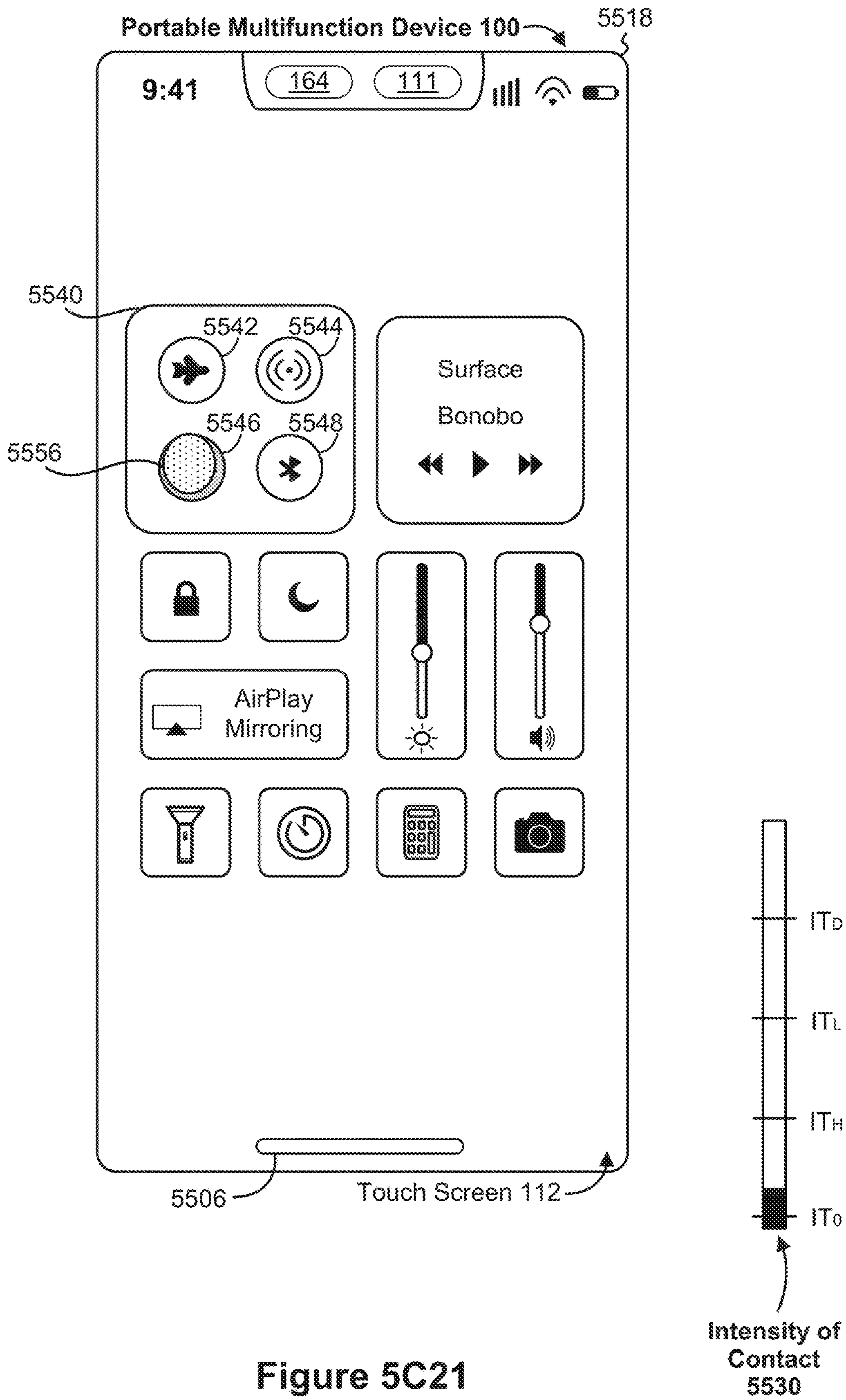
Figure 5C21

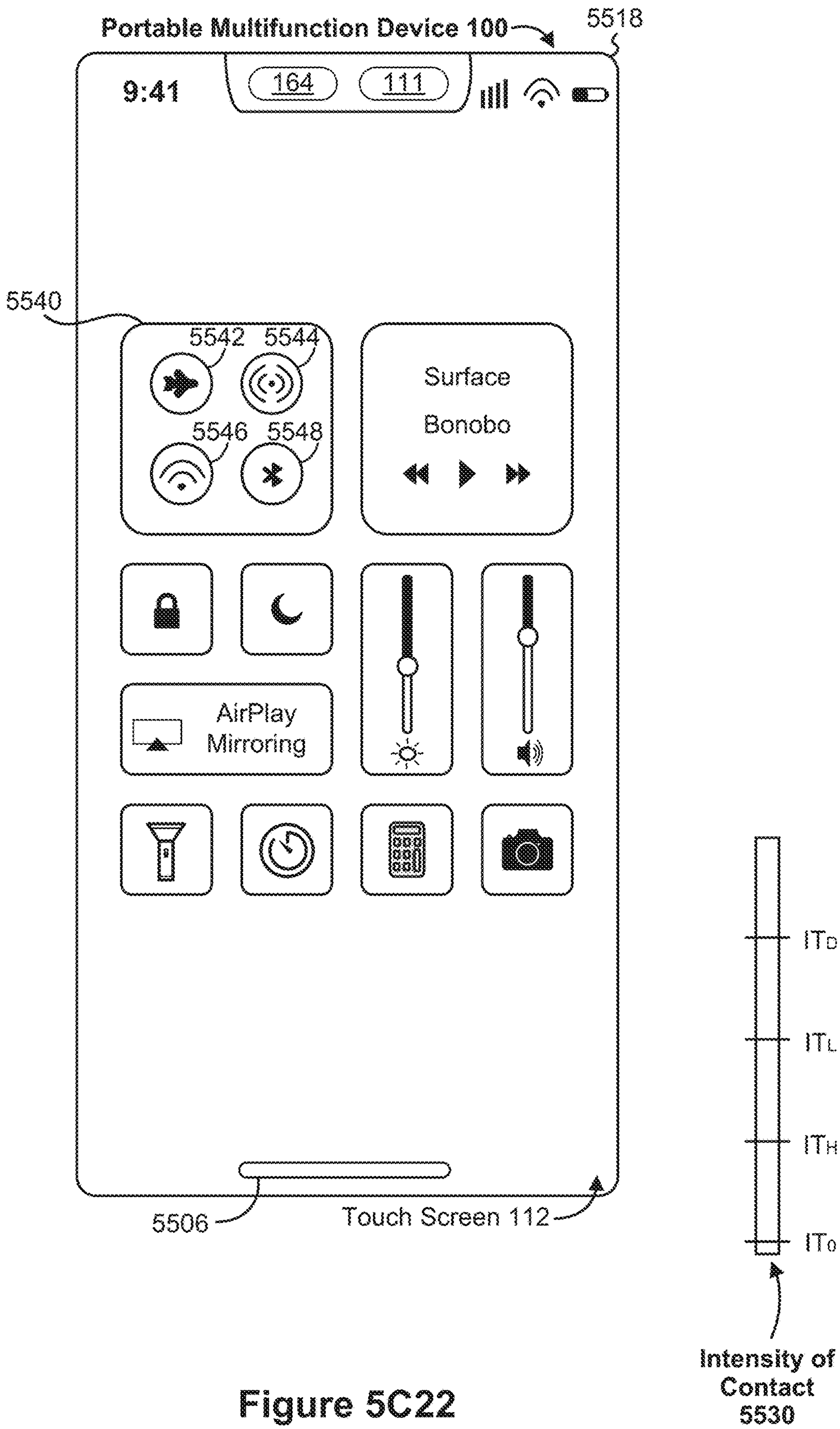
Figure 5C22

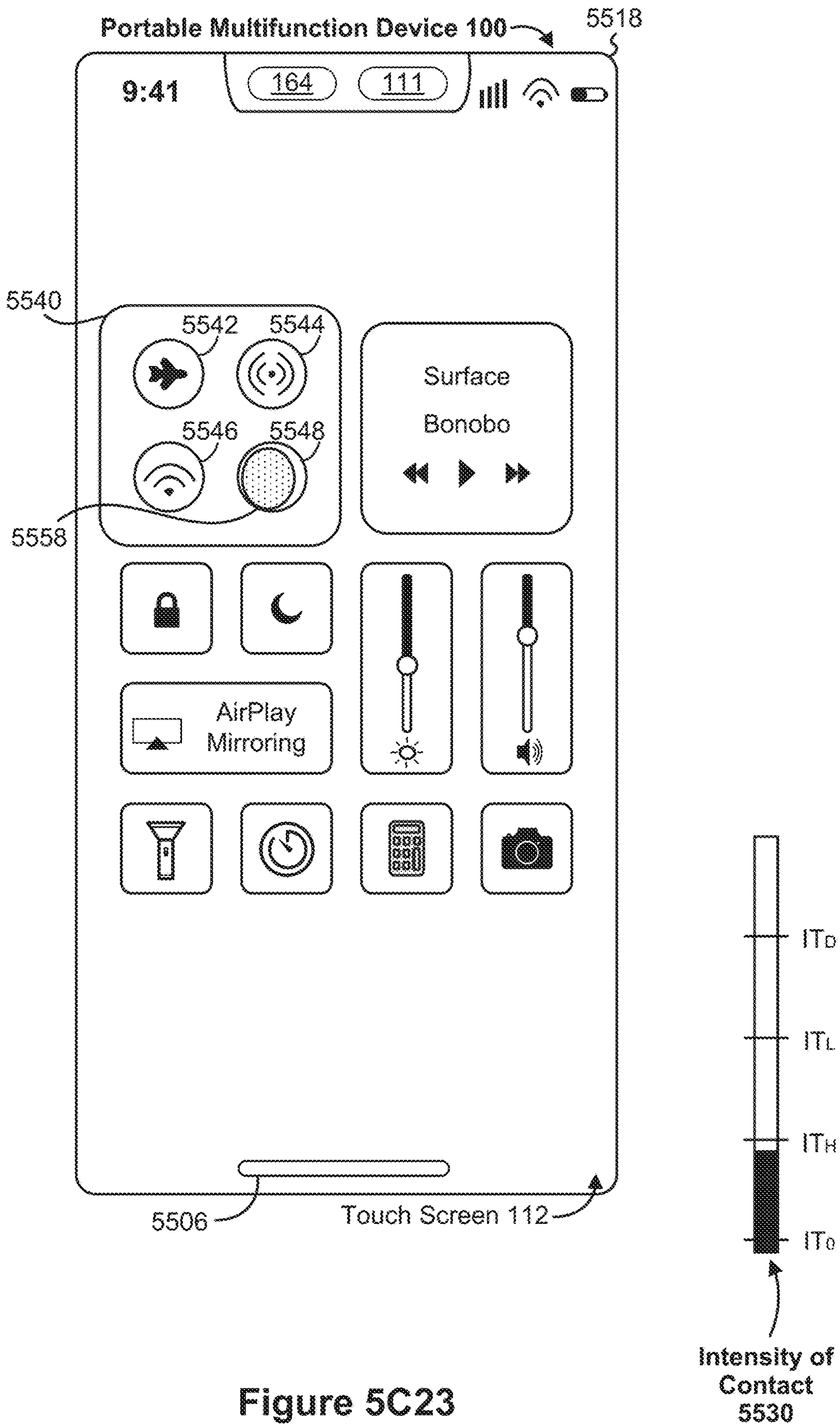
Figure 5C23

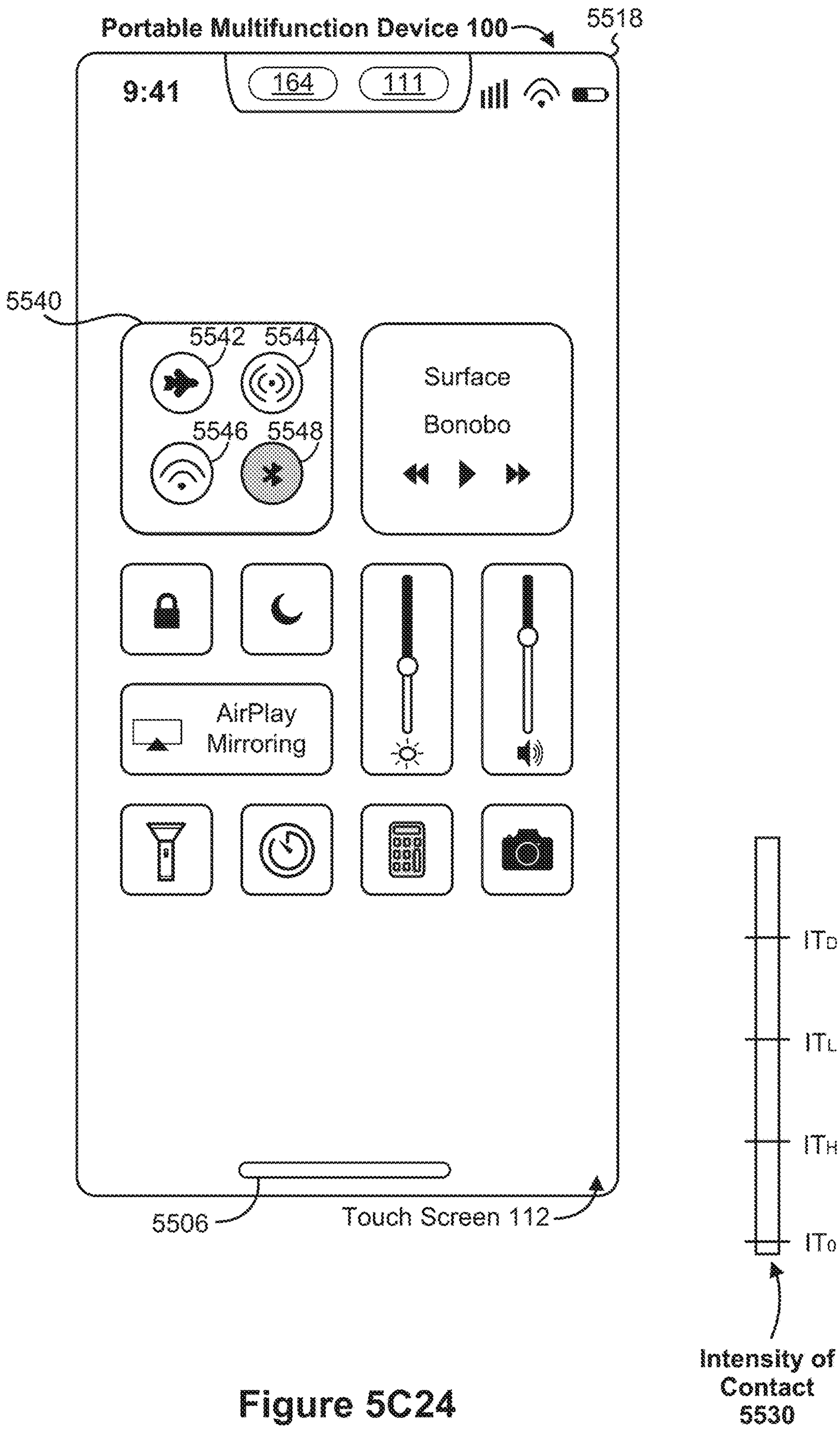
Figure 5C24

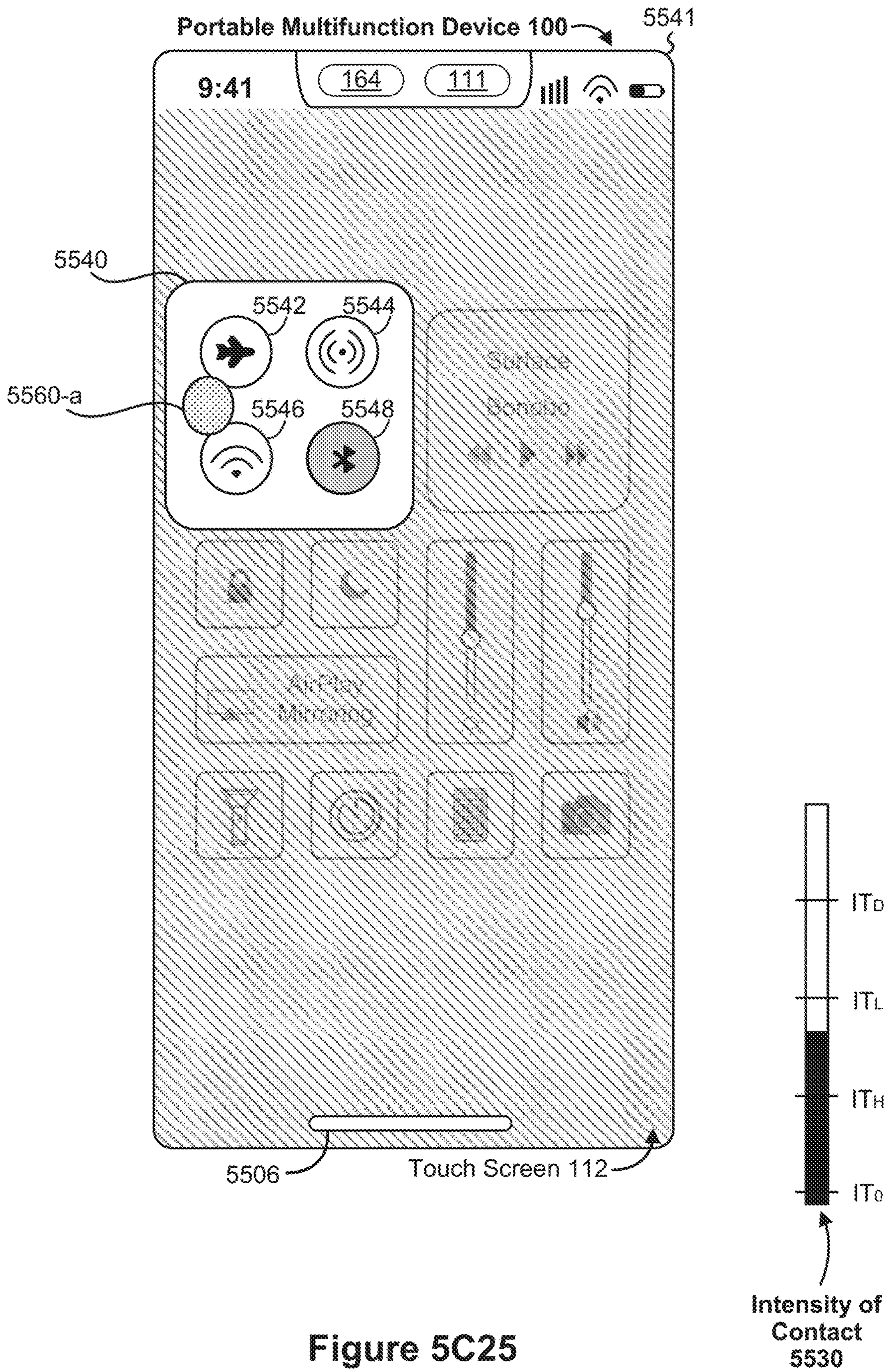
Figure 5C25

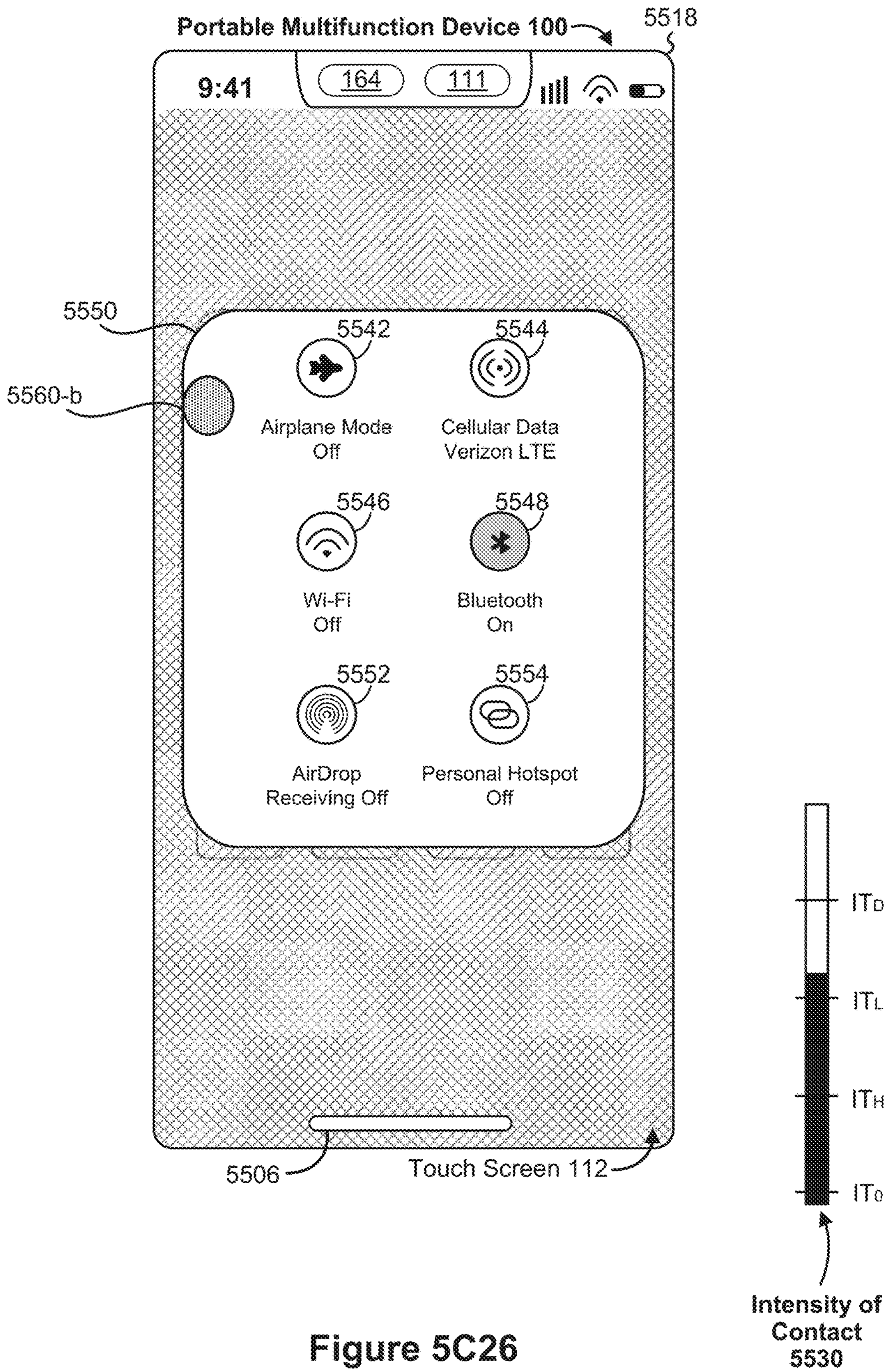
Figure 5C26

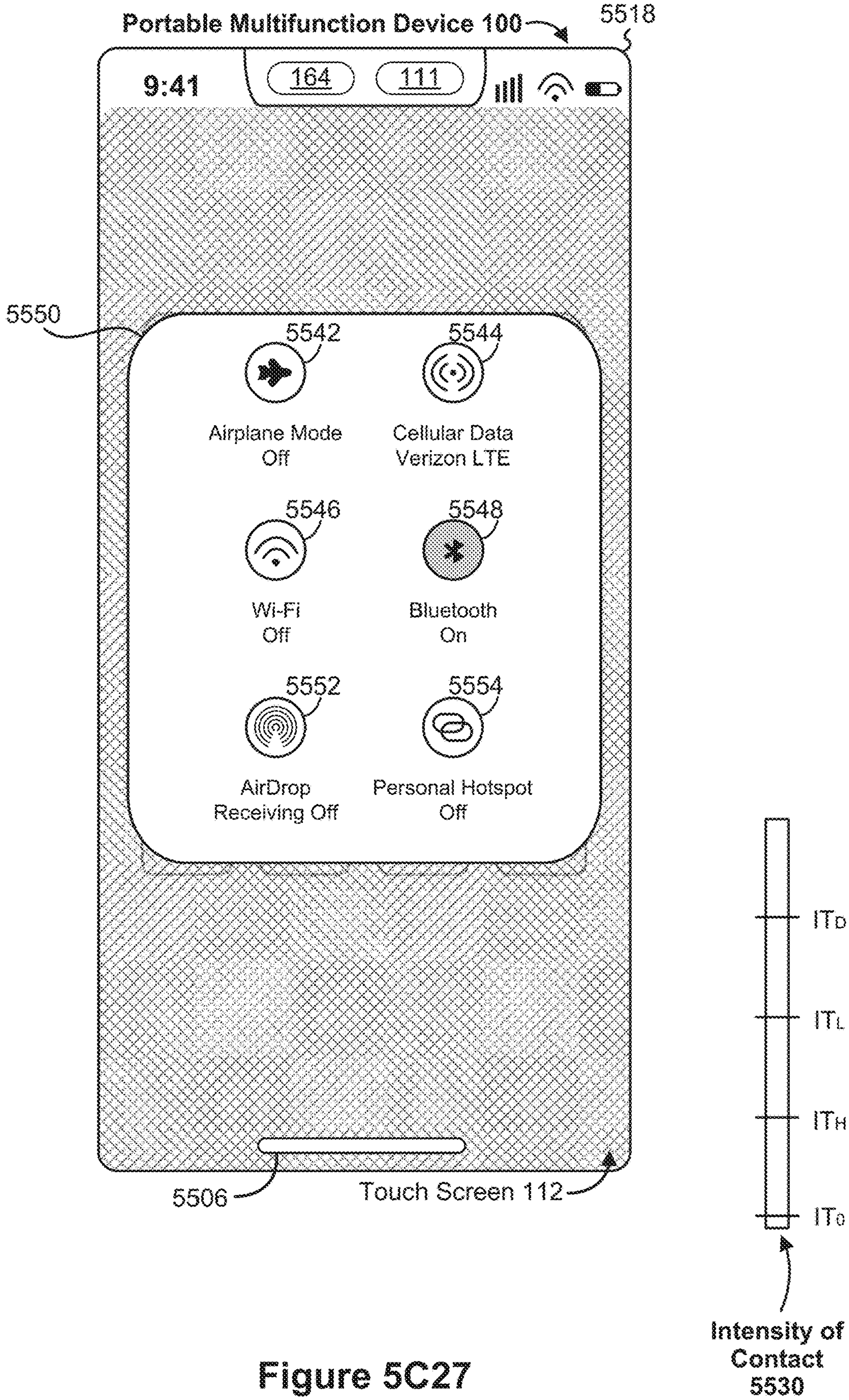
Figure 5C27

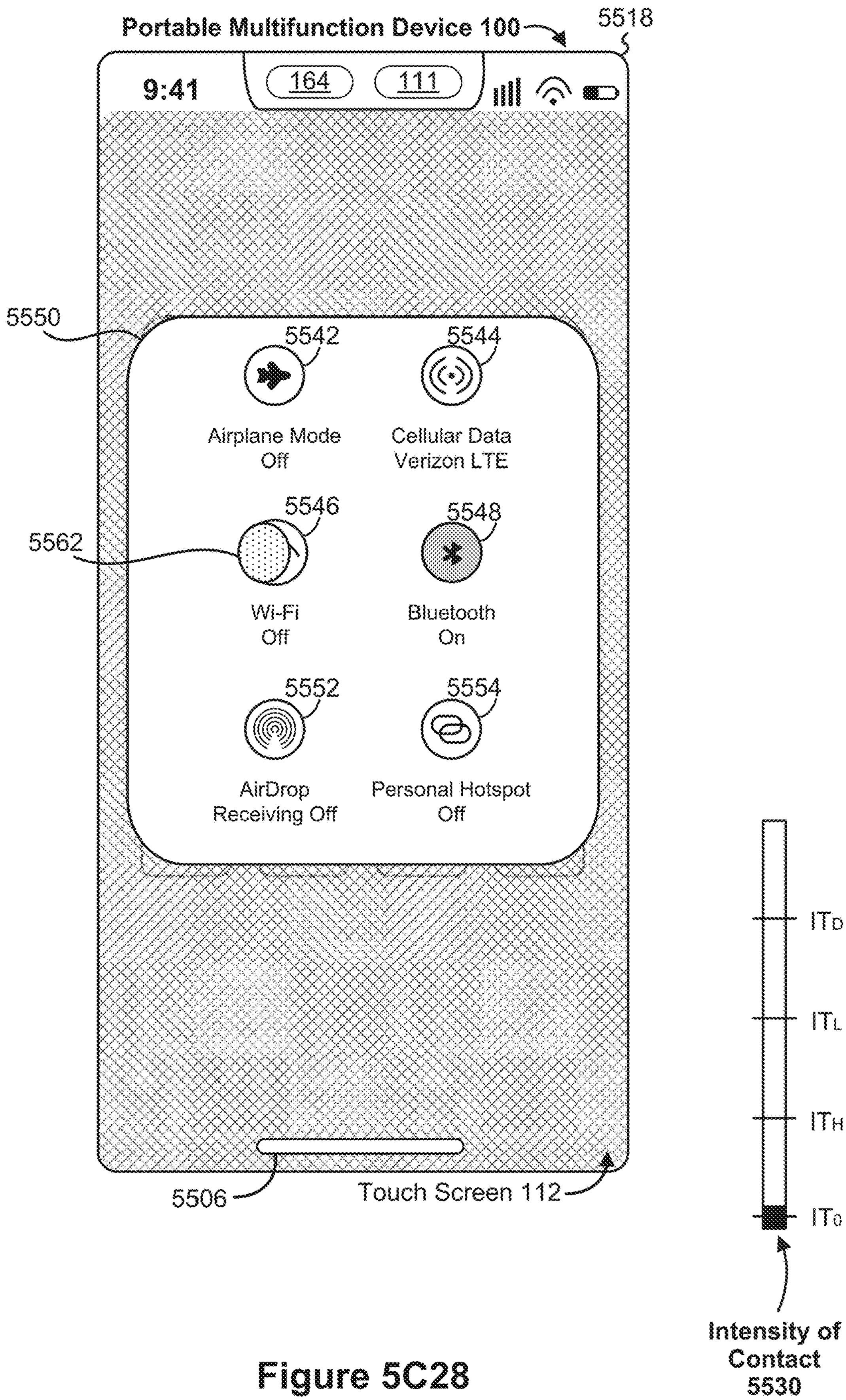
Figure 5C28

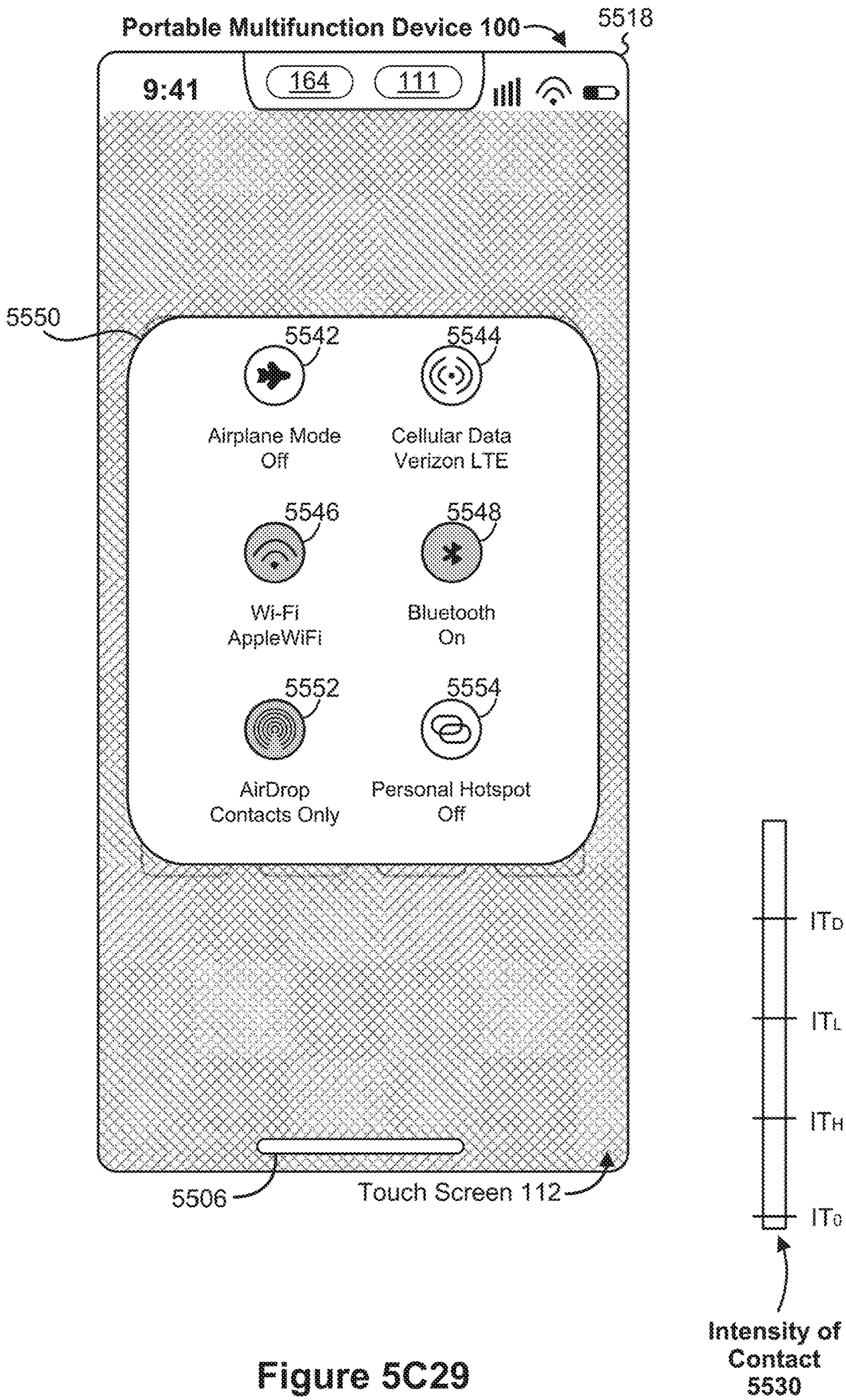
Figure 5C29

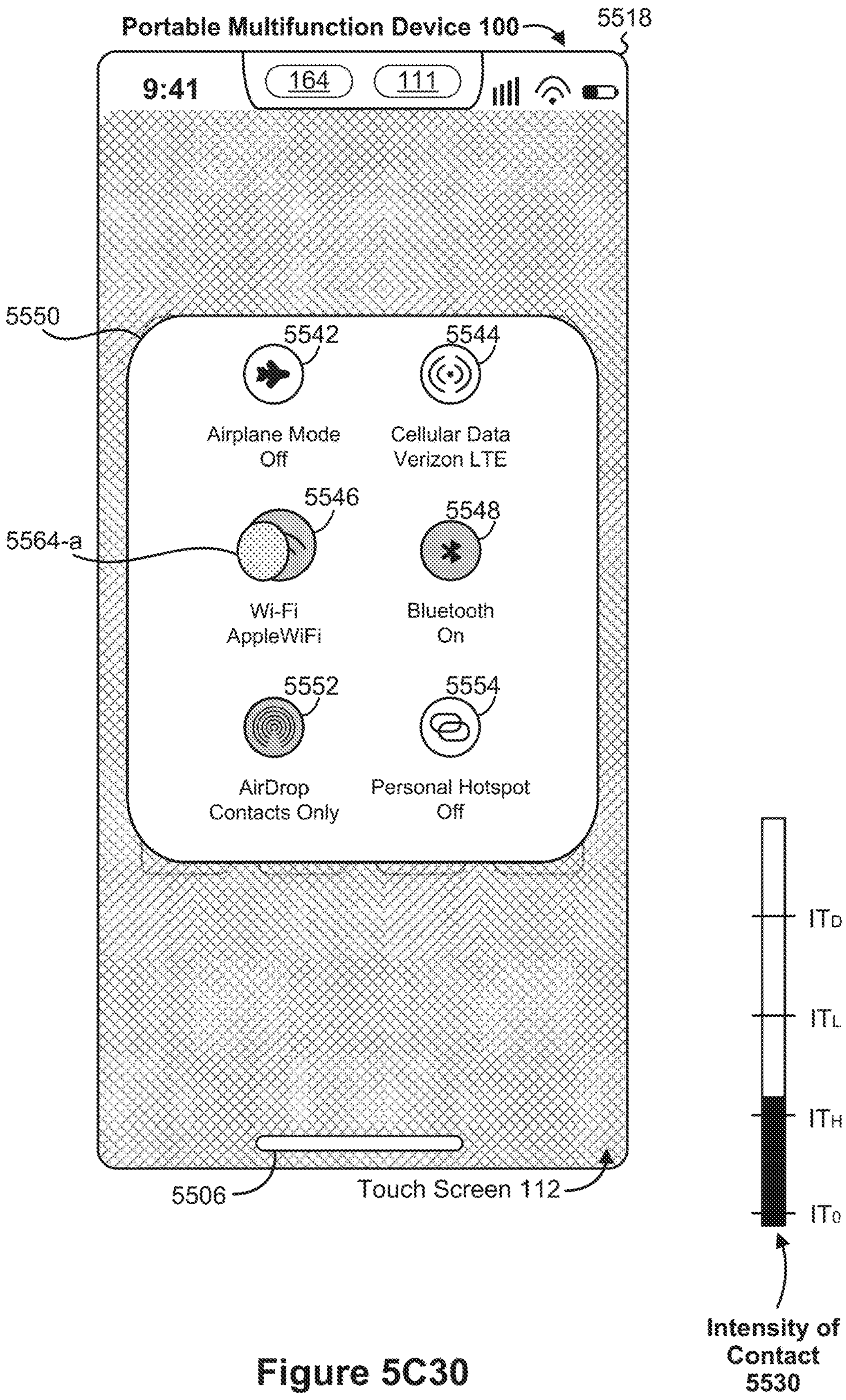
Figure 5C30

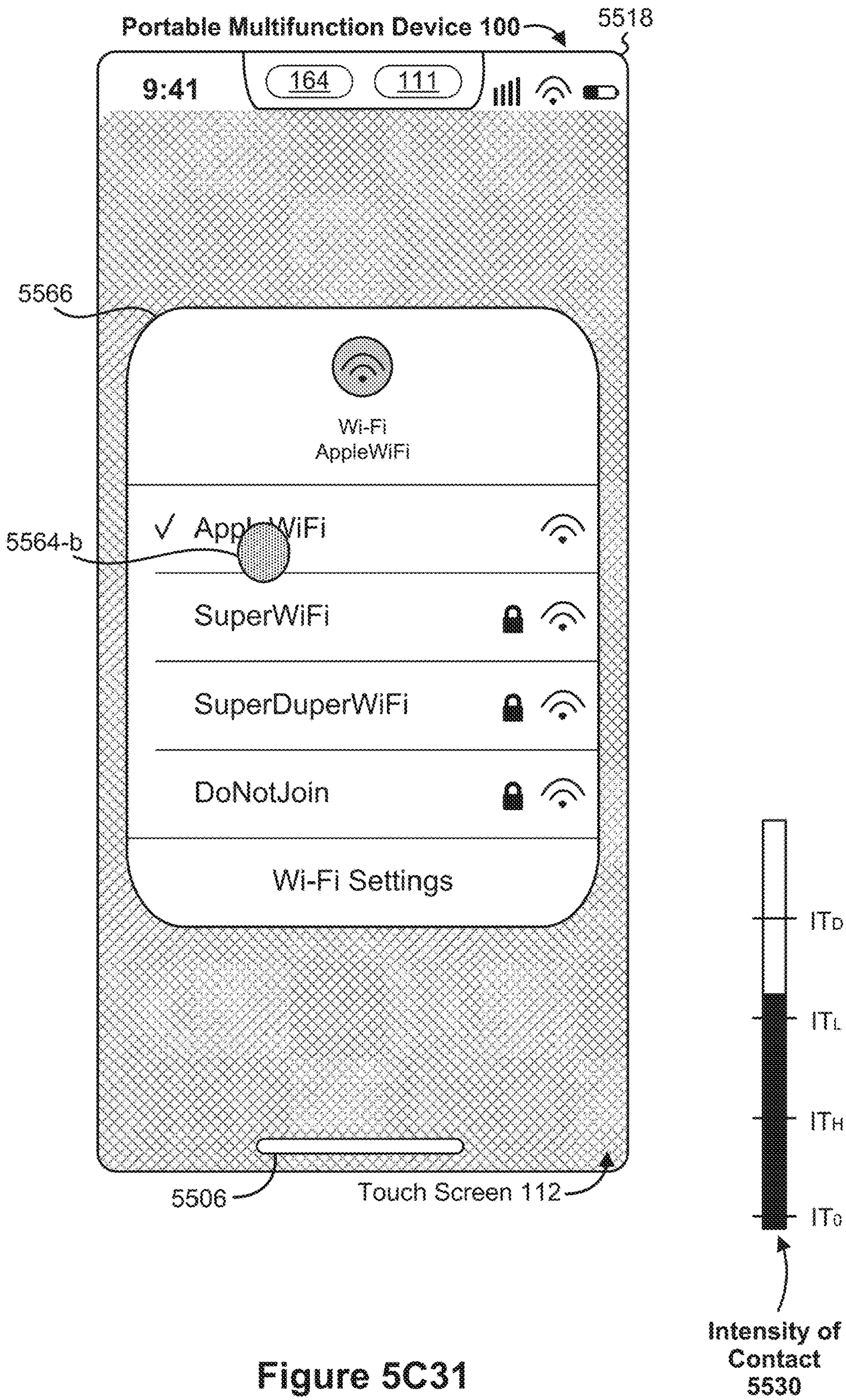
Figure 5C31

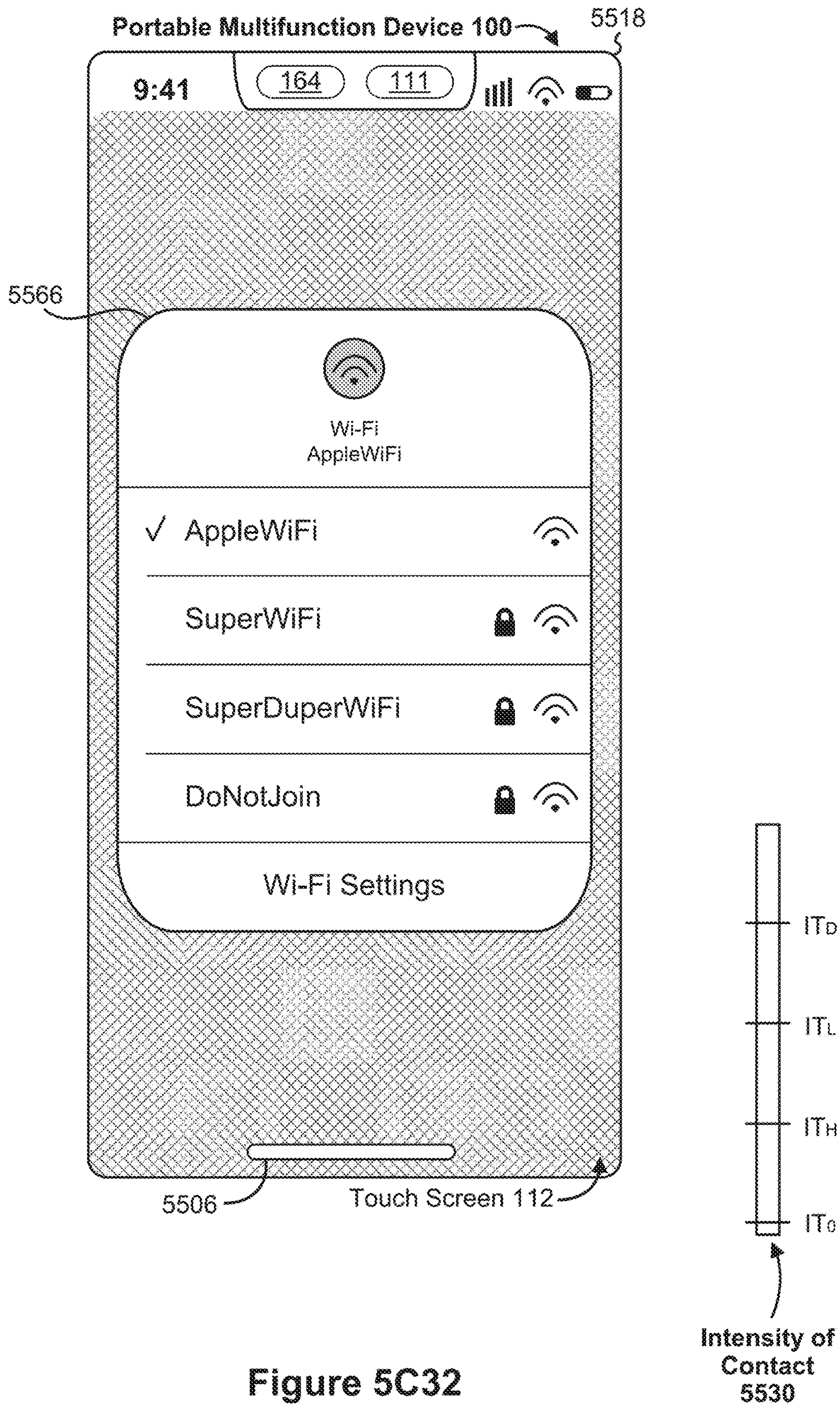
Figure 5C32

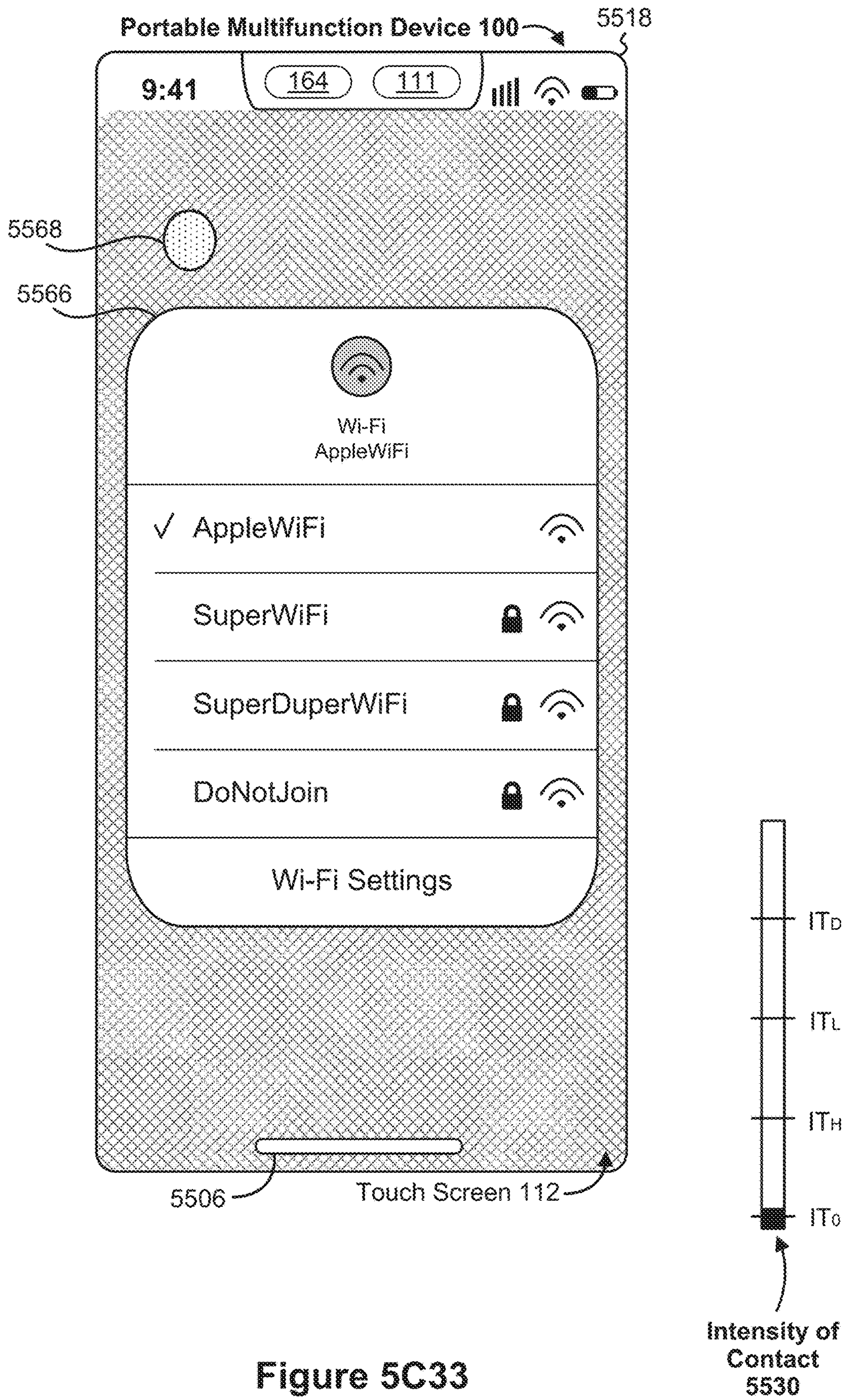
Figure 5C33

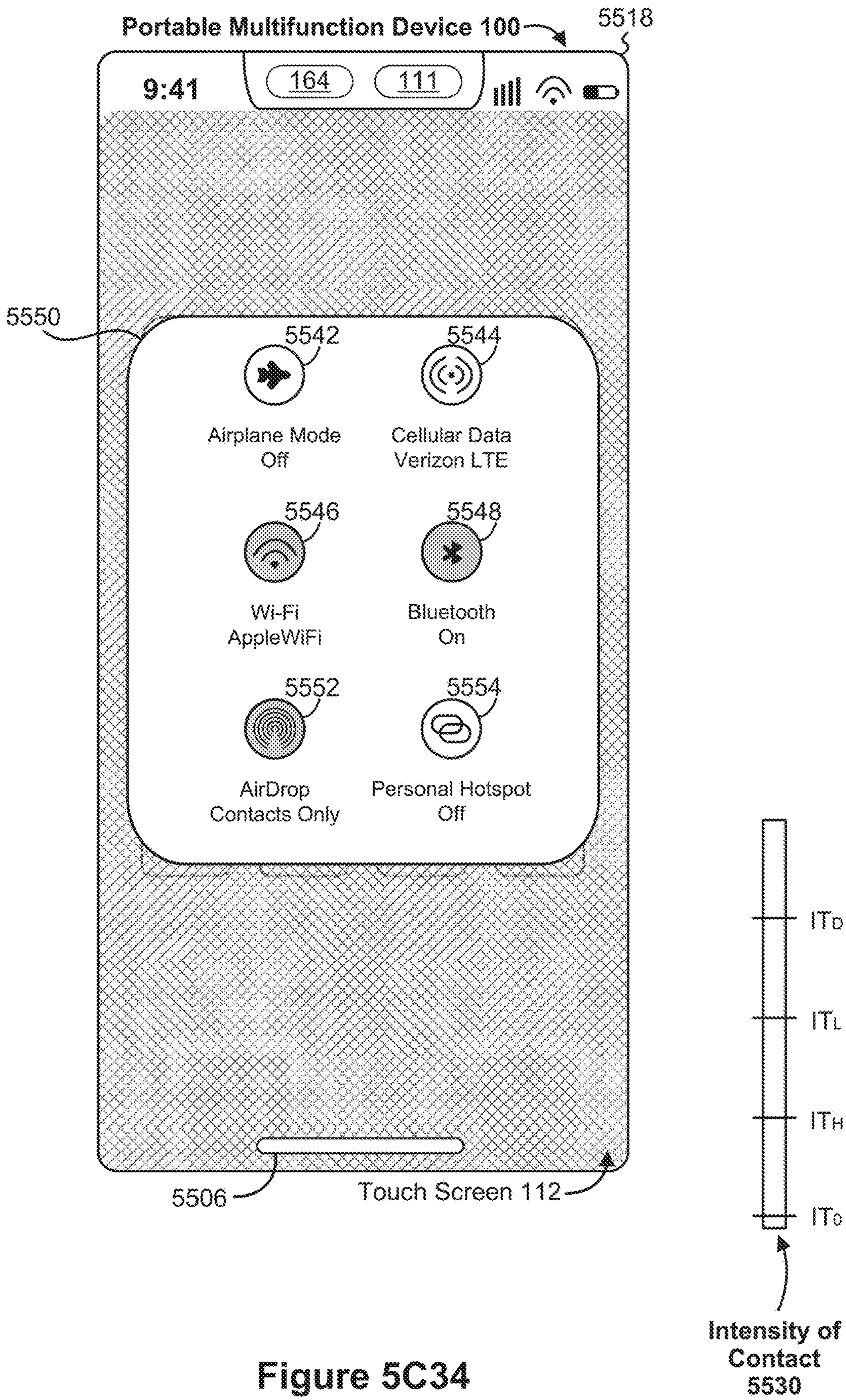
Figure 5C34

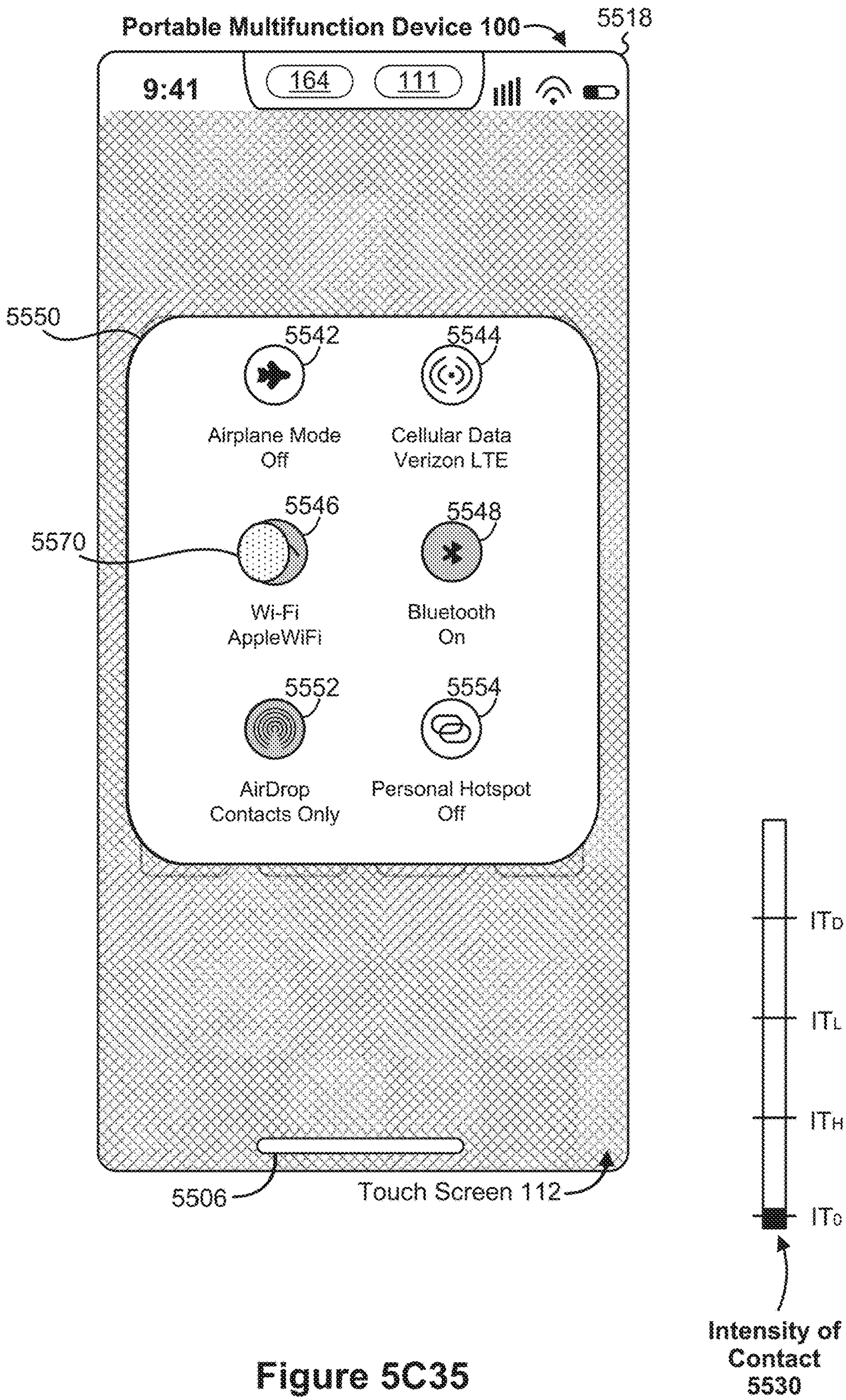
Figure 5C35

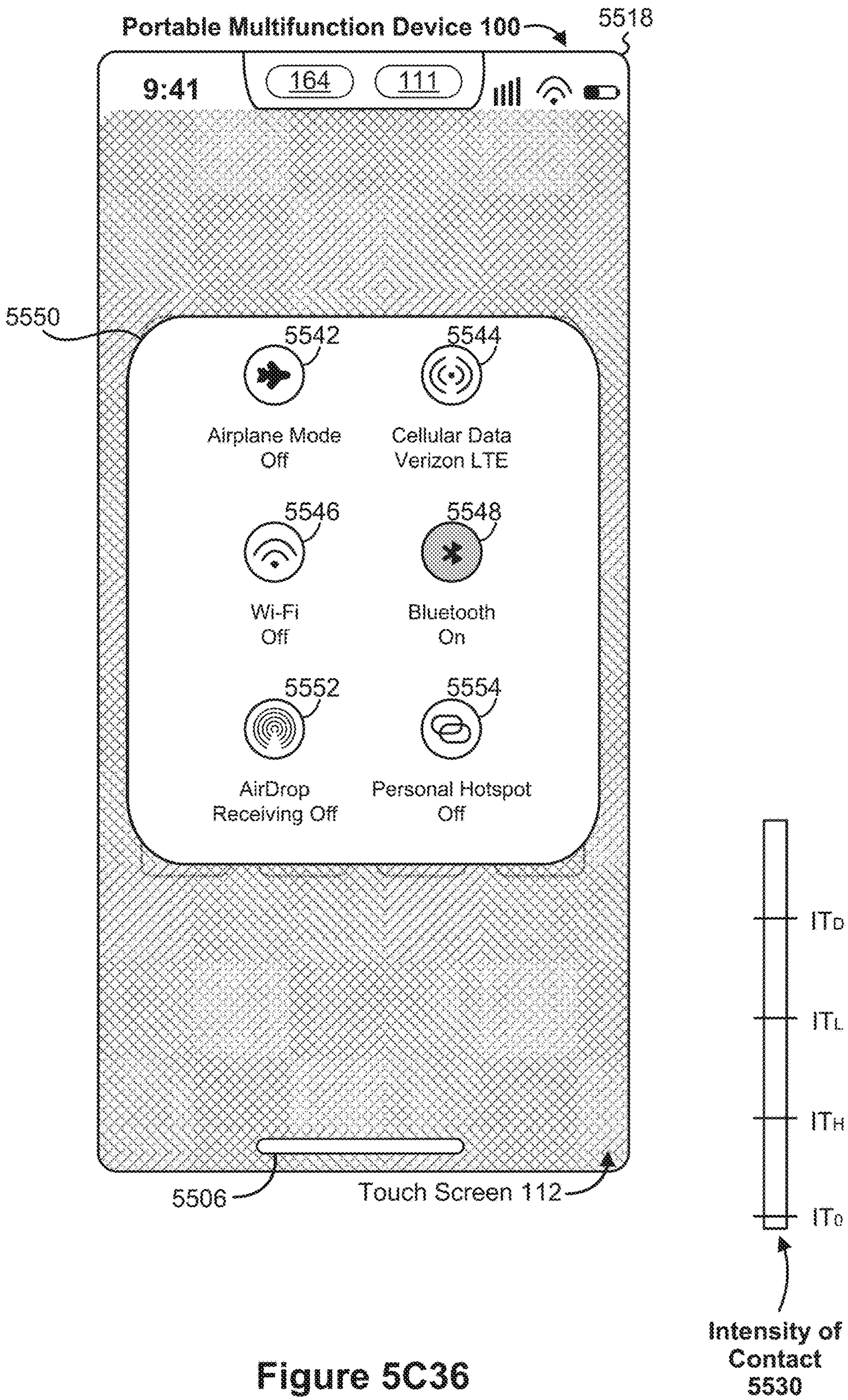
Figure 5C36

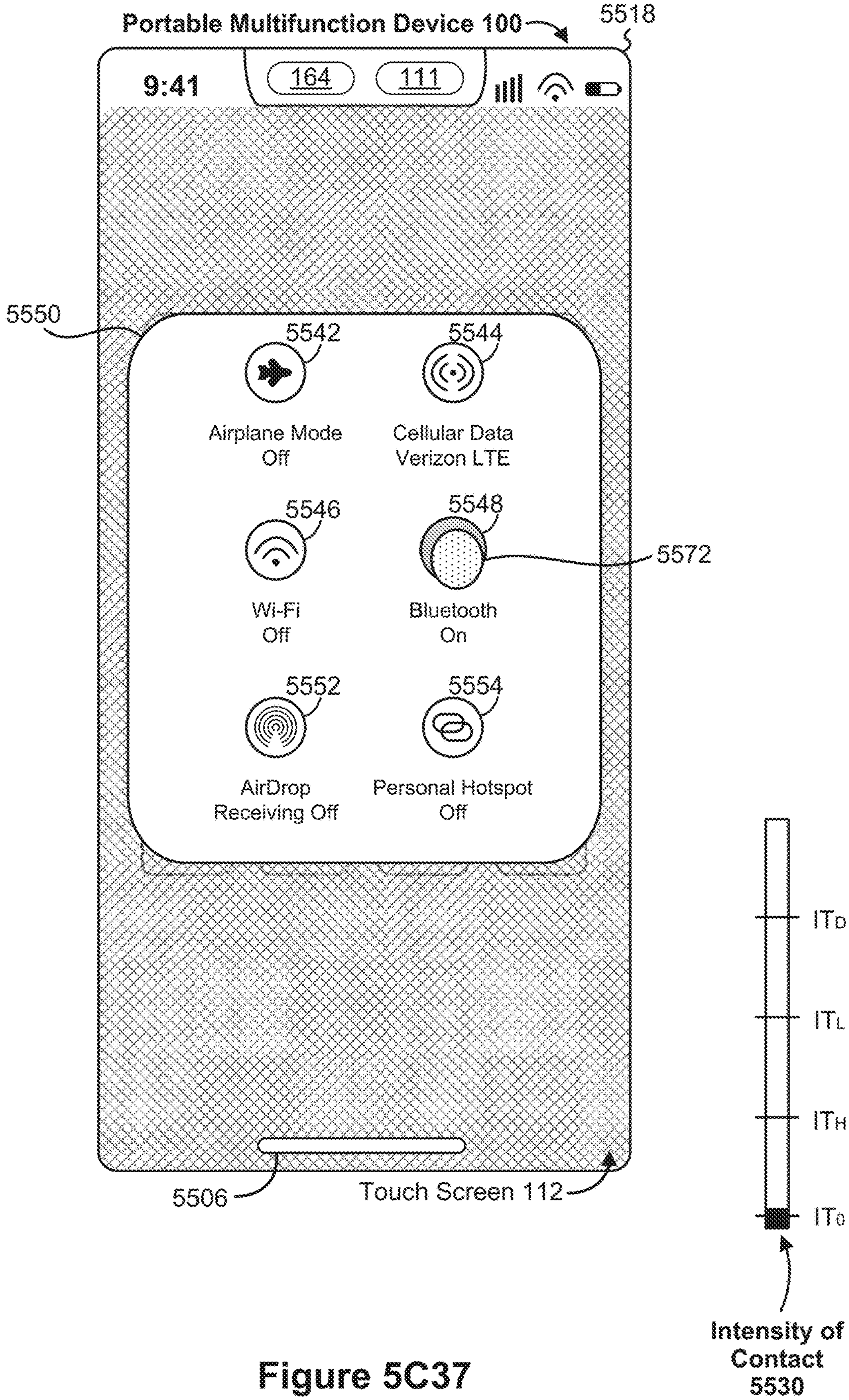
Figure 5C37

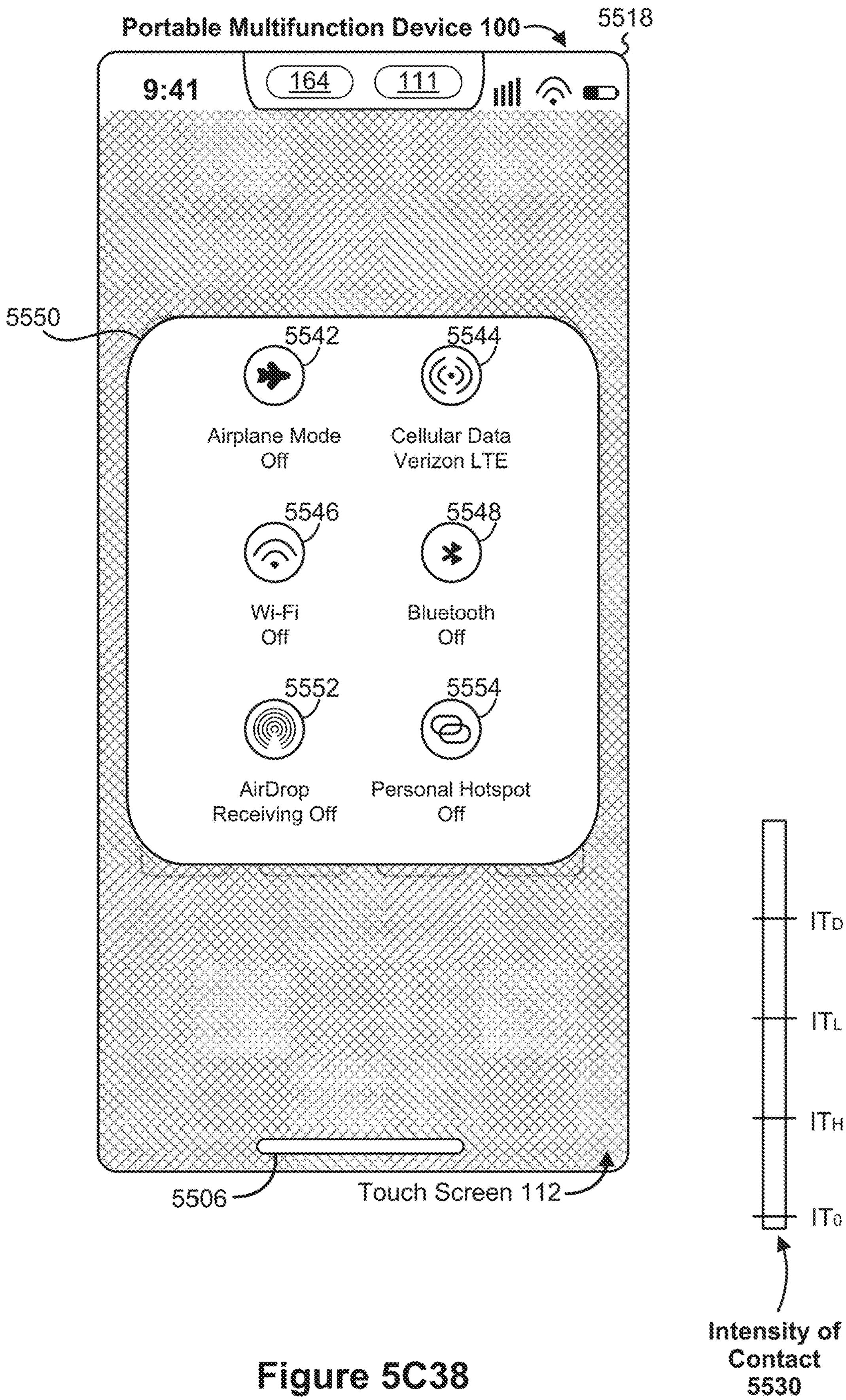
Figure 5C38

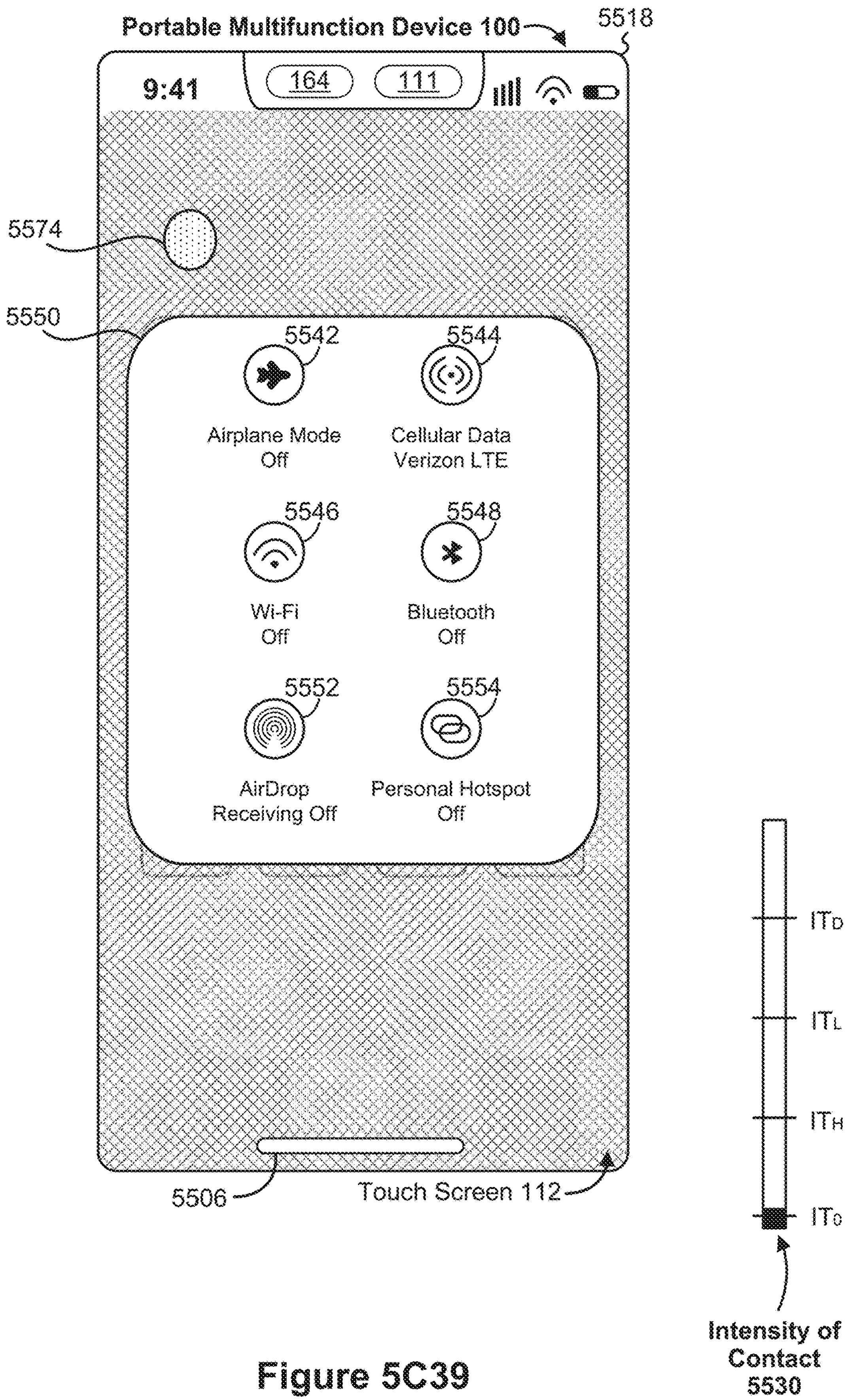
Figure 5C39

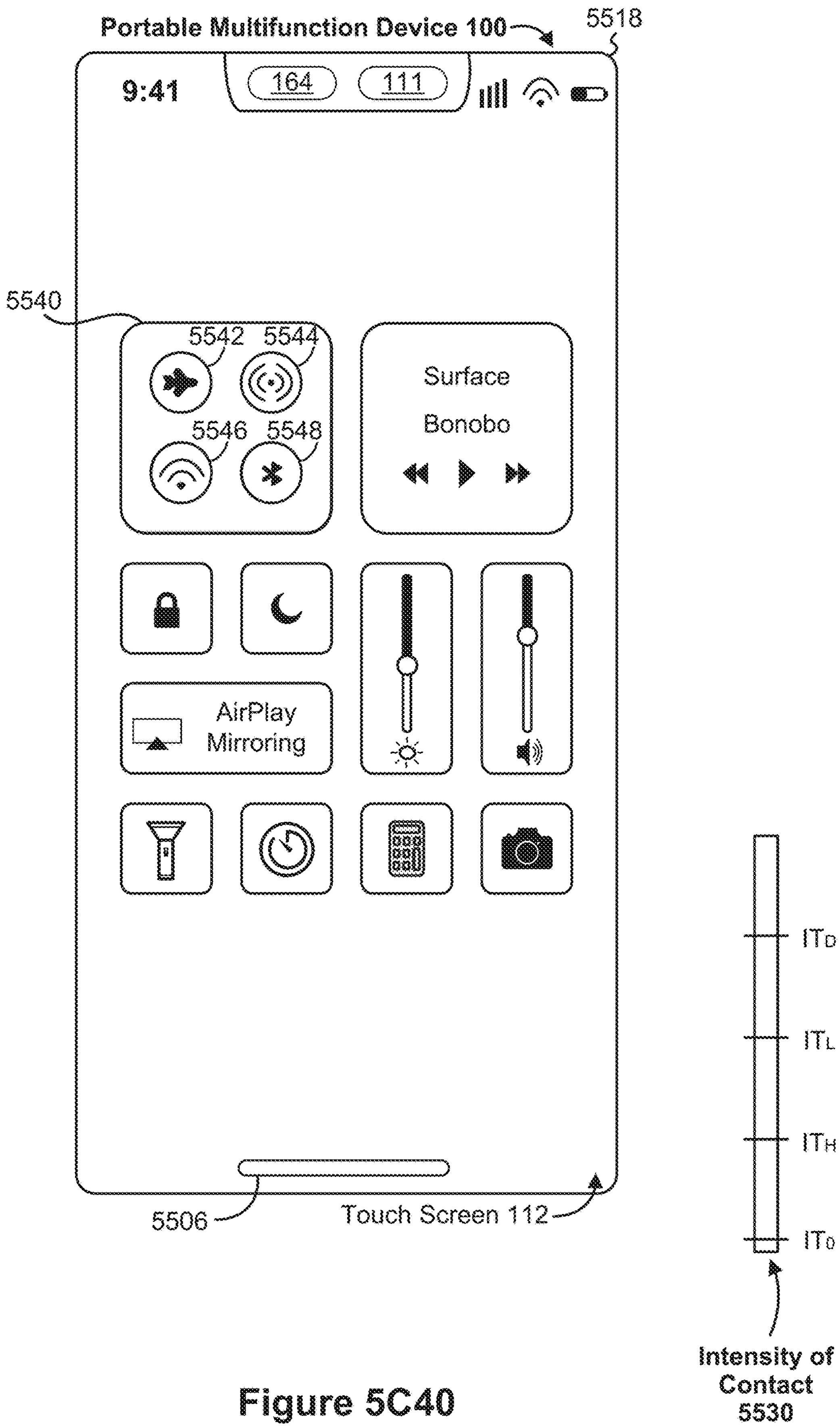
Figure 5C40

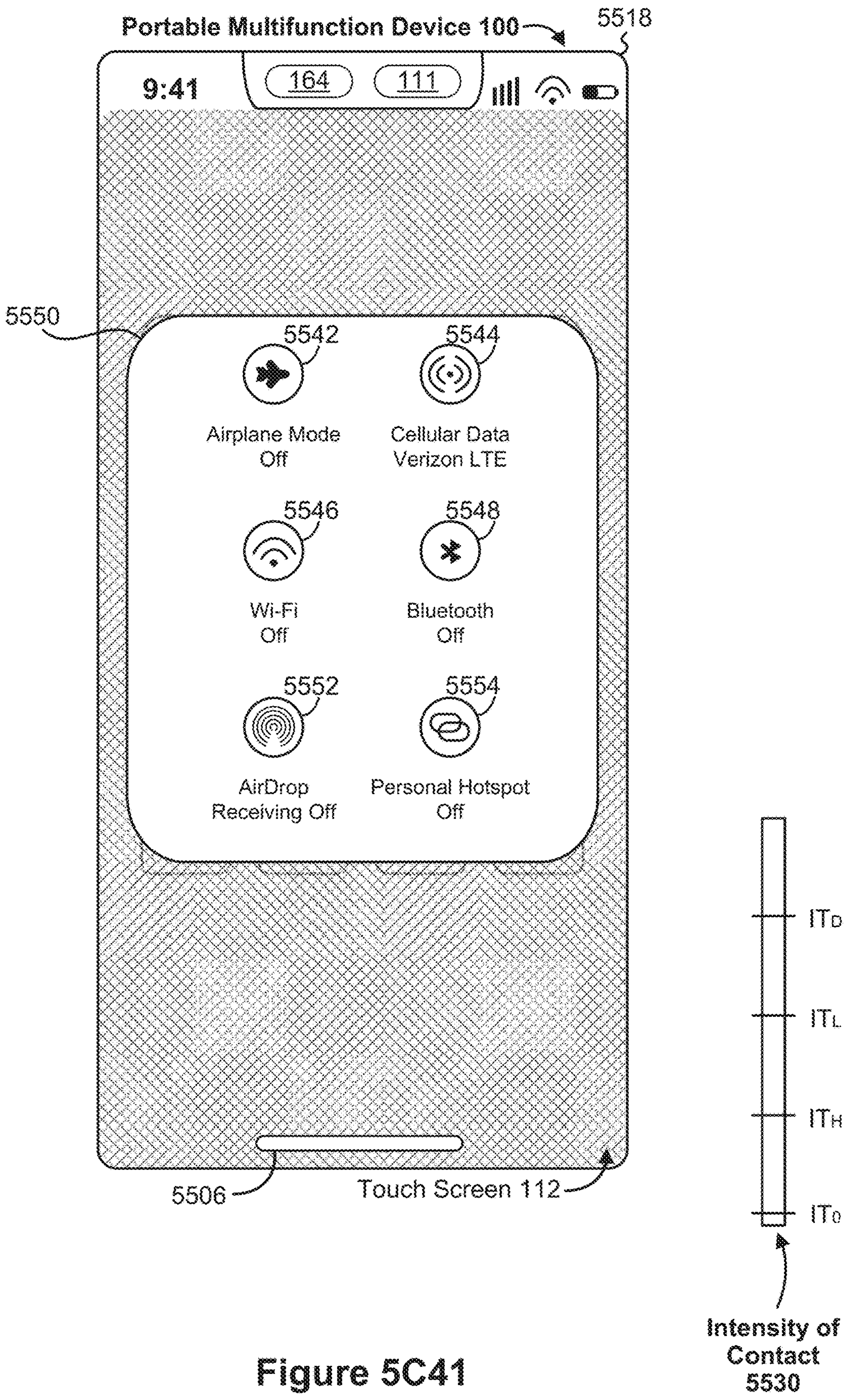
Figure 5C41

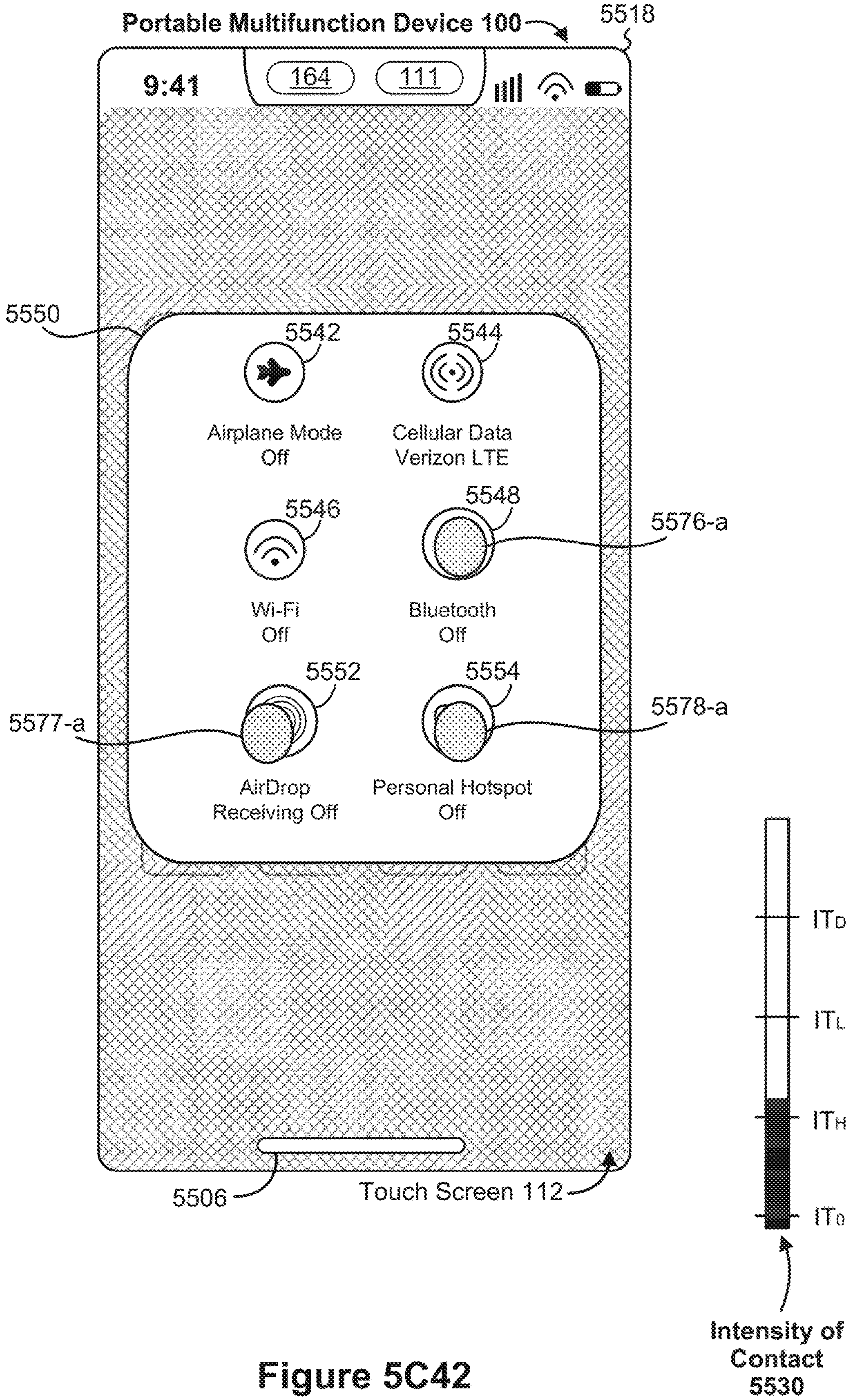
Figure 5C42

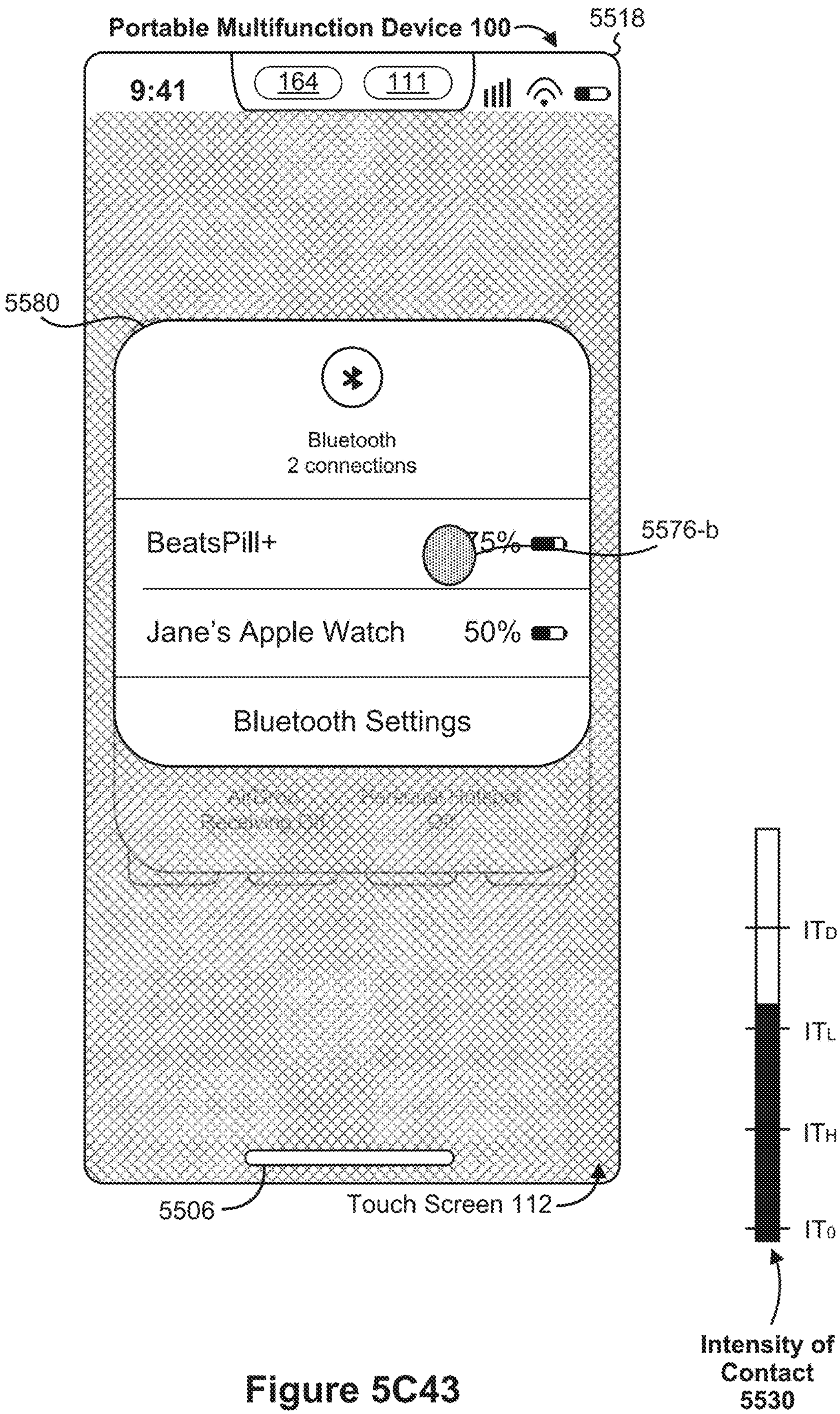
Figure 5C43

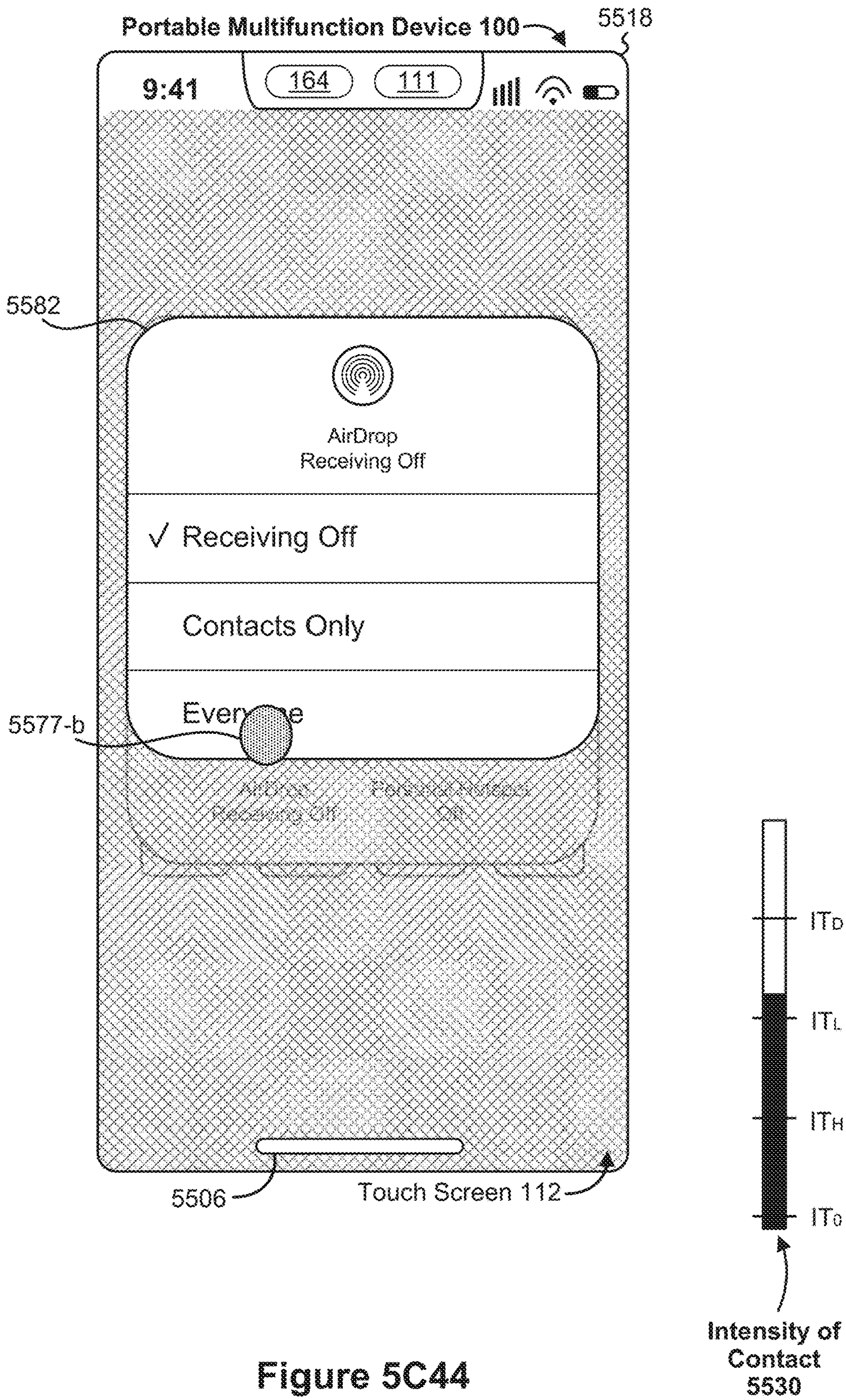
Figure 5C44

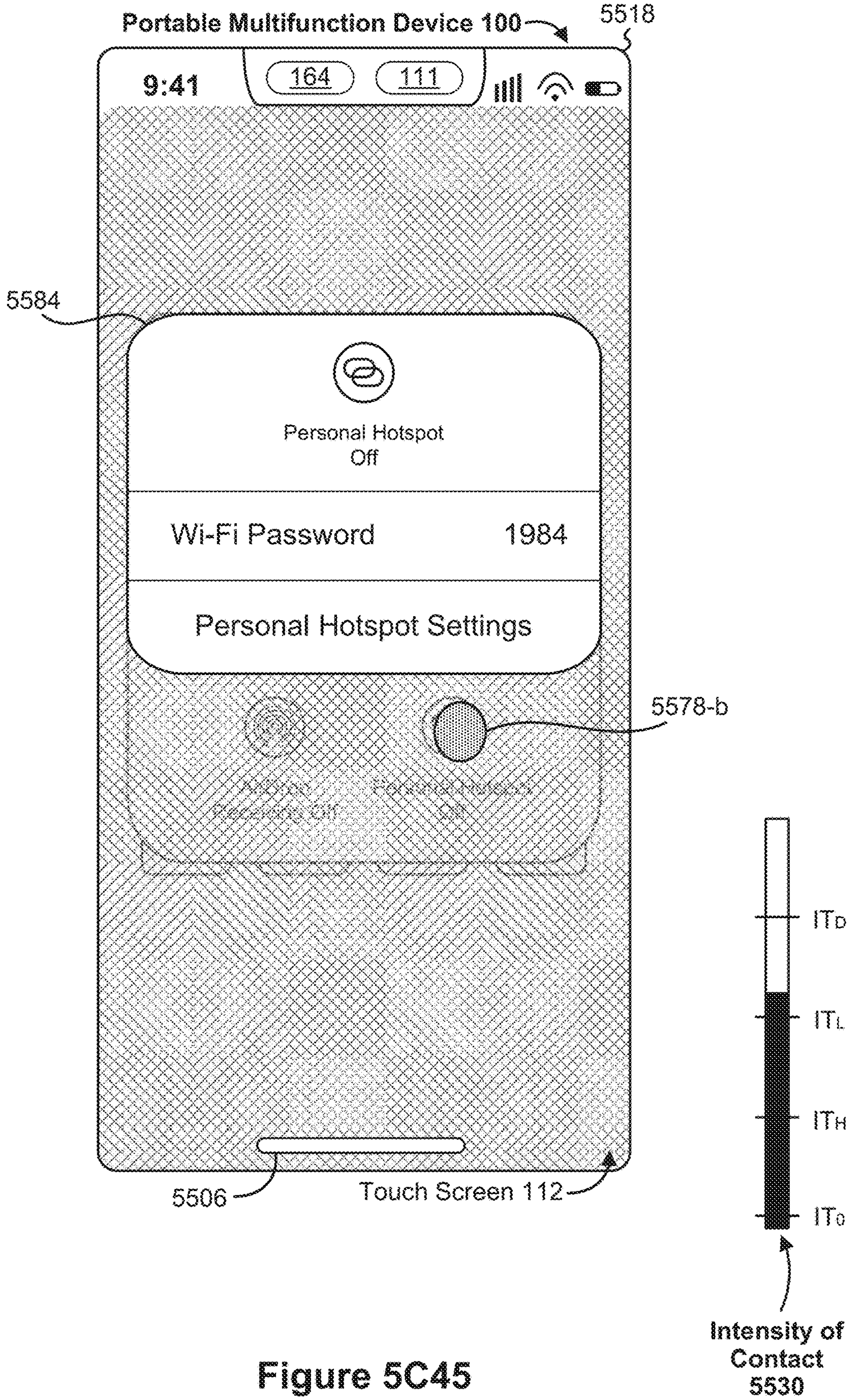
Figure 5C45

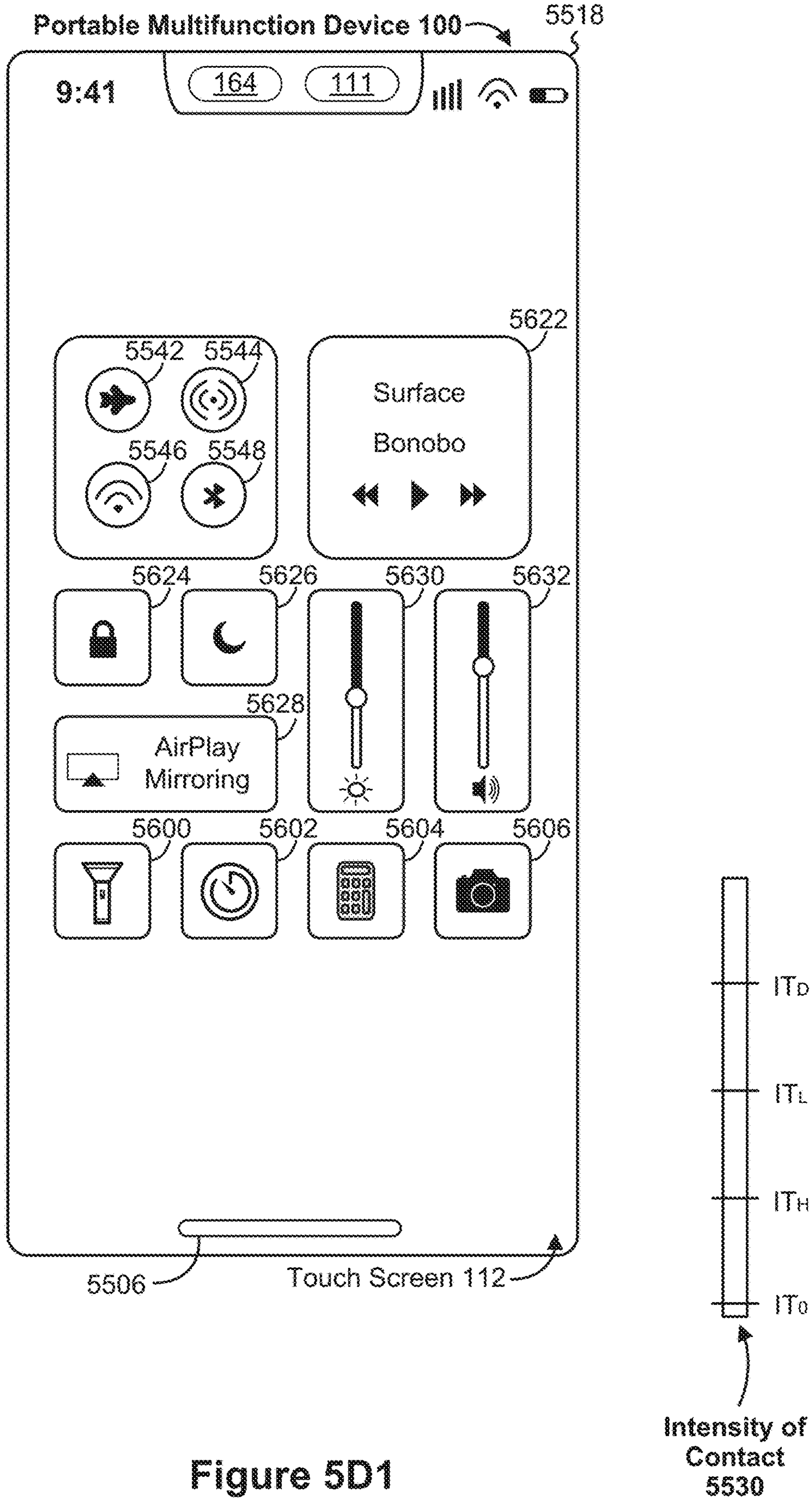
Figure 5D1

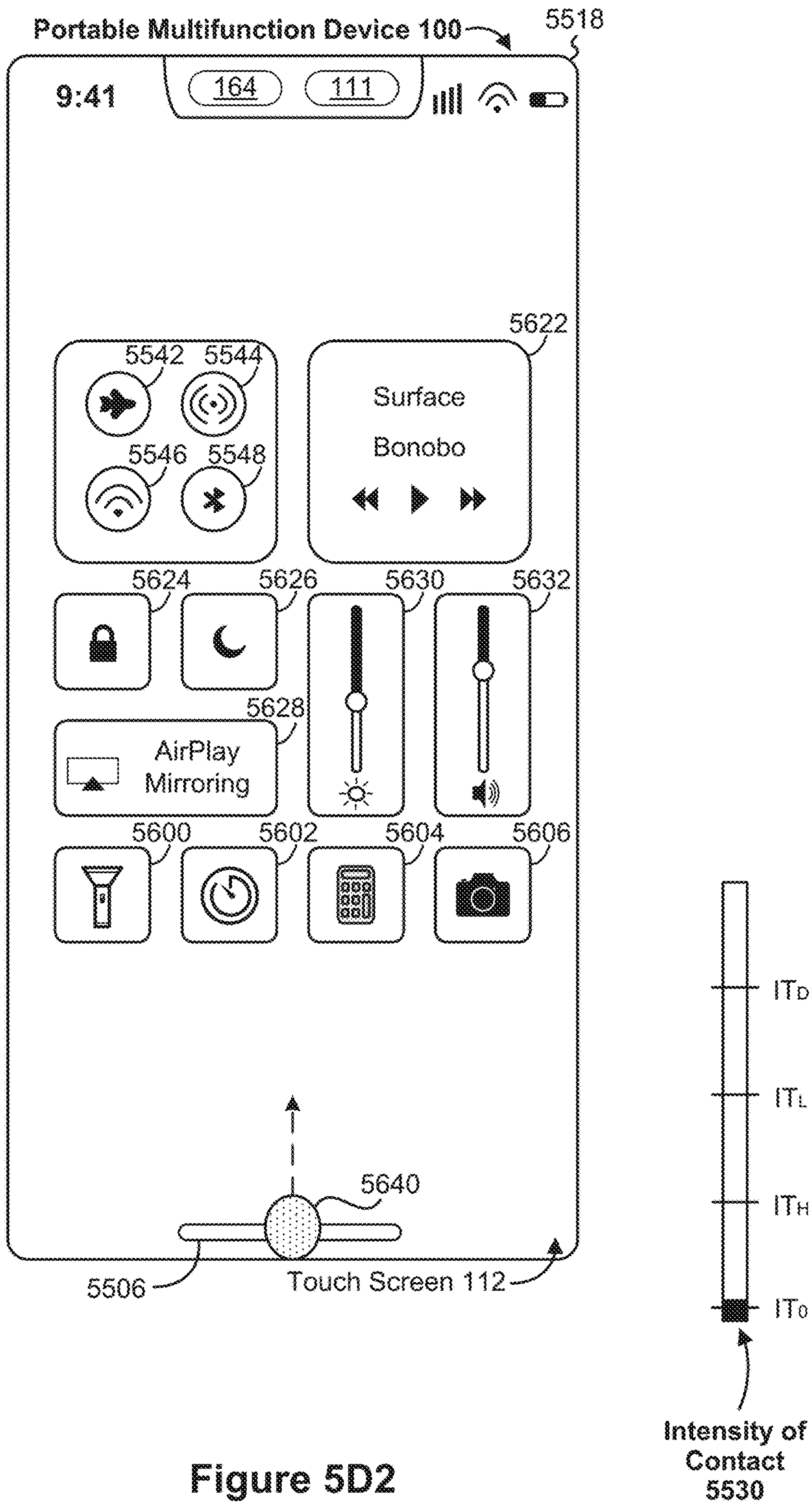
Figure 5D2

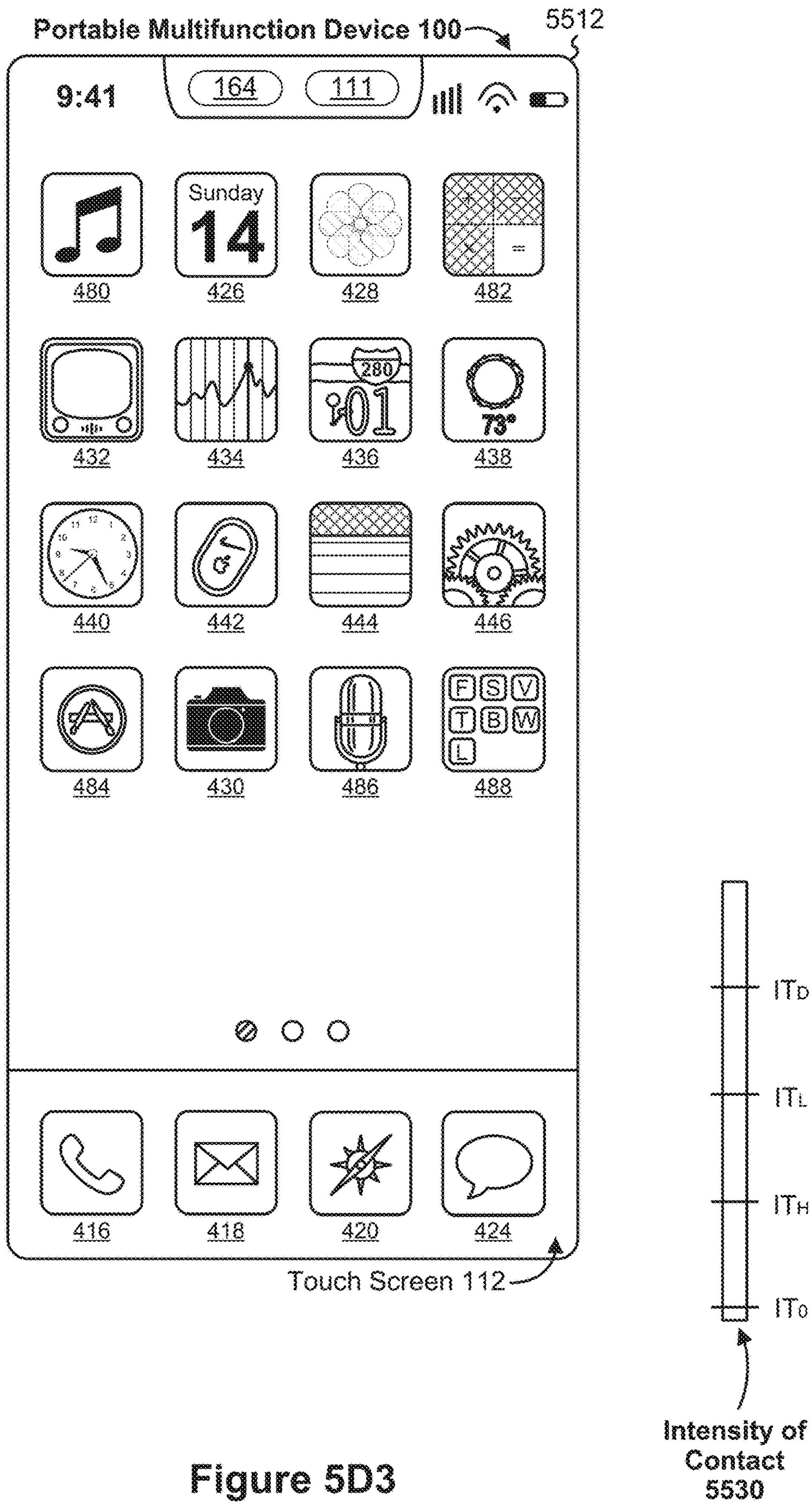
Figure 5D3

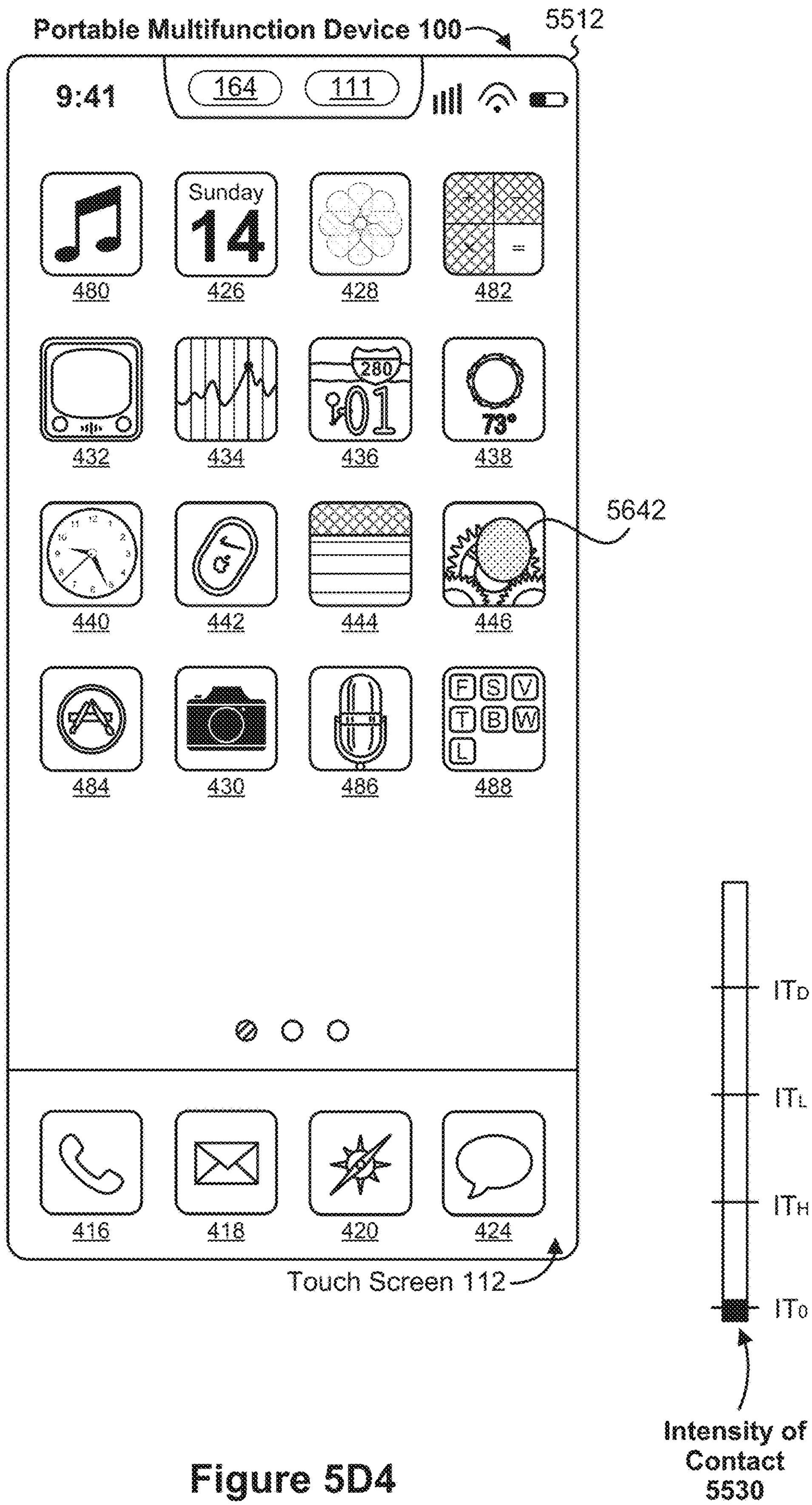
Figure 5D4

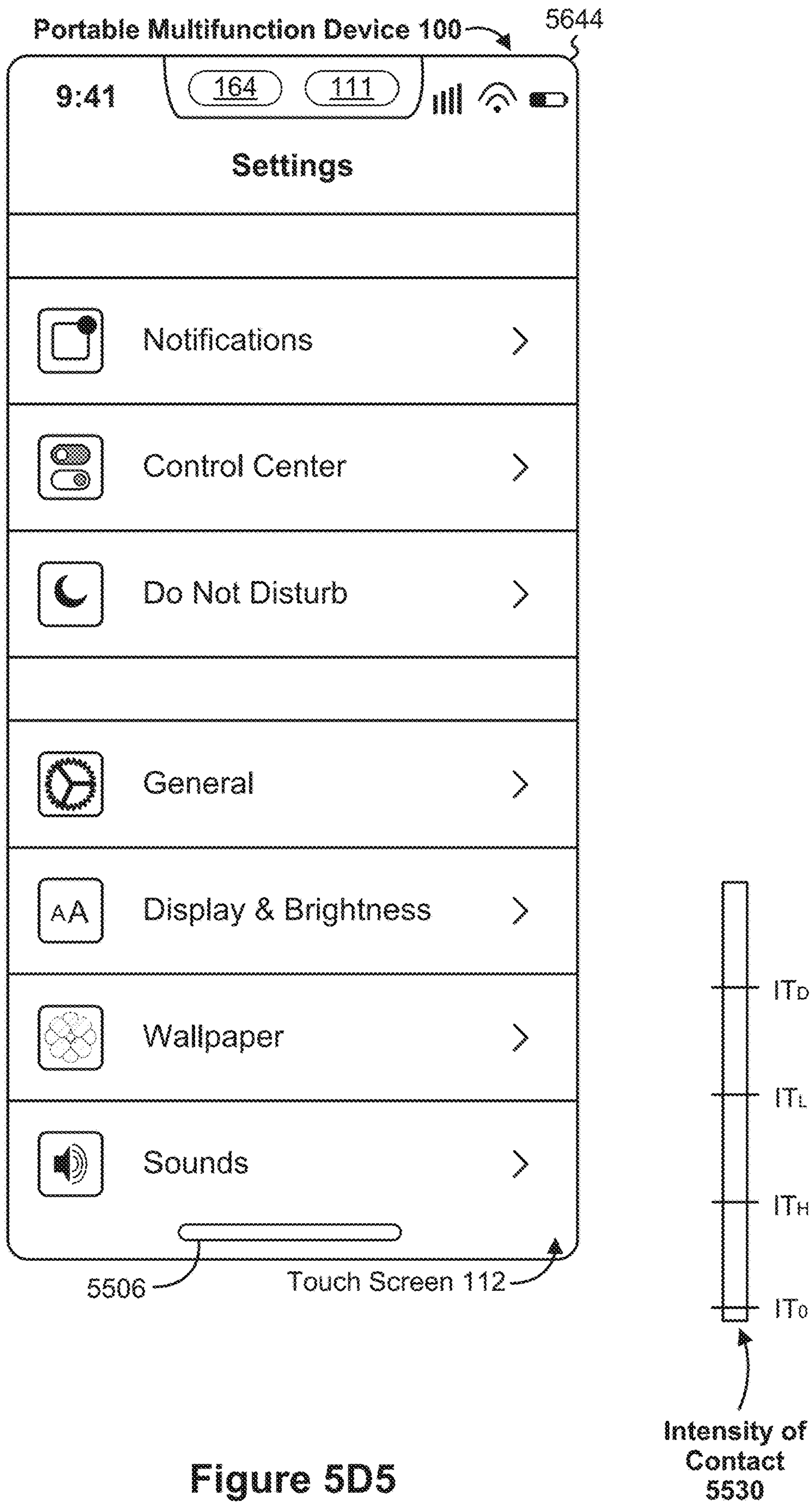
Figure 5D5

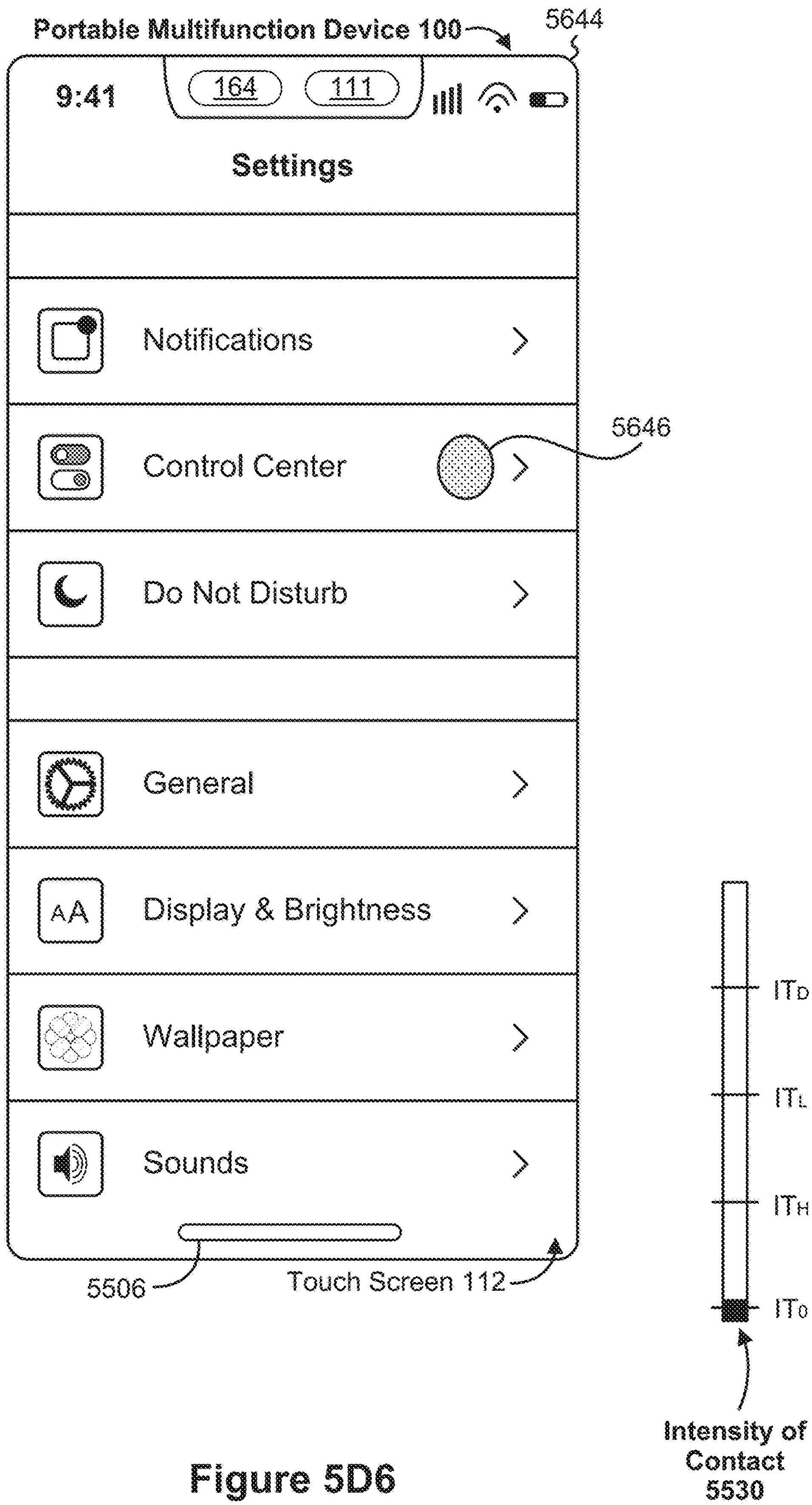
Figure 5D6

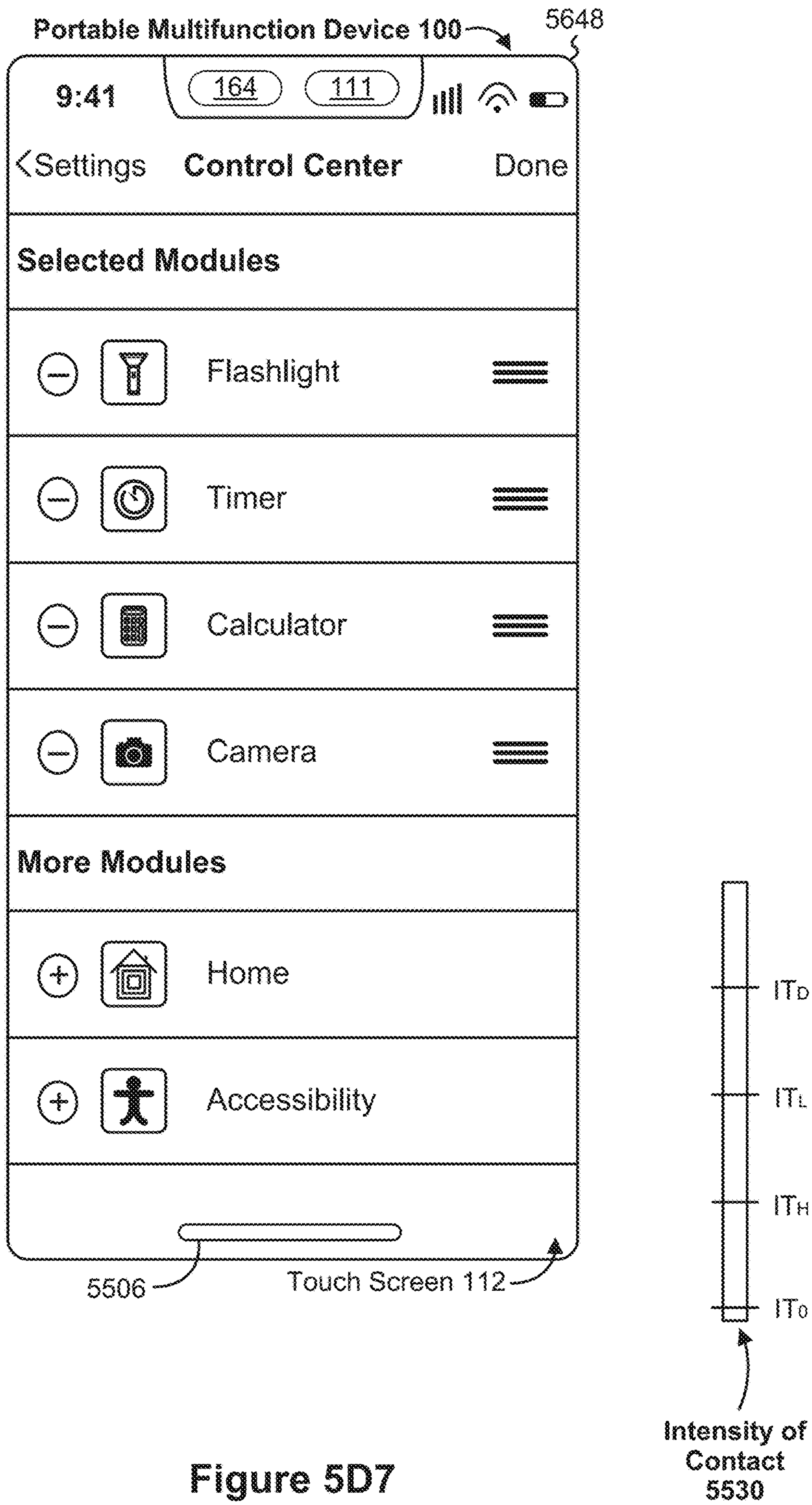
Figure 5D7

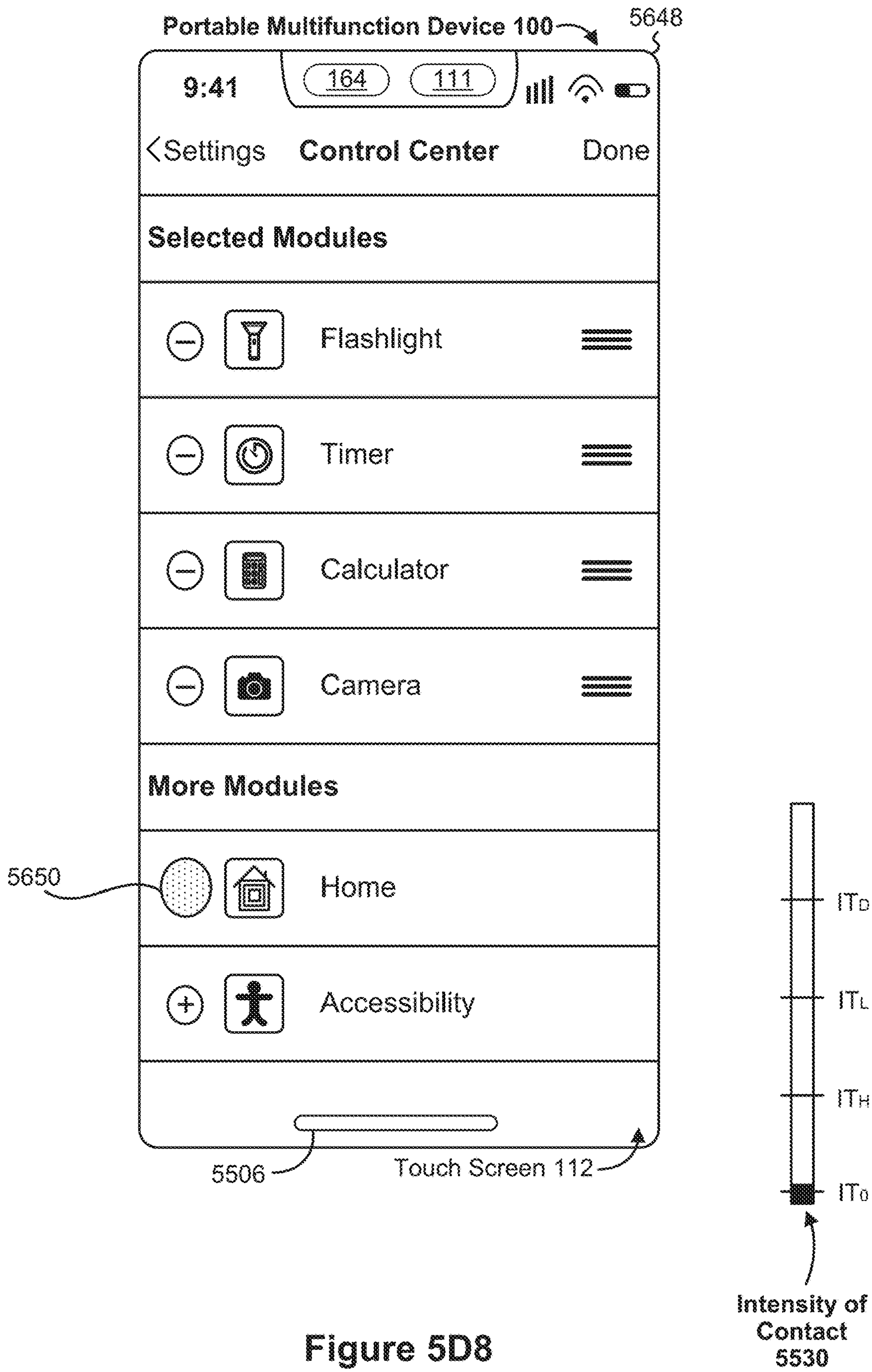
Figure 5D8

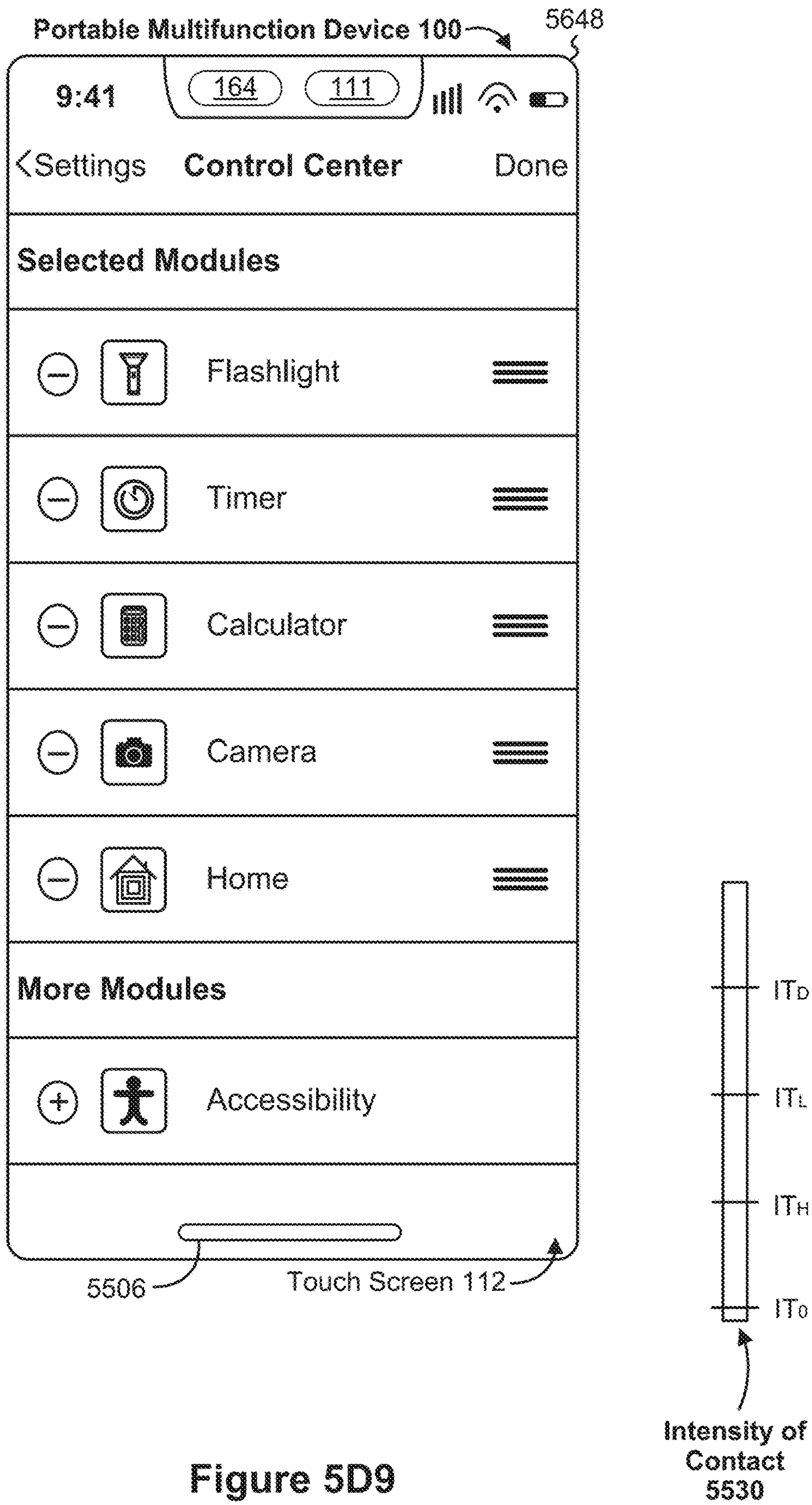
Figure 5D9

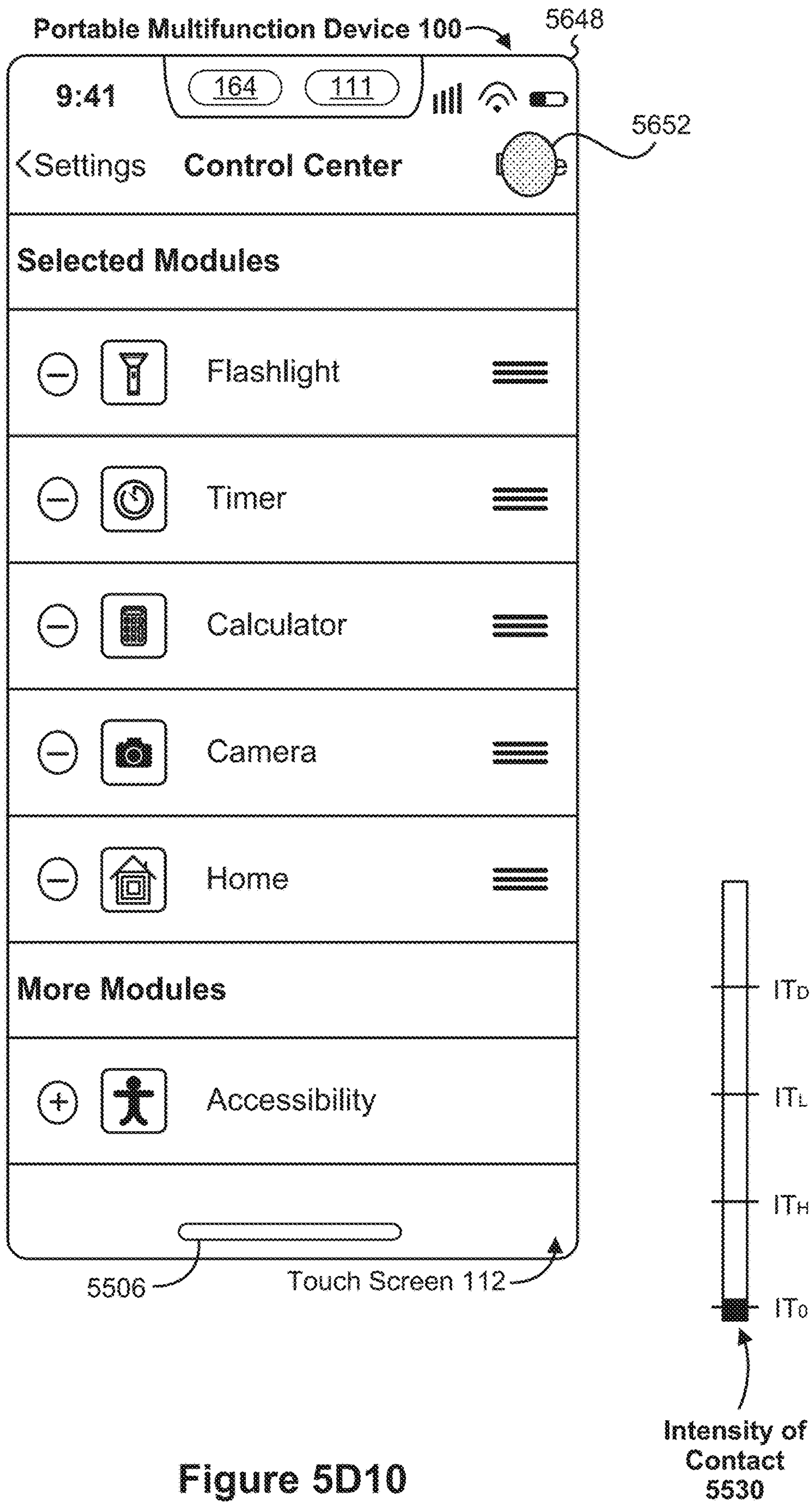
Figure 5D10

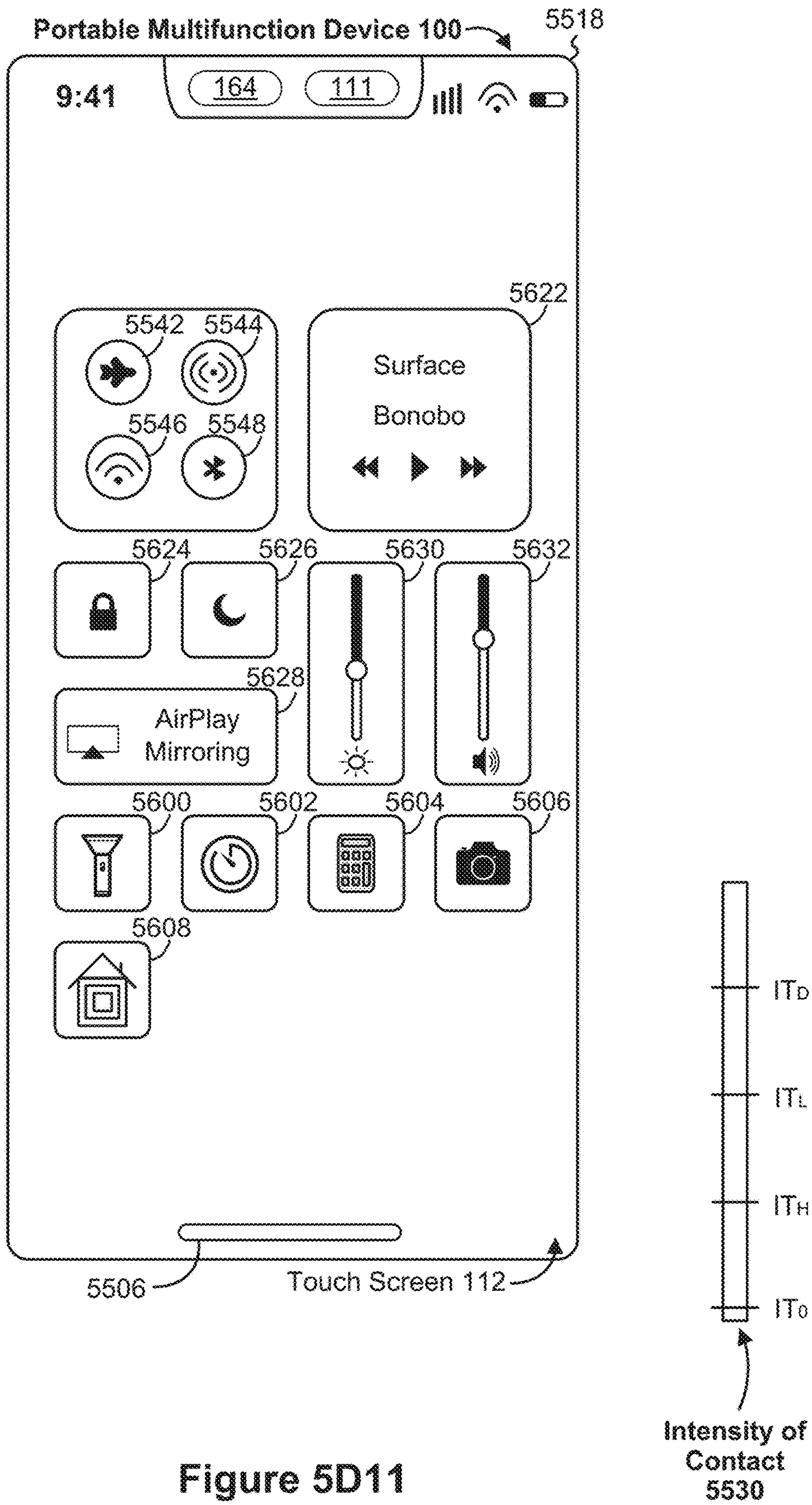
Figure 5D11

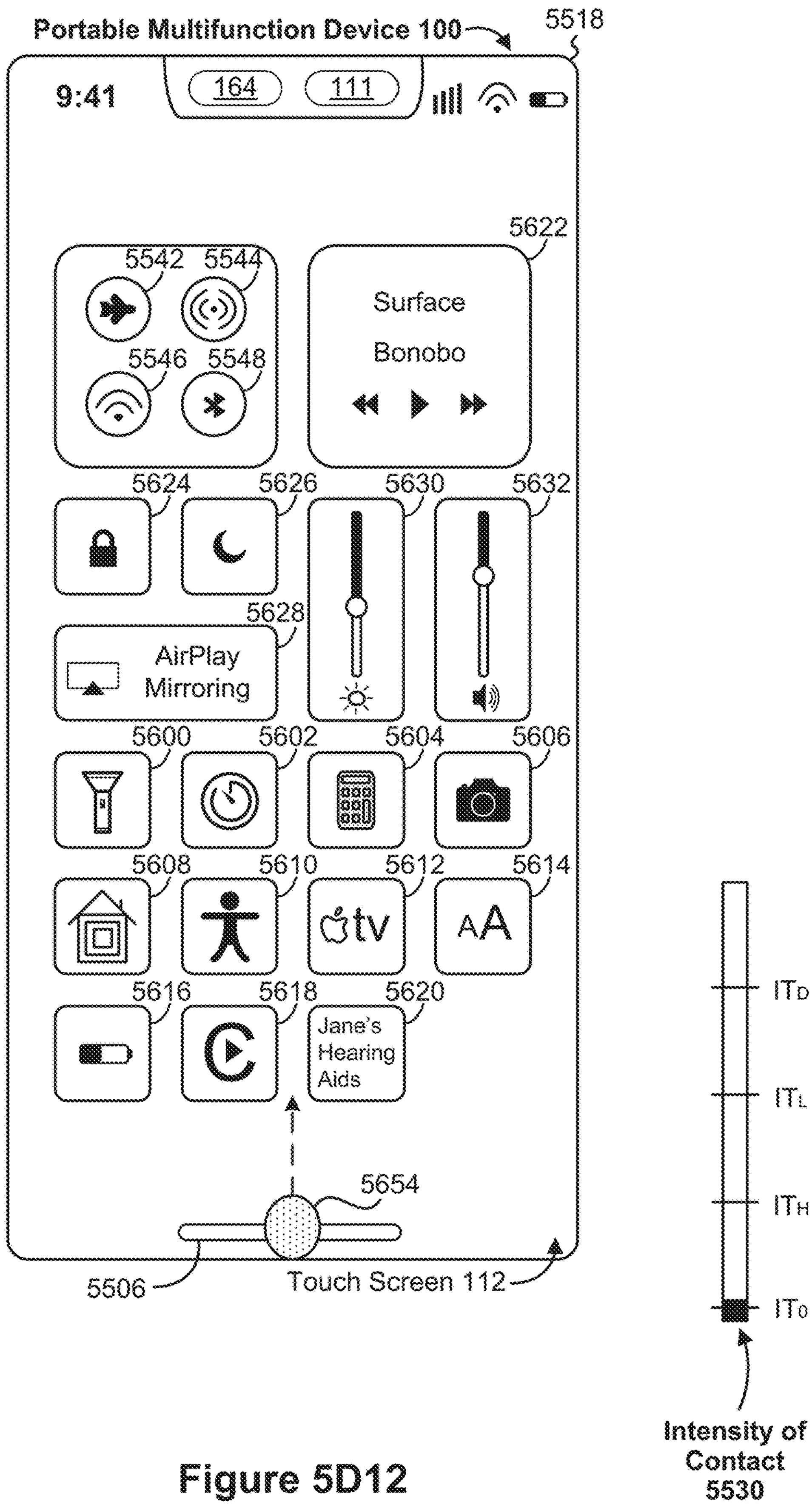
Figure 5D12

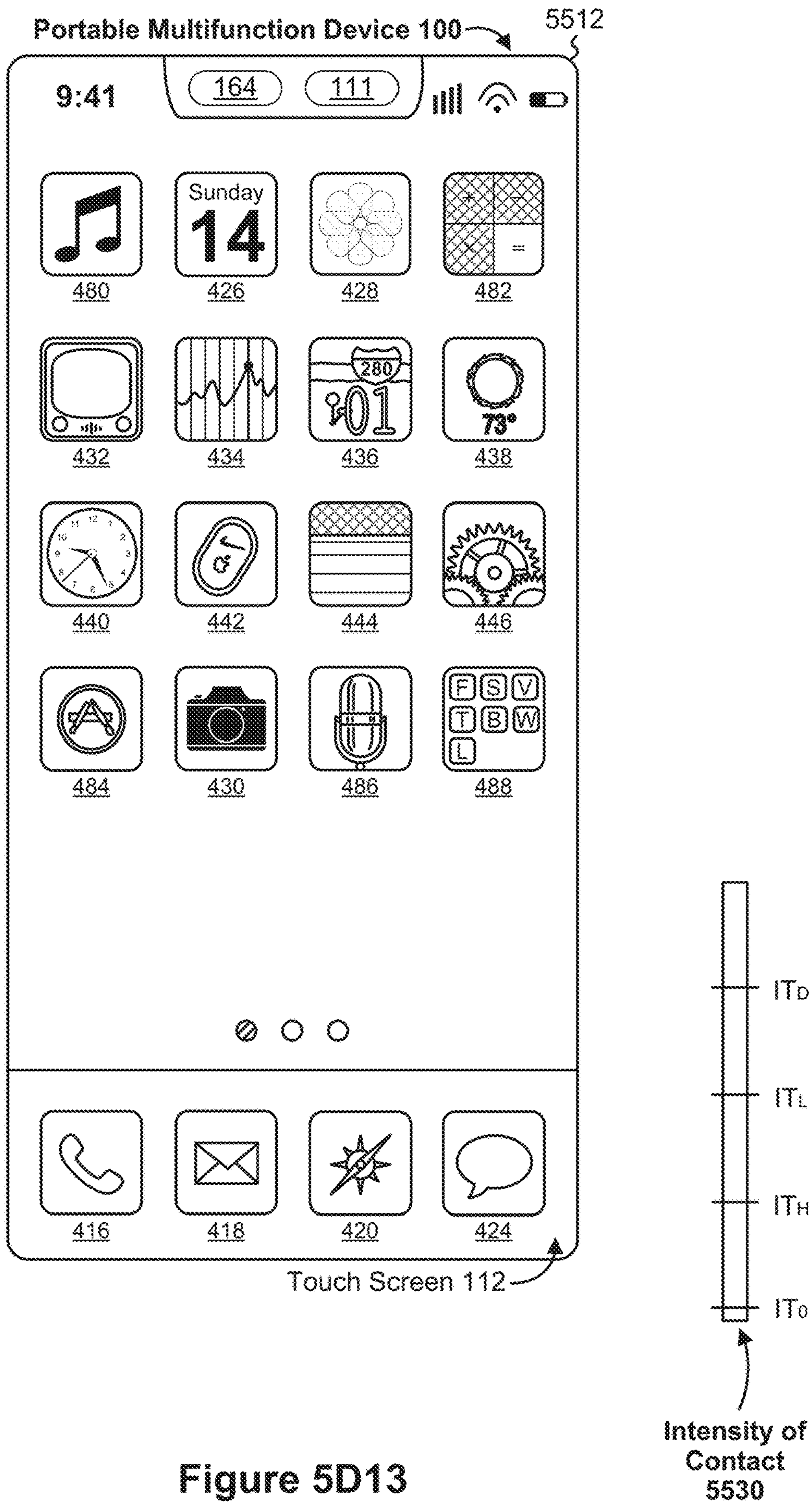
Figure 5D13

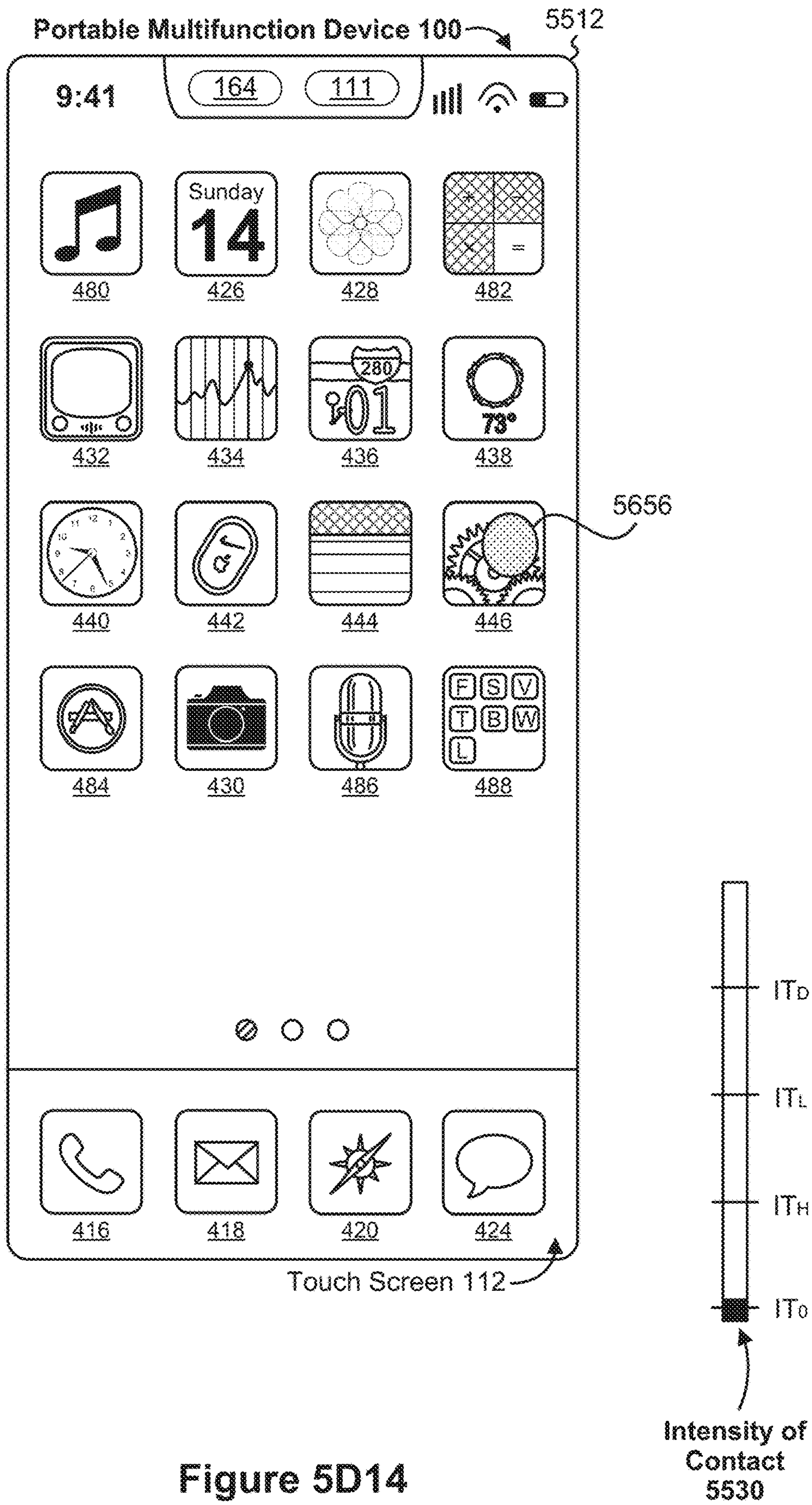
Figure 5D14

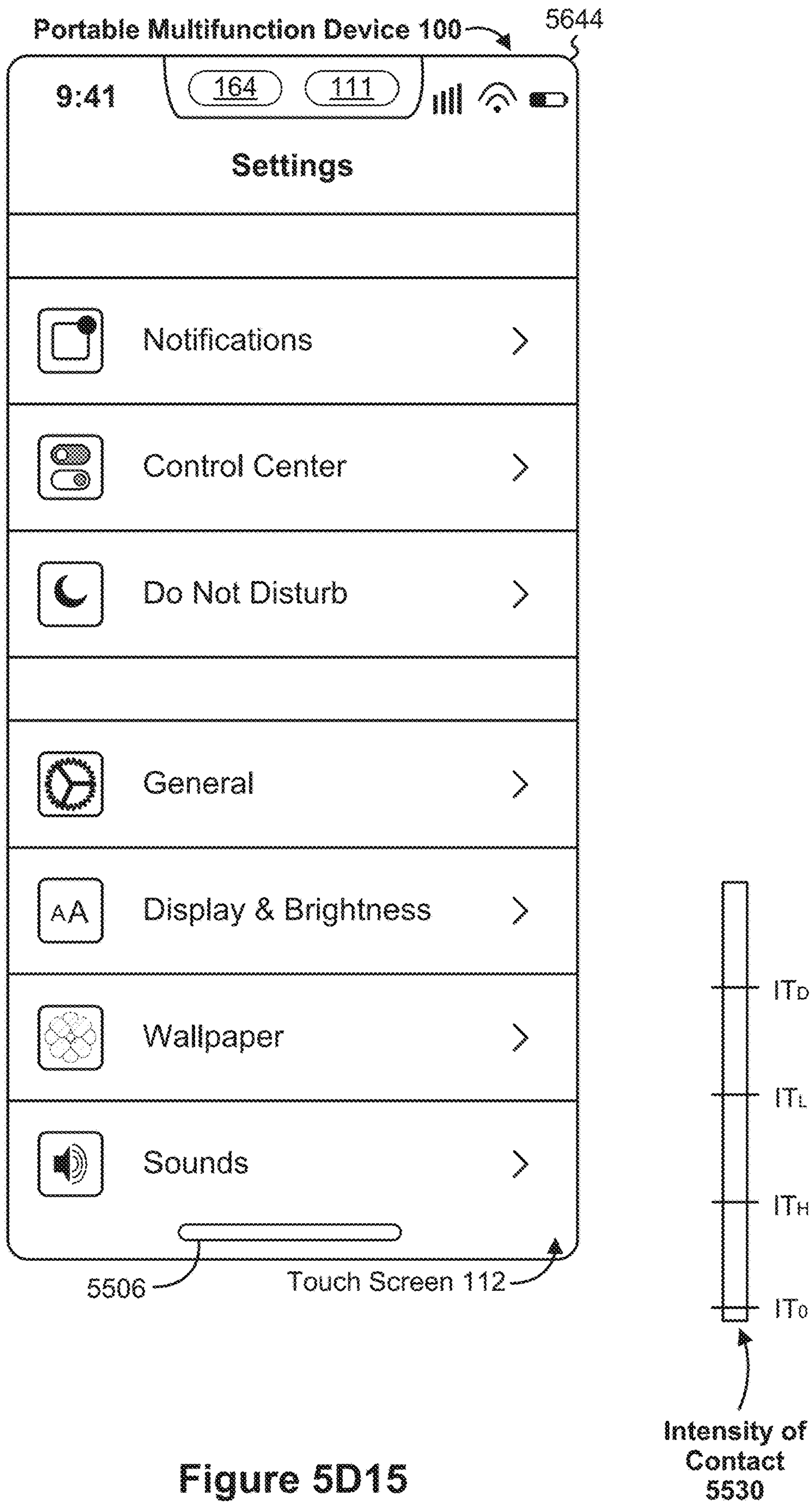
Figure 5D15

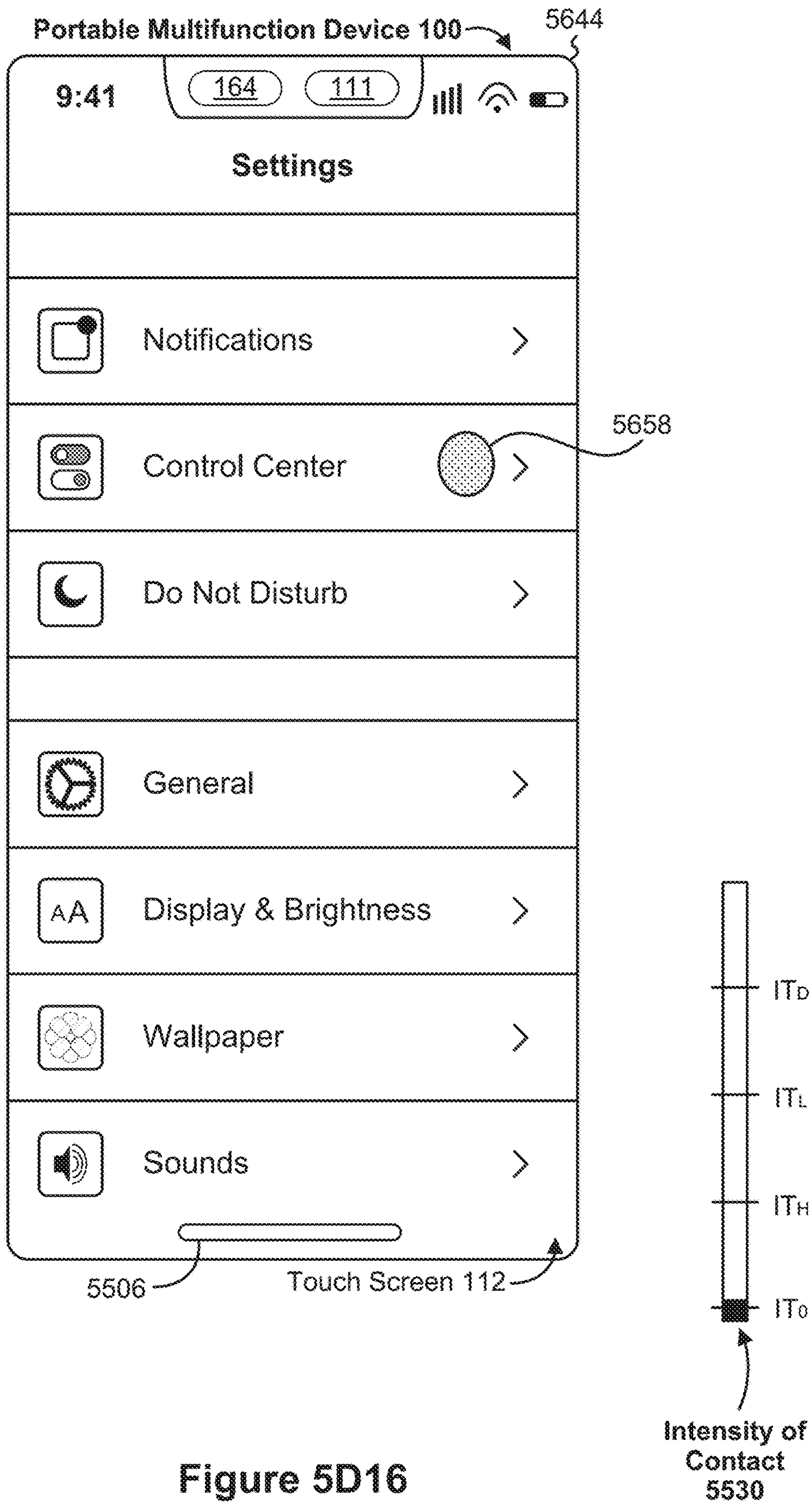
Figure 5D16

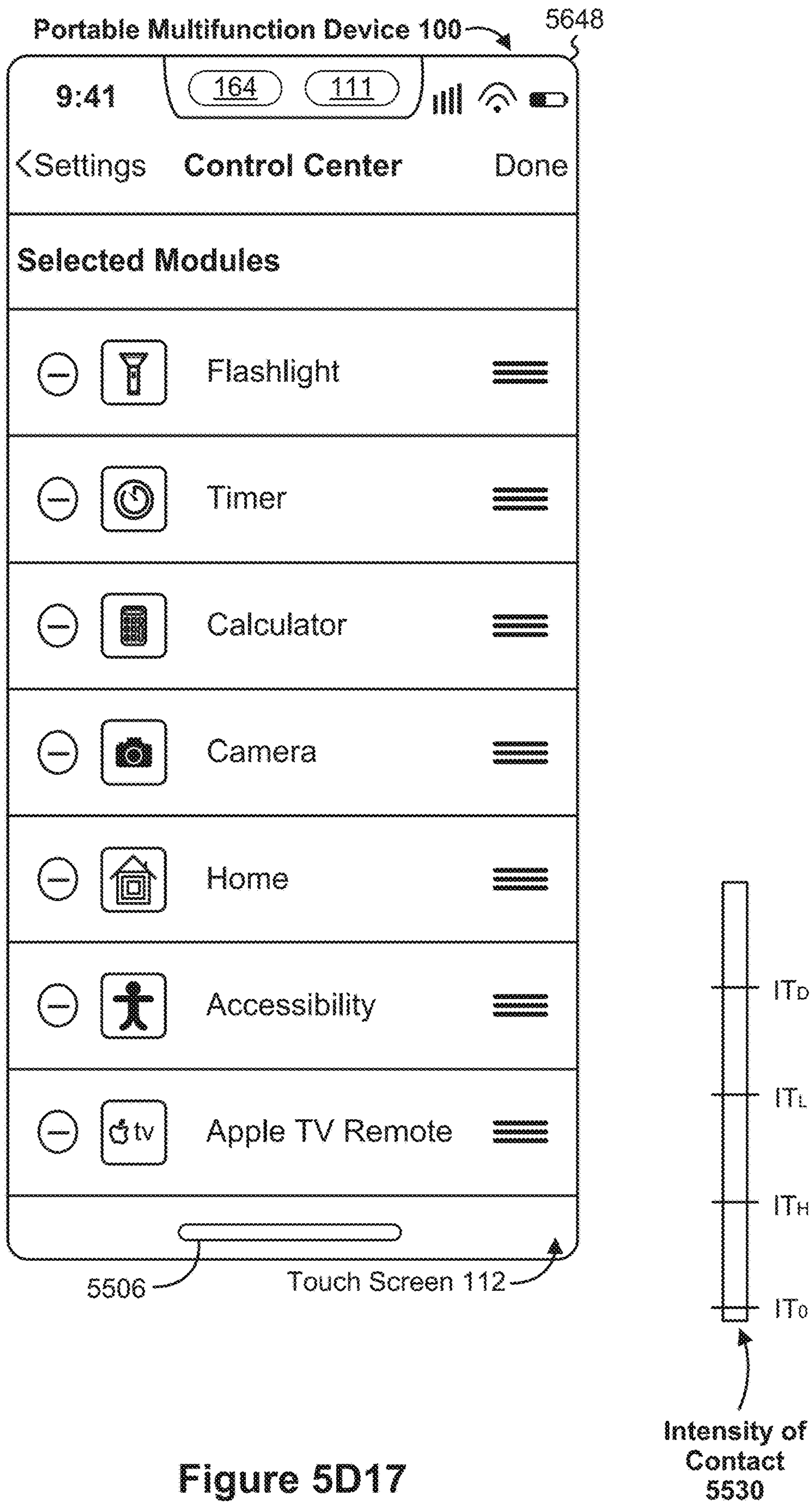
Figure 5D17

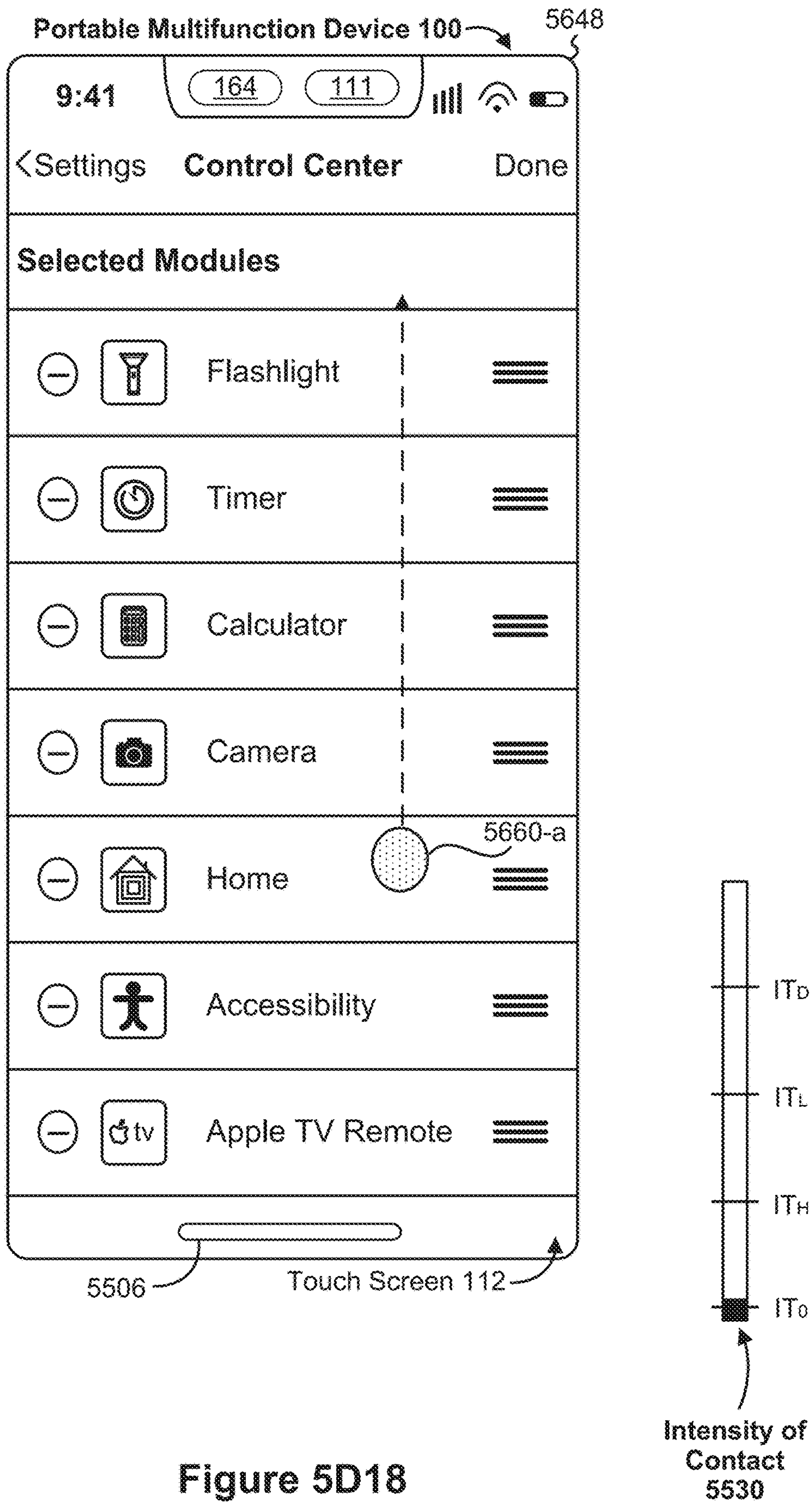
Figure 5D18

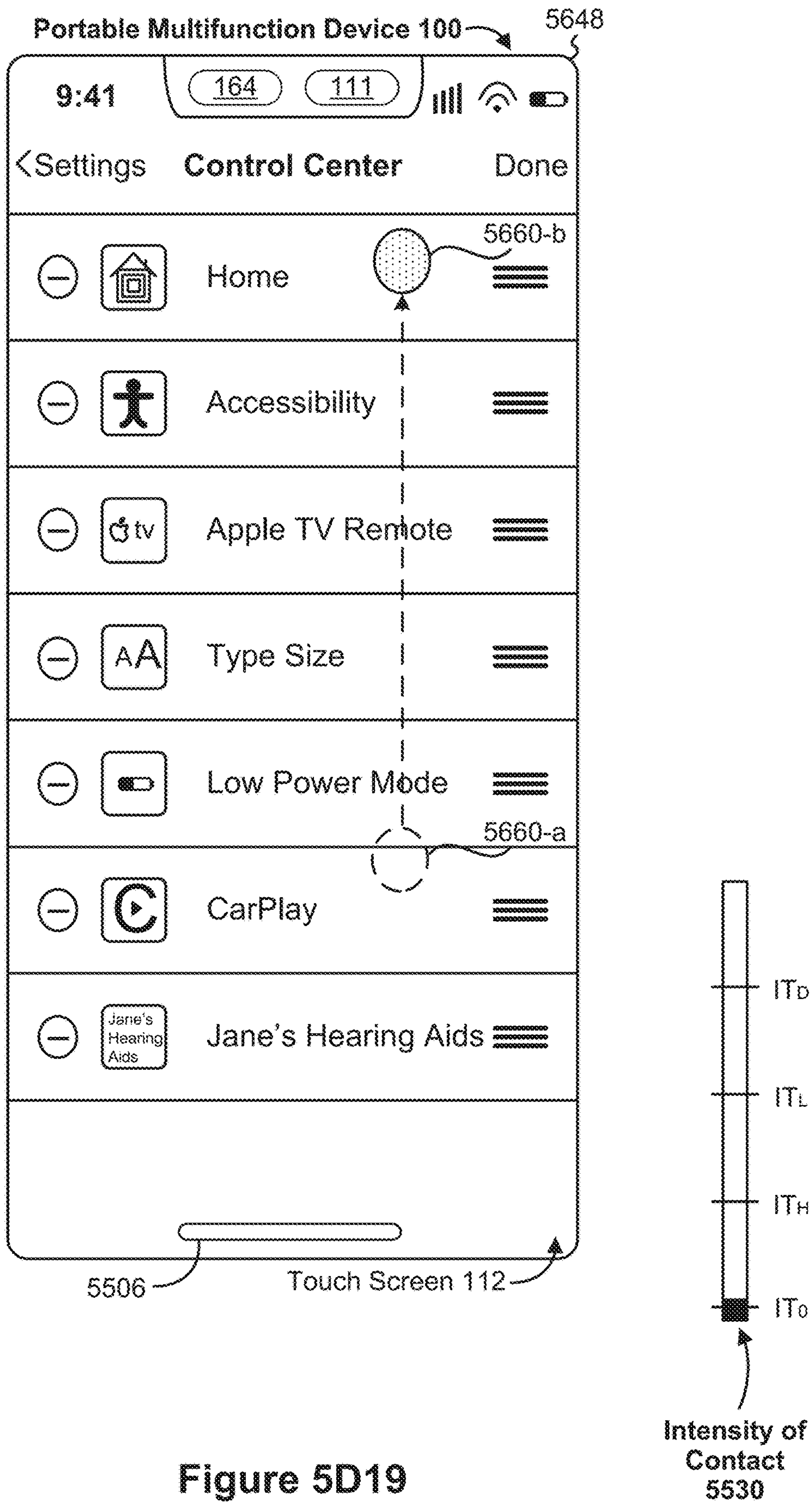
Figure 5D19

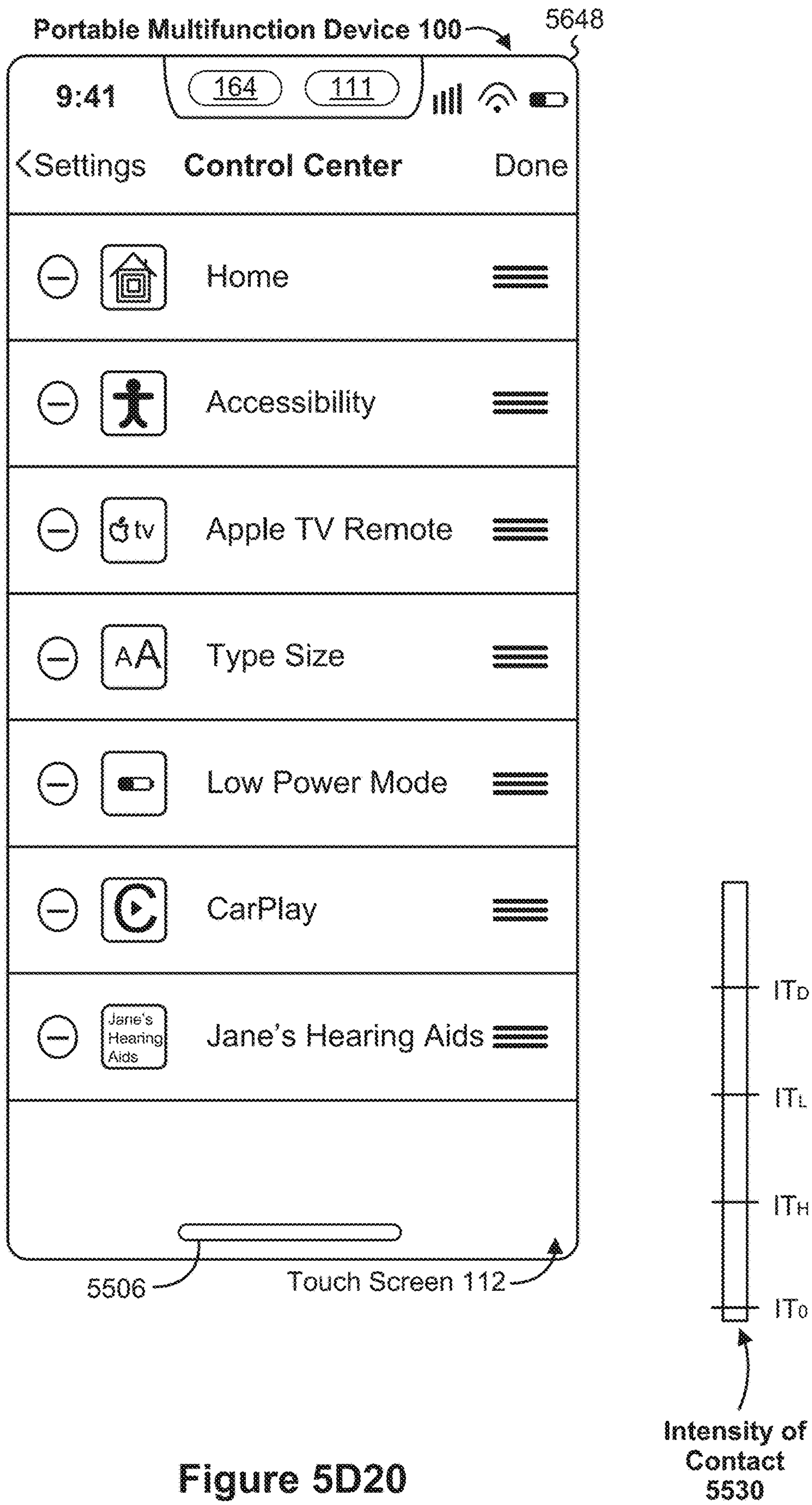
Figure 5D20

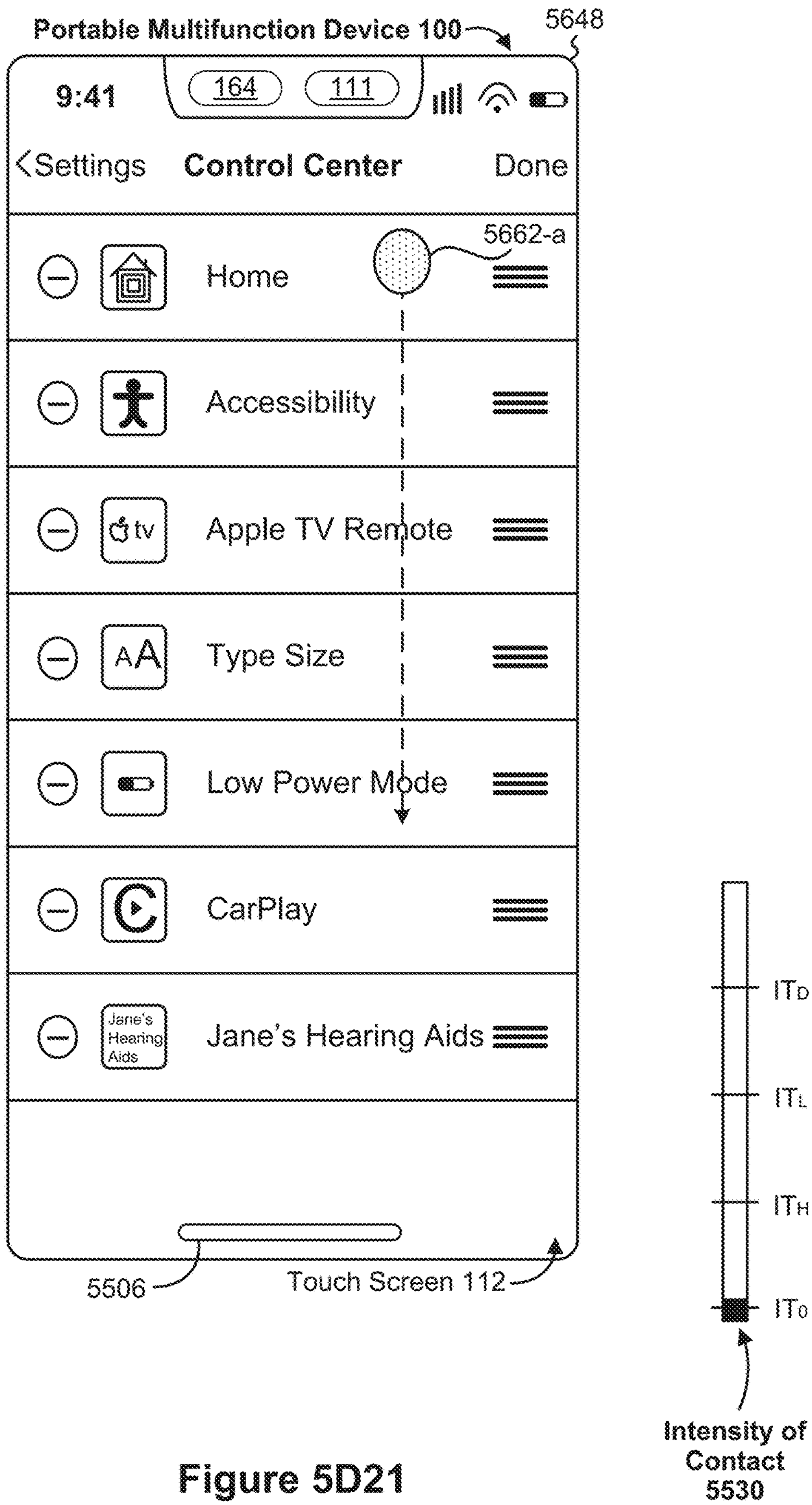
Figure 5D21

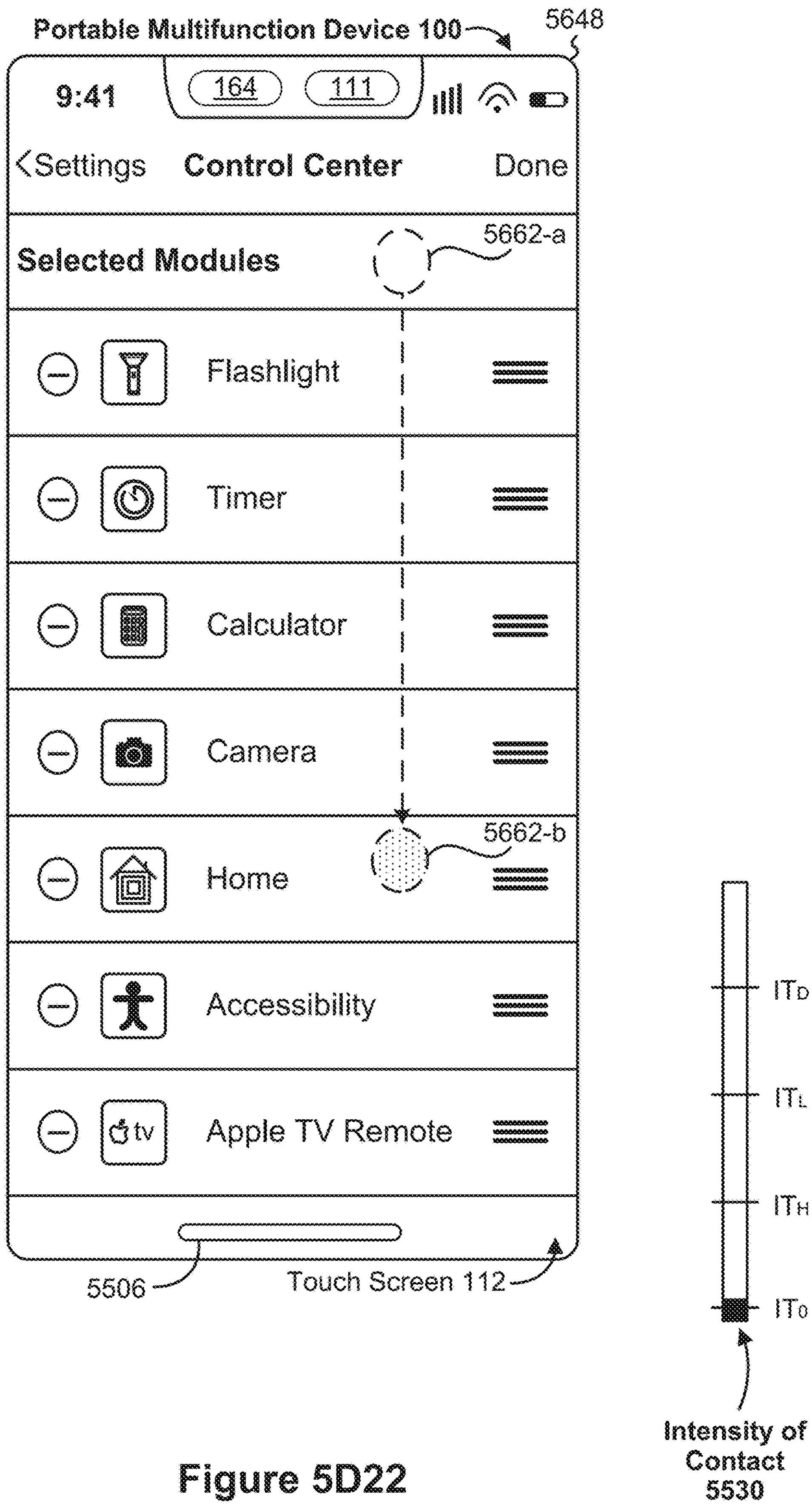
Figure 5D22

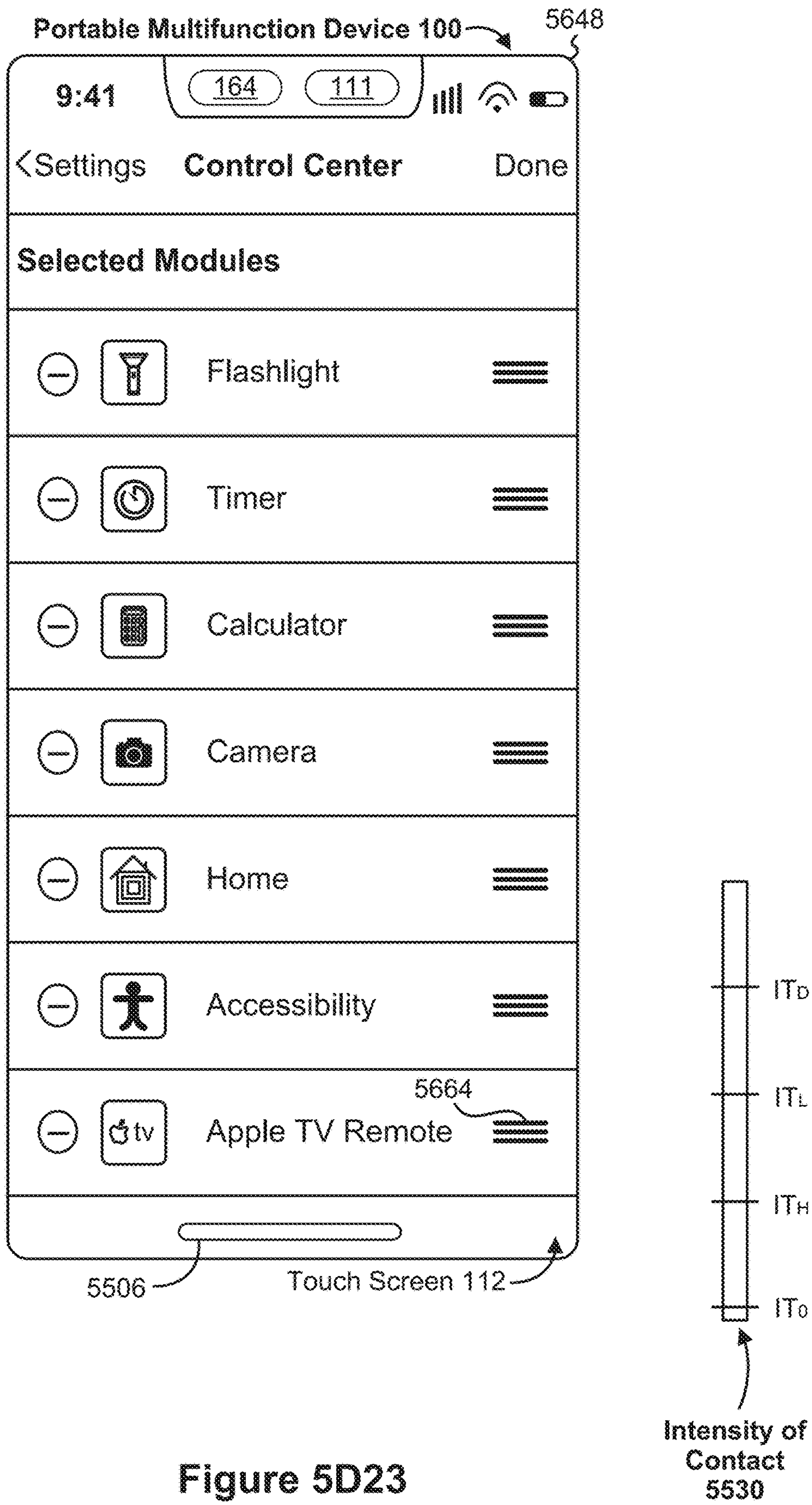
Figure 5D23

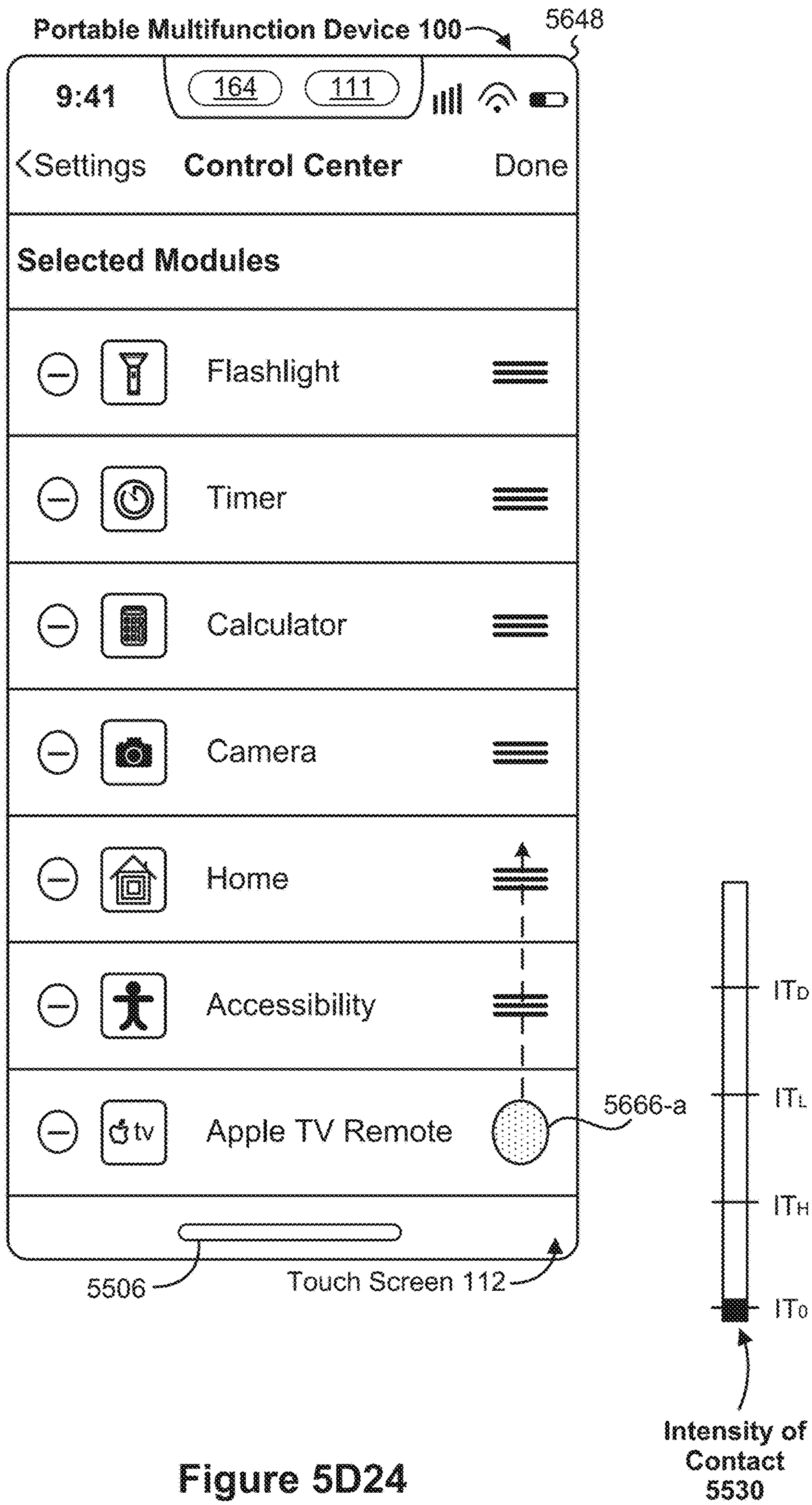
Figure 5D24

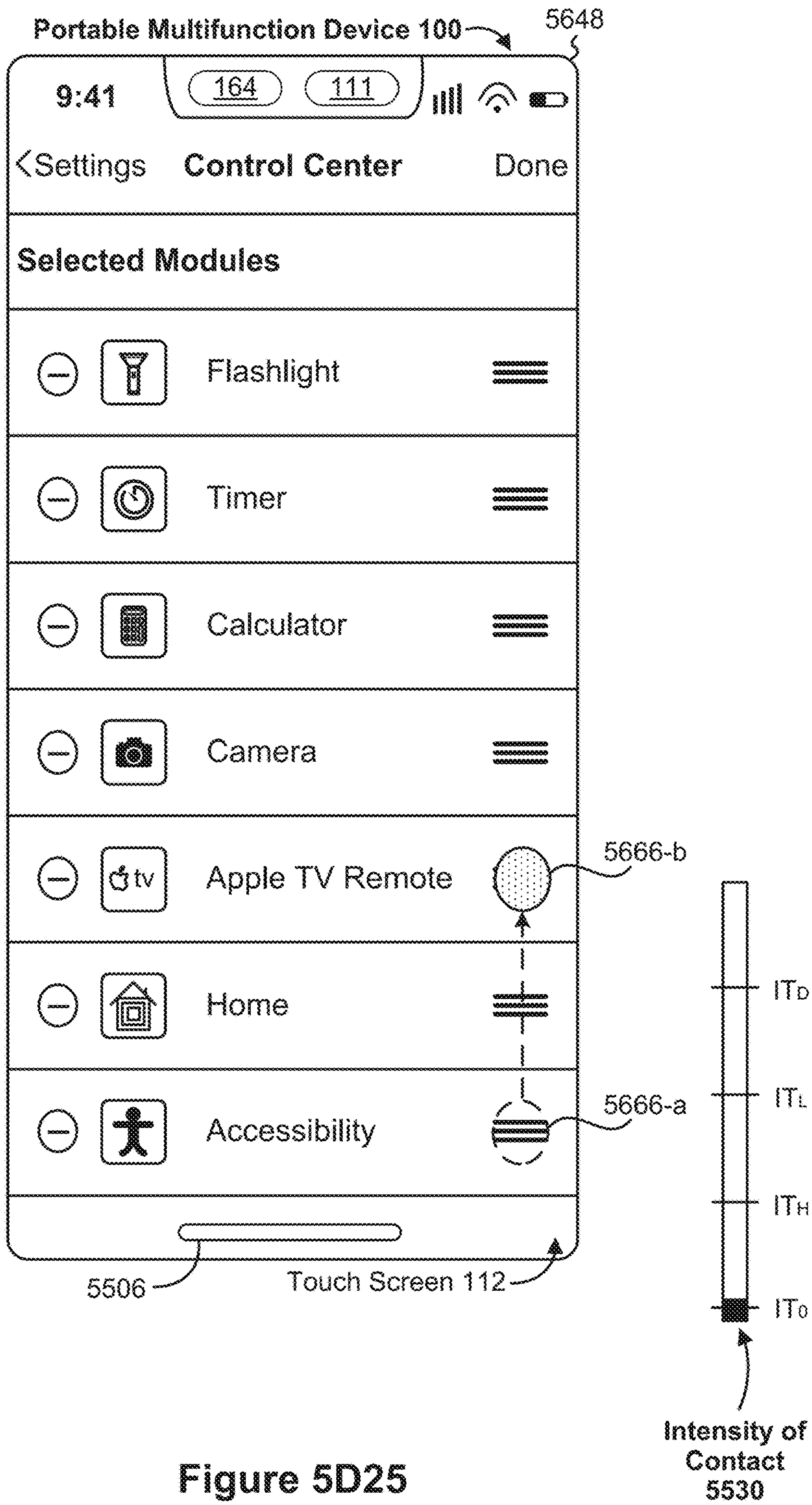
Figure 5D25

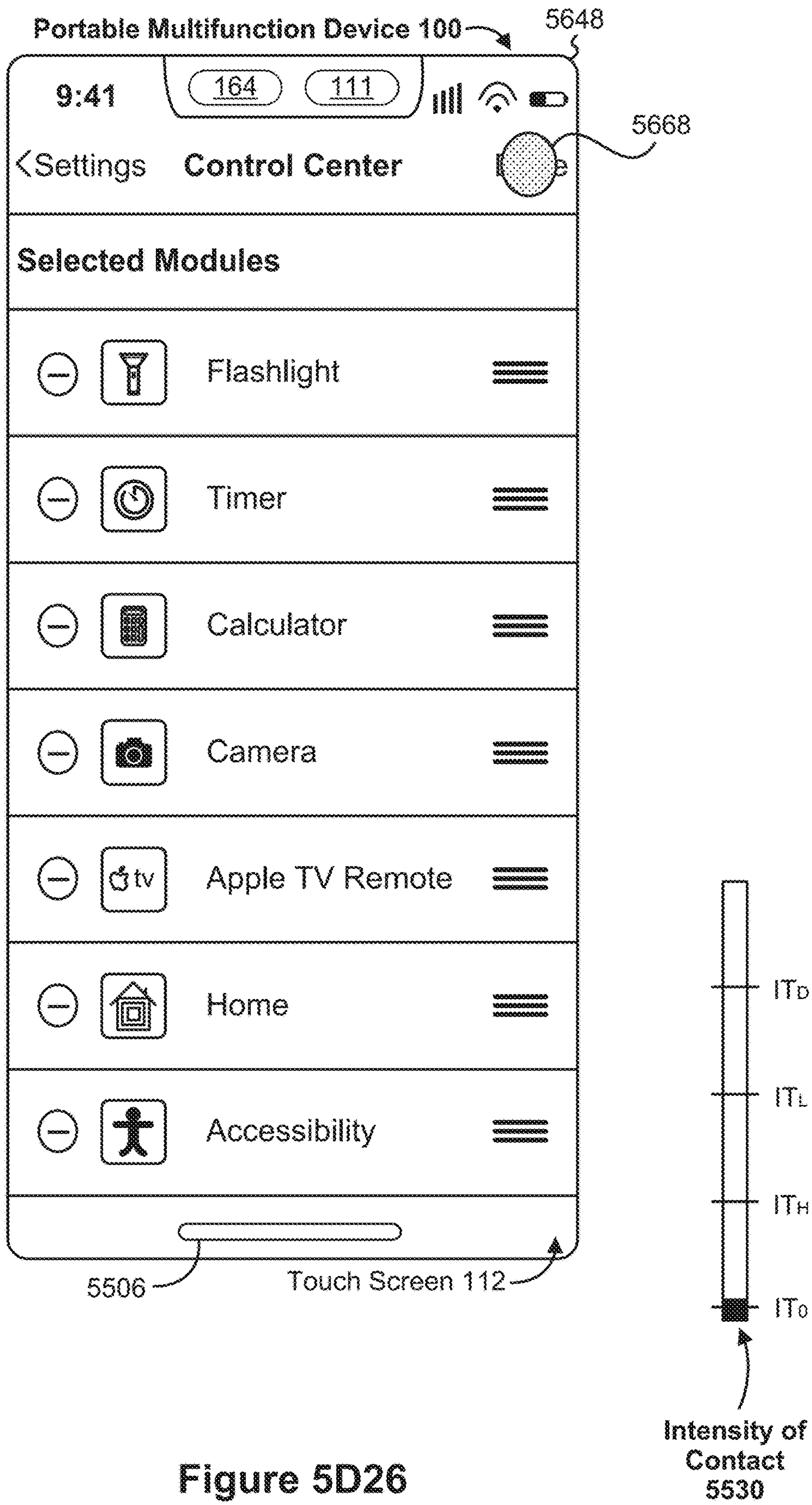
Figure 5D26

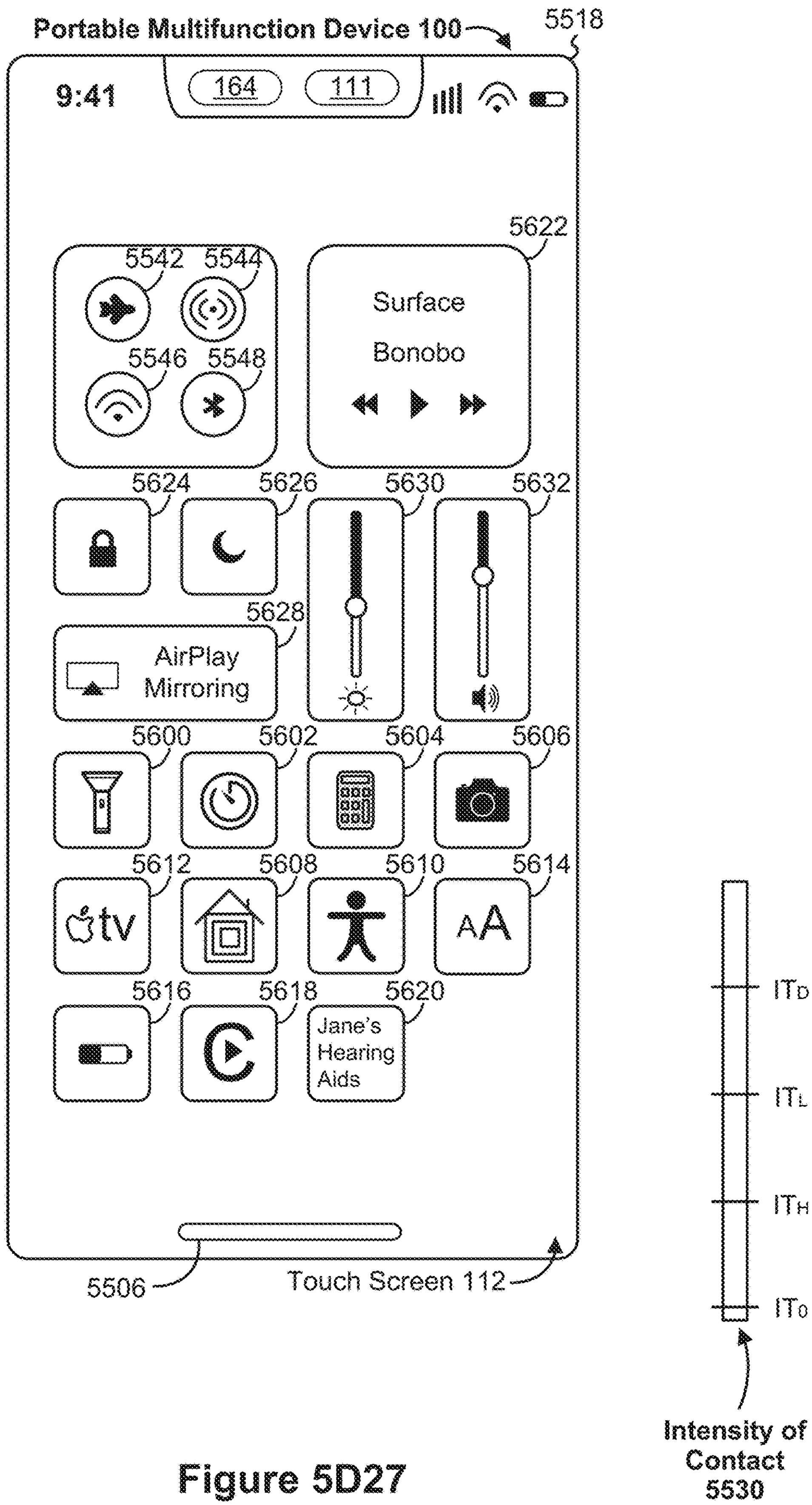
Figure 5D27

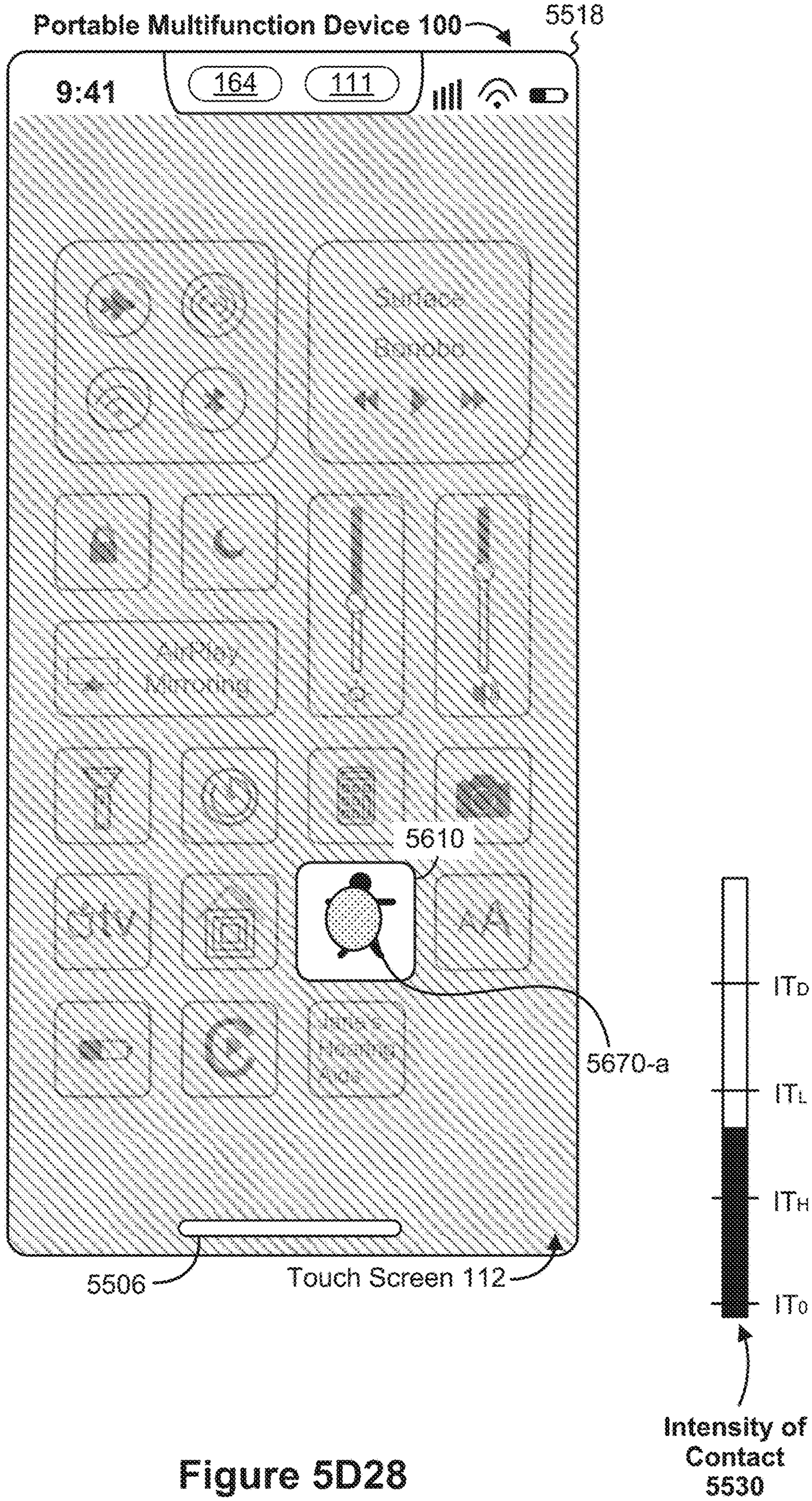
Figure 5D28

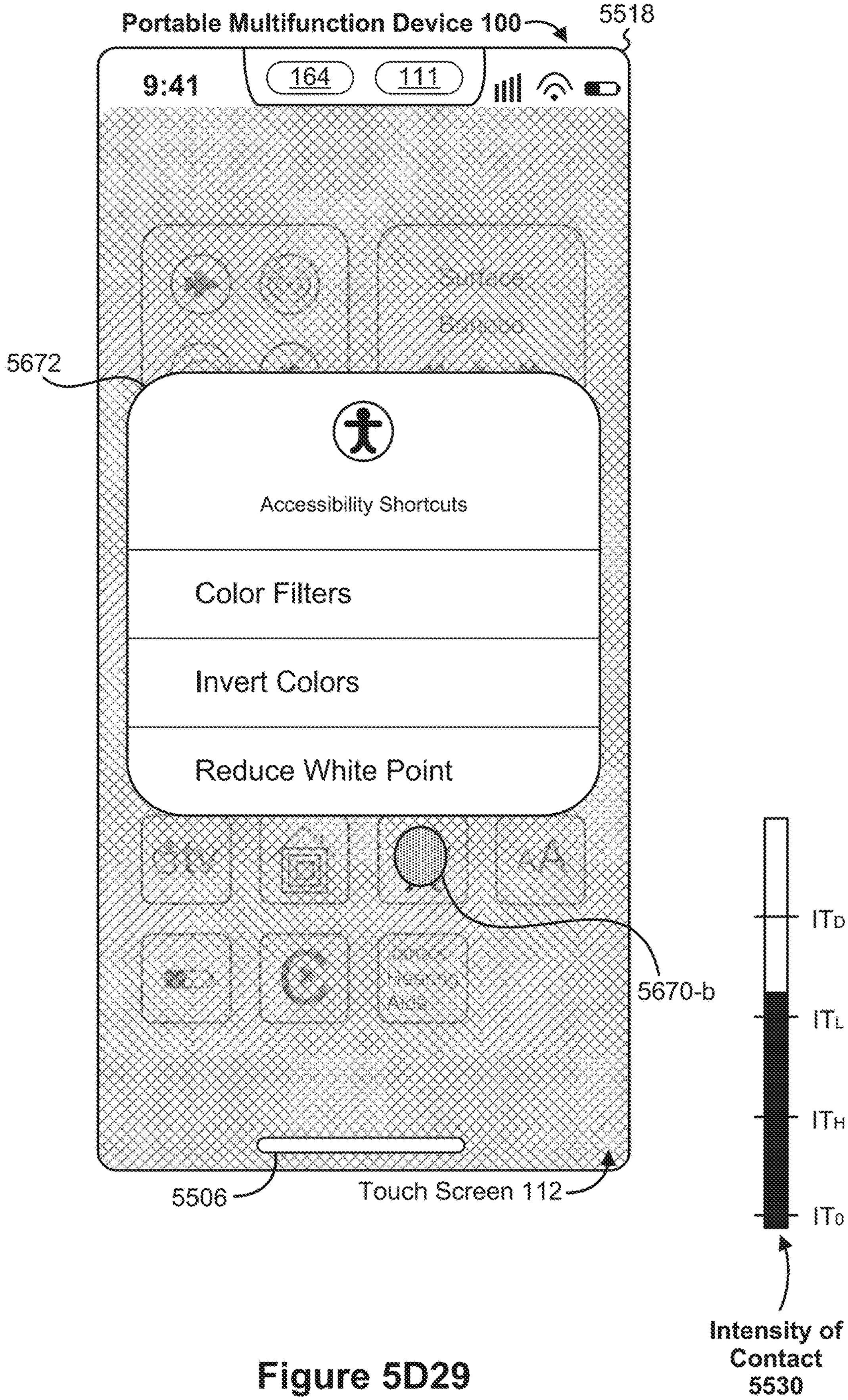
Figure 5D29

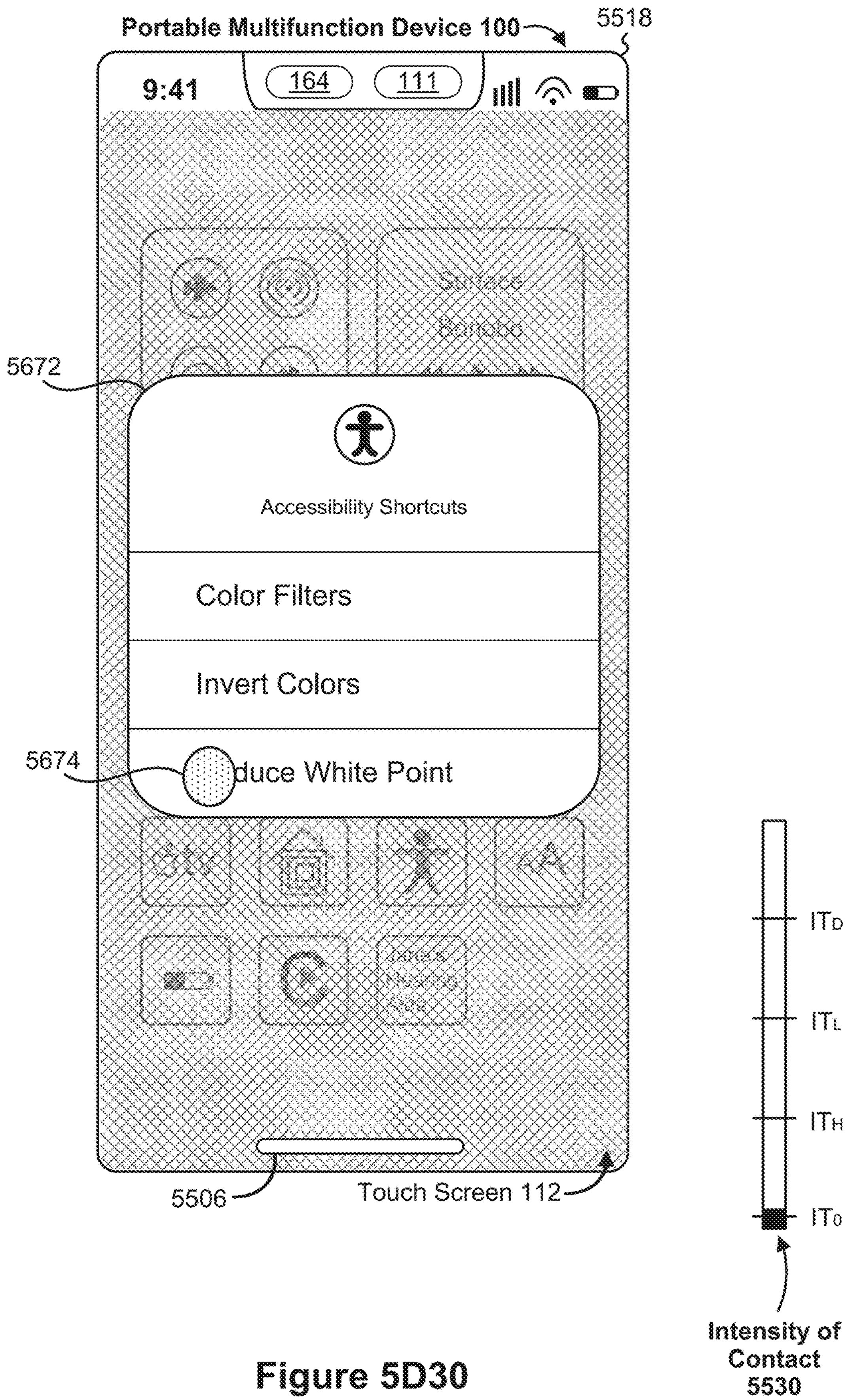
Figure 5D30

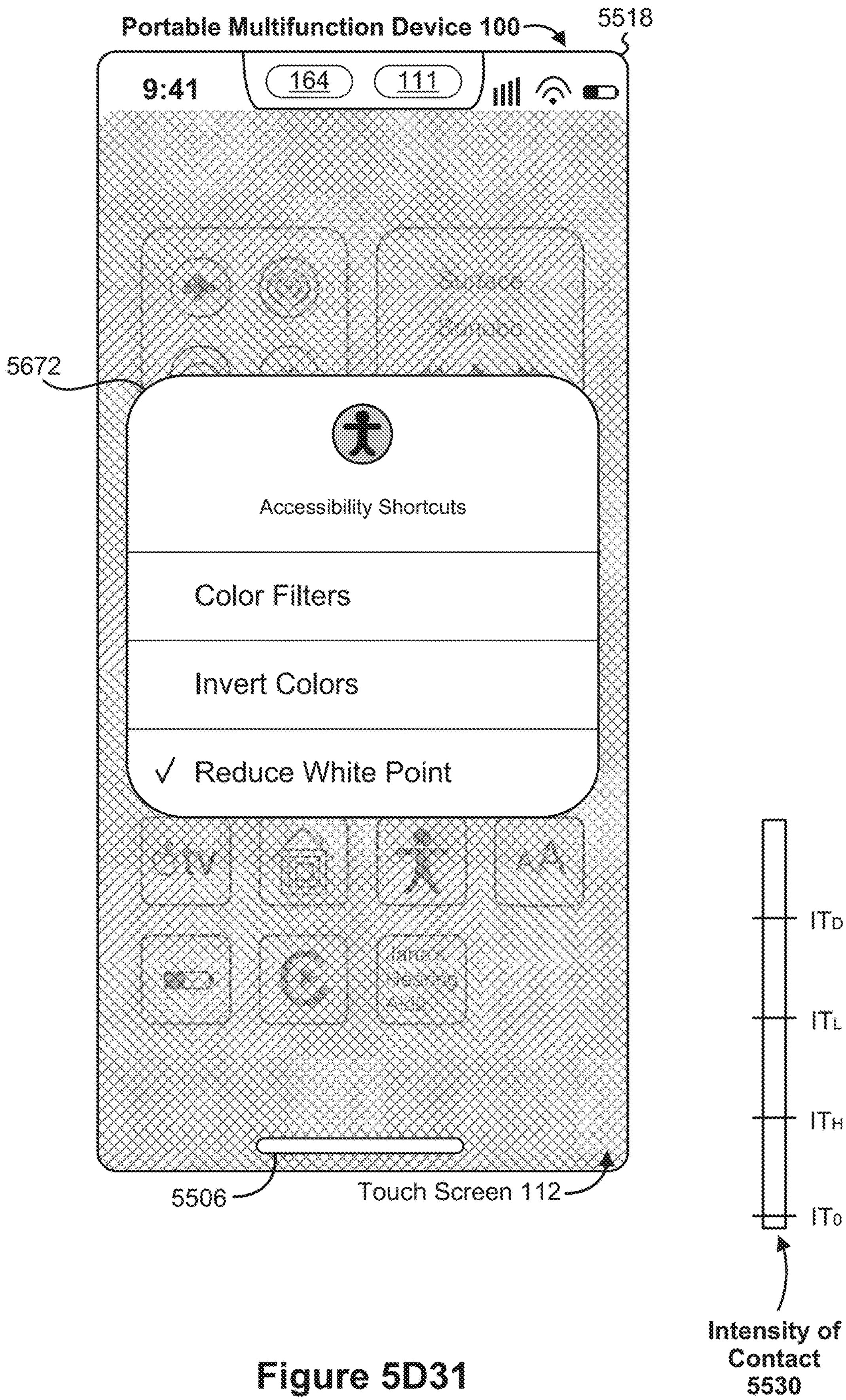
Figure 5D31

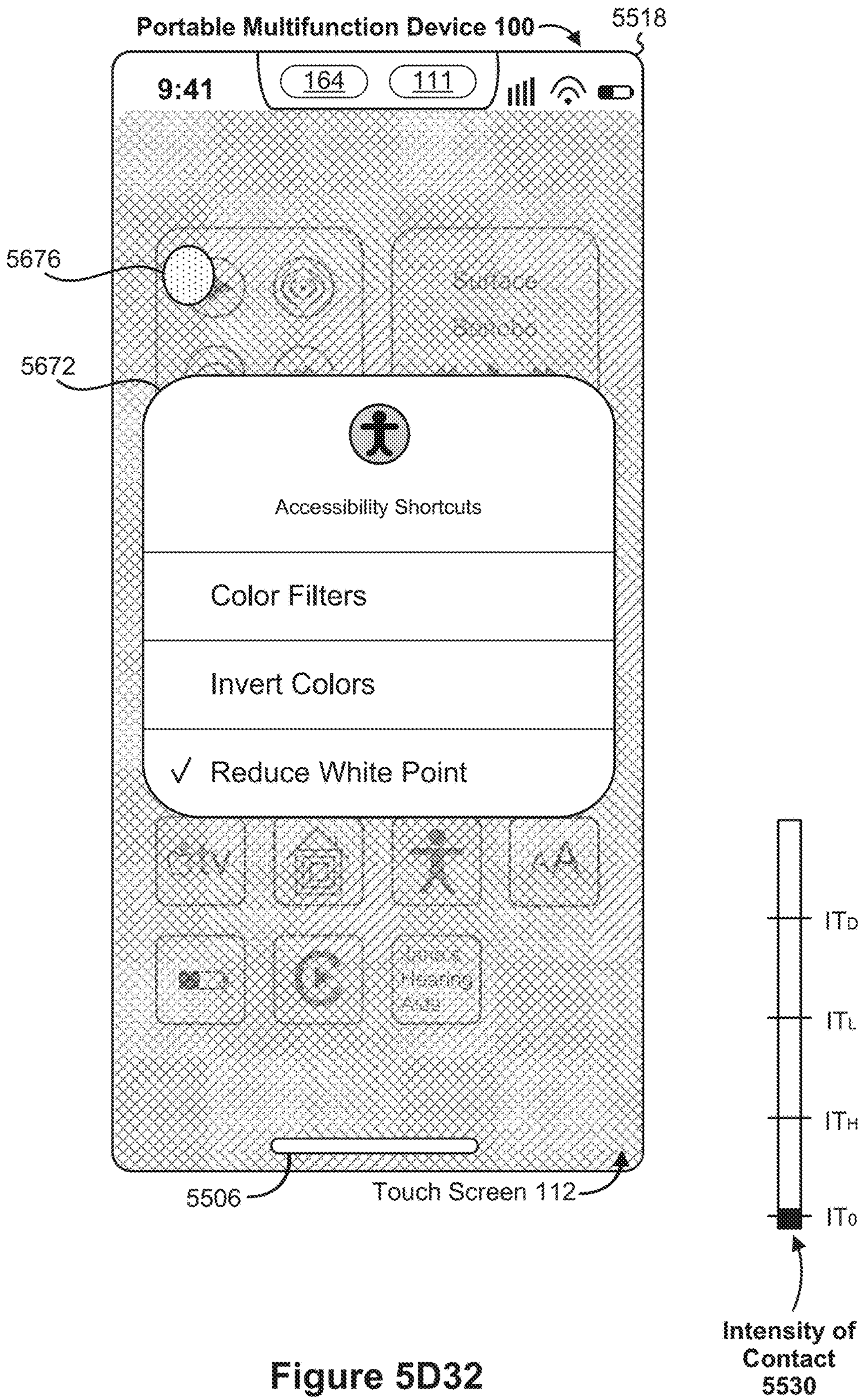
Figure 5D32

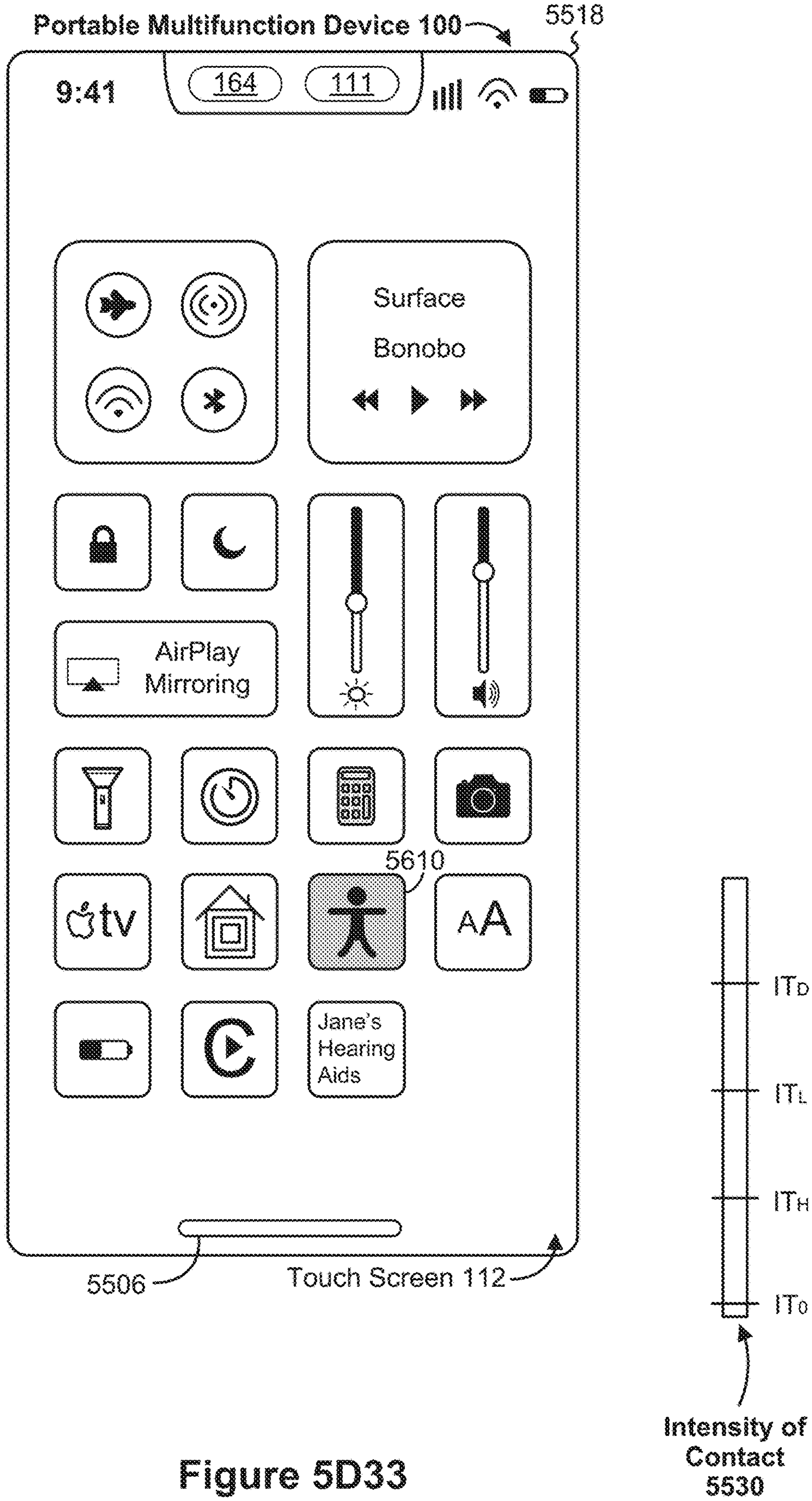
Figure 5D33

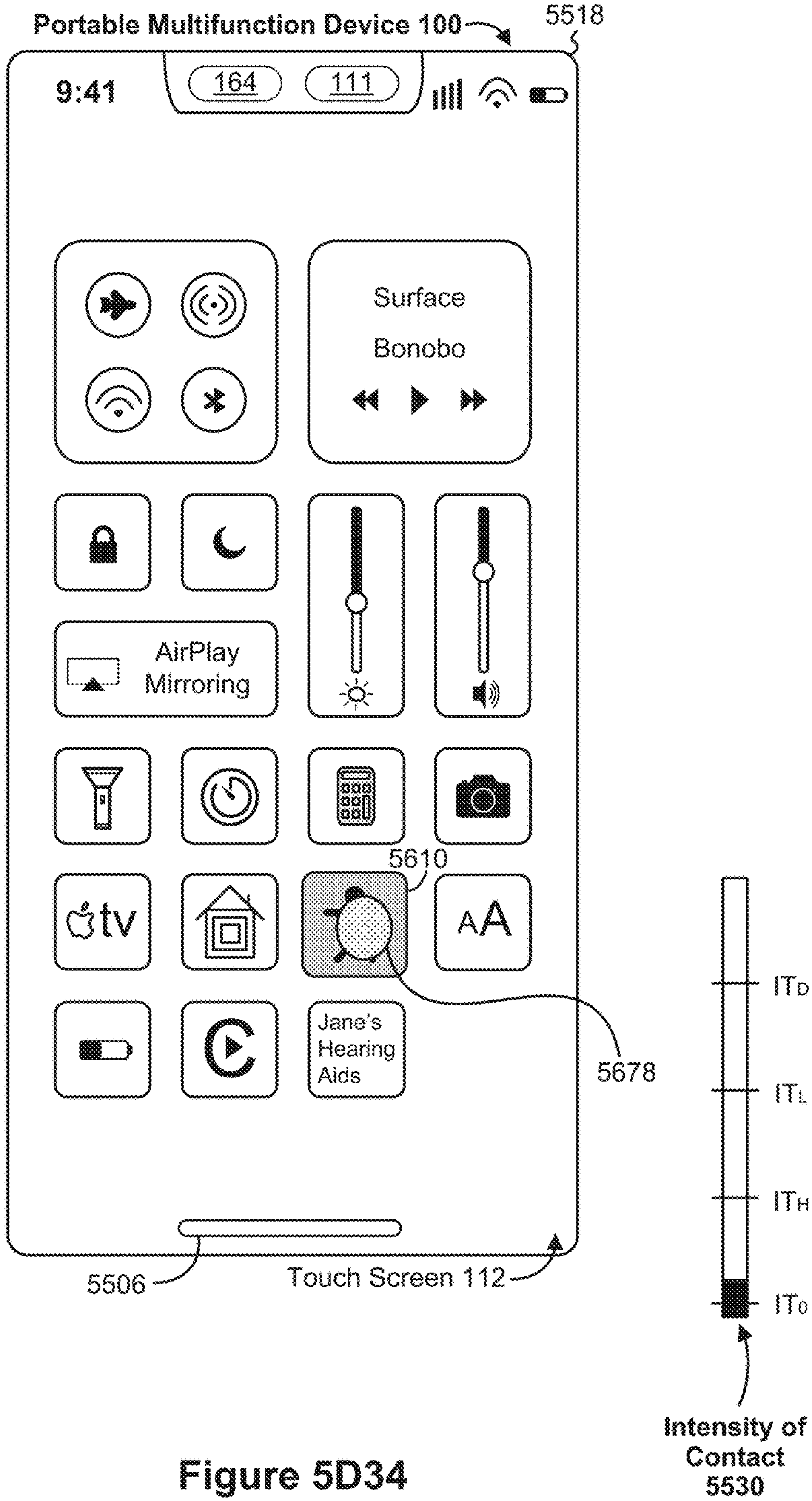
Figure 5D34

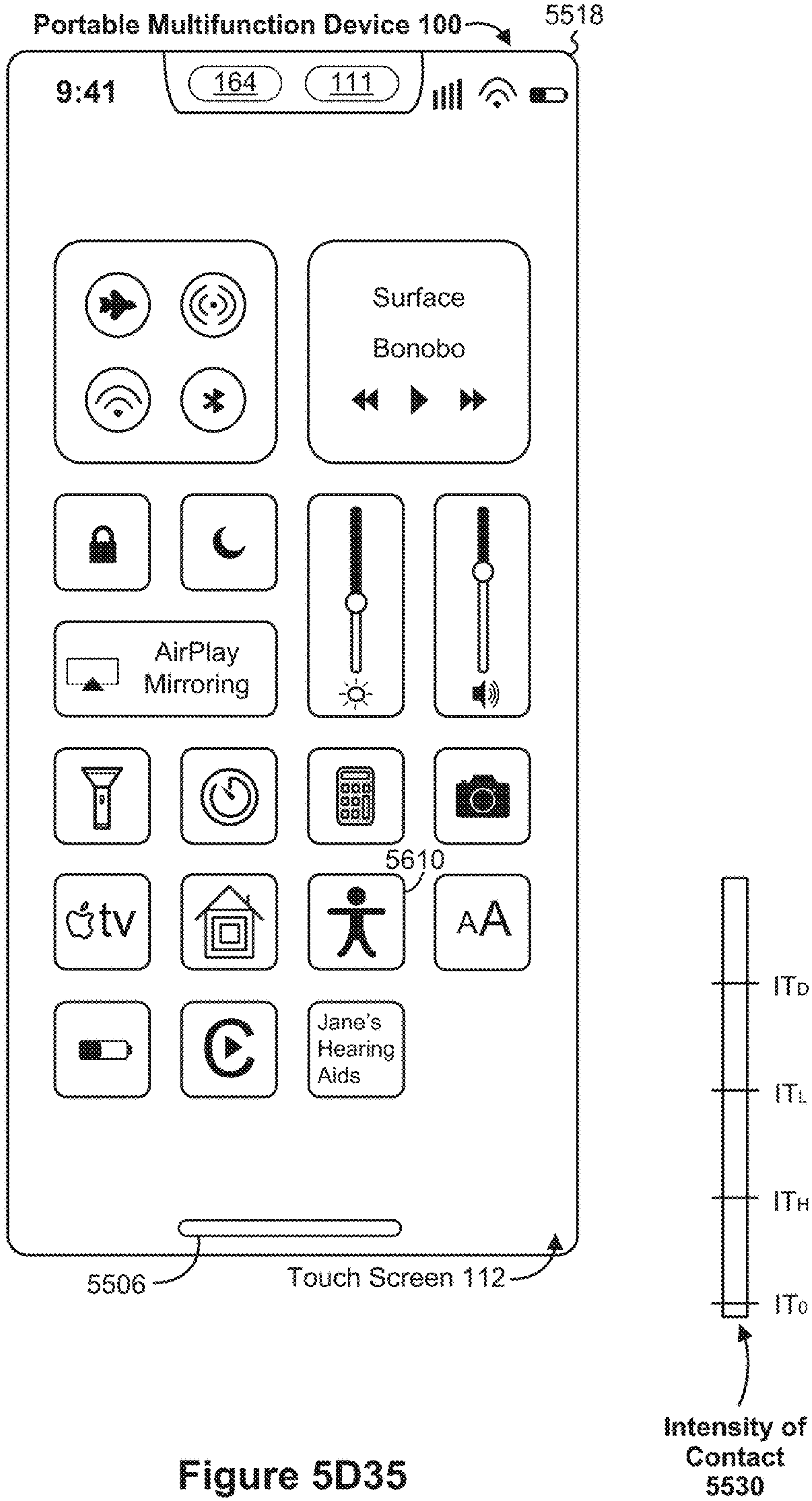
Figure 5D35

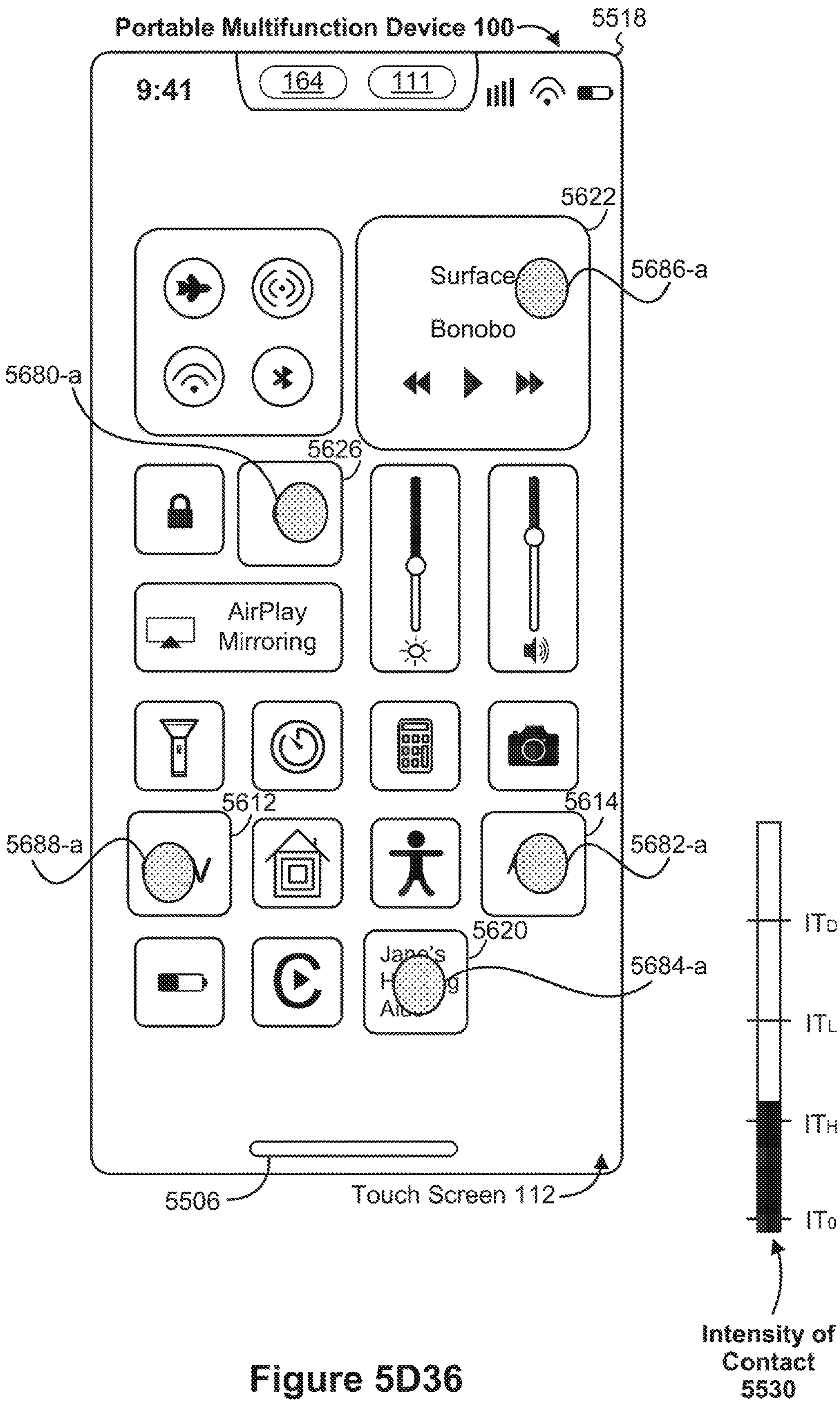
Figure 5D36

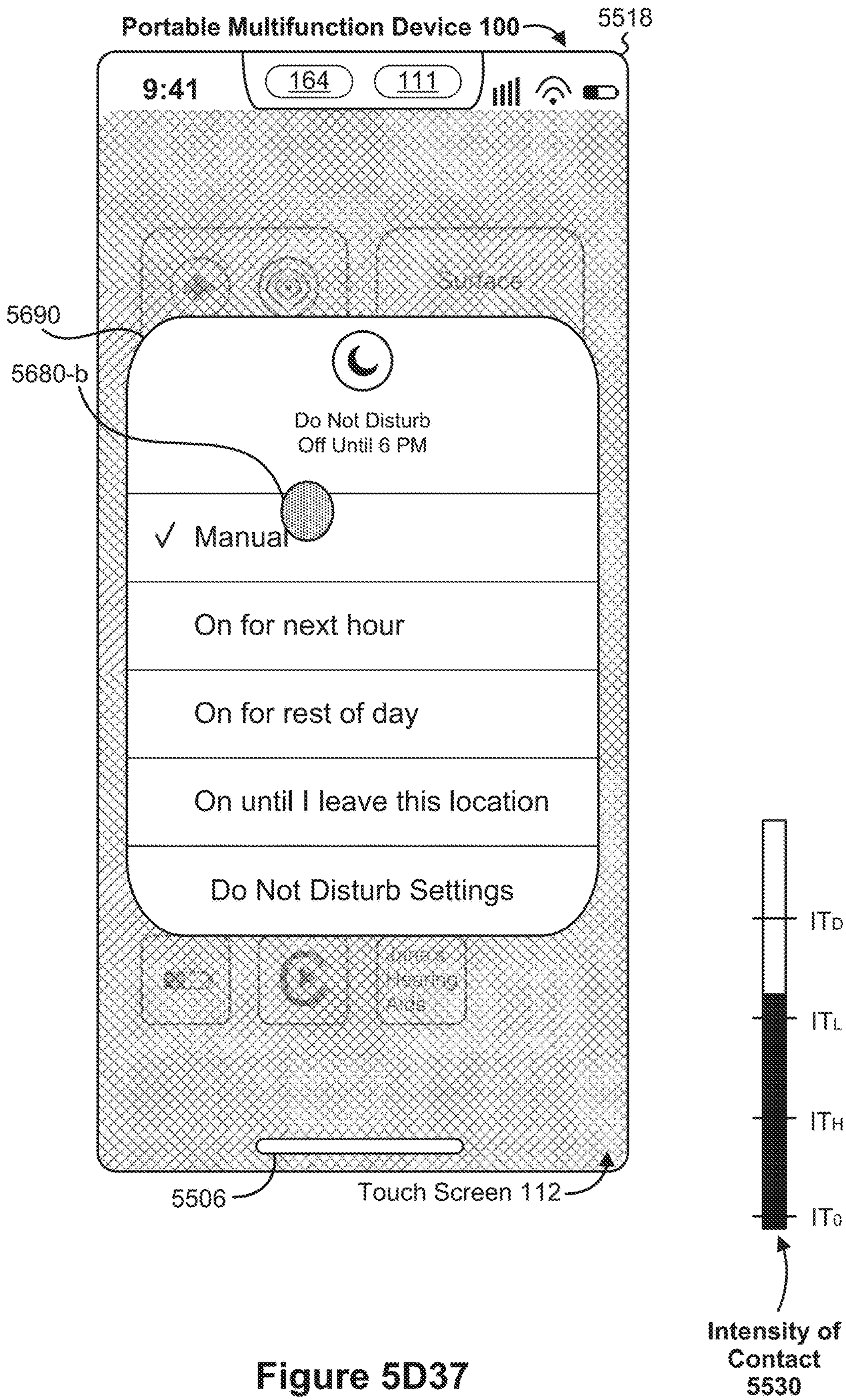
Figure 5D37

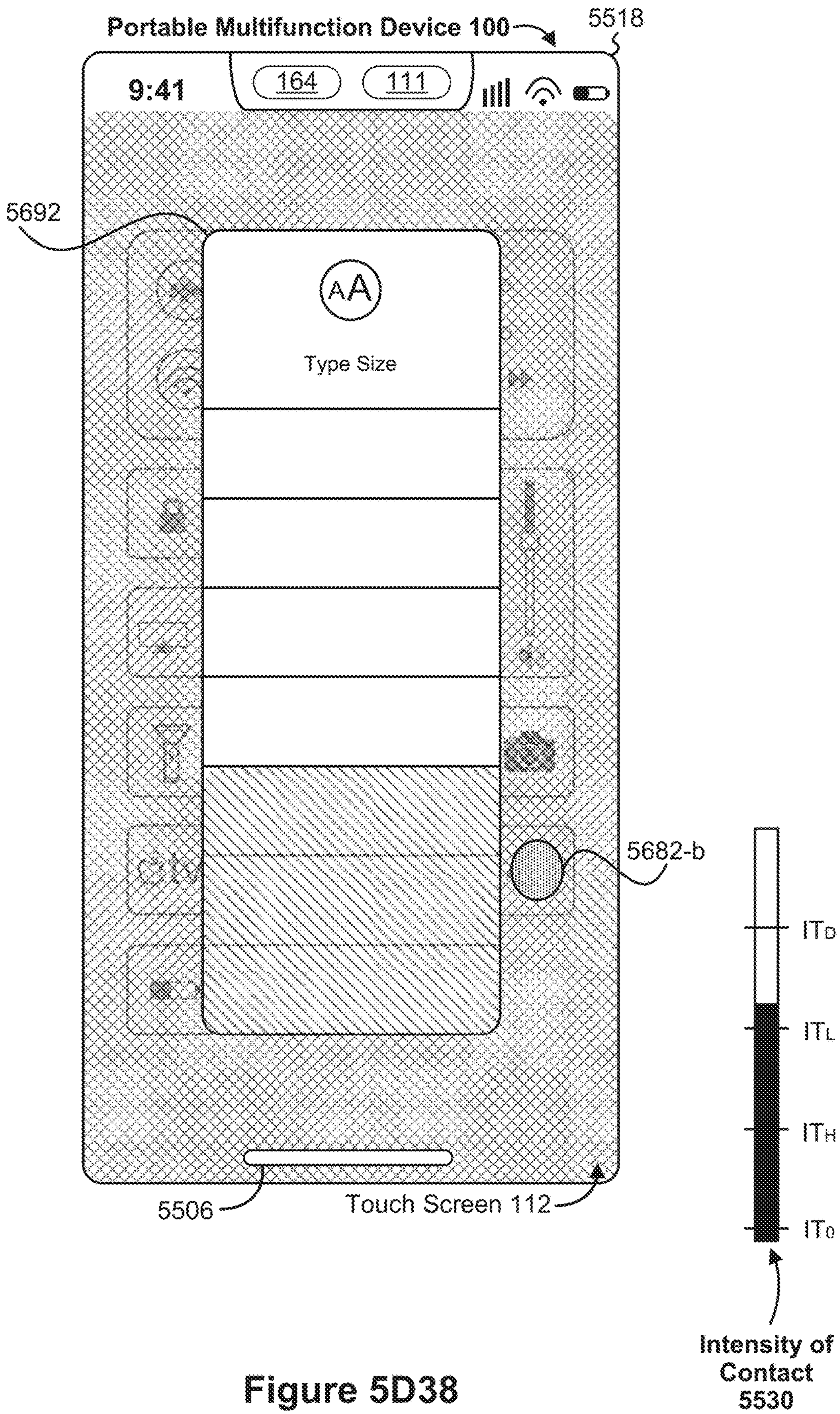
Figure 5D38

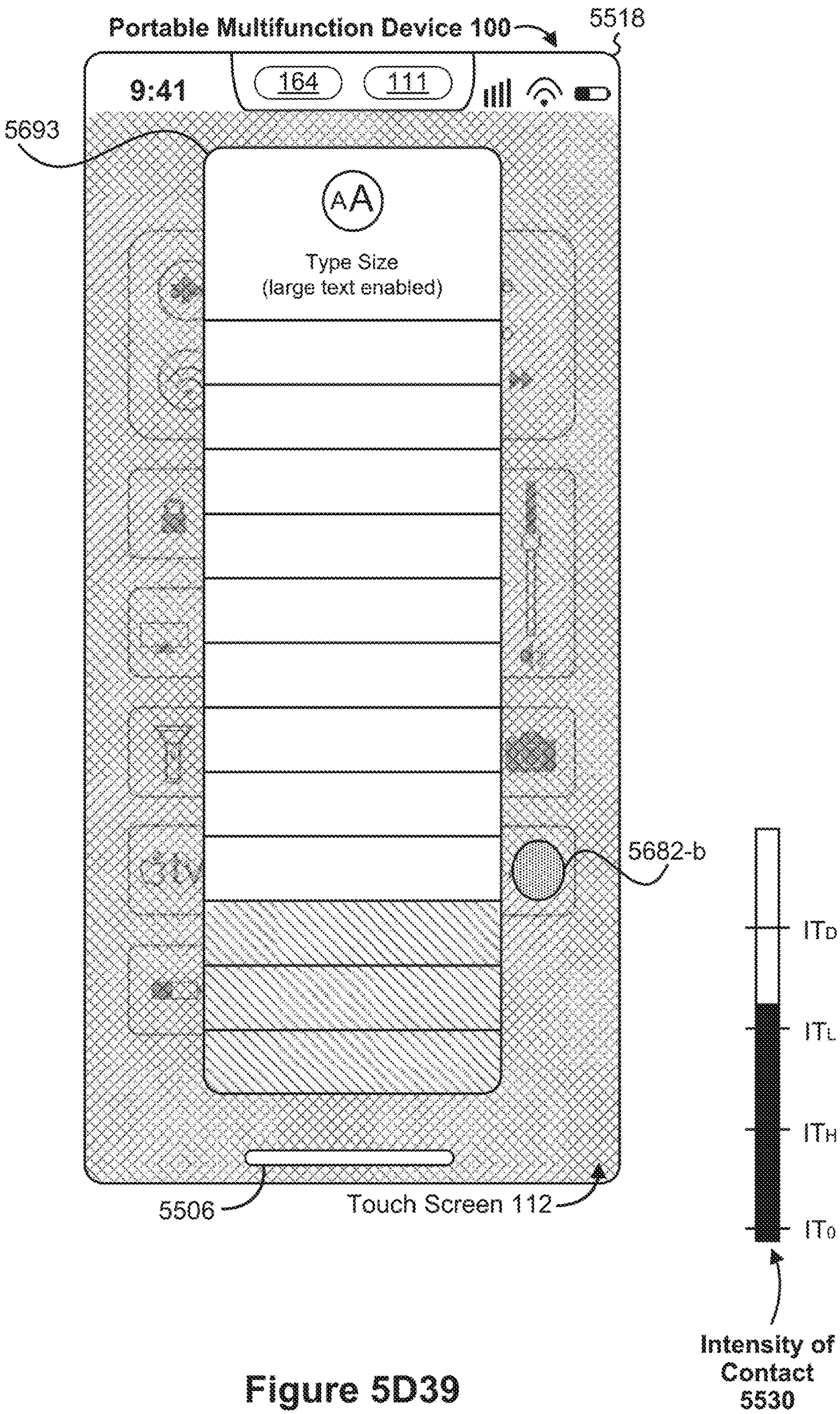
Figure 5D39

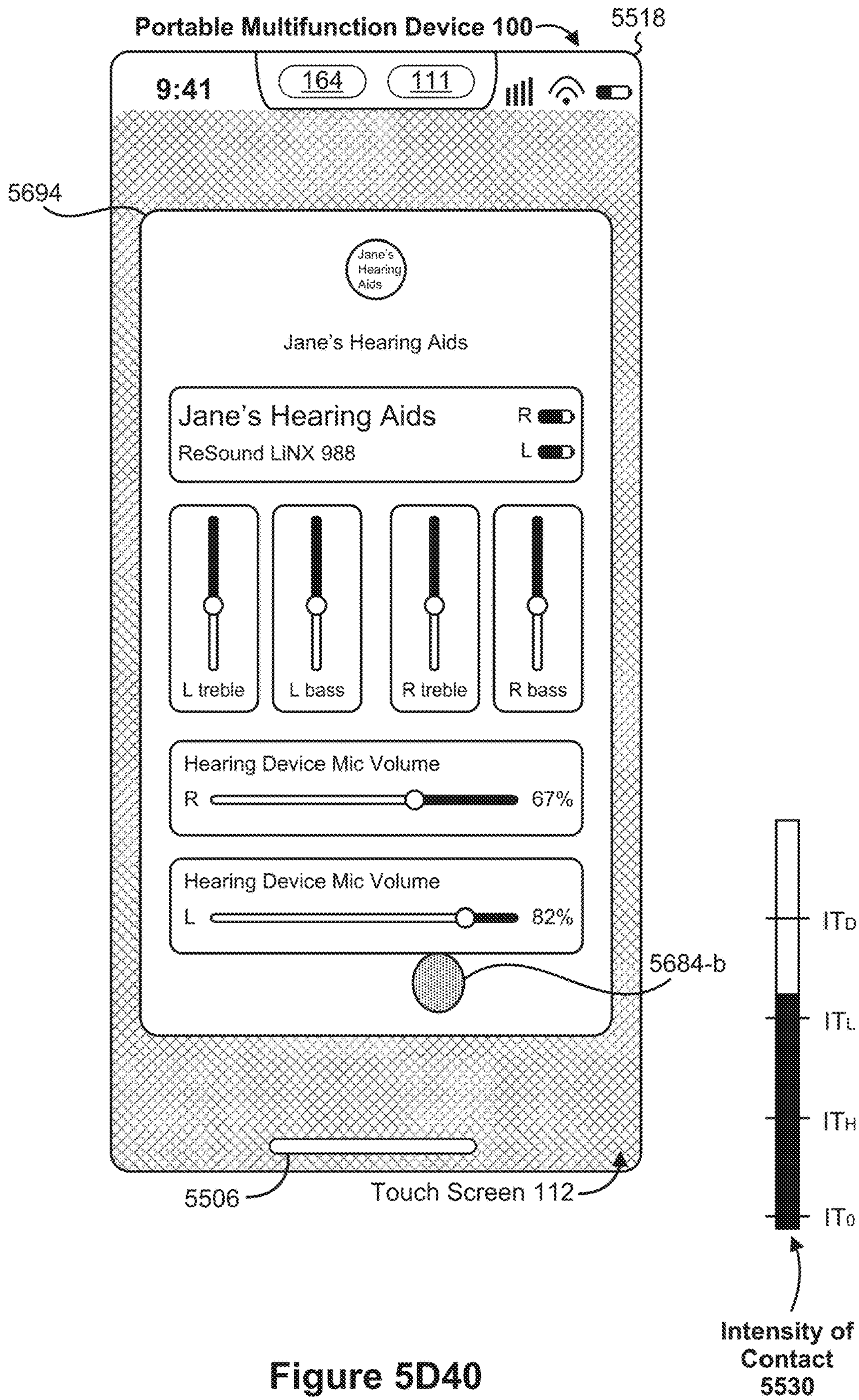
Figure 5D40

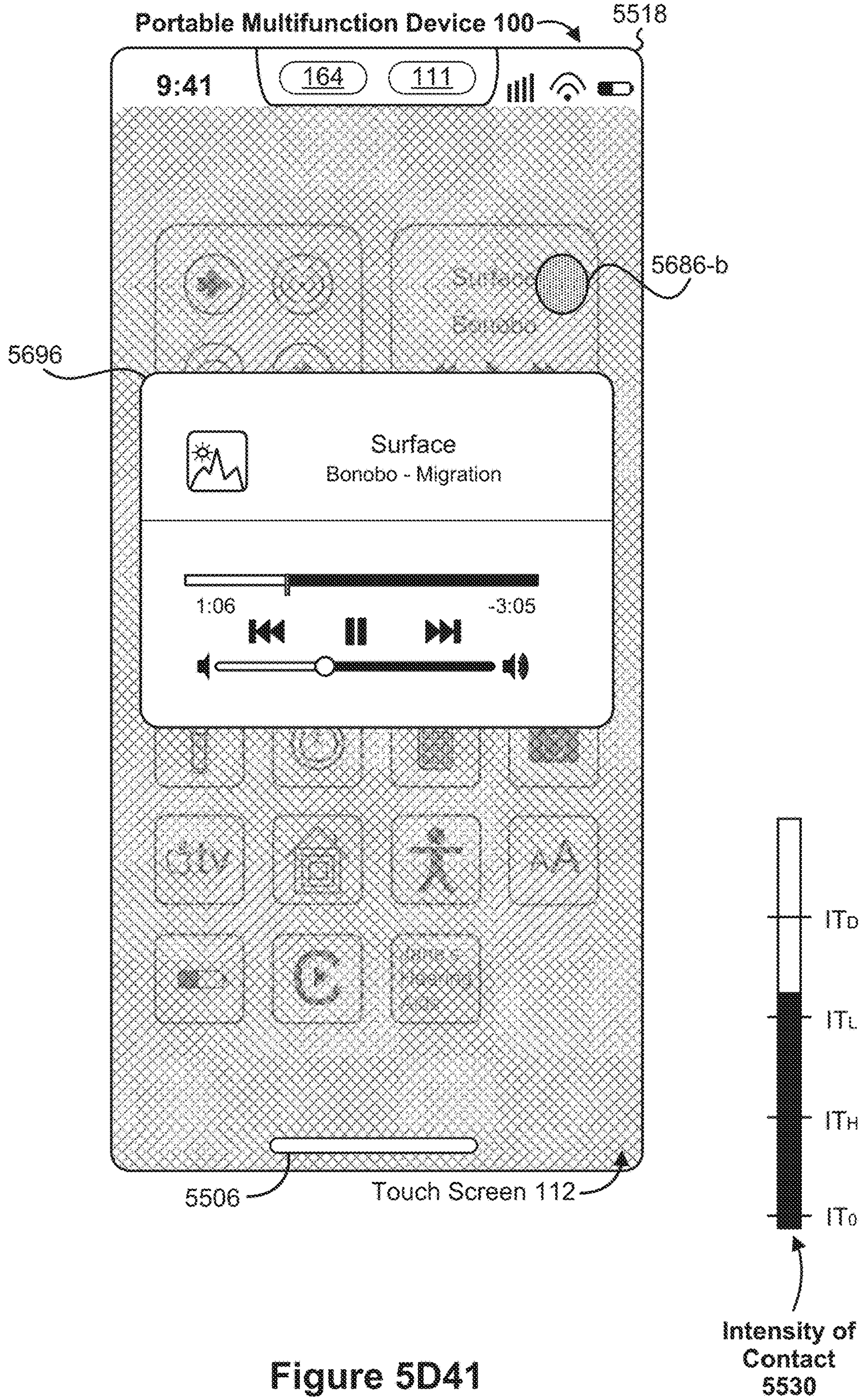
Figure 5D41

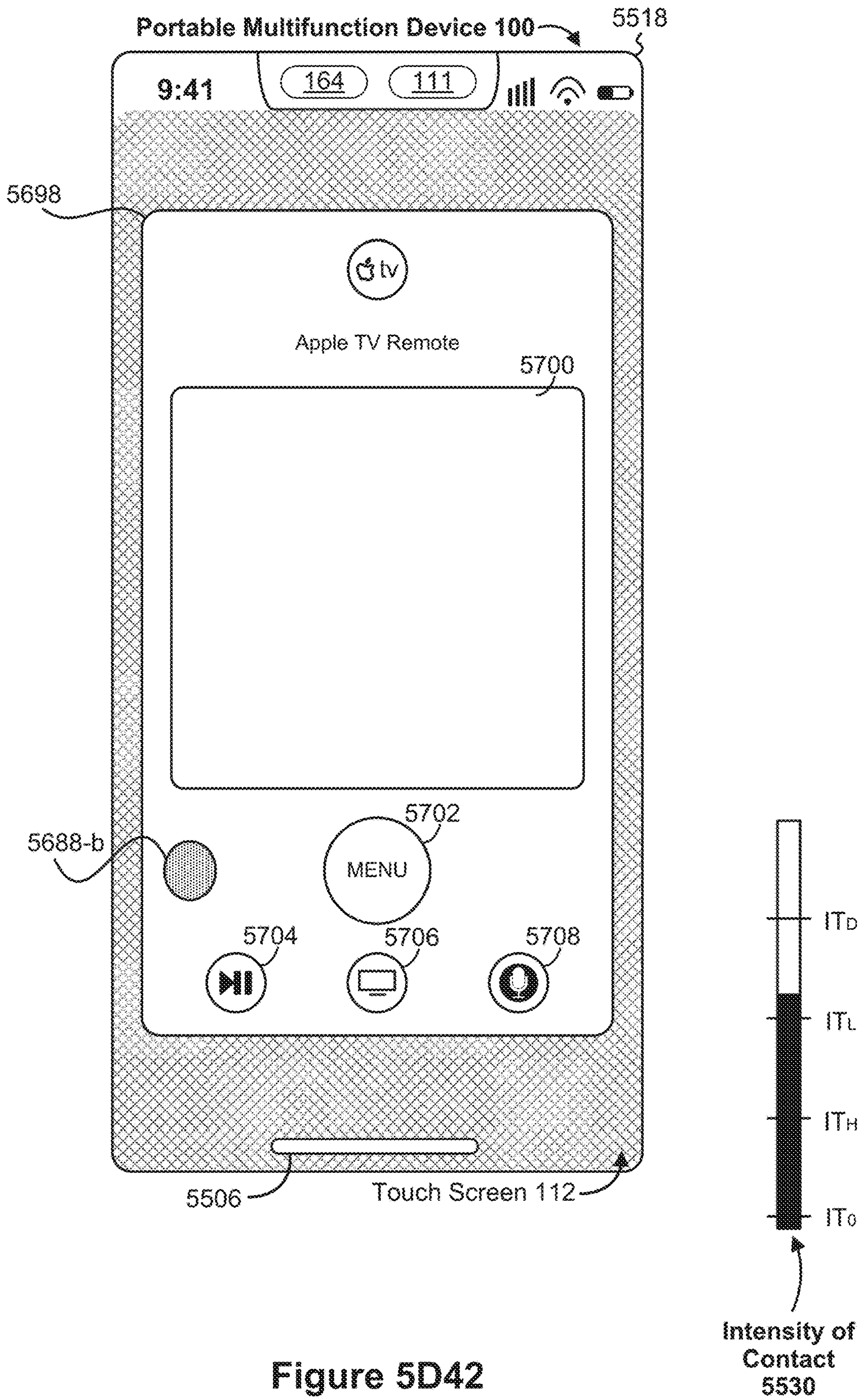
Figure 5D42

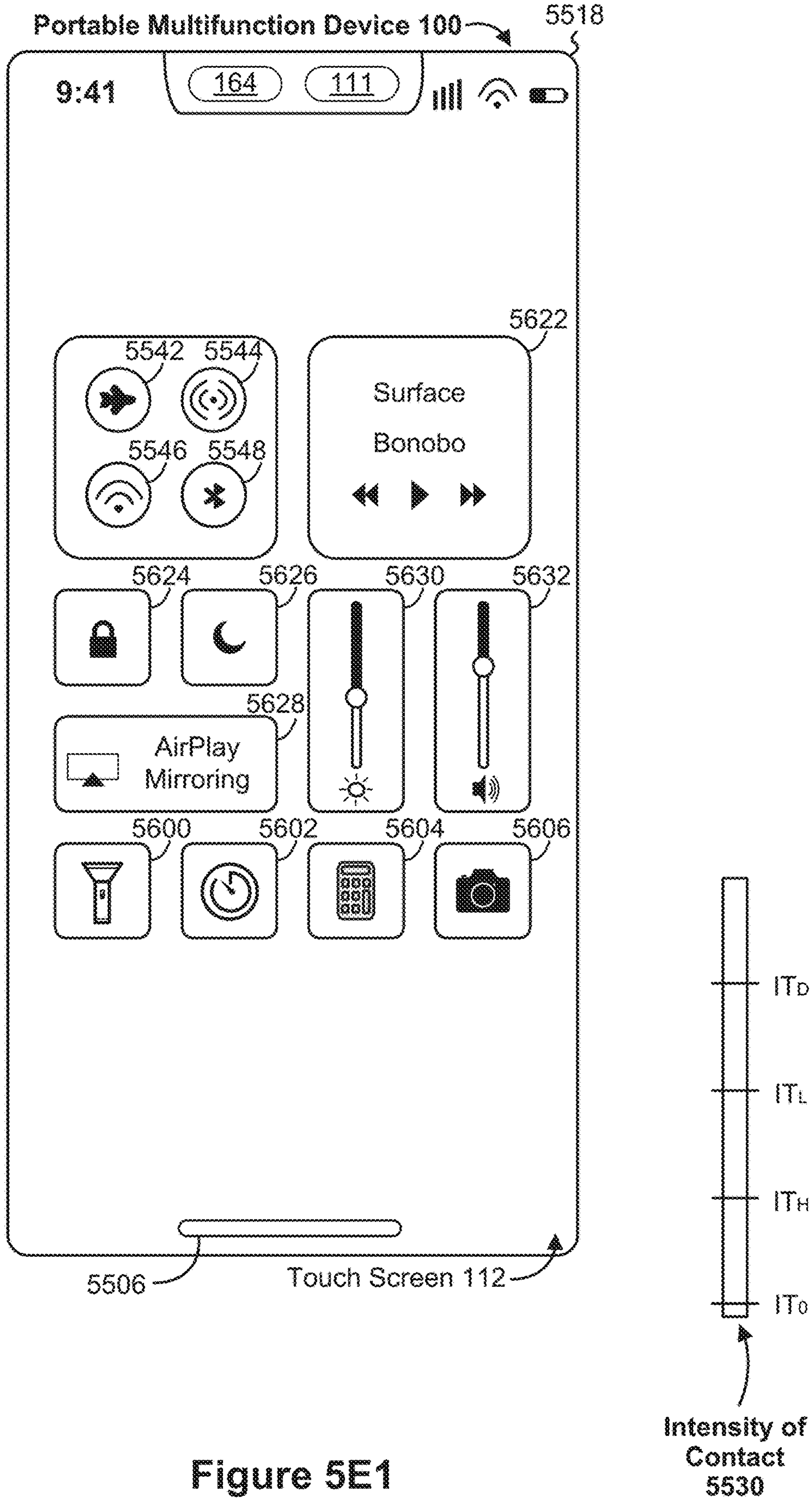
Figure 5E1

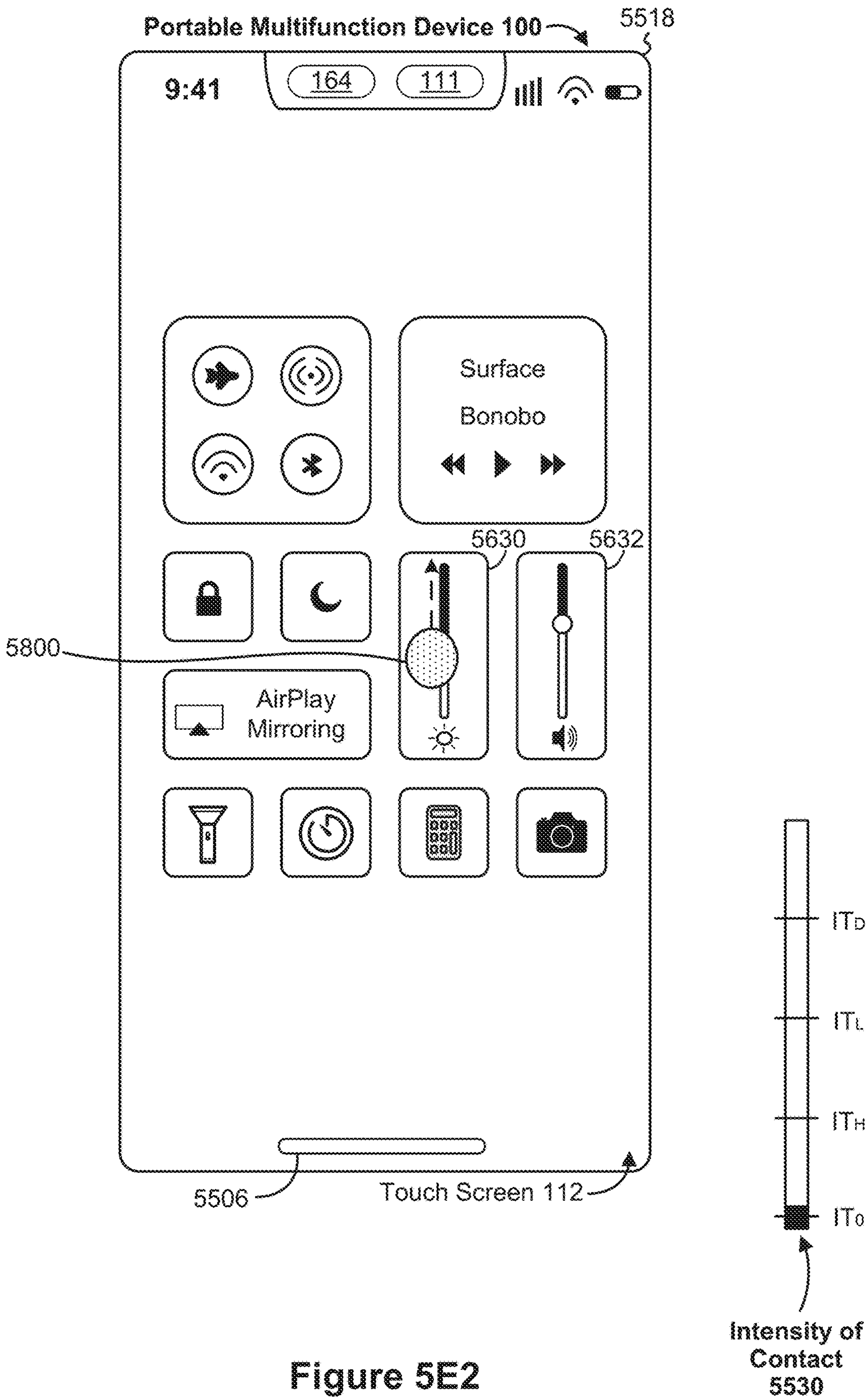
Figure 5E2

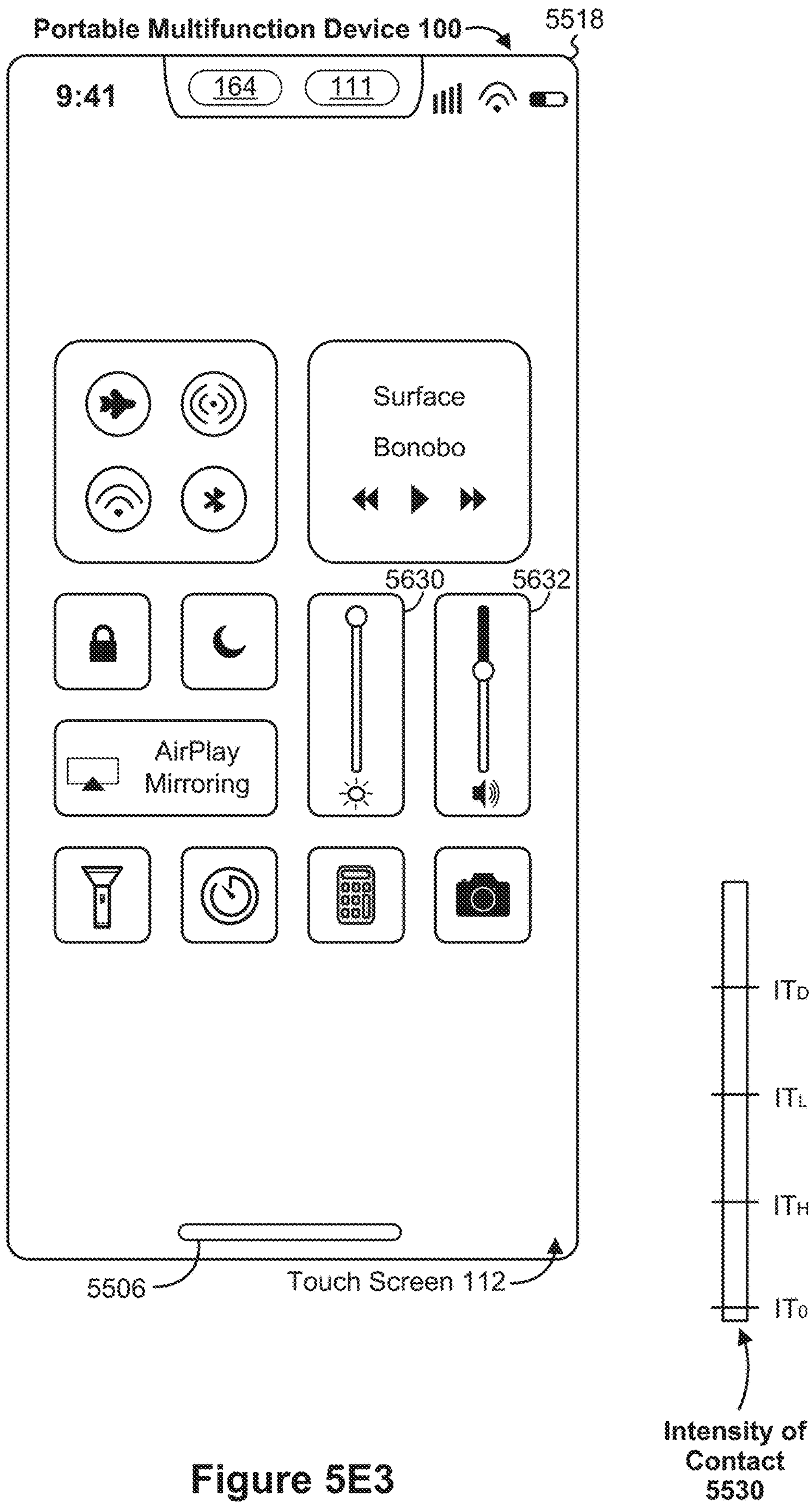
Figure 5E3

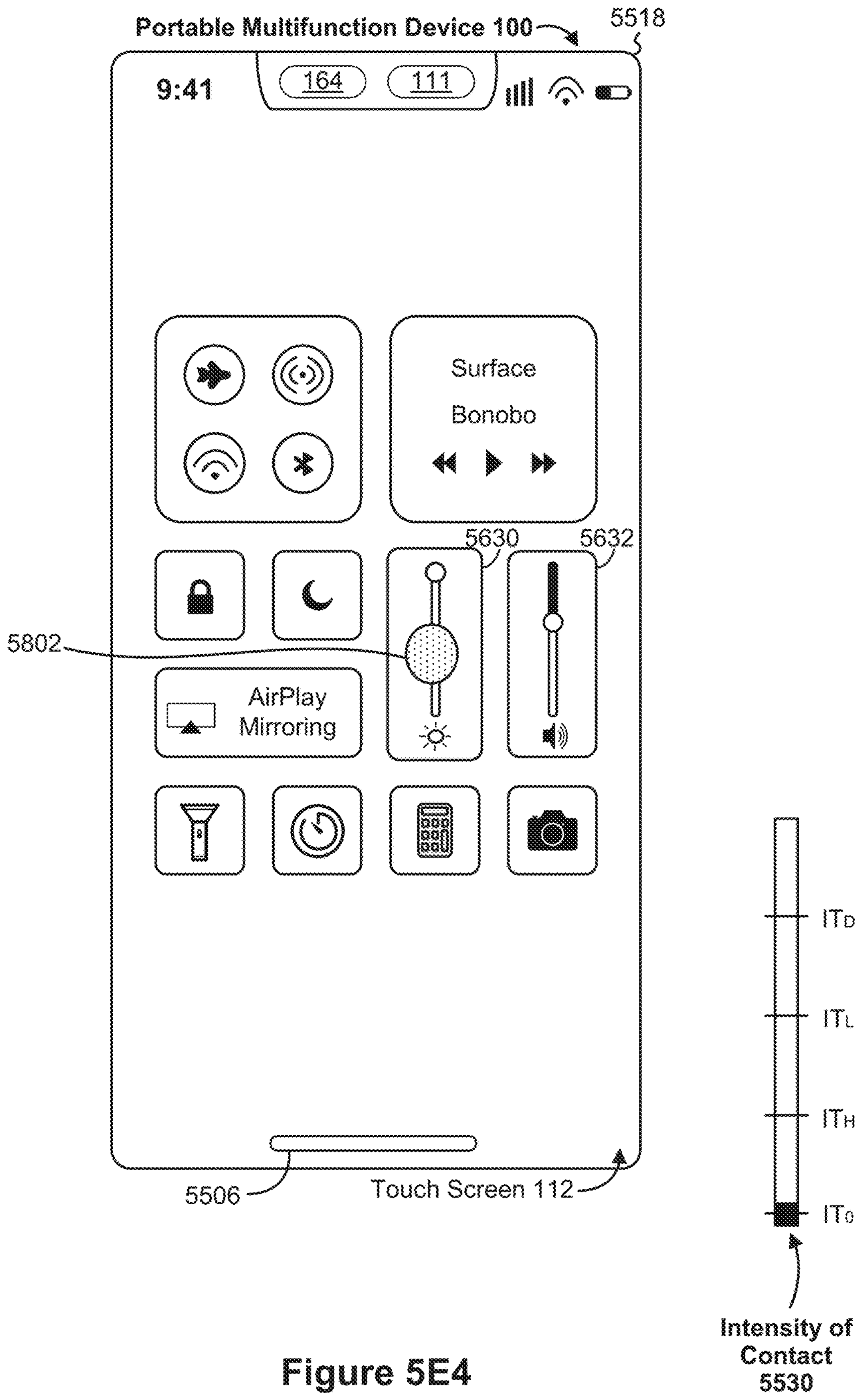
Figure 5E4

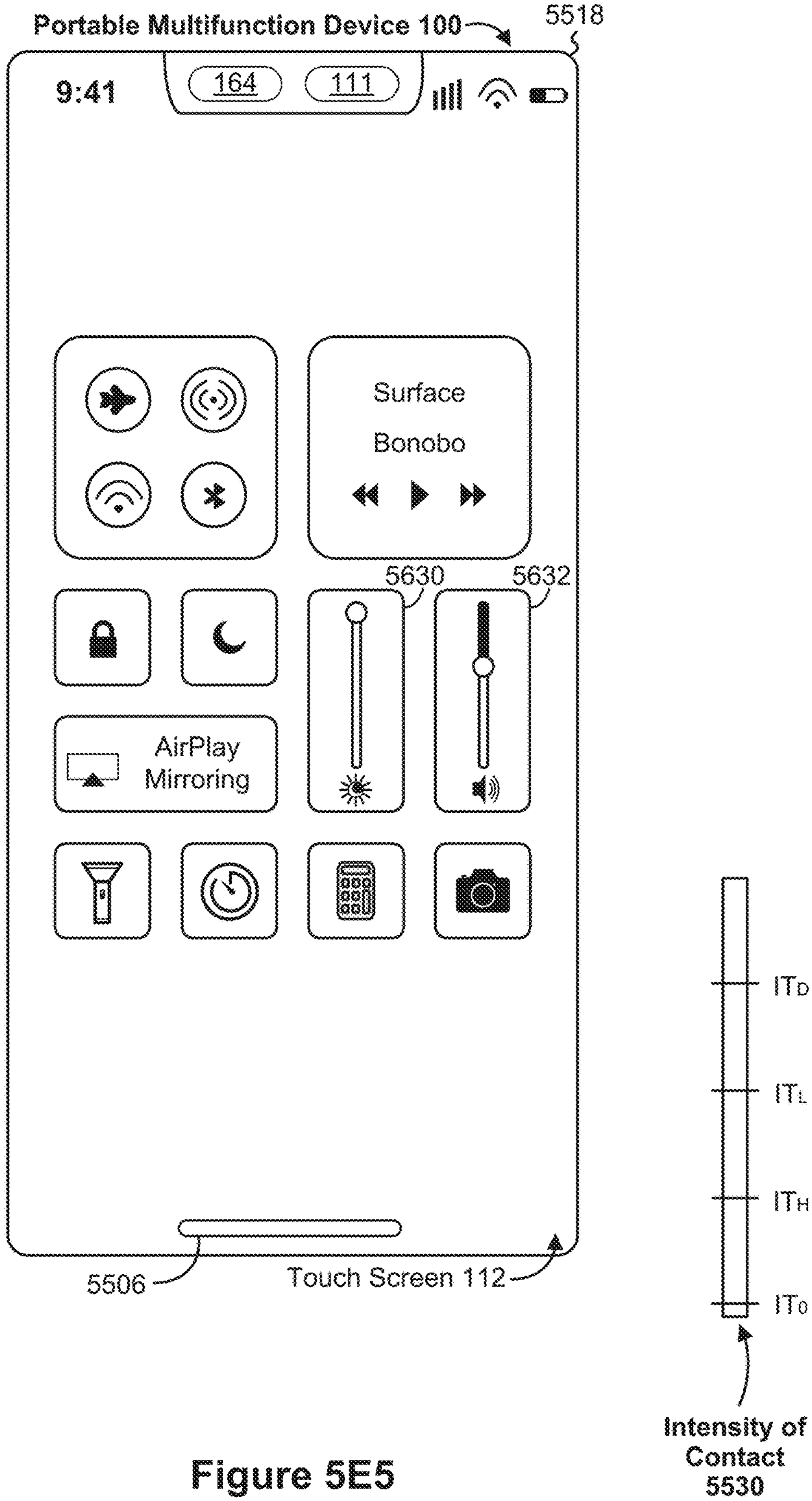
Figure 5E5

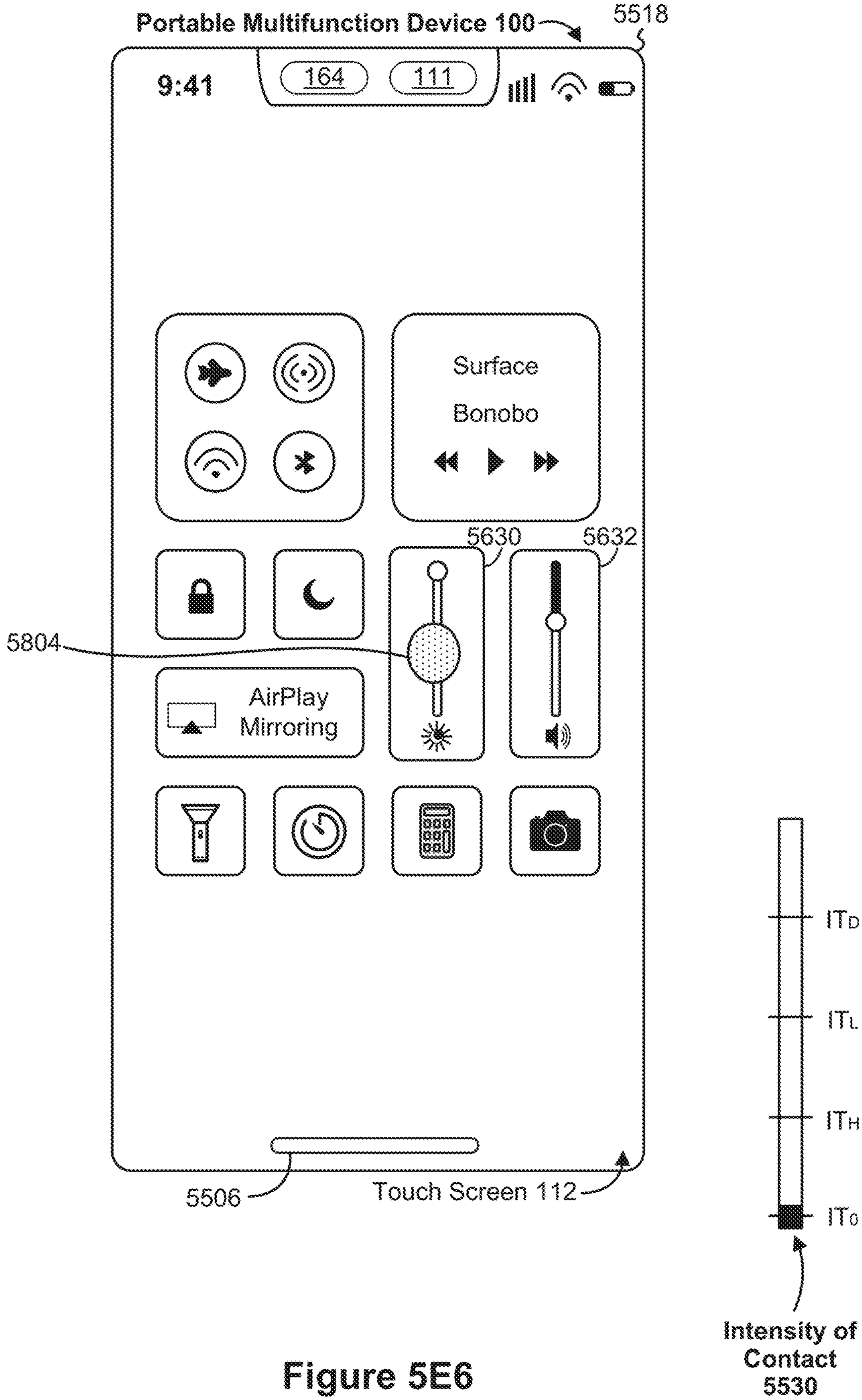
Figure 5E6

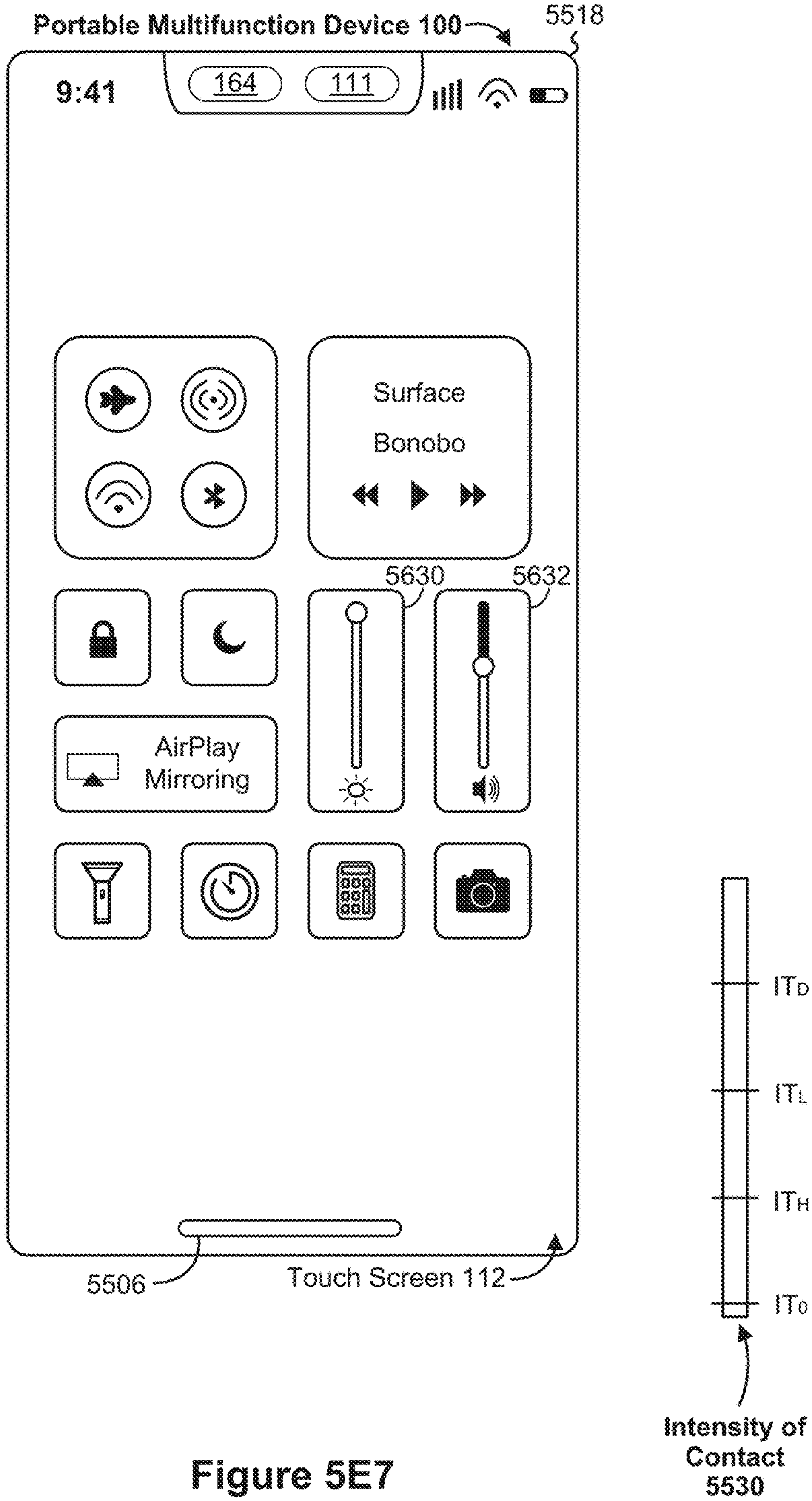
Figure 5E7

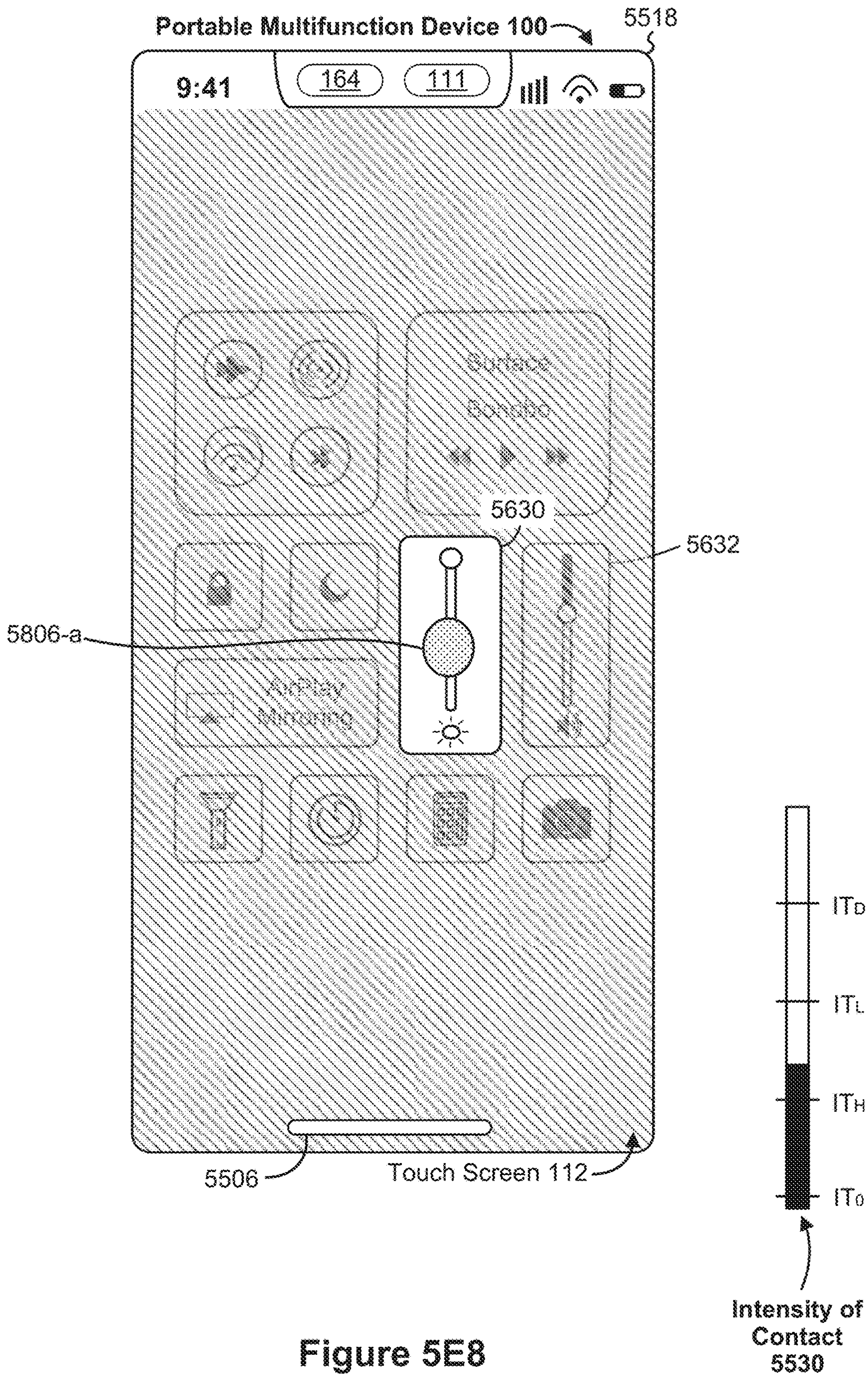
Figure 5E8

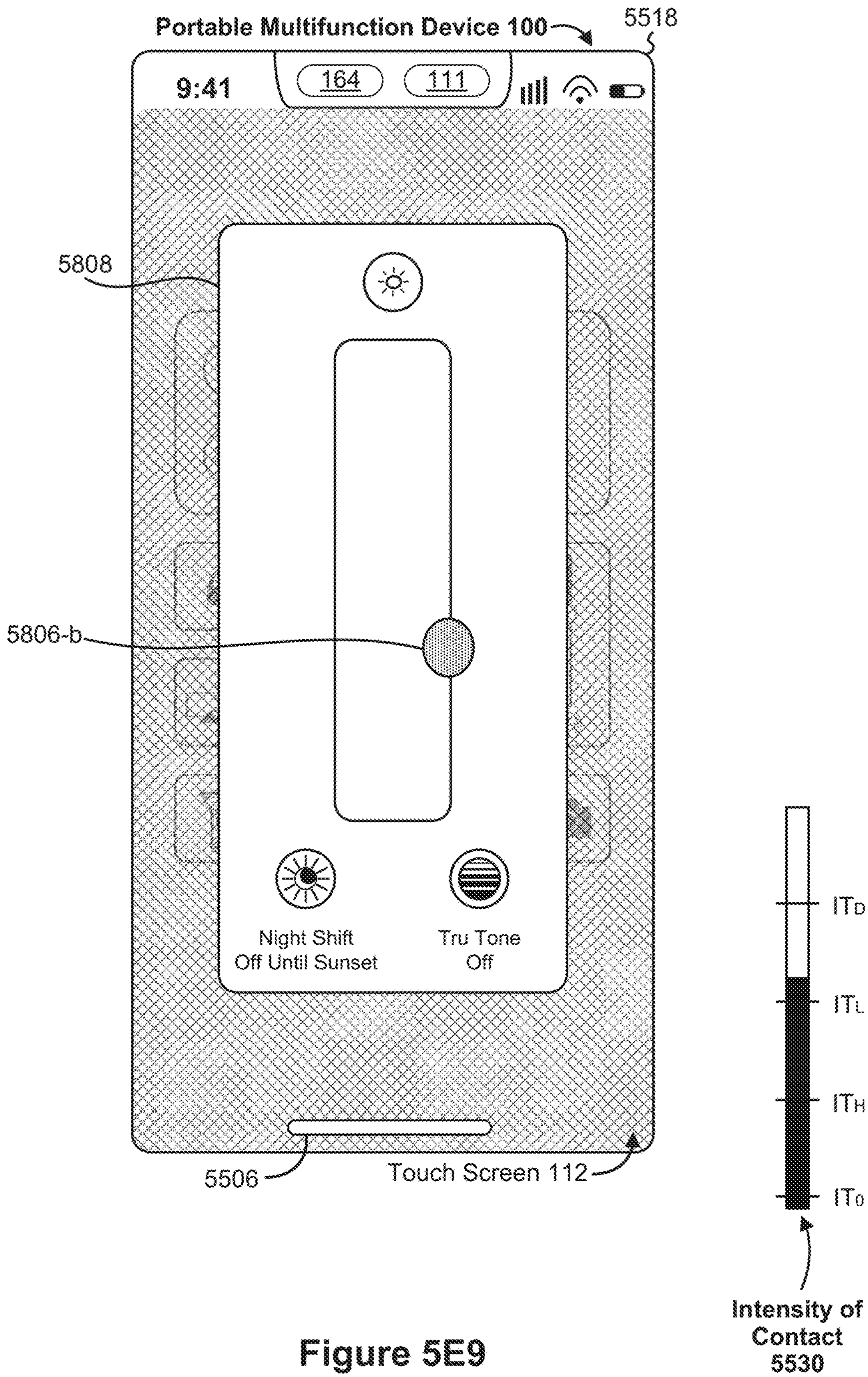
Figure 5E9

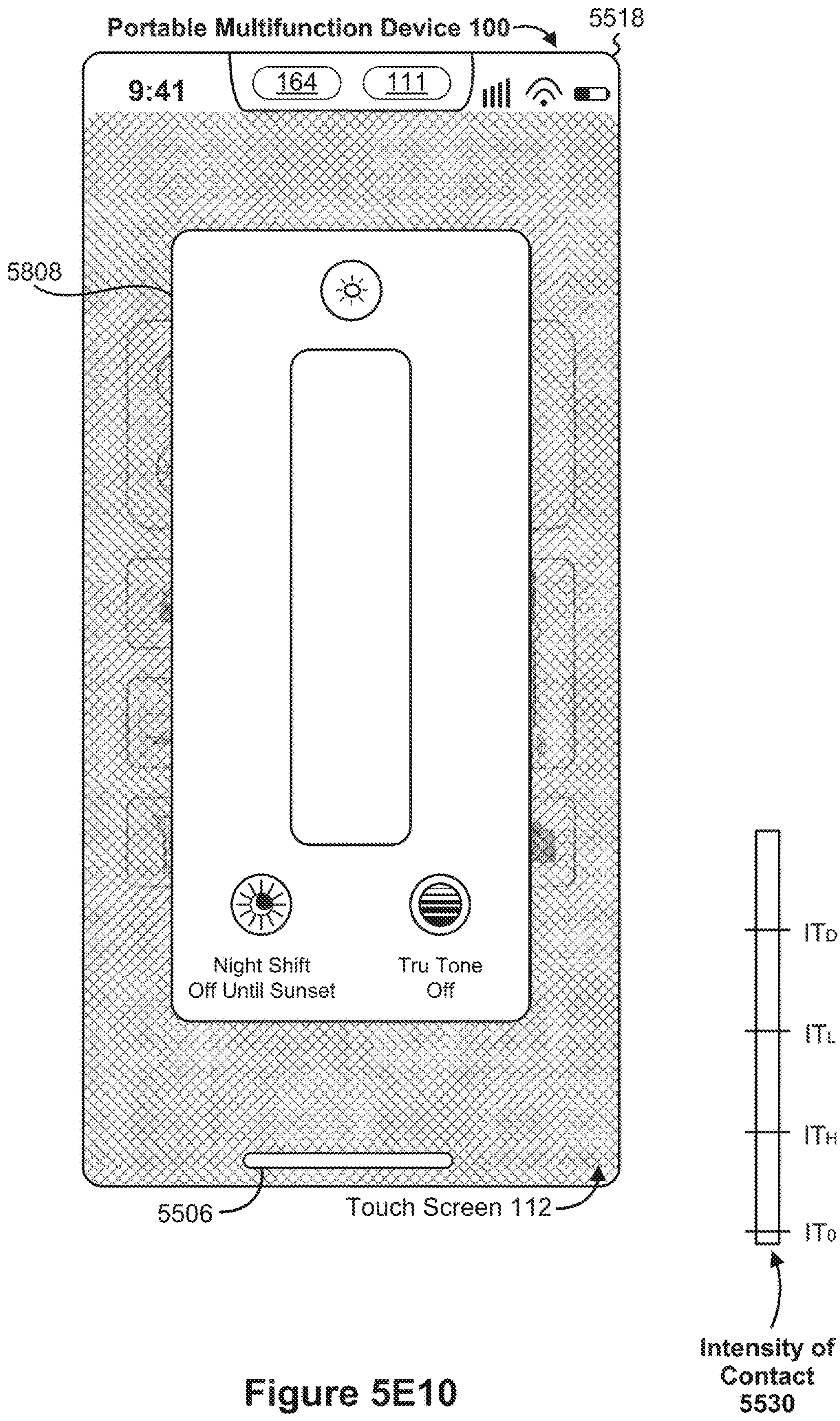
Figure 5E10

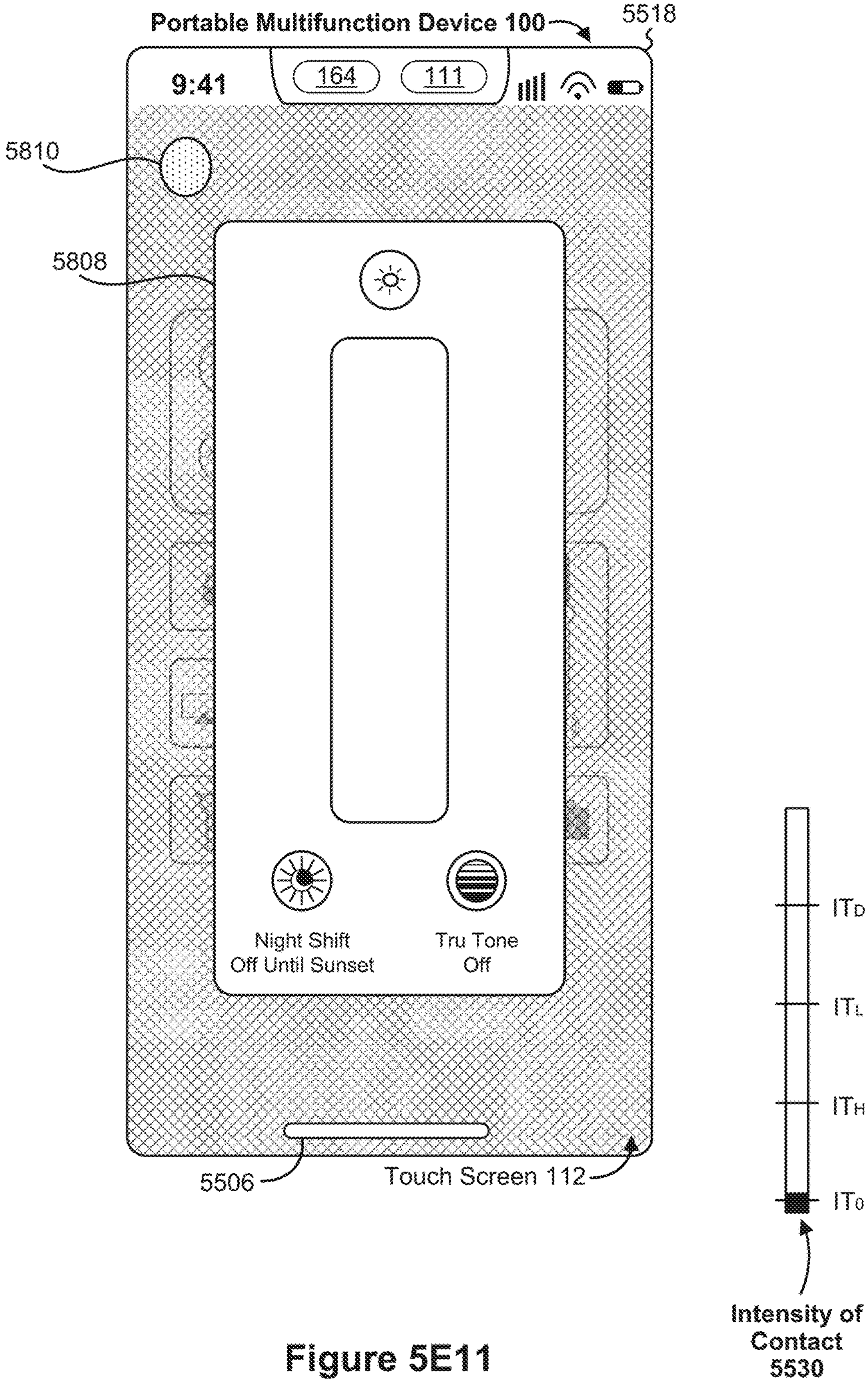
Figure 5E11

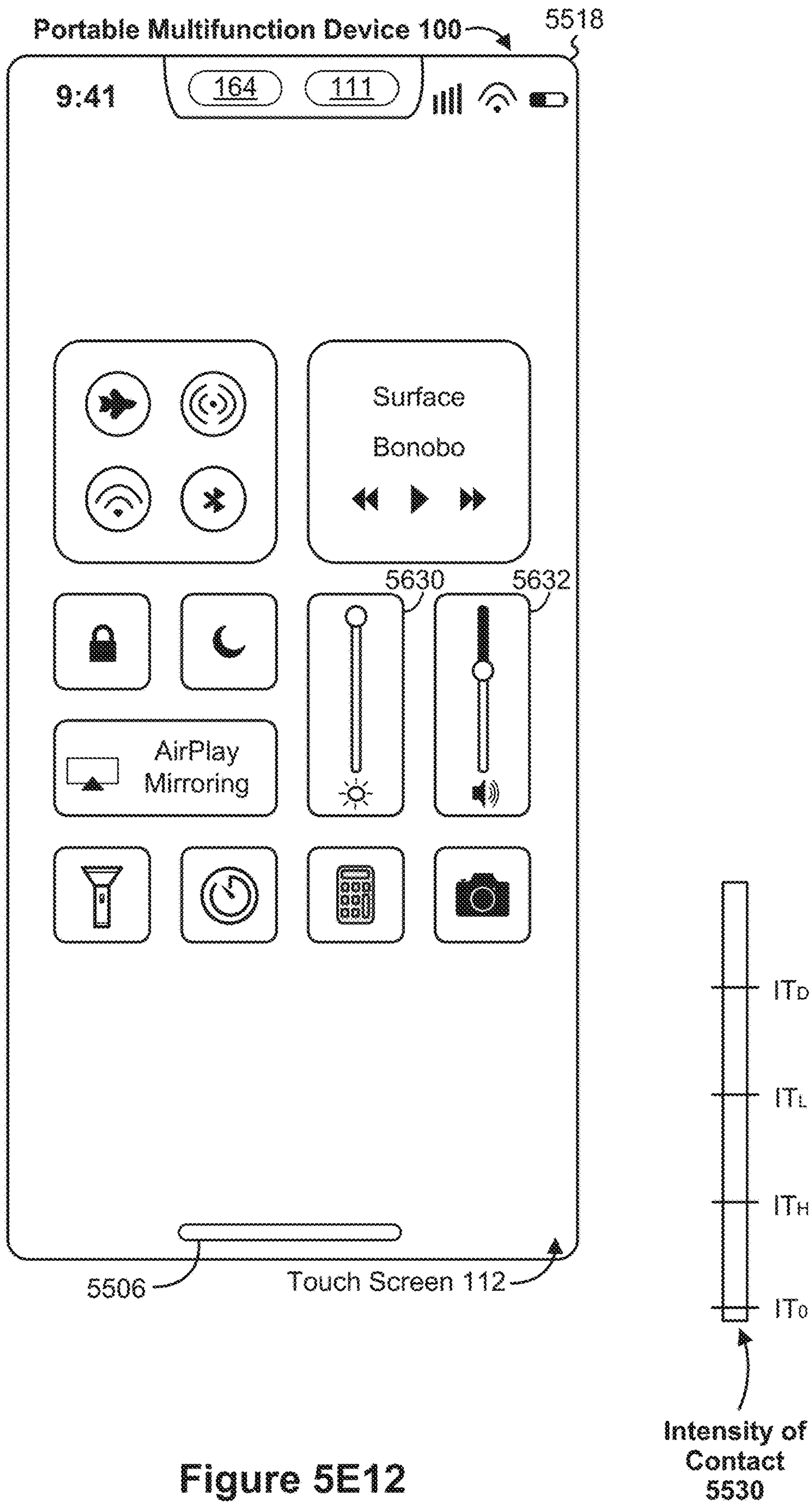
Figure 5E12

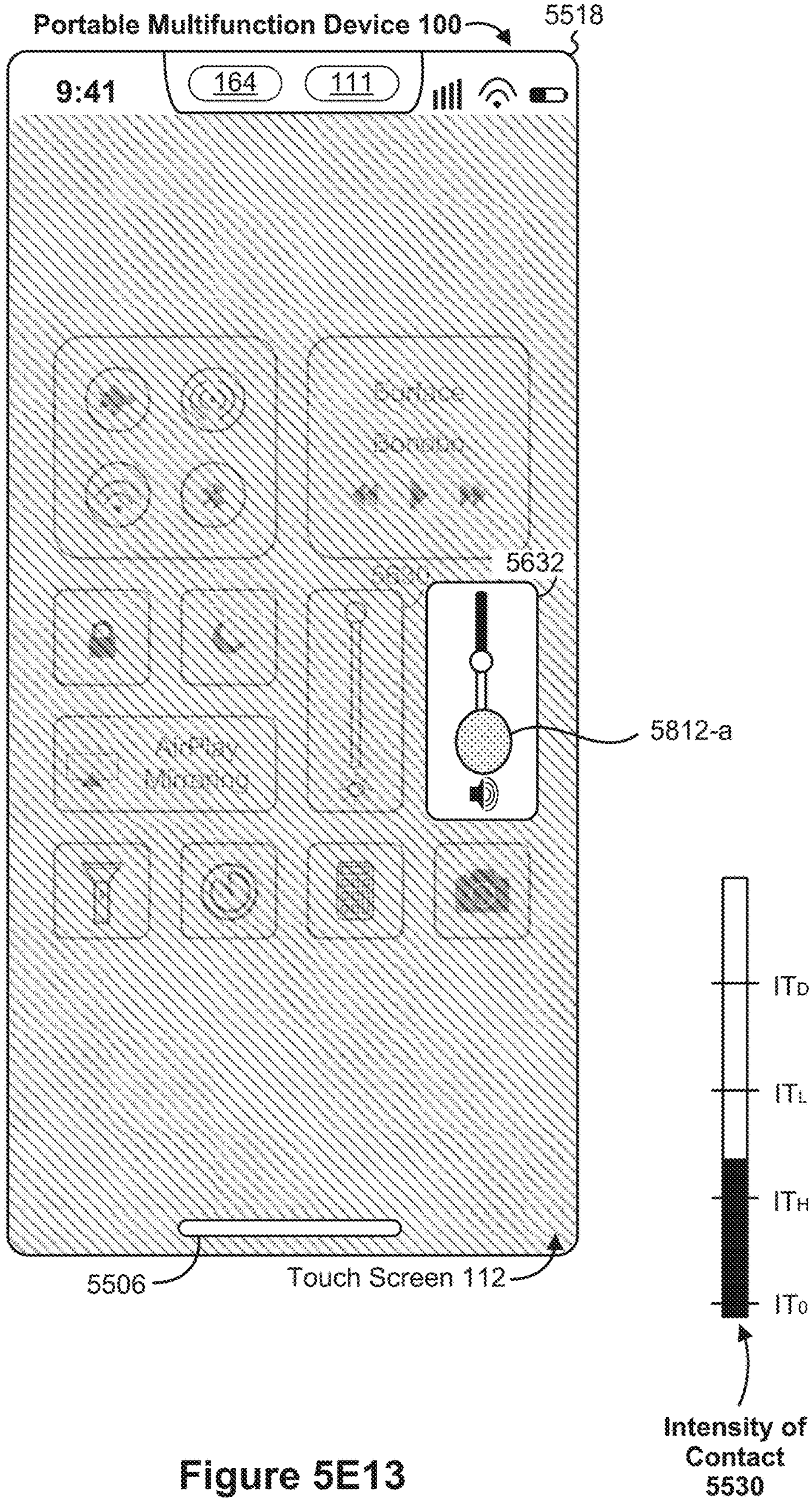
Figure 5E13

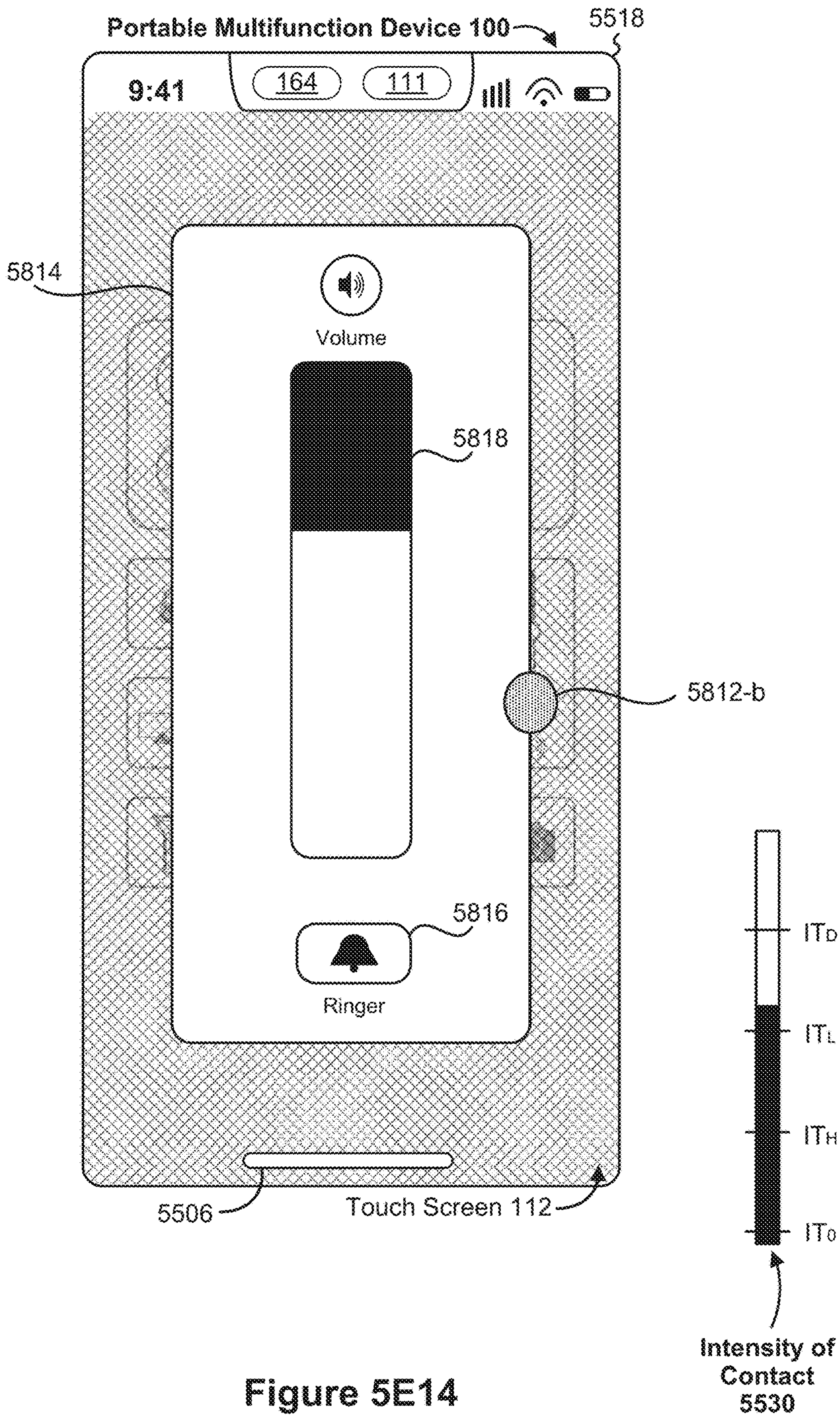
Figure 5E14

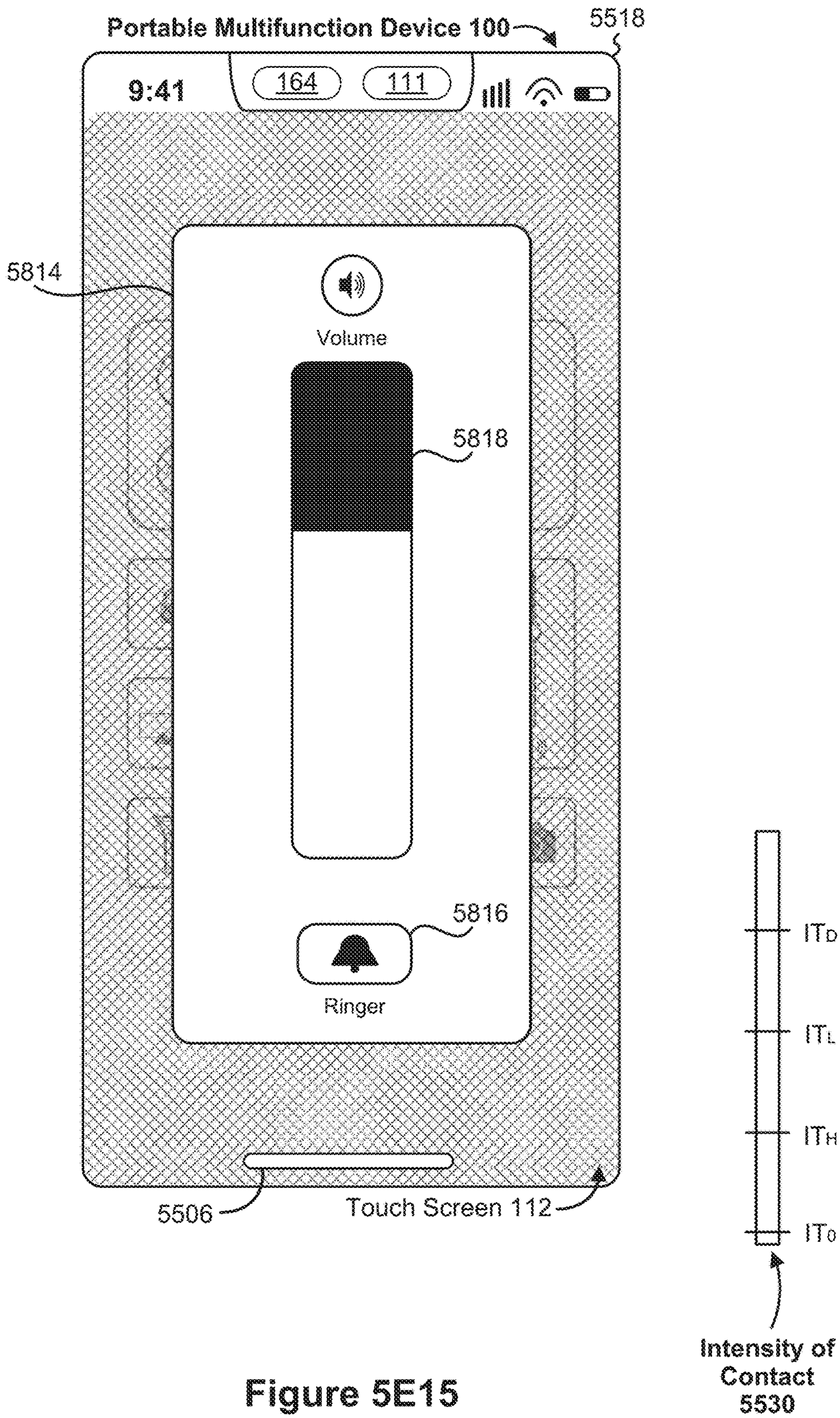
Figure 5E15

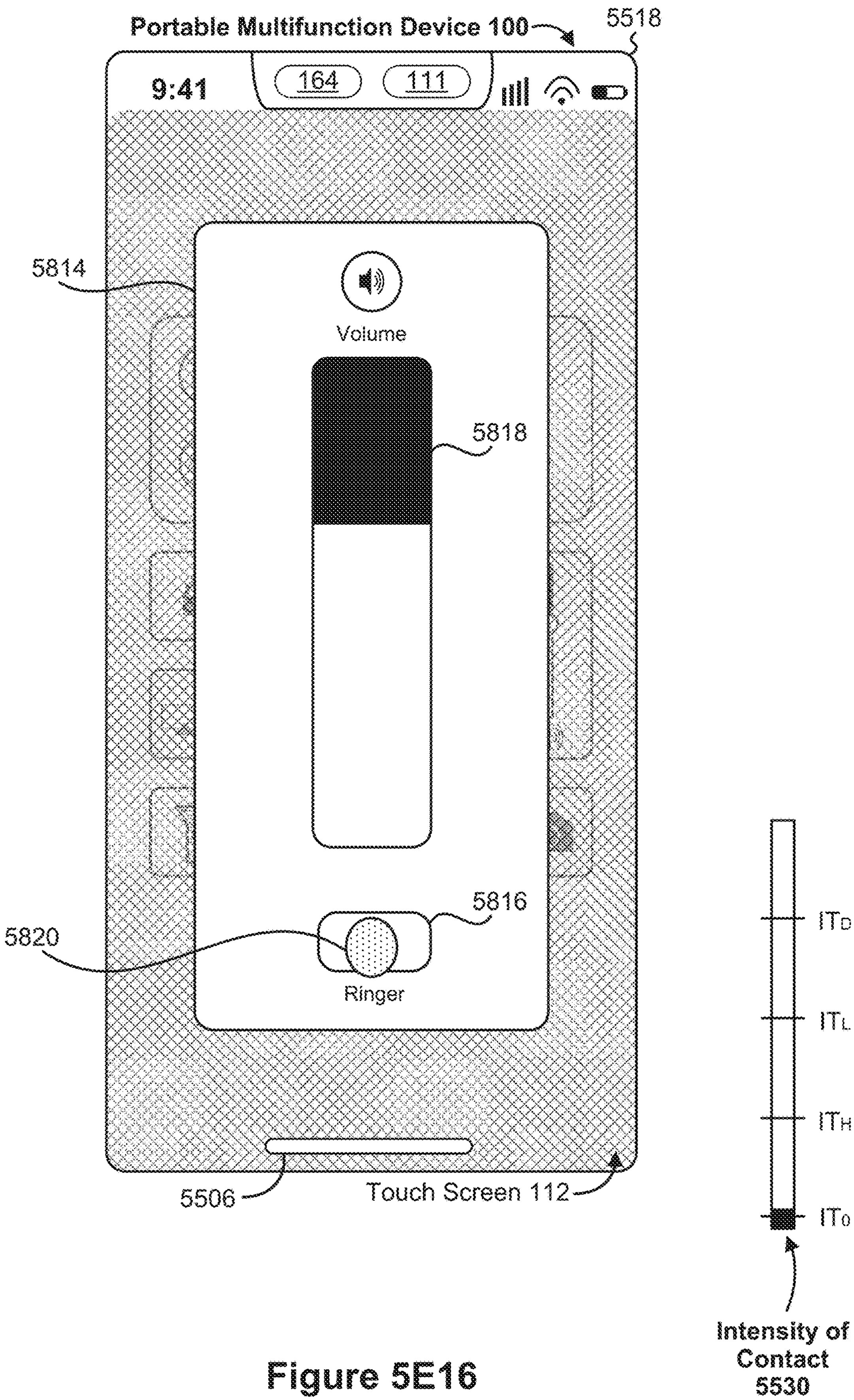
Figure 5E16

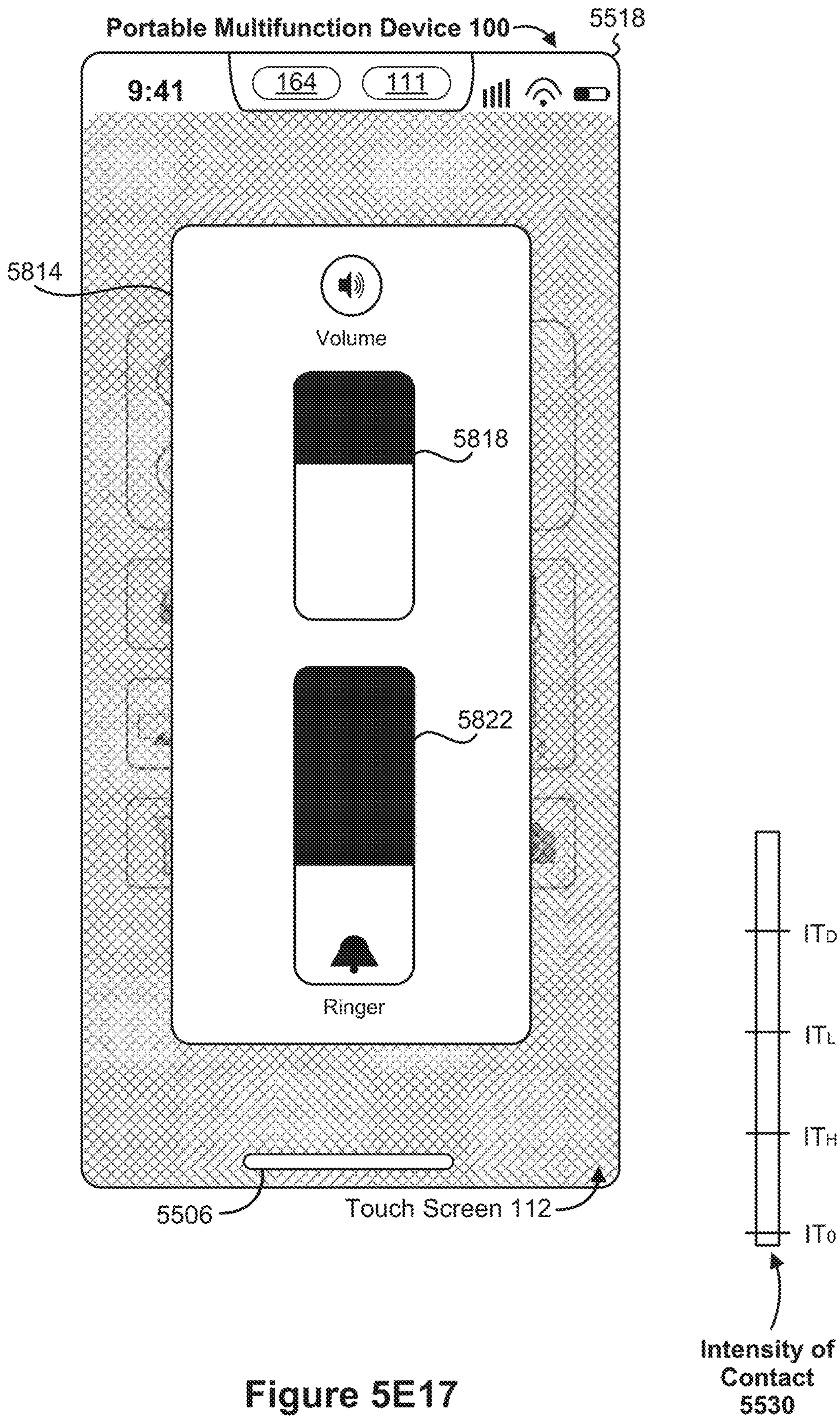
Figure 5E17

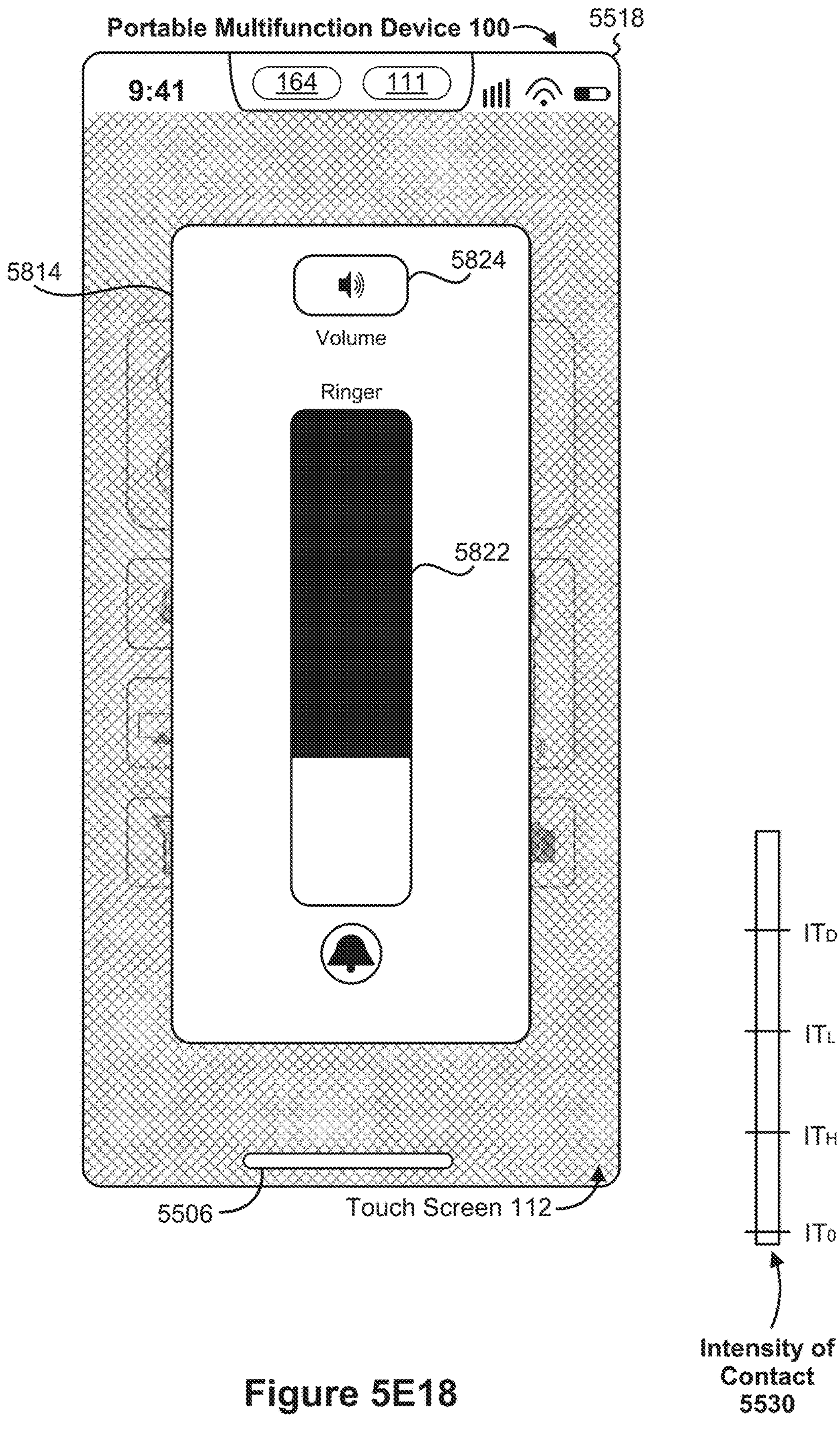
Figure 5E18

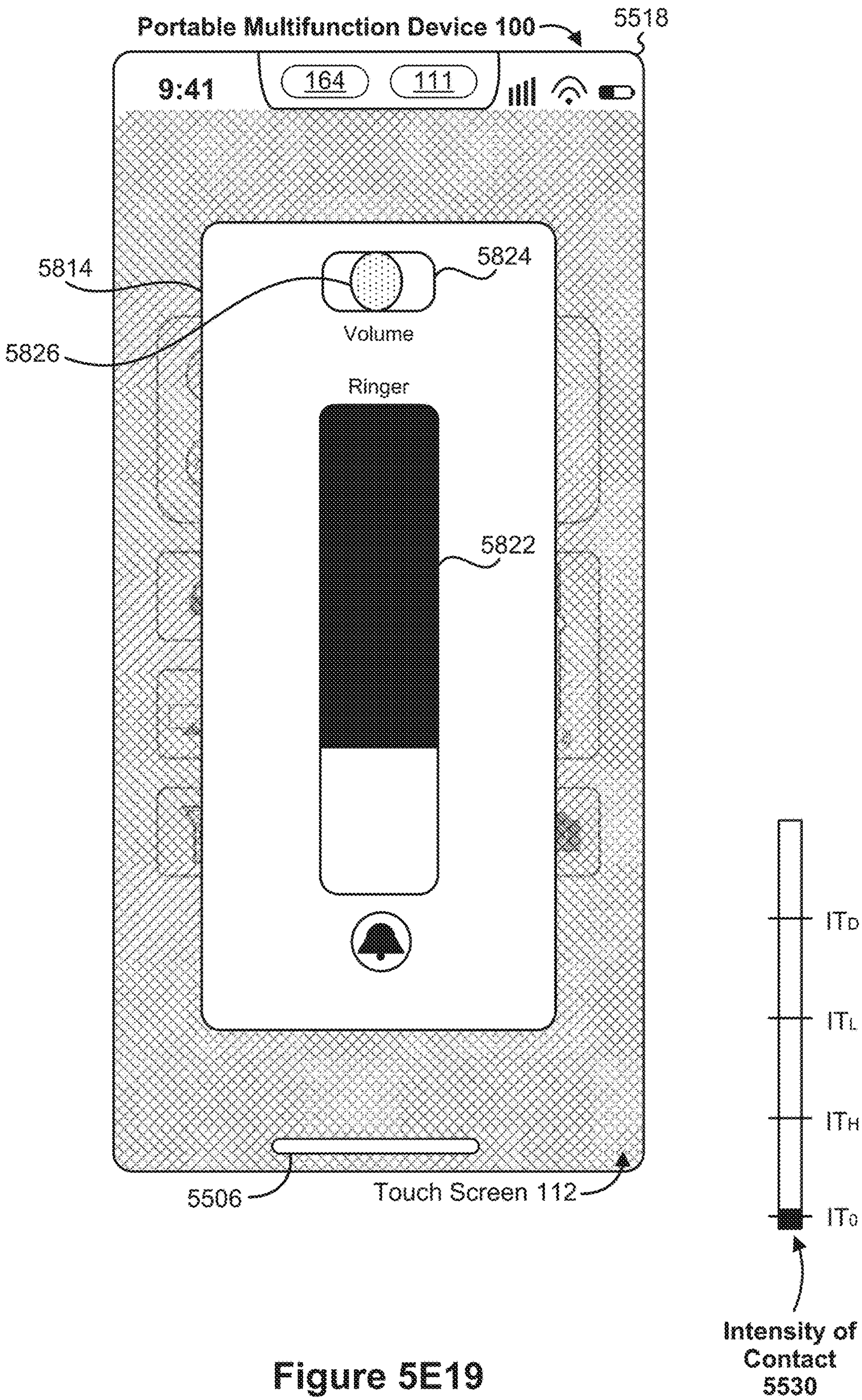
Figure 5E19

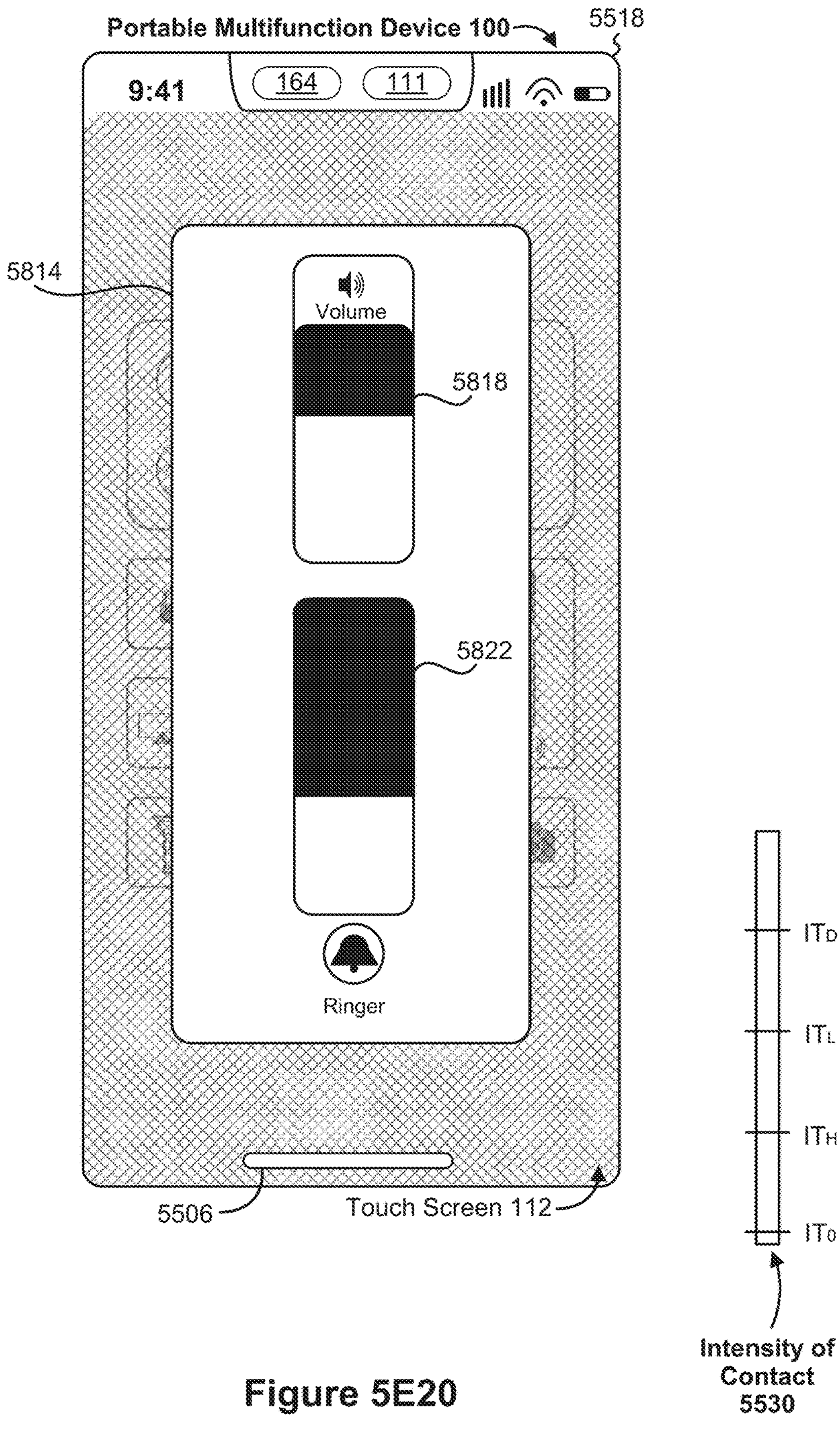
Figure 5E20

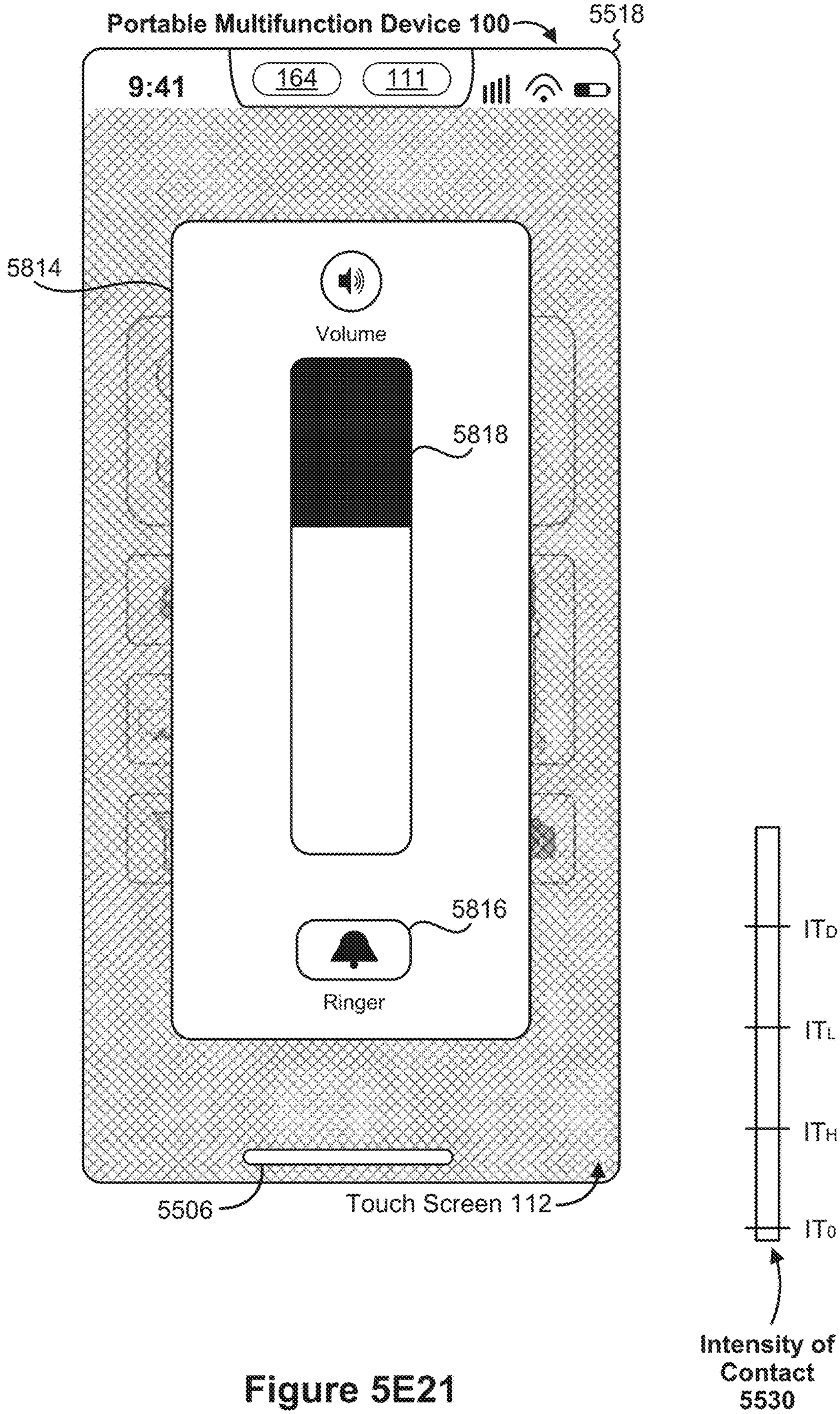
Figure 5E21

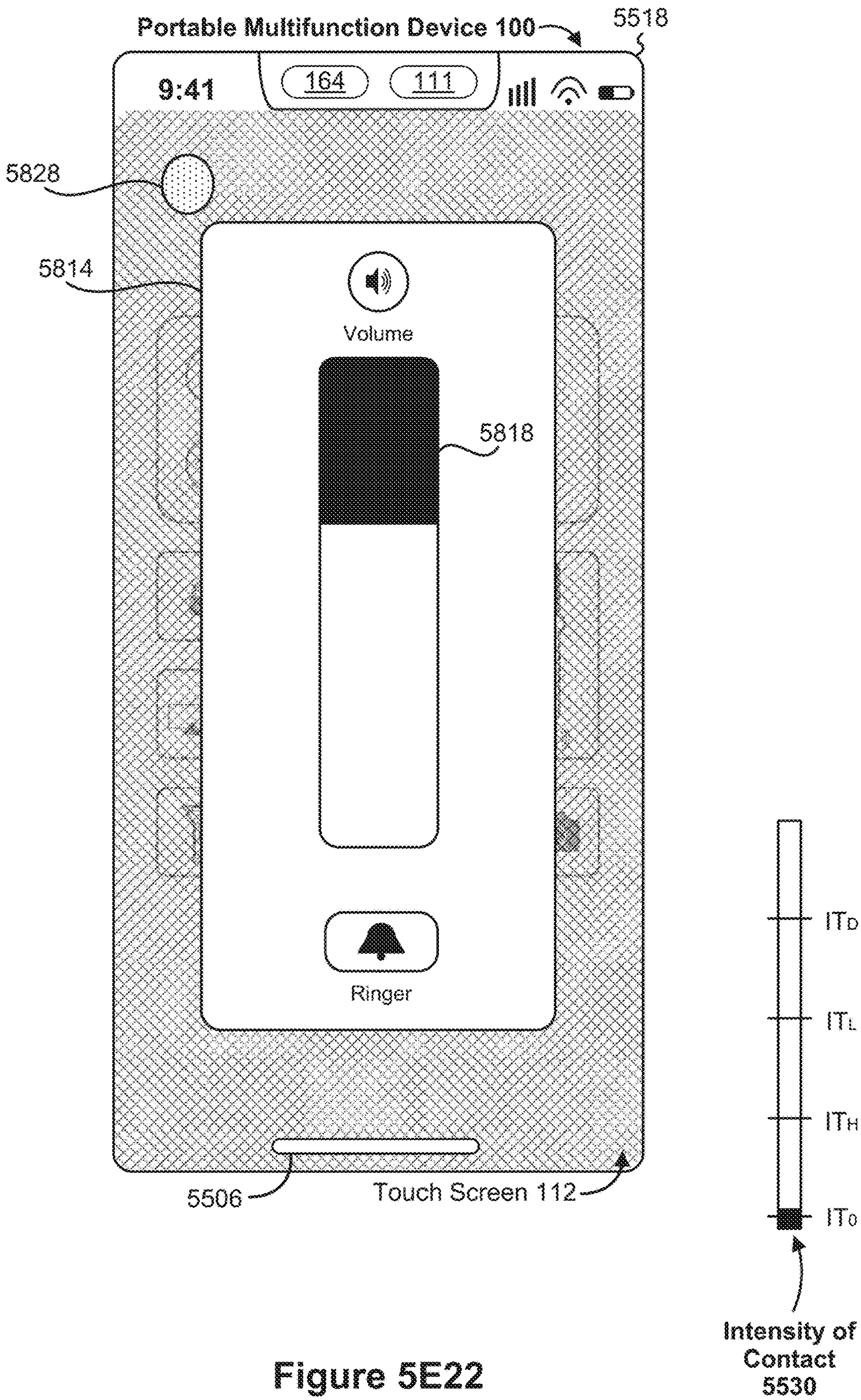
Figure 5E22

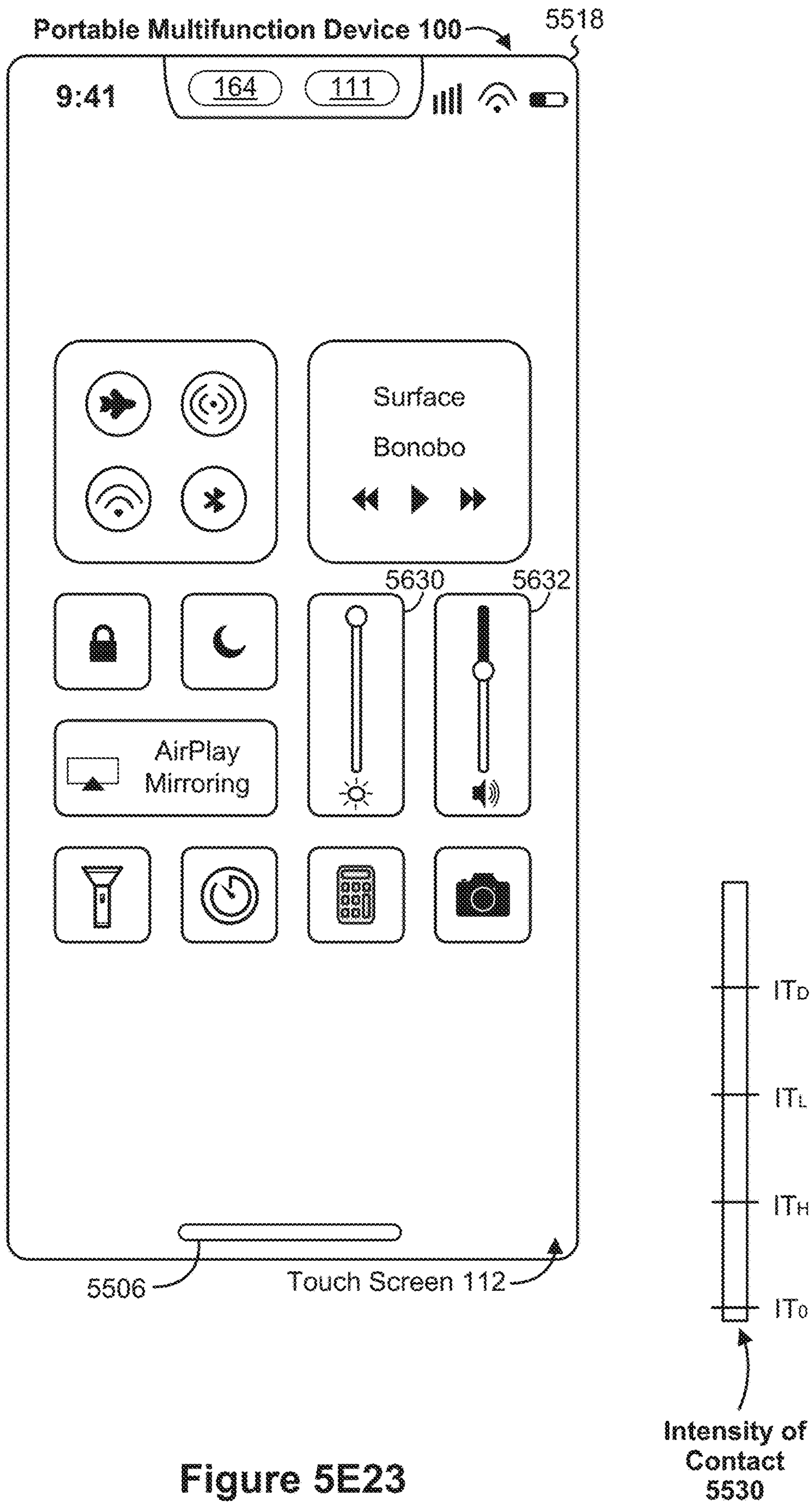
Figure 5E23

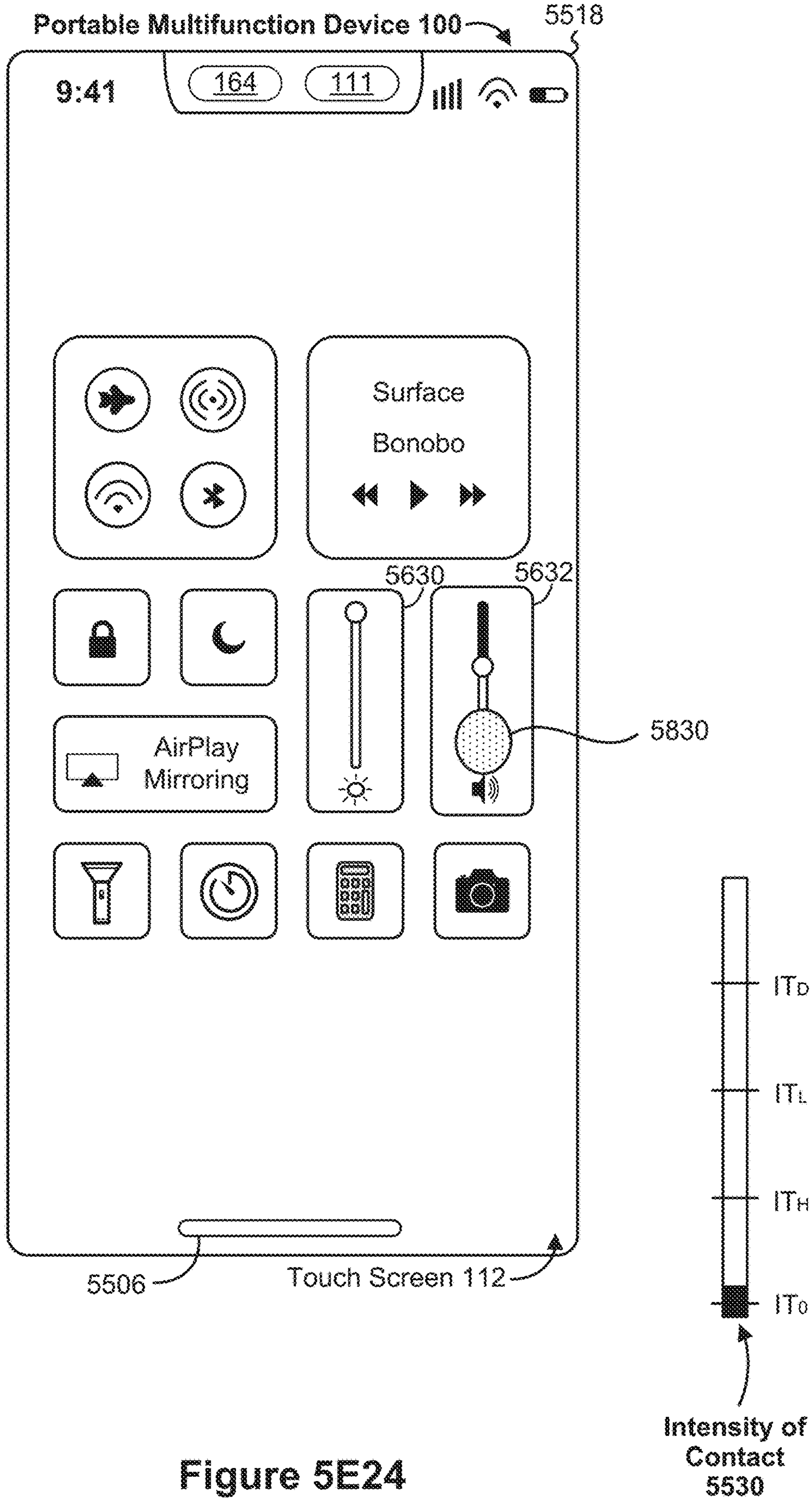
Figure 5E24

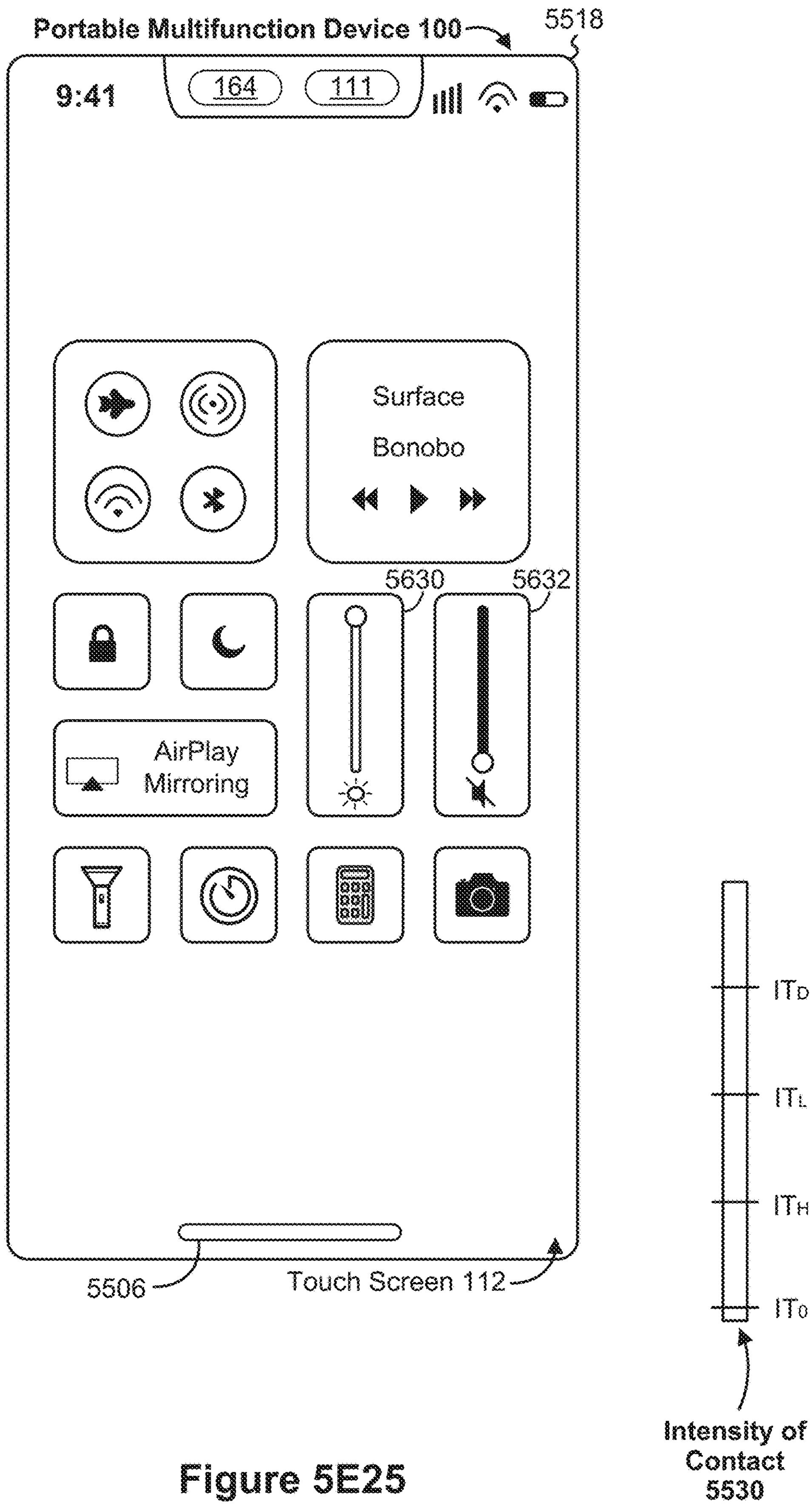
Figure 5E25

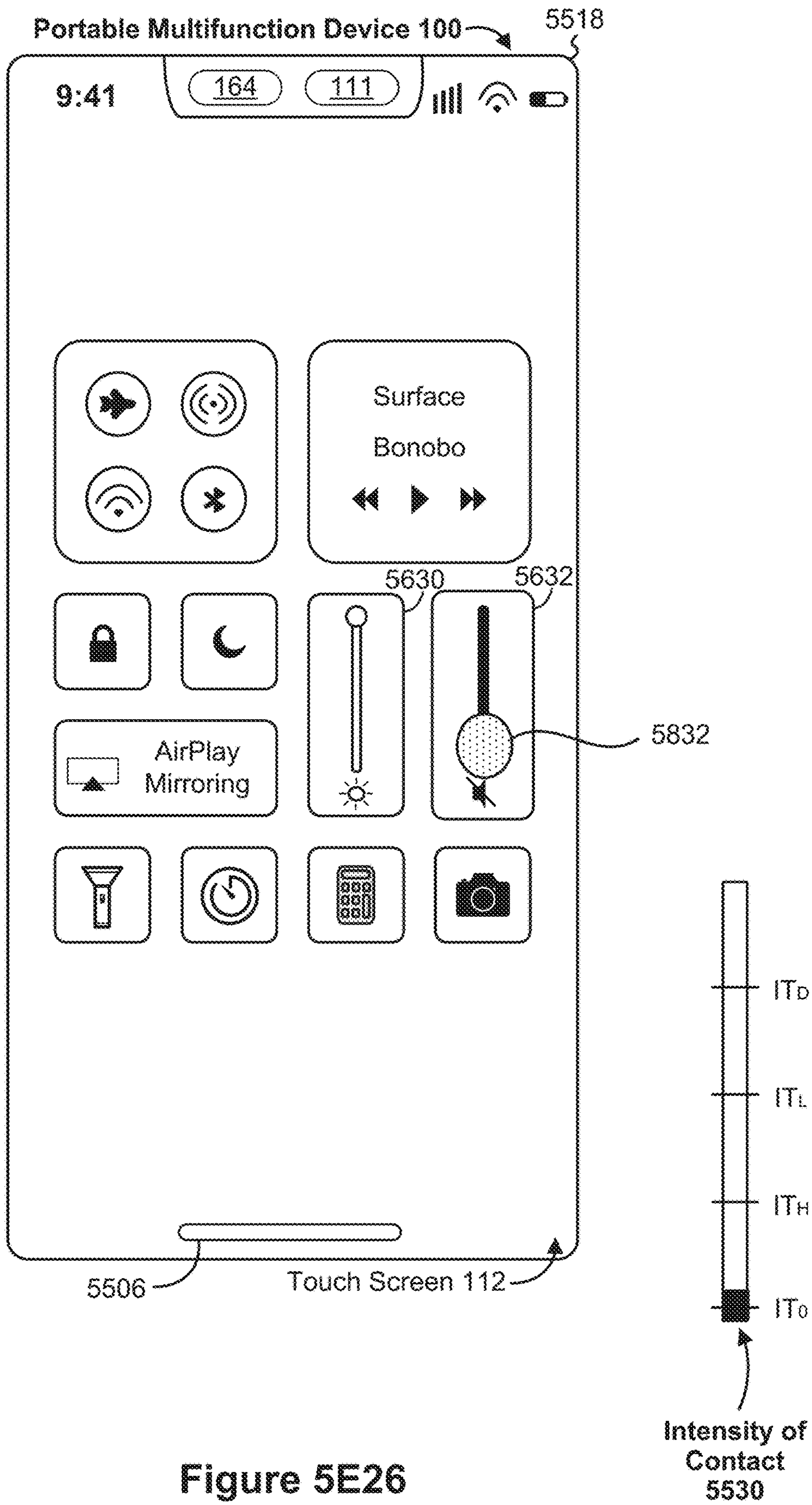
Figure 5E26

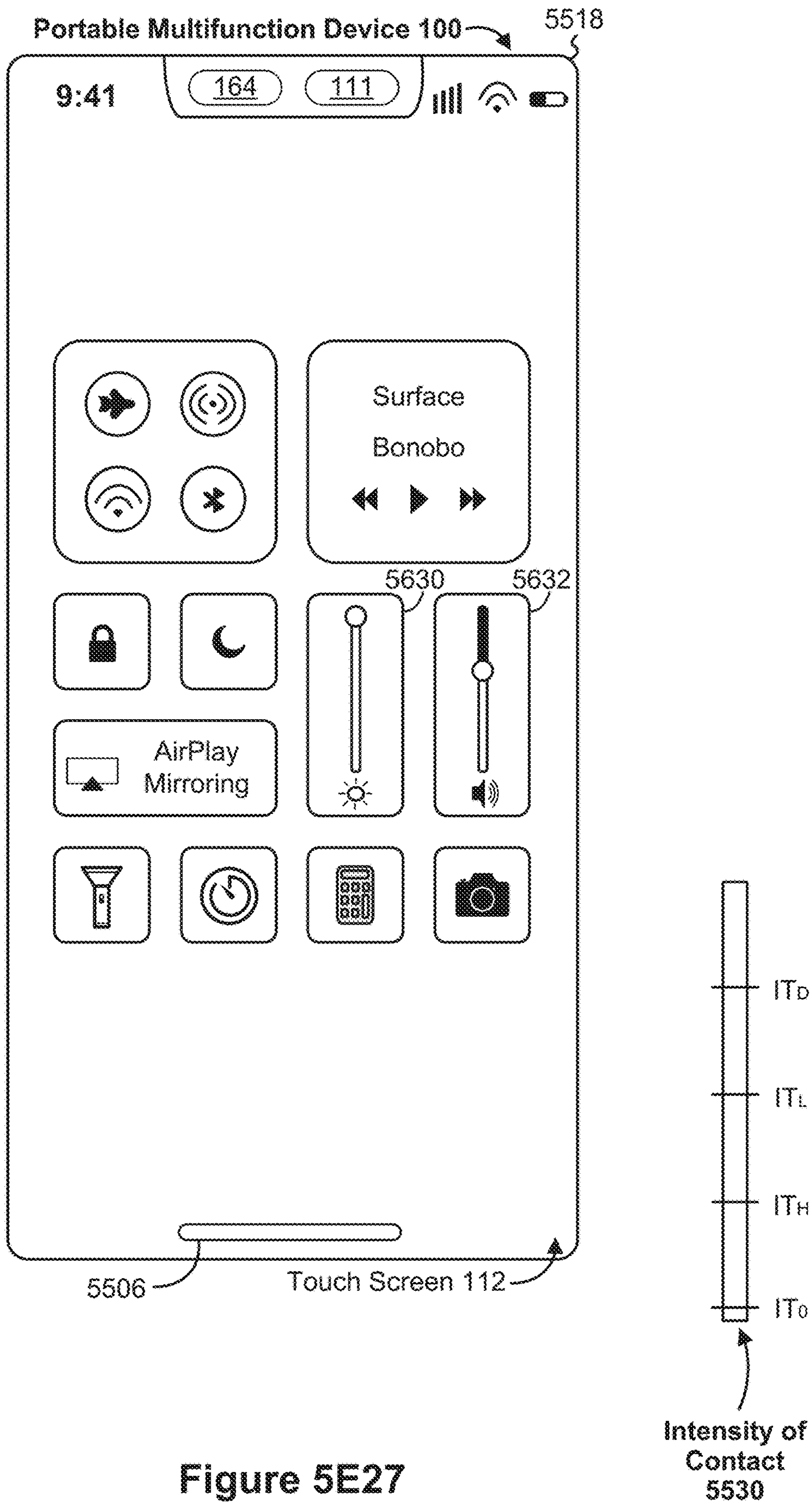
Figure 5E27

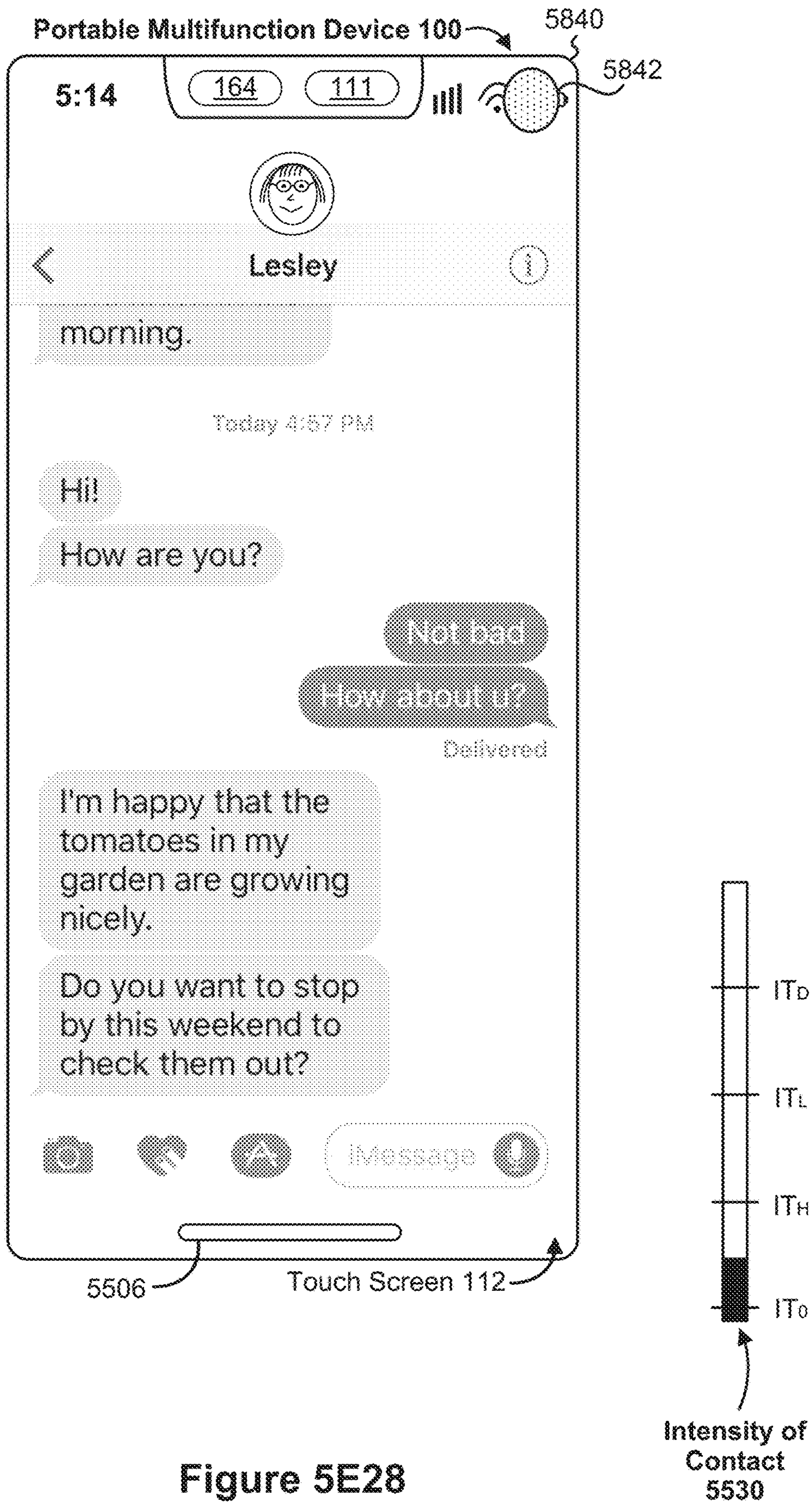
Figure 5E28

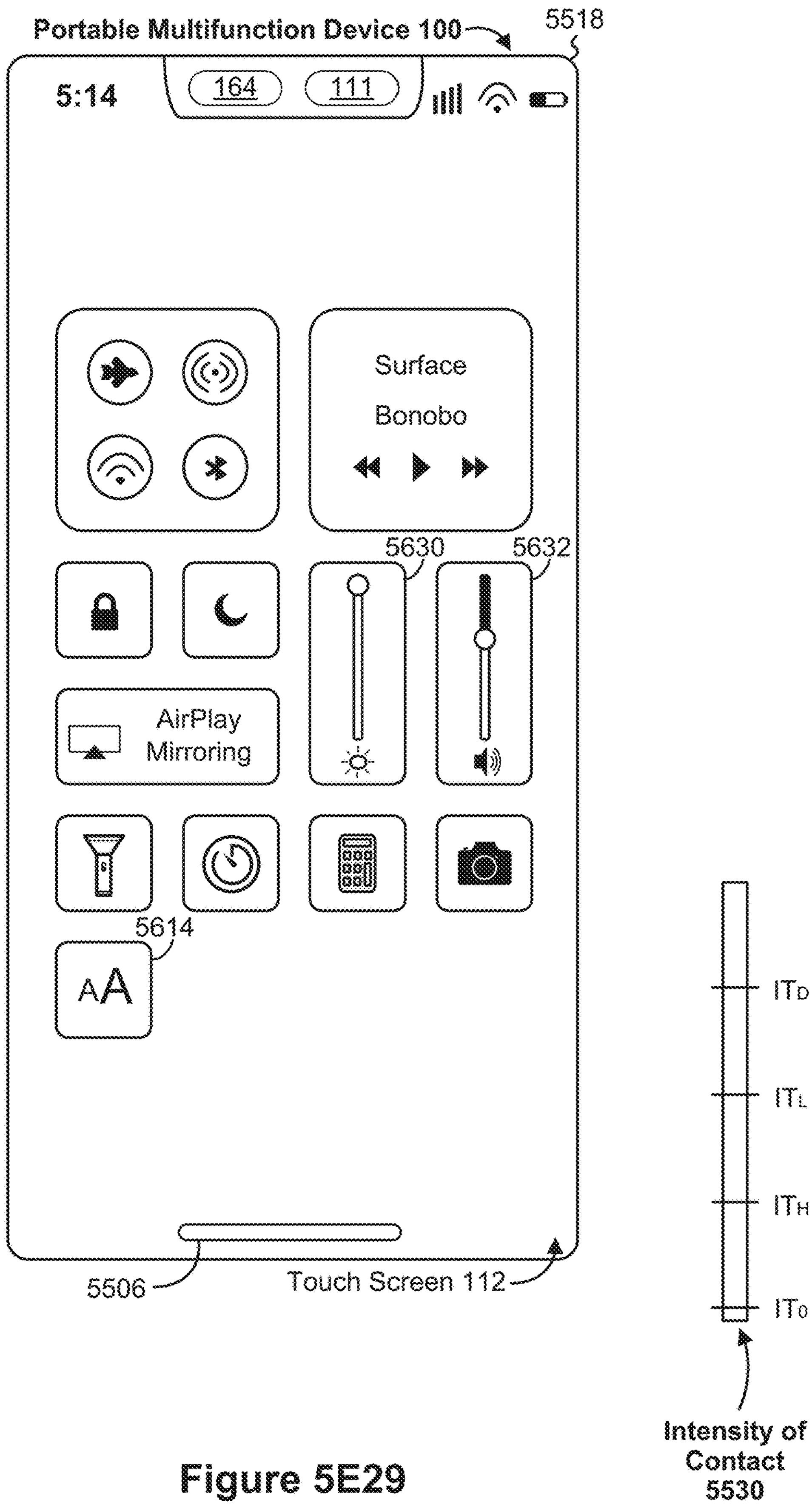
Figure 5E29

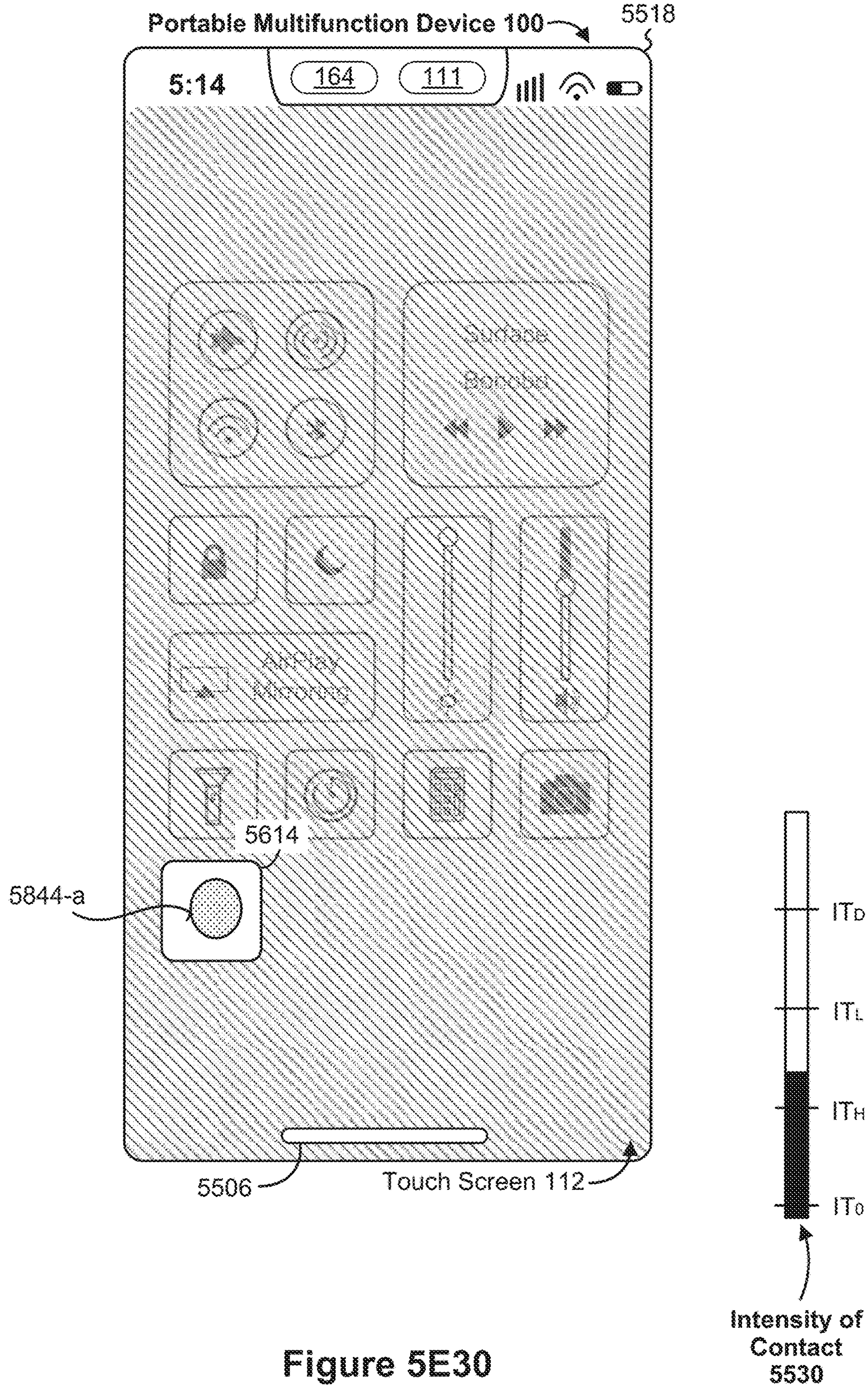
Figure 5E30

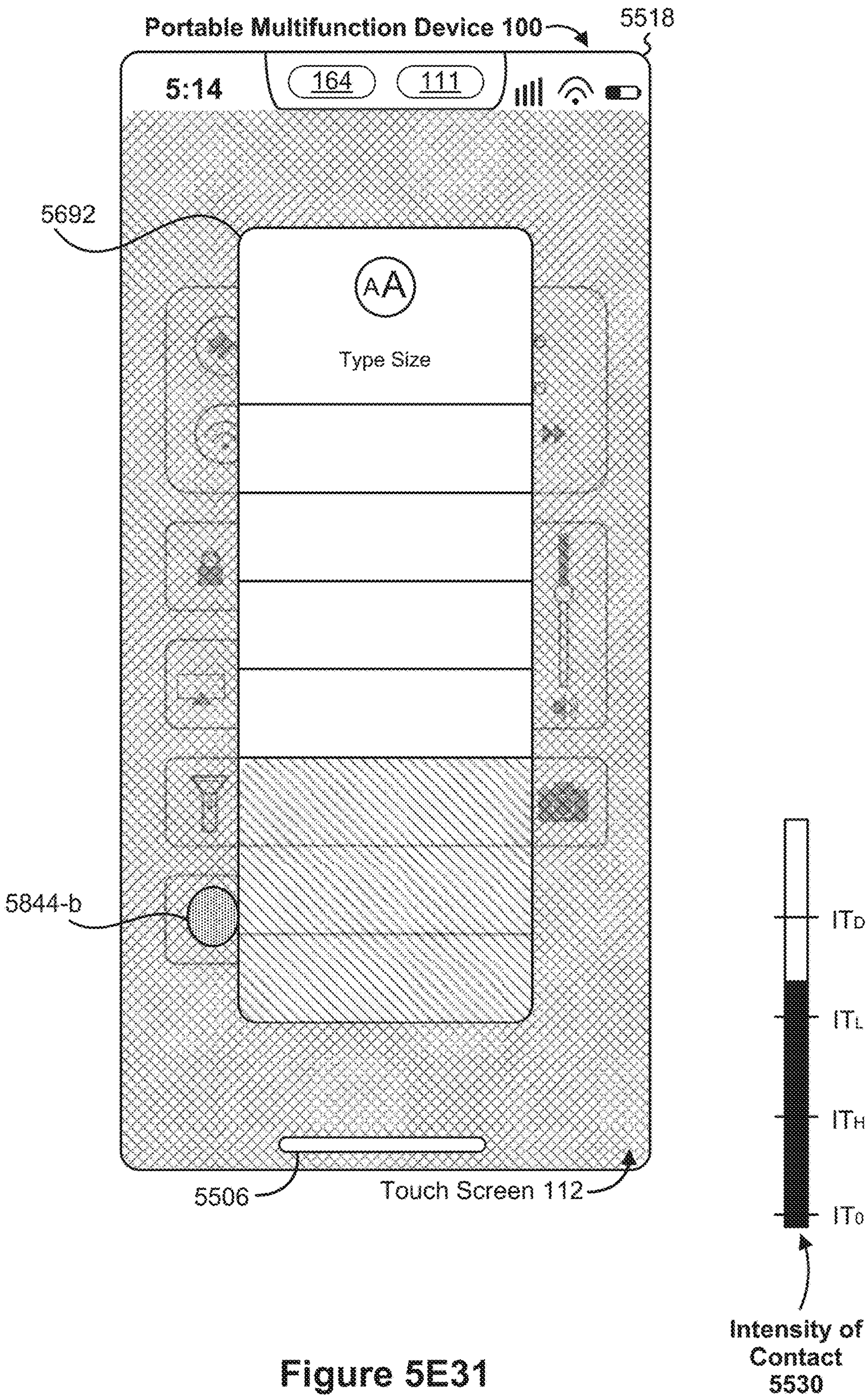
Figure 5E31

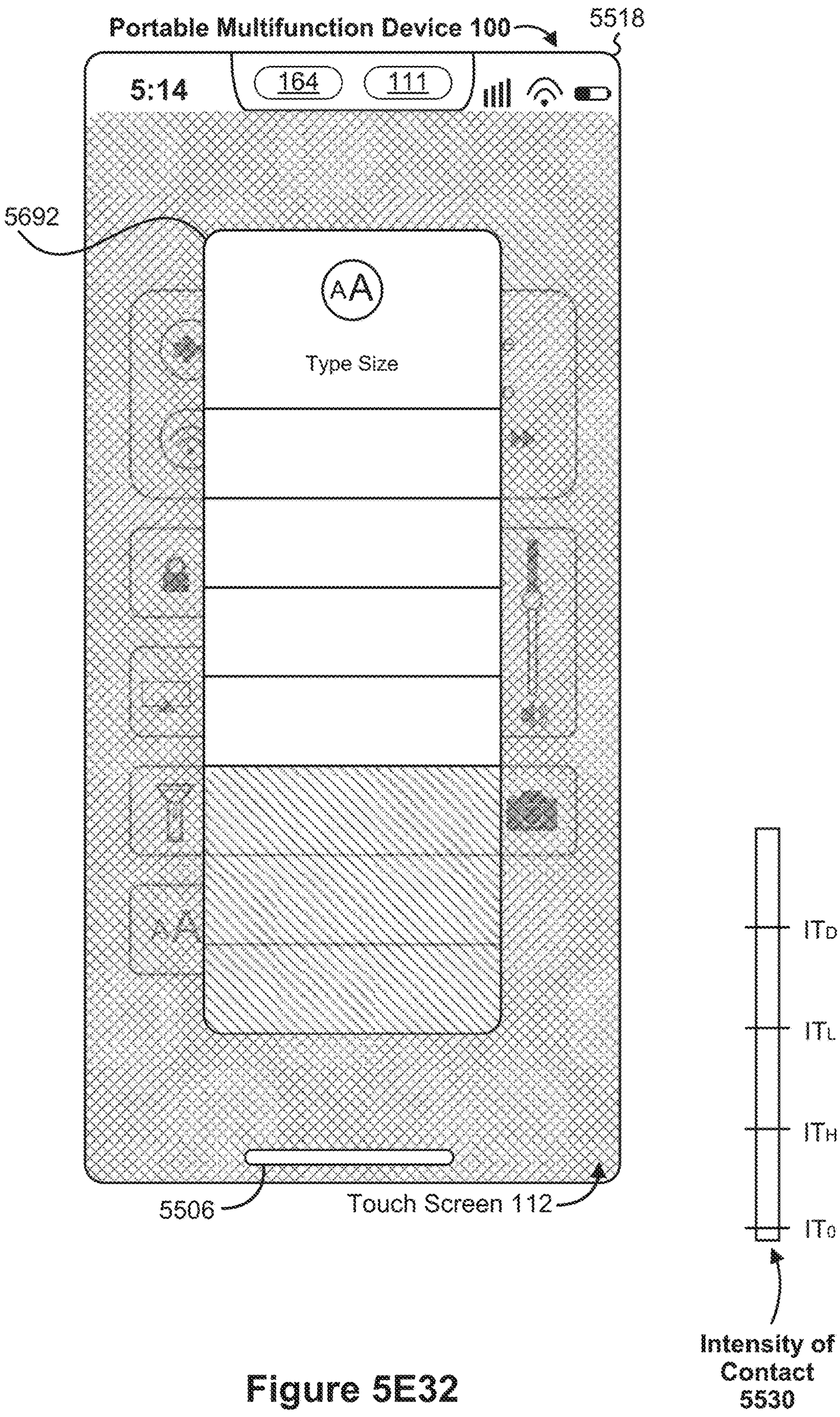
Figure 5E32

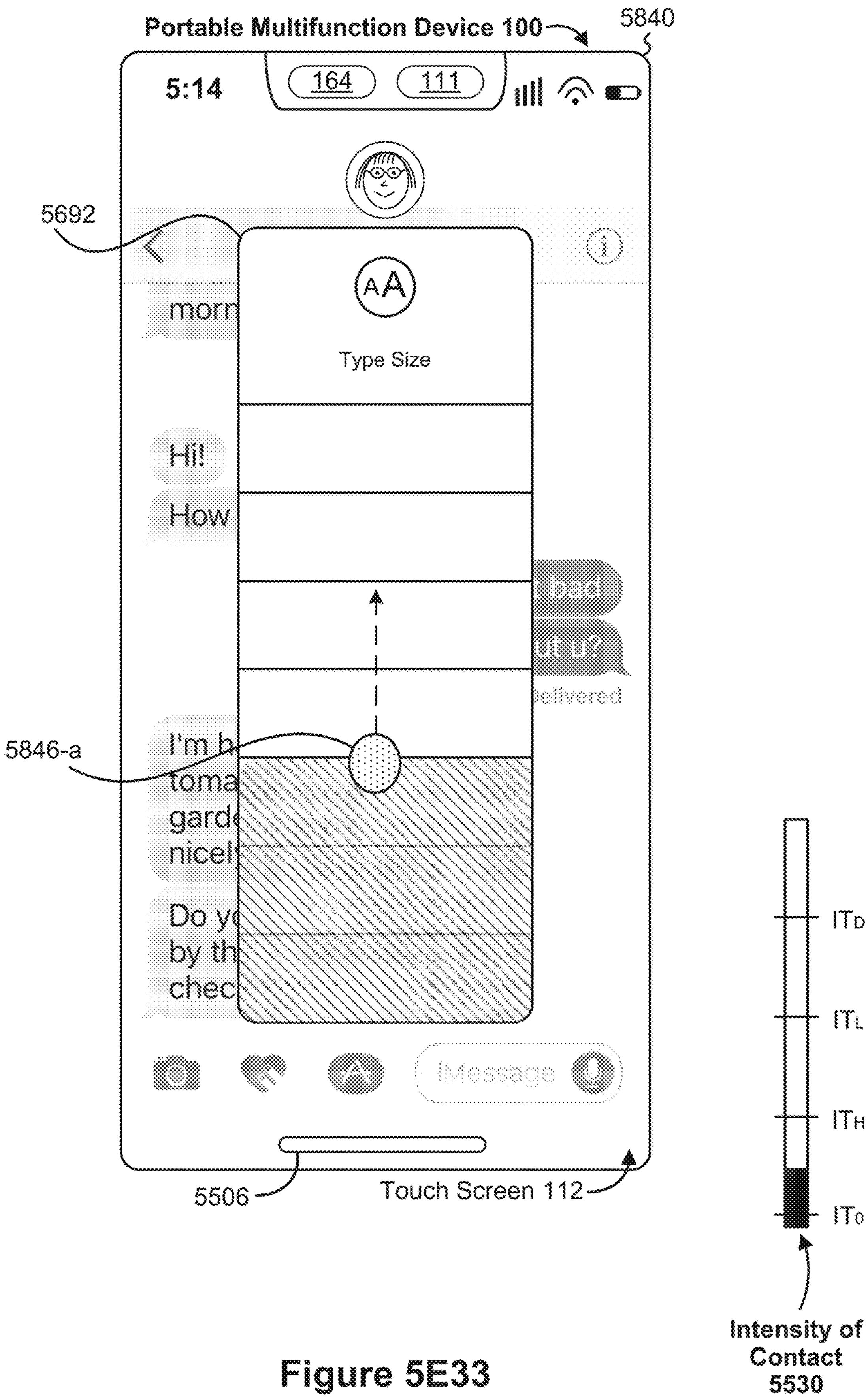
Figure 5E33

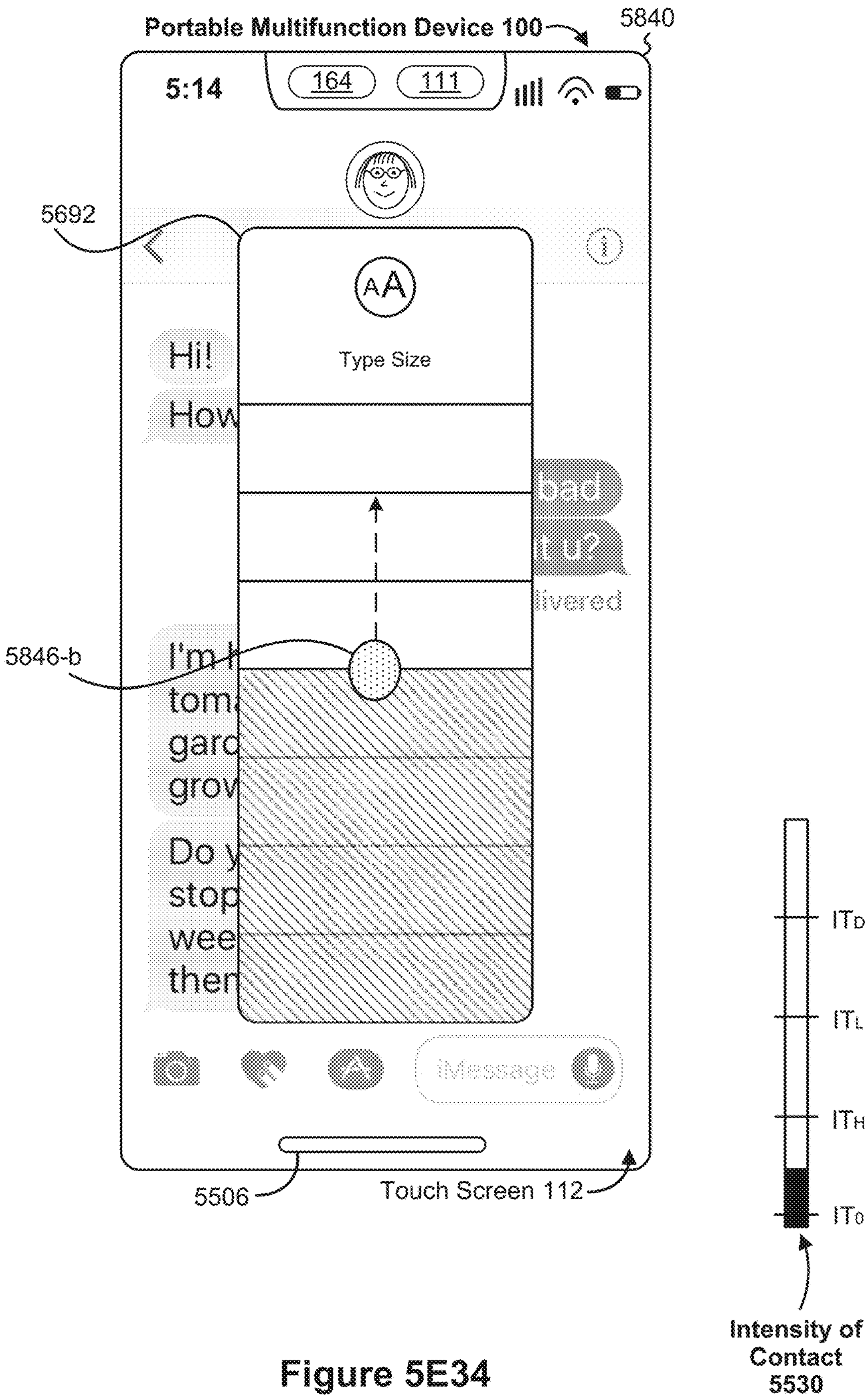
Figure 5E34

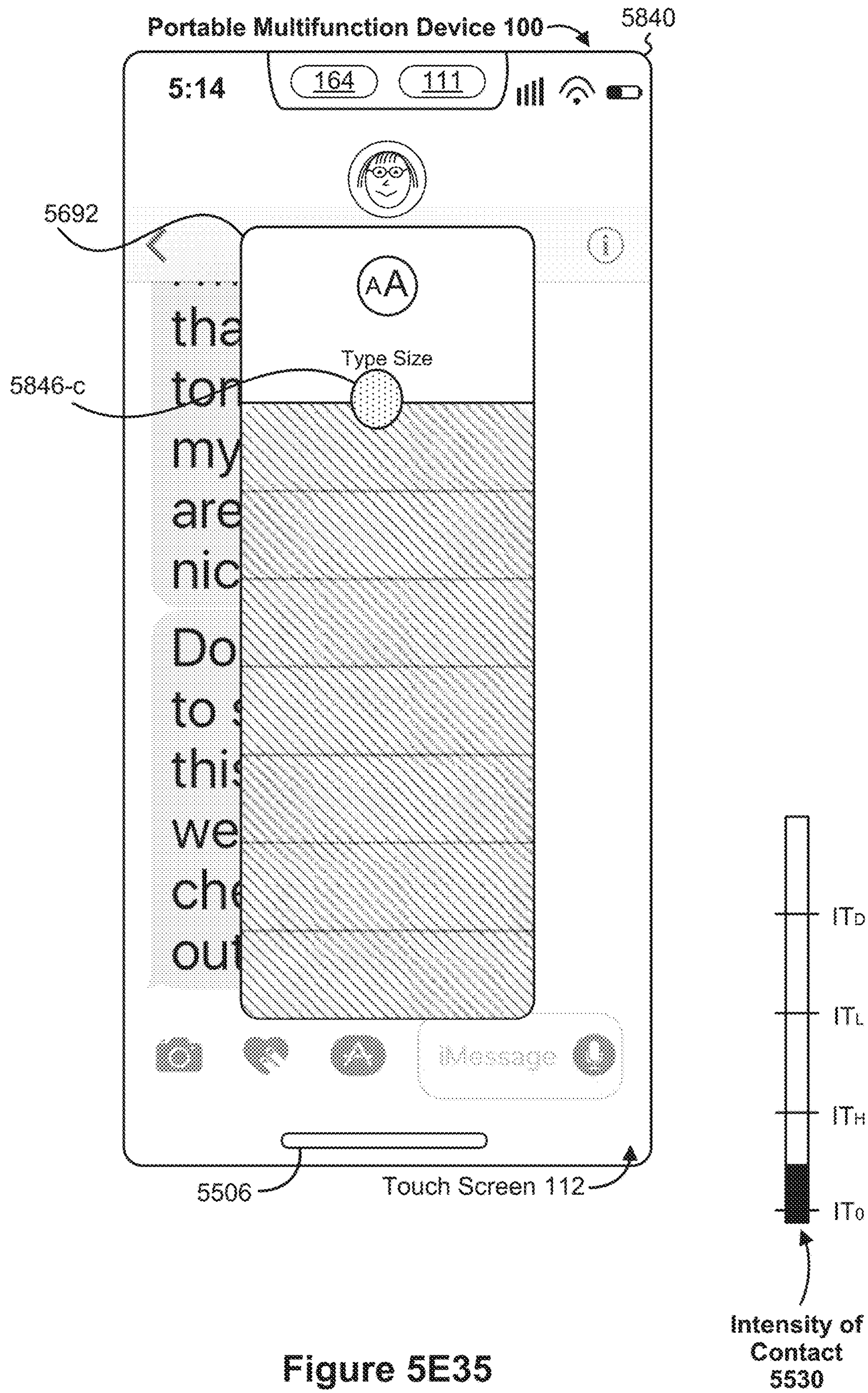
Figure 5E35

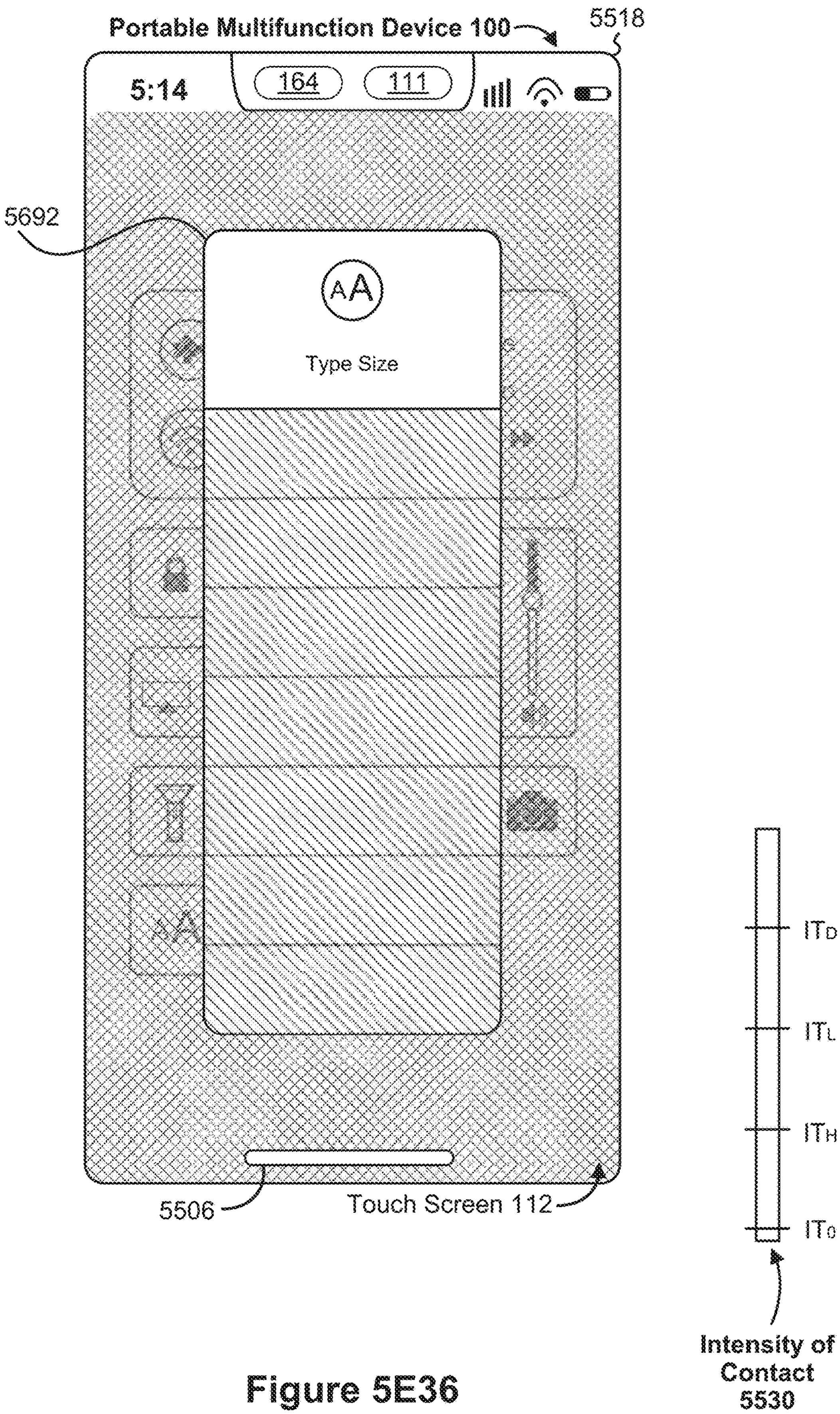
Figure 5E36

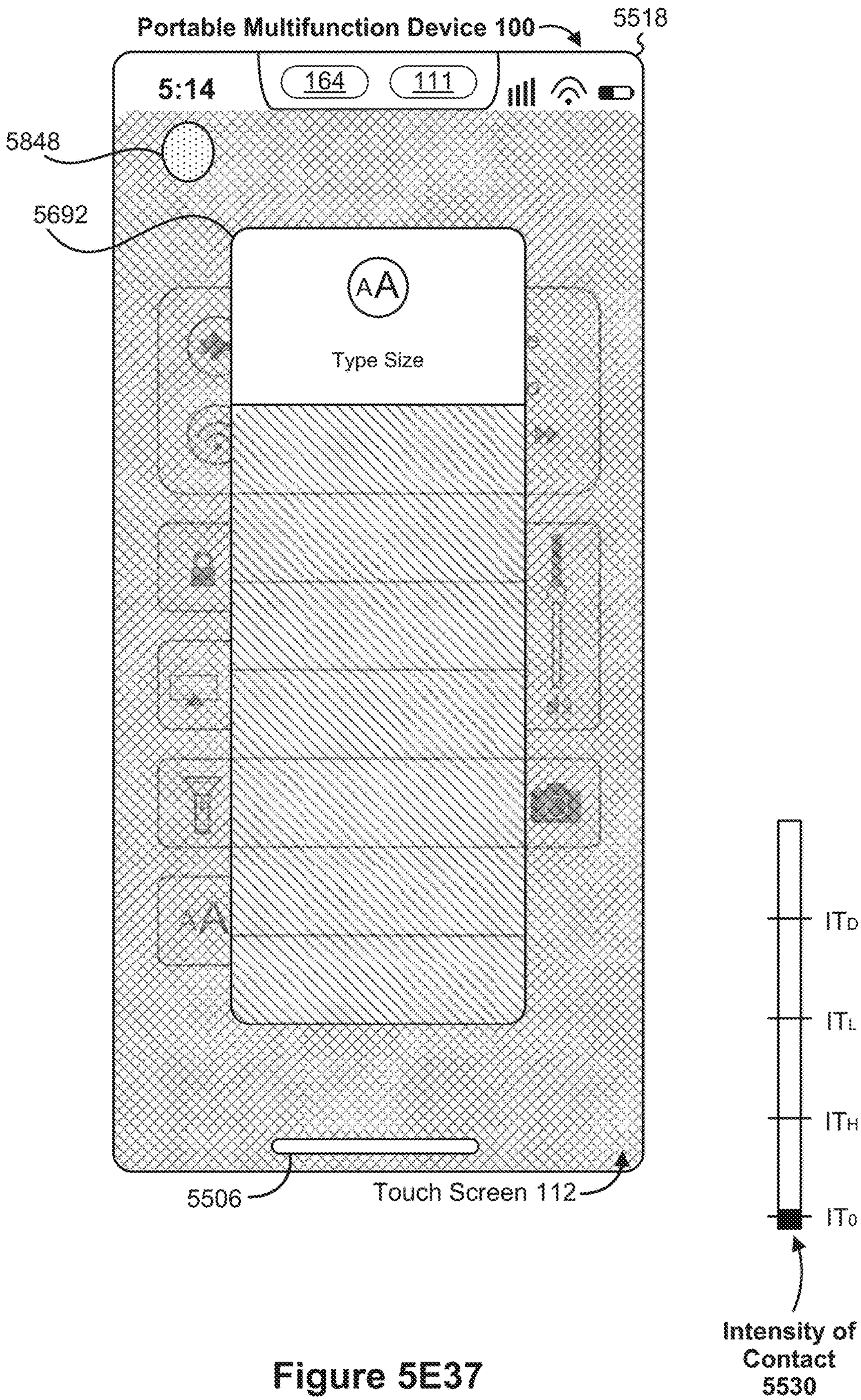
Figure 5E37

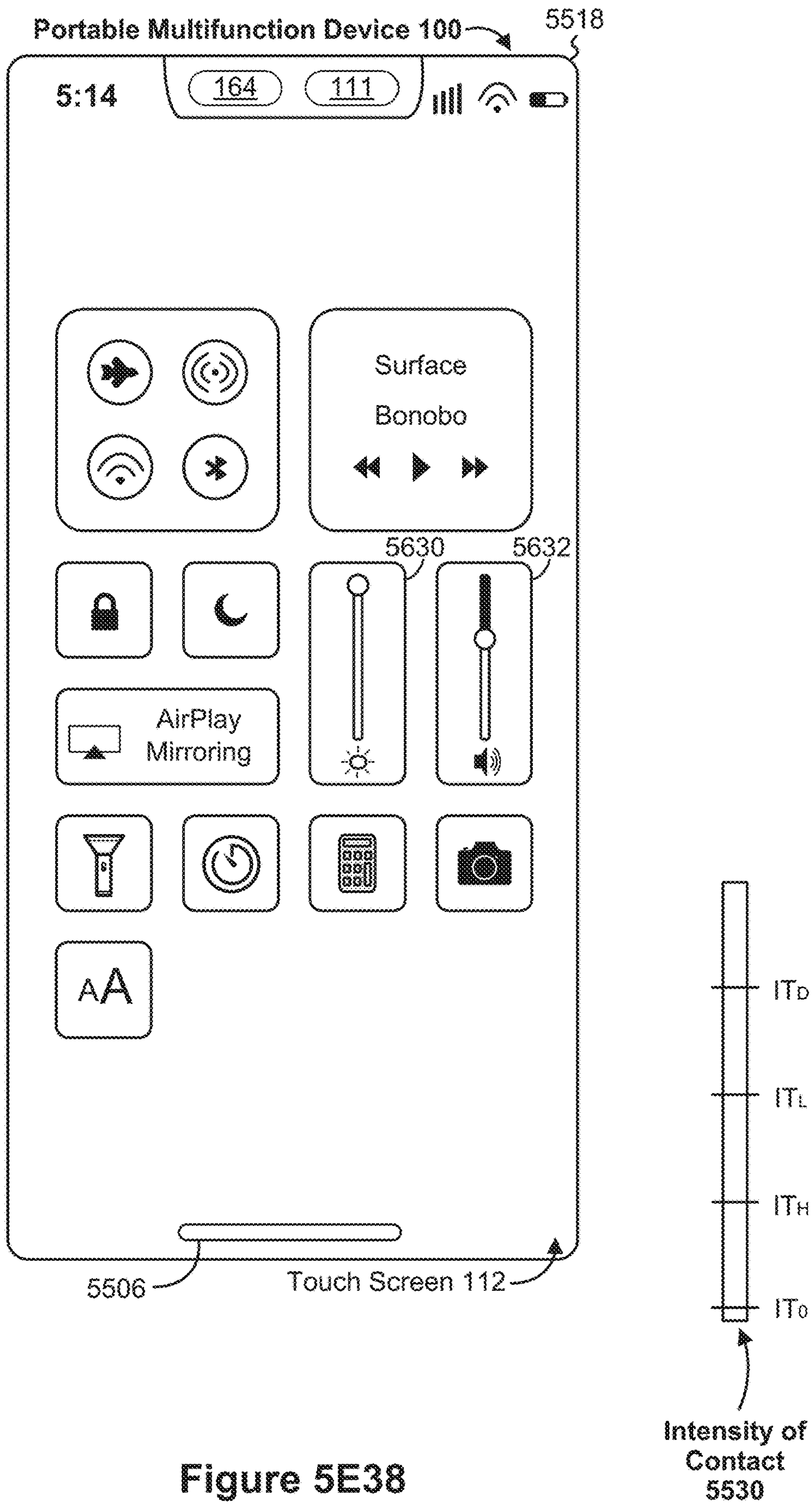
Figure 5E38

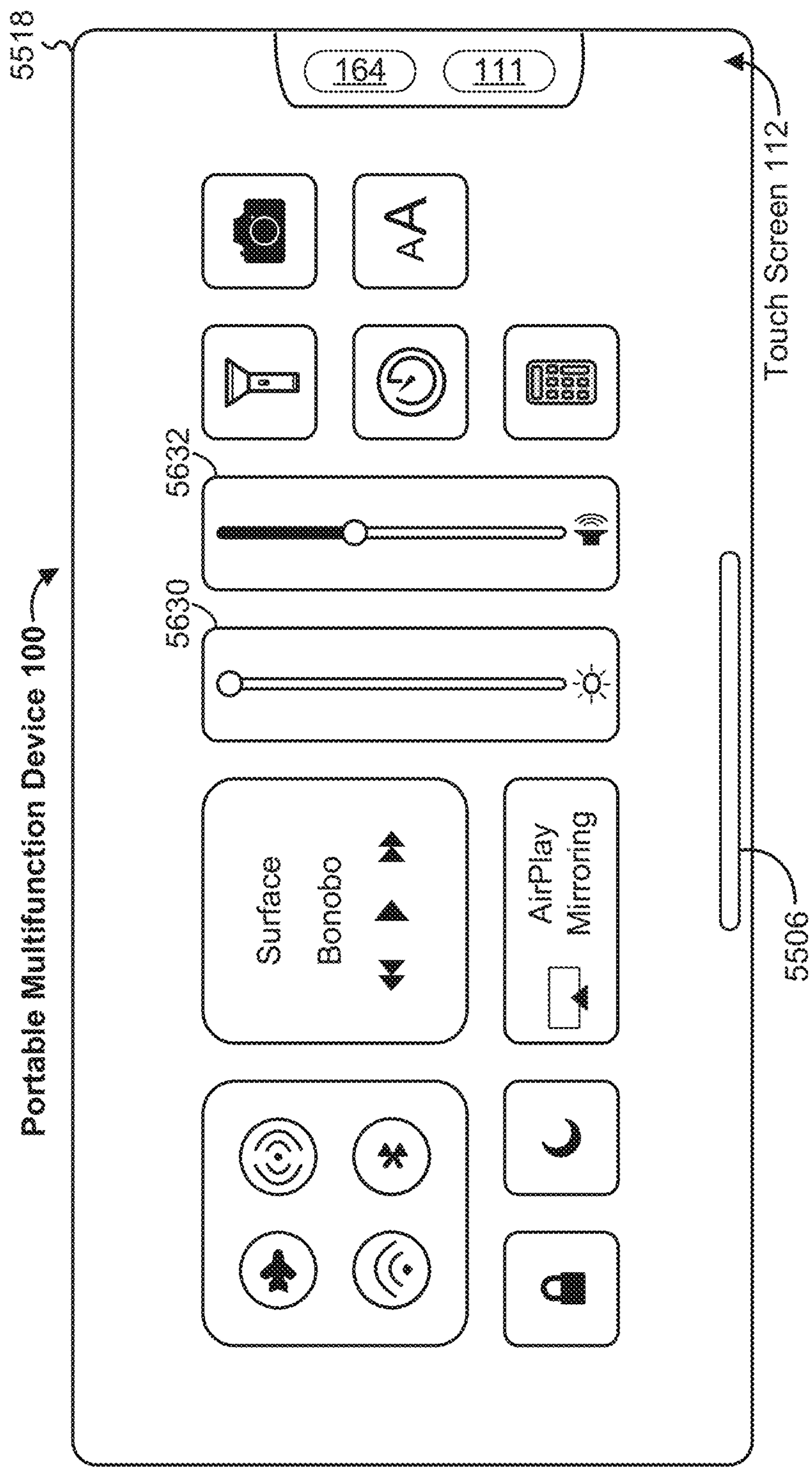
Figure 5E39

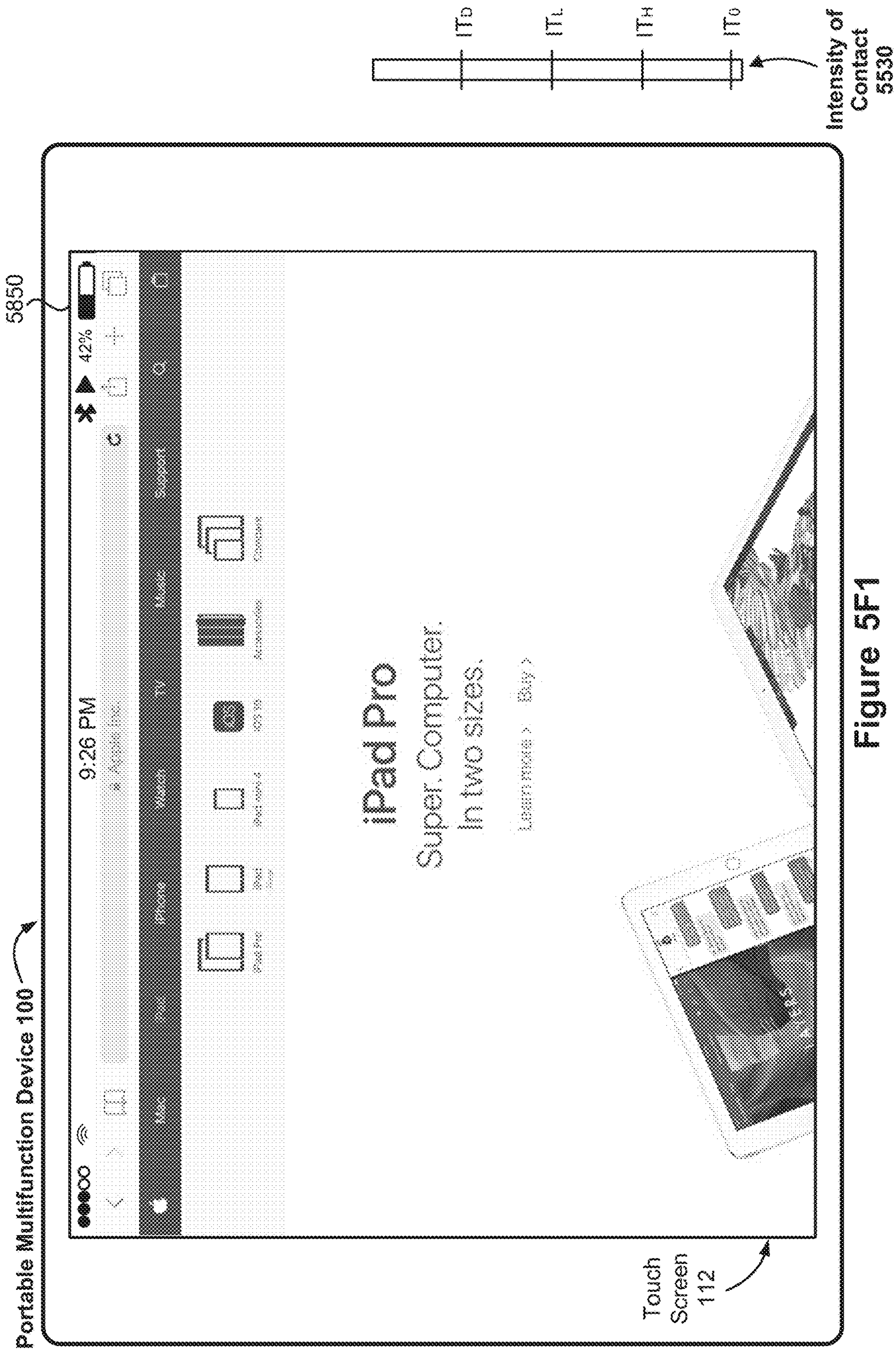
Figure 5F1

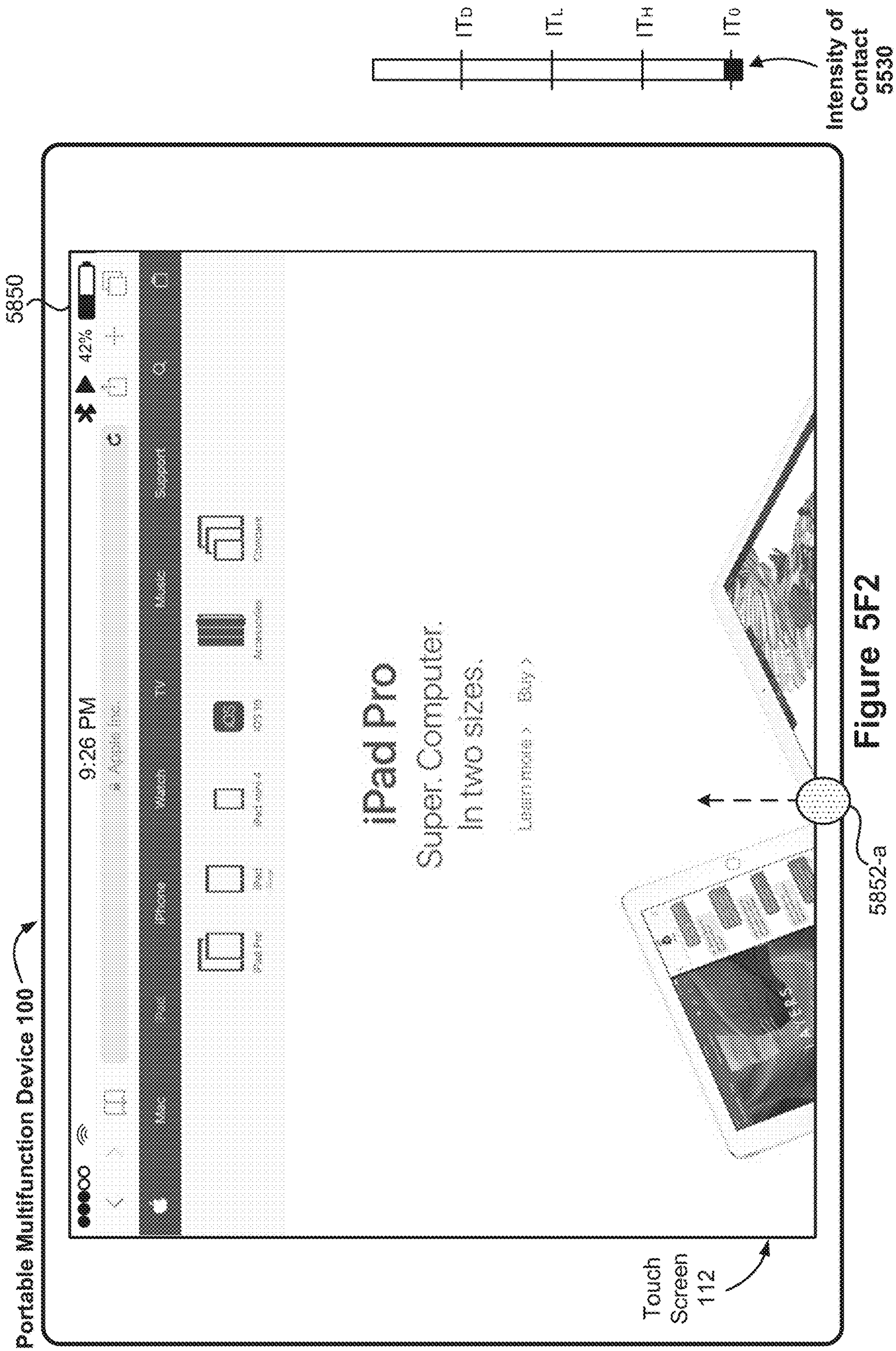
Figure 5F2

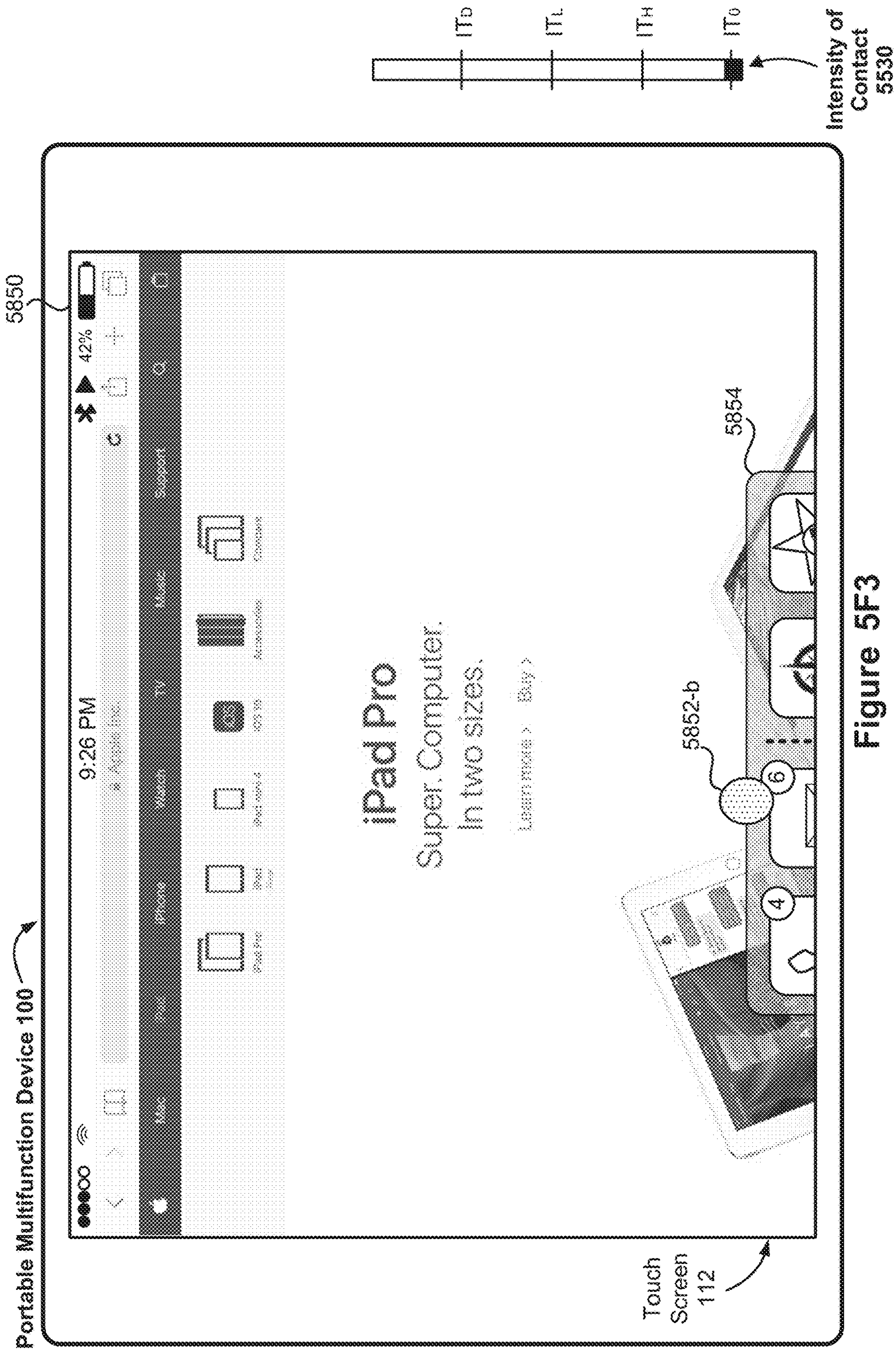
Figure 5F3

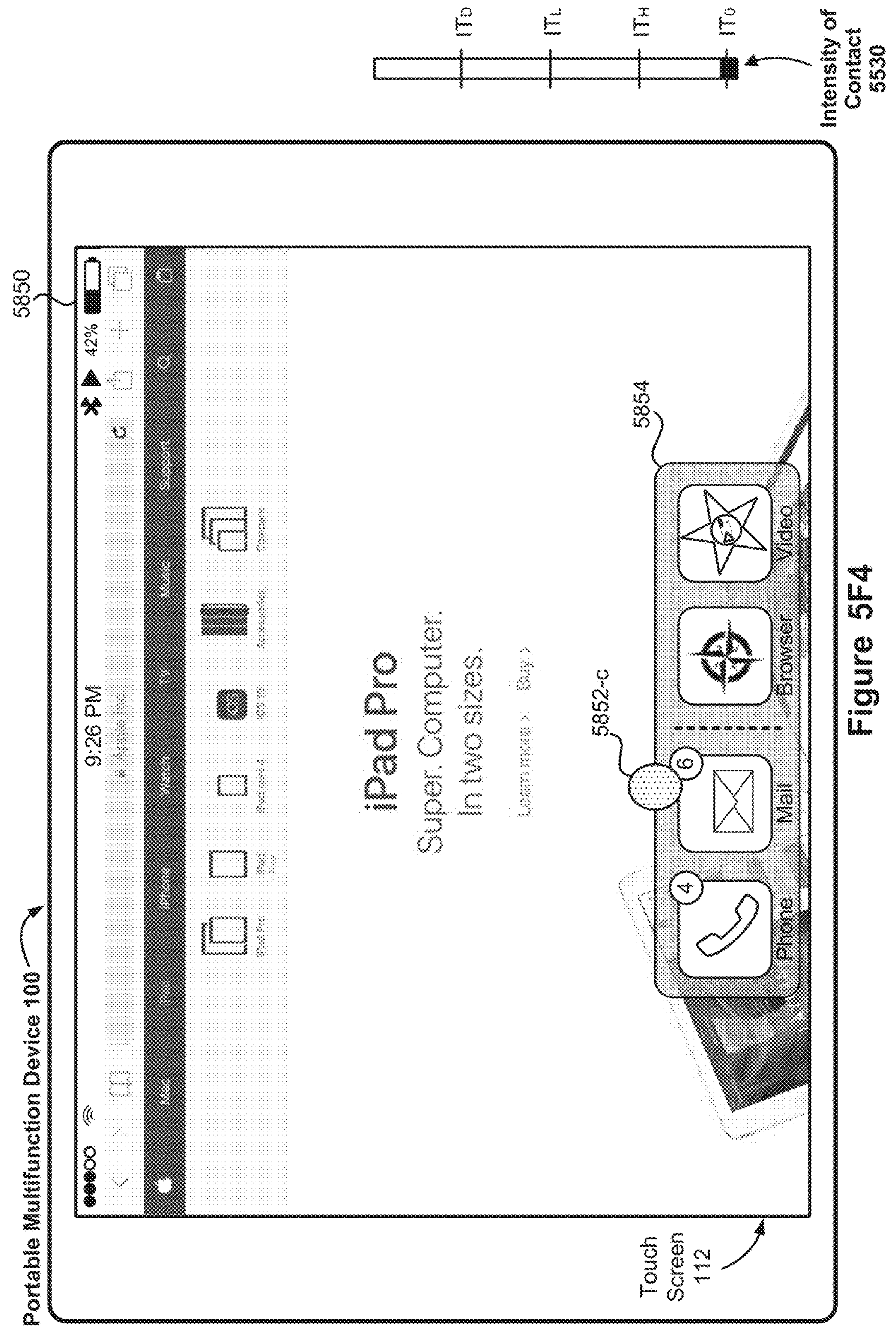
Figure 5F4

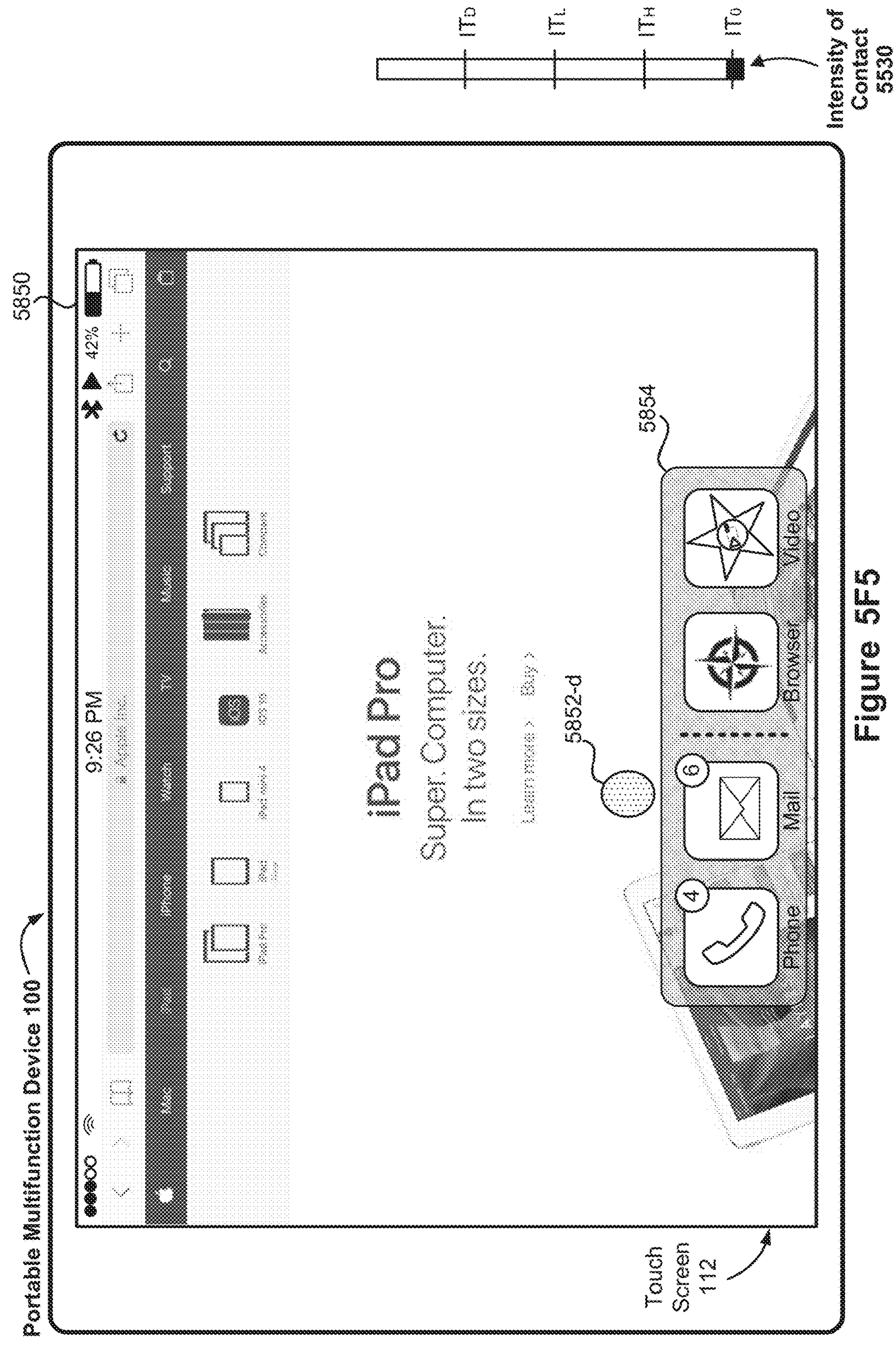
Figure 5F5

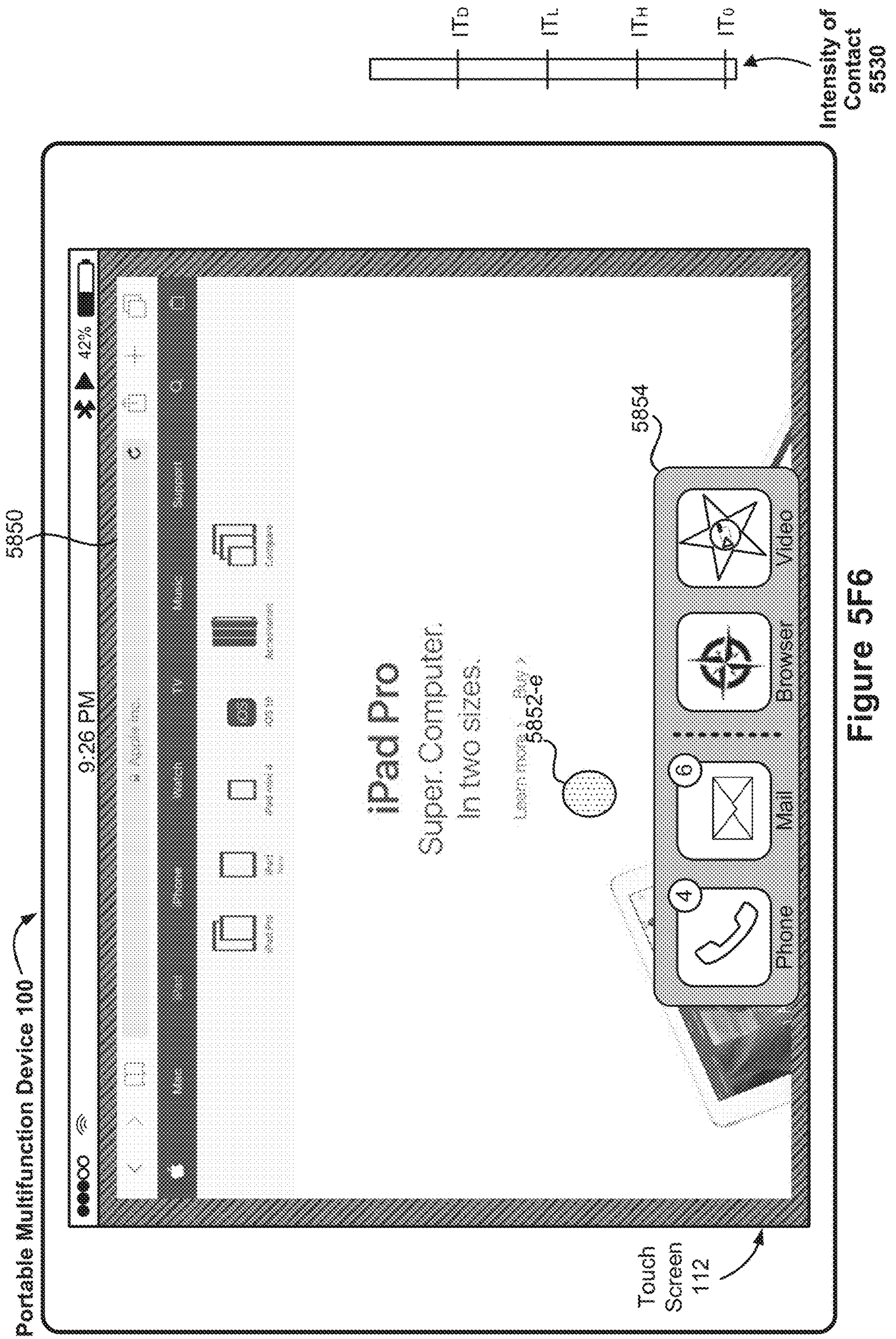
Figure 5F6

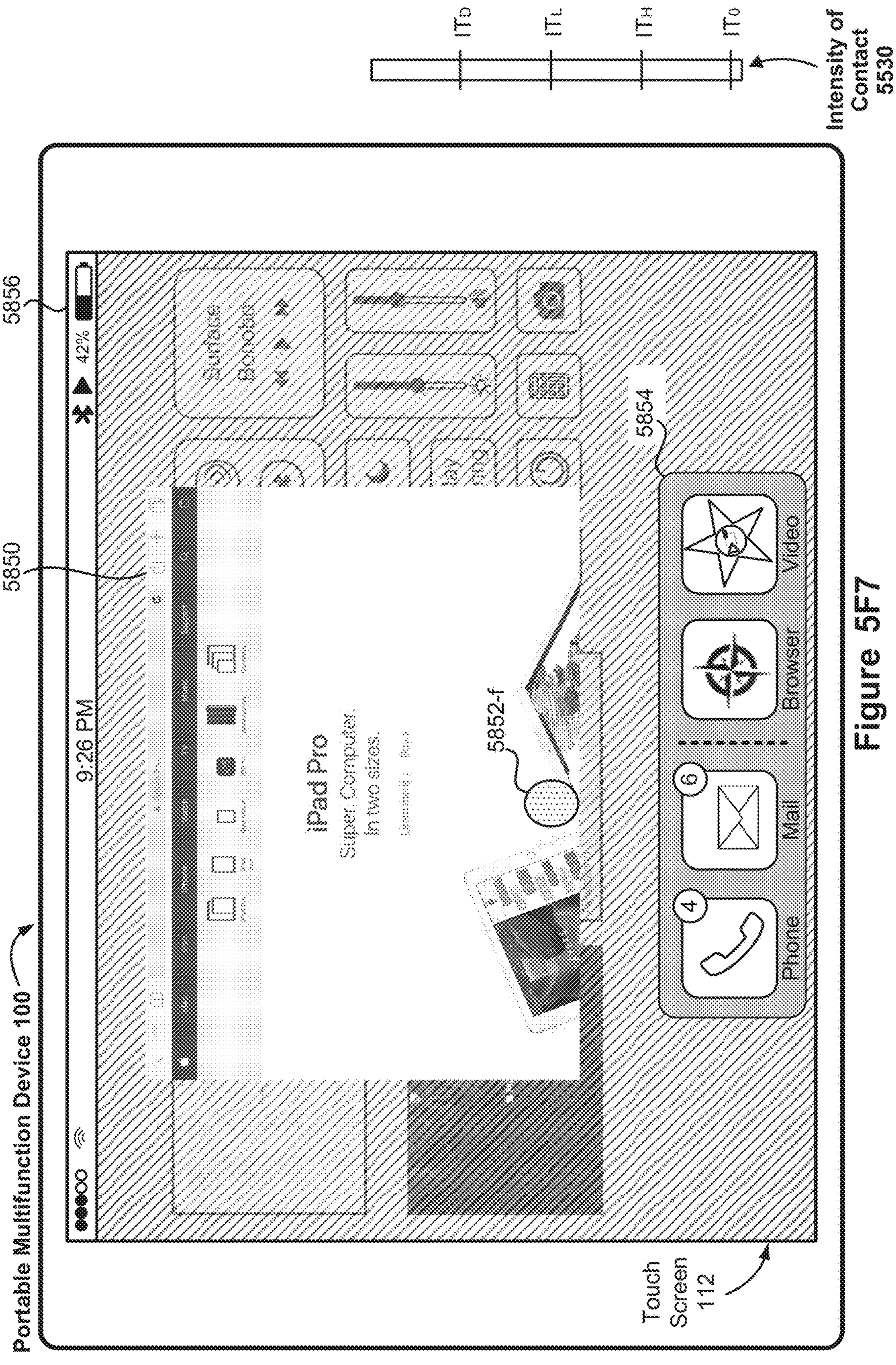
Figure 5F7

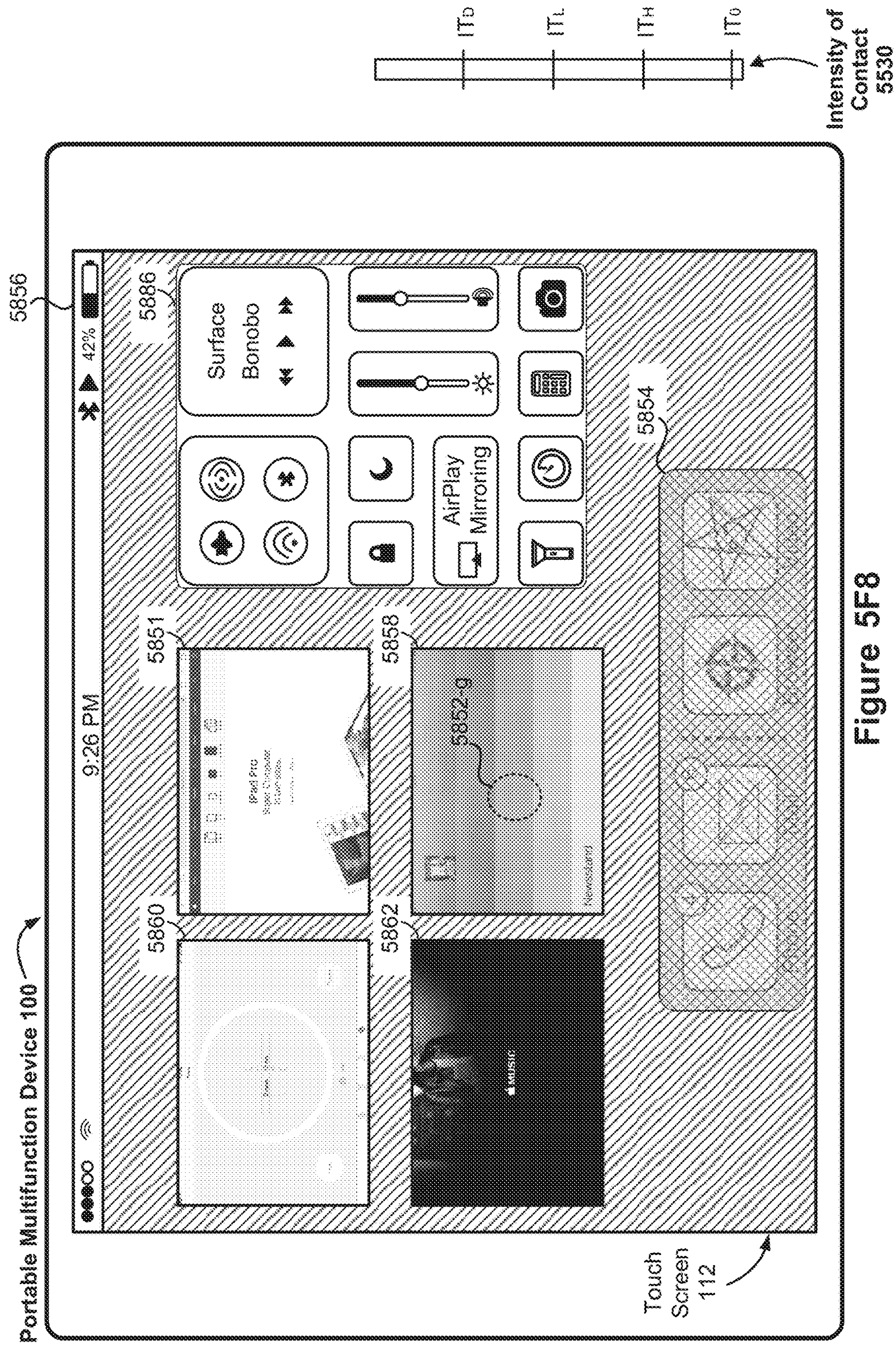
Figure 5F8

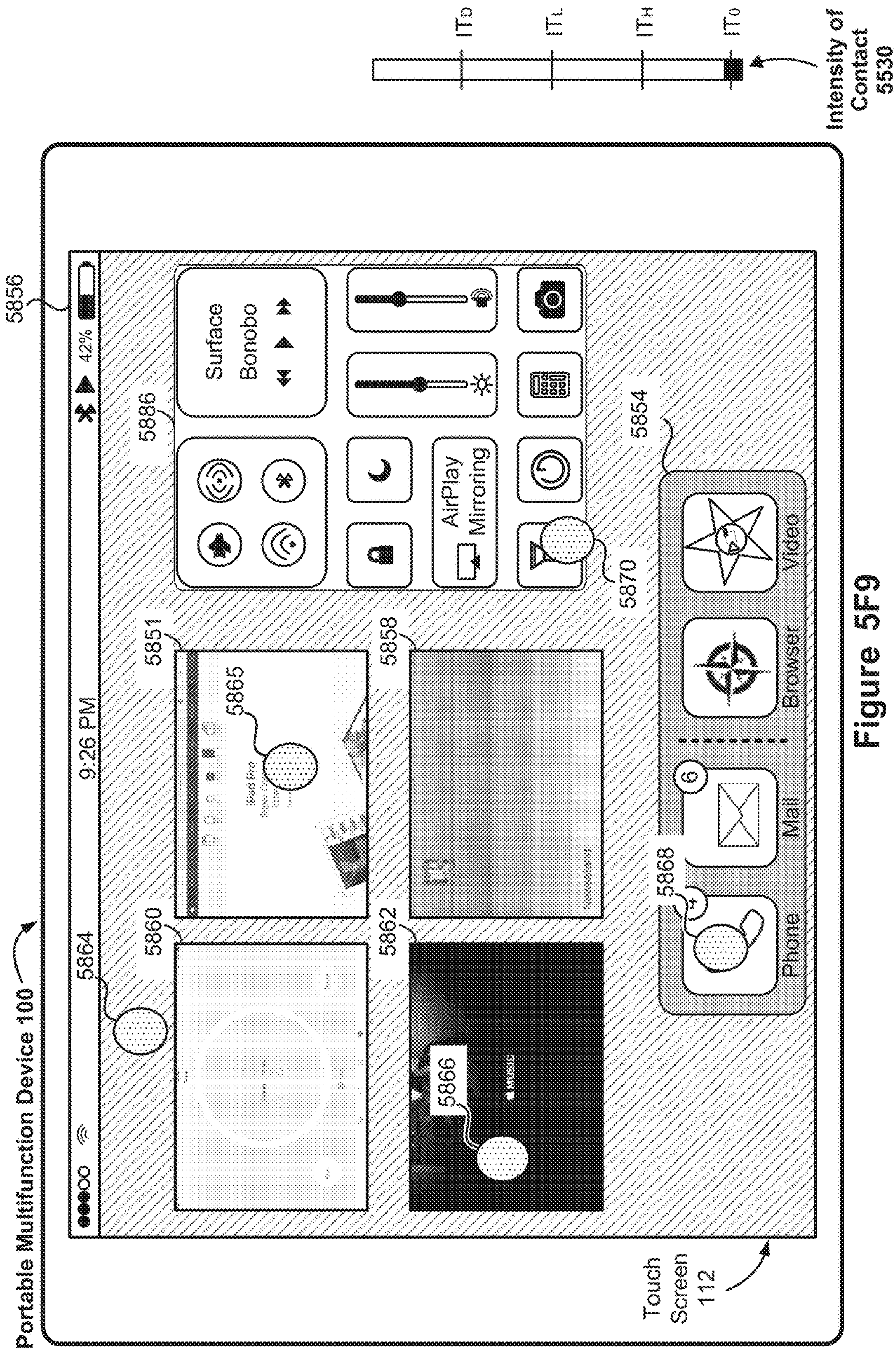
Figure 5F9

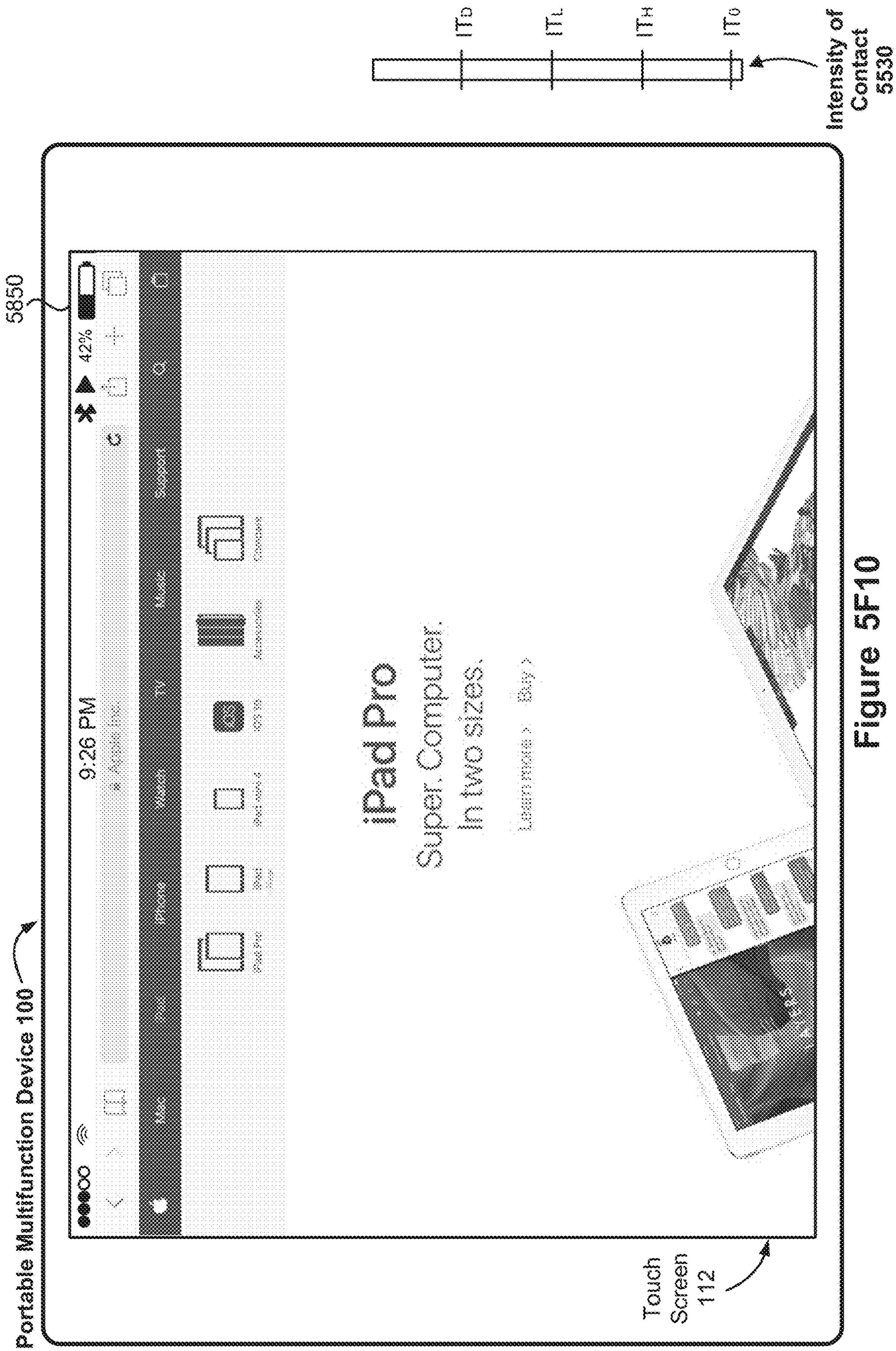
Figure 5F10

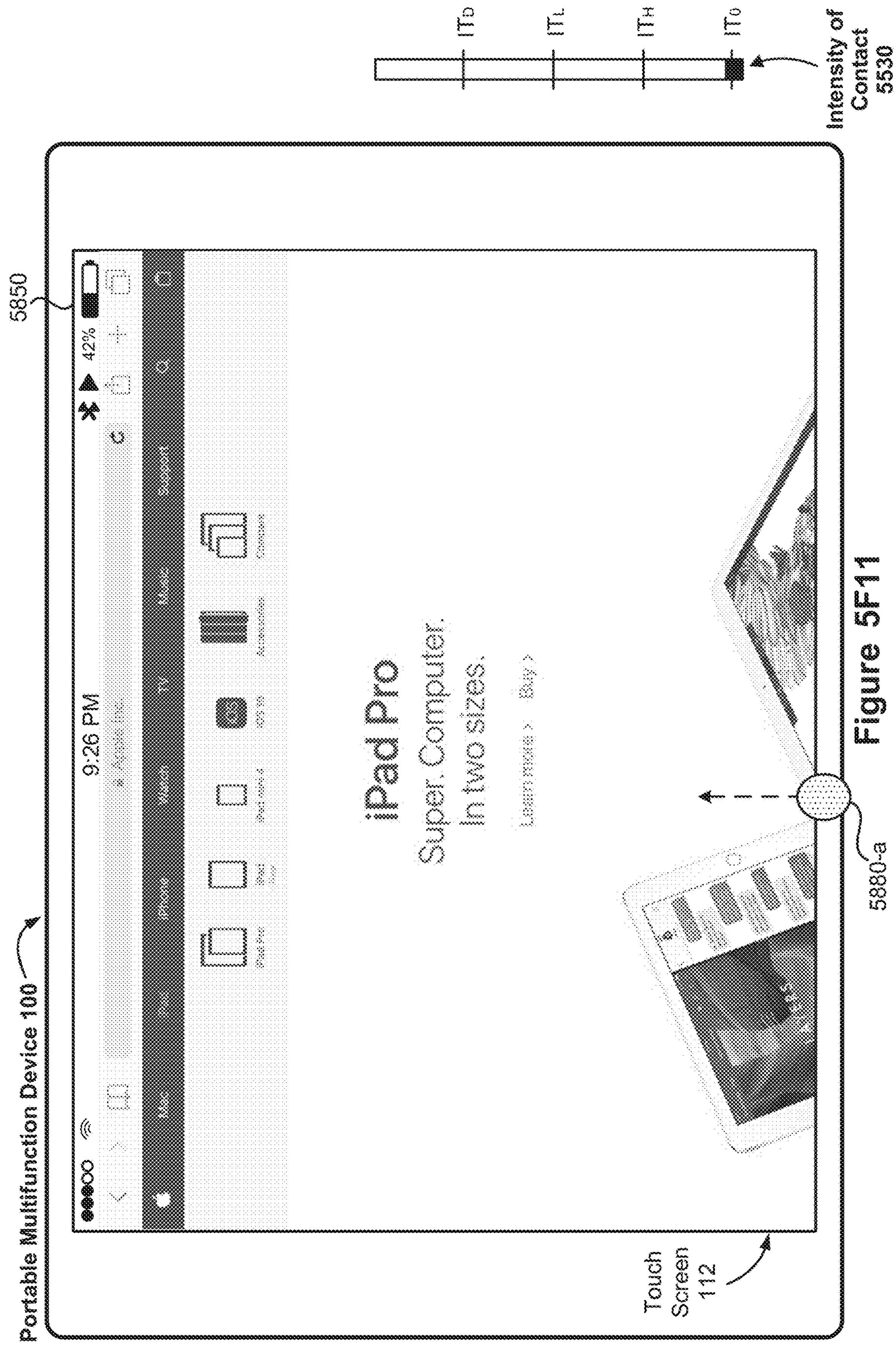
Figure 5F11

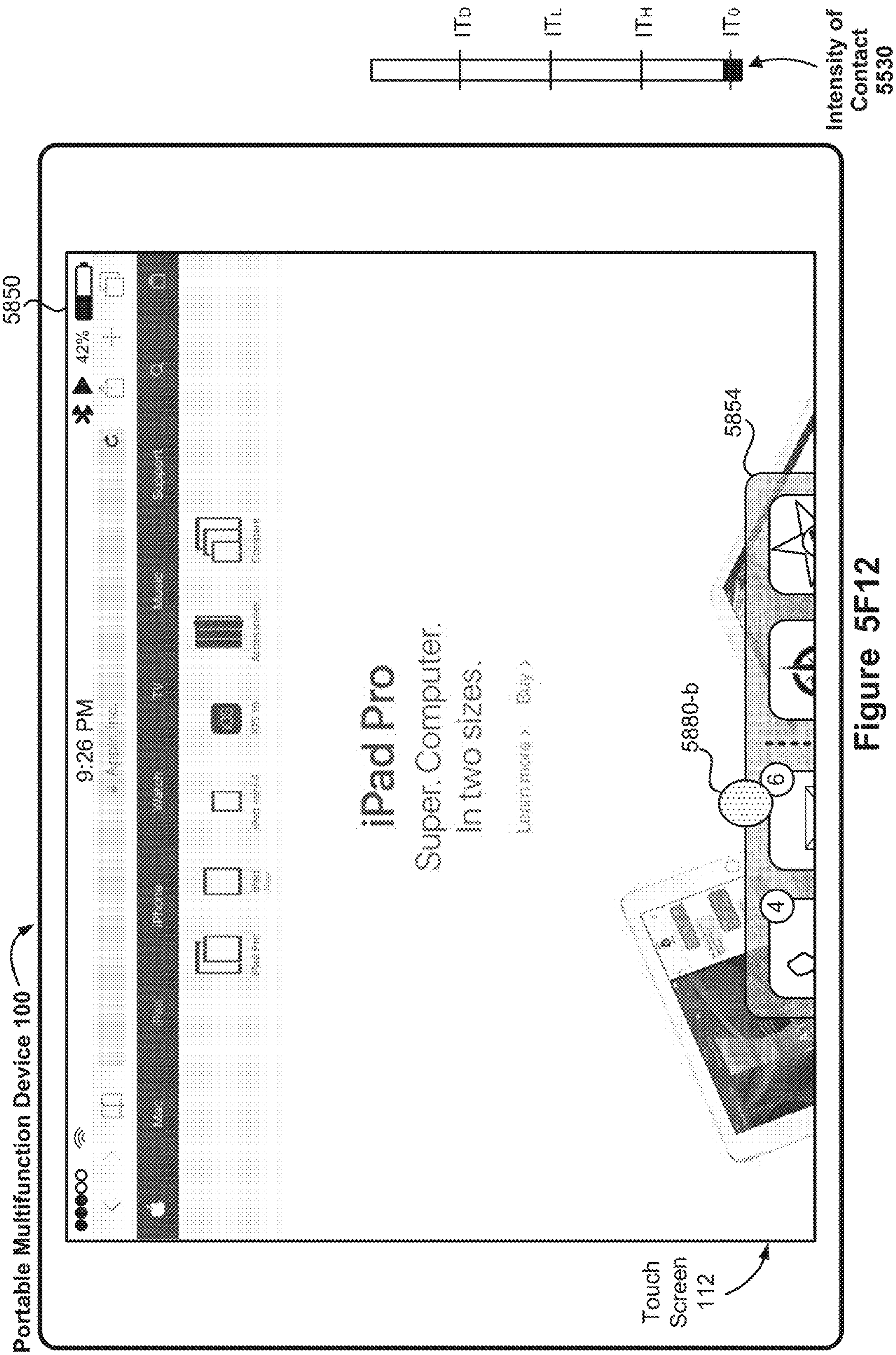
Figure 5F12

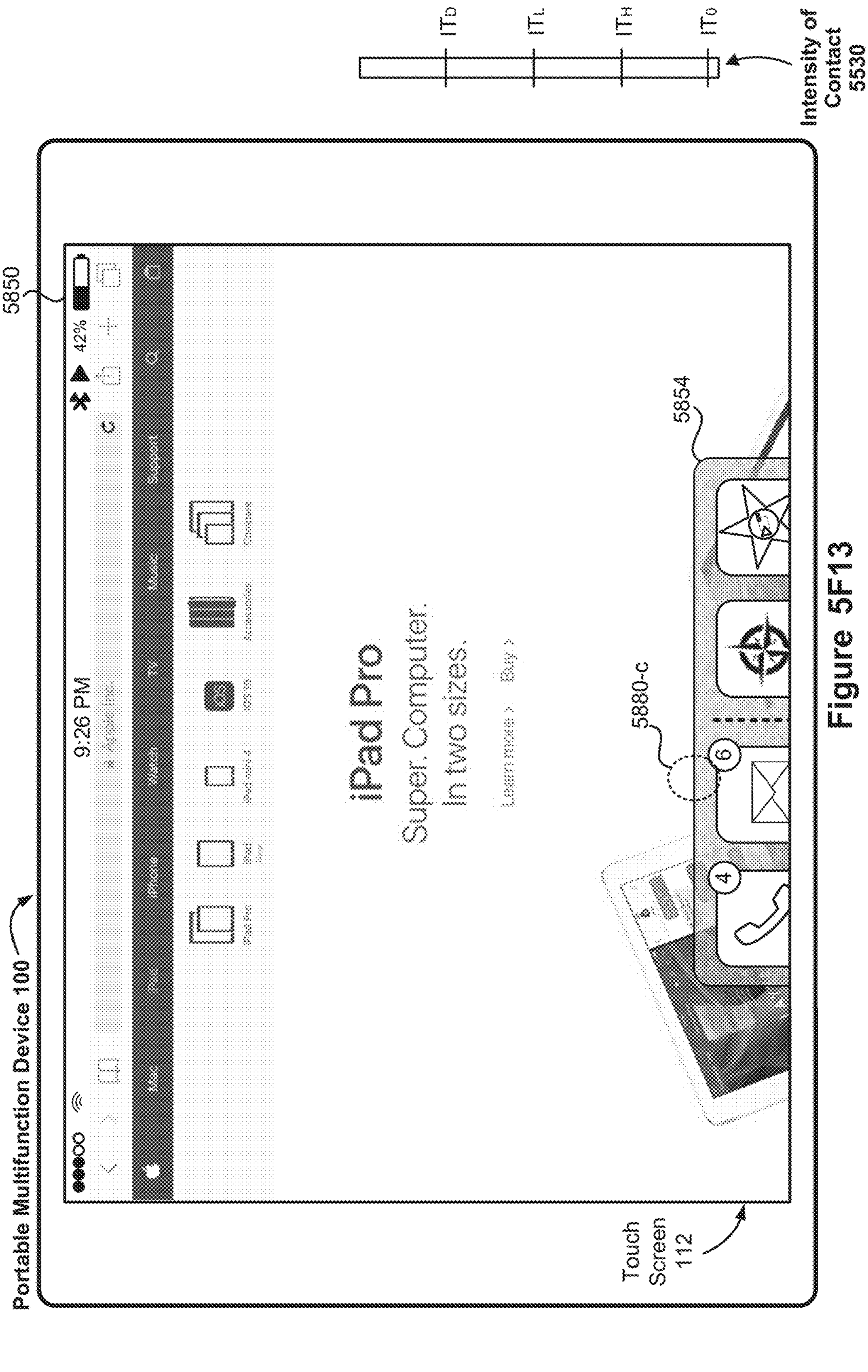
Figure 5F13

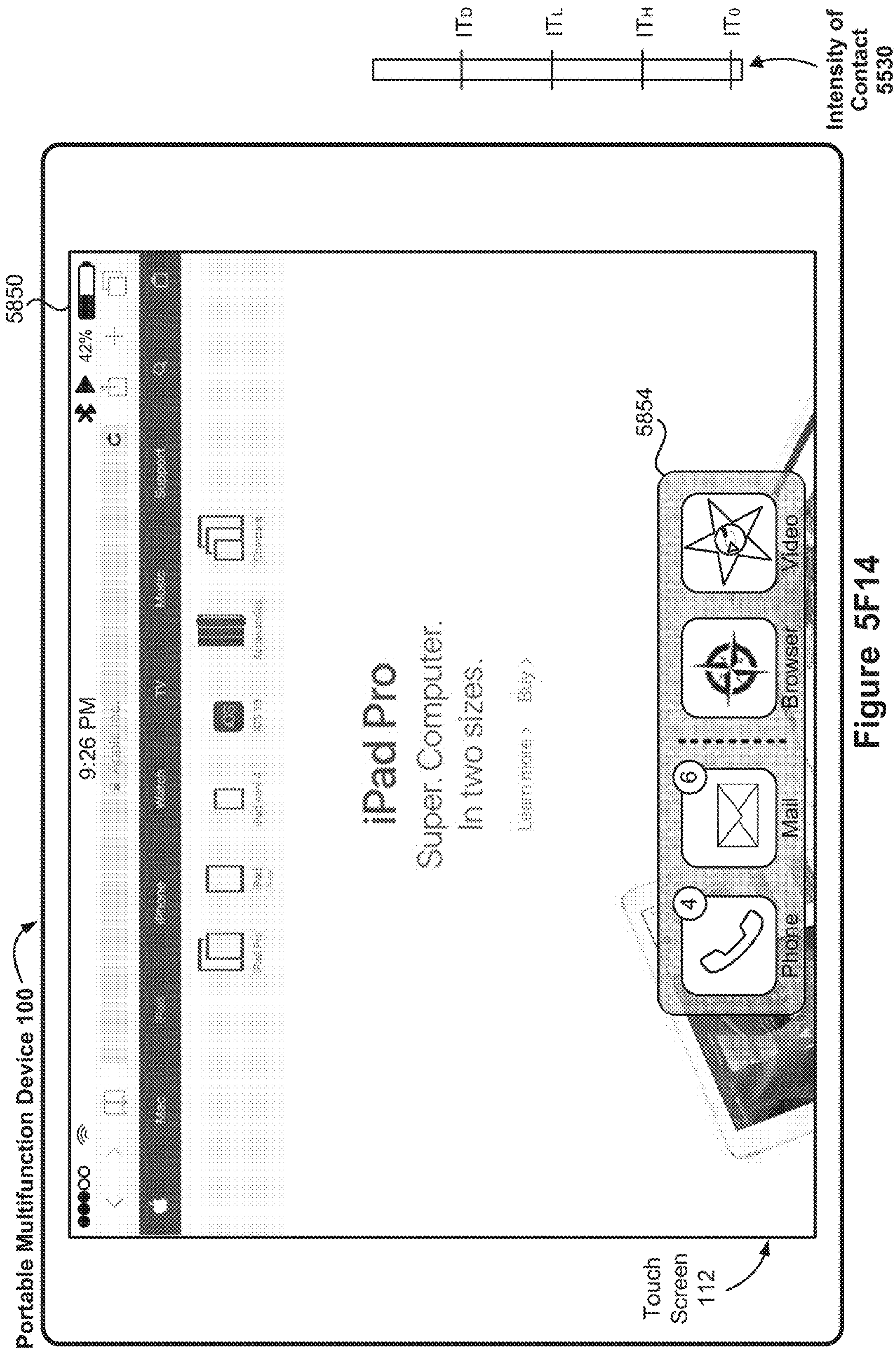
Figure 5F14

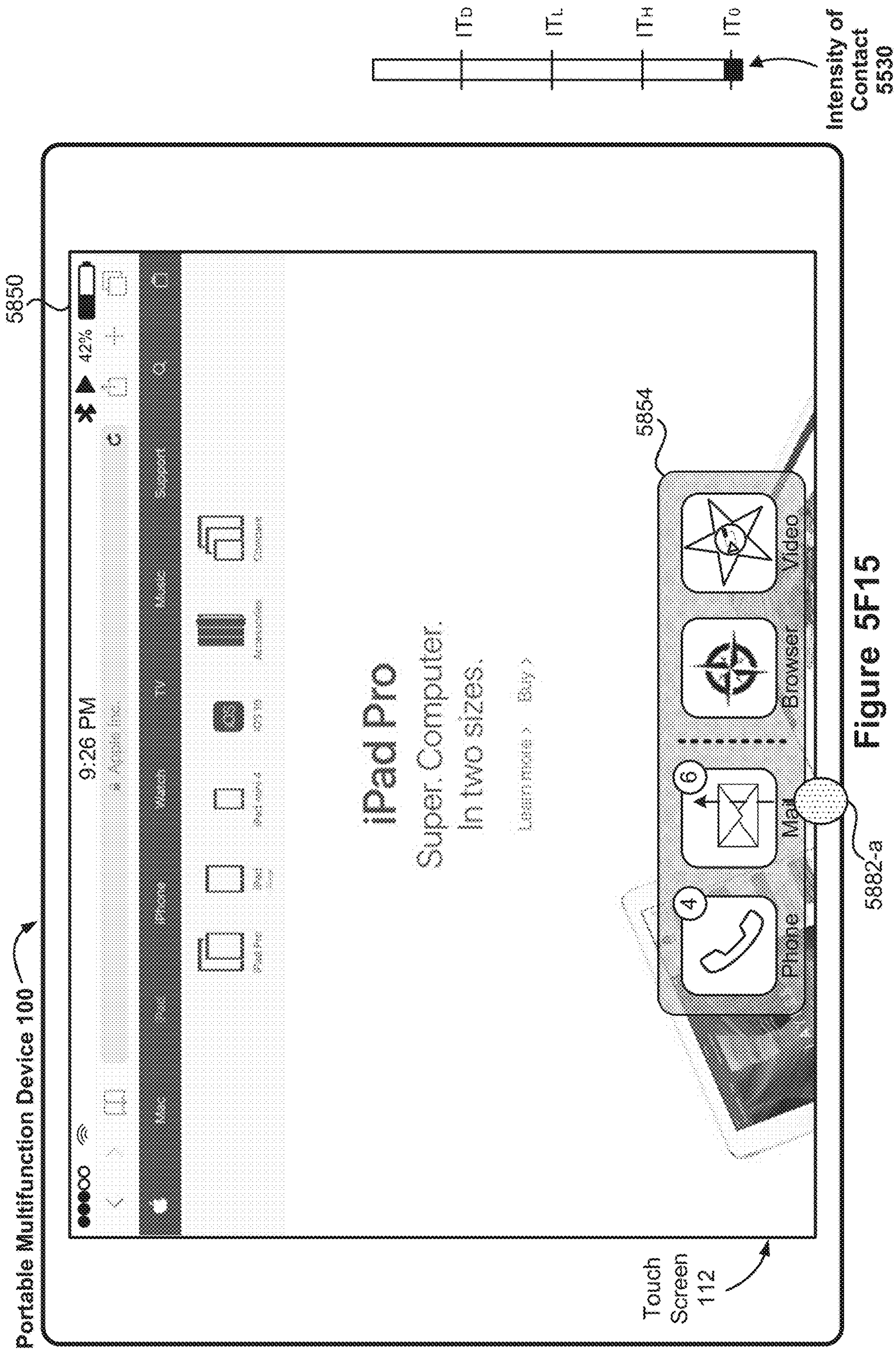
Figure 5F15

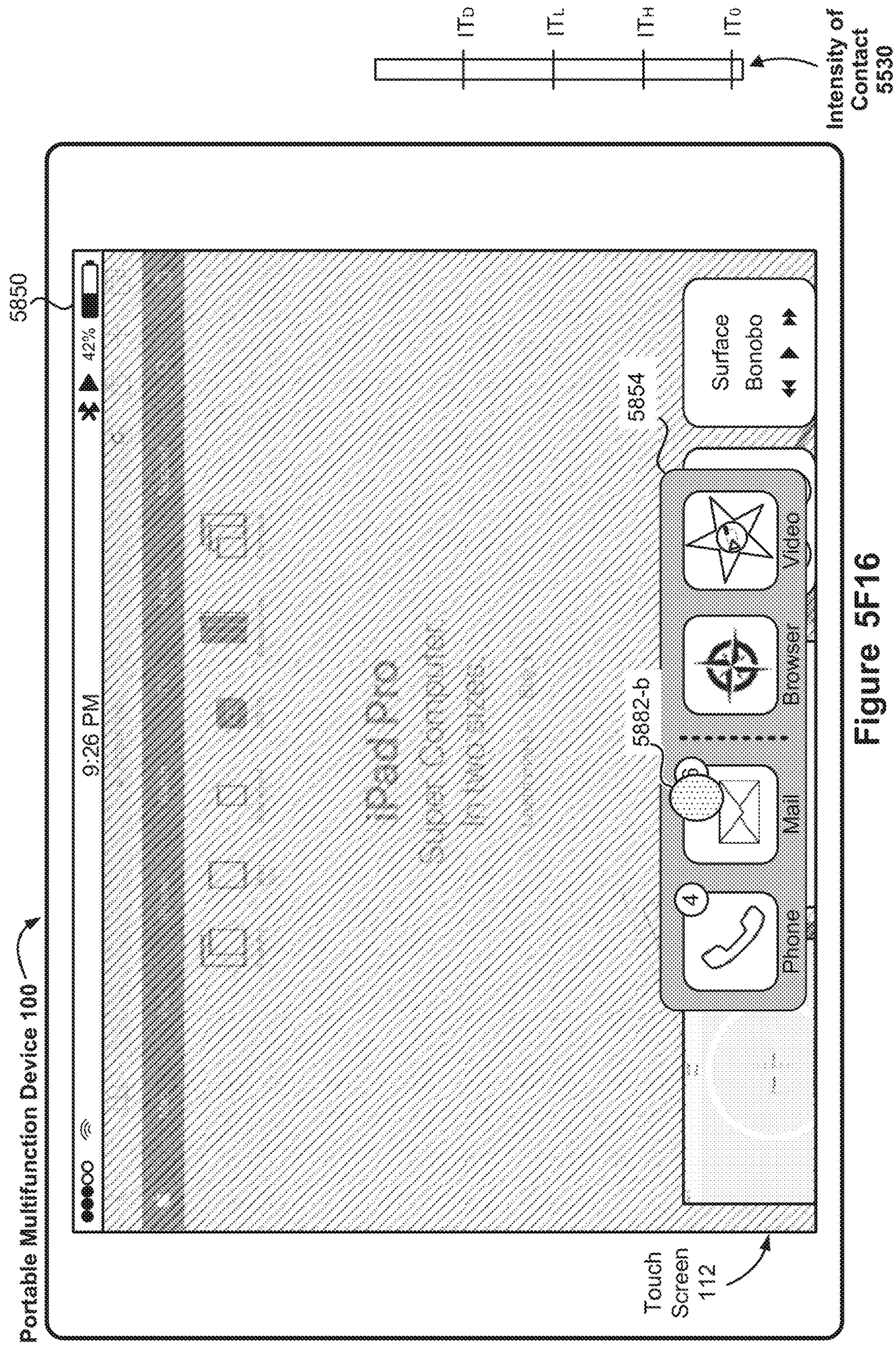
Figure 5F16

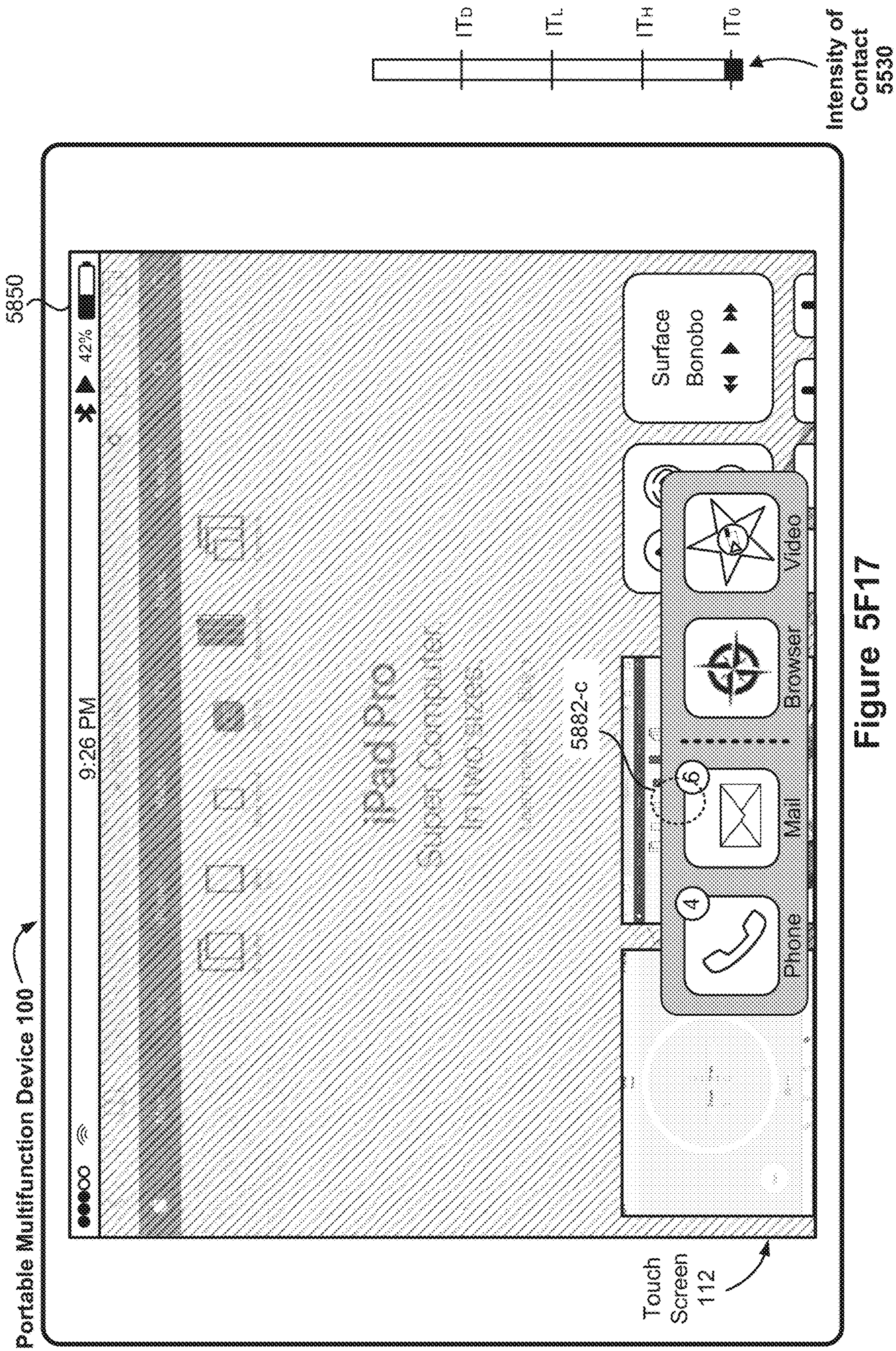
Figure 5F17

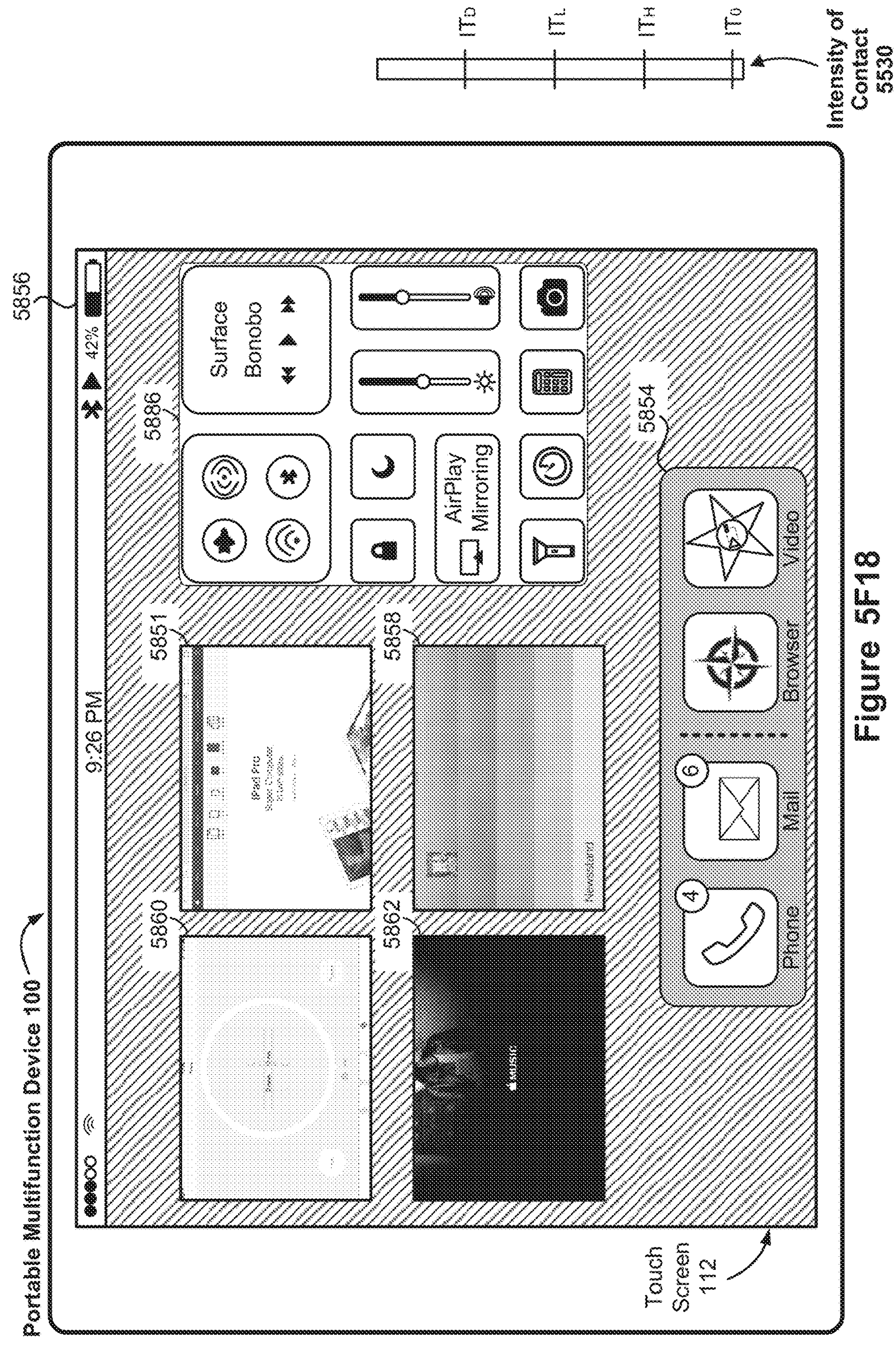
Figure 5F18

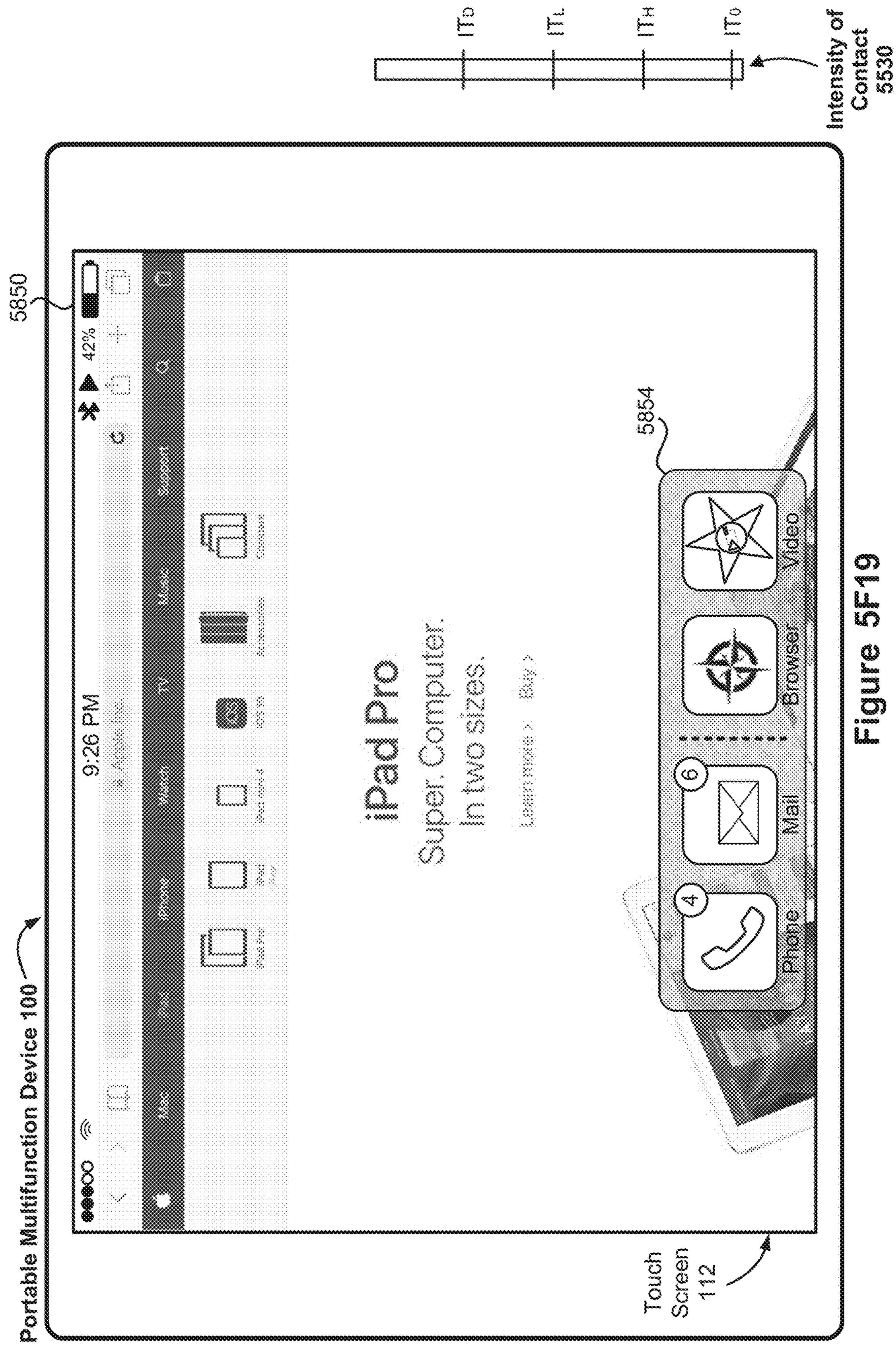
Figure 5F19

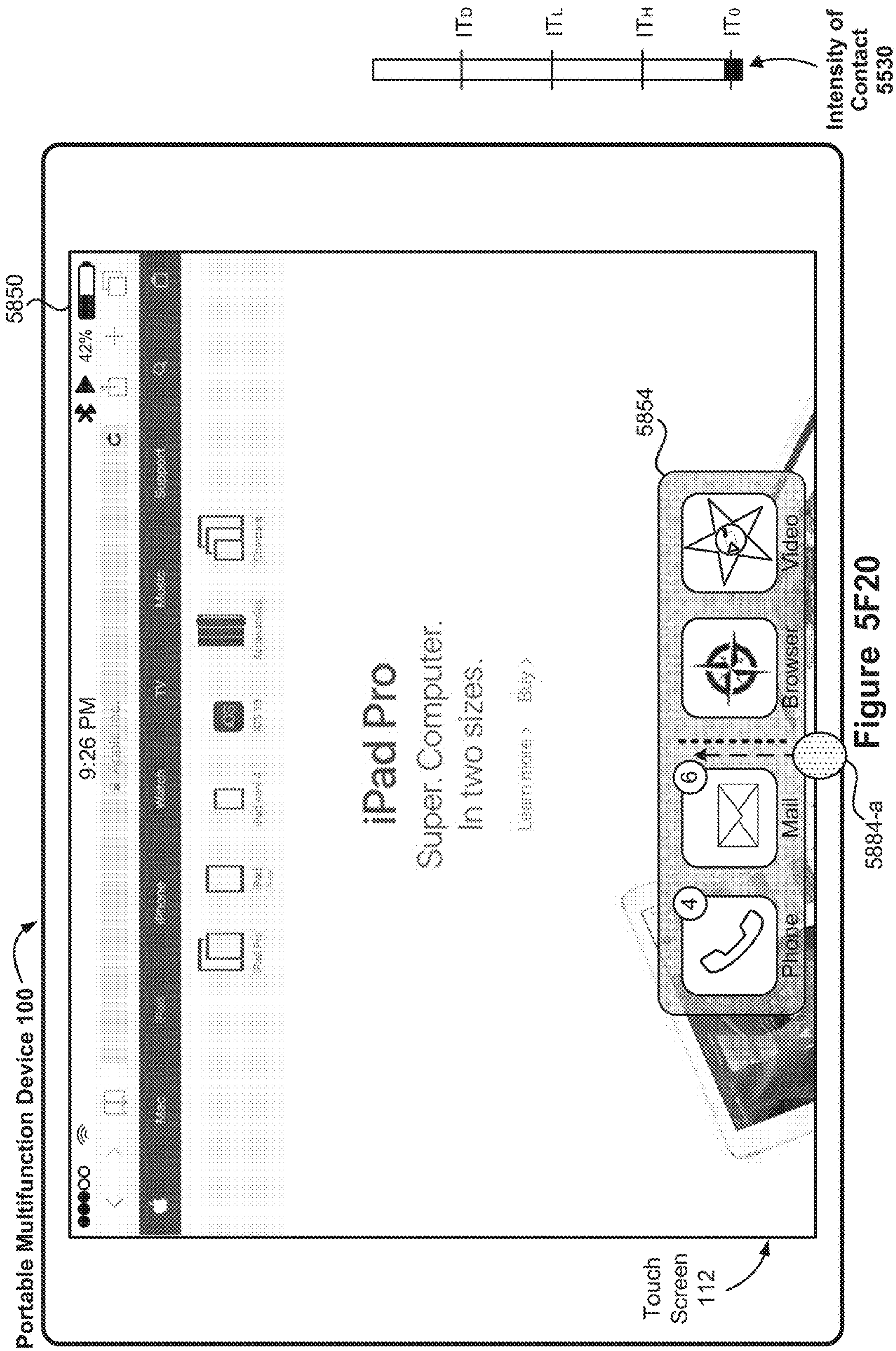
Figure 5F20

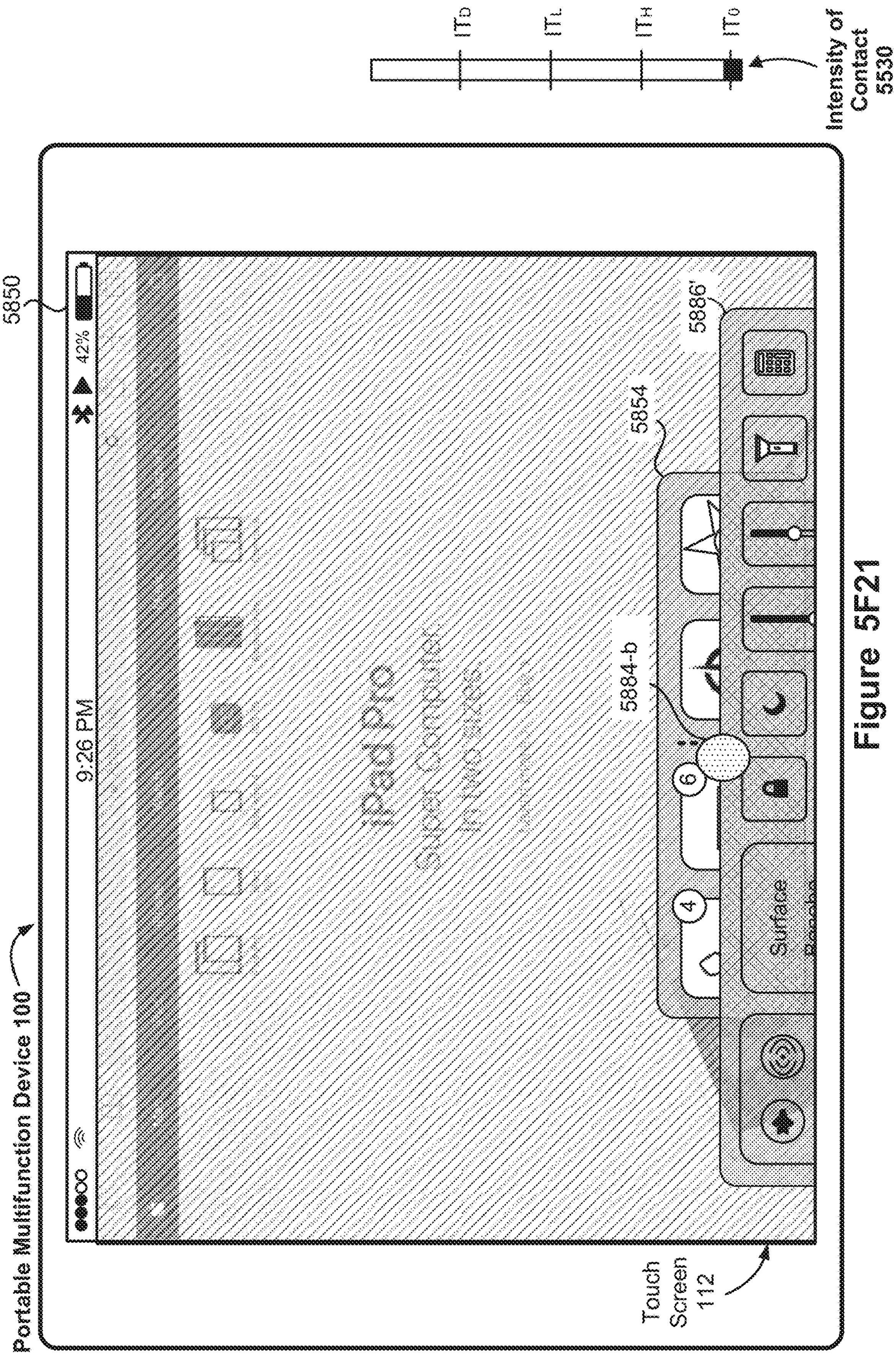
Figure 5F21

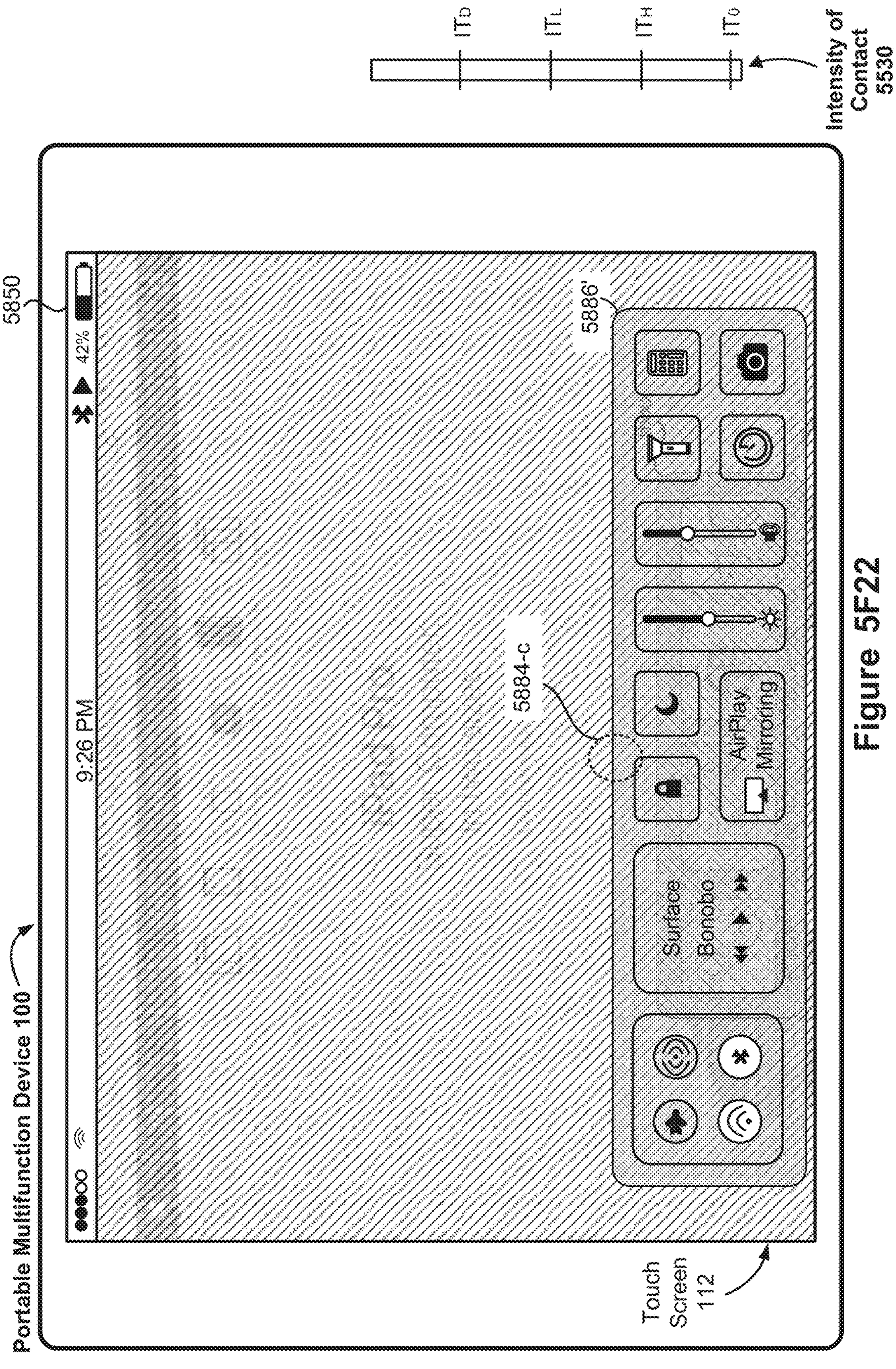
Figure 5F22

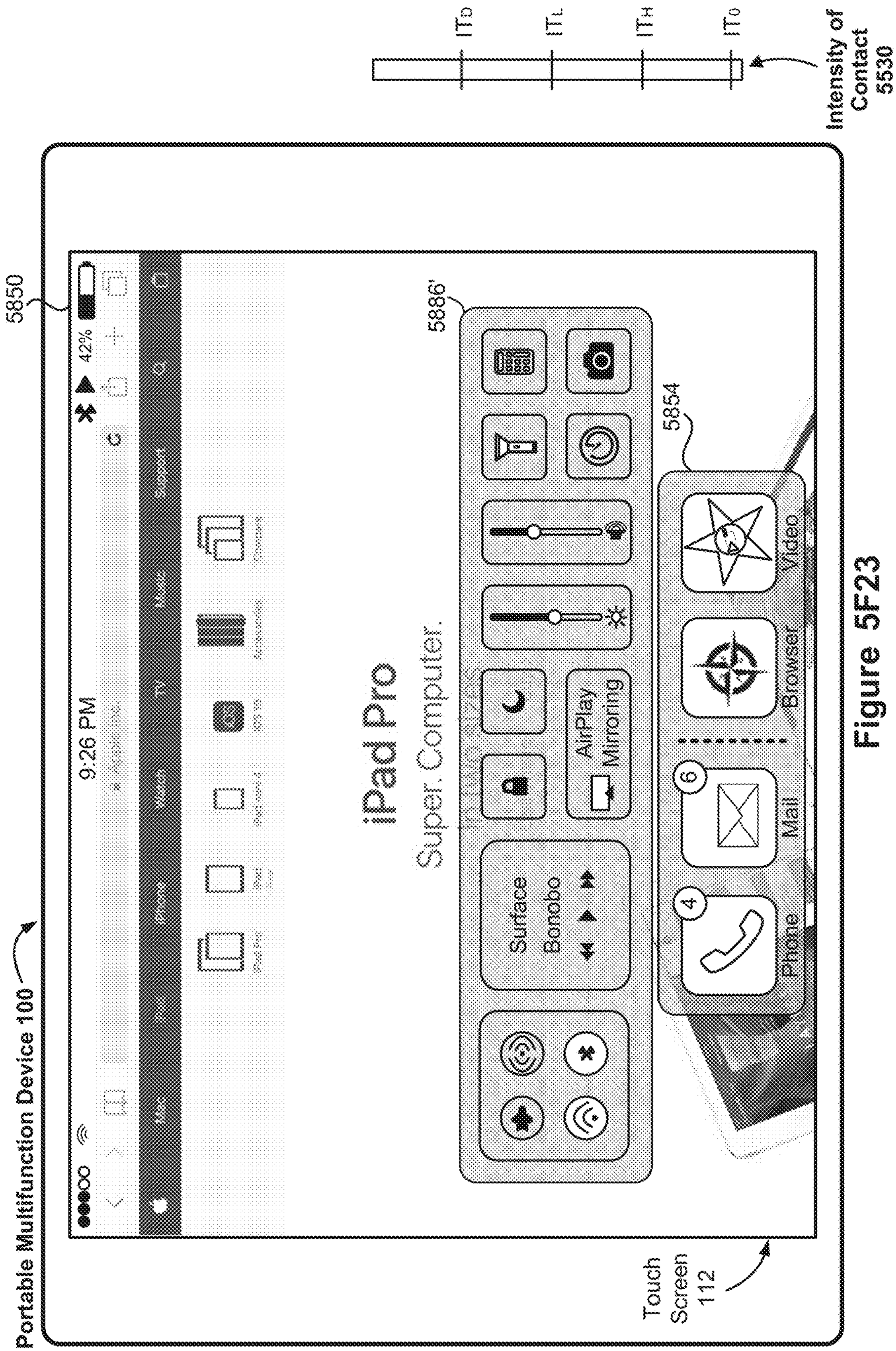
Figure 5F23

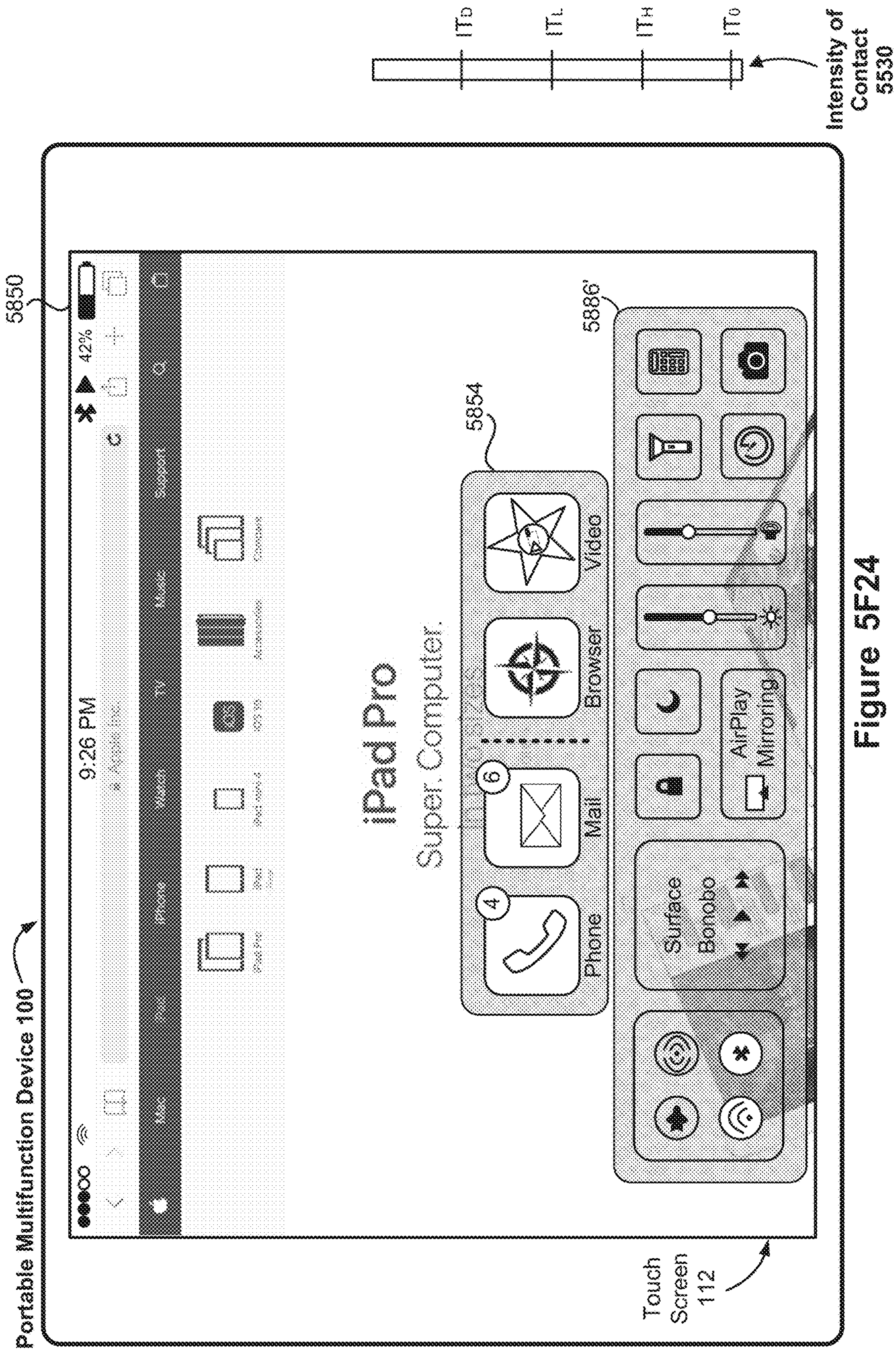
Figure 5F24

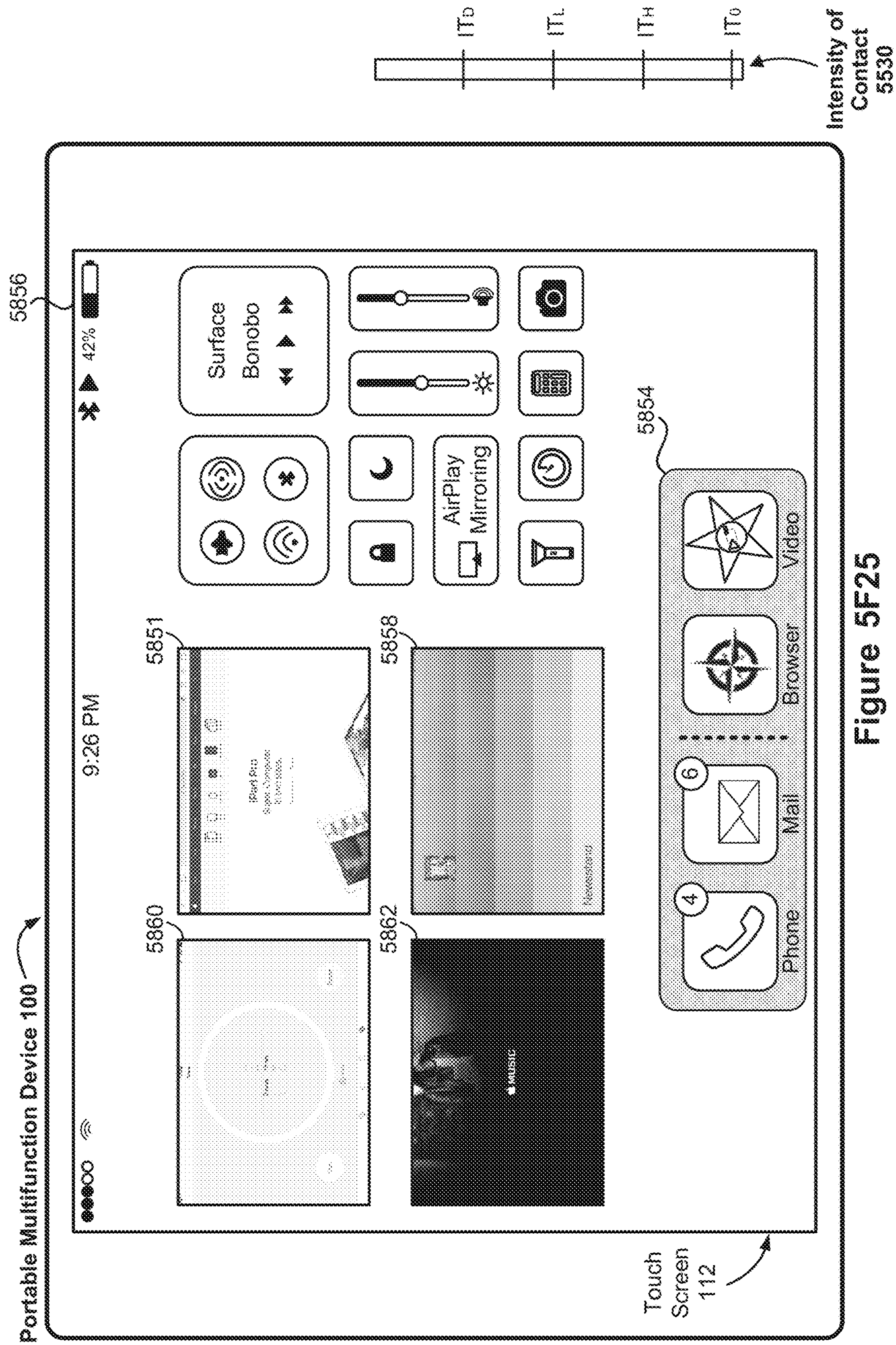
Figure 5F25

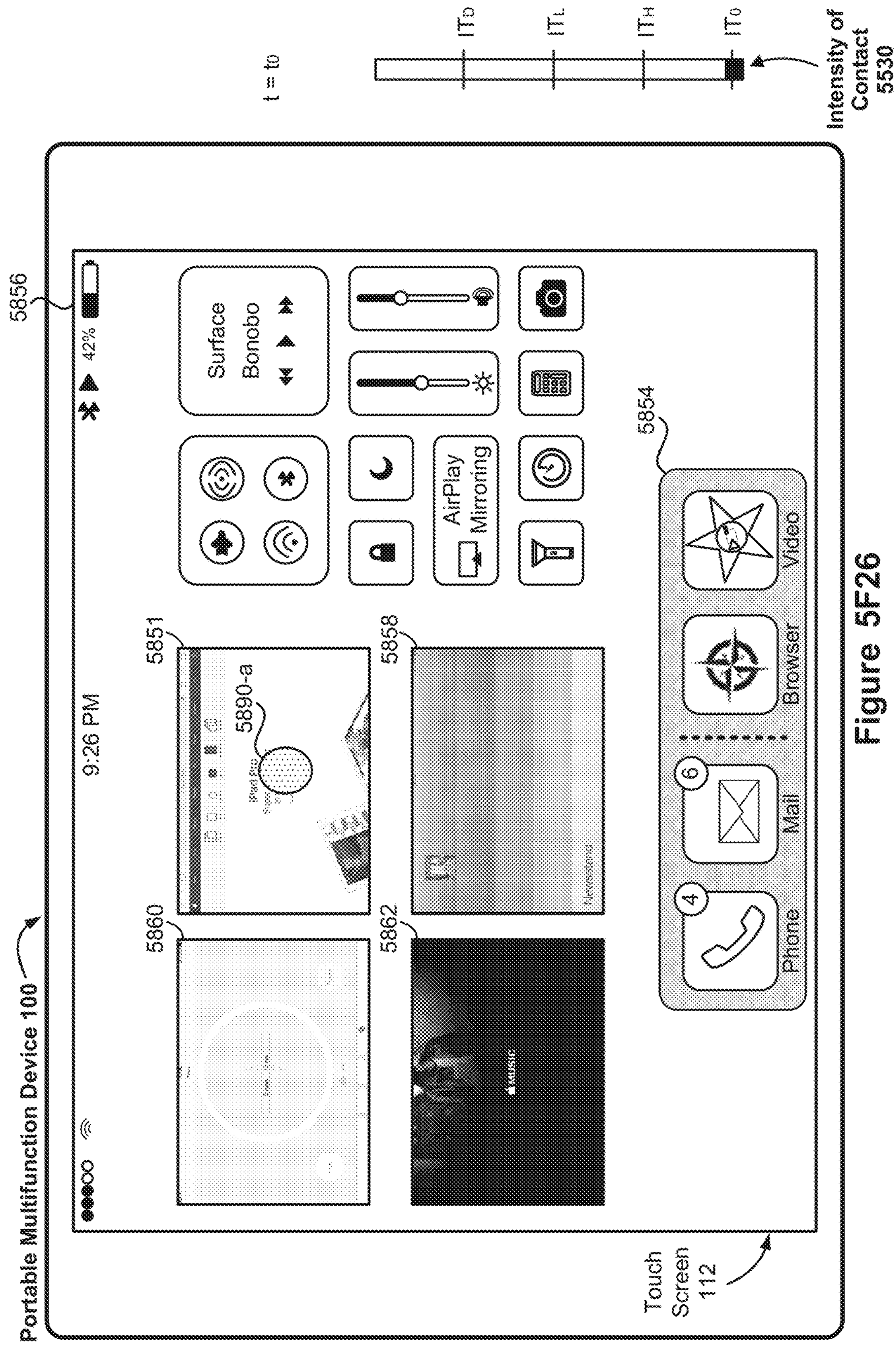
Figure 5F26

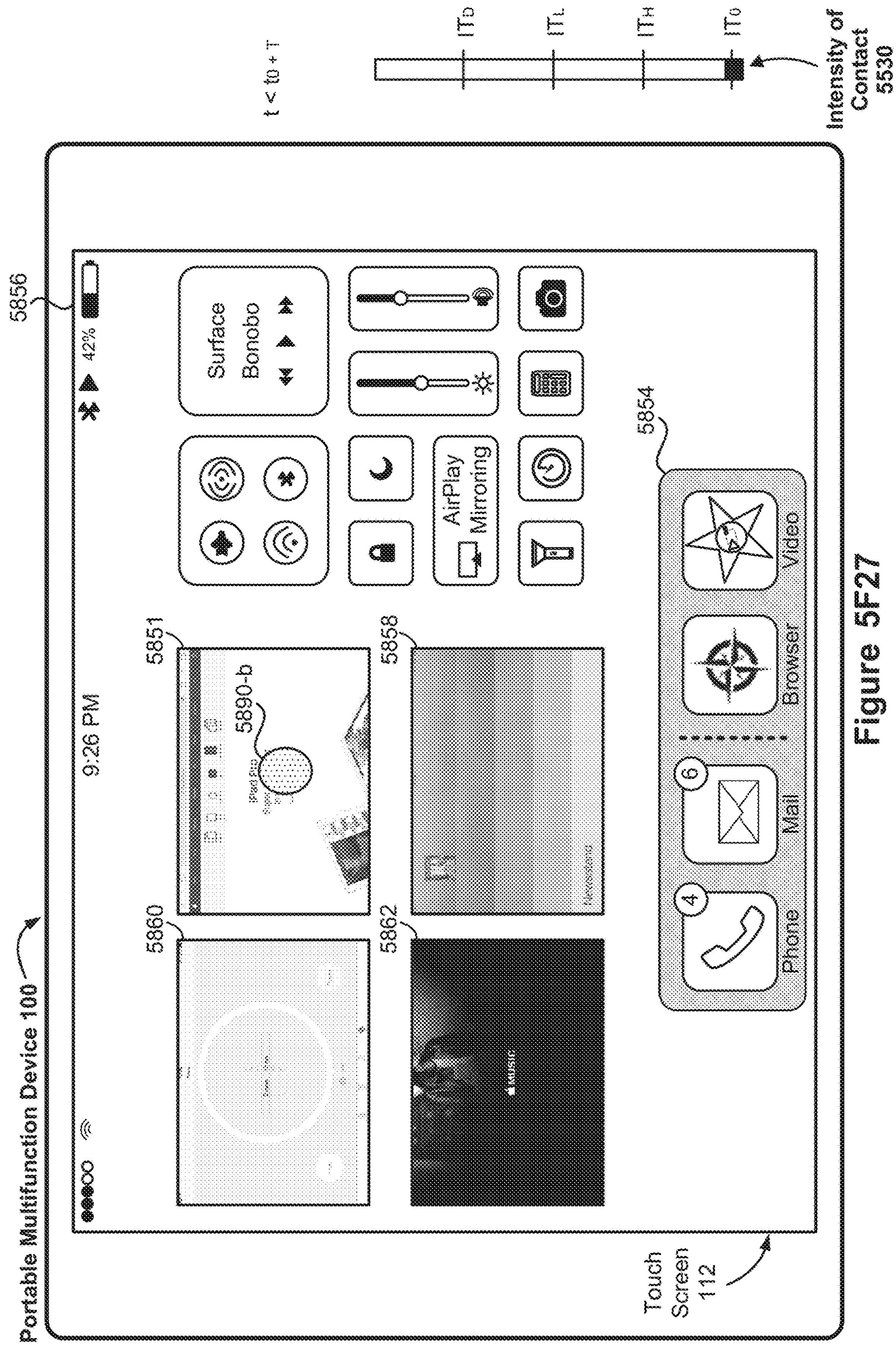
Figure 5F27

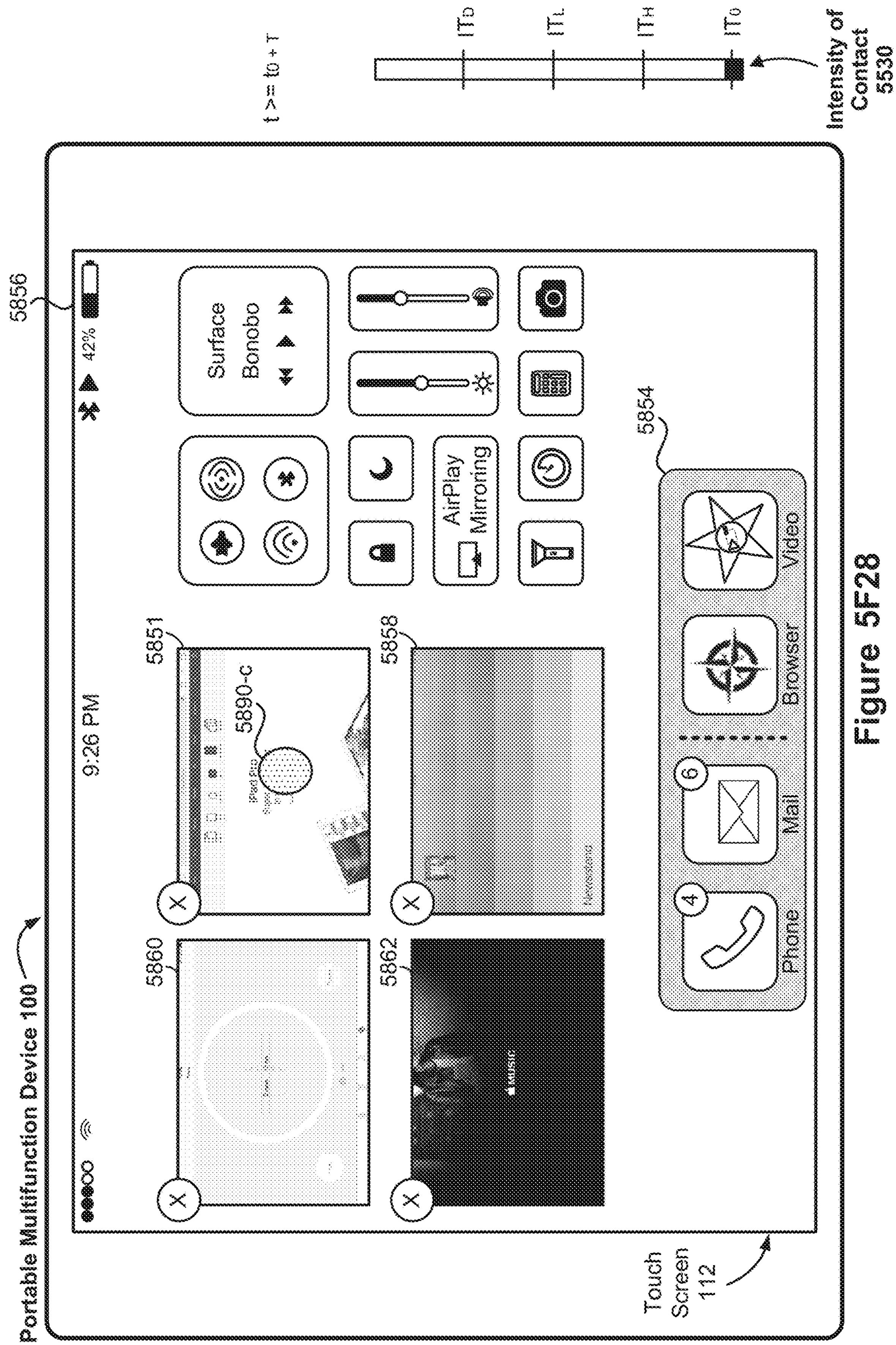
Figure 5F28

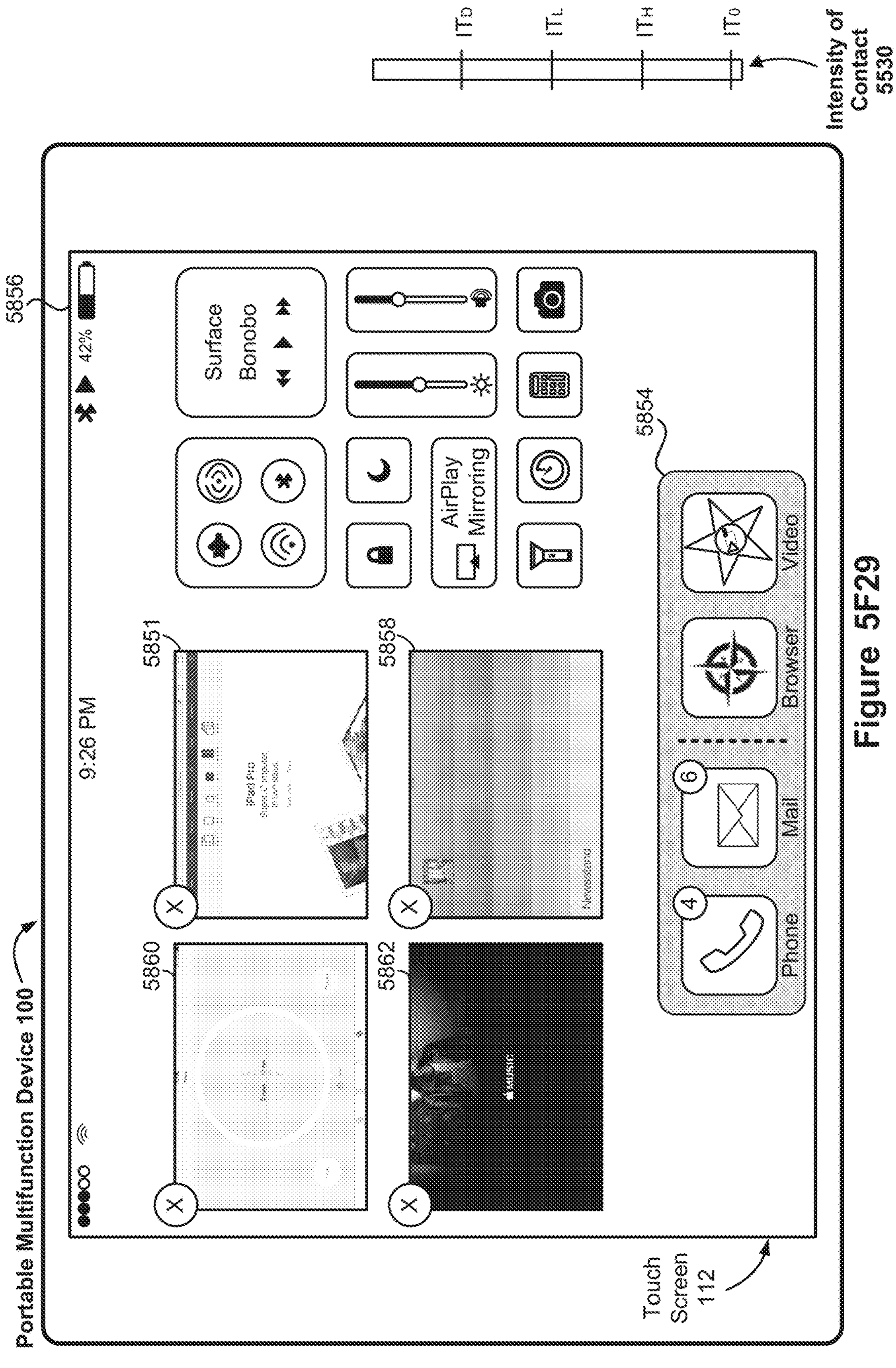
Figure 5F29

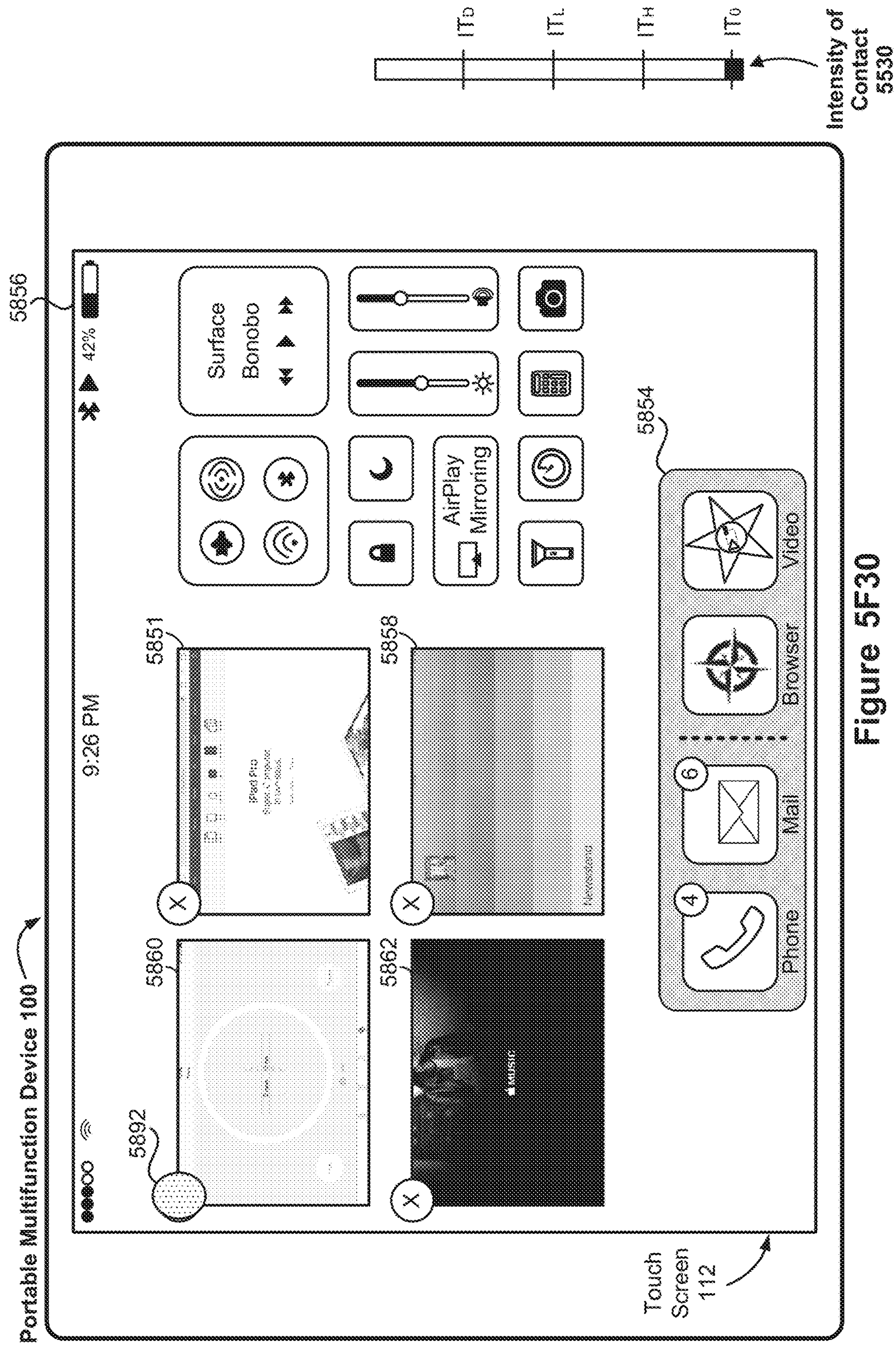
Figure 5F30

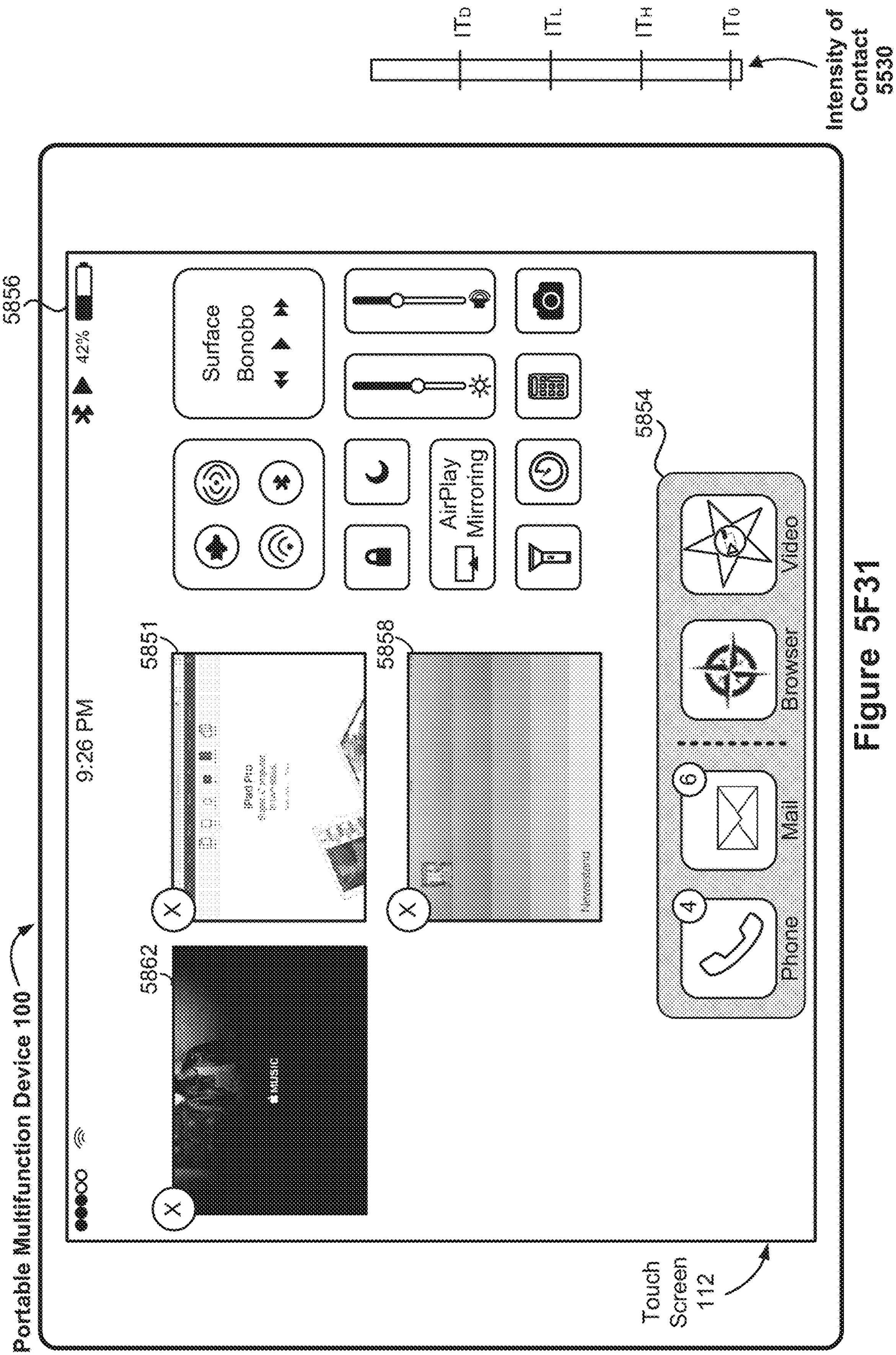
Figure 5F31

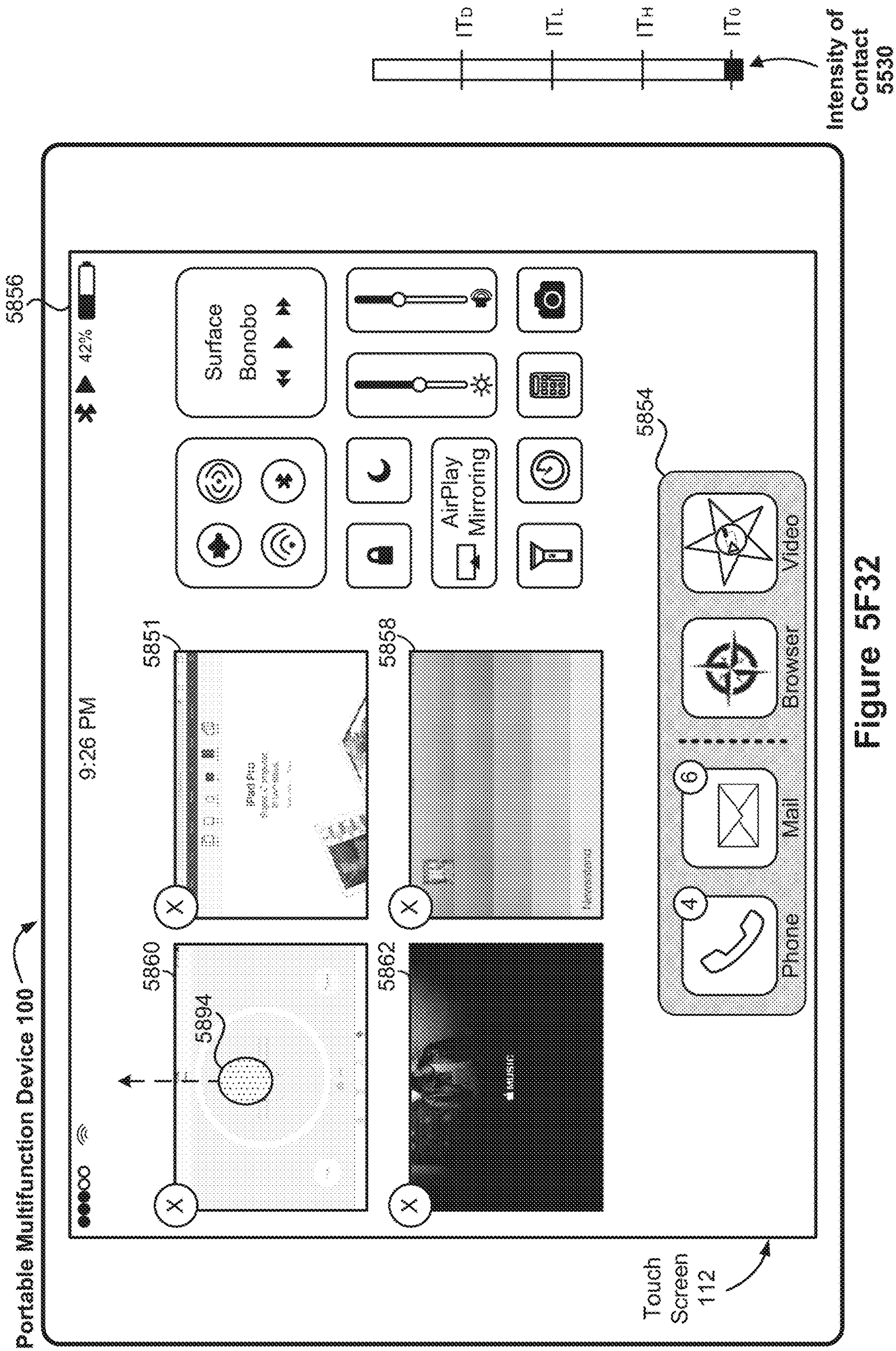
Figure 5F32

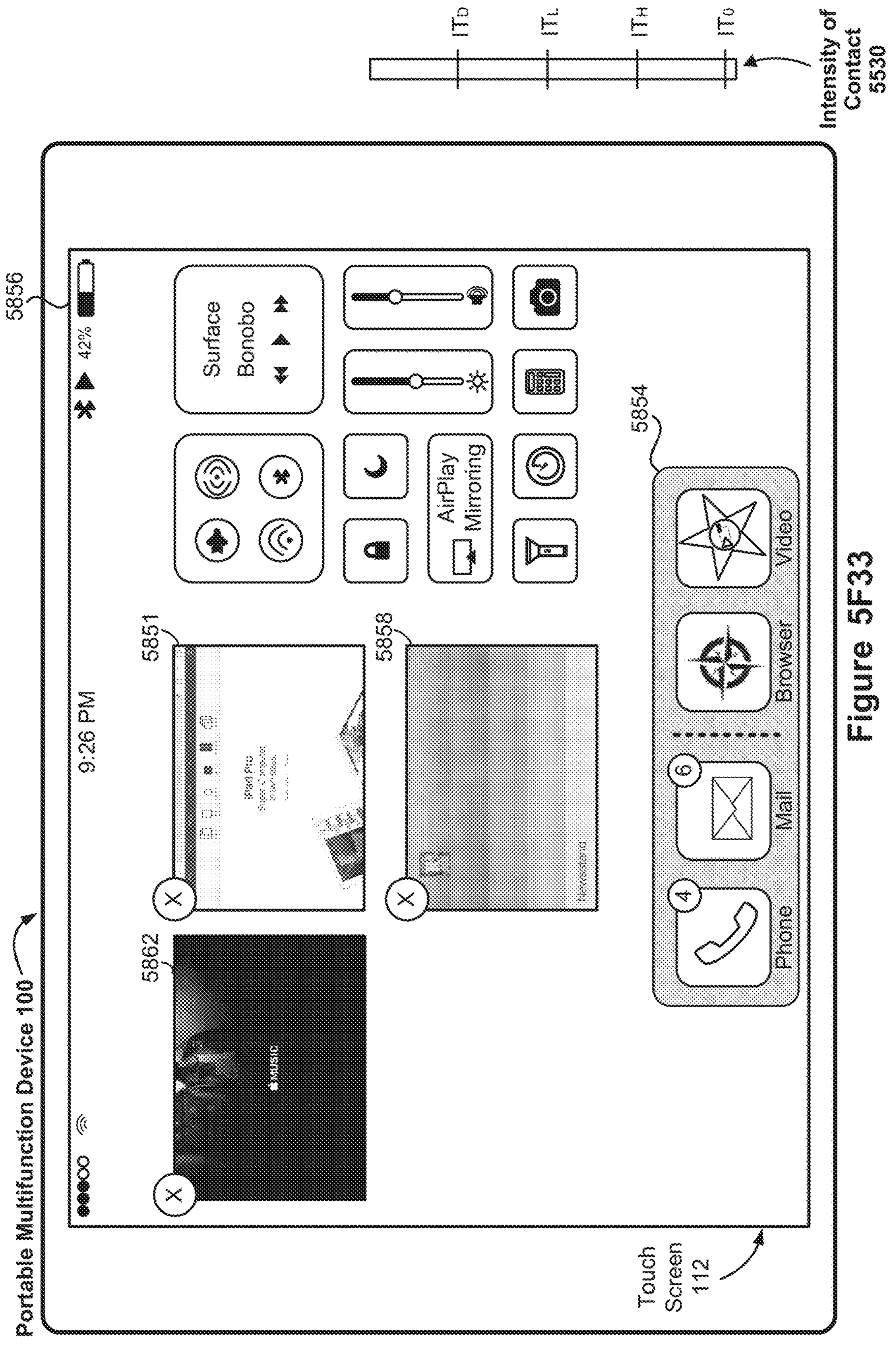
Figure 5F33

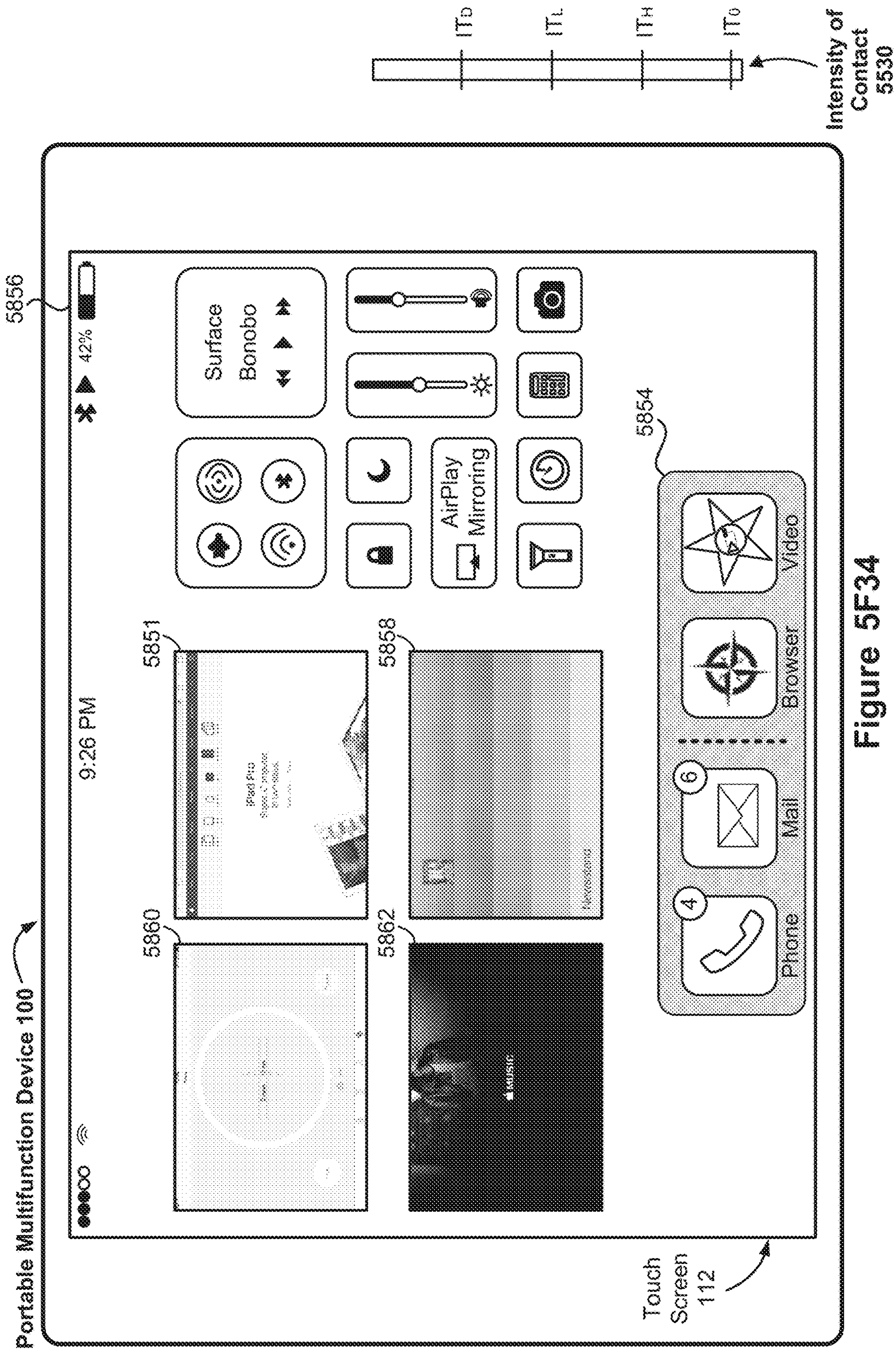
Figure 5F34

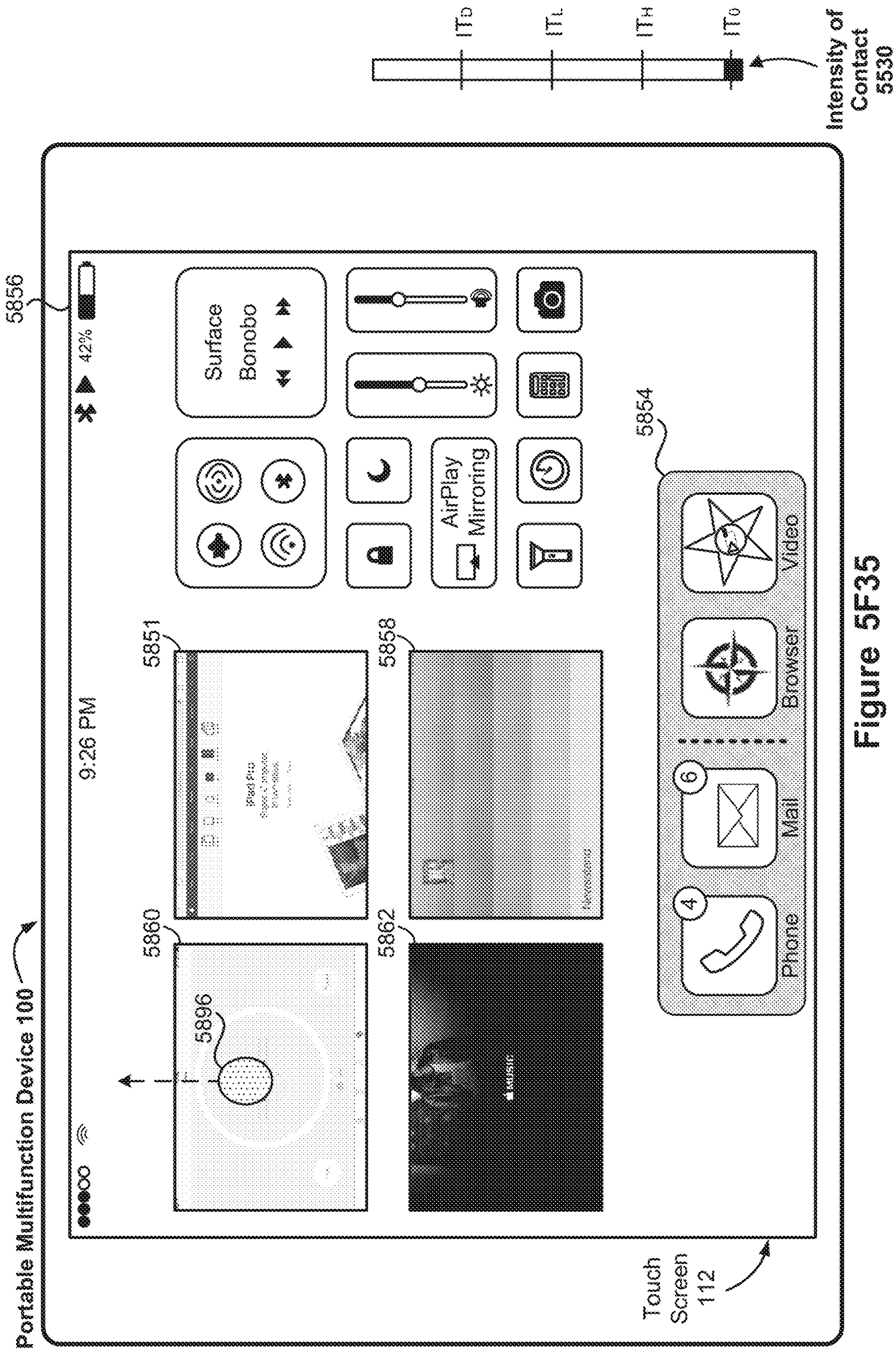
Figure 5F35

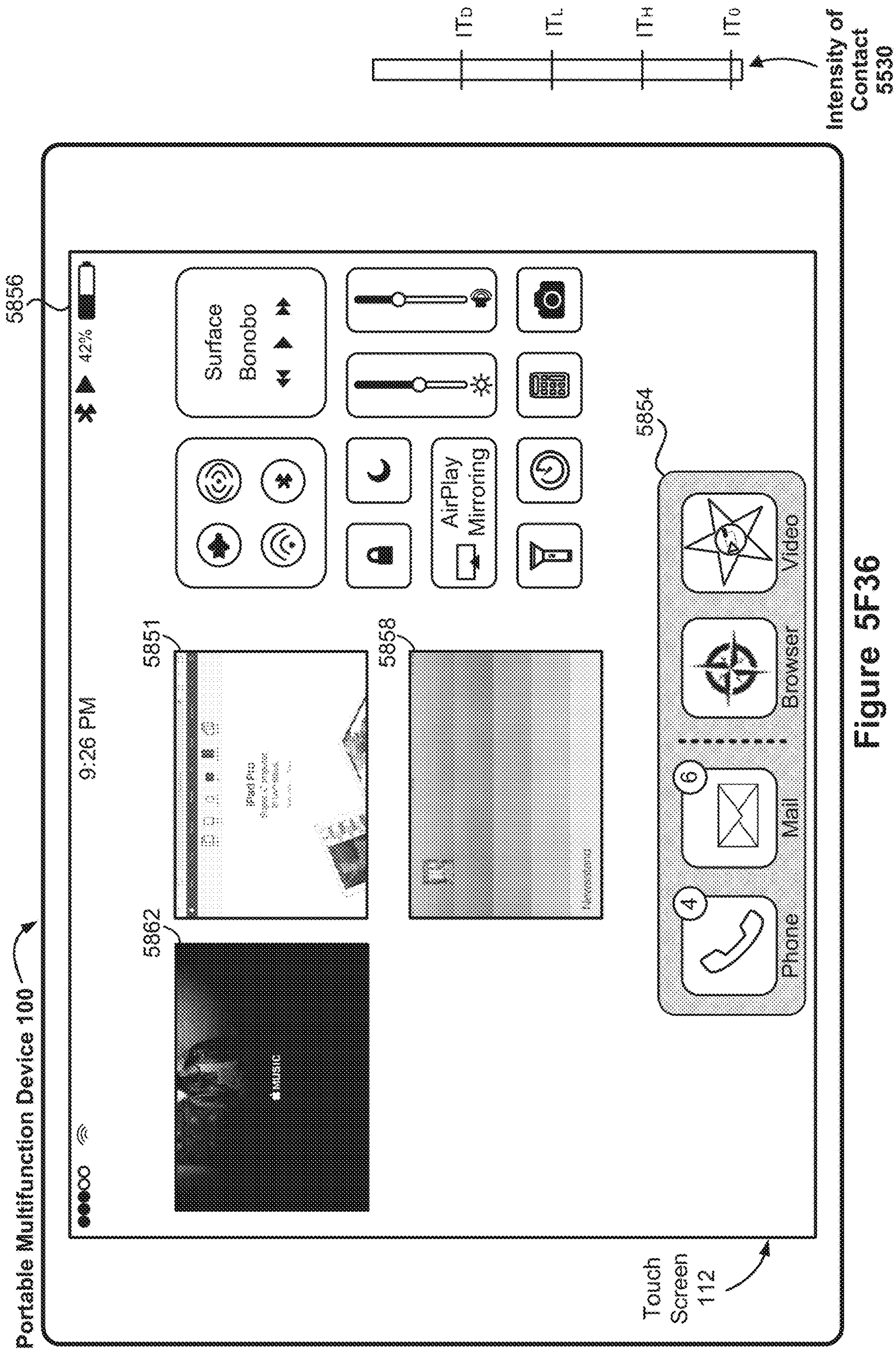
Figure 5F36

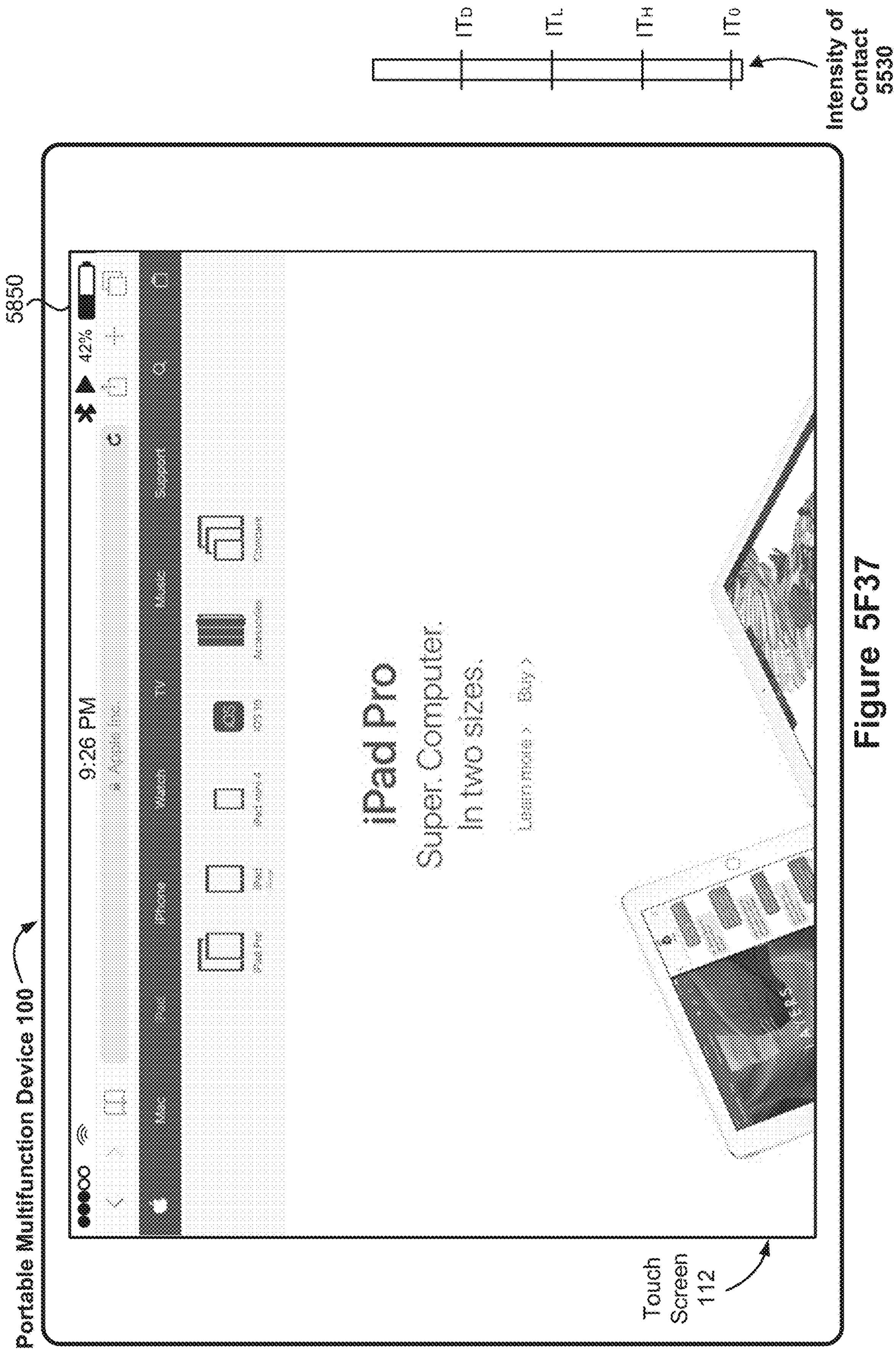
Figure 5F37

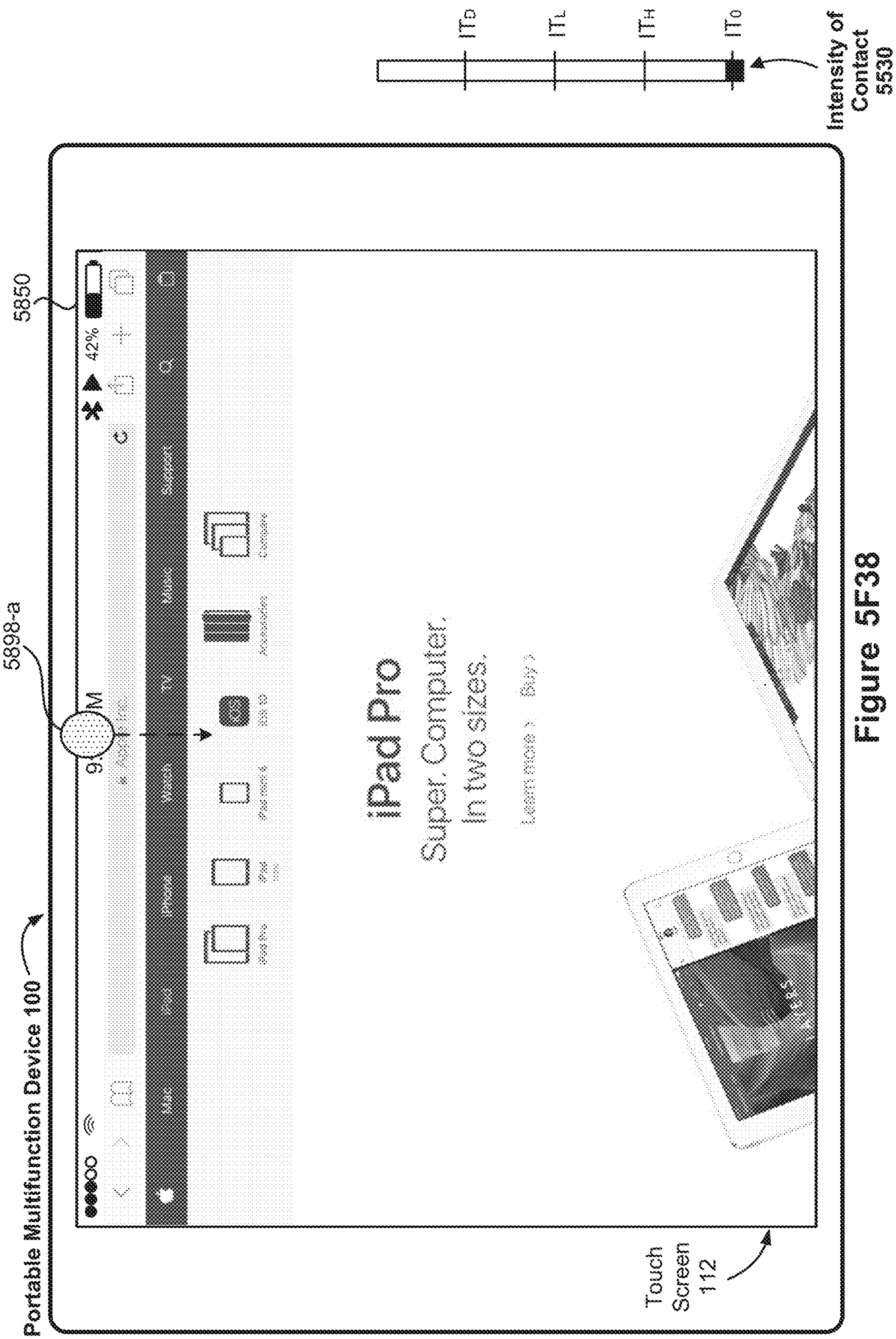
Figure 5F38

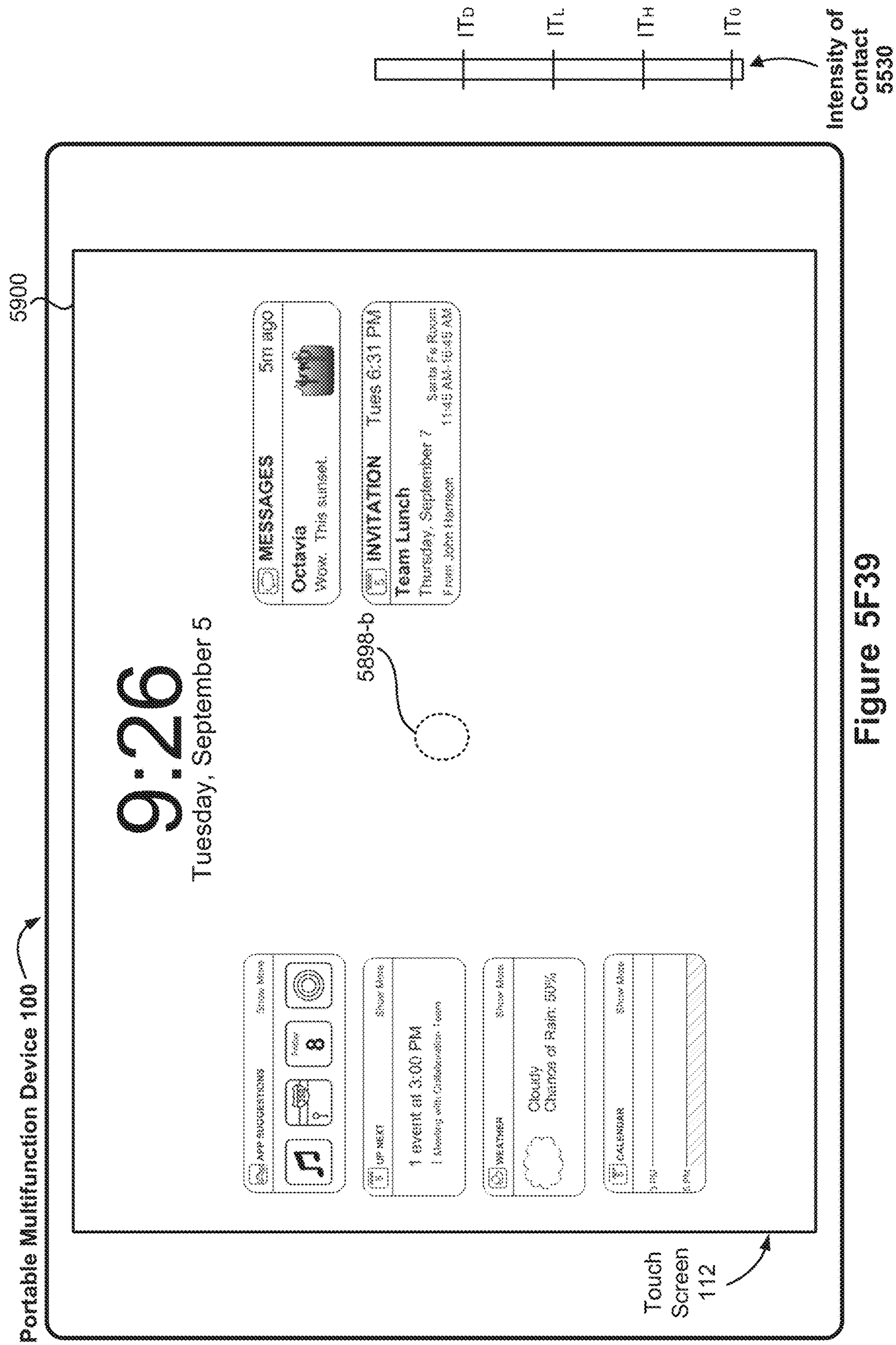
Figure 5F39

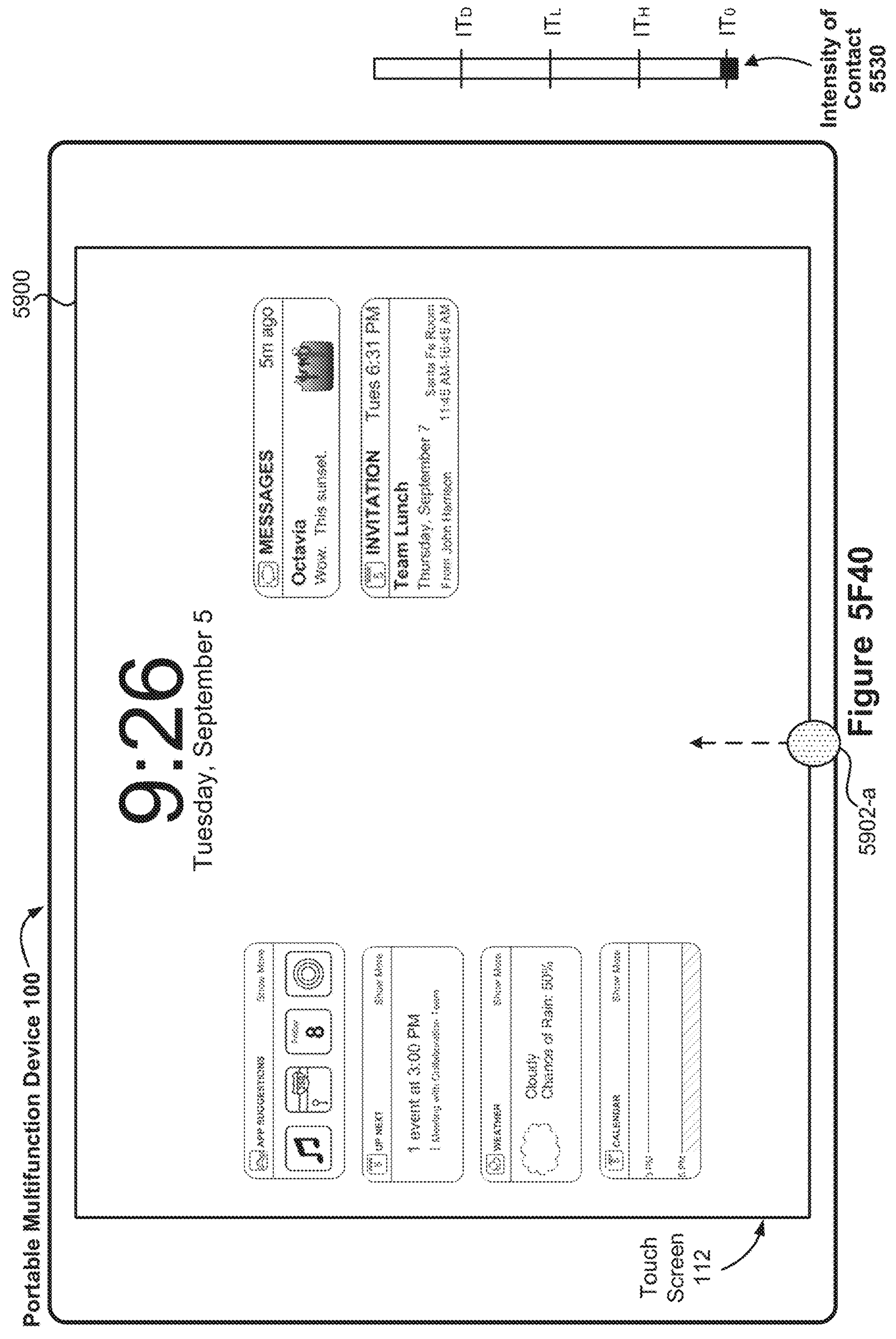
Figure 5F40

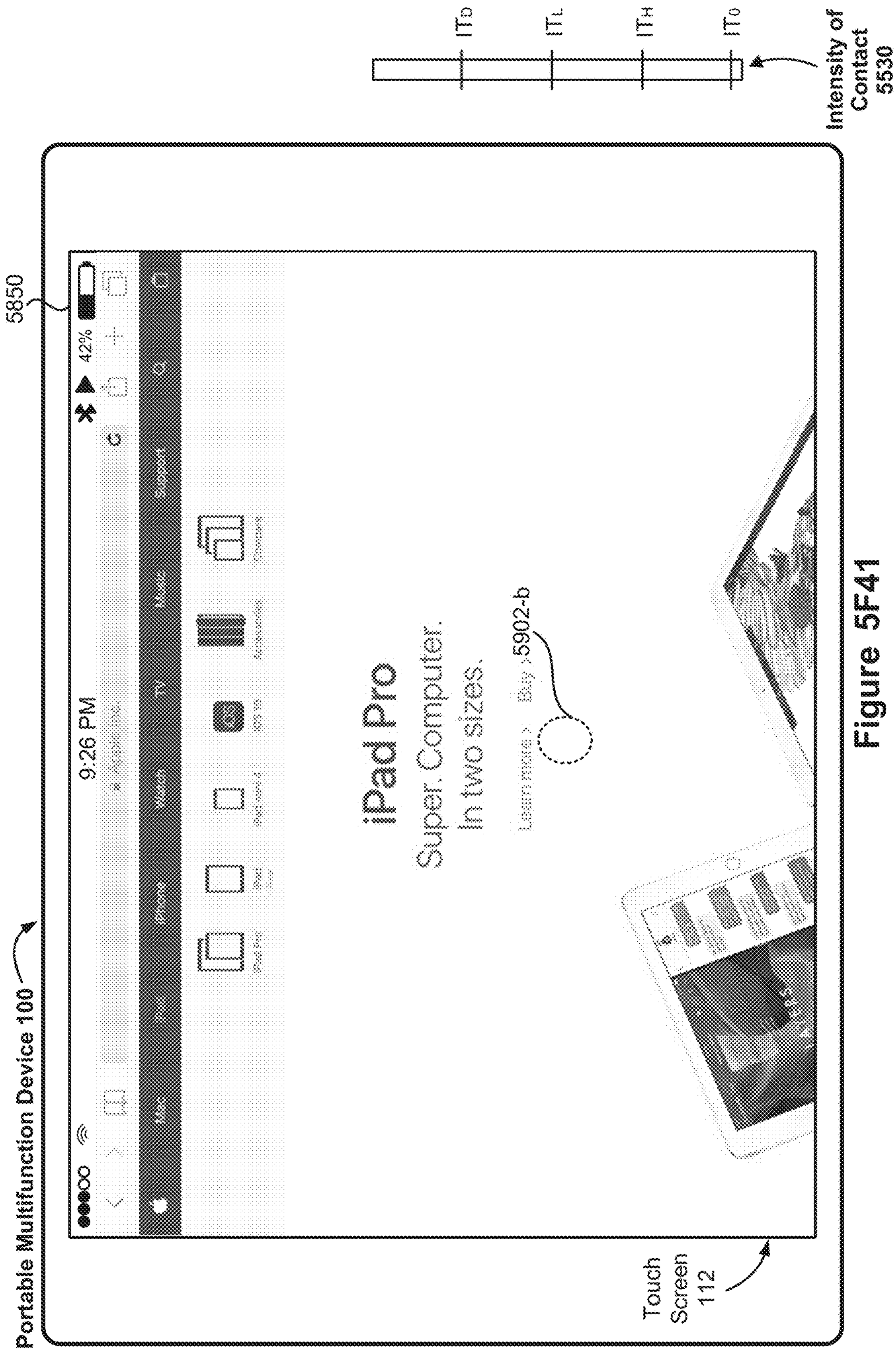
Figure 5F41

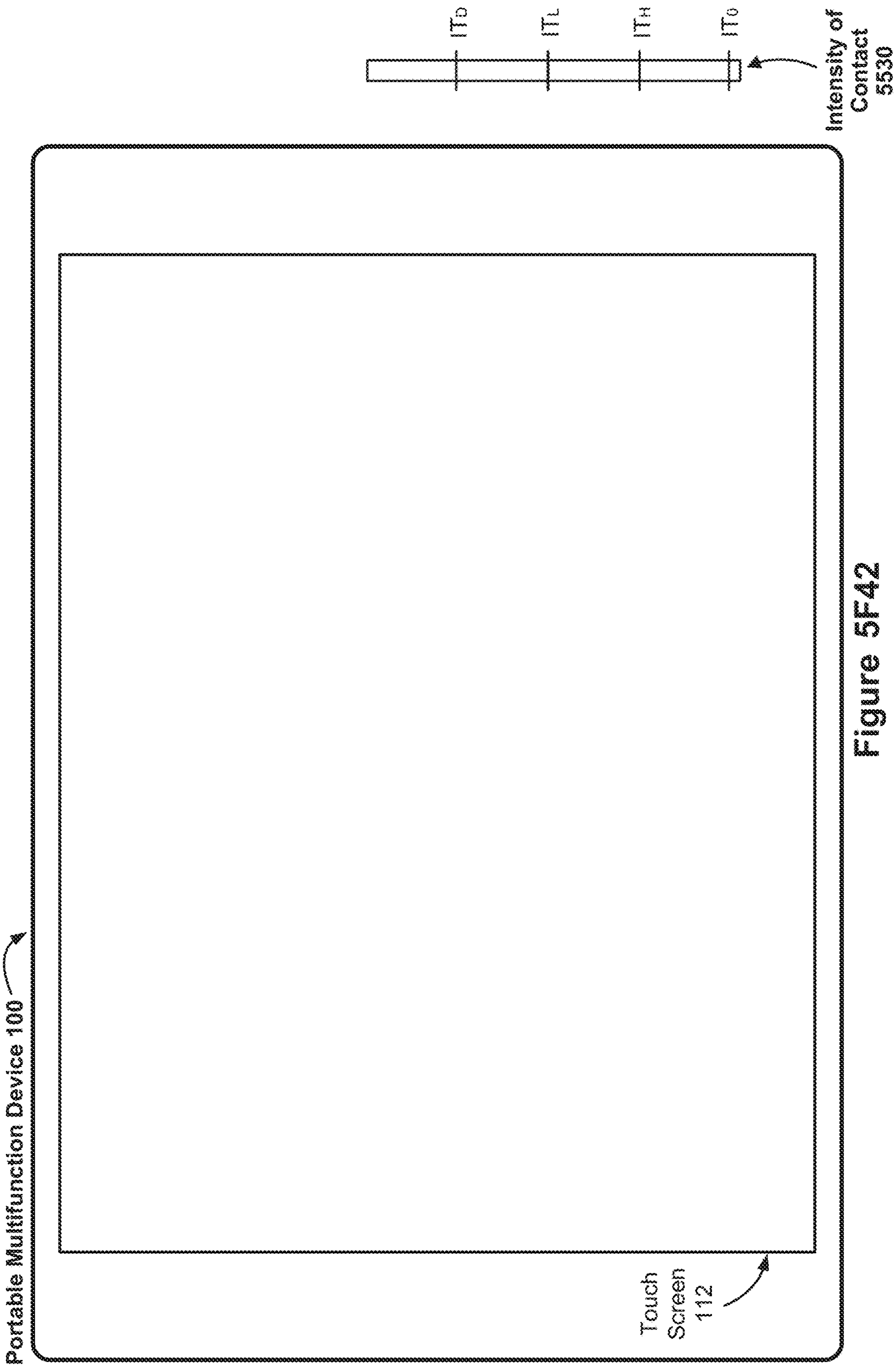
Figure 5F42

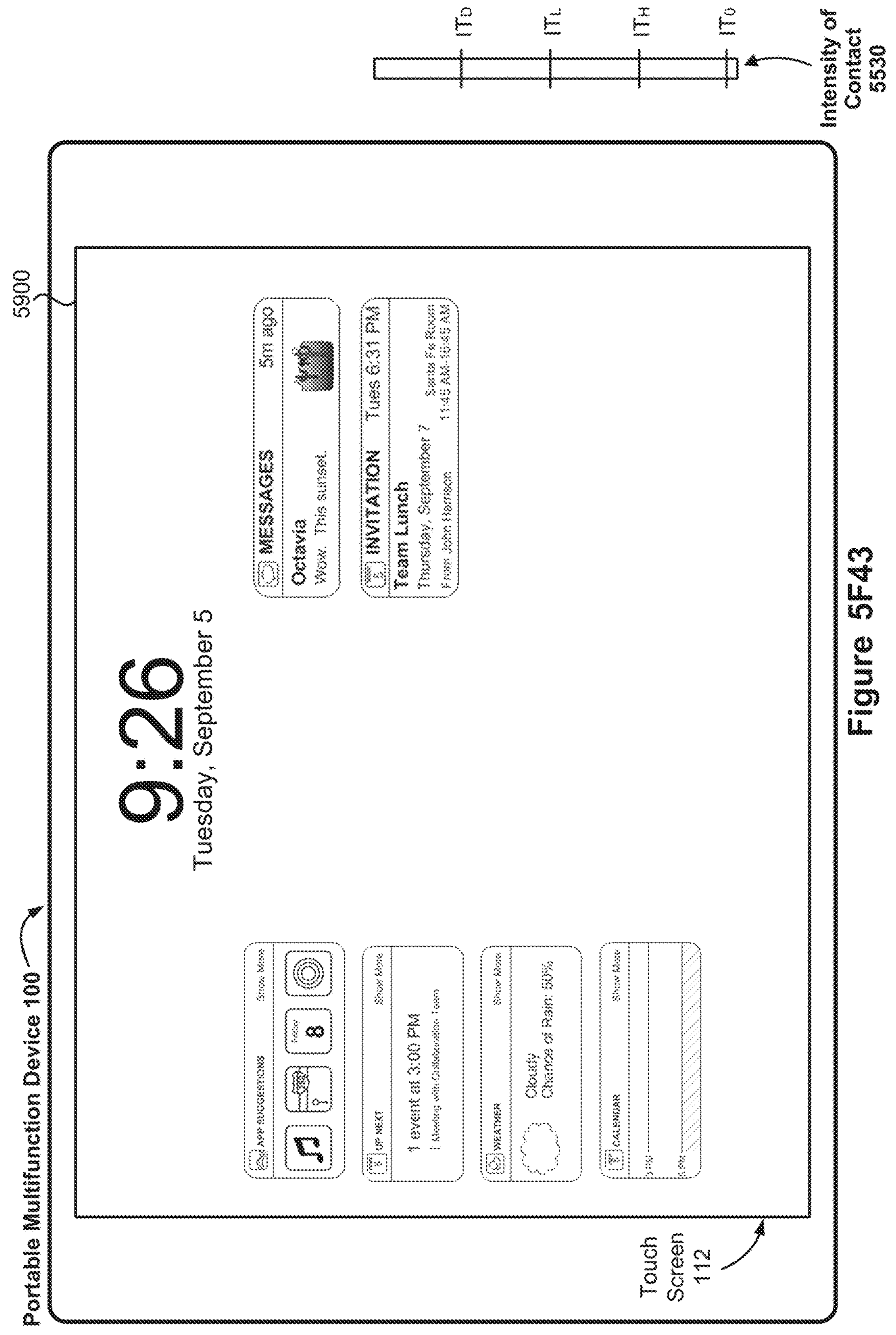
Figure 5F43

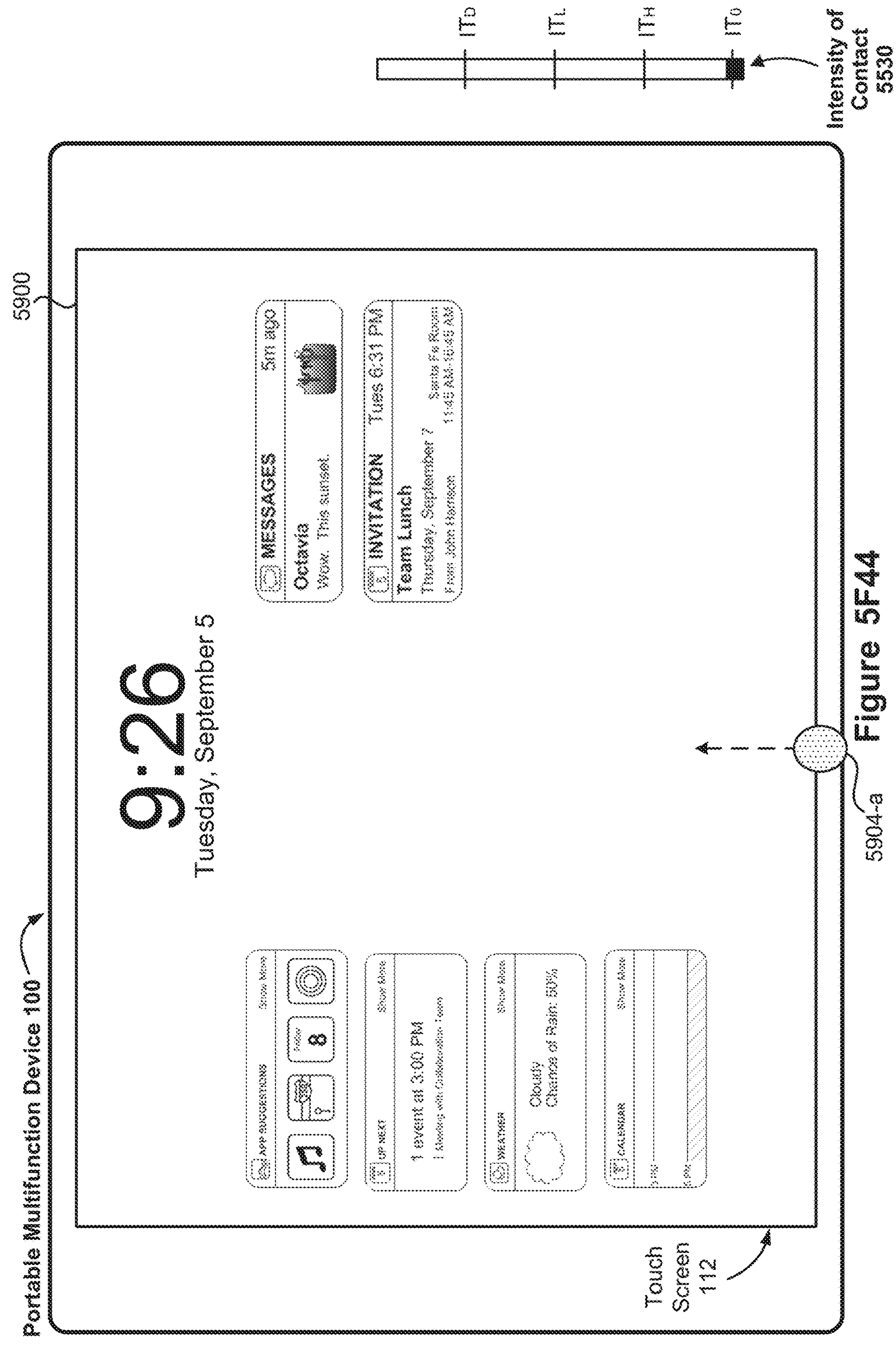
Figure 5F44

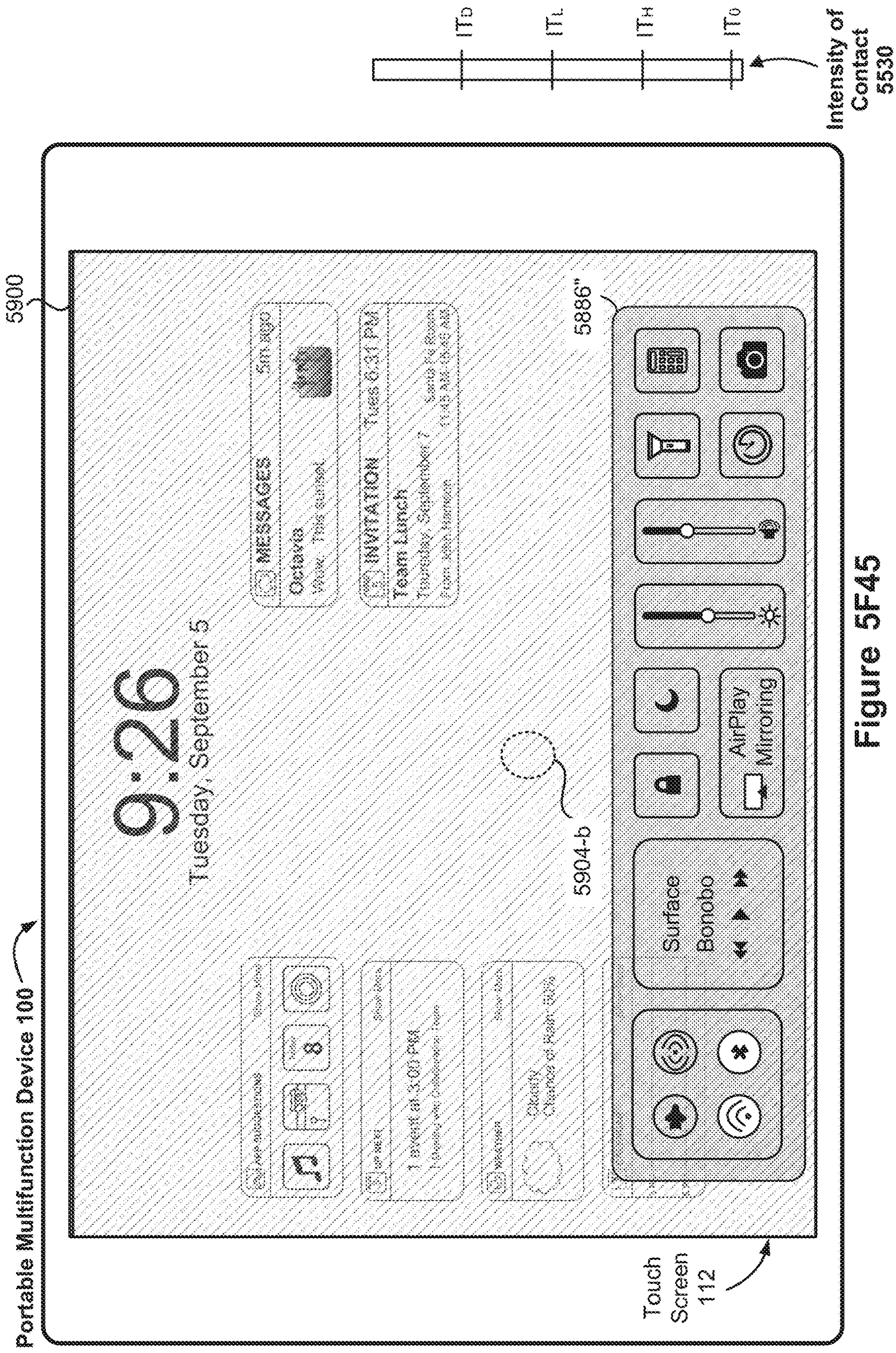
Figure 5F45

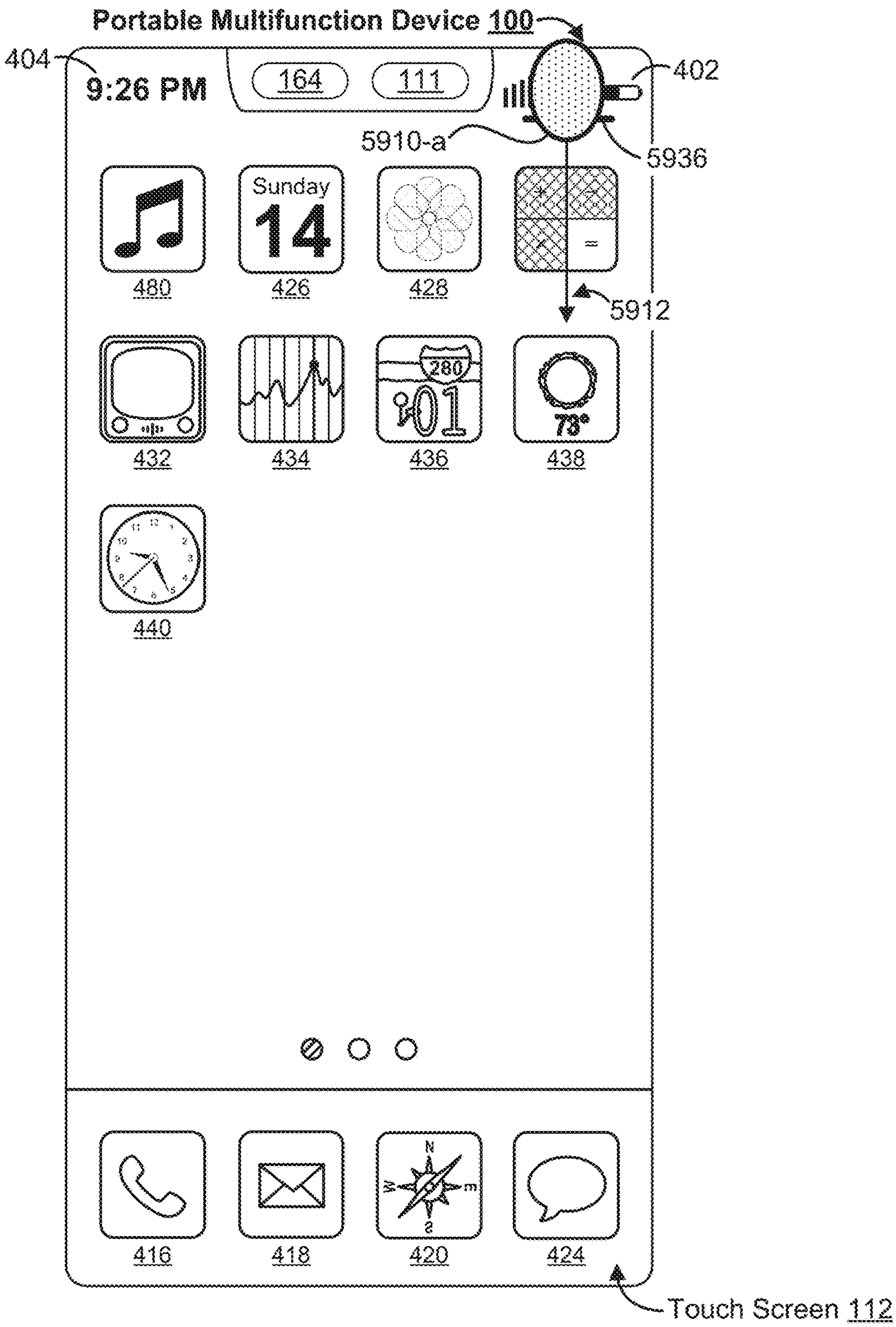
Figure 5G1

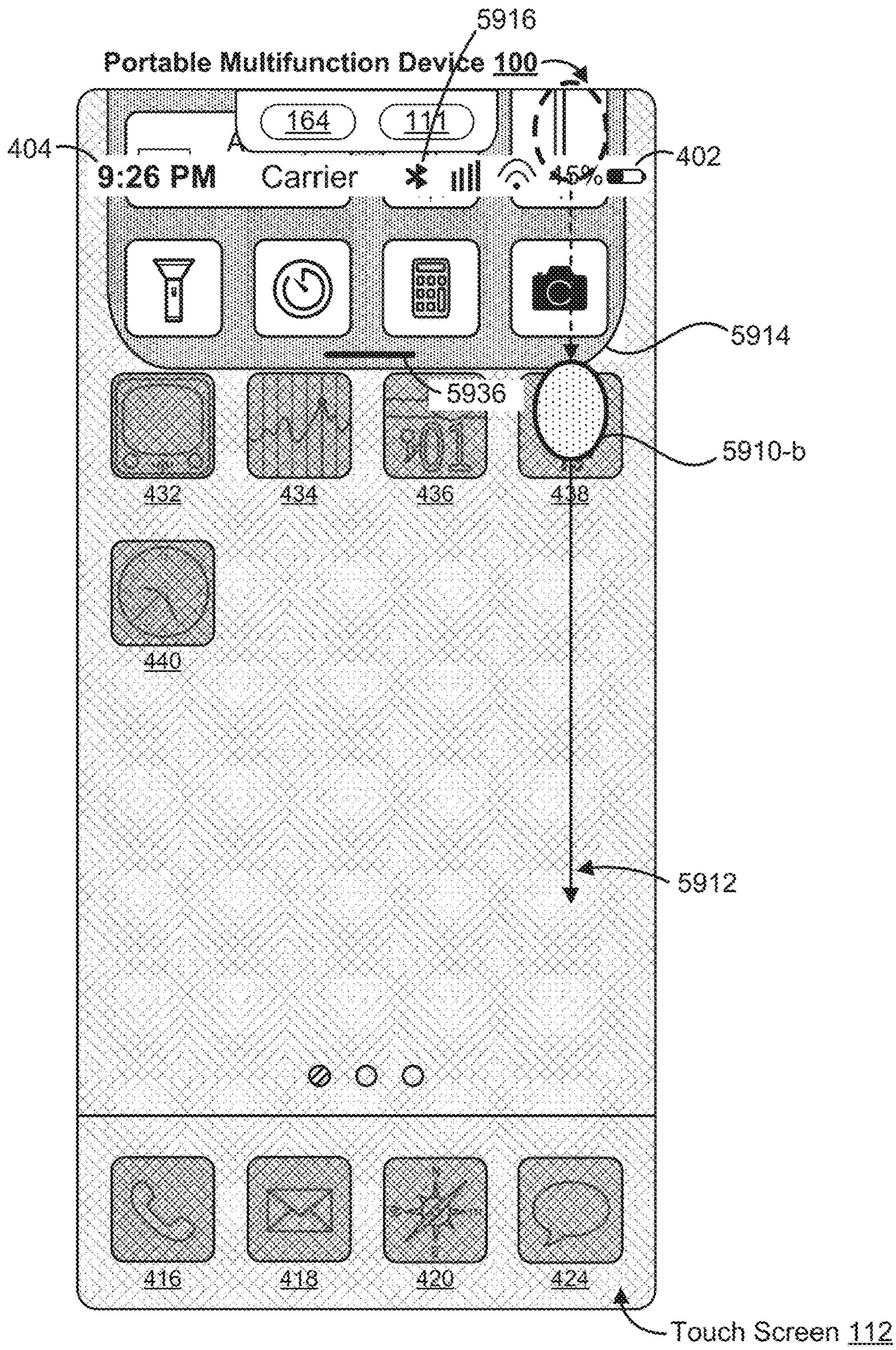
Figure 5G2

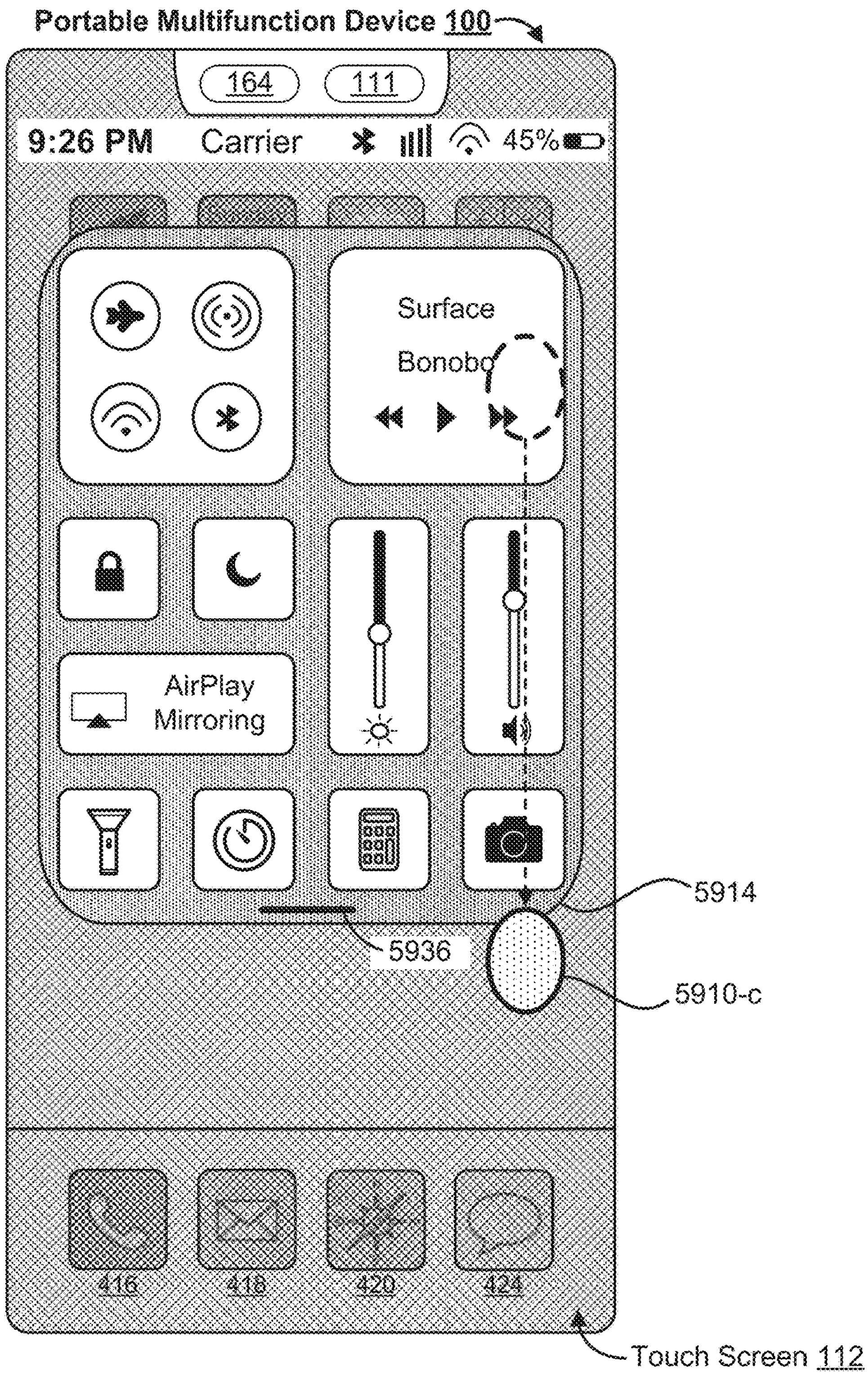
Figure 5G3

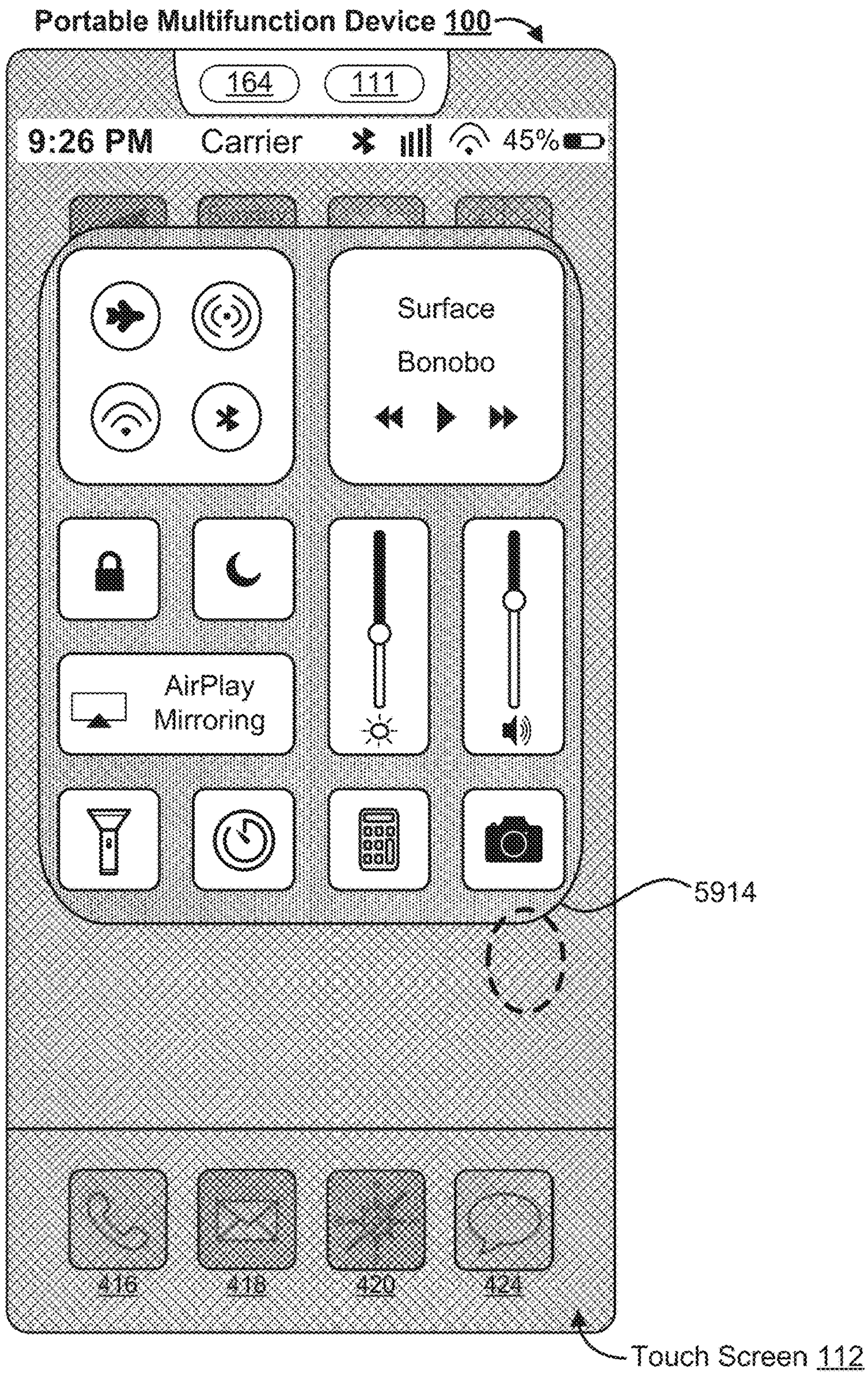
Figure 5G4

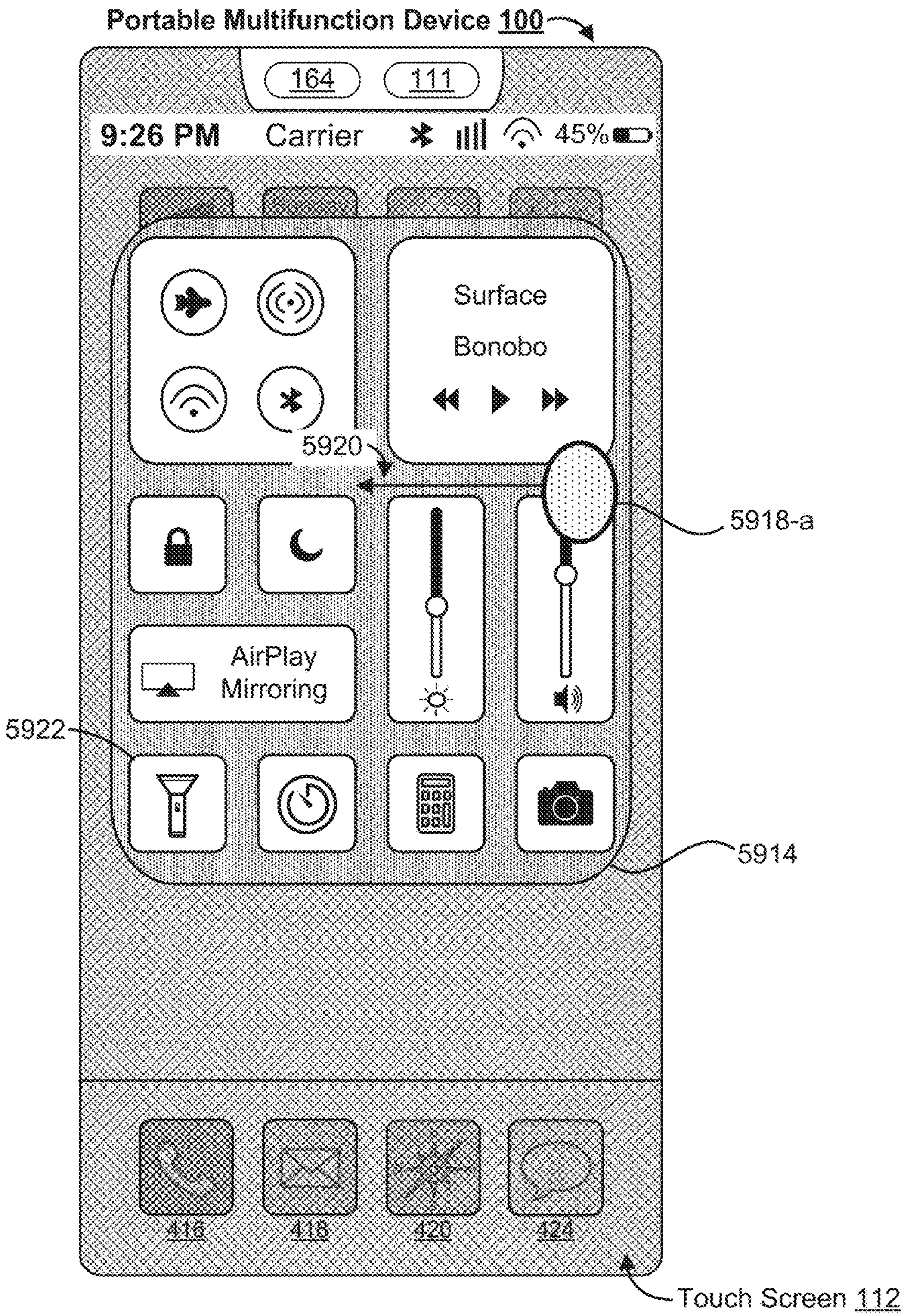
Figure 5G5

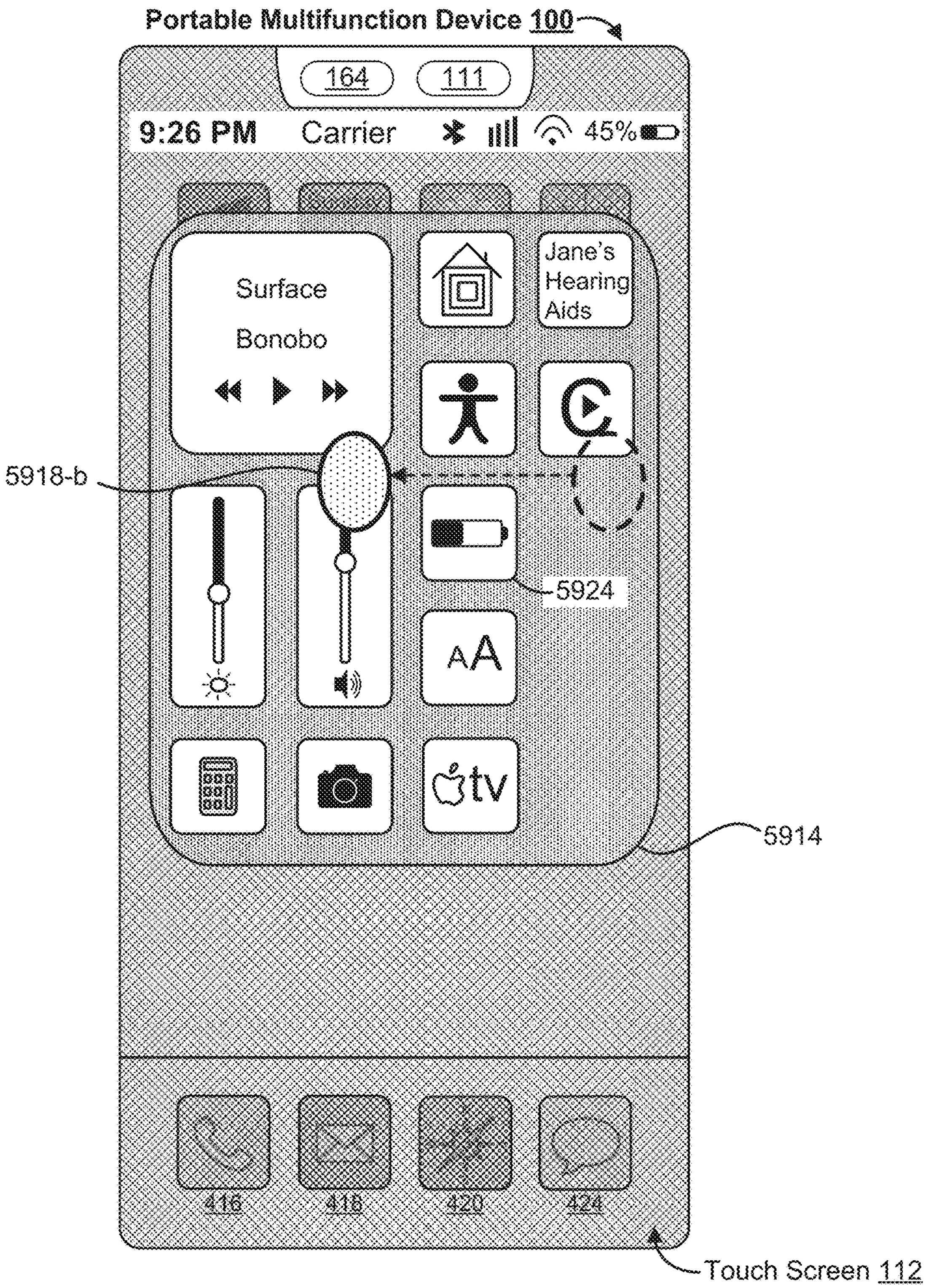
Figure 5G6

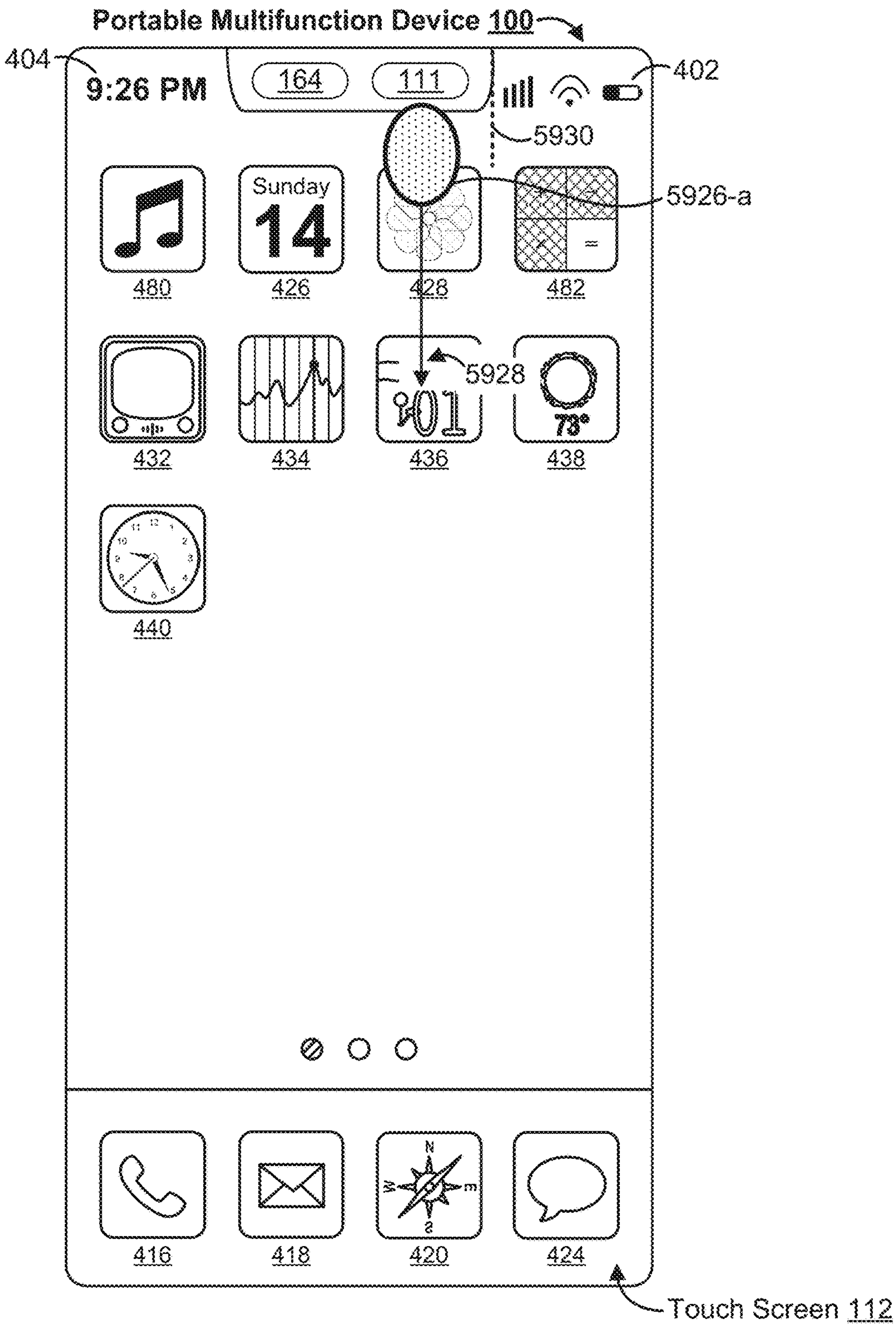
Figure 5G7

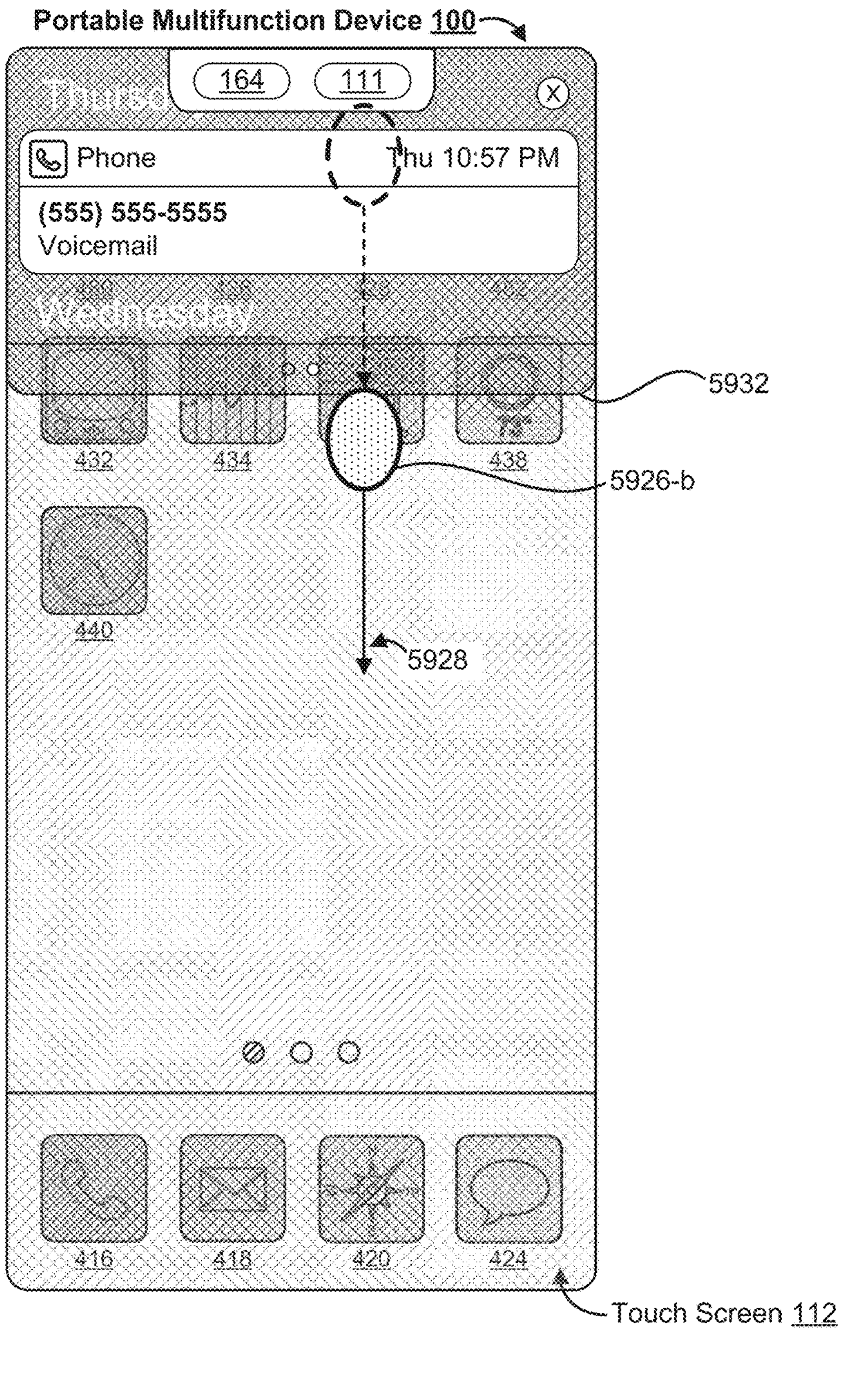
Figure 5G8

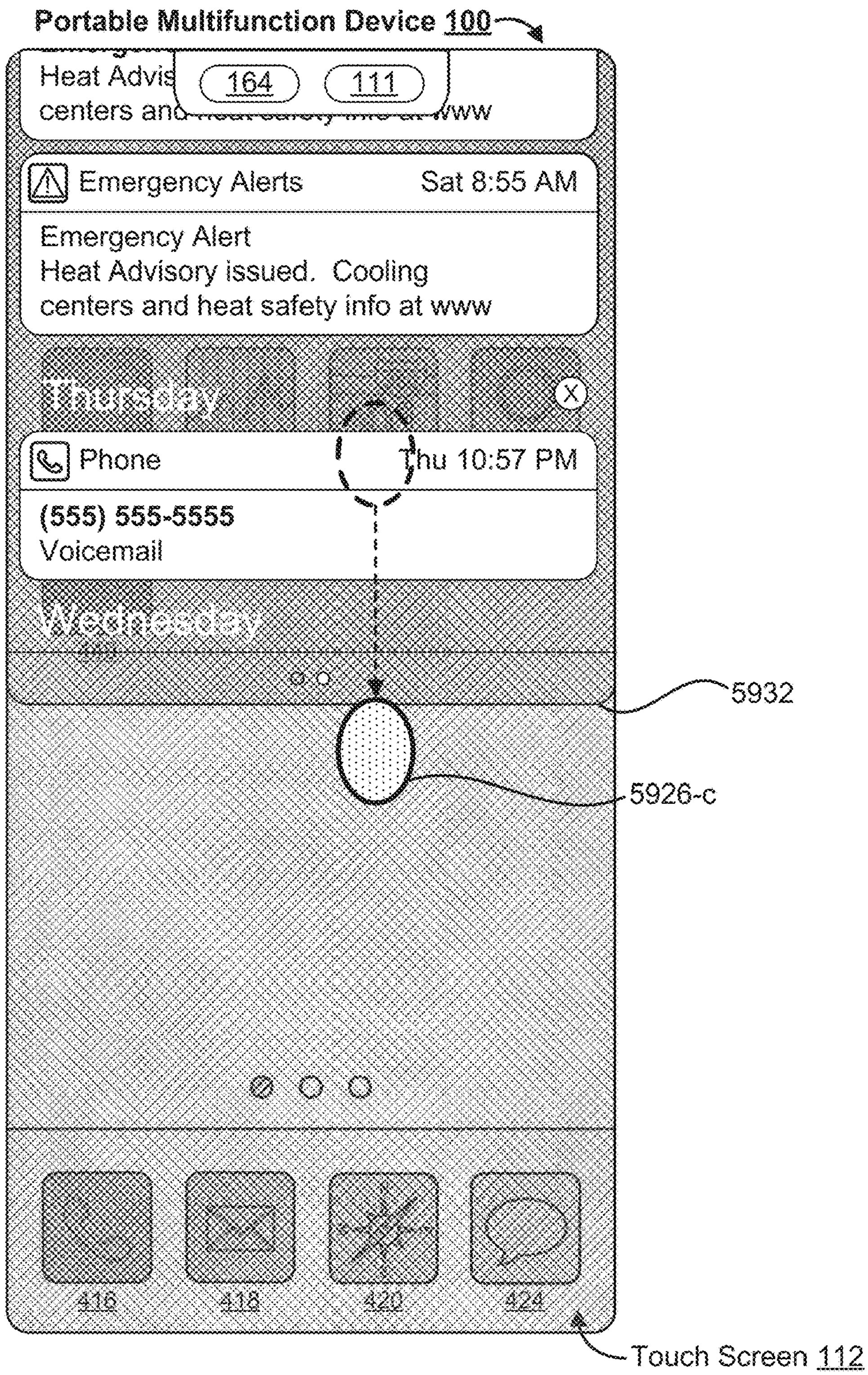
Figure 5G9

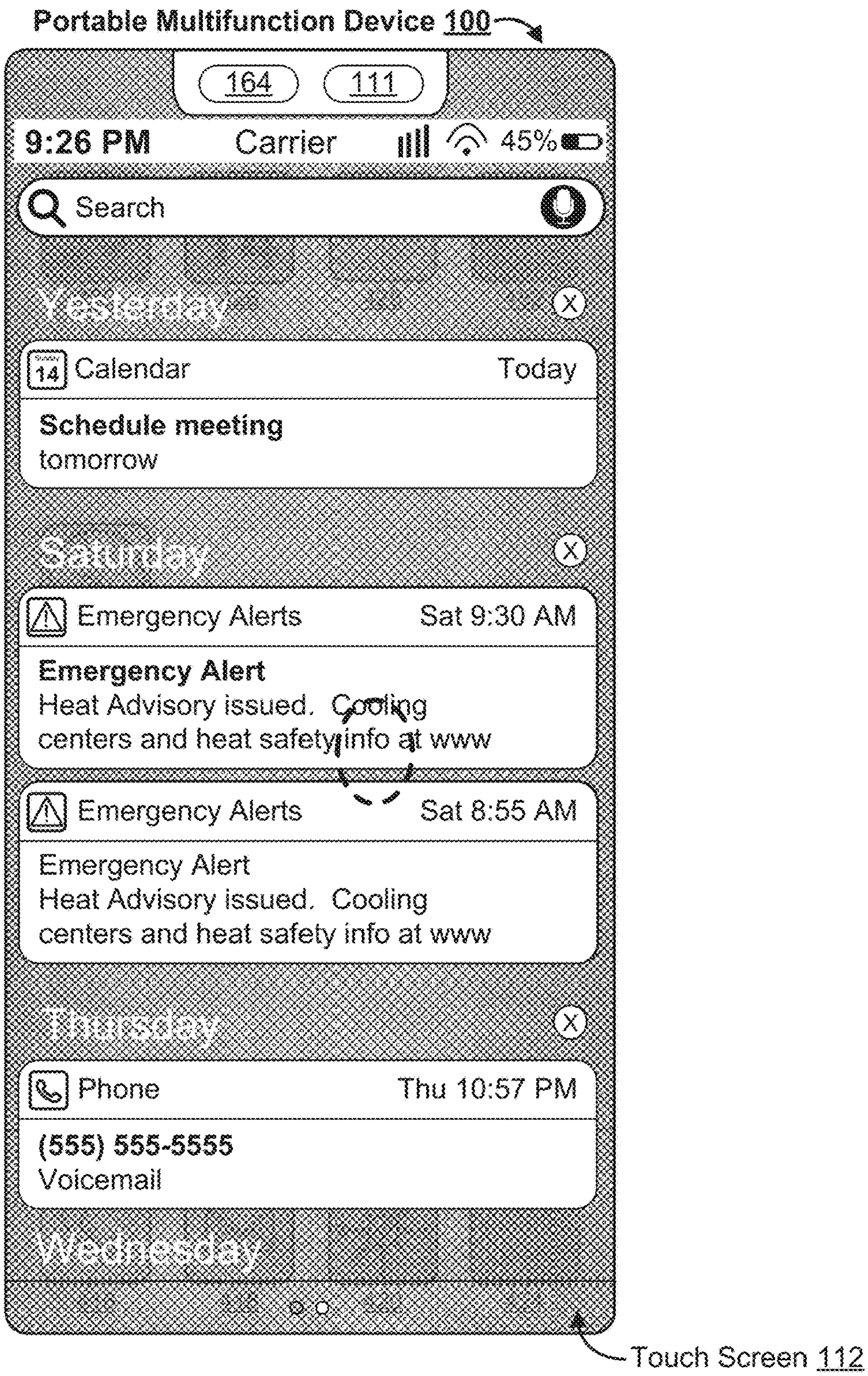
Figure 5G10

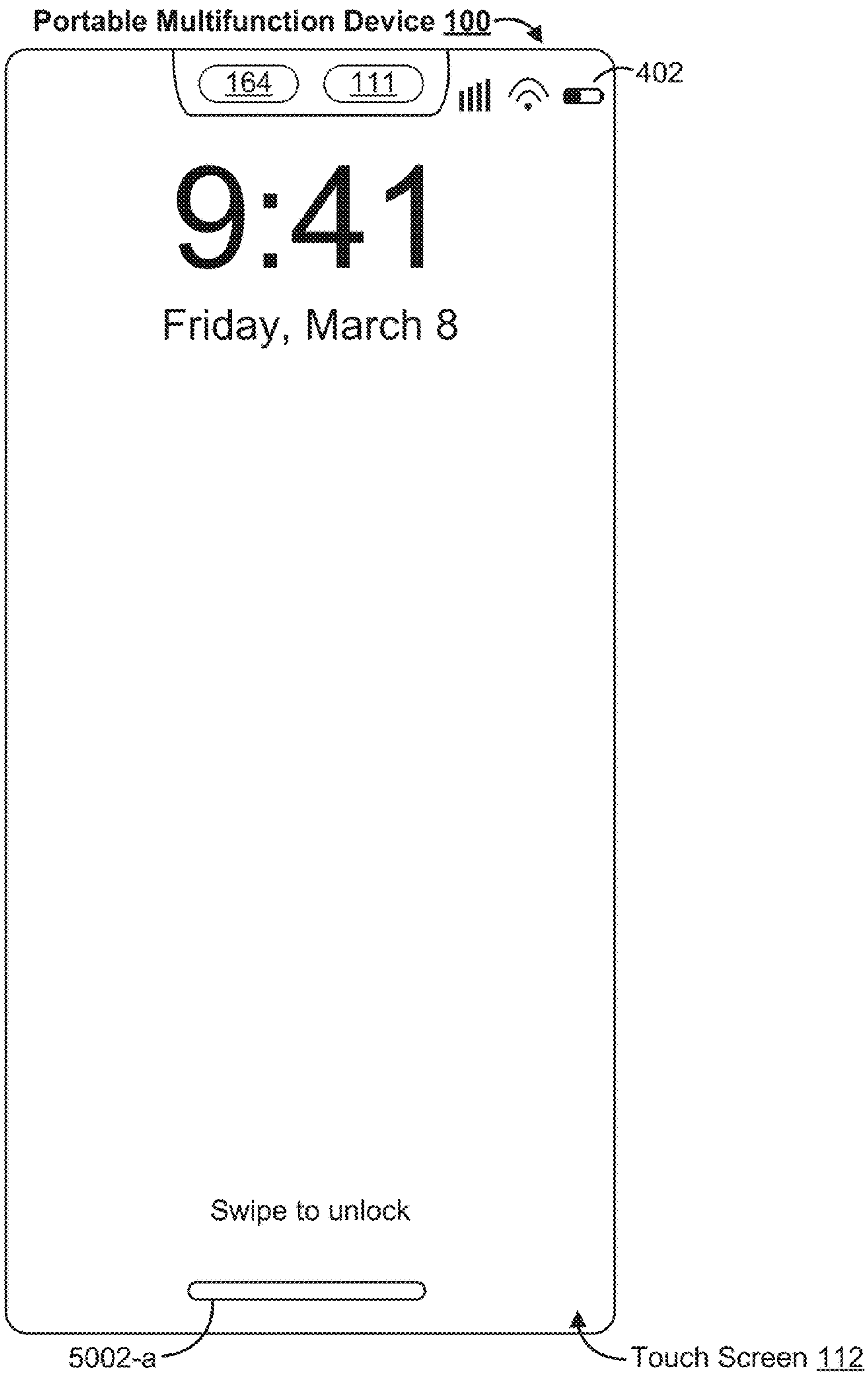
Figure 5G11

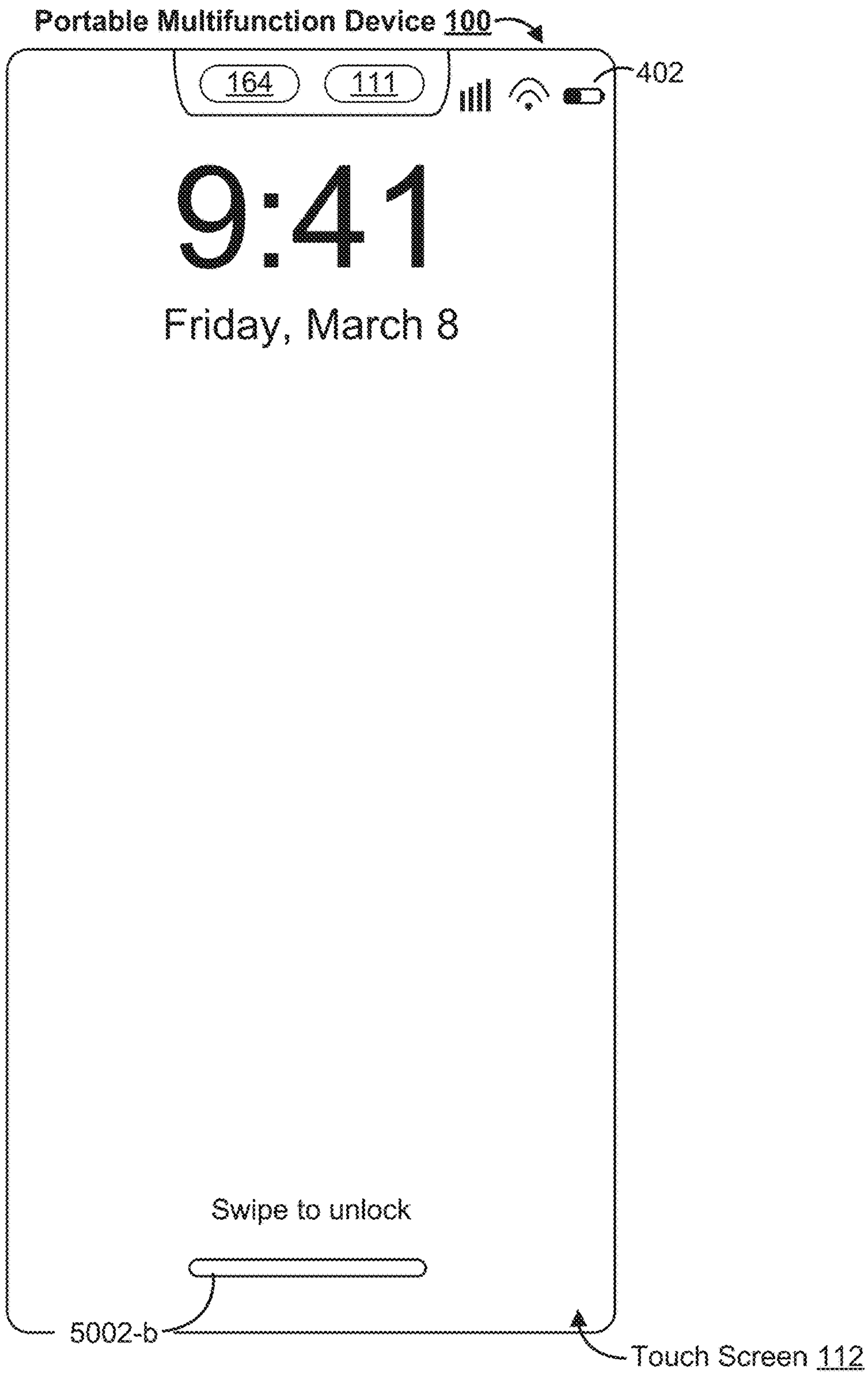
Figure 5G12

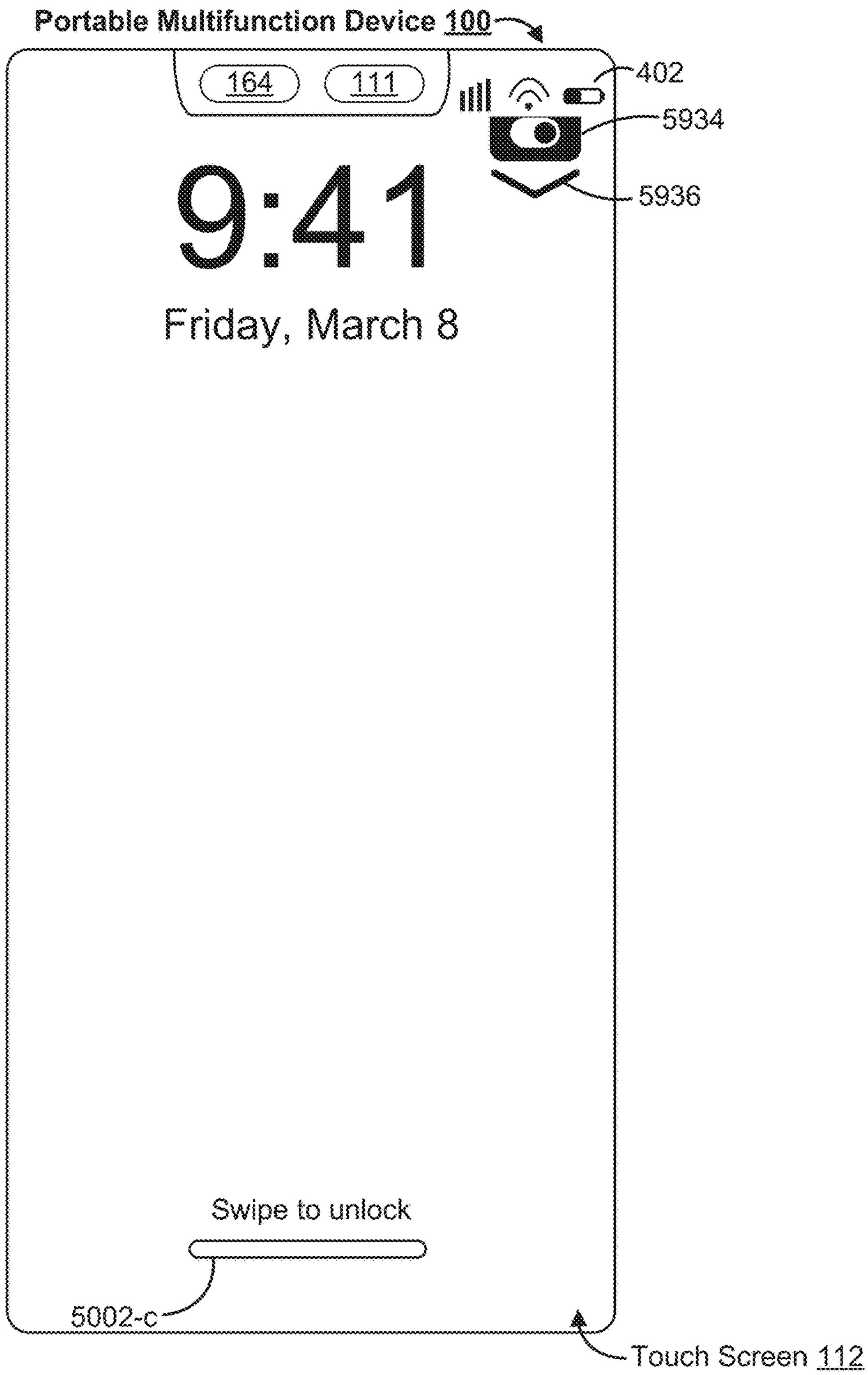
Figure 5G13

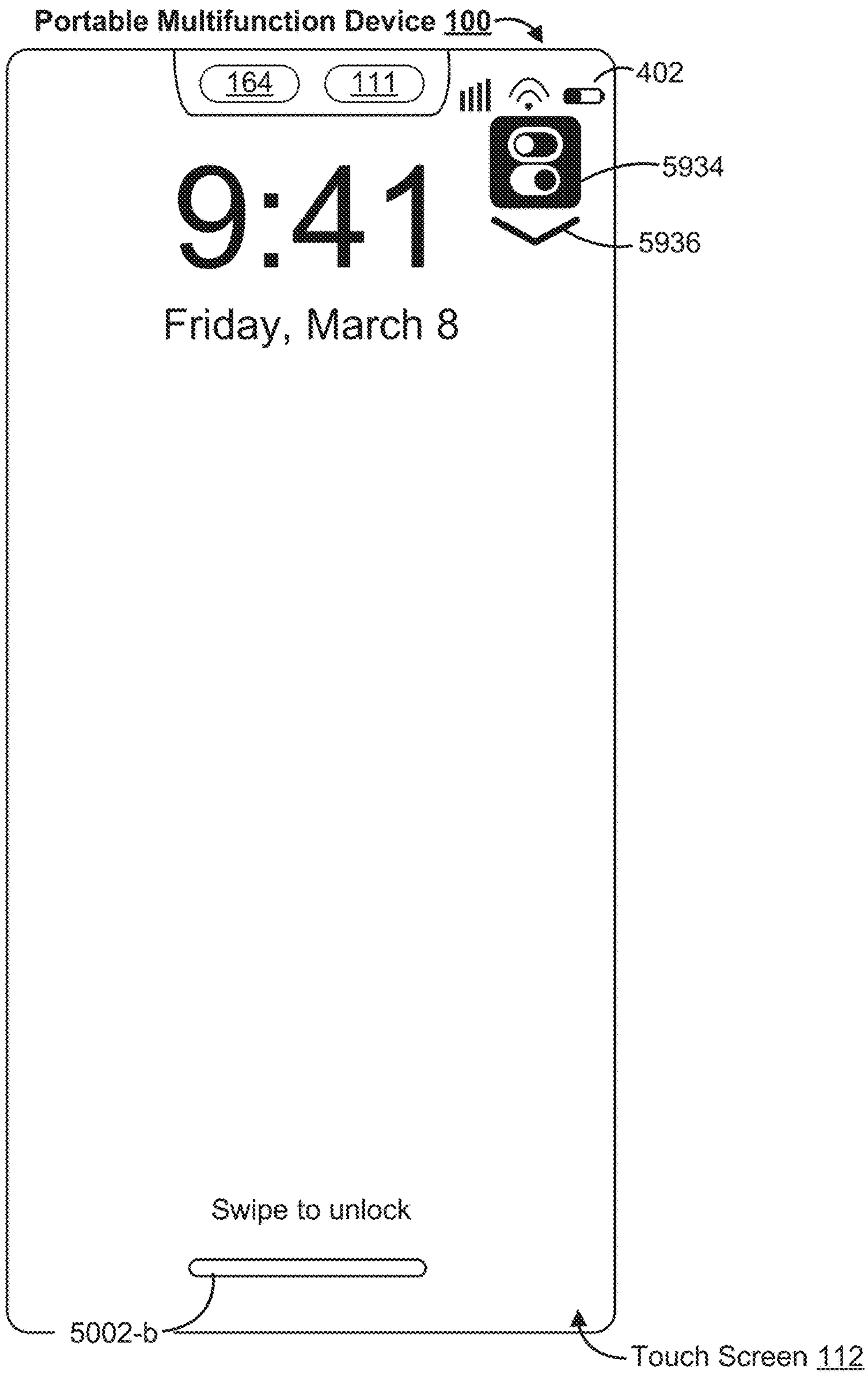
Figure 5G14

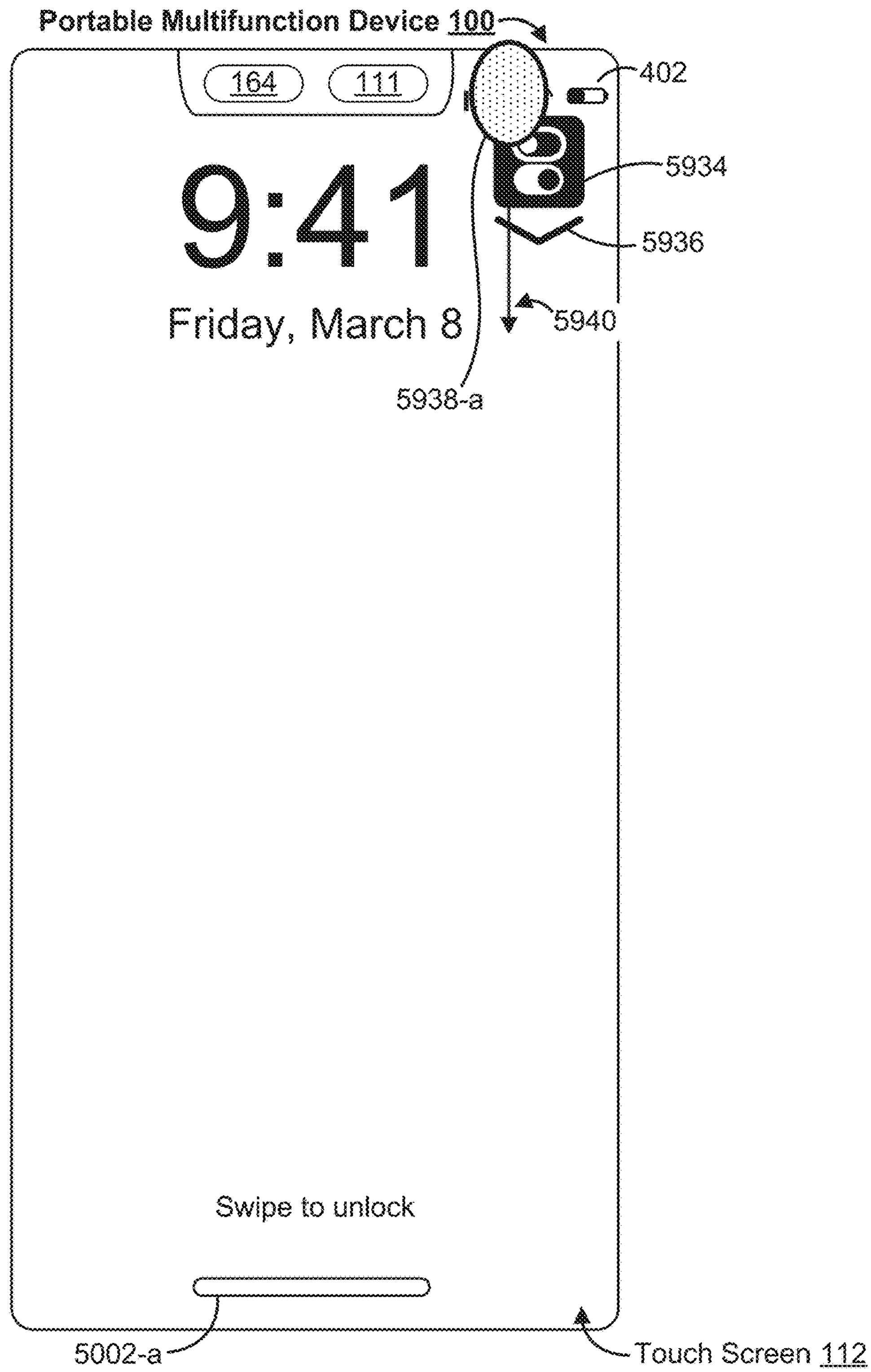
Figure 5G15

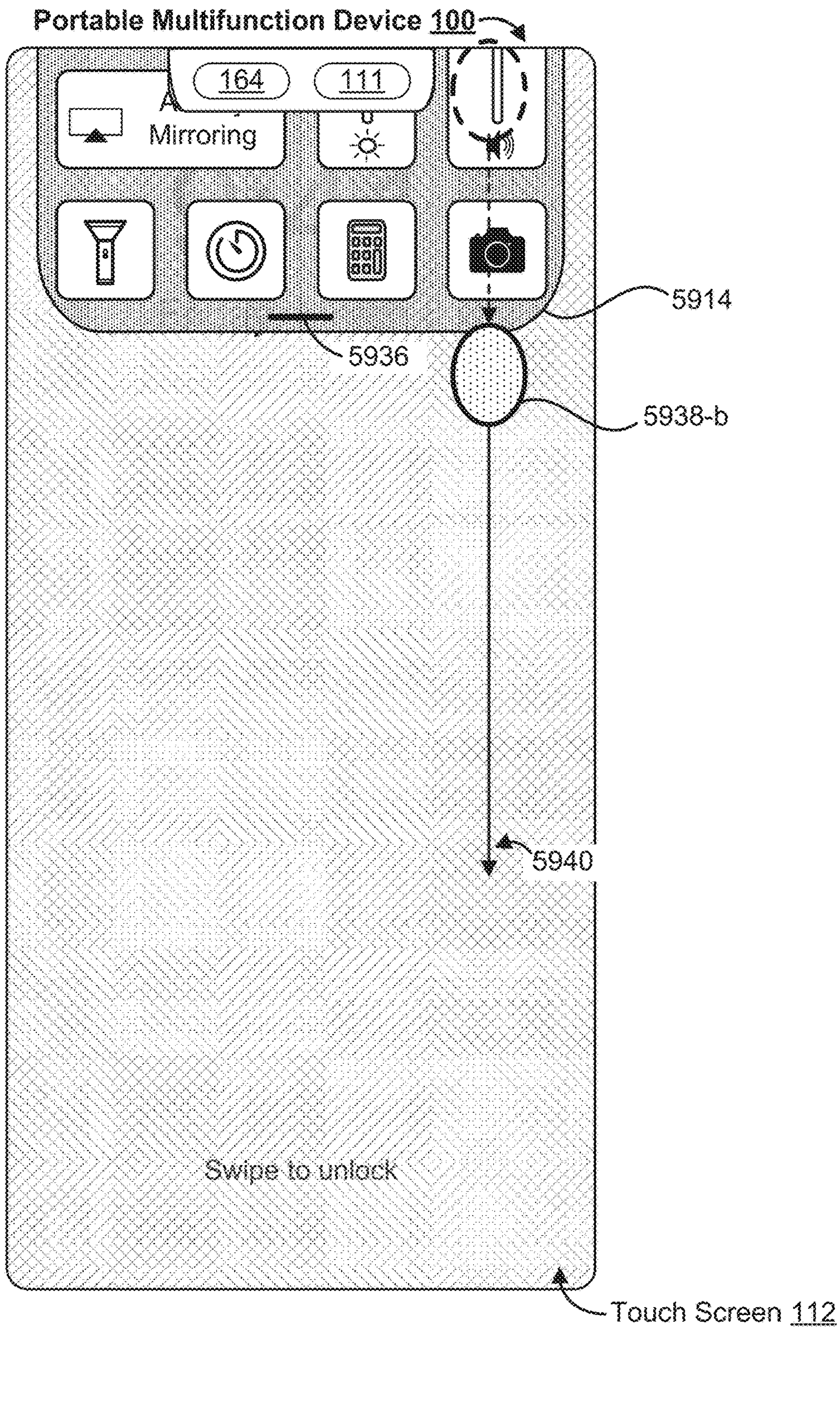
Figure 5G16

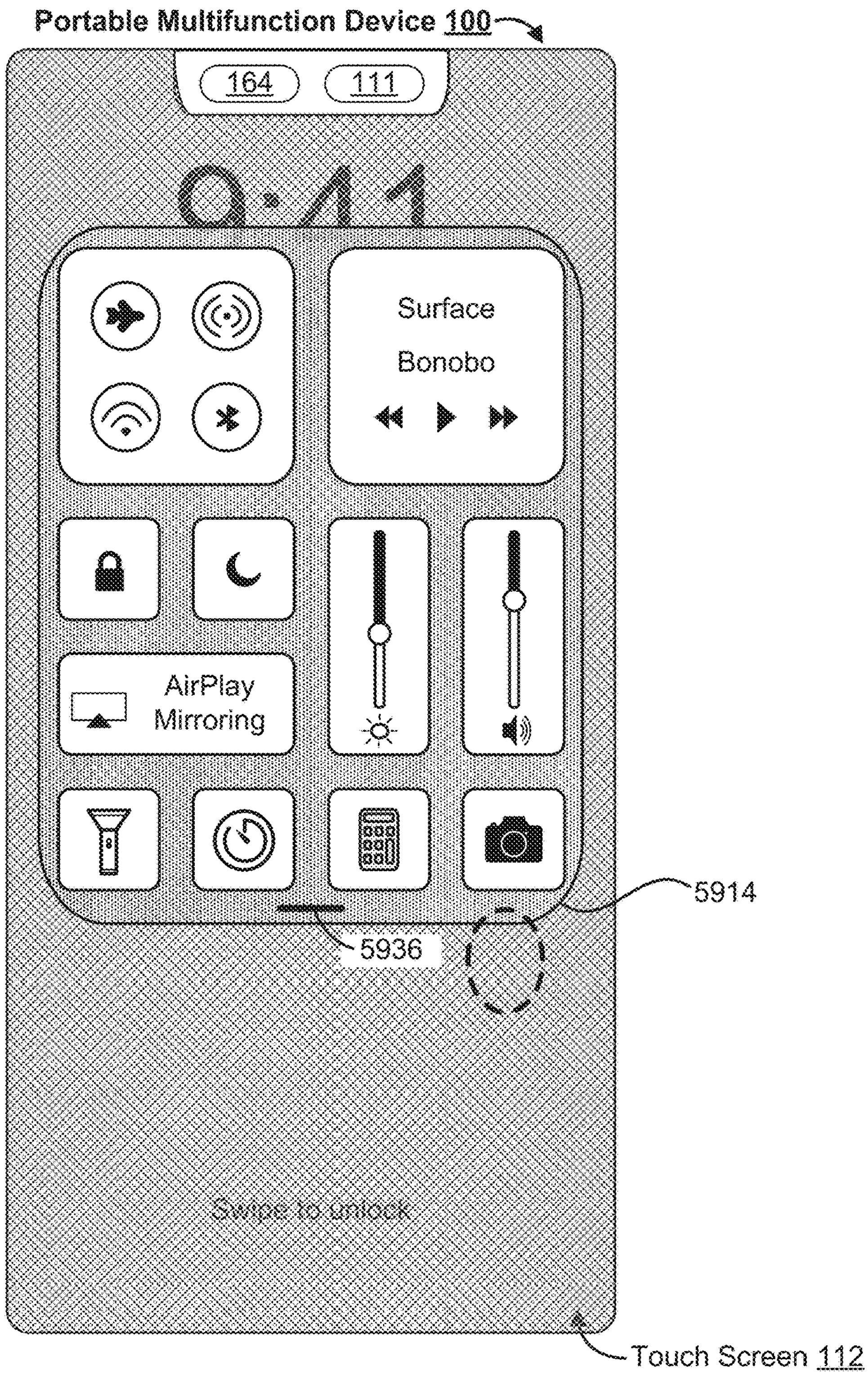
Figure 5G17

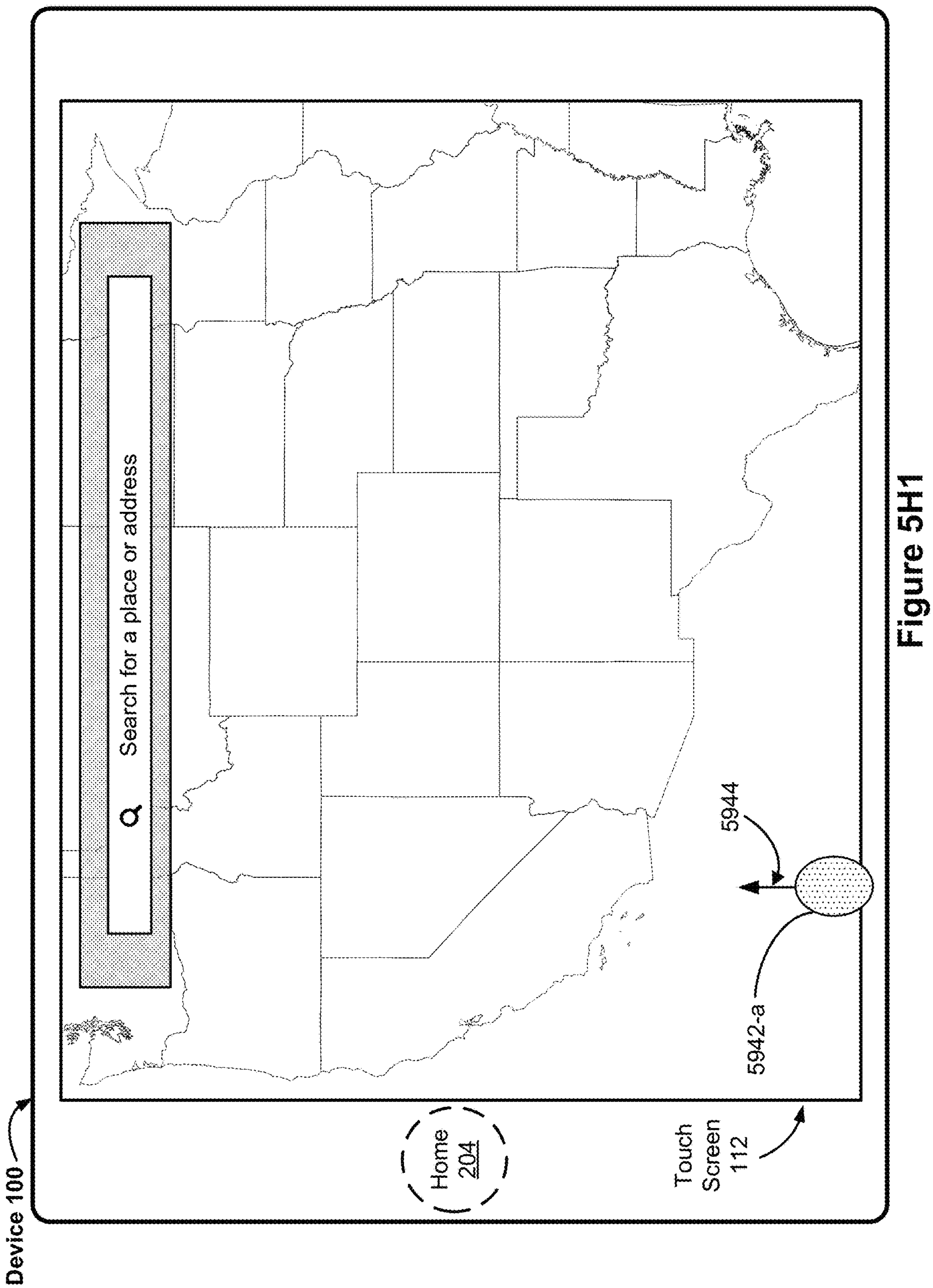
Figure 5H1

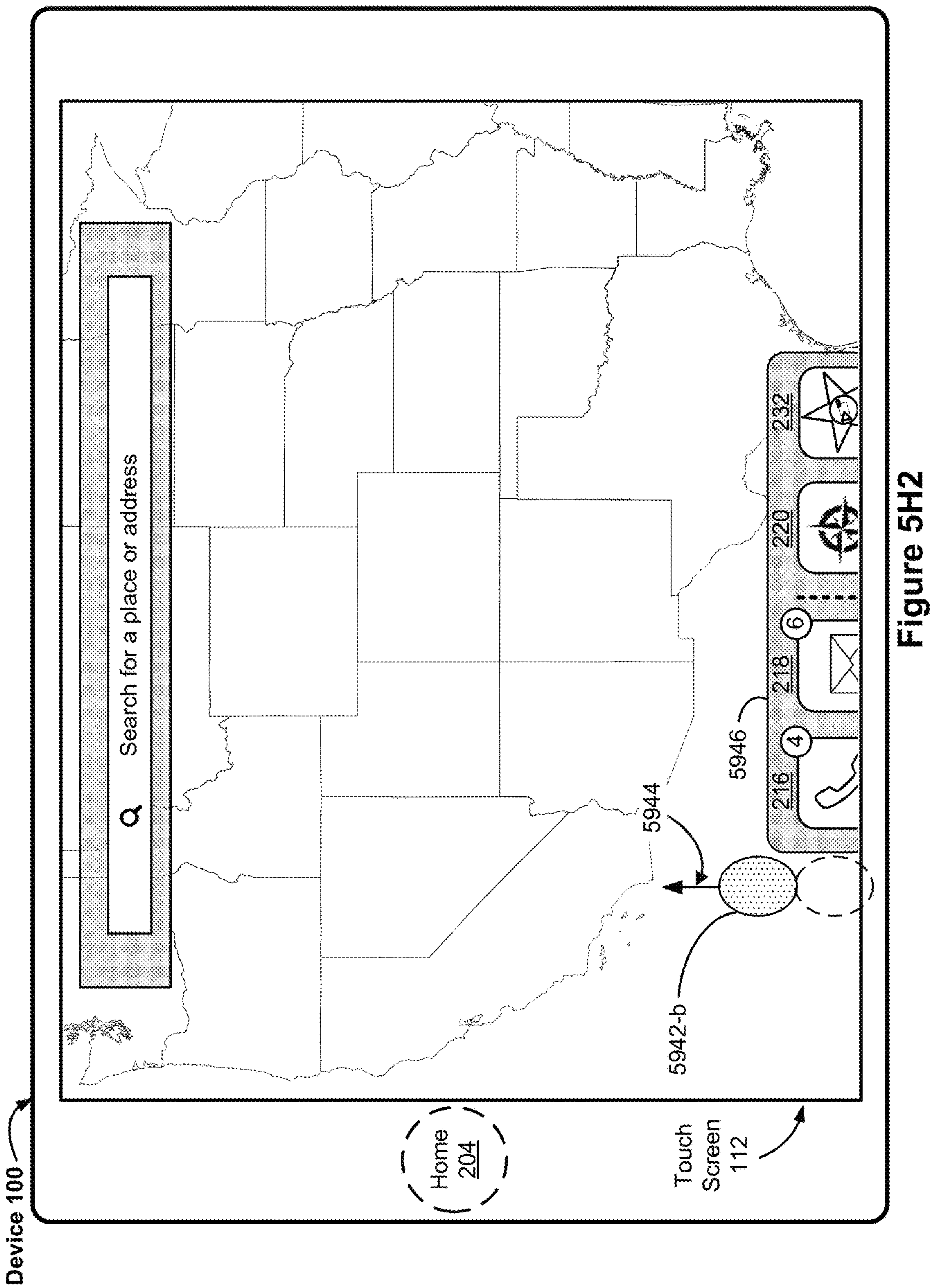
Figure 5H2

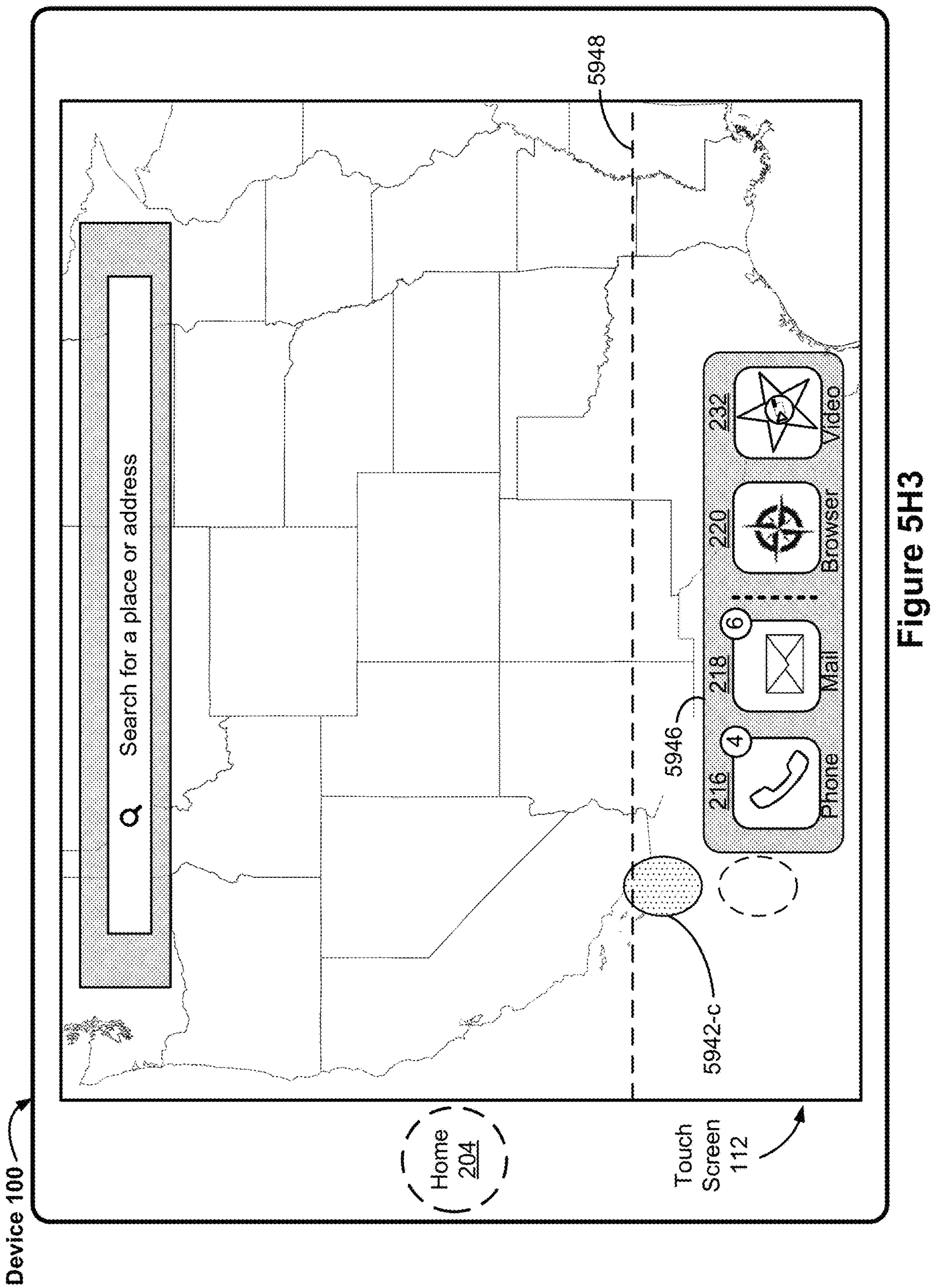
Figure 5H3

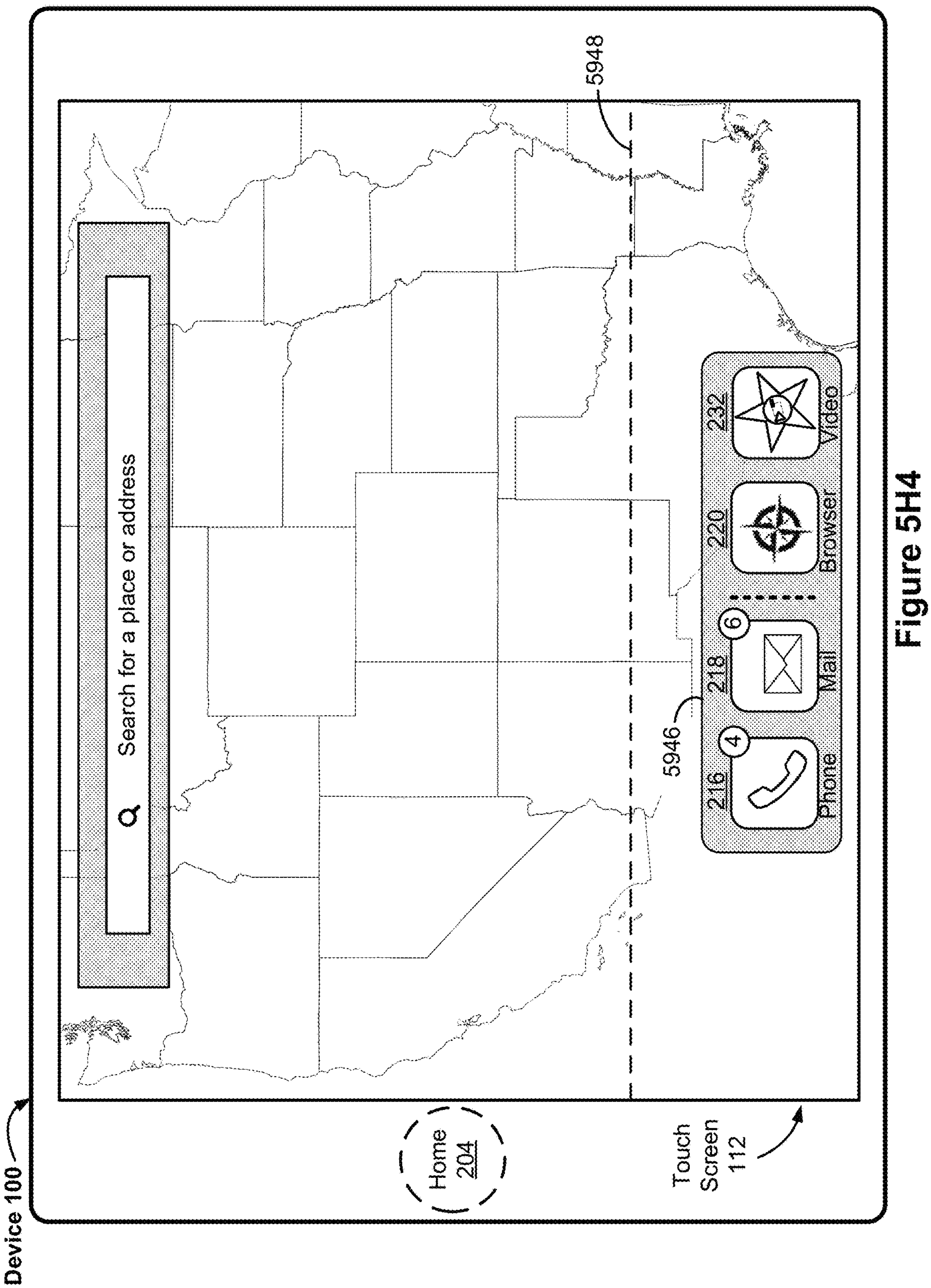
Figure 5H4

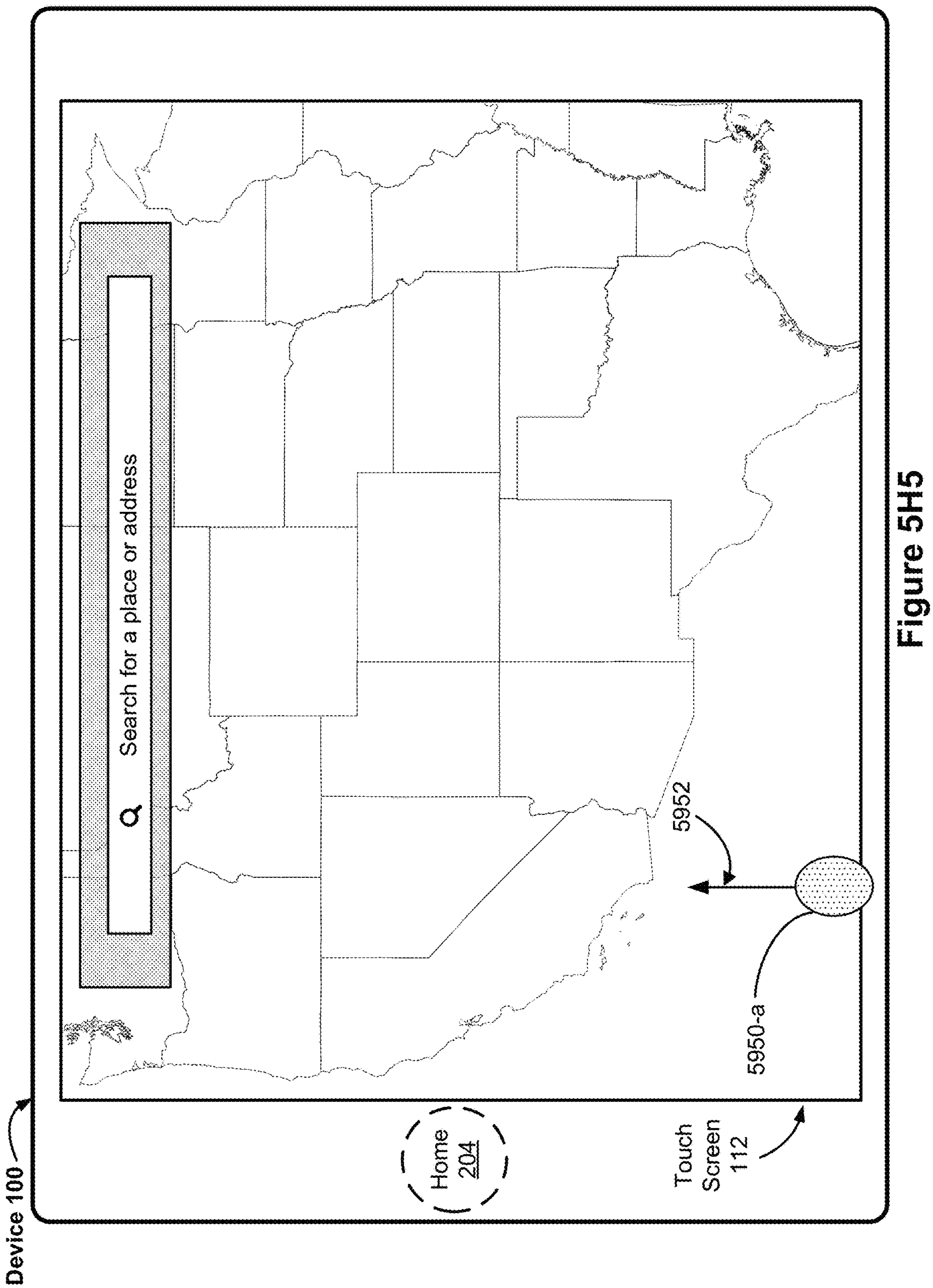
Figure 5H5

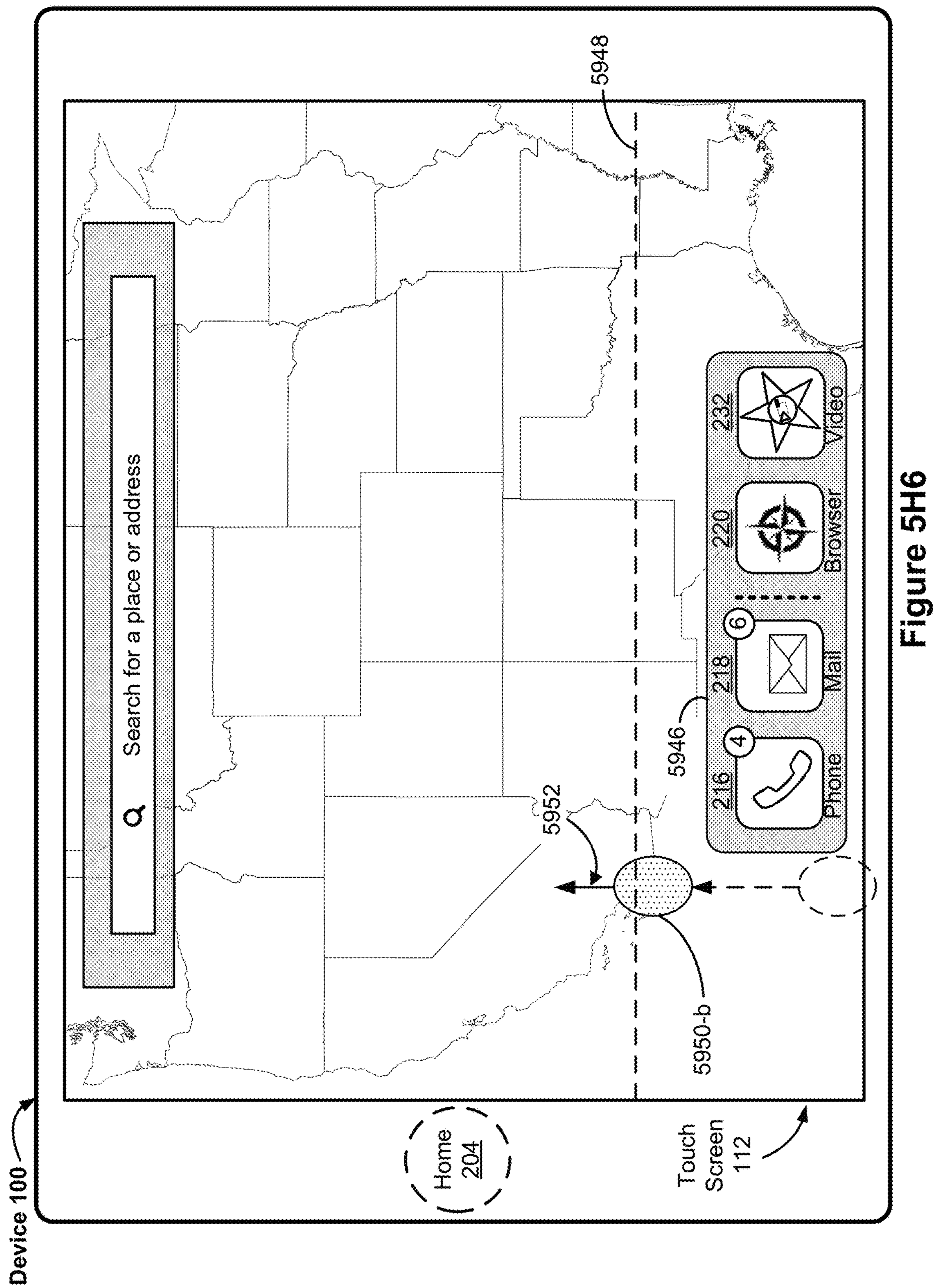
Figure 5H6

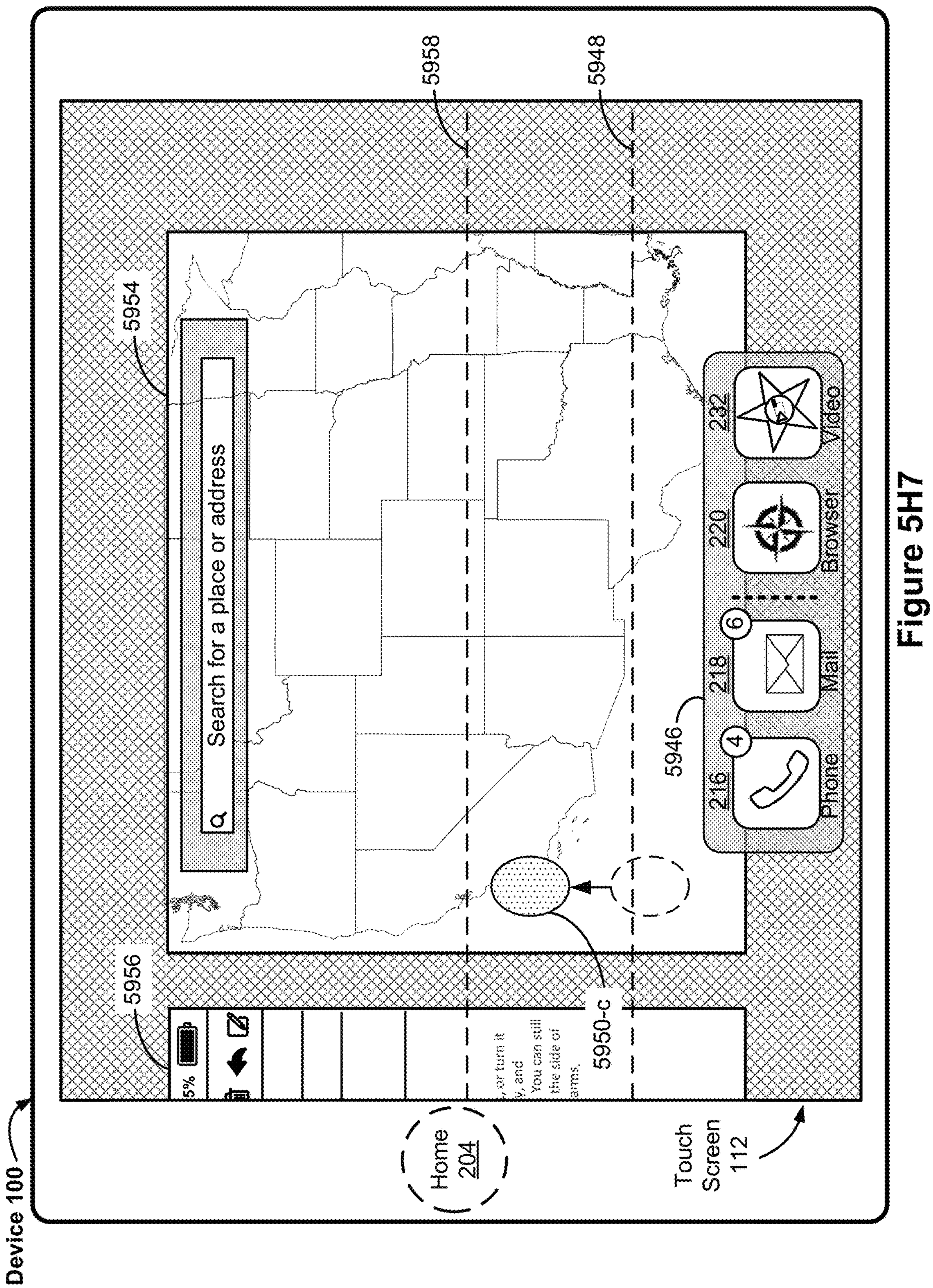
Figure 5H7

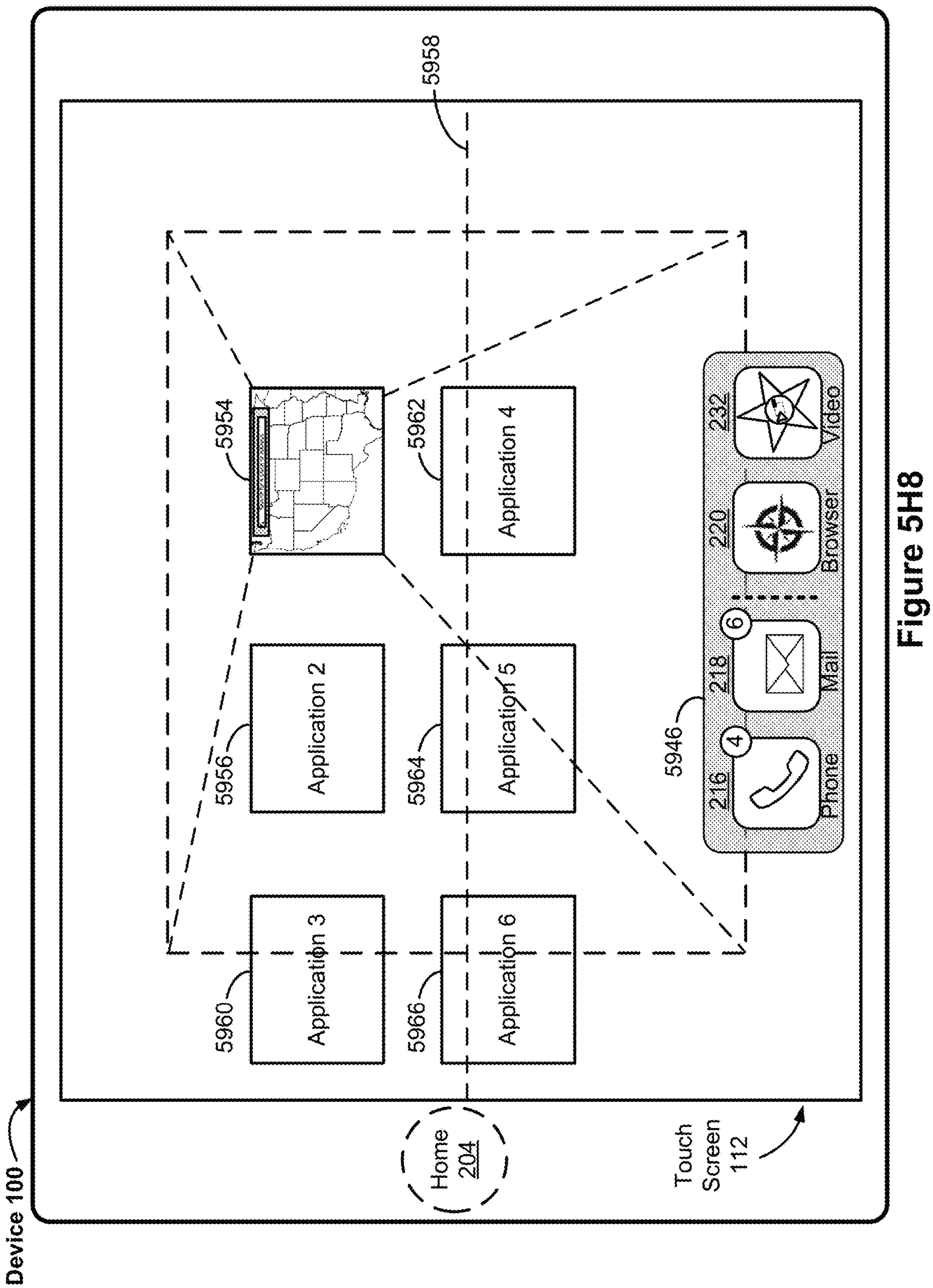
Figure 5H8

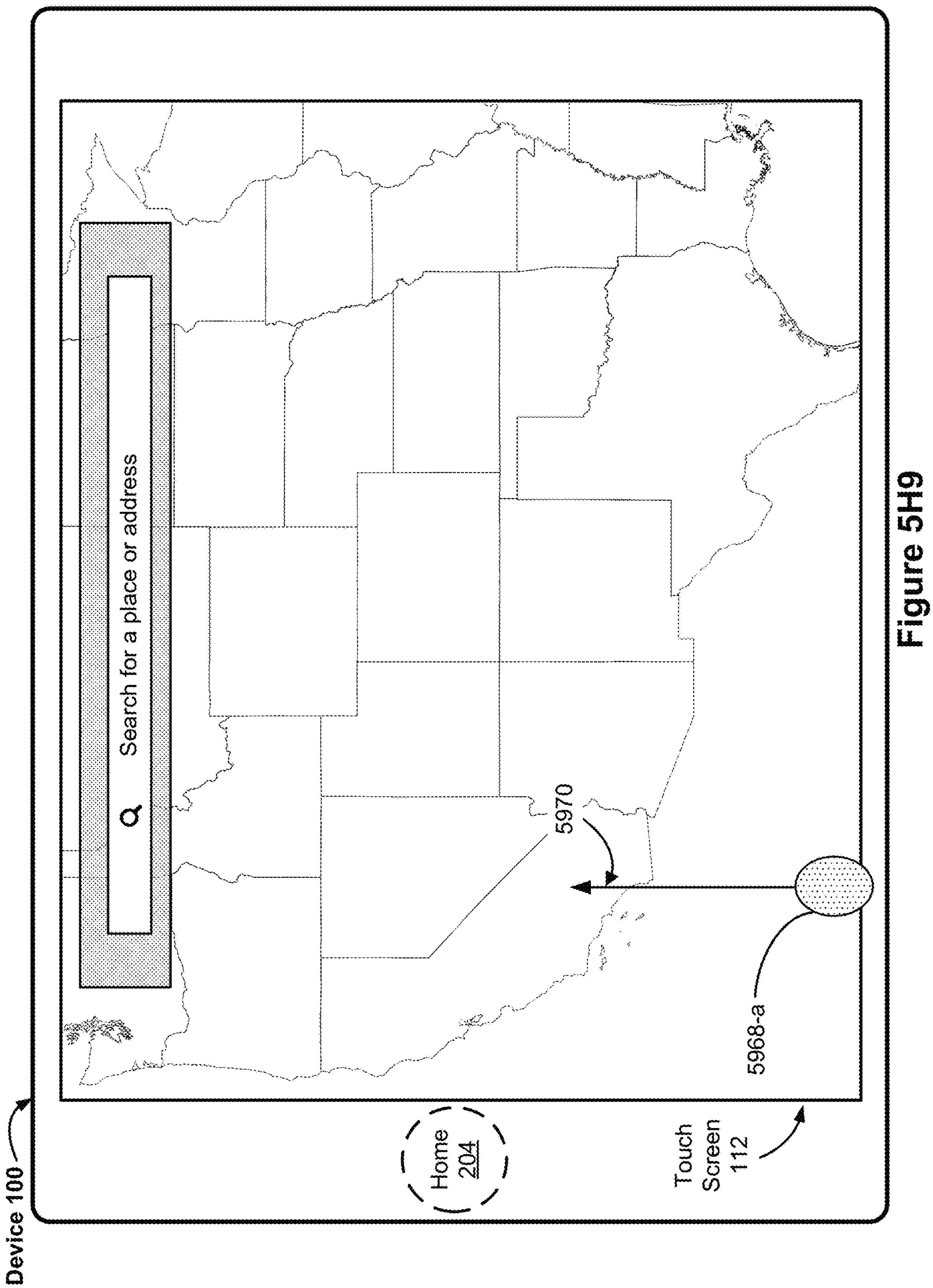
Figure 5H9

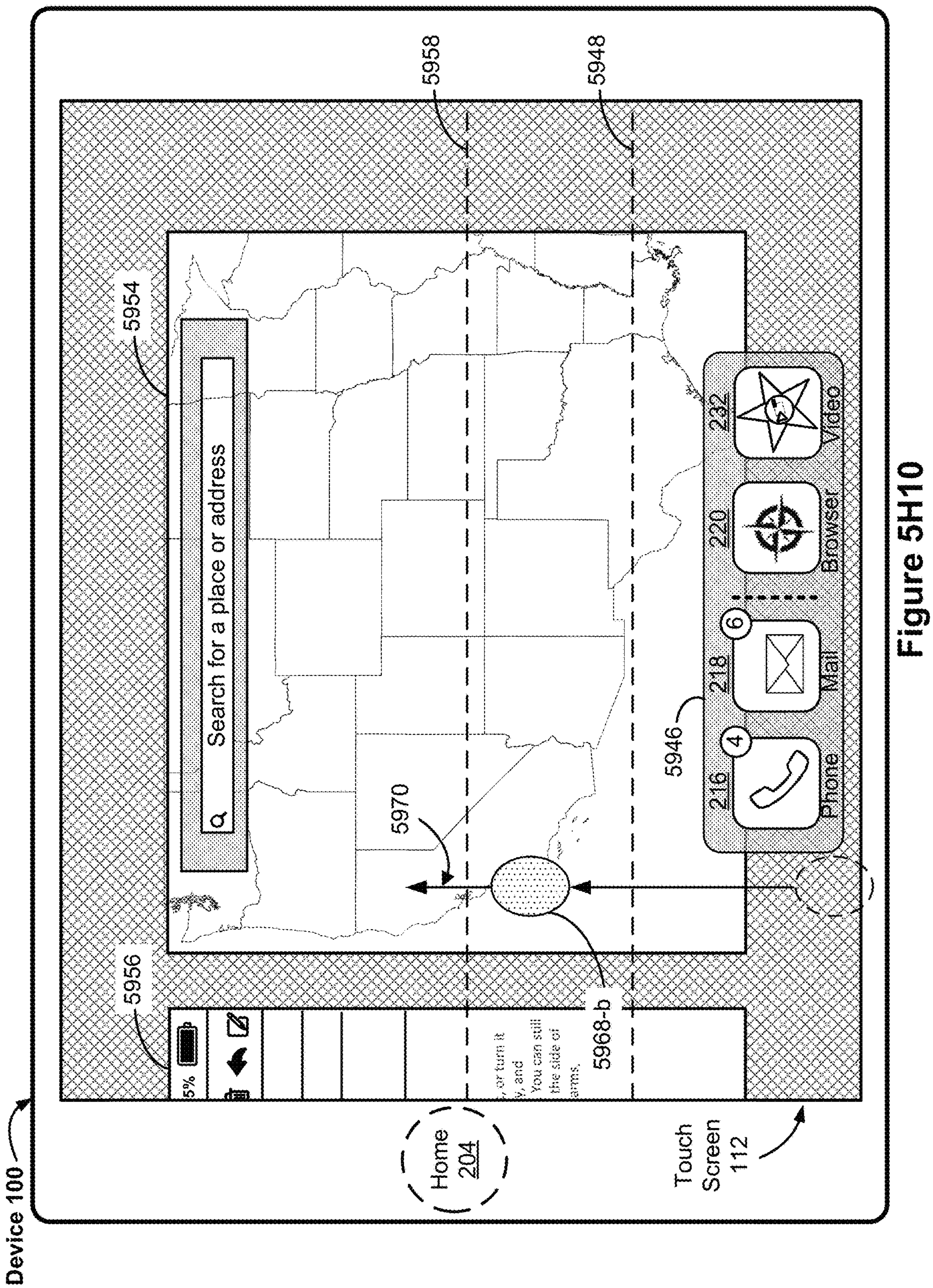
Figure 5H10

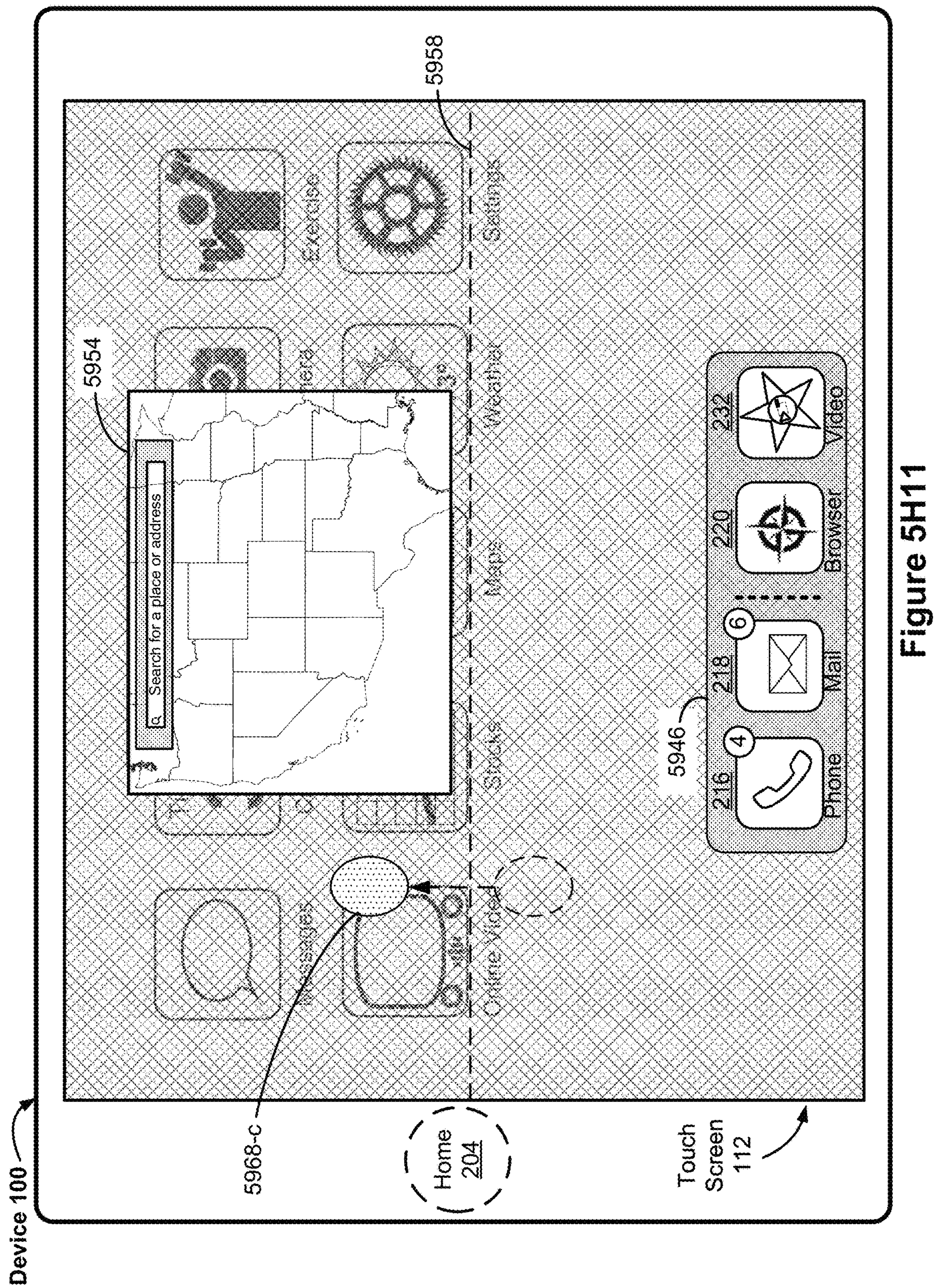
Figure 5H11

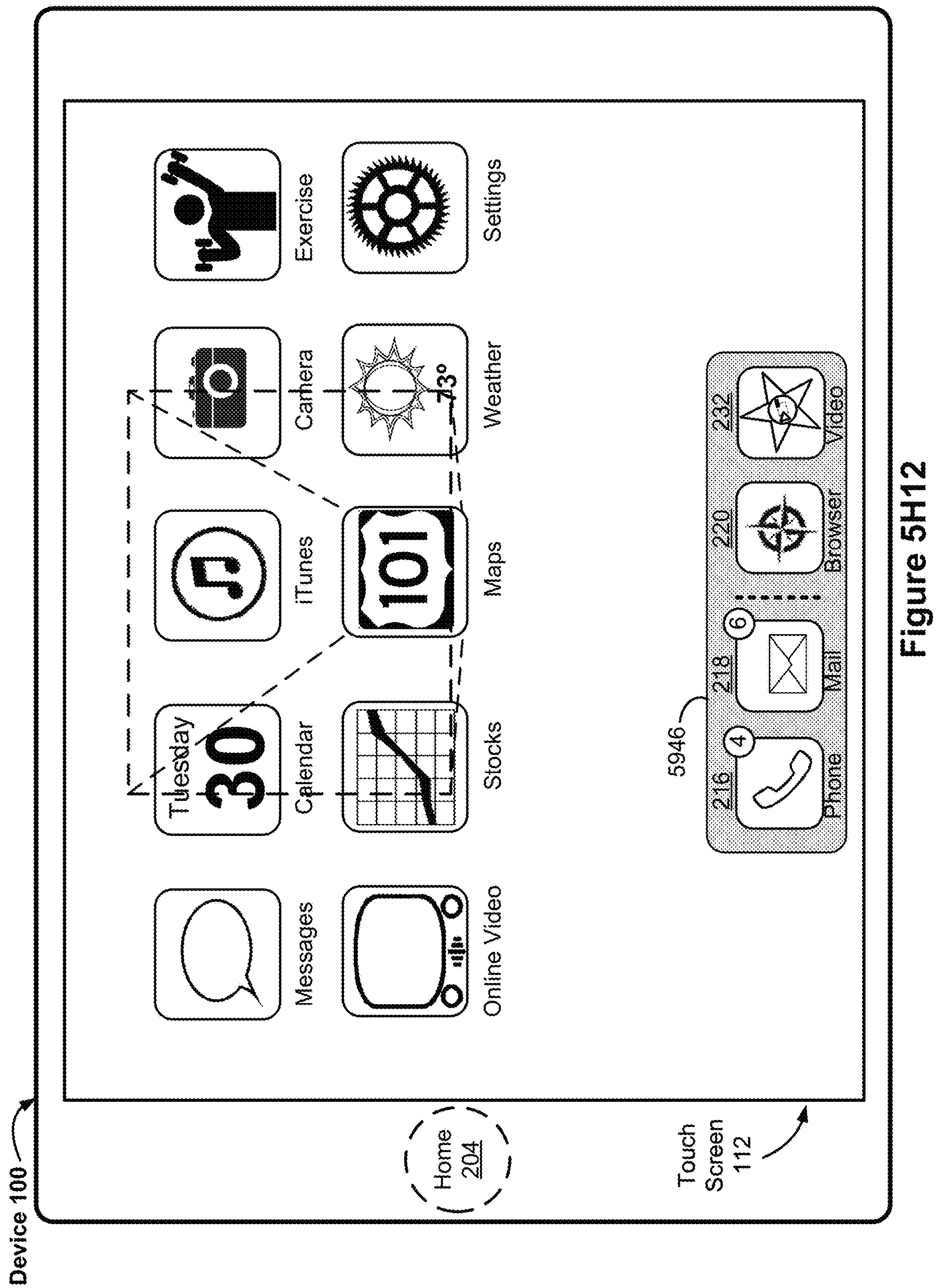
Figure 5H12

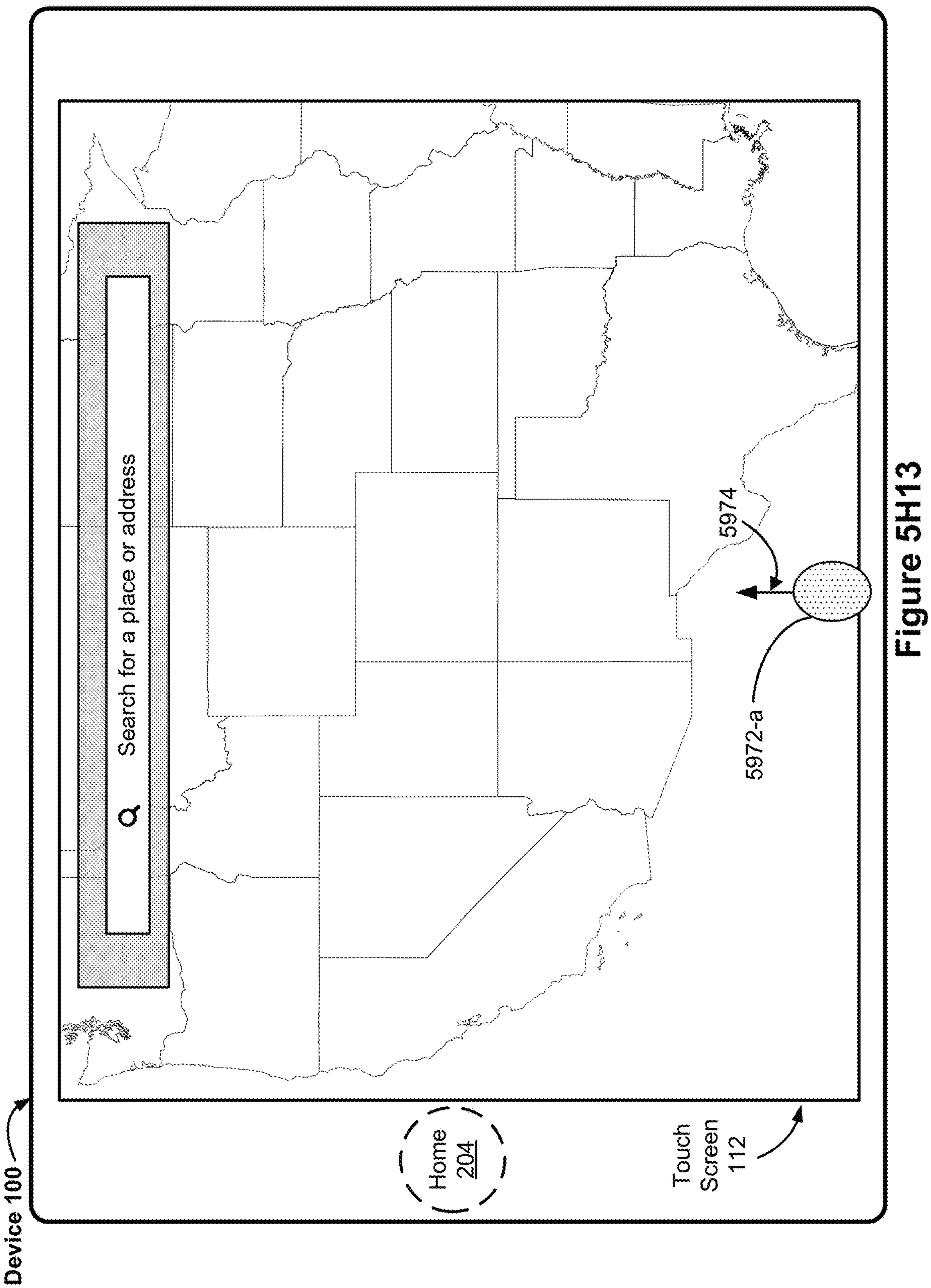
Figure 5H13

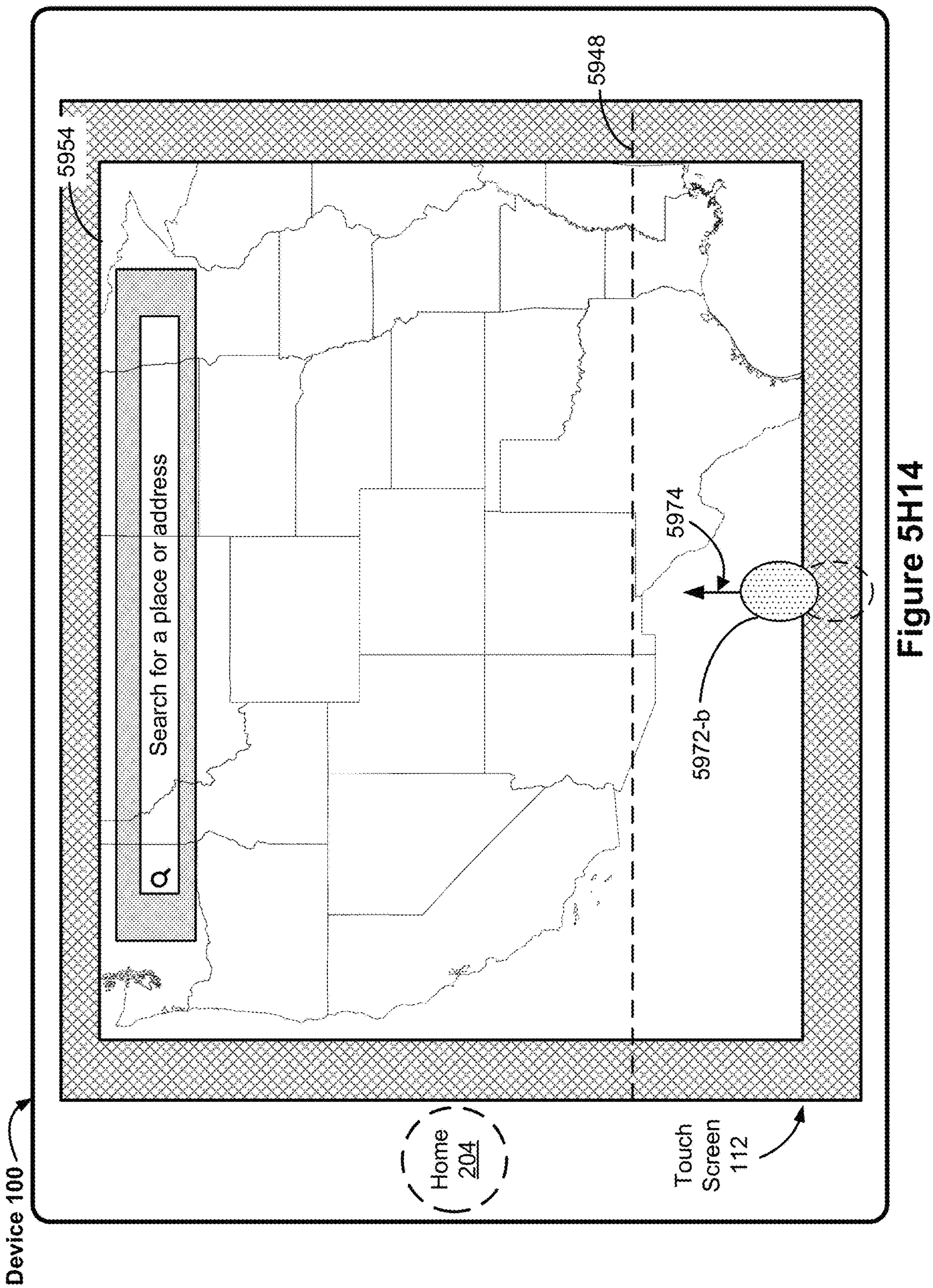
Figure 5H14

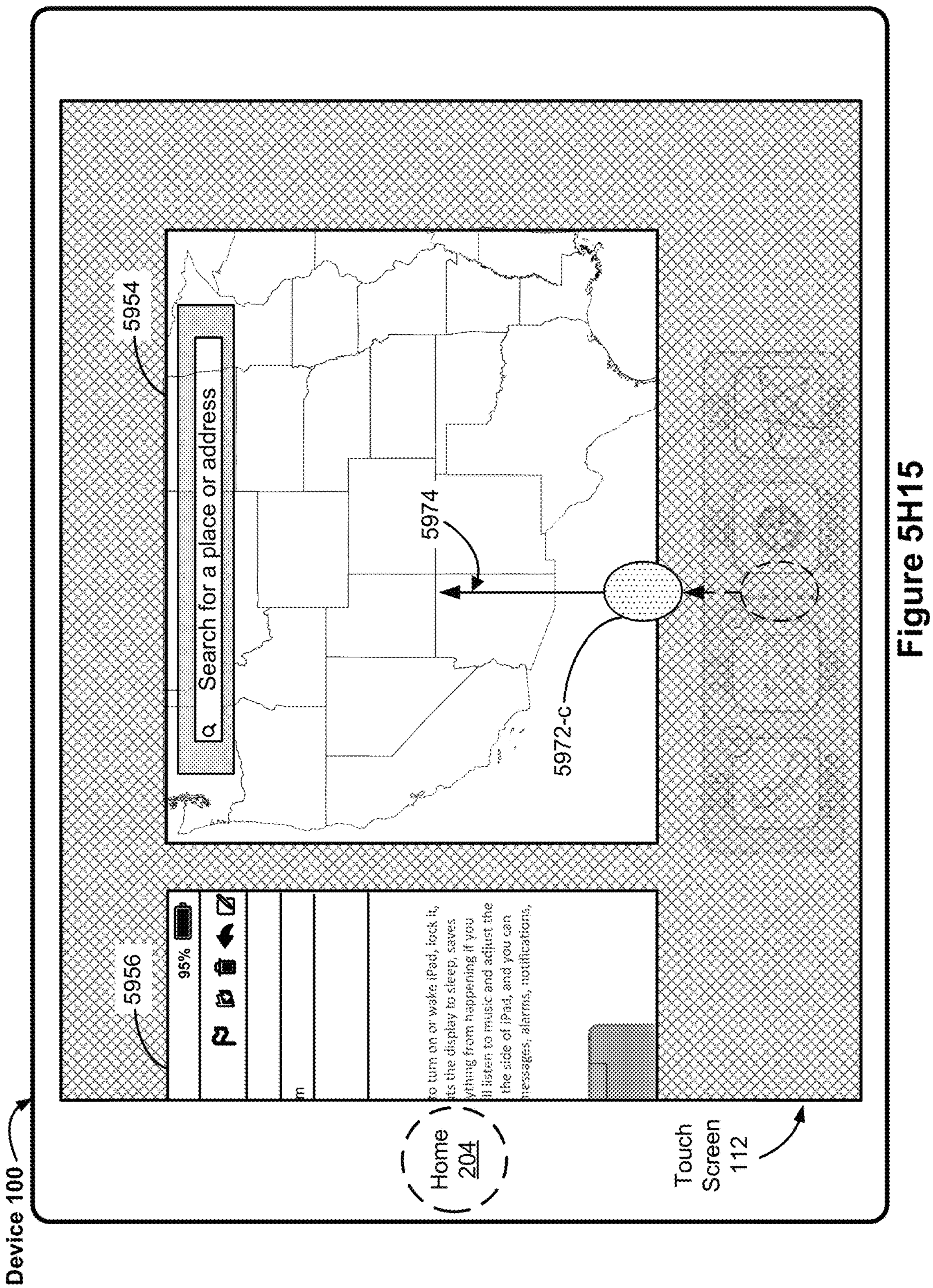
Figure 5H15

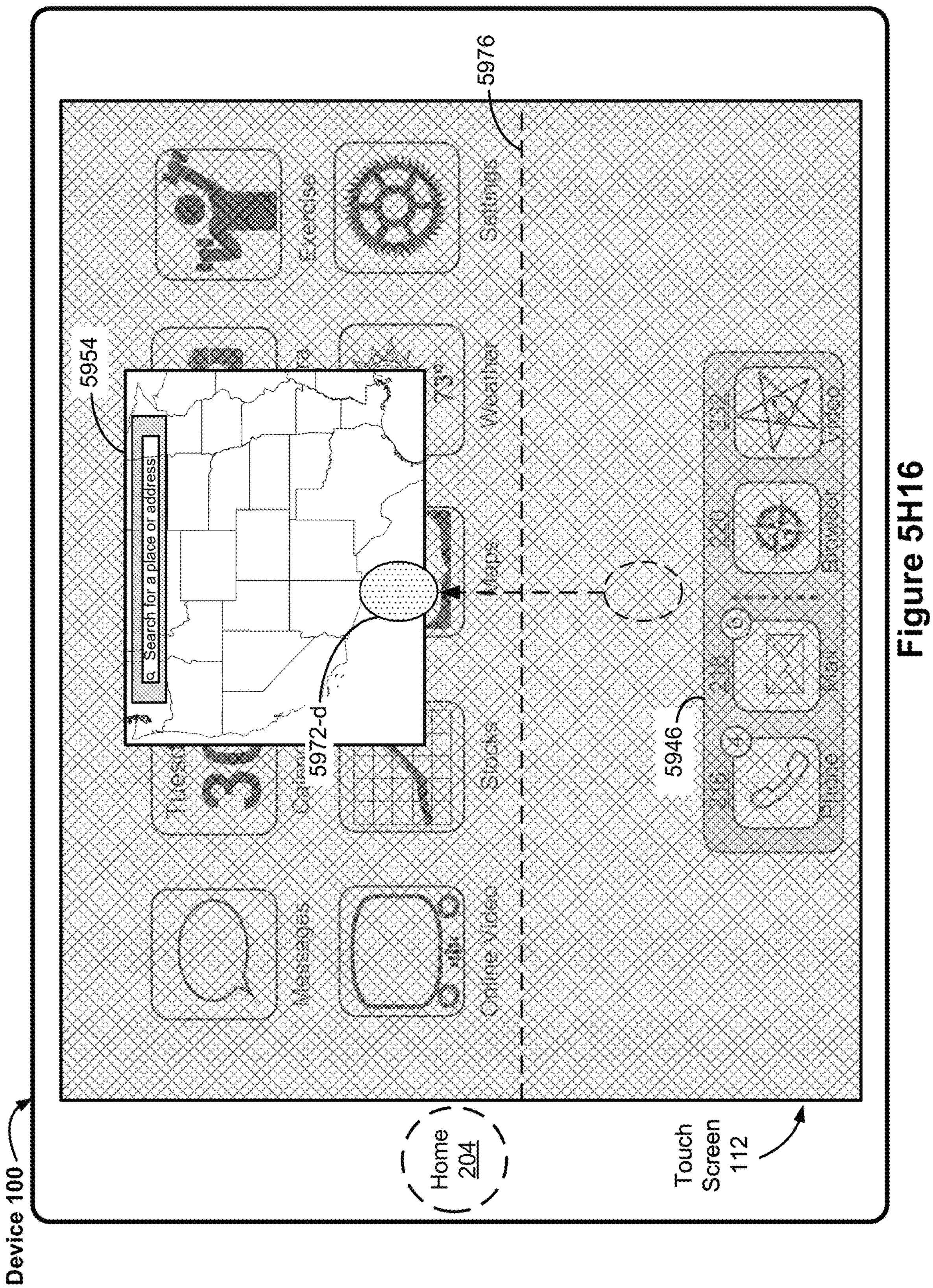
Figure 5H16

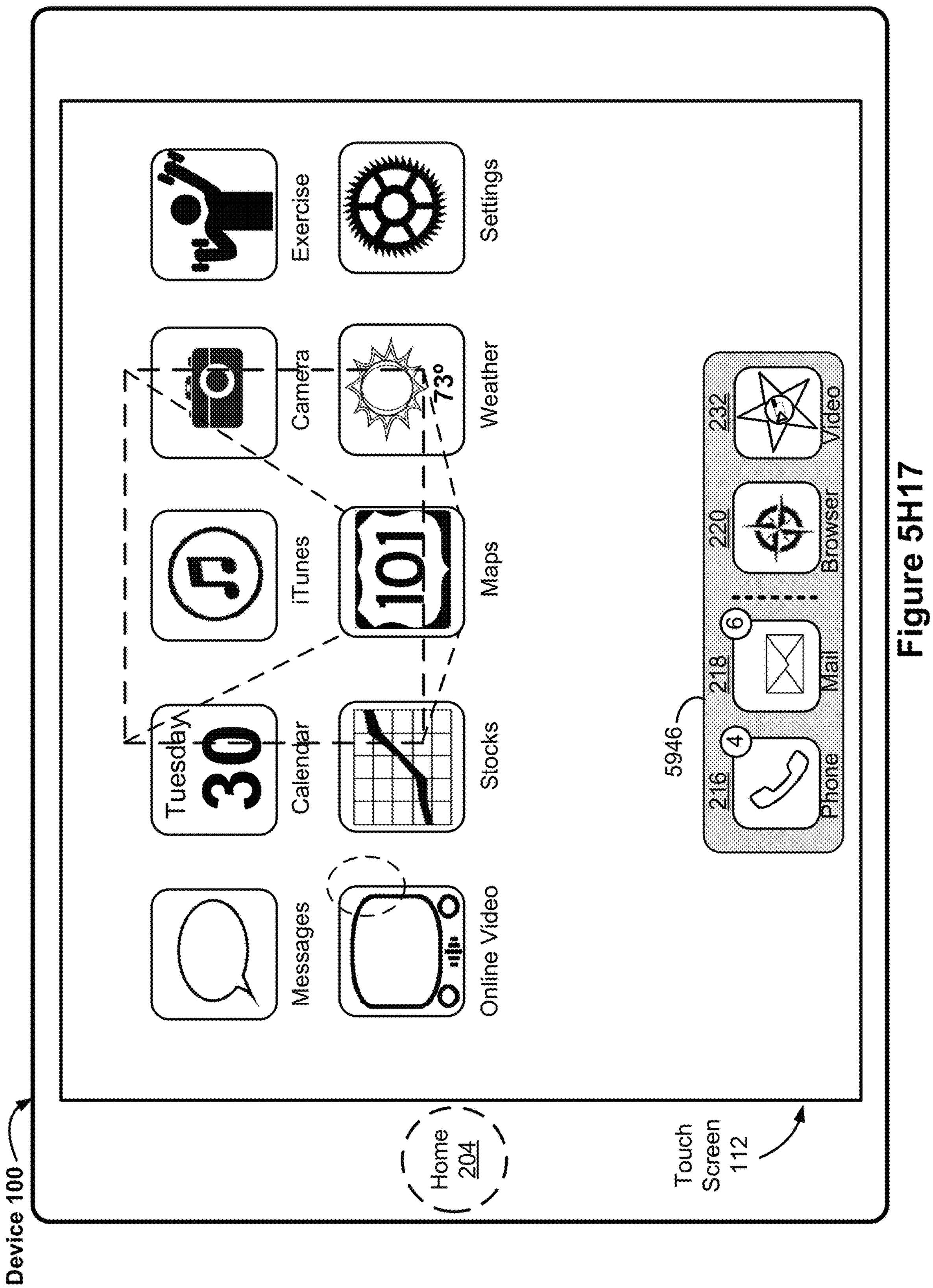
Figure 5H17

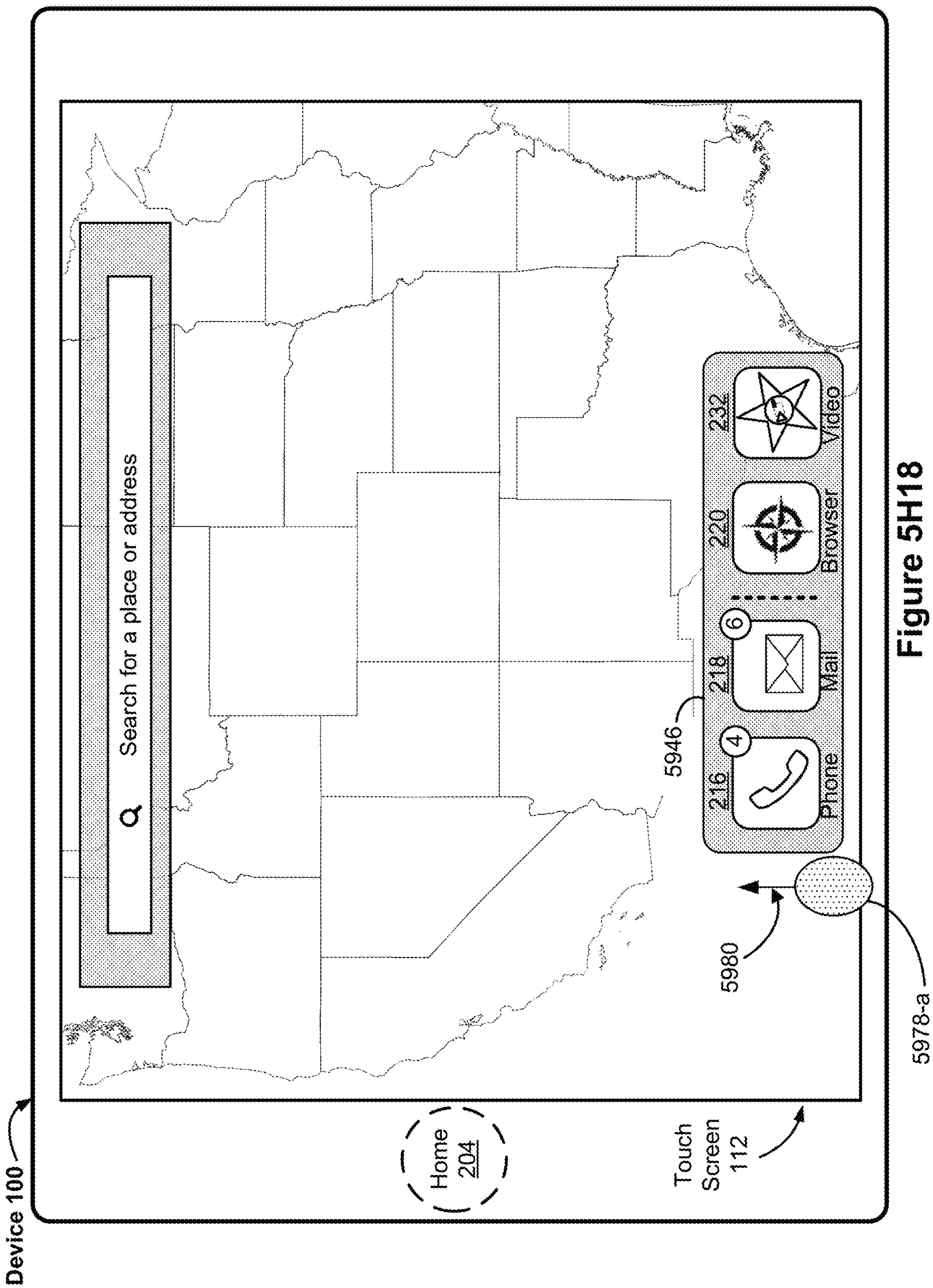
Figure 5H18

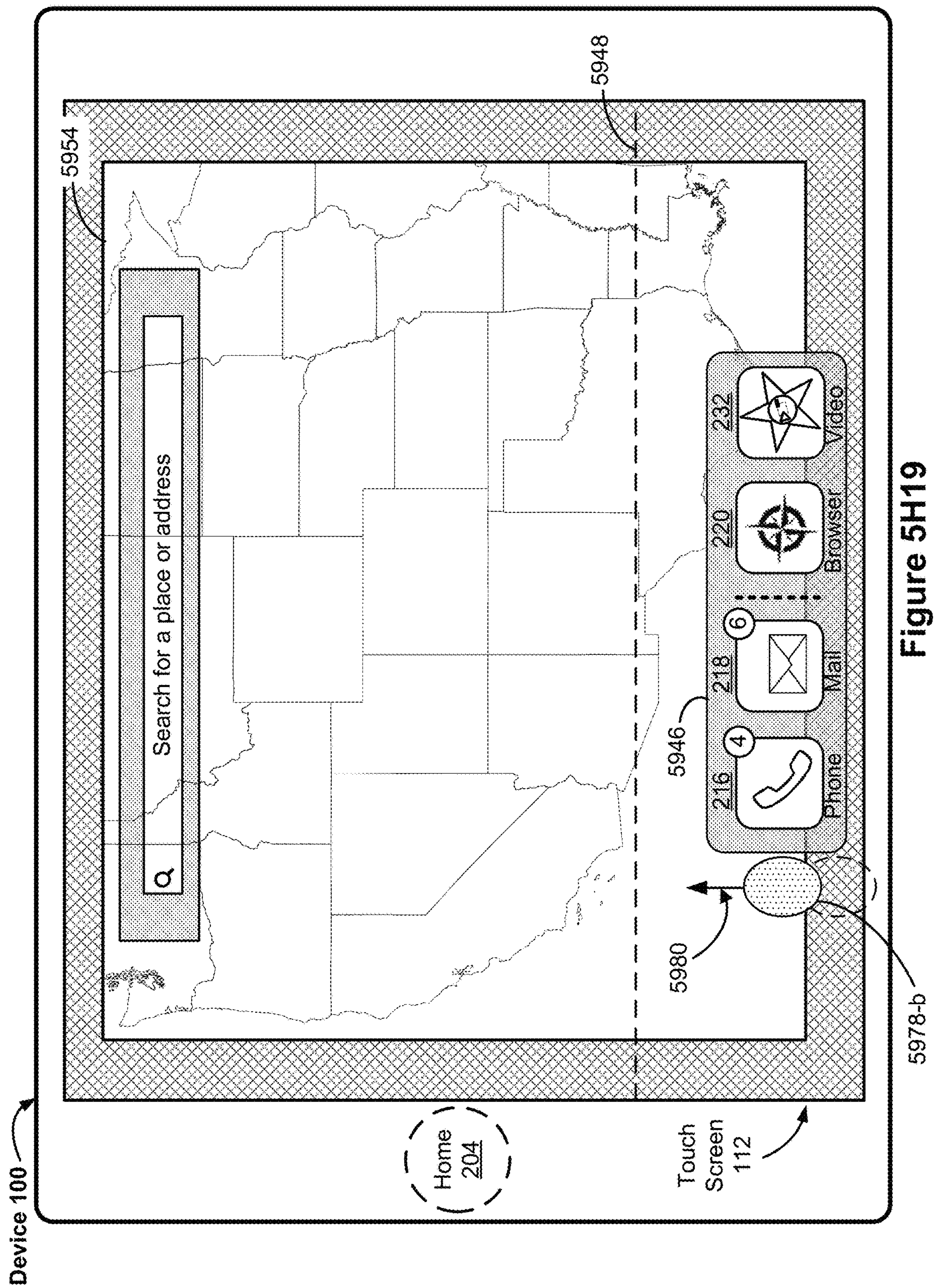
Figure 5H19

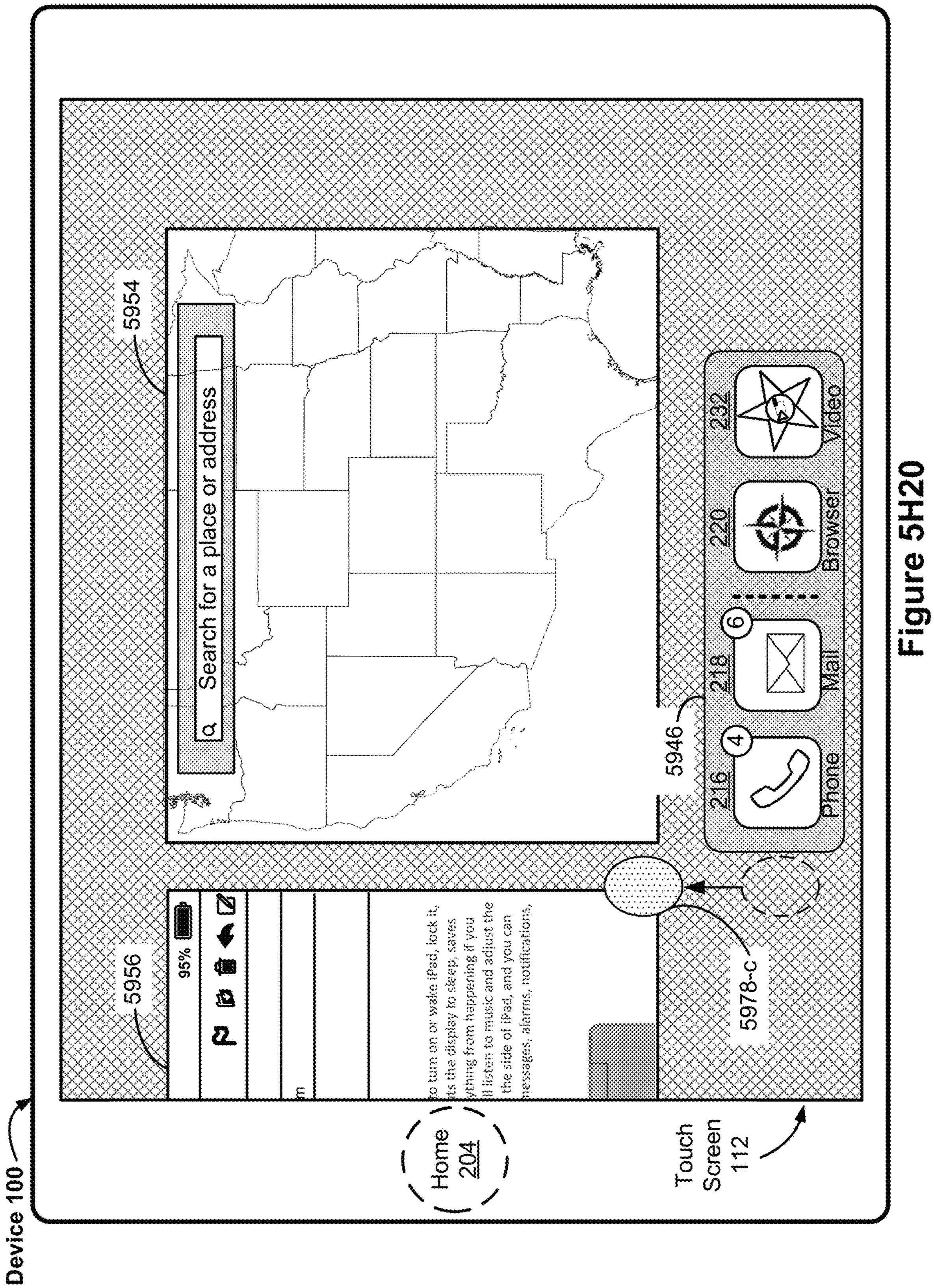
Figure 5H20

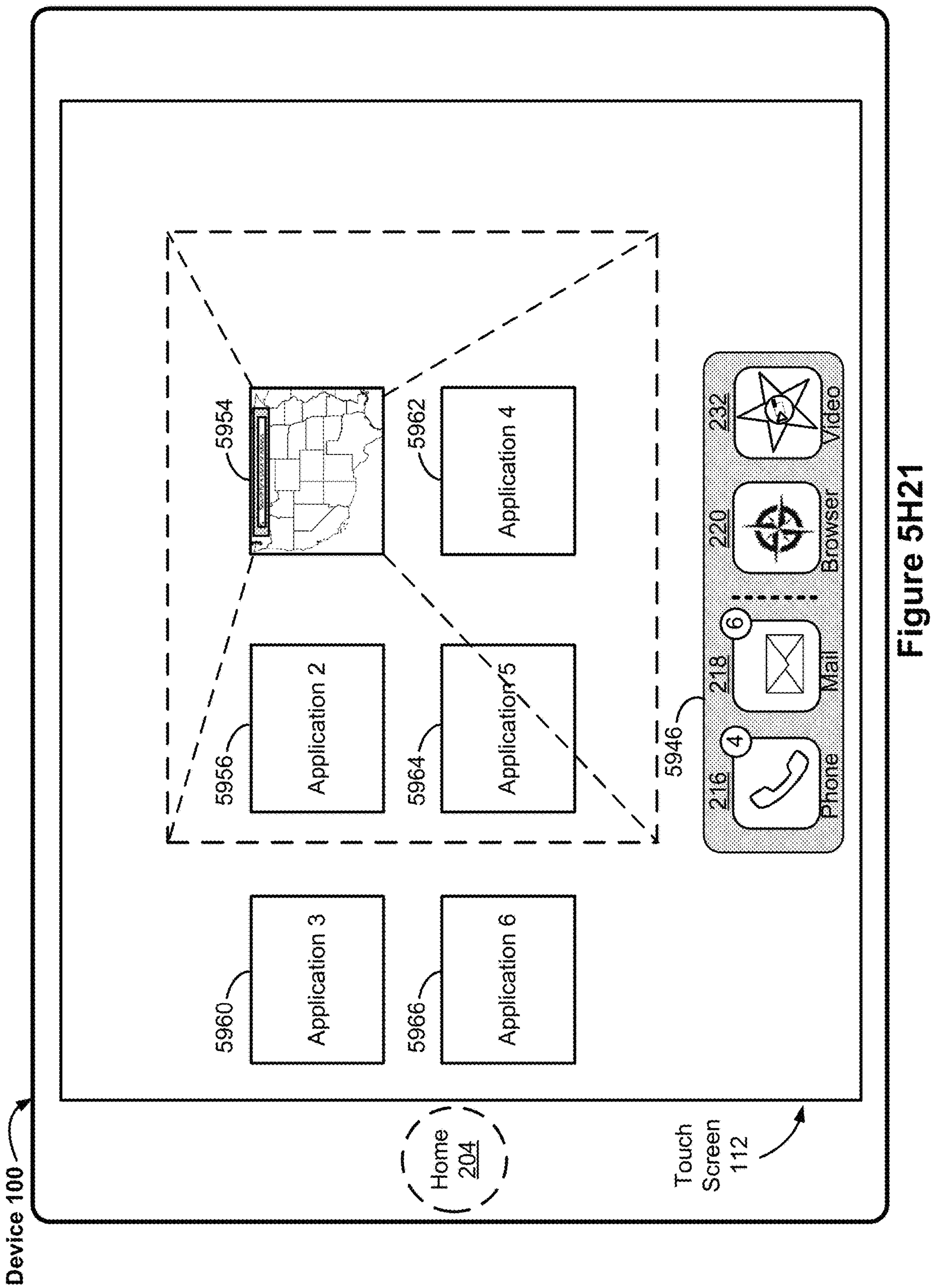
Figure 5H21

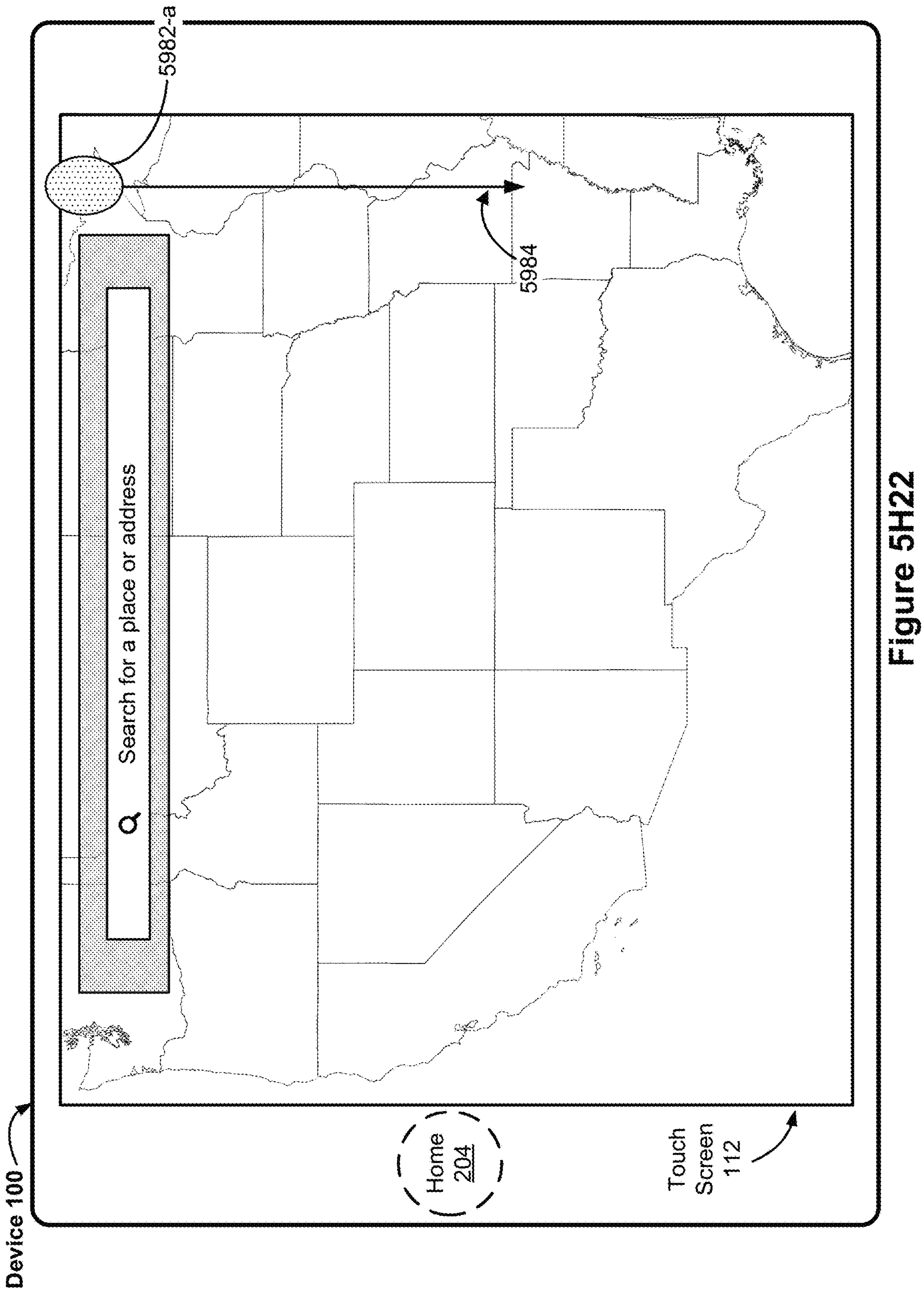
Figure 5H22

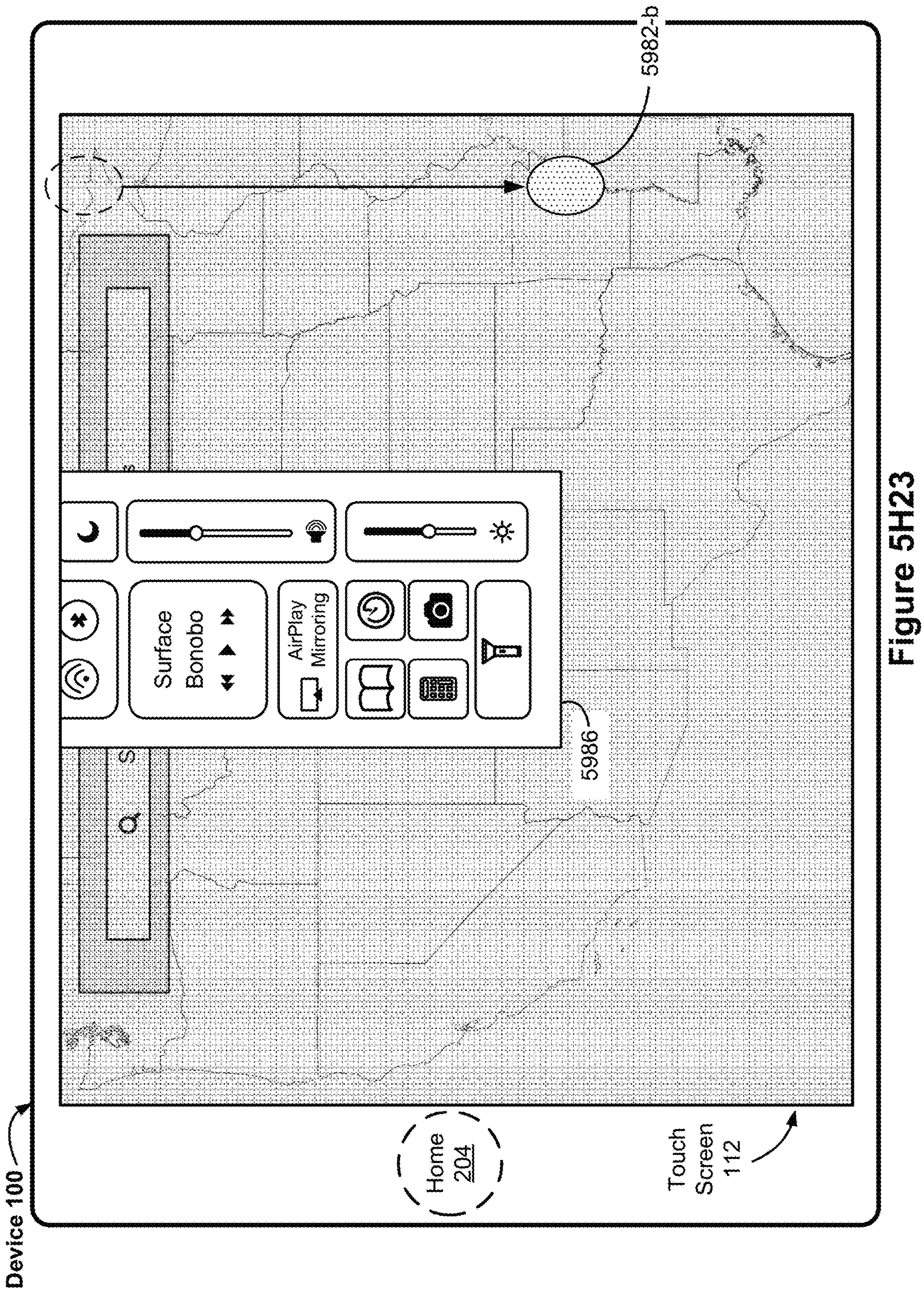
Figure 5H23

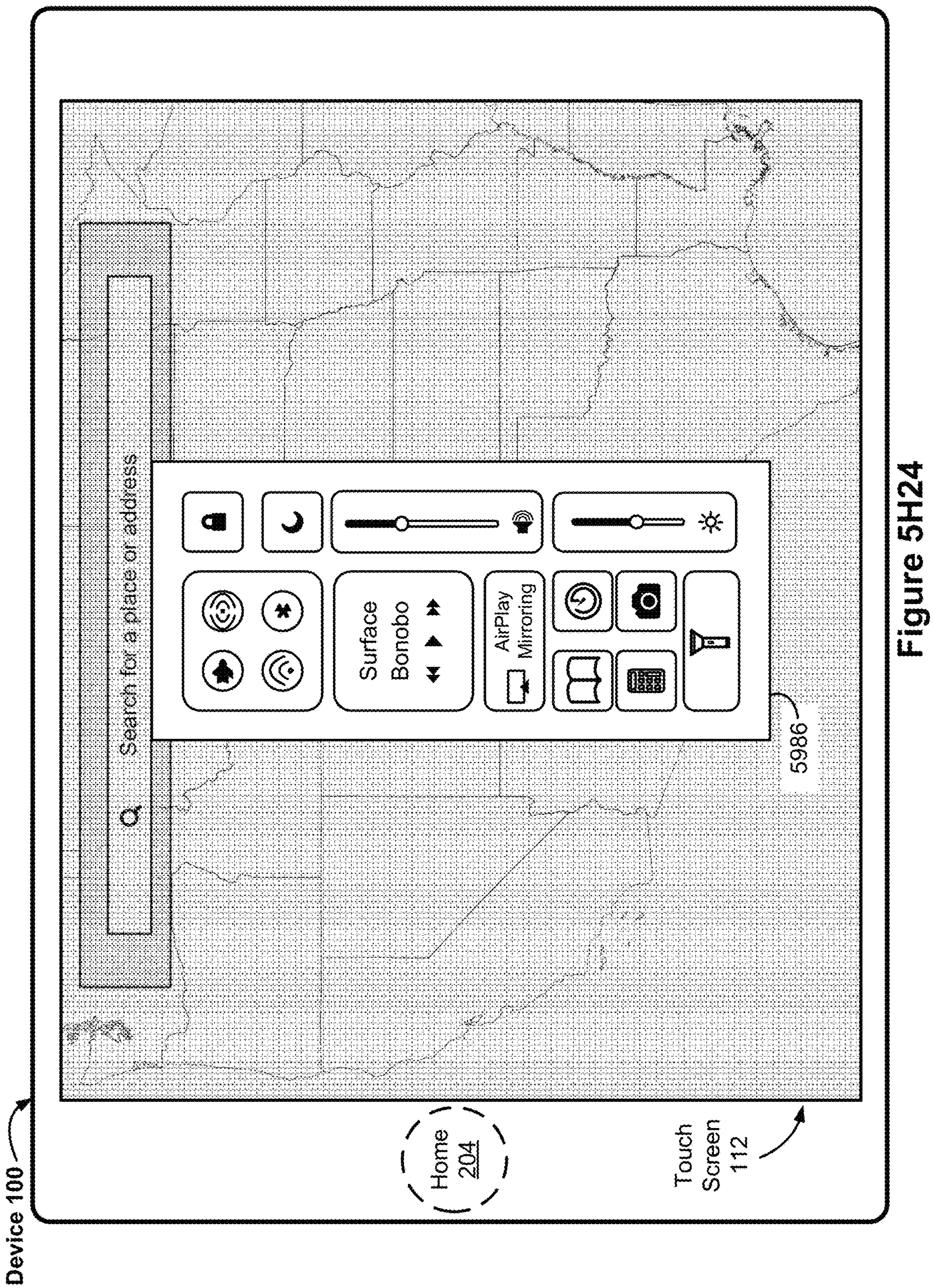
Figure 5H24

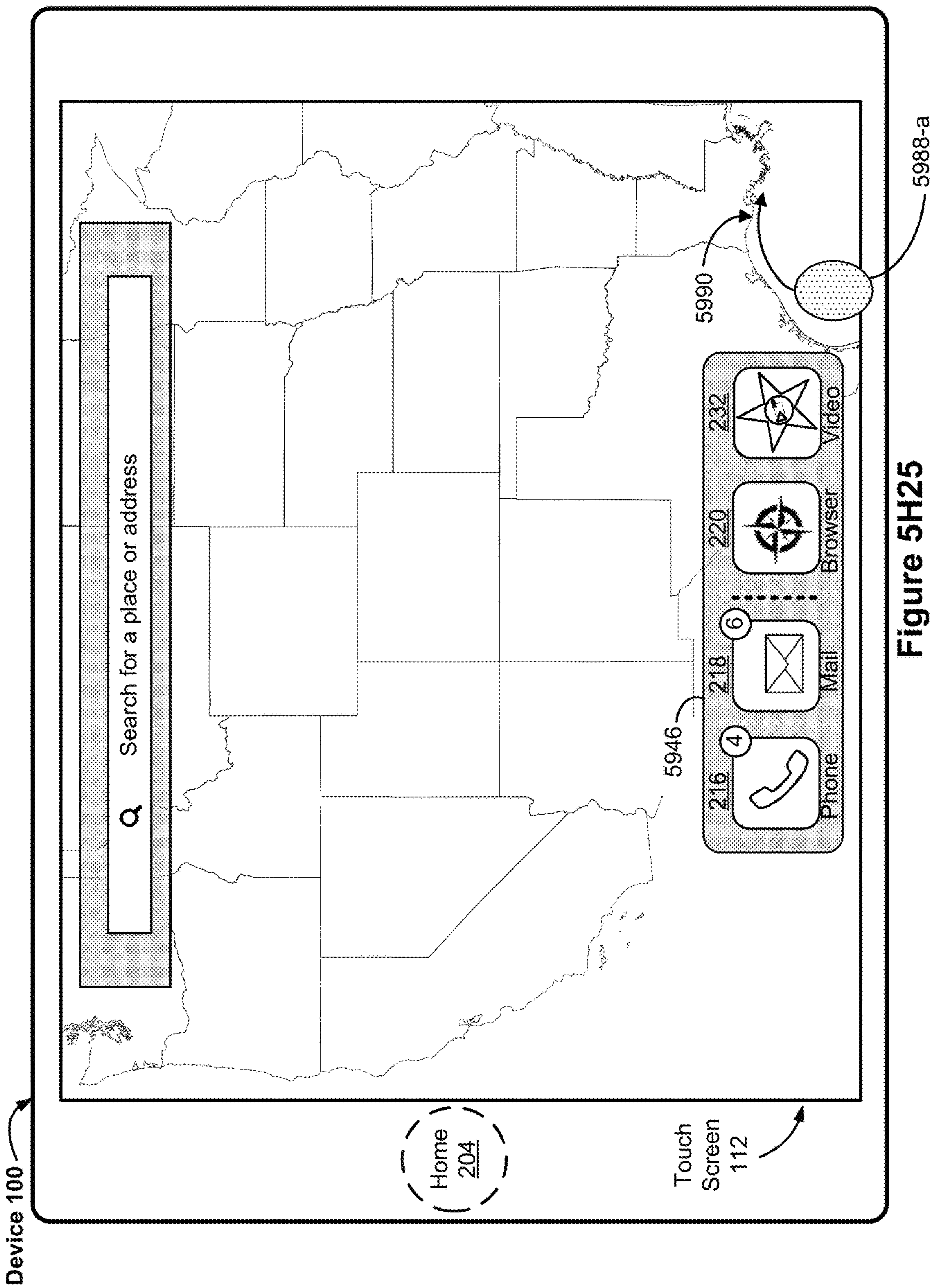
Figure 5H25

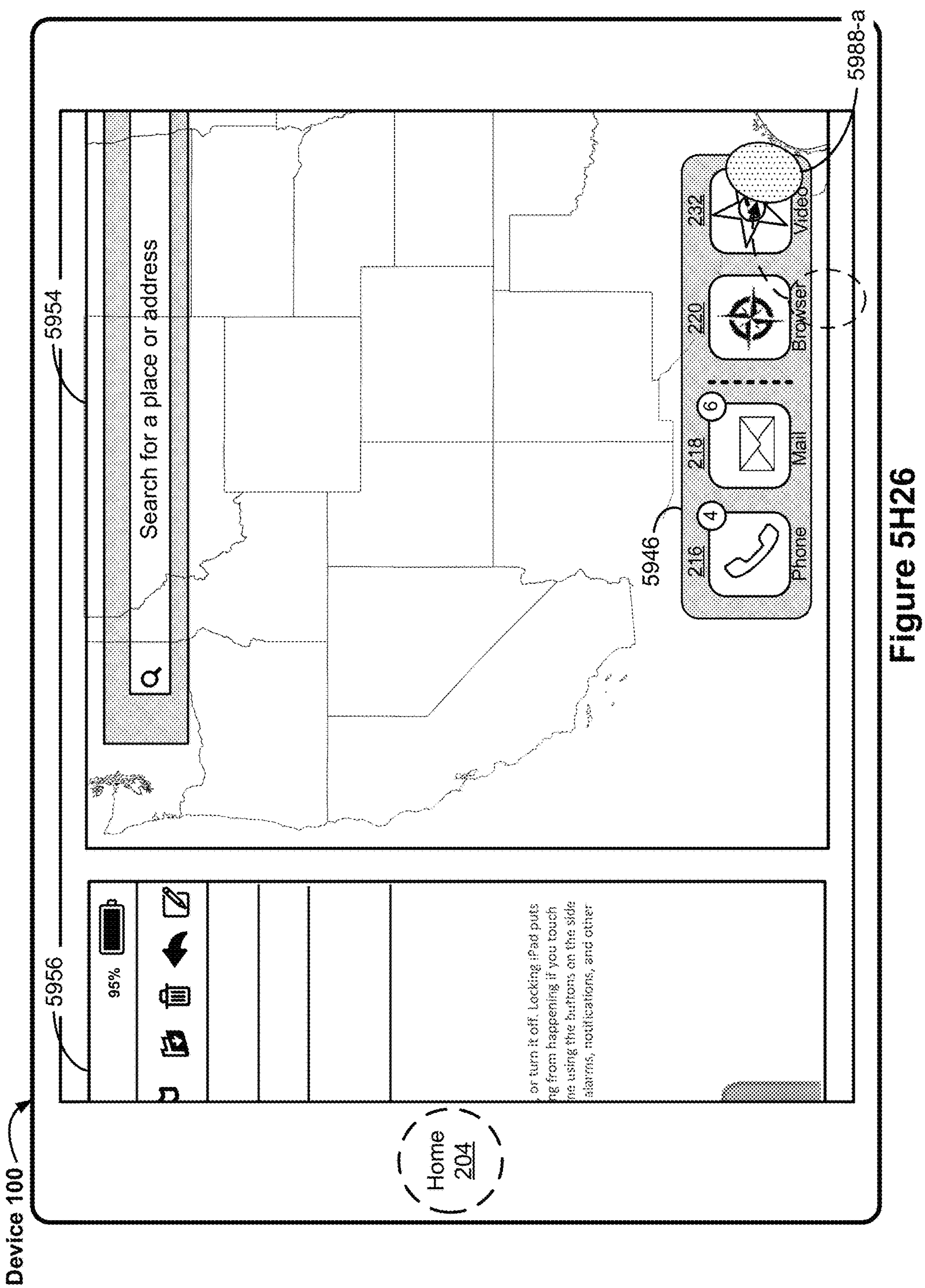
Figure 5H26

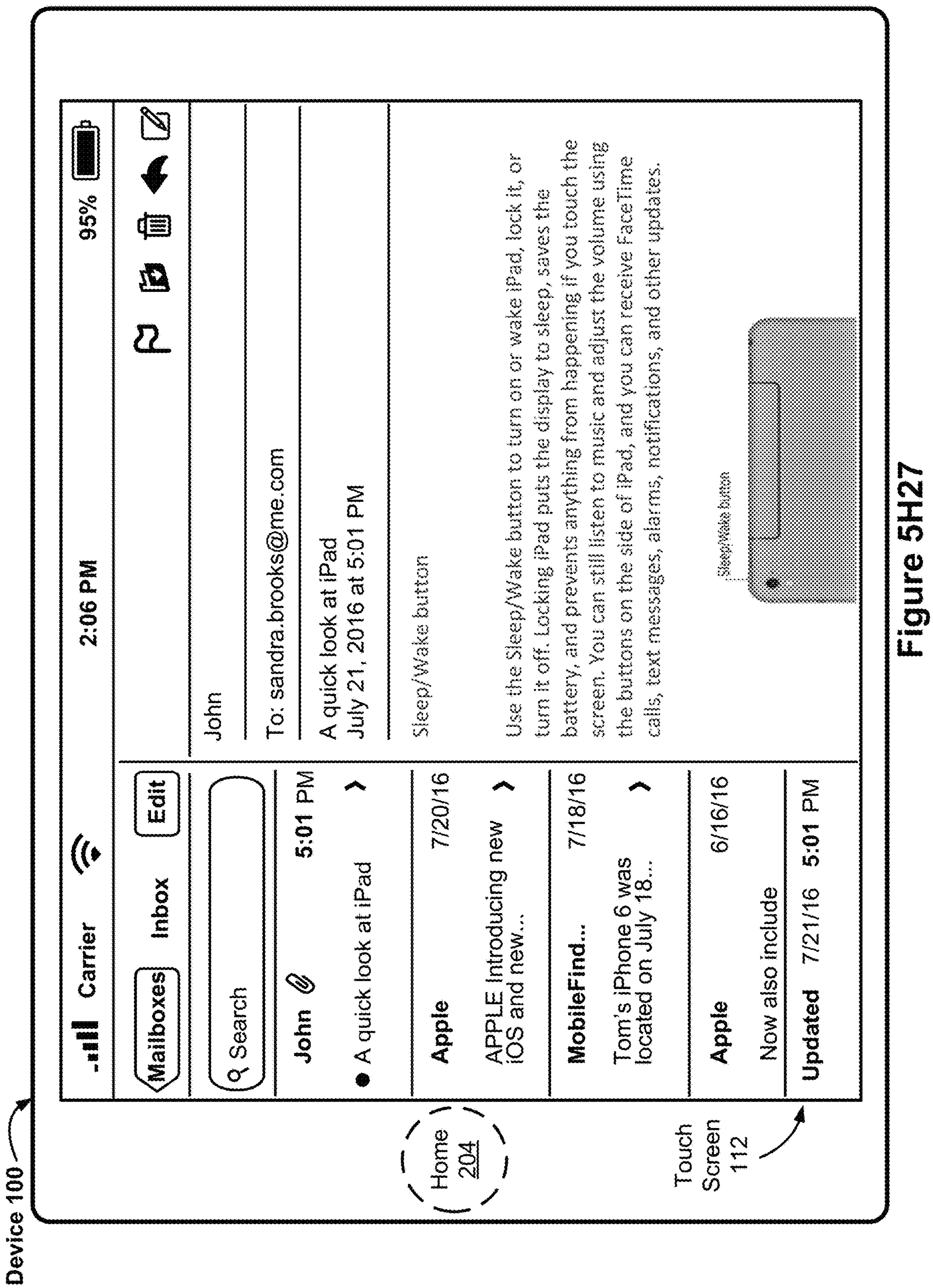
Figure 5H27

Figure 6A:
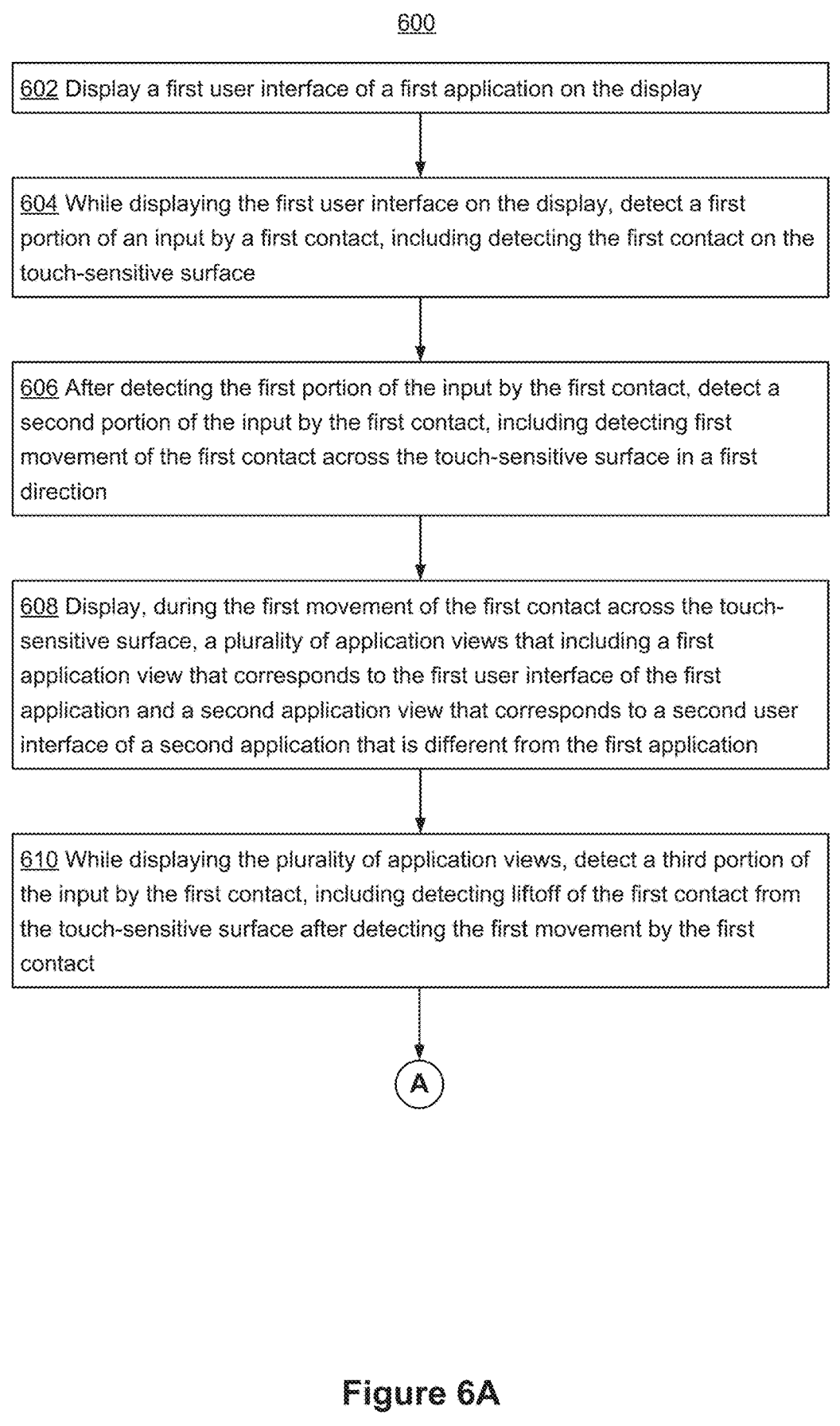

600

602 Display a first user interface of a first application on the display

↓

604 While displaying the first user interface on the display, detect a first portion of an input by a first contact, including detecting the first contact on the touch-sensitive surface

↓

606 After detecting the first portion of the input by the first contact, detect a second portion of the input by the first contact, including detecting first movement of the first contact across the touch-sensitive surface in a first direction

↓

608 Display, during the first movement of the first contact across the touch-sensitive surface, a plurality of application views that including a first application view that corresponds to the first user interface of the first application and a second application view that corresponds to a second user interface of a second application that is different from the first application

↓

610 While displaying the plurality of application views, detect a third portion of the input by the first contact, including detecting liftoff of the first contact from the touch-sensitive surface after detecting the first movement by the first contact

Figure 6B:
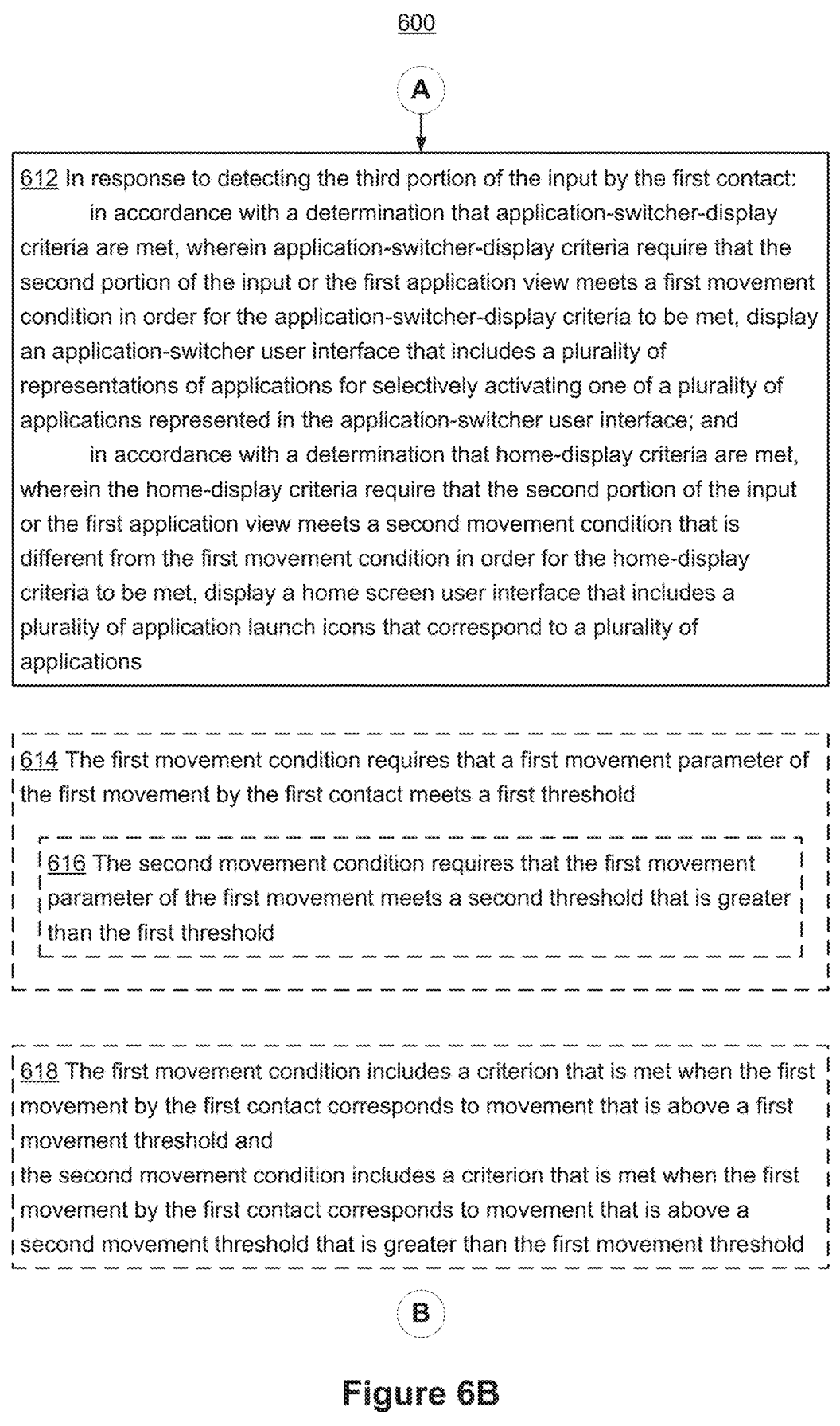

612 In response to detecting the third portion of the input by the first contact:

in accordance with a determination that application-switcher-display criteria are met, wherein application-switcher-display criteria require that the second portion of the input or the first application view meets a first movement condition in order for the application-switcher-display criteria to be met, display an application-switcher user interface that includes a plurality of representations of applications for selectively activating one of a plurality of applications represented in the application-switcher user interface; and in accordance with a determination that home-display criteria are met, wherein the home-display criteria require that the second portion of the input or the first application view meets a second movement condition that is different from the first movement condition in order for the home-display criteria to be met, display a home screen user interface that includes a plurality of application launch icons that correspond to a plurality of applications 614 The first movement condition requires that a first movement parameter of the first movement by the first contact meets a first threshold 616 The second movement condition requires that the first movement parameter of the first movement meets a second threshold that is greater than the first threshold 618 The first movement condition includes a criterion that is met when the first movement by the first contact corresponds to movement that is above a first movement threshold and
the second movement condition includes a criterion that is met when the first movement by the first contact corresponds to movement that is above a second movement threshold that is greater than the first movement threshold (B)

Figure 6C:
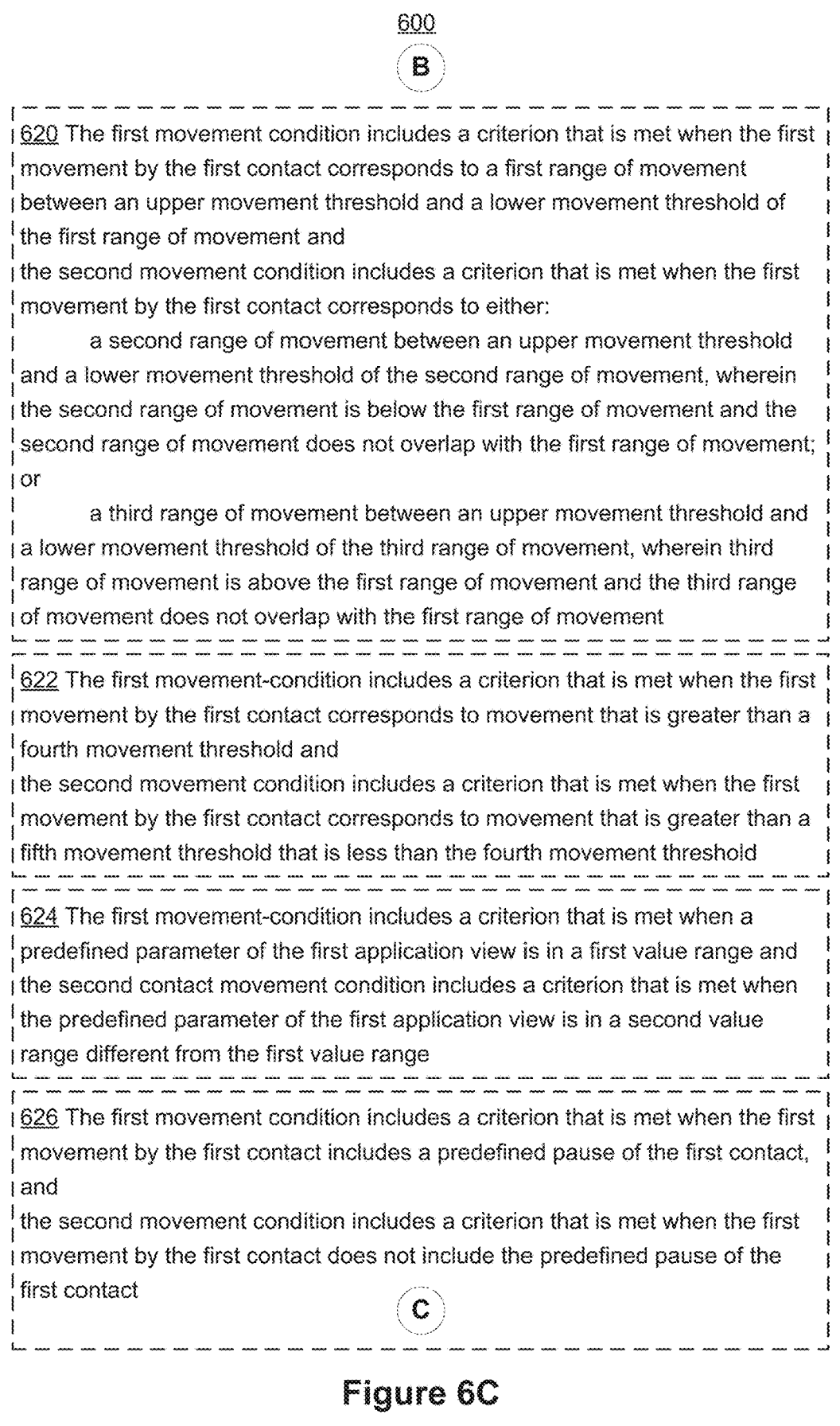

620 The first movement condition includes a criterion that is met when the first movement by the first contact corresponds to a first range of movement between an upper movement threshold and a lower movement threshold of the first range of movement and
the second movement condition includes a criterion that is met when the first movement by the first contact corresponds to either:
a second range of movement between an upper movement threshold and a lower movement threshold of the second range of movement, wherein the second range of movement is below the first range of movement and the second range of movement does not overlap with the first range of movement; or
a third range of movement between an upper movement threshold and a lower movement threshold of the third range of movement, wherein third range of movement is above the first range of movement and the third range of movement does not overlap with the first range of movement 622 The first movement-condition includes a criterion that is met when the first movement by the first contact corresponds to movement that is greater than a fourth movement threshold and
the second movement condition includes a criterion that is met when the first movement by the first contact corresponds to movement that is greater than a fifth movement threshold that is less than the fourth movement threshold 624 The first movement-condition includes a criterion that is met when a predefined parameter of the first application view is in a first value range and the second contact movement condition includes a criterion that is met when the predefined parameter of the first application view is in a second value range different from the first value range 626 The first movement condition includes a criterion that is met when the first movement by the first contact includes a predefined pause of the first contact, and
the second movement condition includes a criterion that is met when the first movement by the first contact does not include the predefined pause of the first contact

Figure 6D:
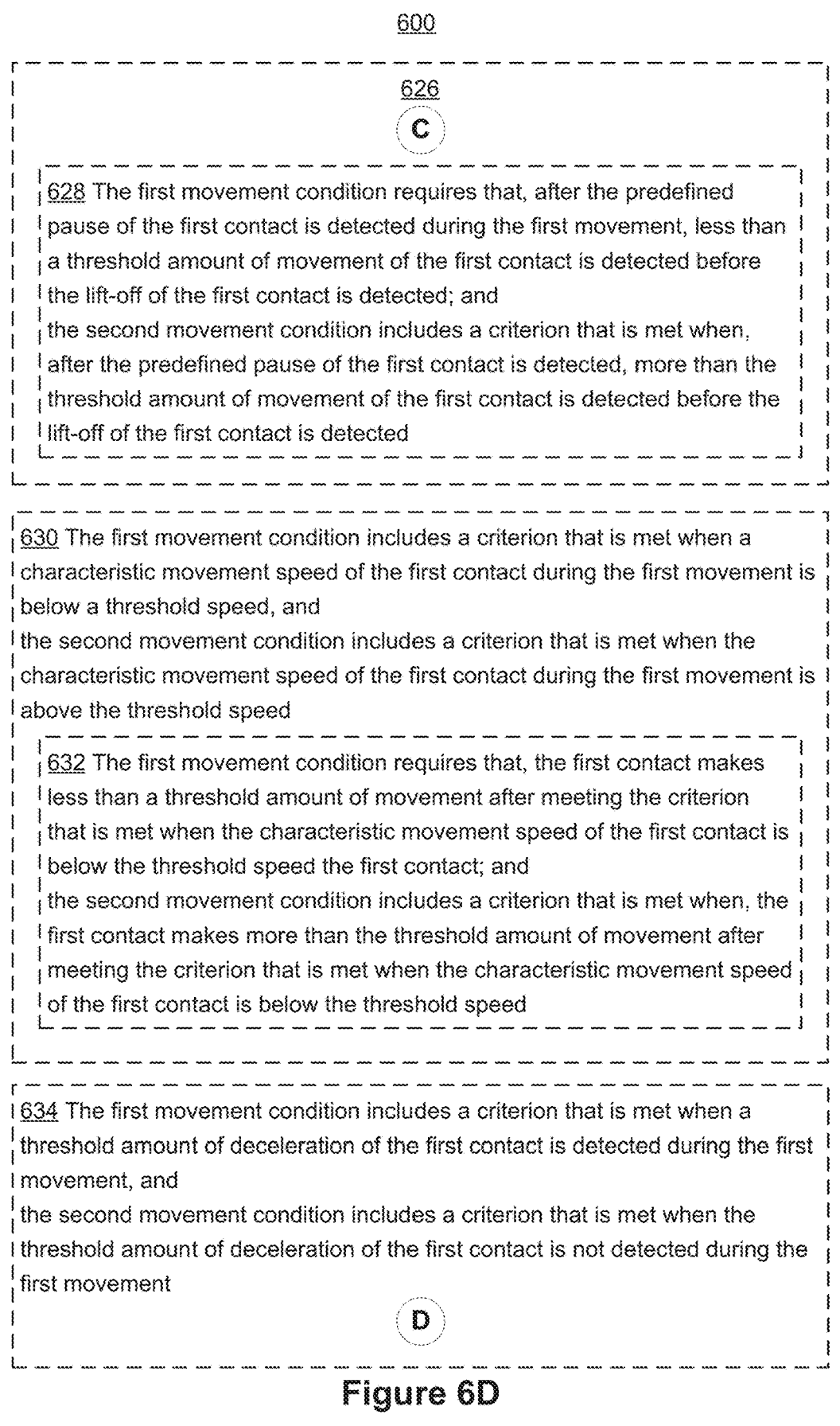

628 The first movement condition requires that, after the predefined pause of the first contact is detected during the first movement, less than a threshold amount of movement of the first contact is detected before the lift-off of the first contact is detected; and
the second movement condition includes a criterion that is met when, after the predefined pause of the first contact is detected, more than the threshold amount of movement of the first contact is detected before the lift-off of the first contact is detected 630 The first movement condition includes a criterion that is met when a characteristic movement speed of the first contact during the first movement is below a threshold speed, and
the second movement condition includes a criterion that is met when the characteristic movement speed of the first contact during the first movement is above the threshold speed 632 The first movement condition requires that, the first contact makes less than a threshold amount of movement after meeting the criterion that is met when the characteristic movement speed of the first contact is below the threshold speed the first contact; and
the second movement condition includes a criterion that is met when, the first contact makes more than the threshold amount of movement after meeting the criterion that is met when the characteristic movement speed of the first contact is below the threshold speed 634 The first movement condition includes a criterion that is met when a threshold amount of deceleration of the first contact is detected during the first movement, and
the second movement condition includes a criterion that is met when the threshold amount of deceleration of the first contact is not detected during the first movement

Figure 6E:
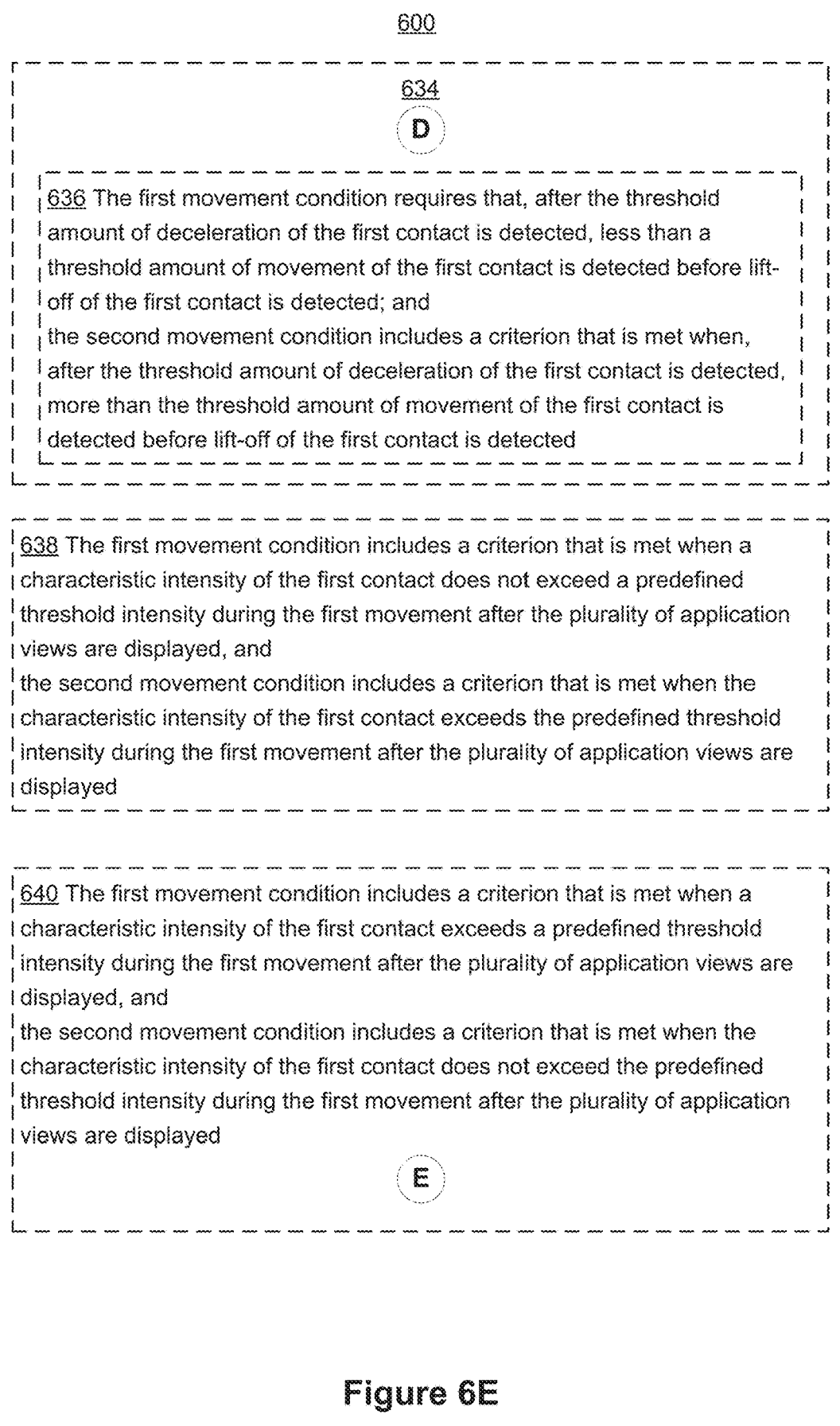

636 The first movement condition requires that, after the threshold amount of deceleration of the first contact is detected, less than a threshold amount of movement of the first contact is detected before lift-off of the first contact is detected; and
the second movement condition includes a criterion that is met when, after the threshold amount of deceleration of the first contact is detected, more than the threshold amount of movement of the first contact is detected before lift-off of the first contact is detected 638 The first movement condition includes a criterion that is met when a characteristic intensity of the first contact does not exceed a predefined threshold intensity during the first movement after the plurality of application views are displayed, and
the second movement condition includes a criterion that is met when the characteristic intensity of the first contact exceeds the predefined threshold intensity during the first movement after the plurality of application views are displayed 640 The first movement condition includes a criterion that is met when a characteristic intensity of the first contact exceeds a predefined threshold intensity during the first movement after the plurality of application views are displayed, and
the second movement condition includes a criterion that is met when the characteristic intensity of the first contact does not exceed the predefined threshold intensity during the first movement after the plurality of application views are displayed

Figure 6F:
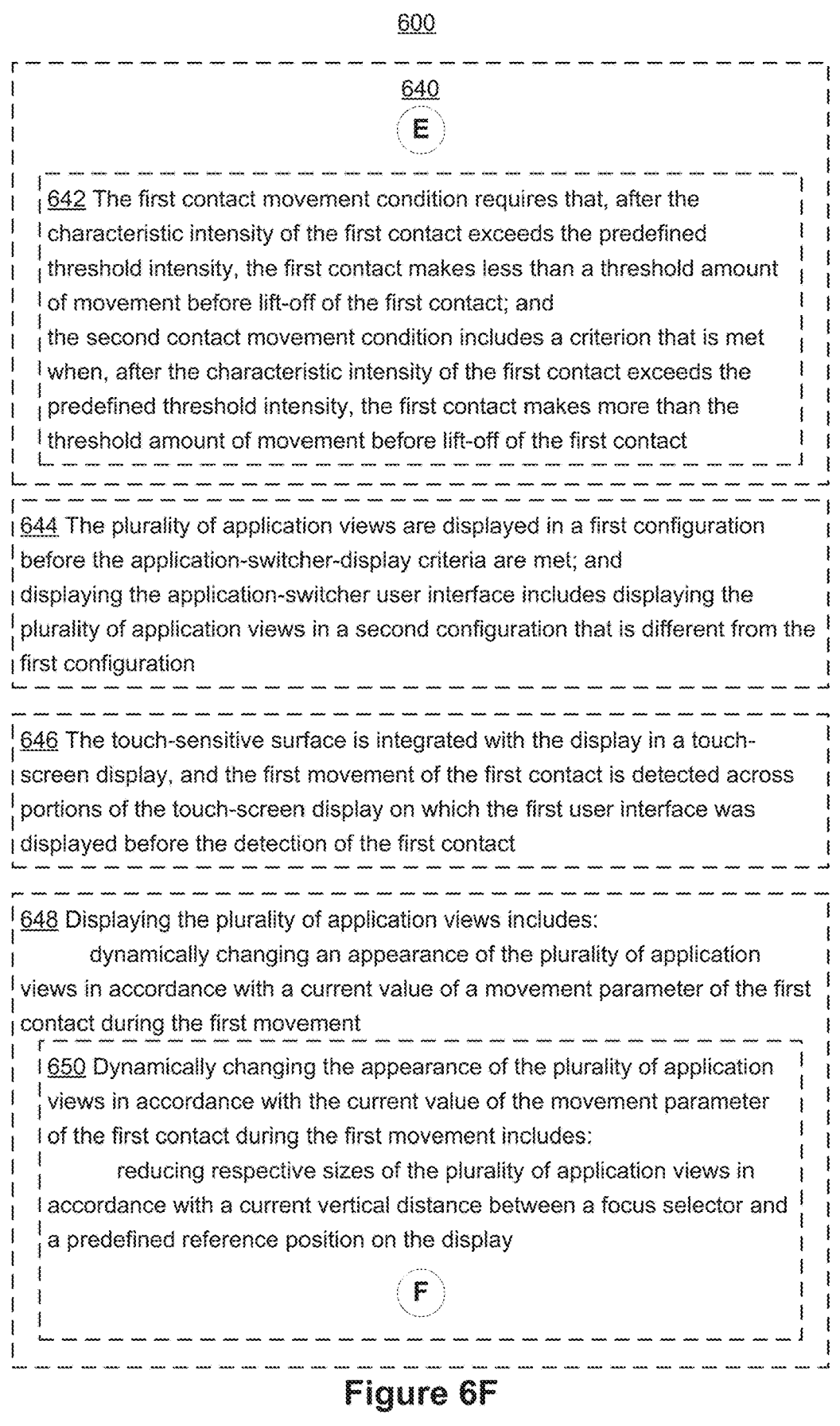

642 The first contact movement condition requires that, after the characteristic intensity of the first contact exceeds the predefined threshold intensity, the first contact makes less than a threshold amount of movement before lift-off of the first contact; and
the second contact movement condition includes a criterion that is met when, after the characteristic intensity of the first contact exceeds the predefined threshold intensity, the first contact makes more than the threshold amount of movement before lift-off of the first contact 644 The plurality of application views are displayed in a first configuration before the application-switcher-display criteria are met; and
displaying the application-switcher user interface includes displaying the plurality of application views in a second configuration that is different from the first configuration 646 The touch-sensitive surface is integrated with the display in a touch-screen display, and the first movement of the first contact is detected across portions of the touch-screen display on which the first user interface was displayed before the detection of the first contact 648 Displaying the plurality of application views includes:
dynamically changing an appearance of the plurality of application views in accordance with a current value of a movement parameter of the first contact during the first movement 650 Dynamically changing the appearance of the plurality of application views in accordance with the current value of the movement parameter of the first contact during the first movement includes:
reducing respective sizes of the plurality of application views in accordance with a current vertical distance between a focus selector and a predefined reference position on the display

Figure 6G:
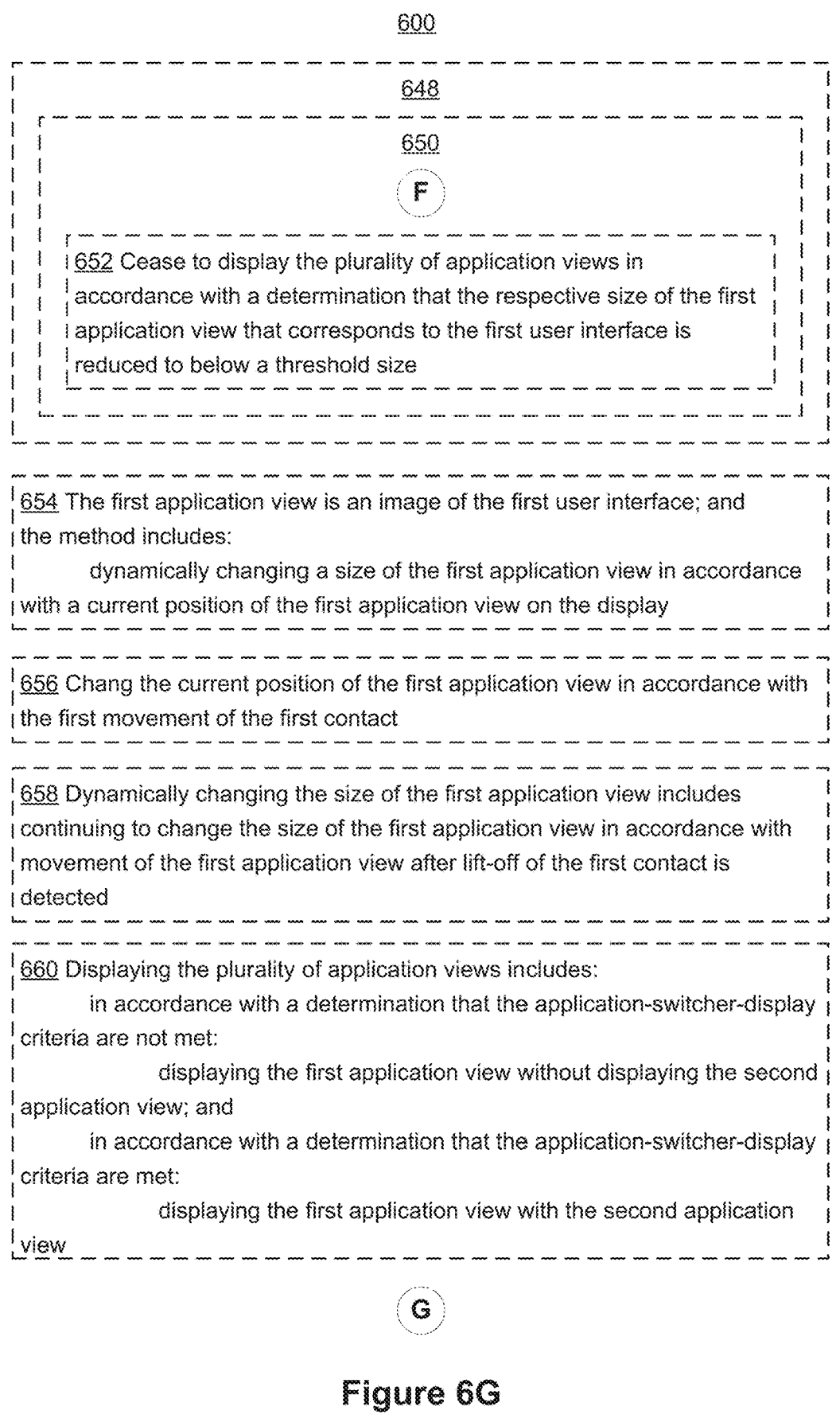

652 Cease to display the plurality of application views in accordance with a determination that the respective size of the first application view that corresponds to the first user interface is reduced to below a threshold size 654 The first application view is an image of the first user interface; and the method includes:

dynamically changing a size of the first application view in accordance with a current position of the first application view on the display 656 Chang the current position of the first application view in accordance with the first movement of the first contact 658 Dynamically changing the size of the first application view includes continuing to change the size of the first application view in accordance with movement of the first application view after lift-off of the first contact is detected 660 Displaying the plurality of application views includes:

in accordance with a determination that the application-switcher-display criteria are not met:

displaying the first application view without displaying the second application view; and in accordance with a determination that the application-switcher-display criteria are met:

displaying the first application view with the second application view

Figure 6H:
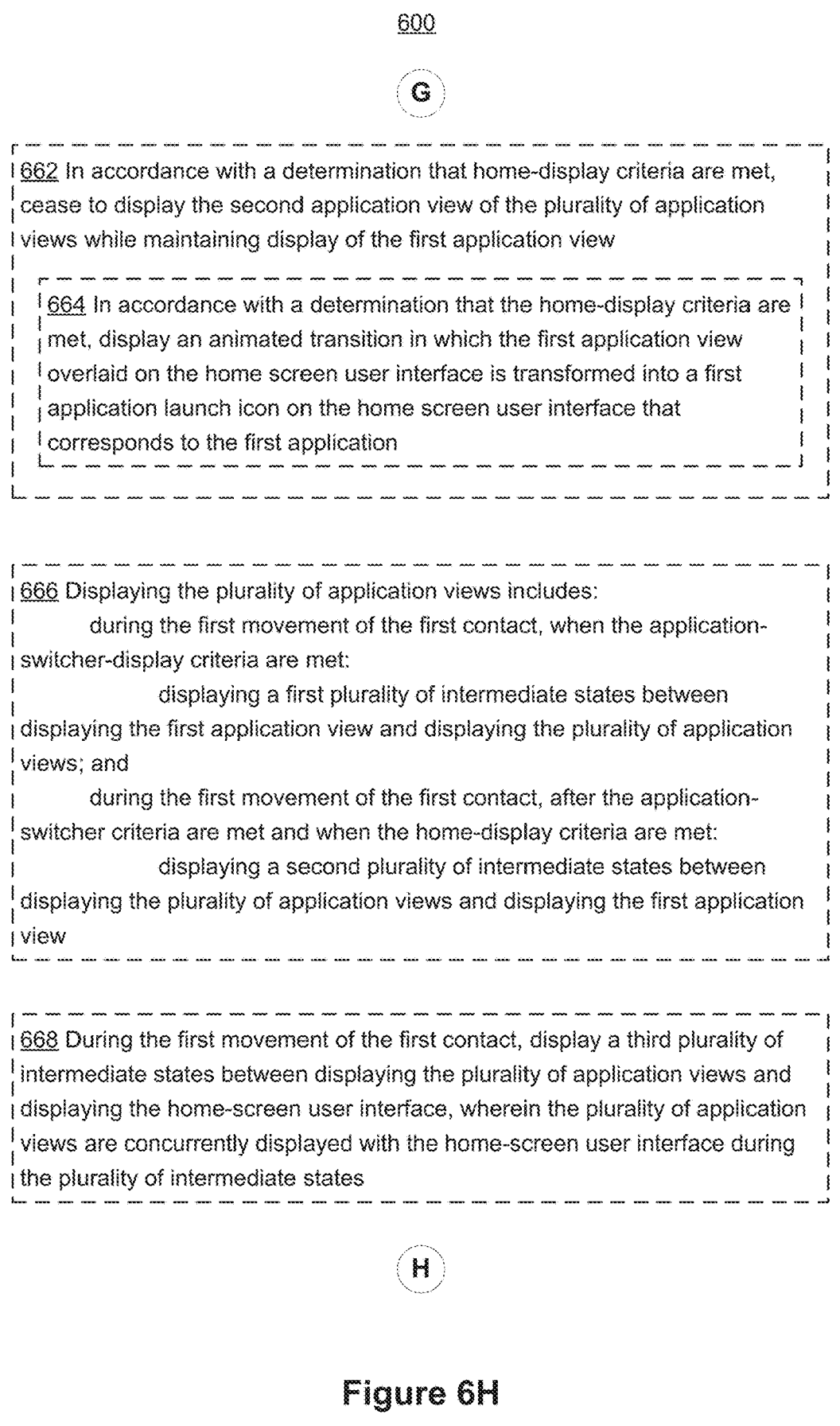

662 In accordance with a determination that home-display criteria are met, cease to display the second application view of the plurality of application views while maintaining display of the first application view 664 In accordance with a determination that the home-display criteria are met, display an animated transition in which the first application view overlaid on the home screen user interface is transformed into a first application launch icon on the home screen user interface that corresponds to the first application 666 Displaying the plurality of application views includes:

during the first movement of the first contact, when the application-switcher-display criteria are met:

displaying a first plurality of intermediate states between displaying the first application view and displaying the plurality of application views; and during the first movement of the first contact, after the application-switcher criteria are met and when the home-display criteria are met:

displaying a second plurality of intermediate states between displaying the plurality of application views and displaying the first application view 668 During the first movement of the first contact, display a third plurality of intermediate states between displaying the plurality of application views and displaying the home-screen user interface, wherein the plurality of application views are concurrently displayed with the home-screen user interface during the plurality of intermediate states

Figure 6I:
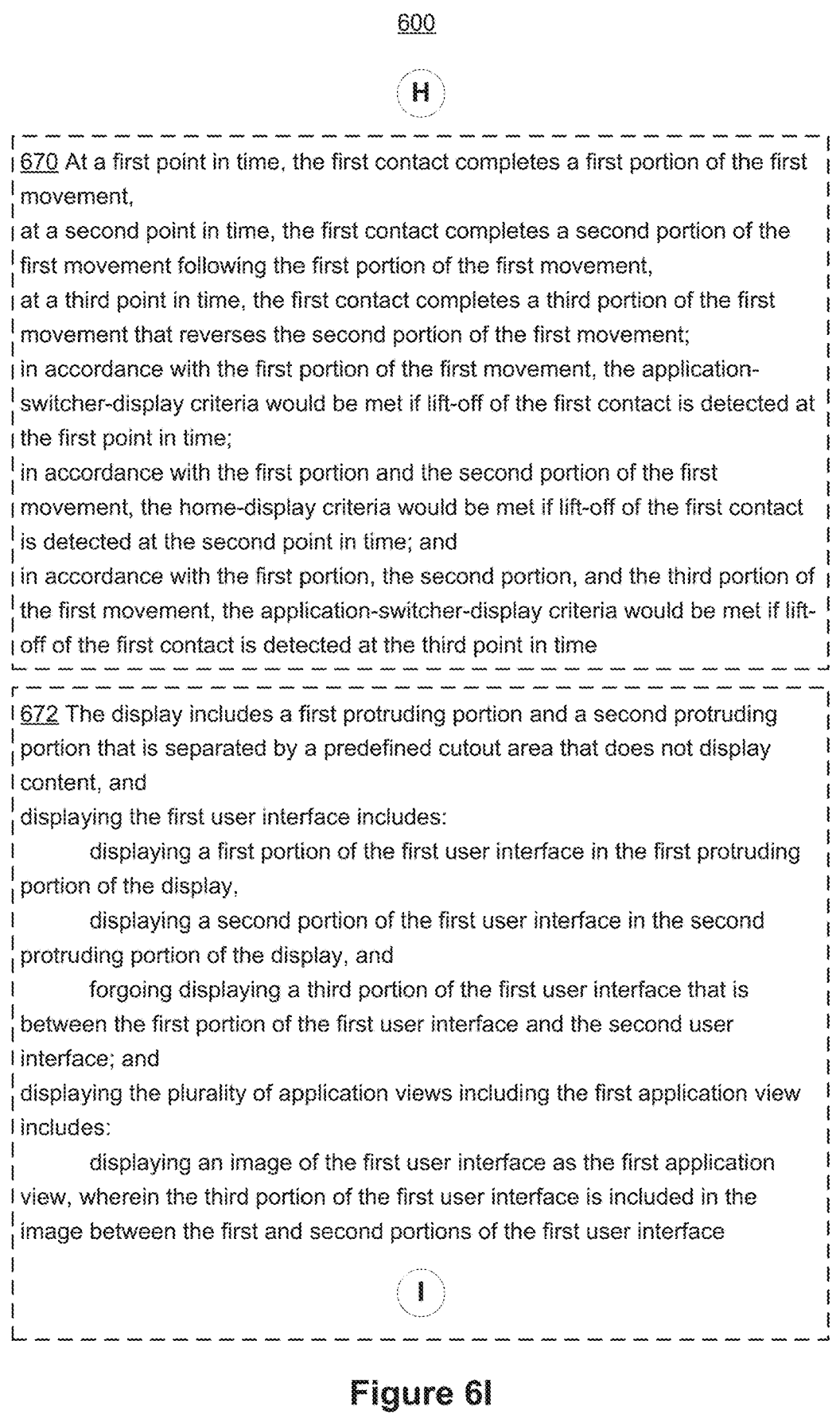

670 At a first point in time, the first contact completes a first portion of the first movement,
at a second point in time, the first contact completes a second portion of the first movement following the first portion of the first movement,
at a third point in time, the first contact completes a third portion of the first movement that reverses the second portion of the first movement;
in accordance with the first portion of the first movement, the application-switcher-display criteria would be met if lift-off of the first contact is detected at the first point in time;
in accordance with the first portion and the second portion of the first movement, the home-display criteria would be met if lift-off of the first contact is detected at the second point in time; and
in accordance with the first portion, the second portion, and the third portion of the first movement, the application-switcher-display criteria would be met if lift-off of the first contact is detected at the third point in time 672 The display includes a first protruding portion and a second protruding portion that is separated by a predefined cutout area that does not display content, and
displaying the first user interface includes:
displaying a first portion of the first user interface in the first protruding portion of the display,
displaying a second portion of the first user interface in the second protruding portion of the display, and
forgoing displaying a third portion of the first user interface that is between the first portion of the first user interface and the second user interface; and
displaying the plurality of application views including the first application view includes:
displaying an image of the first user interface as the first application view, wherein the third portion of the first user interface is included in the image between the first and second portions of the first user interface

Figure 6J:
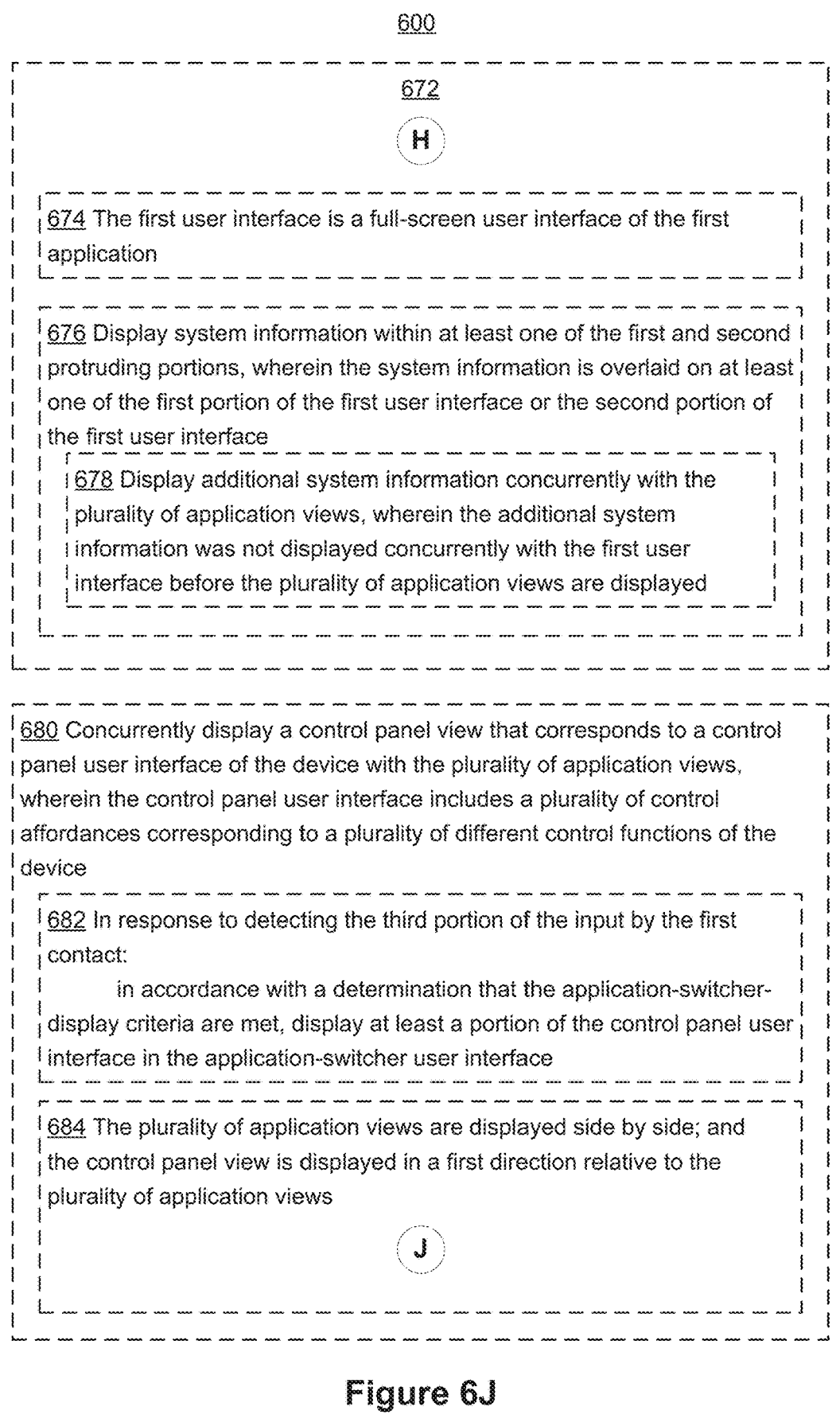

674 The first user interface is a full-screen user interface of the first application 676 Display system information within at least one of the first and second protruding portions, wherein the system information is overlaid on at least one of the first portion of the first user interface or the second portion of the first user interface 678 Display additional system information concurrently with the plurality of application views, wherein the additional system information was not displayed concurrently with the first user interface before the plurality of application views are displayed 680 Concurrently display a control panel view that corresponds to a control panel user interface of the device with the plurality of application views, wherein the control panel user interface includes a plurality of control affordances corresponding to a plurality of different control functions of the device 682 In response to detecting the third portion of the input by the first contact:

in accordance with a determination that the application-switcher-display criteria are met, display at least a portion of the control panel user interface in the application-switcher user interface 684 The plurality of application views are displayed side by side; and the control panel view is displayed in a first direction relative to the plurality of application views (J)

Figure 6K:
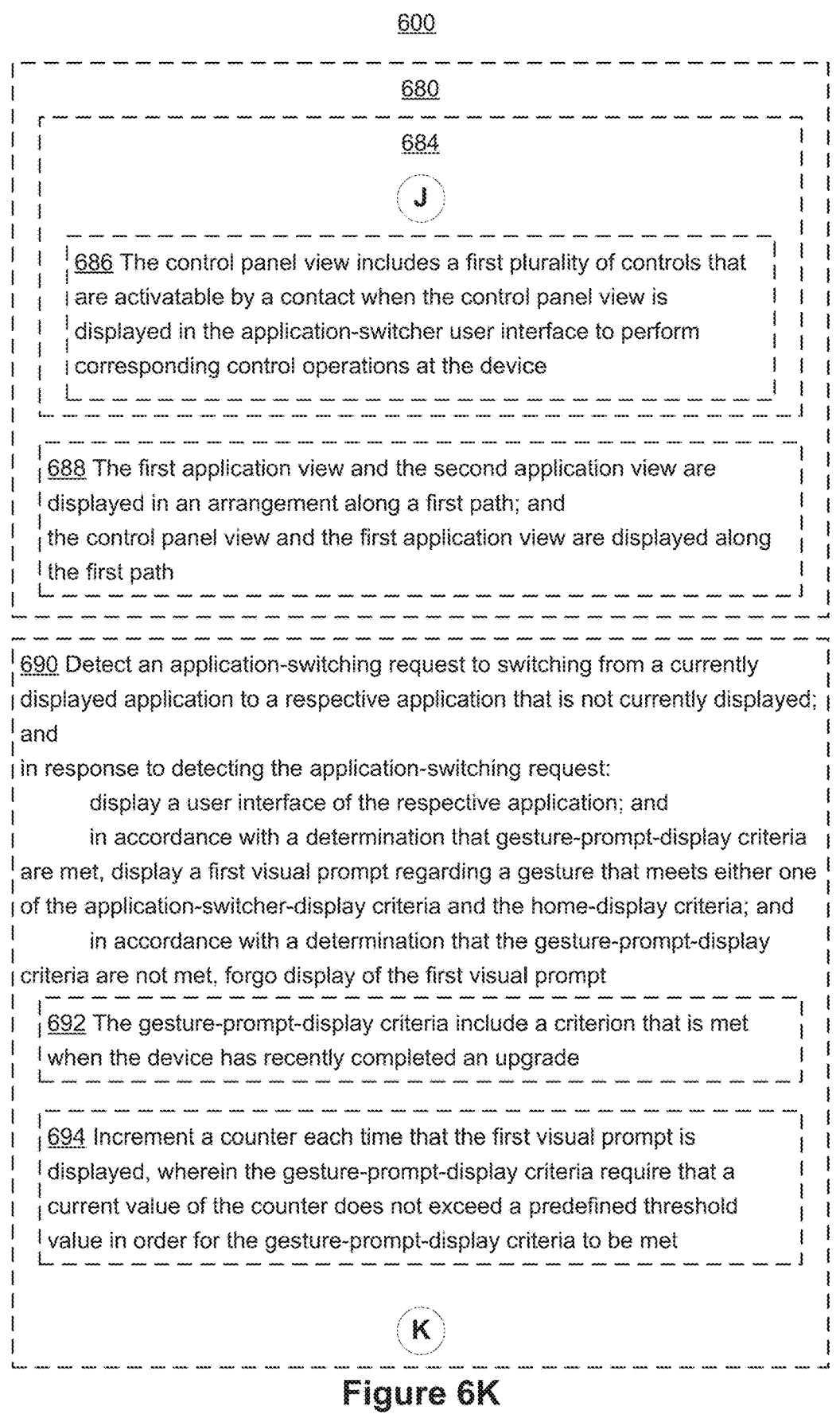

686 The control panel view includes a first plurality of controls that are activatable by a contact when the control panel view is displayed in the application-switcher user interface to perform corresponding control operations at the device 688 The first application view and the second application view are displayed in an arrangement along a first path; and
the control panel view and the first application view are displayed along the first path 690 Detect an application-switching request to switching from a currently displayed application to a respective application that is not currently displayed; and
in response to detecting the application-switching request:
display a user interface of the respective application; and
in accordance with a determination that gesture-prompt-display criteria are met, display a first visual prompt regarding a gesture that meets either one of the application-switcher-display criteria and the home-display criteria; and
in accordance with a determination that the gesture-prompt-display criteria are not met, forgo display of the first visual prompt 692 The gesture-prompt-display criteria include a criterion that is met when the device has recently completed an upgrade 694 Increment a counter each time that the first visual prompt is displayed, wherein the gesture-prompt-display criteria require that a current value of the counter does not exceed a predefined threshold value in order for the gesture-prompt-display criteria to be met

Figure 6L:
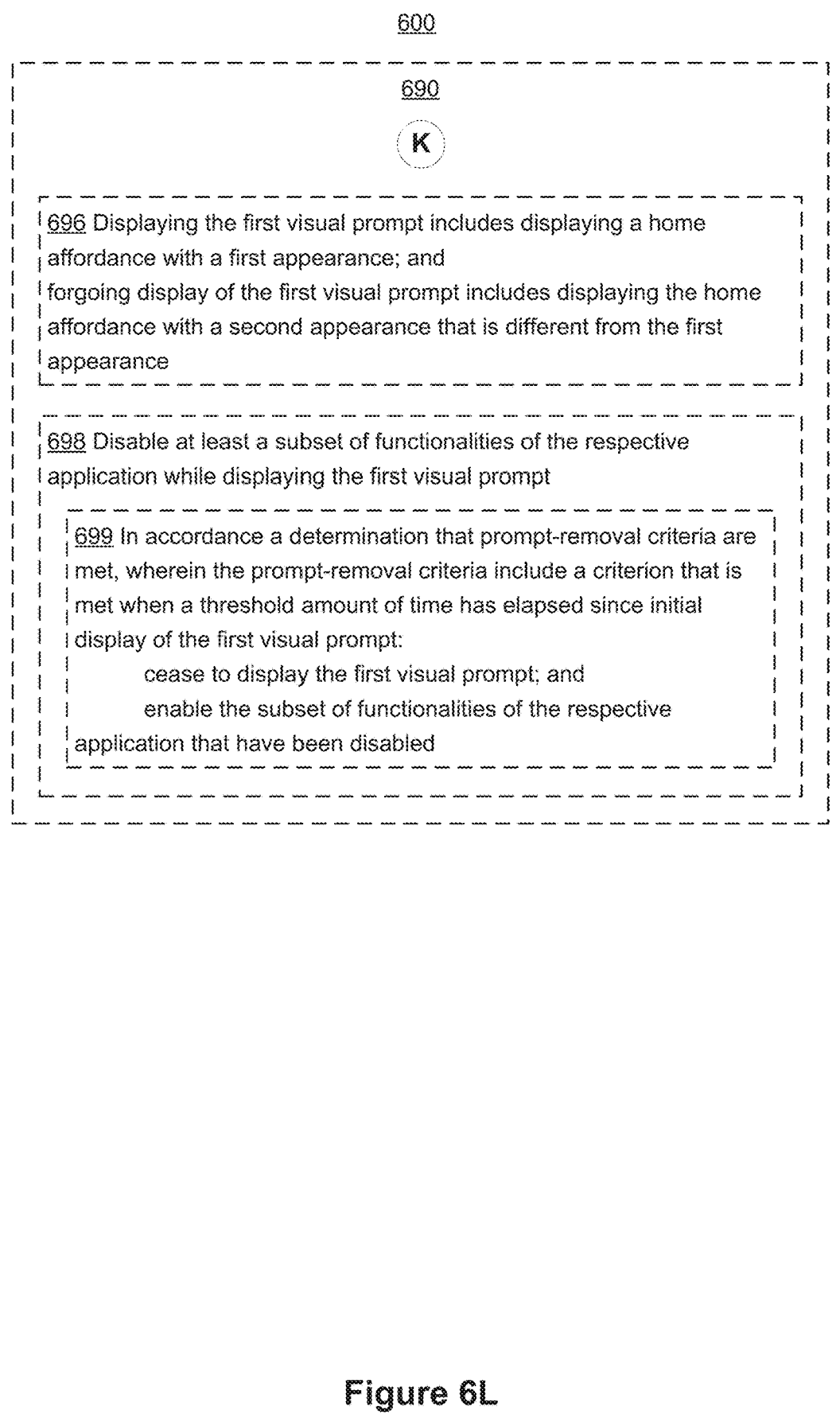

696 Displaying the first visual prompt includes displaying a home affordance with a first appearance; and
forgoing display of the first visual prompt includes displaying the home affordance with a second appearance that is different from the first appearance 698 Disable at least a subset of functionalities of the respective application while displaying the first visual prompt 699 In accordance a determination that prompt-removal criteria are met, wherein the prompt-removal criteria include a criterion that is met when a threshold amount of time has elapsed since initial display of the first visual prompt:

cease to display the first visual prompt; and enable the subset of functionalities of the respective application that have been disabled

Figure 7A:
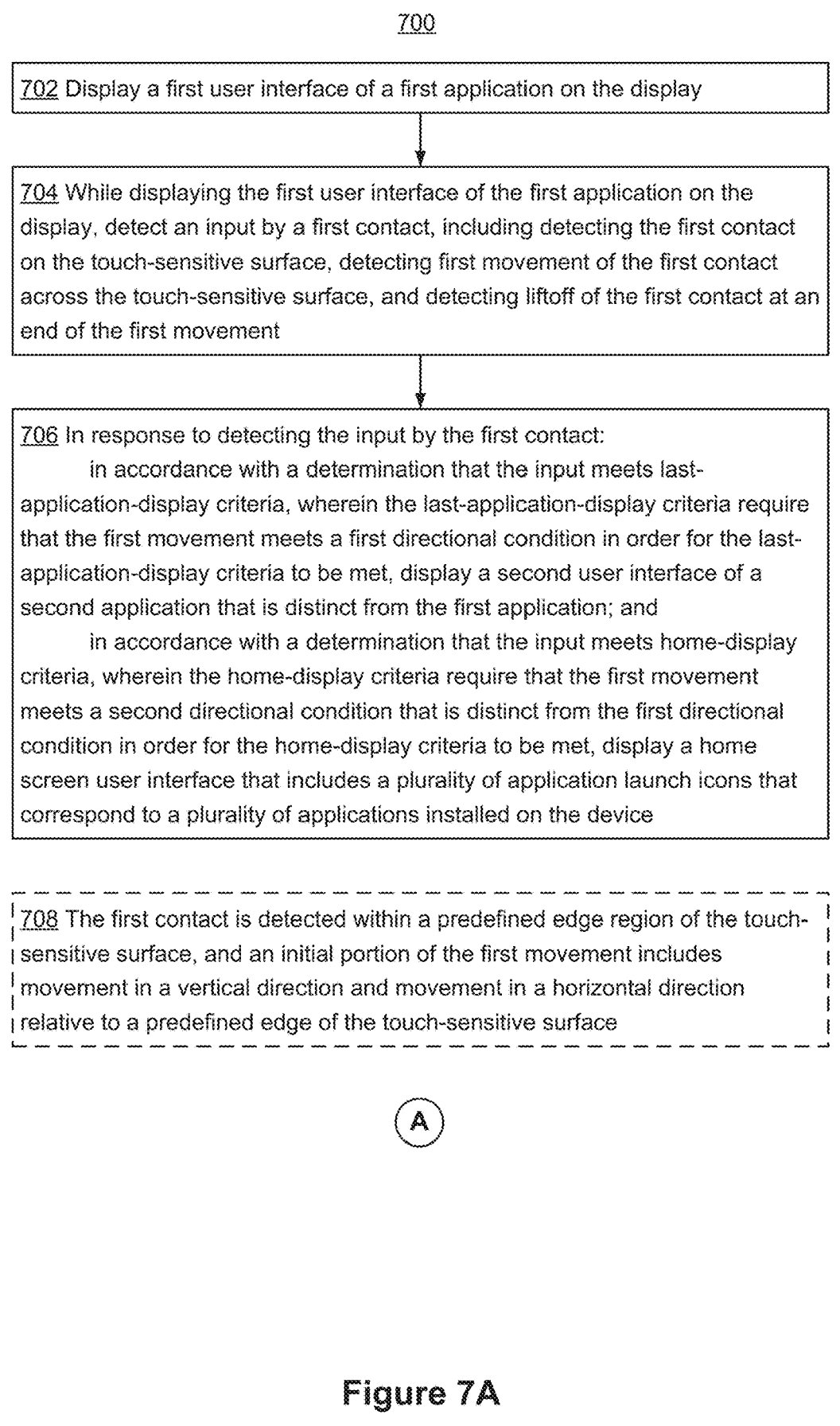

702 Display a first user interface of a first application on the display

↓

704 While displaying the first user interface of the first application on the display, detect an input by a first contact, including detecting the first contact on the touch-sensitive surface, detecting first movement of the first contact across the touch-sensitive surface, and detecting liftoff of the first contact at an end of the first movement

↓

706 In response to detecting the input by the first contact:

in accordance with a determination that the input meets last-application-display criteria, wherein the last-application-display criteria require that the first movement meets a first directional condition in order for the last-application-display criteria to be met, display a second user interface of a second application that is distinct from the first application; and in accordance with a determination that the input meets home-display criteria, wherein the home-display criteria require that the first movement meets a second directional condition that is distinct from the first directional condition in order for the home-display criteria to be met, display a home screen user interface that includes a plurality of application launch icons that correspond to a plurality of applications installed on the device 708 The first contact is detected within a predefined edge region of the touch-sensitive surface, and an initial portion of the first movement includes movement in a vertical direction and movement in a horizontal direction relative to a predefined edge of the touch-sensitive surface (A)

Figure 7B:
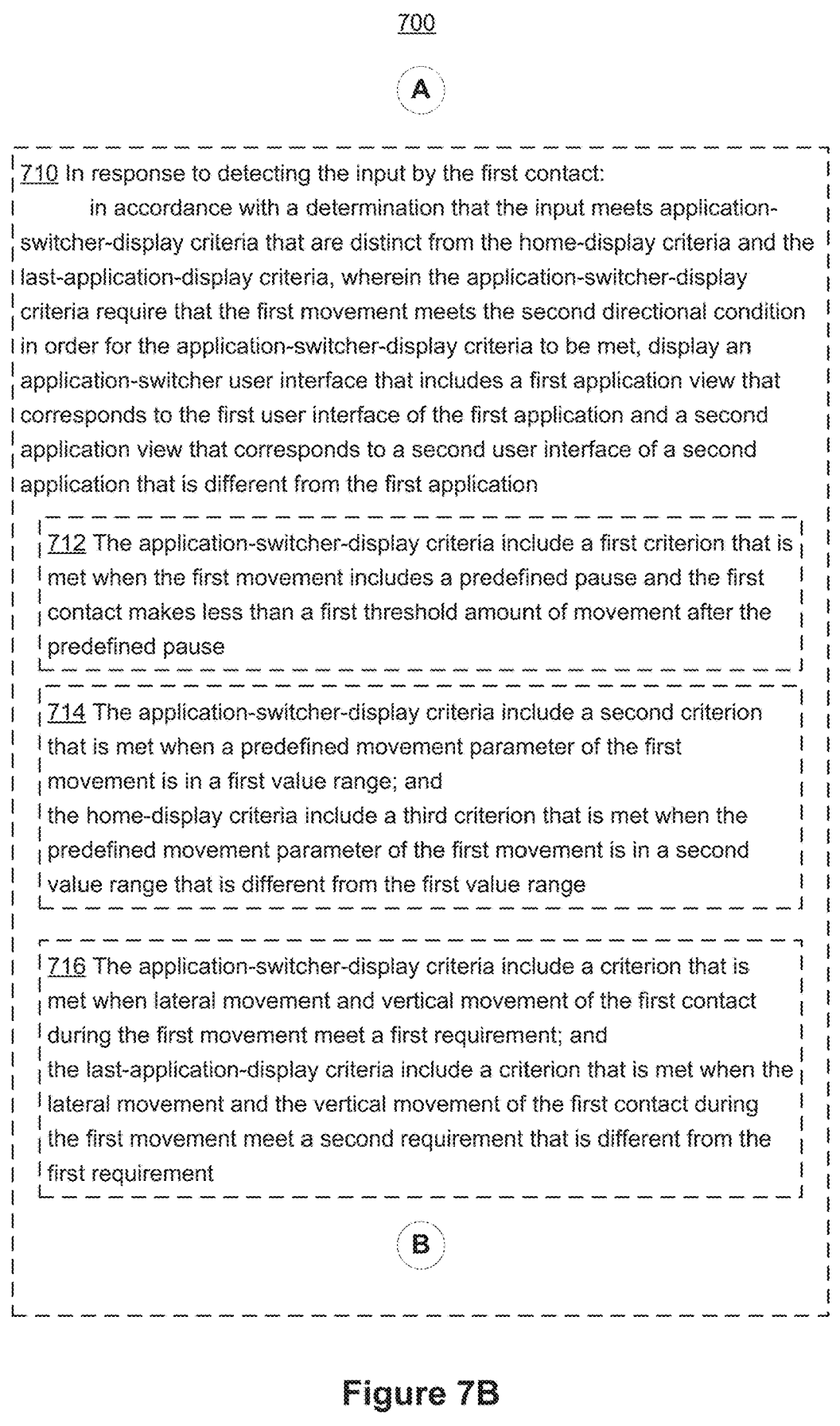

710 In response to detecting the input by the first contact:

in accordance with a determination that the input meets application-switcher-display criteria that are distinct from the home-display criteria and the last-application-display criteria, wherein the application-switcher-display criteria require that the first movement meets the second directional condition in order for the application-switcher-display criteria to be met, display an application-switcher user interface that includes a first application view that corresponds to the first user interface of the first application and a second application view that corresponds to a second user interface of a second application that is different from the first application 712 The application-switcher-display criteria include a first criterion that is met when the first movement includes a predefined pause and the first contact makes less than a first threshold amount of movement after the predefined pause 714 The application-switcher-display criteria include a second criterion that is met when a predefined movement parameter of the first movement is in a first value range; and
the home-display criteria include a third criterion that is met when the predefined movement parameter of the first movement is in a second value range that is different from the first value range 716 The application-switcher-display criteria include a criterion that is met when lateral movement and vertical movement of the first contact during the first movement meet a first requirement; and
the last-application-display criteria include a criterion that is met when the lateral movement and the vertical movement of the first contact during the first movement meet a second requirement that is different from the first requirement (B)

Figure 7C:
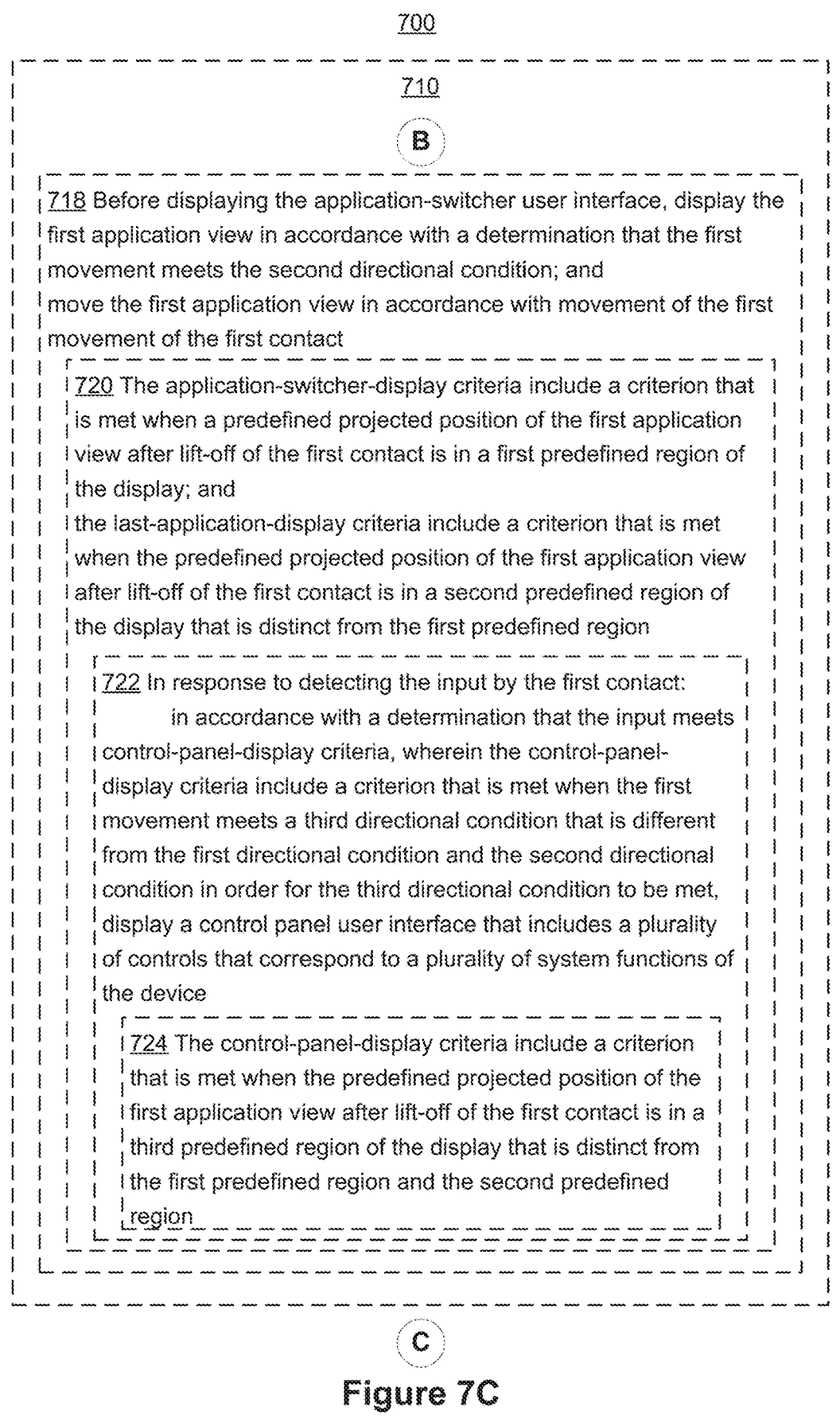

718 Before displaying the application-switcher user interface, display the first application view in accordance with a determination that the first movement meets the second directional condition; and
move the first application view in accordance with movement of the first movement of the first contact 720 The application-switcher-display criteria include a criterion that is met when a predefined projected position of the first application view after lift-off of the first contact is in a first predefined region of the display; and
the last-application-display criteria include a criterion that is met when the predefined projected position of the first application view after lift-off of the first contact is in a second predefined region of the display that is distinct from the first predefined region 722 In response to detecting the input by the first contact:
in accordance with a determination that the input meets control-panel-display criteria, wherein the control-panel-display criteria include a criterion that is met when the first movement meets a third directional condition that is different from the first directional condition and the second directional condition in order for the third directional condition to be met, display a control panel user interface that includes a plurality of controls that correspond to a plurality of system functions of the device 724 The control-panel-display criteria include a criterion that is met when the predefined projected position of the first application view after lift-off of the first contact is in a third predefined region of the display that is distinct from the first predefined region and the second predefined region

Figure 7D:
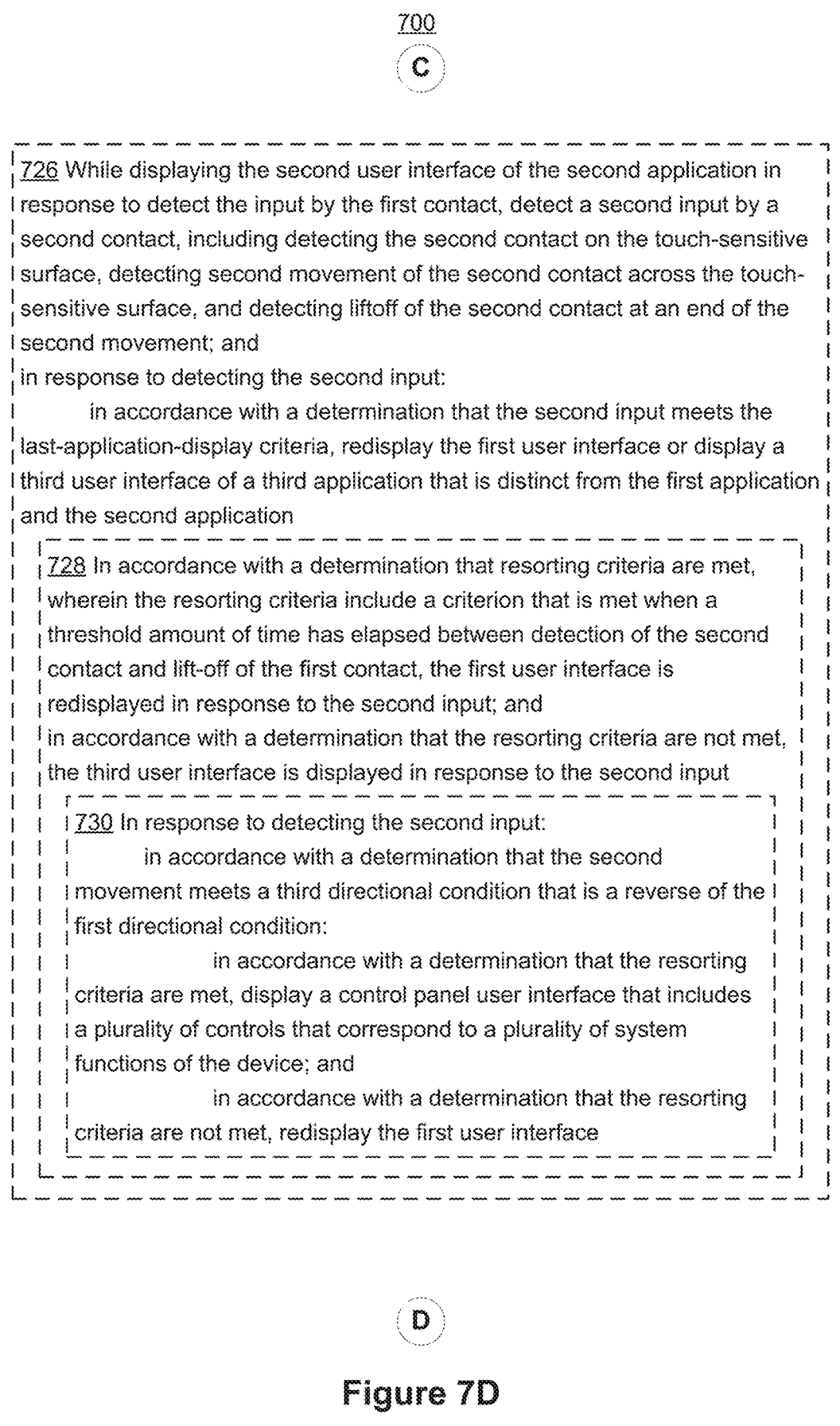

726 While displaying the second user interface of the second application in response to detect the input by the first contact, detect a second input by a second contact, including detecting the second contact on the touch-sensitive surface, detecting second movement of the second contact across the touch-sensitive surface, and detecting liftoff of the second contact at an end of the second movement; and
in response to detecting the second input:
in accordance with a determination that the second input meets the last-application-display criteria, redisplay the first user interface or display a third user interface of a third application that is distinct from the first application and the second application 728 In accordance with a determination that resorting criteria are met, wherein the resorting criteria include a criterion that is met when a threshold amount of time has elapsed between detection of the second contact and lift-off of the first contact, the first user interface is redisplayed in response to the second input; and
in accordance with a determination that the resorting criteria are not met, the third user interface is displayed in response to the second input 730 In response to detecting the second input:
in accordance with a determination that the second movement meets a third directional condition that is a reverse of the first directional condition:
in accordance with a determination that the resorting criteria are met, display a control panel user interface that includes a plurality of controls that correspond to a plurality of system functions of the device; and
in accordance with a determination that the resorting criteria are not met, redisplay the first user interface

Figure 7E:
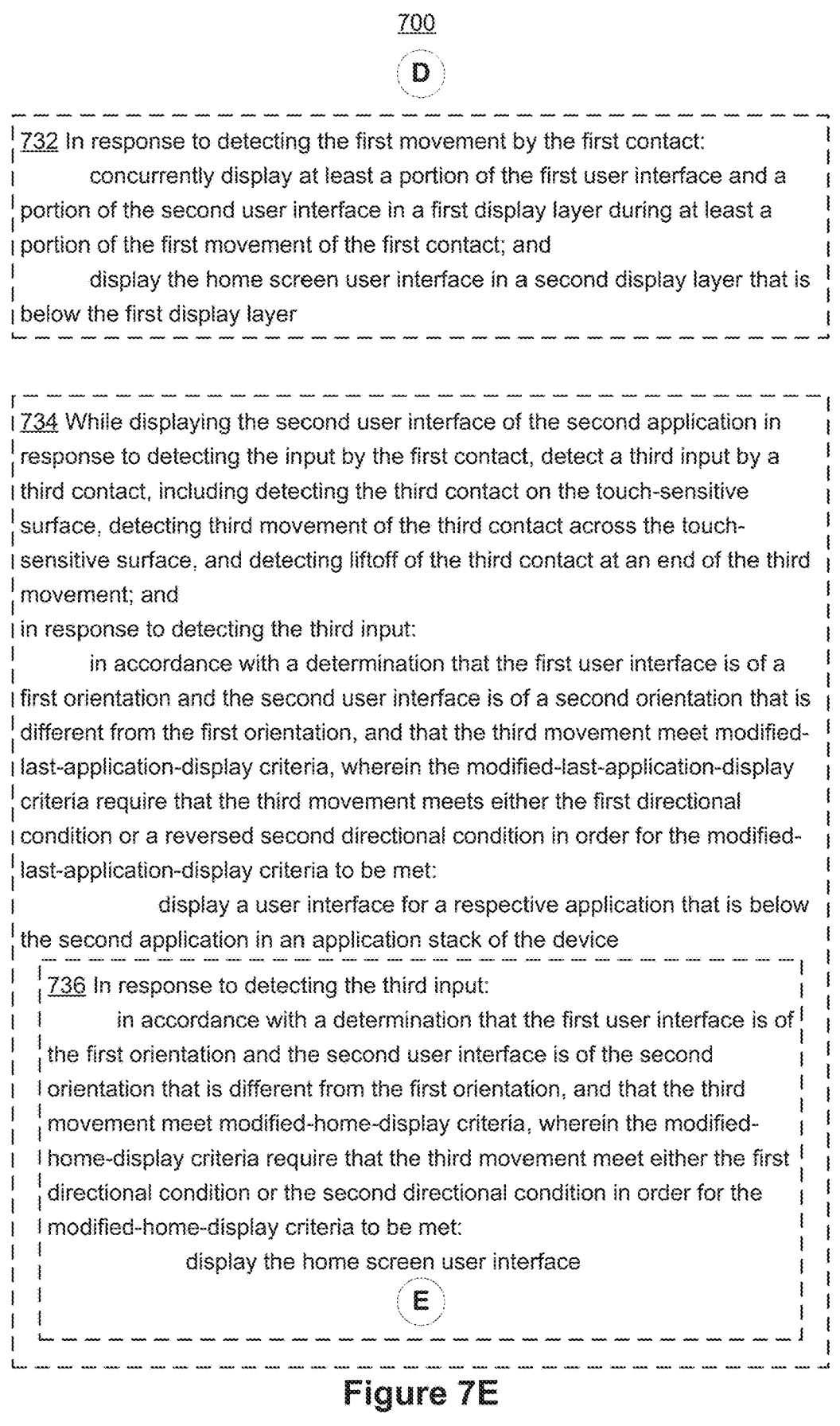

732 In response to detecting the first movement by the first contact:

concurrently display at least a portion of the first user interface and a portion of the second user interface in a first display layer during at least a portion of the first movement of the first contact; and display the home screen user interface in a second display layer that is below the first display layer 734 While displaying the second user interface of the second application in response to detecting the input by the first contact, detect a third input by a third contact, including detecting the third contact on the touch-sensitive surface, detecting third movement of the third contact across the touch-sensitive surface, and detecting liftoff of the third contact at an end of the third movement; and in response to detecting the third input:

in accordance with a determination that the first user interface is of a first orientation and the second user interface is of a second orientation that is different from the first orientation, and that the third movement meet modified-last-application-display criteria, wherein the modified-last-application-display criteria require that the third movement meets either the first directional condition or a reversed second directional condition in order for the modified-last-application-display criteria to be met:

display a user interface for a respective application that is below the second application in an application stack of the device 736 In response to detecting the third input:

in accordance with a determination that the first user interface is of the first orientation and the second user interface is of the second orientation that is different from the first orientation, and that the third movement meet modified-home-display criteria, wherein the modified-home-display criteria require that the third movement meet either the first directional condition or the second directional condition in order for the modified-home-display criteria to be met:

display the home screen user interface

738 Forgo applying the modified-last-application-display criteria and the modified-home-display criteria to the third input in accordance with a determination that the third input is detected after a threshold amount of time of termination of the first input

Figure 8A:
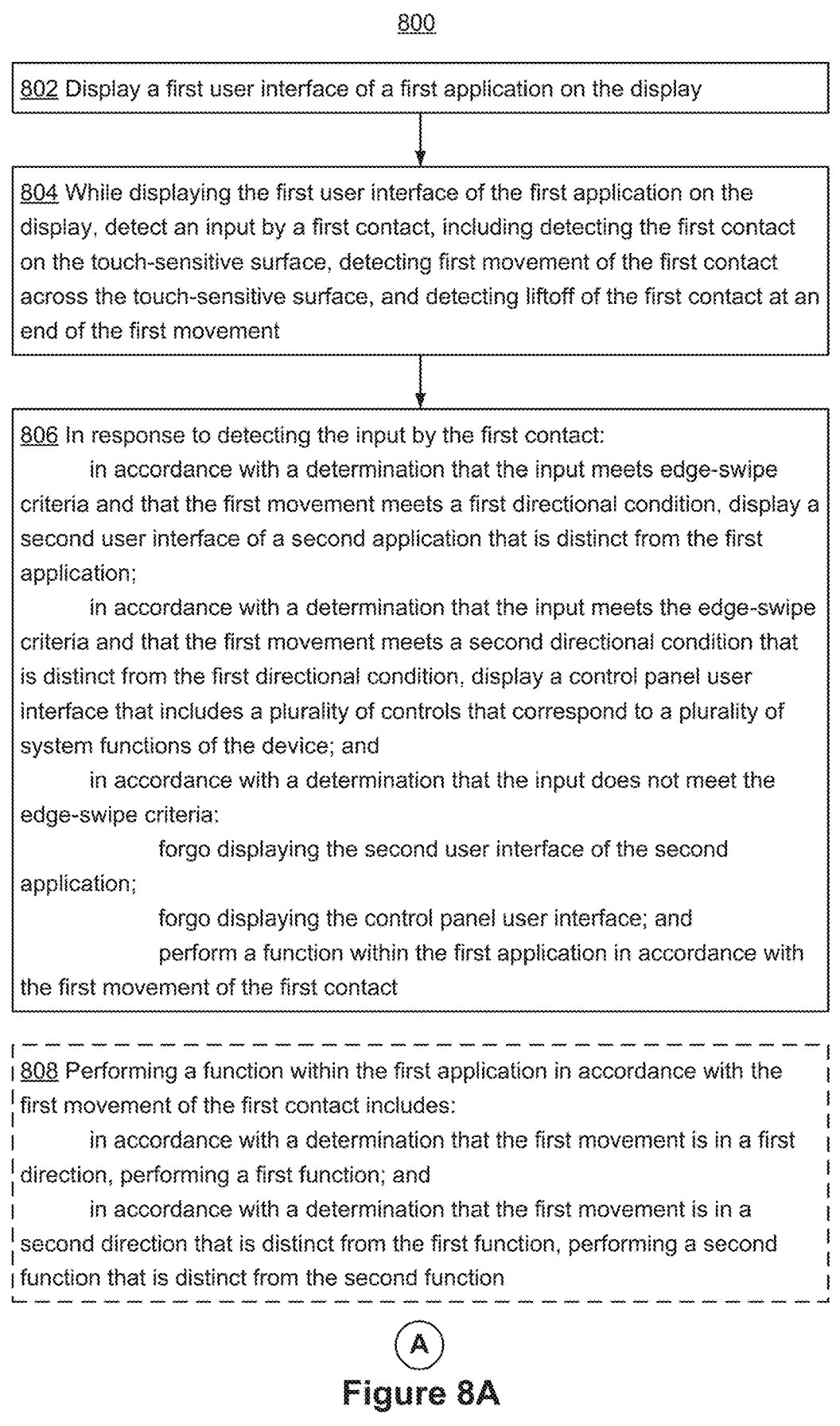

802 Display a first user interface of a first application on the display

804 While displaying the first user interface of the first application on the display, detect an input by a first contact, including detecting the first contact on the touch-sensitive surface, detecting first movement of the first contact across the touch-sensitive surface, and detecting liftoff of the first contact at an end of the first movement 806 In response to detecting the input by the first contact:

in accordance with a determination that the input meets edge-swipe criteria and that the first movement meets a first directional condition, display a second user interface of a second application that is distinct from the first application;

in accordance with a determination that the input meets the edge-swipe criteria and that the first movement meets a second directional condition that is distinct from the first directional condition, display a control panel user interface that includes a plurality of controls that correspond to a plurality of system functions of the device; and in accordance with a determination that the input does not meet the edge-swipe criteria:

forgo displaying the second user interface of the second application;

forgo displaying the control panel user interface; and perform a function within the first application in accordance with the first movement of the first contact 808 Performing a function within the first application in accordance with the first movement of the first contact includes:

in accordance with a determination that the first movement is in a first direction, performing a first function; and in accordance with a determination that the first movement is in a second direction that is distinct from the first function, performing a second function that is distinct from the second function

Figure 8B:
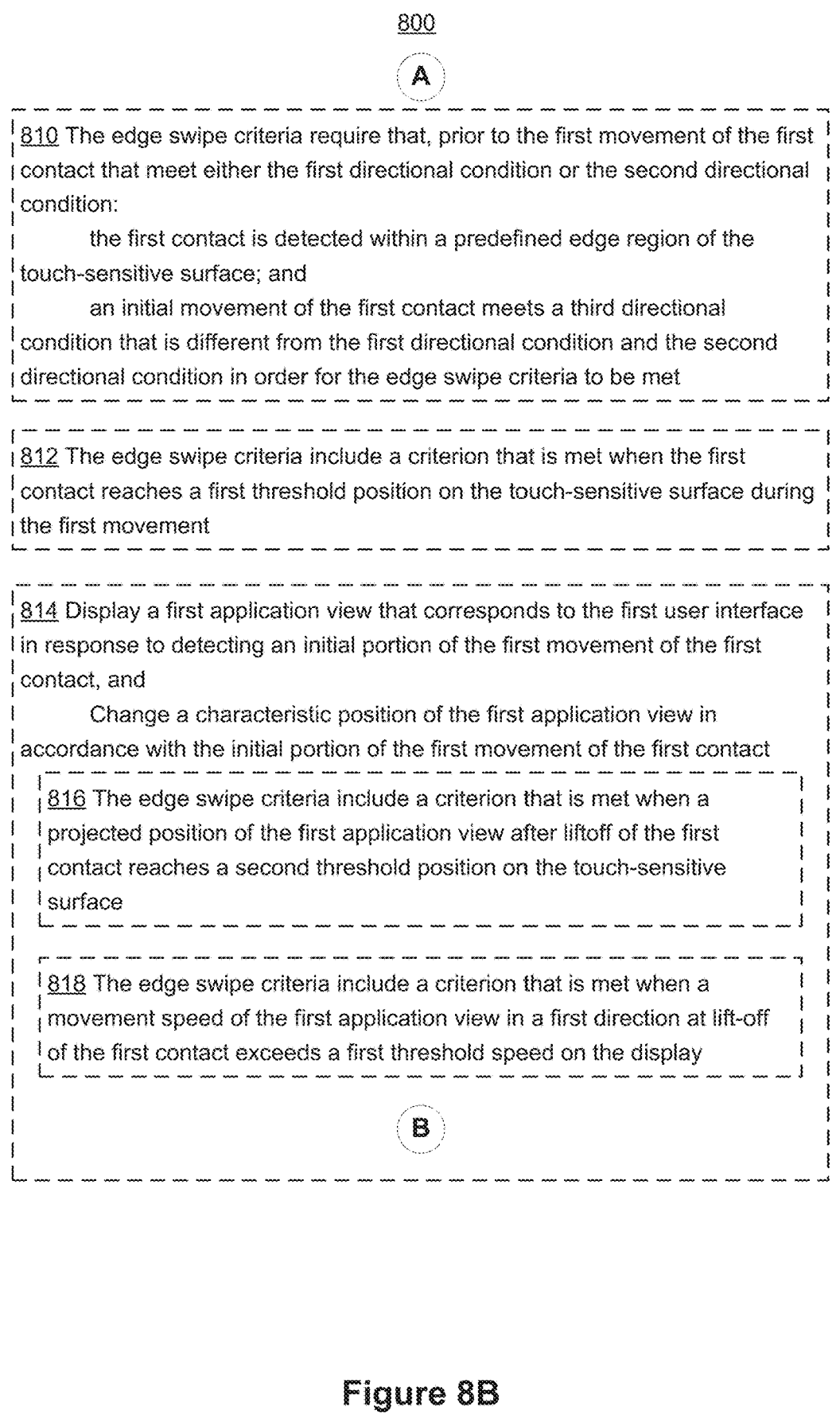

810 The edge swipe criteria require that, prior to the first movement of the first contact that meet either the first directional condition or the second directional condition:

the first contact is detected within a predefined edge region of the touch-sensitive surface; and an initial movement of the first contact meets a third directional condition that is different from the first directional condition and the second directional condition in order for the edge swipe criteria to be met 812 The edge swipe criteria include a criterion that is met when the first contact reaches a first threshold position on the touch-sensitive surface during the first movement 814 Display a first application view that corresponds to the first user interface in response to detecting an initial portion of the first movement of the first contact, and Change a characteristic position of the first application view in accordance with the initial portion of the first movement of the first contact 816 The edge swipe criteria include a criterion that is met when a projected position of the first application view after liftoff of the first contact reaches a second threshold position on the touch-sensitive surface 818 The edge swipe criteria include a criterion that is met when a movement speed of the first application view in a first direction at lift-off of the first contact exceeds a first threshold speed on the display (B)

Figure 8C:
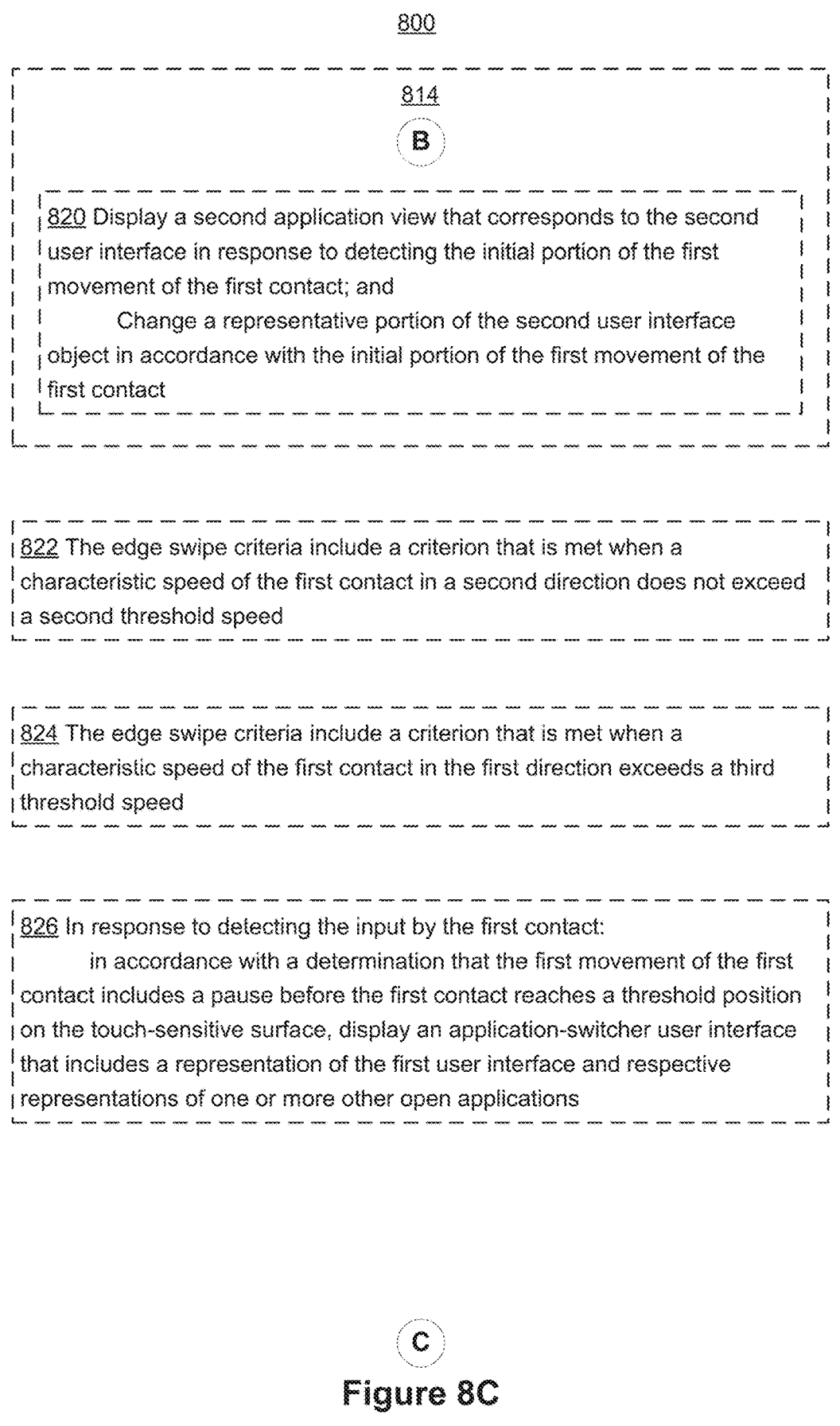

820 Display a second application view that corresponds to the second user interface in response to detecting the initial portion of the first movement of the first contact; and Change a representative portion of the second user interface object in accordance with the initial portion of the first movement of the first contact 822 The edge swipe criteria include a criterion that is met when a characteristic speed of the first contact in a second direction does not exceed a second threshold speed 824 The edge swipe criteria include a criterion that is met when a characteristic speed of the first contact in the first direction exceeds a third threshold speed 826 In response to detecting the input by the first contact:

in accordance with a determination that the first movement of the first contact includes a pause before the first contact reaches a threshold position on the touch-sensitive surface, display an application-switcher user interface that includes a representation of the first user interface and respective representations of one or more other open applications (C)

Figure 8D:
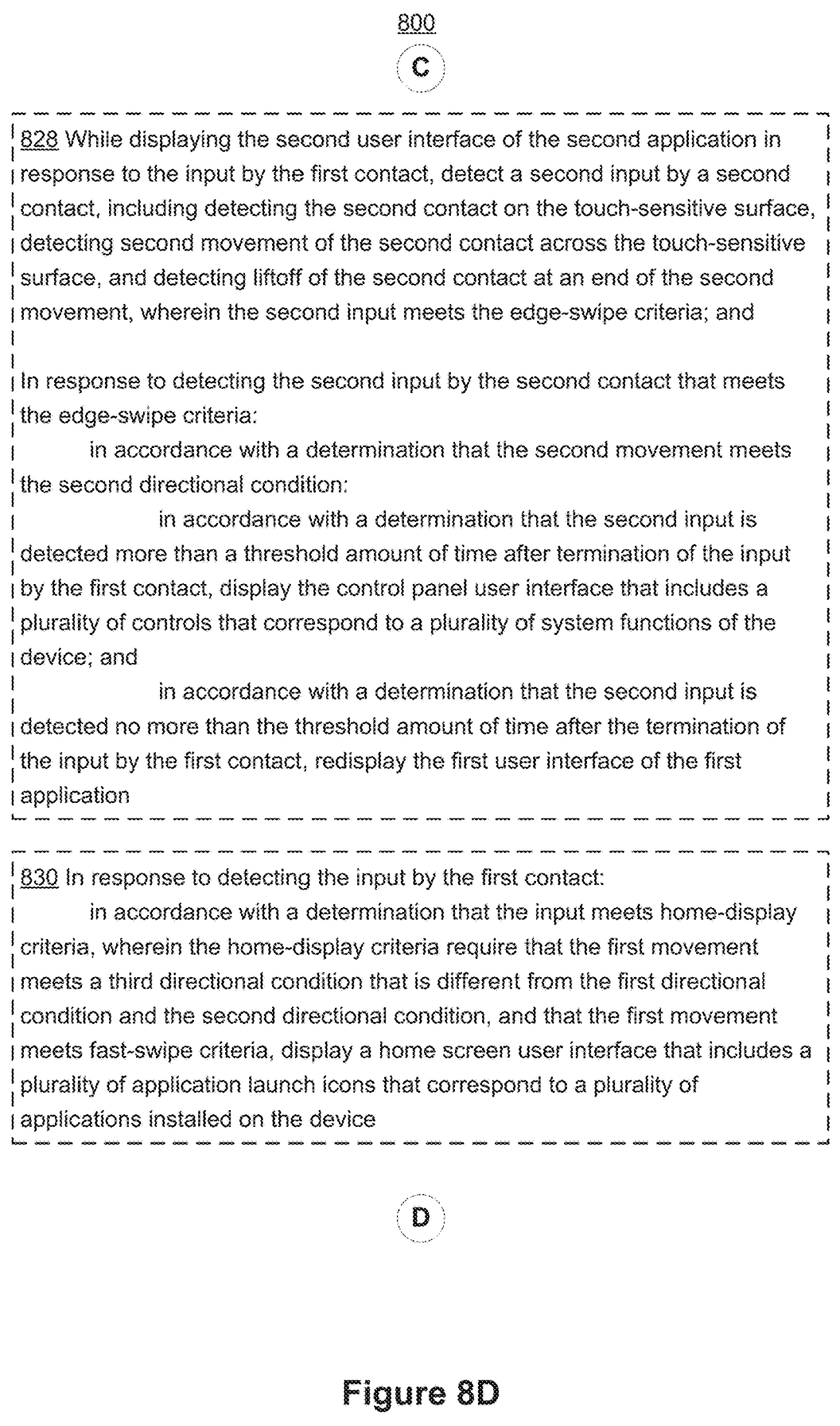

828 While displaying the second user interface of the second application in response to the input by the first contact, detect a second input by a second contact, including detecting the second contact on the touch-sensitive surface, detecting second movement of the second contact across the touch-sensitive surface, and detecting liftoff of the second contact at an end of the second movement, wherein the second input meets the edge-swipe criteria; and In response to detecting the second input by the second contact that meets the edge-swipe criteria:

in accordance with a determination that the second movement meets the second directional condition:

in accordance with a determination that the second input is detected more than a threshold amount of time after termination of the input by the first contact, display the control panel user interface that includes a plurality of controls that correspond to a plurality of system functions of the device; and in accordance with a determination that the second input is detected no more than the threshold amount of time after the termination of the input by the first contact, redisplay the first user interface of the first application 830 In response to detecting the input by the first contact:

in accordance with a determination that the input meets home-display criteria, wherein the home-display criteria require that the first movement meets a third directional condition that is different from the first directional condition and the second directional condition, and that the first movement meets fast-swipe criteria, display a home screen user interface that includes a plurality of application launch icons that correspond to a plurality of applications installed on the device

Figure 8E:
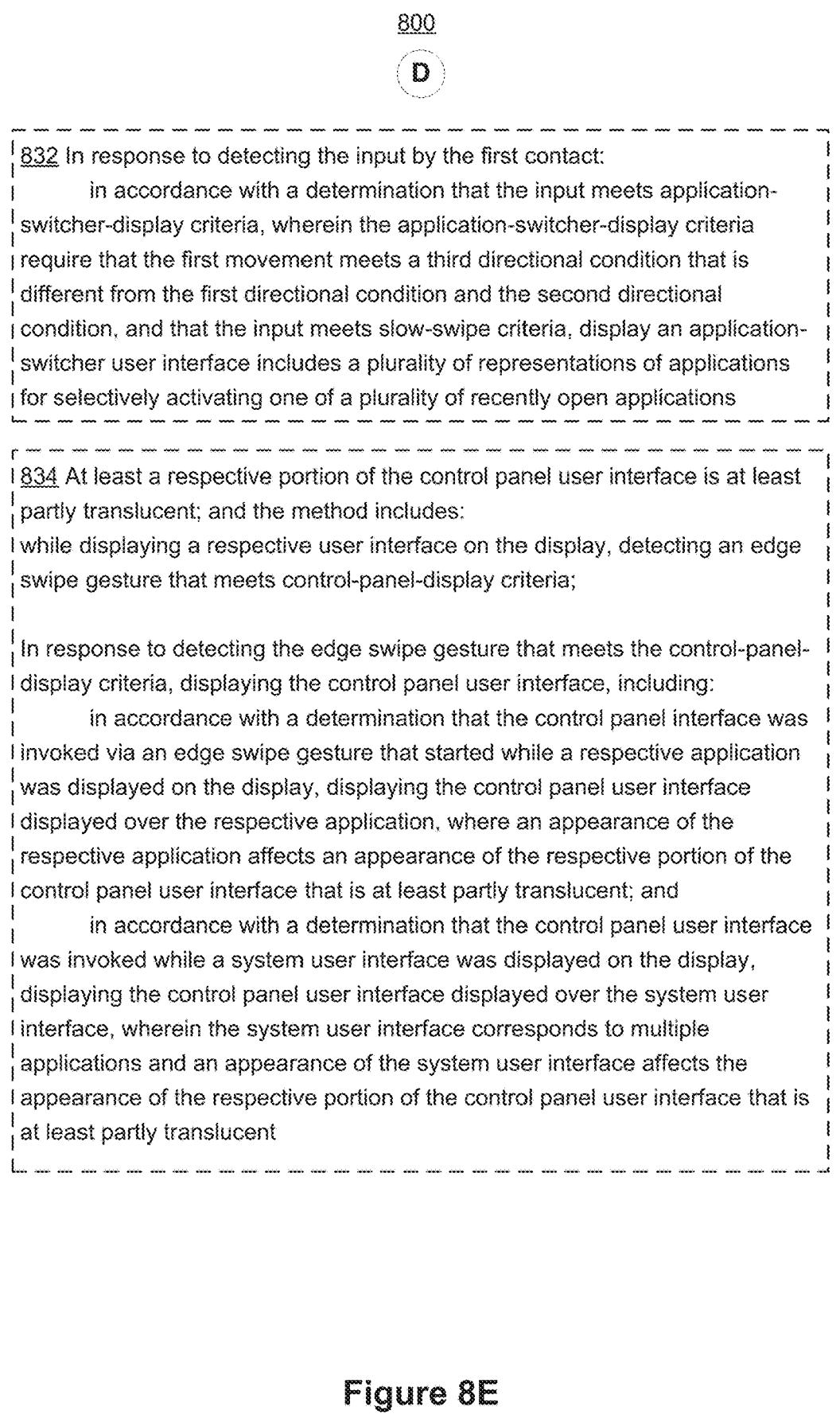

832 In response to detecting the input by the first contact:
in accordance with a determination that the input meets application-switcher-display criteria, wherein the application-switcher-display criteria require that the first movement meets a third directional condition that is different from the first directional condition and the second directional condition, and that the input meets slow-swipe criteria, display an application-switcher user interface includes a plurality of representations of applications for selectively activating one of a plurality of recently open applications 834 At least a respective portion of the control panel user interface is at least partly translucent; and the method includes:
while displaying a respective user interface on the display, detecting an edge swipe gesture that meets control-panel-display criteria;

In response to detecting the edge swipe gesture that meets the control-panel-display criteria, displaying the control panel user interface, including:
in accordance with a determination that the control panel interface was invoked via an edge swipe gesture that started while a respective application was displayed on the display, displaying the control panel user interface displayed over the respective application, where an appearance of the respective application affects an appearance of the respective portion of the control panel user interface that is at least partly translucent; and
in accordance with a determination that the control panel user interface was invoked while a system user interface was displayed on the display, displaying the control panel user interface displayed over the system user interface, wherein the system user interface corresponds to multiple applications and an appearance of the system user interface affects the appearance of the respective portion of the control panel user interface that is at least partly translucent

Figure 9A:
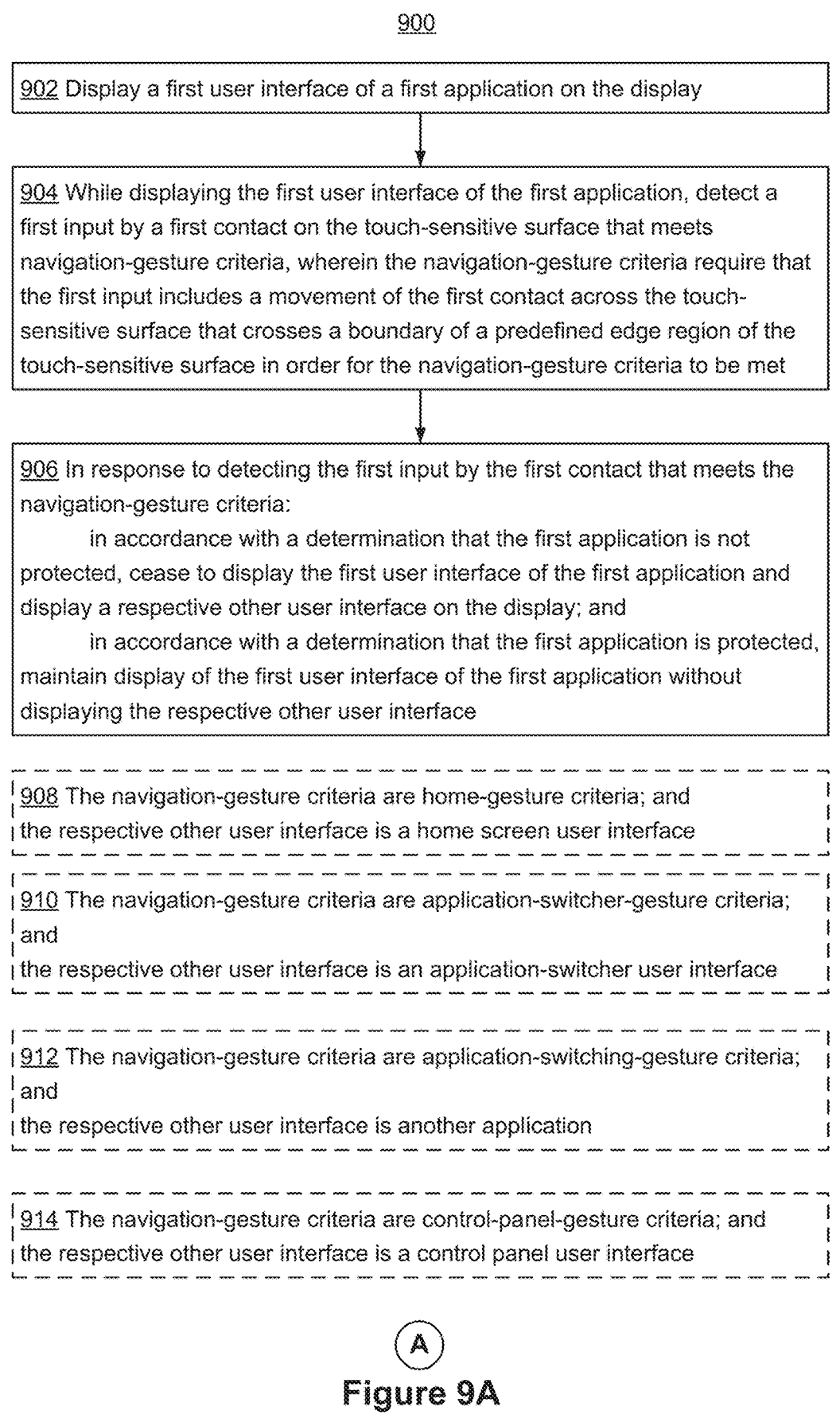

902 Display a first user interface of a first application on the display

904 While displaying the first user interface of the first application, detect a first input by a first contact on the touch-sensitive surface that meets navigation-gesture criteria, wherein the navigation-gesture criteria require that the first input includes a movement of the first contact across the touch-sensitive surface that crosses a boundary of a predefined edge region of the touch-sensitive surface in order for the navigation-gesture criteria to be met 906 In response to detecting the first input by the first contact that meets the navigation-gesture criteria:

in accordance with a determination that the first application is not protected, cease to display the first user interface of the first application and display a respective other user interface on the display; and in accordance with a determination that the first application is protected, maintain display of the first user interface of the first application without displaying the respective other user interface 908 The navigation-gesture criteria are home-gesture criteria; and
the respective other user interface is a home screen user interface 910 The navigation-gesture criteria are application-switcher-gesture criteria; and
the respective other user interface is an application-switcher user interface 912 The navigation-gesture criteria are application-switching-gesture criteria; and
the respective other user interface is another application 914 The navigation-gesture criteria are control-panel-gesture criteria; and
the respective other user interface is a control panel user interface

Figure 9B:
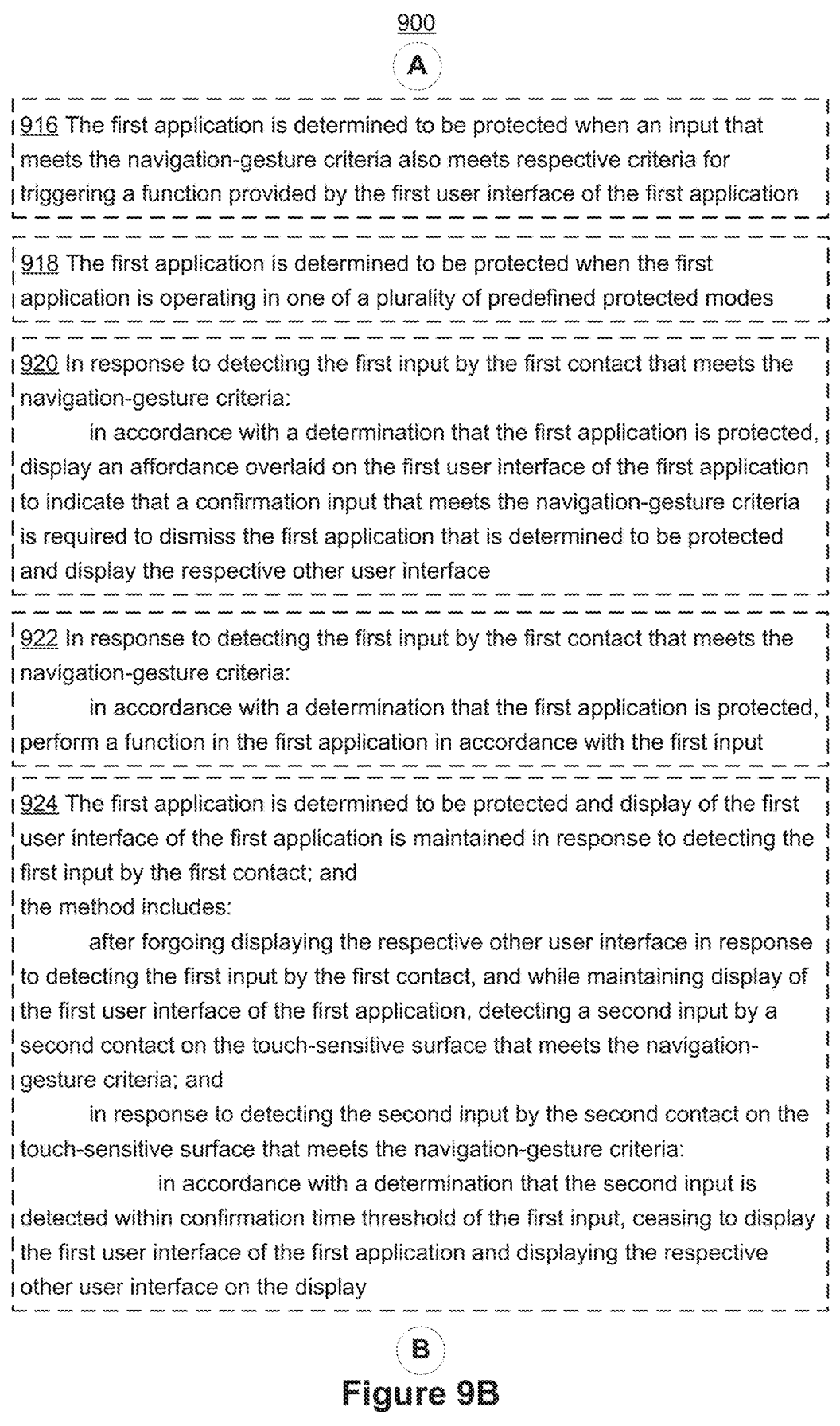

916 The first application is determined to be protected when an input that meets the navigation-gesture criteria also meets respective criteria for triggering a function provided by the first user interface of the first application 918 The first application is determined to be protected when the first application is operating in one of a plurality of predefined protected modes 920 In response to detecting the first input by the first contact that meets the navigation-gesture criteria:

in accordance with a determination that the first application is protected, display an affordance overlaid on the first user interface of the first application to indicate that a confirmation input that meets the navigation-gesture criteria is required to dismiss the first application that is determined to be protected and display the respective other user interface 922 In response to detecting the first input by the first contact that meets the navigation-gesture criteria:

in accordance with a determination that the first application is protected, perform a function in the first application in accordance with the first input 924 The first application is determined to be protected and display of the first user interface of the first application is maintained in response to detecting the first input by the first contact; and
the method includes:

after forgoing displaying the respective other user interface in response to detecting the first input by the first contact, and while maintaining display of the first user interface of the first application, detecting a second input by a second contact on the touch-sensitive surface that meets the navigation-gesture criteria; and in response to detecting the second input by the second contact on the touch-sensitive surface that meets the navigation-gesture criteria:

in accordance with a determination that the second input is detected within confirmation time threshold of the first input, ceasing to display the first user interface of the first application and displaying the respective other user interface on the display

Figure 9C:
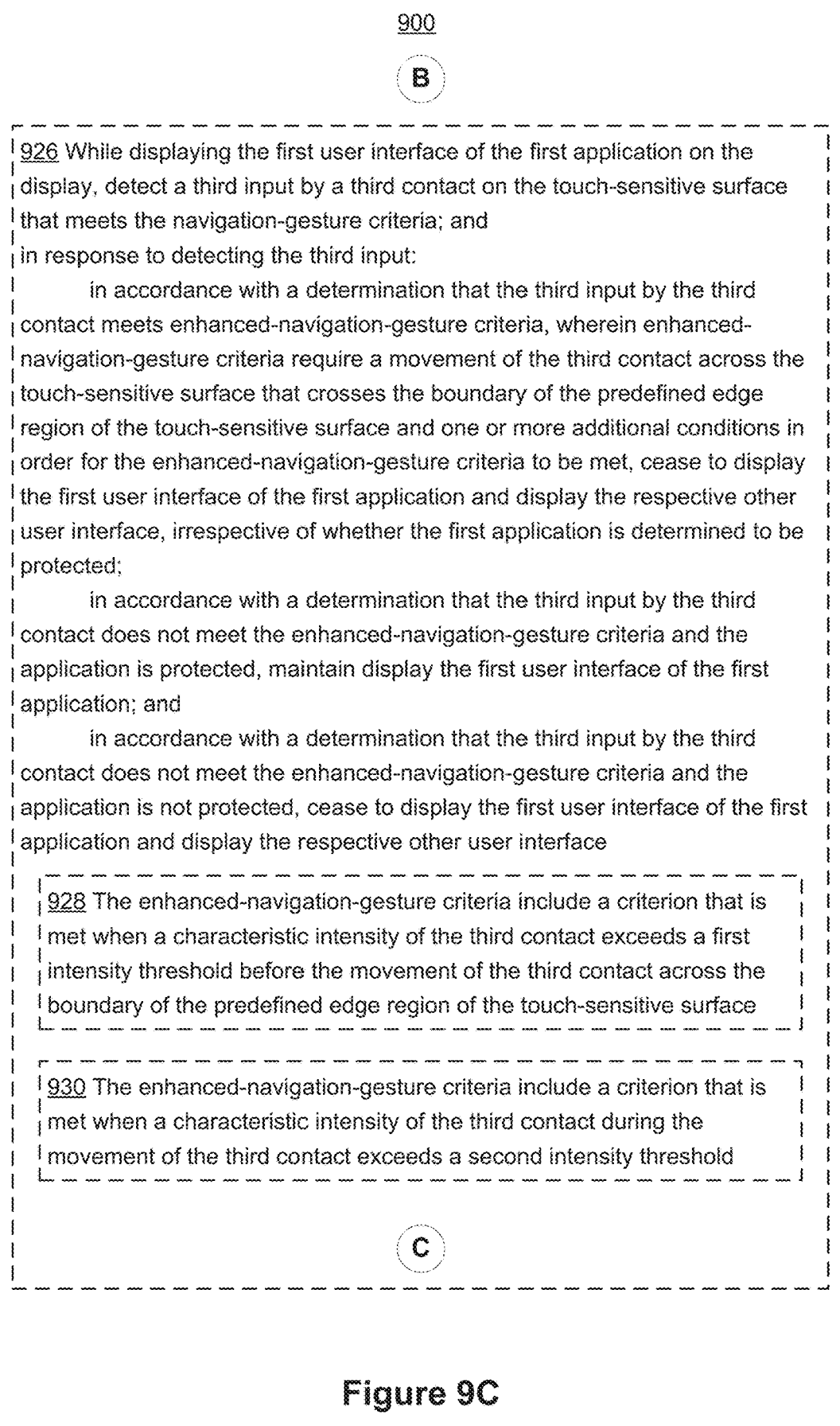

926 While displaying the first user interface of the first application on the display, detect a third input by a third contact on the touch-sensitive surface that meets the navigation-gesture criteria; and
in response to detecting the third input:
in accordance with a determination that the third input by the third contact meets enhanced-navigation-gesture criteria, wherein enhanced-navigation-gesture criteria require a movement of the third contact across the touch-sensitive surface that crosses the boundary of the predefined edge region of the touch-sensitive surface and one or more additional conditions in order for the enhanced-navigation-gesture criteria to be met, cease to display the first user interface of the first application and display the respective other user interface, irrespective of whether the first application is determined to be protected;
in accordance with a determination that the third input by the third contact does not meet the enhanced-navigation-gesture criteria and the application is protected, maintain display the first user interface of the first application; and
in accordance with a determination that the third input by the third contact does not meet the enhanced-navigation-gesture criteria and the application is not protected, cease to display the first user interface of the first application and display the respective other user interface 928 The enhanced-navigation-gesture criteria include a criterion that is met when a characteristic intensity of the third contact exceeds a first intensity threshold before the movement of the third contact across the boundary of the predefined edge region of the touch-sensitive surface 930 The enhanced-navigation-gesture criteria include a criterion that is met when a characteristic intensity of the third contact during the movement of the third contact exceeds a second intensity threshold

Figure 9D:
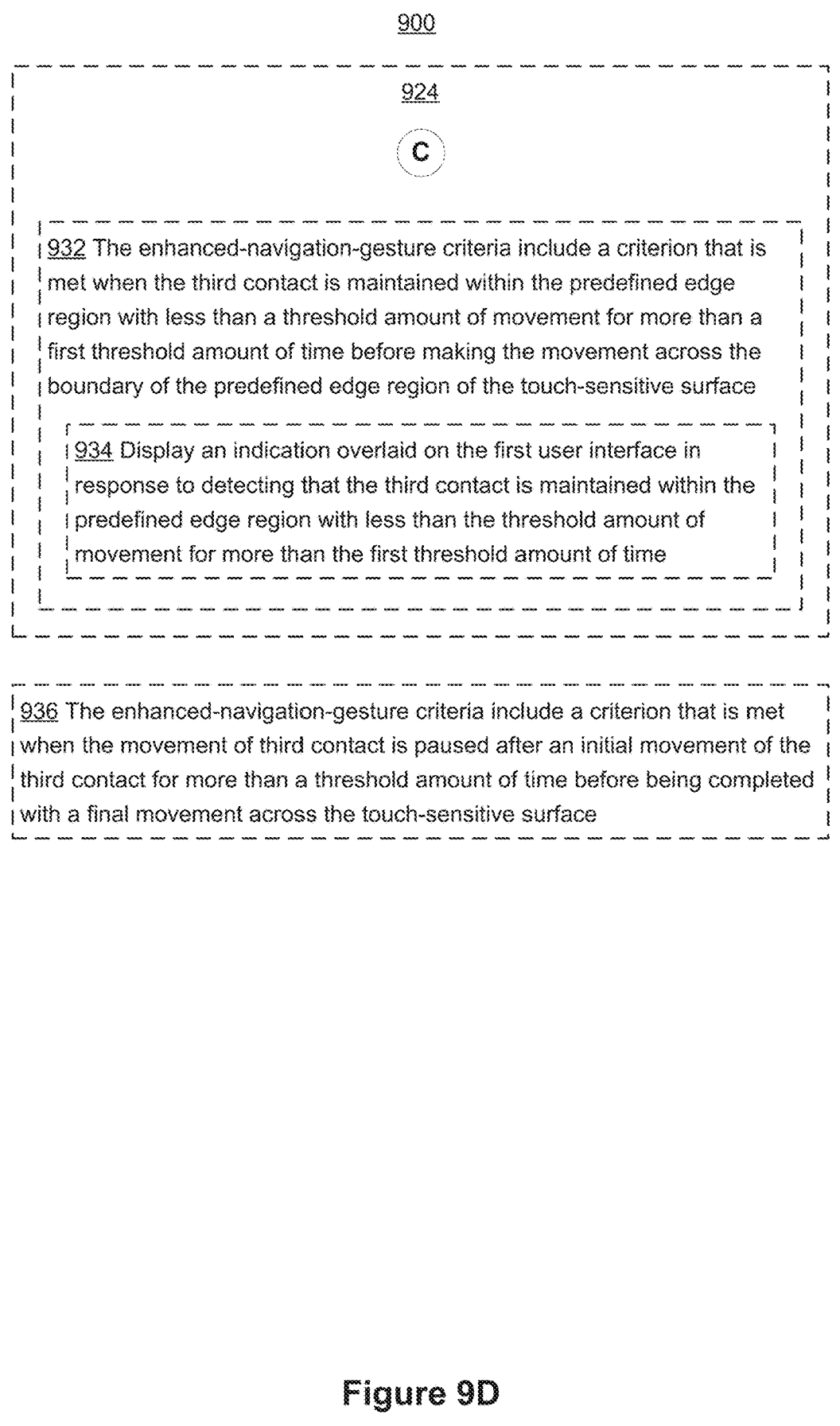

932 The enhanced-navigation-gesture criteria include a criterion that is met when the third contact is maintained within the predefined edge region with less than a threshold amount of movement for more than a first threshold amount of time before making the movement across the boundary of the predefined edge region of the touch-sensitive surface 934 Display an indication overlaid on the first user interface in response to detecting that the third contact is maintained within the predefined edge region with less than the threshold amount of movement for more than the first threshold amount of time 936 The enhanced-navigation-gesture criteria include a criterion that is met when the movement of third contact is paused after an initial movement of the third contact for more than a threshold amount of time before being completed with a final movement across the touch-sensitive surface

Figure 11A:
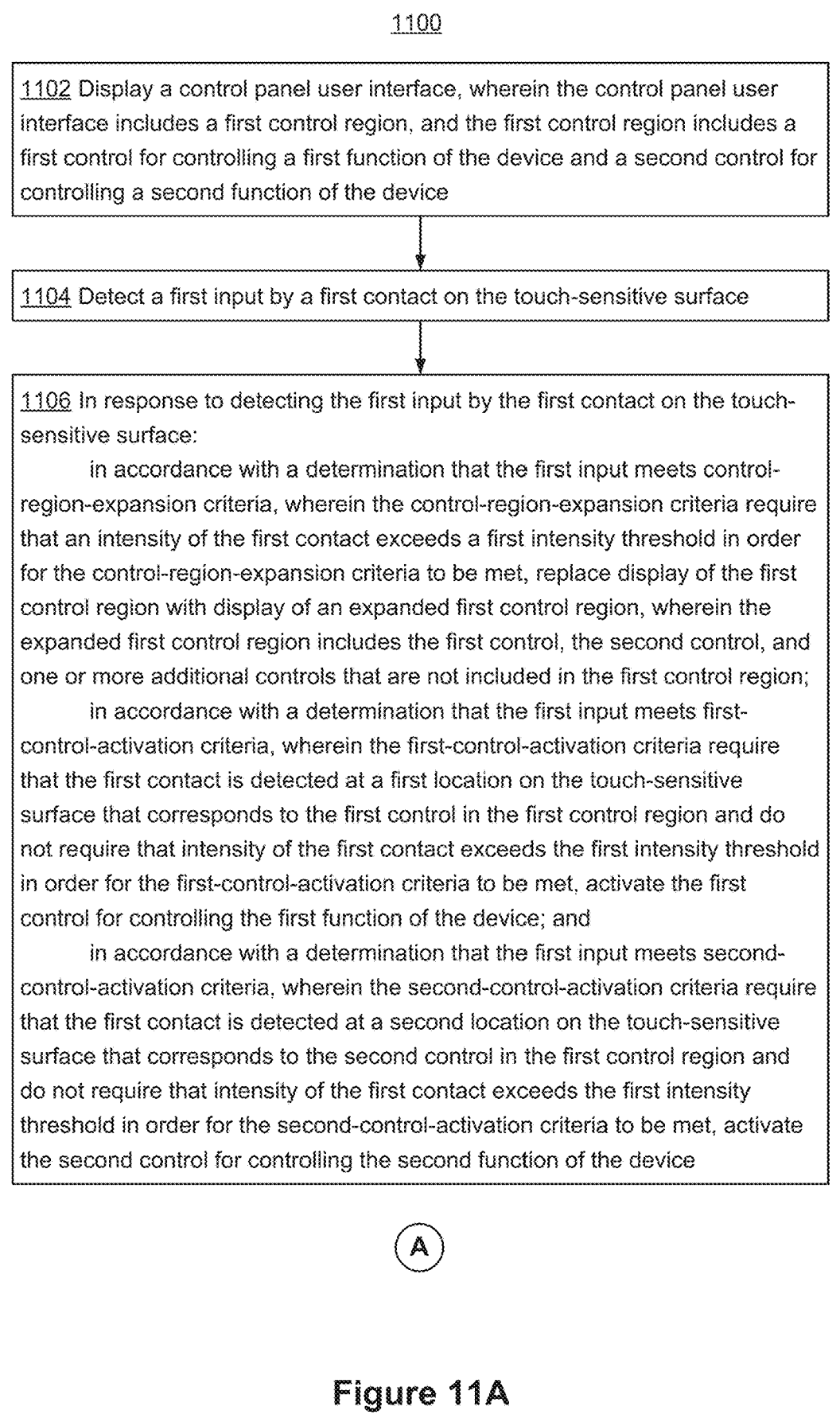

1102 Display a control panel user interface, wherein the control panel user interface includes a first control region, and the first control region includes a first control for controlling a first function of the device and a second control for controlling a second function of the device

↓

1104 Detect a first input by a first contact on the touch-sensitive surface

↓

1106 In response to detecting the first input by the first contact on the touch-sensitive surface:

in accordance with a determination that the first input meets control-region-expansion criteria, wherein the control-region-expansion criteria require that an intensity of the first contact exceeds a first intensity threshold in order for the control-region-expansion criteria to be met, replace display of the first control region with display of an expanded first control region, wherein the expanded first control region includes the first control, the second control, and one or more additional controls that are not included in the first control region;

in accordance with a determination that the first input meets first-control-activation criteria, wherein the first-control-activation criteria require that the first contact is detected at a first location on the touch-sensitive surface that corresponds to the first control in the first control region and do not require that intensity of the first contact exceeds the first intensity threshold in order for the first-control-activation criteria to be met, activate the first control for controlling the first function of the device; and in accordance with a determination that the first input meets second-control-activation criteria, wherein the second-control-activation criteria require that the first contact is detected at a second location on the touch-sensitive surface that corresponds to the second control in the first control region and do not require that intensity of the first contact exceeds the first intensity threshold in order for the second-control-activation criteria to be met, activate the second control for controlling the second function of the device

Figure 11B:
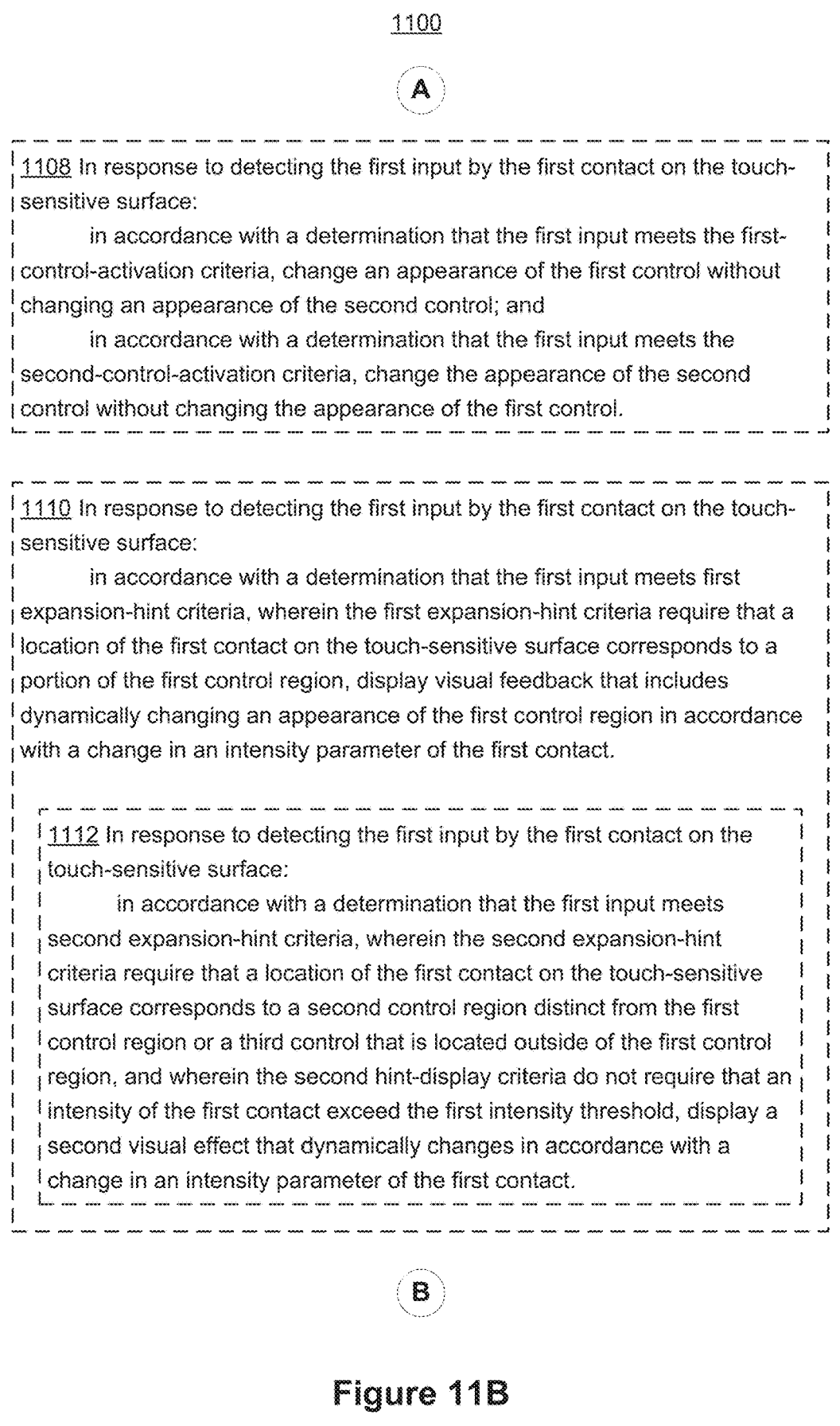

1108 In response to detecting the first input by the first contact on the touch-sensitive surface:

in accordance with a determination that the first input meets the first-control-activation criteria, change an appearance of the first control without changing an appearance of the second control; and in accordance with a determination that the first input meets the second-control-activation criteria, change the appearance of the second control without changing the appearance of the first control.

1110 In response to detecting the first input by the first contact on the touch-sensitive surface:

in accordance with a determination that the first input meets first expansion-hint criteria, wherein the first expansion-hint criteria require that a location of the first contact on the touch-sensitive surface corresponds to a portion of the first control region, display visual feedback that includes dynamically changing an appearance of the first control region in accordance with a change in an intensity parameter of the first contact.

1112 In response to detecting the first input by the first contact on the touch-sensitive surface:

in accordance with a determination that the first input meets second expansion-hint criteria, wherein the second expansion-hint criteria require that a location of the first contact on the touch-sensitive surface corresponds to a second control region distinct from the first control region or a third control that is located outside of the first control region, and wherein the second hint-display criteria do not require that an intensity of the first contact exceed the first intensity threshold, display a second visual effect that dynamically changes in accordance with a change in an intensity parameter of the first contact.

Figure 11C:
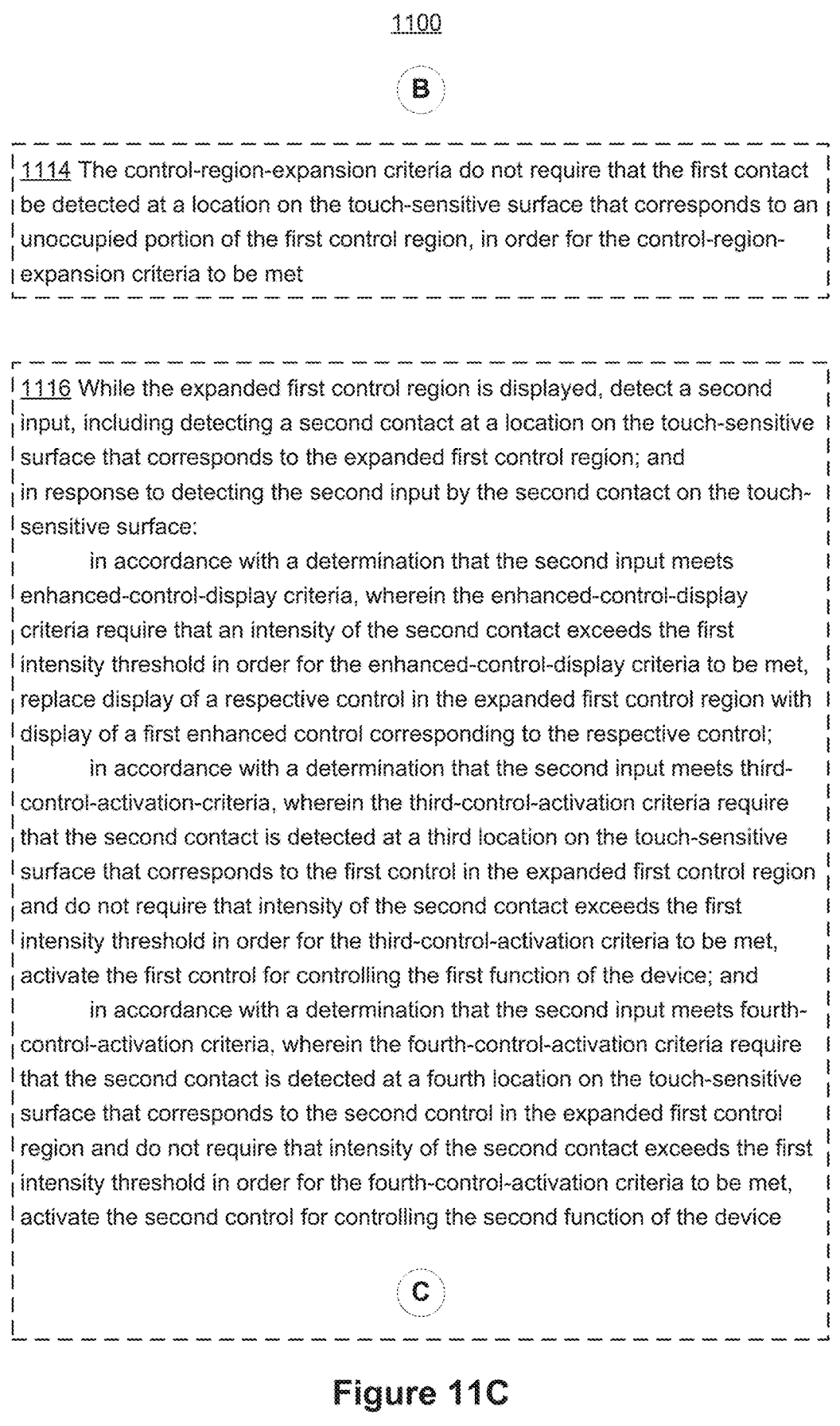

1114 The control-region-expansion criteria do not require that the first contact be detected at a location on the touch-sensitive surface that corresponds to an unoccupied portion of the first control region, in order for the control-region-expansion criteria to be met 1116 While the expanded first control region is displayed, detect a second input, including detecting a second contact at a location on the touch-sensitive surface that corresponds to the expanded first control region; and
in response to detecting the second input by the second contact on the touch-sensitive surface:

in accordance with a determination that the second input meets enhanced-control-display criteria, wherein the enhanced-control-display criteria require that an intensity of the second contact exceeds the first intensity threshold in order for the enhanced-control-display criteria to be met, replace display of a respective control in the expanded first control region with display of a first enhanced control corresponding to the respective control;

in accordance with a determination that the second input meets third-control-activation-criteria, wherein the third-control-activation criteria require that the second contact is detected at a third location on the touch-sensitive surface that corresponds to the first control in the expanded first control region and do not require that intensity of the second contact exceeds the first intensity threshold in order for the third-control-activation criteria to be met, activate the first control for controlling the first function of the device; and in accordance with a determination that the second input meets fourth-control-activation criteria, wherein the fourth-control-activation criteria require that the second contact is detected at a fourth location on the touch-sensitive surface that corresponds to the second control in the expanded first control region and do not require that intensity of the second contact exceeds the first intensity threshold in order for the fourth-control-activation criteria to be met, activate the second control for controlling the second function of the device

Figure 11D:
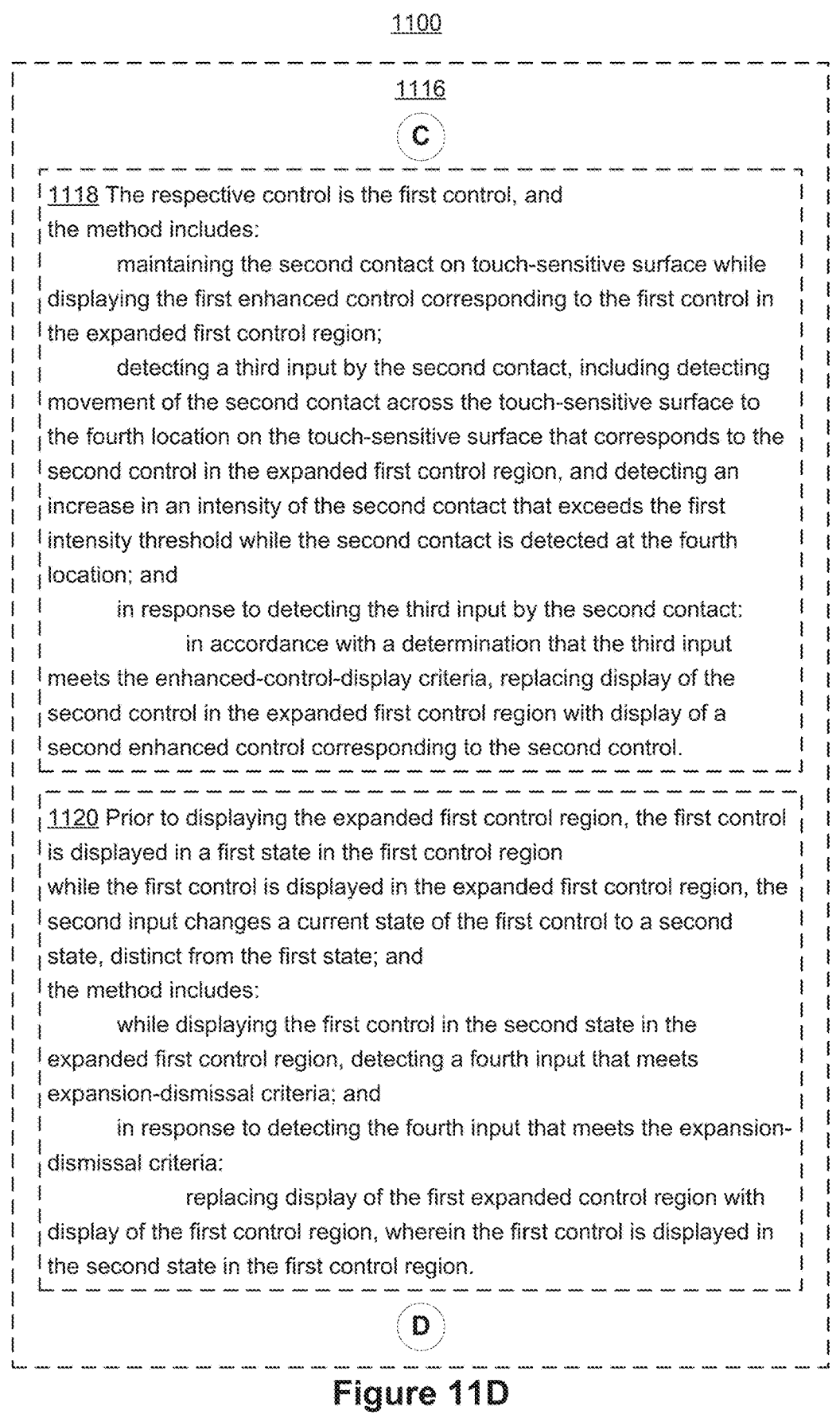

1118 The respective control is the first control, and the method includes:

maintaining the second contact on touch-sensitive surface while displaying the first enhanced control corresponding to the first control in the expanded first control region;

detecting a third input by the second contact, including detecting movement of the second contact across the touch-sensitive surface to the fourth location on the touch-sensitive surface that corresponds to the second control in the expanded first control region, and detecting an increase in an intensity of the second contact that exceeds the first intensity threshold while the second contact is detected at the fourth location; and in response to detecting the third input by the second contact:

in accordance with a determination that the third input meets the enhanced-control-display criteria, replacing display of the second control in the expanded first control region with display of a second enhanced control corresponding to the second control.

1120 Prior to displaying the expanded first control region, the first control is displayed in a first state in the first control region while the first control is displayed in the expanded first control region, the second input changes a current state of the first control to a second state, distinct from the first state; and the method includes:

while displaying the first control in the second state in the expanded first control region, detecting a fourth input that meets expansion-dismissal criteria; and in response to detecting the fourth input that meets the expansion-dismissal criteria:

replacing display of the first expanded control region with display of the first control region, wherein the first control is displayed in the second state in the first control region.

Figure 11E:
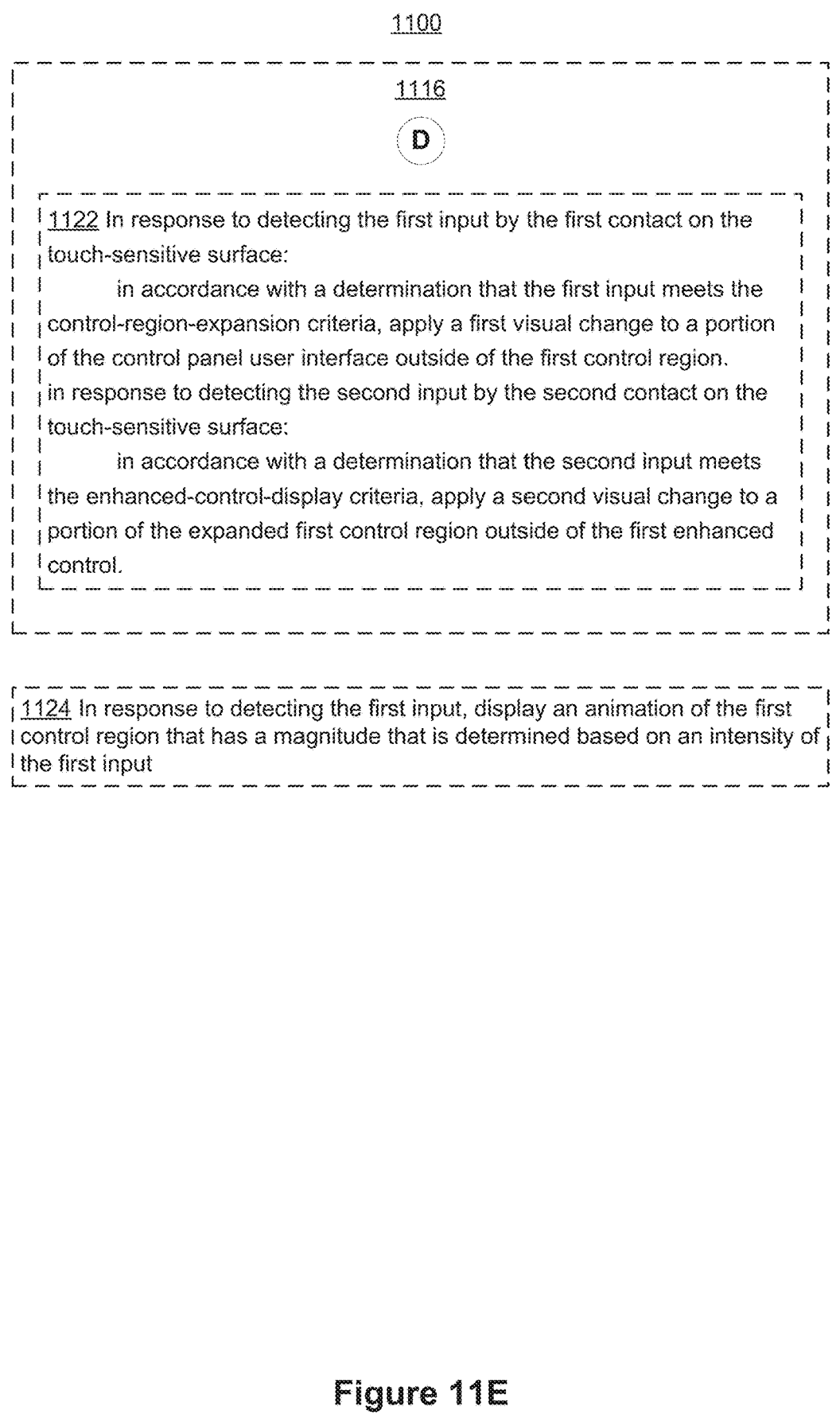

1122 In response to detecting the first input by the first contact on the touch-sensitive surface:

in accordance with a determination that the first input meets the control-region-expansion criteria, apply a first visual change to a portion of the control panel user interface outside of the first control region.

in response to detecting the second input by the second contact on the touch-sensitive surface:

in accordance with a determination that the second input meets the enhanced-control-display criteria, apply a second visual change to a portion of the expanded first control region outside of the first enhanced control.

1124 In response to detecting the first input, display an animation of the first control region that has a magnitude that is determined based on an intensity of the first input

Figure 12A:
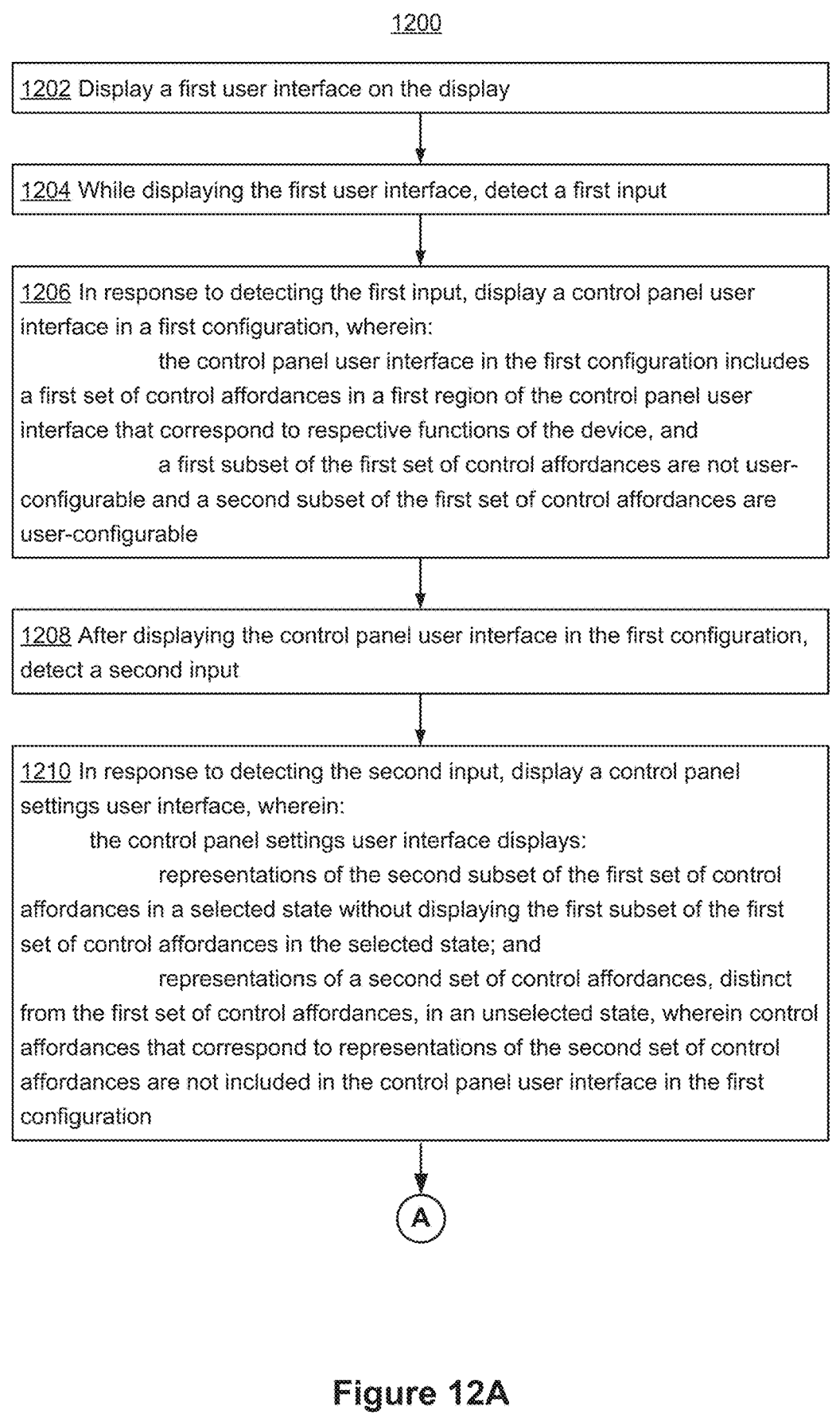

1202 Display a first user interface on the display

1204 While displaying the first user interface, detect a first input

1206 In response to detecting the first input, display a control panel user interface in a first configuration, wherein:

the control panel user interface in the first configuration includes a first set of control affordances in a first region of the control panel user interface that correspond to respective functions of the device, and a first subset of the first set of control affordances are not user-configurable and a second subset of the first set of control affordances are user-configurable 1208 After displaying the control panel user interface in the first configuration, detect a second input 1210 In response to detecting the second input, display a control panel settings user interface, wherein:

the control panel settings user interface displays:

representations of the second subset of the first set of control affordances in a selected state without displaying the first subset of the first set of control affordances in the selected state; and representations of a second set of control affordances, distinct from the first set of control affordances, in an unselected state, wherein control affordances that correspond to representations of the second set of control affordances are not included in the control panel user interface in the first configuration

Figure 12B:
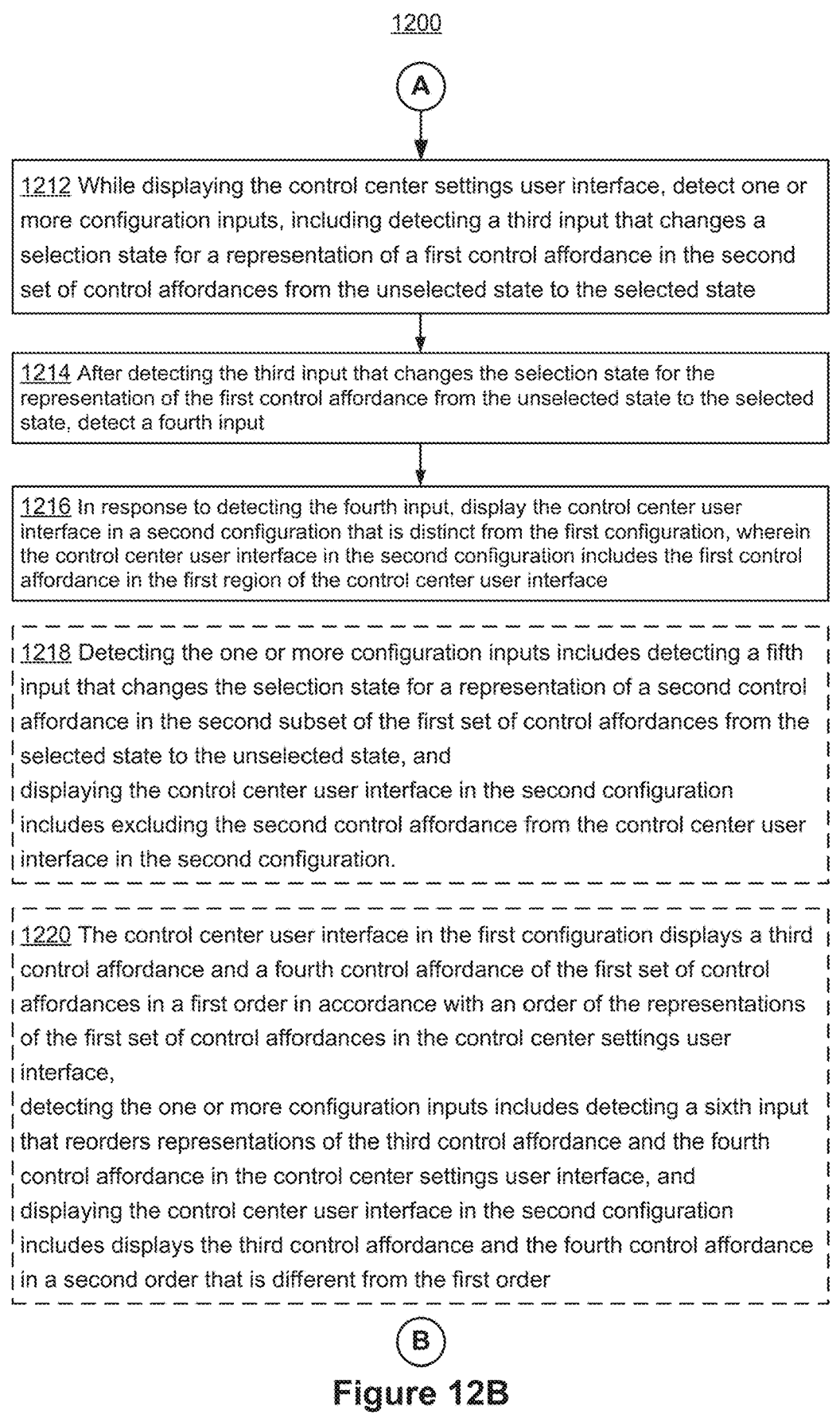

1212 While displaying the control center settings user interface, detect one or more configuration inputs, including detecting a third input that changes a selection state for a representation of a first control affordance in the second set of control affordances from the unselected state to the selected state 1214 After detecting the third input that changes the selection state for the representation of the first control affordance from the unselected state to the selected state, detect a fourth input 1216 In response to detecting the fourth input, display the control center user interface in a second configuration that is distinct from the first configuration, wherein the control center user interface in the second configuration includes the first control affordance in the first region of the control center user interface 1218 Detecting the one or more configuration inputs includes detecting a fifth input that changes the selection state for a representation of a second control affordance in the second subset of the first set of control affordances from the selected state to the unselected state, and
displaying the control center user interface in the second configuration includes excluding the second control affordance from the control center user interface in the second configuration.

1220 The control center user interface in the first configuration displays a third control affordance and a fourth control affordance of the first set of control affordances in a first order in accordance with an order of the representations of the first set of control affordances in the control center settings user interface,
detecting the one or more configuration inputs includes detecting a sixth input that reorders representations of the third control affordance and the fourth control affordance in the control center settings user interface, and
displaying the control center user interface in the second configuration includes displays the third control affordance and the fourth control affordance in a second order that is different from the first order

Figure 12C:
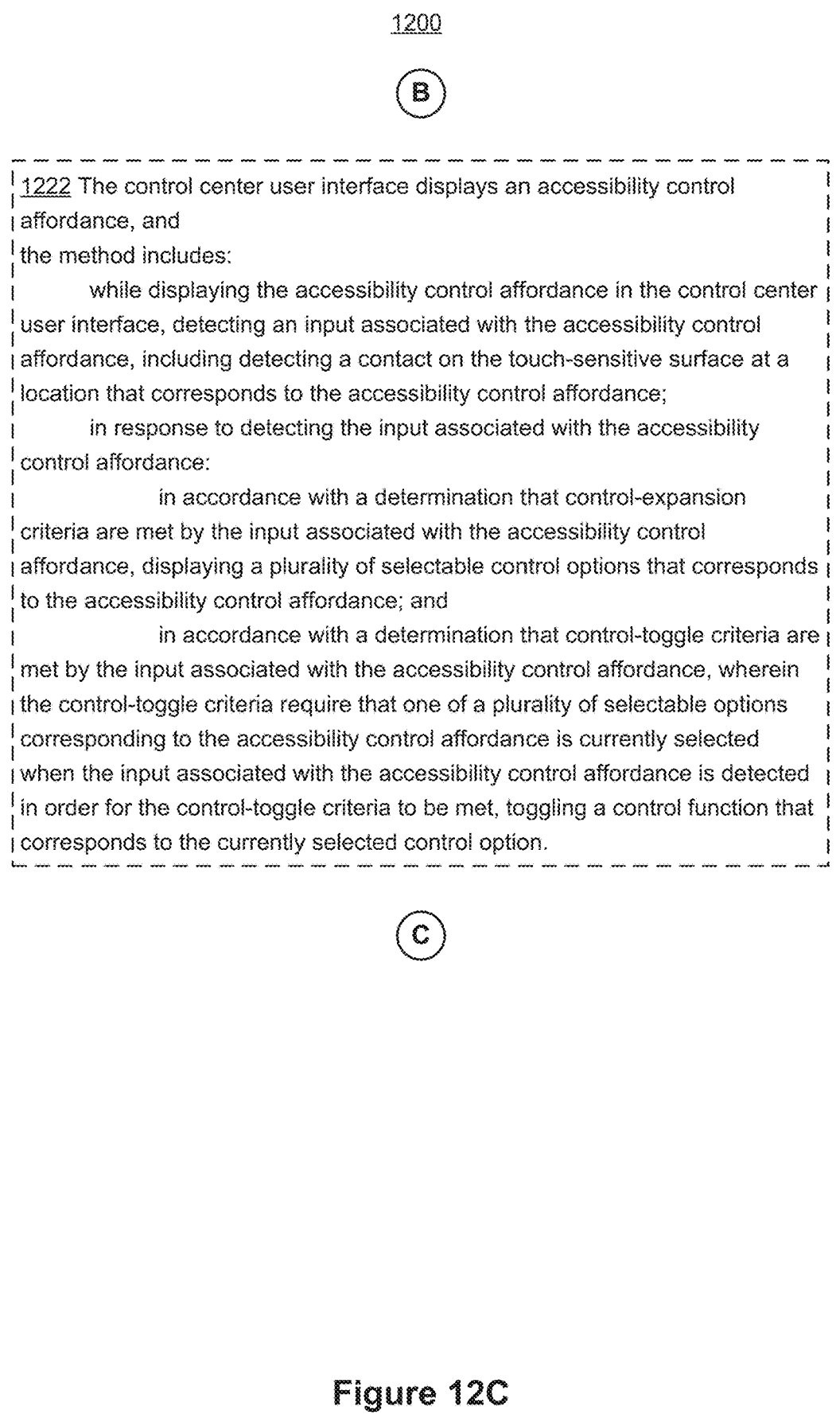

1222 The control center user interface displays an accessibility control affordance, and
the method includes:

while displaying the accessibility control affordance in the control center user interface, detecting an input associated with the accessibility control affordance, including detecting a contact on the touch-sensitive surface at a location that corresponds to the accessibility control affordance;

in response to detecting the input associated with the accessibility control affordance:

in accordance with a determination that control-expansion criteria are met by the input associated with the accessibility control affordance, displaying a plurality of selectable control options that corresponds to the accessibility control affordance; and in accordance with a determination that control-toggle criteria are met by the input associated with the accessibility control affordance, wherein the control-toggle criteria require that one of a plurality of selectable options corresponding to the accessibility control affordance is currently selected when the input associated with the accessibility control affordance is detected in order for the control-toggle criteria to be met, toggling a control function that corresponds to the currently selected control option.

Figure 12D:
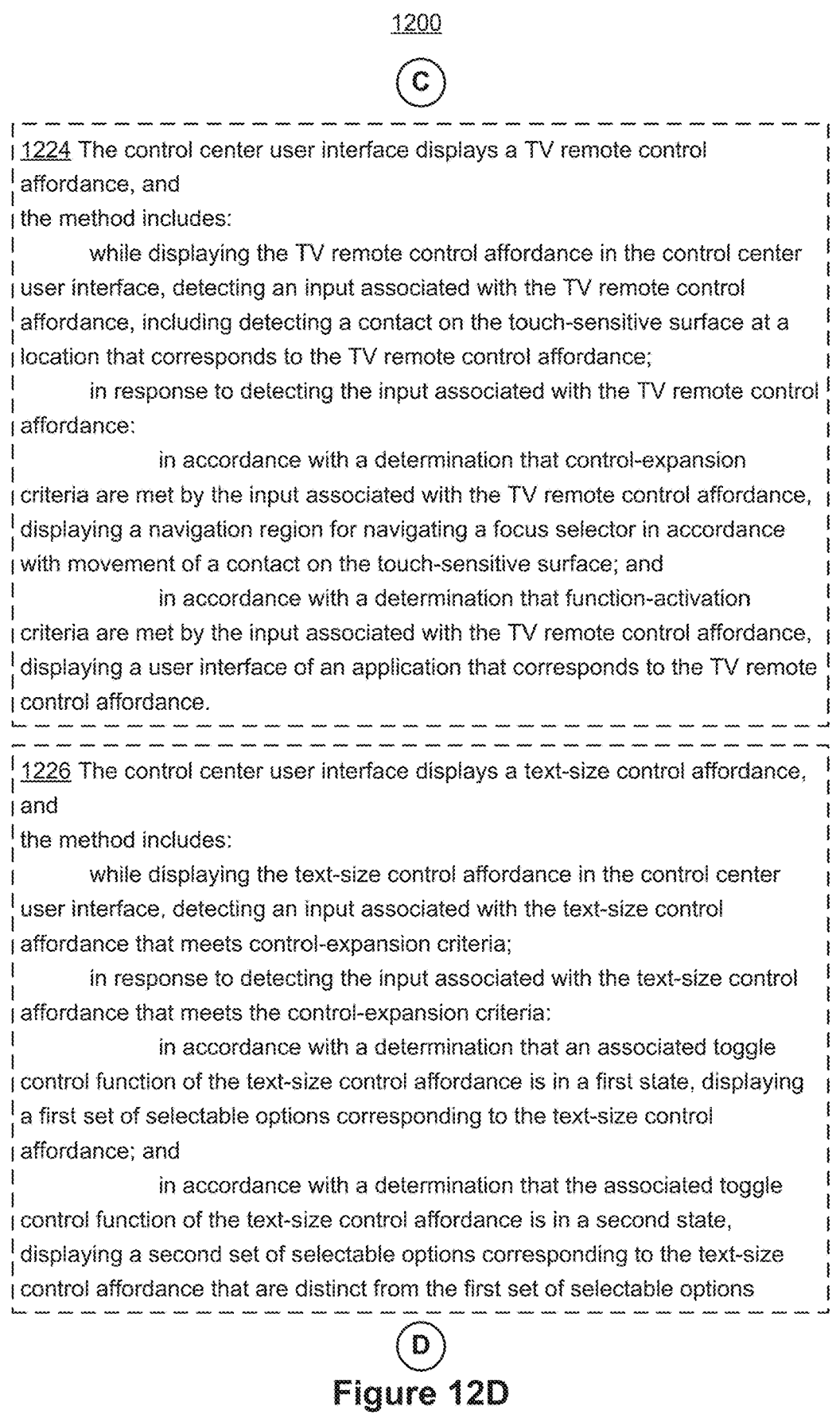

1224 The control center user interface displays a TV remote control affordance, and
the method includes:
while displaying the TV remote control affordance in the control center user interface, detecting an input associated with the TV remote control affordance, including detecting a contact on the touch-sensitive surface at a location that corresponds to the TV remote control affordance;
in response to detecting the input associated with the TV remote control affordance:
in accordance with a determination that control-expansion criteria are met by the input associated with the TV remote control affordance, displaying a navigation region for navigating a focus selector in accordance with movement of a contact on the touch-sensitive surface; and
in accordance with a determination that function-activation criteria are met by the input associated with the TV remote control affordance, displaying a user interface of an application that corresponds to the TV remote control affordance.

1226 The control center user interface displays a text-size control affordance, and
the method includes:
while displaying the text-size control affordance in the control center user interface, detecting an input associated with the text-size control affordance that meets control-expansion criteria;
in response to detecting the input associated with the text-size control affordance that meets the control-expansion criteria:
in accordance with a determination that an associated toggle control function of the text-size control affordance is in a first state, displaying a first set of selectable options corresponding to the text-size control affordance; and
in accordance with a determination that the associated toggle control function of the text-size control affordance is in a second state, displaying a second set of selectable options corresponding to the text-size control affordance that are distinct from the first set of selectable options

Figure 12E:
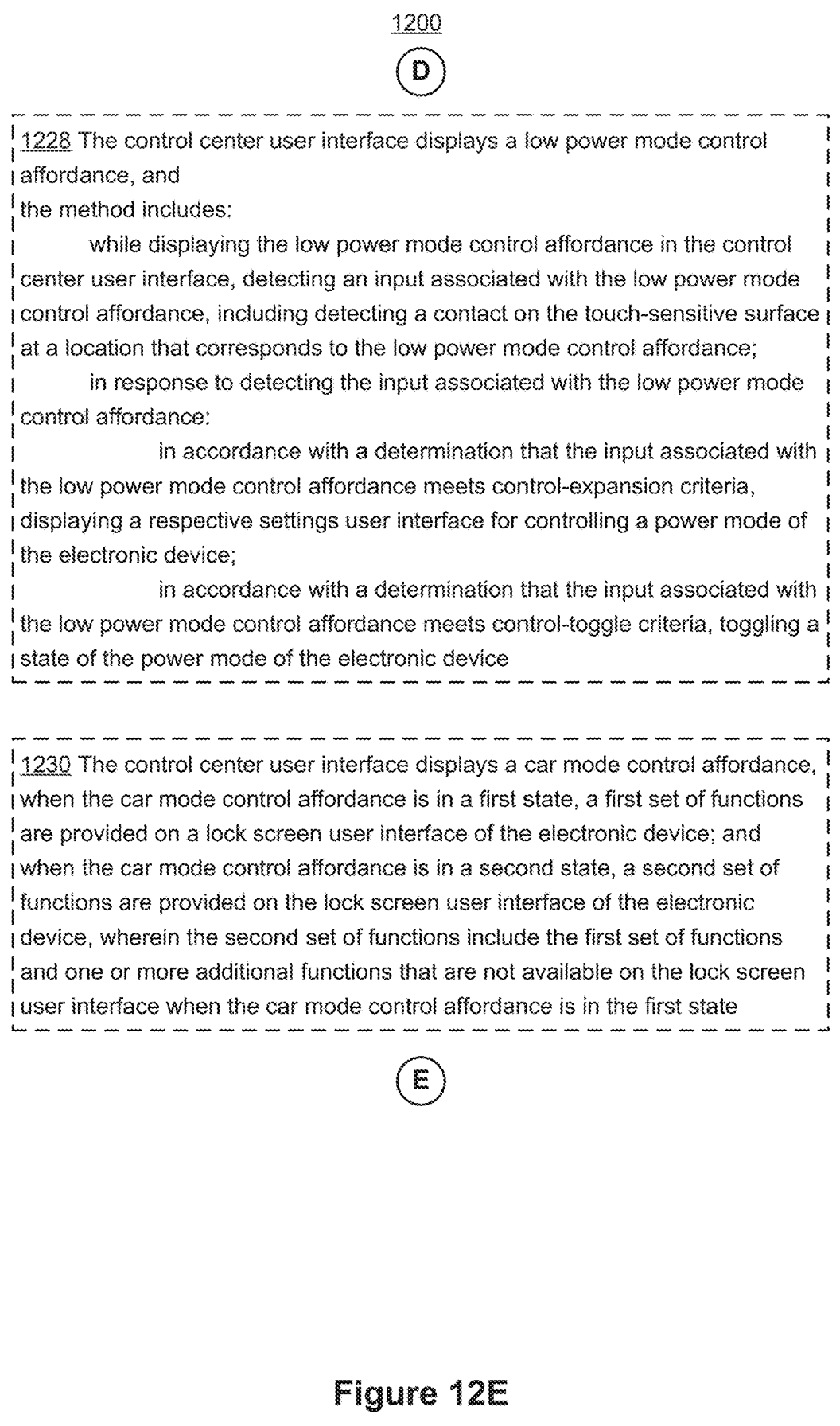

1228 The control center user interface displays a low power mode control affordance, and
the method includes:
while displaying the low power mode control affordance in the control center user interface, detecting an input associated with the low power mode control affordance, including detecting a contact on the touch-sensitive surface at a location that corresponds to the low power mode control affordance;
in response to detecting the input associated with the low power mode control affordance:
in accordance with a determination that the input associated with the low power mode control affordance meets control-expansion criteria, displaying a respective settings user interface for controlling a power mode of the electronic device;
in accordance with a determination that the input associated with the low power mode control affordance meets control-toggle criteria, toggling a state of the power mode of the electronic device 1230 The control center user interface displays a car mode control affordance, when the car mode control affordance is in a first state, a first set of functions are provided on a lock screen user interface of the electronic device; and when the car mode control affordance is in a second state, a second set of functions are provided on the lock screen user interface of the electronic device, wherein the second set of functions include the first set of functions and one or more additional functions that are not available on the lock screen user interface when the car mode control affordance is in the first state (E)

Figure 12F:
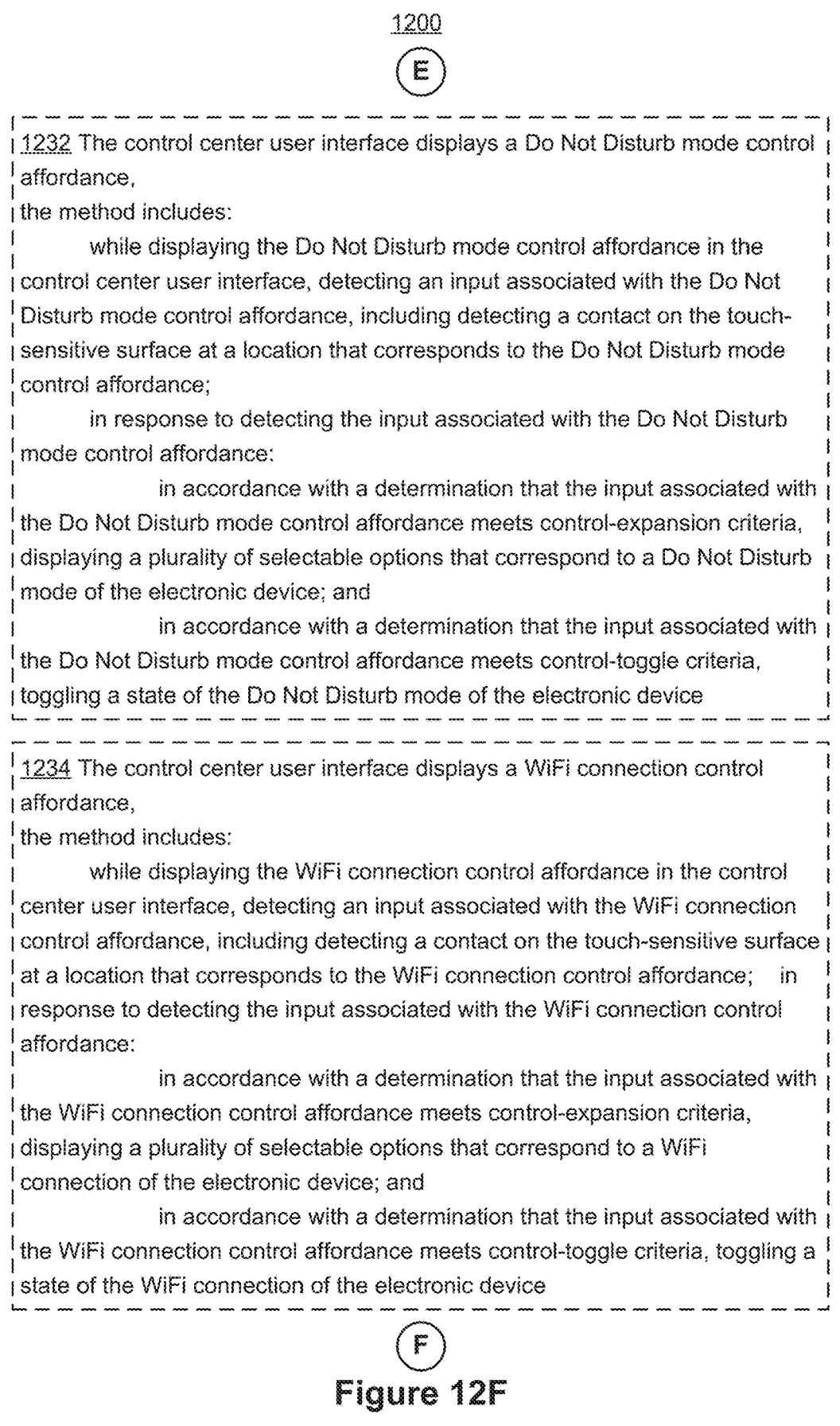

1232 The control center user interface displays a Do Not Disturb mode control affordance,
the method includes:
while displaying the Do Not Disturb mode control affordance in the control center user interface, detecting an input associated with the Do Not Disturb mode control affordance, including detecting a contact on the touch-sensitive surface at a location that corresponds to the Do Not Disturb mode control affordance;
in response to detecting the input associated with the Do Not Disturb mode control affordance:
in accordance with a determination that the input associated with the Do Not Disturb mode control affordance meets control-expansion criteria, displaying a plurality of selectable options that correspond to a Do Not Disturb mode of the electronic device; and
in accordance with a determination that the input associated with the Do Not Disturb mode control affordance meets control-toggle criteria, toggling a state of the Do Not Disturb mode of the electronic device 1234 The control center user interface displays a WiFi connection control affordance,
the method includes:
while displaying the WiFi connection control affordance in the control center user interface, detecting an input associated with the WiFi connection control affordance, including detecting a contact on the touch-sensitive surface at a location that corresponds to the WiFi connection control affordance; in response to detecting the input associated with the WiFi connection control affordance:
in accordance with a determination that the input associated with the WiFi connection control affordance meets control-expansion criteria, displaying a plurality of selectable options that correspond to a WiFi connection of the electronic device; and
in accordance with a determination that the input associated with the WiFi connection control affordance meets control-toggle criteria, toggling a state of the WiFi connection of the electronic device

Figure 12G:
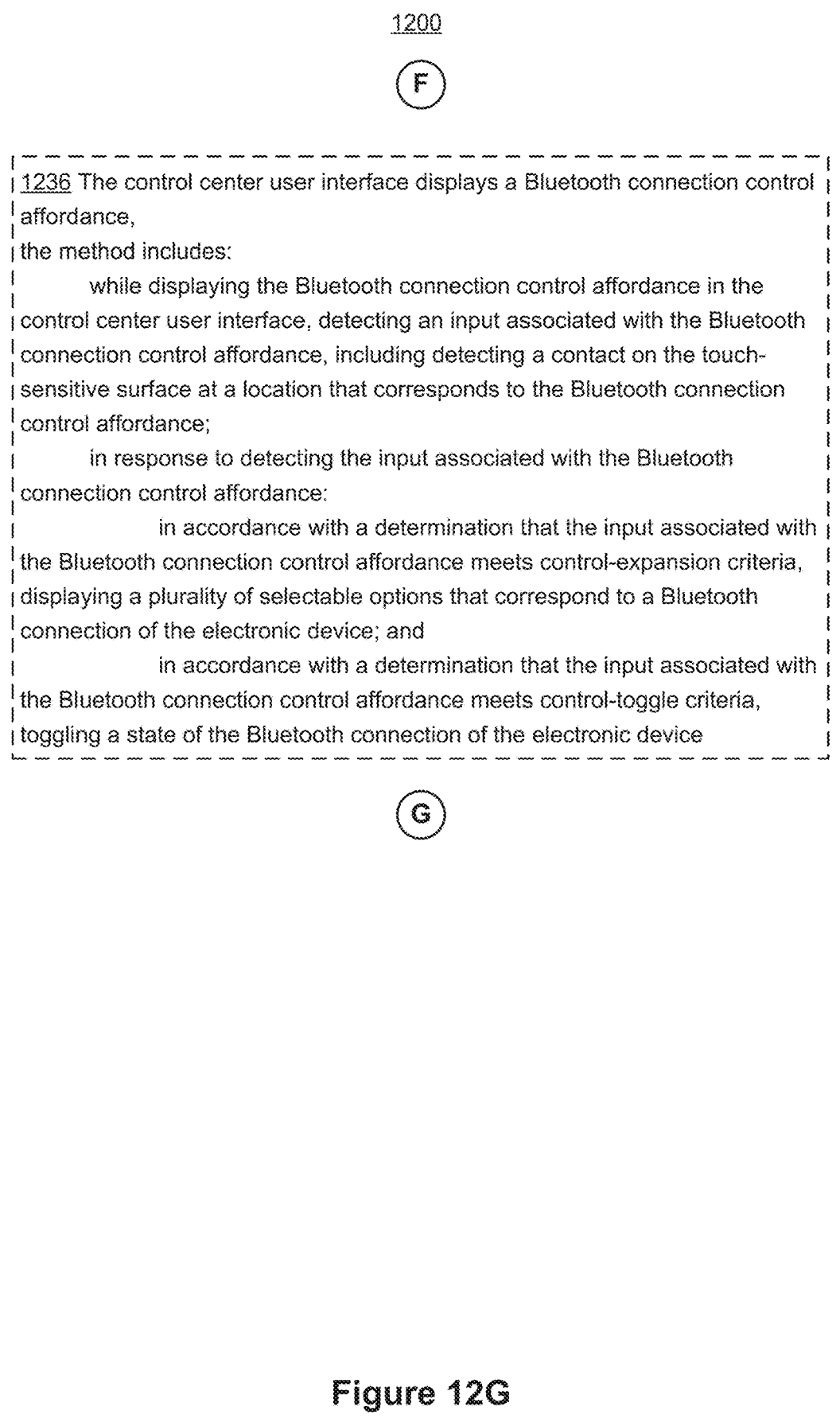

1236 The control center user interface displays a Bluetooth connection control affordance,
the method includes:

while displaying the Bluetooth connection control affordance in the control center user interface, detecting an input associated with the Bluetooth connection control affordance, including detecting a contact on the touch-sensitive surface at a location that corresponds to the Bluetooth connection control affordance;

in response to detecting the input associated with the Bluetooth connection control affordance:

in accordance with a determination that the input associated with the Bluetooth connection control affordance meets control-expansion criteria, displaying a plurality of selectable options that correspond to a Bluetooth connection of the electronic device; and in accordance with a determination that the input associated with the Bluetooth connection control affordance meets control-toggle criteria, toggling a state of the Bluetooth connection of the electronic device (G)

Figure 12H:
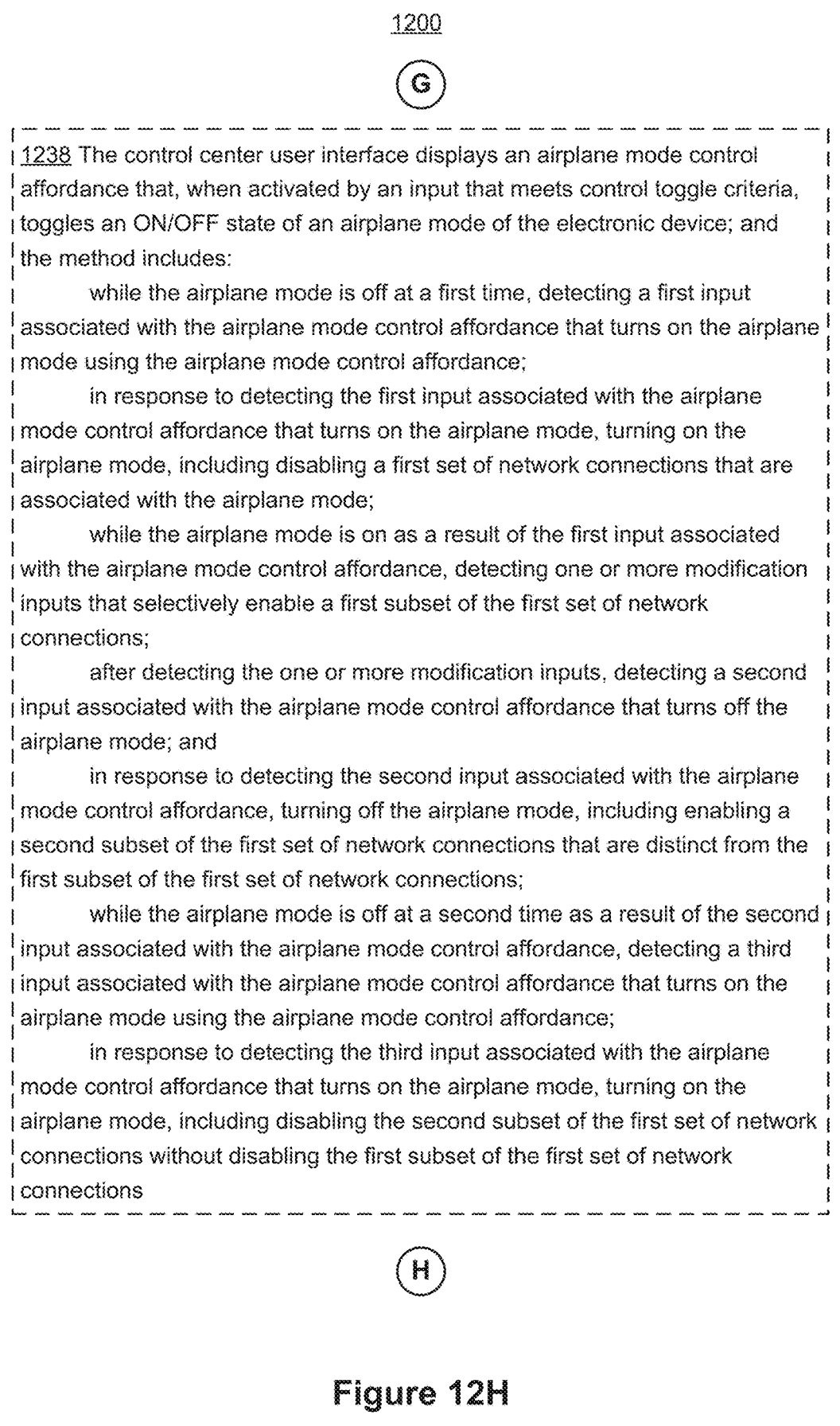

1238 The control center user interface displays an airplane mode control affordance that, when activated by an input that meets control toggle criteria, toggles an ON/OFF state of an airplane mode of the electronic device; and the method includes:

while the airplane mode is off at a first time, detecting a first input associated with the airplane mode control affordance that turns on the airplane mode using the airplane mode control affordance;

in response to detecting the first input associated with the airplane mode control affordance that turns on the airplane mode, turning on the airplane mode, including disabling a first set of network connections that are associated with the airplane mode;

while the airplane mode is on as a result of the first input associated with the airplane mode control affordance, detecting one or more modification inputs that selectively enable a first subset of the first set of network connections;

after detecting the one or more modification inputs, detecting a second input associated with the airplane mode control affordance that turns off the airplane mode; and in response to detecting the second input associated with the airplane mode control affordance, turning off the airplane mode, including enabling a second subset of the first set of network connections that are distinct from the first subset of the first set of network connections;

while the airplane mode is off at a second time as a result of the second input associated with the airplane mode control affordance, detecting a third input associated with the airplane mode control affordance that turns on the airplane mode using the airplane mode control affordance;

in response to detecting the third input associated with the airplane mode control affordance that turns on the airplane mode, turning on the airplane mode, including disabling the second subset of the first set of network connections without disabling the first subset of the first set of network connections

Figure 12I:
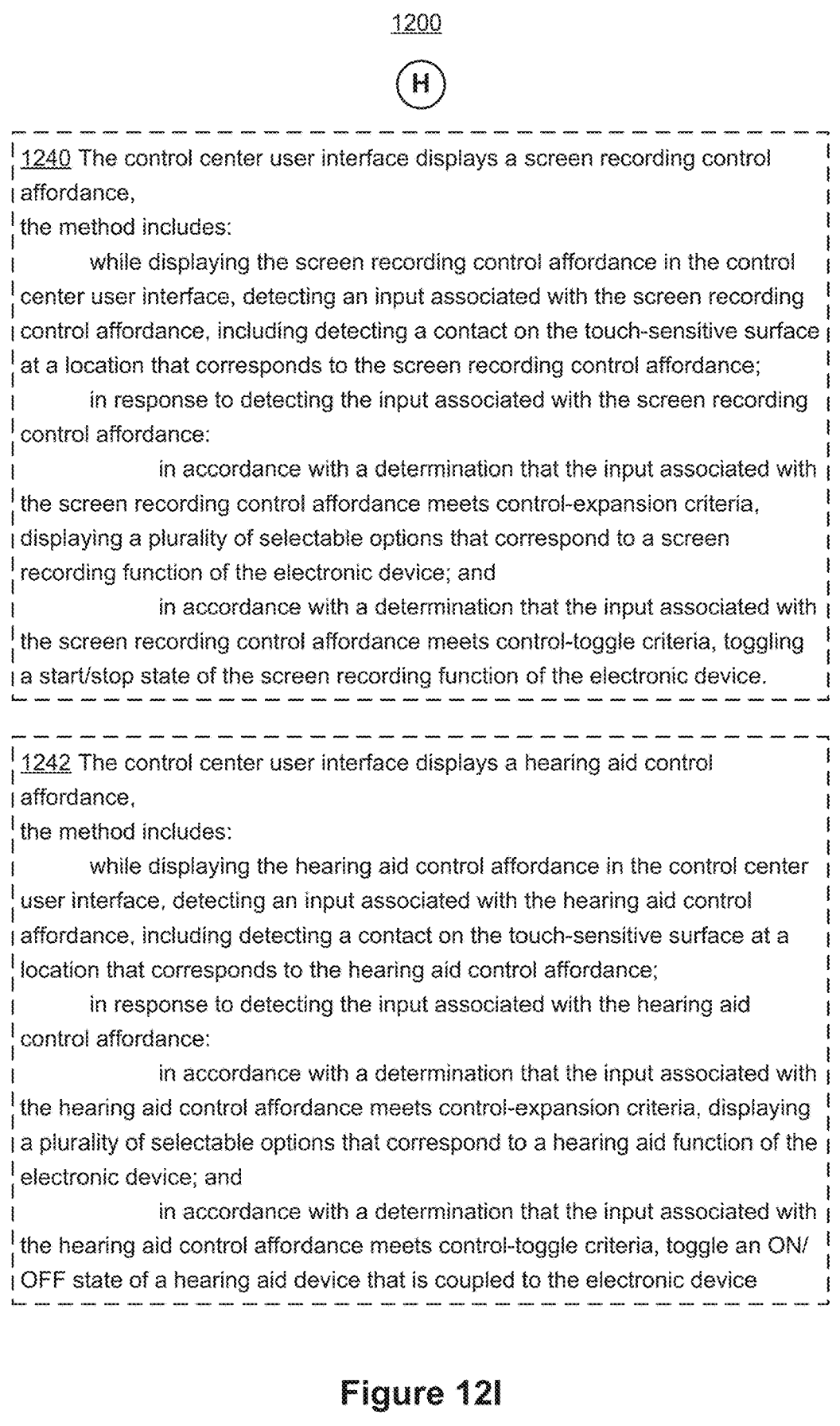

1240 The control center user interface displays a screen recording control affordance,
the method includes:
while displaying the screen recording control affordance in the control center user interface, detecting an input associated with the screen recording control affordance, including detecting a contact on the touch-sensitive surface at a location that corresponds to the screen recording control affordance;
in response to detecting the input associated with the screen recording control affordance:
in accordance with a determination that the input associated with the screen recording control affordance meets control-expansion criteria, displaying a plurality of selectable options that correspond to a screen recording function of the electronic device; and
in accordance with a determination that the input associated with the screen recording control affordance meets control-toggle criteria, toggling a start/stop state of the screen recording function of the electronic device.

1242 The control center user interface displays a hearing aid control affordance,
the method includes:
while displaying the hearing aid control affordance in the control center user interface, detecting an input associated with the hearing aid control affordance, including detecting a contact on the touch-sensitive surface at a location that corresponds to the hearing aid control affordance;
in response to detecting the input associated with the hearing aid control affordance:
in accordance with a determination that the input associated with the hearing aid control affordance meets control-expansion criteria, displaying a plurality of selectable options that correspond to a hearing aid function of the electronic device; and
in accordance with a determination that the input associated with the hearing aid control affordance meets control-toggle criteria, toggle an ON/OFF state of a hearing aid device that is coupled to the electronic device

Figure 13A:
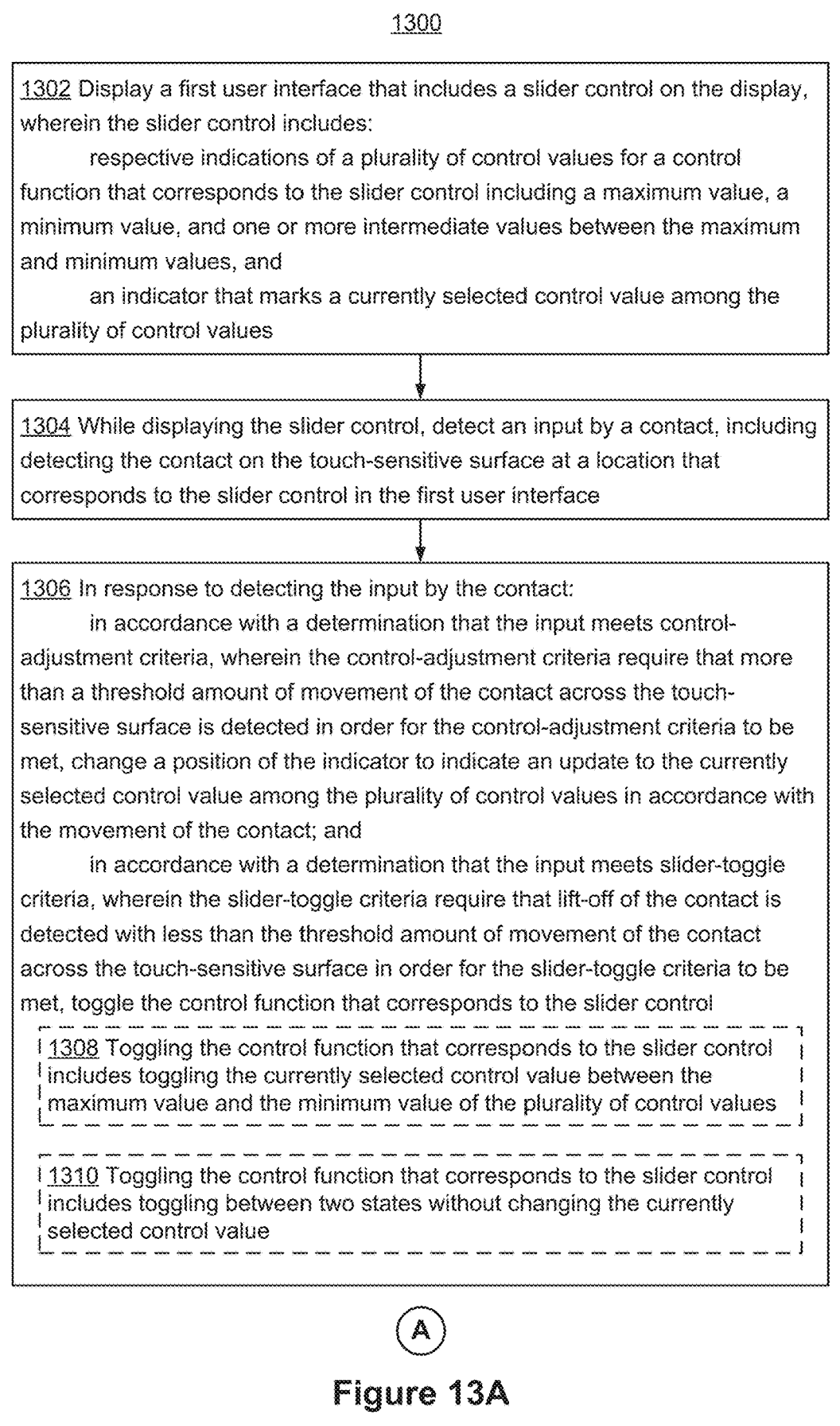

1302 Display a first user interface that includes a slider control on the display, wherein the slider control includes:

respective indications of a plurality of control values for a control function that corresponds to the slider control including a maximum value, a minimum value, and one or more intermediate values between the maximum and minimum values, and an indicator that marks a currently selected control value among the plurality of control values

↓

1304 While displaying the slider control, detect an input by a contact, including detecting the contact on the touch-sensitive surface at a location that corresponds to the slider control in the first user interface

↓

1306 In response to detecting the input by the contact:

in accordance with a determination that the input meets control-adjustment criteria, wherein the control-adjustment criteria require that more than a threshold amount of movement of the contact across the touch-sensitive surface is detected in order for the control-adjustment criteria to be met, change a position of the indicator to indicate an update to the currently selected control value among the plurality of control values in accordance with the movement of the contact; and in accordance with a determination that the input meets slider-toggle criteria, wherein the slider-toggle criteria require that lift-off of the contact is detected with less than the threshold amount of movement of the contact across the touch-sensitive surface in order for the slider-toggle criteria to be met, toggle the control function that corresponds to the slider control 1308 Toggling the control function that corresponds to the slider control includes toggling the currently selected control value between the maximum value and the minimum value of the plurality of control values 1310 Toggling the control function that corresponds to the slider control includes toggling between two states without changing the currently selected control value (A)

Figure 13B:
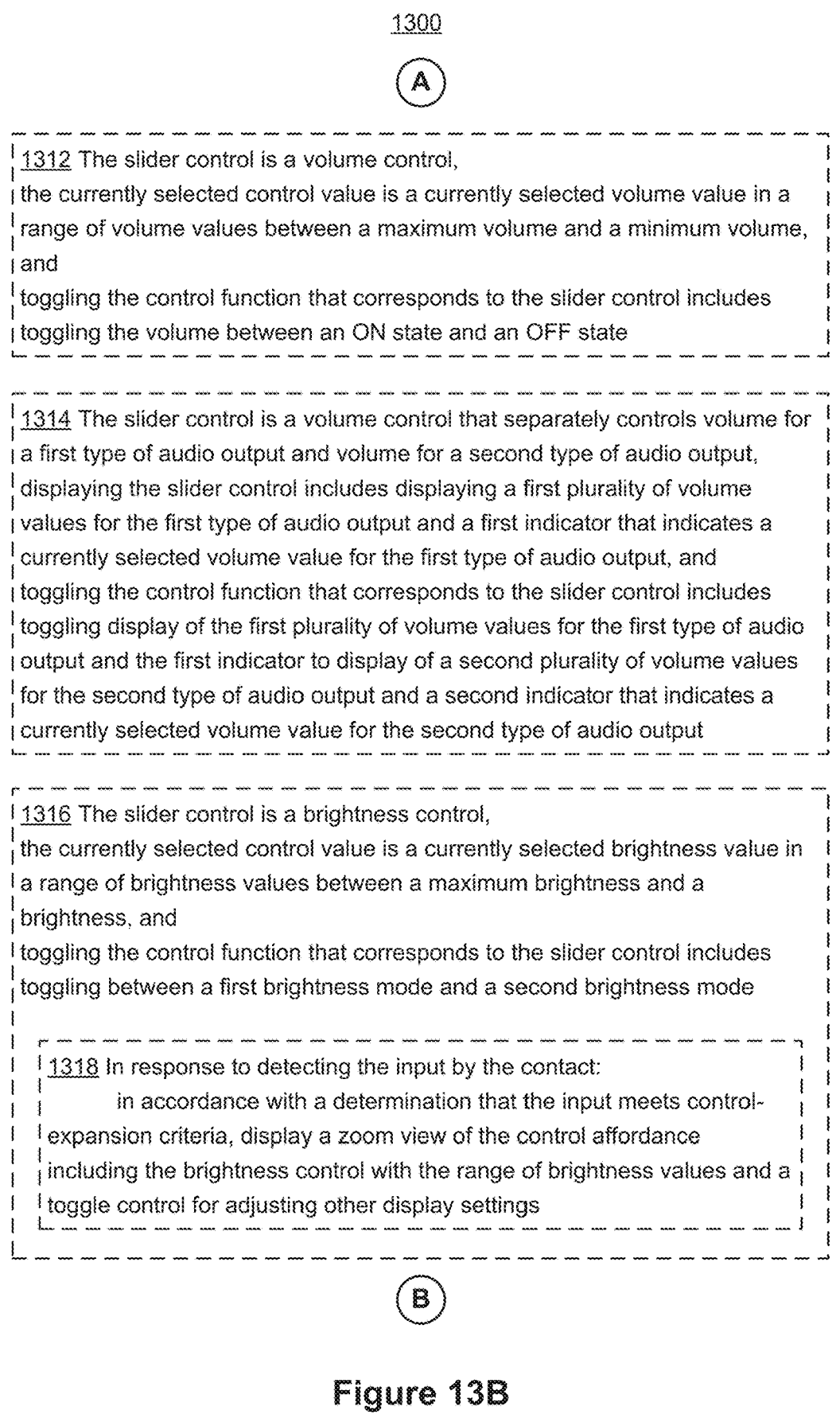

1312 The slider control is a volume control,
the currently selected control value is a currently selected volume value in a range of volume values between a maximum volume and a minimum volume, and
toggling the control function that corresponds to the slider control includes toggling the volume between an ON state and an OFF state 1314 The slider control is a volume control that separately controls volume for a first type of audio output and volume for a second type of audio output,
displaying the slider control includes displaying a first plurality of volume values for the first type of audio output and a first indicator that indicates a currently selected volume value for the first type of audio output, and
toggling the control function that corresponds to the slider control includes toggling display of the first plurality of volume values for the first type of audio output and the first indicator to display of a second plurality of volume values for the second type of audio output and a second indicator that indicates a currently selected volume value for the second type of audio output 1316 The slider control is a brightness control,
the currently selected control value is a currently selected brightness value in a range of brightness values between a maximum brightness and a brightness, and
toggling the control function that corresponds to the slider control includes toggling between a first brightness mode and a second brightness mode 1318 In response to detecting the input by the contact:
in accordance with a determination that the input meets control-expansion criteria, display a zoom view of the control affordance including the brightness control with the range of brightness values and a toggle control for adjusting other display settings (B)

Figure 13C:
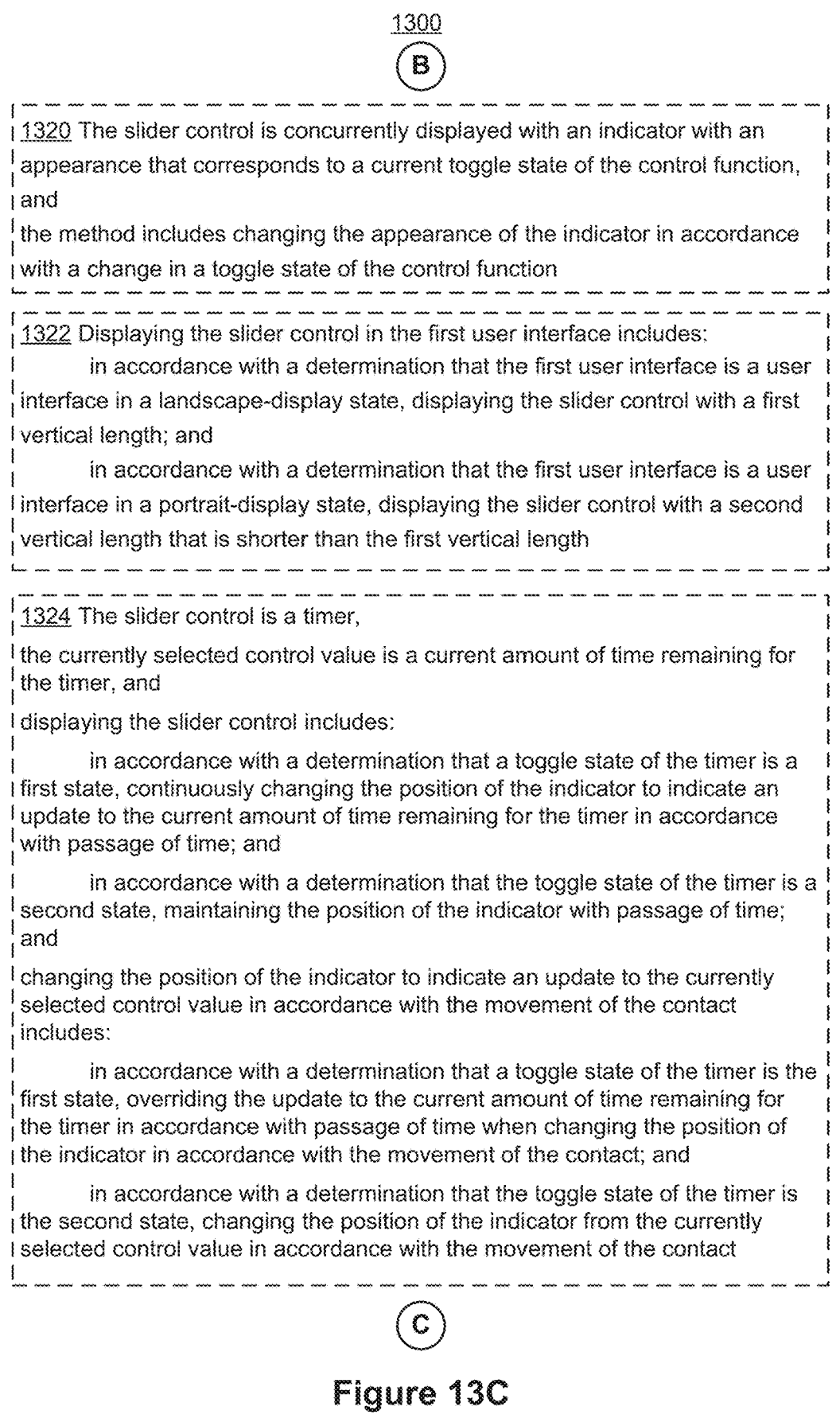

1320 The slider control is concurrently displayed with an indicator with an appearance that corresponds to a current toggle state of the control function, and the method includes changing the appearance of the indicator in accordance with a change in a toggle state of the control function 1322 Displaying the slider control in the first user interface includes:

in accordance with a determination that the first user interface is a user interface in a landscape-display state, displaying the slider control with a first vertical length; and in accordance with a determination that the first user interface is a user interface in a portrait-display state, displaying the slider control with a second vertical length that is shorter than the first vertical length 1324 The slider control is a timer, the currently selected control value is a current amount of time remaining for the timer, and displaying the slider control includes:

in accordance with a determination that a toggle state of the timer is a first state, continuously changing the position of the indicator to indicate an update to the current amount of time remaining for the timer in accordance with passage of time; and in accordance with a determination that the toggle state of the timer is a second state, maintaining the position of the indicator with passage of time; and changing the position of the indicator to indicate an update to the currently selected control value in accordance with the movement of the contact includes:

in accordance with a determination that a toggle state of the timer is the first state, overriding the update to the current amount of time remaining for the timer in accordance with passage of time when changing the position of the indicator in accordance with the movement of the contact; and in accordance with a determination that the toggle state of the timer is the second state, changing the position of the indicator from the currently selected control value in accordance with the movement of the contact (C)

Figure 13D:
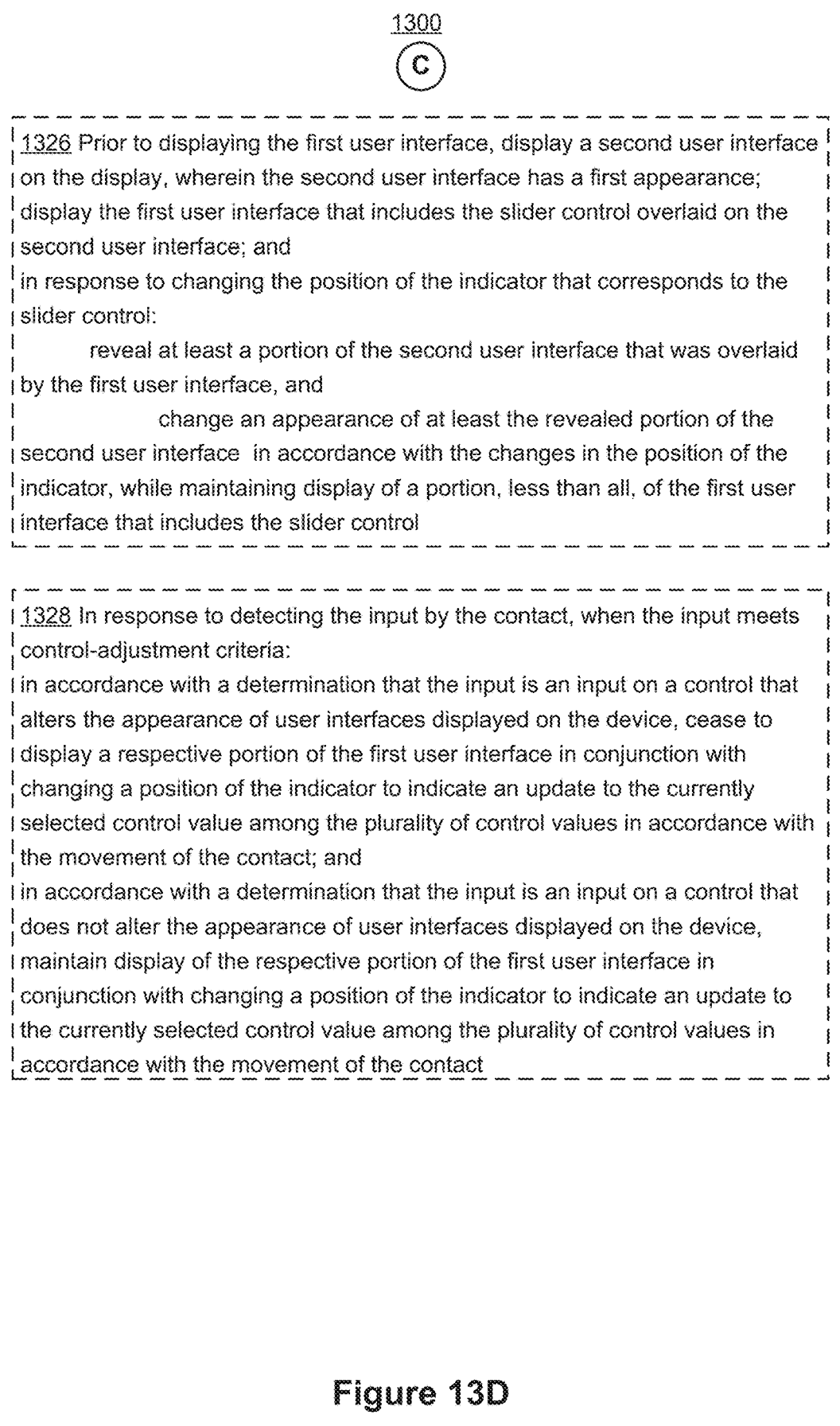

1326 Prior to displaying the first user interface, display a second user interface on the display, wherein the second user interface has a first appearance;
display the first user interface that includes the slider control overlaid on the second user interface; and
in response to changing the position of the indicator that corresponds to the slider control:
reveal at least a portion of the second user interface that was overlaid by the first user interface, and
change an appearance of at least the revealed portion of the second user interface in accordance with the changes in the position of the indicator, while maintaining display of a portion, less than all, of the first user interface that includes the slider control 1328 In response to detecting the input by the contact, when the input meets control-adjustment criteria:
in accordance with a determination that the input is an input on a control that alters the appearance of user interfaces displayed on the device, cease to display a respective portion of the first user interface in conjunction with changing a position of the indicator to indicate an update to the currently selected control value among the plurality of control values in accordance with the movement of the contact; and
in accordance with a determination that the input is an input on a control that does not alter the appearance of user interfaces displayed on the device, maintain display of the respective portion of the first user interface in conjunction with changing a position of the indicator to indicate an update to the currently selected control value among the plurality of control values in accordance with the movement of the contact

Figure 14A:
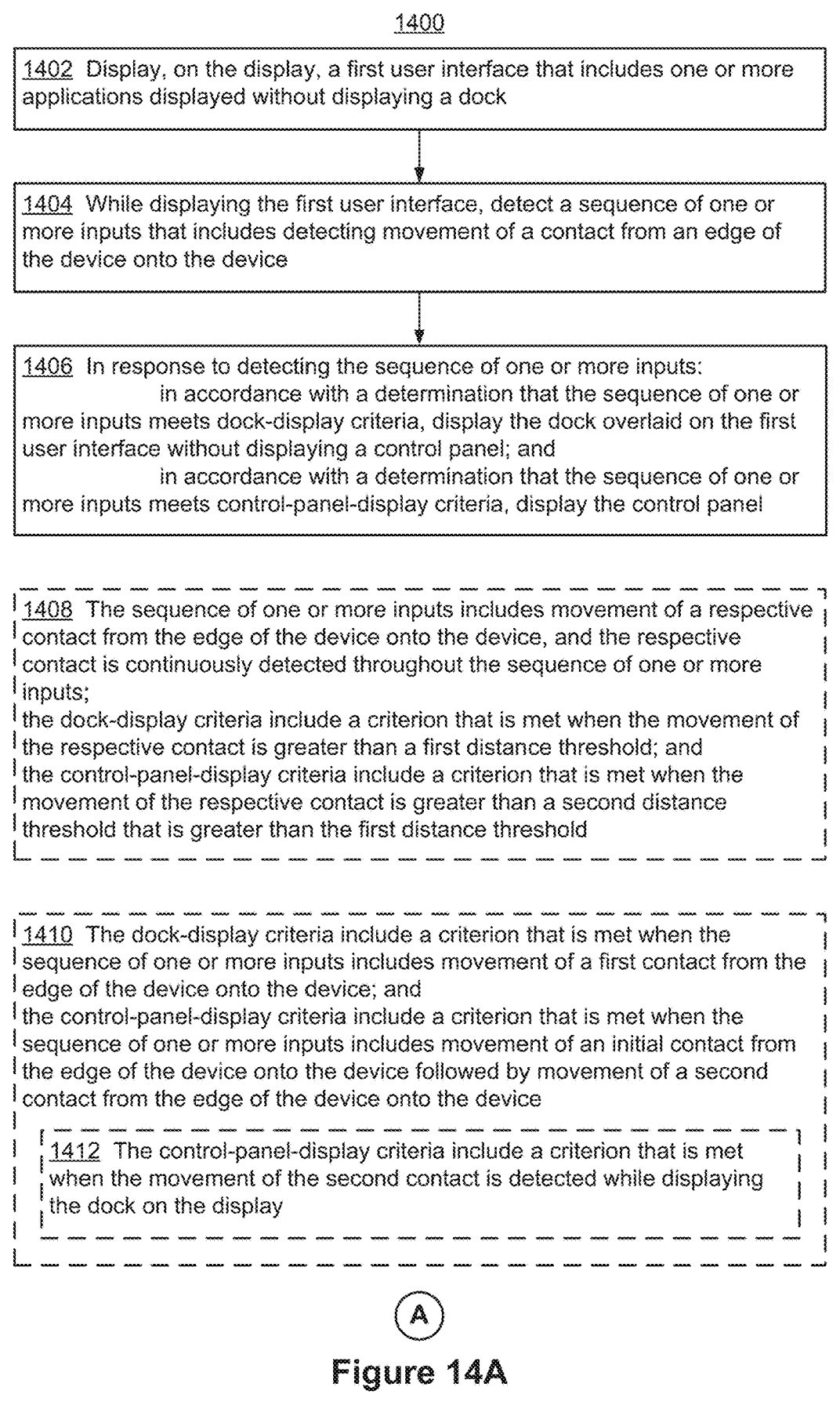

1402 Display, on the display, a first user interface that includes one or more applications displayed without displaying a dock 1404 While displaying the first user interface, detect a sequence of one or more inputs that includes detecting movement of a contact from an edge of the device onto the device 1406 In response to detecting the sequence of one or more inputs:
in accordance with a determination that the sequence of one or more inputs meets dock-display criteria, display the dock overlaid on the first user interface without displaying a control panel; and
in accordance with a determination that the sequence of one or more inputs meets control-panel-display criteria, display the control panel 1408 The sequence of one or more inputs includes movement of a respective contact from the edge of the device onto the device, and the respective contact is continuously detected throughout the sequence of one or more inputs;
the dock-display criteria include a criterion that is met when the movement of the respective contact is greater than a first distance threshold; and
the control-panel-display criteria include a criterion that is met when the movement of the respective contact is greater than a second distance threshold that is greater than the first distance threshold 1410 The dock-display criteria include a criterion that is met when the sequence of one or more inputs includes movement of a first contact from the edge of the device onto the device; and
the control-panel-display criteria include a criterion that is met when the sequence of one or more inputs includes movement of an initial contact from the edge of the device onto the device followed by movement of a second contact from the edge of the device onto the device 1412 The control-panel-display criteria include a criterion that is met when the movement of the second contact is detected while displaying the dock on the display

Figure 14B:
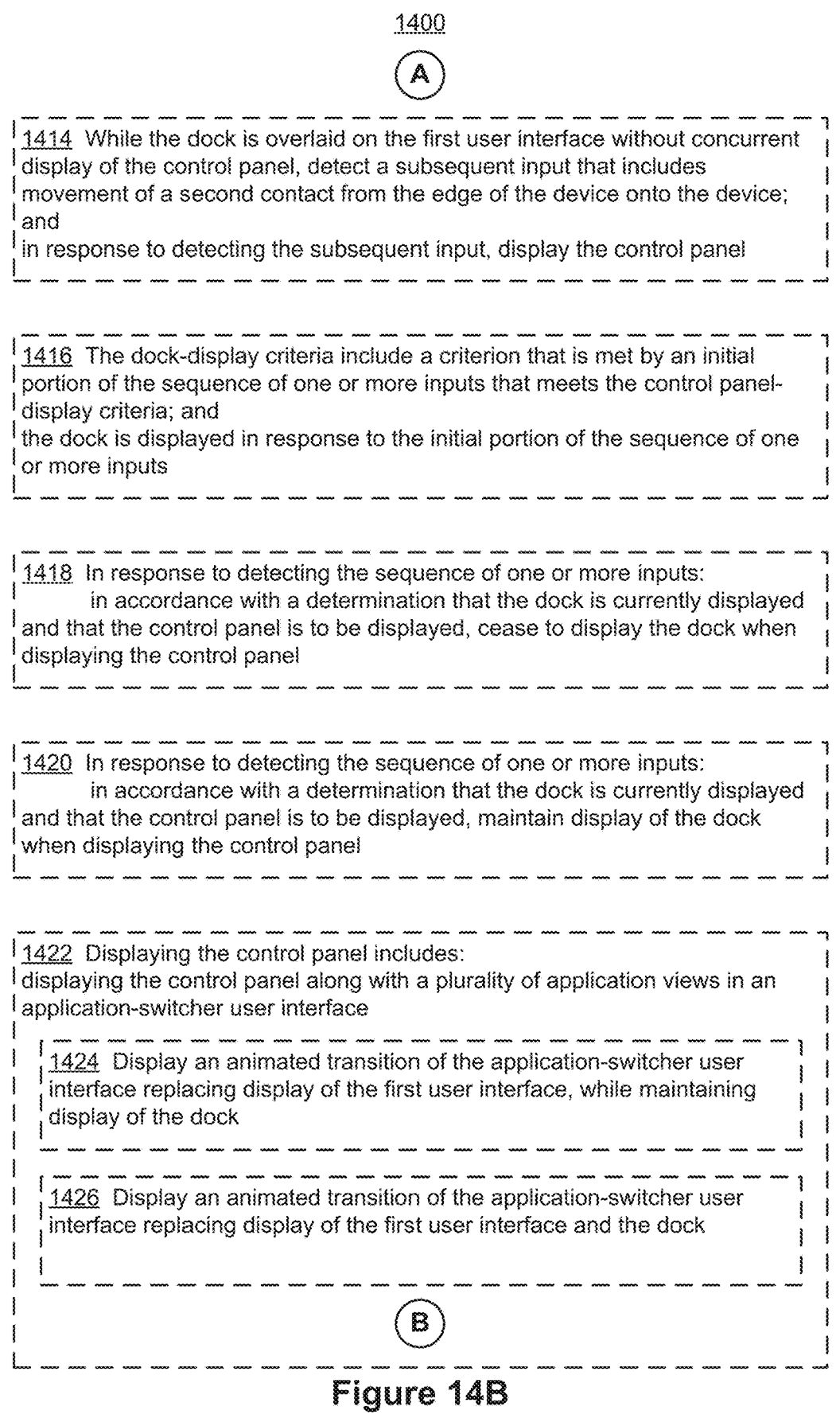

1414 While the dock is overlaid on the first user interface without concurrent display of the control panel, detect a subsequent input that includes movement of a second contact from the edge of the device onto the device; and
in response to detecting the subsequent input, display the control panel 1416 The dock-display criteria include a criterion that is met by an initial portion of the sequence of one or more inputs that meets the control panel-display criteria; and
the dock is displayed in response to the initial portion of the sequence of one or more inputs 1418 In response to detecting the sequence of one or more inputs:
in accordance with a determination that the dock is currently displayed and that the control panel is to be displayed, cease to display the dock when displaying the control panel 1420 In response to detecting the sequence of one or more inputs:
in accordance with a determination that the dock is currently displayed and that the control panel is to be displayed, maintain display of the dock when displaying the control panel 1422 Displaying the control panel includes:
displaying the control panel along with a plurality of application views in an application-switcher user interface 1424 Display an animated transition of the application-switcher user interface replacing display of the first user interface, while maintaining display of the dock 1426 Display an animated transition of the application-switcher user interface replacing display of the first user interface and the dock (B)

Figure 14C:
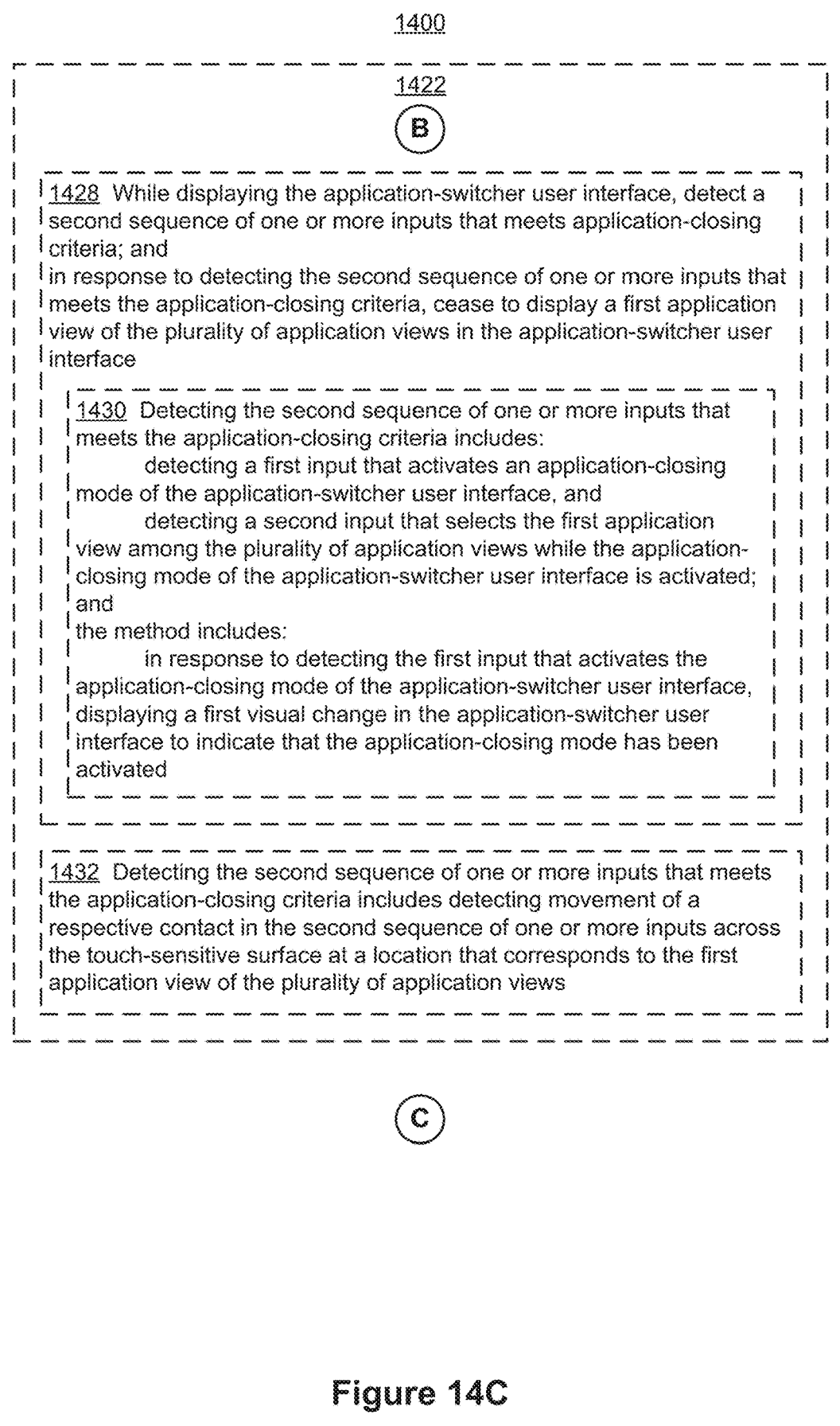

1428 While displaying the application-switcher user interface, detect a second sequence of one or more inputs that meets application-closing criteria; and
in response to detecting the second sequence of one or more inputs that meets the application-closing criteria, cease to display a first application view of the plurality of application views in the application-switcher user interface 1430 Detecting the second sequence of one or more inputs that meets the application-closing criteria includes:
detecting a first input that activates an application-closing mode of the application-switcher user interface, and
detecting a second input that selects the first application view among the plurality of application views while the application-closing mode of the application-switcher user interface is activated; and
the method includes:
in response to detecting the first input that activates the application-closing mode of the application-switcher user interface, displaying a first visual change in the application-switcher user interface to indicate that the application-closing mode has been activated 1432 Detecting the second sequence of one or more inputs that meets the application-closing criteria includes detecting movement of a respective contact in the second sequence of one or more inputs across the touch-sensitive surface at a location that corresponds to the first application view of the plurality of application views (C)

Figure 14D:
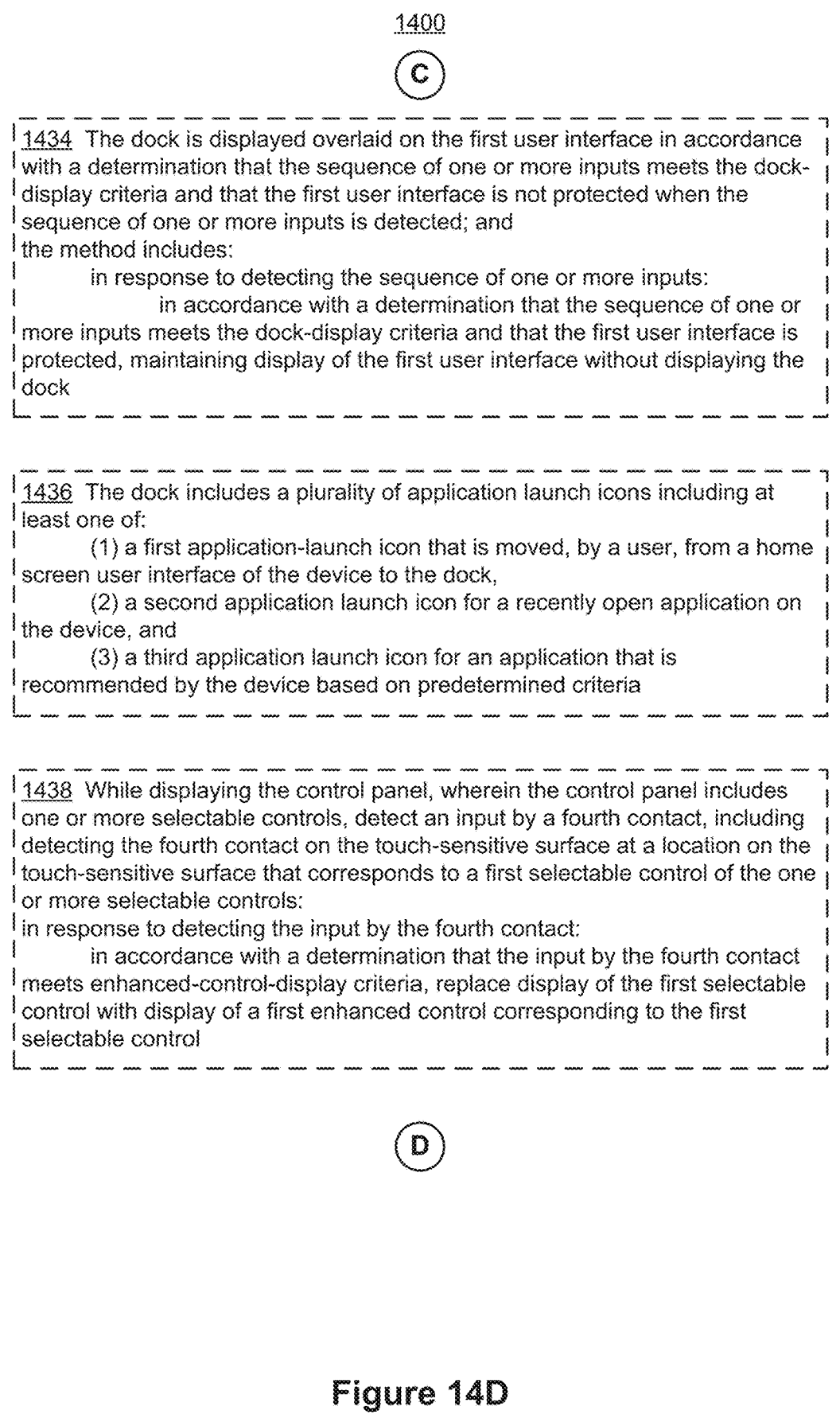

1434 The dock is displayed overlaid on the first user interface in accordance with a determination that the sequence of one or more inputs meets the dock-display criteria and that the first user interface is not protected when the sequence of one or more inputs is detected; and
the method includes:
in response to detecting the sequence of one or more inputs:
in accordance with a determination that the sequence of one or more inputs meets the dock-display criteria and that the first user interface is protected, maintaining display of the first user interface without displaying the dock 1436 The dock includes a plurality of application launch icons including at least one of:
(1) a first application-launch icon that is moved, by a user, from a home screen user interface of the device to the dock,
(2) a second application launch icon for a recently open application on the device, and
(3) a third application launch icon for an application that is recommended by the device based on predetermined criteria 1438 While displaying the control panel, wherein the control panel includes one or more selectable controls, detect an input by a fourth contact, including detecting the fourth contact on the touch-sensitive surface at a location on the touch-sensitive surface that corresponds to a first selectable control of the one or more selectable controls:
in response to detecting the input by the fourth contact:
in accordance with a determination that the input by the fourth contact meets enhanced-control-display criteria, replace display of the first selectable control with display of a first enhanced control corresponding to the first selectable control

Figure 14E:
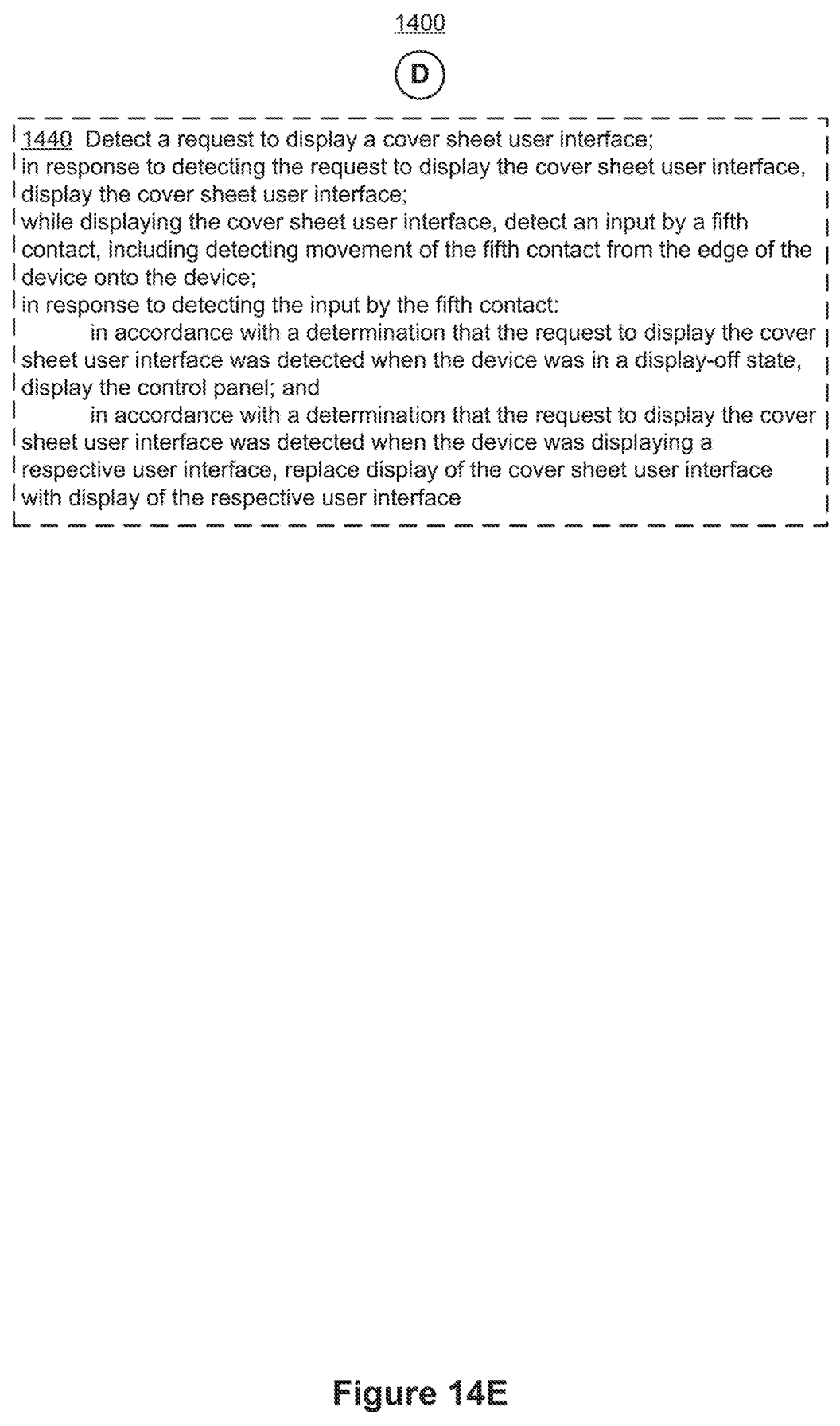

1440 Detect a request to display a cover sheet user interface;
in response to detecting the request to display the cover sheet user interface, display the cover sheet user interface;
while displaying the cover sheet user interface, detect an input by a fifth contact, including detecting movement of the fifth contact from the edge of the device onto the device;
in response to detecting the input by the fifth contact:

in accordance with a determination that the request to display the cover sheet user interface was detected when the device was in a display-off state, display the control panel; and in accordance with a determination that the request to display the cover sheet user interface was detected when the device was displaying a respective user interface, replace display of the cover sheet user interface with display of the respective user interface

Figure 15A:
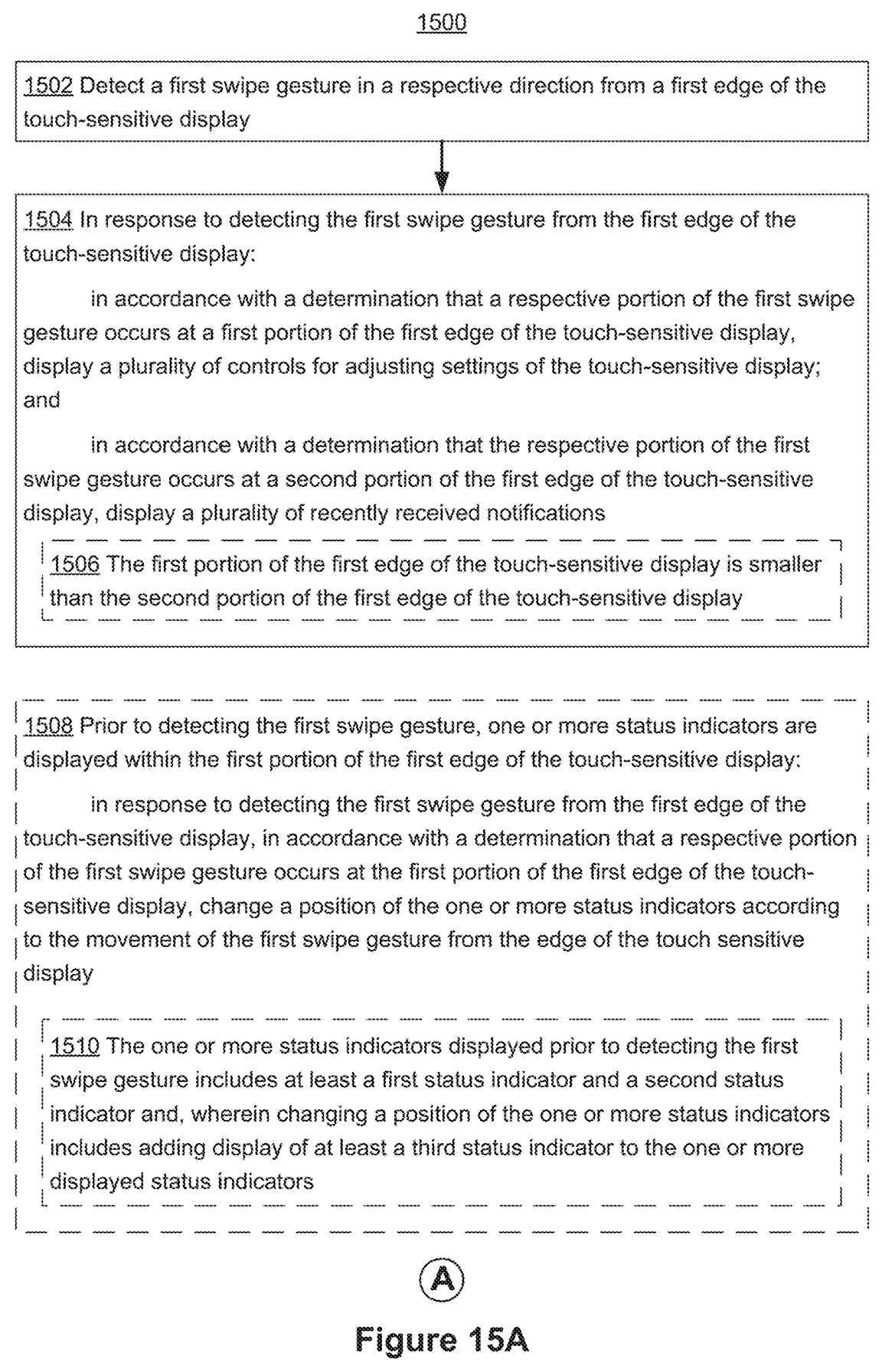

1502 Detect a first swipe gesture in a respective direction from a first edge of the touch-sensitive display 1504 In response to detecting the first swipe gesture from the first edge of the touch-sensitive display:

in accordance with a determination that a respective portion of the first swipe gesture occurs at a first portion of the first edge of the touch-sensitive display, display a plurality of controls for adjusting settings of the touch-sensitive display; and in accordance with a determination that the respective portion of the first swipe gesture occurs at a second portion of the first edge of the touch-sensitive display, display a plurality of recently received notifications 1506 The first portion of the first edge of the touch-sensitive display is smaller than the second portion of the first edge of the touch-sensitive display 1508 Prior to detecting the first swipe gesture, one or more status indicators are displayed within the first portion of the first edge of the touch-sensitive display:

in response to detecting the first swipe gesture from the first edge of the touch-sensitive display, in accordance with a determination that a respective portion of the first swipe gesture occurs at the first portion of the first edge of the touch-sensitive display, change a position of the one or more status indicators according to the movement of the first swipe gesture from the edge of the touch sensitive display 1510 The one or more status indicators displayed prior to detecting the first swipe gesture includes at least a first status indicator and a second status indicator and, wherein changing a position of the one or more status indicators includes adding display of at least a third status indicator to the one or more displayed status indicators

Figure 15B:
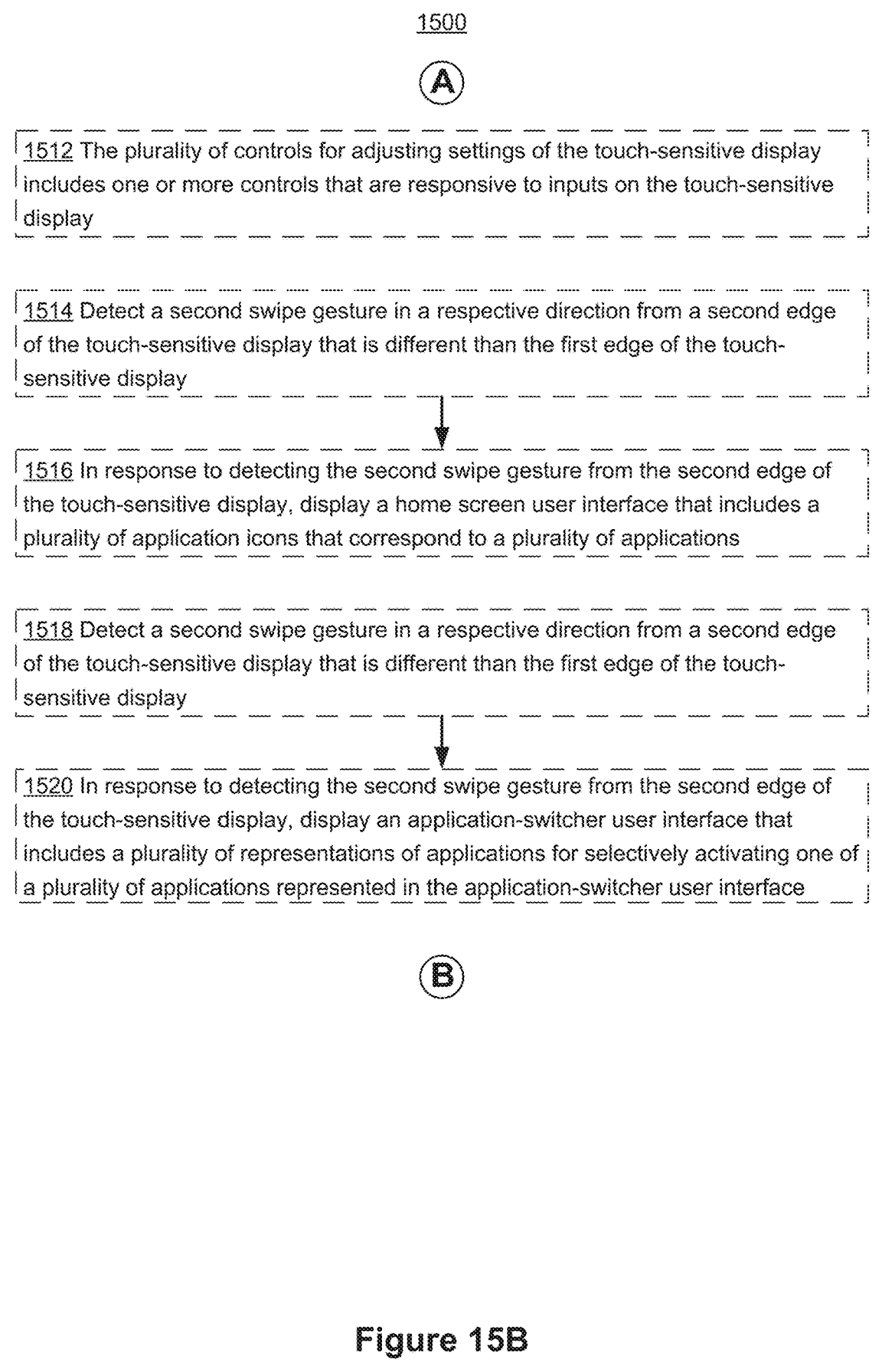

1512 The plurality of controls for adjusting settings of the touch-sensitive display includes one or more controls that are responsive to inputs on the touch-sensitive display 1514 Detect a second swipe gesture in a respective direction from a second edge of the touch-sensitive display that is different than the first edge of the touch-sensitive display

↓

1516 In response to detecting the second swipe gesture from the second edge of the touch-sensitive display, display a home screen user interface that includes a plurality of application icons that correspond to a plurality of applications 1518 Detect a second swipe gesture in a respective direction from a second edge of the touch-sensitive display that is different than the first edge of the touch-sensitive display

↓

1520 In response to detecting the second swipe gesture from the second edge of the touch-sensitive display, display an application-switcher user interface that includes a plurality of representations of applications for selectively activating one of a plurality of applications represented in the application-switcher user interface (B)

Figure 15B 1500 (B)

Figure 15C:
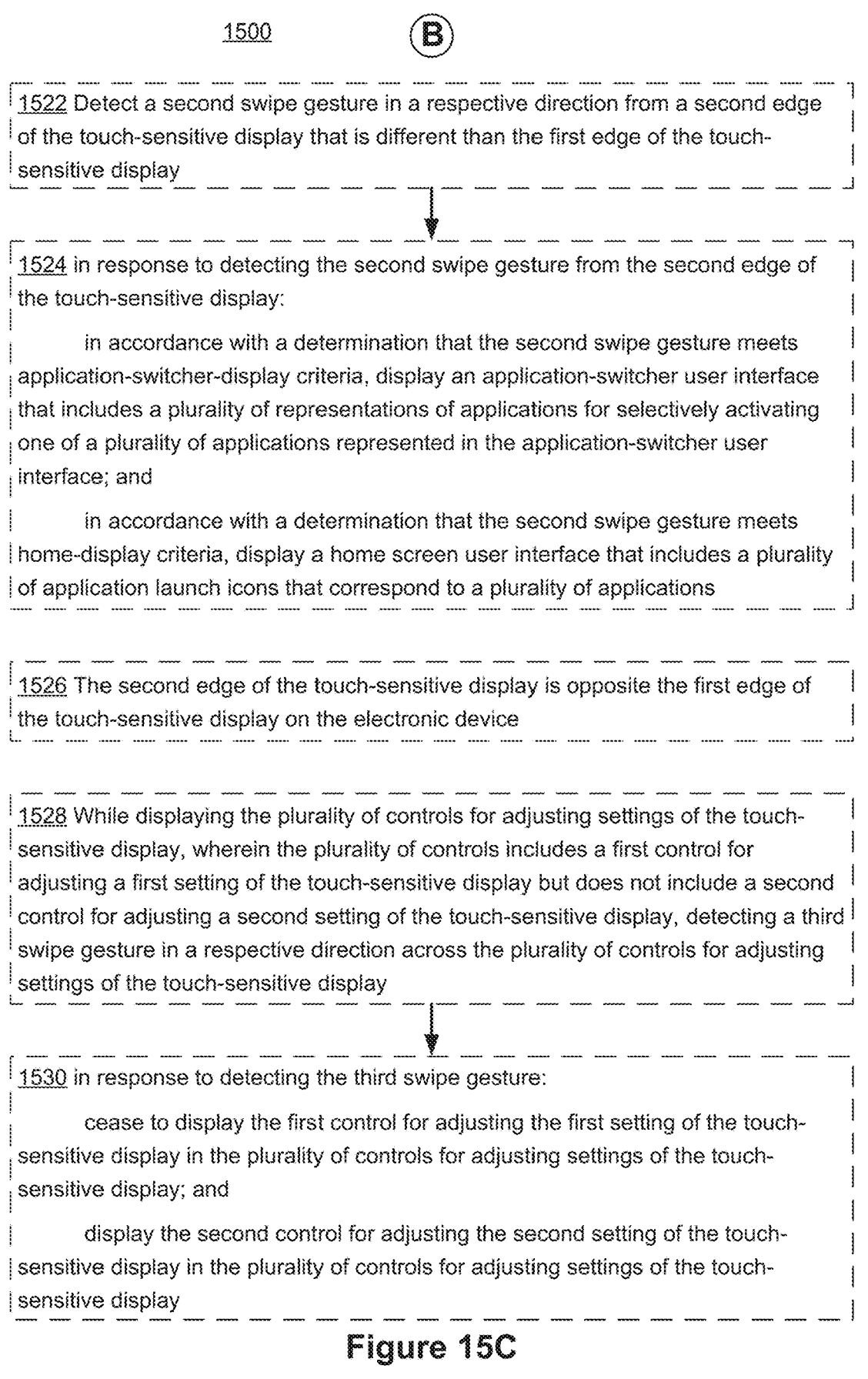

1522 Detect a second swipe gesture in a respective direction from a second edge of the touch-sensitive display that is different than the first edge of the touch-sensitive display

↓

1524 in response to detecting the second swipe gesture from the second edge of the touch-sensitive display:

in accordance with a determination that the second swipe gesture meets application-switcher-display criteria, display an application-switcher user interface that includes a plurality of representations of applications for selectively activating one of a plurality of applications represented in the application-switcher user interface; and in accordance with a determination that the second swipe gesture meets home-display criteria, display a home screen user interface that includes a plurality of application launch icons that correspond to a plurality of applications 1526 The second edge of the touch-sensitive display is opposite the first edge of the touch-sensitive display on the electronic device 1528 While displaying the plurality of controls for adjusting settings of the touch-sensitive display, wherein the plurality of controls includes a first control for adjusting a first setting of the touch-sensitive display but does not include a second control for adjusting a second setting of the touch-sensitive display, detecting a third swipe gesture in a respective direction across the plurality of controls for adjusting settings of the touch-sensitive display

↓

1530 in response to detecting the third swipe gesture:

cease to display the first control for adjusting the first setting of the touch-sensitive display in the plurality of controls for adjusting settings of the touch-sensitive display; and display the second control for adjusting the second setting of the touch-sensitive display in the plurality of controls for adjusting settings of the touch-sensitive display

Figure 18A:
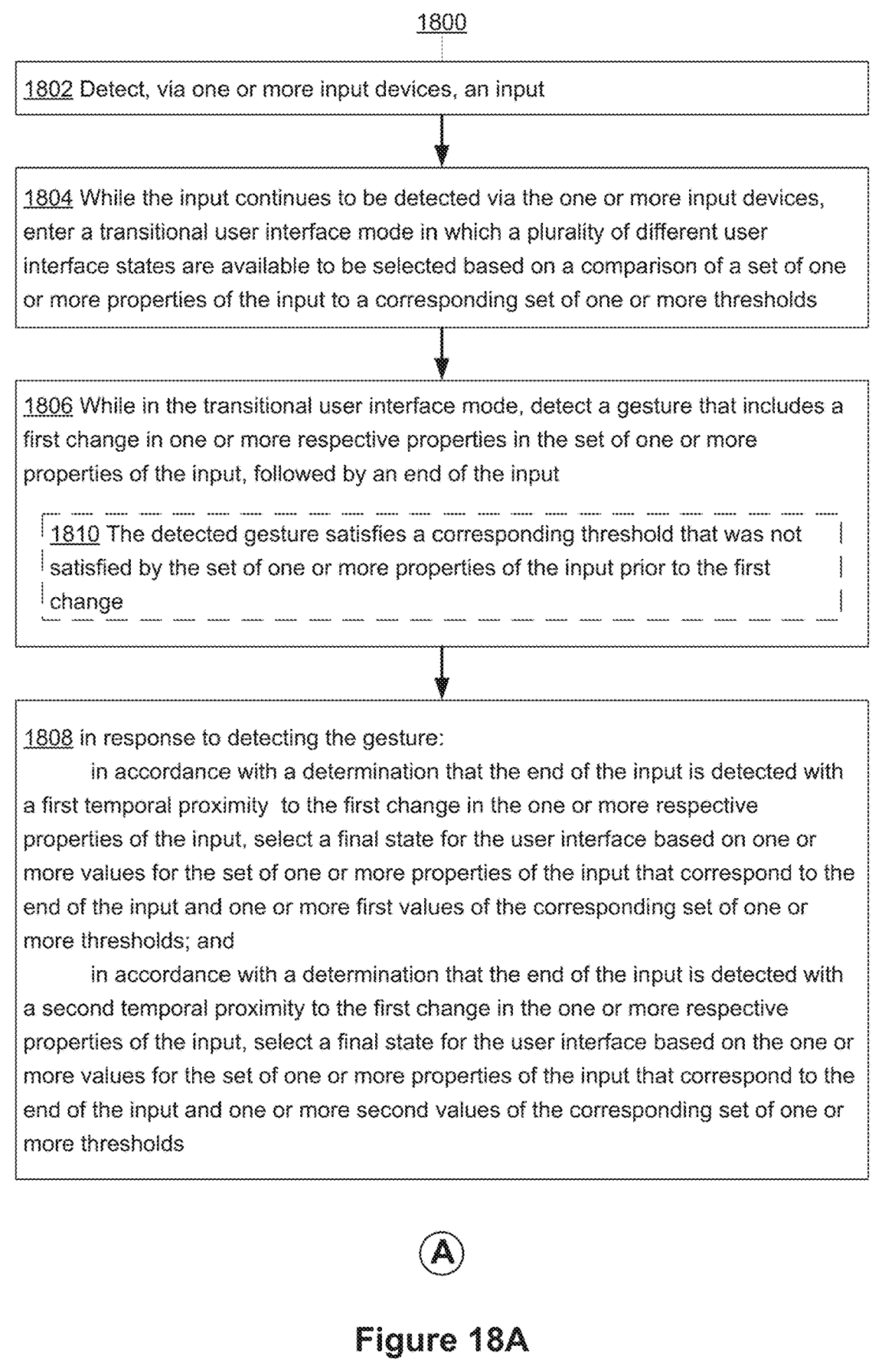

1802 Detect, via one or more input devices, an input

↓

1804 While the input continues to be detected via the one or more input devices, enter a transitional user interface mode in which a plurality of different user interface states are available to be selected based on a comparison of a set of one or more properties of the input to a corresponding set of one or more thresholds

↓

1806 While in the transitional user interface mode, detect a gesture that includes a first change in one or more respective properties in the set of one or more properties of the input, followed by an end of the input 1810 The detected gesture satisfies a corresponding threshold that was not satisfied by the set of one or more properties of the input prior to the first change

↓

1808 in response to detecting the gesture:

in accordance with a determination that the end of the input is detected with a first temporal proximity to the first change in the one or more respective properties of the input, select a final state for the user interface based on one or more values for the set of one or more properties of the input that correspond to the end of the input and one or more first values of the corresponding set of one or more thresholds; and in accordance with a determination that the end of the input is detected with a second temporal proximity to the first change in the one or more respective properties of the input, select a final state for the user interface based on the one or more values for the set of one or more properties of the input that correspond to the end of the input and one or more second values of the corresponding set of one or more thresholds

Figure 18B:
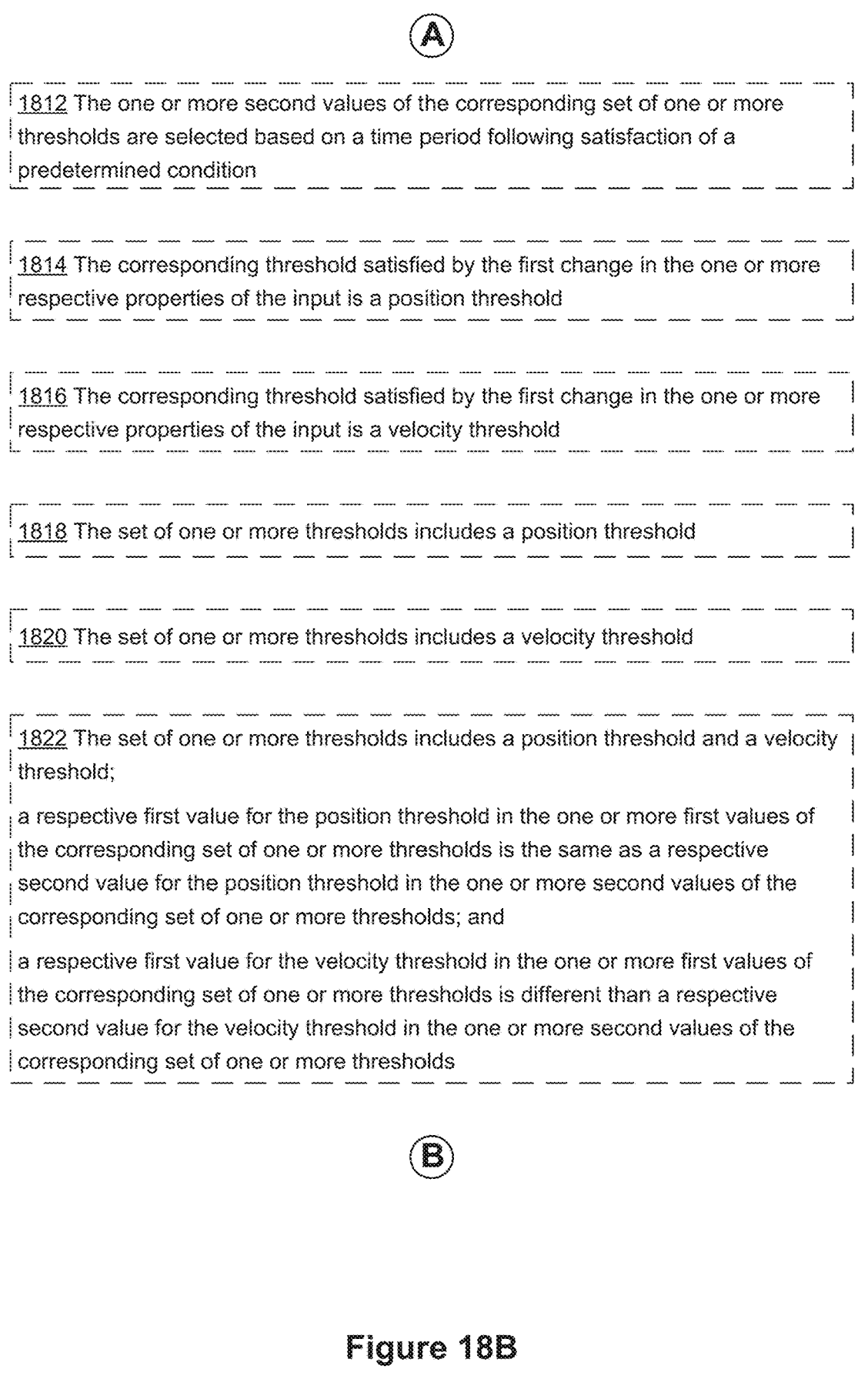

1812 The one or more second values of the corresponding set of one or more thresholds are selected based on a time period following satisfaction of a predetermined condition 1814 The corresponding threshold satisfied by the first change in the one or more respective properties of the input is a position threshold 1816 The corresponding threshold satisfied by the first change in the one or more respective properties of the input is a velocity threshold 1818 The set of one or more thresholds includes a position threshold 1820 The set of one or more thresholds includes a velocity threshold 1822 The set of one or more thresholds includes a position threshold and a velocity threshold;

a respective first value for the position threshold in the one or more first values of the corresponding set of one or more thresholds is the same as a respective second value for the position threshold in the one or more second values of the corresponding set of one or more thresholds; and a respective first value for the velocity threshold in the one or more first values of the corresponding set of one or more thresholds is different than a respective second value for the velocity threshold in the one or more second values of the corresponding set of one or more thresholds (B)

Figure 18B (B)

Figure 18C:
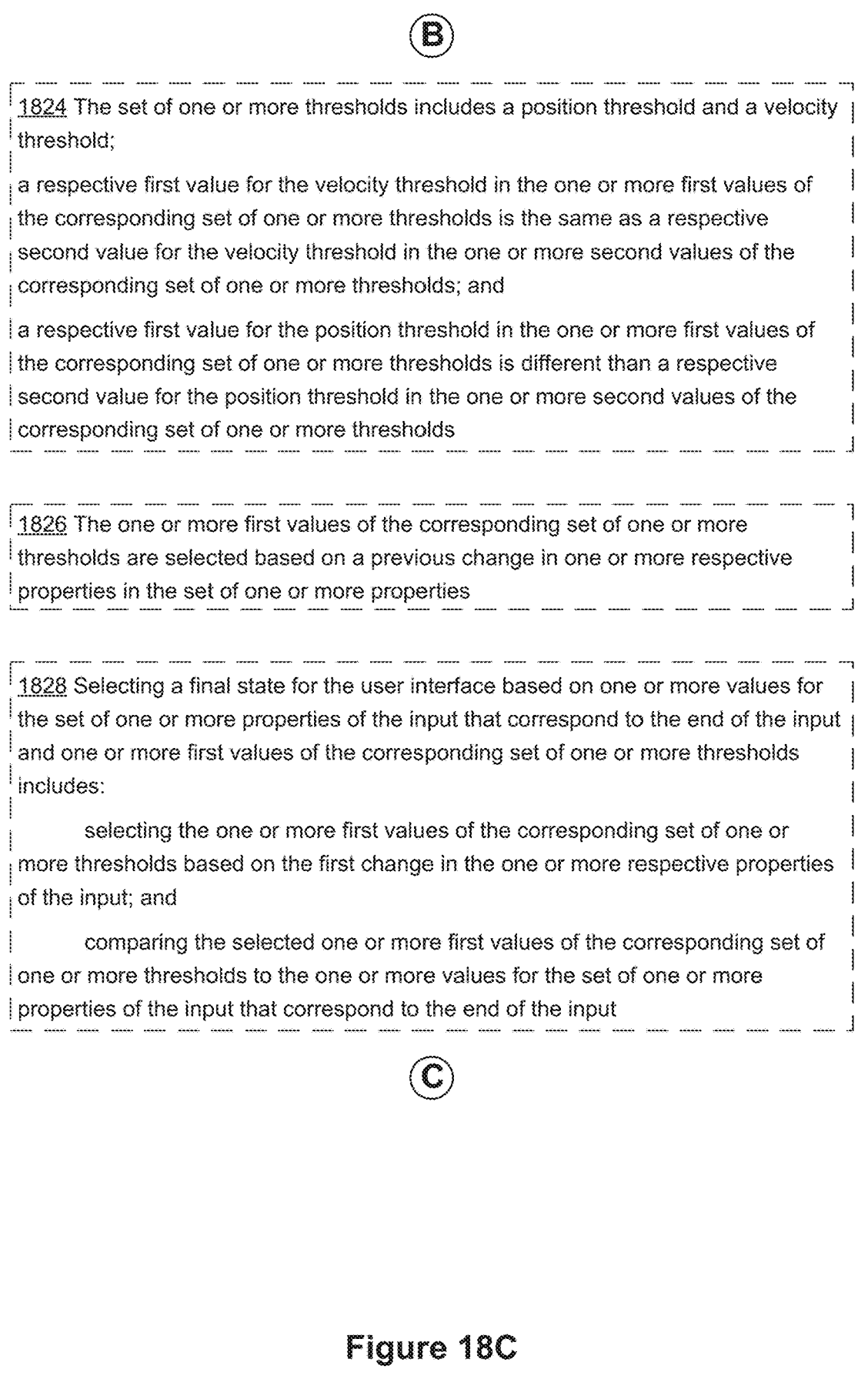

1824 The set of one or more thresholds includes a position threshold and a velocity threshold;

a respective first value for the velocity threshold in the one or more first values of the corresponding set of one or more thresholds is the same as a respective second value for the velocity threshold in the one or more second values of the corresponding set of one or more thresholds; and a respective first value for the position threshold in the one or more first values of the corresponding set of one or more thresholds is different than a respective second value for the position threshold in the one or more second values of the corresponding set of one or more thresholds 1826 The one or more first values of the corresponding set of one or more thresholds are selected based on a previous change in one or more respective properties in the set of one or more properties 1828 Selecting a final state for the user interface based on one or more values for the set of one or more properties of the input that correspond to the end of the input and one or more first values of the corresponding set of one or more thresholds includes:

selecting the one or more first values of the corresponding set of one or more thresholds based on the first change in the one or more respective properties of the input; and comparing the selected one or more first values of the corresponding set of one or more thresholds to the one or more values for the set of one or more properties of the input that correspond to the end of the input (C)

Figure 18C (C)

Figure 18D:
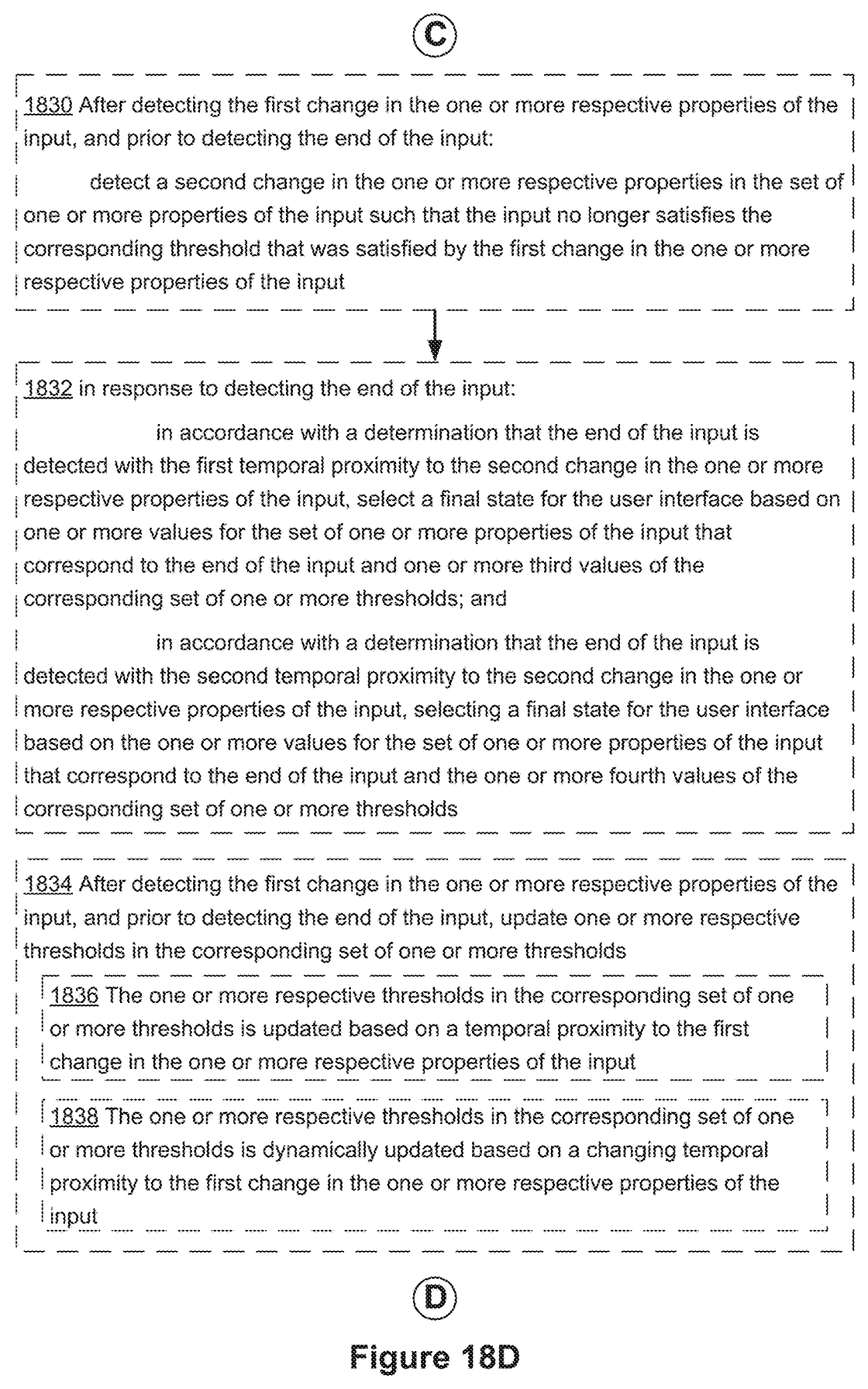

1830 After detecting the first change in the one or more respective properties of the input, and prior to detecting the end of the input:

detect a second change in the one or more respective properties in the set of one or more properties of the input such that the input no longer satisfies the corresponding threshold that was satisfied by the first change in the one or more respective properties of the input

↓

1832 in response to detecting the end of the input:

in accordance with a determination that the end of the input is detected with the first temporal proximity to the second change in the one or more respective properties of the input, select a final state for the user interface based on one or more values for the set of one or more properties of the input that correspond to the end of the input and one or more third values of the corresponding set of one or more thresholds; and in accordance with a determination that the end of the input is detected with the second temporal proximity to the second change in the one or more respective properties of the input, selecting a final state for the user interface based on the one or more values for the set of one or more properties of the input that correspond to the end of the input and the one or more fourth values of the corresponding set of one or more thresholds 1834 After detecting the first change in the one or more respective properties of the input, and prior to detecting the end of the input, update one or more respective thresholds in the corresponding set of one or more thresholds 1836 The one or more respective thresholds in the corresponding set of one or more thresholds is updated based on a temporal proximity to the first change in the one or more respective properties of the input 1838 The one or more respective thresholds in the corresponding set of one or more thresholds is dynamically updated based on a changing temporal proximity to the first change in the one or more respective properties of the input (D)

Figure 18E:
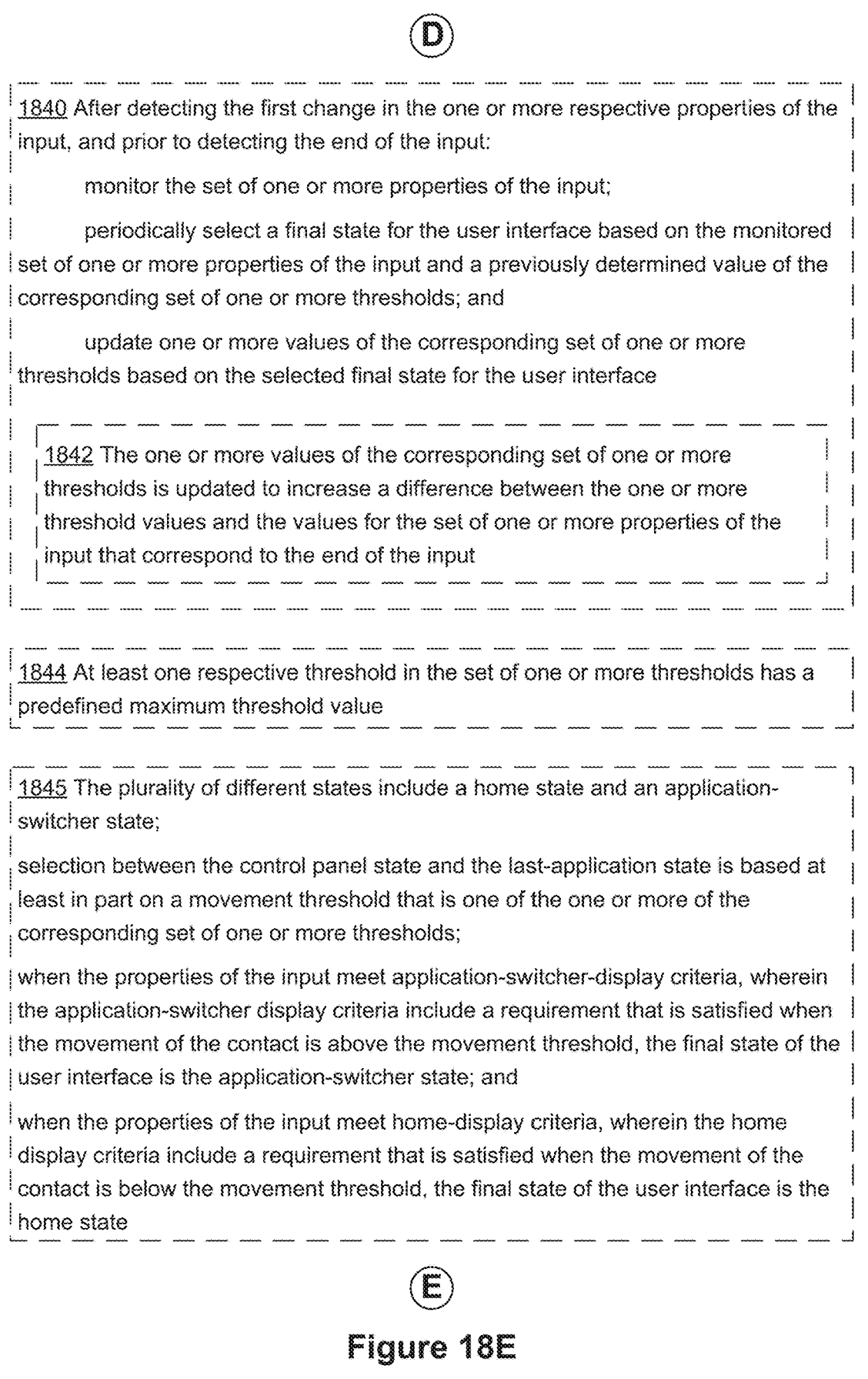

1840 After detecting the first change in the one or more respective properties of the input, and prior to detecting the end of the input:

monitor the set of one or more properties of the input;

periodically select a final state for the user interface based on the monitored set of one or more properties of the input and a previously determined value of the corresponding set of one or more thresholds; and update one or more values of the corresponding set of one or more thresholds based on the selected final state for the user interface 1842 The one or more values of the corresponding set of one or more thresholds is updated to increase a difference between the one or more threshold values and the values for the set of one or more properties of the input that correspond to the end of the input 1844 At least one respective threshold in the set of one or more thresholds has a predefined maximum threshold value 1845 The plurality of different states include a home state and an application-switcher state;

selection between the control panel state and the last-application state is based at least in part on a movement threshold that is one of the one or more of the corresponding set of one or more thresholds;

when the properties of the input meet application-switcher-display criteria, wherein the application-switcher display criteria include a requirement that is satisfied when the movement of the contact is above the movement threshold, the final state of the user interface is the application-switcher state; and when the properties of the input meet home-display criteria, wherein the home display criteria include a requirement that is satisfied when the movement of the contact is below the movement threshold, the final state of the user interface is the home state

Figure 18F:
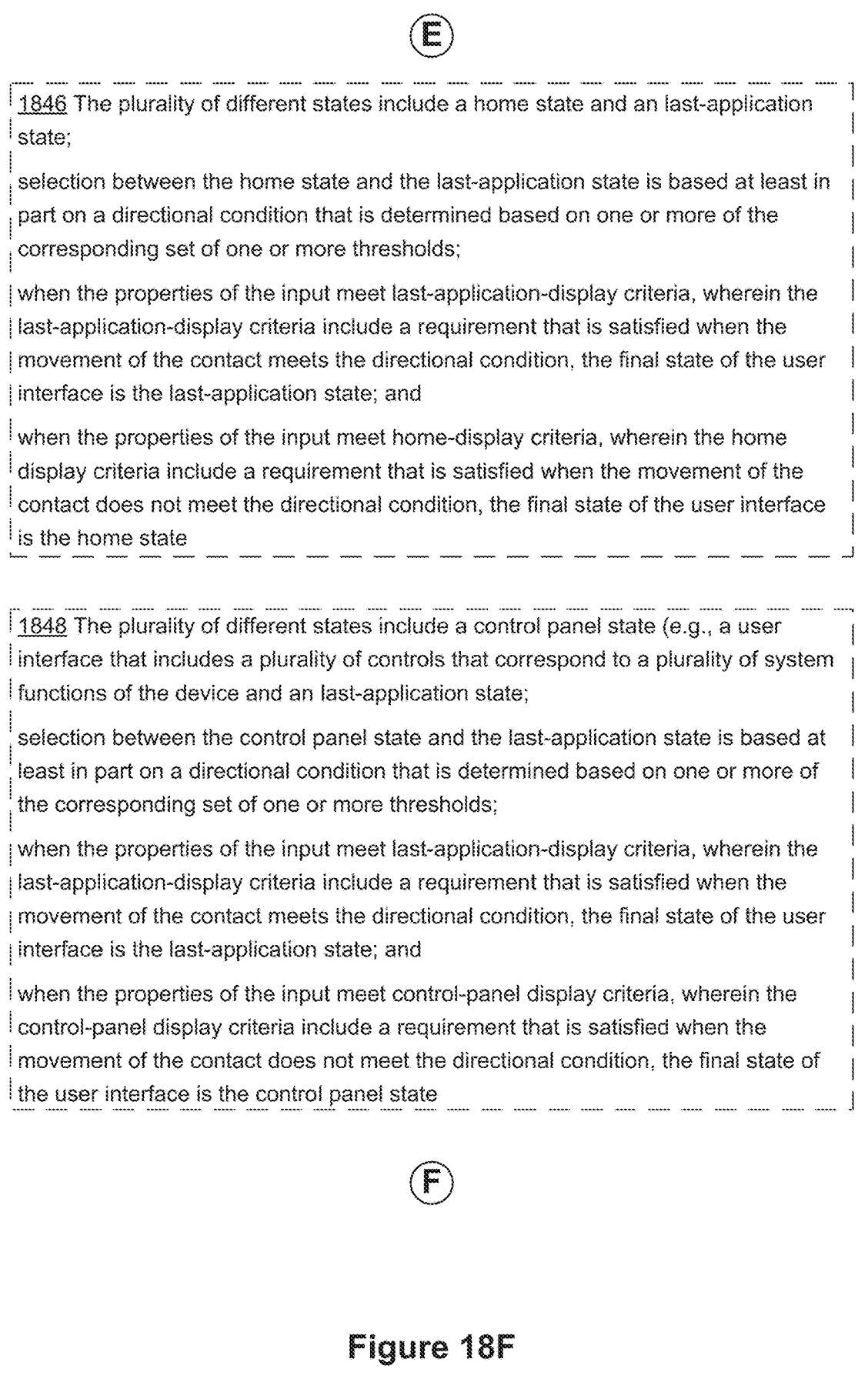

1846 The plurality of different states include a home state and an last-application state;

selection between the home state and the last-application state is based at least in part on a directional condition that is determined based on one or more of the corresponding set of one or more thresholds;

when the properties of the input meet last-application-display criteria, wherein the last-application-display criteria include a requirement that is satisfied when the movement of the contact meets the directional condition, the final state of the user interface is the last-application state; and when the properties of the input meet home-display criteria, wherein the home display criteria include a requirement that is satisfied when the movement of the contact does not meet the directional condition, the final state of the user interface is the home state 1848 The plurality of different states include a control panel state (e.g., a user interface that includes a plurality of controls that correspond to a plurality of system functions of the device and an last-application state;

selection between the control panel state and the last-application state is based at least in part on a directional condition that is determined based on one or more of the corresponding set of one or more thresholds;

when the properties of the input meet last-application-display criteria, wherein the last-application-display criteria include a requirement that is satisfied when the movement of the contact meets the directional condition, the final state of the user interface is the last-application state; and when the properties of the input meet control-panel display criteria, wherein the control-panel display criteria include a requirement that is satisfied when the movement of the contact does not meet the directional condition, the final state of the user interface is the control panel state

Figure 18G:
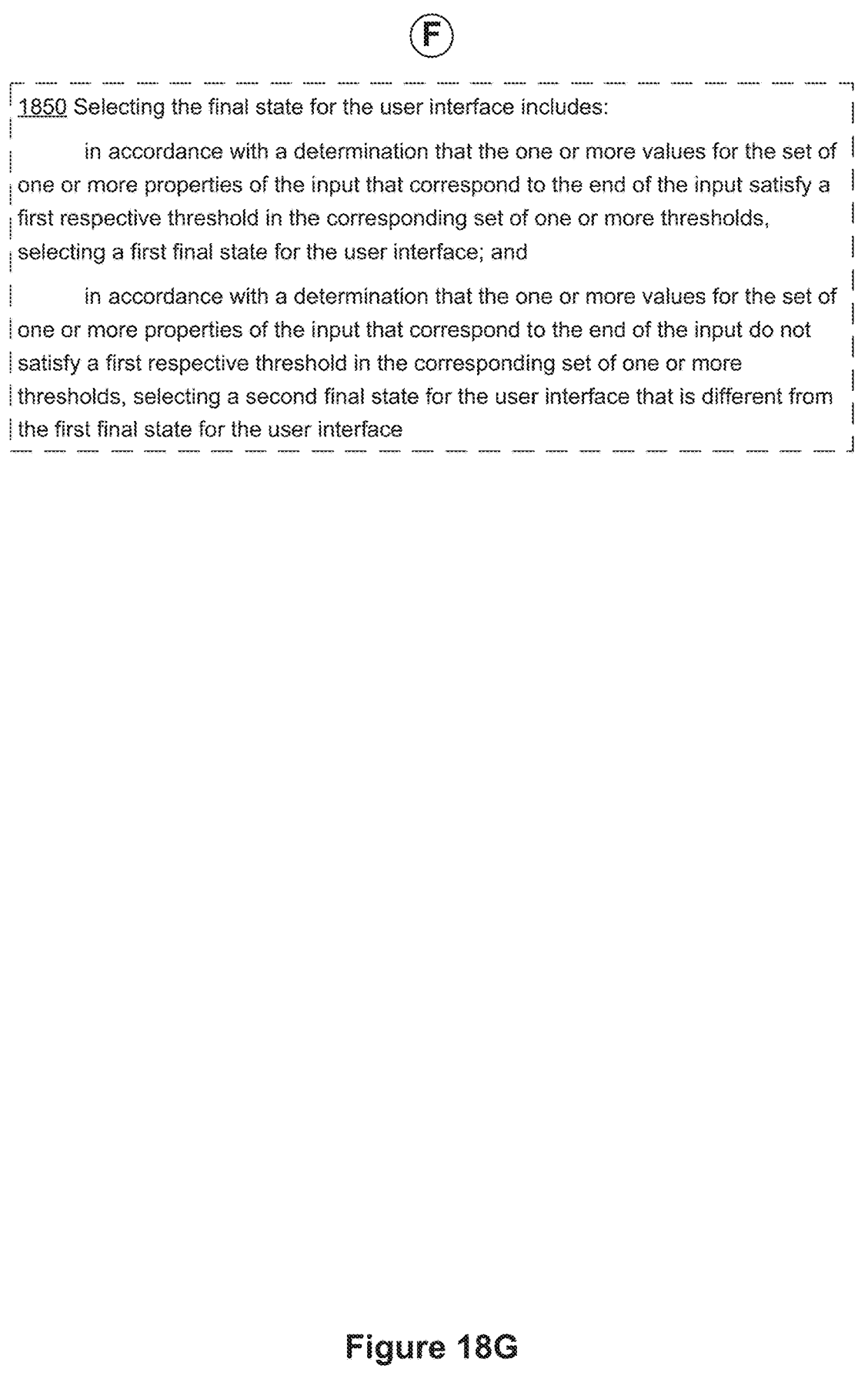

1850 Selecting the final state for the user interface includes:

in accordance with a determination that the one or more values for the set of one or more properties of the input that correspond to the end of the input satisfy a first respective threshold in the corresponding set of one or more thresholds, selecting a first final state for the user interface; and in accordance with a determination that the one or more values for the set of one or more properties of the input that correspond to the end of the input do not satisfy a first respective threshold in the corresponding set of one or more thresholds, selecting a second final state for the user interface that is different from the first final state for the user interface

Figure 19A:
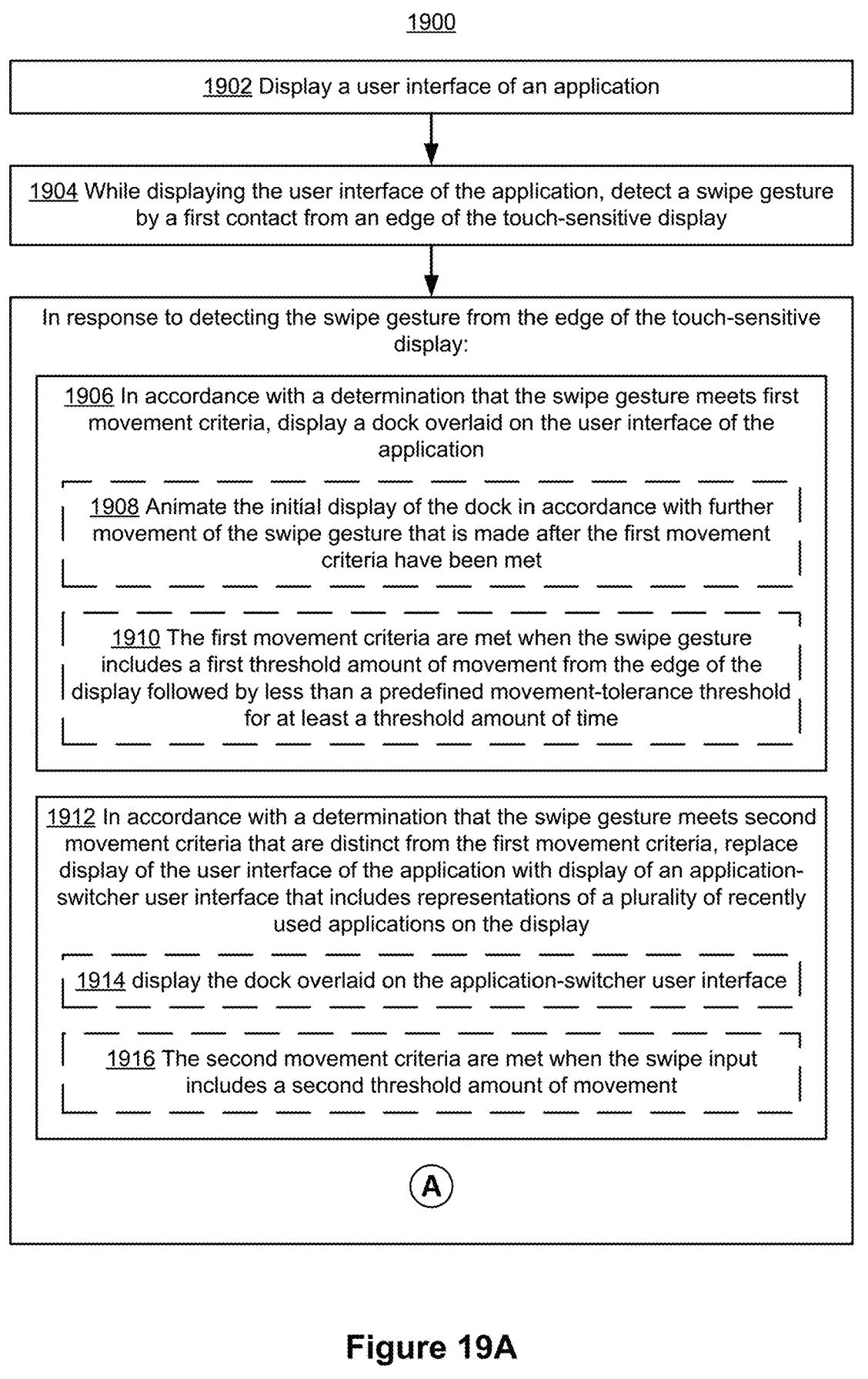

1902 Display a user interface of an application

↓

1904 While displaying the user interface of the application, detect a swipe gesture by a first contact from an edge of the touch-sensitive display

↓

In response to detecting the swipe gesture from the edge of the touch-sensitive display:

1906 In accordance with a determination that the swipe gesture meets first movement criteria, display a dock overlaid on the user interface of the application 1908 Animate the initial display of the dock in accordance with further movement of the swipe gesture that is made after the first movement criteria have been met 1910 The first movement criteria are met when the swipe gesture includes a first threshold amount of movement from the edge of the display followed by less than a predefined movement-tolerance threshold for at least a threshold amount of time 1912 In accordance with a determination that the swipe gesture meets second movement criteria that are distinct from the first movement criteria, replace display of the user interface of the application with display of an application-switcher user interface that includes representations of a plurality of recently used applications on the display 1914 display the dock overlaid on the application-switcher user interface 1916 The second movement criteria are met when the swipe input includes a second threshold amount of movement

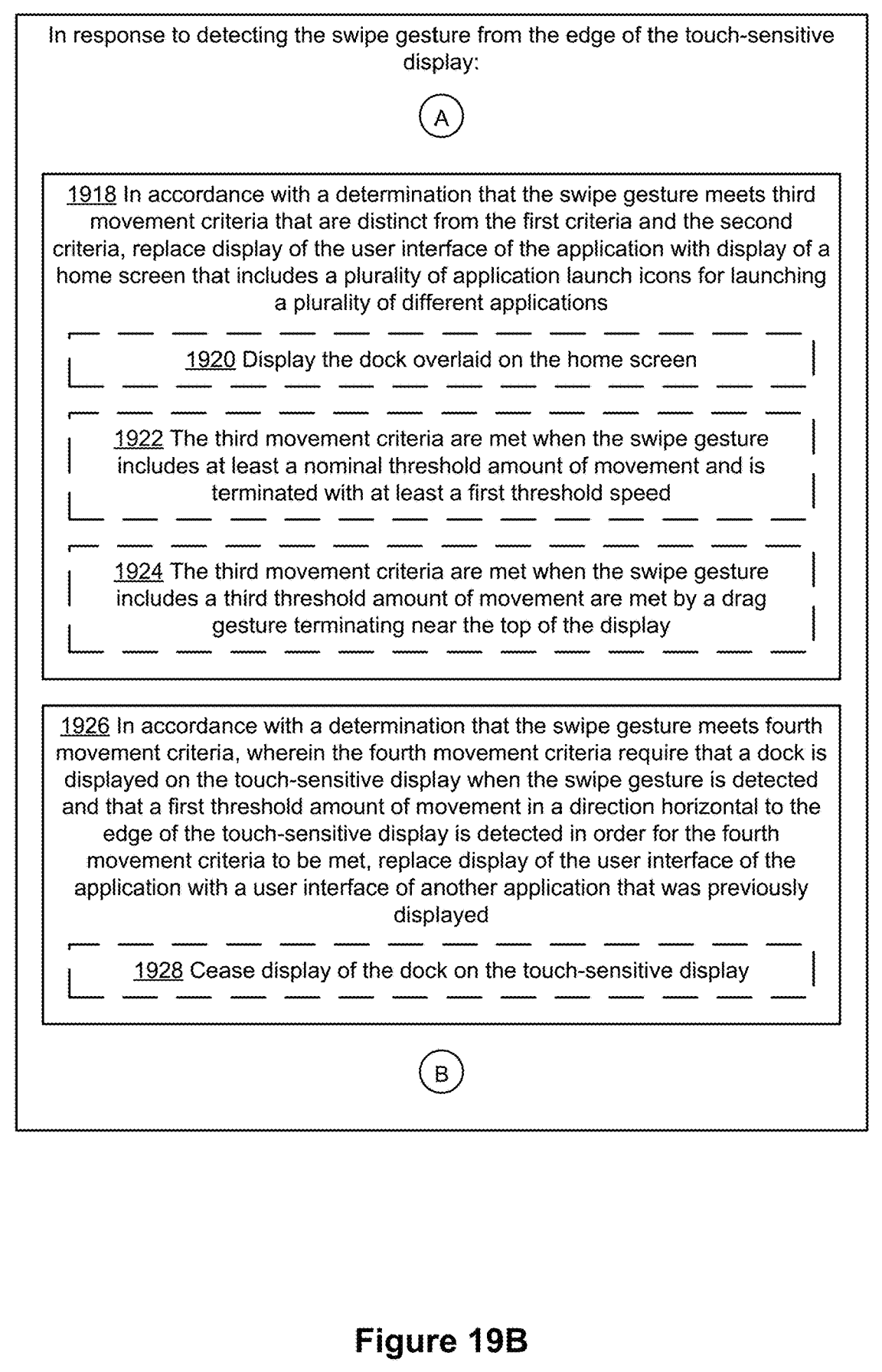

In response to detecting the swipe gesture from the edge of the touch-sensitive display:

(A)

1918 In accordance with a determination that the swipe gesture meets third movement criteria that are distinct from the first criteria and the second criteria, replace display of the user interface of the application with display of a home screen that includes a plurality of application launch icons for launching a plurality of different applications 1920 Display the dock overlaid on the home screen 1922 The third movement criteria are met when the swipe gesture includes at least a nominal threshold amount of movement and is terminated with at least a first threshold speed 1924 The third movement criteria are met when the swipe gesture includes a third threshold amount of movement are met by a drag gesture terminating near the top of the display 1926 In accordance with a determination that the swipe gesture meets fourth movement criteria, wherein the fourth movement criteria require that a dock is displayed on the touch-sensitive display when the swipe gesture is detected and that a first threshold amount of movement in a direction horizontal to the edge of the touch-sensitive display is detected in order for the fourth movement criteria to be met, replace display of the user interface of the application with a user interface of another application that was previously displayed 1928 Cease display of the dock on the touch-sensitive display (B)

Figure 19B

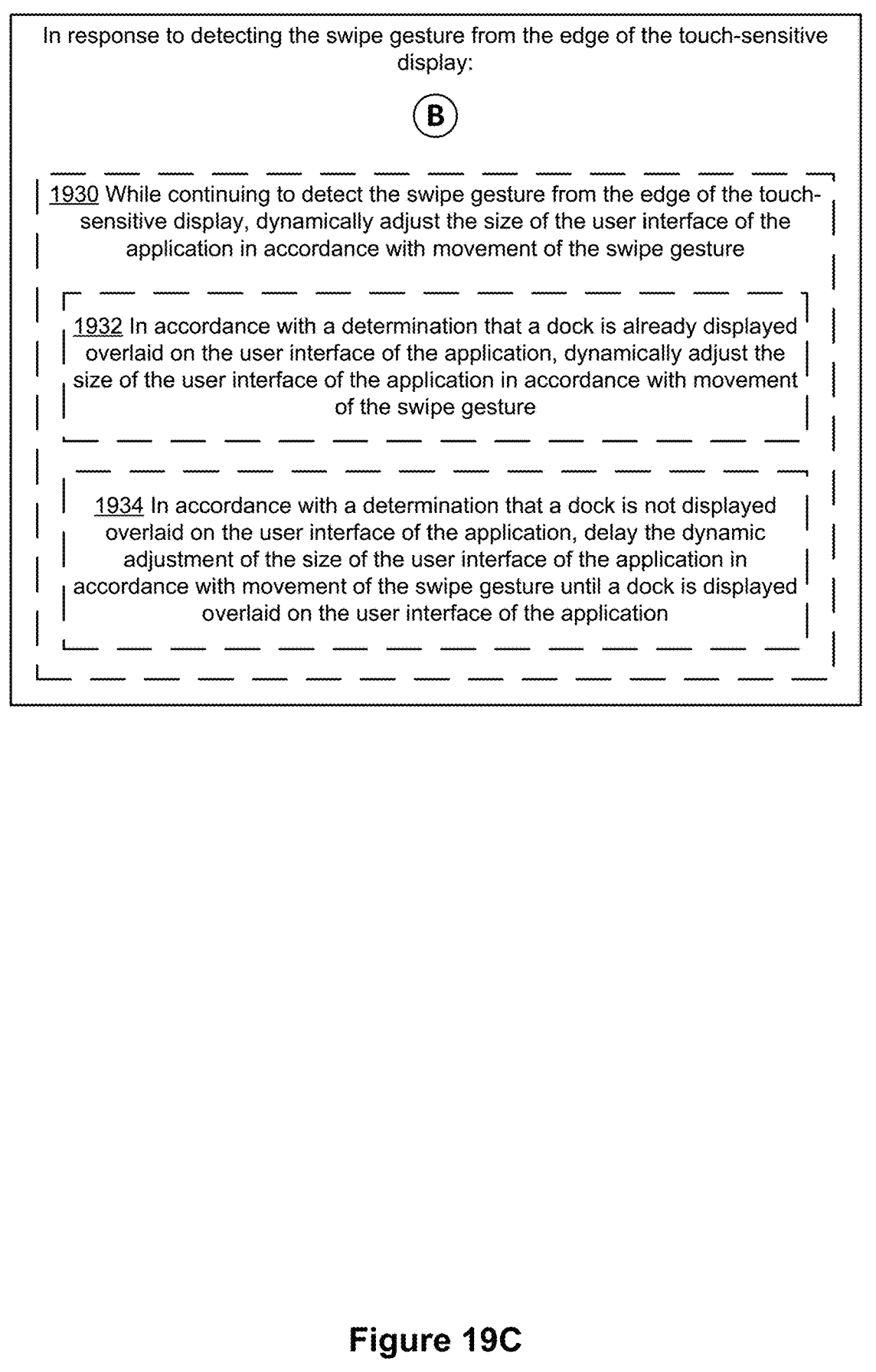

In response to detecting the swipe gesture from the edge of the touch-sensitive display:

(B)

1930 While continuing to detect the swipe gesture from the edge of the touch-sensitive display, dynamically adjust the size of the user interface of the application in accordance with movement of the swipe gesture 1932 In accordance with a determination that a dock is already displayed overlaid on the user interface of the application, dynamically adjust the size of the user interface of the application in accordance with movement of the swipe gesture 1934 In accordance with a determination that a dock is not displayed overlaid on the user interface of the application, delay the dynamic adjustment of the size of the user interface of the application in accordance with movement of the swipe gesture until a dock is displayed overlaid on the user interface of the application

Figure 19C

DEVICES, METHODS, AND GRAPHICAL USER INTERFACES FOR NAVIGATING BETWEEN USER INTERFACES AND INTERACTING WITH CONTROL OBJECTS

RELATED APPLICATIONS

This application claims priority to U.S. Provisional Application No. 62/668,171, filed May 7, 2018, U.S. Provisional Application No. 62/557,101, filed Sep. 11, 2017, U.S. Provisional Application No. 62/556,410, filed Sep. 9, 2017, U.S. Provisional Application No. 62/514,900, filed Jun. 4, 2017, and U.S. Provisional Application No. 62/507,212, filed May 16, 2017, all of which are incorporated herein by reference in their entirety.

TECHNICAL FIELD

This relates generally to electronic devices with touch-sensitive surfaces, including but not limited to electronic devices with touch-sensitive surfaces for navigating between user interfaces and interacting with control objects.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with improved methods and interfaces for navigating between user interfaces and interacting with control objects. Such methods and interfaces optionally complement or replace conventional methods for navigating between user interfaces and interacting with control objects. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a device having a display and a touch-sensitive surface. The method includes: displaying a first user interface of a first application on the display; while displaying the first user interface on the display, detecting a first portion of an input by a first contact, including detecting the first contact on the touch-sensitive surface, and after detecting the first portion of the input by the first contact, detecting a second portion of the input by the first contact, including detecting first movement of the first contact across the touch-sensitive surface in a first direction; displaying, during the first movement of the first contact across the touch-sensitive surface, a plurality of application views that including a first application view that corresponds to the first user interface of the first application and a second application view that corresponds to a second user interface of a second application that is different from the first application; while displaying the plurality of application views, detecting a third portion of the input by the first contact, including detecting liftoff of the first contact from the touch-sensitive surface after detecting the first movement by the first contact; and in response to detecting the third portion of the input by the first contact: in accordance with a determination that application-switcher-display criteria are met, wherein application-switcher-display criteria require that the second portion of the input or the first application view meets a first movement condition in order for the application-switcher-display criteria to be met, displaying an application-switcher user interface that includes a plurality of representations of applications for selectively activating one of a plurality of applications represented in the application-switcher user interface; and in accordance with a determination that home-display criteria are met, wherein the home-display criteria require that the second portion of the input or the first application view meets a second movement condition that is different from the first movement condition in order for the home-display criteria to be met, displaying a home screen user interface that includes a plurality of application launch icons that correspond to a plurality of applications.

In accordance with some embodiments, a method is performed at a device having a display and a touch-sensitive surface. The method includes: displaying a first user interface of a first application on the display; while displaying the first user interface of the first application on the display, detecting an input by a first contact, including detecting the first contact on the touch-sensitive surface, detecting first movement of the first contact across the touch-sensitive surface, and detecting liftoff of the first contact at an end of the first movement, and in response to detecting the input by the first contact: in accordance with a determination that the input meets last-application-display criteria, wherein the last-application-display criteria require that the first movement meets a first directional condition in order for the last-application-display criteria to be met, displaying a second user interface of a second application that is distinct from the first application; and in accordance with a determination that the input meets home-display criteria, wherein the home-display criteria require that the first movement meets a second directional condition that is distinct from the first directional condition in order for the home-display criteria to be met, displaying a home screen user interface that includes a plurality of application launch icons that correspond to a plurality of applications installed on the device.

In accordance with some embodiments, a method is performed at a device having a display and a touch-sensitive surface. The method includes: displaying a first user interface of a first application on the display; while displaying the first user interface of the first application on the display, detecting an input by a first contact, including detecting the first contact on the touch-sensitive surface, detecting first movement of the first contact across the touch-sensitive surface, and detecting liftoff of the first contact at an end of the first movement, and in response to detecting the input by the first contact: in accordance with a determination that the input meets edge-swipe criteria and that the first movement meets a first directional condition, displaying a second user interface of a second application that is distinct from the first application; in accordance with a determination that the input meets the edge-swipe criteria and that the first movement meets a second directional condition that is distinct from the first directional condition, displaying a control panel user interface that includes a plurality of controls that correspond to a plurality of system functions of the device; and in accordance with a determination that the input does not meet the edge-swipe criteria: forgoing displaying the second user interface of the second application; forgoing displaying the control panel user interface; and performing a function within the first application in accordance with the first movement of the first contact.

In accordance with some embodiments, a method is performed at a device having a display and a touch-sensitive surface. The method includes: displaying a first user interface of a first application on the display; while displaying the first user interface of the first application, detecting a first input by a first contact on the touch-sensitive surface that meets navigation-gesture criteria, wherein the navigation-gesture criteria require that the first input includes a movement of the first contact across the touch-sensitive surface that crosses a boundary of a predefined edge region of the touch-sensitive surface in order for the navigation-gesture criteria to be met; in response to detecting the first input by the first contact that meets the navigation-gesture criteria: in accordance with a determination that the first application is not protected, ceasing to display the first user interface of the first application and displaying a respective other user interface on the display; and in accordance with a determination that the first application is protected, maintaining display of the first user interface of the first application without displaying the respective other user interface.

In accordance with some embodiments, a method is performed at a device having a display and a touch-sensitive surface. The method includes: displaying a control panel user interface, wherein the control panel user interface includes a first control region, and the first control region includes a first control for controlling a first function of the device and a second control for controlling a second function of the device; detecting a first input by a first contact on the touch-sensitive surface; and in response to detecting the first input by the first contact on the touch-sensitive surface: in accordance with a determination that the first input meets control-region-expansion criteria, wherein the control-region-expansion criteria require that an intensity of the first contact exceeds a first intensity threshold in order for the control-region-expansion criteria to be met, replacing display of the first control region with display of an expanded first control region, wherein the expanded first control region includes the first control, the second control, and one or more additional controls that are not included in the first control region; in accordance with a determination that the first input meets first-control-activation criteria, wherein the first-control-activation criteria require that the first contact is detected at a first location on the touch-sensitive surface that corresponds to the first control in the first control region and do not require that intensity of the first contact exceeds the first intensity threshold in order for the first-control-activation criteria to be met, activating the first control for controlling the first function of the device; and in accordance with a determination that the first input meets second-control-activation criteria, wherein the second-control-activation criteria require that the first contact is detected at a second location on the touch-sensitive surface that corresponds to the second control in the first control region and do not require that intensity of the first contact exceeds the first intensity threshold in order for the second-control-activation criteria to be met, activating the second control for controlling the second function of the device.

In accordance with some embodiments, a method is performed at a device having a display and a touch-sensitive surface. The method includes: displaying a first user interface on the display; while displaying the first user interface, detecting a first input; in response to detecting the first input, displaying a control panel user interface in a first configuration, wherein: the control panel user interface in the first configuration includes a first set of control affordances in a first region of the control panel user interface that correspond to respective functions of the device, and a first subset of the first set of control affordances are not user-configurable and a second subset of the first set of control affordances are user-configurable; after displaying the control panel user interface in the first configuration, detecting a second input; in response to detecting the second input, displaying a control panel settings user interface, wherein: the control panel settings user interface displays: representations of the second subset of the first set of control affordances in a selected state without displaying the first subset of the first set of control affordances in the selected state; and representations of a second set of control affordances, distinct from the first set of control affordances, in an unselected state, wherein control affordances that correspond to representations of the second set of control affordances are not included in the control panel user interface in the first configuration; while displaying the control panel settings user interface, detecting one or more configuration inputs, including detecting a third input that changes a selection state for a representation of a first control affordance in the second set of control affordances from the unselected state to the selected state; after detecting the third input that changes the selection state for the representation of the first control affordance from the unselected state to the selected state, detecting a fourth input; and, in response to detecting the fourth input, displaying the control panel user interface in a second configuration that is distinct from the first configuration, wherein the control panel user interface in the second configuration includes the first control affordance in the first region of the control panel user interface.

In accordance with some embodiments, a method is performed at a device having a display and a touch-sensitive surface. The method includes: displaying a first user interface that includes a slider control on the display, wherein the slider control includes: respective indications of a plurality of control values for a control function that corresponds to the slider control including a maximum value, a minimum value, and one or more intermediate values between the maximum and minimum values, and an indicator that marks a currently selected control value among the plurality of control values; while displaying the slider control, detecting an input by a contact, including detecting the contact on the touch-sensitive surface at a location that corresponds to the slider control in the first user interface; and in response to detecting the input by the contact: in accordance with a determination that the input meets control-adjustment criteria, wherein the control-adjustment criteria require that more than a threshold amount of movement of the contact across the touch-sensitive surface is detected in order for the control-adjustment criteria to be met, changing a position of the indicator to indicate an update to the currently selected control value among the plurality of control values in accordance with the movement of the contact; and in accordance with a determination that the input meets slider-toggle criteria, wherein the slider-toggle criteria require that lift-off of the contact is detected with less than the threshold amount of movement of the contact across the touch-sensitive surface in order for the slider-toggle criteria to be met, toggling the control function that corresponds to the slider control.

In accordance with some embodiments, a method is performed at an electronic device with a display and a touch-sensitive surface. The method includes: displaying, on the display, a first user interface that includes one or more applications displayed without displaying a dock; while displaying the first user interface, detecting a sequence of one or more inputs that includes detecting movement of a contact from an edge of the device onto the device; and in response to detecting the sequence of one or more inputs: in accordance with a determination that the sequence of one or more inputs meets dock-display criteria, displaying the dock overlaid on the first user interface without displaying a control panel; and in accordance with a determination that the sequence of one or more inputs meets control-panel-display criteria, displaying the control panel.

In accordance with some embodiments, a method is performed at an electronic device with a touch-sensitive display. The method includes: detecting a first swipe gesture in a respective direction from a first edge of the touch-sensitive display and in response to detecting the first swipe gesture from the first edge of the touch-sensitive display: in accordance with a determination that a respective portion of the first swipe gesture occurs at a first portion of the first edge of the touch-sensitive display, displaying a plurality of controls for adjusting settings of the touch-sensitive display; and in accordance with a determination that the respective portion of the first swipe gesture occurs at a second portion of the first edge of the touch-sensitive display, displaying a plurality of recently received notifications.

In accordance with some embodiments, a method is performed at an electronic device with one or more input devices. The method includes detecting, via the one or more input devices, an input. While the input continues to be detected via the one or more input devices, the method includes entering a transitional user interface mode in which a plurality of different user interface states are available to be selected based on a comparison of a set of one or more properties of the input to a corresponding set of one or more thresholds. While in the transitional user interface mode, the method includes detecting a gesture that includes a first change in one or more respective properties in the set of one or more properties of the input and, in response to detecting the gesture: in accordance with a determination that the end of the input is detected with a first temporal proximity to the first change in the one or more respective properties of the input, selecting a final state for the user interface based on one or more values for the set of one or more properties of the input that correspond to the end of the input and one or more first values of the corresponding set of one or more thresholds; and in accordance with a determination that the end of the input is detected with a second temporal proximity to the first change in the one or more respective properties of the input, selecting a final state for the user interface based on the one or more values for the set of one or more properties of the input that correspond to the end of the input and one or more second values of the corresponding set of one or more thresholds.

In accordance with some embodiments, a method is performed at an electronic device with a touch-sensitive display. The method includes: displaying a user interface of an application; while displaying the user interface of the application, detecting a swipe gesture by a first contact from an edge of the touch-sensitive display: in response to detecting the swipe gesture from the edge of the touch-sensitive display: in accordance with a determination that the swipe gesture meets first movement criteria, displaying a dock overlaid on the user interface of the application; in accordance with a determination that the swipe gesture meets second movement criteria that are distinct from the first movement criteria, replacing display of the user interface of the application with display of an application-switcher user interface that includes representations of a plurality of recently used applications on the display; and in accordance with a determination that the swipe gesture meets third movement criteria that are distinct from the first criteria and the second criteria, replacing display of the user interface of the application with display of a home screen that includes a plurality of application launch icons for launching a plurality of different applications.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for navigating between user interfaces and interacting with control objects thereby increasing the effectiveness, efficiency, and user satisfaction with such devices. Such methods and interfaces optionally complement or replace conventional methods for navigating between user interfaces and interacting with control objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A77 illustrate example user interfaces for navigating between user interfaces, in accordance with some embodiments.

FIGS. 5B1-5B33 illustrate example user interfaces for limiting navigation to a different user interface (e.g., a system user interface or another application) when a currently displayed application is determined to be protected, in accordance with some embodiments.

FIGS. 5C1-5C45 illustrate example user interfaces for displaying a control panel user interface and, in response to different inputs, displaying an expanded region of the control panel user interface or activating a control, in accordance with some embodiments.

FIGS. 5D1-5D42 illustrate example user interfaces for displaying and editing a control panel user interface, in accordance with some embodiments.

FIGS. 5E1-5E39 illustrate example user interfaces for displaying a control panel user interface with a slider control and, in response to different inputs on the slider control, changing the position of the slider or toggling the control function, in accordance with some embodiments.

FIGS. 5F1-5F45 illustrate example user interfaces for displaying a dock or displaying a control panel instead of or in addition to the dock, in accordance with some embodiments.

FIGS. 5G1-5G17 illustrate example user interfaces for navigating to a control panel user interface from different user interfaces, in accordance with some embodiments.

FIGS. 5H1-5H27 illustrated example user interfaces for displaying a dock and navigating between user interfaces, in accordance with some embodiments.

FIGS. 6A-6L are flow diagrams illustrating a method of navigating between an application user interface, an application-switcher user interface, and a home screen user interface, in accordance with some embodiments.

FIGS. 7A-7F are flow diagrams illustrating a method of navigating to a home screen user interface or a recently open application in response to a navigation gesture, in accordance with some embodiments.

FIGS. 8A-8E are flow diagrams illustrating a method of navigating to a control panel user interface or a recently open application in response to a navigation gesture, in accordance with some embodiments.

FIGS. 9A-9D are flow diagrams illustrating a method of limiting operation of a navigation gesture, in accordance with some embodiments.

FIGS. 11A-11E are flow diagrams illustrating a method of displaying a control panel user interface and, in response to different inputs, displaying an expanded region of the control panel user interface or activating a control, in accordance with some embodiments.

FIGS. 12A-12I are flow diagrams illustrating a method of displaying and editing a control panel user interface, in accordance with some embodiments.

FIGS. 13A-13D are flow diagrams illustrating a method of displaying a control panel user interface with a slider control and, in response to different inputs on the slider control, changing the position of the slider or toggling the control function, in accordance with some embodiments.

FIGS. 14A-14E are flow diagrams illustrating a method of displaying a dock or displaying a control panel instead of or in addition to the dock, in accordance with some embodiments.

FIGS. 15A-15C are flow diagrams illustrating a method of navigating to a control panel user interface from different user interfaces, in accordance with some embodiments.

FIGS. 18A-18G are flow diagrams illustrating a method of navigating between user interfaces using one or more dynamic thresholds, in accordance with some embodiments.

FIGS. 19A-19C are flow diagrams illustrating a method of displaying a dock and navigating between different user interfaces, in accordance with some embodiments.

DESCRIPTION OF EMBODIMENTS

Conventional methods of navigating between user interfaces, in particular, between application user interfaces and system user interfaces (e.g., a home screen user interface, an application-switcher user interface, a control panel user interface) often require multiple separate inputs (e.g., gestures and button presses, etc.), and discrete user interface transitions that are irreversible. The embodiments below provide a single gesture that is dynamically adjustable cause navigation into different user interfaces (e.g., a recently open application, a home screen user interface, an application-switcher user interface, a control panel user interface), based on different criteria (e.g., different criteria based on position, timing, movement parameters, of the contact and/or user interface objects that are displayed). In addition, the embodiments below provide a customizable control panel user interface with control objects that include zoomed views with enhanced control functions, and depending on the user interaction that is detected, the controls respond in different manners, e.g., to toggle a control function, to transform into a slider control, or to zoom into an expanded control panel, etc. In addition, the embodiments below provide a method for displaying a dock or displaying a control panel instead of or in addition to the dock. In addition, the embodiments below provide a method for displaying a dock and/or navigating to an application-switcher user interface or a home screen user interface, based on different criteria (e.g., different criteria based on position, timing, movement parameters, of the contact and/or user interface objects that are displayed).

Figure 16A:
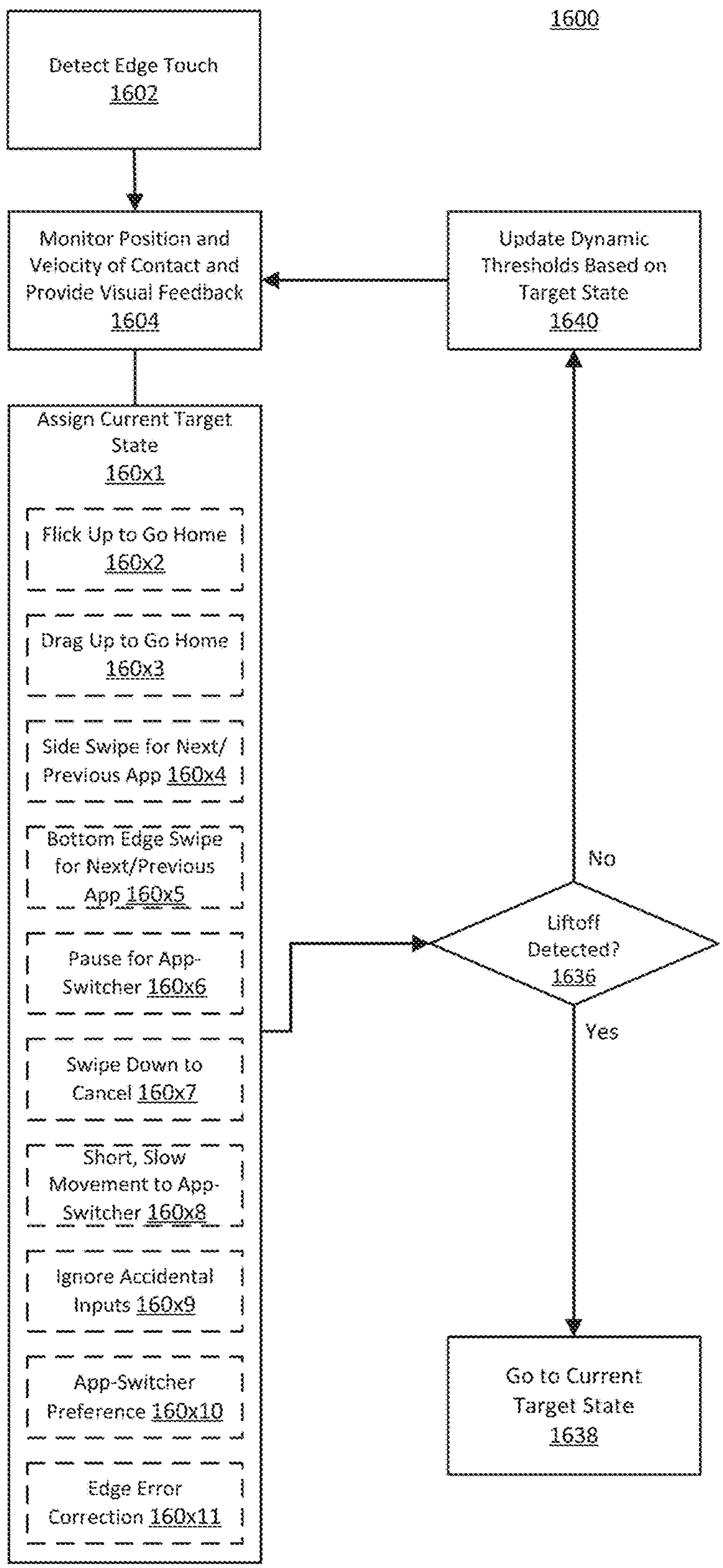
FIGS. 16A-16D are flow diagrams illustrating a method of navigating between application user interfaces, an application-switcher user interface, and a home screen user interface, in accordance with some embodiments.
Figure 16B:
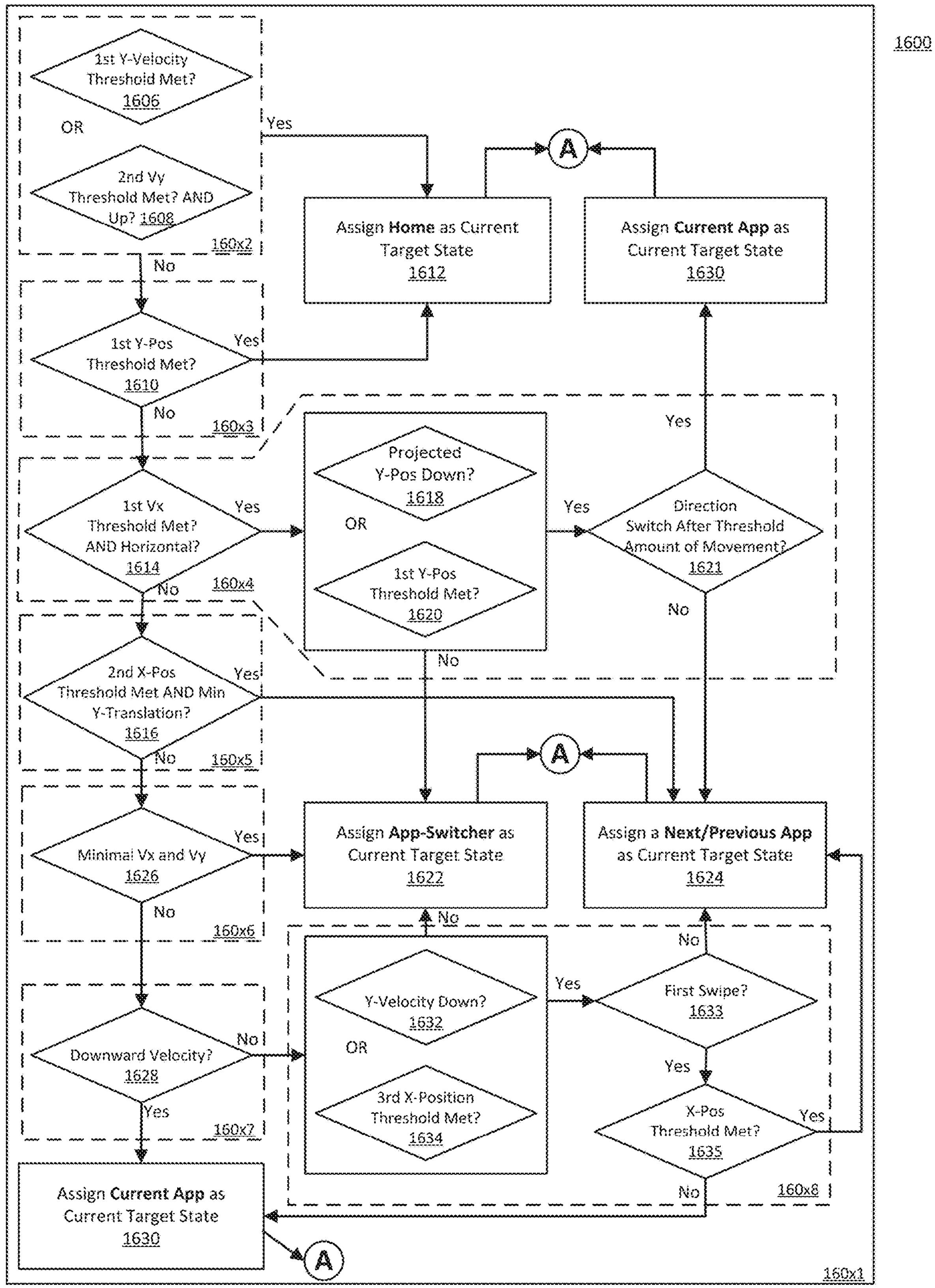
Figure 16C:
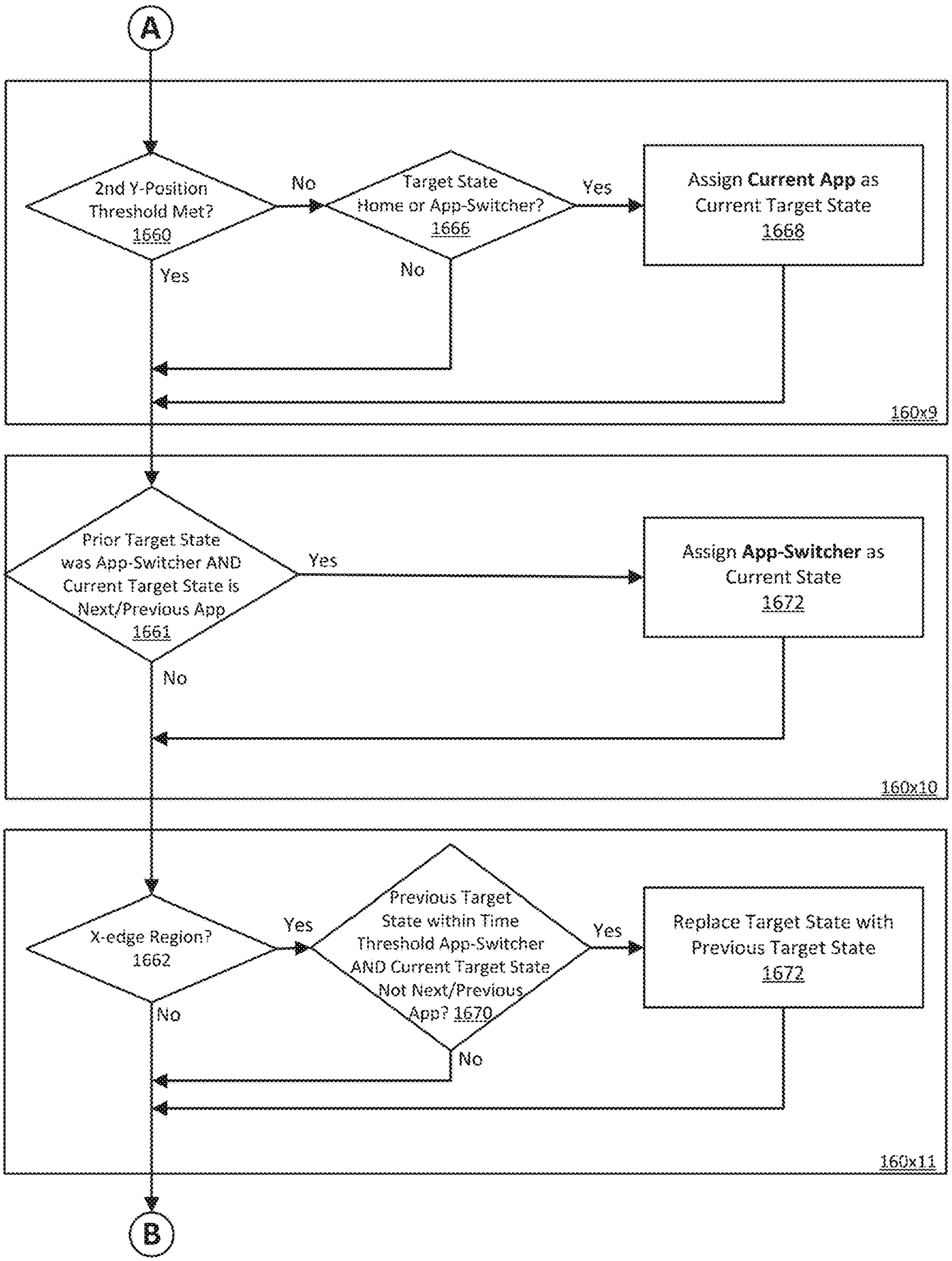

Below, FIGS. 1A-1B, 2, and 3 provide a description of example devices. FIGS. 4A-4B, 5A1-5A77, 5B1-5B33, 5C1-5C45, 5D1-5D42, 5E1-5E39, 5F1-5F45, 5G1-5G17, and 5H1-5H27 illustrate example user interfaces for navigating between user interfaces, interacting with control objects, and displaying a dock or control panel, in accordance with some embodiments. FIGS. 17A-17C illustrate examples of position and velocity thresholds, in accordance with some embodiments. FIGS. 6A-6L, 7A-7F, 8A-8E, 9A-9D, 10A-10B, 11A-11E, 12A-12I, 13A-13D, 14A-14E, 15A-15C, 16A-16D, 18A-18G, and 19A-19C are flow diagrams of methods of navigating between user interfaces, interacting with control objects, and displaying a dock or a control panel, in accordance with some embodiments. The user interfaces in FIGS. 4A-4B, 5A1-5A77, 5B1-5B33, 5C1-5C45, 5D1-5D42, 5E1-5E39, 5F1-5F45, 5G1-5G17, and 5H1-5H27 and position and velocity thresholds in FIGS. 17A-17C are used to illustrate the processes in FIGS. 6A-6L, 7A-7F, 8A-8E, 9A-9D, 10A-10B, 11A-11E, 12A-12I, 13A-13D, 14A-14E, 15A-15C, 16A-16D, 18A-18G, and 19A-19C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments are, optionally, practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
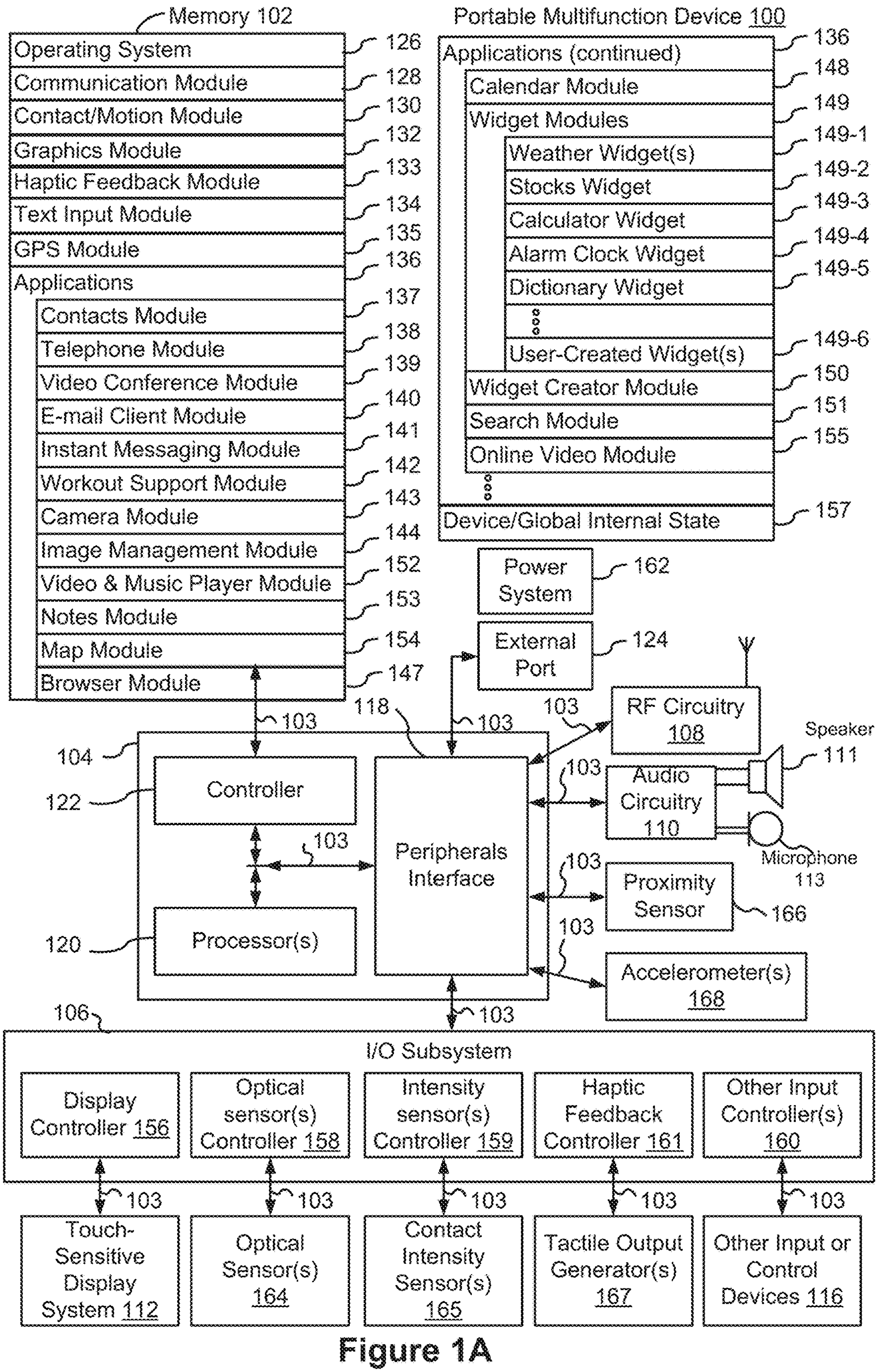
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs will, in some circumstances, invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
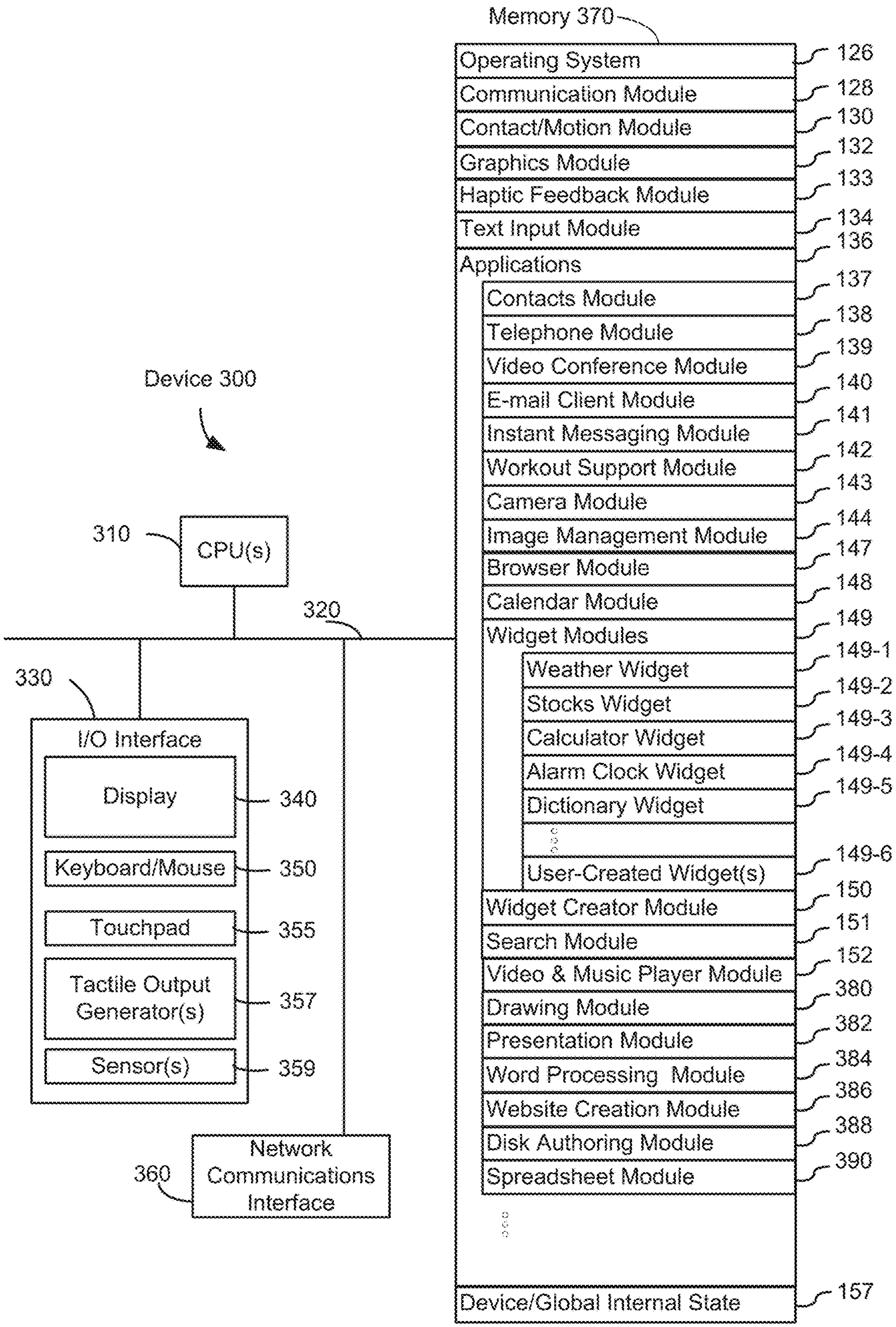
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criterion that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
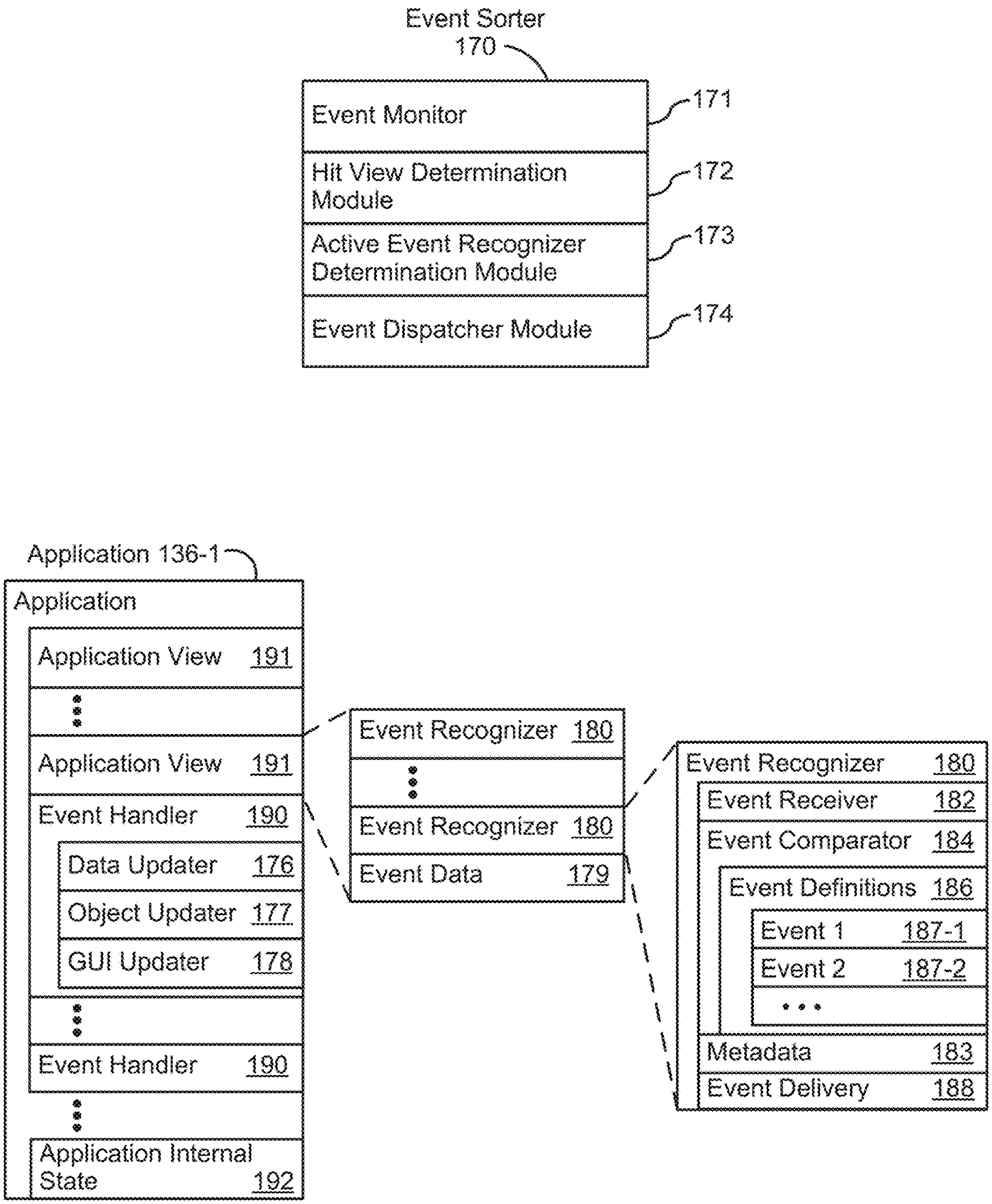
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
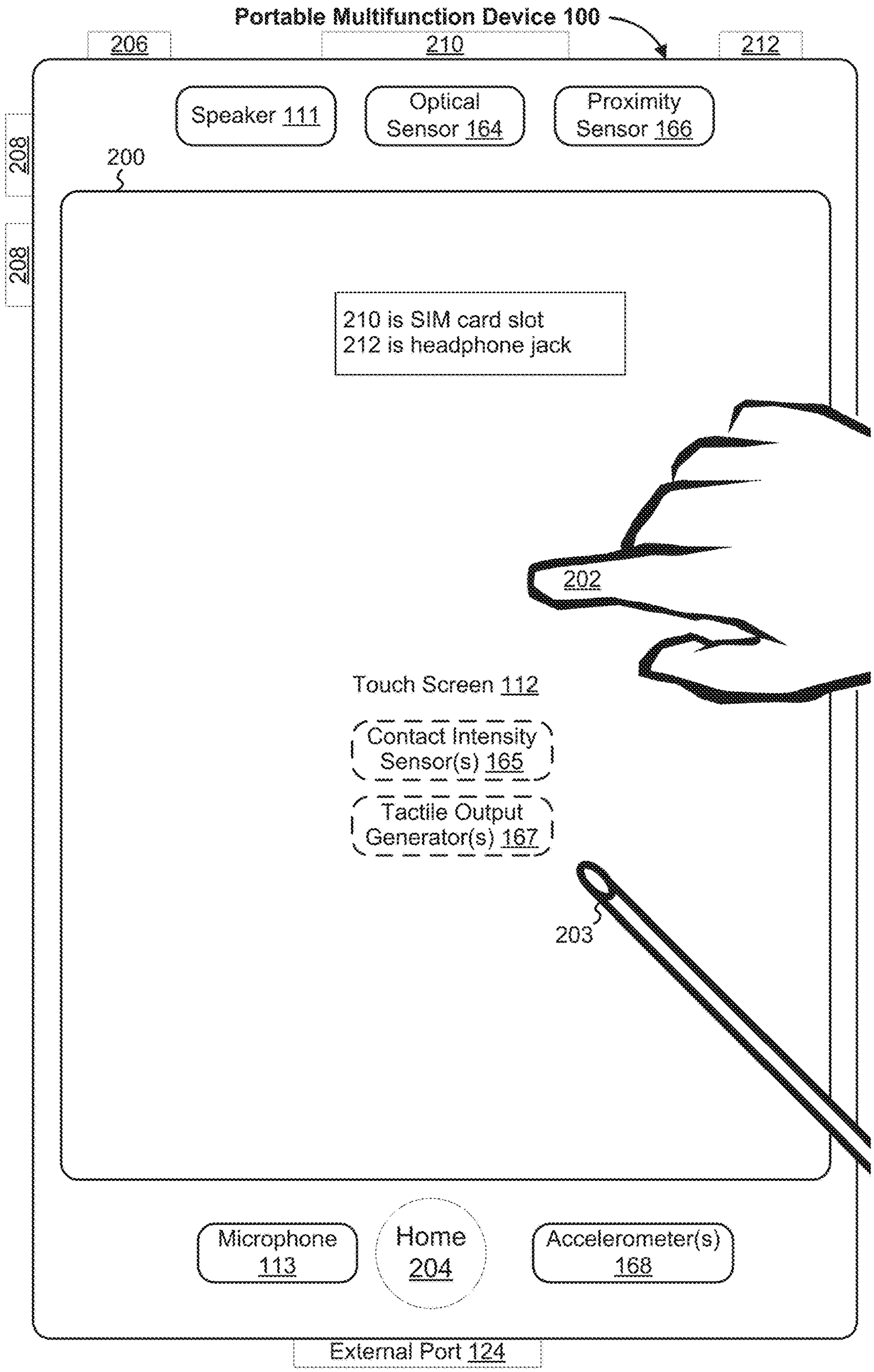
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
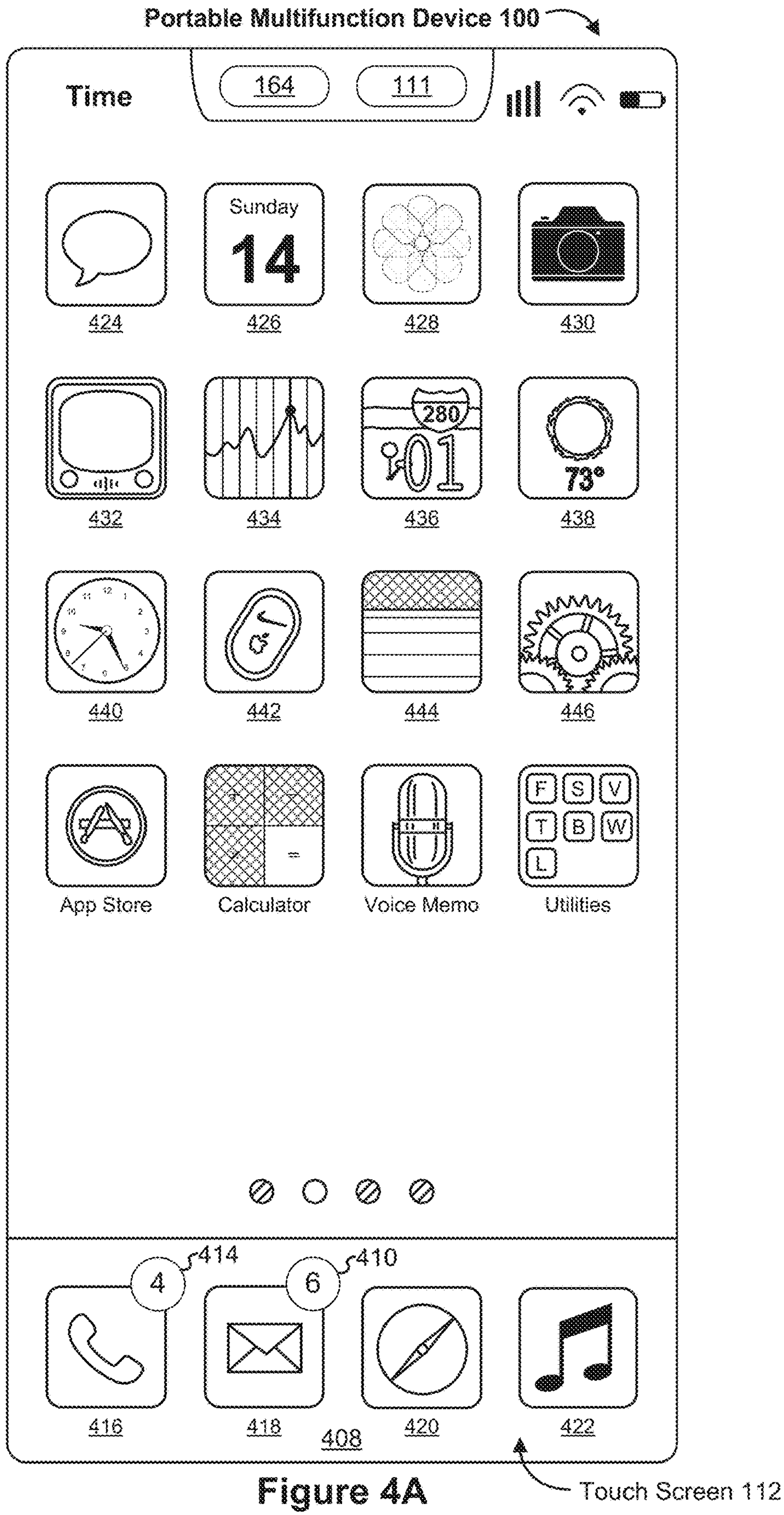
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
    - Icon 426 for calendar module 148, labeled "Calendar;"
    - Icon 428 for image management module 144, labeled "Photos;"
    - Icon 430 for camera module 143, labeled "Camera;"
    - Icon 432 for online video module 155, labeled "Online Video;"
    - Icon 434 for stocks widget 149-2, labeled "Stocks;"
    - Icon 436 for map module 154, labeled "Maps;"
    - Icon 438 for weather widget 149-1, labeled "Weather;"
    - Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
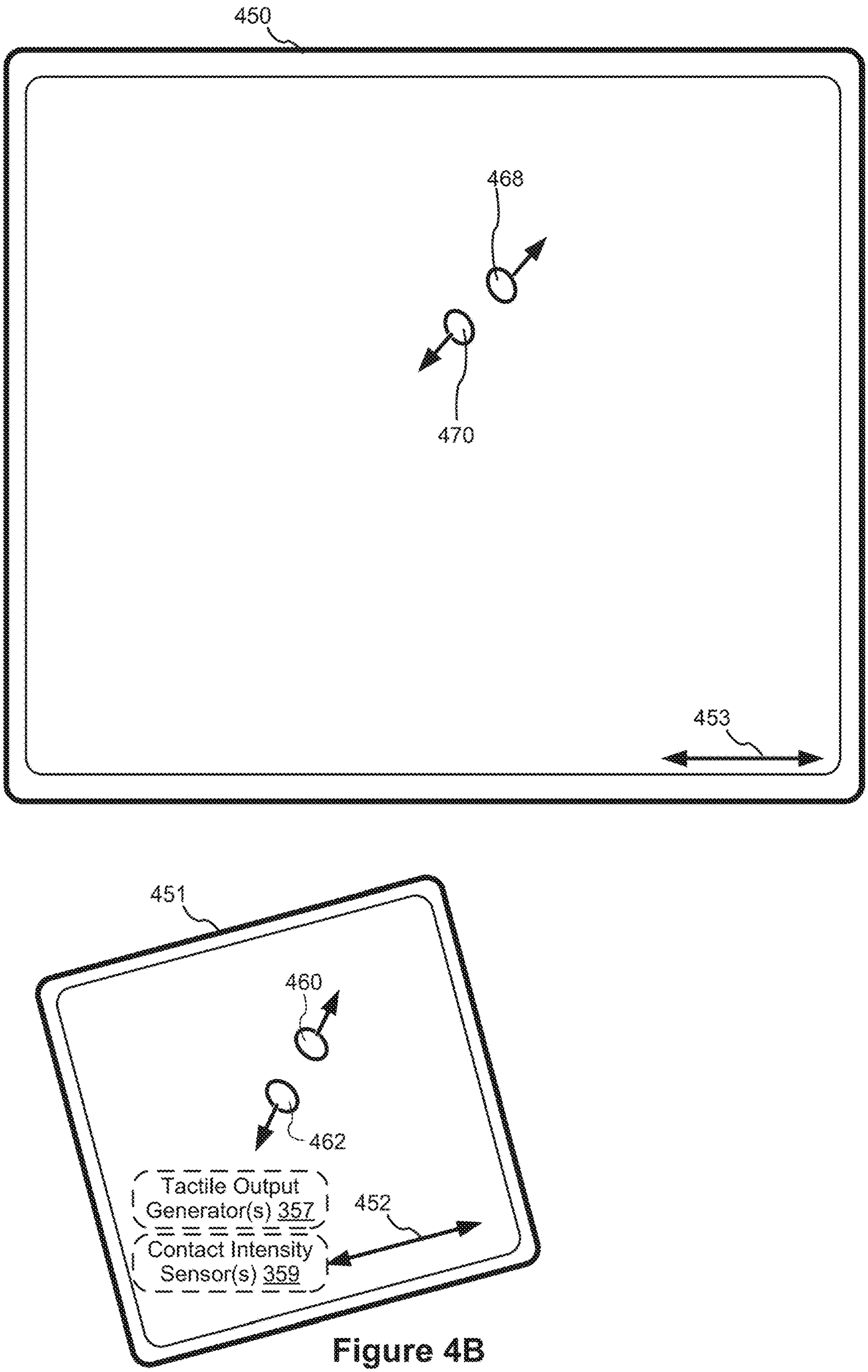
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that will, in some circumstances, otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location (e.g., a drag gesture), at which point the intensity of the contact increases. In this example, the characteristic intensity of the contact at the end location is, in some circumstances, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams (e.g., 5530) that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_D$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press"

inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
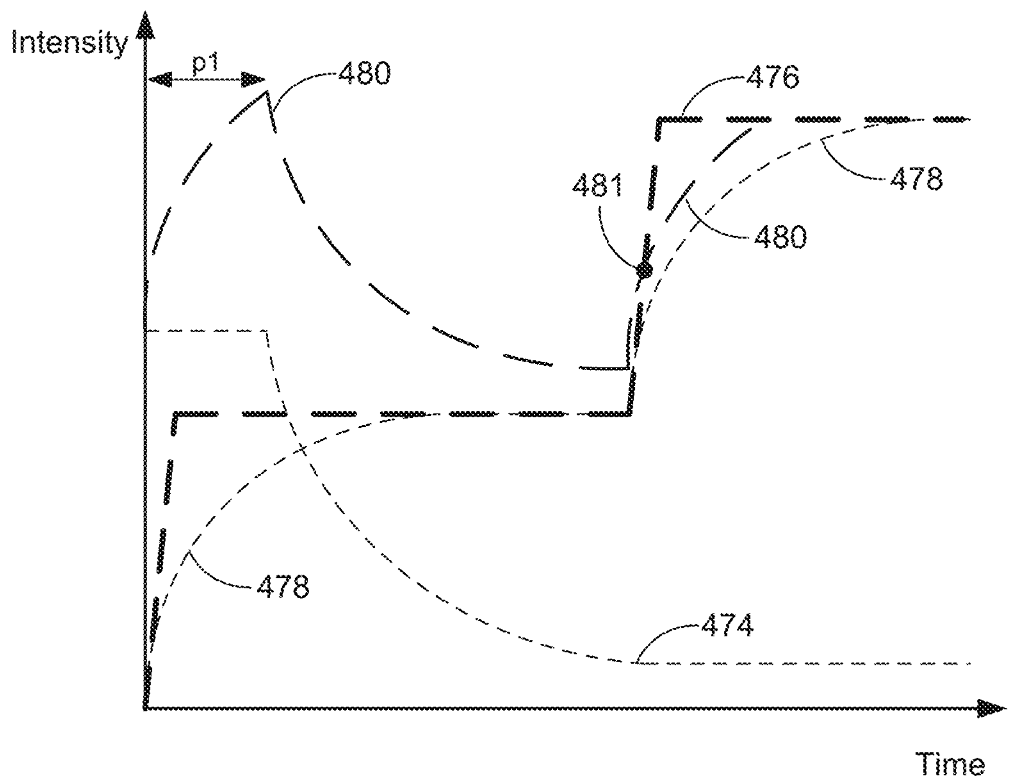
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
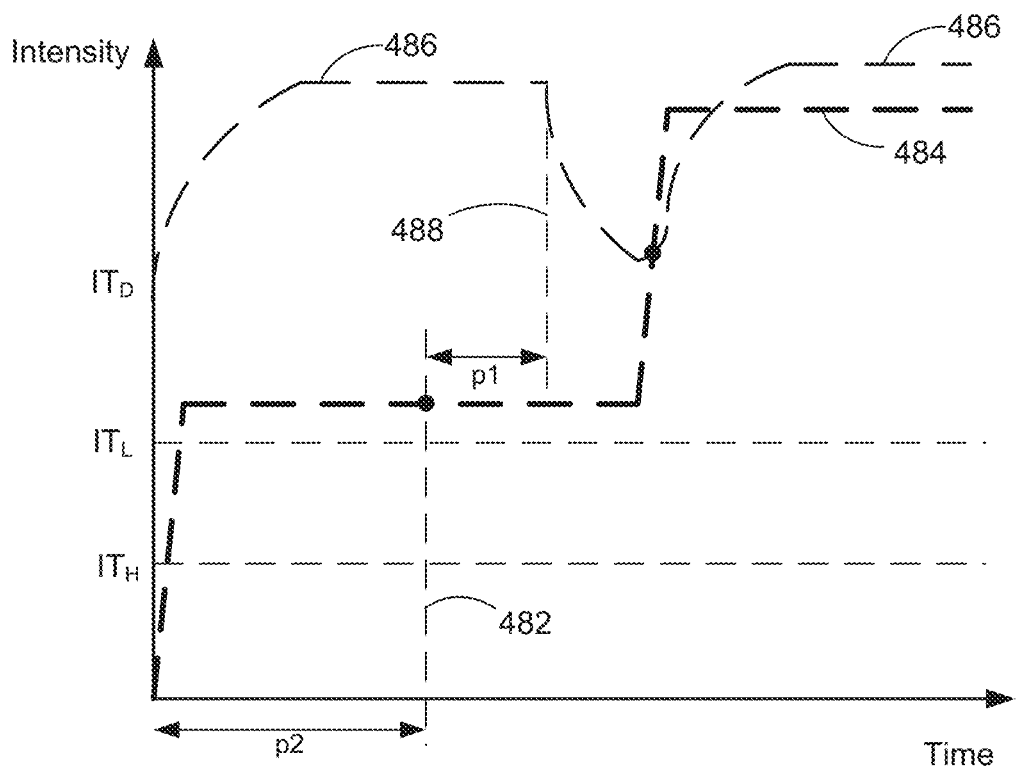

FIG. 4D illustrates another dynamic intensity threshold 486 (e.g., intensity threshold $I_D$). FIG. 4D also illustrates two other intensity thresholds: a first intensity threshold $IT_H$ and a second intensity threshold $I_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $I_L$.

Figure 4E:
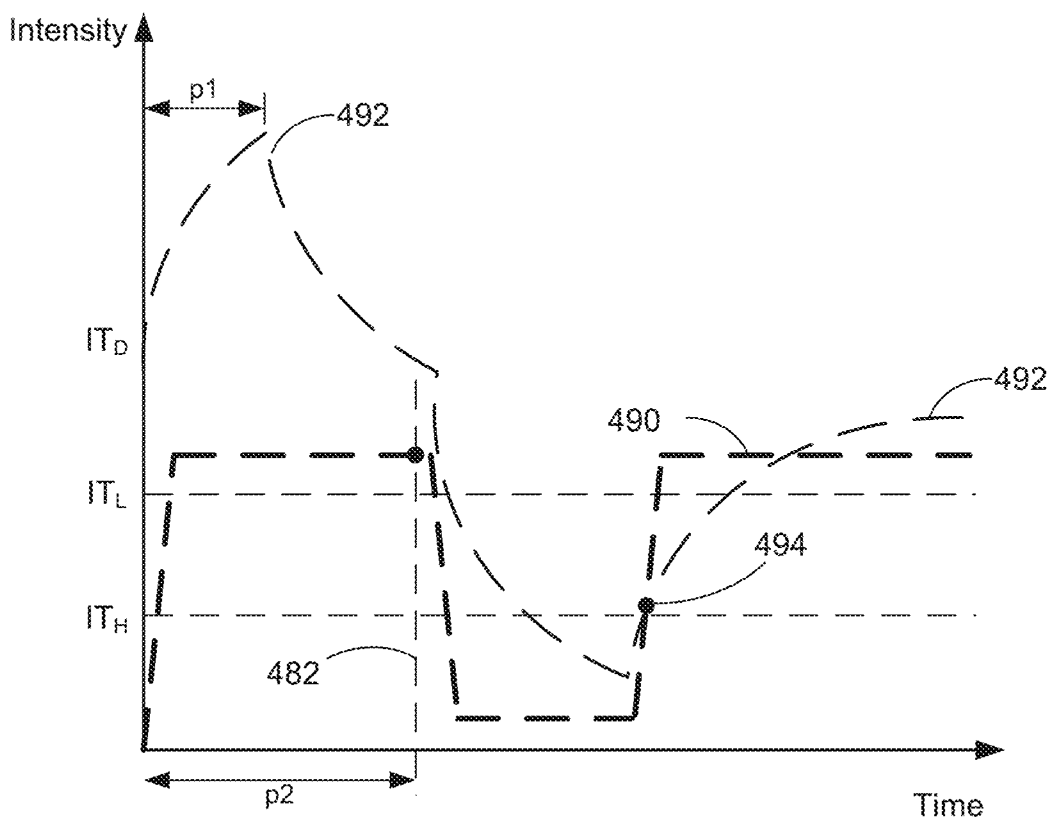

FIG. 4E illustrate yet another dynamic intensity threshold 492 (e.g., intensity threshold $I_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that are, optionally, implemented on an electronic device, such as portable multifunction device 100 or device 300, with a display, a touch-sensitive surface, and (optionally) one or more sensors to detect intensities of contacts with the touch-sensitive surface.

FIGS. 5A1-5A77 illustrate example user interfaces for navigating between user interfaces in accordance with some embodiments. The user interfaces in these figures are used to illustrate the processes described below, including the processes in FIGS. 6A-6AL, 7A-7F, 8A-8E, and 10A-10B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting predefined criteria is used to cause dismissal of a currently displayed user interface and display of the home screen user interface. In some embodiments, a home button (e.g., a mechanical button, a solid state button, or a virtual button) is included on the device and is used to cause dismissal of a currently displayed user interface and display of the home screen user interface. (e.g., in response to a single press input) and/or display a multitasking user interface (e.g., in response to a double press input).

FIGS. 5A1-5A77 illustrate example embodiments of a user interface selection process that allows a user to efficiently navigate between multiple user interfaces, e.g., quickly switching between different applications and system user interfaces, on an electronic device, in accordance with some embodiments. Example user interfaces for the user interface selection process include representations of multiple user interfaces for applications (e.g., recently opened applications, a currently displayed application, and a system control panel) associated with the electronic device displayed as a virtual stack of cards (e.g., the "stack"), where each card in the stack represents a user interface for a different application. The cards are also referred to herein as "application views," when corresponding to a user interface for a recently open application, or as a "control panel view," when corresponding to a user interface for a control panel). User inputs (e.g., contacts, swipe/drag gestures, flick gestures, etc.) detected on touch screen 112 (e.g., a touch-sensitive surface) are used to navigate between user interfaces that can be selected for display on the screen. In some embodiments, the home screen user interface is optionally displayed as a "card" in the virtual stack of cards. In some embodiments, the home screen user interface is displayed in a display layer underlying the stack of cards.

While the device displays any user interface, a gesture beginning at the bottom of the screen (e.g., within a predefined region of the device that is proximate to the edge of the display (e.g., an edge region that includes a predefined portion (e.g., 20 pixels wide) of the display near the bottom edge of the device) invokes the user interface selection process and directs navigation between multiple user interfaces based on the speed and direction of the input, and, optionally, based on movement parameters and characteristics of user interface objects (e.g., the cards) that are currently displayed. The device replaces display of the current user interface with a card representing that user interface. The user has the option to use different gestures to navigate (i) to the home screen, (ii) to the application displayed on the screen immediately prior to the user interface that was displayed when the user interface selection process was invoked, (iii) to a control panel user interface, (iv) to an application-switcher user interface that allows the user to select from applications previously displayed on the screen, or (v) back to the user interface that was displayed when the user interface selection process was invoked, in accordance with some embodiments. During the input, the device provides dynamic visual feedback indicating what navigation choice will be made upon termination of the input, facilitating effective user navigation between multiple choices. In some embodiments, the visual feedback and user interface response is fluid and reversible.

Example user interfaces for applications operated on the electronic device include a visual indication (e.g., home affordance 5002) that provides visual guidance to a user regarding the position of an edge region that the device is ready for a navigation gesture to be started, and, optionally, whether navigation is restricted in the current operating mode of the currently displayed application (e.g., absence of the home affordance indicates that the navigation is limited, and that a confirmation input or, optionally, whether an enhanced navigation gesture is required to navigate between user interfaces (e.g., as illustrated in FIGS. 5B1-5B33)). In some embodiments, the home affordance is not activatable or responsive to touch-inputs directly, e.g., in a manner that is similar to a virtual button.

FIGS. 5A1-5A8 illustrate an example embodiment where the electronic device navigates to an application-switcher user interface because an input invokes the user interface selection process and directs movement of cards in the stack beyond a first movement threshold (and, optionally, below a second movement threshold).

FIG. 5A1 illustrates a web browsing user interface with time 404 and status 402 indicators in the upper left and right corners of the screen, respectively. After the user interface selection process is activated by contact 5004 travelling upwards from the bottom of the screen, in FIG. 5A2, the web browsing user interface is replaced by card 5010 that represents the web browser user interface in FIG. 5A3. As the input moves upwards on the screen, in FIGS. 5A3-5A5, card 5010 shrinks dynamically, revealing a blurred view of the home screen in the background and expanded status bar 5008 in the foreground (status bar 5008 optionally appears to move down from the upper left and right-hand corners of the display, or be revealed by shrinking card 5010). When movement 5006 of contact 5004 pauses, in FIG. 5A6, cards 5014 (representing the messaging application user interface displayed on the screen prior to the web browsing user interface) and 5016 (representing a control panel user interface (e.g., a control center)) appear displayed alongside card 5010, indicating that termination of the input at this time would cause the device to display an application-switcher user interface. Because the input is terminated, in FIG. 5A7, while several cards in the stack are displayed, the device displays the application-switcher user interface, in FIG. 5A8. Cards 5010, 5014, and 5016, which appeared to be relatively co-planar while the input was active (e.g., in FIG. 5A6), are animated to form the stack in FIGS. 5A7-5A8, with control panel card 5016 sliding over, and messaging card 5014 sliding under, web browsing card 5010. Other cards representing user interfaces of applications last displayed prior to the messaging user interface (e.g., card 5022 representing the user interface of an email application) appear below messaging card 5014 in the stack. Application icons (e.g., Safari icon 5012; and Messages icon 5020; see also Email icon 5028 and Settings icon 5032 in FIGS. 5A9-5A13) are displayed in the application-switcher user interface to facilitate quicker identification of the application associated with the user interface shown on the card.

FIGS. 5A9-5A14 illustrate an example embodiment where the application-switcher user interface is used to navigate between previously displayed user interfaces (e.g., switch between applications). Movement 5026 of contact 5024 to the right in FIGS. 5A9-5A11 scrolls through the stack of user interface cards. As cards 5016, 5010, and 5014, from the top of the stack are pushed off the right-hand side of the screen, additional cards 5030 and 5034 are revealed from the bottom of the stack, in FIGS. 5A10-5A11. After selection of email card 5022 in FIG. 5A13, the device replaces the application-switcher user interface with the email user interface in FIG. 5A14.

FIGS. 5A15-5A18 illustrate example embodiments where an input results in navigation within an application, rather than between user interfaces of different applications and system user interfaces, because the input does not meet criteria that invokes the user interface selection process. For example, a tap gesture including contact 5037 on back button 5035 in FIG. 5A15 causes the device to navigate from the apple web page to the "news about sports" web page in FIG. 5A16, rather than invoke the user interface selection process, because there is no upwards movement of contact 5037 from the bottom edge of the screen. Similarly, the upwards swipe gesture including movement 5041 of contact 5039 in FIG. 5A17 causes the device to navigate the "news about sports" web page in FIG. 5A18, rather than invoke the user interface selection process, because the swipe gesture did not initiate at the bottom of the screen.

FIGS. 5A19-5A25 illustrate an example embodiment where the electronic device navigates back to a home screen because an input invokes the user interface selection process and direct movement of cards in the stack past the second movement threshold.

FIG. 5A19 illustrates an email user interface. The user interface selection process is activated by contact 5040 travelling upwards from the bottom of the screen and, as a result, the email user interface is replaced by card 5022 that represents the email user interface in FIG. 5A20. Because movement 5042 of contact 5040 is slow in FIGS. 5A20-5A21, and contact 5040 has not satisfied predefined movement criteria for navigating to the home screen (e.g., passed a particular distance threshold), cards 5016 (a control panel) and 5010 (web browsing) are displayed to indicate that termination of the input will cause the device to navigate to the application-switcher user interface. Once movement 5042 speeds up and/or contact 5040 satisfies the predefined movement criteria for navigating to the home screen (e.g., passes the distance threshold), cards 5016 and 5010 disappear, in FIG. 5A22, indicating that termination of the input will cause the device to navigate to the home screen, as opposed to navigating back to the application-switcher user interface. As contact 5040 moves upwards on the screen, in FIGS. 5A19-5A24, the blurring of the home screen displayed behind the cards is gradually reduced and the icons displayed on the home screen appear to come towards the user as they gradually come into focus, further indicating that navigation is tending towards the home screen.

Because the input is terminated, in FIG. 5A24, while only a single card is displayed, the device navigates to the home screen in FIG. 5A25. This is in contrast to the navigation event in FIGS. 5A2-5A8, which navigates to the application-switcher user interface because the input was terminated while the device displayed multiple cards from the stack on the screen. While navigating home, card 5022 appears to shrink into the launch icon for the mail application.

FIGS. 5A25-5A30 illustrate an example embodiment where the electronic device navigates from the home screen to an email application user interface. FIG. 5A25 illustrates a home screen with multiple application launch icons. Similar to navigation events invoked from an application user interface, as shown in FIGS. 5A2 and 5A19, movement 5048 of contact 5046 upwards from the bottom of the screen, in FIG. 5A25, invokes the user interface selection process from the home screen. Rather than replacing display of the home screen with a card, as done for the web browsing user interface in FIG. 5A3 and mail user interface in FIG. 5A20, the home screen appears to fade away from the screen and cards 5016 (a control panel) and 5022 (email) slide onto the screen in FIG. 5A26. Cards from the stack appear to come from the left-hand side of the screen, while the card for the control panel appears to come from the right-hand side of the screen. As contact 5046 continues to move upwards, in FIG. 5A27, control panel card 5016 slides over mail card 5022 assembling the stack while the home screen continues to blur in the background, indicating that the device will navigate to the application switching user interface. Upon termination of the input in FIG. 5A28, cards 5010 (web browsing) and 5014 (messaging) slide below mail card 5022, completing the stack. Selection of mail card 5022, in FIG. 5A29, directs the device to display the mail user interface in FIG. 5A30. In some embodiments, when movement of contact 5046 does not include a large vertical component, and is substantially horizontal to the left (e.g., a leftward swipe gesture that starts from the bottom edge of the screen (such as the gesture by contact 5074 shown in FIGS. 5A57-5A58)), control panel user interface slides in from the right, and is overlaid on the home screen user interface (e.g., in a final state as shown in FIG. 5A77).

FIGS. 5A31-5A36 illustrate an example embodiment where an input results in navigation within an application, or between applications, depending on whether the input meets criteria invoking the user interface selection process. FIG. 5A31 illustrates a mail user interface displaying previews 5049 of multiple email messages. A swipe gesture, including movement 5053 of contact 5051 across email preview 5049-*d* in FIG. 5A32 causes the device to mark email preview 5049-*d* as read in FIG. 5A33, rather than navigate between user interfaces of different applications or to a system user interface, because it did not originate from the bottom of the screen. In contrast, a swipe gesture including movement 5054 of contact 5052 across email preview 5049-*e*, in FIGS. 5A34-5A35, causes the device to navigate to the previously displayed web browsing user interface in FIG. 5A36, rather than marking the email preview read, because it originated from the bottom of the screen.

In contrast to the inputs illustrated in FIGS. 5A2-5A8 and 5A19-5A25, which cause the device to navigate to the application-switcher user interface and the home screen, respectively, the input illustrated in FIGS. 5A34-5A36 causes the device to navigate to the web browsing user interface because the horizontal component of movement 5054 is much greater than the vertical component of movement 5054. The input appears to push mail card 5022 back into the screen and then slide it off of the right-hand side of the screen, while dragging web browsing card 5010 onto the screen from the left-hand side of the screen. The cards appear to be moving over the home screen, which is blurred in the background.

FIGS. 5A37-5A39 illustrate an example embodiment where the device navigates back to the user interface displayed after the input ended because the input did not meet the criteria to navigate to other user interfaces (e.g., not enough movement to completely invoke the user interface selection process). FIG. 5A37 illustrates a web browsing user interface. An input including movement 5058 of contact 5056 begins to invoke the user interface selection process, as indicated by replacement of the web browsing user interface with web browsing card 5010 in FIG. 5A38. However, because the input terminates before contact 5056 travels far enough to completely invoke the user interface selection process, the device navigates back to displaying the web browser user interface, in FIG. 5A39.

FIGS. 5A40-5A56 illustrate an example embodiment where the stack of cards is not updated immediately after navigating to a different user interface, allowing forward and backwards navigation within the card stack in response to multiple consecutive swipe gestures (e.g., leftward/rightward edge swipe gestures or up-and-left/up-and-right arc swipe gestures). FIG. 5A40 illustrates a web browsing user interface including time 404 and status 402 indicators. A first swipe gesture to the right, initiated in FIG. 5A40, navigates the device to the email user interface, in FIG. 5A42, which was the application user interface displayed immediately prior to the web browsing user interface. Before the stack is resorted to reflect navigation to the email user interface, a second swipe gesture to the right is initiated in FIG. 5A43. The second swipe gesture results in navigation to a messaging user interface, which is the next user interface represented in the stack, as illustrated in FIG. 5A45. Again, before the stack is resorted to reflect navigation to the messaging user interface, a third swipe gesture to the left is initiated in FIG. 5A46. The third swipe gesture results in forward navigation within stack, rather than backwards, back to the email user interface in FIG. 5A48 because the gesture is in the opposite direction. A fourth swipe gesture to the right, initiated in FIG. 5A49, navigates the device backwards in the stack to the messaging user interface, in FIG. 5A51.

After each of the first three navigation events, the stack is not resorted because another navigation gesture is detected before a predetermined amount of time (e.g., $TT_1$) has elapsed since the termination of the previous navigation gesture. The fact that the threshold amount of time has not elapsed is indicated visually by the absence of time 404 and status 402 indicators immediately after the navigation event. As shown in FIG. 5A52, after the predetermined period of time passes without detecting another navigation input, the device resorts the stack to reflect navigation to the messaging user interface. This is visually indicated by display of time 404 and status 402 indicators. In some embodiments, the size of the center card expands slightly to indicate that it has now become the top card in the stack. Thus, after movement 5072 of contact 5070 invokes the user interface selection process in FIG. 5A52, cards 5014 (messaging) and 5010 (web browsing) are displayed side-by-side in FIG. 5A53, reflecting the last two applications used on the device. Although the mail user interface was displayed on the screen (in FIG. 5A49) more recently than the web browsing user interface (in FIG. 5A40), mail card 5022 is not reordered in the stack because the user interface was only displayed transiently, while the user navigated through the stack.

FIGS. 5A57-5A59 illustrate an example embodiment where a navigation gesture to the left from any user interface causes navigation to a control panel user interface (e.g., control center). FIG. 5A57 illustrates a messaging user interface with time 404 and status 402 indicators, representing that the underlying card stack has been re-sorted since the last navigation event (e.g., the navigation from the email application to the messages application in FIGS. 5A49-5A51). A swipe gesture to the left in the bottom edge region of the screen, including movement 5076 of contact 5074 in FIG. 5A57) causes control panel view 5016 to slide over the messaging user interface from the right-hand side of the screen, as illustrated in FIG. 5A58. In some embodiments, the control panel view 5016 is translucent and the portions of the messages user interface at least partially show through from underneath the visible portions of the control panel view 5016. Termination of the input results in navigation to the control panel user interface, in FIG. 5A59, displayed over a blurred view of the messaging user interface, which was displayed when the user interface navigation input was initiated. In contrast to the leftwards swipe gesture in FIGS. 5A46-5A48, which caused forward navigation within the stack, the leftwards swipe in FIGS. 5A57-5A59 causes navigation to the control panel user interface because there are no user interface cards above the messaging card in the stack when the messaging user interface is actively displayed on the screen. In FIGS. 5A46-5A48, the email card is above the messaging card in the stack because the user was actively navigating between user interfaces in the stack (e.g., the order of the stack had not reshuffled because time threshold $TT_1$ had not yet be met).

FIGS. 5A52-5A56 illustrate an example embodiment where the user interface selection process is fluid. FIG. 5A52 illustrates invocation of the user interface selection process from a messaging user interface with an upwards swipe gesture. In response, the device displays cards 5014 (messaging), 5010 (web browsing), and 5016 (control panel), in FIG. 5A53, because the speed of movement 5072 is below a first movement threshold and the position of contact 5070 is below a first position threshold, indicating that termination of the input will result in navigation to the application-switcher user interface. Continuation of the gesture up and to the left, in FIG. 5A54, causes cards 5010 (web browsing) and 5016 (control panel) to disappear, indicating that termination of the input will cause navigation to the home screen. Because the user interface selection process is fluid, messaging card 5014 continues to shrink and moves up and to the left on the screen, in accordance with movement 5072 of contact 5070. When movement 5072 of contact 5070 changes direction towards the bottom of the screen, messaging card 5014 gets larger and the home screen blurs in the background, in FIG. 5A55, indicating that termination of the input will result in navigation back to the messaging user interface, as shown in FIG. 5A56. In some embodiments, between the states shown in FIGS. 5A54 and 5A55, as contact 5070 moves downward, multiple cards 5010, 5014, and 5016 are, optionally, redisplayed (e.g., in a manner shown in FIG. 5A53) to indicate that if termination of the input were detected at that time, the device will navigate to the application-switcher user interface after the termination of the input.

FIGS. 5A60-5A63 illustrate an example embodiment where an input navigates to the application-switcher user interface from the control panel user interface (e.g., control panel). FIG. 5A60 illustrates invocation of the user interface selection process from control panel user interface with an upwards swipe gesture from the bottom of the screen. In response, the stack appears to slide out from under control panel card 5016, in FIG. 5A61. As the swipe gesture continues upwards, the stack continues to spread out from under control panel card 5016, in FIG. 5A62, indicating that termination of the input will result in navigation to the application-switcher user interface, as illustrated in FIG. 5A63.

FIGS. 5A64-5A69 illustrate an example embodiment where applications are closed within the application-switcher user interface. FIG. 5A64 illustrates the beginning of a long-press input by contact 5084 on messaging card 5014 within the application-switcher user interface. When contact 5084 has been detected at its initial touch-down location with less than a threshold amount of movement for at least a threshold amount of time (e.g., $TT_2$) to meet a touch-hold requirement, in FIG. 5A65, the device activates an application termination mode and displays application closing affordances 5086 over the application cards in the stack. Selection of application closing affordance 5086 over messaging card 5014, in FIG. 5A67, results in closing of the messaging application on the device, as indicated by the removal of messaging card 5014 in the stack, in FIG. 5A68. In some embodiments, closing an application from within the application-switcher user interface causes deletion of the retained state information; and when the application is launched again, the application will start from a default starting user interface, as opposed to a user interface corresponding to the state in which the application was last accessed by a user. In response to closing of the messages application, web browsing card 5010 and email card 5022 move up in the stack, revealing settings card 5030 in the stack.

FIGS. 5A69-5A71 illustrate an example embodiment where the device navigates to the home screen from the application-switcher user interface in response to an upwards swipe by contact 5090 with movement 5092. FIG. 5A69 illustrates an upward swipe gesture (e.g., over web browsing card 5010) in the application-switcher user interface. In response to the upward swipe gesture by contact 5090, web browsing card 5010 shrinks and moves upwards, other cards in the stack disappear, and the home screen begins to come into focus in the background, in FIG. 5A70, indicating that termination of the input will result in navigation to the home screen, as shown in FIG. 5A71.

FIGS. 5A72-5A77 illustrate an example embodiment where the electronic device navigates from the home screen to a control panel user interface. FIG. 5A72 illustrates a home screen with multiple launch icons. Movement 5096 of contact 5094 upwards from the bottom of the screen, in FIG. 5A72, invokes the user interface selection process from the home screen. As contact 5094 moves upward on the screen, the home screen appears to fade away from the screen and cards 5016 (control panel) and 5022 (mail) slide onto the screen in FIG. 5A73. As contact 5094 continues to move upwards, in FIG. 5A74, control panel card 5016 slides over mail card 5022 assembling the stack while the home screen continues to blur in the background, indicating that the device will navigate to the application switching user interface. Upon termination of the input in FIG. 5A75, cards 5010 (web browsing) and 5014 (messaging) slide below mail card 5022, completing the stack. Selection of control panel card 5016 with contact 5098, in FIG. 5A76, results in navigation to the control panel user interface, in FIG. 5A77. The control panel is displayed in a semi-transparent state over a blurred view of the home screen, which was displayed when the user interface navigation input was initiated in FIG. 5A72.

FIGS. 5B1-5B33 illustrate example user interfaces for limiting navigation to a different user interface (e.g., a system user interface or a user interface of another application) in response to a navigation gesture when a currently displayed application is determined to be protected, in accordance with some embodiments. The user interfaces in these figures are used to illustrate the processes described below, including the processes in FIGS. 9A-9D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In FIG. 5B1, a media-player application is operating in a first mode (e.g., interactive playback mode). User interface 5302 of the media-player application in the interactive playback mode includes multiple control regions, including a media playback region (e.g., a media playback window for displaying media content), a playback back control region (e.g., media scrubber, fast forward affordance, pause/play affordance, and rewind affordance), a network interactions control region (e.g., affordances for routing the media content to an output device, commenting on the media content in a social networking forum (e.g., like or dislike), sharing the media content with others, etc.), and a related content region (e.g., thumbnails of content that link to other media content related to the currently selected content in the media playback window), etc. User interface 5302 is designed to facilitate user interaction with the user interface (e.g., browsing related content in the related content region, or invoking network interactions via the affordances in the network interaction control region, etc.), while media playback in the media play back region is ongoing. In FIG. 5B1, home affordance 5002 is overlaid on user interface 5302 to indicate an edge region of the touch-screen 112 from which a navigation gesture (e.g., an upward swipe gesture that causes the display of the application-switcher user interface or the home screen display user interface, or a sideway swipe that causes display of the control panel user interface or the user interface of a recently open application) is, in some circumstances, started.

FIGS. 5B1-5B3 illustrate that, when a navigation gesture that meets home-display criteria is detected, the device ceases to display user interface 5302 and displays home screen user interface 5314 after termination of the navigation gesture. In FIG. 5B1, contact 5312 is detected in the bottom edge region of the touch-screen 112 (e.g., region is visually indicated by home affordance 5002). In FIG. 5B2, in accordance with upward movement of contact 5312, user interface 5302 shrinks and becomes application view 5304 (e.g., reduced scale, live or static image of user interface 5302, also referred to as a "card" 5304) that is dragged by contact 5312. When application-switcher display criteria are met, and before lift-off of contact 5312 is detected, control panel view 5306 (e.g., also referred to as a "card" 5306) that corresponds to a control panel user interface and application view 5308 (e.g., also referred to as a "card" 5308) that corresponds to a recently open application (e.g., a web browser application) are displayed on two sides of the application view 5304, and the multiple views move and shrink together as contact 5312 moves upward across the touch-screen 112. The multiple views 5304, 5306, and 5308 are overlaid on top of a blurred version of the home screen user interface (e.g., blurred home screen 5310). In FIG. 5B3, after lift-off of contact 5312 is detected, and home-display criteria are met (e.g., contact 5312 moved beyond a threshold position (e.g., three quarters of screen height) on the touch-screen 112), home screen user interface 5314 is displayed on the touch-screen 112.

FIGS. 5B4-5B10 illustrate an alternate scenario to the scenario shown in FIGS. 5B1-5B3. In FIGS. 5B4-5B10, the media player application is operating in a full-screen playback mode. Intentional navigation to other user interfaces while media playback in the media play back region is relatively rare and accidental navigation to other user interfaces would be considered disruptive by many users. As such, the media player application operating in the full-screen playback mode is defined as an application that is currently "protected" from the effect of the usual navigation gesture (e.g., gesture to navigate to the home screen user interface, application-switcher user interface, a recently open application, or a control panel user interface).

In FIGS. 5B4-5B5, while the media player application is operating in the interactive playback mode with ongoing playback of media content (e.g., a video of a baseball game), device 100 detects that the orientation of device 100 is changed from portrait to landscape orientation. In response to detecting the change in the orientation of the device, device 100 switches from the interactive playback mode to the full-screen display mode (as shown in FIG. 5B5). In FIG. 5B5, full-screen playback user interface 5316 includes only the playback content (e.g., the baseball game video continues to play after rotation of device 100), and other control affordances and user interface objects cease to be displayed on the touch screen 112. Home affordance 5002 is not visible on user interface 5316.

FIGS. 5B5-5B7 illustrate that, while content is being played in the full-screen playback mode, contact 5318 is detected near the bottom edge of the touch-screen (e.g., the "bottom edge" is redefined to be the long edge of the device 100 on the left (e.g., the left edge based on device held in an upright portrait orientation) after device 100 is rotated to the landscape orientation as shown in FIG. 5B5). In FIG. 5B6, in accordance with the upward movement of contact 5318, home affordance 5322 (a longer version of home affordance 5002) is displayed overlaid on user interface 5316 near the bottom edge of touch screen 112. In addition, the upward swipe gesture from the bottom edge is configured to cause display of media selection panel 5320 within the media player application. As shown in FIG. 5B6, media selection panel 5320 including multiple media items related to the currently played media content is dragged upward from the bottom edge of the touch-screen, in accordance with the upward movement of contact 5318. In FIG. 5B6, user interface 5316 remains displayed during the upward movement of contact 5318. Playback of the media content optionally continues during the movement of contact 5318. In FIG. 5B7, lift-off of contact 5318 has been detected, and after lift-off of contact 5318, media playback continues in the full screen playback mode, media selection panel 5320 is fully displayed in user interface 5316. The user can tap on one of the displayed media content item to start playback of the content item, or swipe horizontally on the media selection panel 5320 to browse through other related content items. In FIG. 5B7, home affordance 5322 remains displayed on the touch-screen 112 after lift-off of contact 5318 for at least a threshold amount of time to indicate that another navigation gesture that is received while the home affordance is displayed will cause navigation to a different user interface. In some embodiments, if no navigation gesture or user input is detected on touch-screen 112 within the threshold amount of time, home affordance 5322 (and optionally, content selection panel 5320) ceases to be displayed. Another navigation gesture detected afterwards will have a similar effect as that shown in FIGS. 5B5-5B7. In some embodiments, a tap gesture on user interface 5316 causes display of playback controls overlaid on user interface 5316, and optionally, causes home affordance 5322 to be displayed as well.

FIGS. 5B8-5B10 illustrate that, while home affordance 5322 is displayed on touch-screen 112, the device remains within a state that waits for a confirmation input for the navigation gesture detected earlier. In some embodiments, a repeat of the previously performed navigation gesture or another navigation gesture causes the device to navigate to another user interface in accordance with the newly received navigation gesture. In some embodiments, if home affordance 5322 is displayed in response to a tap gesture, a subsequently received navigation gesture will be treated as a confirmed navigation gesture and cause the device to navigate to a different user interface as well.

In FIG. 5B8, contact 5324 is detected near the bottom edge region of touch-screen 112, while home affordance 5322 remains displayed after the initial navigation gesture (e.g., upward swipe from the bottom edge of the touch-screen by contact 5318) was detected. In response to detecting contact 5324 and upward movement of contact 5324, the device determines that a confirmation input is detected and responds to the current navigation gesture by displaying the multiple application views, e.g., application view 5330 for a recently open application, application view 5326 for the currently open application, and application view 5328 for the control panel user interface, e.g., as shown in FIG. 5B9. In some embodiments, application views 5330, 5326, and 5328 are reduced scale, live or state images of the corresponding user interfaces displayed in landscape orientation. The multiple application views are dragged upward and reduce in size in accordance with the upward movement of contact 5324. FIG. 5B9 also illustrate that, the multiple application views are overlaid on top of blurred home screen user interface 5332 which optionally displays application launch icons in landscape orientation. In FIG. 5B10, after lift-off of contact 5324 is detected and home-gesture criteria are met (e.g., contact 5324 was above three quarters of the screen height when lift-off of contact 5324 was detected), the device displays home screen user interface 5334 in landscape orientation.

FIGS. 5B11-5B33 illustrate another example application that has a protected state. Specifically, a maps application that has an interactive map display mode, and a navigation mode. When the maps application is in the navigation mode, the application is protected from the effect of a regular navigation gesture, and requires a confirmation input after detection of an initial navigation gesture, or requires an initial enhanced navigation gesture to navigate to another user interface.

In FIG. 5B11, the maps application is operating in a first mode (e.g., the interactive map display mode). User interface 5336 of the maps application in the interactive map display mode includes multiple control regions, including a map display region (e.g., a window for displaying a map), a destination display region (e.g., displaying a currently selected destination, affordance to display an editing user interface for setting the start and end locations for a directions request, and affordance to cancel the currently displayed destination), a directions control region (e.g., including affordances for activating the navigation mode for guided navigation to the selected destination), and a transportation selection region (e.g., affordances to select a transportation mode for the directions), etc. User interface 5336 is designed to facilitate user interaction with the user interface (e.g., configuring directions request, and invoking navigation mode after directions request is configured, etc.), while displaying a map. In FIG. 5B11, home affordance 5002 is overlaid on user interface 5336 to indicate an edge region of the touch-screen 112 from which a navigation gesture (e.g., an upward swipe gesture that causes the display of the application-switcher user interface or the home screen display user interface, or a sideway swipe that causes display of the control panel user interface or the user interface of a recently open application) is, in some circumstances, started.

FIGS. 5B11-5B13 illustrate that, when a navigation gesture that meets home-display criteria is detected, the device ceases to display user interface 5336 and displays homes screen user interface 5314 after termination of the navigation gesture. In FIG. 5B11, contact 5338 is detected in the bottom edge region of the touch-screen 112 (e.g., region is visually indicated by home affordance 5002). In FIG. 5B12, in accordance with upward movement of contact 5338, user interface 5336 shrinks and becomes application view 5340 (e.g., reduced scale, live or static image of user interface 5336) that is dragged by contact 5338. When application-switcher display criteria are met, and before lift-off of contact 5338 is detected, control panel view 5306 that corresponds to a control panel user interface and application view 5344 that corresponds to a recently open application (e.g., a browser application) are displayed on two sides of the application view 5340, and the multiple views move and shrink together as contact 5338 moves upward across the touch-screen 112. The multiple views 5344, 5340, and 5306 are overlaid on top of a blurred version of the home screen user interface (e.g., blurred home screen 5310). In FIG. 5B13, after lift-off of contact 5338 is detected, and home-display criteria are met (e.g., contact 5338 moved beyond a threshold position (e.g., three quarters of screen height) on the touch-screen 112), home screen user interface 5314 is displayed on the touch-screen 112.

FIGS. 5B14-5B25 illustrate an alternate scenario to the scenario shown in FIGS. 5B11-5B13. In FIGS. 5B14-5B25, the maps application is operating in a navigation mode. Intentional navigation to other user interfaces while the maps application is in the navigation mode is relatively rare and accidental navigation to other user interfaces would be considered disruptive by many users. As such, the maps application operating in the navigation mode is defined as an application that is currently "protected" from the effect of the usual navigation gesture (e.g., gesture to navigate to the home screen user interface, application-switcher user interface, a recently open application, or a control panel user interface).

In FIG. 5B14, full-screen user interface 5346 includes a zoomed view of a user's current location in a map, a banner indicating the next direction, and a control region 5350 that displays summary of the trip (e.g., estimated arrival time, estimated duration of the trip, etc.) and an affordance to end the navigation mode (e.g., an "End" button). Home affordance 5002 is not visible on full screen user interface 5346.

FIGS. 5B14-5B16 illustrate that, while the maps application is in navigation mode, contact 5348 is detected near an affordance 5342 in the control region 5350 of user interface 5346, above the bottom edge region of the touch-screen 112. In FIG. 5B15, in accordance with the upward movement of contact 5348, control region 5350 is pulled up from the bottom of the display to reveal additional control options, such as icons to search for nearby gas stations, lunch locations, and coffee shops, etc. In FIG. 5B15, user interface 5346 optionally remains displayed (e.g., as a blurred version 5346' of the full screen user interface 5346) during the upward movement of contact 5348. Navigation optionally continues during the movement of contact 5348. In FIG. 5B16, lift-off of contact 5348 has been detected, and after lift-off of contact 5348, the maps application remains in navigation mode, control region 5350 is fully displayed in user interface 5346' (e.g., additional control options are displayed in control region 5350, including an affordance for displaying an overview of the route on the map, an affordance for displaying details of the directions, and an affordance for displaying audio settings for the navigation mode).

FIGS. 5B17-5B19 illustrate another scenario alternative to the scenarios shown in FIGS. 5B11-5B13, and in FIGS. 5B14-5B16. In FIG. 5B17, while the maps application is operating in the navigation mode and no home affordance is displayed on the touch-screen 112, the device detects contact 5352 near the bottom edge of the touch-screen 112 (e.g., as opposed to near affordance 5342 above the bottom edge region). In FIG. 5B18, upward movement of contact 5352 is detected, and instead of displaying the application views as shown in FIG. 5B12, full screen user interface 5346 remains displayed, and home affordance 5002 is optionally displayed in response to the upward movement of contact 5352. In some embodiments, other inputs, such as a tap, or a short upward swipe from the bottom edge of the touch-screen optionally causes the display of the home affordance as well. In FIG. 5B19, lift-off of contact 5352 is detected, and the maps application remain in navigation mode, with full screen user interface 5346 displayed on the touch screen and home affordance 5002 overlaid on full screen user interface 5346.

FIGS. 5B20-5B22 illustrate that, after lift-off of contact 5352, while home affordance 5002 is still displayed on the touch-screen (e.g., before a threshold amount of time has elapsed), contact 5354 is detected near affordance 5342 (as shown in FIG. 5B20). In FIG. 5B21, in accordance with the upward movement of contact 5354, control region 5350 is pulled up from the bottom of the touch-screen 112 over blurred version of user interface 5346 (e.g., shown as user interface 5346'). In FIG. 5B22, lift-off of contact 5354 has been detected, and control region 5350 is fully displayed over blurred version of user interface 5346.

FIGS. 5B23-5B25 illustrate that, after lift-off of contact 5352 (in FIG. 5B19), home affordance 5002 remains displayed for at least a threshold amount of time to indicate that another navigation gesture that is received while the home affordance is displayed will cause navigation to a different user interface. In some embodiments, if no navigation gesture or user input is detected on touch-screen 112 within the threshold amount of time, home affordance 5002 ceases to be displayed. Another navigation gesture detected afterwards will have a similar effect as that shown in FIGS. 5B17-5B19.

In FIG. 5B23, while home affordance 5002 is displayed on touch-screen 112, the device remains within a state that waits for a confirmation input for the navigation gesture detected earlier. In some embodiments, a repeat of the previously performed navigation gesture or another navigation gesture causes the device to navigate to another user interface in accordance with the newly received navigation gesture. In some embodiments, if home affordance 5002 is displayed in response to a tap gesture, a subsequently received navigation gesture will be treated as a confirmed navigation gesture and cause the device to navigate to a different user interface as well.

In FIG. 5B23, contact 5356 is detected near the bottom edge region of touch-screen 112, while home affordance 5002 remains displayed after the initial navigation gesture (e.g., upward swipe from the bottom edge of the touch-screen by contact 5352 in FIGS. 5B17-5B19) was detected. In response to detecting contact 5356 and upward movement of contact 5356, the device determines that a confirmation input has been detected and responds to the current navigation gesture by displaying the multiple application views, e.g., application view 5344 for a recently open application, application view 5358 for the currently open application, and application view 5306 for the control panel user interface, e.g., as shown in FIG. 5B24. In some embodiments, application views 5344, 5358, and 5306 are reduced scale, live or state images of the corresponding user interfaces. The multiple application views are dragged upward and reduce in size in accordance with the upward movement of contact 5356. FIG. 5B24 also illustrate that, the multiple application views are overlaid on top of blurred home screen user interface 5310 which is a blurred version of home screen 5324 and includes a plurality of application launch icons. In FIG. 5B25, after lift-off of contact 5356 is detected and home-gesture criteria are met (e.g., contact 5356 was above three quarters of the screen height when lift-off of contact 5356 was detected), the device displays home screen user interface 5314.

FIGS. 5B26-5B29 illustrate an alternative scenario to those shown in FIGS. 5B11-5B13, FIGS. 5B14-5B16, and FIGS. 5B17-5B25, respectively. In FIG. 5B26-5B29, an enhanced navigation gesture is detected initially, and the enhanced navigation gesture overrides the protection over the maps application in the navigation mode, and causes navigation to a different user interface (e.g., the home screen user interface).

In FIG. 5B26, while the maps application is operating in the navigation mode, full screen user interface 5346 is displayed, and home affordance is not visible on the display. Contact 5360 is detected near the bottom edge region of the touch-screen 112 at time $t=t_0$. In FIG. 5B27, contact 5360 has been maintained at initial touch-down location near the bottom edge of the touch-screen with less than a threshold amount of movement for at least a threshold amount of time T (e.g., an initial touch-hold requirement is met by contact 5360). In response to detecting that contact 5360 has met the touch-hold requirement, home affordance 5002 is displayed near the bottom edge region of the touch-screen to indicate that the touch-hold requirement has been met, and that the initial portion of an enhanced navigation gesture has been detected. In FIG. 5B28, upward movement of contact 5360 is detected, and the device recognizes the input by contact 5360 as an enhanced navigation gesture, and in response to detecting the enhanced navigation gesture, the device displays the multiple application views 5344, 5358, and 5306 in accordance with the upward movement of contact 5360. In FIG. 5B29, lift-off of contact 5360 has been detected and home-display criteria have been met (e.g., contact 5360 has reached above three quarters of the screen height), the device displays home screen user interface 5314 on the touch-screen. In some embodiments, navigation mode continues in the background, e.g., a floating banner indicating the next direction is optionally displayed at the top of the display, or a small direction indicator is optionally displayed in the left upper corner of the display.

FIGS. 5B30-5B33 illustrate an alternative scenario to those shown in FIGS. 5B11-5B13, FIGS. 5B14-5B16, and FIGS. 5B17-5B25, respectively. In FIG. 5B30-5B33, an enhanced navigation gesture is detected initially, and the enhanced navigation gesture overrides the protection over the maps application in the navigation mode, and causes navigation to a different user interface (e.g., the home screen user interface).

In FIG. 5B30, while the maps application is operating in the navigation mode, full screen user interface 5346 is displayed, and home affordance is not visible on the display. Contact 5362 is detected near the bottom edge region of the touch-screen 112 with a first intensity. In FIG. 5B31, intensity of contact 5362 is increased above a threshold intensity $IT_L$ (e.g., an initial intensity requirement is met by contact 5362). In response to detecting that contact 5362 has met the intensity requirement, the device determines that the initial portion of an enhanced navigation gesture has been detected. In FIG. 5B32, upward movement of contact 5362 is detected, and the device recognizes the input by contact 5362 as an enhanced navigation gesture, and in response to detecting the enhanced navigation gesture, the device displays the multiple application views 5344, 5358, and 5306 in accordance with the upward movement of contact 5362. In FIG. 5B33, lift-off of contact 5362 has been detected and home-display criteria have been met (e.g., contact 5362 has reached above three quarters of the screen height), the device displays home screen user interface 5314 on the touch-screen. In some embodiments, navigation mode continues in the background, e.g., a floating banner indicating the next direction is optionally displayed at the top of the display, or a small direction indicator is optionally displayed in the left upper corner of the display.

FIGS. 5C1-5C45 illustrate example user interfaces for displaying a control panel user interface (also sometimes called a "control center") and, in response to different inputs, displaying an expanded region of the control panel user interface or activating a control, in accordance with some embodiments. The user interfaces in these figures are used to illustrate the processes described below, including the processes in FIGS. 11A-11E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5C1-5C12 illustrate various ways to access a control panel user interface from other user interfaces.

FIGS. 5C1-5C3 illustrate accessing a control panel user interface from a lock screen. FIG. 5C1 illustrates displaying a lock screen user interface 5502. In response to various inputs (e.g., in FIG. 5C2), device 100 displays a control panel user interface 5504 with home affordance 5506 (e.g., in FIG. 5C3). As shown in FIG. 5C2, various gestures are used to access control panel user interface 5504, including: a press input on the bottom edge of touch screen 112 by contact 5507 that exceeds an intensity threshold (e.g., light press intensity threshold $IT_L$), a horizontal swipe gesture on the bottom edge of touch screen 112 by contact 5508, an up-and-left arc gesture by contact 5509, and a tap gesture on the status indicators by contact 5510. In some embodiments, a horizontal swipe gesture in the other direction (as opposed to the horizontal swipe gesture by contact 5508), an up-and-right arc gesture (as opposed to the up-and-left arc gesture by contact 5509), or a tap gesture on the other side of device 100 (as opposed to the tap gesture by contact 5510) are used to access control panel user interface 5504. In some embodiments, when control panel user interface 5504 is accessed from the lock screen (e.g., lock screen user interface 5502), the current time and date (that was displayed in a central location on lock screen user interface 5502 in FIG. 5C2) are displayed in a shifted position on control panel user interface 5504, as shown in FIG. 5C3.

FIGS. 5C4-5C6 illustrate accessing a control panel user interface from a home screen. FIG. 5C4 illustrates displaying a home screen user interface 5512. In response to various inputs (e.g., in FIG. 5C5), device 100 displays a control panel user interface 5518 (e.g., in FIG. 5C6). As shown in FIG. 5C5, various gestures are used to access control panel user interface 5518, including: a press input on the bottom edge of touch screen 112 by contact 5513 that exceeds an intensity threshold (e.g., light press intensity threshold $IT_L$), a horizontal swipe gesture on the bottom edge of touch screen 112 by contact 5514, an up-and-left arc gesture by contact 5515, and a tap gesture on the status indicators by contact 5516. In some embodiments, a horizontal swipe gesture in the other direction (as opposed to the horizontal swipe gesture by contact 5514), an up-and-right arc gesture (as opposed to the up-and-left arc gesture by contact 5515), or a tap gesture on the other side of device 100 (as opposed to the tap gesture by contact 5516) are used to access control panel user interface 5518. In some embodiments, when control panel user interface 5518 is accessed from the home screen (e.g., home screen user interface 5512) (and not from a lock screen user interface), the enlarged time and date (that were displayed on control panel user interface 5504, as shown in FIG. 5C3) are not displayed on control panel user interface 5518, as shown in FIG. 5C6.

FIGS. 5C7-5C9 illustrate accessing a control panel user interface from an application. FIG. 5C7 illustrates displaying an application user interface 5520 (e.g., for a messaging application). In response to various inputs (e.g., in FIG. 5C8), device 100 displays a control panel user interface 5518 (e.g., in FIG. 5C9). As shown in FIG. 5C8, various gestures are used to access control panel user interface 5518, including: a press input on the bottom edge of touch screen 112 by contact 5521 that exceeds an intensity threshold (e.g., light press intensity threshold $IT_L$), a horizontal swipe gesture on the bottom edge of touch screen 112 by contact 5522, an up-and-left arc gesture by contact 5523, and a tap gesture on the status indicators by contact 5524. In some embodiments, a horizontal swipe gesture in the other direction (as opposed to the horizontal swipe gesture by contact 5522), an up-and-right arc gesture (as opposed to the up-and-left arc gesture by contact 5523), or a tap gesture on the other side of device 100 (as opposed to the tap gesture by contact 5524) are used to access control panel user interface 5518. In some embodiments, when control panel user interface 5518 is accessed from an application (e.g., application user interface 5520) (and not from a lock screen user interface), the enlarged time and date (that were displayed on control panel user interface 5504, as shown in FIG. 5C3) are not displayed on control panel user interface 5518, as shown in FIG. 5C9.

FIGS. 5C10-5C12 illustrate accessing a control panel user interface from a multitasking user interface. FIG. 5C10 illustrates displaying a multitasking user interface 5526 that includes a representation of control panel user interface 5518. In response to various inputs (e.g., in FIG. 5C11), device 100 displays a control panel user interface 5518 (e.g., in FIG. 5C12). As shown in FIG. 5C11, various gestures are used to access control panel user interface 5518, including: a tap input on a representation of control panel user interface 5518 by contact 5527, a horizontal swipe gesture on the representation of control panel user interface 5518 by contact 5528, and a tap gesture on the status indicators by contact 5529. In some embodiments, a horizontal swipe gesture in the other direction (as opposed to the horizontal swipe gesture by contact 5528) or a tap gesture on the other side of device 100 (as opposed to the tap gesture by contact 5529) are used to access control panel user interface 5518. In some embodiments, when control panel user interface 5518 is accessed from a multitasking user interface (e.g., multitasking user interface 5526) (and not from a lock screen user interface), the enlarged time and date (that were displayed on control panel user interface 5504, as shown in FIG. 5C3) are not displayed on control panel user interface 5518, as shown in FIG. 5C12.

FIGS. 5C13-5C16 illustrate displaying a control panel user interface (e.g., control panel user interface 5518, FIG. 5C13), and in response to a press input on a region of the control panel user interface (e.g., on Wi-Fi icon 5546 in connectivity module 5540), displaying an expanded view of the region (e.g., expanded connectivity module 5550, FIG. 5C15). FIG. 5C13 illustrates displaying a control panel user interface 5518 that includes one or more control regions, each of which includes a respective plurality of controls for controlling corresponding functions of device 100. As shown in FIG. 5C13, control panel user interface 5518 includes connectivity module 5540, which includes multiple controls (e.g., airplane mode icon 5542, cellular data icon 5544, Wi-Fi icon 5546, and Bluetooth icon 5548). In FIGS. 5C14-5C15, device 100 detects an input on connectivity module 5540, such as a press gesture by contact 5532, and in response, device 100 displays an expanded view of connectivity module 5540 (e.g., expanded connectivity module 5550, FIG. 5C15). As shown in FIG. 5C14, as the press gesture by contact 5532-*a* increases above a first intensity threshold (e.g., hint intensity threshold $IT_H$), connectivity module 5540 increases in size and the rest of control panel user interface 5518 starts to blur. As shown in FIG. 5C15, as the press gesture by contact 5532-*b* continues to increase in intensity and increases above a second intensity threshold (e.g., light press intensity threshold $IT_L$), the control region is expanded (e.g., "popped open") to display additional controls in expanded connectivity module 5550 and the rest of control panel user interface 5518 is blurred further. As shown in FIGS. 5C15-5C16, expanded connectivity module 5550 includes additional controls (e.g., AirDrop icon 5552 and Personal Hotspot icon 5554) and additional information (e.g., status of each control) that were not shown in connectivity module 5540 (e.g., in FIG. 5C13). In some embodiments, device 100 displays the expanded view of a control region (e.g., expanded connectivity module 5550, FIG. 5C15) in response to a touch-hold input (e.g., a long press input by contact 5532) (e.g., based on length of time of the contact rather than intensity of the contact). As shown in FIG. 5C16, upon liftoff of contact 5532, expanded connectivity module 5550 remains displayed.

In FIGS. 5C17-5C18, device 100 detects an input on Wi-Fi icon 5546, such as a tap gesture by contact 5534, and in response, toggles the Wi-Fi control from OFF to ON (and changes the status of the Wi-Fi control from "Off" to "AppleWiFi") and changes the appearance of Wi-Fi icon 5546 (e.g., from light to dark). As shown in FIG. 5C17, depending on the intensity of the tap gesture by contact 5534, Wi-Fi icon 5546 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that Wi-Fi icon 5546 is sensitive to intensity-based inputs.

In FIGS. 5C19-5C20, device 100 detects an input outside of expanded connectivity module 5550, such as a tap gesture by contact 5536, and in response, dismisses the expanded connectivity module 5550 and displays control panel user interface 5518 (e.g., in FIG. 5C20). As shown in FIG. 5C20, Wi-Fi icon 5546 is now darkened, indicating that the Wi-Fi control is on.

In FIGS. 5C21-5C22, device 100 detects an input on Wi-Fi icon 5546, such as a tap gesture by contact 5556, and in response, toggles the Wi-Fi control from ON to OFF and changes the appearance of Wi-Fi icon 5546 (e.g., from dark to light). As shown in FIG. 5C21, depending on the intensity of the tap gesture by contact 5556, connectivity module 5540 increases in size in accordance with a rate by which the intensity of the contact changes. For example, connectivity module 5540 will increase in size by a smaller amount in response to a tap gesture with a smaller intensity, as shown in FIG. 5C21, and connectivity module 5540 will increase in size by a larger amount in response to a tap gesture with a larger intensity, as shown in FIG. 5C23. Although the tap gestures shown in FIGS. 5C21 and 5C23 are both below hint intensity threshold $IT_H$, a hard (and quick) tap (e.g., above hint intensity threshold $IT_H$) is still recognized as a tap gesture by device 100 and it is not a requirement that the intensity of a tap gesture remain below a particular intensity threshold. For example, in some embodiments, the intensity of a tap gesture is above hint intensity threshold $IT_H$, above light press intensity threshold $IT_L$, or above deep press intensity threshold $IT_D$, but as long as the duration of the gesture is short enough to qualify as a tap, it is still recognized as a tap gesture.

In FIGS. 5C23-5C24, device 100 detects an input on Bluetooth icon 5548, such as a tap gesture by contact 5558, and in response, toggles the Bluetooth control from OFF to ON and changes the appearance of Bluetooth icon 5548 (e.g., from light to dark). As shown in FIG. 5C23, depending on the intensity of the tap gesture by contact 5558, connectivity module 5540 increases in size in accordance with a rate by which the intensity of the contact changes. For example, since the intensity of contact 5558 (e.g., in FIG. 5C23) is greater than the intensity of contact 5556 (e.g., in FIG. 5C21), the size of connectivity module 5540 is larger in FIG. 5C23 compared to the size of connectivity module 5540 in FIG. 5C21.

FIGS. 5C25-5C27 illustrate displaying a control panel user interface (e.g., user interface 5518, FIG. 5C24), and in response to a press input on a region of the control panel user interface (e.g., in connectivity module 5540, in a region not occupied by any controls), displaying an expanded view of the region (e.g., expanded connectivity module 5550, FIG. 5C26). In FIGS. 5C25-5C26, device 100 detects an input on connectivity module 5540, such as a press gesture by contact 5560, and in response, device 100 displays an expanded view of connectivity module 5540 (e.g., expanded connectivity module 5550, FIG. 5C26). As shown in FIG. 5C25, as the press gesture by contact 5560-*a* increases above a first intensity threshold (e.g., hint intensity threshold $IT_H$), connectivity module 5540 increases in size and the rest of control panel user interface 5518 starts to blur. As shown in FIG. 5C26, as the press gesture by contact 5560-*b* continues to increase in intensity and increases above a second intensity threshold (e.g., light press intensity threshold $IT_L$), the control region is expanded (e.g., "popped open") to display additional controls in expanded connectivity module 5550 and the rest of control panel user interface 5518 is blurred further. In some embodiments, device 100 displays the expanded view of a control region (e.g., expanded connectivity module 5550, FIG. 5C26) in response to a touch-hold input (e.g., a long press input by contact 5560) (e.g., based on length of time of the contact rather than intensity of the contact). As shown in FIG. 5C27, upon liftoff of contact 5560, expanded connectivity module 5550 remains displayed.

In FIGS. 5C28-5C29, device 100 detects an input on Wi-Fi icon 5546, such as a tap gesture by contact 5562, and in response, toggles the Wi-Fi control from OFF to ON (and changes the status of the Wi-Fi control from "Off" to "AppleWiFi") and changes the appearance of Wi-Fi icon 5546 (e.g., from light to dark). As shown in FIG. 5C28, depending on the intensity of the tap gesture by contact 5562, Wi-Fi icon 5546 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that Wi-Fi icon 5546 is sensitive to intensity-based inputs. In some embodiments, for the AirDrop control to be in the ON state, both Wi-Fi and Bluetooth must be ON. As shown in FIG. 5C29, when Wi-Fi is toggled back on (and thus, both Wi-Fi and Bluetooth are in the ON state), AirDrop also turns back on (and the status is changed from "Receiving Off" to "Contacts Only").

FIGS. 5C29-5C32 illustrate displaying an expanded view of a region from the control panel user interface (e.g., expanded connectivity module 5550, FIG. 5C29), and in response to a press input on an expandable control icon (e.g., Wi-Fi icon 5546), displaying an enhanced view of the expandable control (e.g., enhanced Wi-Fi control 5566, FIG. 5C31). In FIGS. 5C30-5C31, device 100 detects an input on Wi-Fi icon 5546, such as a press gesture by contact 5564, and in response, device 100 displays an enhanced view of the Wi-Fi control (e.g., enhanced Wi-Fi control 5566, FIG. 5C31). As shown in FIG. 5C30, as the press gesture by contact 5564-*a* increases above a first intensity threshold (e.g., hint intensity threshold $IT_H$), Wi-Fi icon 5546 increases in size (and optionally, the rest of expanded connectivity module 5550 starts to blur). As shown in FIG. 5C31, as the press gesture by contact 5564-*b* continues to increase in intensity and increases above a second intensity threshold (e.g., light press intensity threshold $IT_L$), the control icon is expanded (e.g., "popped open") to display an enhanced view of the control in enhanced Wi-Fi control 5566 (and expanded connectivity module 5550 is blurred, although in FIG. 5C31, expanded connectivity module 5550 is completely obscured by enhanced Wi-Fi control 5566). As shown in FIGS. 5C31-5C32, enhanced Wi-Fi control 5566 includes additional information and/or controls (e.g., other available Wi-Fi connections, signal strength and other information for the Wi-Fi connections, access to Wi-Fi settings, etc.) that were not shown in expanded connectivity module 5550 (e.g., in FIG. 5C29). In some embodiments, device 100 displays the enhanced view of a control (e.g., enhanced Wi-Fi control 5566) in response to a touch-hold input (e.g., a long press input by contact 5564) (e.g., based on length of time of the contact rather than intensity of the contact). As shown in FIG. 5C32, upon liftoff of contact 5564, enhanced Wi-Fi control 5566 remains displayed.

In FIGS. 5C33-5C34, device 100 detects an input outside of enhanced Wi-Fi control 5566, such as a tap gesture by contact 5568, and in response, dismisses the enhanced Wi-Fi control 5566 and displays expanded connectivity module 5550 (e.g., in FIG. 5C34).

In FIGS. 5C35-5C36, device 100 detects an input on Wi-Fi icon 5546, such as a tap gesture by contact 5570, and in response, toggles the Wi-Fi control from ON to OFF (and changes the status of the Wi-Fi control from "AppleWiFi" to "Off") and changes the appearance of Wi-Fi icon 5546 (e.g., from dark to light). As shown in FIG. 5C35, depending on the intensity of the tap gesture by contact 5570, Wi-Fi icon 5546 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that Wi-Fi icon 5546 is sensitive to intensity-based inputs. In some embodiments, for the AirDrop control to be in the ON state, both Wi-Fi and Bluetooth must be ON. As shown in FIG. 5C36, when Wi-Fi is toggled to the OFF state, AirDrop also turns off (and the status is changed from "Contacts Only" to "Receiving Off").

In FIGS. 5C37-5C38, device 100 detects an input on Bluetooth icon 5548, such as a tap gesture by contact 5572, and in response, toggles the Bluetooth control from ON to OFF (and changes the status of the Bluetooth control from "On" to "Off") and changes the appearance of Bluetooth icon 5548 (e.g., from dark to light). As shown in FIG. 5C37, depending on the intensity of the tap gesture by contact 5572, Bluetooth icon 5548 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that Bluetooth icon 5548 is sensitive to intensity-based inputs.

In FIGS. 5C39-5C40, device 100 detects an input outside of expanded connectivity module 5550, such as a tap gesture by contact 5574, and in response, dismisses the expanded connectivity module 5550 and displays control panel user interface 5518 (e.g., in FIG. 5C40). Note that the change in appearance of any controls in the expanded connectivity module 5550 is preserved in the connectivity module 5540 of control panel user interface 5518 when the expanded connectivity module 5550 is dismissed. For example, since the Wi-Fi control and Bluetooth control were turned off while the expanded connectivity module 5550 was displayed (e.g., in FIGS. 5C35-5C38), Wi-Fi icon 5546 and Bluetooth icon 5548 in connectivity module 5540 (e.g., in FIG. 5C40) are both lightened, indicating that the Wi-Fi control is off and the Bluetooth control is off.

FIGS. 5C41-5C45 illustrate additional enhanced views of expandable controls (e.g., Bluetooth control, AirDrop control, and Personal Hotspot control) from the expanded connectivity module 5550 (e.g., in FIG. 5C41).

In FIGS. 5C42-5C43, device 100 detects an input on Bluetooth icon 5548, such as a press gesture by contact 5576, and in response, device 100 displays an enhanced view of the Bluetooth control (e.g., enhanced Bluetooth control 5580, FIG. 5C43). As shown in FIG. 5C42, as the press gesture by contact 5576-*a* increases above a first intensity threshold (e.g., hint intensity threshold $IT_H$), Bluetooth icon 5548 increases in size (and optionally, the rest of expanded connectivity module 5550 starts to blur). As shown in FIG. 5C43, as the press gesture by contact 5576-*b* continues to increase in intensity and increases above a second intensity threshold (e.g., light press intensity threshold $IT_L$), the control icon is expanded (e.g., "popped open") to display an enhanced view of the control in enhanced Bluetooth control 5580 (and expanded connectivity module 5550 is blurred). As shown in FIG. 5C43, enhanced Bluetooth control 5580 includes additional information and/or controls (e.g., number of Bluetooth connections, battery life of each Bluetooth device, access to Bluetooth settings, etc.) that were not shown in expanded connectivity module 5550 (e.g., in FIG. 5C41). In some embodiments, device 100 displays the enhanced view of a control (e.g., enhanced Bluetooth control 5580) in response to a touch-hold input (e.g., a long press input by contact 5576) (e.g., based on length of time of the contact rather than intensity of the contact).

In FIGS. 5C42 and 5C44, device 100 detects an input on AirDrop icon 5552, such as a press gesture by contact 5577, and in response, device 100 displays an enhanced view of the AirDrop control (e.g., enhanced AirDrop control 5582, FIG. 5C44). As shown in FIG. 5C42, as the press gesture by contact 5577-*a* increases above a first intensity threshold (e.g., hint intensity threshold $IT_H$), AirDrop icon 5552 increases in size (and optionally, the rest of expanded connectivity module 5550 starts to blur). As shown in FIG. 5C44, as the press gesture by contact 5577-*b* continues to increase in intensity and increases above a second intensity threshold (e.g., light press intensity threshold $IT_L$), the control icon is expanded (e.g., "popped open") to display an enhanced view of the control in enhanced AirDrop control 5582 (and expanded connectivity module 5550 is blurred). As shown in FIG. 5C44, enhanced AirDrop control 5582 includes additional information and/or controls (e.g., options to select between "Receiving Off," "Contacts Only," and "Everyone," etc.) that were not shown in expanded connectivity module 5550 (e.g., in FIG. 5C41). In some embodiments, device 100 displays the enhanced view of a control (e.g., enhanced AirDrop control 5582) in response to a touch-hold input (e.g., a long press input by contact 5577) (e.g., based on length of time of the contact rather than intensity of the contact).

In FIGS. 5C42 and 5C45, device 100 detects an input on Personal Hotspot icon 5554, such as a press gesture by contact 5578, and in response, device 100 displays an enhanced view of the Personal Hotspot control (e.g., enhanced Personal Hotspot control 5584, FIG. 5C45). As shown in FIG. 5C42, as the press gesture by contact 5578-*a* increases above a first intensity threshold (e.g., hint intensity threshold $IT_H$), Personal Hotspot icon 5554 increases in size (and optionally, the rest of expanded connectivity module 5550 starts to blur). As shown in FIG. 5C45, as the press gesture by contact 5578-*b* continues to increase in intensity and increases above a second intensity threshold (e.g., light press intensity threshold $IT_L$), the control icon is expanded (e.g., "popped open") to display an enhanced view of the control in enhanced Personal Hotspot control 5584 (and expanded connectivity module 5550 is blurred). As shown in FIG. 5C45, enhanced Personal Hotspot control 5584 includes additional information and/or controls (e.g., Wi-Fi password, access to Personal Hotspot settings, etc.) that were not shown in expanded connectivity module 5550 (e.g., in FIG. 5C41). In some embodiments, device 100 displays the enhanced view of a control (e.g., enhanced Personal Hotspot control 5584) in response to a touch-hold input (e.g., a long press input by contact 5578) (e.g., based on length of time of the contact rather than intensity of the contact).

FIGS. 5D1-5D42 illustrate example user interfaces for displaying and editing a control panel user interface (also sometimes called a "control center"), in accordance with some embodiments. The user interfaces in these figures are used to illustrate the processes described below, including the processes in FIGS. 12A-12I. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5D1 illustrates displaying a control panel user interface 5518 that includes one or more control affordances. As shown in FIG. 5D1, control panel user interface 5518 includes airplane mode icon 5542, cellular data icon 5544, Wi-Fi icon 5546, Bluetooth icon 5548, audio control 5622, orientation lock icon 5624, Do Not Disturb icon 5626, AirPlay icon 5628, brightness control 5630, volume control 5632, and one or more user-configurable control affordances, including: flashlight icon 5600, timer icon 5602, calculator icon 5604, and camera icon 5606. In some embodiments, one or more of the control affordances on control panel user interface 5518 are not user-configurable (e.g., is, optionally, not removed or rearranged by a user of device 100). For example, in some embodiments, control affordances such as airplane mode icon 5542, cellular data icon 5544, Wi-Fi icon 5546, Bluetooth icon 5548, audio control 5622, orientation lock icon 5624, Do Not Disturb icon 5626, AirPlay icon 5628, brightness control 5630, and volume control 5632 are not user-configurable. In some embodiments, one or more of the control affordances on control panel user interface 5518 are user-configurable (e.g., are permitted, by the device, to be added, removed, or rearranged by a user of device 100). For example, in some embodiments, control affordances such as flashlight icon 5600, timer icon 5602, calculator icon 5604, and camera icon 5606 are user-configurable.

FIGS. 5D2-5D7 illustrate navigating to a control panel settings user interface (e.g., control panel settings user interface 5648, FIG. 5D7) from a control panel user interface (e.g., user interface 5518, FIG. 5D2). In FIGS. 5D2-5D3, device 100 detects an input on home affordance 5506, such as a swipe up gesture by contact 5640, and in response, displays the home screen (e.g., home screen user interface 5512, FIG. 5D3). In FIGS. 5D4-5D5, device 100 detects an input on settings icon 446, such as a tap gesture by contact 5642, and in response, displays a settings user interface (e.g., settings user interface 5644, FIG. 5D5). In FIGS. 5D6-5D7, device 100 detects an input to select the control panel settings, such as a tap gesture by contact 5646, and in response, displays a control panel settings user interface (e.g., control panel settings user interface 5648, FIG. 5D7). As shown in FIG. 5D7, control panel settings user interface 5648 displays a set of selected modules (e.g., flashlight, timer, calculator, and camera) that are currently selected for display in control panel user interface 5518 (e.g., in FIG. 5D2) and a set of zero or more additional modules (e.g., in an unselected state) that are not currently included in control panel user interface 5518, but are available to be included in the configurable portion(s) of control panel user interface 5518. As in the example of FIG. 5D7, if there are more modules than can be displayed in an initial single screen of control panel settings user interface 5648, the list of modules is scrollable to allow display of additional modules (e.g., additional modules in the "More Modules" list). In FIG. 5D7, "+" and "–" selection controls are used to add or remove modules, respectively, from control panel user interface 5518. In some embodiments, other methods are used to add or remove modules (e.g., an ON/OFF toggle affordance for each module, dragging modules from the "More Modules" list to the "Selected Modules" list to add modules, dragging modules from the "Selected Modules" list to the "More Modules" list to remove modules, etc.).

FIGS. 5D8-5D11 illustrate an example of adding a control affordance to the control panel user interface. In FIGS. 5D8-5D9, device 100 detects an input on the "+" selection control for the Home module, such as a tap gesture by contact 5650, and in response, moves the Home module from the "More Modules" list to the "Selected Modules" list (e.g., as shown in FIG. 5D9). In FIGS. 5D10-5D11, device 100 detects an input on the "Done" icon of control panel settings user interface 5648, such as a tap gesture by contact 5652, and in response, displays control panel user interface 5518. Although the example in FIG. 5D11 uses the "Done" icon to return to control panel user interface 5518, in some embodiments, the control panel user interface is, optionally, enabled, by the device, to be accessed in other ways, as described above with respect to FIGS. 5C1-5C12 (e.g., a press input on the bottom edge of touch screen 112 that exceeds an intensity threshold (e.g., light press intensity threshold $IT_L$), a horizontal swipe gesture on the bottom edge of touch screen 112, an up-and-left arc gesture, or a tap gesture on the status indicators). As shown in FIG. 5D11, now that the Home module has been selected for display, Home icon 5608 is displayed in control panel user interface 5518.

FIG. 5D12 illustrates control panel user interface 5518 after multiple modules have been selected (e.g., in a similar manner as described above with respect to FIGS. 5D8-5D11). As shown in FIG. 5D12, control panel user interface 5518 includes a set of control affordances that are not user-configurable (e.g., airplane mode icon 5542, cellular data icon 5544, Wi-Fi icon 5546, Bluetooth icon 5548, audio control 5622, orientation lock icon 5624, Do Not Disturb icon 5626, AirPlay icon 5628, brightness control 5630, and volume control 5632), and one or more user-configurable control affordances, including: flashlight icon 5600, timer icon 5602, calculator icon 5604, and camera icon 5606, Home icon 5608, accessibility icon 5610, Apple TV remote icon 5612, type size icon 5614, low power mode icon 5616, CarPlay icon 5618, and hearing aid icon 5620.

FIGS. 5D12-5D17 illustrate navigating to a control panel settings user interface (e.g., control panel settings user interface 5648, FIG. 5D17) from a control panel user interface (e.g., user interface 5518, FIG. 5D12). In FIGS. 5D12-5D13, device 100 detects an input on home affordance 5506, such as a swipe up gesture by contact 5654, and in response, displays the home screen (e.g., home screen user interface 5512, FIG. 5D13). In FIGS. 5D14-5D15, device 100 detects an input on settings icon 446, such as a tap gesture by contact 5656, and in response, displays a settings user interface (e.g., settings user interface 5644, FIG. 5D15). In FIGS. 5D16-5D17, device 100 detects an input to select the control panel settings, such as a tap gesture by contact 5658, and in response, displays a control panel settings user interface (e.g., control panel settings user interface 5648, FIG. 5D17). As shown in FIG. 5D17, control panel settings user interface 5648 displays a set of selected modules (e.g., flashlight, timer, calculator, camera, Home, accessibility, Apple TV remote, etc.) that are currently selected for display in control panel user interface 5518 (e.g., in FIG. 5D12). As in the example of FIG. 5D17, if there are more modules than can be displayed in an initial single screen of control panel settings user interface 5648, the list of modules is scrollable to allow display of additional modules (e.g., additional modules in the "Selected Modules" list).

FIGS. 5D18-5D22 illustrate scrolling through the "Selected Modules" list of control panel settings user interface 5648. FIGS. 5D18-5D19 illustrate an upward movement of a contact 5660 (e.g., in a drag gesture from location of contact 5660-*a* to location of contact 5660-*b*). In some embodiments, the list of modules moves by the same amount as the horizontal component of movement of contact 5660 on the display. In this example, contact 5660-*a* started on the "Home" module (e.g., in FIG. 5D18), which is moved up (e.g., in accordance with movement of contact 5660) to display additional modules that were not visible in the initial single screen of control panel settings user interface 5648 of FIG. 5D18 (e.g., type size, low power mode, CarPlay, and Jane's Hearing Aids). In some embodiments, upon liftoff of contact 5660, the scrollable list remains in the position to which it was scrolled, as shown in FIG. 5D20. FIGS. 5D21-5D22 illustrate a downward movement of a contact 5662 (e.g., in a drag gesture from location of contact 5662-*a* to location of contact 5662-*b*). As contact 5662 moves downward, the scrollable list is scrolled back to the original starting point.

FIGS. 5D23-5D27 illustrate reordering representations of modules in control panel settings user interface 5648, which corresponds to an analogous reordering in the control panel user interface 5518 (e.g., from an initial ordering of control affordances in FIG. 5D12 to an updated ordering of control affordances in FIG. 5D27). In some embodiments, each user-configurable control that is currently selected for display in the control panel user interface (e.g., the modules in the "Selected Modules" list of the control panel settings user interface) includes a reorder control. For example, the representation of the "Apple TV Remote" module includes reorder control 5664. In FIGS. 5D24-5D25, device 100 detects an input on reorder control 5664 to move the representation of "Apple TV Remote," such as a drag gesture by contact 5666, and in response, moves the representation of "Apple TV Remote" to between the representation of "Camera" and the representation of "Home." In some embodiments, a drag gesture on a location other than a reorder control results in scrolling the list of modules, as described above with respect to FIG. 5D18-5D22. In FIGS. 5D26-5D27, device 100 detects an input on the "Done" icon of control panel settings user interface 5648, such as a tap gesture by contact 5668, and in response, displays control panel user interface 5518. Although the example in FIG. 5D26 uses the "Done" icon to return to control panel user interface 5518, in some embodiments, the control panel user interface is, optionally, enabled, by the device, to be accessed in other ways, as described above with respect to FIGS. 5C1-5C12 (e.g., a press input on the bottom edge of touch screen 112 that exceeds an intensity threshold (e.g., light press intensity threshold $IT_L$), a horizontal swipe gesture on the bottom edge of touch screen 112, an up-and-left arc gesture, or a tap gesture on the status indicators). As shown in FIG. 5D27, now that the Apple TV remote module has been reordered, Apple TV remote icon 5612 is displayed after camera icon 5606 and before Home icon 5608 in control panel user interface 5518.

FIGS. 5D27-5D29 illustrate displaying a control panel user interface (e.g., user interface 5518, FIG. 5D27), and in response to a press input on an expandable control icon (e.g., accessibility icon 5610), displaying an enhanced view of the expandable control (e.g., enhanced accessibility control 5672, FIG. 5D29). In FIGS. 5D28-5D29, device 100 detects an input on accessibility icon 5610, such as a press gesture by contact 5670, and in response, device 100 displays an enhanced view of the accessibility control (e.g., enhanced accessibility control 5672, FIG. 5D29). As shown in FIG. 5D28, as the press gesture by contact 5670-*a* increases above a first intensity threshold (e.g., hint intensity threshold $IT_H$), accessibility icon 5610 increases in size (and optionally, the rest of control panel user interface 5518 starts to blur). As shown in FIG. 5D29, as the press gesture by contact 5670-*b* continues to increase in intensity and increases above a second intensity threshold (e.g., light press intensity threshold $IT_L$), the control icon is expanded (e.g., "popped open") to display an enhanced view of the control in enhanced accessibility control 5672 and the rest of control panel user interface 5518 is blurred further. As shown in FIG. 5D29, enhanced accessibility control 5672 includes additional information and/or controls (e.g., accessibility shortcuts such as "Color Filters," "Invert Colors," "Reduce White Point," etc.) that were not shown in control panel user interface 5518 (e.g., in FIG. 5D27). In some embodiments, device 100 displays the enhanced view of a control (e.g., enhanced accessibility control 5672) in response to a touch-hold input (e.g., a long press input by contact 5670) (e.g., based on length of time of the contact rather than intensity of the contact). In some embodiments, upon liftoff of contact 5670, enhanced accessibility control 5672 remains displayed.

In FIGS. 5D30-5D31, device 100 detects an input to select an accessibility shortcut (e.g., to select "Reduce White Point"), such as a tap gesture by contact 5674, and in response, activates "Reduce White Point" and changes the appearance of the accessibility icon (e.g., from light to dark, indicating that an accessibility feature is in an ON state).

In FIGS. 5D32-5D33, device 100 detects an input outside of enhanced accessibility control 5672, such as a tap gesture by contact 5676, and in response, dismisses the enhanced accessibility control 5672 and displays control panel user interface 5518 (e.g., in FIG. 5D33). As shown in FIG. 5D33, accessibility icon 5610 is now darkened, indicating that an accessibility feature is on.

In FIGS. 5D34-5D35, device 100 detects an input on accessibility icon 5610, such as a tap gesture by contact 5678, and in response, toggles the accessibility control from ON to OFF and changes the appearance of accessibility icon 5610 (e.g., from dark to light). As shown in FIG. 5D34, depending on the intensity of the tap gesture by contact 5678, accessibility icon 5610 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that accessibility icon 5610 is sensitive to intensity-based inputs. Although the tap gesture shown in FIG. 5D34 is below hint intensity threshold $IT_H$, a hard (and quick) tap (e.g., above hint intensity threshold $IT_H$) is still recognized as a tap gesture by device 100 and it is not a requirement that the intensity of a tap gesture remain below a particular intensity threshold. For example, in some embodiments, the intensity of a tap gesture is above hint intensity threshold $IT_H$, above light press intensity threshold $IT_L$, or above deep press intensity threshold $IT_D$, but as long as the duration of the gesture is short enough to qualify as a tap, it is still recognized as a tap gesture.

FIGS. 5D36-5D42 illustrate additional enhanced views of expandable controls (e.g., Do Not Disturb control, type size control, hearing aid control, audio control, and Apple TV remote control) from control panel user interface 5518 (e.g., in FIG. 5D36).

In FIGS. 5D36-5D37, device 100 detects an input on Do Not Disturb icon 5626, such as a press gesture by contact 5680, and in response, device 100 displays an enhanced view of the Do Not Disturb control (e.g., enhanced Do Not Disturb control 5690, FIG. 5D37). As shown in FIG. 5D36, as the press gesture by contact 5680-*a* increases above a first intensity threshold (e.g., hint intensity threshold $IT_H$), Do Not Disturb icon 5626 increases in size (and optionally, the rest of control panel user interface 5518 starts to blur). As shown in FIG. 5D37, as the press gesture by contact 5680-*b* continues to increase in intensity and increases above a second intensity threshold (e.g., light press intensity threshold $IT_L$), the control icon is expanded (e.g., "popped open") to display an enhanced view of the control in enhanced Do Not Disturb control 5690 (and control panel user interface 5518 is blurred further). As shown in FIG. 5D37, enhanced Do Not Disturb control 5690 includes additional information and/or controls (e.g., options to select timing of the Do Not Disturb feature, such as "Manual," "On for next hour," "On for rest of day," "On until I leave this location," and access to Do Not Disturb settings, etc.) that were not shown in control panel user interface 5518 (e.g., in FIG. 5D36). In some embodiments, device 100 displays the enhanced view of a control (e.g., enhanced Do Not Disturb control 5690, FIG. 5D37) in response to a touch-hold input (e.g., a long press input by contact 5680) (e.g., based on length of time of the contact rather than intensity of the contact).

In FIGS. 5D36 and 5D38, device 100 detects an input on type size icon 5614, such as a press gesture by contact 5682, and in response, device 100 displays an enhanced view of the type size control (e.g., enhanced type size control 5692, FIG. 5D38). As shown in FIG. 5D36, as the press gesture by contact 5682-*a* increases above a first intensity threshold (e.g., hint intensity threshold $IT_H$), type size icon 5614 increases in size (and optionally, the rest of control panel user interface 5518 starts to blur). As shown in FIG. 5D38, as the press gesture by contact 5682-*b* continues to increase in intensity and increases above a second intensity threshold (e.g., light press intensity threshold $IT_L$), the control icon is expanded (e.g., "popped open") to display an enhanced view of the control in enhanced type size control 5692 (and control panel user interface 5518 is blurred further). As shown in FIG. 5D38, enhanced type size control 5692 includes a step slider bar for selecting between a first number of text sizes (e.g., seven different text sizes), ranging from a first minimum size to a first maximum size (e.g., from 6 point text size to 24 point text size). In some embodiments, enhanced type size control 5692 in FIG. 5D38 is a default step slider bar (e.g., when large text sizes for accessibility are not enabled). In some embodiments, device 100 displays the enhanced view of a control (e.g., enhanced type size control 5692, FIG. 5D38) in response to a touch-hold input (e.g., a long press input by contact 5682) (e.g., based on length of time of the contact rather than intensity of the contact).

Alternatively, when large text sizes for accessibility are enabled, in FIGS. 5D36 and 5D39, device 100 detects an input on type size icon 5614, such as a press gesture by contact 5682, and in response, device 100 displays an enhanced view of the type size control (e.g., enhanced type size control 5693, FIG. 5D39). As shown in FIG. 5D36, as the press gesture by contact 5682-*a* increases above a first intensity threshold (e.g., hint intensity threshold $IT_H$), type size icon 5614 increases in size (and optionally, the rest of control panel user interface 5518 starts to blur). As shown in FIG. 5D39, as the press gesture by contact 5682-*b* continues to increase in intensity and increases above a second intensity threshold (e.g., light press intensity threshold $IT_L$), the control icon is expanded (e.g., "popped open") to display an enhanced view of the control in enhanced type size control 5693 (and control panel user interface 5518 is blurred further). As shown in FIG. 5D39, enhanced type size control 5693 includes a step slider bar for selecting between a second number of text sizes (e.g., twelve different text sizes), ranging from a second minimum size to a second maximum size (e.g., from 8 point text size to 60 point text size). In some embodiments, enhanced type size control 5693 in FIG. 5D39 is an expanded step slider bar (e.g., with more options and/or larger text size options than the default step slider bar in FIG. 5D38) that is provided when large text sizes for accessibility are enabled. In some embodiments, device 100 displays the enhanced view of a control (e.g., enhanced type size control 5693, FIG. 5D39) in response to a touch-hold input (e.g., a long press input by contact 5682) (e.g., based on length of time of the contact rather than intensity of the contact).

In FIGS. 5D36 and 5D40, device 100 detects an input on hearing aid icon 5620, such as a press gesture by contact 5684, and in response, device 100 displays an enhanced view of the hearing aid control (e.g., enhanced hearing aid control 5694, FIG. 5D40). As shown in FIG. 5D36, as the press gesture by contact 5684-*a* increases above a first intensity threshold (e.g., hint intensity threshold $IT_H$), hearing aid icon 5620 increases in size (and optionally, the rest of control panel user interface 5518 starts to blur). As shown in FIG. 5D40, as the press gesture by contact 5684-*b* continues to increase in intensity and increases above a second intensity threshold (e.g., light press intensity threshold $IT_L$), the control icon is expanded (e.g., "popped open") to display an enhanced view of the control in enhanced hearing aid control 5694 (and control panel user interface 5518 is blurred further). As shown in FIG. 5D40, enhanced hearing aid control 5694 includes additional information and/or controls (e.g., battery indicators for each hearing aid, individual volume controls for each hearing aid, individual bass/treble controls, etc.) that were not shown in control panel user interface 5518 (e.g., in FIG. 5D36). In some embodiments, device 100 displays the enhanced view of a control (e.g., enhanced hearing aid control 5694, FIG. 5D40) in response to a touch-hold input (e.g., a long press input by contact 5684) (e.g., based on length of time of the contact rather than intensity of the contact).

In FIGS. 5D36 and 5D41, device 100 detects an input on audio control 5622, such as a press gesture by contact 5686, and in response, device 100 displays an enhanced view of the audio control (e.g., enhanced audio control 5696, FIG. 5D41). As shown in FIG. 5D36, as the press gesture by contact 5686-*a* increases above a first intensity threshold (e.g., hint intensity threshold $IT_H$), audio control 5622 increases in size (and optionally, the rest of control panel user interface 5518 starts to blur). As shown in FIG. 5D41, as the press gesture by contact 5686-*b* continues to increase in intensity and increases above a second intensity threshold (e.g., light press intensity threshold $IT_L$), the control is expanded (e.g., "popped open") to display an enhanced view of the control in enhanced audio control 5696 (and control panel user interface 5518 is blurred further). As shown in FIG. 5D41, enhanced audio control 5696 includes additional information and/or controls (e.g., artist/album information, length of song and time played/remaining, volume control, and optionally, a control to switch the audio output to another audio device, etc.) that were not shown in control panel user interface 5518 (e.g., in FIG. 5D36). In some embodiments, device 100 displays the enhanced view of a control (e.g., enhanced audio control 5696, FIG. 5D41) in response to a touch-hold input (e.g., a long press input by contact 5686) (e.g., based on length of time of the contact rather than intensity of the contact).

In FIGS. 5D36 and 5D42, device 100 detects an input on Apple TV remote icon 5612, such as a press gesture by contact 5688, and in response, device 100 displays an enhanced view of the Apple TV remote control (e.g., enhanced Apple TV remote control 5698, FIG. 5D42). As shown in FIG. 5D36, as the press gesture by contact 5688-*a* increases above a first intensity threshold (e.g., hint intensity threshold $IT_H$), Apple TV remote icon 5612 increases in size (and optionally, the rest of control panel user interface 5518 starts to blur). As shown in FIG. 5D42, as the press gesture by contact 5688-*b* continues to increase in intensity and increases above a second intensity threshold (e.g., light press intensity threshold $IT_L$), the control icon is expanded (e.g., "popped open") to display an enhanced view of the control in enhanced Apple TV remote control 5698 (and control panel user interface 5518 is blurred further). As shown in FIG. 5D42, enhanced Apple TV remote control 5698 includes additional information and/or controls (e.g., touch surface 5700 (used to swipe to navigate around another device (e.g., a TV) and tap to select), menu icon 5702 (used to return to the previous screen or menu), play/pause icon 5704 (used to play or pause content), home icon 5706 (used to see recently used apps, open an app, and/or go to the home screen), and Siri icon 5708 (used to access voice-activated controls and/or dictation), etc.) that were not shown in control panel user interface 5518 (e.g., in FIG. 5D36). In some embodiments, device 100 displays the enhanced view of a control (e.g., enhanced Apple TV remote control 5698, FIG. 5D42) in response to a touch-hold input (e.g., a long press input by contact 5688) (e.g., based on length of time of the contact rather than intensity of the contact).

FIGS. 5E1-5E39 illustrate example user interfaces for displaying a control panel user interface (also sometimes called a "control center") including one or more slider controls and, in response to different inputs on a slider control, displaying an enhanced slider control, updating the control value, or toggling the control, in accordance with some embodiments. The user interfaces in these figures are used to illustrate the processes described below, including the processes in FIGS. 13A-13D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5E1 illustrates displaying a control panel user interface 5518 that includes one or more control affordances. As shown in FIG. 5E1, control panel user interface 5518 includes airplane mode icon 5542, cellular data icon 5544, Wi-Fi icon 5546, Bluetooth icon 5548, audio control 5622, orientation lock icon 5624, Do Not Disturb icon 5626, AirPlay icon 5628, brightness control 5630, volume control 5632, and one or more user-configurable control affordances, including: flashlight icon 5600, timer icon 5602, calculator icon 5604, and camera icon 5606. In some embodiments, one or more of the control affordances on control panel user interface 5518 are slider control affordances that are responsive to inputs to adjust the control (e.g., by a drag input on the indicator of the slider control) and to inputs to toggle the control (e.g., by a tap input on the slide control). For example, in some embodiments, control affordances such as brightness control 5630 and volume control 5632 are slider control affordances.

FIGS. 5E2-5E3 illustrate an example of adjusting the brightness of device 100 using brightness control 5630. In FIGS. 5E2-5E3, device 100 detects an input on brightness control 5630, such as a drag gesture by contact 5800, and in response, device 100 changes the position of the indicator of brightness control 5630 (to indicate an update to the selected brightness control value) in accordance with movement of contact 5800 (e.g., as shown in FIG. 5E3).

FIGS. 5E4-5E7 illustrate an example of toggling a brightness function of device 100 using brightness control 5630. In FIGS. 5E4-5E5, device 100 detects an input on brightness control 5630, such as a tap gesture by contact 5802, and in response, toggles the brightness control from Night Shift OFF to Night Shift ON and changes the appearance of brightness control 5630 (e.g., from displaying the default brightness icon to displaying the Night Shift icon), while maintaining the currently selected brightness control value. In FIGS. 5E6-5E7, device 100 detects an input on brightness control 5630, such as a tap gesture by contact 5804, and in response, toggles the brightness control from Night Shift ON to Night Shift OFF and changes the appearance of brightness control 5630 (e.g., from displaying the Night Shift icon to displaying the default brightness icon), while maintaining the currently selected brightness control value. As shown in FIGS. 5E4 and 5E6, depending on the intensity of the tap gesture by the contact (e.g., contacts 5802 and 5804, respectively), brightness control 5630 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that brightness control 5630 is sensitive to intensity-based inputs.

FIGS. 5E7-5E10 illustrate displaying a control panel user interface (e.g., user interface 5518, FIG. 5E7), and in response to a press input on brightness control 5630, displaying an expanded view of the brightness control (e.g., expanded brightness control 5808, FIG. 5E9). In FIGS. 5E7-5E8, device 100 detects an input on brightness control 5630, such as a press gesture by contact 5806, and in response, device 100 displays an expanded view of the brightness control (e.g., expanded brightness control 5808, FIG. 5E9). As shown in FIG. 5E8, as the press gesture by contact 5806-*a* increases above a first intensity threshold (e.g., hint intensity threshold $IT_H$), brightness control 5630 increases in size and the rest of control panel user interface 5518 starts to blur. As shown in FIG. 5E9, as the press gesture by contact 5806-*b* continues to increase in intensity and increases above a second intensity threshold (e.g., light press intensity threshold $IT_L$), the control is expanded (e.g., "popped open") to display an expanded view of the control in expanded brightness control 5808 (and control panel user interface 5518 is blurred further). As shown in FIG. 5E9, expanded brightness control 5808 includes additional controls (e.g., Night Shift icon and True Tone icon) and additional information (e.g., status of each control, a larger slider bar, etc.) that were not shown in control panel user interface 5518 (e.g., in FIG. 5E7). In some embodiments, device 100 displays the expanded view of a control (e.g., expanded brightness control 5808, FIG. 5E9) in response to a touch-hold input (e.g., a long press input by contact 5806) (e.g., based on length of time of the contact rather than intensity of the contact). As shown in FIG. 5E10, upon liftoff of contact 5806, expanded brightness control 5808 remains displayed.

In FIGS. 5E11-5E12, device 100 detects an input outside of expanded brightness control 5808, such as a tap gesture by contact 5810, and in response, dismisses the expanded brightness control 5808 and displays control panel user interface 5518 (e.g., in FIG. 5E12). Although in this example, no changes related to brightness (e.g., changing the brightness control value, turning on Night Shift, turning on True Tone, etc.) were made while the expanded brightness control 5808 was displayed, if any changes were made while the expanded brightness control 5808 was displayed, brightness control 5630 would change in appearance accordingly.

FIGS. 5E12-5E15 illustrate displaying a control panel user interface (e.g., user interface 5518, FIG. 5E12), and in response to a press input on volume control 5632, displaying an expanded view of the volume control (e.g., expanded volume control 5814, FIG. 5E14). In FIGS. 5E13-5E14, device 100 detects an input on volume control 5632, such as a press gesture by contact 5812, and in response, device 100 displays an expanded view of the volume control (e.g., expanded volume control 5814, FIG. 5E14). As shown in FIG. 5E13, as the press gesture by contact 5812-*a* increases above a first intensity threshold (e.g., hint intensity threshold $IT_H$), volume control 5632 increases in size and the rest of control panel user interface 5518 starts to blur. As shown in FIG. 5E14, as the press gesture by contact 5812-*b* continues to increase in intensity and increases above a second intensity threshold (e.g., light press intensity threshold $IT_L$), the control is expanded (e.g., "popped open") to display an expanded view of the control in expanded volume control 5814 (and control panel user interface 5518 is blurred further). As shown in FIG. 5E14, expanded volume control 5814 includes additional controls (e.g., ringer icon 5816) and additional information (e.g., a larger volume slider bar 5818) that were not shown in control panel user interface 5518 (e.g., in FIG. 5E12). In some embodiments, device 100 displays the expanded view of a control (e.g., expanded volume control 5814, FIG. 5E14) in response to a touch-hold input (e.g., a long press input by contact 5812) (e.g., based on length of time of the contact rather than intensity of the contact). As shown in FIG. 5E15, upon liftoff of contact 5812, expanded volume control 5814 remains displayed.

FIGS. 5E16-5E18 illustrate switching between controlling volume for a first type of audio output (e.g., regular audio output, such as for media content audio, represented by "Volume") and controlling volume for a second type of audio output (e.g., ringer audio output, such as for a telephone ringer, represented by "Ringer") in expanded volume control 5814. In FIG. 5E16, device 100 detects an input on ringer icon 5816, such as a tap gesture by contact 5820. In response, device 100 replaces display of the volume slider bar 5818 (e.g., in FIG. 5E16) with display of the ringer slider bar 5822 (e.g., in FIG. 5E18). In some embodiments, an animated transition from the volume slider bar 5818 to the ringer slider bar 5822 is displayed, as shown in FIGS. 5E16-5E18, where ringer icon 5816 transforms into the ringer slider bar 5822 and the volume slider bar 5818 transforms into volume icon 5824.

FIGS. 5E19-5E21 illustrate switching between controlling volume for a second type of audio output (e.g., ringer audio output, such as for a telephone ringer, represented by "Ringer") and controlling volume for a first type of audio output (e.g., regular audio output, such as for media content audio, represented by "Volume") in expanded volume control 5814. In FIG. 5E19, device 100 detects an input on volume icon 5824, such as a tap gesture by contact 5826. In response, device 100 replaces display of the ringer slider bar 5822 (e.g., in FIG. 5E19) with display of the volume slider bar 5818 (e.g., in FIG. 5E21). In some embodiments, an animated transition from the ringer slider bar 5822 to the volume slider bar 5818 is displayed, as shown in FIGS. 5E19-5E21, where volume icon 5824 transforms into the volume slider bar 5818 and ringer slider bar 5822 transforms into ringer icon 5816.

In FIGS. 5E22-5E23, device 100 detects an input outside of expanded volume control 5814, such as a tap gesture by contact 5828, and in response, dismisses the expanded volume control 5814 and displays control panel user interface 5518 (e.g., in FIG. 5E23). Although in this example, no changes related to volume (e.g., changing the volume control value, switching to controlling volume for the ringer, changing the ringer volume control value, etc.) were maintained while the expanded volume control 5814 was displayed, if any changes were made (and maintained) while the expanded volume control 5814 was displayed, volume control 5632 would change in appearance accordingly.

FIGS. 5E24-5E27 illustrate an example of toggling volume control 5632. In FIGS. 5E24-5E25, device 100 detects an input on volume control 5632, such as a tap gesture by contact 5830, and in response, toggles the volume control from ON to OFF (e.g., from the currently selected volume level to a muted volume level) and changes the appearance of volume control 5632 (e.g., from displaying the default volume icon to displaying the muted volume icon and adjusting the indicator on the slider bar accordingly). In FIGS. 5E26-5E27, device 100 detects an input on volume control 5632, such as a tap gesture by contact 5832, and in response, toggles the volume control from OFF to ON (e.g., from a muted volume level back to the previously selected volume level) and changes the appearance of volume control 5632 (e.g., from displaying the muted volume icon to displaying the default volume icon and adjusting the indicator on the slider bar accordingly). As shown in FIGS. 5E24 and 5E26, depending on the intensity of the tap gesture by the contact (e.g., contacts 5830 and 5832, respectively), volume control 5632 increases in size in accordance with a rate by which the intensity of the contact changes (e.g., increasing in size by a smaller amount in response to a tap gesture with a smaller intensity and increasing in size by a larger amount in response to a tap gesture with a larger intensity), indicating that volume control 5632 is sensitive to intensity-based inputs.

FIGS. 5E28-5E38 illustrate an example of adjusting text size while displaying the changes from the text size adjustments. FIG. 5E28 illustrates displaying a user interface of an open application (e.g., user interface 5840 of a messaging application). In FIGS. 5E28-5E29, device 100 detects an input on the status indicators, such as a tap gesture by contact 5842, and in response, device 100 displays a control panel user interface 5518 (e.g., in FIG. 5E29). Although the example in FIG. 5E8 uses a tap gesture on the status indicators to access control panel user interface 5518, in some embodiments, the control panel user interface is, optionally, enabled, by the device, to be accessed in other ways, as described above with respect to FIGS. 5C7-5C9 (e.g., a press input on the bottom edge of touch screen 112 that exceeds an intensity threshold (e.g., light press intensity threshold $IT_L$), a horizontal swipe gesture on the bottom edge of touch screen 112, an up-and-left arc gesture, etc.).

In FIGS. 5E30-5E32, device 100 detects an input on type size icon 5614, such as a press gesture by contact 5844, and in response, device 100 displays an enhanced view of the type size control (e.g., enhanced type size control 5692, FIG. 5E31). As shown in FIG. 5E30, as the press gesture by contact 5844-*a* increases above a first intensity threshold (e.g., hint intensity threshold $IT_H$), type size icon 5614 increases in size and the rest of control panel user interface 5518 starts to blur. As shown in FIG. 5E31, as the press gesture by contact 5844-*b* continues to increase in intensity and increases above a second intensity threshold (e.g., light press intensity threshold $IT_L$), the control icon is expanded (e.g., "popped open") to display an enhanced view of the control in enhanced type size control 5692 (and control panel user interface 5518 is blurred further). As shown in FIG. 5E31, enhanced type size control 5692 includes a step slider bar for selecting between a number of text sizes (e.g., seven different text sizes), ranging from a first minimum size to a first maximum size. In some embodiments, enhanced type size control 5692 in FIG. 5E31 is a default step slider bar (e.g., when large text sizes for accessibility are not enabled). In some embodiments, device 100 displays the enhanced view of a control (e.g., enhanced type size control 5692, FIG. 5E31) in response to a touch-hold input (e.g., a long press input by contact 5844) (e.g., based on length of time of the contact rather than intensity of the contact). As shown in FIG. 5E32, upon liftoff of contact 5844, enhanced type size control 5692 remains displayed, with the blurred control panel user interface 5518 in the background.

In FIGS. 5E33-5E36, device 100 detects an input on the step slider bar of enhanced type size control 5692, such as a drag gesture by contact 5846, to adjust the text size. In response, device 100 reveals a portion of user interface 5840 and changes the text size of the revealed portion of user interface 5840 in accordance with changes in the position of the text size indicator in the step slider bar. As shown in FIGS. 5E33-5E36, as the position of the text size indicator is moved upward by movement of contact 5846, the text size in user interface 5840 is increased accordingly. As shown in FIG. 5E36, upon liftoff of contact 5846, enhanced type size control 5692 remains displayed and user interface 5840 is replaced by the blurred control panel user interface 5518 in the background.

In FIGS. 5E37-5E38, device 100 detects an input outside of enhanced type size control 5692, such as a tap gesture by contact 5848, and in response, dismisses the enhanced type size control 5692 and displays control panel user interface 5518 (e.g., in FIG. 5E38).

Previous examples of control panel user interface 5518 in FIGS. 5E1-5E38 have shown control panel user interface 5518 in portrait mode. FIG. 5E39 illustrates displaying control panel user interface 5518 in landscape mode. Compared to the control panel user interface 5518 displayed in portrait mode (e.g., in FIG. 5E38), the control panel user interface 5518 displayed in landscape mode (e.g., in FIG. 5E39) includes the same control affordances. However, the slider controls, including brightness control 5630 and volume control 5632 are displayed with a different vertical length in landscape mode compared to portrait mode. For example, when brightness control 5630 is displayed in control panel user interface 5518 in portrait mode, brightness control 5630 is displayed below another control module and is shorter in vertical length, but when brightness control 5630 is displayed in control panel user interface 5518 in landscape mode, brightness control 5630 is displayed without another control module above it and is taller in vertical length. Similarly, volume control 5632 is shorter in portrait mode and taller in landscape mode.

FIGS. 5F1-5F45 illustrate example user interfaces for displaying a dock or displaying a control panel (e.g., instead of or in addition to the dock), in accordance with some embodiments. The user interfaces in these figures are used to illustrate the processes described below, including the processes in FIGS. 14A-14E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5F1-5F8 illustrate an example of displaying a dock and then a control panel (e.g., in an application-switcher user interface) in response to a single long upward swipe from the bottom edge of the device. FIG. 5F1 illustrates displaying a user interface 5850 of an application (e.g., of a browser application). FIGS. 5F2-5F7 illustrate movement of contact 5852 (e.g., in a swipe gesture) from the bottom edge of device 100 and across touch screen 112 in an upward direction. In FIGS. 5F3-5F4, as contact 5852 moves upward (e.g., past a first threshold distance), dock 5854 moves onto user interface 5850 with movement of contact 5852. In some embodiments, if the gesture stops (e.g., liftoff of the contact is detected) before reaching the first threshold distance for displaying the dock (e.g., in FIG. 5F3), the dock ceases to be displayed on liftoff (e.g., the dock slides back off of the display in the direction that it came from). In some embodiments, dock 5854 is a container that includes one or more application launch icons (e.g., a predefined set of application launch icons, application launch icons for one or more recently open applications on the device, application launch icons that are recommended by the device based on predetermined criteria, a combination of two or more of the above, etc.). In these examples, dock 5854 is shown with application launch icons for phone, mail, browser, and video. In some embodiments, dock 5854 includes other combinations of application launch icons (e.g., intelligently-selected application launch icons, such as icons for the most frequently used applications, the most recently used applications, and/or applications selected based on some other criteria, and, optionally, intelligently excluding certain application launch icons, such as icons or representations for currently displayed applications or currently open applications). In FIGS. 5F5-5F7, as movement of contact 5852 continues to move upward (e.g., past a second threshold distance greater than the first threshold distance), the device displays an application switcher user interface that includes a grid of application views for a plurality of recently open applications and a control panel view corresponding to a control panel user interface, e.g., including displaying an animated transition of user interface 5850 decreasing in size to reveal an (initially blurred) application-switcher user interface 5856 (e.g., that includes control panel 5886) and the reduced-scale image of user interface 5850 dropping into place in the (no longer blurred) application-switcher user interface 5856, as shown in FIG. 5F8. In some embodiments, if the gesture stops (e.g., liftoff of the contact is detected) before reaching the second threshold distance for displaying the application-switcher user interface (e.g., in FIG. 5F6), the application expands to fill the display on liftoff In some embodiments, the application-switcher user interface 5856 is revealed by an animated transition of the application-switcher user interface 5856 moving onto user interface 5850 (e.g., sliding in behind dock 5854), as shown below in FIGS. 5F16-5F18. In some embodiments, as shown in FIG. 5F8, when the application-switcher user interface 5856 is displayed, dock 5854 is obscured (e.g., masked or severely blurred). In some embodiments, as shown in FIG. 5F9, when the application-switcher user interface 5856 is displayed, dock 5854 remains displayed with its original clarity and appearance. In some embodiments, the application-switcher user interface 5856 is slightly translucent and is overlaid on the previously-displayed user interface (e.g., a blurred user interface 5850).

FIG. 5F9 illustrates various examples of inputs on the application-switcher user interface 5856. As shown in FIG. 5F9, the application-switcher user interface 5856 includes control panel view 5886 (e.g., a reduced-scale image of a control panel user interface), dock 5854, and one or more application views (e.g., a reduced scale image of a user interface of a corresponding application, such as application view 5851 of a browser application, application view 5858 of a reading application, application view 5860 of a timer application, and application view 5862 of a music application). In response to an input in an area not occupied by a selectable object (e.g., outside of any application views, control panel, and dock), such as a tap gesture by contact 5864, device 100 dismisses (e.g., ceases to display) the application-switcher user interface 5856 and displays the previously-displayed user interface (e.g., user interface 5850), as shown in FIG. 5F10. In response to an input on an application view, device 100 dismisses the application-switcher user interface 5856 and displays the corresponding application. For example, in response to an input on application view 5851, such as a tap gesture by contact 5865, device 100 dismisses the application-switcher user interface 5856 and displays user interface 5850 of the application corresponding to application view 5851, as shown in FIG. 5F10. As another example, in response to an input on application view 5862, such as a tap gesture by contact 5866, device 100 dismisses the application-switcher user interface 5856 and displays a user interface of the music application corresponding to application view 5862. In response to an input on an application launch icon in dock 5854, device 100 dismisses the application-switcher user interface 5856 and displays the corresponding application. For example, in response to an input on the application launch icon for the phone in dock 5854, such as a tap gesture by contact 5868, device 100 launches the phone application. In some embodiments, in response to an input on control panel view 5886, such as a tap gesture on control panel view 5886, device 100 dismisses the application-switcher user interface 5856 and displays control panel user interface. In some embodiments, some or all of the controls represented in control panel view 5886 are live controls, and in response to an input on a control in control panel view 5886, device 100 displays an expanded or enhanced control region or activates the control (e.g., as discussed in detail with respect to FIGS. 5C1-5C45 and FIGS. 11A-11E). For example, in FIG. 5F9, a tap gesture by contact 5870 on the flashlight icon launches the flashlight application.

FIGS. 5F10-5F14 illustrate an example of a displaying a dock in response to a short upward swipe from the bottom edge of the device. FIG. 5F10 illustrates displaying user interface 5850 of a browser application. FIGS. 5F11-5F13 illustrate movement of contact 5880 (e.g., in a swipe gesture) from the bottom edge of device 100 and across touch screen 112 in an upward direction. In FIGS. 5F11-5F12, as contact 5880 moves upward (e.g., past a first threshold distance, but not past a second threshold distance greater than the first threshold distance), dock 5854 moves onto user interface 5850 with movement of contact 5880. In some embodiments, if contact 5880 lifts off before reaching the first threshold distance, dock 5854 retracts back down and ceases to be displayed. In some embodiments, as shown in FIGS. 5F13-5F14, if contact 5880 moves past the first threshold distance, dock 5854 continues to move onto user interface 5850, even if contact 5880 lifts off before dock 5854 is fully revealed.

FIGS. 5F15-5F18 illustrate an example of a displaying a control panel (e.g., control panel view 5886 in application-switcher user interface 5856) in response to a short upward swipe from the bottom edge of the device when dock 5854 is already displayed. FIG. 5F15 illustrates displaying dock 5854 overlaid on user interface 5850 of a browser application (e.g., after an initial short upward swipe, as described above in FIGS. 5F10-5F14). FIGS. 5F15-5F17 illustrate movement of contact 5882 (e.g., in a swipe gesture) from the bottom edge of device 100 and across touch screen 112 in an upward direction. In FIGS. 5F15-5F16, as contact 5882 moves upward (e.g., past a threshold distance), application-switcher user interface 5856 moves onto user interface 5850 with movement of contact 5882. In some embodiments, user interface 5850 begins to blur as application-switcher user interface 5856 moves onto user interface 5850, as shown in FIG. 5F16-5F17. In some embodiments, if contact 5882 lifts off before reaching the threshold distance, application-switcher user interface 5856 retracts back down and ceases to be displayed. In some embodiments, as shown in FIGS. 5F17-5F18, if contact 5882 moves past the threshold distance, application-switcher user interface 5856 continues to move onto user interface 5850, even if contact 5882 lifts off before application-switcher user interface 5856 is fully revealed. In some embodiments, application-switcher user interface 5856 is revealed in a different animated transition (e.g., as shown above in FIGS. 5F6-5F8).

FIGS. 5F19-5F22 illustrate an alternative example of a displaying a control panel (e.g., control panel object 5886' overlaid on blurred dock 5854) in response to a short upward swipe from the bottom edge of the device when dock 5854 is already displayed. FIG. 5F19 illustrates displaying dock 5854 overlaid on user interface 5850 of a browser application (e.g., after an initial short upward swipe, as described above in FIGS. 5F10-5F14). FIGS. 5F20-5F22 illustrate movement of contact 5884 (e.g., in a swipe gesture) from the bottom edge of device 100 and across touch screen 112 in an upward direction. In FIGS. 5F20-5F22, as contact 5884 moves upward (e.g., past a threshold distance), control panel object 5886' moves onto user interface 5850 with movement of contact 5884. In some embodiments, user interface 5850 begins to blur as control panel object 5886' moves onto user interface 5850 (and optionally, the blur increases as control panel object 5886' continues to move onto user interface 5850), as shown in FIG. 5F21-5F22. In some embodiments, if contact 5884 lifts off before reaching the threshold distance, control panel object 5886' retracts back down and ceases to be displayed. In some embodiments, if contact 5884 moves past the threshold distance control panel object 5886' continues to move onto user interface 5850, even if contact 5884 lifts off before control panel object 5886' is fully revealed. FIG. 5F22 illustrates an example of displaying control panel object 5886' overlaid on blurred dock 5854.

FIG. 5F23 illustrates an alternative example of displaying a control panel (e.g., control panel object 5886') with dock 5854. In some embodiments, control panel object 5886' moves onto user interface 5850 (e.g., either sliding in from behind dock 5854 or sliding in over dock 5854) and continues until control panel 5886 is displayed on top of dock 5854, as shown in FIG. 5F23. In some embodiments, user interface 5850 is not blurred when displaying control panel object 5886', as shown in FIG. 5F23. In some embodiments, user interface 5850 is blurred when displaying control panel object 5886' (e.g., as shown in FIG. 5F22).

FIG. 5F24 illustrates another alternative example of displaying control panel (e.g., control panel object 5886') with dock 5854. In some embodiments, control panel object 5886' moves onto user interface 5850 (e.g., pushing up dock 5854) and continues until control panel object 5886' is displayed below dock 5854, as shown in FIG. 5F24. In some embodiments, user interface 5850 is not blurred when displaying control panel object 5886', as shown in FIG. 5F24. In some embodiments, user interface 5850 is blurred when displaying control panel object 5886' (e.g., as shown in FIG. 5F22).

FIGS. 5F25-5F28 illustrate an example of displaying deletion affordances in response to a long press input. FIG. 5F25 illustrates displaying application-switcher user interface 5856 (e.g., after a long upward swipe, as shown in FIGS. 5F1-5F8, or after two short upward swipes, as shown in FIGS. 5F10-5F18). Although no blurred background is shown in application-switcher user interface 5856 of FIGS. 5F25-5F36, in some embodiments, application-switcher user interface 5856 is overlaid on a blurred background (e.g., as described above in FIGS. 5F6-5F9 and 5F16-5F18). FIGS. 5F26-5F28 illustrate holding of contact 5890 from a time of t0 (e.g., in FIG. 5F26) until a time of t0+T (e.g., in FIG. 5F28, where T is a long press time threshold). In response to the long press input by contact 5890, device 100 displays a respective deletion affordance (e.g., "x" in the upper left corner of the application view) over each application view in application-switcher user interface 5856, as shown in FIG. 5F28.

FIGS. 5F29-5F31 illustrate an example of closing an application view in application-switcher user interface 5856 in response to a tap gesture on a deletion affordance. In FIGS. 5F30-5F31, device 100 detects an input on the deletion affordance of application view 5860, such as a tap gesture by contact 5892, and in response, ceases to display application view 5860 (e.g., closing application view 5860). When an application view is deleted from the application-switcher user interface, the retained state of the application is deleted, and the application will open with a default starting state the next time that the application is launched.

FIGS. 5F32-5F33 illustrate an example of closing an application view in application-switcher user interface 5856 in response to a swipe gesture on an application view while the deletion affordances are displayed. In FIGS. 5F32-5F33, device 100 detects an input on application view 5860, such as a swipe gesture by contact 5894, and in response, ceases to display application view 5860 (e.g., closing application view 5860).

FIGS. 5F34-5F36 illustrate an example of closing an application view in application-switcher user interface 5856 in response to a swipe gesture on an application view even when the deletion affordances are not displayed. In FIGS. 5F35-5F36, device 100 detects an input on application view 5860, such as a swipe gesture by contact 5896, and in response, ceases to display application view 5860 (e.g., closing application view 5860).

FIGS. 5F37-5F41 illustrate an example of displaying a cover sheet user interface (e.g., with a downward swipe) over an application user interface and dismissing the cover sheet user interface (e.g., with an upward swipe) to redisplay the application user interface. FIG. 5F37 illustrates displaying a user interface 5850 of an application (e.g., of a browser application). In FIGS. 5F38-5F39, device 100 detects an input from the top edge of the device, such as a downward swipe gesture by contact 5898, and in response, displays cover sheet user interface 5900 (e.g., including displaying an animated transition showing the cover sheet user interface sliding down from the top edge of the display and covering user interface 5850 of the application, in accordance with the downward movement of contact 5898). In FIGS. 5F40-5F41, device 100 detects an input from the bottom edge of the device, such as an upward swipe gesture by contact 5902, an in response, displays user interface 5850.

FIGS. 5F41-5F45 illustrate an example of turning off the display (e.g., by locking the device), displaying the cover sheet user interface as a wake screen user interface (e.g., in response to an input to wake the device from a display-off state), and displaying a control panel (e.g., control panel user interface 5886" overlaid on the wake screen user interface) in response to the same input that can dismiss the cover sheet when the cover sheet is displayed over an application user interface (e.g., in response to an upward swipe as shown in FIGS. 5F40-5F41). In FIGS. 5F41-5F42, device 100 transitions from a display-on state (e.g., displaying user interface 5850) to a display-off state (e.g., a locked state or a sleep state). In FIGS. 5F42-5F43, device 100 transitions from a display-off state to a display-on state (e.g., displaying cover sheet user interface 5900). In some embodiments, cover sheet user interface 5900 serves as a wake screen user interface, as shown in FIG. 5F43. In FIGS. 5F44-5F45, device 100 detects an input from the bottom edge of the device, such as an upward swipe gesture by contact 5904, an in response, displays control panel 5886. In some embodiments, the cover sheet user interface 5900 blurs as control panel user interface 5886" is displayed overlaid on the cover sheet user interface, as shown in FIG. 5F45. In contrast to FIGS. 5F40-5F41 above (e.g., where the cover sheet user interface 5900 serves as a cover sheet to conceal an application user interface, and an upward swipe from the bottom edge of the device dismisses the cover sheet), in FIGS. 5F44-5F45, the cover sheet user interface 5900 serves as a wake screen user interface, and an upward swipe from the bottom edge of the device displays control panel user interface 5886" (e.g., overlaid on the blurred cover sheet user interface that servers as the wake screen user interface).

FIGS. 5G1-5G17 illustrate example embodiments for navigating between multiple user interfaces and, in particular, embodiments for accessing a control panel user interface (also referred to herein as a "control center") from different user interfaces. The user interfaces in these figures are used to illustrate the processes described below, including the processes in FIGS. 15A-15C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

The example user interfaces illustrated in FIGS. 5G1-5G17 relate to methods for accessing a control panel user interface, from which the user can control the device, with a system-specific edge-swipe gesture, in accordance with some embodiments. As shown in the FIGS. 5G1-5G17, the control panel is accessed by a swipe gesture from the upper-right corner of the device, while other user interfaces (e.g., a system-wide notifications user interface, a home user interface, an application-switcher user interface, and a second application user interface) are accessed by edge-swipe gestures originating from other portions of the top edge or from the bottom edge. The method facilitates effective user navigation between multiple user interfaces on the device.

FIGS. 5G1-5G4 and 5G7-5G10 illustrate an example embodiment where the electronic device navigates to either a control panel user interface or a notification user interface in response to an edge-swipe gesture from the top edge of the display, based on the area of the edge the gesture originated.

FIG. 5G1 illustrates a home screen on device 100 with time 404 and status indicators 402 in the upper left and right corners of the screen, respectively. Electronic handle 5936 is displayed below status indicators 402 to indicate that a control panel is available to be pulled down onto the screen from the upper right hand corner of the display. A swipe gesture, including contact 5910 and movement 5912, is detected from the right side of the top edge of the display. As input 5910 travels down the screen, control panel 5914 is pulled over the home screen, which simultaneously begins to blur out of focus, as illustrated in FIG. 5G2. Electronic handle 5936 transitions from the upper right corner, where it provided a hint as to the ability to pull control panel 5914 down, to the bottom of control panel 5914, where it indicates the control panel is available to be pulled down or pushed back up. Status bar 402 also moves down and expands with the swipe gesture, as shown by the addition of Bluetooth status icon 5916. As the swipe gesture continues downward in FIG. 5G3, control panel 5914 is pulled further down on the display and the home screen continues to blur. Upon termination of the swipe gesture in FIG. 5G4, control panel 5914 sticks on the display, because it was pulled far enough down on the display, and electronic handle 5936 disappears, indicating that control panel 5914 is now statically displayed on the screen.

FIG. 5G7 illustrates the same home screen as FIG. 5G1. However, in FIG. 5G7 a swipe gesture, including contact 5926 and movement 5928, is initiated from the center of the top edge of the screen, rather than the right hand edge. Because the area of the top edge of the display to the left of boundary 5930, which is larger than the area to the right of the boundary, corresponds to activation of a notifications user interface—rather than the control panel user interface, continuation of the swipe gesture downwards on the screen pulls notifications 5932 down from the top of the screen, as illustrated in FIG. 5G8. Again, the home screen is dynamically blurred as notifications are pulled down. As the swipe gesture continues down in FIG. 5G9, notifications 5932 is pulled further down on the display and the home screen continues to blur. Upon termination of the swipe gesture in FIG. 5G10, notifications 5932 sticks on the display, because it was pulled far enough down on the display.

FIGS. 5G5 and 5G6 illustrate an example embodiment where the control panel pulled over the home screen can be navigated within to provide access to additional controls. As shown in FIG. 5G5, a swipe gesture to the left, including contact 5918-*a* and movement 5920, is detected. In response, the device slides previously displayed controls, such as flashlight control 5922, off of the left side of the control panel to make room for additional controls, such as battery status 5924, to slide onto the control panel from the right hand side.

FIGS. 5G11-5G17 illustrate example embodiments where the device provides hints as to possible navigations from the home screen. FIG. 5G11, illustrates a lock screen of the device, including home affordance 5002 and status bar 402 showing icons representing various statuses of the device. Home affordance 5002 animates by slowly moving up and down to prompt the user to swipe up to unlock the device and navigate to a home user interface, as shown in FIGS. 5G11-5G15. Similarly, control panel icon 5934 and caret 5936 slide down from under status bar 402 in the upper right hand corner of the display, in FIGS. 5G13 and 5G14 to prompt the user to swipe down from the right side of the top edge of the screen to pull down the control panel. A swipe gesture, including contact 5938 and movement 5940, is detected from the right side of the top edge of the display, over control panel icon 5934, as illustrated in FIG. 5G15. As input 5938 travels down the screen, control panel 5914 is pulled over the lock screen, which simultaneously begins to blur out of focus (e.g., gradually increasing a magnitude and/or radius of a blur), as illustrated in FIG. 5G16. Caret 5936 slides up in response to the swipe gesture, turning into flat handle 5936, as illustrated in FIG. 5G16. Upon termination of the swipe gesture in FIG. 5G17, control panel 5914 sticks on the display, because it was pulled far enough down on the display.

FIGS. 5H1-5H27 illustrate example user interfaces for displaying a dock or navigating to different user interfaces (e.g., instead of or in addition to displaying the dock) in response to a gesture meeting different criteria, in accordance with some embodiments. The user interfaces in these figures are used to illustrate the processes described below, including the processes in FIGS. 19A-19C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting different predefined criteria is used to cause display of an application dock overlaid on a currently displayed application user interface and/or to cause dismissal of a currently displayed application user interface and display of a different user interface (e.g., an application-switcher user interface, a home screen user interface, or a previously displayed application user interface). In some embodiments, a home button (e.g., a mechanical button, a solid state button, or a virtual button, such as optional home button 204 shown in FIGS. 5H1-5H27) is included on the device and is used to cause dismissal of a currently displayed user interface and display of the home screen user interface. (e.g., in response to a single press input) and/or display a multitasking user interface (e.g., in response to a double press input).

The example user interfaces illustrated in FIGS. 5H1-5H27 relate to methods for efficiently displaying an application dock and navigating between multiple user interfaces, e.g., quickly switching between different applications and system user interfaces, on an electronic device, without requiring on presence and activation of a home button, in accordance with some embodiments. An example user interface for the user interface selection process includes an application-switcher user interface that includes representations of multiple user interfaces for applications (e.g., recently opened applications, a currently displayed application, and, optionally, a system control panel) associated with the electronic device displayed as a virtual stack of cards (e.g., the "stack"), where each card in the stack represents a user interface for a different application (e.g., the card is a snapshot of a saved final state of the application's user interface when the application was last displayed). The cards are also referred to herein as "application views," when corresponding to a user interface for a recently open application, or as a "control panel view," when corresponding to a user interface for a control panel). User inputs (e.g., contacts, swipe/drag gestures, flick gestures, etc.) detected on touch screen 112 (e.g., a touch-sensitive surface) are used to display the application dock overlaid on a currently displayed user interface and navigate between different user interfaces that can be selected for display on the screen. In some embodiments, the home screen user interface is optionally displayed as a "card" in the virtual stack of cards. In some embodiments, the home screen user interface is displayed in a display layer underlying the stack of cards.

While the device displays a user interface (e.g., a user interface for an application), a gesture beginning at the bottom of the screen (e.g., within a predefined region of the device that is proximate to the edge of the display (e.g., an edge region that includes a predefined portion (e.g., 20 pixels wide) of the display near the bottom edge of the device) invokes display of the application dock and/or the user interface selection process, and directs navigation between multiple user interfaces based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed. The device replaces display of the current user interface with a card representing that user interface (e.g., in some embodiments, the user interface appears to shrink into a card in accordance with movement of the input). The user has the option to (i) display the application dock, (ii) navigate to the home screen, (iii) navigate to the application displayed on the screen immediately prior to the user interface that was displayed when the user interface selection process was invoked, (iv) navigate to an application-switcher user interface that allows the user to select from applications previously displayed on the screen, or (v) navigate back to the user interface that was displayed when the user interface selection process was invoked, by varying the relevant movement parameters of the input after the input is initiated from the bottom of the screen, in accordance with some embodiments. During the input, the device provides dynamic visual feedback indicating what navigation destination will be chosen upon termination of the input, facilitating effective user navigation between multiple choices of user interface destinations. In some embodiments, the visual feedback and user interface response is fluid and reversible before the termination of the input. In some embodiments, the user also has the option to navigate to a control panel user interface using the gesture (e.g., by selecting a control panel card included in the application-switcher user interface as illustrated in FIGS. 5A1-5A14, 5A72-5A77, and 5F1-5F18, or pulling up a control panel as an extension of the application dock as illustrated in FIGS. 5F19-5F24). In other embodiments, a different input (e.g., initiating from a different edge of the display) is required to navigate to a control panel user interface (e.g., as illustrated in FIGS. 5G1-5G17).

In some embodiments, example user interfaces for applications operated on an electronic device without a home button include a visual indication (e.g., home affordance 5002) that provides visual guidance to a user regarding the position of an edge region that the device is ready for a navigation gesture to be started, and, optionally, whether navigation is restricted in the current operating mode of the currently displayed application (e.g., absence of the home affordance indicates that the navigation is limited, and that a confirmation input or, optionally, whether an enhanced navigation gesture is required to navigate between user interfaces (e.g., as illustrated in FIGS. 5B1-5B33)). In some embodiments, the home affordance is not activatable or responsive to touch-inputs directly, e.g., in a manner that is similar to a virtual button.

Descriptions relevant to various user interface objects (e.g., dock, home screen user interface, application-switcher user interface, control panel user interface, cards, application views, home affordance, control panel user interface, etc.), device or user interface state (e.g., user interface selection mode/transitional user interface mode, user interface selection process, transitional user interface, etc.), navigation inputs (e.g., navigation gesture, edge swipe gesture, movement, contact, intensity, edge region, etc.), and navigation criteria (e.g., various criteria based on movement parameters of the input or user interface objects for navigating to different user interfaces or causing display of various types of user feedback to indicate internal states of the device and the user interface) provided with respect to FIGS. 5A1-5A77, 5B1-5B33, 5C1-5C45, 5D-5D42, 5E1-5E39, 5F-5F45, and 5G1-5G17 are also applicable to the embodiments described with respect to FIGS. 5H1-5H27, in accordance with some embodiments.

FIGS. 5H1-5H4 illustrate an example embodiment where the electronic device displays an application dock (or "dock") overlaid on an application user interface in response to an upward edge swipe gesture, without entering a transitional user interface, because the input is a short drag gesture (e.g., meeting dock-display criteria, but not any user-interface-navigation criteria, where the dock-display criteria and various user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D). FIG. 5H1 illustrates an interactive map user interface of a maps application. After the dock-display and user interface selection process is activated by movement of contact 5942 upwards from the bottom edge of the screen, in FIG. 5H1, application dock 5946 is dragged onto the screen over the map user interface, in FIGS. 5H2-5H3, by the continued movement of contact 5942. Because the upward movement of contact 5942 stops before the contact crosses threshold position 5948 (e.g., user-interface-navigation criteria are not met), in FIG. 5942, the device does not enter into a user interface selection mode. When the contact is lifted off the screen, application dock 5946 remains displayed over the maps user interface, in FIG. 5H4, because dock-display criteria have been met (e.g., because the contact had traveled a sufficient distance away from the edge of the display (e.g., passed a dock-display threshold position located between the bottom edge of the screen and threshold position 5948)). If dock-display criteria had not been met (e.g., the contact is lifted off the screen before moving past the dock-display threshold position), the dock will retract toward the bottom edge of the screen and cease to be displayed after the lift-off of the contact.

FIGS. 5H5-5H8 illustrate an example embodiment where the electronic device displays an application dock and then navigates to an application-switcher user interface because the invoking input is a medium-length drag gesture (e.g., meeting dock-display criteria and a first set of user-interface-navigation criteria (e.g., application-switcher-display criteria), where the dock-display criteria and the first set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D). FIG. 5H5 illustrates the interactive map user interface. After the dock-display and user interface selection process is activated by movement 5952 of contact 5950 upwards from the bottom edge of the screen, in FIG. 5H5, application dock 5946 is dragged onto the screen over the map user interface (e.g., in the manner illustrated in FIGS. 5H1-5H3), in FIG. 5H6, by the continued movement 5952 of contact 5950. The device then enters into the user interface selection mode (e.g., displays a transitional user interface) when the upward movement of contact 5950 continues past threshold position 5948, in FIG. 5H7. The user interface for the map application transforms into card 5954 (e.g., an application view), which is dynamically resized in correlation with movement of the contact 5950 (e.g., in the manner described in FIGS. 5A1-5A6, 5A19-5A21). Second card 5956, representing a previously displayed application user interface, begins to enter the display from the left, indicating to the user that the device is navigating towards an application-switcher user interface. After liftoff of the contact 5950, the device navigates to (e.g., displays) an application-switcher user interface, in FIG. 5H8, because the contact had crossed positional threshold 5948, but not positional threshold 5958 above the positional threshold 5948 (e.g., meeting the dock display criteria and the first set of user-interface-navigation criteria (e.g., application-switcher-display criteria), but not a second set of user-interface-navigation criteria (e.g., home-display criteria), where the dock-display criteria, the first set of user-interface-navigation criteria and the second set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D). Application dock 5946 remains displayed over the application-switcher user interface, in FIG. 5H8, in accordance with some embodiments. The configurations of the transitional user interface and the application-switcher user interface shown in FIG. 5H8 are illustrative for some embodiments. Other configurations of the transitional user interface and the application-switcher user interface, and other animated transition from the transitional user interface to the application-switcher user interface are possible, such as those illustrated in FIGS. 5A5-5A9, 5A25-5A28, and 5F6-5F8, in accordance with some embodiments.

FIGS. 5H9-5H12 illustrate an example embodiment where the electronic device displays an application dock and then navigates to a home screen user interface because the invoking input is a long drag gesture (e.g., meeting dock-display criteria and a second set of user-interface-navigation criteria (e.g., home-display criteria), where the dock-display criteria and the second set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D). FIG. 5H9 illustrates the interactive map user interface. After the dock-display and user interface selection process is activated by movement of contact 5968 upwards from the bottom of the screen, in FIG. 5H9, application dock 5946 is dragged onto the screen and the transitional user interface is displayed showing cards 5954 and 5956 (e.g., in the manner illustrated in FIGS. 5H1-5H3 and 5H6-5H7), in FIG. 5H10, by the continued movement 5970 of contact 5968 past positional threshold 5948. After contact 5968 passes second positional threshold 5958, second card 5956 disappears and a home screen fades-in from behind card 5954, which continues to shrink with continued upwards movement of contact 5968, in FIG. 5H11, indicating to the user that the device is now navigating towards a home screen user interface. After liftoff of the contact 5968, the device navigates to (e.g., displays) a home screen user interface, in FIG. 5H12, because the contact had crossed second positional threshold 5958 (e.g., the second set of user-interface-navigation criteria are met). Application dock 5946 remains displayed over the home screen user interface, in FIG. 5H12, in accordance with some embodiments. The configuration of the transitional user interface shown in FIG. 5H11 is illustrative for some embodiments. Other configurations of the transitional user interface and other animated transition from the transitional user interface to the home screen user interface are possible, such as those illustrated in FIGS. 5A21-5A25, in accordance with some embodiments.

In the embodiments illustrated in FIGS. 5H1-5H12, the starting position of the contact is in the peripheral portion of the bottom edge of the screen. The dock is displayed first in response to upward movement of the contact, before the device enters the transitional user interface in response to continued upward movement of the contact past positional threshold 5948. In some embodiments, the device behaves in the manner illustrated in FIGS. 5H1-5H12, irrespective of the starting positions (e.g., peripheral portions or the center portion) of the contact along the bottom edge of the screen. In other embodiments, the device behaves in the manner illustrated in FIGS. 5H1-5H12 when the starting position of the contact is in the peripheral portion of the bottom edge of the screen; and when the starting position of the contact is in the center portion of the bottom edge of the display (as illustrated in FIGS. 5H13-5H17), the device does not display the dock first and directly enters the navigation user interface, instead.

FIGS. 5H13-5H17 illustrate an example embodiment where the electronic device displays a transitional user interface, without first displaying the application dock, because the invoking input starts from a center portion of the bottom edge of the display (as opposed to a peripheral portion of the bottom edge of the display) (e.g., dock-display criteria are not met, and user-interface-navigation criteria used when dock is not displayed first in response to the input are met, where the dock-display criteria and the user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D). FIG. 5H13 illustrates the interactive map user interface. After the user interface selection process is activated by movement of contact 5972 travelling upwards from the bottom edge of the screen, in FIG. 5H13, the interactive map user interface is replaced by (e.g., transitions into) card 5954 that represents the interactive map user interface in FIG. 5H14. Because movement of contact 5972 started from a center portion of the bottom edge of the display, the dock is not displayed and the transitional user interface is activated earlier (e.g., as shown in FIG. 5H15) (e.g., when a third set of user-interface-navigation criteria are met (e.g., application-switcher-display criteria that are used when dock is not displayed first in response to the input), where the third set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D), e.g., before contact 5972 reaches positional threshold 5948 (e.g., a threshold in the first set of user interface-navigation criteria (e.g., application-switcher-display criteria that are used when dock is displayed first in response to the input)), which was required to enter the transitional user interface when the dock was first displayed (e.g., as illustrated in FIGS. 5H1-5H4, 5H5-5H8, and 5H9-5H12). As the input moves upwards on the screen, in FIGS. 5H14-5H16, card 5954 shrinks dynamically, revealing the home screen underneath, which includes application dock 5946, from behind the transitional user interface with card 5954 in FIG. 5H16. After liftoff of the contact 5972, the device navigates to (e.g., displays) a home screen user interface, in FIG. 5H17, because the contact had crossed second positional threshold 5976 (e.g., meeting a fourth set of user-interface-navigation criteria (e.g., home-display criteria that are used when dock is not displayed first in response to the input), where the fourth set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS.

16A-16D)), which is closer to the bottom of the display than positional threshold 5958 (e.g., a threshold in the second set of user interface-navigation criteria (e.g., home-display criteria that are used when dock is displayed first in response to the input)), which was required to navigate home when the dock was displayed prior to entering the transitional user interface, as illustrated in FIGS. 5H5-5H8 and 5H9-5H12.

FIGS. 5H18-5H21 illustrate an example embodiment where the electronic device enters a transitional user interface earlier (with a lower positional threshold than positional threshold 5948) because the dock was already displayed (e.g., due to a prior short drag gesture as shown in FIGS. 5H1-5H4), regardless of the starting position of the contact along the bottom edge of the screen. FIG. 5H18 illustrates the interactive map user interface. After the user interface selection process is activated by movement of contact 5978 travelling upwards from the bottom edge of the screen, in FIG. 5H18, the interactive map user interface is replaced by (e.g., transitions into) card 5954 that represents the interactive map user interface in FIG. 5H19. Because dock 5946 was already displayed over the interactive map user interface when the input began, the transitional user interface is activated earlier (e.g., as shown in FIG. 5H20) (e.g., when a fifth set of user-interface-navigation criteria are met (e.g., application-switcher-display criteria that are used when dock is already displayed before the input is started), where the fifth set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D)), e.g., before contact 5978 reaches positional threshold 5948 (e.g., a threshold in the first set of user interface-navigation criteria (e.g., application-switcher-display criteria that are used when dock is displayed first in response to the input)), which was required to enter the transitional user interface when the dock was first displayed (e.g., as illustrated in FIGS. 5H1-5H4, 5H5-5H8, and 5H9-5H12. As the input moves upwards on the screen, in FIGS. 5H19-5H20, card 5954 shrinks dynamically in accordance with the position of the contact on the screen. After liftoff of the contact 5978, the device navigates to (e.g., displays) an application-switcher user interface, in FIG. 5H21, because the contact had not crossed second positional threshold associated with navigation to the home screen (e.g., a threshold in a sixth set of user-interface-navigation criteria (e.g., home-display criteria that are used when dock is already displayed before the input is started) are not met, where the sixth set of user-interface-navigation criteria are based on one or more movement parameters of the input (e.g., the speed, acceleration, distance, current or final position, and/or direction of the input), and, optionally, based on movement parameters and characteristics (e.g., displayed size, location, appearance states, etc.) of user interface objects (e.g., the cards) that are currently displayed, e.g., in the manner illustrated in FIGS. 16A-16D)). Application dock 5946 remains displayed over the application-switcher user interface, in FIG. 5H21, in accordance with some embodiments. Although the contact 5980 is shown to start on a peripheral portion of the bottom edge of the screen in FIG. 5H18, in some embodiments, the device enters the transitional user interface with a lower positional threshold if the dock is already displayed, regardless of the starting position of the input on the bottom edge of the display.

FIGS. 5H22-5H24 illustrate an example embodiment where the electronic device navigates to a control panel user interface in response to an edge-swipe gesture from the top edge of the display (e.g., when the contact is detected over an upper right corner region of the display where indicators of some controls in the control panel are displayed). FIG. 5H22 illustrates the interactive map user interface. A downward swipe gesture, including movement of contact 5982, from the right side of the top edge of the display, in FIG. 5H22, drags control panel 5986 onto the screen over the interactive map user interface, rather than displaying an application dock or entering a transitional navigation state, in FIG. 5H23, because the input began from the top edge of the display (e.g., control-panel-display criteria are met), rather than the bottom edge of the display (e.g., dock-display criteria are not met). Simultaneously, the interactive map user interface begins to blur out of focus behind the control panel 5986. After liftoff of the contact, the device displays control panel 5986 over the blurred interactive map user interface, in FIG. 5H24, because the input met the relevant display criteria for displaying the control panel 5986. In some embodiments, the downward edge swipe gesture from the top edge of the display brings down a coversheet user interface (e.g., including stored notifications, current time, etc.) that is distinct from the control panel, if the downward edge swipe gesture is started from the center portion of the top edge of the display, rather than the peripheral portion (e.g., right side) of the top edge of the display.

FIGS. 5H25-5H27 illustrate an example embodiment where an input results in navigation to a previously displayed user interface, rather than an application-switcher user interface, home screen, or control panel, because the input moves substantially horizontally from the bottom edge of the display (e.g., the input is an arc swipe that started from the bottom edge of the screen). FIG. 5H25 illustrates the interactive map user interface. A sideways swipe gesture, including movement 5990 of contact 5988 to the right, in FIG. 5H25, drags the interactive map user interface (e.g., application view 5954 of the interactive map user interface) off of the display to the right, while simultaneously pulling an email user interface (e.g., application view 5956 of an email user interface) onto the display from the left, in FIGS. 5H26-5H27. The input appears to push interactive map card 5954 back into the display and then slide it off of the right-hand side, while dragging email card 5956 onto the display from the left-hand side of the screen. The cards appear to be moving over the home screen, which is blurred in the background. In contrast to FIGS. 5H1-5H4, 5H5-5H8, and 5H9-5H12, movement of contact 5988 does not invoke display of the application dock because the horizontal component of the movement is much greater than the vertical component of movement. In some embodiments, as shown in FIG. 5H26, the dock 5946 is dragged to the right along with card 5954 (e.g., the dock 5946 is treated as part of the currently displayed application user interface at the time when the rightward arc swipe gesture by contact 5988 was detected). In some embodiments, the dock remains at its original location on the screen when cards 5956 and 5954 are dragged across the screen by the arc swipe gesture; and when lift-off of the contact is detected, the dock appears overlaid on the e-mail user interface in FIG. 5H27.

Although the dock-display criteria and various user interface navigation criteria used with respect to the examples shown in FIGS. 5H1-5H27 are positional thresholds. In some embodiments, other movement-based criteria can be used for dock-display and user interface navigation. Additional details of the criteria and thresholds that can be used are described with respect to FIGS. 16A-16D and 17A-17C, and other embodiments described herein, and are not repeated in the interest of brevity.

FIGS. 17A-17C illustrate example thresholds for navigating between different user interface, e.g., an application user interface, a previous application user interface, a home screen user interface, and an application-switcher user interface. The thresholds illustrated in FIGS. 17A-17C are example of thresholds used in conjunction with methods 600, 700, 800, 1000, 1050, 1600, 1700, 1800, and 1900 for navigating between user interfaces.

FIG. 17A illustrates a series of example velocity thresholds having horizontal ($V_x$) and vertical ($V_y$) components on the display. The intersection of the boundaries defines eight sectors (e.g., sectors I-VIII), each associated with a target state for a particular user interface. That is, while in a transitional user interface enabling a user to navigate to any of a plurality of user interfaces (e.g., an application user interface, a next/previous application user interface, a home screen user interface, or an application-switcher user interface), the device assigns a target state user interface based on at least the velocity of the input. When the velocity of the input falls within a particular sector, as defined in FIG. 17A, the device assigns the user interface associated with the sector as the target state, as long as the input satisfies all other criteria (e.g., positional criteria) required for selection of that target state. In some embodiments, the thresholds are used in conjunction with methods 600, 700, 800, 1000, 1050, 1600, 1700, 1800, and 1900 for navigating between user interfaces.

For example, when the y-velocity of an input is greater than threshold 1702, the input is in sector I which is associated with selection of a home screen user interface as the target state. Similarly, inputs with velocities within sector II are associated with selection of a home screen user interface target state. Inputs with velocities within sectors III, IV, and V are associated with selection of an application-switcher user interface target state. Inputs with velocities within sectors VI and VII are associated with selection of a next or previous application user interface target state. Finally, inputs with velocities within sectors VIII are associated with selection of the current application user interface (e.g., the application user interface displayed before the device entered the transitional user interface) target state.

FIG. 17A also illustrates that threshold velocities are, optionally, dynamic. For example, the range of velocity threshold 1710, defining sector V associated with an application-switcher user interface target state, expands from a minimal range of threshold values 1710-*a* to a maximal range of threshold values 1710-*b* when a contact lingers with minimal velocity in sector V. Similarly, velocity thresholds 1704 and 1706, providing boundaries between selecting a next/previous application user interface and a home state user interface as the target state optionally dynamically varies, e.g., from boundary 1704-*c* to 1704-*b*, to allow a less vertically moving input be associated with selection of a home screen user interface as the target state, or to allow a more vertically moving input to be associated with selection of a next/previous application user interface as the target state. Depending upon the designs of a particular system, any threshold is, optionally dynamic, for example by applying method 1800 of dynamically adjusting threshold values.

FIG. 17B illustrates a series of example positional thresholds on the display of a device. In some embodiments, the thresholds are used in conjunction with methods 600, 700, 800, 1000, 1050, 1600, 1700, 1800, and 1900 for navigating between user interfaces. In some embodiments, position thresholds as illustrated in FIG. 17B work in conjunction with velocity thresholds as illustrated in FIG. 17A. In some embodiments, satisfaction of a particular position threshold optionally overrides satisfaction of a corresponding velocity threshold. For example, satisfaction of 1st y-position threshold 1716 in FIG. 17B overrides a corresponding velocity threshold in FIG. 17A, and associates the input with selection of a home screen user interface target state.

FIG. 17C illustrates an example implementation of a dynamic velocity threshold, in accordance with some embodiments. At time T−3, contact velocity 1730 is greater than dynamic velocity threshold 1710-D (which divides selection of a home screen user interface and an application-switcher user interface in FIG. 17A) and the input is therefore associated with selection of a home screen (HS) user interface target state. As contact velocity 1730 slows around time T, the velocity drops below dynamic velocity threshold 1710-D, satisfying the criteria for selecting an application-switcher (AS) user interface target state. In order to favor selection of the application-switcher user interface as the final user interface, dynamic velocity threshold 1710-D increases over time as contact velocity 1730 continues to be below the threshold. Thus, for example, even though contact velocity 1730 at time T+5 is greater than contact velocity at time T−3, because dynamic velocity threshold 1710-D has increased, the input still satisfies selection of application-switcher criteria. However, when dynamic velocity threshold 1710-D reaches threshold maximum 1710-*b*, the device stops increasing the threshold value, despite contact velocity 1730 still being less than the threshold. Once contact velocity 1730 exceeds dynamic velocity threshold 1730-D at time T+6, the device begins reducing dynamic velocity threshold 1710-D, no longer favoring selection of the application-switcher user interface as the final target state. While the variable thresholds discussed above are velocity thresholds, a similar principle is, optionally, applied in other types of thresholds such as position thresholds, pressure thresholds, distance thresholds. Similarly, while the variable thresholds are discussed above with reference to determining whether to select a home screen or application switcher user interface, variable thresholds that operate in the manner described above could be applied to a wide variety of user interface interactions (e.g., determining whether to navigate back to a prior user interface or stay on the current user interface in response to an edge swipe gesture, determining whether to delete an item or not in response to a swipe gesture, determining whether or not to display an expanded preview of a content item based on whether an input has an intensity above a predetermined intensity threshold, whether or not to display a control panel user interface in response to an edge swipe gesture, etc.)

FIGS. 6A-6L are flow diagrams illustrating a method 600 of navigating between an application user interface, an application-switcher user interface, and a home screen user interface, in accordance with some embodiments. The method 600 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

Method 600 relates to transitioning from an application user interface to either the application-switcher user interface or the home screen user interface in response to a swipe gesture. Specifically, the device displays a preview of an application-switcher user interface including multiple application views during an initial portion of the swipe gesture (e.g., an upward swipe gesture that starts from the bottom edge of the touch-screen), and after termination of the gesture is detected, depending on whether application-switcher-display criteria are met or home-display criteria are met, the device ultimately displays either the application-switcher user interface or the home screen user interface. Displaying the preview of the application-switcher user interface in response to an initial portion of a swipe gesture, and allowing the user to either to go to application-switcher user interface or the home screen depending on whether certain preset conditions are met enhance the operability of the device and make the user-device interaction more efficient (e.g., by providing information about the internal state of the device through the multiple application views, helping the user achieve an intended result by providing the required inputs, and reducing the number of steps that are needed to achieve an intended outcome when operating the device), which, additionally, reduce power usage and improve the battery life of the device (e.g., by helping the user to use the device more quickly and efficiently).

Method 600 is performed at a device having a display and a touch-sensitive surface (e.g., a touch-screen display that serves both as the display and the touch-sensitive surface). In some embodiments, the device does not have a home button (e.g., a mechanical button, a virtual button, a solid state button, etc.) that, when activated, is configured to dismiss a currently displayed user interface and replace the currently displayed user interface with a home screen that includes a plurality of application launch icons for a plurality of applications installed on the device. The device displays (602) a first user interface of a first application (e.g., a user interface of an application that has a corresponding application launch icon in the plurality of application launch icons on the home screen) on the display. This is illustrated, for example, in FIGS. 5A1 (web browsing user interface) and FIG. 5A19 (email user interface).

While displaying the first user interface on the display, the device detects (604) a first portion of an input by a first contact, including detecting the first contact on the touch-sensitive surface. In some embodiments, detecting the first portion of the input includes detecting the first contact at an initial touch-down location that is within a predefined region of the device that is proximate to the edge of the display (e.g., an edge region that includes a predefined portion (e.g., 20 pixels wide) of the display near the bottom edge of the device and, optionally, a portion of the bottom edge of the display outside of the display). In some embodiments, detecting the first portion of the input further includes detecting initial movement of the first contact (e.g., horizontal movement or arc movement) that transforms the first user interface. This is illustrated, for example, in FIG. 5A2, where device 100 detects movement 5006 of contact 5004 initiated at the bottom edge of touch screen 112, and in FIG. 5A19, where device 100 detects movement 5042 of contact 5040 initiated at the bottom edge of touch screen 112.

After detecting the first portion of the input by the first contact (e.g., after the initial touch-down of the first contact, or after the first user interface has been transformed by an initial movement of the first contact), the device detects (606) a second portion of the input by the first contact, including detecting first movement of the first contact across the touch-sensitive surface in a first direction (e.g., upward). The device displays (608), during the first movement of the first contact across the touch-sensitive surface, a plurality of application views (e.g., reduced scale images of the application user interface) that including a first application view that corresponds to the first user interface of the first application (e.g., a snapshot or live view of a current state of the first application) and a second application view that corresponds to a second user interface of a second application that is different from the first application (e.g., a snapshot or live view of a current state of the second application) (e.g., the second user interface is a user interface of a recently open application). In some embodiments, recently open applications refer to applications that are deactivated with retained state information, such that when a recently open application is brought to the foreground or reactivated, it will resume functioning from its retained state. In contrast, a closed application refers to an application that is deactivated without a retained state, and when the closed application is opened or reactivated, it starts from a default start state. This is illustrated, for example, in FIGS. 5A2-5A6 and 5A19-5A21. In FIGS. 5A2-5A6, device 100 detects movement 5006 of contact 5004 from position 5004-*a* in FIG. 5A2 to position 5004-*e* in FIG. 5A6 and, in response, displays web browsing application view 5010 (corresponding to the web browsing user interface displayed in FIG. 5A1), messaging application view 5014 (corresponding to a recently open messaging application), and control panel view 5016 (corresponding to a control panel user interface for the device). In FIGS. 5A19-5A21, device 100 detects movement 5042 of contact 5040 from position 5040-*a* in FIG. 5A19 to position 5040-*c* in FIG. 5A21 and, in response, displays email application view 5022 (corresponding to the email user interface displayed in FIG. 5A19), web browsing application view 5010 (corresponding to a recently open web browsing application), and control panel view 5016 (corresponding to a control panel user interface for the device).

While displaying the plurality of application views, the device detects (610) a third portion of the input by the first contact, including detecting liftoff of the first contact from the touch-sensitive surface after detecting the first movement by the first contact. This is illustrated, for example, in FIGS. 5A6-5A7, where contact 5004 pauses and is then lifted-off the screen, and 5A21-5A23, where contact 5040 continues to move upward until it is lifted-off the screen during the upward movement.

In response to detecting the third portion of the input by the first contact (e.g., the portion of the input that includes liftoff of the first contact after the first movement by the first contact) (612): in accordance with a determination that application-switcher-display criteria are met (e.g., based on a predefined movement parameter of the second portion of the input, or based on a predefined movement parameter of the first application view (e.g., either actual movement or projected movement)), wherein application-switcher-display criteria require that the second portion of the input or the first application view meets a first movement condition (e.g., a first condition regarding the contact's speed, acceleration, position, or a combination of one or more of the above, or a first condition regarding a derived movement parameter of the first application view that is based on one or more of the above and one or more additional properties characterizing the state of the current user interface and/or the movements of one or more objects contained therein, etc.) in order for the application-switcher-display criteria to be met, the device displays an application-switcher user interface that includes a plurality of representations of applications (e.g., application launch icons, reduced scale images of application user interfaces, etc.) for selectively activating one of a plurality of applications represented in the application-switcher user interface (e.g., selection of a respective application-selection object re-activates the corresponding application to a state immediate prior to the suspension of the application). In some embodiments, the representations of applications are ordered based on a recency of use of the applications to which they correspond (e.g., with representations of more recently used apps displayed before/above representations of less recently used apps). In some embodiments, the application-switcher user interface includes at least a portion of a control panel user interface. This is illustrated, for example, in FIGS. 5A7-5A8 where lift off of contact 5004 results in display of application views 5012 (web browsing), 5014 (messaging), and 5022 (email) in an application-switcher user interface because the second portion of the input met a first movement condition where the contact was not moving when lifted-off the screen and/or web browsing application view 5010 met a first movement condition where it was larger than 30% of the area of the full screen.

In response to detecting the third portion of the input by the first contact (e.g., the portion of the input that includes liftoff of the first contact after the first movement by the first contact) (612): in accordance with a determination that home-display criteria are met (e.g., based on a predefined movement parameter of the second portion of the input, or based on a predefined movement parameter of the first application view (e.g., either actual movement or projected movement)), wherein the home-display criteria require that the second portion of the input or the first application view meets a second movement condition that is different from the first movement condition (e.g., a second condition regarding the contact's speed, acceleration, position, or a combination of one or more of the above, or a second condition regarding a derived movement parameter of the first application view that is based on one or more of the above and one or more additional properties characterizing the state of the current user interface and/or movements of one or more objects contained therein, etc.) in order for the home-display criteria to be met, displaying a home screen user interface (that is distinct from the application-switcher user interface and) that includes a plurality of application launch icons that correspond to a plurality of applications (e.g., including the plurality of recently open applications and, optionally, one or more additional applications that are closed without retained state information, such that when activated, the applications are started from their default starting states)). This is illustrated, for example, in FIGS. 5A22-5A24 where lift-off of contact 5040 results in display of a home screen user interface in FIG. 5A24 because the second portion of the input met a second movement condition where the contact was moving at a rate greater than a threshold speed and/or email application view 5022 met a second movement condition where it was projected to have an area smaller than 30% of the area of the full screen.

In some embodiments, the first movement condition requires (614) that a first movement parameter of the first movement by the first contact (e.g., an absolute value or a change in position, speed, acceleration, and/or intensity of the first contact, or a combination of multiple factors, such as time, position, speed, intensity of contact, etc. during the first movement) meets a first threshold (e.g., a predefined time threshold for detecting a pause (or alternatively, absence of a pause) in the first movement of the first contact, a predefined position threshold for distinguishing a long swipe versus a short swipe, a predefined speed threshold for distinguishing a fast swipe versus a slow swipe, a predefined acceleration threshold for detecting a deceleration (or alternatively, absence of a deceleration) during the first movement of the first contact, a predefined acceleration threshold for detecting an acceleration (or alternatively, absence of an acceleration) during the first movement of the first contact, a predefined intensity threshold for detecting a press input (or alternatively, absence of a press input) during the first movement of the first contact). This is illustrated, for example, in FIGS. 5A7-5A8 where lift off of contact 5004 results in display of application views 5012 (web browsing), 5014 (messaging), and 5022 (email) in an application-switcher user interface because the second portion of the input met a first movement condition requiring a pause in the movement of contact 5004, illustrated in FIG. 5A6, prior to lift-off in FIG. 5A7. Allowing the user to go to the application-switcher user interface based on whether a movement parameter of the first movement by the first contact meets certain preset conditions enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the second movement condition requires (616) that the first movement parameter of the first movement (e.g., an absolute value or a change in position, speed, acceleration, and/or intensity of the first contact, or a combination of multiple factors, such as time, position, speed, intensity of contact, etc. during the first movement) meets a second threshold that is greater than the first threshold (e.g., a predefined time threshold for detecting a pause (or alternatively, absence of a pause) in the first movement of the first contact, a predefined position threshold for distinguishing a long swipe versus a short swipe, a predefined speed threshold for distinguishing a fast swipe versus a slow swipe, a predefined acceleration threshold for detecting a deceleration (or alternatively, absence of a deceleration) during the first movement of the first contact, a predefined acceleration threshold for detecting an acceleration (or alternatively, absence of an acceleration) during the first movement of the first contact, a predefined intensity threshold for detecting a press input (or alternatively, absence of a press input) during the first movement of the first contact). In some embodiments, the second movement condition requires that the first movement parameter of the first movement meets a third threshold that is lesser than the first threshold. This is illustrated, for example, in FIGS. 5A22-5A24 where lift-off of contact 5040 results in display of a home screen user interface in FIG. 5A24 because the second portion of the input met a second movement condition where the contact was moving at a rate greater than a second threshold speed greater than a first threshold speed required to meet application-switcher-display criteria. Allowing the user to go to the home screen user interface based on whether a movement parameter of the first movement by the first contact meets certain preset conditions that are different from the conditions for displaying the application-switcher user interface enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the first movement condition includes (618) a criterion that is met when the first movement by the first contact corresponds to movement that is above a first movement threshold (e.g., movement of a focus selector by a first distance or movement of a representative portion of a user interface element such as a representation of the application by the first distance) (e.g., a vertical movement of the contact by a half of the screen height from the bottom edge of the touch-screen, or an amount of vertical movement of the contact that causes no more than 30% reduction in size of the card representing the first user interface) and the second movement condition includes (618) a criterion that is met when the first movement by the first contact corresponds to movement that is above a second movement threshold that is greater than the first movement threshold (e.g., movement of the focus selector by a second distance that is greater than the first distance or movement of a representative portion of a user interface element such as a representation of the application by the second distance) (e.g., a vertical movement of the contact by three fourths of the screen height from the bottom edge of the touch-screen, or an amount of vertical movement of the contact that causes more than 30% reduction in size of the card representing the first user interface). For example, a medium length upward swipe from the bottom edge of the touch-screen leads to display of the application-switcher user interface after lift-off of the contact, and a long upward swipe from the bottom edge of the touch-screen leads to display of the home screen after lift-off of the contact. This is illustrated, for example, in FIGS. 5A2-5A6 and 5A19-5A21. In FIGS. 5A2-5A6, movement 5006 of contact 5004 passes a first movement threshold, required to meet application-switcher-display criteria, but not a second movement threshold, required to meet home-display criteria. In contrast, movement 5042 of contact 5040, in FIGS. 5A19-5A21, is much longer, passing both the first movement threshold and the second movement threshold. Allowing the user to go to either the home screen or the application-switcher user interface based on whether the same movement parameter of the first movement by the first contact meets different thresholds enhances the operability of the device and makes the user-device interaction more efficient (e.g., by reducing the number of steps that are needed to achieve an intended outcome when operating the device, and allowing the transition to the home screen and the application-switcher user interface to be continuous and reversible), which, additionally, reduces power usage and improves the battery life of the device (e.g., by helping the user to use the device more quickly and efficiently).

In some embodiments, the first movement condition includes (620) a criterion that is met when the first movement by the first contact corresponds to a first range of movement between an upper movement threshold and a lower movement threshold of the first range of movement (e.g., movement of a focus selector by a distance that is greater than the lower movement threshold and less than the upper movement threshold of the first range or movement of a representative portion of a user interface element such as a representation of the application by a distance that is greater than the lower movement threshold and less than the upper movement threshold of the first range) (e.g., a vertical movement of the contact by a half of the screen height from the bottom edge of the touch-screen, or an amount of vertical movement of the contact that causes no more than 30% reduction in size of the card representing the first user interface) and the second movement condition includes (620) a criterion that is met when the first movement by the first contact corresponds to either a second range of movement or a third range of movement. The second range of movement is between an upper movement threshold and a lower movement threshold of the second range of movement, wherein the second range of movement is below the first range of movement and the second range of movement does not overlap with the first range of movement (e.g., movement of a focus selector by a distance that is greater than the lower movement threshold and less than the upper movement threshold of the second range or movement of a representative portion of a user interface element such as a representation of the application by a distance that is greater than the lower movement threshold and less than the upper movement threshold of the second range) (e.g., a vertical movement of the contact by ⅓ of screen height from the bottom edge of touch-screen with at least a threshold speed before lift-off of the contact). For example, a short upward swipe from the bottom edge of the touch-screen also leads to display of the home screen after lift-off of the first contact, in addition to the long upward swipe from the bottom edge of the touch-screen. In some embodiments, if the movement is below the lower movement threshold of the second range of movement, the device continues to display the user interface for the first application on the display without displaying the displaying a home screen user interface or the application-switcher user interface. The third range of movement is between an upper movement threshold and a lower movement threshold of the third range of movement, wherein third range of movement is above the first range of movement and the third range of movement does not overlap with the first range of movement (e.g., movement of a focus selector by a distance that is greater than the lower movement threshold and less than the upper movement threshold of the third range or movement of a representative portion of a user interface element such as a representation of the application by a distance that is greater than the lower movement threshold and less than the upper movement threshold of the third range). In some embodiments, the upper value of the third range of movement is a furthest extent of movement on the device (e.g., an edge of the display or an edge of the touch-sensitive surface). This would be illustrated in FIGS. 5A2-5A7 and 5A19-5A21 if the navigation results were reversed, e.g., if lift-off of contact 5004, in FIG. 5A7, after a shorter movement 5006, resulted in display of a home screen user interface (as shown in FIG. 5A24) and lift-off of contact 5040 in FIG. 5A23, after an intermediate length movement 5043 resulted in display of a plurality of application views (e.g., as shown in FIG. 5A8). Allowing the user to go to either the home screen or the application-switcher user interface based on the value range that the movement parameter of the first movement by the first contact falls within, and putting the value range for the application-switcher user interface between the value ranges for the home screen user interface enhance the operability of the device and make the user-device interaction more efficient (e.g., by reducing the number of steps that are needed to achieve an intended outcome when operating the device, and allowing the user to transition to the home screen during multiple stages of the swipe gesture), which, additionally, reduces power usage and improves the battery life of the device (e.g., by helping the user to use the device more quickly and efficiently).

In some embodiments, the first movement-condition includes (622) a criterion that is met when the first movement by the first contact corresponds to movement that is greater than a fourth movement threshold (e.g., movement of a focus selector by a fourth distance) (e.g., a vertical movement of the contact by a half of the screen height from the bottom edge of the touch-screen, or an amount of vertical movement of the contact that causes no more than 30% reduction in size of the card representing the first user interface) and the second movement condition includes (622) a criterion that is met when the first movement by the first contact corresponds to movement that is greater than a fifth movement threshold that is less than the fourth movement threshold (e.g., movement of the focus selector by a fifth distance that is less than the fourth distance) (e.g., a vertical movement of the contact by ⅓ of screen height from the bottom edge of touch-screen with at least a threshold speed before lift-off of the contact). For example, a short upward swipe from the bottom edge of the touch-screen leads to the display of the home screen after lift-off of the first contact, and a medium length upward swipe from the bottom edge of the touch-screen leads to the display of the application-switcher user interface after the lift-off of the first contact. This would be illustrated in FIGS. 5A2-5A7 and 5A19-5A21 if the navigation results were reversed, e.g., if lift-off of contact 5004 in FIG. 5A7, after a shorter movement 5006, resulted in display of a home screen user interface (as shown in FIG. 5A24) and lift-off of contact 5040 in FIG. 5A23, after a longer movement 5043 (e.g., where there are only two movement thresholds, rather than three movement thresholds), resulted in display of a plurality of application views (e.g., as shown in FIG. 5A8). Allowing the user to go to either the home screen or the application-switcher user interface based on whether the same movement parameter of the first movement by the first contact meets different thresholds enhances the operability of the device and makes the user-device interaction more efficient (e.g., by reducing the number of steps that are needed to achieve an intended outcome when operating the device, and allowing the transition to the home screen and the application-switcher user interface to be continuous and reversible), which, additionally, reduces power usage and improves the battery life of the device (e.g., by helping the user to use the device more quickly and efficiently).

In some embodiments, the first movement-condition includes (624) a criterion that is met when a predefined parameter (e.g., a projected position/size based on position and size of the first application view upon lift-off of the first contact) of the first application view is in a first value range (e.g., a projected position of the first application view 150 ms after lift-off of the first contact is within a first region on the display (e.g., above one quarter of the screen height above the bottom edge of the screen and below one eighth of the screen height below the top edge of the screen), or a projected size of the first application view 150 ms after lift-off of the first contact is more than 30% of the size of the first user interface) and the second contact movement condition includes (624) a criterion that is met when the predefined parameter of the first application view is in a second value range different from the first value range (e.g., a projected position of the first application view 150 ms after lift-off of the first contact is within a second region (e.g., above seven eighth of the screen height above the bottom edge of the screen, or a projected size of the first application view 150 ms after lift-off of the first contact is less than 30% of the size of the first user interface)). For example, after the application views are displayed, the position and size of the first application view changes in accordance with the movement of the first contact, and thereby acquire positions and speed of its own. After lift-off of the first contact, the projected position and/or size of the first application view is used to determine whether the application-switcher-display criteria are met or whether the home-display criteria are met. This is illustrated, for example, in FIGS. 5A6-5A8 and 5A22-5A24. Lift-off of contact 5004 in FIG. 5A7 causes the device to display an application-switcher user interface because the projected position of the card is greater than 30% of the size of the full screen, since movement of the contact was paused, at a state where the application view was greater than 30% of the size of the full screen, when lift-off occurred). In contrast, lift-off of contact 5040 in FIG. 5A23, where the contact is traveling upwards with movement 5042, results in a projected size and position as shown by outline 5044. Since outline 5044 is smaller than 30% of the area of the full screen, the device displays a home screen user interface in FIG. 5A24. Allowing the user to go to either the home screen or the application-switcher user interface based on whether a predefined parameter of the first application view meets certain preset conditions enhances the operability of the device and makes the user-device interaction more efficient (e.g., by providing information regarding the internal state of the device through the parameter of the first application view, reducing the number of steps that are needed to achieve an intended outcome when operating the device, and allowing the transition to the home screen and the application-switcher user interface to be continuous and reversible), which, additionally, reduces power usage and improves the battery life of the device (e.g., by helping the user to use the device more quickly and efficiently).

In some embodiments, the first movement condition includes (626) a criterion that is met when the first movement by the first contact includes a predefined pause of the first contact, and the second movement condition includes (626) a criterion that is met when the first movement by the first contact does not include the predefined pause of the first contact. For example, during the upward movement of the first contact from the bottom edge of the touch-screen, after the multiple application views are displayed, if the first contact slows down by more than a threshold amount, or if the first contact maintains its position for more than a threshold amount of time, the device displays the application-switcher user interface after lift-off of the first contact; otherwise, if the predefined pause is not detected before lift-off of the first contact, the device displays the home screen user interface after lift-off of the first contact. This is illustrated, for example, in FIGS. 5A6-5A8 and 5A22-5A24. Contact 5004 is paused prior to lift-off in FIG. 5A7—resulting in display of an application-switcher user interface in FIG. 5A8—while contact 5040 continues to travel upwards with movement 5042 prior to lift-off in FIG. 5A23—resulting in display of a home screen user interface in FIG. 5A24. Allowing the user to go to either the home screen or the application-switcher user interface based on whether a predefined pause is detected during the first movement of the first contact enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the first movement condition requires (628) that, after the predefined pause of the first contact is detected during the first movement, less than a threshold amount of movement of the first contact is detected before the lift-off of the first contact is detected; and the second movement condition includes (628) a criterion that is met when, after the predefined pause of the first contact is detected, more than the threshold amount of movement of the first contact is detected before the lift-off of the first contact is detected. For example, during the upward movement of the first contact from the bottom edge of the touch-screen, after the multiple application views are displayed, if the first contact slows down by more than a threshold amount, or if the first contact maintains its position for more than a threshold amount of time, the condition for detecting the predefined pause is met. If lift-off of the first contact is detected with less than a threshold amount of movement after the pause, the device displays the application-switcher user interface after the lift-off of the first contact; otherwise, if the first contact continues to move upward, and more than the threshold amount of movement is detected after the pause and before the lift-off of the first contact, the device displays the home screen user interface after lift-off of the first contact. This would be illustrated if after contact 5004 pauses in FIG. 5A6, and prior to lift-off of contact 5004 in FIG. 5A7, upward movement 5006 of contact 5004 were continued and lift-off resulted in device 100 displaying a home screen user interface, rather than an application-switcher user interface, in FIG. 5A8. Allowing the user to go to either the home screen or the application-switcher user interface based on whether a predefined pause is detected during the first movement of the first contact and then allowing the user to defeat the preset condition with additional movement enhance the operability of the device and make the user-device interaction more efficient (e.g., by reducing the number of steps that are needed to achieve an intended outcome when operating the device, and reducing user mistakes when operating/interacting with the device), which, additionally, reduces power usage and improves the battery life of the device (e.g., by helping the user to use the device more quickly and efficiently).

In some embodiments, the first movement condition includes (630) a criterion that is met when a characteristic movement speed of the first contact during the first movement is below a threshold speed (e.g., one eighth of the screen height per second on lift-off of the first contact), and the second movement condition includes (630) a criterion that is met when the characteristic movement speed of the first contact during the first movement is above the threshold speed. In some embodiments, the characteristic speed of the first contact is the upward speed immediately prior to lift-off of the first contact. In some embodiments, the characteristic speed of the first contact is the average upward speed during a predefined time window (e.g., 20 ms) before lift-off of the first contact. For example, during the upward movement of the first contact, if the upward speed of the first contact immediate prior to lift-off of the first contact is below a first threshold speed (e.g., ⅛ screen height per second), the device displays the application-switcher user interface, and if the upward speed of the first contact immediately prior to lift-off of the first contact is above the first threshold speed, the device displays the home screen user interface after lift-off of the first contact. This would be illustrated in FIGS. 5A2-5A8 and 5A19-5A24 if it is assumed that movement 5006 of contact 5004 is slow—resulting in display of an application-switcher user interface upon lift-off in FIG. 5A8—and movement 5042 of contact 5040 is fast—resulting in display of a home screen user interface upon lift-off in FIG. 5A24. Allowing the user to go to either the home screen or the application-switcher user interface based on whether a slow swipe is detected or a fast swipe is detected enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the first movement condition requires (632) that, the first contact makes less than a threshold amount of movement after meeting the criterion that is met when the characteristic movement speed of the first contact is below the threshold speed; and the second movement condition includes (632) a criterion that is met when, the first contact makes more than the threshold amount of movement after meeting the criterion that is met when the characteristic movement speed of the first contact is below the threshold speed. For example, during the upward movement of the first contact from the bottom edge of the touch-screen, after the multiple application views are displayed, and the characteristic movement speed of the first contact is below a threshold speed (e.g., ⅛ of screen height per second), if the first contact continues to move upward by more than a threshold distance, the device displays the home screen after lift-off of the first contact. If the device does not move by more than the threshold distance after the criterion on the slow speed is met, the device displays the application-switcher user interface after lift-off of the first contact. This would be illustrated by FIGS. 5A19-5A24 if it is assumed that the speed of movement 5042 of contact 5040 between positions 5040-*a* and 5040-*b* was below the threshold speed (which would cause the device to navigate to an application-switcher user interface upon lift-off) and the speed of movement 5042 of contact 5040 between positions 5040-*b* and 5040-*d* was above the threshold speed (defeating the slow speed of movement 5042 between positions 5040-*a* and 5040-*b*), resulting in display of a home screen user interface, in FIG. 5A24, upon lift-off of contact 5040. Allowing the user to go to either the home screen or the application-switcher user interface based on whether a slow swipe is detected or a fast swipe is detected and then allowing the user to defeat the preset condition with additional movement enhance the operability of the device and make the user-device interaction more efficient (e.g., by reducing the number of steps that are needed to achieve an intended outcome when operating the device, and reducing user mistakes when operating/interacting with the device), which, additionally, reduces power usage and improves the battery life of the device (e.g., by helping the user to use the device more quickly and efficiently).

In some embodiments, the first movement condition includes (634) a criterion that is met when a threshold amount of deceleration of the first contact is detected during the first movement, and the second movement condition includes (634) a criterion that is met when the threshold amount of deceleration of the first contact is not detected during the first movement. For example, during the upward movement of the first contact from the bottom edge of the touch-screen, after the multiple application views are displayed, if the first contact slows down by more than a threshold amount within a threshold amount of time, the device displays the application-switcher user interface after lift-off of the first contact; otherwise, if the required amount of deceleration is not detected before lift-off of the first contact, the device displays the home screen user interface after lift-off of the first contact. This is illustrated in FIGS. 5A2-5A8 and 5A19-5A24, where movement 5006 of contact 5004 is decelerated to a pause prior to lift-off, resulting in display of an application-switcher user interface in FIG. 5A8 upon lift-off, while movement 5042 of contact 5040 is not decelerated prior to lift-off, resulting in display of a home screen user interface in FIG. 5A24. Allowing the user to go to either the home screen or the application-switcher user interface based on whether a threshold amount of deceleration is detected during the first movement of the first contact enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the first movement condition requires (636) that, after the threshold amount of deceleration of the first contact is detected, less than a threshold amount of movement of the first contact is detected before lift-off of the first contact is detected, and the second movement condition includes (636) a criterion that is met when, after the threshold amount of deceleration of the first contact is detected, more than the threshold amount of movement of the first contact is detected before lift-off of the first contact is detected. For example, during the upward movement of the first contact from the bottom edge of the touch-screen, after the multiple application views are displayed, if the first contact slows down by more than a threshold amount within a threshold amount of time, the condition for detecting the required deceleration is met. If lift-off of the first contact is detected with less than a threshold amount of movement after the deceleration, the device displays the application-switcher user interface after lift-off of the first contact; otherwise, if the first contact continues to move upward, and more than the threshold amount of movement detected after the required deceleration and before lift-off of the first contact, the device displays the home screen user interface after lift-off of the first contact. This would be illustrated if after contact 5004 decelerates to a pause in FIG. 5A6, and prior to lift-off of contact 5004 in FIG. 5A7, upward movement 5006 of contact 5004 were continued past a threshold amount and lift-off resulted in device 100 displaying a home screen user interface, rather than an application-switcher user interface, in FIG. 5A8. Allowing the user to go to either the home screen or the application-switcher user interface based on whether a threshold amount of deceleration is detected during the first movement of the first contact and then allowing the user to defeat the preset condition with additional movement enhance the operability of the device and make the user-device interaction more efficient (e.g., by reducing the number of steps that are needed to achieve an intended outcome when operating the device, and reducing user mistakes when operating/interacting with the device), which, additionally, reduces power usage and improves the battery life of the device (e.g., by helping the user to use the device more quickly and efficiently).

In some embodiments, the first movement condition includes (638) a criterion that is met when a characteristic intensity of the first contact does not exceed a predefined threshold intensity during the first movement after the plurality of application views are displayed, and the second movement condition includes (638) a criterion that is met when the characteristic intensity of the first contact exceeds the predefined threshold intensity during the first movement after the plurality of application views are displayed. For example, during the upward movement of the first contact from the bottom edge of the touch-screen, after the multiple application views are displayed, if a press input by the first contact is detected, the device displays the home screen user interface after lift-off of the first contact; otherwise, if the press input is not detected before lift-off of the first contact, the device displays the application-switcher user interface after lift-off of the first contact. This would be illustrated in FIGS. 5A2-5A8 and 5A19-5A24 if it is assumed that a characteristic intensity of contact 5004 did not exceed a predefined intensity threshold, resulting in display of an application-switcher user interface upon lift-off, in FIG. 5A8, and a characteristic intensity of contact 5040 did exceed the predefined intensity threshold, resulting in display of a home screen user interface upon lift-off, in FIG. 5A24. Allowing the user to go to either the home screen or the application-switcher user interface based on whether a press input is detected during the first movement of the first contact enhances the operability of the device and makes the user-device interaction more efficient (e.g., by reducing the number of steps that are needed to achieve an intended outcome when operating the device, and reducing user mistakes when operating/interacting with the device), which, additionally, reduces power usage and improves the battery life of the device (e.g., by helping the user to use the device more quickly and efficiently).

In some embodiments, the first movement condition includes (640) a criterion that is met when a characteristic intensity of the first contact exceeds a predefined threshold intensity during the first movement after the plurality of application views are displayed, and the second movement condition includes (640) a criterion that is met when the characteristic intensity of the first contact does not exceed the predefined threshold intensity during the first movement after the plurality of application views are displayed. For example, during the upward movement of the first contact from the bottom edge of the touch-screen, after the multiple application views are displayed, if a press input by the first contact is detected, the device displays the application-switcher user interface after lift-off of the first contact; otherwise, if the press input is not detected before lift-off of the first contact, the device displays the home screen user interface after lift-off of the first contact. This would be illustrated in FIGS. 5A2-5A8 and 5A19-5A24 if it is assumed that a characteristic intensity of contact 5004 exceeded a predefined intensity threshold, resulting in display of an application-switcher user interface upon lift-off, in FIG. 5A8, and a characteristic intensity of contact 5040 did not exceed the predefined intensity threshold, resulting in display of a home screen user interface upon lift-off, in FIG. 5A24. Allowing the user to go to either the home screen or the application-switcher user interface based on whether a press input is detected during the first movement of the first contact enhances the operability of the device and makes the user-device interaction more efficient (e.g., by reducing the number of steps that are needed to achieve an intended outcome when operating the device, and reducing user mistakes when operating/interacting with the device), which, additionally, reduces power usage and improves the battery life of the device (e.g., by helping the user to use the device more quickly and efficiently).

In some embodiments, the first contact movement condition requires (642) that, after the characteristic intensity of the first contact exceeds the predefined threshold intensity, the first contact makes less than a threshold amount of movement before lift-off of the first contact, and the second contact movement condition includes (642) a criterion that is met when, after the characteristic intensity of the first contact exceeds the predefined threshold intensity, the first contact makes more than the threshold amount of movement before lift-off of the first contact. For example, during the upward movement of the first contact from the bottom edge of the touch-screen, after the multiple application views are displayed, if intensity of the first contact exceeds the predefined intensity threshold, the criterion for detecting the required press input is met. If lift-off of the first contact is detected with less than a threshold amount of movement after the press input, the device displays the application-switcher user interface after lift-off of the first contact; otherwise, if the first contact continues to move upward, and more than the threshold amount of movement detected after the press input and before lift-off of the first contact, the device displays the home screen user interface after lift-off of the first contact. This would be illustrated by FIGS. 5A19-5A24 if a characteristic intensity of contact 5040 exceeded a predefined intensity threshold at position 5040-*b*, which would otherwise direct display of an application-switcher user interface upon lift-off, but because contact 5040 continued to move upwards to position 5040-*e* prior to lift-off, the device displays a home screen user interface in FIG. 5A24 after lift-off. Allowing the user to go to either the home screen or the application-switcher user interface based on whether a press input is detected during the first movement of the first contact and then allowing the user to defeat the present condition with additional movement enhance the operability of the device and make the user-device interaction more efficient (e.g., by reducing the number of steps that are needed to achieve an intended outcome when operating the device, and reducing user mistakes when operating/interacting with the device), which, additionally, reduces power usage and improves the battery life of the device (e.g., by helping the user to use the device more quickly and efficiently).

In some embodiments, the plurality of application views are displayed (644) in a first configuration before the application-switcher-display criteria are met (e.g., by the second portion of the input or the first application view). For example, immediately after the upward movement of the first contact is started from the bottom edge of the touch-screen, the first user interface is reduced in size and morphed into a reduced-scale image of the first user interface, and the reduced-scale image of the first user interface continues to shrink in size and move upward with the first contact, as the first contact continues to move upward. Reduced-scale image of at least one other open application is displayed next to the reduced-scale image of the first user interface, and changes its position and size in accordance with the changes in the position and size of the reduced-scale image of the first user interface. Further, displaying the application-switcher user interface includes displaying (644) the plurality of application views in a second configuration that is different from the first configuration. For example, before the lift-off of the first contact is detected, the plurality of application views are displayed side by side in the same z-layer, and do not overlap with one another. After the lift-off of the first contact is detected, the plurality of application views fly into a stack each being slightly offset from the application view above it. In some embodiments, the plurality of application views change their relative positions (e.g., into the stacked configuration) upon satisfaction of the application-switcher-display criteria, before lift-off of the first contact is detected. In some embodiments, the plurality of application views change their relative positions again once the home-display criteria are met (e.g., in some embodiments, the application-switcher-display criteria are no longer met, if the home-display criteria are met (e.g., with continued upward movement of the first contact)). This is illustrated in FIGS. 5A6-5A8 where application views 5014, 5010, and 5018 are displayed in a co-planar fashion prior to lift-off of contact 5004, in FIG. 5A6, and in a stacked orientation after lift-off of contact 5004, in in FIG. 5A8. Displaying the application views in different configurations before and after the application-switcher-display criteria are met enhances the operability of the device and makes the user-device interaction more efficient (e.g., by providing visual feedback regarding the internal state of the device, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, the touch-sensitive surface is integrated with the display in a touch-screen display, and the first movement of the first contact is detected (646) across portions of the touch-screen display on which the first user interface was displayed before the detection of the first contact. For example, the first movement of the first contact is not across a touch-sensitive solid-state home button, or a mechanical button, or a stationary or repositionable virtual home button that is overlaid on the first user interface. This is illustrated, for example, in FIGS. 5A2-5A7, where movement 5006 of contact 5004 is on touch screen 112. Allowing the user to display the home-screen user interface and the application-switcher user interface by providing a gesture on the touch-screen that displays the first user interface (as opposed to a physical, solid state, or virtual home button) enhances the operability of the device and makes the user-device interaction more efficient (e.g., by reducing visual clutter, providing visual feedback directly below finger contacts, and thereby reducing use mistakes and helping the user to use the device more quickly and efficiently). Not requiring a physical or solid state button will, in some circumstances, reduce power usage and manufacturing and maintenance costs of the device (e.g., by eliminating the required hardware and a mechanical fatigue on the required hardware).

In some embodiments, displaying the plurality of application views includes (648) dynamically changing an appearance of the plurality of application views in accordance with a current value of a movement parameter (e.g., position and/or speed) of the first contact during the first movement. This is illustrated, for example, in FIGS. 5A20-5A21, where application views 5010 and 5022, and control panel view 5016, decrease in size and move upward on the screen in response to upward movement 5042 of contact 5040 from position 5040-*b*, in FIG. 5A20, to position 5040-*c*, in FIG. 5A21. Dynamically changing the appearance of the application views in accordance with the current value of the movement parameter of the first contact enhances the operability of the device and makes the user-device interaction more efficient (e.g., by providing real-time visual feedback regarding the internal state of the device, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, dynamically changing the appearance of the plurality of application views in accordance with the current value of the movement parameter of the first contact during the first movement includes reducing (650) respective sizes of the plurality of application views in accordance with a current vertical distance between a focus selector (e.g., the first contact) and a predefined reference position (e.g., bottom center of the touch-screen) on the display. This is illustrated, for example, in FIGS. 5A20-5A21, where application views 5010 and 5022, and control panel view 5016 decrease in size and move upward on the screen in response to upward movement 5042 of contact 5040 from position 5040-*b*, in FIG. 5A20, to position 5040-*c*, in FIG. 5A21. Dynamically reducing the sizes of the application views in accordance with the current vertical distance of the first contact enhances the operability of the device and makes the user-device interaction more efficient (e.g., by providing real-time visual feedback regarding the internal state of the device, providing smooth transition between the application-switcher user interface and the home screen user interface, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, the device ceases (652) to display the plurality of application views in accordance with a determination that the respective size of the first application view that corresponds to the first user interface is reduced to below a threshold size (e.g., 30% of the original size of the first user interface). In some embodiments, the device displays an animation showing the plurality of application views moving toward and merge into the application launch icons of the respective applications that are represented by the plurality of application views. This is illustrated, for example, in FIGS. 5A21-5A22 where device 100 ceases to display application view 5010 and control panel view 5016 upon movement 5042 of contact 5040 from position 5040-*c*, in FIG. 5A21, to position 5040-*d*, in FIG. 5A22, because email application view 5022 decreases in size below a predefined threshold size. Ceasing to display the preview of the application-switcher user interface including the multiple application views when the size of the first application view is reduced below a threshold size and the conditions for displaying the home screen user interface is met enhances the operability of the device and makes the user-device interaction more efficient (e.g., by providing real-time visual feedback regarding the internal state of the device, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, the first application view is an image of the first user interface (e.g., a snapshot of the first user interface) and the method includes dynamically changing (654) a size of the first application view in accordance with a current position of the first application view on the display (e.g., reducing the size of the first application view when the first application view moves upward toward the top of the display). This is illustrated, for example, in FIGS. 5A20-5A21, where application views 5010 and 5022, and control panel view 5016 decrease in size and move upward on the screen in response to upward movement 5042 of contact 5040 from position 5040-*b*, in FIG. 5A20, to position 5040-*c*, in FIG. 5A21. Dynamically changing the size of the application views in accordance with the current position of the first application view enhances the operability of the device and makes the user-device interaction more efficient (e.g., by providing real-time visual feedback regarding the internal state of the device, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, the device changes (656) the current position of the first application view in accordance with the first movement of the first contact. This is illustrated in FIGS. 5A52-5A55, where the vertical and horizontal position of messaging application view 5014 are dynamically changed with movement of contact 5070 from position 5070-*a* through 5070-*b*. Dynamically changing the size of the application views in accordance with the current position of the first contact enhances the operability of the device and makes the user-device interaction more efficient (e.g., by providing real-time visual feedback regarding the internal state of the device, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, dynamically changing the size of the first application view includes continuing (658) to change the size of the first application view in accordance with movement of the first application view after lift-off of the first contact is detected. For example, when the input is an upward flick gesture, card representing the first user interface is "thrown" upward, and continues to shrink in size as it moves toward the top of the display. This is illustrated, for example, in FIGS. 5A55-5A56 where lift-off of contact 5070, while traveling downward according to movement 5072, causes messaging application view 5014 to continue to increase in size until it reaches full screen size, at which time it is replaced by display of the messaging user interface in FIG. 5A56. Dynamically changing the size of the application views in accordance with the current position of the first application view and after lift-off of the first contact enhances the operability of the device and makes the user-device interaction more efficient (e.g., by providing real-time visual feedback regarding the internal state of the device, improving continuity of the visual feedback before and after termination of the input, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, displaying the plurality of application views includes: in accordance with a determination that the application-switcher-display criteria are not met (e.g., before lift-off of the first contact has been detected, or after lift-off of the first contact has been detected), displaying (660) the first application view without displaying the second application view (and any other application views among the plurality of application views); and, in accordance with a determination that the application-switcher-display criteria are met (e.g., before lift-off of the first contact has been detected, or after lift-off of the first contact has been detected), displaying (660) the first application view with the second application view (and, optionally, other applications views among the plurality of application views). For example, initially, when first contact moves upward from the bottom edge of the display, only the card for the first user interface is visible on the display. As the first contact continues to move up on the touch-screen, and reaches a threshold vertical position on the touch-screen or is paused on the touch-screen, such that the applicationswitcher-display criteria are met, the card for the last displayed application and the control panel view are displayed (e.g., shifted in from the two sides of the display (e.g., left side and right side, or left side and bottom side)). This is illustrated, for example, in FIG. 5A2-5A6 where, prior to meeting application-switcher-display criteria, device 100 displays only web browsing application view 5010 in FIGS. 5A2-5A5 but, in response to the input meeting application-switcher-display criteria, the device displays application view 5014 and control panel view 5016 from the left-hand and right-hand sides of the screen in FIG. 5A6. Displaying the first application view without the other application views when application-switcher-display criteria are not met, and displaying multiple application views when the application-switcher-display criteria are met enhance the operability of the device and make the user-device interaction more efficient (e.g., by providing real-time visual feedback regarding the internal state of the device, improving continuity of the visual feedback before and after the application-switcher-display criteria are met, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, in accordance with a determination that home-display criteria are met (e.g., before lift-off of the first contact has been detected, or after lift-off of the first contact has been detected), the device ceases (662) to display the second application view of the plurality of application views while maintaining display of the first application view (e.g., when the home-display criteria are met, the device continues to display only the first application view, and ceases to display other application views and the control panel view on the display). In some embodiments, when the home-display criteria are met (e.g., based on position, speed, acceleration, deceleration, pause, etc. of the first contact or a predefined portion of the first application view), the two side cards fade away, and only the center card representing the first user interface remains displayed and continues to move upward toward the top of the display. This is illustrated in FIGS. 5A21-5A22 where, prior to meeting home-display criteria, device 100 displays application views 5010 and 5022, and control panel view 5016, in FIG. 5A21, but, in response to the input meeting home-display criteria, the device ceases to display application view 5010 and control panel view 5016 in FIG. 5A22. Displaying multiple application views before the home-display criteria are met and ceasing to display multiple application views after the home-display criteria are met enhance the operability of the device and make the user-device interaction more efficient (e.g., by providing real-time visual feedback regarding the internal state of the device, improving continuity of the visual feedback before and after the application-switcher-display criteria are met, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, in accordance with a determination that the home-display criteria are met, the device displays (664) an animated transition in which the first application view overlaid on the home screen user interface is transformed into a first application launch icon on the home screen user interface that corresponds to the first application. This is illustrated in FIGS. 5A22-5A25 where, in response to lift-off of contact 5040 when the input meets home-display criteria, email application view 5022 decreases in size and transitions into email launch icon 418 in FIG. 5A25. Displaying an animated transition showing the first application view overlaid on the home screen to the home screen user interface when the home-display criteria are met enhances the operability of the device and makes the user-device interaction more efficient (e.g., by providing real-time visual feedback regarding the internal state of the device, improving continuity of the visual feedback before and after the home-display criteria are met, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, displaying the plurality of application views includes, during the first movement of the first contact (e.g., the upward movement from the bottom edge of the touch-screen), when the application-switcher-display criteria are met, displaying (666) a first plurality of intermediate states between displaying the first application view and displaying the plurality of application views (e.g., the other application views gradually fade in or slide in from the sides of the display); and during the first movement of the first contact (e.g., the upward movement from the bottom edge of the touch-screen), after the application-switcher criteria are met and when the home-display criteria are met, displaying (666) a second plurality of intermediate states between displaying the plurality of application views and displaying the first application view (e.g., the other application views gradually fade out or slide out to the sides of the display). This would be illustrated by FIGS. 5A19-5A22 if application view 5010 and control panel view 5016 slid onto the screen between FIGS. 5A19 and 5A20 (e.g., upon meeting application-switcher-display criteria) and then slid off of the screen between FIGS. 5A21 and 5A22 (e.g., after no longer meeting application-switcher-display criteria). Displaying a plurality of intermediate states transitioning into the multiple application views when the application-switcher-display criteria are met, and displaying another plurality of intermediates transitioning into the single application view when the home-display criteria are met enhance the operability of the device and make the user-device interaction more efficient (e.g., by providing real-time visual feedback regarding the internal state of the device, improving continuity of the visual feedback before and after the application-switcher-display criteria are met, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, during the first movement of the first contact (e.g., the upward movement from the bottom edge of the touch screen), the device displays (668) a third plurality of intermediate states between displaying the plurality of application views and displaying the home-screen user interface, wherein the plurality of application views are concurrently displayed with the home-screen user interface during the plurality of intermediate states (e.g., the application views are overlaid on the home-screen user interface). For example, the home-screen user interface is displayed in a layer below the plurality of application views, and the plurality of application views become smaller and/or more translucent as the first contact moves toward the top of the display, while the home screen user interface becomes increasingly clear and bright/saturated as the first contact moves toward the top of the display. This is illustrated in FIGS. 5A20-5A21 where application views 5010 and 5022, and control panel view 5016, are displayed over a blurred home screen user interface. The application views decrease in size and the home screen user interface becomes clearer upon upward movement 5042 of contact 5040 from position 5040-*b*, in FIG. 5A20, to position 5040-*c*, in FIG. 5A21. Displaying a plurality of intermediate states between the multiple application views and the home screen user interface enhances the operability of the device and makes the user-device interaction more efficient (e.g., by providing real-time visual feedback regarding the internal state of the device, improving continuity of the visual feedback, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, at a first point in time, the first contact completes a first portion of the first movement, at a second point in time, the first contact completes a second portion of the first movement following the first portion of the first movement, at a third point in time, the first contact completes a third portion of the first movement that reverses the second portion of the first movement. In accordance with the first portion of the first movement, the application-switcher-display criteria would be met (670) if lift-off of the first contact is detected at the first point in time. In accordance with the first portion and the second portion of the first movement, the home-display criteria would be met (670) if lift-off of the first contact is detected at the second point in time. In accordance with the first portion, the second portion, and the third portion of the first movement, the application-switcher-display criteria would be met (670) if lift-off of the first contact is detected at the third point in time. For example, in some embodiments, before the first contact drags the first application view to a threshold position on the touch-screen, the plurality of application views are displayed, and lift-off of the first contact will cause the application-switcher user interface to be displayed; however, the if the first contact continues to move upward to beyond the threshold position, the plurality of application views cease to be displayed, and the home screen would be displayed if lift-off of the first contact is detected at this point; and if the first contact then reverses the movement direction, the plurality of application views are redisplayed, and if lift-off of the first contact is detected at this point. In some embodiments, the user interface is smoothly animated during the first movement, so that even though different operations would be performed depending on which portion of the input the input is detected, the change in the appearance of the user interface during the input are continuous and the visual indications that the different operations will be performed on liftoff of the contact gradually transition as the contact moves on the touch-sensitive surface. Providing visual changes in the user interface that are fluid, continuous, and reversible and forgoing the use of discrete and non-reversible states for performing user interface operations enhance the operability of the device and make the user-device interaction more efficient (e.g., by providing real-time visual feedback regarding the internal state of the device, improving continuity of the visual feedback, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, the display includes a first protruding portion and a second protruding portion that is separated by a predefined cutout area that does not display content. Displaying the first user interface includes: displaying (672) a first portion of the first user interface in the first protruding portion of the display, displaying (672) a second portion of the first user interface in the second protruding portion of the display, and forgoing displaying (672) a third portion of the first user interface that is between the first portion of the first user interface and the second portion of the first user interface. Displaying the plurality of application views including the first application view includes displaying (672) an image of the first user interface as the first application view, wherein the third portion of the first user interface is included in the image between the first and second portions of the first user interface. For example, when the first application is in full screen mode, a portion of the application user interface falls within a cutout region along one edge (e.g., a location of one or more hardware components that extend into the display). The representation of the first application in the application-switcher user interface is a card with rounded corners, and do not have the protruding "ears" in the upper left and upper right corners, and includes content that was within the cutout region and therefore not visible when the first application was in the full-screen mode of operation. This is illustrated, for example, in FIGS. 5A2-5A3 where the portion of the web browsing user interface obscured by the portion of device 100 housing optical sensors 164 and speaker 111 in FIG. 5A2 is revealed in web browsing application view 5010 in FIG. 5A3. Displaying additional content of the user interface that is previously obscured (e.g., due to presence of physical obstacles) when displaying the multiple application views enhances the operability of the device and makes the user-device interaction more efficient (e.g., by providing real-time visual feedback regarding the internal state of the device, and providing additional information without cluttering the display), which, additionally, reduces power usage and improves the battery life of the device (e.g., by helping the user to use the device more quickly and efficiently).

In some embodiments, the first user interface is a full-screen user interface of the first application (674) (e.g., user interface in a theater mode of a media player application, or user interface in a navigation mode of a navigation application). Displaying additional content of a full-screen user interface that is previously obscured (e.g., due to presence of physical obstacles) when displaying the multiple application views enhances the operability of the device and makes the user-device interaction more efficient (e.g., by providing real-time visual feedback regarding the internal state of the device, and providing additional information without cluttering the display), which, additionally, reduces power usage and improves the battery life of the device (e.g., by helping the user to use the device more quickly and efficiently).

In some embodiments, the device displays (676) system information within at least one of the first and second protruding portions, wherein the system information is overlaid on at least one of the first portion of the first user interface or the second portion of the first user interface. This is illustrated, for example, in FIG. 5A1 where time indicator 404 and status indicator 402 are displayed in protruding areas of touch screen 112. Displaying system information in predefined regions of the display that is an extension of the rest of the display enhances the operability of the device and makes the user-device interaction more efficient (e.g., by utilizing available display space to display information that is separate from the underlying user interface, without interfering with the utilization of display space by a currently displayed application, and helping the user to see the system status of the device without additional inputs), which, additionally, reduces power usage and improves the battery life of the device (e.g., by helping the user to use the device more quickly and efficiently).

In some embodiments, the device displays (678) additional system information (e.g., mobile carrier name, Bluetooth connectivity indicator, do not disturb mode indicator, orientation lock indicator, airplane mode indicator, etc.) concurrently with the plurality of application views, wherein the additional system information was not displayed concurrently with the first user interface before the plurality of application views are displayed. In some embodiments, the system information ceases to be displayed if the first user interface for the first application is redisplayed, so that the user can temporarily display the additional system information by swiping up slightly on the touch-sensitive surface and swiping downward or lifting off to redisplay the first user interface for the first application. This is illustrated in FIGS. 5A2 and 5A8, where expanded status bar 5008 is displayed in the application-switcher user interface in FIG. 5A8, but not in web browsing user interface in FIG. 5A2. Displaying additional system information when displaying the multiple application views enhances the operability of the device and makes the user-device interaction more efficient (e.g., by providing the system status of the device with a simple gesture, and without unduly cluttering the display when such additional status information is not needed), which, additionally, reduces power usage and improves the battery life of the device (e.g., by helping the user to use the device more quickly and efficiently).

In some embodiments, the device concurrently displays (680) a control panel view that corresponds to a control panel user interface of the device with the plurality of application views, wherein the control panel user interface includes a plurality of control affordances corresponding to a plurality of different control functions of the device (e.g., different types of network connections, display properties, media playback, peripheral device functions, etc.). This is illustrated, for example, in FIG. 5A6, where control panel view 5016 is displayed with application views 5010 and 5014 prior to lift-off of contact 5004. Displaying a control panel view along with other application views enhances the operability of the device and makes the user-device interaction more efficient (e.g., by providing guidance on how to easily access key control functions of the device, and reducing the number of inputs needed to access the control panel user interface), which, additionally, reduces power usage and improves the battery life of the device (e.g., by helping the user to use the device more quickly and efficiently).

In some embodiments, in response to detecting the third portion of the input by the first contact, in accordance with a determination that the application-switcher-display criteria are met, the device displays (682) at least a portion of the control panel user interface in the application-switcher user interface. In some embodiments, the plurality of application views are displayed concurrently with the control panel view. This is illustrated, for example, in FIG. 5A8, where control panel view 5016 is displayed with application views 5010, 5014, and 5022 in the application-switcher user interface. Displaying the control panel user interface along with other recently open applications in the application-switcher user interface enhances the operability of the device and makes the user-device interaction more efficient (e.g., by providing easy access to key control functions of the device, and reducing the number of inputs needed to access the control panel user interface), which, additionally, reduces power usage and improves the battery life of the device (e.g., by helping the user to use the device more quickly and efficiently).

In some embodiments, the plurality of application views are displayed (684) side by side (e.g., at a first distance above the bottom edge of the display) and the control panel view is displayed (684) in a first direction relative to the plurality of application views (e.g., the first row of the control panel user interface is shown below the plurality of application views that are arranged side by side (e.g., the first row of the control panel user interface is displayed at a second distance above the bottom edge of the display that is smaller than the first distance)). In some embodiments, an upward swipe on the control panel view causes the whole control panel to be displayed. Displaying the control panel user interface along with other recently open applications in the application-switcher user interface and displaying the application views and the control panel user interface in different parts of the display enhance the operability of the device and make the user-device interaction more efficient (e.g., by providing easy access to key control functions of the device, reducing the number of inputs needed to access the control panel user interface, and reducing user mistakes when interacting with/operating the device to access the control panel or a recently open application), which, additionally, reduces power usage and improves the battery life of the device (e.g., by helping the user to use the device more quickly and efficiently).

In some embodiments, the control panel view includes (686) a first plurality of controls (e.g., WiFi connection control, Bluetooth connection control, Airplane mode control, etc.) that are activatable by a contact (e.g., via a tap input or press input) when the control panel view is displayed in the application-switcher user interface to perform corresponding control operations at the device. Making one or more controls in the control panel view activatable while the control panel view is displayed in the application-switcher user interface enhances the operability of the device and makes the user-device interaction more efficient (e.g., by providing easy access to key control functions of the device, and reducing the number of inputs needed to access the control panel user interface), which, additionally, reduces power usage and improves the battery life of the device (e.g., by helping the user to use the device more quickly and efficiently).

In some embodiments, the first application view and the second application view are displayed (688) in an arrangement along a first path (e.g., side by side or arranged in a stack extending along the first path, optionally at a first distance above the bottom edge of the display) and the control panel view and the first application view are displayed (688) along the first path (e.g., side by side or arranged in a stack extending along the first path). For example, a reduced-scale image of the control panel user interface is displayed as a "card" along with the reduced-scale images of the first user interface and the second user interface, with the reduced-scale image of the first user interface being the middle "card" between the reduced-scale images of the control panel user interface and the second use interface. This is illustrated, for example, in FIG. 5A6, where control panel view 5016 is displayed with application views 5010 and 5014 prior to lift-off of contact 5004. Displaying the control panel user interface along with other recently open applications in the application-switcher user interface and displaying the application views and the control panel user interface in the same path enhance the operability of the device and make the user-device interaction more efficient (e.g., by providing easy access to key control functions of the device, reducing the number of inputs needed to access the control panel user interface, and providing visual consistency of the user interface thereby reducing user mistakes when interacting with/operating the device), which, additionally, reduces power usage and improves the battery life of the device (e.g., by helping the user to use the device more quickly and efficiently).

In some embodiments, the device detects (690) an application-switching request to switching from a currently displayed application to a respective application that is not currently displayed (e.g., while displaying the first user interface of the first application, detecting a gesture that meets the home-display criteria, displaying the home screen in response to the gesture, and after the home screen is displayed, detecting an input to launch a second application. In another example, while displaying the second application, detecting another gesture that meets the application-switcher-display criteria, displaying the application-switcher user interface in response to the gesture, and while displaying the application-switcher user interface, detecting user selection of an application view corresponding to a third application, etc.). In response to detecting the application-switching request, the device displays (690) a user interface of the respective application and, in accordance with a determination that gesture-prompt-display criteria are met, the device displays (690) a first visual prompt regarding a gesture that meets either one of the application-switcher-display criteria and the home-display criteria (e.g., a textual prompt such as "swipe up from bottom edge to display the home screen" or "application-switcher", or an animation showing a required gesture for displaying the application-switcher user interface or the home screen), while in accordance with a determination that the gesture-prompt-display criteria are not met, the device forgoes display (690) of the first visual prompt. Displaying a visual prompt regarding the home-display gesture or the application-switcher-display gesture when displaying a transition to a new application user interface enhances the operability of the device and makes the user-device interaction more efficient (e.g., by helping the user to achieve a desired outcome with required inputs, and reducing user mistakes when interacting with/operating the device to access the home screen or the application-switcher user interface), which, additionally, reduces power usage and improves the battery life of the device (e.g., by helping the user to use the device more quickly and efficiently).

In some embodiments, the gesture-prompt-display criteria include (692) a criterion that is met when the device has recently completed an upgrade. For example, the gesture prompt is displayed the first time the device is turned on after an upgrade. In some embodiments, the upgrade is an upgrade that changed the application-switcher and home-display criteria to require a swipe from an edge of the display to go home or display an application-switcher user interface. In some embodiments, the criterion is met when the device has completed an upgrade within a predetermined time threshold and the user has not yet performed a gesture that meets the application-switching or home-display criteria. Displaying a visual prompt regarding the home-display gesture or the application-switcher-display gesture when the device has had a recent upgrade enhances the operability of the device and makes the user-device interaction more efficient (e.g., by helping the user to achieve a desired outcome with required inputs, and reducing user mistakes when interacting with/operating the device to access the home screen or the application-switcher user interface), which, additionally, reduces power usage and improves the battery life of the device (e.g., by helping the user to use the device more quickly and efficiently).

In some embodiments, the device increments (694) a counter each time that the first visual prompt is displayed, wherein the gesture-prompt-display criteria require that a current value of the counter does not exceed a predefined threshold value in order for the gesture-prompt-display criteria to be met (e.g., the gesture hint is displayed a single time or a predetermined number of times). Displaying a visual prompt regarding the home-display gesture or the application-switcher-display gesture only for a set number of times enhances the operability of the device and makes the user-device interaction more efficient (e.g., by helping the user to achieve a desired outcome with required inputs and reducing user mistakes when interacting with/operating the device, without unduly interfering with the user's normal usage of the device), which, additionally, reduces power usage and improves the battery life of the device (e.g., by helping the user to use the device more quickly and efficiently).

In some embodiments, displaying the first visual prompt includes displaying (696) a home affordance (e.g., near a bottom edge of the touch-screen) with a first appearance (e.g., enlarged, animated, blinking, pulsating, etc.) and forgoing display of the first visual prompt includes displaying (696) the home affordance with a second appearance that is different from the first appearance (e.g., the second appearance is the normal appearance of the home affordance, not enlarged, not animated, and not distracting to the user). In some embodiments, the home affordance is displayed at a location on the touch-sensitive display (e.g., a bottom edge of the touch-sensitive display) that indicates a portion of the touch-sensitive display that is configured to receive an input for going home or displaying the application-switcher user interface. In some embodiments, the home affordance is displayed in the second appearance throughout the user interface to indicate a location on the touch-sensitive display (e.g., a bottom edge of the touch-sensitive display) that indicates a portion of the touch-sensitive display that is configured to receive an input for going home or displaying the application-switcher user interface. Visually changing an appearance of the home affordance as a visual prompt regarding the home-display gesture or the application-switcher-display gesture enhances the operability of the device and makes the user-device interaction more efficient (e.g., by helping the user to achieve a desired outcome with required inputs, and reducing user mistakes when interacting with/operating the device, without unduly interfering with the user's normal usage of the device and distracting the user from a task at hand), which, additionally, reduces power usage and improves the battery life of the device (e.g., by helping the user to use the device more quickly and efficiently).

In some embodiments, the device disables (698) at least a subset of functionalities of the respective application (and, optionally, the operating system of the device) while displaying the first visual prompt. For example, after an upgrade, the first time that an application is opened, the application user interface is covered with a dark layer overlaid with a textual and/or graphical prompt regarding the gesture for displaying the application-switcher user interface and/or the home screen, and the user interface does not respond to touch-inputs while the textual and/or graphical prompt is displayed. Disabling some functionalities when providing the visual prompt regarding the home-display gesture or the application-switcher-display gesture enhances the operability of the device and makes the user-device interaction more efficient (e.g., by helping to focus the user's attention on the new feature of the device, helping the user to learn how to display the application-switcher user interface and/or the home screen with required inputs, and reducing user mistakes when interacting with/operating the device), which, additionally, reduces power usage and improves the battery life of the device (e.g., by helping the user to use the device more quickly and efficiently).

In some embodiments, in accordance with a determination that prompt-removal criteria are met, wherein the prompt-removal criteria include a criterion that is met when a threshold amount of time has elapsed since initial display of the first visual prompt, the device ceases (699) to display the first visual prompt and the device enables (699) the subset of functionalities of the respective application that have been disabled. In some embodiments, the disabled functions of the respective application are enabled when the user performs a required gesture (e.g., the upward swipe from the bottom edge of the display) at least once. Ceasing to display the visual prompt and re-enabling the disabled functionalities after a period of time enhances the operability of the device and makes the user-device interaction more efficient (e.g., by helping to focus the user's attention on the new feature of the device, helping the user to learn how to display the application-switcher user interface and/or the home screen with required inputs, without unduly interfering with the user's normal usage of the device), which, additionally, reduces power usage and improves the battery life of the device (e.g., by helping the user to use the device more quickly and efficiently).

It should be understood that the particular order in which the operations in FIGS. 6A-6L have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1050, 1100, 1200, 1300, 1400, 1500, 1600, 1800, and 1900) are also applicable in an analogous manner to method 600 described above with respect to FIGS. 6A-6L. For example, the contacts, gestures, user interface objects, application views, control panels, controls, position thresholds, directional conditions, navigation criteria, movement parameters, thresholds, determinations, focus selectors, and/or animations described above with reference to method 600 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 700, 800, 900, 1000, 1050, 1100, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6L are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7F are flow diagrams illustrating a method 700 of navigating to a home screen user interface or a recently open application in response to a navigation gesture, in accordance with some embodiments. The method 700 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

Method 700 relates to transitioning from display of a first application to display of a second application or the home screen user interface in response to a swipe gesture that meets different directional conditions. Allowing the user to either to go to another application (e.g., a last displayed application) or the home screen depending on whether certain preset directional conditions are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

Method 700 is performed at a device having a display and a touch-sensitive surface (e.g., a touch-screen display that serves both as the display and the touch-sensitive surface) In some embodiments, the device does not have a home button (e.g., a mechanical button, a virtual button, a solid state button, etc.) that, when activated, is configured to dismiss a currently displayed user interface and replace the currently displayed user interface with a home screen that includes a plurality of application launch icons for a plurality of applications installed on the device). The device displays (702) a first user interface of a first application on the display (the first user interface is distinct from an application-switcher user interface or a home screen user interface). While displaying the first user interface of the first application on the display, the device detects (704) an input by a first contact, including detecting the first contact on the touch-sensitive surface, detecting first movement of the first contact across the touch-sensitive surface, and detecting liftoff of the first contact at an end of the first movement (e.g., detecting the first contact at an initial touch-down location that is within a predefined region of the device in proximity to the edge of the display (e.g., an edge region that includes a predefined portion (e.g., 20 pixel wide) of the display near the bottom edge of the device and optionally, a portion of the bottom edge of the display outside of the display)) (e.g., detecting the first portion of the input further includes detecting initial movement of the first contact (e.g., horizontal movement, arc movement, or vertical movement of the first contact across the touch-sensitive surface)) (e.g., detecting the first portion of the input further includes detecting liftoff of the first contact after the horizontal movement, arc movement, or vertical movement). In response to detecting the input by the first contact: in accordance with a determination that the input meets last-application-display criteria, wherein the last-application-display criteria require that the first movement meets a first directional condition (e.g., is, rightward, and substantially horizontal without any reverse movement) in order for the last-application-display criteria to be met (e.g., the last-application-display criteria require that the first movement is substantially horizontal relative to the bottom edge of the display and moving rightward immediately before lift-off of the first contact), the device displays (706) a second user interface of a second application that is distinct from the first application (e.g., the second application is the last application that the user had interacted with before having switched to the first application), the second user interface of the second application is displayed without first displaying the home screen user interface or the application-switcher user interface; and in accordance with a determination that the input meets home-display criteria, wherein the home-display criteria require that the first movement meets a second directional condition that is distinct from the first directional condition in order for the home-display criteria to be met (e.g., the home display criteria require that the first movement is substantially vertical relative to the bottom edge of the display and moving away from the bottom edge of the display immediately before lift-off of the first contact), the device displays a home screen user interface that includes a plurality of application launch icons that correspond to a plurality of applications installed on the device In some embodiments, the home screen user interface is displayed without displaying the second user interface of the second application. This is illustrated, for example, in FIGS. 5A19-5A25, where an upward swipe gesture by contact 5040 that started from the bottom edge of the touch-screen causes display of the home screen user interface after the termination of the swipe gesture; and in FIGS. 5A34-5A36, where a rightward swipe gesture by contact 5052 that started from the bottom edge of the display causes display of a recently displayed application (e.g., a web browser application) after the termination of the swipe gesture.

In some embodiments, the first contact is detected (708) within a predefined edge region of the touch-sensitive surface (e.g., detecting the first contact at an initial touch-down location that is within a predefined region of the device in proximity to the bottom edge of the display), and an initial portion of the first movement includes movement in a vertical direction (e.g., upward) and movement in a horizontal direction (e.g., rightward) relative to a predefined edge (e.g., bottom edge) of the touch-sensitive surface. This is illustrated, for example, in FIGS. 5A34-5A36, where the rightward swipe gesture by contact 5052 includes an initial vertical upward component along with the horizontal rightward component. In some embodiments, the movement of contact 5040 in FIGS. 5A29-5A25 does not have to be completely vertical, and can include a small horizontal component along with the vertical component in order to cause display of the home screen user interface, as long as the movement of contact 5040 does not cause the position of card 5022 (e.g., actual or projected) to end up outside a predefined central region of the display (e.g., between 30 degrees and 150 degrees angle above the bottom edge of the touch-screen). In some embodiments, the initial portion of the first movement includes the movement in the vertical direction followed by the movement in the horizontal direction. In some embodiments, the initial portion of the first movement includes the movement in the vertical direction concurrent with the movement in the horizontal direction. Requiring an arc swipe gesture (e.g., a gesture with an initial portion of the first movement includes movement in a vertical direction and movement in a horizontal direction relative to a predefined edge of the touch-sensitive surface) that starts from a predefined region of the touch-sensitive surface (e.g., from a bottom edge region of the touch-sensitive surface) to go to either another application (e.g., a last displayed application) or the home screen enhances the operability of the device and makes the user-device interaction more efficient (e.g., by avoiding accidentally activating an operation, thereby reducing user mistakes when operating/interacting with the device), which, additionally, reduce power usage and improve the battery life of the device (e.g., by helping the user to use the device more quickly and efficiently).

In some embodiments, in response to detecting the input by the first contact: in accordance with a determination that the input meets application-switcher-display criteria that are distinct from the home-display criteria and the last-application-display criteria, wherein the application-switcher-display criteria require that the first movement meets the second directional condition (e.g., first movement is upward) in order for the application-switcher-display criteria to be met, the device displays (710) an application-switcher user interface that includes a first application view that corresponds to the first user interface of the first application (e.g., a snapshot or live view of a current state of the first application) and a second application view that corresponds to a second user interface of a second application that is different from the first application (e.g., a snapshot or live view of a current state of the second application) (e.g., the second user interface is a user interface of a recently open application). This is illustrated, for example, in FIGS. 5A1-5A8, where an upward swipe gesture by contact 5004 from the bottom edge of the touch-screen causes the application-switcher user interface to be displayed after the termination of the swipe gesture. In some embodiments, the application-switcher user interface includes the application views of three or more application views that correspond to different recently open applications. In some embodiments, recently open applications refer to applications with retained state information, such that when a recently open application is brought to the foreground and reactivated, it will resume functioning from its retained state. In contrast, a closed application does not have a retained state, and when the closed application is opened, it starts from a default start state. In some embodiments, the recently open applications are stored in an application stack in accordance with the order by which they were last displayed/accessed, e.g., with the currently displayed application at the top application in the application stack. In some embodiments, a representation of a control panel user interface is displayed on top of the application stack. Allowing the user to either to go to the home screen or the application-switcher user interface when the gesture meets the same directional condition enhances the operability of the device and makes the user-device interaction more efficient (e.g., by reducing the number of steps that are needed to achieve an intended outcome when operating the device, and allowing the user to adjust an input to go to different user interfaces based on criteria other than direction of the input), which, additionally, reduce power usage and improve the battery life of the device (e.g., by helping the user to use the device more quickly and efficiently).

In some embodiments, the application-switcher-display criteria include (712) a first criterion that is met when the first movement includes a predefined pause (e.g., a reduction in speed of the first contact by a threshold amount within a threshold amount of time, or a reduction in speed of the first contact below a threshold speed while moving upward from the bottom edge) and the first contact makes less than a first threshold amount of movement after the predefined pause (e.g., lift-off of the first contact occurs immediately after the pause is detected). This is illustrated, for example, in FIGS. 5A1-5A8, where the application-switcher user interface is displayed in response to an upward swipe gesture by contact 5004 that started from the bottom edge of the touch-screen; and in some embodiments, a predefined pause is required in the upward movement of contact 5004 in order for the upward swipe gesture to meet the application-switcher-display criteria and cause the device to display the application-switcher user interface after the termination of the swipe gesture. In some embodiments, if the first contact continues to move upward after the pause, the device displays the home screen user interface after lift-off of the first contact. When the gesture meets the same directional condition, allowing the user to either to go to the home screen or the application-switcher user interface based on whether a predefined pause is detected during the movement of the contact enhances the operability of the device and makes the user-device interaction more efficient (e.g., by reducing the number of steps that are needed to achieve an intended outcome when operating the device, and allowing the user to adjust an input to go to different user interfaces based on criteria other than direction of the input), which, additionally, reduce power usage and improve the battery life of the device (e.g., by helping the user to use the device more quickly and efficiently).

In some embodiments, the application-switcher-display criteria include (714) a second criterion that is met when a predefined movement parameter of the first movement is in a first value range (e.g., the average or final speed of the first contact is less than a first threshold speed, and/or the final vertical position of the first contact is between one eighth of the screen height and three quarters of the screen height from the bottom edge of the display). The home-display criteria include a third criterion that is met when the predefined movement parameter of the first movement is in a second value range that is different from the first value range (e.g., the average or final speed of the first contact is greater than the first threshold speed, and/or the final vertical position below one eighth of the screen height or above three quarters of the screen height from the bottom edge of the display). For example, in some embodiments, a fast upward swipe causes the home screen to be displayed, while a slow upward swipe causes the application-switcher user interface to be displayed. In some embodiments, a short upward swipe and a long upward swipe cause the home screen displayed, while a medium length upward swipe causes the application-switcher user interface to be displayed. This is illustrated, for example, in FIGS. 5A1-5A8, where the application-switcher user interface is displayed in response to an upward swipe gesture by contact 5004 that started from the bottom edge of the touch-screen, and in FIGS. 5A19-5A25, where the home screen user interface is displayed in response to an upward swipe gesture by contact 5046 that started from the bottom edge of the touch-screen; and in some embodiments, the device displays the application-switcher user interface when the lift-off of contact 5004 is detected within a medium height range of the display, and displays the home screen user interface when the lift-off of contact 5046 is detected below the medium height range or above the medium height range of the display. When the gesture meets the same directional condition, allowing the user to either to go to the home screen or the application-switcher user interface based on whether a predefined movement parameter of the input is in a first range or a second range enhances the operability of the device and makes the user-device interaction more efficient (e.g., by reducing the number of steps that are needed to achieve an intended outcome when operating the device, and allowing the user to adjust an input to go to different user interfaces based on criteria other than direction of the input), which, additionally, reduce power usage and improve the battery life of the device (e.g., by helping the user to use the device more quickly and efficiently).

In some embodiments, the application-switcher-display criteria include (716) a criterion that is met when lateral movement and vertical movement of the first contact during the first movement (e.g., speed and curvature of the first movement) meet a first requirement (e.g., the first requirement is met when a ratio between the characteristic vertical speed (e.g., average speed or speed upon lift-off) and the characteristic horizontal speed (e.g., average speed or speed upon lift-off) of the first contact is within a first value range (e.g., greater than 0.7)). The last-application-display criteria include a criterion that is met when the lateral movement and the vertical movement of the first contact during the first movement meet a second requirement that is different from the first requirement (e.g., the second requirement is met when a ratio between the characteristic vertical speed and the characteristic horizontal speed of the first contact is within a second value range (e.g., less than or equal to 0.7)). For example, a swipe gesture in a direction that is more than a 30 degree angle above the bottom edge of the touch-screen leads to display of the application-switcher user interface, while a swipe gesture in a direction that is less than a 30 degree angle above the bottom edge of the touch-screen leads to display of a previous application (e.g., the second user interface of the second application). In some embodiments, an up-and-right arc swipe gesture that includes a downward movement immediately before lift-off of the first contact causes display of the previous application if the direction of the movement before lift-off is less than a 30 degree angle below the bottom edge of the display; and the device redisplays the first user interface, if the movement before lift-off is more than a 30 degree angle below the bottom edge of the display. This is illustrated, for example, in FIGS. 5A1-5A8, where the application-switcher user interface is displayed in response to an upward swipe gesture by contact 5004 that started from the bottom edge of the touch-screen, and in FIGS. 5A34-5A36, where a recently open application is displayed in response to a rightward swipe gesture by contact 5052 that also has an upward component that started from the bottom edge of the touch-screen; and in some embodiments, the device displays the application-switcher user interface when a ratio between the characteristic vertical speed of contact 5052 and the characteristic horizontal speed of contact 5052 is less than or equal to 0.7, and displays the recently open application when the ratio is greater than 0.7 for example. lift-off of contact 5046 is detected below the medium height range or above the medium height range of the display. Allowing the user to either to go to the last application or the application-switcher user interface based on relative curvature of the movement and/or speed of the movement in the horizontal direction and the vertical direction enhances the operability of the device and makes the user-device interaction more efficient (e.g., by reducing the number of steps that are needed to achieve an intended outcome when operating the device, and allowing the user to adjust an input to go to different user interfaces after the input has been started), which, additionally, reduce power usage and improve the battery life of the device (e.g., by helping the user to use the device more quickly and efficiently).

In some embodiments, before displaying the application-switcher user interface, the device displays (718) the first application view (e.g., among a plurality of application views including the second application view for the second application) in accordance with a determination that the first movement meets the second directional condition (e.g., the first movement includes upward movement). The device moves the first application view in accordance with movement of the first movement of the first contact (e.g., the first application view is dragged across the display in accordance with the first movement of the first contact). This is illustrated, for example, in FIGS. 5A2-5A5, where first application view (e.g., card 5010) is displayed in response to the upward movement of contact 5004. In some embodiments, concurrently with the first application view, the device displays a second application view corresponding to the second application and a control panel view corresponding to a control panel user interface. This is illustrated, for example, in FIGS. 5A6, where, in response to detecting the upward movement of contact 5004, a second application view (e.g., card 5014) and control panel view (e.g., card 5016) are displayed concurrently with the first application view (e.g., card 5012) before the application-switcher user interface is displayed in FIGS. 5A7 and 5A8. In some embodiments, when the upward movement of the first contact continues, the application views and the control panel view shrink in accordance with the current positions of the application views and the control panel view; and when the home-display criteria are met, an animation is displayed showing the application views move toward and morph into their respective application icons on the home screen user interface. Displaying the first application view and moving the first application view in accordance with the movement of the contact before the application-switcher-display criteria are met enhances the operability of the device and makes the user-device interaction more efficient (e.g., by providing real-time information about the internal state of the device, and helping the user to achieve a desired outcome with the required inputs, and reducing user mistakes when operating/interacting with the device), which, additionally, reduces power usage and improves the battery life of the device (e.g., by helping the user to use the device more quickly and efficiently).

In some embodiments, the application-switcher-display criteria include (720) a criterion that is met when a predefined projected position of the first application view (e.g., projected position of the bottom center of the first application view) after lift-off of the first contact (e.g., the projected position is calculated in accordance with speed and position of the first application view at lift-off of the first contact) is in a first predefined region of the display (e.g., a line linking the initial position of the first application view and the projected position of the first application view 150 ms after lift-off of the first contact is greater than 30 degrees and less than 150 degrees above the bottom edge of the display). The last-application-display criteria include a criterion that is met when the predefined projected position of the first application view after lift-off of the first contact is in a second predefined region of the display that is distinct from the first predefined region (e.g., a line linking the initial position of the first application view and the projected position of the first application view 150 ms after lift-off of the first contact is greater than 150 degrees above the bottom edge of the display (e.g., the projected position is in the lower right portion of the display)). For example, the first contact drags the first application view in accordance with the first contact's speed and trajectory before lift-off of the first contact, and the first application view acquires different starting positions and different starting momenta at the lift-off of the first contact depending on the differences in speed and trajectory during the different types of movement that were made by the first contact. Therefore, in some embodiments, the projected position of the first application view depends on both the final position and the final speed of the first application view at lift-off of the first contact, and optionally, momentum accumulated during the course of the movement of the first contact. Therefore, in some embodiments, different movement patterns of the first contact optionally leads to display of the application-switcher user interface, or the previous application, depending on the projected position of the first application view. This is illustrated, for example, in FIGS. 5A1-5A8, where the application-switcher user interface is displayed after lift-off of contact 5004; and in some embodiments, the application-switcher user interface is displayed in accordance with a determination that the projected position of card 5010 is within a first predefined region on the display (e.g., a line linking the initial position of card 5010 and the projected position of card 5010 150 ms after lift-off of contact 5004 is greater than 30 degrees and less than 150 degrees above the bottom edge of the display). This is further illustrated, for example, in FIGS. 5A34-5A36, where a recently open application (e.g., the web browser application) is displayed after lift-off of contact 5052; and in some embodiments, the recently open application is displayed in accordance with a determination that the projected position of card 5022 is within a second predefined region on the display (e.g., a line linking the initial position of the card 5022 and the projected position of card 5022 150 ms after lift-off of the contact 5052 is greater than 150 degrees above the bottom edge of the display (e.g., the projected position is in the lower right portion of the display). Displaying either the last application or the application-switcher user interface based on a projected position of the first application view after lift-off of the contact enhances the operability of the device and makes the user-device interaction more efficient (e.g., by taking into account of the cumulated momentum and position and speed of the first application view at lift-off of the first contact, thereby providing a more responsive user interface and less stringent requirement for achieving a desired outcome), which, additionally, reduces power usage and improves the battery life of the device (e.g., by helping the user to use the device more quickly and efficiently).

In some embodiments, in response to detecting the input by the first contact: in accordance with a determination that the input meets control-panel-display criteria, wherein the control-panel-display criteria include a criterion that is met when the first movement meets a third directional condition that is different from the first directional condition and the second directional condition (e.g., the third directional condition requires the first movement to be leftward, and substantially horizontal without any reverse movement) in order for the third directional condition to be met, the device displays (722) a control panel user interface that includes a plurality of controls that correspond to a plurality of system functions of the device (e.g., a control panel user interface with controls for network connections, display brightness, audio playback, peripheral devices, etc.). This is illustrated, for example, in FIGS. 5A58-5A60, where, in response to a leftward swipe gesture by contact 5074 that started from the bottom edge of the touch-screen, the control panel user interface is displayed after lift-off of contact 5074. Displaying the control panel user interface, or the home screen user interface, or the last application based on the swipe gesture meeting different directional conditions enhances the operability of the device and makes the user-device interaction more efficient (e.g., by reducing the number of steps needed to achieve a desired outcome, and reducing user mistakes when operating/interacting with the device), which, additionally, reduces power usage and improves the battery life of the device (e.g., by helping the user to use the device more quickly and efficiently).

In some embodiments, the control-panel-display criteria include (724) a criterion that is met when the predefined projected position of the first application view (e.g., projected position of the bottom center of the first application view) after lift-off of the first contact (e.g., the projected position is calculated in accordance with speed and position of the first application view at lift-off of the first contact) is in a third predefined region of the display that is distinct from the first predefined region and the second predefined region (e.g., a line linking the initial position of the first application view and the projected position of the first application view 150 ms after lift-off of the first contact is less than 30 degrees above the bottom edge of the display (e.g., the projected position is in the lower left portion of the display)). Displaying the control panel user interface, or the home screen user interface, or the last application based on the projected position of the first application view being within different predefined regions on the display enhances the operability of the device and makes the user-device interaction more efficient (e.g., by taking into account of the cumulated momentum and position and speed of the first application view at lift-off of the first contact, thereby providing a more responsive user interface and less stringent requirement for achieving a desired outcome), which, additionally, reduces power usage and improves the battery life of the device (e.g., by helping the user to use the device more quickly and efficiently).

In some embodiments, while displaying the second user interface of the second application in response to detecting the input by the first contact, the device detects (726) a second input by a second contact, including detecting the second contact on the touch-sensitive surface, detecting second movement of the second contact across the touch-sensitive surface, and detecting liftoff of the second contact at an end of the second movement. In response to detecting the second input: in accordance with a determination that the second input meets the last-application-display criteria, the device redisplays the first user interface or displays a third user interface of a third application that is distinct from the first application and the second application. This is illustrated, for example, in FIGS. 5A40-5A45, two consecutive rightward swipe gestures in the bottom edge region causes the device to switch from a currently displayed application (e.g., the web browser application) to a last displayed application (e.g., the email application in FIG. 5A43), and then to another application (e.g., the messages application in FIG. 5A45) that is displayed before the last displayed application. In some embodiments, if the second rightward swipe gesture is detected after a threshold amount of time of the first rightward swipe gesture, the application stack is resorted, and the initially displayed application (e.g., the web browser application) is redisplayed in response to the second rightward swipe gesture. In some embodiments, in response to multiple consecutive horizontal swipes near the bottom edge of the touch-screen, the device displays the next applications in the application stack one by one. Switching to a different user interface in an application stack in response to a swipe gesture that meets the last-application-display criteria enhances the operability of the device and makes the user-device interaction more efficient (e.g., by reducing the number of steps needed to achieve a desired outcome), which, additionally, reduces power usage and improves the battery life of the device (e.g., by helping the user to use the device more quickly and efficiently).

In some embodiments, in accordance with a determination that resorting criteria are met, wherein the resorting criteria include a criterion that is met when a threshold amount of time has elapsed between detection of the second contact and lift-off of the first contact, the first user interface is redisplayed (728) in response to the second input. For example, after the application stack is resorted, the second application becomes the top application, and the first application is below the second application in the application stack, so when the last-application-display criteria are met by the second input, the first application is redisplayed. In accordance with a determination that the resorting criteria are not met, the third user interface is displayed in response to the second input. For example, when the application stack is not resorted, the first application remains the top application, and the second application is below the first application in the application stack, so when the last-application-display criteria are met by the second input, a third application that is below the second application in the application stack is displayed. This is illustrated, for example, in FIGS. 5A40-5A45, two consecutive rightward swipe gestures in the bottom edge region causes the device to switch from a currently displayed application (e.g., the web browser application) to a last displayed application (e.g., the email application in FIG. 5A43), and then to another application (e.g., the messages application in FIG. 5A45) that is displayed before the last displayed application. In some embodiments, if the second rightward swipe gesture is detected after a threshold amount of time of the first rightward swipe gesture, the application stack is resorted, and the initially displayed application (e.g., the web browser application) is redisplayed in response to the second rightward swipe gesture. Allowing resorting of the applications in the application stack during multiple consecutive swipe gestures enhances the operability of the device and makes the user-device interaction more efficient (e.g., by reducing the number of steps needed to return to a previous user interface of the user's choice based on whether a pause is detected between two consecutive swipe gestures), which, additionally, reduces power usage and improves the battery life of the device (e.g., by helping the user to use the device more quickly and efficiently).

In some embodiments, in response to detecting the second input: in accordance with a determination that the second movement meets a third directional condition that is a reverse of the first directional condition (e.g., the second movement is leftward, and substantially horizontal without any reversal movement): in accordance with a determination that the resorting criteria are met, the device displays (730) a control panel user interface that includes a plurality of controls that correspond to a plurality of system functions of the device (e.g., a control panel user interface with controls for network connections, display brightness, audio playback, peripheral devices, etc.). For example, when the application stack is resorted, the second application becomes the top application in the application stack; and when a reverse horizontal swipe is detected, the control panel user interface is displayed. In response to detecting the second input and in accordance with a determination that the second movement meets the third directional condition that is a reverse of the first directional condition, in accordance with a determination that the resorting criteria are not met, the device redisplays the first user interface. For example, when the application stack is not resorted, the second application remains below the first application in the application stack; and when a reverse swipe is detected, the first user interface is redisplayed. This is illustrated, for example, in FIGS. 5A43-5A48, where an initial rightward swipe by contact 5064 causes the device to switch from the email application to the messages application (e.g., in FIG. 5A53-5A55), and a leftward swipe by contact 5065 following the initial rightward swipe by contact 5064 causes the device to return to the email application (e.g., in FIGS. 5A46-5A48). This is further illustrated, for example, in FIGS. 5A49-5A51 and 5A57-5A59, where an initial rightward swipe by contact 5069 causes the device to switch from the email application to the messages application, and a leftward swipe by contact 5074 causes the device to switch from the message application to the control panel user interface. Allowing resorting of the applications in the application stack during multiple consecutive swipe gestures, and displaying different user interfaces based on whether a pause has been detected between two consecutive swipe gestures enhances the operability of the device and makes the user-device interaction more efficient (e.g., by reducing the number of steps needed to return to a previous user interface or to go to the control panel user interface), which, additionally, reduces power usage and improves the battery life of the device (e.g., by helping the user to use the device more quickly and efficiently).

In some embodiments, in response to detecting the first movement by the first contact: the device concurrently displays (732) at least a portion of the first user interface and a portion of the second user interface in a first display layer during at least a portion of the first movement of the first contact; and the device displays the home screen user interface in a second display layer that is below the first display layer. For example, in response to a rightward swipe input or an up-and-right arc swipe near the bottom edge of the touch-screen, the first user interface shifts rightward, and the second user interface slides in from the left. In some embodiments, a portion of the home screen user interface is visible between a gap between the first user interface and the second user interface, as the first user interface and the second user interface slide rightward on the display in accordance with the movement of the first contact across the touch-sensitive surface. This is illustrated, for example, in FIGS. 5A35 and 5A41, where home screen user interface is displayed in a layer underlying card 5010 and 5022. Displaying the home screen user interface as a background layer below two application user interfaces enhances the operability of the device and makes the user-device interaction more efficient (e.g., by providing visual feedback to inform the user of the internal state of the device, and reducing user mistakes when operating the device), which, additionally, reduces power usage and improves the battery life of the device (e.g., by helping the user to use the device more quickly and efficiently).

In some embodiments, while displaying the second user interface of the second application in response to detecting the input by the first contact, the device detects (734) a third input by a third contact, including detecting the third contact on the touch-sensitive surface, detecting third movement of the third contact across the touch-sensitive surface, and detecting liftoff of the third contact at an end of the third movement. In response to detecting the third input: in accordance with a determination that the first user interface is of a first orientation (e.g., portrait orientation) and the second user interface is of a second orientation (e.g., landscape orientation) that is different from the first orientation, and that the third movement meet modified-last-application-display criteria, wherein the modified-last-application-display criteria require that the third movement meets either the first directional condition or a reversed second directional condition (e.g., the third input is either a rightward, horizontal swipe near the bottom edge of the display, or a downward swipe near the left edge of the display that corresponds to a swipe along an edge of the touch-sensitive display that corresponds to a bottom of the application in the landscape orientation)) in order for the modified-last-application-display criteria to be met: the device displays a user interface for a respective application that is below the second application in an application stack of the device. For example, when a change in user interface orientation in detected when the user is swiping through the stack of open applications, the device allows the user to continue to use swipes in the same direction to switch to the next applications in the application stack, or use a swipe that is a "true" rightward swipe in relation to the orientation of the currently displayed user interface to switch to the next application in the application stack. Allowing the last-application-display criteria to be met based on multiple alternative directional conditions when there is a switch of user interface orientation during an application-switching process enhances the operability of the device and makes the user-device interaction more efficient (e.g., by reducing the number of steps needed to return to a previous user interface of the user's choice, and allowing the user to achieve a desired outcome with required inputs in a faster or more convenient manner), which, additionally, reduces power usage and improves the battery life of the device (e.g., by helping the user to use the device more quickly and efficiently).

In some embodiments, in response to detecting the third input: in accordance with a determination that the first user interface is of the first orientation (e.g., portrait orientation) and the second user interface is of the second orientation (e.g., landscape orientation) that is different from the first orientation, and that the third movement meet modified-home-display criteria, wherein the modified-home-display criteria require that the third movement meet either the first directional condition or the second directional condition (e.g., the third input is either a rightward, horizontal swipe across the middle of the display (e.g., a swipe that starts from an edge that corresponds to a bottom of the application in the landscape orientation), or an upward swipe from the bottom edge of the display) in order for the modified-home-display criteria to be met: the device displays (736) the home screen user interface. For example, when a change in user interface orientation in detected when the user is swiping through the stack of open applications, the device allows the user to swipe "up" to go to the home screen both relative to the orientation of the first user interface and relative to the orientation of the currently displayed user interface. Allowing the home-display criteria to be met based on multiple alternative directional conditions when there is a switch of user interface orientation during an application-switching process enhances the operability of the device and makes the user-device interaction more efficient (e.g., by reducing the number of steps needed to return to the home screen, and allowing the user to achieve a desired outcome with required inputs in a faster or more convenient manner), which, additionally, reduces power usage and improves the battery life of the device (e.g., by helping the user to use the device more quickly and efficiently).

In some embodiments, the device forgoes (738) applying the modified-last-application-display criteria and the modified-home-display criteria to the third input in accordance with a determination that the third input is detected after a threshold amount of time of termination of the first input. For example, the modified-last-application-display criteria and the modified-home-display criteria are only temporarily used for a short period of time after the change in user interface orientation is detected. After the short period of time, the "bottom edge" of the display is redefined based on the orientation of the currently displayed user interface, and the first directional condition in the last-application-display criteria and the second directional condition in the home-display criteria are based on the newly defined "bottom edge". Making the alternative directional conditions only temporary after there is a switch of user interface orientation during an application-switching process enhances the operability of the device and makes the user-device interaction more efficient (e.g., by making the user interface response more consistent and reducing user mistakes when operating the device), which, additionally, reduces power usage and improves the battery life of the device (e.g., by helping the user to use the device more quickly and efficiently).

It should be understood that the particular order in which the operations in FIGS. 7A-7F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, 1000, 1050, 1100, 1200, 1300, 1400, 1500, 1600, 1800, and 1900) are also applicable in an analogous manner to method 700 described above with respect to FIGS. 7A-7F. For example, the contacts, gestures, user interface objects, application views, control panels, controls, position thresholds, directional conditions, navigation criteria, movement parameters, thresholds, determinations, focus selectors, and/or animations described above with reference to method 700 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 800, 900, 1000, 1050, 1100, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7F are, optionally, implemented by components depicted in FIGS. 1A-1B. For example, detection operation 704 and display operation 706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8E are flow diagrams illustrating a method 800 of navigating to a control panel user interface or a recently open application in response to a navigation gesture, in accordance with some embodiments. The method 800 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

Method 800 relates to transitioning from display of a first application to display of a second application or the control panel user interface in response to a swipe gesture that meets different directional conditions and the edge-swipe criteria. In addition, the device performs an operation within the application if the swipe gesture does not meet the edge-swipe criteria. Allowing the user to either to go to another application (e.g., a last displayed application) or the control panel user interface, or to perform an operation within the application depending on whether certain preset directional conditions and edge-swipe criteria are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

Method 800 is performed at a device having a display and a touch-sensitive surface (e.g., a touch-screen display that serves both as the display and the touch-sensitive surface). In some embodiments, the device does not have a home button (e.g., a mechanical button, a virtual button, a solid state button, etc.) that, when activated, is configured to dismiss a currently displayed user interface and replace the currently displayed user interface with a home screen that includes a plurality of application launch icons for a plurality of applications installed on the device. The device displays (802) a first user interface of a first application on the display (the first user interface is distinct from an application-switcher user interface or a home screen user interface). While displaying the first user interface of the first application on the display, the device detects (804) an input by a first contact, including detecting the first contact on the touch-sensitive surface, detecting first movement of the first contact across the touch-sensitive surface, and detecting liftoff of the first contact at an end of the first movement (e.g., detecting the first contact at an initial touch-down location that is within a predefined region of the device in proximity to the edge of the display (e.g., an edge region that includes a predefined small portion (e.g., 20 pixel wide) of the display near the bottom edge of the device and optionally, a portion of the bottom edge of the display outside of the display)) (e.g., detecting initial movement of the first contact (e.g., horizontal movement, arc movement, or vertical movement of the first contact across the touch-sensitive surface)) (e.g., detecting liftoff of the first contact after the horizontal movement, arc movement, or vertical movement). In response to detecting the input by the first contact: in accordance with a determination that the input meets edge-swipe criteria (e.g., the edge swipe criteria require that the first movement is within a predefined edge region that is proximate to a bottom edge of the display) and that the first movement meets a first directional condition (e.g., the first directional condition requires that the first movement is substantially horizontal relative to the bottom edge of the display and moving rightward immediately before lift-off of the first contact), the device displays (806) a second user interface of a second application that is distinct from the first application (e.g., the first user interface of the first application ceases to be displayed on the display); in accordance with a determination that the input meets the edge-swipe criteria and that the first movement meets a second directional condition that is distinct from the first directional condition (e.g., the second directional condition requires that the first movement is substantially horizontal relative to the bottom edge of the display and moving leftward immediately before lift-off of the first contact), the device displays a control panel user interface that includes a plurality of controls that correspond to a plurality of system functions of the device (e.g., a control panel user interface with controls for network connections, display brightness, audio playback, peripheral devices, etc.). In some embodiments, the control panel user interface is overlaid on the first user interface of the first application. In response to detecting the input by the third contact and in accordance with a determination that the input does not meet the edge-swipe criteria: the device forgoes displaying the second user interface of the second application; the device forgoes displaying the control panel user interface; and the device performs a function within the first application in accordance with the first movement of the first contact (e.g., scrolling the first user interface, or dragging an object within the first user interface, or revealing a hidden object in the first user interface, switching to a new user interface within the first application, etc., with the movement of the first contact). This is illustrated, for example, in FIGS. 5A34-5A36, where a rightward swipe in the bottom edge region of the touch-screen by contact 5052 causes a current displayed application (e.g., user interface of the email application) to switch to a last displayed application (e.g., a web browser application). This is further illustrated in FIGS. 5A31-5A36, where a swipe gesture across email preview 5049-*e* causes the corresponding email and email preview to marked as read, for example. This is further illustrated in FIGS. 5A57-5A59, where a leftward swipe in the bottom edge region of the touch-screen by contact 5074 causes a control panel user interface to be overlaid on top of a currently displayed application (e.g., user interface of a messages application), for example.

In some embodiments, performing a function within the first application in accordance with the first movement of the first contact includes (808): in accordance with a determination that the first movement is in a first direction, performing a first function (e.g., the first function is scrolling upward, when the first movement is in an upward direction; or the first function is archiving or deleting a message, when the first movement is a rightward swipe on the message); and in accordance with a determination that the first movement is in a second direction that is distinct from the first function, performing a second function that is distinct from the second function (e.g., the second function is scrolling downward, when the first movement is in a downward direction; or the second function is marking the message as unread or displaying a menu of selectable options related to the message, when the first movement is a leftward swipe on the message). This is illustrated, for example, in FIGS. 5A31-5A36, where a rightward swipe gesture across email preview 5049-*e* causes the corresponding email and email preview to marked as read, for example. A different function would be performed (e.g., deletion) if the swipe gesture were leftward. Performing different operations within the application depending on the direction of the swipe gesture enhances the operability of the device and makes the user-device interaction more efficient (e.g., by providing additional functions without cluttering up the display with additional controls, and reducing the number of steps that are needed to achieve an intended outcome when operating the device), which, additionally, reduces power usage and improves the battery life of the device (e.g., by helping the user to use the device more quickly and efficiently).

In some embodiments, the edge swipe criteria require (810) that, prior to the first movement of the first contact that meet either the first directional condition or the second directional condition: the first contact is detected within a predefined edge region of the touch-sensitive surface (e.g., detecting the first contact at an initial touch-down location that is within a predefined region of the device in proximity to the bottom edge of the display); and an initial movement of the first contact meets a third directional condition that is different from the first directional condition and the second directional condition (e.g., the third directional condition requires that the first contact moves upward (e.g., moving upward beyond the predefined edge region of the touch-sensitive surface) after being detected in the predefined edge region of the touch-sensitive surface) in order for the edge swipe criteria to be met. This is further illustrated in FIGS. 5A34-5A35 and 5A58-5A59, where the swipe gestures by contacts 5060 and 5074 include a upward component in addition to the leftward or rightward component, for example. In some embodiments, the edge swipe criteria are met when the device detects an upward swipe that starts from the bottom edge of the touch-screen and continues leftward or rightward across the touch-screen before liftoff of the first contact (e.g., the movement of the first contact forming the first half of an arc). In some embodiments, the edge swipe criteria are met when the device detects an upward swipe that starts from the bottom edge region of the touch-screen and continues leftward or rightward across the touch-screen, and then returns to the bottom edge region of the touch-screen before lift-off of the first contact (e.g., the movement of the first contact forming an arc). Requiring an initial portion of the swipe gesture to meet a third directional condition for the swipe gesture to meet edge-swipe criteria, and then meet the first or second directional condition to display either a last application or the control panel user interface enhances the operability of the device and makes the user-device interaction more efficient (e.g., by avoiding accidentally triggering the display of the last application or the control panel user interface, and reducing user mistakes when operating/interacting with the device), which, additionally, reduces power usage and improves the battery life of the device (e.g., by helping the user to use the device more quickly and efficiently).

In some embodiments, the edge swipe criteria include (812) a criterion that is met when the first contact reaches a first threshold position on the touch-sensitive surface during the first movement (e.g., an upward movement of the first contact on the touch-sensitive surface that corresponds to an upward movement of a focus selector on the display by one quarter of the height of the display). For example, in some embodiments, the edge swipe criteria are met when the first contact slowly moves upward (with or without simultaneous lateral movement) from the bottom edge of the touch-screen to at least one quarter of the height of the touch-screen from the bottom edge and then lift-off with or without an upward speed. This is illustrated, for example, in FIGS. 5A37-5A39, where navigation to a last application or the control panel user interface did not occur, and the currently displayed user interface remains displayed at the end of the gesture by contact 5056 because contact 5056 did not reach a threshold position on the touch-screen 112 and there was not enough lateral speed to meet other alternative criteria for displaying the last application or the control panel user interface. Requiring an initial portion of the swipe gesture to reach a threshold position for the swipe gesture to meet edge-swipe criteria, and then meet the first or second directional condition to display either a last application or the control panel user interface enhances the operability of the device and makes the user-device interaction more efficient (e.g., by avoiding accidentally triggering the display of the last application or the control panel user interface, and reducing user mistakes when operating/interacting with the device), which, additionally, reduces power usage and improves the battery life of the device (e.g., by helping the user to use the device more quickly and efficiently).

In some embodiments, the device displays (814) a first application view that corresponds to the first user interface (e.g., displaying a reduced scale image of the first user interface as a card overlaid on a background user interface (e.g., a home screen user interface)) in response to detecting an initial portion of the first movement of the first contact. The device changes a characteristic position of the first application view (e.g., the bottom center of the card that represents the first user interface) in accordance with the initial portion of the first movement of the first contact (e.g., dynamically adjusting an overall size of the card and an overall position of the card in accordance with the vertical location of the first contact on the touch-sensitive surface (e.g., the overall size and position of the card is adjusted based on a number of factors, one of which is the position and velocity of the contact)). This is illustrated, for example, in FIGS. 5A34-5A35, where card 5022 is a reduced scale image of the currently displayed user interface of the email application, and the device changes the position and size of card 5022 in accordance with the movement of contact 5052. Displaying a first application view and dynamically changing the appearance of the first application view during an initial portion of the swipe gesture enhances the operability of the device and makes the user-device interaction more efficient (e.g., by providing information about the internal state of the device, helping the user to achieve a desired outcome with required inputs, and reducing user mistakes when operating/interacting with the device), which, additionally, reduces power usage and improves the battery life of the device (e.g., by helping the user to use the device more quickly and efficiently).

In some embodiments, the edge swipe criteria include (816) a criterion that is met when a projected position of the first application view after liftoff of the first contact reaches a second threshold position on the touch-sensitive surface (e.g., the projected position of the card representing the first user interface at 150 ms after liftoff of the first contact is at least one quarter of the height of the display above the bottom edge of the display). For example, in some embodiments, after lift-off of the first contact is detected, the device calculates a projected position of the card that has been dragged by the first contact upward 150 ms into the future using a characteristic speed of the contact (or a characteristic speed of the card itself). If the projected position of the card at 150 ms after lift-off of the first contact is above one quarter of the display height from the bottom edge of the display, the edge swipe criteria are considered met. This is illustrated, for example, in FIG. 5A34-5A36, where projected position of card 5022 after lift-off of contact 5052 meets predefined threshold position, and in some embodiments, switching to the browser application is completed after lift-off of contact 5052 is detected based on the projected position of card 5022. Allowing the edge-swipe criteria to be met based on a projected position of the first application view enhances the operability of the device and makes the user-device interaction more efficient (e.g., by taking into account cumulated momentum of the first application view, and the final position and speed of the first application view at lift-off of the contact, thereby providing a more responsive user interface), which, additionally, reduces power usage and improves the battery life of the device (e.g., by helping the user to use the device more quickly and efficiently).

In some embodiments, the edge swipe criteria include (818) a criterion that is met when a movement speed of the first application view (or a representative portion of the first application view such as a bottom edge, a top edge, a center or some other portion of the first application view) in a first direction (e.g., horizontal speed) at lift-off of the first contact exceeds a first threshold speed (e.g., a threshold horizontal speed that is dynamically calculated based on the vertical speed of the first user interface object) on the display (e.g., the upward speed and/or the sideway speed of the card representing the first user interface at lift-off of the first contact each meet a respective threshold speed requirement). This is illustrated, for example, in FIG. 5A34-5A36, where velocity of card 5022 at lift-off of contact 5052 meets predefined threshold speed, and in some embodiments, switching to the browser application is completed after lift-off of contact 5052 is detected based on the velocity of card 5022 at lift-off of contact 5052. In some embodiments, upon detecting lift-off of the first contact, the device determines a current velocity of the card representing the first user interface. If the horizontal speed of the card is sufficiently great relative to the upward speed of the card, and the upward speed of the card does not exceed a predefined threshold speed (e.g., the card will end up in a lower side region of the display according to projection calculated based on the card's speed at lift-off of the contact), the edge swipe criteria are considered met. Allowing the edge-swipe criteria to be met based on a movement speed of the first application view at lift-off of the first contact enhances the operability of the device and makes the user-device interaction more efficient (e.g., by taking into account cumulated momentum of the first application view at lift-off of the contact, thereby providing a more responsive user interface), which, additionally, reduces power usage and improves the battery life of the device (e.g., by helping the user to use the device more quickly and efficiently).

In some embodiments, the device displays (820) a second application view that corresponds to the second user interface (e.g., displaying a reduced scale image of the second user interface as a card overlaid on a background user interface (e.g., a home screen user interface)) in response to detecting the initial portion of the first movement of the first contact. The device changes a representative portion of the second user interface object (e.g., a bottom edge, a top edge, a center or some other portion of the second user interface object) in accordance with the initial portion of the first movement of the first contact (e.g., dynamically adjusting an overall size of the card and an overall position of the card in accordance with the vertical location of the first contact on the touch-sensitive surface (e.g., the overall size and position of the card is adjusted based on a number of factors, one of which is the position and velocity of the contact)). This is illustrated, for example, in FIGS. 5A40-5A41, where the location and size of card 5022 (e.g., a reduced scale representation of a user interface of the email application) changes in accordance with the movement of contact 5060, as do the location and size of card 5010 (e.g., a reduced scale representation of a user interface of the web browser application). Displaying multiple application views during the initial portion of the swipe gesture and changing the appearance of the multiple application views based on the initial portion of the swipe gesture enhance the operability of the device and make the user-device interaction more efficient (e.g., by providing information regarding the internal state of the device, helping the user to achieve a desired outcome with required inputs, and reducing user mistakes when operating the device), which, additionally, reduce power usage and improve the battery life of the device (e.g., by helping the user to use the device more quickly and efficiently).

In some embodiments, the edge swipe criteria include (822) a criterion that is met when a characteristic speed of the first contact in a second direction (e.g., an upward speed of the contact immediately prior to lift-off of the first contact) does not exceed a second threshold speed. For example, in some embodiments, the edge swipe criteria are met when the swipe gesture by the first contact is not a quick upward swipe. This is illustrated, for example, in FIG. 5A34-5A36, where a characteristic upward speed of contact 5052 does not exceed a predefined threshold speed (e.g., the swipe is not a fast upward swipe), and in some embodiments, switching to the browser application is completed after lift-off of contact 5052 is detected based on the characteristic upward speed of contact 5052 being less than the threshold speed. Requiring that the characteristic speed of the first contact in the second direction does not exceed a predefined threshold speed enhances the operability of the device and makes the user-device interaction more efficient (e.g., by reserving the gesture with fast speed for other functions (e.g., display the application-switcher user interface or the home screen), and reducing user mistakes when operating the device), which, additionally, reduces power usage and improves the battery life of the device (e.g., by helping the user to use the device more quickly and efficiently).

In some embodiments, the edge swipe criteria include (824) a criterion that is met when a characteristic speed of the first contact in the first direction (e.g., a sideway speed of the contact immediately prior to lift-off of the first contact) exceeds a third threshold speed. For example, in some embodiments, the edge swipe criteria are met when the swipe gesture by the first contact is a quick sideway swipe. This is illustrated, for example, in FIG. 5A34-5A36, where a characteristic rightward speed of contact 5052 meets predefined threshold speed (e.g., the swipe is a fast rightward swipe), and in some embodiments, switching to the browser application is completed after lift-off of contact 5052 is detected based on the characteristic rightward speed of contact 5052. Allowing the edge swipe criteria to be met when the characteristic speed of the first contact exceeds a predefined threshold speed enhances the operability of the device and makes the user-device interaction more efficient (e.g., by reducing the number of steps required to achieve a desired outcome, and providing a faster and easier way to achieve a desired outcome), which, additionally, reduces power usage and improves the battery life of the device (e.g., by helping the user to use the device more quickly and efficiently).

In some embodiments, in response to detecting the input by the first contact: in accordance with a determination that the first movement of the first contact includes a pause (e.g., as indicated by a reduction of upward speed to below a threshold speed during the first movement that includes less than a threshold amount of movement for at least a threshold amount of time) before the first contact reaches a threshold position on the touch-sensitive surface (e.g., corresponding to a position of a focus selector at three quarters of the display height above the bottom edge of the display), the device displays (826) an application-switcher user interface (e.g., also referred to as a multitasking user interface) that includes a representation of the first user interface and respective representations of one or more other open applications (e.g., a multitasking user interface that includes a plurality of cards that are reduced scale images of the last seen user interfaces of different open applications). This is illustrated, for example, in FIGS. 5A1-5A8, where the application-switcher user interface is displayed after the upward swipe gesture by contact 5004, and in some embodiments, the application-switcher user interface is displayed because the upward movement of contact 5004 included a predefined pause. Displaying an application-switcher user interface when a pause is detected before the first contact reaches a threshold position on the touch-sensitive surface enhances the operability of the device and makes the user-device interaction more efficient (e.g., by reducing the number of steps required to achieve a desired outcome), which, additionally, reduces power usage and improves the battery life of the device (e.g., by helping the user to use the device more quickly and efficiently).

In some embodiments, while displaying the second user interface of the second application in response to the input by the first contact (e.g., displaying the user interface of a last active application in an open application stack in response to a rightward edge swipe), the device detects (828) a second input by a second contact, including detecting the second contact on the touch-sensitive surface, detecting second movement of the second contact across the touch-sensitive surface, and detecting liftoff of the second contact at an end of the second movement, wherein the second input meets the edge-swipe criteria. In response to detecting the second input by the second contact that meets the edge-swipe criteria: in accordance with a determination that the second movement meets the second directional condition (e.g., the second contact moves leftward across the touch-screen): in accordance with a determination that the second input is detected more than a threshold amount of time after termination of the input by the first contact (e.g., the second contact is detected more than a threshold amount of time after the liftoff of the first contact), the device displays the control panel user interface that includes a plurality of controls that correspond to a plurality of system functions of the device. This is illustrated, for example, in FIGS. 5A57-5A59, where after a threshold amount of time has elapsed since a previous rightward edge swipe gesture has caused switching from the email application to the messages application (e.g., in FIG. 5A48-5A51), the application stack is resorted, and a leftward edge swipe gesture by contact 5074 causes the messages application to switch to the control panel user interface. For example, after a pause between the first input and the second input, the open application stack is resorted and the second application is moved to the top of the stack above the first application, and the device replaces display of the second user interface of the second application with the control panel user interface in response to the second put. In response to detecting the second input by the second contact that meets the second directional condition and in accordance with a determination that the second movement meets the second directional condition, in accordance with a determination that the second input is detected no more than the threshold amount of time after the termination of the input by the first contact (e.g., the second contact is detected less than the threshold amount of time after the liftoff of the first contact), the device redisplays the first user interface of the first application. For example, if there is not a sufficient amount of pause between the first input and the second input, the open application stack is not resorted, and the first application remains at the top of the stack above the second application, and the device replaces display of the second user interface of the second application with the first user interface of the first application in response to the second input. This is illustrated, for example, in FIGS. 5A43-5A48, where after a rightward edge swipe gesture by contact 5064 that caused the device to switch from the email application to the messages application, a leftward edge swipe gesture by contact 5065 is detected before the threshold amount of time has elapsed. In response to the leftward edge swipe gesture by contact 5065, the device switches back to the email application because the application stack has not been resorted. Allowing resorting of the application stack during multiple consecutive edge swipe gestures that meet the first or second directional conditions enhances the operability of the device and makes the user-device interaction more efficient (e.g., by reducing the number of steps required to achieve a desired outcome, and providing a faster and easier way to achieve a desired outcome), which, additionally, reduces power usage and improves the battery life of the device (e.g., by helping the user to use the device more quickly and efficiently).

In some embodiments, in response to detecting the input by the first contact: in accordance with a determination that the input meets home-display criteria, wherein the home-display criteria require that the first movement meets a third directional condition (e.g., the first movement is upward) that is different from the first directional condition and the second directional condition, and that the first movement meets fast-swipe criteria (e.g., the movement speed of the first contact is greater than a first threshold speed), the device displays (830) a home screen user interface (distinct from the control panel user interface) that includes a plurality of application launch icons that correspond to a plurality of applications installed on the device. In some embodiments, the home screen user interface is displayed without displaying the second user interface of the second application. This is illustrated, for example, in FIGS. 5A19-5A25, where an upward swipe gesture by contact 5040 causes the display of the home screen user interface, and in some embodiments, the device displays the home screen user interface because the upward movement speed of contact 5040 is greater than a threshold speed, for example. Displaying the home screen user interface when a gesture meets third directional condition and fast-swipe criteria enhances the operability of the device and makes the user-device interaction more efficient (e.g., by reducing the number of steps required to achieve a desired outcome, and providing a faster and easier way to achieve a desired outcome), which, additionally, reduces power usage and improves the battery life of the device (e.g., by helping the user to use the device more quickly and efficiently).

In some embodiments, in response to detecting the input by the first contact: in accordance with a determination that the input meets application-switcher-display criteria, wherein the application-switcher-display criteria require that the first movement meets a third directional condition (e.g., the first movement is upward) that is different from the first directional condition and the second directional condition, and that the input meets slow-swipe criteria (e.g., the movement speed of the first contact is less than the first threshold speed), the device displays (832) an application-switcher user interface includes a plurality of representations of applications (e.g., application launch icons, reduced scale images of application user interfaces, etc.) for selectively activating one of a plurality of recently open applications (e.g., selection of a respective application-selection object re-activates the corresponding recently open application to a state immediate prior to the suspension of the application). In some embodiments, the representations of applications are ordered based on a recency of use of the applications to which they correspond (e.g., with representations of more recently used apps displayed before/above representations of less recently used apps). In some embodiments, the application-switcher user interface includes at least a portion of a control panel user interface. This is illustrated in FIGS. 5A1-5A8, where an upward swipe gesture by contact 5004 causes the display of the application-switcher user interface, and in some embodiments, the device displays the application-switcher user interface because the upward movement speed of contact 5004 is less than a threshold speed. Displaying the application-switcher user interface when a gesture meets third directional condition and slow-swipe criteria enhances the operability of the device and makes the user-device interaction more efficient (e.g., by reducing the number of steps required to achieve a desired outcome), which, additionally, reduces power usage and improves the battery life of the device (e.g., by helping the user to use the device more quickly and efficiently).

In some embodiments, at least a respective portion of the control panel user interface is (834) at least partly translucent. While displaying a respective user interface on the display, the device detects an edge swipe gesture that meets control-panel-display criteria (e.g., an upward swipe the meets the edge-swipe criteria and includes a movement that meets the second directional condition; or an upward swipe from the bottom edge of the touch-screen that causes display of an application-switcher user interface (e.g., a stack of cards including cards representing a last open application, a currently open application, and the control panel user interface) or a preview of the application-switcher user interface (e.g., side-by-side cards representing a last open application, a currently open application, and the control panel user interface) over the home screen user interface). In response to detecting the edge swipe gesture that meets the control-panel-display criteria, the device displays the control panel user interface, including: in accordance with a determination that the control panel interface was invoked via an edge swipe gesture that started while a respective application was displayed on the display (e.g., the respective user interface is a user interface of the respective application), displaying the control panel user interface displayed over the respective application, where an appearance of the respective application affects an appearance of the respective portion of the control panel user interface that is at least partly translucent (e.g., shapes and/or colors of user interface objects in the respective application change the appearance of the translucent portions of the control panel user interface); and in accordance with a determination that the control panel user interface was invoked while a system user interface was displayed on the display (e.g., the system user interface is an application-switcher user interface or the home screen user interface), displaying the control panel user interface displayed over the system user interface, wherein the system user interface corresponds to multiple applications and an appearance of the system user interface affects the appearance of the respective portion of the control panel user interface that is at least partly translucent (e.g., shapes and/or colors of user interface objects in the respective application change the appearance of the translucent portions of the control panel user interface). This is illustrated, for example, in FIGS. 5A58-5A59, where the appearance of control panel user interface is affected by the underlying application user interface (e.g., card 5016 and control panel user interface allow features of the user interface of the messages application to show through). In FIG. 5A77, the appearance of the control panel user interface is affected by the appearance of the underlying home screen user interface. Displaying a translucent control panel user interface whose appearance changes based on the user interface underneath enhances the operability of the device and makes the user-device interaction more efficient (e.g., providing information about the internal state of the device, helping the user to achieve a desired outcome with required inputs, and reducing user mistakes when operating the device), which, additionally, reduces power usage and improves the battery life of the device (e.g., by helping the user to use the device more quickly and efficiently).

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, 1050, 1100, 1200, 1300, 1400, 1500, 1600, 1800, and 1900) are also applicable in an analogous manner to method 800 described above with respect to FIGS. 8A-8E. For example, the contacts, gestures, user interface objects, application views, control panels, controls, position thresholds, directional conditions, navigation criteria, movement parameters, thresholds, determinations, focus selectors, and/or animations described above with reference to method 800 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1050, 1100, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8E are, optionally, implemented by components depicted in FIGS. 1A-1B. For example, detection operation 804 and performing operation 806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9D are flow diagrams illustrating a method 900 of limiting operation of a navigation gesture, in accordance with some embodiments. The method 900 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

Method 900 relates to limiting operation of a navigation gesture when the navigation gesture is detected while a currently displayed application is operating in a protected state (e.g., in a full-screen display mode, or in a mode that unintended interruption is highly undesirable). Specifically, when a navigation gesture is detected and the currently displayed application is determined to be protected, the device forgoes switching to a new user interface (e.g., a system user interface such as the home screen user interface or the application-switcher user interface, a control panel user interface, or a user interface of a recently open application) in response to the navigation gesture, and the device switches to the new user interface in response to the navigation gesture if the currently displayed application is not protected. Limiting the operation of the navigation gesture when a currently application is determined to be protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

Method 900 is performed at a device having a display and a touch-sensitive surface (e.g., a touch-screen display that serves both as the display and the touch-sensitive surface). In some embodiments, the device does not have a home button (e.g., a mechanical button, a virtual button, a solid state button, etc.) that, when activated, is configured to dismiss a currently displayed user interface and replace the currently displayed user interface with a home screen that includes a plurality of application launch icons for a plurality of applications installed on the device. The device displays (902) a first user interface of a first application on the display. While displaying the first user interface of the first application, the device detects (904) a first input by a first contact on the touch-sensitive surface (e.g., detecting a vertical edge swipe gesture by the first contact) that meets navigation-gesture criteria, wherein the navigation-gesture criteria require that the first input includes a movement of the first contact across the touch-sensitive surface that crosses a boundary of a predefined edge region of the touch-sensitive surface (in a first predefined direction (e.g., upward)) in order for the navigation-gesture criteria to be met. In response to detecting the first input by the first contact that meets the navigation-gesture criteria: in accordance with a determination that the first application is not protected (e.g., the application is not operating a full screen mode, or the application is not currently in a mode which should not be suddenly interrupted, such as a gaming application that is not in an active gaming mode, or a maps application that that is not in a navigation mode, etc.), the device ceases (906) to display the first user interface of the first application and displays a respective other user interface (e.g., a home screen user interface, an application switcher user interface, a user interface of another application, or a control panel user interface) on the display. In some embodiments, the respective other user interface is selected based on characteristics of the swipe input, as described herein with respect to the methods 600, 700, 800, 1000, 1050, 1100, 1200, 1300, 1400, 1500, 1600, 1800, and 1900. In response to detecting the first input by the first contact that meets the navigation-gesture criteria, in accordance with a determination that the first application is protected (e.g., the application is operating in a full screen mode, or the application is currently in a mode which should not be suddenly interrupted, such as a gaming application that is in an active gaming mode, or a maps application that is in a navigation mode, etc.), the device maintains display of the first user interface of the first application without displaying the respective other user interface (e.g., the device activates a home-gesture verification mode that will cause display of the home screen user interface only if a verification input is detected while the device is in the home-gesture verification mode). This is illustrated in FIGS. 5B1-5B3, where when the media player application is not protected, a navigation gesture (e.g., upward swipe from the bottom edge of the display that meets home-display criteria) causes the device to switch to displaying the home screen; in FIGS. 5B5-5B7, where when the media player application is in full-screen playback mode and is protected, the navigation gesture does not cause display of the home screen, for example. This is also illustrated in FIGS. 5B11-5B13, where when the maps applications is in the interactive map display mode and is not protected, a navigation gesture causes the device to switch to the home screen user interface; and in FIGS. 5B17-5B19, when the maps application is in navigation mode, a navigation gesture cause the home affordance to be displayed, but maintains display of the navigation user interface. In some embodiments, a similar process is used by the device to determine whether or not to display an application switcher in response to a swipe input that starts from an edge of the device and moves onto the device from the edge of the device (e.g., as described in greater detail with reference to method 600 or to switch between different applications or a control panel user interface in response to a swipe input that moves along an edge of the device (e.g., as described in greater detail with reference to method 700 and 800. For example, when a swipe input that corresponds to displaying a respective user interface (e.g., an application switcher, a different application, or a control panel) is detected, if the application is not protected, then the respective user interface is displayed, but if the application is protected, then the respective user interface is not displayed and, optionally, an affordance is displayed instead, and if the swipe input is detected again while the affordance is displayed (e.g., before it hides automatically after a predetermined period of time), then the respective user interface is displayed.

In some embodiments, the navigation-gesture criteria are (908) home-gesture criteria. The respective other user interface is a home screen user interface (e.g., a gesture that meets the home-gesture criteria (e.g., a quick upward swipe from the bottom edge of the touch-screen, or a long upward swipe that starts from the bottom of the touch-screen and ends above three quarters of the screen height from the bottom edge of the touch-screen) causes dismissal of the currently displayed user interface and display of the home screen user interface after termination of the gesture). This is illustrated in FIGS. 5B1-5B7, and FIGS. 5B11-5B14 and 5B17-5B19, for example. Limiting navigation to the home screen in response to a navigation gesture when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the navigation-gesture criteria are (910) application-switcher-gesture criteria. The respective other user interface is an application-switcher user interface (e.g., a gesture that meets the application-switcher-gesture criteria (e.g., a slow upward swipe from the bottom edge of the touch-screen, an upward swipe that starts from the bottom edge of the touch-screen and includes a required pause before termination of the gesture, an intermediate-length upward swipe that starts from the bottom edge of the touch-screen and ends below three quarters of the screen height from the bottom edge of the touch-screen) causes display of an application-switcher user interface that includes representations (e.g., reduced scale images) of user interfaces of multiple recently open applications). Limiting navigation to the application-switcher user interface in response to a navigation gesture when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the navigation-gesture criteria are (912) application-switching-gesture criteria. The respective other user interface is another application (e.g., a gesture that meets the application-switching-gesture criteria (e.g., a horizontal swipe within the bottom edge region of the touch-screen in a first predefined direction (e.g., rightward)) causes the currently displayed application to be switched to a last opened application before the currently displayed application). Limiting navigation to another application (e.g., the last displayed application) in response to a navigation gesture when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the navigation-gesture criteria are (914) control-panel-gesture criteria. The respective other user interface is a control panel user interface (e.g., a gesture that meets control-panel-gesture criteria (e.g., a horizontal swipe within the bottom edge region of the touch-screen in a second predefined direction (e.g., leftward)) causes the currently displayed application to be switched to a control panel user interface that includes controls for different system functions, such as the controls for network connections, media playback, display settings, audio settings, etc.). Limiting navigation to the control panel user interface in response to a navigation gesture when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the first application is determined (916) to be protected when an input that meets the navigation-gesture criteria also meets respective criteria for triggering a function provided by the first user interface of the first application. For example, if an upward swipe from the bottom edge is designed to bring up an application-specific control panel (e.g., a hidden tool bar) during gameplay in a gaming application, detection of such a gesture does not cause dismissal of the current user interface or display of the home screen. In another example, if the upward swipe from the bottom edge is designed to bring up a selection panel (e.g., related content selection panel) while a media-player application is in a full-screen media playback mode, detection of such a gesture does not cause dismissal of the current user interface or display of the home screen. This is illustrated in FIGS. 5B1-5B7, and FIGS. 5B11-5B14, for example, where the upward swipe from bottom edge is used to trigger display of control region 5320 in the media player application. Limiting navigation to another user interface in response to a navigation gesture when the navigation gesture also meets the criteria for triggering other functions within the currently displayed application enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the first application is determined (918) to be protected when the first application is operating in one of a plurality of predefined protected modes (e.g., full screen playback mode (e.g., when a movie is played in a theater mode), active gaming mode (e.g., when game is within an active gaming session, as opposed to in the setup stage, in a paused state, or in the result displaying stage), fast touch-interaction mode (e.g., when in a timed touch-based game, or in combative or competitive portion of a game)). This is illustrated, for example, in FIGS. 5B5-5B7 where the media player is operating in full-screen media playback mode, and in FIGS. 5B17-5B19, where the maps application is operating in the navigation mode. Limiting navigation to another user interface in response to a navigation gesture when the currently displayed application is in a predefined protected mode enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, in response to detecting the first input by the first contact that meets the navigation-gesture criteria: in accordance with a determination that the first application is protected, the device displays (920) an affordance overlaid on the first user interface of the first application (e.g., displaying a home affordance in the predefined edge region of the touch-screen) to indicate that a confirmation input that meets the navigation-gesture criteria is required to dismiss the first application that is determined to be protected and display the respective other user interface (e.g., a home screen user interface, an application switcher user interface, a user interface of another application, or a control panel user interface). This is illustrated, for example, in FIGS. 5B5-5B7, where home affordance 5322 is displayed in response to the navigation gesture by contact 5318. This is also illustrated in FIGS. 5B17-5B19, where home affordance 5002 is displayed in response to the navigation gesture by contact 5352. In some embodiments, when the affordance is overlaid on the first user interface, the device disambiguates between inputs that cause the device to navigate to: an application switcher user interface, a recent application, a control panel user interface, and a home screen user interface based on one or more of the steps in methods 600, 700, 800, 1000, and 1600. Displaying a visual hint for confirmation after navigation to another user interface is limited due to protection of the currently displayed application enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, in response to detecting the first input by the first contact that meets the navigation-gesture criteria: in accordance with a determination that the first application is protected, the device performs (922) a function (e.g., displaying a hidden tool bar from the bottom edge of the touch-screen, or effecting a game move (e.g., a sword swing)) in the first application in accordance with the first input. In some embodiments, the function that is performed in the first application is performed in conjunction with displaying the affordance overlaid on the first user interface of the first application. This is illustrated, for example, in FIGS. 5B5-5B7, where home affordance 5322 and control region 5320 are displayed in response to the navigation gesture by contact 5318. Performing an operation with the currently displayed application in response to the navigation gesture after navigation to another user interface is limited due to protection of the currently displayed application enhances the operability of the device and makes the user-device interaction more efficient (e.g., by reducing the number of steps needed to achieve a desired outcome, reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the first application is determined (924) to be protected and display of the first user interface of the first application is maintained in response to detecting the first input by the first contact. After forgoing displaying the respective other user interface (e.g., a home screen user interface, an application switcher user interface, a user interface of another application, or a control panel user interface) in response to detecting the first input by the first contact, and while maintaining display of the first user interface of the first application, the device detects a second input by a second contact on the touch-sensitive surface that meets the navigation-gesture criteria (e.g., a second upward swipe gesture by a second contact that starts from the bottom edge of the touch screen). In response to detecting the second input by the second contact on the touch-sensitive surface that meets the navigation-gesture criteria: in accordance with a determination that the second input is detected within confirmation time threshold of the first input (e.g., while the home affordance has not faded away from the display), the device ceases to display the first user interface of the first application and displaying the respective other user interface (e.g., a home screen user interface, an application switcher user interface, a user interface of another application, or a control panel user interface) on the display. This is illustrated, for example, in FIGS. 5B7-5B10, where a second navigation gesture by contact 5324 detected within the threshold amount of time since the first navigation gesture by contact 5318 causes display of the home screen user interface. This is further illustrated in FIGS. 5B19, and 5B23-5B25, where a second navigation gesture by contact 5358 within a threshold amount of time of the first navigation gesture by contact 5352 causes display of the home screen user interface. In some embodiments, if the second input by the second contact is not detected within the confirmation time threshold of the first input, the second input is treated as an initial upward wipe, and triggers the same heuristic that is used to test the first input. In other word, if the application is determined to be a protected application, the device does not dismiss the current user interface and does not display of the home screen user interface; and if the application is determined not to be a protected application, the device ceases to display the current user interface and displays the home screen user interface. In some embodiments, in response to the second input, the device first reduces a size of the first user interface of the first application and then displays representations of additional applications and subsequently ceases to display the first user interface of the first application when the end of the second input is detected. Navigating to a new user interface in response to a second navigation gesture after navigation to the user interface was limited the first time due to protection of the currently displayed application enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, while displaying the first user interface of the first application on the display, the device detects (926) a third input by a third contact on the touch-sensitive surface that meets the navigation-gesture criteria. In response to detecting the third input: in accordance with a determination that the third input by the third contact meets enhanced-navigation-gesture criteria, wherein enhanced-navigation-gesture criteria require a movement of the third contact across the touch-sensitive surface that crosses the boundary of the predefined edge region of the touch-sensitive surface (in a first predefined direction (e.g., upward)) and one or more additional conditions in order for the enhanced-navigation-gesture criteria to be met, the device ceases to display the first user interface of the first application and displays the respective other user interface (e.g., a home screen user interface, an application switcher user interface, a user interface of another application, or a control panel user interface), irrespective of whether the first application is determined to be protected. In response to detecting the third input: in accordance with a determination that the third input by the third contact does not meet the enhanced-navigation-gesture criteria and the application is protected, the device maintains display the first user interface of the first application; and in accordance with a determination that the third input by the third contact does not meet the enhanced-navigation-gesture criteria and the application is not protected, the device ceases to display the first user interface of the first application and displaying the respective other user interface (e.g., a home screen user interface, an application switcher user interface, a user interface of another application, or a control panel user interface). This is illustrated, for example, in FIGS. 5B1-5B9, and FIGS. 5B11-5B13, 5B17-5B19, 5B26-5B29, and FIGS. 5B30-5B33. In some embodiments, two consecutive short swipes that are in the bottom edge region of the touch-screen also dismiss the current user interface and display the home screen, irrespective of whether the application is determined to be a protected application or not. In some embodiments, a similar process is used by the device to determine whether or not to display an application switcher in response to a swipe input that starts from an edge of the device and moves onto the device from the edge of the device (e.g., as described in greater detail with reference to method 600) or to switch between different applications or a control panel user interface in response to a swipe input that moves along an edge of the device (e.g., as described in greater detail with reference to method 700 and 800). For example, when an swipe input that corresponds to displaying a respective user interface (e.g., an application switcher, a different application, or a control panel) is detected and the application is protected, if the swipe input meets the enhanced-navigation-gesture criteria, then the respective user interface is displayed, but if the swipe input does not meet the enhanced-navigation-gesture criteria, then the respective user interface is not displayed and, optionally, an affordance is displayed instead. Allowing the user to navigating to a new user interface by providing an enhanced navigation gesture even when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the enhanced-navigation-gesture criteria include (928) a criterion that is met when a characteristic intensity of the third contact exceeds a first intensity threshold (e.g., a light press intensity threshold $IT_L$) before the movement of the third contact across the boundary of the predefined edge region of the touch-sensitive surface (e.g., the enhanced-navigation-gesture criteria are met by a press-input by the third contact in the bottom edge region of the touch-screen, followed by an upward swipe by the third contact). This is illustrated in FIGS. 5B30-5B33, for example. Allowing the user to navigating to a new user interface by providing an enhanced navigation gesture with a press input even when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the enhanced-navigation-gesture criteria include (930) a criterion that is met when a characteristic intensity of the third contact during the movement of the third contact exceeds a second intensity threshold (e.g., a light press intensity threshold $IT_L$ or a threshold intensity that is lower than $IT_L$ and greater than the detection intensity threshold $IT_0$)(e.g., the enhanced-navigation-gesture criteria are met by an upward swipe with force that starts from the bottom edge of the touch-screen). Allowing the user to navigating to a new user interface by providing an enhanced-navigation-gesture with increased intensity during the gesture even when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the enhanced-navigation-gesture criteria include (932) a criterion that is met when the third contact is maintained within the predefined edge region with less than a threshold amount of movement for more than a first threshold amount of time (e.g., a long-press time threshold) before making the movement across the boundary of the predefined edge region of the touch-sensitive surface (e.g., the enhanced-navigation-gesture criteria are met by a touch-hold input in the bottom edge region of the touch-screen, followed by an upward swipe). This is illustrated in FIGS. 5B26-5B29, for example. Allowing the user to navigating to a new user interface by providing an enhanced-navigation-gesture with an initial touch-hold input even when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the device displays (934) an indication (e.g., a home affordance) overlaid on the first user interface in response to detecting that the third contact is maintained within the predefined edge region with less than the threshold amount of movement for more than the first threshold amount of time. Displaying a visual indication when an enhanced navigation gesture is detected to override the protection of the currently displayed application enhances the operability of the device and makes the user-device interaction more efficient (e.g., by providing information regarding the internal state of the device, helping the user to achieve a desired outcome with required inputs, and reducing user mistakes when operating the device), which, additionally, reduces power usage and improves the battery life of the device (e.g., by helping the user to use the device more quickly and efficiently).

In some embodiments, the enhanced-navigation-gesture criteria include (936) a criterion that is met when the movement of third contact is paused after an initial movement of the third contact for more than a threshold amount of time (e.g., a long-press time threshold) before being completed with a final movement across the touch-sensitive surface (e.g., the enhanced-navigation-gesture criteria are met by an upward swipe that starts from the bottom edge region of the touch-screen and that includes an initial upward movement of the third contact across the touch-screen, followed by a pause of the third contact on the touch-screen, followed by a final upward movement of the third contact across the touch-screen). In some embodiments, the device displays an indication (e.g., a home affordance) overlaid on the first user interface in response to detecting that the movement of the third contact is paused after an initial movement of the third contact for more than a threshold amount of time. Allowing the user to navigating to a new user interface by providing an enhanced navigation gesture with pause followed by final movement even when the currently displayed application is protected enhances the operability of the device and makes the user-device interaction more efficient (e.g., by reducing unintended disruptions to the user's usage of the device, and reducing user mistakes when operating the device), which, additionally, reduces power usage and improves the battery life of the device (e.g., by helping the user to use the device more quickly and efficiently).

In some embodiments, the control panel user interface is displayed in response to other types of inputs. For example, the device detects a press input by a contact in the predefined bottom edge region of the touch-sensitive surface followed by an upward swipe; in response to detecting such a swipe input, the device displays the control panel user interface instead of the home screen user interface after the lift-off of the contact.

In some embodiments, swiping up from the central region of the bottom edge causes the control panel user interface to be displayed, and swiping up from the side regions of the bottom edge causes the application-switcher user interface or the home screen to be displayed after the lift-off of the contact.

In some embodiments, a plurality of system status indicators are displayed in a predefined region of the display (e.g., in the upper right corner of the display), and tapping on the status indicators causes the control panel user interface to be displayed.

In some embodiments, swiping rightward from the left edge of the display causes the previous application to be displayed; and swiping leftward from the right edge of the display causes the control panel user interface to be displayed.

In some embodiments, swiping from the top edge of the display bring down a status bar, and tapping on the status bar causes the control panel user interface to be displayed.

It should be understood that the particular order in which the operations in FIGS. 9A-9D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 1000, 1050, 1100, 1200, 1300, 1400, 1500, 1600, 1800, and 1900) are also applicable in an analogous manner to method 900 described above with respect to FIGS. 9A-9D. For example, the contacts, gestures, user interface objects, application views, control panels, controls, position thresholds, directional conditions, navigation criteria, movement parameters, thresholds, determinations, focus selectors, and/or animations described above with reference to method 900 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 1000, 1050, 1100, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9D are, optionally, implemented by components depicted in FIGS. 1A-1B. For example, detection operation 904 and maintain operation 906 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 10A:
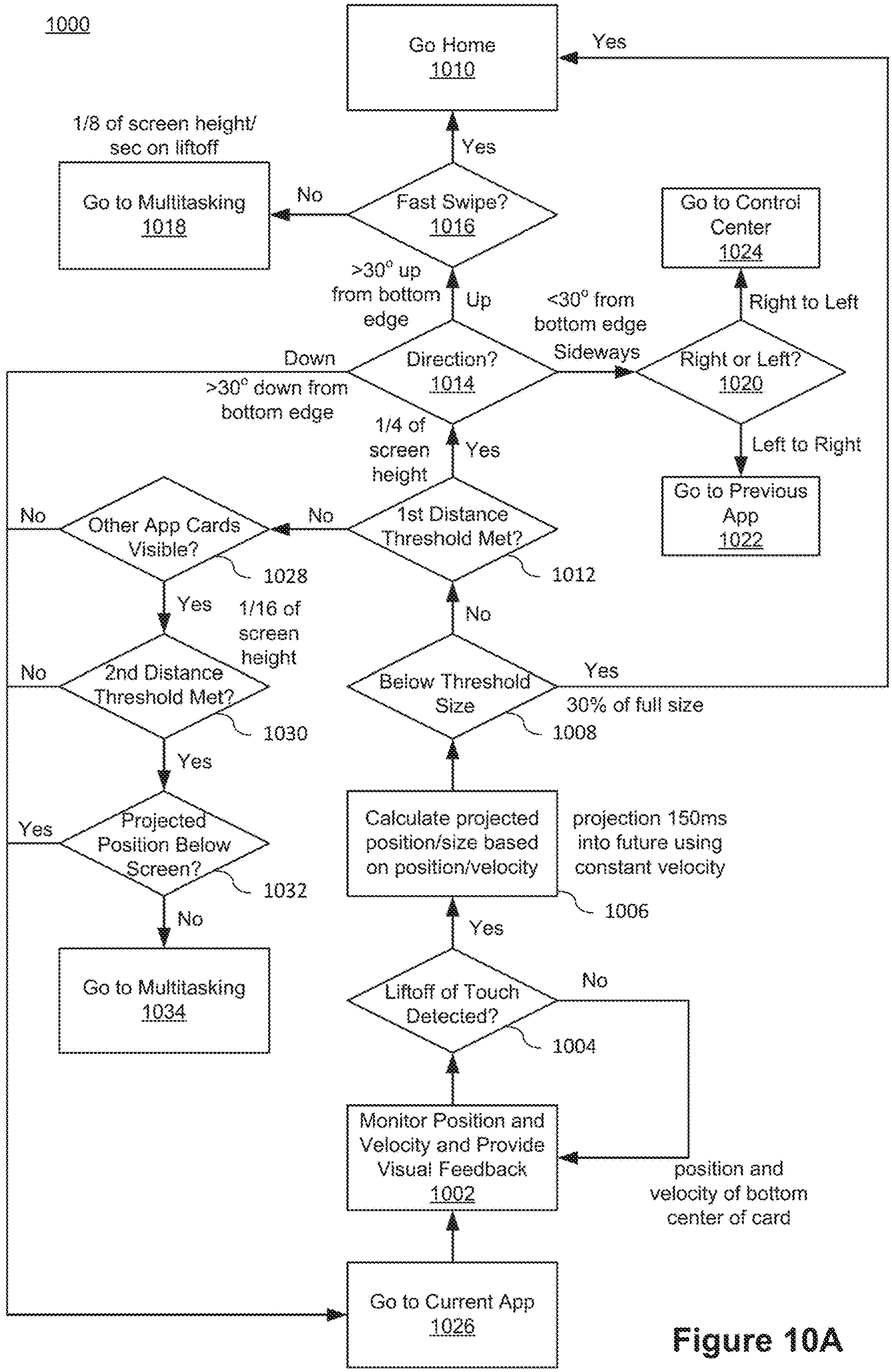
FIGS. 10A-10B are flow diagrams illustrating a method of navigating between user interfaces, in accordance with some embodiments.

FIG. 10A is a flow diagram illustrating a method 1000 of navigating between user interfaces, in accordance with some embodiments. The method 1000 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

Method 1000 relates to navigating between user interfaces in response to a swipe gesture that meets different movement conditions. Allowing the user to navigate (i) to the home screen, (ii) to the application displayed on the screen immediately prior to a user interface that was displayed when the swipe gesture began, (iii) to a control panel user interface, (iv) to an application switching user interface, or (v) back to the user interface that was displayed when the swipe gesture began depending on whether certain preset movement conditions are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

Method 1000 is performed at a device having a touch-screen display and displaying a user interface for an application on the touch-screen display. After the device detects a contact at the bottom edge of the touch-screen display (e.g., contact 5004, 5040, 5052, 5056, 5060, 5064, 5065, 5069, 5070, 5074, 5950, 5968, 5972, 5980, and 5988 in FIGS. 5A2, 5A19, 5A34, 5A37, 5A40, 5A43, 5A46, 5A49, 5A52, 5A57, 5H5, 5H9, 5H13, 5H18, and 5H25 respectively), the device replaces the user interface for the application with a corresponding application view (e.g., application views 5010, 5022, 5022, 5010, 5010, 5022, 5014, 5022, 5014, and 5954 in FIGS. 5A3, 5A20, 5A35, 5A38, 5A41, 5A44, 5A47, 5A50, 5A53, 5H7, 5H10, 5H14, 5H19, and 5H26 respectively). Method 1000 is then used to determine which user interface the device navigates to upon lift-off of the contact.

The device monitors (1002) the position and velocity of the application view (e.g., at the bottom center of the application view) and provides visual feedback, e.g., indicating how the device will navigate upon lift-off of the contact. The position and velocity of the application view corresponds to the position and velocity of the contact. For example, as illustrated in FIG. 5A5, device 100 monitors the position and velocity of application view 5010. Because the instantaneous velocity of application view 5010 meets home-display criteria, the device displays application view 5010 without displaying an application view for any other recently open application, indicating that the device will navigate to the home screen user interface upon immediate lift-off of the contact. In contrast, as illustrated in FIG. 5A6, because application view 5010 has paused at a position that meets application-switcher-display criteria, rather than home-display criteria, the device additionally displays a portion of application view 5014, corresponding to a recently open application, and a portion of control panel view 5016, corresponding to a control panel, indicating that the device will navigate to an application-switcher user interface upon immediate lift-off of the contact.

The device detects (1004) lift-off of the contact from the touch screen display (e.g., liftoff of contact 5004, 5040, 5052, 5056, 5060, 5064, 5065, 5069, 5070, 5074, 5950, 5968, 5972, 5980, and 5988 in FIGS. 5A7, 5A24, 5A36, 5A39, 5A42, 5A45, 5A48, 5A51, 5A56, 5A59, 5H8, 5H12, 5H17, 5H21, and 5H27 respectively). Alternatively, if the device does not detect lift-off of the contact from the touch screen display, the device returns to monitoring (1002) the position and velocity of the application view and providing visual feedback.

In response to detecting lift-off, the device calculates (1006) the projected position and size of the application view, e.g., assuming that it will continue to move in the same direction for a period of time. In some embodiments, the projected position and size of the application view is calculated as if the application view has momentum based on its instantaneous velocity at the moment of contact lift-off. In some embodiments, the projected position and/or size of the application view is calculated as if the application view would continue to move at its instantaneous velocity at the moment of lift-off for a predetermined time (e.g., 150 ms). In some embodiments, the projected position and size of the application view is calculated as if the application view would continue to move with decreasing velocity at the moment of lift-off, e.g., as if slowed by a frictional coefficient. For example, upon lift-off of contact 5004 in FIG. 5A7, device 100 calculates that the projected position and size of application view 5010 is the same as the position and/or size of the application view in FIG. 5A6 because contact 5004 has no instantaneous velocity at lift-off. In contrast, upon lift-off of contact 5040 in FIG. 5A23, device 100 calculates that the projected position and size of application view 5022 is higher on the screen and smaller than that shown in FIG. 5A22 because the application view had upward velocity corresponding to movement 5042 at the moment contact 5040 was lifted-off the screen. The projected position and size of application view is shown as outline 5044 in FIG. 5A23.

The device determines (1008) whether the calculated size of the application view meets a predetermined threshold value. In some embodiments, the threshold value is a maximum size, e.g., such that the device determines whether the projected size of the application view is below the threshold size (e.g., 30% of the full size of the screen).

In accordance with a determination that the calculated size of the application view meets the predetermined threshold value, the device displays (1010) a home screen user interface. For example, upon determining that the size of outline 5044 is less than 30% of the full size of the screen in FIG. 5A23, device 100 displays a home screen user interface in FIG. 5A24.

In accordance with a determination that the calculated size of the application view does not meet the predetermined threshold value, the device forgoes displaying a home screen user interface. For example, upon determining that the projected size of application view 5010 is greater than 30% of the full size of the screen in FIG. 5A6, device 100 does not display a home screen user interface in FIG. 5A7.

After determining that the calculated size of the application view does not meet a predetermined threshold value, the device determines (1012) whether the calculated position of the application view (e.g., the position of the middle of the bottom edge of the application view) meets a first predetermined threshold value. In some embodiments, the threshold value is a predetermined distance between the center of the bottom edge of the screen and the center of the bottom edge of the projected position of the application view, e.g., such that the device determines whether the distance between the projected center of the bottom edge of the application view and the center of the bottom of the screen is greater than the threshold distance (e.g., a distance equal to ¼ of the height of the screen). For example, because the projected sizes of application view 5022 in FIG. 5A35, upon lift-off of contact 5052 in FIG. 5A36, and application view 5010 in FIG. 5A38, upon lift-off of contact 5056 in FIG. 5A39, are greater than 30% of the total size of the screen, device determines whether the projected positions of application view 5022 (yes) and application view 5010 (no) are a distance greater than ¼ of the screen height away from the center of the bottom edge of the screen.

In accordance with a determination that the calculated position of the application view meets the predetermined threshold value, the device determines (1014) the direction the application view was traveling prior to lift off of the contact. For example, because device 100 determined that the projected position of application view 5022 in FIG. 5A35, upon lift-off of contact 5052 in FIG. 5A36, is a distance greater than ¼ of the screen height away from the center of the bottom edge of the screen, the device determines the direction application view 5022 was traveling prior to lift-off (e.g., sideways or left to right). In some embodiments, the direction the application view is traveling is based on an angle relative to the bottom edge of the screen. For example, in one embodiment, an application view traveling in a direction that has an angle of greater than 30 degrees above the bottom edge of the screen is determined to be traveling upwards, an application view traveling in a direction that has an angle of greater than 30 degrees below the bottom edge of the screen is determined to be traveling downward, and an application view travelling in a direction that has an angle of less than 30 degrees from (e.g., above or below) the bottom edge of the screen is determined to be traveling sideways.

In accordance with a determination that the application view was traveling upwards prior to contact lift-off (e.g., in a direction having an angle of greater than 30 degrees above the bottom edge of the screen), the device determines (1016) whether the velocity of the application view, at the moment contact lift-off is detected, meets a first predetermined velocity threshold (e.g., a velocity of at least ⅛ the length of the screen height per second at contact lift-off). For example, had device 100 determined that the projected size of application view 5022 did not meet the predetermined size threshold (e.g., was greater than 30% of the total size of the screen) upon lift-off of contact 5040 in FIG. 5A23, the device would have determined whether the velocity of application view 5022 was at least ⅛ the length of the screen height per second at lift-off because it was traveling at a direction with an angle of greater than 30 degrees above the bottom edge of the screen when contact 5040 was lifted-off.

In accordance with a determination that the velocity of the application view met the first predetermined velocity threshold, the device displays (1010) a home screen user interface. For example, had device 100 determined that the projected size of application view 5022 did not meet the predetermined size threshold (e.g., was greater than 30% of the total size of the screen), but met the first predetermined velocity threshold (e.g., was travelling at a velocity of at least ⅛ the length of the screen height per second) upon lift-off of contact 5040 in FIG. 5A23, device 100 would have displayed a home screen user interface, as illustrated in FIG. 5A24.

In accordance with a determination that the velocity of the application view did not meet the first predetermined velocity threshold, the device displays (1018) an application-switcher user interface. For example, had device 100 determined that the projected size of application view 5022 did not meet the predetermined size threshold (e.g., was greater than 30% of the total size of the screen), and did not meet the first predetermined velocity threshold (e.g., was travelling at a velocity of less than ⅛ the length of the screen height per second) upon lift-off of contact 5040 in FIG. 5A23, device 100 would have displayed an application-switcher user interface, as illustrated in FIG. 5A8.

In accordance with a determination that the application view was traveling sideways prior to contact lift-off (e.g., in a direction having an angle of less than 30 degrees above or below the bottom edge of the screen), the device determines (1020) whether the application view was traveling right to left or left to right. In some embodiments, the determining (1020) whether the application view was traveling right to left or left to right is the same as the determining (1014) the direction the application view was traveling prior to lift off of the contact (e.g., rather than determining that the application view is traveling sideways, the device determines that the application view is traveling right to left or left to right, such that steps 1014 and 1020 are a single step). For example, device 100 determines that application view 5022 is traveling left to right because the center of the bottom edge of application view 5022, in FIG. 5A35, is traveling rightwards at an angle less than 30 degrees above the bottom of the screen when contact 5052 is lifted-off, in FIG. 5A36.

In accordance with a determination that the application view was traveling left to right prior to contact lift-off, the device displays (1022) a user interface for the recently open application having a retained state in the application stack immediately below the retained state of the application associated with the user interface displayed on the screen prior to first detecting the contact at the bottom edge of the touch screen display. For example, in response to detecting lift-off of contact 5052, which was directing email application view 5022 in a left to right direction in FIG. 5A35 prior to lift-off, device 100 displays a web browsing user interface in FIG. 5A36 because web browsing application view 5010 was immediately behind email application view 5022 in the stack, as illustrated in FIG. 5A29.

In accordance with a determination that the application view was traveling right to left prior to contact lift-off, the device displays (1024) a control panel user interface. In some embodiments, where the contact is moving in a right to left direction in a fashion that would otherwise satisfy the criteria for navigating to the control panel user interface, the device does not display movement of an application view corresponding to the user interface that was displayed immediately prior to detecting the contact at the bottom edge of the screen but, rather, displays movement of an application view corresponding to the control panel user interface from the right hand side of the screen (e.g., as if sliding over the user interface displayed immediately prior to detecting the contact at the bottom edge of the screen). For example, in response to detecting lift-off of contact 5074, which was traveling in a right to left direction in FIG. 5A58 prior to lift-off, device 100 displays a control panel user interface in FIG. 5A59.

In some embodiments, where the order of retained states of the recently open applications in the application stack has not yet been updated following navigation to a different user interface (e.g., where a time threshold for reordering cards in the stack was not met prior to the detection of another contact at the bottom edge of the screen), lift-off of a contact directing movement of an application view in the right to left direction causes the device to display a user interface for the recently open application having a retained state in the application stack immediately above the retained state of the application associated with the user interface displayed on the screen prior to first detecting the contact at the bottom edge of the touch screen display. For example, because contact 5065 was detected in FIG. 5A46 within a time threshold $TT_1$ after lift-off of prior contact 5064, the order of retained application states in the application stack was not reordered to reflect navigation from the email user interface in FIG. 5A43 to the messaging user interface in FIG. 5A45. As a result, lift-off of contact 5065, directing movement of messaging application view 5014 in a right to left direction in FIG. 5A47 and FIG. 5A48, causes device 100 to display an email user interface in FIG. 5A48, rather than a control panel user interface, because email application view 5010 was immediately above messaging application view 5014 in the application stack.

In accordance with a determination that the application view was traveling downwards prior to contact lift-off (e.g., in a direction having an angle of greater than 30 degrees below the bottom edge of the screen), the device redisplays (1026) the application user interface that was displayed prior to first detecting the contact at the bottom edge of the touch-screen display. For example, in response to detecting lift-off of contact 5070, when messaging application view 5014 was traveling downwards in FIG. 5A55, device 100 displays a messaging user interface in FIG. 5A56 because the messaging user interface was displayed on the screen when contact 5070 was first detected in FIG. 5A52.

In accordance with a determination that the calculated position of the application view does not meet the first predetermined threshold value, the device determines (1028) whether any other application views are visible on the display.

In accordance with a determination that no other application views are visible on the display, the device redisplays (1026) the application user interface that was displayed prior to first detecting the contact at the bottom edge of the touch-screen display. For example, in response to detecting lift-off of contact 5056, where the projected size of web browsing application view 5010 is greater than 30% of the full size of the screen and the projected position of web browsing application view 5010 is closer to the center of the bottom edge of the screen than ¼ the length of the screen height in FIG. 5A38, device 100 displays web browsing user interface in FIG. 5A39 because no other application views were visible, in FIG. 5A38, when lift-off of contact 5056 was detected.

In accordance with a determination that other application views are visible on the display, the device determines (1030) whether the calculated position of the application view (e.g., the position of the middle of the bottom edge of the application view) meets a second predetermined threshold value (e.g., that is smaller than the first predetermined threshold that the device determined was not met). In some embodiments, the second threshold value is a predetermined distance between the center of the bottom edge of the screen and the center of the bottom edge of the projected position of the application view, e.g., such that the device determines whether the distance between the projected center of the bottom edge of the application and the center of the bottom of the screen is greater than the second threshold distance (e.g., a distance equal to 1/16 of the height of the screen). For example, in response to detecting lift-off of contact 5004 in FIG. 5A7, where the projected size of web browsing application view 5010 is greater than 30% of the full size of the screen and the projected position of web browsing application view 5010 is closer to the center of the bottom edge of the screen than ¼ the length of the screen height, device 100 determines whether the second predetermined distance threshold is met because messaging application view 5014 and control panel view 5016 are partially visible in FIG. 5A6.

In accordance with a determination that the calculated position of the application view does not meet the second predetermined threshold value, the device redisplays (1026) the application user interface that was displayed prior to first detecting the contact at the bottom edge of the touch-screen display. For example, if the projected position of email application view 5022 did not meet either the first predetermined distance threshold or the second predetermined distance threshold upon lift-off of contact 5052 in FIG. 5A35, device would redisplay the email user interface, as illustrated in FIG. 5A33, because the email user interface was displayed when contact 5052 was first detected in FIG. 5A34.

In accordance with a determination that the calculated position of the application view meets the second predetermined threshold value, the device determines (1032) whether the projected position of the application view (e.g., the position of the center of the bottom edge of the card) is below the bottom edge of the screen. For example, in response to detecting lift-off of contact 5004 in FIG. 5A7—where the projected size of web browsing application view 5010 is greater than 30% of the full size of the screen, the distance between the projected position of web browsing application view 5010 and the center of the bottom edge of the screen is between 1/16 and ¼ the length of the screen height, and application view 5014 and control panel view 5016 are also visible—device 100 determines whether the projected position of web browsing application view 5010 is below the bottom edge of the screen.

In accordance with a determination that the projected position of the application view is below the bottom edge of the screen, the device redisplays (1026) the application user interface that was displayed prior to first detecting the contact at the bottom edge of the touch-screen display. For example, if contact 5004 would have moved downwards prior to lift-off in FIG. 5A6, with sufficient speed such that the projected position of application view 5010 would have been below the bottom edge of the screen, device 100 would have redisplayed the web browsing user interface, as illustrated in FIG. 5A1, because the web browsing user interface was displayed when contact 5004 was first detected in FIG. 5A2.

In accordance with a determination that the projected position of the application view is not below the bottom edge of the screen, the device displays (1034) an application-switcher user interface. In some embodiments, display of the application-switcher user interface includes animation of a smooth transition where an application view for the control panel slides on top (e.g., from the right-hand side of the screen) of the application view corresponding to the user interface displayed when the contact was first detected at the bottom edge of the screen and application views corresponding to other user interfaces with retained states in the application stack slide below (e.g., from the left-hand side of the screen) of the application view corresponding to the user interface displayed when the contact was first detected at the bottom edge of the screen. For example, in response to lift-off of contact 5004—where the projected position of web browsing application view 5010 is determined to be above the bottom edge of the screen—device 100 displays an application-switcher user interface in FIG. 5A8, including animation of a transition where control panel view 5016 slides over, and application views 5014 (messaging) and 5022 (email) slide under, web browsing application view 5010 in FIG. 5A7.

It should be understood that the particular order in which the operations in FIG. 10A have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1050, 1100, 1200, 1300, 1400, 1500, 1600, 1800, and 1900) are also applicable in an analogous manner to method 1000 described above with respect to FIG. 10A. For example, the contacts, gestures, user interface objects, application views, control panels, controls, position thresholds, directional conditions, navigation criteria, movement parameters, thresholds, determinations, focus selectors, and/or animations described above with reference to method 1000 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1050, 1050, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 10A are, optionally, implemented by components depicted in FIGS. 1A-1B. For example, detection operations and performing operations are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 10B:
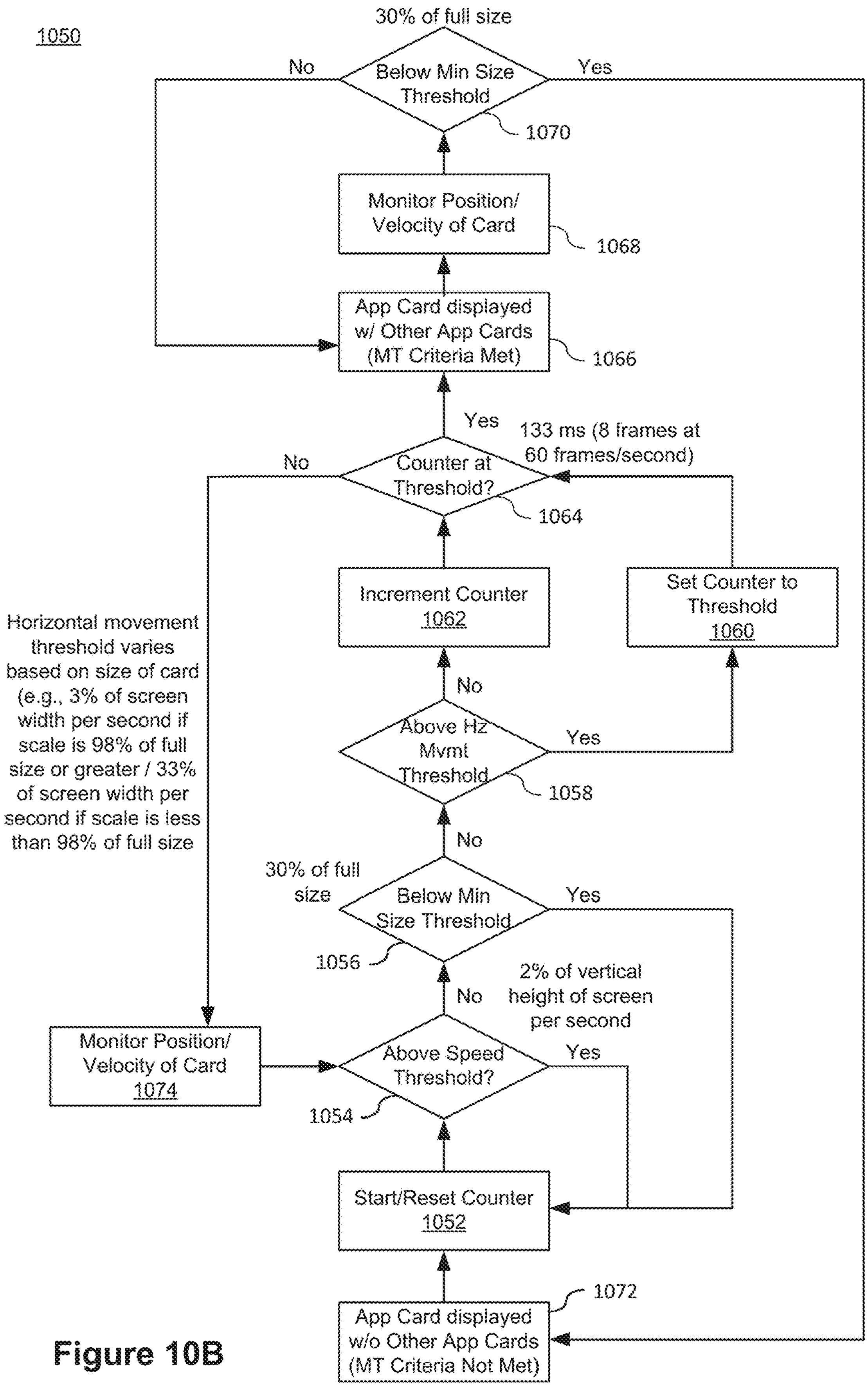

FIG. 10B is a flow diagram illustrating a method 1050 of providing visual feedback when navigating between user interfaces, in accordance with some embodiments. The method 1050 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1050 are, optionally, combined and/or the order of some operations is, optionally, changed.

Method 1050 relates to providing visual feedback while navigating between user interfaces in response to a swipe gesture that meets different movement conditions. Specifically, the device displays a preview of an application-switcher user interface including multiple application views, while navigating between user interfaces, when the input directing navigation would satisfy criteria for navigating to the application-switcher user interface upon immediate lift-off of a contact that is part of the input. Displaying the preview of the application-switcher user interface when the swipe gesture would cause navigation to the application-switcher user interface enhances the operability of the device and makes the user-device interaction more efficient (e.g., by providing information about the internal state of the device through the multiple application views, helping the user achieve an intended result by providing the required inputs, and reducing the number of steps that are needed to achieve an intended outcome when operating the device), which, additionally, reduce power usage and improve the battery life of the device (e.g., by helping the user to use the device more quickly and efficiently).

Method 1050 is performed at a device having a touch-screen display and displaying a user interface for an application on the touch-screen display. After the device detects a contact at the bottom edge of the touch-screen display (e.g., contact 5004, 5040, 5052, 5056, 5060, 5064, 5065, 5069, 5070, 5074, 5950, 5968, 5972, 5980, and 5988 in FIGS. 5A2, 5A19, 5A34, 5A37, 5A40, 5A43, 5A46, 5A49, 5A52, 5A57, 5H5, 5H9, 5H13, 5H18, and 5H25 respectively), the device replaces the user interface for the application with a corresponding application view (e.g., application views 5010, 5022, 5022, 5010, 5010, 5022, 5014, 5022, 5014, and 5954 in FIGS. 5A3, 5A20, 5A35, 5A38, 5A41, 5A44, 5A47, 5A50, 5A53, 5H7, 5H10, 5H14, 5H19, and 5H26). Method 1050 is then used to provide visual feedback indicating when criteria for navigating to the application-switcher user interface has been met.

While displaying a single application view, corresponding to the user interface displayed when the contact at the bottom edge of the screen was first detected, the device starts (1052) an internal counter that triggers display of application views corresponding to user interfaces of applications with retained state information in the application stack upon reaching a predetermined temporal threshold (e.g., 133 ms or 8 frame refreshes at a frequency of 60 frames per second).

The device determines (1054) whether the velocity of the application view exceeds a first predetermined threshold velocity (e.g., 2% of the vertical height of the screen per second). In some embodiments, the velocity of the application view is the rate of change in the distance between the center of the bottom edge of the application view and the center of the bottom of the screen. In some embodiments, the velocity of the application view is the rate of change of the vertical position (e.g., a vertical velocity vector) of the center of the bottom edge of the application view. In some embodiments, the velocity of the application view is the rate of change in the position of the center of the bottom edge of the application view, e.g., in any direction.

In accordance with a determination that the velocity of the application view exceeds the first predetermined threshold velocity, the device resets (1052) the counter. For example, device 100 determines that the velocity of application view 5010 in FIG. 5A3 exceeds the predetermined threshold velocity and resets the counter, preventing display of other application views in FIG. 5A4.

In accordance with a determination that the velocity of the application view does not exceed the first predetermined threshold velocity, the device determines (1056) whether the size of the application view is below a second predetermined size threshold (e.g., 30% of the size of the full screen).

In accordance with a determination that the size of the application view is below the second predetermined size threshold velocity, the device resets (1052) the counter. For example, device 100 determines that the size of email application view 5022 is less than 30% of the size of the full screen in FIG. 5A22 and resents the counter, preventing display of other application views in FIG. 5A23.

In accordance with a determination that the size of the application view is not below the second predetermined size threshold velocity, the device determines (1058) whether the horizontal movement of the application view exceed a second predetermined threshold velocity. In some embodiments, the horizontal velocity of the application view is the rate of change in the position of the center of the bottom edge of the application view. In some embodiments, the second predetermined threshold velocity varies based upon the size of the application view, e.g., the second predetermined threshold velocity is 3% of the screen width per second when the size of the application view is at least 98% of the size of the full screen and 33% of the screen width per second when the size of the application view is less than 98% of the size of the full screen.

In accordance with a determination that the horizontal velocity of the application view exceeds the second predetermined threshold velocity, the device sets (1060) the counter to the temporal threshold. For example, device 100 determines that the horizontal velocity of email application view 5022 exceeds 3% of the screen width per second upon movement 5054 of contact 5052 in FIG. 5A34 and sets the counter to the temporal threshold, enabling display of web browsing application view 5010 in FIG. 5A35.

In accordance with a determination that the horizontal velocity of the application view does not exceed the second predetermined threshold velocity, the device increments (1062) the counter.

After determining whether the horizontal movement of the application view exceeds the second predetermined threshold velocity, the device determines (1064) whether the counter has reached the temporal threshold.

In accordance with a determination that the counter has reached the temporal threshold (e.g., upon setting the counter to the temporal threshold or incrementing the counter until the threshold is reached), the device displays (1066) one or more other application views corresponding to user interfaces of applications with retained state information in the application stack (e.g., an application view for a recently open application, an application view for a control panel, or both). For example, device 100 determines that the counter has reached the temporal threshold upon increment of the counter between FIGS. 5A5 and 5A6 and, in response, displays portions of messaging application view 5014 and control panel view 5016 along with web browsing application view in FIG. 5A6, indicating that lift-off of contact 5004 will result in navigation to the application-switcher user interface, as illustrated in FIGS. 5A7-5A8. Similarly, device 100 determines that the counter has reached the temporal threshold upon setting the counter to the temporal threshold, upon horizontal movement 5054 of contact 5052 in FIG. 5A34 and, in response, displays a portion of web browsing application view 5010 along with email application view 5022 in FIG. 5A35. Likewise, device 100 determines that the counter has reached the temporal threshold upon setting the counter to the temporal threshold, upon horizontal movement 5076 of contact 5074 in FIG. 5A57 and, in response, displays a portion of control panel view 5016 in FIG. 5A58.

After displaying the one or more other application views corresponding to user interfaces of applications with retained state information in the application stack, the device continues to monitor (1068) the size, position, and/or velocity of the application view corresponding to the user interface displayed when the contact was first detected at the bottom edge of the screen.

While monitoring the size, position, and/or velocity of the application view corresponding to the user interface displayed when the contact was first detected at the bottom edge of the screen, the device determines (1070) whether the size of the application view is below a third predetermined size threshold (e.g., 30% of the size of the full screen).

In accordance with a determination that the size of the application view is below the third predetermined size threshold, the device terminates (1072) display of the one or more other application views corresponding to user interfaces of applications with retained state information in the application stack, and resets (1052) the counter. For example, while monitoring the position of email application view 5022 in FIG. 5A21, device 100 determines that the size of the application view becomes less than 30% of the size of the full screen and, in response, terminates display of web browsing application view 5010 and control panel view 5016 in FIG. 5A22, indicating that lift-off of contact 5040 will result in navigation to a home user interface, as illustrated in FIGS. 5A23-5A24. In some embodiments, a metric related to the size of the application view (e.g., a position or velocity) is monitored and display of the other application views is terminated upon a determination that a threshold relating to the other metric (e.g., a position threshold or velocity threshold) has been met.

In accordance with a determination that the size of the application view is below the third predetermined size threshold, the device continues to monitor (1068) the size, position, and/or velocity of the application view corresponding to the user interface displayed when the contact was first detected at the bottom edge of the screen.

In accordance with a determination that the counter has not reached the temporal threshold, the device continues to monitor (1074) the size, position, and/or velocity of the application view corresponding to the user interface displayed when the contact was first detected at the bottom edge of the screen, until the counter is either reset (1052) or reaches the temporal threshold.

It should be understood that the particular order in which the operations in FIG. 10B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, 1200, 1300, 1400, 1500, 1600, 1800, and 1900) are also applicable in an analogous manner to method 1050 described above with respect to FIG. 10B. For example, the contacts, gestures, user interface objects, application views, control panels, controls, position thresholds, directional conditions, navigation criteria, movement parameters, thresholds, determinations, focus selectors, and/or animations described above with reference to method 1050 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1100, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 10B are, optionally, implemented by components depicted in FIGS. 1A-1B. For example, detection operations and performing operations are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application.

Similarly, it would be clear to a person having ordinary skill in the art how other processes can be implemented based on the components depicted in FIGS. 1A-1B.

FIGS. 11A-11E are flow diagrams illustrating a method 1100 of displaying a control panel user interface and, in response to different inputs, displaying an expanded region of the control panel user interface or activating a control, in accordance with some embodiments. The method 1100 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

Method 1100 relates to a heuristic for determining whether to activate a first control in a device's control panel interface, to activate a second control in the control panel interface, or to expand a control region in the control panel interface to reveal additional controls in accordance with variations in detected inputs. Specifically, if a detected input is of a first type (e.g., a tap gesture), then the device activates whichever control corresponds to the location of the input. However, if the detected input is of a second type (e.g., a press gesture that exceeds an intensity threshold or a long press gesture), then instead of activating a corresponding control, the device expands a corresponding control region to reveal additional controls that were not displayed before the expansion. Providing additional controls or activating a currently selected control based on characteristics of a single input enhances the operability of the device and makes the user-device interface more efficient (e.g., by reducing the number of inputs needed to display additional controls, and thereby providing additional functionality and control functions without cluttering the UI with additional displayed controls) which, additionally, reduces power usage and improves battery life of the device by enabling the user to use the device more quickly and efficiently.

Method 1100 is performed at a device having a display and a touch-sensitive surface (e.g., a touch-screen display that serves both as the display and the touch-sensitive surface). The device displays (1102) a control panel user interface (e.g., control panel user interface 5518, FIG. 5C13), wherein the control panel user interface includes a first control region (e.g., connectivity module 5540, FIG. 5C13), and the first control region includes a first control for controlling a first function of the device (e.g., Wi-Fi icon 5546, FIG. 5C13) and a second control for controlling a second function of the device (e.g., Bluetooth icon 5548, FIG. 5C13). In some embodiments, the control panel user interface further includes one or more additional control regions (e.g., audio control 5622, orientation lock icon 5624, Do Not Disturb icon 5626, AirPlay icon 5628, brightness control 5630, volume control 5632, and one or more user-configurable control affordances, including: flashlight icon 5600, timer icon 5602, calculator icon 5604, and camera icon 5606, FIG. 5D1) each of which includes a respective plurality of controls for controlling corresponding functions of the device. The device detects (1104) a first input by a first contact on the touch-sensitive surface (e.g., a press gesture by contact 5532, FIG. 5C14). In some embodiments, the first input by the first contact is detected at a location on the touch-sensitive surface that corresponds to the first control region (e.g., connectivity module 5540, FIG. 5C14). The device, in response to detecting the first input by the first contact on the touch-sensitive surface (including detecting the first contact on the touch-sensitive surface and detecting that the first contact is maintained at its initial touch location with less than a threshold amount of movement before lift-off of the contact is detected (e.g., the first contact is a stationary contact)) (1106): in accordance with a determination that the first input meets control-region-expansion criteria, wherein the control-region-expansion criteria require that an intensity of the first contact exceeds a first intensity threshold (e.g., the first input is a press input within the first control region) in order for the control-region-expansion criteria to be met, replaces display of the first control region (e.g., connectivity module 5540, FIG. 5C14) with display of an expanded first control region (e.g., expanded connectivity module 5550, FIG. 5C15), wherein the expanded first control region includes the first control (e.g., Wi-Fi icon 5546, FIG. 5C15), the second control (e.g., Bluetooth icon 5548, FIG. 5C15), and one or more additional controls that are not included in the first control region (e.g., AirDrop icon 5552 and Personal Hotspot icon 5554, FIG. 5C15). In some embodiments, the controls displayed in the expanded control region include controls that are related to the first control and the second control (e.g., the first control is a playback control, the second control is a volume control, and the additional controls include a playlist selection control, an audio routing control, a fast forward control, etc.). In some embodiments, the control-region-expansion criteria are met by a touch-hold input (e.g., a long press input) by the first contact (e.g., a long press input by contact 5532, FIG. 5C14). In accordance with a determination that the first input meets first-control-activation criteria, wherein the first-control-activation criteria require that the first contact is detected at a first location on the touch-sensitive surface that corresponds to the first control in the first control region (e.g., the first input is a tap on the first control, such as a tap gesture by contact 5556 on Wi-Fi icon 5546, FIG. 5C21) and do not require that intensity of the first contact exceeds the first intensity threshold in order for the first-control-activation criteria to be met (e.g., the first control activation criteria are capable of being satisfied when the intensity of the first contact does not exceed the first intensity threshold), the device activates the first control for controlling the first function of the device (e.g., toggles the Wi-Fi control from ON to OFF and changes the appearance of Wi-Fi icon 5546 (e.g., from dark to light), as shown in FIGS. 5C21-5C22). In some embodiments, the first-control-activation criteria are satisfied with a hard, quick, tap that is still registered as a "tap" by a tap gesture recognizer, and the first-control-activation criteria do not always require that the intensity of the contact remain below a particular intensity threshold in order for the first-control activation criteria to be satisfied. In accordance with a determination that the first input meets second-control-activation criteria, wherein the second-control-activation criteria require that the first contact is detected at a second location on the touch-sensitive surface that corresponds to the second control in the first control region (e.g., the first input is a tap on the second control, such as a tap gesture by contact 5558 on Bluetooth icon 5548, FIG. 5C23) and do not require that intensity of the first contact exceeds the first intensity threshold in order for the second-control-activation criteria to be met (e.g., the second control activation criteria are capable of being satisfied when the intensity of the first contact does not exceed the first intensity threshold), the device activates the second control for controlling the second function of the device (e.g., toggles the Bluetooth control from OFF to ON and changes the appearance of Bluetooth icon 5548 (e.g., from light to dark), as shown in FIGS. 5C23-5C24). In some embodiments, the second-control-activation criteria are satisfied with a hard, quick, tap that is still registered as a "tap" by a tap gesture recognizer, and the second-control-activation criteria do not always require that the intensity of the contact remain below a particular intensity threshold in order for the second-control activation criteria to be satisfied. In some embodiments, the device generates a first tactile output when the control-region-expansion criteria are met by the first input, and the device generates a second tactile output when the first-control-activation criteria and/or the second-control-activation criteria are met by the first input, where the first tactile output and the second tactile output have different tactile output properties. In some embodiments (e.g., for devices that do not detect multiple levels of intensity variations in a contact), the control-region-expansion criteria are met by a touch-hold input by the first contact.

In some embodiments, in response to detecting the first input by the first contact on the touch-sensitive surface (1108): in accordance with a determination that the first input meets the first-control-activation criteria, the device changes an appearance of the first control without changing an appearance of the second control (e.g., when a tap input is detected on the first control, the device changes the toggle state of the first control (e.g., toggles the first control from ON to OFF) without making any change to the second control) (e.g., toggles the Wi-Fi control from ON to OFF and changes the appearance of Wi-Fi icon 5546 (e.g., from dark to light), without making any change to Bluetooth icon 5548, as shown in FIGS. 5C21-5C22); and in accordance with a determination that the first input meets the second-control-activation criteria, changing the appearance of the second control without changing the appearance of the first control (e.g., when a tap input is detected on the second control, the device changes the toggle state of the second control (e.g., toggles the control from OFF to ON) without making any change to the first control) (e.g., toggles the Bluetooth control from OFF to ON and changes the appearance of Bluetooth icon 5548 (e.g., from light to dark), without making any change to Wi-Fi icon 5546, as shown in FIGS. 5C23-5C24). Changing an appearance of a control in response to the control being activated without making any changes to the appearance of other controls provides improved feedback which enhances the operability of the device and makes the user-device interface more efficient (e.g., by allowing the user to see which control has been activated, and thereby helping the user to achieve an intended outcome with the required inputs) which, additionally, reduces power usage and improves battery life of the device by enabling the user to use the device more quickly and efficiently.

In some embodiments, in response to detecting the first input by the first contact on the touch-sensitive surface (1110): in accordance with a determination that the first input meets first expansion-hint criteria, wherein the first expansion-hint criteria require that a location of the first contact on the touch-sensitive surface corresponds to a portion of the first control region, the device displays visual feedback (e.g., an animation) that includes dynamically changing an appearance of the first control region in accordance with a change in an intensity parameter (e.g., intensity or rate of change in intensity) of the first contact (e.g., as shown in FIG. 5C14) (e.g., when the intensity of the contact changes, the appearance of the first control region and/or the appearance of the control panel user interface outside the first control region are dynamically changed in accordance with a magnitude of the changes in the intensity of the first contact, and/or in accordance with a rate by which the intensity of the first contact changes). In some embodiments, the first visual effect is a "springy" animation (e.g., an animation that oscillates back and forth in a virtual z-direction by an amount that is based on the detected intensity of the first contact or the rate of change of the intensity of the first contact). The first visual effect indicates that if the intensity of the first contact continues to increase and exceeds the first intensity threshold, the first control region will be expanded (e.g., "popped open") to display additional controls. In some embodiments, the first visual effect includes dynamically changing a size of the first control region in accordance with the change in the intensity parameter of the first contact (e.g., increasing the size with increasing intensity of the first contact). In some embodiments, the first visual effect includes dynamically deemphasizing portions of the control panel user interface outside of the first control region in accordance with the change in the intensity parameter of the first contact (e.g., increasing an amount of blurring and darkening applied to the portions of the control panel user interface outside of the first control region with increasing intensity of the first contact). In some embodiments, the visual feedback indicating that the first control region is sensitive to intensity-based inputs is displayed even when the input does not trigger an intensity-based operation (e.g., displaying an expanded control region). For example, the visual feedback is displayed in accordance with a determination that the first input meets first expansion-hint criteria, wherein the first expansion-hint criteria require that a location of the first contact on the touch-sensitive surface corresponds to an unoccupied portion of the first control region (e.g., a region that is not occupied by any controls) and the first expansion-hint criteria do not require that an intensity of the first contact exceed the first intensity threshold in order for the first expansion-hint criteria to be met. In some embodiments, the visual feedback is displayed whether a location of the first contact on the touch-sensitive surface corresponds to an unoccupied portion of the first control region (e.g., as shown in FIG. 5C25) or a location of the first contact on the touch-sensitive surface corresponds to location of a control in the first control region (e.g., as shown in FIG. 5C14). Dynamically changing an appearance of a control region in accordance with a change in intensity of a corresponding contact provides improved feedback which enhances the operability of the device and makes the user-device interface more efficient (e.g., by indicating that the control region is sensitive to intensity-based inputs, and thereby helping the user to achieve an intended outcome with the required inputs) which, additionally, reduces power usage and improves battery life of the device by enabling the user to use the device more quickly and efficiently.

In some embodiments, in response to detecting the first input by the first contact on the touch-sensitive surface (1112): in accordance with a determination that the first input meets second expansion-hint criteria, wherein the second expansion-hint criteria require that a location of the first contact on the touch-sensitive surface corresponds to a second control region distinct from the first control region or a third control that is located outside of the first control region (e.g., as shown in FIG. 5D36), and wherein the second expanded hint-display criteria do not require that an intensity of the first contact exceed the first intensity threshold, displaying a second visual effect (e.g., an animation) that dynamically changes in accordance with a change in an intensity parameter (e.g., intensity or rate of change in intensity) of the first contact (e.g., when the intensity of the contact changes, the appearance of the third control or the second control region, and/or the appearance of the control panel user interface outside the third control or the second control region, are dynamically changed in accordance with a magnitude of the changes in the intensity of the first contact, and/or in accordance with a rate by which the intensity of the first contact changes). In some embodiments, the second visual effect is a "springy" animation (e.g., an animation that oscillates back and forth in a virtual z-direction by an amount that is based on the detected intensity of the first contact or the rate of change of the intensity of the first contact). The second visual effect indicates that if the intensity of the first contact continues to increase and exceeds the first intensity threshold, the third control or the second control region will be expanded (e.g., "popped open") to display an expanded third control with additional control options, or an expanded second control region with additional controls (e.g., as shown in FIGS. 5D36-5D42). In some embodiments, the second visual effect includes dynamically changing a size of the third control or the second control region in accordance with the change in the intensity parameter of the first contact (e.g., increasing the size with increasing intensity of the first contact). In some embodiments, the second visual effect includes dynamically deemphasizing portions of the control panel user interface outside of the third control or the second control region in accordance with the change in the intensity parameter of the first contact (e.g., increasing an amount of blurring and darkening applied to the portions of the control panel user interface outside of the first control region with increasing intensity of the first contact). Dynamically changing an appearance of a control region in accordance with a change in intensity of a corresponding contact provides improved feedback which enhances the operability of the device and makes the user-device interface more efficient (e.g., by indicating that the control region is sensitive to intensity-based inputs, and thereby helping the user to achieve an intended outcome with the required inputs) which, additionally, reduces power usage and improves battery life of the device by enabling the user to use the device more quickly and efficiently.

In some embodiments, the control-region-expansion criteria do not require (1114) that the first contact be detected at a location on the touch-sensitive surface that corresponds to an unoccupied portion of the first control region (e.g., regions that are not currently occupied by any controls), in order for the control-region-expansion criteria to be met. In some embodiments, the first contact is detected at the first location (or the second location) on the touch-sensitive surface (e.g., the first contact is detected on the first control (or the second control)), and the control-region-expansion criteria are met by the first input by the first contact at the first location (or the second location) on the touch-sensitive surface (e.g., as shown in FIGS. 5C14-5C15). In some embodiments, the first contact is detected at a location on the touch-sensitive surface that corresponds to an unoccupied portion of the first control region; and the control-region-expansion criteria are met by the first input by the first contact at the location on the touch-sensitive surface that corresponds to the unoccupied portion of the first control region (e.g., as shown in FIGS. 5C25-5C26). Allowing the user to expand the control region by contacting any area of the control region enhances the operability of the device and makes the user-device interface more efficient (e.g., by reducing user mistakes when operating/interacting with the device by not limiting which areas can be contacted for expansion and helping the user to achieve an intended outcome with the required inputs) which, additionally, reduces power usage and improves battery life of the device by enabling the user to use the device more quickly and efficiently.

In some embodiments, while the expanded first control region is displayed, the device detects (1116) a second input, including detecting a second contact at a location on the touch-sensitive surface that corresponds to the expanded first control region (e.g., a press input on an expandable control icon (e.g., Wi-Fi icon 5546, FIG. 5C30) of the expanded first control region (e.g., expanded connectivity module 5550, FIG. 5C30) by contact 5564, FIG. 5C30). In some embodiments, the second input is detected after the contact lifts off of the touch-sensitive surface. In some embodiments, the second input is performed by the same contact that performed the first input (e.g., the first input includes an increase in intensity of the contact while over the first control region, and the second input includes, after the expanded first control region has been displayed, movement of the same contact over a respective control in the expanded control region and a confirmation input performed by the contact to activate the respective control in the expanded control region, where the confirmation input includes an increase in intensity of the contact while the contact is over the respective control, a pause in movement of the contact while the contact is over the respective control, or a liftoff of the contact while the contact is over the respective control). In response to detecting the second input by the second contact on the touch-sensitive surface (including detecting the first contact on the touch-sensitive surface and detecting that the first contact is maintained at its initial touch location with less than a threshold amount of movement before lift-off of the contact is detected (e.g., the first contact is a stationary contact)): in accordance with a determination that the second input meets enhanced-control-display criteria, wherein the enhanced-control-display criteria require that an intensity of the second contact exceeds the first intensity threshold (e.g., the second input is a press input within the expanded first control region (e.g., on one of the controls in the expanded first control region), such as a press input on an expandable control icon (e.g., Wi-Fi icon 5546, FIG. 5C30) by contact 5564) in order for the enhanced-control-display criteria to be met, the device replaces display of a respective control (e.g., a toggle control, such as Wi-Fi icon 5546, FIG. 5C30) in the expanded first control region with display of a first enhanced control (e.g., a slider control or a menu of control options, such as enhanced Wi-Fi control 5566, FIG. 5C31) corresponding to the respective control. In accordance with a determination that the second input meets third-control-activation-criteria, wherein the third-control-activation criteria require that the second contact is detected at a third location on the touch-sensitive surface that corresponds to the first control in the expanded first control region (e.g., the second input is a tap on the first control, such as a tap gesture by contact 5570 on Wi-Fi icon 5546, FIG. 5C35) and do not require that intensity of the second contact exceeds the first intensity threshold in order for the third-control-activation criteria to be met (e.g., the third control activation criteria are capable of being satisfied when the intensity of the second contact does not exceed the first intensity threshold), the device activates the first control for controlling the first function of the device (e.g., toggles the Wi-Fi control from ON to OFF (and changes the status of the Wi-Fi control from "AppleWiFi" to "Off") and changes the appearance of Wi-Fi icon 5546 (e.g., from dark to light), as shown in FIGS. 5C35-5C36). In some embodiments, the third-control-activation criteria are satisfied with a hard, quick, tap that is still registered as a "tap" by a tap gesture recognizer, and the third-control-activation criteria do not always require that the intensity of the contact remain below a particular intensity threshold in order for the third-control activation criteria to be satisfied. In accordance with a determination that the second input meets fourth-control-activation criteria, wherein the fourth-control-activation criteria require that the second contact is detected at a fourth location on the touch-sensitive surface that corresponds to the second control in the expanded first control region (e.g., the second input is a tap on the second control, such as a tap gesture by contact 5572 on Bluetooth icon 5548, FIG. 5C37) and do not require that intensity of the second contact exceeds the first intensity threshold in order for the fourth-control-activation criteria to be met (e.g., the fourth control activation criteria are capable of being satisfied when the intensity of the second contact does not exceed the first intensity threshold), the device activates the second control for controlling the second function of the device (e.g., toggles the Bluetooth control from ON to OFF (and changes the status of the Bluetooth control from "On" to "Off") and changes the appearance of Bluetooth icon 5548 (e.g., from dark to light), as shown in FIGS. 5C37-5C38). In some embodiments, the fourth-control-activation criteria are satisfied with a hard, quick, tap that is still registered as a "tap" by a tap gesture recognizer, and the fourth-control-activation criteria do not always require that the intensity of the contact remain below a particular intensity threshold in order for the fourth-control activation criteria to be satisfied. In some embodiments, the device generates a third tactile output when the enhanced-control-display criteria are met by the second input, and the device generates a fourth tactile output when the third-control-activation criteria and/or the fourth-control-activation criteria are met by the second input, where the third tactile output and the fourth tactile output have different tactile output properties. Replacing the display of a selected control with an enhanced control while in the expanded control region or activating a control in the expanded control region based on characteristics of a single input enhances the operability of the device and makes the user-device interface more efficient (e.g., by reducing the number of steps that are needed to achieve an intended outcome when operating the device and by providing additional functionality and control functions without cluttering the UI with additional displayed controls) which, additionally, reduces power usage and improves battery life of the device by enabling the user to use the device more quickly and efficiently.

In some embodiments, the respective control is (1118) the first control (e.g., the second input is a press input at the third location on the touch-sensitive surface that corresponds to a location of the first control in the expanded first control region, and the first control is expanded into a slider control or a menu of control options in response to the press input by the second contact), and the method includes: maintaining the second contact on touch-sensitive surface while displaying the first enhanced control (e.g., a slider control or a menu of control options) corresponding to the first control in the expanded first control region; detecting a third input by the second contact, including detecting movement of the second contact across the touch-sensitive surface to the fourth location on the touch-sensitive surface that corresponds to the second control in the expanded first control region, and detecting an increase in an intensity of the second contact that exceeds the first intensity threshold while the second contact is detected at the fourth location; and in response to detecting the third input by the second contact: in accordance with a determination that the third input meets the enhanced-control-display criteria (e.g., the third input is a press input on the second control within the expanded first control region), replacing display of the second control (e.g., a toggle control) in the expanded first control region with display of a second enhanced control (e.g., a slider control or a menu of control options) corresponding to the second control. In some embodiments, the device ceases to display the enhanced first control and restores display of the first control when the second contact moves away from the third location on the touch-sensitive surface. Replacing the display of a selected control with an enhanced control while in the expanded control region enhances the operability of the device and makes the user-device interface more efficient (e.g., by reducing the number of steps that are needed to achieve an intended outcome when operating the device and by providing additional functionality and control functions without cluttering the UI with additional displayed controls) which, additionally, reduces power usage and improves battery life of the device by enabling the user to use the device more quickly and efficiently.

In some embodiments, prior to displaying the expanded first control region, the first control is (1120) displayed in a first state in the first control region (e.g., the first control is initially in an OFF state) (e.g., Wi-Fi icon 5546 is initially in an OFF state in FIG. 5C13). While the first control is displayed in the expanded first control region (e.g., in expanded connectivity module 5550, FIG. 5C17), the second input changes a current state of the first control to a second state, distinct from the first state (e.g., the second input is a tap input on the first control and toggles the first control to the ON state) (e.g., tap gesture by contact 5534 toggles the Wi-Fi control from Off to ON, FIGS. 5C17-5C18). The method includes: while displaying the first control in the second state in the expanded first control region, detecting a fourth input that meets expansion-dismissal criteria (e.g., the expansion-dismissal criteria are met by a tap input outside of the expanded first control region, such as a tap gesture by contact 5536, FIG. 5C19); and in response to detecting the fourth input that meets the expansion-dismissal criteria: the device replaces display of the first expanded control region with display of the first control region, wherein the first control is displayed in the second state in the first control region (e.g., on dismissal of the expanded first control region, the change in appearance of any controls in the expanded first control region is preserved in the first control region (e.g., airplane indicator is still orange, Wi-Fi indicator is still filled in, etc.), as shown in FIGS. 5C19-5C20). Preserving changes to the state of a control after a transition from an expanded view to a non-expanded view of the control region provides improved feedback which enhances the operability of the device and makes the user-device interface more efficient (e.g., by allowing the user to keep track of changes to control elements, thereby helping the user to achieve an intended outcome and reducing user mistakes when operating/interacting with the device) which, additionally, reduces power usage and improves battery life of the device by enabling the user to use the device more quickly and efficiently.

In some embodiments, in response to detecting the first input by the first contact on the touch-sensitive surface (1122): in accordance with a determination that the first input meets the control-region-expansion criteria, the device applies a first visual change to a portion of the control panel user interface outside of the first control region (e.g., without applying the first visual change to the first control region or the expanded first control region) (e.g., when a press input is detected on the first control region (e.g., on the first control, on the second control, or on an unoccupied portion of the first control region), the appearance of the control panel user interface outside the first control region is altered (e.g., blurred and darkened), e.g., to focus the user's attention on the expanded first control region) (e.g., as shown in FIG. 5C14). In response to detecting the second input by the second contact on the touch-sensitive surface: in accordance with a determination that the second input meets the enhanced-control-display criteria, applying a second visual change to a portion of the expanded first control region outside of the first enhanced control (e.g., without applying the second visual change to the first enhanced control) (e.g., when a press input is detected on the first control within the expanded first control region, the appearance of the expanded first control region outside the first enhanced control is altered (e.g., blurred and darkened), e.g., to focus the user's attention on the enhanced first control) (e.g., as shown in FIGS. 5C31, 5C43, 5C44, and 5C45). In some embodiments, before the enhanced-control-display criteria are met by the second input, when the intensity of the second contact changes, the appearance of the first control and/or the appearance of the expanded first control region outside the first control are dynamically changed in accordance with a magnitude of the changes in the intensity of the second contact, and/or in accordance with a rate by which the intensity of the first contact changes (e.g., as shown in FIGS. 5C30 and 5C42). Applying a visual change to areas outside of expanded and enhanced control regions provides improved feedback by allowing the user to have a more focused view of the control regions that are currently expanded or enhanced, which enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the first input, the device displays (1124) an animation of the first control region that has a magnitude that is determined based on an intensity of the first input (e.g., as shown in FIG. 5C21 compared to FIG. 5C23). In some embodiments, the animation of the first control region occurs even when the first input does not meet the control-region-expansion criteria (e.g., when the first input meets the first-control-activation criteria or the second-control-activation criteria, as shown in FIGS. 5C21 and 5C23). For example, the first control region moves in a simulated z direction by an amount that is based on the intensity of the first input as a hint that the first control region is sensitive to intensity-based inputs. Displaying an animation of a control region in accordance with a change in intensity of a corresponding contact provides improved feedback which enhances the operability of the device and makes the user-device interface more efficient (e.g., by making the device appear more responsive to user input and helping the user to achieve an intended outcome with the required inputs) which, additionally, reduces power usage and improves battery life of the device by enabling the user to use the device more quickly and efficiently.

It should be understood that the particular order in which the operations in FIGS. 11A-11E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1200, 1300, 1400, 1500, 1600, 1800, and 1900) are also applicable in an analogous manner to method 1100 described above with respect to FIGS. 11A-11E. For example, the contacts, gestures, user interface objects, application views, control panels, controls, position thresholds, directional conditions, navigation criteria, movement parameters, thresholds, determinations, focus selectors, and/or animations described above with reference to method 1100 optionally have one or more of the characteristics of the contacts, gestures, user interface objects, position thresholds, application views, control panels, controls, directional conditions, navigation criteria, movement parameters, thresholds, determinations, focus selectors, and/or animations described herein with reference to other methods described herein (e.g., methods 600, 700, 800, 900, 1000, 1050, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 11A-11E are, optionally, implemented by components depicted in FIGS. 1A-1B. For example, display operation 1102, detection operation 1104, and replace/activate operation 1106 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12I are flow diagrams illustrating a method 1200 of displaying and editing a control panel user interface, in accordance with some embodiments. The method 1200 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

Method 1200 relates to providing options for a user to manage which control functions appear in a control panel user interface of a device. Specifically, the device displays the control panel user interface in a first configuration setting which includes a subset of selected control affordances. After displaying the control panel user interface and in response to a user input, the device displays a control panel settings interface which displays representations of the selected control affordances, as well as representations of unselected control affordances (e.g., control affordances that were not displayed in the first configuration of the control panel user interface). In response to detecting user selection of an unselected control affordance (e.g., a user input that changes the selection state for a control affordance from unselected to selected), and in further response to another user input for once again opening up the control panel user interface, the device displays the control panel user interface in a second configuration which includes the recently selected control affordance. Allowing the user to select which control affordances appear in the control panel user interface provides a customizable user interface that allows the user to decide which controls can be easily accessible. Providing customizable control accessibility enhances the operability of the device and makes the user-device interface more efficient (e.g., by providing easy access to key control functions of the device and by helping the user to achieve an intended outcome with fewer required inputs, and thereby reducing the number of inputs needed to interact with desired controls) which, additionally, reduces power usage and improves battery life of the device by enabling the user to use the device more quickly and efficiently.

Method 1200 is performed at an electronic device with a display and a touch-sensitive surface (e.g., a touch-screen display that serves both as the display and the touch-sensitive surface). The device displays (1202) a first user interface (e.g., the home screen user interface, a lock screen user interface, a wake screen user interface, a user interface that displays missed notifications, an application user interface, a mini widget screen user interface) on the display (e.g., lock screen user interface 5502 in FIG. 5C1, home screen user interface 5512 in FIG. 5C4, application user interface 5520 in FIG. 5C7, or multitasking user interface 5526 in FIG. 5C10). While displaying the first user interface, the device detects (1204) a first input (e.g., as shown in FIGS. 5C2, 5C5, 5C8, and 5C11). In response to detecting the first input, the device displays (1206) a control panel user interface in a first configuration (e.g., control panel user interface 5518, FIG. 5D1). As used herein, the configuration of the control panel user interface refers to the number, type, and arrangement of controls in the control panel user interface, and not to the value, setting, or state of a given control. The control panel user interface in the first configuration includes a first set of control affordances in a first region of the control panel user interface (e.g., a customizable region that is distinct from a preconfigured, non-customizable region of the control panel user interface) that correspond to respective functions of the device (e.g., the first set of control affordances includes a control module for controlling a set of peripherals of the device, a WiFi control affordance for controlling a WiFi connection of the device, a brightness slider for controlling brightness of the display, a control module for controlling media playback on the device, application launch icons for a set of frequently used applications, including a camera app, a flashlight app, a calculator app, etc.), and a first subset of the first set of control affordances are not user-configurable (e.g., control affordances such as airplane mode icon 5542, cellular data icon 5544, Wi-Fi icon 5546, Bluetooth icon 5548, audio control 5622, orientation lock icon 5624, Do Not Disturb icon 5626, AirPlay icon 5628, brightness control 5630, and volume control 5632 of control panel user interface 5518 in FIG. 5D1 are not user-configurable) and a second subset of the first set of control affordances are user-configurable (e.g., control affordances such as flashlight icon 5600, timer icon 5602, calculator icon 5604, and camera icon 5606 of control panel user interface 5518 in FIG. 5D1 are user-configurable). In some embodiments, the control panel user interface in a given configuration is overlaid on top of the first user interface, fully or partially obscuring the first user interface (e.g., a blurred version or other versions of the first user interface with an altered appearance). after displaying the control panel user interface in the first configuration (e.g., after dismissing the control panel user interface with the first configuration and returning to the home screen user interface), the device detects (1208) a second input (e.g., detecting selection of application launch icon for a settings application on the home screen, such as a tap gesture by contact 5642 on settings icon 446 in FIG. 5D4). In response to detecting the second input (and optionally, additional inputs to navigate to the desired settings user interface), the device displays (1210) a control panel settings user interface (e.g., control panel settings user interface 5648, FIG. 5D7) (and ceases to display the home screen user interface), wherein the control panel settings user interface (concurrently) displays: representations of the second subset of the first set of control affordances in a selected state (e.g., flashlight module, timer module, calculator module, and camera module in control panel settings user interface 5648, FIG. 5D7) without displaying the first subset of the first set of control affordances in the selected state; and representations of a second set of control affordances, distinct from the first set of control affordances, in an unselected state (e.g., Home module and accessibility module in control panel settings user interface 5648, FIG. 5D7), wherein control affordances that correspond to representations of the second set of control affordances are not included (e.g., not displayed) in the control panel user interface in the first configuration (e.g., control panel user interface 5518 in FIG. 5D1). In some embodiments, the second subset of control affordances (that are user-configurable) are displayed in a first list of control affordances that are currently selected for display in the control panel user interface (e.g., in the "Selected Modules" list of FIG. 5D7), where the first list is editable and the first subset of controls are not included in the editable first list (e.g., representations of the first subset of control affordances are included in a non-editable list that is distinct from the first list). In some embodiments, each representation of a control affordance in the second subset of control affordances has a corresponding toggle selection control set to the "ON" state. In some embodiments, the first subset of the first set of control affordances are not displayed in the control panel settings user interface (e.g., as shown in FIG. 5D7). In some embodiments, the first subset of the first set of control affordances are displayed in the control panel settings user interface, but their selection states are not editable (e.g., their corresponding toggle selection controls are grayed out, or they do not have corresponding toggle selection controls). In some embodiments, the representations of the second set of control affordances are included in a second list of control affordances that are not currently included in the control panel user interface (e.g., in the "More Modules" list of FIG. 5D7) but are available to be included in the configurable portion(s) of the control panel user interface. In some embodiments, each representation of a control affordance in the second set of control affordances has a corresponding toggle selection control in the "OFF" state. While displaying the control panel settings user interface, the device detects (1212) one or more configuration inputs, including detecting a third input that changes a selection state for a representation of a first control affordance (e.g., Home module, FIG. 5D8) in the second set of control affordances from the unselected state to the selected state (e.g., such as a tap gesture by contact 5650 on the "+" selection control for the Home module, FIG. 5D8) (e.g., the third input drags the representation of the first control affordance from the second list to the first list, or toggles the selection control corresponding to the representation of the first control affordance from the "OFF" state to the "ON" state). After detecting the third input that changes the selection state for the representation of the first control affordance from the unselected state to the selected state, the device detects (1214) a fourth input (e.g., such as a tap gesture by contact 5652 on the "Done" icon of control panel settings user interface 5648, FIG. 5D10). In response to detecting the fourth input, the device displays (1216) (e.g., in accordance with a determination that the selection state of the first control affordance has been changed from the unselected state to the selected state in the control panel settings user interface) the control panel user interface in a second configuration (e.g., control panel user interface 5518 in FIG. 5D11) that is distinct from the first configuration (e.g., control panel user interface 5518 in FIG. 5D1), wherein the control panel user interface in the second configuration includes the first control affordance (e.g., control panel user interface 5518 in FIG. 5D11 includes Home icon 5608) (and any other control affordances of the first set of control affordances that are also in the selected state in the control panel settings user interface) in the first region of the control panel user interface.

In some embodiments, detecting the one or more configuration inputs includes (1218) detecting a fifth input that changes the selection state for a representation of a second control affordance in the second subset of the first set of control affordances from the selected state to the unselected state (e.g., an input dragging the representation of the second control affordance from the first list to the second list, or an input that changes the toggle selection control corresponding to the representation of the second control affordance from the "ON" state to the "OFF" state), and displaying the control panel user interface in the second configuration includes excluding the second control affordance from the control panel user interface in the second configuration (e.g., in accordance with a determination that the selection state of the second control affordance has been changed from the selected state to the unselected state in the control panel settings user interface). Allowing the user to select which control affordances appear in the control panel user interface provides a customizable user interface that allows the user to decide which controls can be easily accessible and enhances the operability of the device and makes the user-device interface more efficient (e.g., by providing easy access to key control functions of the device and by helping the user to achieve an intended outcome with fewer required inputs, and thereby reducing the number of inputs needed to interact with desired controls) which, additionally, reduces power usage and improves battery life of the device by enabling the user to use the device more quickly and efficiently.

In some embodiments, the control panel user interface in the first configuration displays (1220) a third control affordance and a fourth control affordance of the first set of control affordances in a first order (e.g., as shown in FIG. 5D12) in accordance with an order of the representations of the first set of control affordances in the control panel settings user interface (e.g., the order of the first set of control affordances in the first list before the one or more configuration inputs are detected), detecting the one or more configuration inputs includes detecting a sixth input that reorders representations of the third control affordance and the fourth control affordance in the control panel settings user interface (e.g., as shown in FIGS. 5D24-5D25), and displaying the control panel user interface in the second configuration includes displays the third control affordance and the fourth control affordance in a second order that is different from the first order (e.g., as shown in FIG. 5D27, where Apple TV remote icon 5612 has been moved) (e.g., in accordance with a current order of the representations of the control affordances that are currently included in the first list). In some embodiments, some of the first set of control affordances are fixed in position, and the device does not move representations of these fixed control affordances from the first list to the second list, or reorder the representations of these fixed control affordances relative to other control affordances in the first list. In some embodiments, the device allows the user to reorder the fixed control affordances among themselves, e.g., within the first row of the configurable region of the control panel user interface. Allowing the user to rearrange the order of control affordances in the control panel user interface provides a customizable user interface that enhances the operability of the device and makes the user-device interface more efficient (e.g., by providing easy access to key control functions of the device and by helping the user to achieve an intended outcome with fewer required inputs, and thereby reducing the number of inputs needed to interact with desired controls) which, additionally, reduces power usage and improves battery life of the device by enabling the user to use the device more quickly and efficiently.

In some embodiments, the control panel user interface (e.g., the control panel user interface with the first configuration) displays (1222) an accessibility control affordance (e.g., accessibility icon 5610, FIG. 5D27), and the method includes: while displaying the accessibility control affordance in the control panel user interface, detecting an input associated with the accessibility control affordance, including detecting a contact on the touch-sensitive surface at a location that corresponds to the accessibility control affordance (e.g., such as a press gesture by contact 5670, FIG. 5D28); in response to detecting the input associated with the accessibility control affordance: in accordance with a determination that control-expansion criteria are met by the input associated with the accessibility control affordance (e.g., the control-expansion criteria require that a change in intensity of the contact in the input associated with the accessibility control affordance exceeds a first intensity threshold (e.g., the control-expansion criteria are met by a press input that meets intensity activation criteria (e.g., a press input by a contact with a characteristic intensity that is above the light press intensity threshold $IT_L$), as shown in FIGS. 5D28-5D29) or that the contact in the input associated with the accessibility control affordance is maintained for at least a threshold amount of time (e.g., the control-expansion criteria are met by a long-press input by the contact) in order for the control-expansion criteria to be met), displaying a plurality of selectable control options that corresponds to the accessibility control affordance (e.g., displaying an expanded menu that includes selectable options that correspond to a plurality of accessibility control functions, such as a contrast enhancement function, a noise cancelation function, a magnification function, etc., as shown in FIG. 5D29). In some embodiments, the device selects one or more of the plurality of selectable control options in response to one or more selection inputs received from the user (e.g., as shown in FIGS. 5D30-5D31). In some embodiments, only one of the selectable control options can be selected at any time, and a new selection of one selectable control option cancels the selection of an existing selection of another selectable control option. In accordance with a determination that control-toggle criteria are met by the input associated with the accessibility control affordance (e.g., such as a tap gesture by contact 5678, FIG. 5D34) wherein the control-toggle criteria require that one of a plurality of selectable options corresponding to the accessibility control affordance is currently selected when the input associated with the accessibility control affordance is detected in order for the control-toggle criteria to be met (e.g., this condition is met when the option for the contrast enhancement function is currently selected or when the option for the reduce white point function is currently selected, as shown in FIG. 5D32), toggling a control function that corresponds to the currently selected control option (e.g., if the contrast enhancement function is the currently selected option, the contrast enhancement function is toggled on or off by the tap input on the accessibility control affordance, depending on whether the contrast enhancement function is currently on or off). In the example of FIGS. 5D31-5D35, the reduce white point function is currently selected and the tap input by contact 5678 in FIG. 5D34 toggles the reduce white point function off. In some embodiments, the control-toggle criteria do not require that a change in intensity of the contact in the input associated with the accessibility control affordance exceeds the first intensity threshold or that the contact in the input associated with the accessibility control affordance is maintained for at least the threshold amount of time in order for the control-toggle criteria to be met (e.g., the control-toggle criteria are met by a tap input by the contact, when one of the selectable options corresponding to the accessibility control affordance is currently selected). In some embodiments, if none of the plurality of selectable options that correspond to the accessibility control affordance is currently selected, tapping on the accessibility control affordance does not toggle any control function. In some embodiments, if none of the plurality of selectable options that correspond to the accessibility control affordance is currently selected, tapping on the accessibility control affordance causes the plurality of selectable options to be displayed, so that the user can select one or more of the selectable options. In some embodiments, if more than one of the plurality of selectable options that correspond to the accessibility control affordance are currently selected, tapping on the accessibility control affordance causes the plurality of selectable options to be displayed. In some embodiments, if more than one of the plurality of selectable options that correspond to the accessibility control affordance are currently selected, tapping on the accessibility control affordance toggles the most recently selected option among the currently selected options. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1224) a TV remote control affordance (e.g., Apple TV remote icon 5612, FIG. 5D36). While displaying the TV remote control affordance in the control panel user interface, the device detects an input associated with the TV remote control affordance, including detecting a contact on the touch-sensitive surface at a location that corresponds to the TV remote control affordance. In response to detecting the input associated with the TV remote control affordance: in accordance with a determination that control-expansion criteria are met by the input associated with the TV remote control affordance (e.g., the control-expansion criteria require that a change in intensity of the contact in the input associated with the TV remote control affordance exceeds a first intensity threshold (e.g., the control-expansion criteria are met by a press input that meets intensity activation criteria (e.g., a press input by a contact with a characteristic intensity that is above the light press intensity threshold $IT_L$), such as a press gesture by contact 5688 as shown in FIGS. 5D36 and 5D42) or that the contact in the input associated with the TV remote control affordance is maintained for at least a threshold amount of time (e.g., the control-expansion criteria are met by a long-press input by the contact) in order for the control-expansion criteria to be met), the device displays a navigation region for navigating a focus selector in accordance with movement of a contact on the touch-sensitive surface (e.g., displaying a trackpad that navigates a focus selector around a locally or remotely displayed user interface in accordance with movement of a contact on the touch-sensitive surface (e.g., within the displayed trackpad on a touchscreen display)) (e.g., as shown in FIG. 5D42). In some embodiments, the navigation region that is displayed on the display of the electronic device (e.g., a mobile telephony device or a tablet device) is also displayed (e.g., replicated) on a remote display device (e.g., a television set, or a computer monitor) that is coupled to the electronic device through a networking device (e.g., a media console, a set-top box, a router, etc.). In some embodiments, the navigation region that is displayed on the display of the electronic device is mapped to a user interface (e.g., a user interface with a navigable menu and various control affordances, e.g., for selecting media programs and controlling playback of the media programs) that is concurrently displayed on the remote display device, such that a location of the focus selector at the electronic device corresponds to a location in the user interface displayed at the remote display device, and an input detected in the navigation region displayed at the electronic device is treated as an input directed to a corresponding region in the user interface displayed at the remote display device. In accordance with a determination that function-activation criteria are met by the input associated with the TV remote control affordance (e.g., the function-activation criteria do not require that a change in intensity of the contact in the input associated with the TV remote control affordance exceeds the first intensity threshold or that the contact in the input associated with the TV remote control affordance is maintained for at least the threshold amount of time in order for the function-activation criteria to be met (e.g., the function-activation criteria are met by a tap input by the contact)), the device displays a user interface of an application that corresponds to the TV remote control affordance (e.g., launching the TV remote application that optionally includes a navigation region for navigating the focus selector and/or one or more virtual buttons that simulate functionality of buttons on a hardware remote for the locally or remotely displayed user interface). Allowing the user to expand a control affordance (to display a navigation region for navigating around a locally or remotely displayed device) or to activate a control function based on variations in the detected input enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1226) a text-size control affordance (e.g., type size icon 5614, FIG. 5D36). While displaying the text-size control affordance in the control panel user interface, the device detects an input associated with the text-size control affordance that meets control-expansion criteria (including detecting a contact on the touch-sensitive surface at a location that corresponds to the text-size control affordance, and that a change in intensity of the contact in the input associated with the text-size control affordance exceeds a first intensity threshold (e.g., such as a press gesture by contact 5682, FIG. 5D36) (e.g., the control-expansion criteria are met by a press input that meets intensity activation criteria (e.g., a press input by a contact with a characteristic intensity that is above the light press intensity threshold $IT_L$)) or that the contact in the input associated with the text-size control affordance is maintained for at least a threshold amount of time (e.g., the control-expansion criteria are met by a long-press input by the contact). In response to detecting the input associated with the text-size control affordance that meets the control-expansion criteria: in accordance with a determination that an associated toggle control function (e.g., the toggle function of the accessibility control affordance) of the text-size control affordance is in a first state (e.g., the accessibility control is in an "OFF" state), displaying a first set of selectable options corresponding to the text-size control affordance (e.g., as shown in FIG. 5D38) (e.g., displaying a first number of text sizes ranging from a first minimum size to a first maximum size (e.g., 8 pt, 10 pt, 12 pt, 16 pt, 20 pt, and 24 pt)). In accordance with a determination that the associated toggle control function (e.g., the toggle function of the accessibility control affordance) of the text-size control affordance is in a second state (e.g., the accessibility control is in an "ON" state), displaying a second set of selectable options corresponding to the text-size control affordance that are distinct from the first set of selectable options (e.g., as shown in FIG. 5D39) (e.g., displaying a partially overlapping set of selectable options that are biased toward the top half of the first set of selectable options) (e.g., displaying a second number of text sizes ranging from a second minimum size to a second maximum size (e.g., 12 pt, 16 pt, 24 pt, 36 pt, and 48 pt)). For example, when the accessibility control is turned on, the set of text sizes that is provided is mainly focused on assisting the user to see the text (and hence sizes are larger and gaps between sizes are wider) and when the accessibility control is turned off, the set of text sizes that is provided is mainly focused on allowing the user to choose an aesthetically pleasing visual appearance for the text (and hence the sizes are not very large, and the gaps between sizes are finer). Expanding a text-size control affordance to display a first set of selectable options corresponding to text size if the accessibility control is OFF and displaying a second set of selectable options corresponding to text size if the accessibility control is ON enhances the operability of the device and makes the user-device interface more efficient (e.g., by providing customized options to help the user choose an aesthetically pleasing visual appearance for the text or assisting the user to see the text, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1228) a low power mode control affordance (e.g., low power mode icon 5616, FIG. 5D12). While displaying the low power mode control affordance in the control panel user interface, the device detects an input associated with the low power mode control affordance, including detecting a contact on the touch-sensitive surface at a location that corresponds to the low power mode control affordance. In response to detecting the input associated with the low power mode control affordance: in accordance with a determination that the input associated with the low power mode control affordance meets control-expansion criteria (e.g., in accordance with a determination that a change in intensity of the contact in the input associated with the low power mode control affordance exceeds a first intensity threshold (e.g., the control-expansion criteria are met by a press input that meets intensity activation criteria (e.g., a press input by a contact with a characteristic intensity that is above the light press intensity threshold $IT_L$)) or that the contact in the input associated with the low power mode control affordance is maintained for at least a threshold amount of time (e.g., the control-expansion criteria are met by a long-press input by the contact)), the device displays a respective settings user interface for controlling a power mode of the electronic device (e.g., launching the settings application and displaying the settings page for the low power mode in the settings application). The lower power mode temporarily reduces power consumption until the phone is fully charged or connected to a charger. In some embodiments, when the low power mode is on, certain functions of the device (e.g., voice-activated digital assistant, background application refresh, automatic downloads, and certain visual effects) are reduced or turned off. In some embodiments, the settings user interface for the low power mode includes a toggle control for turning the low power mode on and off. In some embodiments, the settings user interface for the low power mode displays a list of applications with their corresponding power consumption statistics. In some embodiments, the list of applications also each includes a toggle control for turning off the corresponding application when the low power mode is turned on. In accordance with a determination that the input associated with the low power mode control affordance meets control-toggle criteria (e.g., the control-toggle criteria are met by a tap input by the contact), the device toggles a state of the power mode of the electronic device (e.g., the low power mode is toggled on or off by the tap input on the low power control affordance, depending on whether the low power mode is currently on or off). In some embodiments, the low power mode control affordance is a toggle control and the toggle state of the toggle control corresponds to the ON/OFF state of the low power mode. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1230) a car mode control affordance (e.g., CarPlay icon 5618, FIG. 5D12). When the car mode control affordance is in a first state (e.g., toggled OFF), a first set of functions are provided on a lock screen user interface of the electronic device (e.g., the first set of functions is a subset, less than all, of the functions that would be available on the device when the device is unlocked). The first set of functions is a restricted set of functions that is made available on the lock screen due to privacy concerns for the user. When the car mode control affordance is in a second state (e.g., toggled ON), a second set of functions are provided on the lock screen user interface of the electronic device, wherein the second set of functions include the first set of functions and one or more additional functions that are not available on the lock screen user interface when the car mode control affordance is in the first state. In some embodiments, a tap input on the car mode control affordance launches the settings application and displays a car mode settings page, or launches a third-party car-mode application and displays a user interface of the third-party car-mode application for controlling audio connections between the device and a vehicle. In some embodiments, the first set of functions that are available on the lock screen user interface when the car mode is off include limited application functions that are restricted due to privacy protection for the user (e.g., limited ability to view full content and to perform destructive, irreversible actions (e.g., deletion of information, etc.)). In some embodiments, the second set of functions that are available on the lock screen user interface when the car mode is on include limited application functions that are aimed to reduce distractions to the driver during vehicle navigation (e.g., limited text messaging functions (e.g., voice-based outgoing messages only), limited user interface navigation using touch inputs (e.g., text entry is disabled, and only voice commands are used for user interface navigation), and certain applications with heavy visual content and extensive interactions (e.g., web browsing, etc.) are disabled, etc.). The second set of functions represents a further restriction on the first set of functions based on the modes of interaction (e.g., input and output modes), rather than the availability of content and the types of ultimate tasks (e.g., sending a message, learning the content of a received message, learning the content of a calendar event, performing a search, starting map navigation to a destination, etc.) that can be accomplished. In some embodiments, the second set of functions also include additional functionalities that are available to better facilitate the user in using the device under the additional restrictions on the modes of interaction, such as hands-free menu navigation, auto-activation of dictation and narration for text messaging, etc. Providing a first set of functions on a lock screen user interface when a car mode control affordance is OFF and providing a second set of functions on the lock screen user interface when the car mode control affordance is ON enhances the operability of the device and makes the user-device interface more efficient (e.g., by helping the user to better use the device under driving conditions and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1232) a Do Not Disturb mode control affordance (e.g., Do Not Disturb icon 5626, FIG. 5D36). While displaying the Do Not Disturb mode control affordance in the control panel user interface, the device detects an input associated with the Do Not Disturb mode control affordance, including detecting a contact on the touch-sensitive surface at a location that corresponds to the Do Not Disturb mode control affordance. In response to detecting the input associated with the Do Not Disturb mode control affordance: in accordance with a determination that the input associated with the Do Not Disturb mode control affordance meets control-expansion criteria (e.g., such as a press gesture by contact 5680 in FIGS. 5D36-5D37) (e.g., in accordance with a determination that a change in intensity of the contact in the input associated with the Do Not Disturb mode control affordance exceeds a first intensity threshold (e.g., the control-expansion criteria are met by a press input that meets intensity activation criteria (e.g., a press input by a contact with a characteristic intensity that is above the light press intensity threshold $IT_L$)) or that the contact in the input associated with the Do Not Disturb mode control affordance is maintained for at least a threshold amount of time (e.g., the control-expansion criteria are met by a long-press input by the contact)), the device displays a plurality of selectable options (e.g., in a zoomed view of the control affordance) that correspond to a Do Not Disturb mode of the electronic device (e.g., enhanced Do Not Disturb control 5690, FIG. 5D37) (e.g., the plurality of selectable options include options that specify different amounts of time that the "Do Not Disturb" function are to be turned on (or off), and an option that specifies a location-based criterion for turning on (or off) the "Do Not Disturb" mode (e.g., "Turn on Do Not Disturb mode until I leave this location" or "Turn off Do Not Disturb mode until I arrive at the Office")). In accordance with a determination that the input associated with the Do Not Disturb mode control affordance meets control-toggle criteria (e.g., the control-toggle criteria are met by a tap input by the contact), the device toggles a state of the Do Not Disturb mode of the electronic device (e.g., the Do Not Disturb mode is toggled on or off by the tap input on the Do Not Disturb control affordance, depending on whether the Do Not Disturb mode is currently on or off). In some embodiments, the Do Not Disturb mode control affordance is a toggle control and the toggle state of the toggle control corresponds to the ON/OFF state of the Do Not Disturb mode. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1234) a WiFi connection control affordance (e.g., Wi-Fi icon 5546, FIG. 5C29). While displaying the WiFi connection control affordance in the control panel user interface (or in an expanded control region, as shown in FIG. 5C29), detecting an input associated with the WiFi connection control affordance, including detecting a contact on the touch-sensitive surface at a location that corresponds to the WiFi connection control affordance. In response to detecting the input associated with the WiFi connection control affordance: in accordance with a determination that the input associated with the WiFi connection control affordance meets control-expansion criteria (e.g., such as a press input by contact 5564, FIGS. 5C30-5C31) (e.g., in accordance with a determination that a change in intensity of the contact in the input associated with the WiFi connection control affordance exceeds a first intensity threshold (e.g., the control-expansion criteria are met by a press input that meets intensity activation criteria (e.g., a press input by a contact with a characteristic intensity that is above the light press intensity threshold $IT_L$)) or that the contact in the input associated with the WiFi connection control affordance is maintained for at least a threshold amount of time (e.g., the control-expansion criteria are met by a long-press input by the contact)), the device displays a plurality of selectable options (e.g., enhanced Wi-Fi control 5566, FIG. 5C31) (e.g., in a zoomed view of the control affordance) that correspond to a WiFi connection of the electronic device (e.g., including options corresponding to different WiFi networks that are detected by the device, options to disconnect from a currently connected WiFi network based on a scheduled time (e.g., connect to this network after 5 pm) and/or based on a location-based criterion (e.g., "leave this network when I leave this location"), and an option to open the WiFi settings page in a settings application, or to launch a third-party application for controlling the WiFi settings). In accordance with a determination that the input associated with the WiFi connection control affordance meets control-toggle criteria (e.g., such as a tap input by contact 5570, FIG. 5C35) (e.g., the control-toggle criteria are met by a tap input by the contact), the device toggles a state of the WiFi connection of the electronic device (e.g., WiFi connection is toggled on or off by the tap input on the WiFi connection control affordance, depending on whether WiFi connection is currently on or off) (e.g., as shown in FIGS. 5C35-5C36). In some embodiments, the WiFi connection control affordance is a toggle control and the toggle state of the toggle control corresponds to the ON/OFF state of WiFi connection at the electronic device. In some embodiments, toggling the state of the WiFi connection includes turning WiFi capabilities of the device on/off. In some embodiments, toggling the state of the WiFi connection includes disconnecting from currently connected WiFi access points/networks without turning WiFi capabilities of the device off and, optionally, setting a time based or location based criteria for attempting to reconnect to nearby WiFi access points/networks. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1236) a Bluetooth connection control affordance (e.g., Bluetooth icon 5548, FIG. 5C41), While displaying the Bluetooth connection control affordance in the control panel user interface (or in an expanded control region, as shown in FIG. 5C41), the device detects an input associated with the Bluetooth connection control affordance, including detecting a contact on the touch-sensitive surface at a location that corresponds to the Bluetooth connection control affordance. In response to detecting the input associated with the Bluetooth connection control affordance: in accordance with a determination that the input associated with the Bluetooth connection control affordance meets control-expansion criteria (e.g., such as a press input by contact 5576 in FIGS. 5C42-5C43) (e.g., in accordance with a determination that a change in intensity of the contact in the input associated with the Bluetooth connection control affordance exceeds a first intensity threshold (e.g., the control-expansion criteria are met by a press input that meets intensity activation criteria (e.g., a press input by a contact with a characteristic intensity that is above the light press intensity threshold $IT_L$)) or that the contact in the input associated with the Bluetooth connection control affordance is maintained for at least a threshold amount of time (e.g., the control-expansion criteria are met by a long-press input by the contact)), the device displays a plurality of selectable options (e.g., in enhanced Bluetooth control 5580, FIG. 5C43) (e.g., in a zoomed view of the control affordance) that correspond to a Bluetooth connection of the electronic device (e.g., including options corresponding to different Bluetooth devices that are detected by the device, options to disconnect from a currently connected Bluetooth based on a scheduled time (e.g., "connect to this device after 5 pm") and/or based on a location-based criterion (e.g., "disconnect this device when I leave this location"), and an option to open the Bluetooth settings page in a settings application, or to launch a third-party application for controlling the Bluetooth settings). In accordance with a determination that the input associated with the Bluetooth connection control affordance meets control-toggle criteria (e.g., such as a tap input by contact 5572, FIG. 5C37) (e.g., the control-toggle criteria are met by a tap input by the contact), the device toggles a state of the Bluetooth connection of the electronic device (e.g., as shown in FIGS. 5C37-5C38) (e.g., Bluetooth connection is toggled on or off by the tap input on the Bluetooth connection control affordance, depending on whether Bluetooth connection is currently on or off). In some embodiments, the Bluetooth connection control affordance is a toggle control and the toggle state of the toggle control corresponds to the ON/OFF state of Bluetooth connection at the electronic device. In some embodiments, when the Bluetooth control affordance is toggled by a tap input, if a wireless device is currently connected to the device via a Bluetooth connection (e.g., the Bluetooth control affordance is currently in the "ON" state), the device generates an alert to the user, such as "Bluetooth device currently connected, do you want to leave Bluetooth on?" or "Bluetooth device currently connected, are you sure you want to turn off Bluetooth?" In some embodiments, if no additional input changing the previously received toggle input within a threshold amount of time, the device turns off Bluetooth on the device. In some embodiments, toggling the state of the Bluetooth connection includes turning Bluetooth capabilities of the device on/off. In some embodiments toggling the state of the Bluetooth connection includes disconnecting from currently connected Bluetooth devices without turning Bluetooth capabilities of the device off and, optionally, setting a time based or location based criteria for attempting to reconnect to nearby Bluetooth devices that have been paired to the device. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1238) an airplane mode control affordance (e.g., airplane mode icon 5542, FIG. 5D1) that, when activated by an input that meets control toggle criteria (e.g., a tap input) toggles an ON/OFF state of an airplane mode of the electronic device. While the airplane mode is off at a first time (e.g., the airplane mode control affordance is in the OFF state), the device detects a first input associated with the airplane mode control affordance that turns on the airplane mode using the airplane mode control affordance. In response to detecting the first input associated with the airplane mode control affordance that turns on the airplane mode, the device turns on the airplane mode, including disabling a first set of network connections that are associated with the airplane mode (e.g., the first set of network connections include a default set of network connections (e.g., telephony, WiFi, and Bluetooth), or a previously stored, customized set of network connections (e.g., telephony only). While the airplane mode is on as a result of the first input associated with the airplane mode control affordance, the device detects one or more modification inputs that selectively enable a first subset of the first set of network connections (e.g., the user enables the WiFi connection manually using the WiFi connection control affordance in the control panel user interface). After detecting the one or more modification inputs (and while the airplane mode is turned on as a result of the first input associated with the airplane mode control affordance), the device detects a second input associated with the airplane mode control affordance that turns off the airplane mode. In response to detecting the second input associated with the airplane mode control affordance, the device turns off the airplane mode, including enabling a second subset of the first set of network connections that are distinct from the first subset of the first set of network connections (e.g., the telephony and Bluetooth connections are re-enabled, while the WiFi connection is already enabled). While the airplane mode is off at a second time as a result of the second input associated with the airplane mode control affordance, the device detects a third input associated with the airplane mode control affordance that turns on the airplane mode using the airplane mode control affordance. In response to detecting the third input associated with the airplane mode control affordance that turns on the airplane mode, the device turns on the airplane mode, including disabling the second subset of the first set of network connections without disabling the first subset of the first set of network connections (e.g., telephony and Bluetooth connections are disabled, and the WiFi connection stays enabled). In some embodiments, the control user interface includes an airplane mode control affordance that controls the enabled and disabled states of two or more types of network connections (e.g., WiFi, cellular, Bluetooth, etc.). Specifically, when the airplane mode is turned on, the two or more types of network connections are disabled by default; and when the airplane mode is turned off, the two or more types of network connections are enabled again. In some embodiments, the device also provides separate control affordances for controlling the enabled and disabled states of individual types of network connections (e.g., a WiFi control affordance for toggling the WiFi connection on and off, and a separate Bluetooth control affordance for toggling the Bluetooth connection on and off). In some embodiments, when the airplane mode is first turned on, all the connections that are controlled by the airplane mode are turned off (e.g., cellular connection, WiFi connection, Bluetooth connection, etc. are all turned off). If some of the connections controlled by the airplane mode also have separate control affordances, the appearance of those control affordances change to indicate that their corresponding connections have been turned off. While the airplane mode is turned on, if the device detects subsequent inputs that toggles one or more of the individual control affordances for connections that that are also controlled by the airplane mode, the device changes the connection states of those individual control affordances according to the subsequent inputs. When the airplane mode is turned on later, the current states of the connections that are controlled by the airplane mode are stored, such that, the next time that the airplane mode is turned on again, the connection states of the connections that are controlled by the airplane mode are set in accordance with the stored states of the connections. For example, if the user turns on the airplane mode, the device sets the states of the WiFi and Bluetooth connections to the last stored states for WiFi and Bluetooth (e.g., Bluetooth OFF and WiFi ON). While the airplane mode is on, the device detects user inputs to toggle the WiFi control affordance from ON to OFF and toggle the Bluetooth from OFF to ON. While the Bluetooth is ON and the WiFi is OFF, the device detects an input that turns off the airplane mode. In some circumstances, the user subsequently changes the toggle states of WiFi and Bluetooth in any number of configurations when the airplane mode is OFF. When the airplane mode is turned on again, regardless of the current states of the WiFi and Bluetooth control affordances, the device sets the states of the WiFi and Bluetooth connections to the stored states (e.g., Bluetooth ON and WiFi OFF). In some embodiments, when airplane mode is activated, the disconnection of WiFi and Bluetooth from paired devices (and/or the disabling of WiFi and Bluetooth) is momentarily delayed (e.g., for 1-15 seconds) to see if the user re-enables WiFi or Bluetooth. This delay ensures that peripherals that are closely linked to the functioning of the device (e.g., wirelessly connected headphones, or a wirelessly connected stylus) do not have to reconnect to the device if the user activates airplane mode and then selects WiFi and/or Bluetooth to be active during airplane mode. Storing the states of connections that are controlled by airplane mode and restoring the stored states of the connections the next time airplane mode is turned on enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1240) a screen recording control affordance. While displaying the screen recording control affordance in the control panel user interface, the device detects an input associated with the screen recording control affordance, including detecting a contact on the touch-sensitive surface at a location that corresponds to the screen recording control affordance. In response to detecting the input associated with the screen recording control affordance: in accordance with a determination that the input associated with the screen recording control affordance meets control-expansion criteria (e.g., in accordance with a determination that a change in intensity of the contact in the input associated with the screen recording control affordance exceeds a first intensity threshold (e.g., the control-expansion criteria are met by a press input that meets intensity activation criteria (e.g., a press input by a contact with a characteristic intensity that is above the light press intensity threshold $IT_L$)) or that the contact in the input associated with the screen recording control affordance is maintained for at least a threshold amount of time (e.g., the control-expansion criteria are met by a long-press input by the contact)), the device displays a plurality of selectable options (e.g., in a zoomed view of the control affordance) that correspond to a screen recording function of the electronic device (e.g., including options for turning on/off screen recording, displaying a picture-in-picture view during screen recording, turning on/off the microphone during screen recording, selecting a location to store recorded content, selecting an app or service to use to broadcast recorded content, etc.). In accordance with a determination that the input associated with the screen recording control affordance meets control-toggle criteria (e.g., the control-toggle criteria are met by a tap input by the contact), toggling a start/stop state of the screen recording function of the electronic device (e.g., Screen recording is toggled on or off by the tap input on the screen recording control affordance, depending on whether screen recording is currently on or off). In some embodiments, the screen recording control affordance is a toggle control and the toggle state of the toggle control corresponds to the start/stop state of screen recording at the electronic device. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the control panel user interface (e.g., the control panel user interface with the first configuration) displays (1242) a hearing aid control affordance (e.g., hearing aid icon 5620, FIG. 5D36). While displaying the hearing aid control affordance in the control panel user interface, the device detects an input associated with the hearing aid control affordance, including detecting a contact on the touch-sensitive surface at a location that corresponds to the hearing aid control affordance. In response to detecting the input associated with the hearing aid control affordance: in accordance with a determination that the input associated with the hearing aid control affordance meets control-expansion criteria (e.g., such as a press gesture by contact 5684, FIGS. 5D36 and 5D40) (e.g., in accordance with a determination that a change in intensity of the contact in the input associated with the hearing aid control affordance exceeds a first intensity threshold (e.g., the control-expansion criteria are met by a press input that meets intensity activation criteria (e.g., a press input by a contact with a characteristic intensity that is above the light press intensity threshold $IT_L$)) or that the contact in the input associated with the hearing aid control affordance is maintained for at least a threshold amount of time (e.g., the control-expansion criteria are met by a long-press input by the contact)), the device displays a plurality of selectable options (e.g., in enhanced hearing aid control 5694, FIG. 5D40) (e.g., in a zoomed view of the control affordance) that correspond to a hearing aid function of the electronic device (e.g., including individual volume controls for each hearing aid, individual base/treble controls, battery indicators for each hearing aid, a left preset control, and a right preset control, etc.). In accordance with a determination that the input associated with the hearing aid control affordance meets control-toggle criteria (e.g., the control-toggle criteria are met by a tap input by the contact), toggling a state of a hearing aid device that is coupled to the electronic device (e.g., the hearing aid device is turned on or off). In some embodiments, the hearing aid control affordance is a toggle control and the toggle state of the toggle control corresponds to the ON/OFF state of the hearing aid device. Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

It should be understood that the particular order in which the operations in FIGS. 12A-12I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1100, 1300, 1400, 1500, 1600, 1800, and 1900) are also applicable in an analogous manner to method 1200 described above with respect to FIGS. 12A-12I. For example, the contacts, gestures, user interface objects, application views, control panels, controls, position thresholds, directional conditions, navigation criteria, movement parameters, thresholds, determinations, focus selectors, and/or animations described above with reference to method 1200 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1050, 1100, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12I are, optionally, implemented by components depicted in FIGS. 1A-1B. For example, display operation 1202, detection operation 1104, display operation 1206, detection operation 1208, display operation 1210, detection operations 1212 and 1214, and display operation 1216 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13D are flow diagrams illustrating a method 1300 of displaying a control panel user interface with a slider control and, in response to different inputs on the slider control, changing the position of the slider or toggling the control function, in accordance with some embodiments. The method 1300 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1300 are, optionally, combined and/or the order of some operations is, optionally, changed.

Method 1300 relates to adjusting a control value for a slider control or toggling the control function that corresponds to the slider control in response to an input that meets different conditions. Allowing the user adjust a control value or to toggle a control function based on variations in the detected input enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

Method 1300 is performed at an electronic device with a display and a touch-sensitive surface (e.g., a touch-screen display that serves both as the display and the touch-sensitive surface). The device displays (1302) a first user interface (e.g., a control panel user interface, such as control panel user interface 5518, FIG. 5E1) that includes a slider control (e.g., a volume slider control, such as volume control 5632 in FIG. 5E1, a brightness slider control, such as brightness control 5630 in FIG. 5E1, etc.) on the display, wherein the slider control includes: respective indications of a plurality of control values for a control function that corresponds to the slider control (e.g., the mute/unmute function corresponds to the volume slider control, the flashlight on/off function corresponds to a flashlight brightness control, a timer on/off function corresponds to a timer control, etc.) including a maximum value, a minimum value, and one or more intermediate values between the maximum and minimum values (e.g., the values are ordered based on numerical values, or based on positions along the slider control), and an indicator that marks a currently selected control value among the plurality of control values (e.g., a linear slider control includes a linear track that represents a continuous range of values (or a sequence of discrete values marked by markers) between a maximum value and a minimum value, and a moveable indicator that is moveable along the linear track to select a control value by its position on the linear track; a radial slider control includes a circular range around a fixed center that represents a continuous range of values (or a sequence of discrete values marked by markers) between a maximum value and a minimum value (e.g., marked by the same location or slightly offset positions), and a rotatable indicator that is rotated around the fixed center of the circular range to select a control value by its position around the circular range). While displaying the slider control, the device detects (1304) an input by a contact, including detecting the contact on the touch-sensitive surface at a location that corresponds to the slider control in the first user interface (e.g., on brightness control 5630 in control panel user interface 5518, FIG. 5E2). In response to detecting the input by the contact (1306): in accordance with a determination that the input meets control-adjustment criteria, wherein the control-adjustment criteria require that more than a threshold amount of movement of the contact across the touch-sensitive surface is detected in order for the control-adjustment criteria to be met (e.g., the control-adjustment criteria are met by a drag input on the indicator of the slider control, either immediately upon touch-down of the contact, or after a touch-hold time threshold has expired), the device changes a position of the indicator to indicate an update to the currently selected control value among the plurality of control values in accordance with the movement of the contact (e.g., as shown in FIGS. 5E2-5E3). In accordance with a determination that the input meets slider-toggle criteria, wherein the slider-toggle criteria require that lift-off of the contact is detected with less than the threshold amount of movement of the contact across the touch-sensitive surface in order for the slider-toggle criteria to be met (e.g., the slider-toggle criteria are met by a tap input on the slider control), the device toggles the control function that corresponds to the slider control (e.g., as shown in FIGS. 5E4-5E5 and in FIGS. 5E6-5E7) (e.g., the control function is toggled on while observing the currently selected control value, or the control function is toggled on with a default control value (e.g., a median, or maximum, or minimum value)).

In some embodiments, toggling the control function that corresponds to the slider control includes (1308) toggling the currently selected control value between the maximum value and the minimum value of the plurality of control values (e.g., toggling a volume control on and off corresponds changing the volume from maximum volume to minimum volume). Allowing the user to toggle the control function between the maximum value and the minimum value of the control values enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, toggling the control function that corresponds to the slider control includes (1310) toggling between two states without changing the currently selected control value (e.g., toggling a flashlight on and off does not change a currently selected brightness value for the flashlight when the flashlight is turned on again). For example, toggling a Night Shift function on and off does not change a currently selected brightness value for the device, as shown in FIGS. 5E4-5E7. Allowing the user to toggle between two states without changing the currently selected control value enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the slider control is (1312) a volume control (e.g., volume control 5632, FIG. 5E23), the currently selected control value is a currently selected volume value in a range of volume values (e.g., a continuous range) between a maximum volume and a minimum volume (e.g., as shown in FIG. 5E23), and toggling the control function that corresponds to the slider control includes toggling the volume between an ON state (e.g., unmute) and an OFF state (e.g., mute) (e.g., as shown in FIGS. 5E24-5E27). Allowing the user to toggle the volume between an ON state and an OFF state enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the slider control is (1314) a volume control that separately controls volume for a first type of audio output (e.g., volume for regular audio output, such as media content) and volume for a second type of audio output (e.g., volume for a ringer audio output, such as the telephone ringer, audio alerts, etc.), displaying the slider control includes displaying a first plurality of volume values for the first type of audio output (e.g., in a volume slider for regular audio output) and a first indicator that indicates a currently selected volume value for the first type of audio output, and toggling the control function that corresponds to the slider control includes toggling display of the first plurality of volume values for the first type of audio output and the first indicator to display of a second plurality of volume values for the second type of audio output and a second indicator that indicates a currently selected volume value for the second type of audio output. For example, when displaying the first plurality of volume values for the first type of audio output in a first volume slider for the first type of audio output (e.g., regular audio output), an icon representing a second volume slider for the second type of audio output (e.g., ringer audio output) is concurrently displayed with the first volume slider for the first type of audio output (e.g., as shown in FIG. 5E15). When a tap input is detected on the first volume slider (or on the icon representing the second type of audio input, as shown in FIG. 5E16), the first volume slider transforms into an icon representing the first volume slider, and the icon representing the second volume slider transforms into the second volume slider for the second type of audio output (e.g., as shown in FIGS. 5E17-5E18). Allowing the user to toggle between controlling the volume for a first type of audio output and a second type of audio output enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the slider control is (1316) a brightness control (e.g., brightness control 5630, FIG. 5E3), the currently selected control value is a currently selected brightness value in a range of brightness values (e.g., a continuous range) between a maximum brightness and a brightness, and toggling the control function that corresponds to the slider control includes toggling between a first brightness mode (e.g., a nightshift on mode) and a second brightness mode (e.g., a nightshift off mode) (e.g., as shown in FIGS. 5E4-5E7). Allowing the user to toggle the control function between a first brightness mode and a second brightness mode enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, in response to detecting the input by the contact (1318): in accordance with a determination that the input meets control-expansion criteria (e.g., the control-expansion criteria require that an increase in a characteristic intensity of the contact exceeds a first intensity threshold (e.g., the control-expansion criteria are met by a press input that meet intensity activation criteria (e.g., a press input by a contact with a characteristic intensity that is above the light press intensity threshold $IT_L$)) or that less than a threshold amount of movement of the contact is detected before a threshold amount of time has elapsed since detection of the contact at the location that corresponds to slider control (e.g., the control-expansion criteria are met by a long press input by the contact) in order for the control-expansion criteria to be met), the device displays a zoom view of the control affordance including the brightness control with the range of brightness values and a toggle control for adjusting other display settings (e.g., night shift and/or true tone settings that adjust the color reproduction of the display) (e.g., as shown in FIGS. 5E8-5E9). In some embodiments, the zoom view of the control affordance also includes a toggle control for another pair of brightness modes (e.g., true tone on/off modes, as shown in FIG. 5E9). In some embodiments, upon lift-off of the contact, if more than a threshold amount of movement is detected on the brightness slider control, the device ceases to display the zoom view after lift-off of the contact is detected; and if less than a threshold amount of movement is detected before lift-off of the contact, the device maintains display of the zoom view after lift-off of the contact is detected (e.g., as shown in FIG. 5E10, where display of the zoom view is maintained after lift-off of the contact is detected). Allowing the user to expand a control affordance (to display additional controls and/or information) or to toggle a control function based on variations in the detected input enhances the operability of the device and makes the user-device interface more efficient (e.g., by providing additional functions without cluttering up the display with additional controls, reducing the number of steps that are needed to achieve an intended outcome when operating the device, and reducing user mistakes when operating/interacting with the device) which, additionally, reduces power usage and improves battery life of the device by enabling the user to use the device more quickly and efficiently.

In some embodiments, the slider control is (1320) concurrently displayed with an indicator with an appearance that corresponds to a current toggle state of the control function (e.g., as shown in brightness control 5630 in FIGS. 5E4-5E7) (e.g., the brightness slider is concurrently displayed with an icon that shows the current toggle state for the nightshift control, or the current toggle state of the Do Not Disturb function). The device changes the appearance of the indicator in accordance with a change in a toggle state of the control function (e.g. the icon that is concurrently displayed with the brightness slider changes from a gray crescent moon to a blue crescent moon when the nightshift control function is toggled on) (e.g., the icon that is concurrently displayed with the brightness slider changes from a regular sun icon to a sun icon with a crescent moon when the nightshift control function is toggled on, as shown in FIGS. 5E4-5E5). In some embodiments, the change in appearance of the indicator occurs both when the control function is toggled by a tap input on the control slider (e.g., on brightness control 5630, FIG. 5E4), and when the control function is toggled by a tap input on the toggle control within the expanded view of the slider control (e.g., within expanded brightness control 5808, FIG. 5E10). Changing an appearance of a control in accordance with a change in a toggle state of the control function enhances the operability of the device and makes the user-device interface more efficient (e.g., by allowing the user to see the current toggle state of the control function, thereby helping the user to achieve an intended outcome with the required inputs and reducing user mistakes when operating/interacting with the device) which, additionally, reduces power usage and improves battery life of the device by enabling the user to use the device more quickly and efficiently.

In some embodiments, displaying the slider control in the first user interface includes (1322): in accordance with a determination that the first user interface is a user interface in a landscape-display state, displaying the slider control with a first vertical length (e.g., as shown in FIG. 5E39); and in accordance with a determination that the first user interface is a user interface in a portrait-display state, displaying the slider control with a second vertical length that is shorter than the first vertical length (e.g., as shown in FIG. 5E38). For example, when the slider control is displayed in a control panel user interface in the portrait-display state, the slider control is displayed below another control module and is shorter; and when the slider control is displayed in the control panel user interface in the landscape-display state, the slider control is displayed without another control module above it, and is taller. The same set of control values are distributed on the long version and the short version of the slider control. Displaying the slider control with a first vertical length in a landscape-display state and displaying the slider control with a second vertical length in a portrait-display state enhances the operability of the device and makes the user-device interface more efficient (e.g., by providing a taller version of the slider control when space allows, thereby helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the slider control is (1324) a timer, the currently selected control value is a current amount of time remaining for the timer, and displaying the slider control includes: in accordance with a determination that a toggle state of the timer is a first state (e.g., the “running” state), continuously changing the position of the indicator to indicate an update to the current amount of time remaining for the timer in accordance with passage of time; and in accordance with a determination that the toggle state of the timer is a second state (e.g., the “paused” state or “stopped” state), maintaining the position of the indicator with passage of time; and changing the position of the indicator to indicate an update to the currently selected control value in accordance with the movement of the contact includes: in accordance with a determination that a toggle state of the timer is the first state (e.g., the “running” state), overriding the update to the current amount of time remaining for the timer in accordance with passage of time when changing the position of the indicator in accordance with the movement of the contact; and in accordance with a determination that the toggle state of the timer is the second state (e.g., the “paused” state or “stopped” state), changing the position of the indicator from the currently selected control value in accordance with the movement of the contact. Changing the position of the indicator in a timer slider control when the timer is in a “running” state or in accordance with a user input enhances the operability of the device and makes the user-device interface more efficient (e.g., by allowing the user to see the amount of time remaining for the timer in accordance with passage of time and allowing the user to override the amount of time remaining for the timer with a user input, thereby helping the user to achieve an intended outcome with the required inputs and reducing user mistakes when operating/interacting with the device) which, additionally, reduces power usage and improves battery life of the device by enabling the user to use the device more quickly and efficiently.

In some embodiments, prior to displaying the first user interface (e.g., the control panel user interface), the device displays (1326) a second user interface (e.g., user interface 5840 of a messaging application, FIG. 5E28) (e.g., the home screen user interface, a user interface of an open application, etc.) on the display, wherein the second user interface has a first appearance (e.g., having content with a first contrast level, a first text size, a first brightness level, a first overall tint (e.g., a blue tint), a first color scheme, etc.). The device displays the first user interface (e.g., control panel user interface 5518, FIG. 5E29) that includes the slider control overlaid on the second user interface (e.g., as shown in FIG. 5E29). In some embodiments, the second user interface is completely blocked by the first user interface (e.g., as shown in FIG. 5E29). In some embodiments, the first user interface is semi-transparent, and some visual features of the second user interface is, optionally, visible through the semi-transparent first user interface. In some embodiments, the first user interface is a platter that is smaller than the size of the second user interface, and portions of the second user interface are visible around the first user interface. In some embodiments, the visual properties of the first user interface are generated based on the visual properties of the second user interface below the first user interface. In some embodiments, the second user interface is processed to have a different appearance (e.g., blurred, darkened, de-saturated, etc.) before the first user interface is overlaid on top of the second user interface. In response to changing the position of the indicator that corresponds to the slider control: the device reveals at least a portion of the second user interface that was overlaid by the first user interface (e.g., as shown in FIG. 5E33), and the device changes an appearance of at least the revealed portion of the second user interface (e.g., with different text size due to a change in the enhanced type size control 5692, as shown in FIGS. 5E33-5E35) (e.g., with alterations from the first appearance, such as with a different contrast level due to changes in the contrast value in the accessibility control, with a different text size due to a change in the text size slider in the accessibility control, with a different brightness level due to a change in the brightness slider control, with a different tint due to a change in the toggle state of the nightshift control or true tone control) in accordance with the changes in the position of the indicator, while maintaining display of a portion, less than all, of the first user interface that includes the slider control. In some embodiments, a portion of the first user interface is removed to reveal the second user interface with the altered appearance from below. In some embodiments, the first user interface is shifted to reveal the second user interface with the altered appearance from below. In some embodiments, if a blurred background or mask has been inserted between the first user interface and the second user interface, the blurred background or mask is removed to reveal the second user interface with the altered appearance. In some embodiments, the portion of the second user interface that is revealed is magnified. Revealing at least a portion of a user interface and changing an appearance of the revealed portion of the user interface in accordance with the changes in the position of the indicator of the slider control enhances the operability of the device and makes the user-device interface more efficient (e.g., by allowing the user to see how the changes in position of the indicator affect the appearance of the user interface, thereby helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the input by the contact, when the input meets control-adjustment criteria (1328): in accordance with a determination that the input is an input on a control that alters the appearance of user interfaces displayed on the device (e.g., brightness, font size, display zoom, etc.), the device ceases to display a respective portion of the first user interface (e.g., to reveal at least a portion of the second user interface that was overlaid by the first user interface) in conjunction with changing a position of the indicator to indicate an update to the currently selected control value among the plurality of control values in accordance with the movement of the contact (e.g., as shown in FIGS. 5E33-5E35); and in accordance with a determination that the input is an input on a control that does not alter the appearance of user interfaces displayed on the device, the device maintains display of the respective portion of the first user interface (e.g., forgoing revealing the portion of the second user interface that was overlaid by the first user interface) in conjunction with changing a position of the indicator to indicate an update to the currently selected control value among the plurality of control values in accordance with the movement of the contact. For example, when the slider control is a volume control, changing the volume value or toggling volume on and off does not have any impact on the appearance of the user interface underneath the control panel user interface. In such a scenario, the control panel user interface is updated without revealing the underlying portions of the second user interface. Revealing at least a portion of a user interface and changing an appearance of the revealed portion of the user interface in accordance with the changes in the position of the indicator of the slider control only when the control would alter the appearance of the user interface enhances the operability of the device and makes the user-device interface more efficient (e.g., by allowing the user to see how the changes in position of the indicator affect the appearance of the user interface, thereby helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 13A-13D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1100, 1200, 1400, 1500, 1600, 1800, and 1900) are also applicable in an analogous manner to method 1300 described above with respect to FIGS. 13A-13D. For example, the contacts, gestures, user interface objects, application views, control panels, controls, position thresholds, directional conditions, navigation criteria, movement parameters, thresholds, determinations focus selectors, and/or animations described above with reference to method 1300 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1050, 1100, 1200, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 13A-13D are, optionally, implemented by components depicted in FIGS. 1A-1B. For example, display operation 1302, detection operation 1304, and change/toggle operation 1306 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 14A-14E are flow diagrams illustrating a method 1400 of displaying a dock or displaying a control panel (e.g., instead of or in addition to the dock), in accordance with some embodiments. The method 1400 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

Method 1400 relates to determining whether to display a dock or to display a control panel (e.g., instead of or in addition to the dock) in response to a sequence of one or more edge-swipe gestures based on whether the sequence of one or more edge-swipe gestures meets respective criteria. For example, in some embodiments, the device displays the dock in response to a first upward swipe gesture from the bottom edge of the device, and the device displays the control panel in response to a second upward swipe from the bottom edge of the device after the dock is displayed. In some embodiments, the dock is displayed in response to a short upward swipe from the bottom edge of the device, and the control panel is displayed in response to a long upward swipe from the bottom edge of the device (and optionally the dock is displayed during the upward swipe). Allowing the user to display a dock or to display a control panel instead of or in addition to the dock in response to a sequence of one or more edge-swipe gestures depending on whether certain criteria are met enhances the operability of the device and makes the user-device interaction more efficient (e.g., by providing easy access to key control functions of the device, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

Method 1400 is performed at an electronic device with a display and a touch-sensitive surface (e.g., a device with a touch-screen display that serves both as the display and the touch-sensitive surface). The device displays (1402), on the display, a first user interface (e.g., user interface 5850, FIG. 5F1) that includes one or more applications (e.g., the first user interface is a user interface of an application, such as user interface 5850 in FIG. 5F1, or a split user interface that includes user interfaces of two or more applications) displayed without displaying a dock (e.g., an application dock for selecting an application launch icon from a plurality of application launch icons to switch from displaying the first user interface to displaying a user interface of another application, or to add the user interface of another application to the first user interface in a split screen format on the display). While displaying the first user interface, the device detects (1404) a sequence of one or more inputs that includes detecting movement of a contact from an edge of the device onto the device (e.g., detecting touch-down of the contact at an edge of the touch-screen, and detecting movement of the contact from the edge of the touch-screen onto the touch-screen) (e.g., contact 5852 in FIGS. 5F2-5F8) (e.g., contact 5880 in FIGS. 5F11-5F13 and contact 5882 in FIGS. 5F15-5F18). In response to detecting the sequence of one or more inputs (1406): in accordance with a determination that the sequence of one or more inputs meets dock-display criteria, the device displays the dock overlaid on the first user interface without displaying a control panel (e.g., a control panel user interface with activatable controls, a control panel view corresponding to a control panel user interface, or a control panel object with activatable controls that is overlaid on top of another currently displayed user interface), as shown in FIGS. 5F2-5F5 and also shown in FIGS. 5F11-5F14. In some embodiments, in response to detecting the sequence of one or more inputs: in accordance with a determination that the sequence of one or more inputs does not meet the dock-display criteria, the device maintains display of the first user interface without displaying the dock. In some embodiments, in response to detecting the sequence of one or more inputs: the device displays a portion of the dock in response to the sequence of one or more inputs; and in accordance with a determination that the sequence of one or more inputs does not meet the dock-display criteria (e.g., the movement of a respective contact, in the sequence of one or more inputs, is less than the first distance threshold upon liftoff of the respective contact), the device ceases to display the portion of the dock (e.g., the portion of the dock will cease to be displayed (e.g., retracted) when the termination of the sequence of one or more inputs is detected without having met the dock-display criteria). In accordance with a determination that the sequence of one or more inputs meets control-panel-display criteria, the device displays the control panel (e.g., as shown in FIGS. 5F6-5F8, as shown in FIGS. 5F15-5F18, and as shown in FIGS. 5F20-5F22). In some embodiments, in response to detecting the sequence of one or more inputs: in accordance with a determination that the sequence of one or more inputs does not meet the control-panel-display criteria, the device maintains display of the first user interface (e.g., with or without concurrent display of the dock) without displaying the control panel.

In some embodiments, the sequence of one or more inputs includes (1408) movement of a respective contact from the edge of the device onto the device, and the respective contact is continuously detected throughout the sequence of one or more inputs (e.g., the sequence of one or more inputs is a single swipe input by the respective contact that starts from an edge of the touch-screen and continues onto the touch-screen) (e.g., the single swipe input by contact 5852 in FIGS. 5F2-5F8). In some embodiments, the dock-display criteria include a criterion that is met when the movement of the respective contact is greater than a first distance threshold (e.g., the dock-display criteria are met when the single long swipe input includes upward or arc movement of the respective contact beyond a quarter of the screen height from the bottom edge of the touch screen, or more than half of the height of the dock from the bottom edge of the touch screen), as shown in FIGS. 5F2-5F5; and the control-panel-display criteria include a criterion that is met when the movement of the respective contact is greater than a second distance threshold that is greater than the first distance threshold (e.g., the control-panel-display criteria are met when the single long swipe input includes upward or arc movement of the respective contact beyond a third of the screen height from the bottom edge of the touch screen, or more than the height of the dock from the bottom edge of the touch screen), as shown in FIGS. 5F6-5F8. Displaying the dock when a first distance threshold is met and displaying the control panel when a second distance threshold is met enhances the operability of the device and makes the user-device interface more efficient (e.g., by providing easy access to key control functions of the device, by helping the user to achieve an intended outcome with fewer required inputs and reducing user mistakes when operating/interacting with the device, and by providing additional control options without cluttering the user interface with additional displayed controls) which, additionally, reduces power usage and improves battery life of the device by enabling the user to use the device more quickly and efficiently.

In some embodiments, the dock-display criteria include (1410) a criterion that is met when the sequence of one or more inputs includes movement of a first contact from the edge of the device onto the device (e.g., the dock-display criteria are met when the first contact moves upward for more than the first threshold distance from the bottom edge of the touch screen, optionally without detecting movement of a second contact from the edge of the device onto the device), as shown in FIGS. 5F11-5F14; and the control-panel-display criteria include a criterion that is met when the sequence of one or more inputs includes movement of an initial contact (e.g., the first contact, such as contact 5880 in FIGS. 5F11-5F14) from the edge of the device onto the device (e.g., more than the first threshold distance) followed by movement of a second contact (e.g., such as contact 5882 in FIGS. 5F15-5F18) (e.g., different from the initial contact (e.g., the first contact)) from the edge of the device onto the device (e.g., the control-panel display criteria are met when two consecutive upward or arc swipe inputs by separate contacts are detected). In some embodiments, the control-panel-display criteria are met after detecting liftoff of the first contact from the touch-sensitive surface (e.g., liftoff of contact 5880-*c* in FIG. 5F13) and after detecting movement of the second contact from the edge of the device onto the device (e.g., contact 5882 in FIGS. 5F15-5F17). In some embodiments, the control-panel-display criteria require that the two consecutive upward swipes by the two separate contacts to be in the same direction (e.g., upward) in order for the control-panel-display criteria to be met. Displaying the dock in response to a first upward swipe and displaying the control panel in response to a second upward swipe enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the control-panel-display criteria include (1412) a criterion that is met when the movement of the second contact is detected while displaying the dock on the display (e.g., before the dock has been dismissed or otherwise ceases to be displayed), as shown in FIGS. 5F14-5F18. Displaying the control panel in response to a second upward swipe (while the dock is displayed) enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, while the dock is overlaid on the first user interface without concurrent display of the control panel (e.g., after the dock is displayed in response to a sequence of one or more inputs that met the dock-display criteria and that did not meet the control-panel-display criteria) (e.g., as shown in FIG. 5F14), the device detects (1414) a subsequent input that includes movement of a second contact from the edge of the device onto the device (e.g., a subsequent upward or arc swipe input by another contact that is distinct from the contact of the sequence of one or more inputs) (e.g., contact 5882 in FIGS. 5F15-5F17) (e.g., contact 5884 in FIGS. 5F20-5F22); and in response to detecting the subsequent input, the device displays the control panel (e.g., after ceasing to display the dock, as shown in FIG. 5F22, or concurrently with the display of the dock, as shown in FIG. 5F18). Displaying the control panel in response to a subsequent upward swipe (while the dock is displayed) enhances the operability of the device and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the dock-display criteria include (1416) a criterion that is met by an initial portion of the sequence of one or more inputs that meets the control panel-display criteria (e.g., the dock-display criteria are met by the initial upward movement of a contact during a single long upward swipe that meets the control-panel-display criteria, as shown in FIGS. 5F2-5F5, and the dock-display criteria are also met by a first upward swipe of a sequence of two consecutive upward swipes that meets the control-panel-display criteria, as shown in FIGS. 5F11-5F14); and the dock is displayed in response to the initial portion of the sequence of one or more inputs. Displaying the dock in response to the initial portion of the upward swipe provides improved feedback, enhances the operability of the device, and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, in response to detecting the sequence of one or more inputs: in accordance with a determination that the dock is currently displayed and that the control panel (e.g., a control panel user interface with activatable controls, a control panel view corresponding to a control panel user interface, or a control panel object with activatable controls that is overlaid on another currently displayed user interface) is to be displayed (e.g., when the dock is already displayed in response to an initial portion of the sequence of one or more inputs that met the dock-display criteria, and the control-panel-display criteria are met by the sequence of one or more inputs), the device ceases (1418) to display the dock when displaying the control panel (e.g., a control panel user interface with activatable controls, a control panel view corresponding to a control panel user interface, or a control panel object with activatable controls that is overlaid on another currently displayed user interface) (e.g., as shown in FIG. 5F8) (e.g., as shown in FIG. 5F22). In some embodiments, the control panel user interface or control panel object slides upward from the bottom edge of the touch-screen in a display layer that is overlaid on top of the display layer of the dock, and the dock (e.g., along with all other content in the display layer of the dock) is obscured (e.g., masked or severely blurred), as shown in FIG. 5F22. Ceasing to display the dock when displaying the control panel enhances the operability of the device and makes the user-device interface more efficient (e.g., by allowing the user to focus on the control panel control options without cluttering the user interface with additional displayed controls, by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, in response to detecting the sequence of one or more inputs: in accordance with a determination that the dock is currently displayed and that the control panel is to be displayed (e.g., when the dock is already displayed in response to an initial portion of the sequence of one or more inputs that met the dock-display criteria, and the control-panel-display criteria are met by the sequence of one or more inputs), the device maintains (1420) display of the dock when displaying the control panel (e.g., a control panel user interface with activatable controls, a control panel view corresponding to a control panel user interface, or a control panel object with activatable controls) (e.g., as shown in FIG. 5F9) (e.g., as shown in FIG. 5F23) (e.g., as shown in FIG. 5F24). In some embodiments, the control panel user interface or the control panel object slides upward from the bottom edge of the touch-screen in a display layer that is behind the display layer of the dock, and eventually the controls in the control panel are displayed above the dock on the display, as shown in FIG. 5F23. In some embodiments, the control panel object is an extension of the dock from the bottom edge of the dock, and as the control panel object is dragged upward, the control panel object pushes the dock upward on the display along with the control panel object (e.g., as shown in FIG. 5F24) (and optionally, the first user interface is blurred underneath the dock and the control panel object). Maintaining display of the dock when displaying the control panel enhances the operability of the device and makes the user-device interface more efficient (e.g., by providing both control options of the dock with control options of the control panel, by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, displaying the control panel includes (1422): displaying the control panel along with a plurality of application views in an application-switcher user interface (e.g., as shown in FIG. 5F8). In some embodiments, the application-switcher user interface (e.g., application-switcher user interface 5856, FIG. 5F8) is a grid of application views (e.g., application view 5851, application view 5858, application view 5860, and application view 5862), or a stack of application views (e.g., an application view is a reduced scale image of the user interface of a corresponding application that is displayed last before the application is closed with retained state information). In some embodiments, the application-switcher user interface only includes application views corresponding to applications that are closed with retained state information, and selection of an application view in the application-switcher user interface causes the application corresponding to the selected application view to be opened to the last state that was saved prior to closing the application (e.g., as described above with respect to FIG. 5F9). In contrast to the applications that were closed with retained state information, an application that was closed without retained state information is not represented in the application-switcher user interface by an application view, and launching the application (e.g., by selecting the corresponding application launch icon in the home screen user interface or in the dock) causes the application to be displayed from a default state (e.g., from a default starting user interface of the application). In some embodiments, the control panel (e.g., control panel view 5886, FIG. 5F8) is represented in the application-switcher user interface by a control panel view that is a reduced scale image of the control panel user interface. In some embodiments, the control panel view is live and the controls contained therein are activatable by touch inputs. In some embodiments, a touch input (e.g., a tap input) detected on the control panel view in the application-switcher user interface causes the display of the application-switcher user interface to be replaced by the control panel user interface. Displaying the control panel in an application-switcher user interface enhances the operability of the device and makes the user-device interface more efficient (e.g., by providing the user with additional control options, by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the device displays (1424) an animated transition of the application-switcher user interface replacing display of the first user interface, while maintaining display of the dock (e.g., the dock remains on the display and the application-switcher user interface (including the plurality of application views and the control panel view) slides in upward from the bottom of the display, behind the dock, to cover the first user interface), as shown in FIGS. 5F16-5F18. Displaying an animated transition of the application-switcher user interface replacing display of the first user interface provides improved feedback, enhances the operability of the device, and makes the user-device interface more efficient (e.g., by providing visual feedback to the user, thereby helping the user to achieve an intended outcome when operating the device and reducing user mistakes when operating/interacting with the device) which, additionally, reduces power usage and improves battery life of the device by enabling the user to use the device more quickly and efficiently.

In some embodiments, the device displays (1426) an animated transition of the application-switcher user interface replacing display of the first user interface and the dock. For example, in some embodiments, the dock and the first user interface fade away and the application-switcher user interface is overlaid on top of the faded dock and the first user interface, as shown in FIGS. 5F6-5F8. In some embodiments, the dock is faded more than the first user interface. Displaying an animated transition of the application-switcher user interface replacing display of the first user interface and the dock provides improved feedback, enhances the operability of the device, and makes the user-device interface more efficient (e.g., by providing visual feedback to the user, thereby helping the user to achieve an intended outcome when operating the device and reducing user mistakes when operating/interacting with the device) which, additionally, reduces power usage and improves battery life of the device by enabling the user to use the device more quickly and efficiently.

In some embodiments, while displaying the application-switcher user interface, the device detects (1428) a second sequence of one or more inputs that meets application-closing criteria (e.g., including detecting a sequence of one or more inputs by one or more contacts on the touch-sensitive surface at a location that corresponds to a first application view (e.g., an icon or reduced scale image of a last-displayed user interface a first application) of the plurality of application views) (e.g., as shown in FIGS. 5F30, 5F32, and 5F35); and in response to detecting the second sequence of one or more inputs that meets the application-closing criteria, the device ceases to display a first application view of the plurality of application views in the application-switcher user interface (e.g., while maintaining display of other application views of the plurality of application views in the application-switcher user interface) (e.g., as shown in FIGS. 5F30-5F31, FIGS. 5F32-5F33, and FIGS. 5F35-5F36). Allowing the user to close application views in the application-switcher user interface provides a customizable user interface that allows the user to decide which applications can be easily accessible and enhances the operability of the device and makes the user-device interface more efficient (e.g., by providing easy access to key control functions of the device and by helping the user to achieve an intended outcome with fewer required inputs and reducing user mistakes when operating/interacting with the device) which, additionally, reduces power usage and improves battery life of the device by enabling the user to use the device more quickly and efficiently.

In some embodiments, detecting the second sequence of one or more inputs that meets the application-closing criteria includes (1430): detecting a first input that activates an application-closing mode of the application-switcher user interface (e.g., as shown in FIGS. 5F26-5F28), and detecting a second input that selects the first application view among the plurality of application views while the application-closing mode of the application-switcher user interface is activated (e.g., as shown in FIGS. 5F30 and 5F32); and the method includes: in response to detecting the first input that activates the application-closing mode of the application-switcher user interface, displaying a first visual change in the application-switcher user interface to indicate that the application-closing mode has been activated (e.g., as shown in FIG. 5F28). For example, in some embodiments, in accordance with a determination that an input by a third contact meets long press criteria (e.g., contact 5890 in FIGS. 5F26-5F28), wherein the long press criteria require that the third contact is maintained on the touch-sensitive surface with less than a threshold amount of movement for more than a threshold amount of time (e.g., a long press time threshold, time T) in order for the long press criteria to be met, the device displays a respective deletion affordance (e.g., "x" in the upper left corner of the application view) over each application view of the plurality of application views, as shown in FIG. 5F28. After the deletion affordances are displayed, the device detects a tap input on the deletion affordance for the first application view (e.g., a tap input by contact 5892, FIG. 5F30), and the first application view is removed from the application-switcher user interface and the retained state information for the first application is deleted, as shown in FIG. 5F31. In some embodiments, the first visual change in the application-switcher user interface includes displaying the application views with an increased transparency level to indicate that the application-closing mode has been activated. In some embodiments, an upward swipe or flick input on the first application view (e.g., either by the third contact or by a different contact that is detected after the lift-off of the third contact) while the application-closing mode remains activated (e.g., while the deletion affordances are displayed or while the application views are displayed with the increased transparency level) causes the first application view to be removed from the application-switcher user interface and the retained state information for the first application to be deleted (e.g., as shown in FIGS. 5F32-5F33). In some embodiments, a tap input detected outside of the plurality of application views (e.g., in an unoccupied region above the plurality of application views) causes the application-closing mode to be deactivated, and a subsequent selection of an application view launches the corresponding application, and replaces the display of the application-switcher user interface with the last-displayed user interface of the selected application (or the control panel user interface if the control panel view was selected instead of an application view). Displaying a visual change to indicate the application-closing mode has been activated provides improved visual feedback, enhances the operability of the device, and makes the user-device interface more efficient (e.g., by providing visual feedback to the user, thereby helping the user to achieve an intended outcome when operating the device and reducing user mistakes when operating/interacting with the device) which, additionally, reduces power usage and improves battery life of the device by enabling the user to use the device more quickly and efficiently.

In some embodiments, detecting the second sequence of one or more inputs that meets the application-closing criteria includes (1432) detecting movement of a respective contact in the second sequence of one or more inputs across the touch-sensitive surface (e.g., an upward swipe or upward flick) at a location that corresponds to the first application view of the plurality of application views (e.g., contact 5894 in FIG. 5F32 and contact 5896 in FIG. 5F35). Allowing the user to close application views in the application-switcher user interface provides a customizable user interface that allows the user to decide which applications can be easily accessible and enhances the operability of the device and makes the user-device interface more efficient (e.g., by providing easy access to key control functions of the device and by helping the user to achieve an intended outcome with fewer required inputs and reducing user mistakes when operating/interacting with the device) which, additionally, reduces power usage and improves battery life of the device by enabling the user to use the device more quickly and efficiently.

In some embodiments, the dock is (1434) displayed overlaid on the first user interface in accordance with a determination that the sequence of one or more inputs meets the dock-display criteria and that the first user interface is not protected (e.g., the first user interface corresponds to an application operating in an unprotected mode, such as an interactive content display mode, as opposed to a full-screen content display mode for a media player application, an active gaming mode of a gaming application, or a navigation mode of a maps application) when the sequence of one or more inputs is detected; and the method includes: in response to detecting the sequence of one or more inputs: in accordance with a determination that the sequence of one or more inputs meets the dock-display criteria and that the first user interface is protected (e.g., the first user interface corresponds to an application operating in a full screen content display mode, or an application that is currently in a mode which should not be suddenly interrupted, such as a gaming application that is in an active gaming mode, or a maps application that is in a navigation mode, etc.), maintaining display of the first user interface without displaying the dock. For example, in some embodiments, the device activates a verification mode in which the dock is displayed when a verification input is detected. In some embodiments, in response to the sequence of one or more inputs that meet the dock-display criteria, an affordance is displayed instead, and if another sequence of one or more inputs that meet the dock-display criteria is detected while the affordance is displayed (e.g., before the affordance hides automatically after a predetermined period of time with no user interaction), then the dock is displayed (e.g., as explained in more detail with respect to FIGS. 5B1-5B33 and FIGS. 9A-9D). Limiting the operation of the swipe gesture when a currently-displayed application is determined to be protected enhances the operability of the device and makes the user-device interaction more efficient (e.g., by reducing unintended disruptions to the user's usage of the device and reducing user mistakes when operating the device), which, additionally, reduces power usage and improves battery life of the device by enabling the user to use the device more quickly and efficiently.

In some embodiments, the dock (e.g., dock 5854, FIG. 5F5) includes (1436) a plurality of application launch icons including at least one of: (1) a first application-launch icon that is moved, by a user, from a home screen user interface of the device to the dock (e.g., an application launch icon that is dragged by the user from the home screen and dropped onto the dock), (2) a second application launch icon for a recently open application on the device (e.g., an application that is just closed by the user), and (3) a third application launch icon for an application that is recommended by the device based on predetermined criteria (e.g., a recently used applications on another device associated with the device (e.g., connected to the same WiFi network, or connected to each other via Bluetooth, etc.)). For example, in some embodiments, the dock includes application launch icons for the N (e.g., three) most recently open applications used on the device, M (e.g., four) favorite applications specified by the user, one or more recently used applications on a related device (e.g., in an automatic hand-off between the devices), and/or a combination of favorite applications, recently open applications, and/or suggested applications. In some embodiments, the recent applications are separated from the rest of application launch icons in the dock by a vertical divider. In some embodiments, the recent applications simply include three most recent applications. In some embodiments, the recent applications include three most recent applications that are not already included in the dock. In some embodiments, the default dock contains a preset number of application launch icons (e.g., messages, web browser, media player, email, and file-storage applications). In some embodiments, in addition to application launch icons, other affordances, such as folder icons, web clippings, and document icons can also be dragged from the home screen user interface or other user interfaces (e.g., a drive or network storage space) and dropped into the dock. In some embodiments, the method includes adding affordances (e.g., application launch icon, folders, web clippings, documents, etc.) to the dock. When adding affordances, the dock gets longer in length until it reaches the maximum length of the display, and then the dock gets shorter in height (and icons decrease in size) to accommodate more icons. In some embodiments, the method includes deleting affordances from the dock. When deleting affordances, the dock gets taller in height (and icons increase in size) as icons are removed from the dock; and once icons are of a standard size, the dock gets shorter in length. In some embodiments, the dock remains displayed when the device is rotated (e.g., from the landscape orientation to the portrait orientation, or vice versa). In some embodiments, the dock disappears when an application is launched from the dock or from the home screen on which the dock is displayed. In some embodiments, the dock is dismissed in response to a downward swipe gesture over the dock (e.g., a separate input from the sequence of one or more inputs). In some embodiments, the dock is dismissed upon touchdown of a contact anywhere in the first user interface, or in response to a user interaction with the first user interface (e.g., by an input separate from the sequence of one or more inputs). In some embodiments, the dock is dismissed in response to a downward swipe gesture that moves past the dock (e.g., similar to a downward swipe gesture past an onscreen keyboard to dismiss the keyboard in a messaging application). Providing a plurality of application launch icons in the dock provides a customizable dock that allows the user to decide which applications can be easily accessible and enhances the operability of the device and makes the user-device interface more efficient (e.g., by providing easy access to key control functions of the device and by helping the user to achieve an intended outcome with fewer required inputs and reducing user mistakes when operating/interacting with the device) which, additionally, reduces power usage and improves battery life of the device by enabling the user to use the device more quickly and efficiently.

In some embodiments, while displaying the control panel (e.g., a control panel user interface or a control panel object with activatable controls), wherein the control panel includes one or more selectable controls, the device detects (1438) an input by a fourth contact, including detecting the fourth contact on the touch-sensitive surface at a location on the touch-sensitive surface that corresponds to a first selectable control of the one or more selectable controls. In some embodiments, the control panel includes one or more control regions, each of which includes a respective plurality of controls for controlling corresponding functions of the device. In some embodiments, the control panel includes one or more additional controls that are not included in the one or more control region. In response to detecting the input by the fourth contact: in accordance with a determination that the input by the fourth contact meets enhancedcontrol-display criteria (e.g., a long press or a deep press), the device replaces display of the first selectable control (e.g., a control icon) with display of a first enhanced control corresponding to the first selectable control (e.g., a zoom view of the control icon) (e.g., as explained in more detail with respect to FIGS. 5C1-5C45 and FIGS. 11A-11E). In some embodiments, the enhanced-control-display criteria include a criterion that is met when the fourth contact is maintained on the touch-sensitive surface with less than a threshold amount of movement for at least a threshold amount of time (e.g., a long press time threshold) (e.g., the enhanced-control-display criteria are met by a long press input by the fourth contact). In some embodiments, the enhanced-control-display criteria include a criterion that is met when an intensity of the fourth contact increases above a predefined intensity threshold (e.g., a light press intensity threshold $IT_L$). For example, in some embodiments, the enhanced-control-display criteria are met by a press input by the fourth contact. In some embodiments, in accordance with a determination that the input by the fourth contact does not meet enhanced-control-display criteria, display of the first selectable control is maintained without displaying the first enhanced control corresponding to the first selectable control. In some embodiments, in response to detecting the input by the fourth contact, in accordance with a determination that the input by the fourth contact meets control-activation criteria, the device activates the first selectable control (e.g., for controlling a corresponding function of the device) (e.g., as shown in FIG. 5F9). In some embodiments, the control-activation criteria are capable of being satisfied when the fourth contact is maintained on the touch-sensitive surface for less than the threshold amount of time (e.g., less than a long press time threshold). In some embodiments, the control-activation criteria are capable of being satisfied when the intensity of the fourth contact does not exceed the predefined intensity threshold. In some embodiments, the control-activation criteria are satisfied with a hard, quick tap that is still registered as a "tap" by a tap gesture recognizer, and the control-activation criteria do not always require that the intensity of the contact remain below a particular intensity threshold in order for the control-activation criteria to be satisfied. Providing additional controls in the enhanced control (or optionally, activating a currently selected control) enhances the operability of the device and makes the user-device interface more efficient (e.g., by reducing the number of inputs needed to display additional controls, and thereby providing additional functionality and control functions without cluttering the UI with additional displayed controls) which, additionally, reduces power usage and improves battery life of the device by enabling the user to use the device more quickly and efficiently.

In some embodiments, the device detects (1440) a request to display a cover sheet user interface (e.g., detecting the request includes detecting a downward swipe from the top edge of the touch-screen (e.g., while the first user interface is displayed (e.g., with or without the dock and/or control panel), as shown in FIG. 5F38), or detecting an input to wake the device from a display-off state (e.g., after a transition from displaying the first user interface in a display-on state to turning off the display in a display-off state, the device detects an input (e.g., lifting of the device, or a press input on a power button of the device) to transition back to the display-on state), as shown in FIG. 5F42). In some embodiments, the cover sheet user interface (e.g., cover sheet user interface 5900, FIG. 5F39) is used to present recent information received and/or generated by applications installed on the device (e.g., providing ways to retain sets of notifications, clear sets of notifications, display missed notifications, display previously cleared notifications in a notification history, access information from an active mode of an application using a banner that is displayed in user interfaces other than the application user interface, and access additional user interfaces, both upon transitioning to the display-on state and subsequently during normal usage of the device). In some embodiments, the cover sheet user interface is a user interface that is immediately displayed when the device transitions from a screen-off state to a screen-on state (e.g., as shown in FIGS. 5F42-5F43) (e.g., upon waking the device from a sleep state and/or while the device is in a locked state) and the cover sheet user interface is available to be redisplayed (e.g., to allow a user to view notifications, access a mini application user interface and/or access a control panel user interface) after the device is unlocked. In response to detecting the request to display the cover sheet user interface, the device displays the cover sheet user interface (e.g., as shown in FIG. 5F39 and FIG. 5F43). While displaying the cover sheet user interface, the device detects an input by a fifth contact, including detecting movement of the fifth contact from the edge of the device onto the device (e.g., detecting touch-down of the fifth contact at an edge of the touch-screen, and detecting movement of the fifth contact from the edge of the touch-screen onto the touch-screen) (e.g., as shown in FIG. 5F40 and FIG. 5F44). In response to detecting the input by the fifth contact: in accordance with a determination that the request to display the cover sheet user interface was detected when the device was in a display-off state (e.g., when the request to display the cover sheet user interface is for waking the device and the cover sheet user interface serves as a wake screen user interface, as shown in FIGS. 5F42-5F43), the device displays the control panel (e.g., overlaid on the cover sheet user interface) (e.g., as shown in FIG. 5F44-5F45). In some embodiments, when the cover sheet user interface serves as a wake screen user interface, pressing the power button dismisses the cover sheet user interface and returns the device to the display-off state (e.g., a locked state or a sleep state). In accordance with a determination that the request to display the cover sheet user interface was detected when the device was displaying a respective user interface (e.g., the user interface of an application, or a home screen user interface) (e.g., as shown in FIGS. 5F38-5F39), the device replaces display of the cover sheet user interface with display of the respective user interface (e.g., as shown in FIGS. 5F40-5F41). In some embodiments, when the cover sheet user interface serves as a cover sheet to conceal an application user interface or home screen user interface, the first upward swipe from the bottom edge of the device dismisses the cover sheet user interface and reveals the user interface that was displayed prior to displaying the cover sheet user interface (e.g., as shown in FIGS. 5F38-5F41). In some embodiments, after the cover sheet user interface is dismissed by the first upward swipe, a second upward swipe brings up the dock over the application user interface and a third upward swipe brings up the control panel (or a long swipe brings up the dock and the control panel user interface (e.g., as explained above in FIGS. 5F1-5F24). Displaying the control panel (e.g., overlaid on the cover sheet user interface) or dismissing the cover sheet user interface depending on whether the cover sheet user interface serves as a wake screen user interface or is concealing an application user interface enhances the operability of the device and makes the user-device interface more efficient (e.g., by helping the user to achieve an intended outcome with fewer required inputs and reducing user mistakes when operating/ interacting with the device, and by providing additional control options without cluttering the user interface with additional displayed controls) which, additionally, reduces power usage and improves battery life of the device by enabling the user to use the device more quickly and efficiently.

It should be understood that the particular order in which the operations in FIGS. 14A-14E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1100, 1200, 1300, 1400, 1500, 1600, 1800, and 1900) are also applicable in an analogous manner to method 1400 described above with respect to FIGS. 14A-14E. For example, the contacts, gestures, user interface objects, application views, control panels, controls, position thresholds, directional conditions, navigation criteria, movement parameters, thresholds, determinations, focus selectors, and/or animations described above with reference to method 1400 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1050, 1100, 1200, 1300, 1400, 1500, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 14A-14E are, optionally, implemented by components depicted in FIGS. 1A-1B. For example, display operation 1402, detection operation 1404, and display operation 1406 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15C are flow diagrams illustrating method 1500 of navigating to a control panel user interface from a different user interface in accordance with some embodiments. Method 1500 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1500 are, optionally, combined and/or the order of some operations is, optionally, changed.

As described below, method 1500 provides an intuitive way to navigate to a control panel user interface from a different user interface. The method reduces the number, extent, and/or nature of the inputs from a user when navigating to a control panel user interface from a different user interface, thereby creating a more efficient human-machine interface. For battery-operated electronic devices, enabling a user to navigate to a control panel user interface from a different user interface faster and more efficiently conserves power and increases the time between battery charges.

Method 1500 relates to transitioning from display of a first application to display of the control panel or notifications user interface in response to a swipe gesture from the top edge of the screen based on the region of the edge where the input originated. Swipe gestures from the bottom edge of the device transition display of a first application to display of a second application, the home screen, or an application-switching user interface based on different directional conditions and edge-swipe criteria. In addition, activation of the control panel user interface includes expansion of the status bar, providing the user with additional information about the current status of the device.

In some embodiments, method 1500 is performed at an electronic device with a touch-sensitive display (e.g., a touch-screen display that serves both as the display and the touch-sensitive surface). In some embodiments, the device does not have a home button (e.g., a mechanical button, a virtual button, a solid state button, etc.) that, when activated, is configured to dismiss a currently displayed user interface and replace the currently displayed user interface with a home screen that includes a plurality of application launch icons for a plurality of applications installed on the device. In some embodiments, the device has a home button (e.g., a mechanical button, a virtual button, a solid state button, etc.)

The device detects (1502) a first swipe gesture in a respective direction (e.g., down from the top of the device relative to the orientation of the display) from a first edge of the touch-sensitive display (e.g., contacts 5910, 5926, 5938, and 5982 having movements 5912, 5928, 5940, and 5984 illustrated in FIGS. 5G1, 5G7, 5G15, and 5H22 respectively). In some embodiments, detecting the swipe gesture includes detecting a first contact at an initial touch-down location that is within a predefined region of the device that is proximate to the edge of the display (e.g., an edge region that includes a predefined portion (e.g., 20 pixels wide) of the display near the top edge of the device and, optionally, a portion of the top edge of the display outside of the display). In some embodiments, detecting the swipe gesture includes detecting initial movement of a first contact, e.g., vertical movement away from the edge of the display. In some embodiments, the device is displaying a first user interface of a first application on the display when the swipe gesture is first detected.

In response to detecting the first swipe gesture from the first edge of the touch-sensitive display (1504), in accordance with a determination that a respective portion of the first swipe gesture (e.g., a beginning of the detected swipe gesture) occurs at a first portion of the first edge of the touch-sensitive display (e.g., the right or left side of the top edge of the device, relative to the current orientation of the display), the device displays a plurality of controls for adjusting settings of the touch-sensitive display (e.g., a control panel user interface with controls for network connections, display brightness, audio playback, peripheral devices, etc.). For example, because the swipe gestures in FIGS. 5G1, 5G15, and 5H22 were initiated from the right side of the top edge of the display, the downward motions of contacts 5910, 5938, and 5984 in FIGS. 5G2-5G3, 5G16-5G17, and 5H22-5H23 cause the device to display control panel 5914 and 5986, respectively. In some embodiments, the control panel user interface is overlaid on the first user interface of the first application (e.g., the home screen is visible, but blurred, behind control panel 5914 in FIG. 5G4, the lock screen is visible, but blurred, behind control panel 5914 in FIG. 5G17, and the interactive map user interface is visible, but blurred, behind control panel 5986 in FIG. 5H24).

In response to detecting the first swipe gesture from the first edge of the touch-sensitive display (1504), in accordance with a determination that the respective portion of the first swipe gesture (e.g., the beginning of the detected swipe gesture) occurs at a second portion of the first edge of the touch-sensitive display, the device displays a plurality of recently received notifications. For example, because the swipe gesture in FIG. 5G17 was initiated in the center of the top edge of the display, as opposed to the right side of the top of the display, the downward motion of contact 5926 in FIGS. 5G8-5G9 cause the device to display notifications 5932.

Allowing the user to navigate between the control panel, notifications, another application (e.g., a last displayed application), home, or application-switcher user interfaces depending on whether certain preset directional conditions and edge-swipe criteria are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the first portion of the first edge of the touch-sensitive display is smaller (1506) than the second portion of the first edge of the touch-sensitive display. For example, when displaying a user interface of the device, only a portion of the right half of the top of the screen, relative to the orientation of the display (e.g., landscape or portrait), is associated with activation of control panel (e.g., only the area of the top edge of the display to the right of boundary 5930, illustrated in FIG. 5G7, is associated with activation of control panel), while the rest of the top of the screen, relative to the orientation of the display, is associated with activation of notifications (e.g., the area of the top edge of the display to the left of boundary 5930, illustrated in FIG. 5G7, is associated with activation of notifications). This is why the swipe gestures initiated in FIGS. 5G1 and 5G15, starting to the right of boundary 5930 as illustrated in FIG. 5G7, result in the display of control panel 5914, while the swipe gesture initiated in FIG. 5G7, starting to the left of boundary 5930, results in the display of notifications 5932.

Allowing the user to navigate to the notification user interface based on whether the swipe gesture initiated from a larger area on the top of the screen, rather than a smaller area of the edge corresponding to navigation to the control panel user interface, enhances the operability of the device and makes the user-device interaction more efficient (e.g., by reducing inadvertent navigation to the control panel user interface and reducing the number of steps that are needed to achieve an intended outcome when operating the device), which, additionally, reduces power usage and improves the battery life of the device (e.g., by helping the user to use the device more quickly and efficiently).

In some embodiments, prior to detecting the first swipe gesture, one or more status indicators (e.g., or more of cell signal, airplane mode, LTE status, UMTS status, edge status, GPRS status, Wi-Fi-status, Bluetooth status, battery status, location services, alarm, display orientation lock, call forwarding status, network activity, syncing, hotspot status, or do not disturb) are displayed within the first portion of the first edge of the touch-sensitive display (e.g., status bar 402 illustrated in FIGS. 5G1 and 5G7, and 5G15). In response to detecting the first swipe gesture from the first edge of the touch-sensitive display, in accordance with a determination that a respective portion of the first swipe gesture (e.g., a beginning of the detected swipe gesture) occurs at the first portion of the first edge of the touch-sensitive display, the device changes (1508) a position of the one or more status indicators (e.g., dynamically) according to the movement of the first swipe gesture from the edge of the touch sensitive display (e.g., the one or more status indicators move down from the edge of the screen proportional to movement of the gesture away from the edge of the screen). For example, in response to the swipe gesture down from the right side of the top edge of the display, status bar 402 moves down and expands in FIG. 5G2, because the gesture initiated right of boundary 5930 is associated with activating control panel, but not in FIG. 5G8, because the gesture initiated left of boundary 5930 is not associated with navigating to notifications, rather than control panel.

Displaying information about the status of the electronic device more prominently upon detecting an input associated with (e.g., that causes) display of a control panel user interface enhances the operability of the device and makes the user-device interaction more efficient (e.g., by providing visual feedback regarding the current status of the device when the user has indicated a desire to navigate to a user interface where the controls are, optionally, changed and by providing particular information to the user when they are most likely to want that information, while saving prominent display space during other times), which, additionally, reduces power usage and improves the battery life of the device (e.g., by helping the user to use the device more quickly and efficiently).

In some embodiments, the one or more status indicators (e.g., status bar 402) displayed prior to detecting the first swipe gesture includes (1510) at least a first status indicator and a second status indicator and, wherein changing a position of the one or more status indicators includes adding display of at least a third status indicator to the one or more displayed status indicators (e.g., as the gesture pulls down control panel from the top left corner of the device, the status bar drops down from the edge of the device and expands to display additional status information). For example, status bar 402 includes indicators for battery level, WiFi connectivity, and cellular network connectivity in FIG. 5G1, and is expanded to include Bluetooth connectivity icon 5916 in response to the swipe gestures associated with navigation to the control panel user interface in FIG. 5G2.

Displaying additional information about the status of the electronic device upon detecting an input associated with (e.g., that causes) display of a control panel user interface enhances the operability of the device and makes the user-device interaction more efficient (e.g., by providing visual feedback regarding the current status of the device when the user has indicated a desire to navigate to a user interface where the controls are, optionally, changed and by providing particular information to the user when they are most likely to want that information, while saving prominent display space during other times), which, additionally, reduces power usage and improves the battery life of the device (e.g., by helping the user to use the device more quickly and efficiently).

In some embodiments, wherein the plurality of controls for adjusting settings of the touch-sensitive display includes (1512) one or more controls that are responsive to inputs on the touch-sensitive display (e.g., one or more settings of the touch-sensitive device can be changed in response to detecting an input on a control corresponding to the one or more settings). This is illustrated, for example, in FIGS. 5C1-5C45 and described with respect to method 1100. In some embodiments, the one or more settings of the touch-sensitive device can be changed in response to detecting an input that do not have a characteristic force above a predefined threshold (e.g., a light press), while inputs having a characteristic force above the predefined threshold (e.g., a deep press) triggers expansion of the control to allow for finer manipulation of the setting (e.g., the plurality of controls for adjusting settings of the touch-sensitive display includes a first control for controlling a first function of the device and a second control for controlling a second function of the device, as described in greater detail with respect to method 1100.

In some embodiments, the control panel user interface further includes one or more additional control regions, each of which includes a respective plurality of controls for controlling corresponding functions of the device. In some embodiments, while displaying the plurality of controls for adjusting settings of the touch-sensitive display (e.g., after termination of the swipe gesture that activated control panel): detecting a first input by a first contact on the touch-sensitive surface; and in response to detecting the first input by the first contact on the touch-sensitive surface (including detecting the first contact on the touch-sensitive surface and detecting that the first contact is maintained at its initial touch location with less than a threshold amount of movement before lift-off of the contact is detected (e.g., the first contact is a stationary contact)): in accordance with a determination that the first input meets control-region-expansion criteria, wherein the control-region-expansion criteria require that an intensity of the first contact exceeds a first intensity threshold (e.g., the first input is a press input within the first control region) in order for the control-region-expansion criteria to be met, replacing display of the first control region with display of an expanded first control region, wherein the expanded first control region includes the first control, the second control, and one or more additional controls that are not included in the first control region (e.g., the controls displayed in the expanded control region include controls that are related to the first control and the second control (e.g., the first control is a playback control, the second control is a volume control, and the additional controls include a playlist selection control, an audio routing control, a fast forward control, etc.)).

In accordance with a determination that the first input meets first-control-activation criteria, wherein the first-control-activation criteria require that the first contact is detected at a first location on the touch-sensitive surface that corresponds to the first control in the first control region (e.g., the first input is a tap on the first control) and do not require that intensity of the first contact exceeds the first intensity threshold in order for the first-control-activation criteria to be met (e.g., the first control activation criteria are capable of being satisfied when the intensity of the first contact does not exceed the first intensity threshold), activating the first control for controlling the first function of the device. In some embodiments, the first-control-activation criteria are satisfied with a hard, quick, tap that is still registered as a "tap" by a tap gesture recognizer, and the first-control-activation criteria do not always require that the intensity of the contact remain below a particular intensity threshold in order for the first-control activation criteria to be satisfied.

In accordance with a determination that the first input meets second-control-activation criteria, wherein the second-control-activation criteria require that the first contact is detected at a second location on the touch-sensitive surface that corresponds to the second control in the first control region (e.g., the first input is a tap on the second control) and do not require that intensity of the first contact exceeds the first intensity threshold in order for the second-control-activation criteria to be met (e.g., the second control activation criteria are capable of being satisfied when the intensity of the first contact does not exceed the first intensity threshold), activating the second control for controlling the second function of the device. In some embodiments, the second-control-activation criteria are satisfied with a hard, quick, tap that is still registered as a "tap" by a tap gesture recognizer, and the second-control-activation criteria do not always require that the intensity of the contact remain below a particular intensity threshold in order for the second-control activation criteria to be satisfied.

In some embodiments, the device generates a first tactile output when the control-region-expansion criteria are met by the first input, and the device generates a second tactile output when the first-control-activation criteria and/or the second-control-activation criteria are met by the first input, where the first tactile output and the second tactile output have different tactile output properties. In some embodiments (e.g., for devices that do not detect multiple levels of intensity variations in a contact), the control-region-expansion criteria are met by a touch-hold input by the first contact.

Providing additional controls or activating a currently selected control based on characteristics of a single input enhances the operability of the device and makes the user-device interface more efficient (e.g., by reducing the number of inputs needed to display additional controls, and thereby providing additional functionality and control functions without cluttering the UI with additional displayed controls) which, additionally, reduces power usage and improves battery life of the device by enabling the user to use the device more quickly and efficiently.

In some embodiments, the device detects (1514) a second swipe gesture in a respective direction (e.g., up from the bottom of the device, relative to the current orientation of the display) from a second edge of the touch-sensitive display that is different than the first edge of the touch-sensitive display (e.g., the swipe gesture including contact 5040 having movement 5042 in FIGS. 5A19-5A23 and the swipe gesture including contact 5968 having movement 5970 in FIGS. 5H9-5H12). In some embodiments, detecting the swipe gesture includes detecting a second contact at an initial touch-down location that is within a predefined region of the device that is proximate to the edge of the display (e.g., an edge region that includes a predefined portion (e.g., 20 pixels wide) of the display near the bottom edge of the device and, optionally, a portion of the bottom edge of the display outside of the display). In some embodiments, detecting the swipe gesture includes detecting initial movement of a second contact (e.g., vertical movement away from the edge of the display).

In response to detecting the second swipe gesture from the second edge of the touch-sensitive display, the device displays (1516) a home screen user interface (that is distinct from the application-switcher user interface and) that includes a plurality of application icons (e.g., for launching or opening applications) that correspond to a plurality of applications (e.g., including the plurality of recently open applications and, optionally, one or more additional applications that are closed without retained state information, such that when activated, the applications are started from their default starting states)). For example, in response to detecting the swipe gesture in FIGS. 5A19-5A23 and 5H9-5H11, the device navigates to a home screen, as illustrated in FIGS. 5A24 and 5H12, respectively.

Displaying a home screen user interface in response to a swipe gesture from an edge of the display is described in greater detail with respect to methods 600, 700, and 1900 illustrated in FIGS. 5A1-5A77 and 5H1-5H27.

Allowing the user to navigate to the home screen user interface based on a swipe gesture initiated from an edge of the display that is different from the edge of the screen associated with navigation to the control panel and notification user interfaces enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the device detects (1518) a second swipe gesture in a respective direction (e.g., up from the bottom of the device, relative to the current orientation of the display) from a second edge of the touch-sensitive display that is different than the first edge of the touch-sensitive display (e.g., the swipe gesture including contact 5004 having movement 5006 in FIGS. 5A2-5A7 and the swipe gesture including contact 5950 having movement 5952 in FIGS. 5H5-5H7). In some embodiments, detecting the swipe gesture includes detecting a second contact at an initial touch-down location that is within a predefined region of the device that is proximate to the edge of the display (e.g., an edge region that includes a predefined portion (e.g., 20 pixels wide) of the display near the bottom edge of the device and, optionally, a portion of the bottom edge of the display outside of the display). In some embodiments, detecting the swipe gesture includes detecting initial movement of a second contact (e.g., vertical movement away from the edge of the display).

In response to detecting the second swipe gesture from the second edge of the touch-sensitive display, the device displays (1520) an application-switcher user interface that includes a plurality of representations of applications (e.g., application launch icons, reduced scale images of application user interfaces, etc.) for selectively activating one of a plurality of applications represented in the application-switcher user interface (e.g., selection of a respective application-selection object re-activates the corresponding application to a state immediate prior to the suspension of the application). For example, in response to detecting the swipe gesture in FIGS. 5A2-5A7 and 5H5-5H7, the device navigates to an application-switcher user interface, as illustrated in FIGS. 5A8 and 5H8, respectively. In some embodiments, the representations of applications are ordered based on a recency of use of the applications to which they correspond (e.g., with representations of more recently used apps displayed before/above representations of less recently used apps). In some embodiments, the application-switcher user interface includes at least a portion of a control panel user interface).

Displaying an application-switcher user interface in response to a swipe gesture from an edge of the display is described in greater detail with respect to methods 600, 700, 800, and 1900 illustrated in FIGS. 5A1-5A77 and 5H1-5H27.

Allowing the user to navigate to the application-switcher user interface based on a swipe gesture initiated from an edge of the display that is different from the edge of the screen associated with navigation to the control panel and notification user interfaces enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the device detects (1522) a second swipe gesture in a respective direction (e.g., up from the bottom of the device, relative to the current orientation of the display) from a second edge of the touch-sensitive display that is different than the first edge of the touch-sensitive display (e.g., the swipe gestures including contacts 5004 and 5040, having movements 5006 and 5042, in FIGS. 5A2-5A7 and 5A19-5A23, respectively). In some embodiments, detecting the swipe gesture includes detecting a second contact at an initial touch-down location that is within a predefined region of the device that is proximate to the edge of the display (e.g., an edge region that includes a predefined portion (e.g., 20 pixels wide) of the display near the bottom edge of the device and, optionally, a portion of the bottom edge of the display outside of the display). In some embodiments, detecting the swipe gesture includes detecting initial movement of a second contact (e.g., vertical movement away from the edge of the display).

In response to detecting the second swipe gesture from the second edge of the touch-sensitive display: in accordance with a determination that the second swipe gesture meets application-switcher-display criteria (e.g., based on a predefined movement parameter of the second portion of the input, or based on a predefined movement parameter of the first application view (e.g., either actual movement or projected movement), the device displays (1524) an application-switcher user interface that includes a plurality of representations of applications (e.g., application launch icons, reduced scale images of application user interfaces, etc.) for selectively activating one of a plurality of applications represented in the application-switcher user interface (e.g., selection of a respective application-selection object re-activates the corresponding application to a state immediate prior to the suspension of the application). For example, as illustrated in FIGS. 5A2-5A8.

In some embodiments application-switcher-display criteria require that the second portion of the input or the first application view meets a first movement condition (e.g., a first condition regarding the contact's speed, acceleration, position, or a combination of one or more of the above, or a first condition regarding a derived movement parameter of the first application view that is based on one or more of the above and optionally one or more additional properties characterizing the state of the current user interface and/or the movements of one or more objects contained therein, etc.) in order for the application-switcher-display criteria to be met). In some embodiments, the representations of applications are ordered based on a recency of use of the applications to which they correspond (e.g., with representations of more recently used apps displayed before/above representations of less recently used apps). In some embodiments, the application-switcher user interface includes at least a portion of a control panel user interface.

In response to detecting the second swipe gesture from the second edge of the touch-sensitive display: in accordance with a determination that the second swipe gesture meets home-display criteria (e.g., based on a predefined movement parameter of the second portion of the input, or based on a predefined movement parameter of the first application view (e.g., either actual movement or projected movement), the device displays (1524) a home screen user interface (that is distinct from the application-switcher user interface and) that includes a plurality of application launch icons that correspond to a plurality of applications (e.g., including the plurality of recently open applications and, optionally, one or more additional applications that are closed without retained state information, such that when activated, the applications are started from their default starting states)). For example, as illustrated in FIGS. 5A19-5A24.

In some embodiments, home-display criteria require that the second portion of the input or the first application view meets a second movement condition that is different from the first movement condition (e.g., a second condition regarding the contact's speed, acceleration, position, or a combination of one or more of the above, or a second condition regarding a derived movement parameter of the first application view that is based on one or more of the above and optionally one or more additional properties characterizing the state of the current user interface and/or movements of one or more objects contained therein, etc.) in order for the home-display criteria to be met.

Determining whether to display an application-switcher user interface or a home screen user interface in response to a swipe gesture from an edge of the display is described in greater detail with respect to methods 600, 700, 800, and 1900 illustrated in FIGS. 5A1-5A77 and 5H1-5H27.

Allowing the user to navigate to the home screen or application-switcher user interface based on a swipe gesture initiated from an edge of the display that is different from the edge of the screen associated with navigation to the control panel and notifications user interface and based on movement parameters of the input that are different for displaying the home screen than for displaying the application-switcher user interface, enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, the second edge of the touch-sensitive display is opposite (1526) the first edge of the touch-sensitive display on the electronic device (e.g., control panel is activated by a swipe gesture down from the upper right of the touch-sensitive display, notifications is activated by a swipe down from the upper left and center of the touch sensitive display, and navigation to the home screen and application-switcher is accessed through a swipe gesture up from the bottom of the touch-sensitive display, relative to the current orientation of the display on the device). For example, the swipe gestures in FIGS. 5G1-5G3, 5G7-5G9, and 5H22-5H23 navigating to control panel and notifications, respectively, start from the top edge of the device, while the swipe gestures in FIGS. 5A2-5A7, 5A19-5A23, 5H5-5H7, and 5H9-5H11, navigating to the application-switcher and home screen, start from the bottom edge of the device.

Allowing the user to navigate to the home screen or application-switcher user interface based on a swipe gesture initiated from an opposite edge of the display than the edge of the screen associated with navigation to the control panel and notifications user interface enhances, and based on movement parameters of the input that are different for displaying the home screen than for displaying the application-switcher user interface, enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently).

In some embodiments, while displaying the plurality of controls for adjusting settings of the touch-sensitive display, wherein the plurality of controls includes a first control (e.g., flashlight control 5922 in FIG. 5G5) for adjusting a first setting of the touch-sensitive display but does not include a second control (e.g., battery control 5924) for adjusting a second setting of the touch-sensitive display (e.g., if control panel includes more than a threshold quantity of controls, only a sub-plurality of all controls are displayed within control panel at any one time), the device detects (1528) a third swipe gesture in a respective direction across the plurality of controls for adjusting settings of the touch-sensitive display (e.g., the swipe gesture including contact 5918 and movement 5920, across control panel 5914, in FIG. 5G5. In some embodiments, detecting the third swipe gesture includes detecting a third contact at an initial touch-down location that is within a predefined region displaying the pluralities of controls, e.g., the swipe must be initiated within control panel.

In response to detecting the third swipe gesture, the device ceases (1530) to display the first control (e.g., flashlight control 5922 is not displayed in control panel 5914 in FIG. 5G6) for adjusting the first setting of the touch-sensitive display in the plurality of controls for adjusting settings of the touch-sensitive display (e.g., sliding the first control out of the control panel display), and displays the second control (e.g., battery control 5924 is displayed in control panel 5914 in FIG. 5G6) for adjusting the second setting of the touch-sensitive display in the plurality of controls for adjusting settings of the touch-sensitive display (e.g., sliding the second control onto the control panel display by shifting which controls are visible in the control panel user interface while maintaining display of at least a portion of the control panel user interface on the display). In some embodiments, the controls in the control panel slide in response to a swipe gesture in the respective direction across the plurality of controls when there are more controls (e.g., an amount of controls that take up more than the allotted area for the control panel user interface on the touch-sensitive display) in the control panel user interface than can be displayed on the touch-sensitive display at the same time (e.g., in response to detecting the third swipe gesture, in accordance with a determination that there are more than a predetermined amount of controls in the control panel, the control panel shifts in the respective direction, and in accordance with a determination that there are less than the predetermined amount of controls in the control panel, the control panel does not shift in the respective direction).

In some embodiments, a swipe in the respective direction that starts from the second edge of the touch-sensitive display causes the control panel user interface to cease to be displayed instead of any of: maintaining at least a portion of the control panel user interface on the display (e.g., which occurs when the swipe in the respective direction occurs at a location that does not start from the second edge of the touch-sensitive display as described above), displaying a home screen user interface (e.g., which would occur in response to a long and/or fast swipe in the respective direction that started from the second edge of the touch-sensitive display, as described with respect to method 600, illustrated in FIGS. 5A1-5A77), or displaying an application switching user interface on the display (e.g., which would occur in response to a short and/or slow swipe in the respective direction that started from the second edge of the touch-sensitive display, as described with respect to method 600, illustrated in FIGS. 5A1-5A77).

Allowing the user to navigate within the control panel user interface to display additional device controls enhances the operability of the device and makes the user-device interaction more efficient (e.g., by reducing the number of steps that are needed to achieve an intended outcome when operating the device, and by allowing individual controls to be displayed at a large enough size on the display such that they can be directly manipulated without having to navigate between another layer of the user interface), which, additionally, reduces power usage and improves the battery life of the device (e.g., by helping the user to use the device more quickly and efficiently).

It should be understood that the particular order in which the operations in FIGS. 15A-15C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1100, 1200, 1300, 1400, 1600, 1800, and 1900) are also applicable in an analogous manner to method 1500 described above with respect to FIGS. 15A-15C. For example, the control panel, controls, contacts, gestures, user interface objects, tactile outputs, thresholds, determinations, focus selectors, and animations described above with reference to method 1500 optionally have one or more of the characteristics of the control panel, controls, contacts, gestures, user interface objects, tactile outputs, thresholds, determinations focus selectors, animations described herein with reference to other methods described herein (e.g., methods 600, 700, 800, 900, 1000, 1050, 1100, 1200, 1300, 1400, 1600, 1800, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B. For example, detection operation 1502 and display operation 1504 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 16A-16D are a flow diagram illustrating a method 1600 of navigating between user interfaces, in accordance with some embodiments. The method 1600 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1600 are, optionally, combined and/or the order of some operations is, optionally, changed.

Method 1600 relates to navigating between user interfaces in response to a swipe gesture that meets different movement conditions. Allowing the user to navigate (i) to the home screen, (ii) to the application displayed on the screen prior (e.g., immediately prior) to a user interface that was displayed when the swipe gesture began (e.g., a "next or previous application"), (iii) to an application switching user interface (sometimes referred elsewhere as a "multitasking" user interface), or (iv) back to the user interface that was displayed when the swipe gesture began (the "current application"), depending on whether certain preset movement conditions (e.g., velocity and position threshold criteria) are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently). In some embodiments, a dock is displayed on the currently displayed user interface in response to an initial portion of the input that meets a movement condition corresponding to dock-display. In some embodiments, some of the thresholds are adjusted depending on whether the dock was already displayed on the screen when the input began. Method 1600 relates to improving the accuracy of navigating between user interfaces, by dynamically adjusting threshold values based on predicted final user interface states. Additionally, method 1600 relates to improving the accuracy of navigating between user interfaces by reducing the impact of unintended inputs and artifacts associated with the lack of motion sensors outside of the display region.

Method 1600 is performed at a device having a display and a touch-sensitive surface (in some embodiments, the display is a touch-sensitive display), displaying a user interface (e.g., an application user interface or a home screen user interface) (e.g., on the touch-screen display). The device detects (1602) a contact at the bottom edge of the touch-screen display (e.g., contact 5004, 5040, 5052, 5056, 5060, 5064, 5065, 5069, 5070, 5074, 5950, 5968, 5972, 5980, and 5988 in FIGS. 5A2, 5A19, 5A34, 5A37, 5A40, 5A43, 5A46, 5A49, 5A52, 5A57, 5H5, 5H9, 5H13, 5H18, and 5H25 respectively) and enters a transitional user interface allowing the user to navigate to different user interfaces (e.g., back to the current application, to a different (e.g., next/previous) application user interface, to a home screen user interface, or to an application-switcher user interface). In some embodiment, the device replaces the user interface for the application with a corresponding application view (e.g., application views 5010, 5022, 5022, 5010, 5010, 5022, 5014, 5022, 5014, and 5954 in FIGS. 5A3, 5A20, 5A35, 5A38, 5A41, 5A44, 5A47, 5A50, 5A53, 5H7, 5H10, 5H14, 5H19, and 5H26, respectively) in the transitional user interface. In some embodiments, before the device enters the transitional user interface, the device fully displays an application dock over the currently displayed user interface in response to an initial portion of the input, and the device displays the transitional user interface after the dock is fully displayed and the input meets a preset (e.g., static or dynamic) movement condition (e.g., positional threshold 5948 in FIGS. 5H6-5H7). In some embodiments, the device enters the transitional user interface before the dock is fully displayed on the screen.

The device monitors (1604) the position and velocity of the contact and provides visual feedback, (e.g., by moving, shrinking, or enlarging the application view that replaced the user interface when the input began) indicating to the user how the device will navigate (e.g., what user interface will be displayed and active) upon lift-off of the contact. In some embodiments, the position and velocity of the contact correspond to the display of the application view providing feedback to the user. For example, as illustrated in FIG. 5A5, device 100 monitors the position and velocity of application view 5010. Because the instantaneous velocity of application view 5010 meets home-display criteria, the device displays application view 5010 without displaying an application view for any other recently open application, indicating that the device will navigate to the home screen user interface upon immediate lift-off of the contact.

In contrast, as illustrated in FIG. 5A6, because application view 5010 has paused at a position that meets application-switcher-display criteria, rather than home-display criteria, the device additionally displays a portion of application view 5014, corresponding to a recently open application, and a portion of control panel view 5016, corresponding to a control panel, indicating that the device will navigate to an application-switcher user interface upon immediate lift-off of the contact. In some embodiments, the control panel user interface is not accessible from the transitional user interface and, thus, when the device provides visual feedback indicating that the target state of the device is the application-switcher user interface it does not include display of a representation of a control panel user interface. Example embodiments, where the control panel is accessible in response to detecting a swipe-gesture from the top of the display, rather than a swipe-gesture from the bottom of the display is home state and the application-switcher state, are discussed in greater detail herein with respect to methods 1500 and 1900, illustrated in FIGS. 5G1-5G17 and 5H1-5H27.

The device then assigns (160*x*1) a current target state (e.g., a user interface that would be navigated to if the input were to be lifted-off at that time) based on the current properties of the input (e.g., predicting what user interface the user will navigate to upon lift-off of the input). As illustrated in FIG. 16A, the device selects a target state by proceeding through one or more (e.g., a series of) decisions (160*x*2-160*x*11) based on the current characteristics of the input and the value of one or more thresholds (e.g., by comparing the input characteristics to various velocity and position thresholds).

Each of these decisions is shown in more detail in corresponding FIGS. 16B-16D and described below in greater detail. One or more of the decisions are, optionally excluded or rearranged within assignment operation 160*x*1. In some embodiments, additional decisions are, optionally, added to the set of decisions within assignment operation 160*x*1. Additionally, decisions resulting in the display of other user interfaces (e.g., a control panel user interface or a notifications user interface) are, optionally, added to the set of decisions within assignment operation 160*x*1.

The device then determines (1636) whether liftoff of the contact was detected. If lift-off was detected, the device navigates to (1638) (e.g., displays the user interface for) the currently assigned target state (e.g., the target state assigned by assignment operation 160*x*1). For example, liftoff of contact 5004, 5040, 5052, 5056, 5060, 5064, 5065, 5069, 5070, 5074, 5950, 5968, 5972, 5980, and 5988 in FIGS. 5A7, 5A24, 5A36, 5A39, 5A42, 5A45, 5A48, 5A51, 5A56, 5A59, 5H8, 5H12, 5H17, 5H21, and 5H27, respectively, results in navigation to the assigned user interface target state. For example, because contact 5004 was paused at position 5004-*e*, in FIG. 5A6, before liftoff was detected, in FIG. 5A7, the device would have assigned application-switcher as the target state (e.g., according to decision 160*x*6 "pause for app-switcher," because the current velocity of the threshold was located within sector V, near the origin in FIG. 17A, application-switcher is assigned as the target state) such that the device navigates to the application-switcher user interface in FIG. 5A8 because it is the currently assigned target state when liftoff is detected in FIG. 5A7.

Figure 16D:
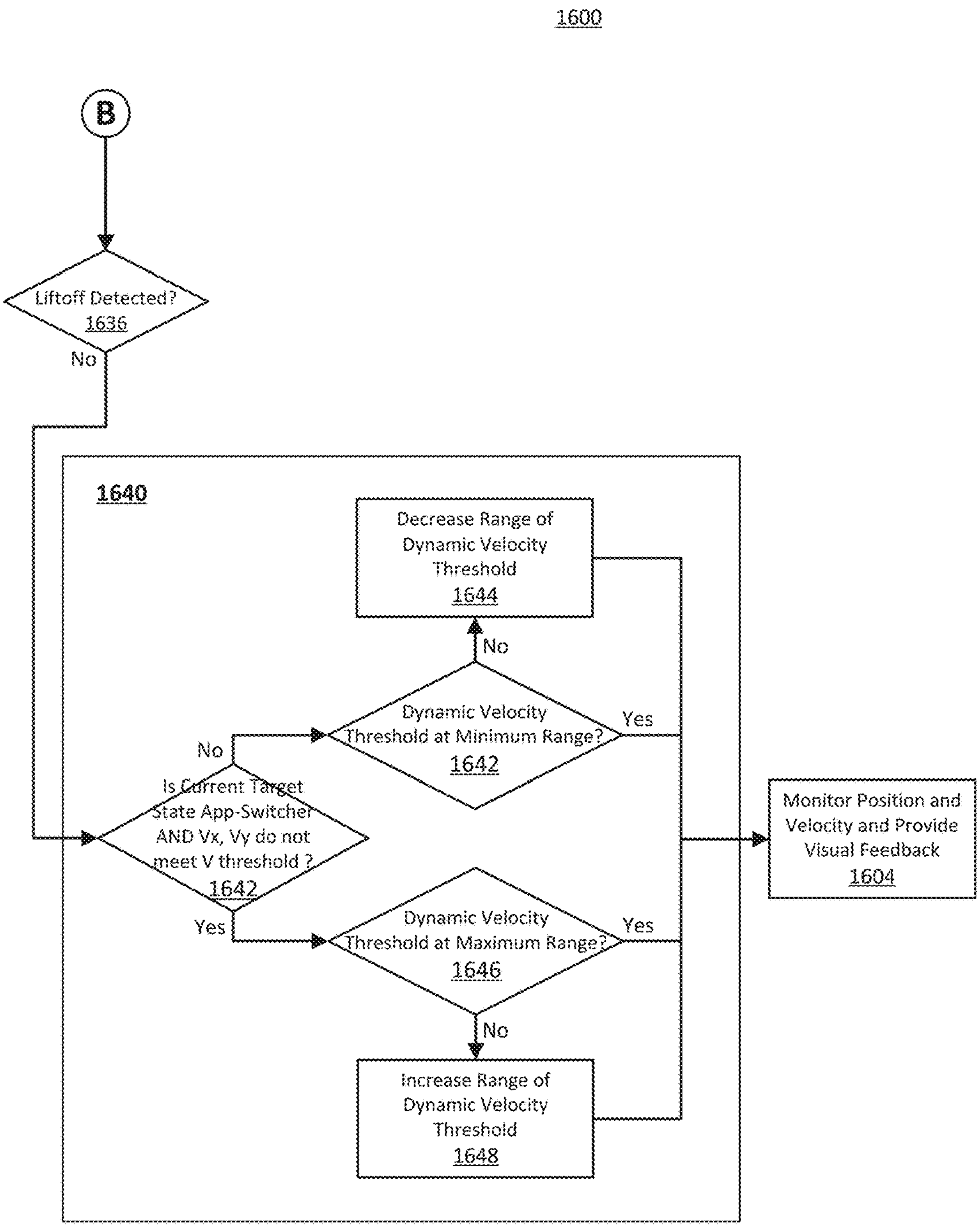
Figure 17A:
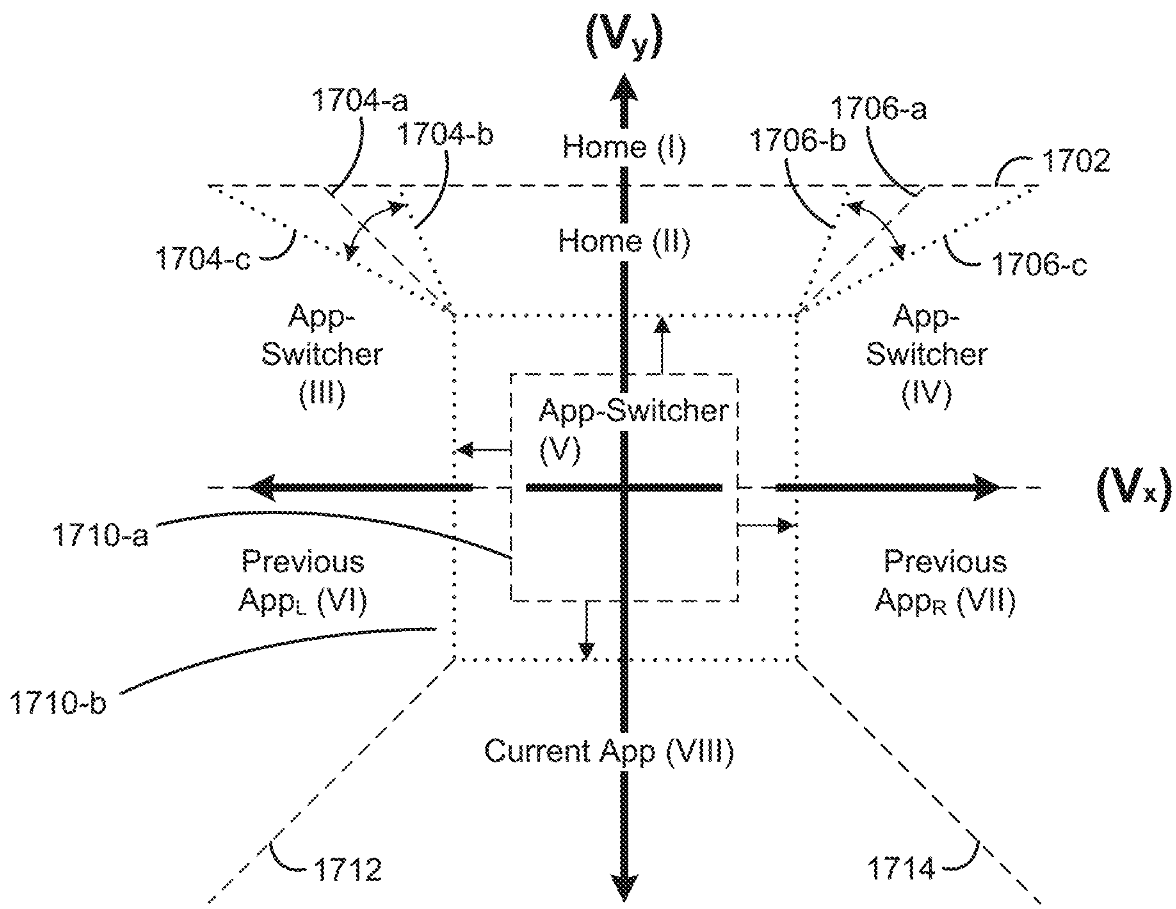
FIGS. 17A-17C illustrate static and dynamic velocity and positional boundaries for navigating between application user interfaces, an application-switcher user interface, and a home screen user interface, in accordance with some embodiments.
Figure 17B:
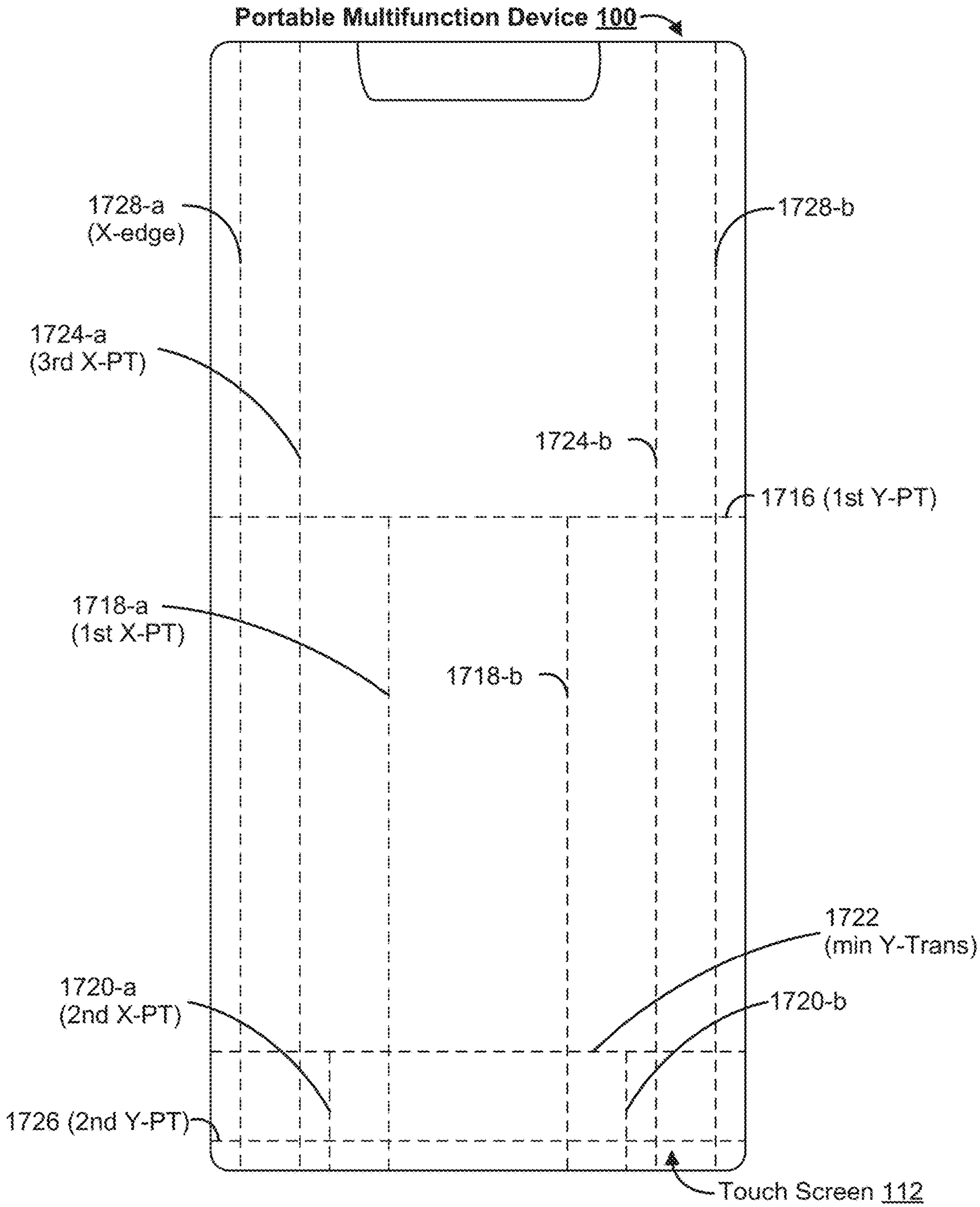
Figure 17C:
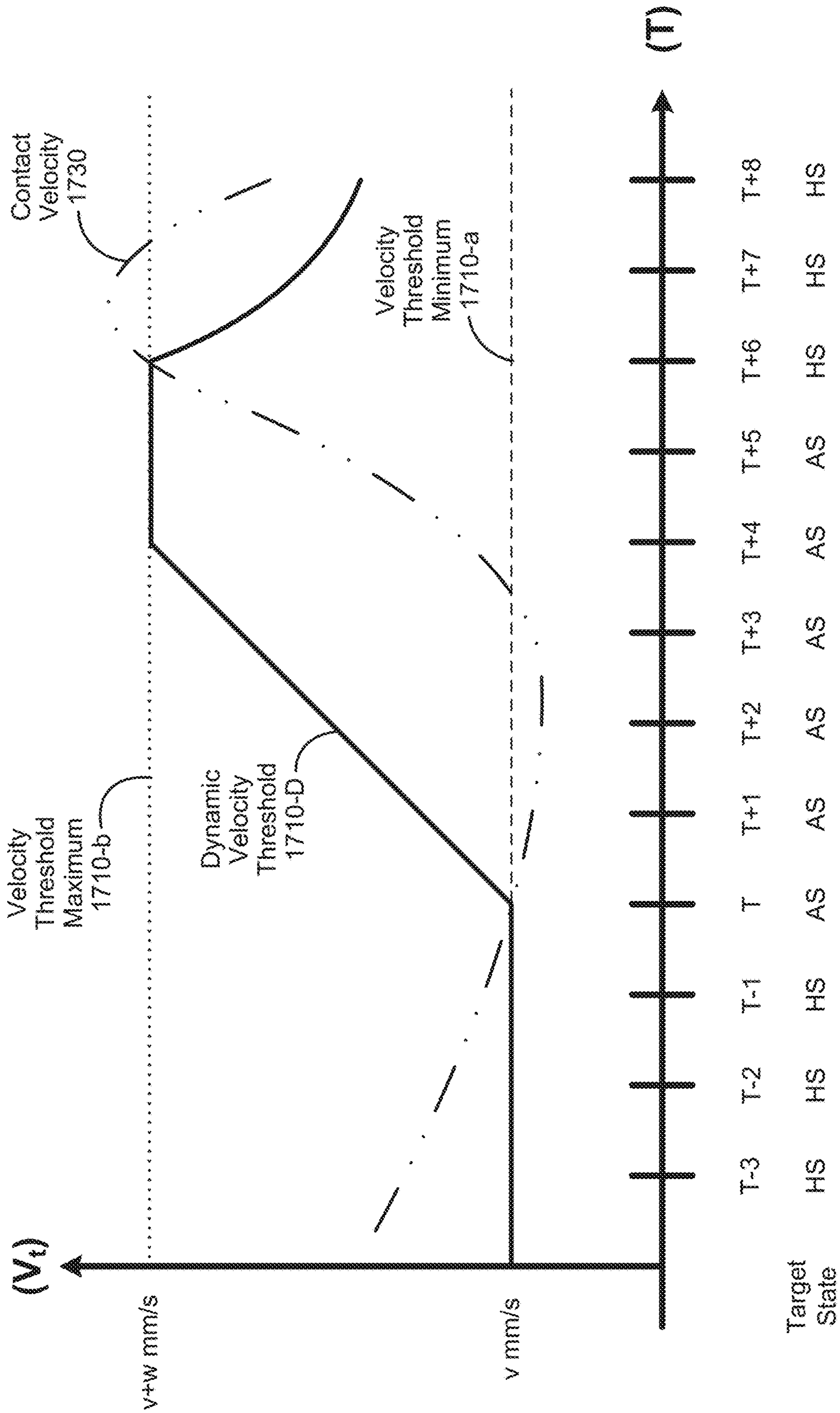

If liftoff has not been detected, the device optionally updates (1640) a dynamic threshold affecting the selection of one or more current target user interfaces, e.g., according to the sub-method illustrated in FIG. 16D. In some embodiments, dynamic thresholds are adjusted to favor a currently predicted final user interface target state to prevent unintended changes in the properties of the input during lift-off of the contact to affect the final determination. For example, in some embodiments, if the user pauses a contact at a position on the display corresponding to navigation to the application-switcher user interface, the device provides visual feedback by starting to slide representations of previous user interfaces under the representation of the "current application." To prevent the device from navigating home if the user incidentally moves his finger quickly up while lifting-off, the device will increase a dynamic velocity threshold (e.g., velocity threshold range 1710 in FIG. 17A) while the contact is paused, in anticipation of a liftoff event navigating the device to the application-switcher user interface.

If liftoff was not detected, the device continues to monitor (1604) the properties of the input and provide visual feedback, update (e.g., assign) (**160*x*1) the current target state, and optionally update (1640) dynamic threshold values until liftoff is detected (1636**).

In some embodiments, when assigning (**160*x*1) a current target state, the device first determines (160*x*2) whether the input appears to be a "flick up to go home" gesture (e.g., an input that is substantially fast in the vertical direction or fast enough and substantially vertical (e.g., more vertical than horizontal)), indicating an intent of the user (as determined by the device) to navigate to the home screen user interface. The device determines whether the velocity of the contact meets (1606) a first y-velocity threshold (e.g., velocity threshold 1702, defining sector I in FIG. 17A) or meets (1608) a second velocity threshold (e.g., a lower y-velocity threshold such as velocity threshold 1710 in the y-direction (e.g., distinguishing sector II from sector V) in FIG. 17A) and is substantially upwards (e.g., within slope thresholds 1704 and 1706 (distinguishing sector II, where the velocity is more vertical, from sectors III and IV, where the velocity of the contact is more horizontal) in FIG. 17A). If the properties of the contact meet either of these criteria, the device assigns (1612**) the home screen user interface as the current target state.

In some embodiments, the device then checks for one or more exceptions (e.g., via decisions **160*x*9, 160*x*10, and 160*x*11, described in more detail below) that, in some circumstances, reassign the current target state. The device then determines (1636) whether liftoff has been detected and, if so, navigates to (e.g., displays) (1638) the home screen user interface if the current target state was not reassigned according to an exception. For example, assuming that movement 5042 of contact 5022 in FIG. 5A22 was either faster than y-velocity threshold 1702 or fell within sector III in FIG. 17A (e.g., satisfying "flick up to go home" criteria (1606) or (1608)), the device assigns the home screen user interface as the current target state, such that upon liftoff in FIG. 5A23**, the device navigates (e.g., displays) the home screen user interface because it was the current target state at the time of liftoff.

In some embodiments, if the device determines that the input does not satisfy "flick up to go home" criteria (**160*x*2), the device then determines (160*x*3) whether the input appears to be a "drag up to go home" gesture (e.g., an input that travels sufficiently far in the vertical direction, regardless of how fast), indicating an intent of the user (as determined by the device) to navigate to the home screen user interface. The device determines (1610) whether the y-position of the input (e.g., either a current y-position of the contact/user interface representation or a predicted y-position of the user interface representation) meets a first y-position threshold (e.g., first y-position threshold 1716 in FIG. 17B). If the properties of the contact meet this criteria, the device assigns (1612**) the home screen user interface as the current target state.

In some embodiments, the device then checks for exceptions (e.g., via decisions **160*x*9, 160*x*10, and 160*x*11, described in more detail below) that, in some circumstances, reassign the current target state. The device then determines (1636) whether liftoff has been detected and, if so, navigates to (e.g., displays) (1638) the home screen user interface if the current target state was not reassigned according to an exception. For example, assuming that the position of 5022 in FIG. 5A22 is sufficiently far enough from the bottom edge of the display (e.g., past y-position threshold 1716 depicted in FIG. 17B), e.g., satisfying "drag up to go home" criteria (1610), the device assigns the home screen user interface as the current target state, such that upon liftoff in FIG. 5A23**, the device navigates (e.g., displays) the home screen user interface because it was the current target state at the time of liftoff.

In some embodiments, if the device determines that the input does not satisfy "drag up to go home" criteria (**160*x*3), the device then determines (160*x*4) whether the input appears to be a "side swipe for next/previous app" gesture (e.g., a swipe to the right or left with sufficient horizontal velocity, that is either moving downward or near the bottom of the display, and that is not indicative of returning from a peak of a next/previous application), indicating an intent of the user (as determined by the device) to navigate to a different application in the application stack (e.g., a previously displayed application user interface). The device first determines (1614) whether the x-velocity of the input meets a first x-velocity threshold in a horizontal direction (e.g., when traveling leftwards, a velocity threshold defined by the left boundary of the range of velocity threshold 1710 in conjunction with slope thresholds 1704 and 1712, defining the union of sectors III and VI in FIG. 17A or, when traveling rightwards, a velocity threshold defined by the right boundary of the range of the velocity threshold 1710 in conjunction with slope thresholds 1706 and 1714, defining the union of sectors IV and VII in FIG. 17**A.

In some embodiments, if the contact meets this criteria, the device then determines whether the projected y-position of the representation of the user interface corresponding to the user interface displayed when the input was first detected is below (1618) the current y-position of the representation (e.g., whether the card is traveling with downward motion on the display; in some embodiments, rather than determining a projected position of the representation, the device determines whether the y-velocity of the contact is negative (e.g., traveling towards the bottom edge of the display)) or the y-position of the contact (e.g., or UI representation) is below (1620) a y-position threshold (e.g., a minimal y-position threshold corresponding to a probability that the input was an inadvertent edge-touch). If the input does not meet either of these criteria, the device assigns (1622) the application-switcher user interface as the current target state.

In some embodiments, if the input meets either of the y-velocity (1618) or y-position (1620) criteria, the device determines (1621) whether the input is traveling in a direction opposite of a previous direction it traveled after a threshold amount of movement. If the input does not meet this criteria, the device assigns (1624) a next/previous application user interface as the current target state. For example, in FIG. 5A44, contact 5064 is traveling to the right and did not previously travel to the left, so the device assigns a previous application user interface (e.g., corresponding to representation 5014) as the current target state. In some embodiments, the decision as to whether to select a next application or a previous application as a current target state depends on a direction of movement (e.g., a direction of change in position of the input or a direction of velocity of the input) of the input that is used to make the determination to set the next/previous application user interface as the current target state. In some embodiments, the direction of change in position of the input is used to determine whether to select a next application or a previous application as the current target state if the direction of change in position is the determining characteristic of the input. In some embodiments, the direction of velocity of the input is used to determine whether to select a next application or a previous application as the current target state if the direction of velocity is the determining characteristic of the input. For example, if the input moves to the left and next/previous application is selected as the current target state, then previous application is selected as the current target state and if the input moves to the right and next/previous application is selected as the current target state, then next application (or a control panel user interface, if there is no next application) is selected as the current target state, or vice versa.

In some embodiments, if the input is traveling in a direction opposite of a previous direction it traveled after a threshold amount of movement (e.g., satisfying criteria (1621)), the device assigns (1630) the current application user interface as the current target state. This assignment avoids unintended navigations, for example, when a user starts a swipe gesture right to peek at a previous application user interface, without intent to actually navigate to the previous application user interface, and then changes the direction of the input to return to the "current application." Without this rule, assignment logic 160*x*1 would assign a next application user interface (e.g., an application to the right of the "current" application), rather than the current application. For example, in FIG. 5A44 an email application corresponding to representation 5022 is assigned as the "current application" because that is the application that was active when contact 5064 was first detected in FIG. 5A43. Contact 5064 has moved to the left to display a portion of an application interface (e.g., provide the user with the opportunity to peek at the messaging user interface corresponding to representation 5014). If, having peeked at the messaging application, the user changed the direction of contact 5064 back to the left, with intent to return to the email user interface, the device would assign the web browsing application, corresponding to representation 5010 in FIG. 5A41, e.g., the "next application" user interface (because the card stack did not reshuffle after navigation from the web browsing user interface to the email user interface in FIGS. 5A40-5A41, representation 5010 corresponding to web browsing application sits to the right—as the "next application"—of representation 5022 corresponding to the email application), as the current target state without this exception because the input otherwise meets x-velocity criteria (1614) to the left and y-position criteria (1620).

Having assigned the application-switcher user interface (1622), next/previous application user interface (1624), or current application user interface (1630) as the current target state, in some embodiments, the device then checks for exceptions (e.g., via decisions 160*x*9, 160*x*10, and 160*x*11, described in more detail below) that, in some circumstances, reassign the current target state. The device then determines (1636) whether liftoff has been detected and, if so, navigates to (e.g., displays) (1638) the currently assigned target state user interface.

In some embodiments, if the device determines that the input does not satisfy "side swipe for next/previous app" criteria (160*x*4), the device then determines (160*x*5) whether the input appears to be a "bottom edge swipe for next/previous app" gesture (e.g., an input traveling left or right along the bottom edge of the display), indicating an intent of the user (as determined by the device) to navigate to a previously displayed application user interface. The device determines (1616) whether the x-position of the input (e.g., either a current x-position of the contact/user interface representation or a predicted x-position of the user interface representation) meets a second x-position threshold (e.g., second x-position threshold 1720 depicted in FIG. 17B) in a right or left direction with minimal y-translation (e.g., below min y-translation threshold 1722 depicted in FIG. 17B). If the properties of the contact meet this criteria, the device assigns (1624) a next/previous application user interface as the current target state.

In some embodiments, the device then checks for exceptions (e.g., via decisions 160*x*9, 160*x*10, and 160*x*11, described in more detail below) that, in some circumstances, reassign the current target state. The device then determines (1636) whether liftoff has been detected and, if so, navigates to (e.g., displays) (1638) a next/previous user interface if the current target state was not reassigned according to an exception. For example, assuming that the position of contact 5064 in FIG. 5A44 is sufficiently far enough to the right (e.g., past x-position threshold 1720-*b* depicted in FIG. 17B) and close enough to the bottom edge of the display (e.g., below minimum y-translation threshold 1722 depicted in FIG. 17B), e.g., satisfying "side swipe for next/previous app" criteria (1616), the device assigns the messaging application user interface corresponding to representation 5014 in FIG. 5A44, such that upon liftoff in FIG. 5A45, the device navigates (e.g., displays) the messaging user interface because it was the current target state at the time of liftoff.

In some embodiments, if the device determines that the input does not satisfy "bottom edge swipe for next/previous app" criteria (160*x*5), the device then determines (160*x*6) whether the input appears to be a "pause for app-switcher" gesture (e.g., a pause or near pause in the velocity of an input), indicating an intent of the user (as determined by the device) to navigate to an application-switcher user interface. The device determines (1626) whether the x-velocity and y-velocity of the input (e.g., either current x,y-position of the contact/user interface representation or a predicted x,y-position of the user interface representation) have a minimal velocity (e.g., a velocity corresponding to a point near the origin, in sector V, of the velocity threshold scheme depicted in FIG. 17A). If the properties of the contact meet this criteria, the device assigns (1622) an application-switcher user interface as the current target state.

In some embodiments, the device then checks for exceptions (e.g., via decisions 160*x*9, 160*x*10, and 160*x*11, described in more detail below) that, in some circumstances, reassign the current target state. The device then determines (1636) whether liftoff has been detected and, if so, navigates to (e.g., displays) (1638) an application-switcher user interface if the current target state was not reassigned according to an exception. For example, assuming that the x- and y-velocity of contact 5004 where minimal in FIG. 5A6 (e.g., near the origin of the velocity threshold scheme depicted in FIG. 17A), e.g., satisfying "pause for app-switcher" criteria (1626), the device assigns the application switcher user interface as the current target state, such that upon liftoff in FIGS. 5A7-5A8, the device navigates (e.g., displays) the application-switcher user interface because it was the current target state at the time of liftoff.

In some embodiments, if the device determines that the input does not satisfy "pause for app-switcher" criteria (160*x*6), the device then determines (160*x*7) whether the input appears to be a "swipe down to cancel" gesture (e.g., movement of the input back towards the bottom of the screen with a sufficiently vertical direction and sufficient y-velocity), indicating an intent of by the user (as determined by the device) to navigate back to the current application user interface (e.g., the user interface displayed when the input was first detected). The device determines (1628) whether the velocity of the input is in a substantially downward direction (e.g., within slope thresholds 1712 and 1714 (distinguishing sector VIII, where the velocity is more vertical, from sectors VI and VII, where the velocity of the contact is more horizontal) in FIG. 17A). This criteria requires that the velocity fall within sector VIII of the velocity threshold scheme depicted in FIG. 7A, which requires a minimum y-velocity threshold satisfying the value equal to the bottom boundary of the range of velocity threshold 1710 in FIG. 17A (e.g., separating sector V from sector VIII). However, because the device already determined that the velocity of the contact did fall within sector V (e.g., the input is not a "pause for app-switcher" 160*x*6 gesture), the device does not need to check for a minimum y-velocity at this step. In some embodiments, where "swipe down to cancel" decision 160*x*7 is made before "pause for app-switcher" decision 160*x*6, or "pause for app-switcher" decision 160*x*6 is not included, the application will determine whether the y-velocity of the contact meets a minimum y-velocity threshold, such as the lower boundary of the range of velocity threshold 1710 depicted in FIG. 17A. If the properties of the contact meet this criteria, the device assigns (1630) the current application user interface as the current target state.

In some embodiments, the device then checks for exceptions (e.g., via decisions 160*x*9, 160*x*10, and 160*x*11, described in more detail below) that, in some circumstances, reassign the current target state. The device then determines (1636) whether liftoff has been detected and, if so, navigates to (e.g., displays) (1638) the current application user interface if the current target state was not reassigned according to an exception. For example, assuming that the velocity of contact 5070 in FIG. 5A55 was substantially downward (e.g., falling within sector VIII depicted in FIG. 17A), e.g., satisfying "swipe down to cancel" criteria (1628), the device assigns the messaging user interface corresponding to representation 5014 (e.g., the user interface displayed when the device first detected contact 5070 in FIG. 5A52) as the current target state, such that upon liftoff in FIG. 5A56, the device navigates (e.g., displays) the messaging application user interface because it was the current target state at the time of liftoff. In some embodiments, in addition to returning to the current application user interface, the device also removes the application dock that was displayed in response to the initial portion of the input. In some embodiments, the device does not remove the application dock that was displayed in response to the initial portion of the input, and the dock remains displayed on the current application user interface after the device exits the transitional user interface.

In some embodiments, if the device determines that the input does not satisfy "swipe down to cancel" criteria (160*x*7), the device then determines (160*x*8) whether the input appears to be a "short, slow movement to app-switcher" gesture (e.g., a swipe with slow upwards y-velocity that has not translated significantly to the right or left), indicating an intent of the user (as determined by the device) an intent of the user (as determined by the device) to navigate to an application-switcher user interface. The device determines whether the y-velocity of the input is down (1632) (e.g., below the x-axis of the velocity threshold scheme depicted in FIG. 17A) or the x-position of the input (e.g., either a current x-position of the contact/user interface representation or a predicted x-position of the user interface representation) meets (1634) a third x-position threshold (e.g., 3rd x-position threshold 1724 in the right or left direction in FIG. 7B). If the properties of the contact do not meet either of these criteria, the device assigns (1622) an application-switcher user interface as the current target state.

In some embodiments, if the y-velocity of the input is down (1632) or the x-position of the input (e.g., either a current x-position of the contact/user interface representation or a predicted x-position of the user interface representation) meets (1634) the third x-position threshold, the device determines whether the swipe is a first swipe gesture (e.g., as opposed to a second swipe gesture in a series of application user interface navigating swipe gestures where the stack of cards has not yet been reshuffled). For example, the swipe gesture including movement 5062 of contact 5060 in FIGS. 5A40-5A42 is a first swipe gesture because there we no previous right or left swipe gestures in the series. In contrast, the swipe gesture including movement 5066 of contact 5064 in FIGS. 5A43-5A44 is not a first swipe gesture because the swipe gesture including movement 5062 of contact 5060 in FIGS. 5A40-5A42 occurred previously and time threshold $TT_1$ for "reshuffling the cards" (e.g., reordering the history of active user interfaces in the history of the device) was not met before contact 5064 was detected. In some embodiments, if the swipe gesture is not a first swipe gesture, the device assigns (1624) the next/previous application user interface as the current target state, because there is an increased probability the user intends to keep navigating between previously displayed user interface, since they just executed such a swipe gesture.

In some embodiments, if the swipe gesture is a first swipe gesture (1633), the device determines (1635) whether an x-position threshold is met (e.g., to distinguish between a purposeful navigation to a previously displayed application user interface and an incidental edge contact). If the x-position threshold is met, the device assigns (1624) the next/previous application user interface as the current target state. If the x-position threshold is not met, the device assigns (1624) the current application user interface as the target state, not finding a substantial similarity between the contact and a dedicated navigation gesture.

In some embodiments, having assigned the application-switcher user interface (1622), next/previous application user interface (1624), or current application user interface (1630) as the current target state, in some embodiments, the device then checks for exceptions (e.g., via decisions 160*x*9, 160*x*10, and 160*x*11, described in more detail below) that, in some circumstances, reassign the current target state. The device then determines (1636) whether liftoff has been detected and, if so, navigates to (e.g., displays) (1638) the currently assigned target state user interface.

In some embodiments, after each assignment of a current application state, the device checks to see if the properties of the contact meet an exception, each designed to avoid a different unintended navigation, as illustrated in FIG. 16C. In some embodiments, the order and identity of the exceptions varies (e.g., the order of execution of the exceptions change, exceptions are, removed or modified, or additional exceptions are added). First, the device replaces (160*x*9) the currently assigned target state with the current application if it determines that the input was accidental (e.g., it did not travel far enough away from the bottom of the screen (1660) and the home screen or application-switcher was assigned as the target state (1666)).

In some embodiments, after one or more of the determinations above, the device replaces (160*x*10) assignment of the next or previous application user interface with assignment of the application-switcher as the target state if the previous target state was application-switcher (1661). For example, when the input causes the device to display the application user interface, right and left movement is interpreted as swiping through the stack of cards, rather than moving to a next or previous application user interface).

In some embodiments, if the contact has entered the right or left edge region of the display, the device replaces (160*x*11) assignment of anything other than a next or previous application user interface with an assignment of an application-switcher user interface if the application-switcher user interface was the target state assigned prior to the contact entering the edge region. This compensates for an inadequate number of contact sensors at the edge region. For example, as a contact moves off the side of the display, there are no sensors to detect continuing lateral movement. However, as long as some part of the contact is over the display, the device is still registering vertical movement. Thus, the device optionally interprets a diagonal movement as a purely vertical movement.

In some embodiments, the device checks to see whether "ignore accidental inputs" criteria (160*x*9) (e.g., where the user accidentally touches the bottom edge of the device without intent to navigate to a different user interface) have been met. The device determines (1660) whether the y-position of the input (e.g., either current y-position of the contact/user interface representation or a predicted y-position of the user interface representation) meets a second y-position threshold (e.g., 2nd y-position threshold 1726, close to the bottom edge of the display, in FIG. 17B). If the input meets the second y-position threshold (e.g., the contact has traveled sufficiently far from the bottom edge of the display to rule out an accidental edge touch), the device moves onto the next exception without updating the current target state (e.g., determining that the input was not an accidental edge touch).

If the input does not meet the second y-position threshold, the device determines (1666) whether the current target state is a home screen user interface or an application-switcher user interface. If so, the device assigns (1668) the current application user interface as the current target state (e.g., updates the current target state to ignore what is likely an inadvertent edge touch), and proceeds to the next exception. If the current target state is not a home screen user interface or an application-switcher user interface, the device moves onto the next exception without updating the current target state (e.g., determining that the input was not an accidental edge touch). For example, a contact that move significantly right or left without traveling away from the bottom edge of the display would indicate a clear intention to navigate to a previously displayed application user interface (e.g., satisfying "side swipe for next/previous app" criteria (160*x*4)) as, thus, should not be determined to be an accidental input).

In some embodiments, after determining whether to "ignore accidental inputs" (160*x*9) (e.g., by updating the current target state to the current application user interface), the device checks to see whether "application-switcher preference" criteria (160*x*10) (e.g., where the target state changed from an application-switcher user interface to a next/previous application user interface) have been met. The device determines (1661) whether the current target state is next/previous application and the target state prior (e.g., immediately prior) was application-switcher (e.g., whether the device changed assignment of an application-switcher as the current target state to an assignment of a next/previous application as the current target state). If this is the case, the device assigns (1672) an application-switcher user interface as the current target state, and proceeds to the next exception. If this was not the case, the device proceeds to the next exception without updating the current target state.

In some embodiments, after determining whether to give "application-switcher preference" (160*x*10) (e.g., by updating the current target state from a next/previous application user interface to an application-switcher user interface), the device checks to see whether "edge error correction" criteria (160*x*11) (e.g., where the contact is sufficiently close to the right or left edge of the display, a recent target state was application-switcher, and the current target state is not next/previous application) have been met. The device determines (1662) whether the contact is within an x-edge region of the display (e.g., satisfying x-edge position threshold 1728 to the right or left in FIG. 17B, for example, within about 1 mm, 2 mm, 3 mm, 4 mm, or 5 mm from a right or left edge of the display) and, if not, proceeds to determine (1636) whether liftoff has been detected (or to an additional or reordered exception), without updating the current target state.

In some embodiments, if the contact is within an x-edge region of the display, the device determines (1670) whether a previous target state (e.g., a target state assigned within a time threshold of entering the x-region, for example, within the previous 1, 2, 3, 4, 5, 6, 7, 8, 9, 10, 11, 12, 13, 14, 15, 16, 17, 18, 19, or 20 frame refreshes or target state determinations) was an application-switcher user interface and the current target state is not a next/previous application user interface. If these criteria are met, the device replaces (1672) the current target state with the previous target state (e.g., application-switcher), and then proceeds to determine (1636) whether liftoff has been detected (or to an additional or reordered exception). If these criteria are not met, the device proceeds to determine (1636) whether liftoff has been detected (or to an additional or reordered exception), without updating the current target state.

In some embodiments, after determining (1636) that lift off of the contact was not detected, the device determines (1640) whether a dynamic velocity threshold should be adjusted (e.g., where the current target application is an application-switcher user interface, and the contact has nearly stalled on the screen, the device increases the dynamic velocity threshold needed the transition from sector V in FIG. 17A to sector II, associated with assignment of a home screen user interface, preventing inadvertent increases in contact velocity as the user lifts the contact off the screen from being interpreted as a change in the user's intent to navigate home, rather than to the application-switcher user interface). This dynamic correction improves the prediction and accuracy of navigating to a particular target state user interface (e.g., an application-switcher user interface).

In some embodiments, the device determines (1642) whether the current target state is an application-switcher user interface and whether x-velocity and y-velocity of the contact do not meet a minimal velocity threshold (e.g., the range of velocity threshold 1710 in FIG. 17A, or a range of velocity thresholds defining a smaller area in sector V of FIG. 17A (e.g., a smaller region around the origin of the velocity threshold scheme depicted in FIG. 17A).

In some embodiments, if these criteria are met (e.g., the contact has stalled or nearly at a time where the current target state is an application user interface), the device determines (1646) whether a dynamic velocity threshold is at a maximum range (e.g., whether dynamic velocity threshold range 1710 is at is maximum range 1710-*b*) and, if so, continues to monitor (1604) the position and velocity of the input and provide visual feedback without updating the dynamic threshold. If the dynamic threshold is not at a maximum range (e.g., dynamic velocity threshold range 1710 is smaller than maximum range 1710-*b*), the device increases (1648) the range of the dynamic velocity threshold (e.g., expands the threshold 1710 "box" out towards maximum threshold range 1710-*b*), before continuing to monitor (1604) the position and velocity of the input and provide visual feedback.

In some embodiments, if these criteria are not met (e.g., the contact has not stalled or nearly at a time where the current target state is an application user interface), the device determines (1642) whether a dynamic velocity threshold is at a minimum range (e.g., whether dynamic velocity threshold range 1710 is at is minimum range 1710-*a*) and, if so, continues to monitor (1604) the position and velocity of the input and provide visual feedback without updating the dynamic threshold. If the dynamic threshold is not at a minimum range (e.g., dynamic velocity threshold range 1710 is larger than minimum range 1710-*a*), the device decreases (1644) the range of the dynamic velocity threshold (e.g., contracts the threshold 1710 "box" out towards minimum threshold range 1710-*a*), before continuing to monitor (1604) the position and velocity of the input and provide visual feedback. It should be understood that the process described in the flow diagrams optionally applies to any of the methods described herein for determining whether to enter an application switching user interface, a home screen, and/or a previous/next application are used for navigating between the user interfaces described herein with respect to the user interfaces shown in FIGS. 5A1-5F45. In some embodiments, a control panel user interface is switched to in place of a next or previous application using the rules for switching to the next/previous application.

FIGS. 18A-18G are flow diagrams illustrating method 1800 of navigating between user interfaces using one or more dynamic thresholds, in accordance with some embodiments. Method 1800 is performed at an electronic device with one or more input devices (e.g., device 300, FIG. 3, or portable multifunction device 100, FIG. 1A). In some embodiments, the electronic device has a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1800 are, optionally, combined and/or the order of some operations is, optionally, changed.

As described below, method 1800 provides an intuitive way to transition between different user interfaces (e.g., a current application user interface, a prior application user interface, a home screen user interface, and an application-switcher user interface). The method reduces the number, extent, and/or nature of the inputs from a user when transitioning between different user interfaces, thereby creating a more efficient human-machine interface. For battery-operated electronic devices, enabling a user to transition between different user interfaces faster and more efficiently conserves power and increases the time between battery charges.

Method 1800 relates to improving user accuracy when transitioning from an application user interface to the application-switcher user interface, the home screen user interface, or a second application (e.g., a last displayed application) in response to a swipe gesture. The final user interface state is determined by comparing characteristics of the swipe gesture associated with the end of the gesture to a set of thresholds that are dynamically adjusted during the gesture to improve user predictability and accuracy. Specifically, the device detects an edge-swipe gesture associated with transitioning between user interfaces, monitors the characteristics of the gesture, and makes predictions about what user interface will be navigated to after termination of the gesture (e.g., determines a target state for the device) based on the current properties of the gesture (e.g., an example scheme for determining which user interface to navigate to is illustrated in FIGS. 16A-16D and 17A-17C). The device then dynamically adjusts one or more thresholds, based on the predicted state of the device, to make it more likely that the predicted user interface state is selected as the final user interface displayed upon detecting the end of the input.

In some embodiments, method 1800 is performed at an electronic device with one or more input devices (e.g., a touch-sensitive surface, a touch-sensitive display, or a mouse). In some embodiments, the device does not have a home button (e.g., a mechanical button, a virtual button, a solid state button, etc.) that, when activated, is configured to dismiss a currently displayed user interface and replace the currently displayed user interface with a home screen that includes a plurality of application launch icons for a plurality of applications installed on the device. In some embodiments, the device has a home button (e.g., a mechanical button, a virtual button, a solid state button, etc.).

The device detects (1802), via the one or more input devices (e.g., a touch-sensitive display), an input (e.g., a touch input, such as edge-swipe inputs including contacts 5004, 5040, 5052, 5056, 5060, 5064, 5065, 5069, 5070, 5074, 5950, 5968, 5972, 5980, and 5988, having movements 5006, 5042, 5048, 5054, 5058, 5062, 5066, 5067, 5071, 5072, 5076, 5082, 5096, 5952, 5970, 5974, 5982, and 5990 in FIGS. 5A2, 5A19, 5A34, 5A37, 5A40, 5A43, 5A46, 5A49, 5A52, 5A57, 5H5, 5H9, 5H13, 5H18, and 5H25, respectively). For example, the device detects (1602) an edge touch, as shown in FIG. 16A.

While the input continues to be detected via the one or more input devices, the device enters (1804) a transitional user interface mode in which a plurality of different user interface states are available to be selected based on a comparison of a set of one or more properties (e.g., position, velocity, direction of movement) of the input to a corresponding set of one or more thresholds. For example, as contacts 5004, 5040, 5052, 5056, 5060, 5064, 5065, 5069, 5070, 5074, 5950, 5968, 5972, 5980, and 5988, continue movements 5006, 5042, 5048, 5054, 5058, 5062, 5066, 5067, 5071, 5072, 5076, 5082, 5096, 5952, 5970, 5974, 5982, and 5990, in FIGS. 5A3, 5A20, 5A26, 5A35, 5A38, 5A41, 5A44, 5A47, 5A50, 5A53, 5A58, 5A61, 5A73, 5H8, 5H11, 5H15, 5H20, and 5H27, respectively, the device displays a transitional user interface that shows the user interface displayed prior to detection of the respective contact as a representation (e.g., a "card") on the screen (e.g., the web browsing user interface shown in FIG. 5A2 is displayed as card 5010 in FIG. 5A3 in response to detecting the edge-swipe gesture including movement 5006 of contact 5004). As illustrated in example method 1600, after detecting the edge touch, the device monitors (1604) the position and velocity of the contact (e.g., the device monitors contact velocity 1730 in FIG. 17C) and provides visual feedback (e.g., via the transitional user interface), where a plurality of user interface can be selected (**160*x*1**).

While in the transitional user interface mode, the device detects (1806) a gesture that includes a first change in one or more respective properties in the set of one or more properties of the input (e.g., which causes the input to satisfy a corresponding threshold that was not satisfied by the input prior to the first change; for example, a change in the speed of the input which satisfies a threshold associated with assigning the application-switcher user interface as the current target state), followed by an end of the input (e.g., liftoff of a touch input). For example, contact velocity 1730 falls below dynamic velocity threshold 1710-D at time T, and then lift-off of the contact is detected at time T+8, as illustrated in FIG. 17C.

In response to detecting the gesture: in accordance with a determination that the end of the input is detected with a first temporal proximity to the first change in the one or more respective properties of the input (e.g., the first change in the input is a change that occurs within a predefined time threshold or sampling threshold of the end of the input. For example, the device monitors properties of the input (e.g., one or more of position, velocity, and pressure, such as contact velocity 1730 in FIG. 17C, corresponding to the monitoring (1604) in FIG. 16A) and periodically updates the current target state (e.g., the user interface that would be navigated to if the input was terminated before the next periodic update, e.g., target states HS (home state) and AS (application-switcher) shown in FIG. 17C), corresponding to assigning a current target state (160*x*1) in FIG. 16A), the device selects (1808) (e.g., displays or goes (1638) to) a final state for the user interface based on one or more values for the set of one or more properties of the input that correspond to the end of the input (e.g., measured, predicted, and/or averaged values that are based on the values of the set of one or more properties of the input that were measured at or near an end of the input such as at or near a time of liftoff of the input from the touch-sensitive surface) and one or more first values of the corresponding set of one or more thresholds. For example, if the contact depicted in FIG. 17C were lifted-off before time T+1, the device would compare a velocity of the contact corresponding to lift-off (e.g., the last measured velocity of the contact) with the value of the dynamic threshold at time T. In some embodiments, the first temporal proximity is the periodicity of the target state update cycle (e.g., the period of time between updates, such as the time between iterations of assigning a current target state (160*x*1)).

In accordance with a determination that the end of the input is detected with a second temporal proximity (e.g., the first change in the input is a change that does not occurs within a predefined time threshold or sampling threshold of the end of the input) to the first change in the one or more respective properties of the input, the device selects (1808) (e.g., displays or goes (1638) to) a final state for the user interface based on the one or more values for the set of one or more properties of the input that correspond to the end of the input (e.g., measured, predicted, and/or averaged values that are based on the values of the set of one or more properties of the input that were measured at or near an end of the input such as at or near a time of liftoff of the input from the touch-sensitive surface) and one or more second values of the corresponding set of one or more thresholds. For example, if the contact depicted in FIG. 17C were lifted-off between T+1 and T+2 (e.g., after time T+1), the device would compare a velocity of the contact corresponding to lift-off (e.g., the last measured velocity of the contact) with the value of the dynamic threshold at time T+1.

Dynamically adjusting (e.g., increasing) a threshold based on current properties of a user input enhances the operability of the device and makes the user-device interaction more efficient (e.g., by helping the user achieve an intended result by making it more likely that a user interface state associated with current parameters of the input is selected as the final user interface state upon detecting lift-off of the input and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the detected gesture satisfies (1810) a corresponding threshold that was not satisfied by the set of one or more properties of the input prior to the first change. For example, the change in contact velocity 1730 around time T+6 now satisfies dynamic velocity threshold 1710-D, that was not satisfied at time T+5, as illustrated in FIG. 17C.

Dynamically adjusting (e.g., increasing) a threshold based on a predicted final UI state enhances the operability of the device and makes the user-device interaction more efficient (e.g., by helping the user achieve an intended result by making it more likely that a predicted user interface is selected as the final user interface state upon detecting lift-off of the input and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the one or more second values of the corresponding set of one or more thresholds are selected (1812) based on a time period following satisfaction of a predetermined condition (e.g., where the predetermined condition is the first detection of an input meeting application-switcher-display criteria or a change in the input causing the input to no longer meet application-switcher-display criteria). For example, if the contact depicted in FIG. 17C were to end between T+3 and T+4, after detecting a change around time T that first satisfied application-switcher display criteria, the value for the dynamic velocity threshold used in the comparison would be the value at T+3, which increased as a function of time from the value of the dynamic threshold at time T.

Dynamically adjusting (e.g., increasing) a threshold based on how long a particular final UI state has been predicted to be the final UI state prior to termination of the input enhances the operability of the device and makes the user-device interaction more efficient (e.g., by helping the user achieve an intended result by increasing the confidence that a predicted user interface is the intended result and dynamically increasing the likelihood that the predicted UI state will be selected as the final user interface state upon detecting lift-off of the input based on the confidence of the prediction, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the corresponding threshold satisfied by the first change in the one or more respective properties of the input is (1814) a position threshold (e.g., where an input otherwise meets all velocity and directional thresholds required for application-switcher-display criteria, a change in the position of the input from below a Y-translation threshold to above the Y-translational threshold triggers dynamic adaption of the velocity threshold for selecting the application-switcher user interface upon termination of the input, or where an input otherwise meets all velocity and directional thresholds required for application-switcher-display criteria, a change in the position of the input from above a Y-translation threshold to below the Y-translational threshold triggers dynamic adaption of the velocity threshold for selecting the application-switcher user interface upon termination of the input). For example, crossing 1st X-position threshold 1718 in FIG. 17B will, in some circumstances, trigger adjustment of a dynamic threshold used in the final state determination.

Dynamically adjusting (e.g., increasing) a threshold based on detecting the input crossing a position threshold enhances the operability of the device and makes the user-device interaction more efficient (e.g., by helping the user achieve an intended result by increasing the likelihood that a predicted UI state associated with the position threshold will be selected as the final user interface state upon detecting lift-off of the input, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the corresponding threshold satisfied by the first change in the one or more respective properties of the input is (1816) a velocity threshold (e.g., where an input otherwise meets all translational and directional thresholds required for application-switcher-display criteria, a change in the velocity of the input from above a velocity threshold to below the velocity threshold triggers dynamic adaption of the velocity threshold for selecting the application-switcher user interface upon termination of the input or, where an input otherwise meets all translational and directional thresholds required for application-switcher-display criteria, a change in the velocity of the input from below a velocity threshold to above the velocity threshold triggers dynamic adaption of the velocity threshold for selecting the application-switcher user interface upon termination of the input). For example, the decrease in contact velocity 1730 around time T satisfies application-switcher velocity threshold criterion 1710, thereby triggering adjustment of dynamic threshold 1710-D in FIG. 17C.

Dynamically adjusting (e.g., increasing) a threshold based on detecting the input crossing a velocity threshold enhances the operability of the device and makes the user-device interaction more efficient (e.g., by helping the user achieve an intended result by increasing the likelihood that a predicted UI state associated with the velocity threshold will be selected as the final user interface state upon detecting lift-off of the input, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the set of one or more thresholds includes (1818) a position threshold (e.g., a translational threshold serving as a boundary between selecting an application-switcher user interface and a home user interface is dynamic relative to characteristics of the input). For example, 1st X-position threshold 1718 is, optionally, dynamically moved right or left on the screen in FIG. 17B.

Dynamically adjusting (e.g., increasing) a position threshold based on a predicted final UI state enhances the operability of the device and makes the user-device interaction more efficient (e.g., by helping the user achieve an intended result by decreasing the likelihood that an unintended change in the position of the input during lift-off of the input will cause selection of a final user interface other than the predicted UI state, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the set of one or more thresholds includes (1820) a velocity threshold (e.g., a velocity threshold serving as a boundary between selecting an application-switcher user interface and a home user interface is dynamic relative to characteristics of the input). For example, as depicted in FIGS. 17A and 17C, the range of velocity threshold 1710 dynamically expands or contracts based on satisfaction of particular target state selection criteria (e.g., application-switcher target state selection criteria).

Dynamically adjusting (e.g., increasing) a velocity threshold based on a predicted final UI state enhances the operability of the device and makes the user-device interaction more efficient (e.g., by helping the user achieve an intended result by decreasing the likelihood that an unintended change in the velocity of the input during lift-off of the input will cause selection of a final user interface other than the predicted UI state, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the set of one or more thresholds includes (1822) a position threshold and a velocity threshold (e.g., first X-position threshold 1718 in FIG. 17B and velocity threshold 1710 in FIG. 17A), a respective first value for the position threshold in the one or more first values of the corresponding set of one or more thresholds is the same as a respective second value for the position threshold in the one or more second values of the corresponding set of one or more thresholds (e.g., at least one position threshold, such as first X-position threshold 1718 in FIG. 17B, is fixed), a respective first value for the velocity threshold in the one or more first values of the corresponding set of one or more thresholds is different than a respective second value for the velocity threshold in the one or more second values of the corresponding set of one or more thresholds (e.g., at least one velocity threshold, such as the range of velocity threshold 1710 in FIG. 17A, is dynamic).

Dynamically adjusting (e.g., increasing) a velocity threshold based on a predicted final UI state enhances the operability of the device and makes the user-device interaction more efficient (e.g., by helping the user achieve an intended result by decreasing the likelihood that an unintended change in the velocity of the input during lift-off of the input will cause selection of a final user interface other than the predicted UI state, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the set of one or more thresholds includes (1824) a position threshold and a velocity threshold (e.g., first X-position threshold 1718 in FIG. 17B and velocity threshold 1710 in FIG. 17A), a respective first value for the velocity threshold in the one or more first values of the corresponding set of one or more thresholds is the same as a respective second value for the velocity threshold in the one or more second values of the corresponding set of one or more thresholds (e.g., at least one velocity threshold, such as the range of velocity threshold 1710 in FIG. 17A, is fixed), a respective first value for the position threshold in the one or more first values of the corresponding set of one or more thresholds is different than a respective second value for the position threshold in the one or more second values of the corresponding set of one or more thresholds (e.g., at least one position threshold, such as first X-position threshold 1718 in FIG. 17B, is dynamic).

Dynamically adjusting (e.g., increasing) a position threshold based on a predicted final UI state enhances the operability of the device and makes the user-device interaction more efficient (e.g., by helping the user achieve an intended result by decreasing the likelihood that an unintended change in the position of the input during lift-off of the input will cause selection of a final user interface other than the predicted UI state, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the one or more first values of the corresponding set of one or more thresholds are selected based on (1826) a previous change in one or more respective properties in the set of one or more properties (e.g., initial values for the one or more thresholds are based on previous properties of the input, e.g., the first value of a respective threshold at time $t_0$ is based on a change in the properties of the input at time $t_{n-1}$ that caused the electronic device to update the dynamic threshold). For example, as illustrated in FIG. 17C, the value for dynamic velocity threshold 1710-D at time T+3 is selected based on an increase in the threshold over the previous value of the threshold at time T+2.

Iteratively adjusting (e.g., increasing) a threshold based on a previously adjusted value for the threshold enhances the operability of the device and makes the user-device interaction more efficient (e.g., by helping the user achieve an intended result by iteratively increasing the likelihood that the predicted UI state will be selected as the final user interface state upon detecting lift-off of the input based on increasing confidence in the prediction, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, selecting a final state for the user interface based on one or more values for the set of one or more properties of the input that correspond to the end of the input and one or more first values of the corresponding set of one or more thresholds includes (1828): selecting the one or more first values of the corresponding set of one or more thresholds based on the first change in the one or more respective properties of the input (e.g., determining whether one or more initial values for the set of thresholds needs to be updated based on a (e.g., previous) change in the input before comparing the selected thresholds with the input properties corresponding to the end of the input); and comparing the selected one or more first values of the corresponding set of one or more thresholds to the one or more values for the set of one or more properties of the input that correspond to the end of the input. For example, as illustrated in FIGS. 16A and 16D, the device periodically updates dynamic thresholds by determining (1640) whether the threshold needs to be updated in accordance with determinations (1642 and 1646) that the dynamic velocity threshold is not at a minimum range (1642) or not at a maximum range (1646).

Adjusting (e.g., increasing) a threshold based on a change in the properties of an input enhances the operability of the device and makes the user-device interaction more efficient (e.g., by helping the user achieve an intended result by iteratively increasing or decreasing the likelihood that the predicted UI state will be selected as the final user interface state upon detecting lift-off of the input based on increasing or decreasing confidence in the prediction, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, after detecting the first change in the one or more respective properties of the input, and prior to detecting the end of the input, the device detects (1830) a second change in the one or more respective properties in the set of one or more properties of the input such that the input no longer satisfies the corresponding threshold that was satisfied by the first change in the one or more respective properties of the input. For example, after detecting a first change (e.g., decrease) in contact velocity 1730 around time T that first satisfied application-switcher selection criteria, in FIG. 17C, a second change (e.g., an increase) in velocity 1730 around time T+6 caused the application-switcher selection criteria to no longer be satisfied (e.g., because velocity 1730 increased beyond dynamic velocity threshold 1710-D). In response to detecting the end of the input, in accordance with a determination that the end of the input is detected with the first temporal proximity to the second change in the one or more respective properties of the input (e.g., the second change in the input is a change that occurs within a predefined time threshold or sampling threshold of the end of the input), the device selects (1832) (e.g., displaying or navigates to) a final state for the user interface based on one or more values for the set of one or more properties of the input that correspond to the end of the input (e.g., measured, predicted, and/or averaged values that are based on the values of the set of one or more properties of the input that were measured at or near an end of the input such as at or near a time of liftoff of the input from the touch-sensitive surface) and one or more third values of the corresponding set of one or more thresholds. For example, if the contact depicted in FIG. 17C were to be terminated between time T+6 and T+7 (e.g., within a first sampling threshold after detecting the change around time T+6), the device would use a first value for the dynamic temporal threshold as defined at time T+6, equal to velocity threshold maximum 1710-*b*.

In some embodiments, the first temporal proximity to the second change is the periodicity of the target state update cycle (e.g., the period of time between updates). In some embodiments, the first temporal proximity to the second change is a same predefined threshold as the first temporal proximity to the first change in the one or more respective properties of the input. In some embodiments, the first temporal proximity to the second change is a different predefined threshold as the first temporal proximity to the first change in the one or more respective properties of the input).

In accordance with a determination that the end of the input is detected with the second temporal proximity to the second change in the one or more respective properties of the input (e.g., the first change in the input is a change that does not occur within a predefined time threshold or sampling threshold of the end of the input), the device selects (1832) (e.g., displaying) a final state for the user interface based on the one or more values for the set of one or more properties of the input that correspond to the end of the input (e.g., measured, predicted, and/or averaged values that are based on the values of the set of one or more properties of the input that were measured at or near an end of the input such as at or near a time of liftoff of the input from the touch-sensitive surface) and the one or more fourth values of the corresponding set of one or more thresholds. For example, because the contact depicted in FIG. 17C was terminated around time T+8 (e.g., not within a first sampling threshold after detecting the change around time T+6), the device uses a second value for the dynamic temporal threshold that has been reduced relative to the value defined at time T+6, when the second change occurred.

Dynamically adjusting (e.g., decreasing) a threshold based on a second change in the properties of a user input enhances the operability of the device and makes the user-device interaction more efficient (e.g., by helping the user achieve an intended result by making it less likely that a user interface state not associated with current parameters of the input is selected as the final user interface state upon detecting lift-off of the input and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, after detecting the first change in the one or more respective properties of the input, and prior to detecting the end of the input, the device updates (1834) one or more respective thresholds in the corresponding set of one or more thresholds (e.g., according to procedure 1640 in method 1600). For example, after detecting the decrease in contact velocity 1730 around time T, in FIG. 17C, the device updates the dynamic velocity threshold at time T+1 to make it more likely that the final user interface state selected is application-switcher because lift-off of contact 1730 has not been detected.

Dynamically updating (e.g., increasing or decreasing) a threshold prior to termination of the input enhances the operability of the device and makes the user-device interaction more efficient (e.g., by helping the user achieve an intended result by increasing the confidence that a predicted user interface is the intended result and dynamically increasing the likelihood that the predicted UI state will be selected as the final user interface state upon detecting lift-off of the input based on the confidence of the prediction, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the one or more respective thresholds in the corresponding set of one or more thresholds is updated (1836) based on a temporal proximity to the first change in the one or more respective properties of the input (e.g., the time between detecting the first change in the one or more respective properties of the input and the decision to update the threshold). For example, after detecting the change in contact velocity around time T in FIG. 17C, the value used for dynamic velocity threshold 1710-D is dependent upon the amount of time that passes, e.g., the value used for the threshold is greater at time T+4 than is the value used at time T+2 because more time has passed since the change in the input was detected.

Dynamically updating (e.g., increasing or decreasing) a threshold based on how long a particular final UI state has been predicted to be the final UI state prior to termination of the input enhances the operability of the device and makes the user-device interaction more efficient (e.g., by helping the user achieve an intended result by increasing the confidence that a predicted user interface is the intended result and dynamically increasing the likelihood that the predicted UI state will be selected as the final user interface state upon detecting lift-off of the input based on the confidence of the prediction, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the one or more respective thresholds in the corresponding set of one or more thresholds is dynamically updated (1838) based on a changing temporal proximity to the first change in the one or more respective properties of the input (e.g., the one or more threshold is periodically updated after detecting the first change in the one or more respective properties of the input). For example, after detecting the change in contact velocity around time T in FIG. 17C, the value used for dynamic velocity threshold 1710-D is gradually increased from time T to time T+4. In some embodiments, when the current user interface state changes from a first user interface state to a second user interface state, the device gradually adjusts one or more thresholds (e.g., from threshold(s) associated with the first user interface state to threshold(s) associated with the second user interface state) by increments toward one or more target thresholds that are associated with the second user interface state (e.g., so long as the current user interface state continues to be the second user interface state). In some embodiments, number of increments is 5, 10, 15, 20, or some other reasonable number. In some embodiments, the number of increments is selected so that the one or more target thresholds will be reached within a predetermined time period such as 0.05, 0.2, 0.5, 1, or 2 seconds).

Gradually updating (e.g., increasing or decreasing) a threshold over time based on monitored parameters of the input enhances the operability of the device and makes the user-device interaction more efficient (e.g., by helping the user achieve an intended result by increasing the confidence that a predicted user interface is the intended result and gradually increasing the likelihood that the predicted UI state will be selected as the final user interface state upon detecting lift-off of the input based on the confidence of the prediction, and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, after detecting the first change in the one or more respective properties of the input, and prior to detecting the end of the input (1840): the device monitors (e.g., periodically determines via procedure 1604 in method 1600) the set of one or more properties of the input, periodically selects a final state for the user interface (e.g., via procedure **160*x*1 in method 1600) based on the monitored set of one or more properties of the input and a previously determined value (e.g., the last updated threshold value) of the corresponding set of one or more thresholds, and updates (e.g., via procedure 1640 in method 1600**) one or more values of the corresponding set of one or more thresholds based on the selected final state for the user interface.

Dynamically updating (e.g., increasing or decreasing) a threshold based on a predicted final UI state enhances the operability of the device and makes the user-device interaction more efficient (e.g., by helping the user achieve an intended result by making it more likely that a predicted user interface is selected as the final user interface state upon detecting lift-off of the input and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, the one or more values of the corresponding set of one or more thresholds is updated (1842) to increase a difference between the one or more threshold values and the values for the set of one or more properties of the input that correspond to the end of the input (e.g., thresholds are changed to make it more likely that the predicted user interface state is selected as the final user interface state upon detecting the end of the input). For example, in FIG. 17C, after detecting the change in contact velocity 1730 around time T that first satisfies application-switcher selection criteria, the device increases dynamic velocity threshold 1710-D to increase the difference between contact velocity 1730 and the threshold (e.g., at time T+3, the difference between contact velocity 1730 and dynamic velocity threshold 1710-D is greater than the difference between the two values at time T and T+1).

Dynamically updating (e.g., increasing or decreasing) a threshold to favor a predicted final UI state enhances the operability of the device and makes the user-device interaction more efficient (e.g., by helping the user achieve an intended result by making it more likely that a predicted user interface is selected as the final user interface state upon detecting lift-off of the input and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments, at least one respective threshold in the set of one or more thresholds has a predefined maximum threshold value (1844). For example, as illustrated in FIG. 17C, dynamic velocity threshold 1710-D has a predefined maximum value of 1710-*b*. As such, when dynamic velocity threshold 1710-D reaches velocity threshold maximum 1710-*b* at time T+4, the device ceases to continue increasing the threshold even though contact velocity 1730 is still below dynamic velocity threshold 1710-D at time T+4.

Setting a maximum threshold value for a dynamic threshold enhances the operability of the device and makes the user-device interaction more efficient (e.g., by avoiding locking-in a final UI state due to excessive updating of the dynamic threshold, rendering the user unable to change the final navigation prior to lift-off of the input and by reducing the number of steps that are needed to achieve an intended outcome when operating the device by improving navigation accuracy), which, additionally, reduces power usage and improves the battery life of the device (e.g., by helping the user to use the device more quickly and efficiently).

In some embodiments (1845), the plurality of different states include a home state (e.g., a user interface that includes a plurality of application launch icons that correspond to a plurality of applications (e.g., including the plurality of recently open applications and, optionally, one or more additional applications that are closed without retained state information, such that when activated, the applications are started from their default starting states)) and an application-switcher state (e.g., an user interface that includes a plurality of representations of applications (e.g., application launch icons, reduced scale images of application user interfaces, etc.)), selection between the home state and the application-switcher state is based at least in part on a movement threshold that is one of the one or more of the corresponding set of one or more thresholds; (e.g., a first condition regarding the contact's speed, acceleration, position, or a combination of one or more of the above, or a first condition regarding a derived movement parameter of the first application view that is based on one or more of the above and one or more additional properties characterizing the state of the current user interface and/or the movements of one or more objects contained therein, etc.).

When the properties of the input meet application-switcher-display criteria, wherein the application-switcher display criteria include a requirement that is satisfied when the movement of the contact is above the movement threshold, the final state of the user interface is the application-switcher state (e.g., the device displays the application-switcher user interface in response to detecting liftoff of the contact).

When the properties of the input meet home-display criteria, wherein the home display criteria include a requirement that is satisfied when the movement of the contact is below the movement threshold, the final state of the user interface is the home state (e.g., the device displays the home user interface in response to detecting liftoff of the contact).

The user interfaces displayed in response to detecting a gesture that is selecting between the home state and the application-switcher state are discussed in greater detail herein with respect to methods 600 and 1900, illustrated in FIGS. 5A1-5A77 and 5H1-5H27, respectively. Additionally, any of the thresholds discussed with respect to method 600 or 1900 could also be adjusted using the processes described above.

Allowing the user to either to go to application-switcher user interface or the home screen depending on whether certain preset conditions are met enhance the operability of the device and make the user-device interaction more efficient (e.g., by helping the user achieve an intended result by providing the required inputs, and reducing the number of steps that are needed to achieve an intended outcome when operating the device), which, additionally, reduce power usage and improve the battery life of the device (e.g., by helping the user to use the device more quickly and efficiently).

In some embodiments (1846) the plurality of different states include a home state (e.g., a user interface that includes a plurality of application launch icons that correspond to a plurality of applications (e.g., including the plurality of recently open applications and, optionally, one or more additional applications that are closed without retained state information, such that when activated, the applications are started from their default starting states)) and an last-application state For example, a user interface that includes a second user interface of a second application that is distinct from the first application (e.g., the second application is the last application that the user had interacted with before having switched to the first application) In some embodiments, the second user interface of the second application is displayed without first displaying the home screen user interface or the application-switcher user interface.

Selection between the home state and the last-application state is based at least in part on a directional condition that is determined based on one or more of the corresponding set of one or more thresholds; (e.g., a first condition regarding a direction of movement of the contact optionally in conjunction with the contact's speed, acceleration, position, or a combination of one or more of the above, or a first condition regarding a derived movement parameter of the first application view that is based on one or more of the above and one or more additional properties characterizing the state of the current user interface and/or the movements of one or more objects contained therein, etc.).

When the properties of the input meet last-application-display criteria, wherein the last-application-display criteria include a requirement that is satisfied when the movement of the contact meets the directional condition, the final state of the user interface is the last-application state (e.g., the device displays the last-application user interface in response to detecting liftoff of the contact).

When the properties of the input meet home-display criteria, wherein the home display criteria include a requirement that is satisfied when the movement of the contact does not meet the directional condition, the final state of the user interface is the home state (e.g., the device displays the home user interface in response to detecting liftoff of the contact).

The user interfaces displayed in response to detecting a gesture that is selecting between the home state and the last-application state are discussed in greater detail herein with respect to methods 700 and 1900, illustrated in FIGS. 5A1-5A77 and 5H1-5H27. Additionally, any of the thresholds discussed with respect to method 700 or 1900 could also be adjusted using the processes described above.

Allowing the user to either to go to an application-switcher user interface or a previous application user interface depending on whether certain preset conditions are met enhance the operability of the device and make the user-device interaction more efficient (e.g., by helping the user achieve an intended result by providing the required inputs, and reducing the number of steps that are needed to achieve an intended outcome when operating the device), which, additionally, reduce power usage and improve the battery life of the device (e.g., by helping the user to use the device more quickly and efficiently).

In some embodiments (1848), the plurality of different states include a control panel state (e.g., a user interface that includes a plurality of controls that correspond to a plurality of system functions of the device (e.g., a control panel user interface with controls for network connections, display brightness, audio playback, peripheral devices, etc.) and a last-application state. In some embodiments, the control panel user interface is overlaid on the first user interface of a last-used application)

Selection between the control panel state and the last-application state is based at least in part on a directional condition that is determined based on one or more of the corresponding set of one or more thresholds; (e.g., a first condition regarding a direction of movement of the contact optionally in conjunction with the contact's speed, acceleration, position, or a combination of one or more of the above, or a first condition regarding a derived movement parameter of the first application view that is based on one or more of the above and one or more additional properties characterizing the state of the current user interface and/or the movements of one or more objects contained therein, etc.).

When the properties of the input meet last-application-display criteria, wherein the last-application-display criteria include a requirement that is satisfied when the movement of the contact meets the directional condition, the final state of the user interface is the last-application state (e.g., the device displays the last-application user interface in response to detecting liftoff of the contact).

When the properties of the input meet control-panel display criteria, wherein the control-panel display criteria include a requirement that is satisfied when the movement of the contact does not meet the directional condition (e.g., when the movement of the contact is in a different direction), the final state of the user interface is the control panel state (e.g., the device displays the control panel user interface in response to detecting liftoff of the contact).

The user interfaces displayed in response to detecting a gesture that is selecting between the home state and the last-application state are discussed in greater detail herein with respect to methods 800 and 1900 illustrated in FIGS. 5A1-5A77 and 5H1-5H27, respectively. Additionally, any of the thresholds discussed with respect to method 800 or 1900 could also be adjusted using the processes described above.

Allowing the user to either to go to an application-switcher user interface or a control panel user interface depending on whether certain preset conditions are met enhance the operability of the device and make the user-device interaction more efficient (e.g., by helping the user achieve an intended result by providing the required inputs, and reducing the number of steps that are needed to achieve an intended outcome when operating the device), which, additionally, reduce power usage and improve the battery life of the device (e.g., by helping the user to use the device more quickly and efficiently).

In some embodiments, selecting (1850) the final state for the user interface includes: in accordance with a determination that the one or more values for the set of one or more properties of the input that correspond to the end of the input satisfy a first respective threshold in the corresponding set of one or more thresholds (e.g., regardless of the value assigned to the threshold based on the proximity of the end of the input relative to the first or second change in the one or more respective properties of the input), selecting a first final state for the user interface (e.g., displaying an application launch user interface or a home screen user interface), and in accordance with a determination that the one or more values for the set of one or more properties of the input that correspond to the end of the input do not satisfy a first respective threshold in the corresponding set of one or more thresholds (e.g., regardless of the value assigned to the threshold based on the proximity of the end of the input relative to the first or second change in the one or more respective properties of the input), selecting a second final state for the user interface that is different from the first final state for the user interface (e.g., displaying an application launch user interface or a home screen user interface). For example, as illustrated in FIG. 17A, where the velocity of a contact resides in either of sectors III and V, whether or not the velocity of the contact satisfies velocity threshold 1710 will determine whether the device will select the home state (e.g., the velocity of the contact is greater than threshold 1710) of the application-switcher (e.g., the velocity of the contact is less than threshold 1710) as the final state.

Allowing the user to go to either of two different user interfaces depending on whether certain preset conditions are met enhance the operability of the device and make the user-device interaction more efficient (e.g., by helping the user achieve an intended result by providing the required inputs, and reducing the number of steps that are needed to achieve an intended outcome when operating the device), which, additionally, reduce power usage and improve the battery life of the device (e.g., by helping the user to use the device more quickly and efficiently).

It should be understood that the particular order in which the operations in FIGS. 18A-18G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1100, 1200, 1300, 1400, 1500, 1600, and 1900) are also applicable in an analogous manner to method 1800 described above with respect to FIGS. 18A-18G. For example, the contacts, gestures, user interface objects, application views, control panels, controls, position thresholds, directional conditions, navigation criteria, movement parameters, thresholds, determinations, focus selectors, and/or animations described above with reference to method 1800 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1050, 1100, 1200, 1300, 1400, 1500, 1600, and 1900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18G are, optionally, implemented by components depicted in FIGS. 1A-1B. For example, detection operation 1802, entering operation 1804 and detection operation 1806, and selection operation 1808 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 19A-19C are flow diagrams illustrating method 1900 of displaying a dock and navigating between different user interfaces in accordance with some embodiments. Method 1900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1900 are, optionally, combined and/or the order of some operations is, optionally, changed.

As described below, method 1900 provides an intuitive way to display a dock and navigate between different user interfaces in response to an input in accordance with determinations of whether the input meets different movement conditions. The method reduces the number, extent, and/or nature of the inputs from a user when displaying a dock and navigating between different user interfaces, thereby creating a more efficient human-machine interface. For battery-operated electronic devices, enabling a user to display a dock and navigate between different user interfaces faster and more efficiently conserves power and increases the time between battery charges, and enhances the operability of the device (e.g., by helping the user to provide proper inputs and reducing/mitigating user mistakes when operating/interacting with the device).

Method 1900 relates to determining whether to display a dock or to transition from an application user interface to a different user interface (e.g., a different application user interface, a home user interface, or an application-switching user interface), e.g., instead of or in addition to displaying the dock, in response to a sequence of one or more edge-swipe gestures based on whether the sequence of one or more edge-swipe gestures meets respective criteria. For example, in some embodiments, the device displays the dock in response to a first upward swipe gesture (e.g., a short and/or slow swipe up) from the bottom edge of the device or an initial portion of an upward swipe gesture from the bottom edge of the device. In some embodiments, the device displays an application-switching user interface in response to a second upward swipe gesture (e.g., a slightly longer and/or faster swipe up) from the bottom edge of the device or a continuation of the upward swipe gesture from the bottom edge of the device that caused display of the dock. In some embodiments, the device displays a home user interface in response to a third upward swipe gesture (e.g., a long and/or fast swipe up) from the bottom edge of the device or a continuation of the upward swipe gesture from the bottom edge of the device that caused display of the dock. In some embodiments, the device displays a different application user interface in response to a substantially sideways swipe gesture from the bottom edge of the device. The dock display occurs without the device transitioning to other user interfaces (e.g., the application-switcher user interface, the home screen user interface, a different user interface), when the input only meets the dock-display criteria and does not meet the criteria for navigating to any of the other user interfaces. The dock display precedes navigation to another user interface in response to the same continuous edge swipe gesture, when the input meets both the dock-display criteria and the criteria for navigating to another user interface. Allowing the user to display a dock or to navigate to one of a plurality of user interfaces instead of or in addition to displaying the dock in response to a sequence of one or more edge-swipe gestures, depending on whether certain criteria are met, enhances the operability of the device and makes the user-device interaction more efficient (e.g., by providing easy access to navigation functions of the device, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, user interface navigation is controlled (e.g., the device determines which user interface to navigate to) based on the steps illustrated in FIGS. 16A-16D, and described with respect to method 1600, with the following rules: (i) if an application dock is already displayed when the navigation gesture is initiated, the device follows the steps illustrated in FIGS. 16A-16D, and (ii) if an application dock is not already displayed when the navigation gesture is initiated, the device follows the steps illustrated in FIGS. 16A-16D, except that in response to a gesture that meets 'current application' sub-criteria 1635 (e.g., a 'no' answer) of criteria 160$x$8 (e.g., a gesture with a final velocity that is not downward), the device displays the current application user interface with the dock overlaid while, in response to a gesture that meets 'current application' sub-criteria 1621 of criteria 160$x$4 or 'current application' criteria 160$x$7 (e.g., a gesture with a downward final velocity), the device displays the current application user interface without the dock overlaid (e.g., the device ceases to display the dock upon termination of the gesture).

In accordance with method 1900, the device displays (1902) a user interface of an application. While displaying the user interface of the application, the device detects (1904) a swipe gesture by a first contact from an edge of the touch-sensitive display (e.g., a swipe gesture including movement 5944, 5952, 5970, 5974, 5980, 5984, and 5990, of contacts 5942, 5950, 5968, 5972, 5978, 5982, and 5988 in FIGS. 5H1-5H27).

In response to detecting the swipe gesture from the edge of the touch-sensitive display, in accordance with a determination that the swipe gesture meets first movement criteria (e.g., the first movement criteria include dock-display criteria, where the dock-display criteria require that the first input includes movement of the first contact with a magnitude of a movement parameter (e.g., distance and/or speed) that is above a first movement threshold (e.g., a distance greater than 1⁄10 of the screen height, or a speed greater than 200 pixels per second) in order to be met), the device displays (1906) a dock overlaid on the user interface of the application (e.g., above the center of the bottom or side edge of the display). For example, device 100 displays dock 5946 in FIGS. 5H3, 5H6, and 5H10 in response to swipe gestures including movement 5944, 5952, and 5970 of contacts 5942, 5950, and 5968, respectively.

In accordance with a determination that the swipe gesture meets second movement criteria that are distinct from the first movement criteria (e.g., the second movement criteria include application-switcher-navigation criteria, where the application-switcher-navigation criteria require that the first input includes movement of the first contact with a magnitude of a movement parameter (e.g., distance and/or speed) that is above a second movement threshold (e.g., a distance greater than 2⁄10 of the screen height) in order to be met) that is greater than the first movement threshold), the device replaces display (1912) of the user interface of the application with display of an application-switcher user interface that includes representations of (e.g., thumbnail images of last active user interfaces for) a plurality of recently used applications on the display. For example, device 100 displays an application-switcher user interface in FIGS. 5H8 and 5H21 in response to swipe gestures including movement 5952 and 5980 of contacts 5950 and 5978, respectively. In some embodiments, first criteria include criteria of 160$x$4, 160$x$6, and 160$x$8, as shown in FIGS. 16A-16D and described with respect to method 1600.

In accordance with a determination that the swipe gesture meets third movement criteria that are distinct from the first criteria and the second criteria (e.g., the third movement criteria include home-navigation criteria, where the home-navigation criteria require that the first input includes movement of the first contact with a magnitude of a movement parameter (e.g., distance and/or speed) that is above the first and/or second movement threshold (e.g., a distance greater than ⅕ of the screen height, or a speed greater than 400 pixels per second) in order to be met), the device replaces display (1918) of the user interface of the application with display of a home screen that includes a plurality of application launch icons for launching a plurality of different applications. For example, device 100 displays a home screen in FIGS. 5H12 and 5H17 in response to swipe gestures including movement 5970 and 5974 of contacts 5968 and 5972, respectively. In some embodiments, third criteria include criteria of 160$x$2 or criteria 160$x$3, as shown in FIGS. 16A-16D and described with respect to method 1600.

Displaying a dock when a first criteria is met (e.g., a first distance and/or velocity threshold), displaying an application-switcher user interface when a second criteria is met (e.g., a second distance and/or velocity threshold), and displaying a home screen when a third criteria is met (e.g., a third distance and/or velocity threshold) enhances the operability of the device and makes the user-device interface more efficient (e.g., by providing easy access to navigation functions of the device, by helping the user to achieve an intended outcome with fewer required inputs, by reducing user mistakes when operating/interacting with the device, and by providing additional control options without cluttering the user interface with additional displayed controls) which, additionally, reduces power usage and improves battery life of the device by enabling the user to use the device more quickly and efficiently.

In some embodiments, in response to detecting the swipe gesture from the edge of the touch-sensitive display, in accordance with a determination that the swipe gesture meets the second movement criteria, the device displays (1914) the dock overlaid on the application-switcher user interface. For example, dock 5946 is displayed over the application-switcher user interface in FIGS. 5H8 and 5H21. In some embodiments, when navigating to the application-switcher user interface, first movement criteria are met prior to second movement criteria being met and the dock is displayed before the application-switcher user interface is displayed (e.g., after first movement criteria are met, the dock is pulled-up from below the display screen while the user interface of the application is displayed, and then second movement criteria are met resulting in display of the application-switcher user interface). For example, dock 5946 is displayed in FIG. 5H6, before the application-switcher user interface is displayed in FIG. 5H8 because first movement criteria are met (e.g., in FIGS. 5H5-5H6) before second movement criteria are met (e.g., in FIGS. 5H7-5H8).

Maintaining display of a dock after navigating to an application-switcher user interface enhances the operability of the device and makes the user-device interface more efficient (e.g., by providing both the control options of the dock and the control options of the application-switcher user interface, by reducing the number of steps that are needed to achieve an intended outcome when operating the device, and reducing/mitigating user mistakes when operating/interacting with the device) which, additionally, reduces power usage and improves battery life of the device by enabling the user to use the device more quickly and efficiently.

In some embodiments, in accordance with a determination that the swipe gesture meets the third movement criteria, the device displays (1920) the dock overlaid on the home screen. For example, dock 5946 is displayed over the home screen in FIG. 5H12. In some embodiments, when navigating to the home screen, first movement criteria are met prior to third movement criteria being met and the dock is displayed before the home screen is displayed (e.g., after first movement criteria are met, the dock is pulled-up from below the display screen while the user interface of the application is displayed, and then third movement criteria are met resulting in display of the home screen). For example, dock 5946 is displayed in FIG. 5H10, before the home screen is displayed in FIG. 5H12 because first movement criteria are met (e.g., in FIGS. 5H9-5H10) before third movement criteria are met (e.g., in FIGS. 5H11-5H12).

Maintaining display of a dock after navigating to a home screen user interface enhances the operability of the device and makes the user-device interface more efficient (e.g., by providing both the control options of the dock and the control options of the home screen user interface, by reducing the number of steps that are needed to achieve an intended outcome when operating the device, and reducing/mitigating user mistakes when operating/interacting with the device) which, additionally, reduces power usage and improves battery life of the device by enabling the user to use the device more quickly and efficiently.

In some embodiments, in response to detecting the swipe gesture from the edge of the touch-sensitive display, in accordance with a determination that the swipe gesture meets the first movement criteria, the device animates (1908) the initial display of the dock in accordance with further movement of the swipe gesture that is made after the first movement criteria have been met (e.g., pulling the dock further upward onto the display with continued movement of the first contact away from the bottom edge of the display). For example, dock 5946 is gradually displayed from the bottom of the display in FIGS. 5H2-5H3 in accordance with upward movement 5944 of contact 5942.

Displaying an animated transition of the dock appearance provides improved feedback, enhances the operability of the device, and makes the user-device interface more efficient (e.g., by providing visual feedback to the user, thereby helping the user to achieve an intended outcome when operating the device and reducing user mistakes when operating/interacting with the device) which, additionally, reduces power usage and improves battery life of the device by enabling the user to use the device more quickly and efficiently.

In some embodiments, while continuing to detect the swipe gesture from the edge of the touch-sensitive display, the device dynamically adjusts (1930) the size of the user interface of the application in accordance with movement of the swipe gesture (e.g., the application shrinks as the contact moves away from the edge of the display and grows as the contact moves back towards the edge of the display). For example, as contact 5968 moves away from the bottom of the display, from position 5968-*b*, in FIG. 5H10, to position 5968-*c*, in FIG. 5H11, application view 5954 becomes smaller. In some embodiments, after the swipe gesture is first detected, and prior to determining that the input meets the second and/or third criteria, replacing display of the user interface of the application with a replacement user interface that includes an application view of the user interface of the application (e.g., a transitional user interface that allows the user to navigate to a plurality of different user interfaces on that portion of the display, for example, an application switcher user interface, a previous/next application user interface, or a home screen, in accordance an evaluation of the swipe gesture against different navigation criteria corresponding to the different user interfaces, e.g., a comparison of a set of one or more properties of the swipe gesture to a corresponding set of thresholds corresponding to the different user interfaces).

Dynamically adjusting the size of the user interface in accordance with movement of the swipe gesture enhances the operability of the device and makes the user-device interaction more efficient (e.g., by providing real-time information about the internal state of the device, by helping the user to achieve a desired outcome with the required inputs, and by reducing/mitigating user mistakes when operating/interacting with the device), which, additionally, reduces power usage and improves the battery life of the device (e.g., by helping the user to use the device more quickly and efficiently).

In some embodiments, in response to detecting the swipe gesture (e.g., where swipe gesture criteria require that the input includes a threshold amount of movement from the edge of the touch-sensitive display in order for the swipe gesture criteria to be met) from the edge of the touch-sensitive display, in accordance with a determination that a dock is already displayed overlaid on the user interface of the application, the device dynamically adjusts (1932) the size of the user interface of the application in accordance with movement of the swipe gesture (e.g., immediately, as soon as the input is recognized as a swipe gesture meeting the swipe gesture criteria). And, in accordance with a determination that a dock is not displayed overlaid on the user interface of the application, the device delays (1934) the dynamic adjustment of the size of the user interface of the application in accordance with movement of the swipe gesture until a dock is displayed overlaid on the user interface of the application (e.g., until the dock is displayed fully in response to an initial portion of the swipe gesture). For example, because dock 5946 is not displayed over the interactive map user interface in FIG. 5H5, device 100 delays replacing the user interface with application view 5954 (e.g., waits to adjust the size of the user interface), until dock 5946 is displayed in FIG. 5H6 (e.g., and contact 5950 crosses positional threshold 5948. In contrast, because dock 5956 is already displayed over the interactive map user interface in FIG. 5H18, device 100 does not delay replacing the user interface with application view 5954 in FIG. 5H19 (e.g., the size of the interactive map user interface is adjusted before contact 5978 crosses positional threshold 5948).

Delaying the dynamic adjustment of the user interface until after the dock has been displayed provides improved feedback, enhances the operability of the device, and makes the user-device interface more efficient (e.g., by avoiding animation/navigation that is unintended by the user, by providing visual feedback to the user, thereby helping the user to achieve an intended outcome when operating the device and reducing/mitigating user mistakes when operating/interacting with the device) which, additionally, reduces power usage and improves battery life of the device by enabling the user to use the device more quickly and efficiently.

In some embodiments, the first movement criteria are met (1910) when the swipe gesture includes a first threshold amount of movement (e.g., 1/10 of the display height) from the edge of the display followed by less than a predefined movement-tolerance threshold (e.g., movement threshold for detecting a substantially stationary contact) for at least a threshold amount of time (e.g., the first movement criteria are met by a drag and hold gesture near the edge of the screen). For example, dock 5946 is displayed in response to a short drag gesture including movement 5944 of contact 5942 from position 5942, in FIG. 5H1, to position 5942-*c*, in FIG. 5H3. In some embodiments, the first movement criteria require that the swipe gesture includes at least a first threshold amount of movement away from the edge of the screen in order for the first movement criteria to be met, regardless of whether liftoff (e.g., termination) of the gesture occurs). In some embodiments, a short swipe and hold gesture causes the dock to be displayed and maintained at the end of the swipe gesture, while a short swipe without the hold causes the dock to be displayed temporarily or partially and to retract after the swipe gesture terminates.

Displaying the dock in response to detecting a short drag and hold provides improved feedback, enhances the operability of the device, and makes the user-device interface more efficient (e.g., by reducing the number of steps that are needed to achieve an intended outcome when operating the device and reducing/mitigating user mistakes when operating/interacting with the device) which, additionally, reduces power usage and improves battery life of the device by enabling the user to use the device more quickly and efficiently.

In some embodiments, the second movement criteria are met (1916) when the swipe input includes a second threshold amount of movement (e.g., the second movement criteria are met by a drag gesture terminating near the middle of the display) (e.g., the second threshold amount of movement away from the edge of the screen is greater than the first threshold amount of movement necessary to meet the first movement criteria). For example, the application-switcher user interface is displayed in FIG. 5H8 because a medium-length swipe gesture, including movement 5950 of contact 5952 from position 5950-*a*, in FIG. 5H5, to position 5950-*c*, in FIG. 5H7, crossed positional threshold 5948 located further from the bottom edge of the display than the positional threshold satisfied to cause display of dock 5046 in FIG. 5H6.

In some embodiments, application-switcher-interface-navigation criteria (e.g., the second movement criteria) requires that liftoff of the contact is detected when the assigned current target state of a transitional user interface is an application-switching user interface, e.g., as determined with reference to FIGS. 16A-16D and/or FIGS. 17A-17C. For example, in some embodiments, application-switcher-interface-navigation criteria include that the input meets a first X-velocity threshold, is substantially horizontal, and does not meet a Y-position threshold, e.g., meeting sub-criteria 1614, but not sub-criteria 1618 or sub-criteria 1620, of criteria 160*x*4 in FIG. 16B, when criteria 160*x*2 and 160*x*3 were not met, for example, a velocity falling within area III or IV in FIG. 17A, immediately prior to detecting liftoff of the contact. Similarly, in some embodiments, application-switcher-interface-navigation criteria include that the input has no more than a minimal X-velocity and Y-velocity, e.g., meeting criteria 160*x*6 in FIG. 16B, when none of criteria 160*x*2 through 160*x*5 were met, for example, a velocity falling within velocity boundary 1710 in FIG. 17A, immediately prior to detecting liftoff of the contact. Similarly, in some embodiments, application-switcher-interface-navigation criteria include that the input does not have a downward velocity or meet a third X-position threshold, e.g., failing sub-criteria 1632 and 1634 of criteria 160*x*8 in FIG. 16B, immediately prior to detecting liftoff of the contact.

Allowing navigation to an application-switcher user interface in response to detecting a medium-length swipe gesture from the bottom of the display enhances the operability of the device and makes the user-device interface more efficient (e.g., by providing an easy navigation function, by helping the user to achieve an intended outcome with fewer required inputs, and by reducing user mistakes when operating/interacting with the device) which, additionally, reduces power usage and improves battery life of the device by enabling the user to use the device more quickly and efficiently.

In some embodiments, the third movement criteria are met (1922) when the swipe gesture includes at least a nominal threshold amount of movement (e.g., a movement-detection threshold) and is terminated with at least a first threshold speed (e.g., the third movement criteria are met by a short swipe gesture having more than a threshold amount of velocity) (e.g., a flick gesture having a high velocity). For example, if contact 5942 would have had a high velocity when lifted-off in between FIGS. 5H3-5H4, the device would have displayed a home screen in FIG. 5H4, rather than maintaining display of the interactive map user interface. In some embodiments, the high velocity of a flick gesture overrides any movement thresholds, e.g., where third movement criteria are met when the swipe gesture includes a third threshold amount of movement that is greater than the first and second threshold amounts of movements, detection of a high velocity threshold bypasses the requirement for the third threshold amount of movement, such that gestures that include less than the second threshold amount of movement, or possibly even less than the first threshold amount of movement, still satisfy the third criteria for navigating home.

Allowing navigation to a home screen user interface in response to detecting an upwards flick gesture from the bottom of the display enhances the operability of the device and makes the user-device interface more efficient (e.g., by providing an easy navigation function, by helping the user to achieve an intended outcome with fewer required inputs, and by reducing user mistakes when operating/interacting with the device) which, additionally, reduces power usage and improves battery life of the device by enabling the user to use the device more quickly and efficiently.

In some embodiments, the third movement criteria are met (1924) when the swipe gesture includes a third threshold amount of movement (e.g., the third movement criteria are met by a drag gesture terminating near the top of the display). In some embodiments, the third threshold amount of movement away from the edge of the screen is greater than the first threshold and second threshold amounts of movement necessary to meet the first and second criteria, respectively. For example, the home screen is displayed in FIG. 5H12 because a long swipe gesture, including movement 5970 of contact 5968 from position 5968-*a*, in FIG. 5H9, to position 5968-*c*, in FIG. 5H11, crossed positional threshold 5958 located further from the bottom edge of the display than positional threshold 5948 associated with satisfaction of the second movement criteria.

In some embodiments, home-navigation criteria (e.g., the third movement criteria) requires that liftoff of the contact is detected when the assigned current target state of a transitional user interface is an application-switching user interface, e.g., as determined with reference to FIGS. 16A-17D and/or FIGS. 17A-17C. For example, in some embodiments, home-navigation criteria include that the input meets a first Y-velocity threshold or a second Y-velocity threshold when movement is substantially upwards, e.g., meeting criteria

160*x*2 in FIG. 16B, for example, a velocity falling within area I or II in FIG. 17A, immediately prior to detecting liftoff of the contact. Similarly, in some embodiments, home-navigation criteria include that the input meets a Y-positional threshold, e.g., meeting criteria 160*x*3 in FIG. 16B, for example, having a position past first Y-positional threshold 1716 in FIG. 17B, immediately prior to detecting liftoff of the contact.

Allowing navigation to a home screen user interface in response to detecting a long swipe gesture from the bottom of the display enhances the operability of the device and makes the user-device interface more efficient (e.g., by providing an easy navigation function, by helping the user to achieve an intended outcome with fewer required inputs, and by reducing user mistakes when operating/interacting with the device) which, additionally, reduces power usage and improves battery life of the device by enabling the user to use the device more quickly and efficiently.

In some embodiments, in response to detecting the swipe gesture from the edge of the touch-sensitive display, in accordance with a determination that the swipe gesture meets fourth movement criteria, where the fourth movement criteria require that a dock is displayed on the touch-sensitive display when the swipe gesture is detected and that a first threshold amount of movement in a direction horizontal to the edge of the touch-sensitive display (e.g., a threshold amount of movement in a direction substantially parallel to the edge of the touch-screen display that the swipe gesture started from while having less than a second threshold movement in a direction away (e.g., substantially perpendicular to the edge of the touch-screen display)) is detected in order for the fourth movement criteria to be met, the device replaces display (1926) of the user interface of the application with a user interface of another application that was previously displayed (e.g., a user interface for the last active application on the device). For example, device 100 replaces display of the interactive map user interface with the email user interface, in FIG. 5H27, in response to the arc gesture including movement 5990 of contact 5988 in a substantially horizontal direction, in FIGS. 5H25-5H26.

In some embodiments, the fourth movement criteria require that liftoff of the contact is detected when the assigned current target state of a transitional user interface is a next/previous application user interface, e.g., as determined with reference to FIGS. 16A-16D and/or FIGS. 17A-17C. For example, in some embodiments, next/previous-application-interface-navigation criteria (e.g., the fourth movement criteria) include that the input meets a first X-velocity threshold, has a projected downward position or meet a first Y-position threshold, and not include a direction shift after a threshold amount of movement, e.g., meeting sub-criteria 1614 and either or both of 1618 and 1620, but not 1621 of criteria 160*x*4 in FIG. 16B, when criteria 160*x*2 and 160*x*3 were not met, for example, a velocity falling within area VI or VII in FIG. 17A, immediately prior to detecting liftoff of the contact. Similarly, in some embodiments, next/previous-application-interface-navigation criteria include that the input meets a second X-positional threshold with less than a minimal amount of Y-translation, e.g., meeting criteria 160*x*5 in FIG. 16B, when none of criteria 160*x*2 through 160*x*4 were met, immediately prior to detecting liftoff of the contact. Similarly, in some embodiments, next/previous-application-interface-navigation criteria include that the input has either a downward Y-velocity or meets a third X-position threshold, but is not a first swipe in a compound gesture, e.g., meeting either of sub-criteria 1632 or 1634, but not sub-criteria 1633, of criteria 160*x*8 in FIG. 16B, when none of criteria 160*x*2 through 160*x*7 were met, immediately prior to detecting liftoff of the contact. Similarly, in some embodiments, next/previous-application-interface-navigation criteria include that the input has either a downward Y-velocity or meets a third X-position threshold, is a first swipe, and meets an X-positional threshold, e.g., meeting criteria 160*x*8 in FIG. 16B, when none of criteria 160*x*2 through 160*x*7 were met, immediately prior to detecting liftoff of the contact.

Allowing navigation to a previously displayed application user interface in response to detecting a sideways gesture from the bottom of the display enhances the operability of the device and makes the user-device interface more efficient (e.g., by providing an easy navigation function, by helping the user to achieve an intended outcome with fewer required inputs, and by reducing user mistakes when operating/interacting with the device) which, additionally, reduces power usage and improves battery life of the device by enabling the user to use the device more quickly and efficiently.

In some embodiments, in response to detecting the swipe gesture from the edge of the touch-sensitive display, in accordance with a determination that the swipe gesture meets the fourth movement criteria, the device ceases display (1928) of the dock on the touch-sensitive display. For example, dock 5946 is not displayed over the email user interface in FIG. 5H27, after navigation from the interactive map user interface, in FIG. 5H25, over which dock 5946 was displayed. In some embodiments, when switching between previously active applications, the dock does not remain displayed, while the dock does remain displayed when navigating to an application switcher user interface or to a home screen.

Hiding display of the dock after navigating to a previously displayed application user interface enhances the operability of the device and makes the user-device interface more efficient (e.g., by allowing the user to focus on the previously displayed application user interface without cluttering the user interface with additional displayed controls, by helping the user to achieve an intended outcome with fewer required inputs, and by reducing user mistakes when operating/interacting with the device) which, additionally, reduces power usage and improves battery life of the device by enabling the user to use the device more quickly and efficiently.

It should be understood that the particular order in which the operations in FIGS. 19A-19C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1050, 1100, 1200, 1300, 1400, 1500, 1600, and 1800) are also applicable in an analogous manner to method 1900 described above with respect to FIGS. 19A-19C. For example, the contacts, gestures, user interface objects, application views, control panels, controls, position thresholds, directional conditions, navigation criteria, movement parameters, thresholds, determinations, focus selectors, and/or animations described above with reference to method 1900 optionally have one or more of the characteristics of the contacts, gestures, user interface objects, application views, control panels, controls, position thresholds, directional conditions, navigation criteria, movement parameters, thresholds, determinations, focus selectors, and/or animations described herein with reference to other methods described herein (e.g., methods 600, 700, 800, 900, 1000, 1050, 1100, 1200, 1300, 1400, 1500, 1600, and 1800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 19A-19C are, optionally, implemented by components depicted in FIGS. 1A-1B. For example, display operation 1902, detection operation 1904, display operation 1906, animation operation 1908, replacement operation 1912, display operation 1914, replacement operation 1918, display operation 1920, replacement operation 1926, and display operation 1928 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device having a display and a touch-sensitive surface:
displaying a first user interface of a first application on the display;
while displaying the first user interface of the first application on the display, detecting an input by a first contact, including detecting touch-down of the first contact at a first location on the touch-sensitive surface, detecting first movement of the first contact across the touch-sensitive surface from the first location on the touch-sensitive surface, and detecting liftoff of the first contact at an end of the first movement, and
in response to detecting the input by the first contact:
in accordance with a determination that the input meets last-application-display criteria, wherein the last-application-display criteria require that the first movement of the first contact from the first location on the touch-sensitive surface meets a first directional condition in order for the last-application-display criteria to be met, displaying a second user interface of a second application that is distinct from the first application; and
in accordance with a determination that the input meets home-display criteria, wherein the home-display criteria require that the first movement of the first contact from the first location on the touch-sensitive surface meets a second directional condition that is distinct from the first directional condition in order for the home-display criteria to be met, displaying a home screen user interface that includes a plurality of application launch icons that correspond to a plurality of applications installed on the electronic device, wherein:
the first movement of the first contact includes movement of the first contact from the first location to a second location across the touch-sensitive surface, followed by movement of the first contact away from the second location across the touch-sensitive surface;
the method includes, in response to detecting the input by the first contact, moving a representation of the first user interface of the first application to a first updated position on the display in accordance with the movement of the first contact from the first location to the second location across the touch-sensitive surface;
displaying the second user interface of the second application in accordance with the determination that the input meets the last-application-display criteria includes transitioning from displaying the representation of the first user interface of the first application at the first updated position on the display to displaying the second user interface of the second application in accordance with the determination that the input meets the last-application-display criteria; and
displaying the home screen user interface in accordance with the determination that the input meets the home-display criteria includes transitioning from displaying the representation of the first user interface of the first application at the first updated position on the display to displaying the home screen user interface in accordance with the determination that the input meets the home-display criteria.

2. The method of claim 1, wherein the first contact is detected within a predefined edge region of the touch-sensitive surface, and an initial portion of the first movement includes movement in a vertical direction and movement in a horizontal direction relative to a predefined edge of the touch-sensitive surface.

3. The method of claim 1, including:
in response to detecting the input by the first contact:
in accordance with a determination that the input meets application-switcher-display criteria that are distinct from the home-display criteria and the last-application-display criteria, wherein the application-switcher-display criteria require that the first movement meets the second directional condition in order for the application-switcher-display criteria to be met, displaying an application-switcher user interface that includes a first application view that corresponds to the first user interface of the first application and a second application view that corresponds to a second user interface of a second application that is different from the first application.

4. The method of claim 3, wherein the application-switcher-display criteria include a first criterion that is met when the first movement includes a predefined pause and the first contact makes less than a first threshold amount of movement after the predefined pause.

5. The method of claim 3, wherein:

the application-switcher-display criteria include a second criterion that is met when a predefined movement parameter of the first movement is in a first value range; and the home-display criteria include a third criterion that is met when the predefined movement parameter of the first movement is in a second value range that is different from the first value range.

6. The method of claim 3, wherein:

the application-switcher-display criteria include a criterion that is met when lateral movement and vertical movement of the first contact during the first movement meet a first requirement; and the last-application-display criteria include a criterion that is met when the lateral movement and the vertical movement of the first contact during the first movement meet a second requirement that is different from the first requirement.

7. The method of claim 3, including:

before displaying the application-switcher user interface, displaying the first application view in accordance with a determination that the first movement meets the second directional condition; and moving the first application view in accordance with movement of the first movement of the first contact.

8. The method of claim 7, wherein:

the application-switcher-display criteria include a criterion that is met when a predefined projected position of the first application view after lift-off of the first contact is in a first predefined region of the display; and the last-application-display criteria include a criterion that is met when the predefined projected position of the first application view after lift-off of the first contact is in a second predefined region of the display that is distinct from the first predefined region.

9. The method of claim 8, including:

in response to detecting the input by the first contact:

in accordance with a determination that the input meets control-panel-display criteria, wherein the control-panel-display criteria include a criterion that is met when the first movement meets a third directional condition that is different from the first directional condition and the second directional condition in order for the third directional condition to be met, displaying a control panel user interface that includes a plurality of controls that correspond to a plurality of system functions of the electronic device.

10. The method of claim 9, wherein:

the control-panel-display criteria include a criterion that is met when the predefined projected position of the first application view after lift-off of the first contact is in a third predefined region of the display that is distinct from the first predefined region and the second predefined region.

11. The method of claim 1, including:

while displaying the second user interface of the second application in response to detecting the input by the first contact, detecting a second input by a second contact, including detecting the second contact on the touch-sensitive surface, detecting second movement of the second contact across the touch-sensitive surface, and detecting liftoff of the second contact at an end of the second movement; and in response to detecting the second input:

in accordance with a determination that the second input meets the last-application-display criteria, redisplaying the first user interface or displaying a third user interface of a third application that is distinct from the first application and the second application.

12. The method of claim 11, wherein:

in accordance with a determination that resorting criteria are met, wherein the resorting criteria include a criterion that is met when a threshold amount of time has elapsed between detection of the second contact and lift-off of the first contact, the first user interface is redisplayed in response to the second input; and in accordance with a determination that the resorting criteria are not met, the third user interface is displayed in response to the second input.

13. The method of claim 12, including:

in response to detecting the second input:

in accordance with a determination that the second movement meets a third directional condition that is a reverse of the first directional condition:

in accordance with a determination that the resorting criteria are met, displaying a control panel user interface that includes a plurality of controls that correspond to a plurality of system functions of the electronic device; and in accordance with a determination that the resorting criteria are not met, redisplaying the first user interface.

14. The method of claim 1, including:

in response to detecting the first movement by the first contact:

concurrently displaying at least a portion of the first user interface and a portion of the second user interface in a first display layer during at least a portion of the first movement of the first contact; and displaying the home screen user interface in a second display layer that is below the first display layer.

15. The method of claim 1, including:

while displaying the second user interface of the second application in response to detecting the input by the first contact, detecting a third input by a third contact, including detecting the third contact on the touch-sensitive surface, detecting third movement of the third contact across the touch-sensitive surface, and detecting liftoff of the third contact at an end of the third movement; and in response to detecting the third input:

in accordance with a determination that the first user interface is of a first orientation and the second user interface is of a second orientation that is different from the first orientation, and that the third movement meet modified-last-application-display criteria, wherein the modified-last-application-display criteria require that the third movement meets either the first directional condition or a reversed second directional condition in order for the modified-last-application-display criteria to be met:

displaying a user interface for a respective application that is below the second application in an application stack of the electronic device.

16. The method of claim 15, including:

in response to detecting the third input:

in accordance with a determination that the first user interface is of the first orientation and the second user interface is of the second orientation that is different from the first orientation, and that the third movement meet modified-home-display criteria, wherein the modified-home-display criteria require that the third movement meet either the first directional condition or the second directional condition in order for the modified-home-display criteria to be met:

displaying the home screen user interface.

17. The method of claim 16, including:

forgoing applying the modified-last-application-display criteria and the modified-home-display criteria to the third input in accordance with a determination that the third input is detected after a threshold amount of time of termination of the input by the first contact.

18. The method of claim 1, wherein: transitioning from displaying the representation of the first user interface of the first application at the first updated position on the display to displaying the second user interface of the second application includes displaying a first animated transition between displaying the representation of the first user interface of the first application at the first updated position on the display to displaying the second user interface of the second application in accordance with the determination that the input meets the last-application-display criteria; and transitioning from displaying the representation of the first user interface of the first application at the first updated position on the display to displaying the home screen user interface includes displaying a second animated transition between displaying the representation of the first user interface of the first application at the first updated position on the display to displaying the home screen user interface in accordance with the determination that the input meets the last-application-display criteria.

19. The method of claim 1, wherein:

the method includes, in response to detecting the input by the first contact, resizing a representation of the first user interface of the first application to a first updated size on the display in accordance with the movement of the first contact from the first location to the second location across the touch-sensitive surface;

displaying the second user interface of the second application in accordance with the determination that the input meets the last-application-display criteria includes transitioning from displaying the representation of the first user interface of the first application with the first updated size on the display to displaying the second user interface of the second application in accordance with the determination that the input meets the last-application-display criteria; and displaying the home screen user interface in accordance with the determination that the input meets the home-display criteria includes transitioning from displaying the representation of the first user interface of the first application with the first updated size on the display to displaying the home screen user interface in accordance with the determination that the input meets the home-display criteria.

20. The method of claim 19, wherein:

transitioning from displaying the representation of the first user interface of the first application with the first updated size on the display to displaying the second user interface of the second application includes displaying a first animated transition between displaying the representation of the first user interface of the first application with the first updated size on the display to displaying the second user interface of the second application in accordance with the determination that the input meets the last-application-display criteria; and transitioning from displaying the representation of the first user interface of the first application with the first updated size on the display to displaying the home screen user interface includes displaying a second animated transition between displaying the representation of the first user interface of the first application with the first updated size on the display to displaying the home screen user interface in accordance with the determination that the input meets the last-application-display criteria.

21. The method of claim 1, including:

in response to detecting the movement of the first contact from the first location to the second location across the touch-sensitive surface:

displaying a representation of the first user interface that is smaller than the first user interface; and displaying a representation of the home screen behind the representation of the first user interface on the display.

22. An electronic device, comprising:

a display;

a touch-sensitive surface;

one or more processors;

memory; and one or more programs, wherein the one or more programs are stored in the memory and configured to be executed by the one or more processors, the one or more programs including instructions for:

displaying a first user interface of a first application on the display;

while displaying the first user interface of the first application on the display, detecting an input by a first contact, including detecting touch-down of the first contact at a first location on the touch-sensitive surface, detecting first movement of the first contact across the touch-sensitive surface from the first location on the touch-sensitive surface, and detecting liftoff of the first contact at an end of the first movement, and in response to detecting the input by the first contact:

in accordance with a determination that the input meets last-application-display criteria, wherein the last-application-display criteria require that the first movement of the first contact from the first location on the touch-sensitive surface meets a first directional condition in order for the last-application-display criteria to be met, displaying a second user interface of a second application that is distinct from the first application; and in accordance with a determination that the input meets home-display criteria, wherein the home-display criteria require that the first movement meets a second directional condition that is distinct from the first directional condition in order for the home-display criteria to be met, displaying a home screen user interface that includes a plurality of application launch icons that correspond to a plurality of applications installed on the electronic device, wherein:

the first movement of the first contact includes movement of the first contact from the first location to a second location across the touch-sensitive surface, followed by movement of the first contact away from the second location across the touch-sensitive surface;

the one or more programs include instructions for, in response to detecting the input by the first contact, moving a representation of the first user interface of the first application to a first updated position on the display in accordance with the movement of the first contact from the first location to the second location across the touch-sensitive surface;

displaying the second user interface of the second application in accordance with the determination that the input meets the last-application-display criteria includes transitioning from displaying the representation of the first user interface of the first application at the first updated position on the display to displaying the second user interface of the second application in accordance with the determination that the input meets the last-application-display criteria; and displaying the home screen user interface in accordance with the determination that the input meets the home-display criteria includes transitioning from displaying the representation of the first user interface of the first application at the first updated position on the display to displaying the home screen user interface in accordance with the determination that the input meets the home-display criteria.

23. The electronic device of claim 22, wherein the first contact is detected within a predefined edge region of the touch-sensitive surface, and an initial portion of the first movement includes movement in a vertical direction and movement in a horizontal direction relative to a predefined edge of the touch-sensitive surface.

24. The electronic device of claim 22, wherein the one or more programs include instructions for:

in response to detecting the input by the first contact:

in accordance with a determination that the input meets application-switcher-display criteria that are distinct from the home-display criteria and the last-application-display criteria, wherein the application-switcher-display criteria require that the first movement meets the second directional condition in order for the application-switcher-display criteria to be met, displaying an application-switcher user interface that includes a first application view that corresponds to the first user interface of the first application and a second application view that corresponds to a second user interface of a second application that is different from the first application.

25. The electronic device of claim 24, wherein the application-switcher-display criteria include a first criterion that is met when the first movement includes a predefined pause and the first contact makes less than a first threshold amount of movement after the predefined pause.

26. The electronic device of claim 24, wherein:

the application-switcher-display criteria include a second criterion that is met when a predefined movement parameter of the first movement is in a first value range; and the home-display criteria include a third criterion that is met when the predefined movement parameter of the first movement is in a second value range that is different from the first value range.

27. The electronic device of claim 24, wherein:

the application-switcher-display criteria include a criterion that is met when lateral movement and vertical movement of the first contact during the first movement meet a first requirement; and the last-application-display criteria include a criterion that is met when the lateral movement and the vertical movement of the first contact during the first movement meet a second requirement that is different from the first requirement.

28. The electronic device of claim 24, wherein the one or more programs include instructions for:

before displaying the application-switcher user interface, displaying the first application view in accordance with a determination that the first movement meets the second directional condition; and moving the first application view in accordance with movement of the first movement of the first contact.

29. The electronic device of claim 28, wherein:

the application-switcher-display criteria include a criterion that is met when a predefined projected position of the first application view after lift-off of the first contact is in a first predefined region of the display; and the last-application-display criteria include a criterion that is met when the predefined projected position of the first application view after lift-off of the first contact is in a second predefined region of the display that is distinct from the first predefined region.

30. The electronic device of claim 29, wherein the one or more programs include instructions for:

in response to detecting the input by the first contact:

in accordance with a determination that the input meets control-panel-display criteria, wherein the control-panel-display criteria include a criterion that is met when the first movement meets a third directional condition that is different from the first directional condition and the second directional condition in order for the third directional condition to be met, displaying a control panel user interface that includes a plurality of controls that correspond to a plurality of system functions of the electronic device.

31. The electronic device of claim 30, wherein:

the control-panel-display criteria include a criterion that is met when the predefined projected position of the first application view after lift-off of the first contact is in a third predefined region of the display that is distinct from the first predefined region and the second predefined region.

32. The electronic device of claim 22, wherein the one or more programs include instructions for:

while displaying the second user interface of the second application in response to detecting the input by the first contact, detecting a second input by a second contact, including detecting the second contact on the touch-sensitive surface, detecting second movement of the second contact across the touch-sensitive surface, and detecting liftoff of the second contact at an end of the second movement; and in response to detecting the second input:

in accordance with a determination that the second input meets the last-application-display criteria, redisplaying the first user interface or displaying a third user interface of a third application that is distinct from the first application and the second application.

33. The electronic device of claim 32, wherein:

in accordance with a determination that resorting criteria are met, wherein the resorting criteria include a criterion that is met when a threshold amount of time has elapsed between detection of the second contact and lift-off of the first contact, the first user interface is redisplayed in response to the second input; and in accordance with a determination that the resorting criteria are not met, the third user interface is displayed in response to the second input.

34. The electronic device of claim 33, wherein the one or more programs include instructions for:

in response to detecting the second input:

in accordance with a determination that the second movement meets a third directional condition that is a reverse of the first directional condition:

in accordance with a determination that the resorting criteria are met, displaying a control panel user interface that includes a plurality of controls that correspond to a plurality of system functions of the electronic device; and in accordance with a determination that the resorting criteria are not met, redisplaying the first user interface.

35. The electronic device of claim 22, wherein the one or more programs include instructions for:

in response to detecting the first movement by the first contact:

concurrently displaying at least a portion of the first user interface and a portion of the second user interface in a first display layer during at least a portion of the first movement of the first contact; and displaying the home screen user interface in a second display layer that is below the first display layer.

36. The electronic device of claim 22, wherein the one or more programs include instructions for:

while displaying the second user interface of the second application in response to detecting the input by the first contact, detecting a third input by a third contact, including detecting the third contact on the touch-sensitive surface, detecting third movement of the third contact across the touch-sensitive surface, and detecting liftoff of the third contact at an end of the third movement; and in response to detecting the third input:

in accordance with a determination that the first user interface is of a first orientation and the second user interface is of a second orientation that is different from the first orientation, and that the third movement meet modified-last-application-display criteria, wherein the modified-last-application-display criteria require that the third movement meets either the first directional condition or a reversed second directional condition in order for the modified-last-application-display criteria to be met:

displaying a user interface for a respective application that is below the second application in an application stack of the electronic device.

37. The electronic device of claim 36, wherein the one or more programs include instructions for:

in response to detecting the third input:

in accordance with a determination that the first user interface is of the first orientation and the second user interface is of the second orientation that is different from the first orientation, and that the third movement meet modified-home-display criteria, wherein the modified-home-display criteria require that the third movement meet either the first directional condition or the second directional condition in order for the modified-home-display criteria to be met:

displaying the home screen user interface.

38. The electronic device of claim 37, wherein the one or more programs include instructions for:

forgoing applying the modified-last-application-display criteria and the modified-home-display criteria to the third input in accordance with a determination that the third input is detected after a threshold amount of time of termination of the input by the first contact.

39. The electronic device of claim 22, wherein:

transitioning from displaying the representation of the first user interface of the first application at the first updated position on the display to displaying the second user interface of the second application includes displaying a first animated transition between displaying the representation of the first user interface of the first application at the first updated position on the display to displaying the second user interface of the second application in accordance with the determination that the input meets the last-application-display criteria; and transitioning from displaying the representation of the first user interface of the first application at the first updated position on the display to displaying the home screen user interface includes displaying a second animated transition between displaying the representation of the first user interface of the first application at the first updated position on the display to displaying the home screen user interface in accordance with the determination that the input meets the last-application-display criteria.

40. The electronic device of claim 22, wherein:

the one or more programs include instructions for, in response to detecting the input by the first contact, resizing a representation of the first user interface of the first application to a first updated size on the display in accordance with the movement of the first contact from the first location to the second location across the touch-sensitive surface;

displaying the second user interface of the second application in accordance with the determination that the input meets the last-application-display criteria includes transitioning from displaying the representation of the first user interface of the first application with the first updated size on the display to displaying the second user interface of the second application in accordance with the determination that the input meets the last-application-display criteria; and displaying the home screen user interface in accordance with the determination that the input meets the home-display criteria includes transitioning from displaying the representation of the first user interface of the first application with the first updated size on the display to displaying the home screen user interface in accordance with the determination that the input meets the home-display criteria.

41. The electronic device of claim 40, wherein:

transitioning from displaying the representation of the first user interface of the first application with the first updated size on the display to displaying the second user interface of the second application includes displaying a first animated transition between displaying the representation of the first user interface of the first application with the first updated size on the display to displaying the second user interface of the second application in accordance with the determination that the input meets the last-application-display criteria; and transitioning from displaying the representation of the first user interface of the first application with the first updated size on the display to displaying the home screen user interface includes displaying a second animated transition between displaying the representation of the first user interface of the first application with the first updated size on the display to displaying the home screen user interface in accordance with the determination that the input meets the last-application-display criteria.

42. The electronic device of claim 22, wherein the one or more programs include instructions for:

in response to detecting the movement of the first contact from the first location to the second location across the touch-sensitive surface:

displaying a representation of the first user interface that is smaller than the first user interface; and displaying a representation of the home screen behind the representation of the first user interface on the display.

43. A non-transitory computer readable storage medium storing one or more programs, the one or more programs comprising instructions, which when executed by an electronic device with a display and a touch-sensitive surface, cause the electronic device to:

display a first user interface of a first application on the display;

while displaying the first user interface of the first application on the display, detect an input by a first contact, including detecting touch-down of the first contact on the touch-sensitive surface at a first location, detecting first movement of the first contact across the touch-sensitive surface from the first location on the touch-sensitive surface, and detecting liftoff of the first contact at an end of the first movement, and in response to detecting the input by the first contact:

in accordance with a determination that the input meets last-application-display criteria, wherein the last-application-display criteria require that the first movement of the first contact from the first location on the touch-sensitive surface meets a first directional condition in order for the last-application-display criteria to be met, display a second user interface of a second application that is distinct from the first application; and in accordance with a determination that the input meets home-display criteria, wherein the home-display criteria require that the first movement of the first contact from the first location on the touch-sensitive surface meets a second directional condition that is distinct from the first directional condition in order for the home-display criteria to be met, display a home screen user interface that includes a plurality of application launch icons that correspond to a plurality of applications installed on the electronic device, wherein:

the first movement of the first contact includes movement of the first contact from the first location to a second location across the touch-sensitive surface, followed by movement of the first contact away from the second location across the touch-sensitive surface;

the one or more programs include instructions for, in response to detecting the input by the first contact, moving a representation of the first user interface of the first application to a first updated position on the display in accordance with the movement of the first contact from the first location to the second location across the touch-sensitive surface;

displaying the second user interface of the second application in accordance with the determination that the input meets the last-application-display criteria includes transitioning from displaying the representation of the first user interface of the first application at the first updated position on the display to displaying the second user interface of the second application in accordance with the determination that the input meets the last-application-display criteria; and displaying the home screen user interface in accordance with the determination that the input meets the home-display criteria includes transitioning from displaying the representation of the first user interface of the first application at the first updated position on the display to displaying the home screen user interface in accordance with the determination that the input meets the home-display criteria.

44. The non-transitory computer readable storage medium of claim 43, wherein the first contact is detected within a predefined edge region of the touch-sensitive surface, and an initial portion of the first movement includes movement in a vertical direction and movement in a horizontal direction relative to a predefined edge of the touch-sensitive surface.

45. The non-transitory computer readable storage medium of claim 43, wherein the one or more programs include instructions for:

in response to detecting the input by the first contact:

in accordance with a determination that the input meets application-switcher-display criteria that are distinct from the home-display criteria and the last-application-display criteria, wherein the application-switcher-display criteria require that the first movement meets the second directional condition in order for the application-switcher-display criteria to be met, displaying an application-switcher user interface that includes a first application view that corresponds to the first user interface of the first application and a second application view that corresponds to a second user interface of a second application that is different from the first application.

46. The non-transitory computer readable storage medium of claim 45, wherein the application-switcher-display criteria include a first criterion that is met when the first movement includes a predefined pause and the first contact makes less than a first threshold amount of movement after the predefined pause.

47. The non-transitory computer readable storage medium of claim 45, wherein:

the application-switcher-display criteria include a second criterion that is met when a predefined movement parameter of the first movement is in a first value range; and the home-display criteria include a third criterion that is met when the predefined movement parameter of the first movement is in a second value range that is different from the first value range.

48. The non-transitory computer readable storage medium of claim 45, wherein:

the application-switcher-display criteria include a criterion that is met when lateral movement and vertical movement of the first contact during the first movement meet a first requirement; and the last-application-display criteria include a criterion that is met when the lateral movement and the vertical movement of the first contact during the first movement meet a second requirement that is different from the first requirement.

49. The non-transitory computer readable storage medium of claim 45, wherein the one or more programs include instructions for:

before displaying the application-switcher user interface, displaying the first application view in accordance with a determination that the first movement meets the second directional condition; and moving the first application view in accordance with movement of the first movement of the first contact.

50. The non-transitory computer readable storage medium of claim 49, wherein:

the application-switcher-display criteria include a criterion that is met when a predefined projected position of the first application view after lift-off of the first contact is in a first predefined region of the display; and the last-application-display criteria include a criterion that is met when the predefined projected position of the first application view after lift-off of the first contact is in a second predefined region of the display that is distinct from the first predefined region.

51. The non-transitory computer readable storage medium of claim 50, wherein the one or more programs include instructions for:

in response to detecting the input by the first contact:

in accordance with a determination that the input meets control-panel-display criteria, wherein the control-panel-display criteria include a criterion that is met when the first movement meets a third directional condition that is different from the first directional condition and the second directional condition in order for the third directional condition to be met, displaying a control panel user interface that includes a plurality of controls that correspond to a plurality of system functions of the electronic device.

52. The non-transitory computer readable storage medium of claim 51, wherein:

the control-panel-display criteria include a criterion that is met when the predefined projected position of the first application view after lift-off of the first contact is in a third predefined region of the display that is distinct from the first predefined region and the second predefined region.

53. The non-transitory computer readable storage medium of claim 43, wherein the one or more programs include instructions for:

while displaying the second user interface of the second application in response to detecting the input by the first contact, detecting a second input by a second contact, including detecting the second contact on the touch-sensitive surface, detecting second movement of the second contact across the touch-sensitive surface, and detecting liftoff of the second contact at an end of the second movement; and in response to detecting the second input:

in accordance with a determination that the second input meets the last-application-display criteria, redisplaying the first user interface or displaying a third user interface of a third application that is distinct from the first application and the second application.

54. The non-transitory computer-readable storage medium of claim 53, wherein:

in accordance with a determination that resorting criteria are met, wherein the resorting criteria include a criterion that is met when a threshold amount of time has elapsed between detection of the second contact and lift-off of the first contact, the first user interface is redisplayed in response to the second input; and in accordance with a determination that the resorting criteria are not met, the third user interface is displayed in response to the second input.

55. The non-transitory computer readable storage medium of claim 54, wherein the one or more programs include instructions for:

in response to detecting the second input:

in accordance with a determination that the second movement meets a third directional condition that is a reverse of the first directional condition:

in accordance with a determination that the resorting criteria are met, displaying a control panel user interface that includes a plurality of controls that correspond to a plurality of system functions of the electronic device; and in accordance with a determination that the resorting criteria are not met, redisplaying the first user interface.

56. The non-transitory computer readable storage medium of claim 43, wherein the one or more programs include instructions for:

in response to detecting the first movement by the first contact:

concurrently displaying at least a portion of the first user interface and a portion of the second user interface in a first display layer during at least a portion of the first movement of the first contact; and displaying the home screen user interface in a second display layer that is below the first display layer.

57. The non-transitory computer readable storage medium of claim 43, wherein the one or more programs include instructions for:

while displaying the second user interface of the second application in response to detecting the input by the first contact, detecting a third input by a third contact, including detecting the third contact on the touch-sensitive surface, detecting third movement of the third contact across the touch-sensitive surface, and detecting liftoff of the third contact at an end of the third movement; and in response to detecting the third input:

in accordance with a determination that the first user interface is of a first orientation and the second user interface is of a second orientation that is different from the first orientation, and that the third movement meet modified-last-application-display criteria, wherein the modified-last-application-display criteria require that the third movement meets either the first directional condition or a reversed second directional condition in order for the modified-last-application-display criteria to be met:

displaying a user interface for a respective application that is below the second application in an application stack of the electronic device.

58. The non-transitory computer readable storage medium of claim 57, wherein the one or more programs include instructions for:

in response to detecting the third input:

in accordance with a determination that the first user interface is of the first orientation and the second user interface is of the second orientation that is different from the first orientation, and that the third movement meet modified-home-display criteria, wherein the modified-home-display criteria require that the third movement meet either the first directional condition or the second directional condition in order for the modified-home-display criteria to be met:

displaying the home screen user interface.

59. The non-transitory computer-readable storage medium of claim 58, wherein the one or more programs include instructions for:

forgoing applying the modified-last-application-display criteria and the modified-home-display criteria to the third input in accordance with a determination that the third input is detected after a threshold amount of time of termination of the input by the first contact.

60. The non-transitory computer readable storage medium of claim 43, wherein:

transitioning from displaying the representation of the first user interface of the first application at the first updated position on the display to displaying the second user interface of the second application includes displaying a first animated transition between displaying the representation of the first user interface of the first application at the first updated position on the display to displaying the second user interface of the second application in accordance with the determination that the input meets the last-application-display criteria; and transitioning from displaying the representation of the first user interface of the first application at the first updated position on the display to displaying the home screen user interface includes displaying a second animated transition between displaying the representation of the first user interface of the first application at the first updated position on the display to displaying the home screen user interface in accordance with the determination that the input meets the last-application-display criteria.

61. The non-transitory computer readable storage medium of claim 43, wherein:

the one or more programs include instructions for, in response to detecting the input by the first contact, resizing a representation of the first user interface of the first application to a first updated size on the display in accordance with the movement of the first contact from the first location to the second location across the touch-sensitive surface;

displaying the second user interface of the second application in accordance with the determination that the input meets the last-application-display criteria includes transitioning from displaying the representation of the first user interface of the first application with the first updated size on the display to displaying the second user interface of the second application in accordance with the determination that the input meets the last-application-display criteria; and displaying the home screen user interface in accordance with the determination that the input meets the home-display criteria includes transitioning from displaying the representation of the first user interface of the first application with the first updated size on the display to displaying the home screen user interface in accordance with the determination that the input meets the home-display criteria.

62. The non-transitory computer readable storage medium of claim 61, wherein:

transitioning from displaying the representation of the first user interface of the first application with the first updated size on the display to displaying the second user interface of the second application includes displaying a first animated transition between displaying the representation of the first user interface of the first application with the first updated size on the display to displaying the second user interface of the second application in accordance with the determination that the input meets the last-application-display criteria; and transitioning from displaying the representation of the first user interface of the first application with the first updated size on the display to displaying the home screen user interface includes displaying a second animated transition between displaying the representation of the first user interface of the first application with the first updated size on the display to displaying the home screen user interface in accordance with the determination that the input meets the last-application-display criteria.

63. The non-transitory computer readable storage medium device of claim 43, wherein the one or more programs include instructions for:

in response to detecting the movement of the first contact from the first location to the second location across the touch-sensitive surface:

displaying a representation of the first user interface that is smaller than the first user interface; and displaying a representation of the home screen behind the representation of the first user interface on the display.

* * * * *